United States Patent [19]

Spangler et al.

[11] 4,012,725

[45] Mar. 15, 1977

[54] PROGRAMMABLE CALCULATOR

[75] Inventors: Richard M. Spangler; Eugene V. Burmeister; Frank E. Cada; Wayne F. Covington; Chris J. Christopher; Myles A. Judd; Freddie W. Wenninger; Robert E. Watson; Kent W. Simcoe, all of Loveland, Colo.

[73] Assignee: Hewlett-Packard Company, Palo Alto, Calif.

[22] Filed: May 30, 1974

[21] Appl. No.: 469,727

Related U.S. Application Data

[63] Continuation of Ser. No. 269,899, July 7, 1972, abandoned.

[52] U.S. Cl. .............................. 340/172.5; 235/152

[51] Int. Cl.² .................. G06F 15/40; G06F 15/02; G06F 3/14; G06F 7/38

[58] Field of Search ..... 340/172.5, 324 A, 324 AD; 235/156, 152

[56] References Cited

UNITED STATES PATENTS

| | | | |
|---|---|---|---|
| 3,248,705 | 4/1966 | Dammann | 340/172.5 |
| 3,355,714 | 11/1967 | Culler | 340/172.5 |
| 3,364,473 | 1/1968 | Reitz | 340/172.5 |
| 3,389,404 | 6/1968 | Koster | 340/172.5 |
| 3,501,746 | 3/1970 | Vosbury | 340/172.5 |
| 3,505,665 | 4/1970 | Lasoff | 340/324 |
| 3,581,290 | 5/1971 | Sugarman | 340/172.5 |
| 3,610,902 | 10/1971 | Rahenkamp | 340/172.5 |
| 3,618,032 | 11/1971 | Goldsberry | 340/172.5 |
| 3,648,245 | 3/1972 | Dodds | 340/172.5 |
| 3,699,531 | 10/1972 | Heiman | 340/172.5 |
| 3,760,171 | 9/1973 | Wang | 340/172.5 |
| 3,764,986 | 10/1973 | Spademan | 340/172.5 |

*Primary Examiner*—Gareth D. Shaw
*Assistant Examiner*—James D. Thomas
*Attorney, Agent, or Firm*—Roland I. Griffin; William E. Hein

[57] ABSTRACT

An adaptable programmable calculator is provided by employing a modular read-write and read-only memory unit capable of being expanded to provide the calculator with additional program and data storage functions oriented towards the environment of the user, a central processing unit capable of performing both serial binary and parallel binary-coded-decimal arithmetic, and an input-output control unit capable of bidirectionally transferring information between the memory or central processing units and a number of input and output units. The memory, central processor, and input-output control units are controlled by a microprocessor included in the central processing unit.

The input and output units include a keyboard input unit with a plurality of alphanumeric keys, a magnetic tape cassette reading and recording unit capable of bidirectionally transferring programs and data between a magnetic tape and the calculator and, a solid state output display unit capable of displaying every alphabetic and numeric character and many other symbols individually or in combination. All of these input and output units are included within the calculator itself. An output printer, an X-Y plotter, a typewriter, a teletypewriter, a magnetic or paper tape reading and recording unit, an extended read-write memory unit, a magnetic disc reading and recording unit, a modem for connecting the calculator via telephone lines to remotely located computer, and many other peripheral input and output units may also be employed with the calculator.

The calculator may be operated manually by the user from the keyboard input unit or automatically by a program stored within the memory unit to perform calculations and provide an output indication of the results thereof. It may also be employed to load programs into the memory unit from the keyboard input unit, to separately or collectively transfer data and programs bidirectionally between the memory unit and an external magnetic tape and to code programs or sections thereof stored in the memory unit as being secure when they are transferred to an external magnetic tape, thereby preventing users of the calculator from again transferring them to an external magnetic tape or obtaining any indication of the individual program steps once they are reloaded into the calculator. In addition, the calculator may be employed to edit programs stored in the memory unit and to print out program lists, labels, and messages.

The calculator employs an extended version of BASIC computer language and allows the user to enter a line comprising an alphanumeric statement into the calculator from the keyboard input unit while visually observing an alphanumeric display of that line to check for errors therein, permitting the user to case the entered lines to be immediately executed by the calculator or stored as part of a program within the memory unit, and permitting the user to subsequently recall the executed or stored line so that it may be reinspected, reevaluated, and, if necessary, edited and executed or re-executed, or restored in edited form. Any entered or recalled information may be edited by employing the keyboard input unit to selectively delete or replace incorrect or undesired portions of the information or to selectively insert corrected or previously omitted portions thereof on a line-by-line or character-by-character basis. Syntax errors are automatically detected by the calculator when the entered statement is terminated, and execution errors are automatically detected upon attempted execution of the statement or statements. Both types of errors are indicated to the user via error messages displayed by the output display unit. In the event the calculator is being used in combination ith an external printer, unit indications of syntax or execution errors may, if desired, be printed.

The calculator employs a compiler for converting each statement entered into the calculator in BASIC language into an internal stored format. It also employs an uncompiler for generating in the BASIC language statement any entered line converter to the internal stored format. The compiler and uncompiler operate on a line-by-line basis.

The magnetic tape cassette reading and recording unit employed in the calculator allows the user to chain together several program segments and allows program manipulation of several blocks of data on an individual basis, thereby providing more efficient utilization of the available calculator memory. An interrupt feature of the cassette unit facilitates searching for a particular file located on a magnetic tape at the same time the calculator is performing other functions.

41 Claims, 277 Drawing Figures

OVERALL BLOCK DIAGRAM OF FIRMWARE

Floating Point Add and Subtract

FLOATING POINT MULTIPLY

FLOATING POINT SQUARE ROOT

STORE ROUTINE

ATNF IS THE ARCTAN FLAG

THETL = ADDRESS OF LAST CORDIC CONSTANT -4

FNCFG IS THE FUNCTION FLAG
COUNT WILL HOLD THE INTEGER PART OF THE LN(10) RESOLUTION

FIG 22A
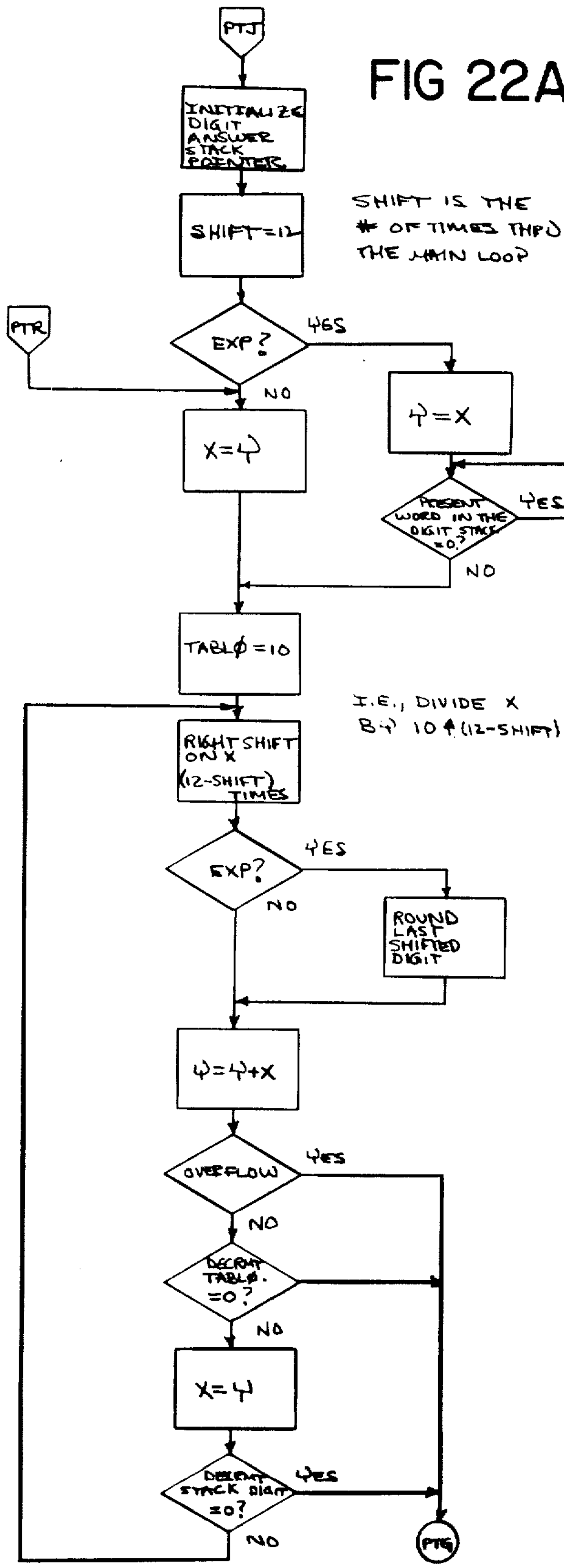
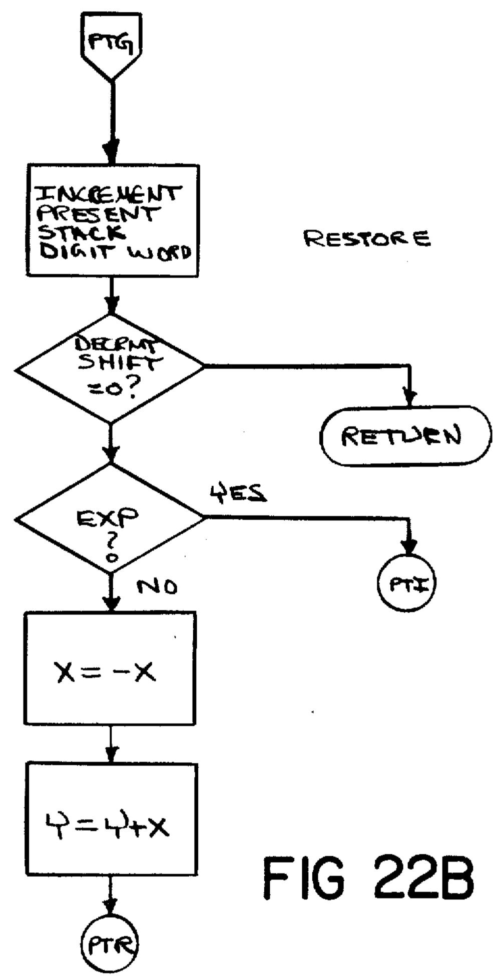
FIG 22B

SINE AND COSINE ROUTINE

INTERGER UPARROW

MICRO PROCESSOR

FIG 28'
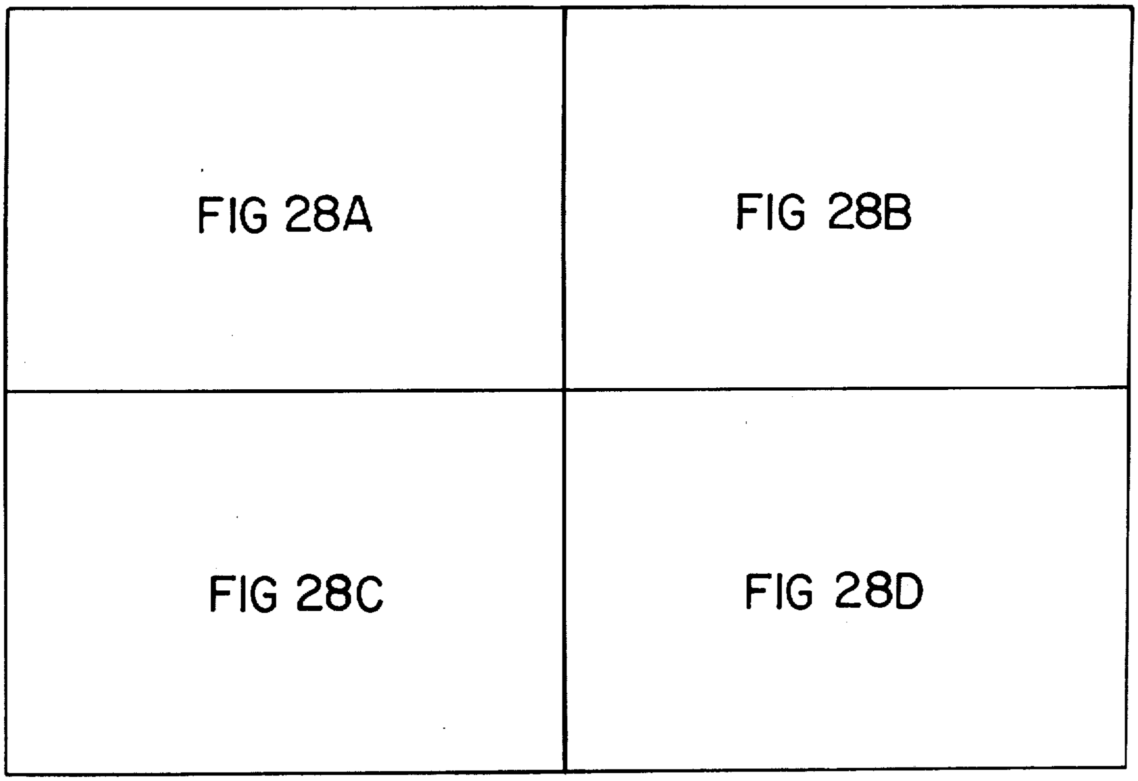
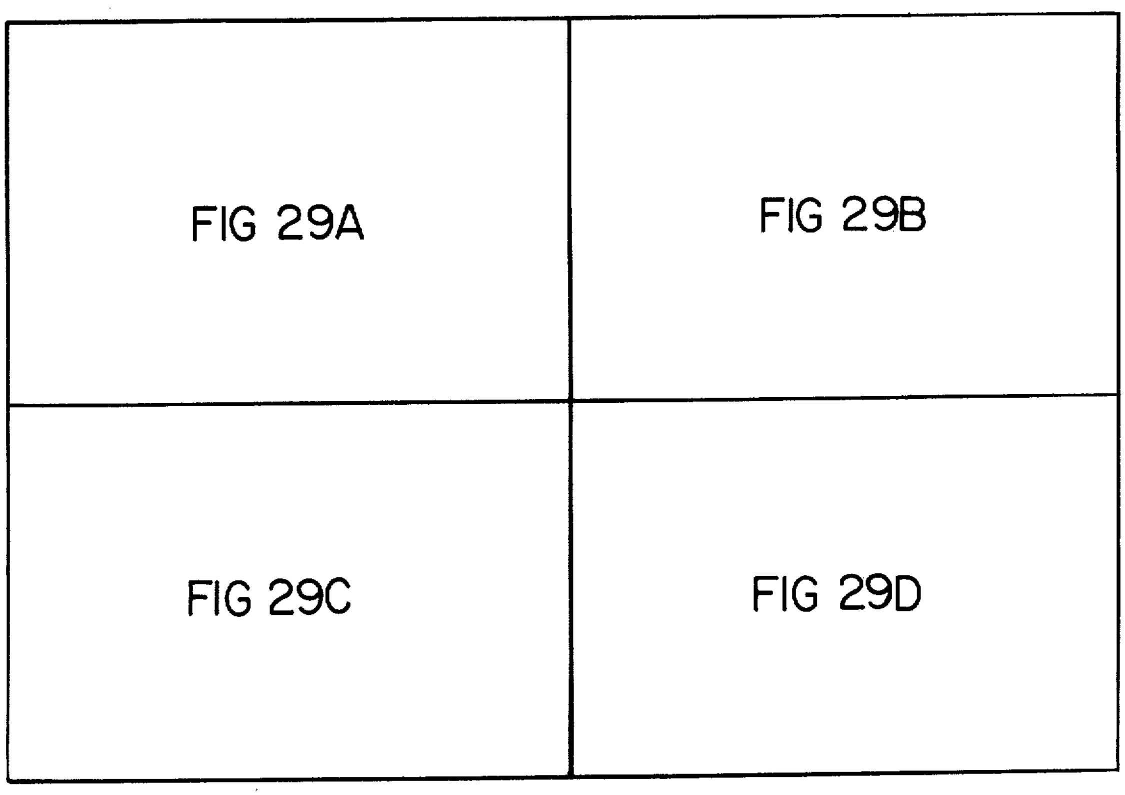
FIG 29'

| COMPONENT IC NO | SERIES NO | DESCRIPTION |
|---|---|---|
| 1 | SN7404 | 6-HEX INVERTERS |
| 2 | SN74H101 | J-K EDGE-TRIGGERED FLIP-FLOP |
| 3,12,13,14 | SN7495 | 4-BIT RIGHT-LEFT SHIFT REGISTER |
| 4 | SN74H10 | TRIPLE 3-INPUT 'NAND' GATE |
| 5 | SN74150 | DATA SELECTOR/MULTIPLEXERS |
| 6 | SN23703 | ROM |
| 7 | SN23704 | ROM |
| 8,9,16,17 | SN74H108 | DUAL J-K EDGE-TRIGGERED FLIP-FLOP |
| 10,18 | SN74155 | DUAL 2-LINE-TO-4-LINE DECODER |
| 11 | MC3001 | QUAD 2-INPUT 'AND' GATE |
| 15 | F932259 | QUAD DATA SELECTOR |
| 19 | SN23707 | ROM |
| 20 | SN23708 | ROM |
| 21 | SN23706 | ROM |
| 22 | SN23705 | ROM |
| 23 | SN23709 | ROM |

FIG 29''
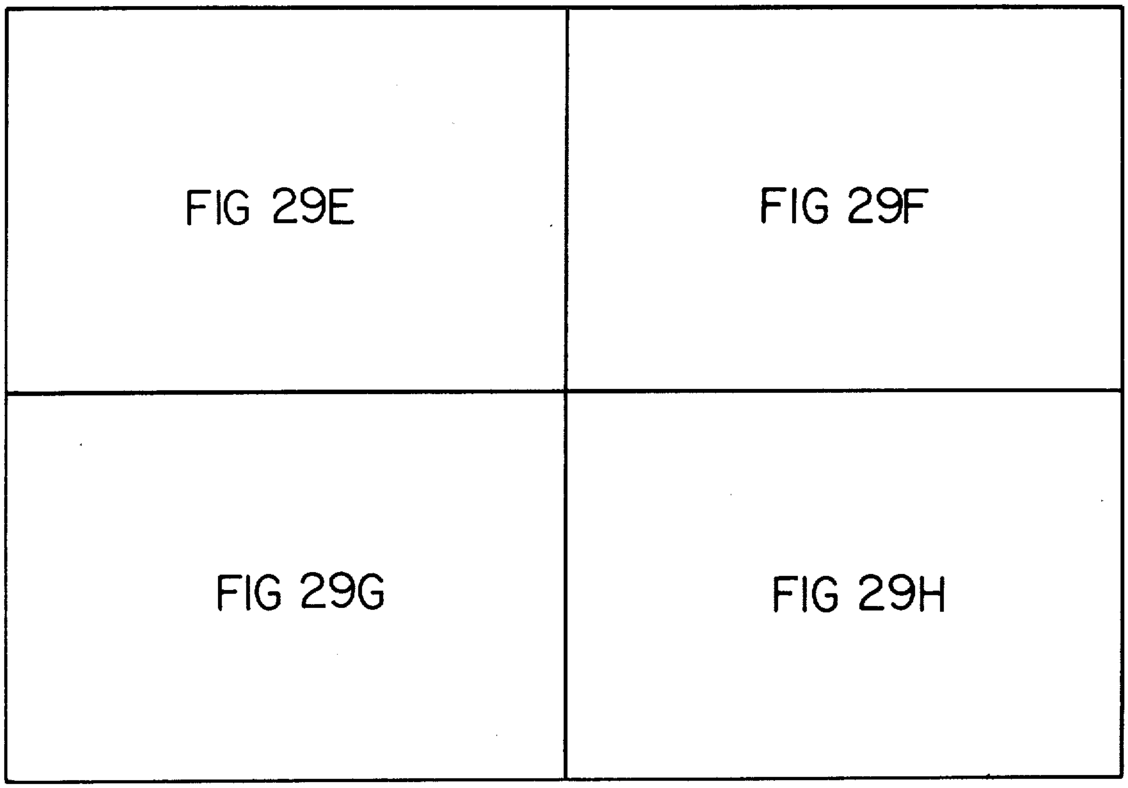
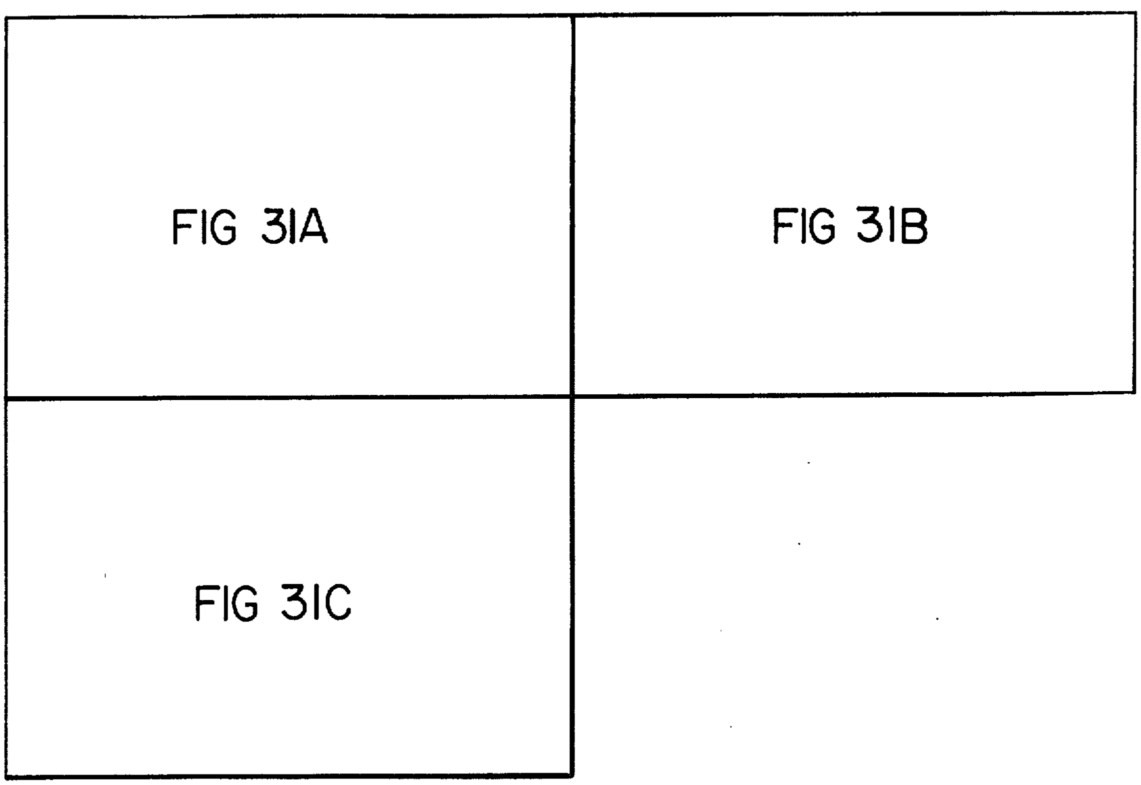
FIG 31'

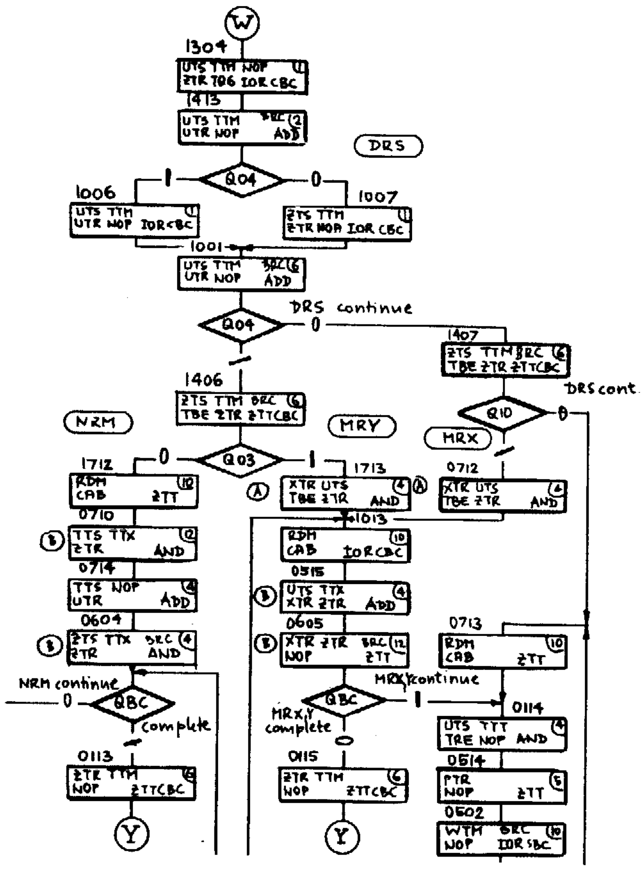

FIG 29F

① MAC-INSTRUCTION CODING TABLE:

| MNEMONIC | 15 | 14 | 13 | 12 | 11 | 10 | 9 | 8 | 7 | 6 | 5 | 4 | 3 | 2 | 1 | 0 | OCTAL |
|---|---|---|---|---|---|---|---|---|---|---|---|---|---|---|---|---|---|
| RET | 1 | 1 | 1 | 1 | 0 | 0 | 0 | 1 | 0 | 0 | 0 | 0 | 0 | 0 | 1 | 0 | 170402 |
| MOV | 1 | 1 | 1 | 1 | 0 | 0 | 0 | 0 | 0 | 0 | 0 | 0 | 0 | 0 | 1 | 0 | 170002 |
| CLR | 1 | 1 | 1 | 1 | 0 | 0 | 0 | 0 | 0 | 0 | 0 | 0 | 0 | 0 | 0 | 0 | 170000 |
| XFR | 1 | 1 | 1 | 1 | 0 | 0 | 0 | 0 | 0 | 0 | 0 | 0 | 0 | 1 | 0 | 0 | 170004 |
| MRY | 1 | 1 | 1 | 1 | 1 | 0 | 0 | 1 | 0 | 0 | 1 | 1 | 1 | 0 | 0 | 0 | 174470 |
| MLS | 1 | 1 | 1 | 1 | 0 | 0 | 1 | 1 | 0 | 0 | 0 | 0 | 0 | 0 | 0 | 0 | 171400 |
| DRS | 1 | 1 | 1 | 1 | 0 | 0 | 0 | 1 | 0 | 0 | 0 | 0 | 1 | 0 | 0 | 0 | 170410 |
| DLS | 1 | 1 | 1 | 1 | 1 | 0 | 1 | 1 | 0 | 0 | 0 | 0 | 0 | 0 | 0 | 0 | 175400 |
| FXA | 1 | 1 | 1 | 1 | 0 | 0 | 0 | 1 | 0 | 1 | 1 | 1 | 0 | 0 | 0 | 0 | 170560 |
| FMP | 1 | 1 | 1 | 1 | 0 | 0 | 1 | 1 | 0 | 0 | 1 | 1 | 0 | 0 | 0 | 0 | 171460 |
| FDV | 1 | 1 | 1 | 1 | 0 | 0 | 0 | 1 | 0 | 0 | 0 | 1 | 0 | 0 | 0 | 0 | 170420 |
| GMX | 1 | 1 | 1 | 1 | 1 | 0 | 0 | 1 | 0 | 0 | 0 | 0 | 0 | 0 | 0 | 0 | 174400 |
| CMY | 1 | 1 | 1 | 1 | 0 | 0 | 0 | 1 | 0 | 0 | 0 | 0 | 0 | 0 | 0 | 0 | 170400 |
| MDI | 1 | 1 | 1 | 1 | 0 | 0 | 0 | 1 | 0 | 1 | 1 | 0 | 0 | 0 | 0 | 0 | 170540 |
| NRM | 1 | 1 | 1 | 1 | 0 | 0 | 1 | 1 | 0 | 0 | 1 | 0 | 1 | 0 | 0 | 0 | 171450 |
| MRX | 1 | 1 | 1 | 1 | 1 | 0 | 0 | 1 | 0 | 0 | 0 | 1 | 1 | 0 | 0 | 0 | 174430 |

② USED DATA FORMAT:

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| M | se | exponent | | | | | | | | | | | | | | sm |
| M+1 | $D_1$ | | | | $D_2$ | | | | $D_3$ | | | | $D_4$ | | | |
| M+2 | $D_5$ | | | | $D_6$ | | | | $D_7$ | | | | $D_8$ | | | |
| M+3 | $D_9$ | | | | $D_{10}$ | | | | $D_{11}$ | | | | $D_{12}$ | | | |

$D_1$ ... most significant digit
$D_{12}$ ... least significant digit
se ... sign of exponent
sm ... sign of mantissa
Decimal point is located between $D_1$ and $D_2$

③ USED ADDRESSES AND CONSTANTS (OCTAL)

0001 counter constant address
1700 P-register contents storage
1777 stack-pointer address
1744 - 47 AR1 } arithmetic pseudoregisters
1754 - 57 AR2 } arithmetic pseudoregisters
043060 counter constant

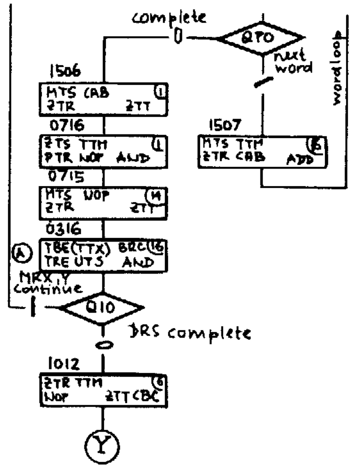

FIG 29H

INSTRUCTIONS

ADD – BINARY ADD • CARRY FLIP-FLOP + $R_{BUS}$ + $S_{BUS}$ TO $T_{BUS}$ – CARRY OUT TO CARRY FLIP-FLOP
AND – LOGICAL AND • R•S TO $T_{BUS}$
BCD – BCD ARITHMATIC MODE OF ALU
BRC – BRANCH INHIBIT 500 IF QNM
CAB – COMPLIMENT AB FLIP FLOP
IOR – INCLUSIVE OR R+S TO $T_{BUS}$
IOR•CBC – IOR, CLEAR BINARY CARRY FLIP-FLOP
IOR•SBC – IOR, SET BINARY CARRY FLIP-FLOP
IOS = PTR•XTR – INITIATES TRANSFER OF CONTROL TO I/O
IQN – INHIBIT SHIFT CLOCK IF QNM
MTS – TRANSFER $M_{REG}$ TO $S_{BUS}$
NOP – NO OPERATION ON XC INSTRUCTIONS
PTR – TRANSFER $P_{REG}$ TO $R_{BUS}$
QAB – $Q_{REG}$ (BIT 11) TO AB FLIP-FLOP
QTR – TRANSFER $Q_{REG}$ TO $R_{BUS}$
RDM – READ MEMORY (M) TO $T_{REG}$
TRE – TRANSFER $T_{BUS}$ TO $E_{REG}$ TO $R_{BUS}$
TQR = UTR•XTR – TRANSFER $Q_{REG}$ TO PRIMARY ADDRESS P
TRE – TRANSFER $T_{REG}$ TO $E_{REG}$ TO $R_{BUS}$
TTM – TRANSFER $T_{BUS}$ TO $M_{REG}$.
TTP – TRANSFER $T_{BUS}$ TO $P_{REG}$
TTQ – TRANSFER $T_{BUS}$ TO $Q_{REG}$
TTS – TRANSFER $T_{REG}$ TO $S_{BUS}$
TTT – TRANSFER $T_{BUS}$ TO $T_{REG}$
TTX – TRANSFER $T_{BUS}$ TO $A/B_{REG}$
TØ6•ZTR – TRANSFER $T_{BUS}$ TO $Q_{REG}$ (BIT 6)
UTR – ONE TO $R_{BUS}$
UTS – ONE TO $S_{BUS}$
WTM – STORE $T_{REG}$ IN MEMORY
XOR – EXCLUSIVE OR R⊕S TO $T_{BUS}$
XTR – $A/B_{REG}$ TO $R_{BUS}$
ZTR – ZERO TO $R_{BUS}$
ZTS – ZERO TO $S_{BUS}$
ZTT – ZERO TO $T_{BUS}$
ZTT•CBC – ZERO TO $T_{BUS}$, CLEAR BINARY CARRY FLIP-FLOP

| | |
|---|---|
| Q14•Q11 | → P04 |
| Q12 | → P05 |
| Q13 | → P06 |
| Q14 | → P07 |

PROGRAMMABLE CLOCK

TIMING WAVEFORMS — CENTRAL PROCESSOR

FIG 33'
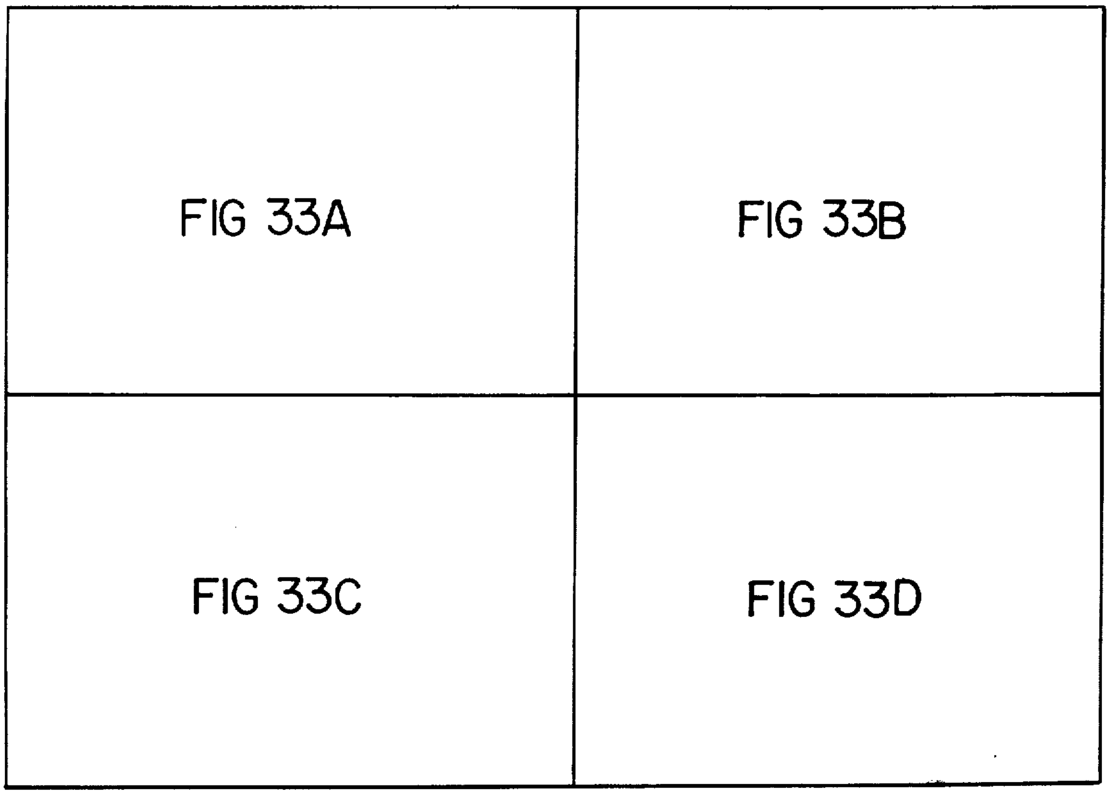
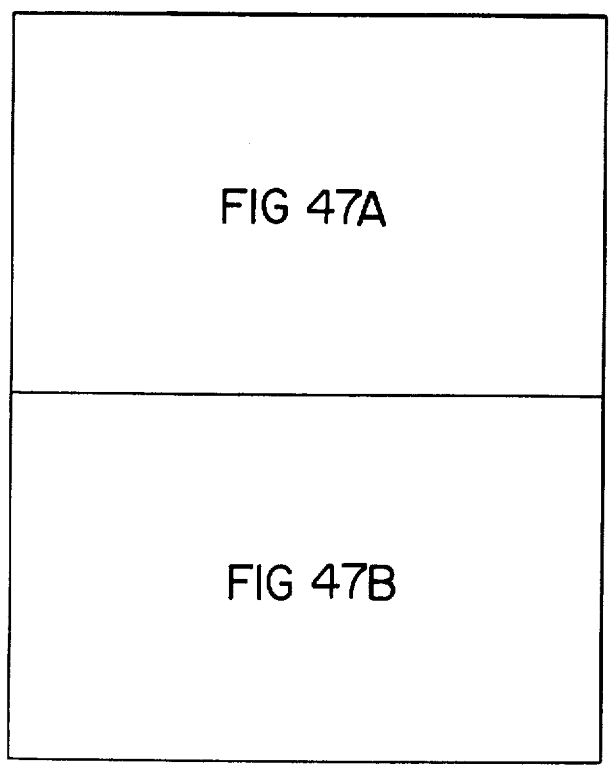
FIG 47'

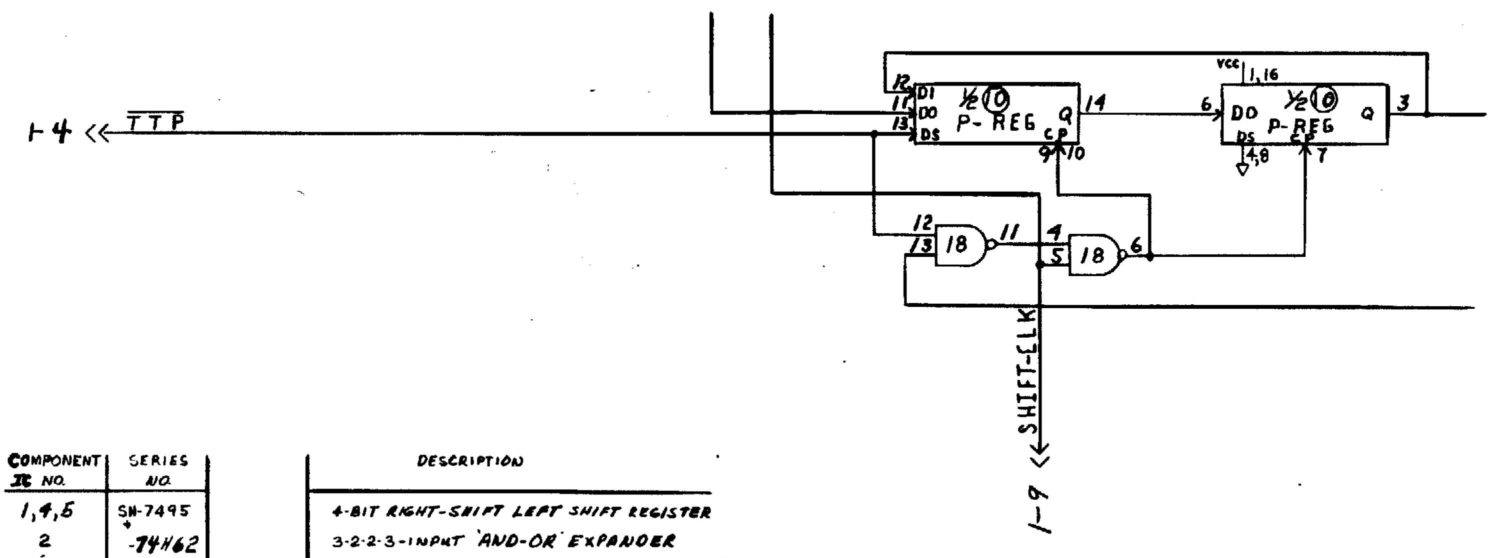

| COMPONENT IC NO. | SERIES NO. | DESCRIPTION |
|---|---|---|
| 1,4,5 | SN-7495 | 4-BIT RIGHT-SHIFT LEFT SHIFT REGISTER |
| 2 | -74H62 | 3-2-2-3-INPUT 'AND-OR' EXPANDER |
| 3 | -74H53 | EXPANDABLE 2-2-2-3-INPUT 'AND-OR' INVERTED GATE |
| 6 | -7491 | 8 BIT SHIFT REGISTER |
| 7, 13, 17, 18 | -74H00 | QUAD 2-INPUT 'NAND' GATES |
| 8 | MC-3001P | QUAD 2-INPUT 'AND' GATES |
| 9, 10 | F932859 | 8-BIT SHIFT REGISTER, DUAL |
| 11 | | BI-POLAR 'ROM' |
| 12 | SN-7474 | DUAL, EDGE-TRIGGERED FLIP-FLOPS |
| 14 | SN-74H21 | DUAL, 4-INPUT 'AND' GATES |
| 15 | MC3003P | QUAD, 2-INPUT 'OR' GATES |
| 16 | MC3002P | QUAD, 2-INPUT 'NOR' GATES |
| 19 | | BI-POLAR 'ROM' |
| 20 | SN74H01 | QUAD 2-INPUT 'NAND' GATE (OPEN COLLECTOR OUTPUT) |

FIG 33C

BINARY / BCD ARITH LOGIC UNIT

| MAXIMUM DEVICE CAPACITANCE | LINE |
|---|---|
| 20 PF | RWI |
| 12 PF | RWD |
| 144 PF | CEN BUF |
| 144 PF | PCG BUF |
| 480 PF | RW BUF |
| 224 PF | ADD BUF |

*RW, PCG, CEN ARE CONNECTED IN COMMON TO ALL 8 PACKAGES. DIN 1 IS CONNECTED TO DIN OF PACKAGE 1 IN BLOCKS A, B, C, & D.

| MAXIMUM DEVICE CAPACITANCE | LINE |
|---|---|
| 20 PF | RWI |
| 12 PF | RWD |
| 144 PF | CEN BUF |
| 144 PF | PCG BUF |
| 480 PF | RW BUF |
| 224 PF | ADD BUF |

*RW, PCG, CEN ARE CONNECTED IN COMMON TO ALL 8 PACKAGES. DIN 1 IS CONNECTED TO DIN OF PACKAGE 1 IN BLOCKS A, B, C, & D.

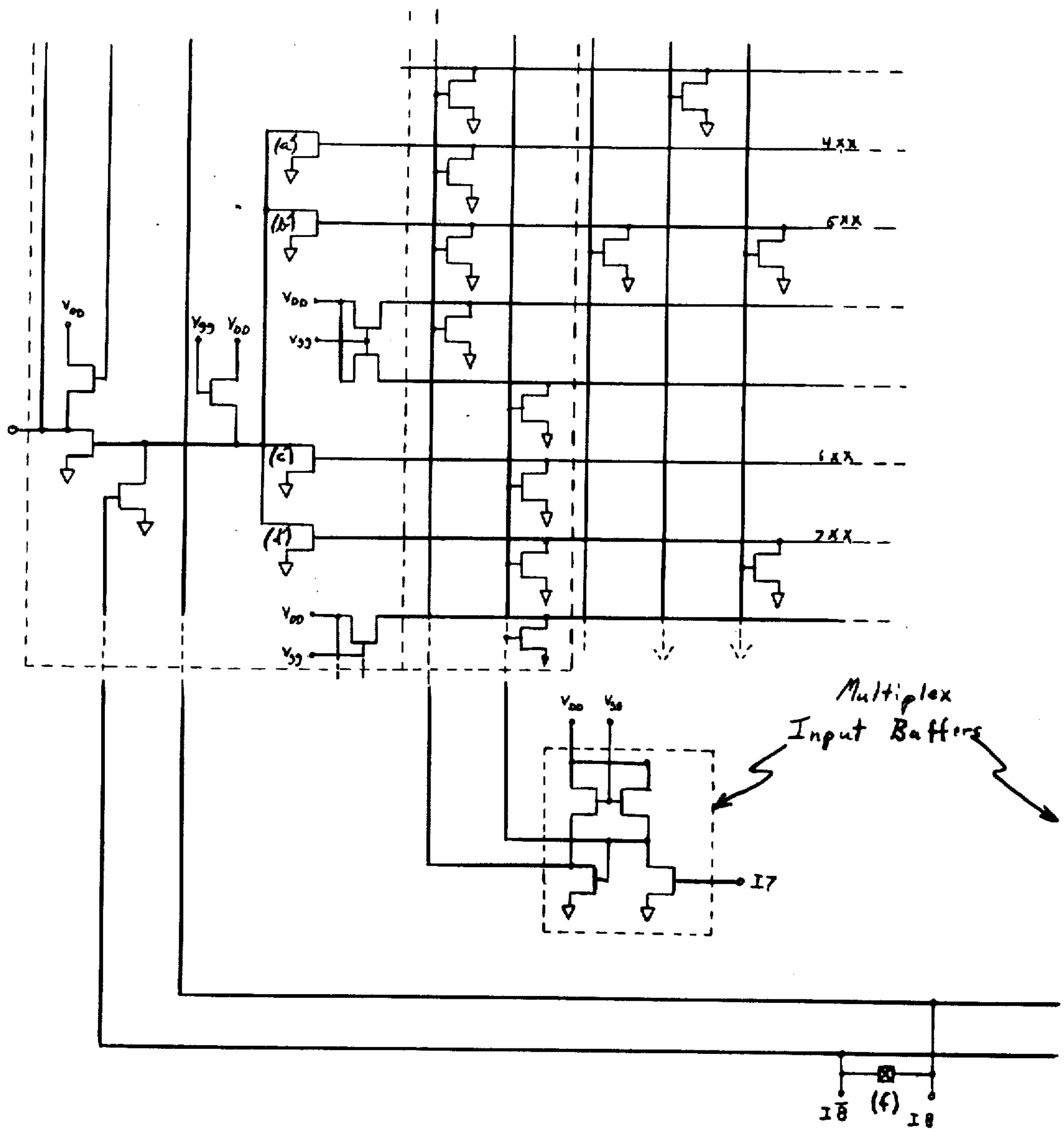

NOTES →

This symbol indicates connections which can be programmed open or short. —⊠—

① FOR A 512 X8:
ⓐ TIE OUTPUT PAIRS TOGETHER
ⓑ DO NOT TIE I8 AND $I\bar{8}$ TOGETHER ② FOR A 256 X16:
ⓐ DO NOT TIE OUTPUT PAIRS TOGETHER
ⓑ TIE I8 AND $I\bar{8}$ TOGETHER ③ $V_{DD}$ = +5V $V_{SS}$ = +12V (switched)
(POSITIVE TRUE LOGIC)

④ RESISTANCES ASSUME 10 Ω/□
ALL W/L'S ASSUME A 3 μ TOTAL SIDE DIFFUSION
ALL CONTACTS SHOWN AS (■) ARE PROGRAMMABLE WITH GATE MASK

FIG 42C

| BIT NUMBERS | ACTUAL BIT |
|---|---|
| 1 | 15 or 7 |
| 2 | 14 or 6 |
| 3 | 13 or 5 |
| 4 | 12 or 4 |
| 5 | 11 or 3 |
| 6 | 10 or 2 |
| 7 | 9 or 1 |
| 8 | 8 or 0 |

FIG 48'
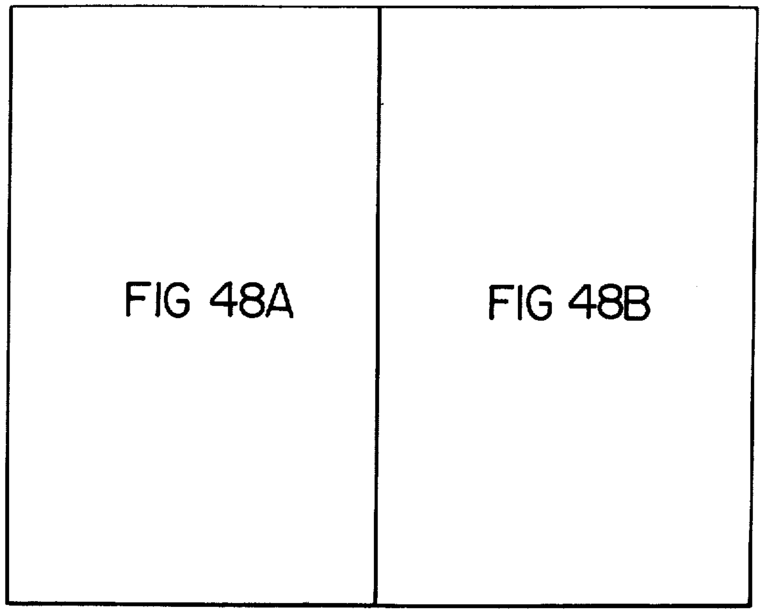
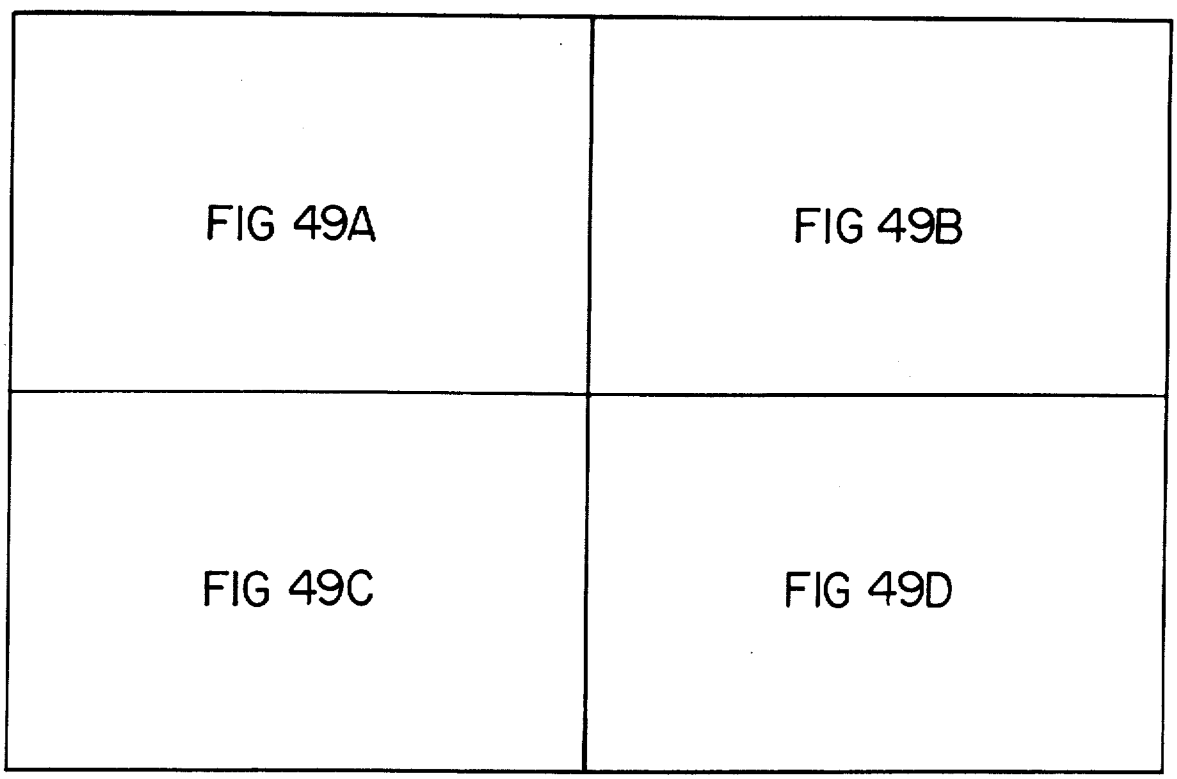
FIG 49'

| COMPONENT IC NO. | SERIES NO. | DESCRIPTION |
|---|---|---|
| 1,19 | MC-3001P | QUAD 2-INPUT 'AND' GATES |
| 2,4,5,10,11,16 | SN-7400 | QUAD 2-INPUT 'NAND' GATES |
| 3,20 | -7404 | 6 PK HEX INVERTERS |
| 6,7 | -7410 | TRIPLE 3-INPUT 'NAND' GATES |
| 8 | -74121 | MONOSTABLE MULTIVIBRATOR |
| 9 | -7453 | EXPANDABLE 4-WIDE 2-INPUT 'AND-OR-INVERTED' GATES |
| 12 | -7420 | DUAL 4-INPUT 'NAND' GATES |
| 13 | -7474 | DUAL EDGE-TRIGGERED FLIP-FLOPS |
| 14,15,17,18 | -7495 | 4-BIT RIGHT SHIFT, LEFT SHIFT REGISTER |

Relationship of the I/0 Lines.

I/O Control Board Timing Diagrams Showing Execution of STC

HIGH SPEED INPUT WAVEFORMS

HIGH SPEED OUTPUT WAVE FORM

INTERRUPT WAVEFORMS

Interface Logic to Plotter

| | WRITE | REVERSE | FAST | |
|---|---|---|---|---|
| 0 | 0 | 0 | 0 | READ-FORWARD-SLOW |
| 1 | 0 | 0 | 1 | READ-FORWARD-FAST |
| 2 | 0 | 1 | 0 | READ-REVERSE-SLOW |
| 3 | 0 | 1 | 1 | READ-REVERSE-FAST |
| 4 | 1 | 0 | 0 | WRITE-FORWARD-SLOW |
| 5 | 1 | 0 | 1 | STOP |
| 6 | 1 | 1 | 0 | CONTINUE PRESENT COMMAND |
| 7 | 1 | 1 | 1 | CONTINUE PRESENT COMMAND |

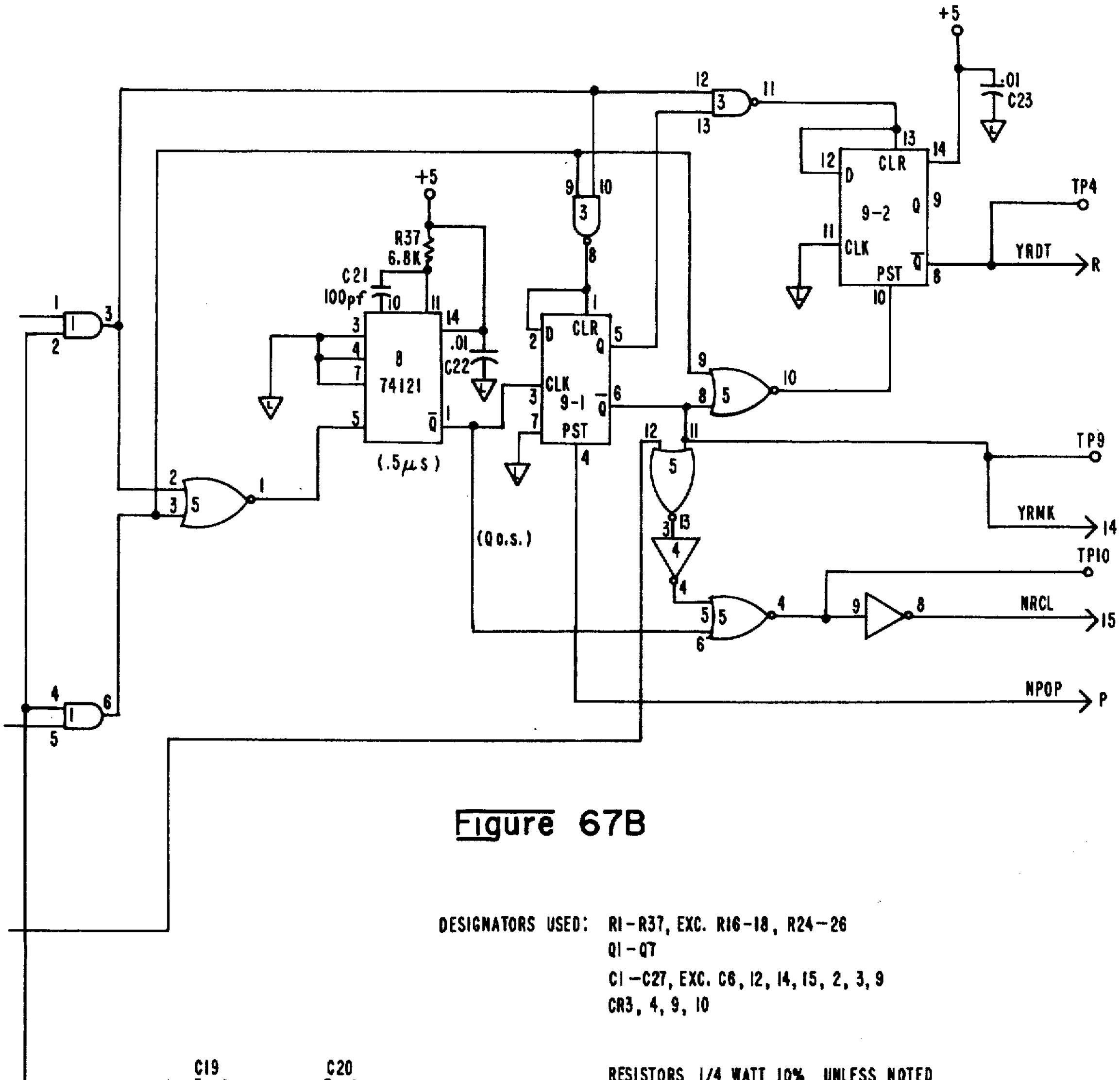
Figure 67B
DESIGNATORS USED: R1-R37, EXC. R16-18, R24-26
Q1-Q7
C1-C27, EXC. C6, 12, 14, 15, 2, 3, 9
CR3, 4, 9, 10
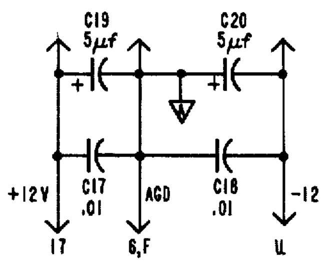
RESISTORS 1/4 WATT 10% UNLESS NOTED
DIODES 1901-0040
NPN: 1854-0071
PNP: 1853-0020
| | | |
|---|---|---|
| 9 | 1 | SN7474N |
| 8 | 1 | SN74121 |
| 6 | 1 | MC1437 |
| 5 | 1 | SN7402 |
| 4 | 1 | SN7404N |
| 3 | 1 | SN7400N |
| 2 | 1 | SN7410N |
| 1 | 1 | SN7408N |

| MOTOR RESIS. | R*2 (R*3) | HP STOCK NO. |
|---|---|---|
| 10.03 10.33 | .27 | 0812-0040 |
| 9.74 10.02 | .56 | 0811-2546 |
| 9.55 9.73 | .75 | 0811-3050 |
| 9.30 9.54 | 1.0 | 0811-3069 |
| 9.10 9.29 | 1.2 | 0811-3071 |
| 8.80 9.09 | 1.5 | 0811-3077 |
| 8.46 8.79 | 1.8 | 0811-3142 |

CALCULATOR POWER SYSTEM BLOCK DIAGRAM

NOTE: TRANSISTORS MARKED * USE HEAT SINK

INPUTS

S0-S7 : 14 m.s. STATES
FCN 2 = CODE ON LATCH OUTPUTS IS A FUNCTION
FCN 1 = " " " INPUTS " " "
CONTROL = SAME AS CEO FROM 9810
REP = REPEATING CHARACTER
SHFT1 = CODE ON LATCH INPUTS IS FOR UPPER CASE CHARACTER ON WRITER
STROBE = 8 μsec PULSE DURING STATE TRANSITION
ΔSHFT = SHIFT BIT AT INPUT AND STATE OF SHIFT FF NOT THE SAME
DF7 = DATA, FACIT CODE BIT 7 (USED IN CODING "LEFT SIDE" FUNCTIONS : COLOR SHIFT, TAB CLEAR, TAB SET)

OUTPUTS

RS = "RESET SOLENOIDS"
YCDE FF = "YES CODE FLIP FLOP
FLAG = REQUEST TO CALCULATOR FOR NEXT CODE
PS = "PROGRAM SOLENOIDS"
FS = "FUNCTION SOLENOIDS"
CS = RIBBON COLOR SHIFT
SHIFT FF = INSTRUCTS WRITER TO SHIFT TO UPPER CASE (also called 12VFF)
KLFF = KEYBOARD LOCK FF
INHIBIT COUNTER = STOP INPUT PULSES TO COUNTER

FIG 80B

NOTE: 1. P1: CONNECTOR ON CALCULATOR END OF CARD
2. P2: CONNECTOR TO TYPEWRITER INTERFACE BOX

KWYBOARD MONITOR (3)

KEYBOARD MONITOR (4)

SEARCH ALL TABLES

SEARCH A TABLE ON A GIVEN PAGE

RETURN TO P+2 OF ROUTINE WHICH CALLED SALT

REED SUBROUTINE (1)

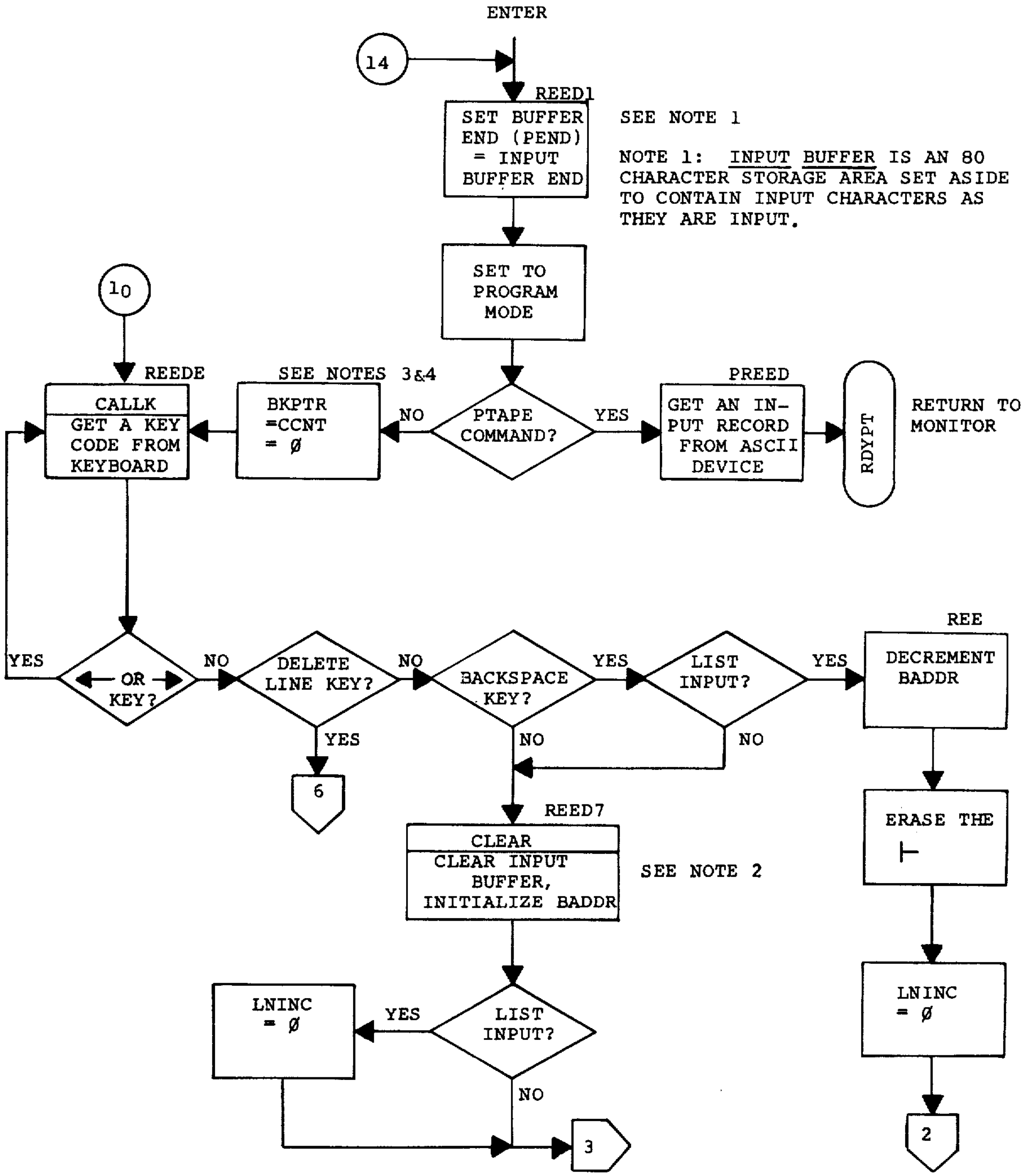

NOTE 2: BADDR IS A CHARACTER POINTER WHICH POINTS TO THE NEXT CHARACTER POSITION IN THE INPUT BUFFER ALTHOUGH IT CAN BE USED WITH ANY BUFFER. IT CONSISTS OF A WORD POINTER SHIFTED LEFT ONE BIT POSITION. THE LEAST SIGNIFICANT BIT INDICATES UPPER OR LOWER HALF CHARACTER (0 OR 1). THIS TYPE OF POINTER ALLOWS DIRECT INCREMENTING AND DECREMENTING SINCE THE WORD ADDRESS PORTION AUTOMATICALLY INCREMENTS WHEN THE POINTER POINTS TO THE SECOND CHARACTER POSITION.
NOTE 3: BKPTR POINTS TO THE POSITION OF THE CURSOR CHARACTER IN THE INPUT BUFFER. IT IS ZERO IF THE CURSOR IS NOT VISABLE ON THE DISPLAY i.e. A BACKSPACE HAS NOT BEEN EXECUTED.
NOTE 4: CCNT IS A CHARACTER COUNT WHICH INDICATES THE NUMBER OF CHARACTERS IN A STRING TO BE TAKEN AS INPUT BEFORE A KEYCODE IS ENTERED.

FIG 88A

REED SUBROUTINE (2)

REED SUBROUTINE (3)

REED (4)

REED (4)

REED (6)

LEFT SUBROUTINE

RIGHT SUBROUTINE

SAROW SUBROUTINE

CALLK SUBROUTINE

KEYIN SUBROUTINE

GETCH
GTMP
GNEXT
GTCON

GET CHARACTER SUBROUTINES

NOTE 1: THE B REGISTER CONTAINS THE WORD ADDRESS OF THE CHARACTER POINTER UPON ENTRY.

NOTE 2: THE A REGISTER CONTAINS THE CHARACTER POINTED TO BY THE PASSED CHARACTER POINTER.

OBLNK
ONEXT OUTPUT SUBROUTINES
OUTCR

NOTE 1: UPON ENTERING OUTCR THE A REGISTER HAS THE CHARACTER TO BE STORED, THE B REGISTER HAS THE ADDRESS OF THE CHARACTER POINTER WHERE THE CHARACTER IS TO BE STORED.

TTY SUBROUTINE

SUBROUTINE TO PRINT ERROR MESSAGES

ROUTINE TO ADD OR REPLACE A STATEMENT IN USER'S MEMORY

ROUTINE TO DELETE A STATEMENT FROM USER'S MEMORY

RETURN TO KEYBOARD MONITOR

SUBROUTINES TO ADJUST USER MEMORY AND UPDATE USER MEMORY POINTERS

MVTOH SUBROUTINE

FNDPS SUBROUTINE

USER DEFINABLE KEY SUBROUTINES

SET UP MEMORY POINTERS AND ENTER INTO DEFINITION MODE FOR A KEY

FIND THE USER CODE FOR A PARTICULAR KEY

SET UP A NEW KEY

LEAVE KEY DEFINITION MODE

EXECUTION MONITOR (1)

EXECUTION MONITOR (2)

LOAD A PROGRAM FROM THE CASSETTE

THE COMMAND IS: LOAD #UNIT, FILE NO., LNX1, LNX2

MERGE ROUTINE

LINK ROUTINE

THE COMMAND IS: LINK #UNIT, FILE NO, LNX1, LNX2

FIND COMMAND EXECUTION

THE FIND COMMAND LOCATES THE DESIRED FILE UNDER INTERRUPT MODE.

LOAD2 SUBROUTINE

LOAD9 SUBROUTINE

LOAD DATA ROUTINE

STORE DATA ROUTINE

THE COMMAND IS: STORE DATA #UNIT, FILE NO., ARRAY NAME

ARYLS SUBROUTINE

STORE KEY ROUTINE

THE COMMAND IS: STORE KEY #UNIT, FILE NO.

LOAD ASSEMBLY LANGUAGE PROGRAM

MAR4 - SUBROUTINE USED BY THE MARK COMMAND

TAPE LIST ROUTINE

PRIN- PRINT SUBROUTINE USED BY TAPE LIST ROUTINE

SECURE ROUTINE

THE COMMAND IS: SEC (LNX1 (,LNX2))

WHERE: LNX1 IS THE FIRST LINE TO BE SECURED
LNX2 IS THE LAST LINE TO BE SECURED

TAPE CASSETTE INTERRUPT SERVICE ROUTINE

FLOWCHART OF OFFSET COMMAND FOR PLOTTER BLOCK

FLOWCHART OF I PLOT COMMAND FOR PLOTTER BLOCK

FLOWCHART OF LABEL COMMAND FOR PLOTTER BLOCK

FLOWCHART OF LETTER COMMAND FOR PLOTTER BLOCK

FLOWCHART OF CPLOT COMMAND FOR PLOTTER BLOCK

FLOWCHART OF XAXIS AND YAXIS COMMAND FOR PLOTTER BLOCK

FLOWCHART OF AXIS SUBROUTINES FOR PLOTTER BLOCK

FLOWCHART OF PLOTTER BLOCK SUBROUTINES

SUBROUTINE TO CONVERT USER UNITS TO PLOTTER UNITS.
CALLED BY IPLOT, PLOT, XAXIS, AND YAXIS.

FLOWCHART OF PLOTTER BLOCK SUBROUTINES

FLOWCHART OF THE I/O BLOCK'S OUTPUT STATEMENT ILLUSTRATING INTERNAL CONVERSION AND CODE CONVERSION

FLOWCHART OF THE I/O BLOCK'S OUTPUT ROUTINE
TO DO INTERNAL CONVERSION

FLOWCHART OF THE I/O BLOCKS CODE CONVERSION ROUTINES

FLOWCHART OF MISCELLANEOUS FUNCTIONS FOR I/O BLOCK

FLOWCHART OF MISCELLANEOUS FUNCTIONS FOR I/O BLOCK

PROGRAMMABLE CALCULATOR

CROSS REFERENCE TO RELATED APPLICATION

This is a continuation of U.S. Patent application Ser. No. 269,899 filed July 7, 1972 and now abandoned.

BACKGROUND OF THE INVENTION

This invention relates generally to calculators and improvements therein and more particularly to programmable calculators that may be controlled both manually from the keyboard input unit and automatically by a stored program loaded into the calculator from the keyboard input unit or an external record member.

Computational problems may be solved manually, with the aid of a calculator (a dedicated computational keyboard-driven machine that may be either programmable or nonprogrammable), or a general purpose computer. Manual solution of computational problems is often very slow, so slow in many cases as to be an impractical, expensive, and ineffective use of the human resource, particularly when there are other alternatives for solution of the computational problems.

Nonprogrammable calculators may be employed to solve many relatively simple computational problems more efficiently than they could be solved by manual methods. However, the keyboard operations or language employed by these calculators is typically trivial in structure, thereby requiring many keyboard operations to solve more general arithmetic problems. Programmable calculators may be employed to solve many additional computational problems at rates hundreds of times faster than manual methods. However, the keyboard language employed by these calculators is also typically relatively simple in structure, thereby again requiring many keyboard operations to solve more general arithmetic problems.

Another basic problem with nearly all of the keyboard languages employed by conventional programmable and nonprogrammable calculators is that they allow the characteristics of the hardware of the calculator to show through to the user. Thus, the user must generally work with data movement at the hardware level, for example, by making sure that data is in certain storage registers before specifying the operations to be performed with that data and by performing other such housekeeping functions. In addition, these languages have been unique to a particular calculator and have not been generally familiar to those persons skilled in the computer and calculator arts.

In the past both programmable and nonprogrammable calculators have generally had very limited memories, thereby severely limiting the size of the computational problems they could be employed to solve. Because of these limitations, the relatively simple structure of the keyboard languages employed by these calculators and the housekeeping requirements associated with their languages have not heretofore been serious shortcomings. However, with advances in technology, the cost of memories has decreased to a point where larger memories could be economically included in programmable calculators. These larger memories have allowed larger and more sophisticated problems to be handled by programmable calculators. As a result the shortcomings of conventional calculator languages have become more critical, thereby creating the need for higher level keyboard languages.

In addition to the foregoing shortcomings, conventional programmable calculators generally have less capability and flexibility than is required to meet the needs of many users. For example, they typically cannot be readily expanded and adapted by the user to increase the amount of program and data storage memory or to perform many special keyboard functions oriented toward the environment of the user.

In some conventional programmable calculators a program stored within the calculator can be recorded onto an external magnetic record member and can later be reloaded back into the calculator from the magnetic record member. However, data and programs stored within these calculators typically cannot be separately recorded onto an external magnetic record member and later separately reloaded back into the calculator therefrom. Moreover, these calculators typically have no provision for making a program secure when it is recorded onto an external magnetic record member. Any user may therefore re-record the program or obtain an indication of the individual program steps once the program is reloaded into the calculator.

Conventional programmable calculators with self-contained output display units typically have little or no alpha capability and typically can only display the contents of one or more selected registers. They are therefore typically unable to display a line containing an alpha-numeric statement or an alphabetic message such as might be used, for example, to inform the user how to run programs with which he may be unfamiliar. Such features would be very helpful to the user both in editing programs and in simplifying their use.

Conventional programmable calculators typically have little or no capability for editing keyboard entries or programs stored within the calculator. For example, they typically have no provision for deleting, replacing, and inserting information included in or omitted from a keyboard entry or internally-stored program on a character-by-character or line-by-line basis. As another example, they typically have no provision for directly recalling any line of an internally-stored program. As a further example, they typically have no provision for automatically accommodating and sequencing program statements which are entered by the user in random order. Such features would be very helpful to the user in editing programs.

Conventional computers typically pose an interfacing problem between the user and the machine. This interface requirement takes the form of a machine-level operator with special abilities for maintaining the software system in operative condition for the user. Computer time sharing systems comprising a centrally located computer and a multiplicity of remotely located user terminals connected thereto by telephone lines have partially solved the user/machine interface problem. However, these systems lack the same flexibility as conventional computers in that they are only programmable and provide no convenient non-programmable method for performing relatively simple calculations. Both types of systems lack provision for editing a program statement from a keyboard without the necessity of retyping the entire statement.

SUMMARY OF THE INVENTION

The principal object of this invention is to provide an improved programmable calculator that has more capability and flexibility than conventional programmable calculators, that is smaller, less expensive and more efficient in calculating elementary mathematical functions than conventional computer systems, and that is easier to utilize than conventional programmable calculators or computer systems.

Another object of this invention is to provide a programmable calculator employing BASIC computer language implemented in a read-only memory (ROM) that completely eliminates the user/machine interface requirement of conventional computers and further eliminates the necessity of learning a non-universal language such as those typically associated with conventional programmable calculators.

Another object of this invention is to provide a programmable calculator in which the user may, be employing a BACK key or a FORWARD key of a keyboard, position a visual cursor over any character position of a line of information entered from the keyboard or recalled into the display from memory to indicate the character which may be edited by simply actuating a key representing the replacement character.

Another object of this invention is to provide a programmable calculator in which the user may employ an INSERT key of a keyboard to insert a blank character position immediately to the left of the cursor position, and may insert any character therein by actuating its representative key.

Another object of this invention is to provide a programmable calculator in which the user may employ a space bar of a keyboard when entering a line of information from the keyboard to introduce blank characters at desired character positions along the line.

Another object of this invention is to provide a programmable calculator in which the user may delete a character from a line of information entered from the keyboard or recalled into the display from memory by actuating the space bar after positioning a cursor over the character to be deleted.

Another object of this invention is to provide a programmable calculator in which the user may delete a character from a line of information entered from the keyboard or recalled into the display from memory and simultaneously move the right hand portion of that line one character position to the left to occupy the space resulting from the deleted character by positioning the cursor over the character to be deleted and then simultaneously actuating the INSERT key and a SHIFT key.

Another object of this invention is to provide a programmable calculator in which the user may move a displayed line of information either left or right across a display register independently of the location of a cursor at a particular character position thereof.

Another object of this invention is to provide a programmable calculator in which the user may display a statement located at a particular line in memory by actuating a FETCH key of a keyboard followed by the line designation.

Another object of this invention is to provide a programmable calculator in which the user may halt execution of a program, call various lines of information from memory into a display register for visual examination, and thereafter automatically resume program execution at the point at which the halt occurred by actuating a single key of a keyboard unit.

Another object of this invention is to provide a programmable calculator in which the user may call a particular line of information from memory into a display register and may then actuate one of two keys of a keyboard unit to step to and visually observe the contents of lines preceding or following the line originally displayed.

Another object of this invention is to provide a programmable calculator in which the user may store into memory a line of information residing in a display register irrespective of the position of that line in the display register and irrespective of the location of a cursor.

Another object of this invention is to provide a programmable calculator in which the user may, by actuating a RECALL key of a keyboard unit, recall into a display register the most recent line of information which was terminated by either an EXECUTE or END-OF-LINE command.

Another object of this invention is to provide a programmable calculator in which a group of keys of a keyboard unit, representing various editing commands, are provided for conditioning the calculator to perform the command represented without the necessity of literally spelling out the command by actuating a sequence of alphabetic keys.

Another object of this invention is to provide a programmable calculator in which the user may, by actuating a single key of a keyboard unit, delete a statement portion of a line of information being entered into a display register while retaining the line number of that line.

Another object of this invention is to provide a programmable calculator in which the user may, by actuating a single key of a keyboard unit, erase from memory a line of information recalled into a display register from the memory.

Another object of this invention is to provide a programmable calculator in which the user may selectively list on an external printing unit an entire file stored in memory or any portion thereof.

Another object of this invention is to provide a programmable calculator in which the user may designate an automatic line numbering mode for automatically providing a line number, according to a selected sequence involving a starting line number and an increment, at the beginning of each line of information entered into a display register.

Another object of this invention is to provide a programmable calculator in which the user may selectively scratch from memory a mainline program, non-common variables, a symbol table, and the definitions of a group of user-definable keys.

Another object of this invention is to provide a programmable calculator in which the user may, during execution of a program, designate a trace mode of operation whereby the line number of each statement executed is printed on an external output unit as it is executed.

Another object of this invention is to provide a programmable calculator in which the user may, prior to execution of a program and without altering the program, designate a line or lines prior to the execution of which program execution is to be halted.

Another object of this invention is to provide a programmable calculator in which the user may selectively commence execution of a program at either the beginning or at any intermediate line and may designate that at such time all variables are to be either unaltered or set to an undefined state.

Another object of this invention is to provide a programmable calculator in which the user may, by actuating a single key of a keyboard unit, instruct the calculator to set all program variables to an undefined state and to set up array storage for all arrays previously dimensioned in a program.

Another object of this invention is to provide a programmable calculator in which the user may designate any portion of a program as being secure so that a user may not obtain any indication of the contents of such portion and may not store onto a magnetic record member any secure program that has previously been entered into the calculator from a magnetic record member but may observe the contents of the unsecure portion of any program residing in memory.

Another object of this invention is to provide a programmable calculator in which a group of characters may be associated with each one of a plurality of definable keys of a keyboard unit, may later be displayed upon actuation of the associated key, and, if the group of characters represents an executable command, may be immediately executed upon actuation of the associated key.

Another object of this invention is to provide a programmable calculator in which each of a plurality of definable keys of a keyboard unit may be associated with a single or multiline function of one argument, which function may be employed as part of a program or immediately executed from the keyboard.

Another object of this inventon is to provide a programmable calculator in which each of a plurality of definable keys of a keyboard unit may be associated with a multiplicity of BASIC language program statements and the resulting program executed upon actuation of the associated key.

Another object of this invention is to provide a programmable calculator in which the user may, when employing a matrix plug-in read-only memory module, select as a function the determinant of a previously defined square matrix.

Another object of this invention is to provide a programmable calculator in which the user may, by actuating a SHIFT key of a keyboard unit, selectively cause to be printed on an external printing unit either lower or upper case alphabetic characters.

Another object of this invention is to provide a programmable calculator in which the user may, when the calculator is used in conjunction with an external printing unit, designate a print-all mode for printing all lines of information entered from a keyboard and terminated by EXECUTE or END-OF-LINE commands, all error messages, and all information displayed during execution.

Another object of this invention is to provide a programmable calculator in which the user may immediately execute any self-contained BASIC language program statement from a keyboard unit.

Another object of this invention is to provide a programmable calculator in which plug-in read-only memory modules are not uniquely associated with a particular group of keys of a keyboard unit.

Another object of this invention is to provide a programmable calculator in which functions available through the use of plug-in read-only memory modules are selected by actuating a series of alphanumeric keys of a keyboard unit rather than a single key, thereby allowing the number of functions available to be independent of the number of keys available.

Another object of this invention is to provide a programmable calculator in which the user may create a program using functions available from a plurality of plug-in read-only memory modules inserted into receptacles on the calculator in a particular sequence, may record such program onto an external magnetic record member, and may thereafter execute such program on another calculator of the same type configured with the same plug-in read-only memory modules but without observing the sequence in which they were placed in the receptacles of the first calculator.

Another object of this invention is to provide a programmable calculator in which the user may, when the calculator is configured with a plotter plug-in read-only memory module and an external X-Y plotter, specify an offset of X and Y coordinates to be applied to all subsequent coordinate specifications.

Another object of this invention is to provide a programmable calculator in which the user may, when the calculator is configured with a plotter plug-in read-only memory module, and an external X-Y plotter, incrementally plot, in user units, points relative to a current pen position.

Another object of this invention is to provide a programmable calculator in which the user may, when the calculator is configured with a plotter plug-in read-only memory module and external X-Y plotter, plot rectangular coordinate axes by specifying in user units starting and ending coordinates for each axis, a coordinate at which each axis intersects the other axis, and a tick mark spacing for tick marking along each axis in either direction from a starting point.

Another object of this invention is to provide a programmable calculator in which the user may, when the calculator is configured with a plotter plug-in read-only memory module and an external X-Y plotter, plot labels according to the format of a standard BASIC language print statement or according to a referenced format statement of a program, specify the height of characters contained in such labels, specify a character aspect ratio (ratio of height to width) for the characters contained in such labels, specify an angle of rotation in either degrees, radians or grads at which such labels are to be plotted, and specify a paper height-to-width ratio for assuring character uniformity regardless of plot angle.

Another object of this invention is to provide a programmable calculator in which the user may, when the calculator is configured with a plotter plug-in read-only memory module and an external X-Y plotter, incrementally plot characters according to character size units for facilitating pen placement at the beginning of plotter labelling operations.

Another object of this invention is to provide a programmable calculator in which the user may, when the calculator is configured with a plotter plug-in read-only memory module and an external X-Y plotter, plot characters as the corresponding keys of a keyboard input unit are actuated and use UP, DOWN, LEFT, and RIGHT ARROW keys of the keyboard input unit for controlling the position of the plotter pen.

Another object of this invention is to provide a programmable calculator in which the user may, when the calculator is configured with a terminal plug-in read-only memory module and an external modem for transmitting and receiving information over telephone lines, select from a keyboard unit any baud rate from a continuously variable range of baud rates.

Another object of this invention is to provide a programmable calculator in which the user may, when the calculator is configured with a terminal plug-in read-only memory module and an external modem for transmitting and receiving data over telephone lines, select by actuating a single key of a keyboard unit either odd or even parity of transmitted data.

Another object of this invention is to provide a programmable calculator in which the user may when the calculator is configured with a terminal plug-in read-only memory module, enter free text information from a keyboard input unit, an external magnetic record member, or any peripheral input unit, edit such information on a line-by-line or character-by-character basis, store such information on an external magnetic record member, and thereafter transmit such information, for example, to a remotely located time-sharing computer system.

Another object of this invention is to provide a programmable calculator in which the user may, when the calculator is configured with a terminal plug-in read-only memory module, generate and transmit any ASCII codes.

Another object of this invention is to provide a programmable calculator in which the user may, when the calculator is configured with a terminal plug-in read-only memory module and an external modem for transmitting and receiving information over telephone lines, make calculations and run programs locally at the same time as, for example, the calculator is on-line with and running programs through a remotely located time-sharing computer system.

Another object of this invention is to provide a programmable calculator in which the user may, when the calculator is configured with a terminal plug-in read-only memory module, receive BASIC language programs from remote locations and thereafter run them locally on the calculator.

Another object of this invention is to provide a programmable calculator in which the user may, when the calculator is configured with an extended input-output plug-in read-only memory module, from a keyboard unit or under program control, generate and transmit to any of a plurality of input-output channels any twelve-bit code.

Another object of this invention is to provide a programmable calculator in which the user may, when the calculator is configured with an extended input-output plug-in read-only memory module, from a keyboard unit or under program control, read an eight-bit character from a designated input-output channel.

Another object of this invention is to provide a programmable calculator in which the user may, when the calculator is configured with an extended input-output plug-in read-only memory module, from a keyboard unit or under program control, read the status of a designated external input-output unit.

Another object of this invention is to provide a programmable calculator in which the user may, when the calculator is configured with an extended input-output plug-in read-only memory module, from a keyboard unit or under program control, perform bit manipulation on sixteen-bit integer data according to the functions of ROTATE, AND, and OR.

Another object of this invention is to provide a programmable calculator in which the user may, when the calculator is configured with an extended input-output plug-in read-only memory module, from a keyboard unit or under program control, convert between various multi-bit data codes and the ASCII code of the calculator for allowing the calculator to communicate with peripheral units having operating codes other than ASCII.

Another object of this invention is to provide a programmable calculator in which the user may, when the calculator is configured with an extended input-output plug-in read-only memory module, from a keyboard unit or under program control, write into a string variable any information which may be transmitted to an output unit.

Another object of this invention is to provide a programmable calculator in which the user may, from a keyboard or under program control, by means of a single command which may involve parameters, mark a magnetic tape, stored either on an internal tape cassette or on one of a plurality of external tape cassettes, into a designated number of files each being of a designated length.

Another object of this invention is to provide a programmable calculator in which the user may designate that a particular file stored on a magnetic tape cassette is to be used for either program storage or data storage and in which he is subsequently prevented from attempting to access data from a file designated for program storage and vice versa.

Another object of this invention is to provide a programmable calculator in which the user may, from a keyboard or under program control, access a file stored on a magnetic tape cassette, by means of a single command indicating a file number, which file number may be the result of an arithmetic expression.

Another object of this invention is to provide a programmable calculator in which only complete files of a designated length may be marked on a magnetic tape, thus preventing the existence of a partially complete file near the end of a tape because of an insufficient amount of tape.

Another object of this invention is to provide a programmable calculator in which the user may, by means of a single command entered either from a keyboard or encountered under program control, list on an external printing unit certain information with respect to each file stored on a magnetic tape cassette, such information being the file number, the amount of information currently stored therein, the file type, the maximum file length, the starting and ending line numbers of a program stored therein, the number of words of common data storage associated with a program stored therein, and the form of data stored therein.

Another object of this invention is to provide a programmable calculator in which the user may, from a keyboard unit or under program control, chain one or more program segments stored on a magnetic tape cassette to a program residing in the calculator memory and may use the same variables in each segment without declaring common storage for the variables.

Another object of this invention is to provide a programmable calculator in which the user may, from a keyboard unit or under program control, insert a program or a program segment stored on a magnetic tape cassette at any line number of a program residing in the calculator memory.

Another object of this invention is to provide a programmable calculator in which the user may specify a line number in memory at which a program or a program segment loaded from a magnetic tape cassette is to begin and in which, if the resulting line numbers differ from those of the program or program segment as it resided on tape, references within such program or program segment are automatically modified to reflect the current line number sequence.

Another object of this invention is to provide a programmable calculator in which the user may, from a keyboard unit or under program control, selectively store any portion of a program residing in the calculator memory onto a magnetic tape cassette.

Another object of this invention is to provide a programmable calculator in which the user may, from a keyboard unit or under program control, store the definitions associated with all keys of a group of user-definable keys into a file on a magnetic tape cassette.

Another object of this invention is to provide a programmable calculator in which the user may, from a keyboard or under program control, load from a file on a magnetic tape cassette the definitions associated with all keys of a group of user-definable keys.

Another object of this invention is to provide a programmable calculator in which the user may, from a keyboard unit or under program control, load, store, merge, or chain programs or functions residing or to reside on a magnetic tape cassette and associated with or to be associated with any key of a group of user-definable keys.

Another object of this invention is to provide a programmable calculator in which the user may, from a keyboard unit or under program control, load into the calculator memory from a magnetic tape cassette or store onto a magnetic tape cassette from the calculator memory all common data defined in the program residing in the calculator memory without specifying individual variable names and by means of a single command.

Another object of this invention is to provide a programmable calculator in which the user may load prerecorded assembly language programs containing commands, statements, or functions which expand the capabilities of the calculator and which may be selected for execution by the user just as though the same commands, statements, or functions had been made available to the user by means of a plug-in read-only memory module.

Another object of this invention is to provide a programmable calculator in which the user may, from a keyboard unit or under program control, search a magnetic tape cassette in either forward or reverse directions for locating a particular file at the same time as the calculator is executing program statements or keyboard commands.

Other and incidental objects of this invention will become apparent from a reading of this specification and an inspection of the accompanying drawings.

These objects are accomplished according to the illustrated preferred embodiment of this invention by employing a keyboard input unit, a magnetic tape cassette reading and recording unit, a solid state output display unit, an optional external output printer unit, an input-output control unit, a memory unit, and a central processing unit to provide an adaptable programmable calculator having manual operating, automatic operating, program entering, magnetic tape reading, magnetic tape recording, and alphanumeric display and print modes. The keyboard input unit includes a group of data keys for entering numeric data into the calculator, a group of control keys for controlling the various modes and operations of the calculator and the format of the output display, a group of alphanumeric keys arranged as a typewriter keyboard for entering statements, and a group of user-definable keys. All of the data and alphanumeric keys and some of the control keys may also be employed for programming the calculator.

The magnetic tape cassette reading and recording unit includes a reading and recording head, a drive mechanism for driving a magnetic tape past the reading and recording head, and reading and recording drive circuits coupled to the reading and recording head for bidirectionally transferring information between the magnetic tape and the calculator as determined by keyboard commands or commands which are part of a stored program.

The input-output control unit includes a sixteen-bit universal shift register serving as an input-output register into which information may be transferred serially from the central processing unit or in parallel from the keyboard input and magnetic tape cassette reading and recording units and from which information may be transferred serially to the central processing unit or in parallel to the solid state output display, magnetic tape cassette reading and recording, and output printer units. It also includes control logic responsive to the central processing unit for controlling the transfer of information between these units. The input-output control unit may also be employed to perform the same functions between the central processing unit and peripheral units including, for example, an external printing unit, a digitizer, a marked card reader, an X-Y plotter, an external magnetic tape unit, a disc, a typewriter, and a modem. A plurality of peripheral units may be connected at the same time to the input-output control unit by simply plugging interface modules associated with the selected peripheral units into receptacles provided therefore in a rear panel of the calculator housing.

The memory unit includes a modular random-access read-write memory having a dedicated system area and a separate user area for storing program statements and/or data. The user portion of the read-write memory may be expanded without increasing the overall dimensions of the calculator by the addition of a program storage module. Additional read-write memory made vailable to the user is automaticlly accommodated by the calculator, and the user is automatically informed when the storage capacity of the read-write memory has been exceeded.

The memory unit also includes a modular read-only memory in which routines and subroutines of assembly language instructions for performing the various functions of the calculator are stored. These routines and subroutines of the read-only memory may be expanded and adapted by the user to perform additional functions oriented toward the specific needs of the user. This is accomplished by simply plugging additional read-only memory modules into receptacles provided therefore in a side panel of the calculator housing. Added read-only memory modules are automatically accommodated by the calculator and are accessed by the calculator through a series of mnemonic tables. These tables contain mnemonics which are additions to the calculator's programming language.

Plug-in read-only memory modules include, for example, a matrix module, a string variables module, a plotter module, an extended input-output module, and a terminal module. The matrix module makes available to the user standard BASIC language matrix functions plus an additional function which returns the determinant of a previously defined square matrix. The string variables module makes available to the user standard BASIC language string variables operations. The plotter module enables the user to conveniently plot and label on an external X-Y plotter. The extended input-output module allows the calculator to be used with a wide variety of peripheral input-output units. The terminal module facilitates interfacing the calculator with a modem for communicating, for example, with remotely located time-sharing computer systems. It further allows free text editing and storage.

The memory unit further includes a pair of recirculating sixteen-bit serial shift registers. One of these registers serves as a memory address register for serially receiving information from an arithmetic-logic unit included in the central processing unit, for parallel addressing any memory location designated by the received information back to the arithmetic-logic unit. The other of these registers serves as a memory access register for serially receiving information from the arithmetic-logic unit for writing information in parallel into any addressed memory location, for reading information in parallel from any addressed memory location, and for serially transferring information to the arithmetic-logic unit. It also serves as a four-bit parallel shift register for transferring four bits of binary-coded-decimal information in parallel to the arithmetic-logic unit.

The central processing unit includes four recirculating sixteen-bit serial shift registers, a four-bit serial shift register, the arithmetic-logic unit, a programmable clock, and a microprocessor. Two of these sixteen-bit serial shift registers serve as accumulator registers for serially receiving information from and serially transferring information to the arithmetic-logic unit. The accumulator register employed is designated by a control flip-flop. One of the accumulator registers also serves as a four-bit parallel shift register for receiving four bits of binary-coded-decimal information in parallel from and transferring four bits of such information in parallel to the arithmetic-logic unit. The two remaining sixteen-bit serial shift registers serve as a program counter register and a qualifier register, respectively. They are also employed for serially receiving information from and serially transferring information to the arithmetic-logic unit. The four-bit serial shift register serves as an extend register for serially receiving information from either the memory access register or the arithmetic-logic unit and for serially transferring information to the arithmetic-logic unit.

The arithmetic-logic unit is employed for performing one-bit serial binary arithmetic, four-bit parallel binary-coded-decimal arithmetic, and logic operations. It may also be controlled by the microprocessor to perform bidirectional direct and indirect arithmetic between any of a plurality of the working registers and any of the registers of the read-write memory.

The programmable clock is employed to supply a variable number of shift clock pulses to the arithmetic-logic unit and to the serial shift registers of the input-output, memory, and central processing units. It is also employed to supply clock control signals to the input-output control logic and to the microprocessor.

The microprocessor includes a read-only memory in which a plurlaity of microinstructions and plurality are stored. These microinstructions and codes are employed to perform the basic instructions of the calculator. They include a plurality of coded and non-coded microinstructions for transferring control to the input-output control logic, for controlling the addressing and accessing of the memory unit, and for controlling the operation of the two accumulator registers, the program counter register, the extend register and the arithmetic-logic unit. They also include a plurality of clock codes for controlling the operation of the programmable clock, a plurality of qualifier selection codes for selecting qualifiers and serving as primary address codes for addressing the read-only memory of the microprocessor, and a plurality of secondary address codes for addressing the read-only memory of the microprocessor. In response to a control signal from a power supply provided for the calculator, control signals for the programmable clock, and qualifier control signals from the central processing and input-output control units, the microprocessor issues the microinstructions and codes stored in the read-only memory of the microprocessor as required to process either binary or binary-coded-decimal information entered into or stored in the calculator.

In the keyboard mode, the calculator is controlled by keycodes sequentially entered into the calculator from the keyboard input unit by the user. The solid state output display unit dispays either the alphanumeric representation of the keys as they are depressed or a numeric representation of output data or alphanumeric user instructions or program results. An external output printer unit may be controlled by the user to selectively print a numeric representation of any numeric data entered into the calculator from the keyboard input unit, a numeric representation of any result calculated by the calculator, or a program listing on a line-by-line basis of the statements entered.

When the calculator is in the keyboard mode, it may also be operated in a print-all printing mode. The output printer unit then prints out each program line as it is entered by the user.

In the program running mode, the calculator is controlled by automatically obtaining an internal representation of the program statements stored in the user storage section of the read-write memory. During automatic operation of the calculator, data may be obtained from the memory unit as designated by the program, from the keyboard input unit while the operation of the calculator is stopped for data either by the program or by the user, of from the magnetic tape cassette unit as designated by the program.

When the calculator is in the program running mode, the user may also selectively employ a trace mode to check the execution of the program line-by-line in order to determine whether the program, as entered into the calculator, does in fact carry out the desired sequence of statements.

In the program entering mode, statements are sequentially entered by the user into the calculator from the keyboard input unit and are translated into an internal stored format which consists of a series of operation codes and operand names and are thereafter stored as statements of a program in the user storage section of the readwrite memory.

The magnetic tape cassette reading and recording unit may be employed by the user to separately load either data, BASIC language programs, assembly language programs, or sets of user-definable key definitions into the calculator from an external magnetic tape cassette.

The magnetic tape cassette reading and recording unit may also be employed by the user to separately record either data, BASIC language programs, or sets of user-definable key definitions stored in the user section of the read-write memory onto an external magnetic tape cassette. Programs, or portions thereof, may be coded by the user as being secure when they are recorded onto an external magnetic tape cassette. The calculator detects such programs when they are reloaded into the calculator and prevents the user from re-recording them or obtaining any listing or other indication of the individual program steps contained in the secured portions of such programs.

DESCRIPTION OF THE DRAWINGS

FIGS. 22A–B are a flow chart of a subroutine employed by the $e^X$ and natural logarithm X routines of FIGS. 18A–B and 19, respectively.

FIG. 28' is a diagram showing the arrangement of FIGS. 28A–D.

FIGS. 29A–H are detailed flow charts illustrating the operation of the microprocessor of FIGS. 3A–B, 27, and 28A–D.

FIGS. 29' and 29'' are diagrams showing the arrangement of FIGS. 29A-H.

FIG. 31' is a diagram showing the arrangement of FIGS. 31A–C.

FIGS. 33A–D are a detailed schematic diagram of the shift register and arithmetic logic units of FIGS. 3A–B.

FIG. 33' is a diagram showing the arrangement of FIGS. 33A–D.

FIGS. 42A–D are a schematic diagram of one of the read-only memory chips of FIGS. 38 and 39.

FIG. 47' is a diagram showing the arrangement of FIGS. 47A–B.

FIG. 48' is a diagram showing the arrangement of FIGS. 48A–B.

FIG. 49' is a diagram showing the arrangement of FIGS. 49A–D.

FIGS. 67A–B are a detailed schematic diagram of the read-write block of FIG. 64.

FIGS. 80A–B are a simplified logic diagram showing state qualifiers and instructions relating to the flow chart of FIGS. 77A–B.

FIGS. 88A–G are a flow chart of the keyboard input routine and special keyboard functions routines of FIG. 4A.

FIG. 97 is a flow chart of another of the general system subroutines of FIG. 4A which is also called by the routines of FIGS. 96A–D.

FIG. 98 is a flow chart of another of the general system subroutines of FIG. 4A.

Figure 4:
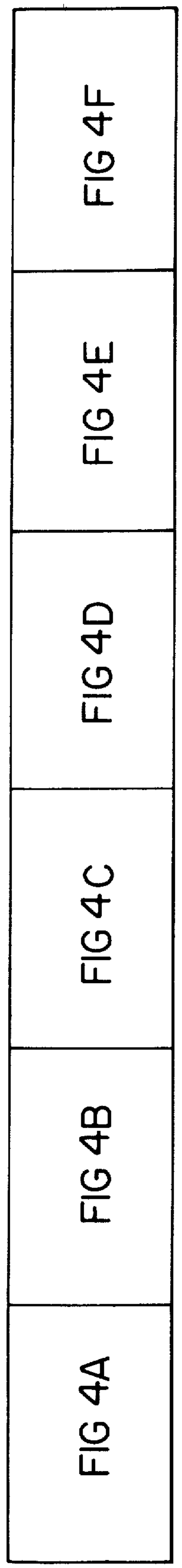
FIG. 4' is a diagram showing the arrangement of FIGS. 4A–F.
Figure 4A:
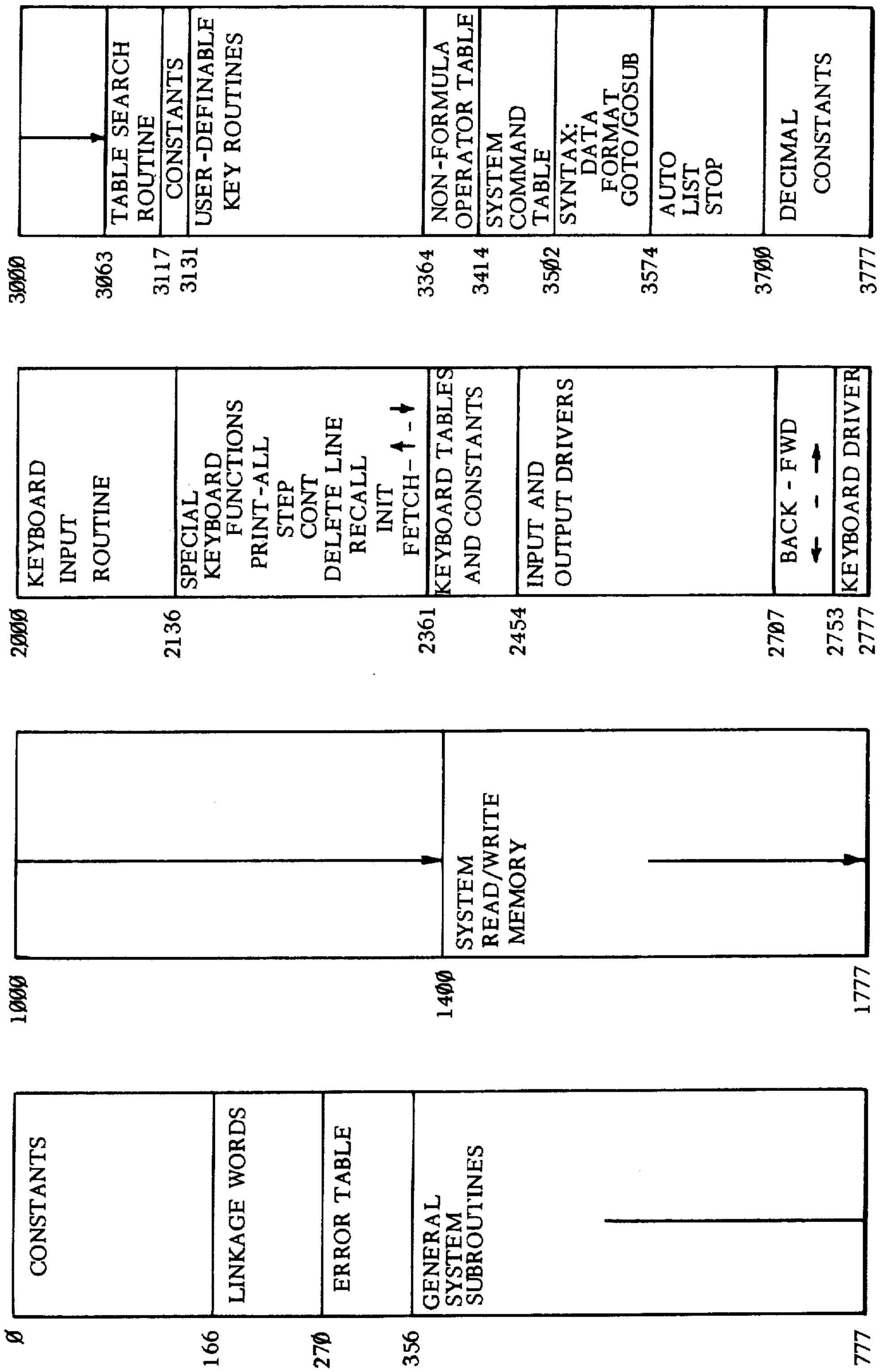
FIGS. 4A–F are a memory map of the memory unit employed in the adaptable programmable calculator of FIGS. 1–3B.

FIGS. 99A–F are flow charts of the user-definable key routines of FIG. 4A.

Figure 4B:
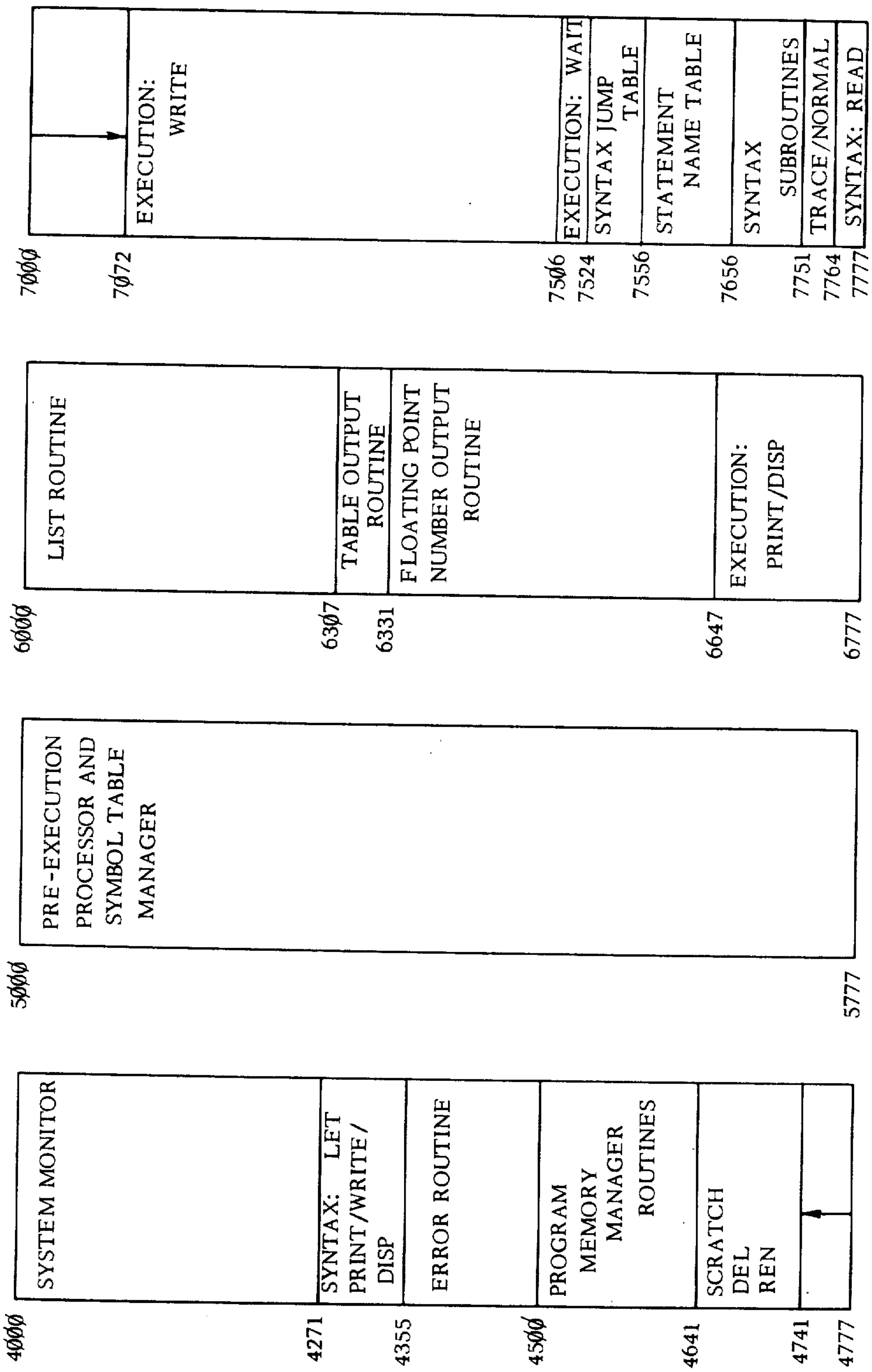
Figure 4C:
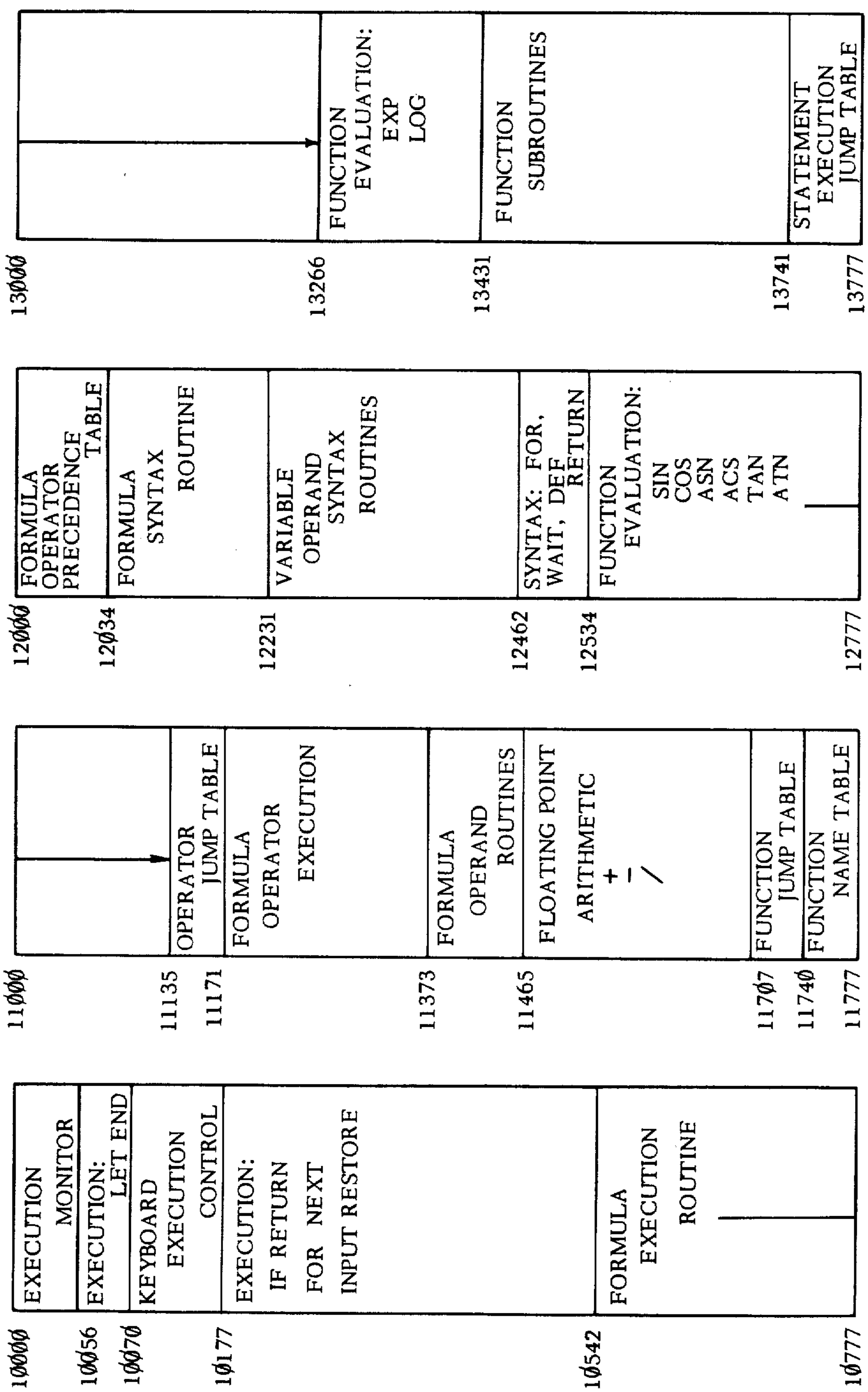

FIGS. 100A–D are flow charts of the execution monitor and keyboard execution control blocks of FIG. 4C.

Figure 4D:
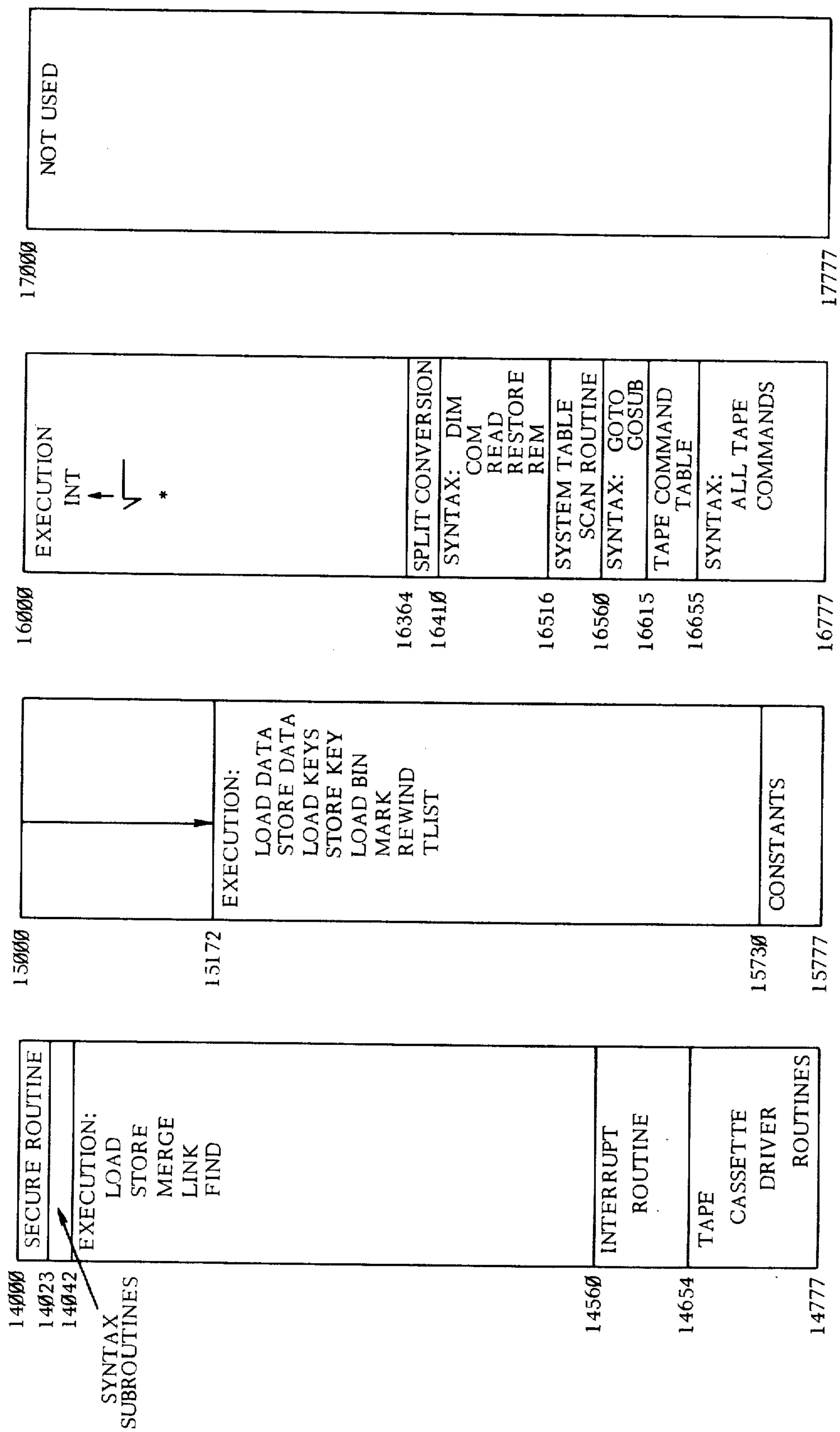
Figure 4E:
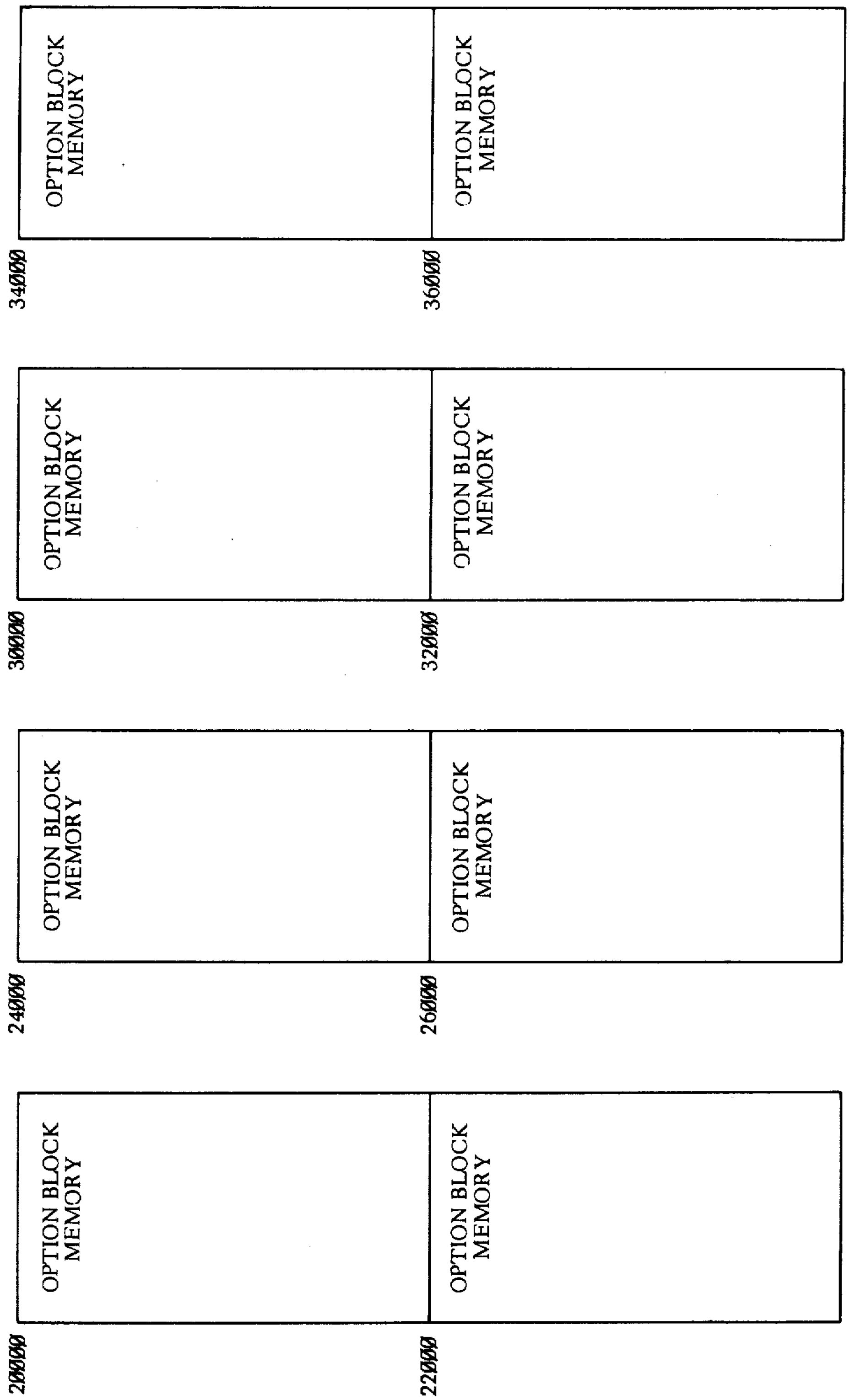
Figure 4F:
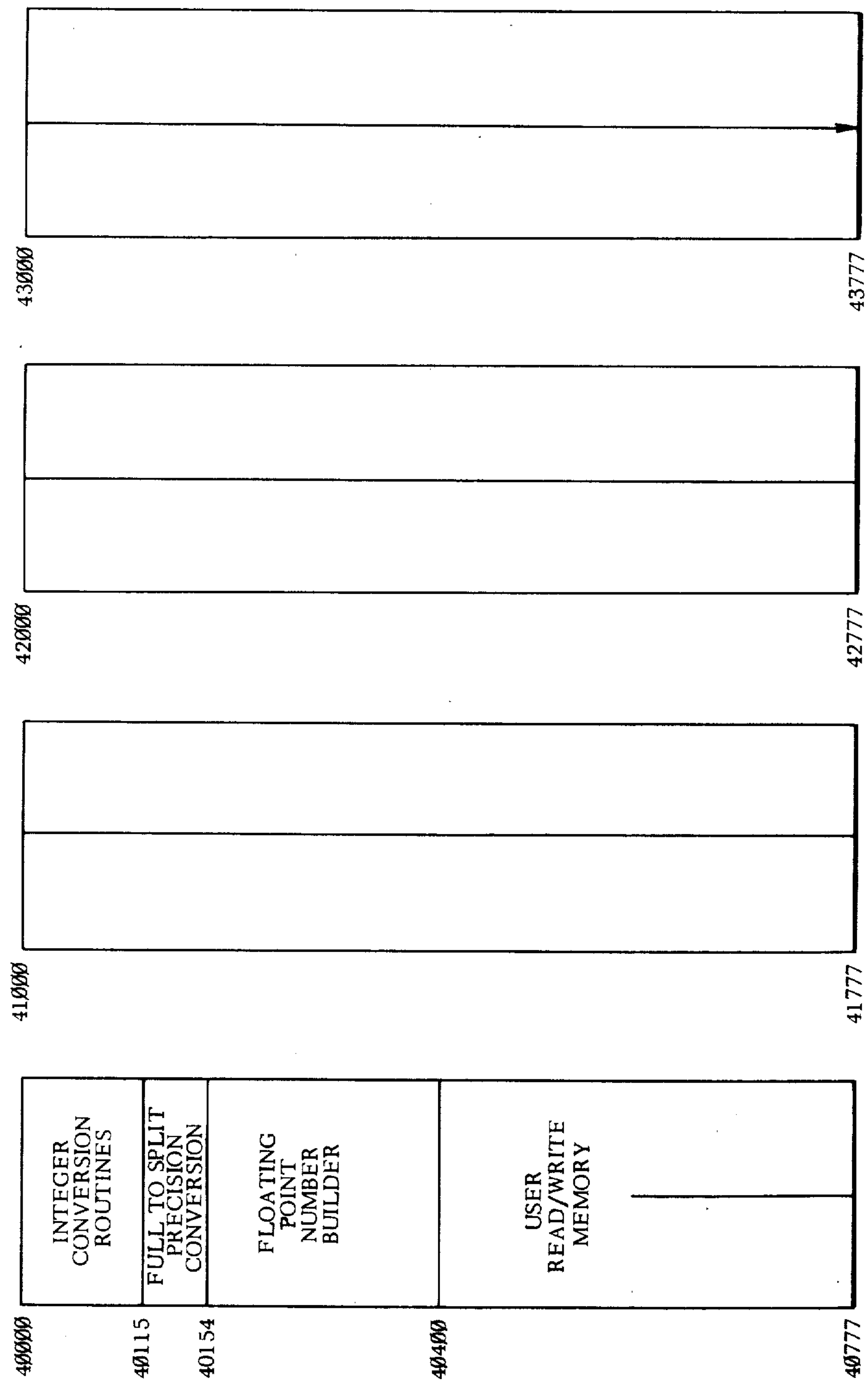
Figure 101:
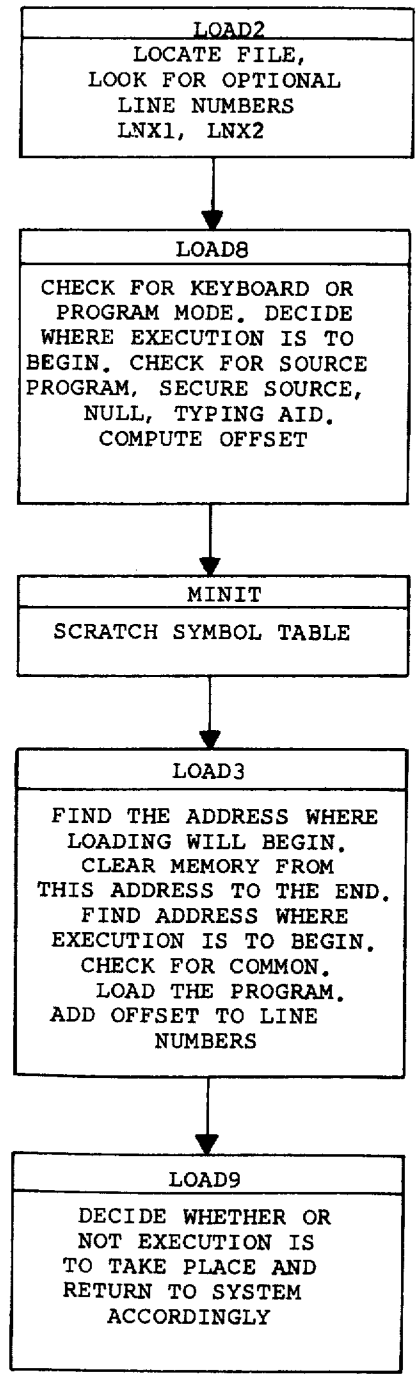

FIG. 101 is a flow chart of the load execution routine of FIG. 4D.

Figure 102:
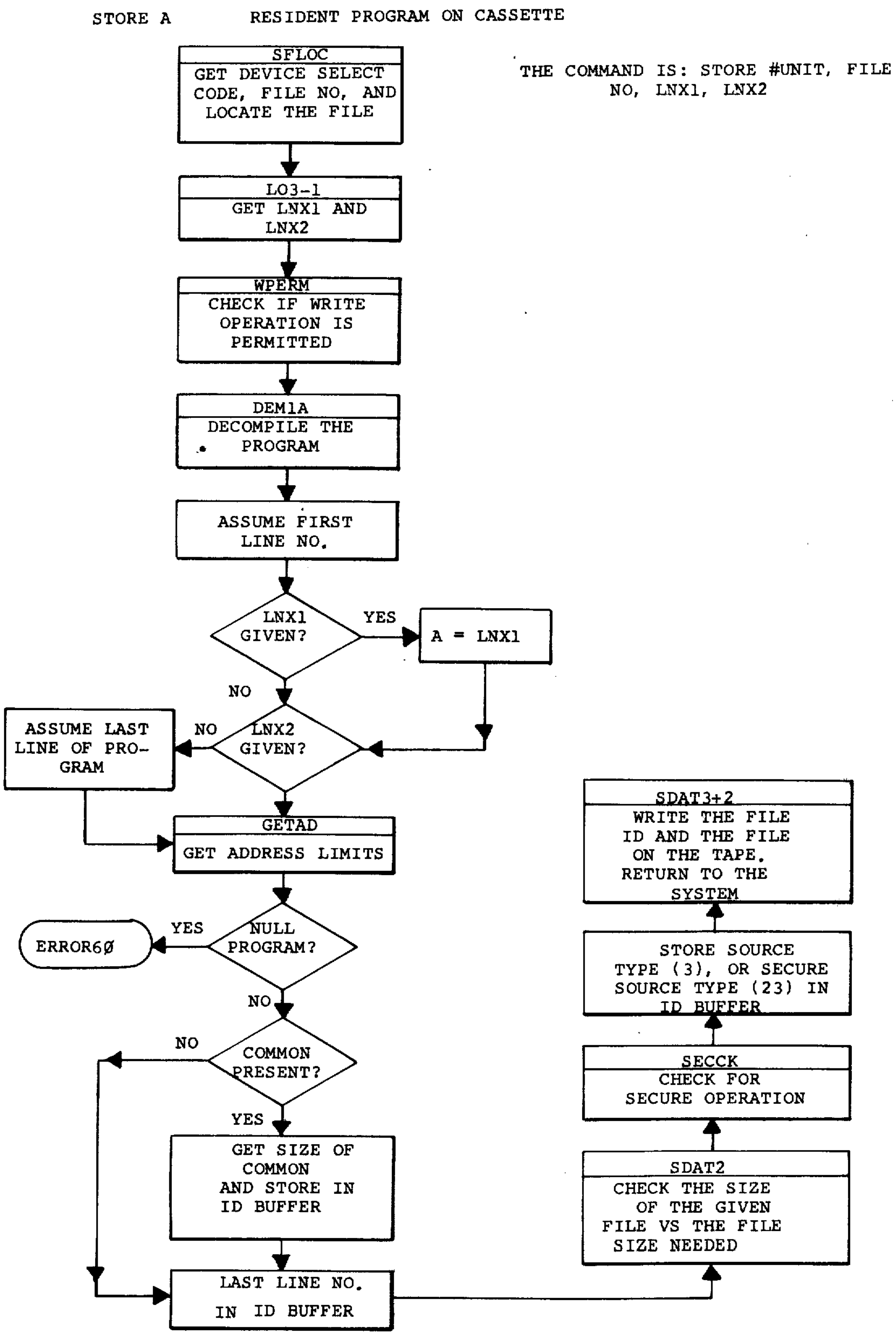

FIG. 102 is a flow chart of the store execution routine of FIG. 4D.

Figure 103:
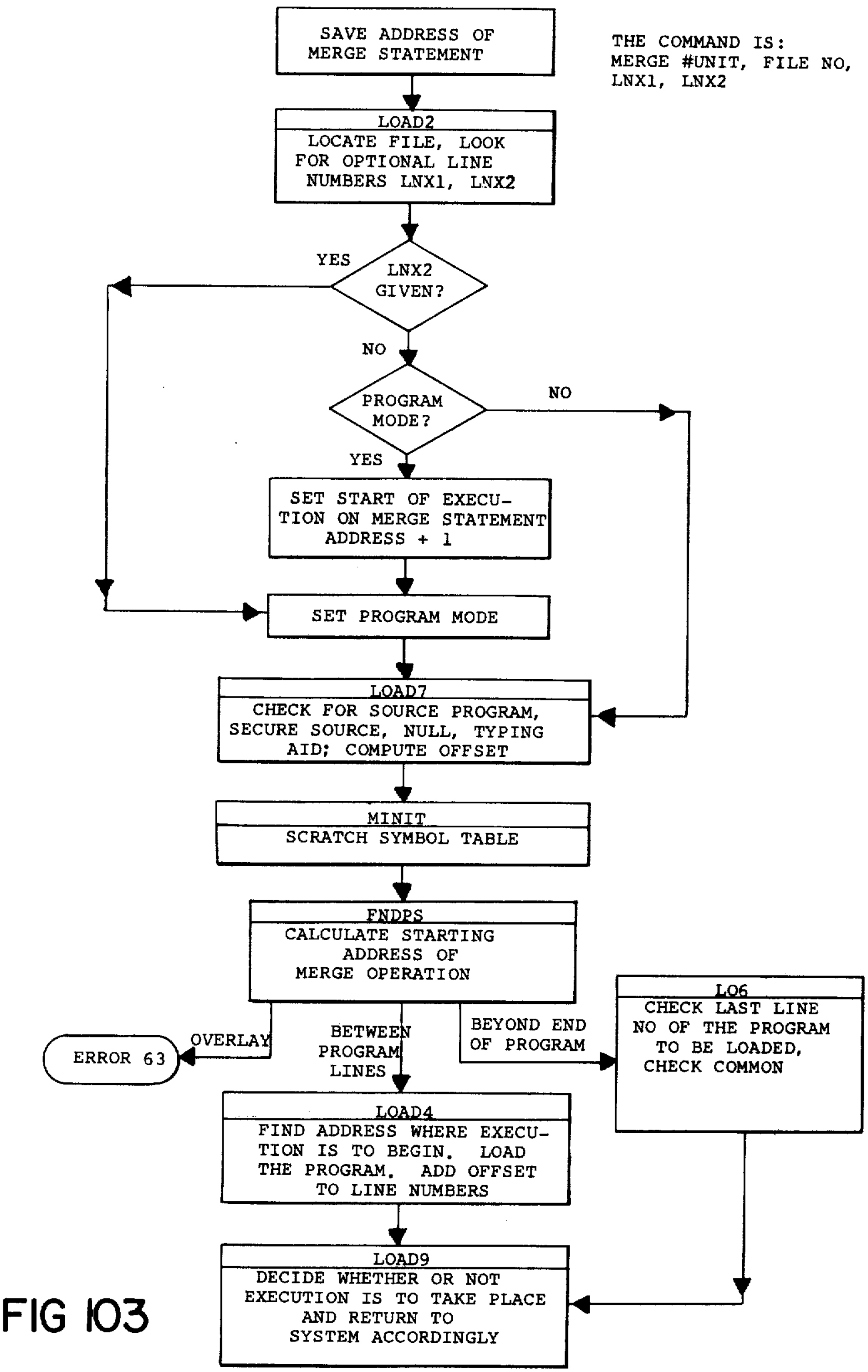

FIG. 103 is a flow chart of the merge execution routine of FIG. 4D.

Figure 104:
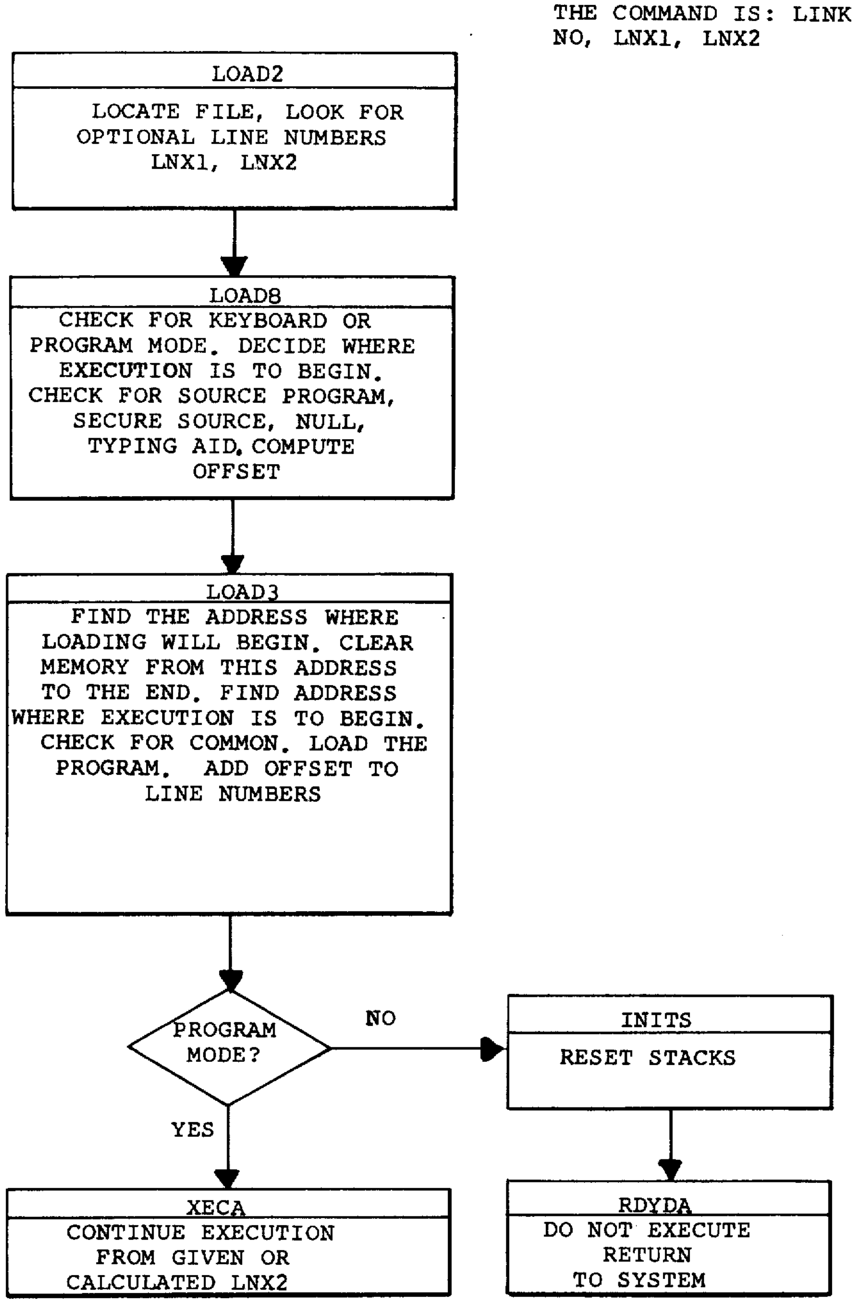

FIG. 104 is a flow chart of the link execution routine of FIG. 4D.

Figure 105:
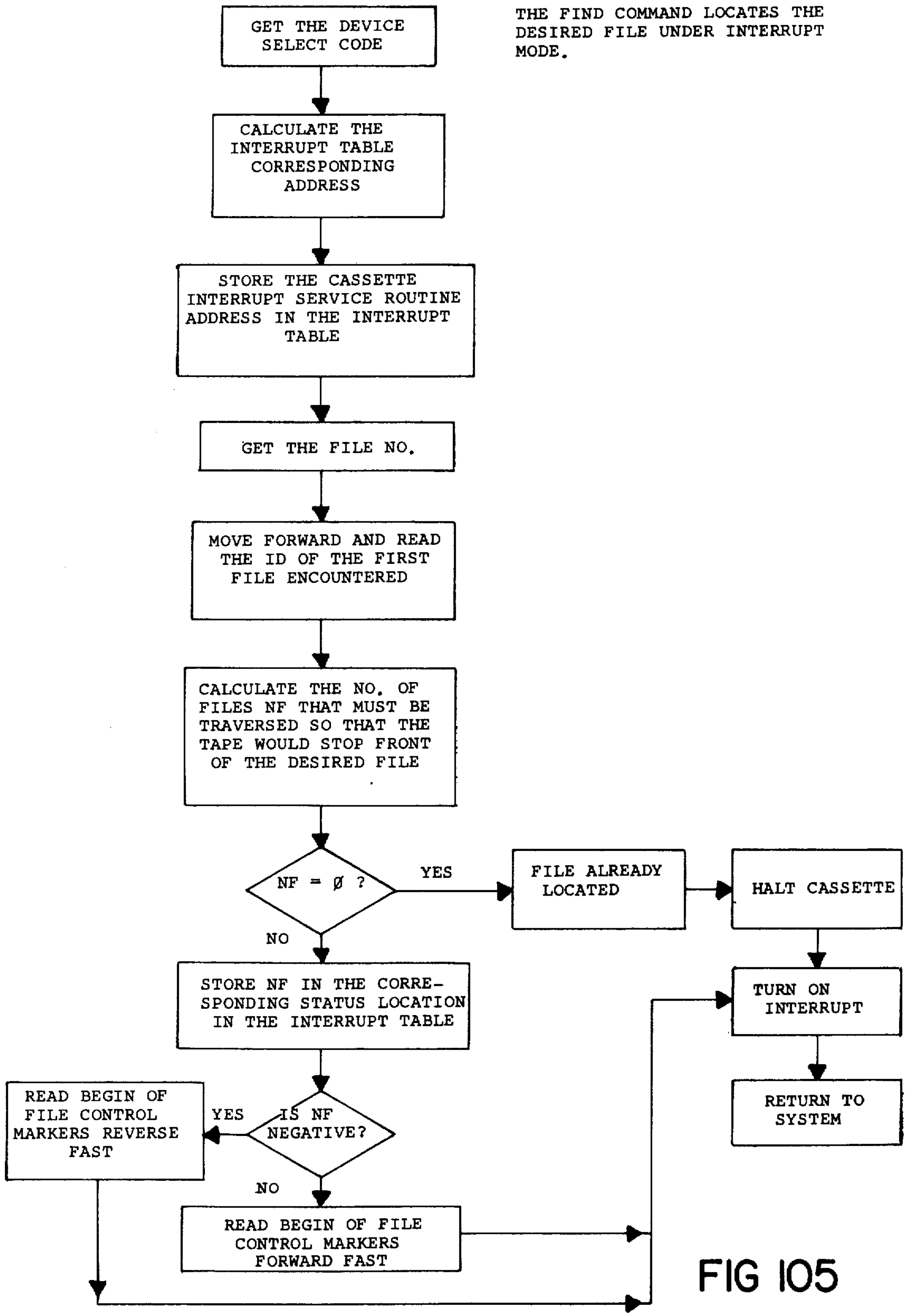
Figure 106A:
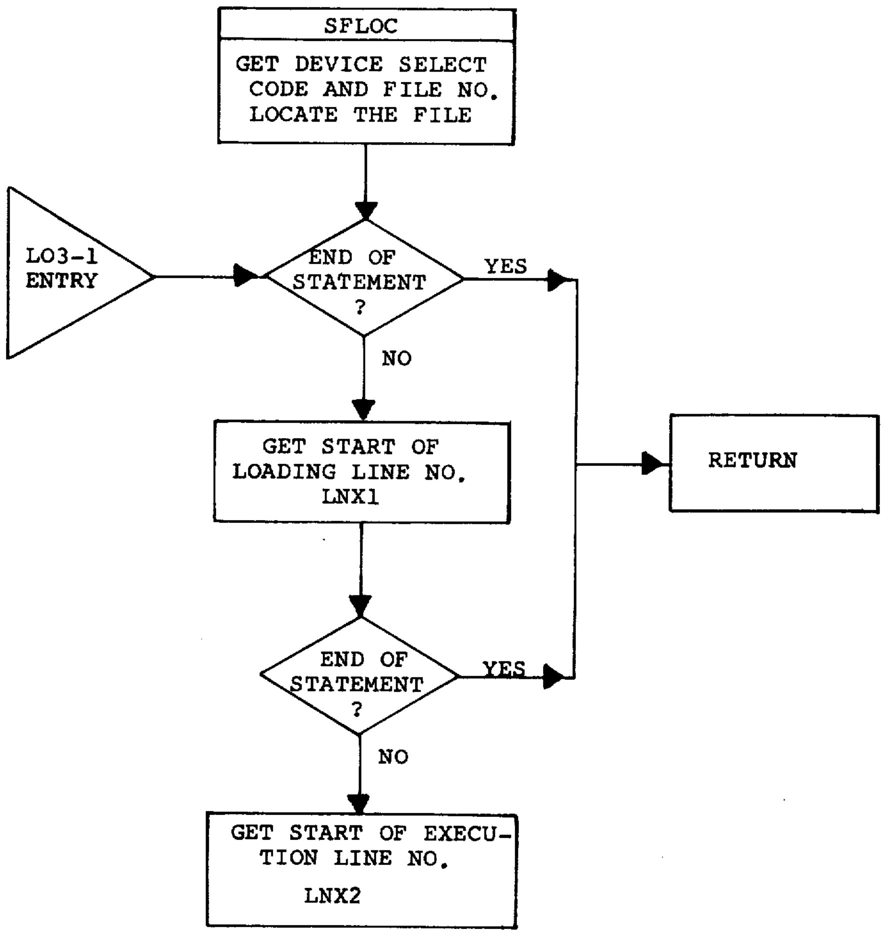
Figure 106B:
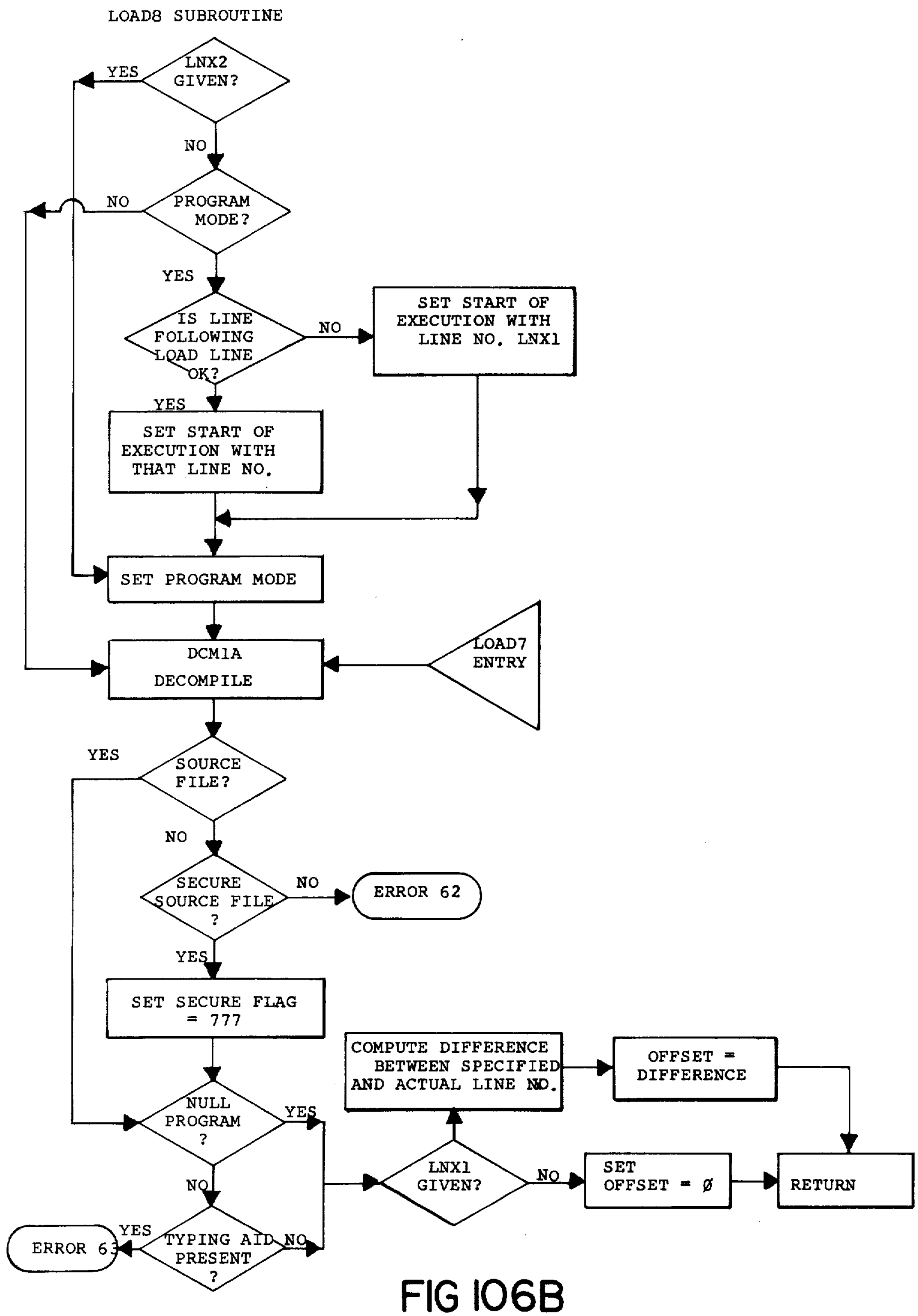
Figure 106C:
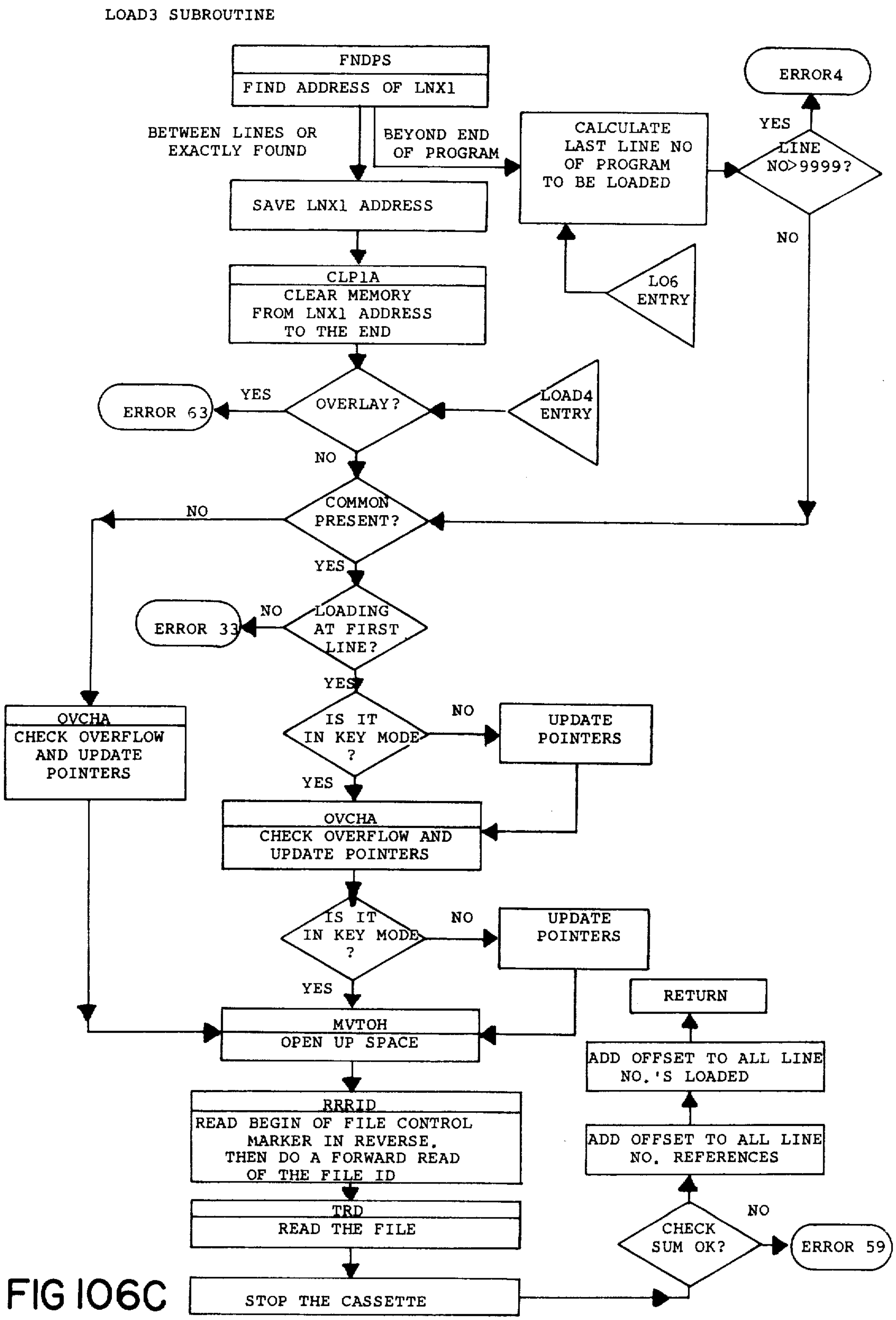
Figure 106D:
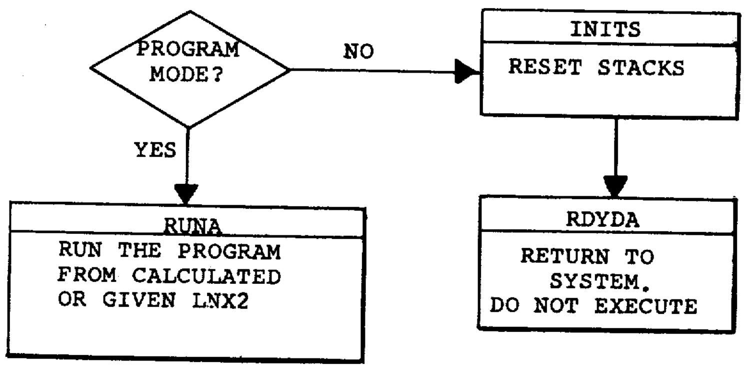

FIG. 105 is a flow chart of the find execution routine of FIG. 4D.

FIGS. 106A–D are flow charts of subroutines called by the execution routines of FIGS. 101–104.

Figure 107:
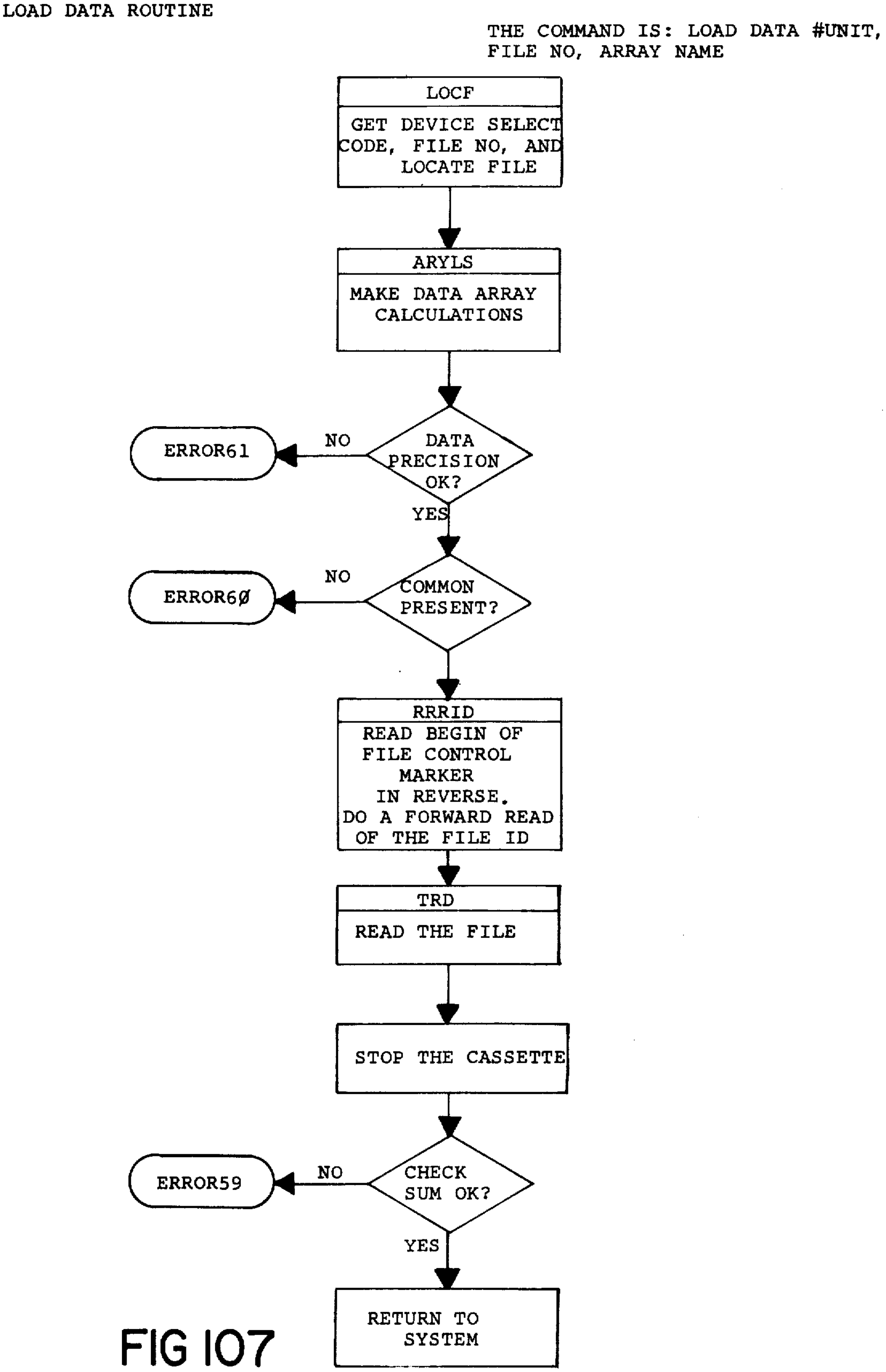

FIG. 107 is a flow chart of the load data execution routine of FIG. 4D.

Figure 108:
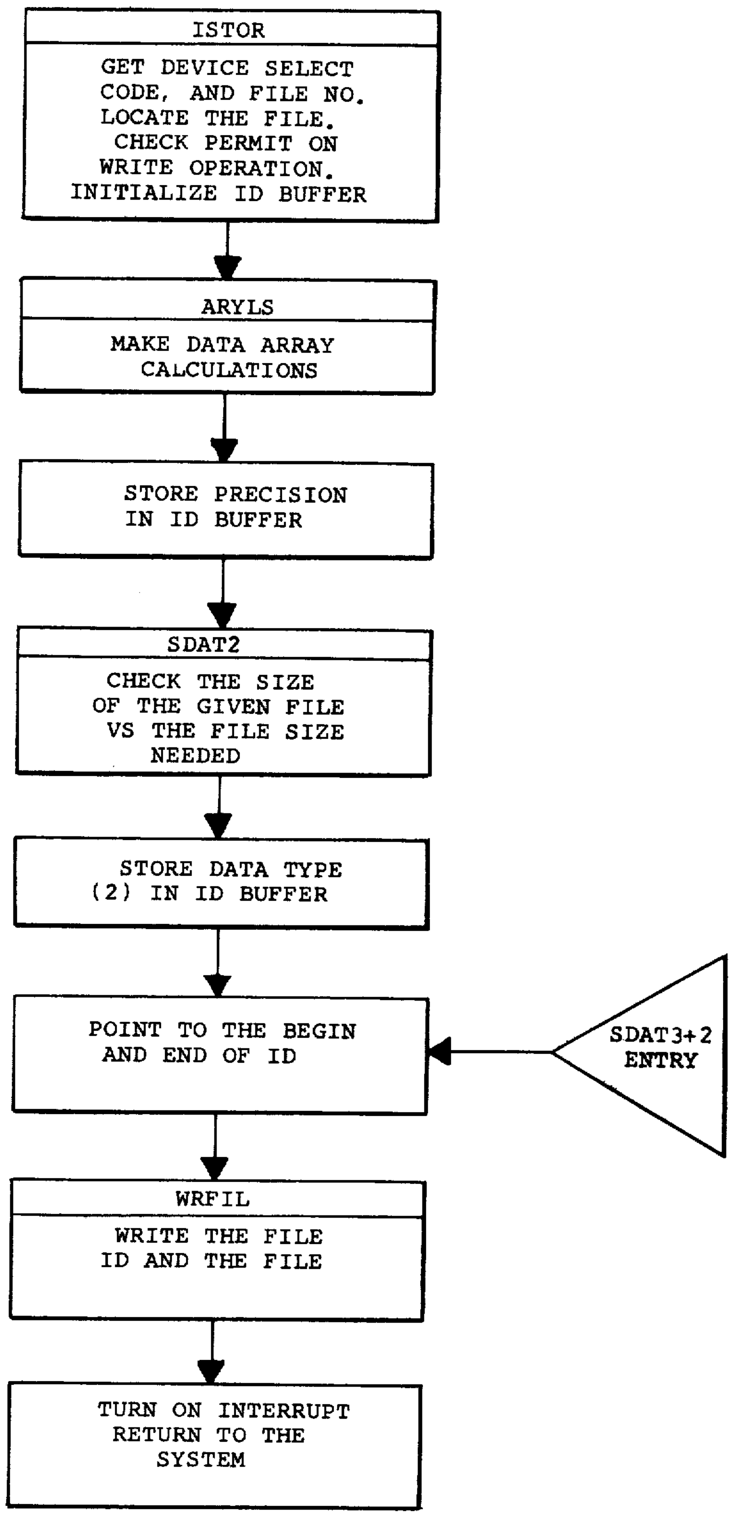

FIG. 108 is a flow chart of the store data execution routine of FIG. 4D.

Figure 109:
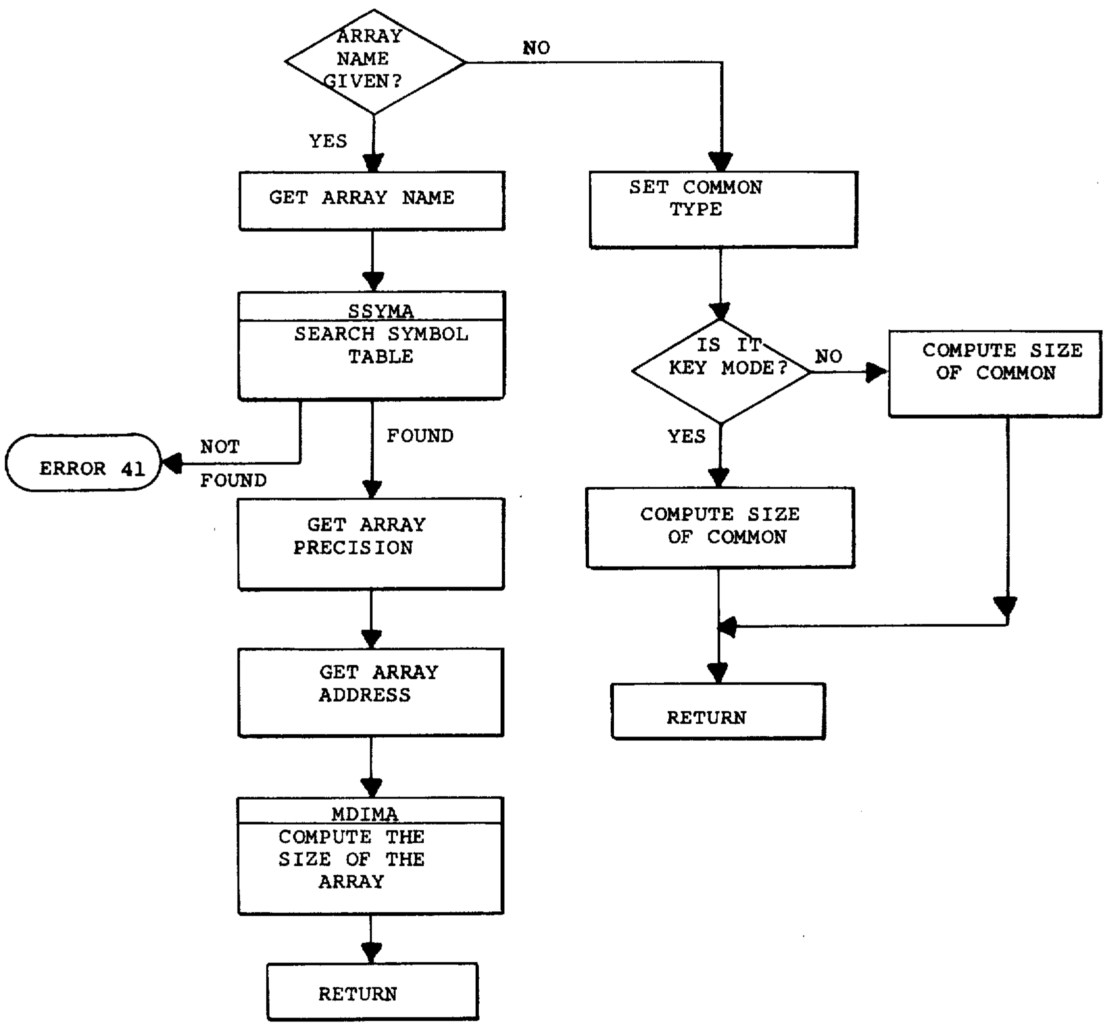

FIG. 109 is a flow chart of a subroutine called by the routines of FIGS. 107 and 108.

Figure 110:
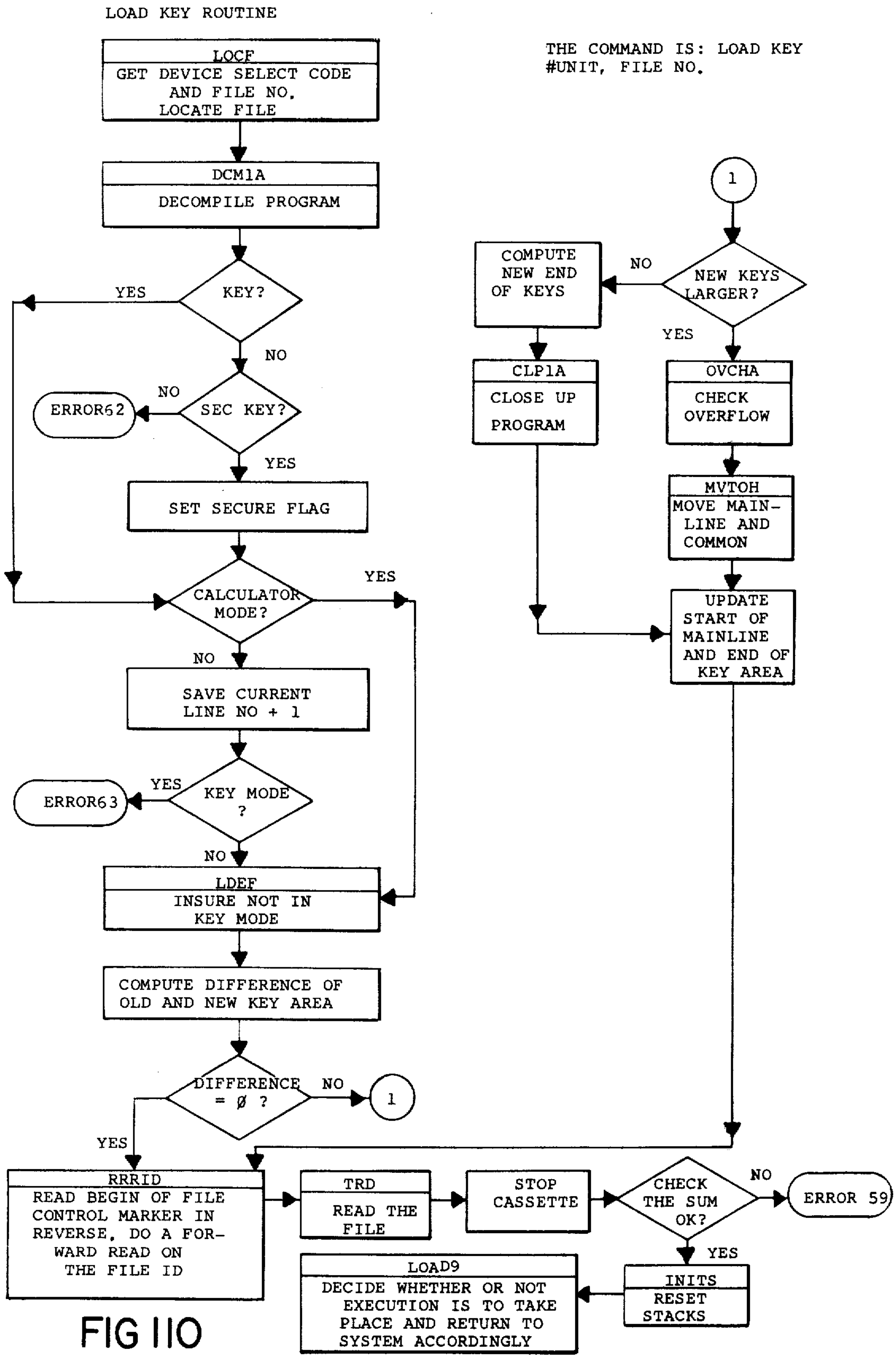

FIG. 110 is a flow chart of the load key execution routine of FIG. 4D.

Figure 111:
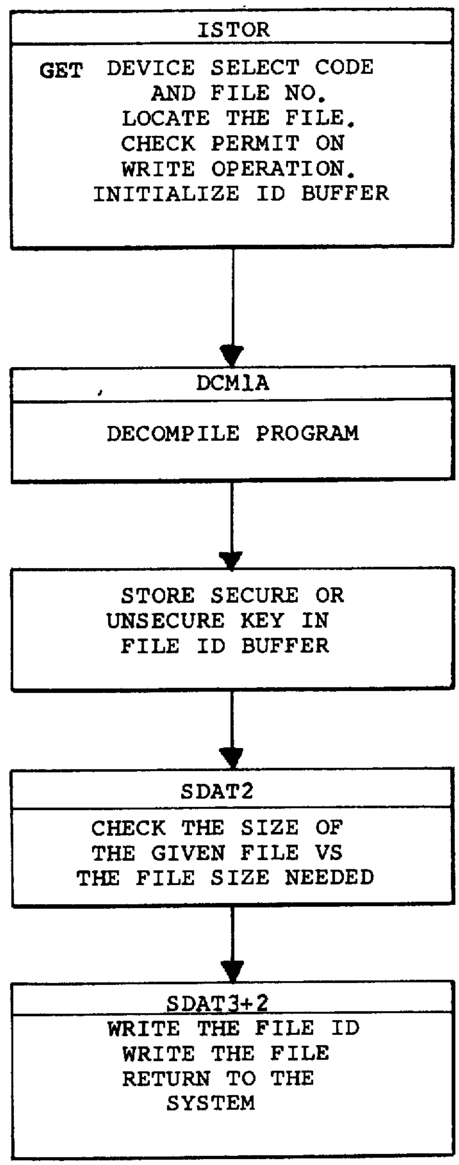

FIG. 111 is a flow chart of the store key execution routine of FIG. 4D.

Figure 112:
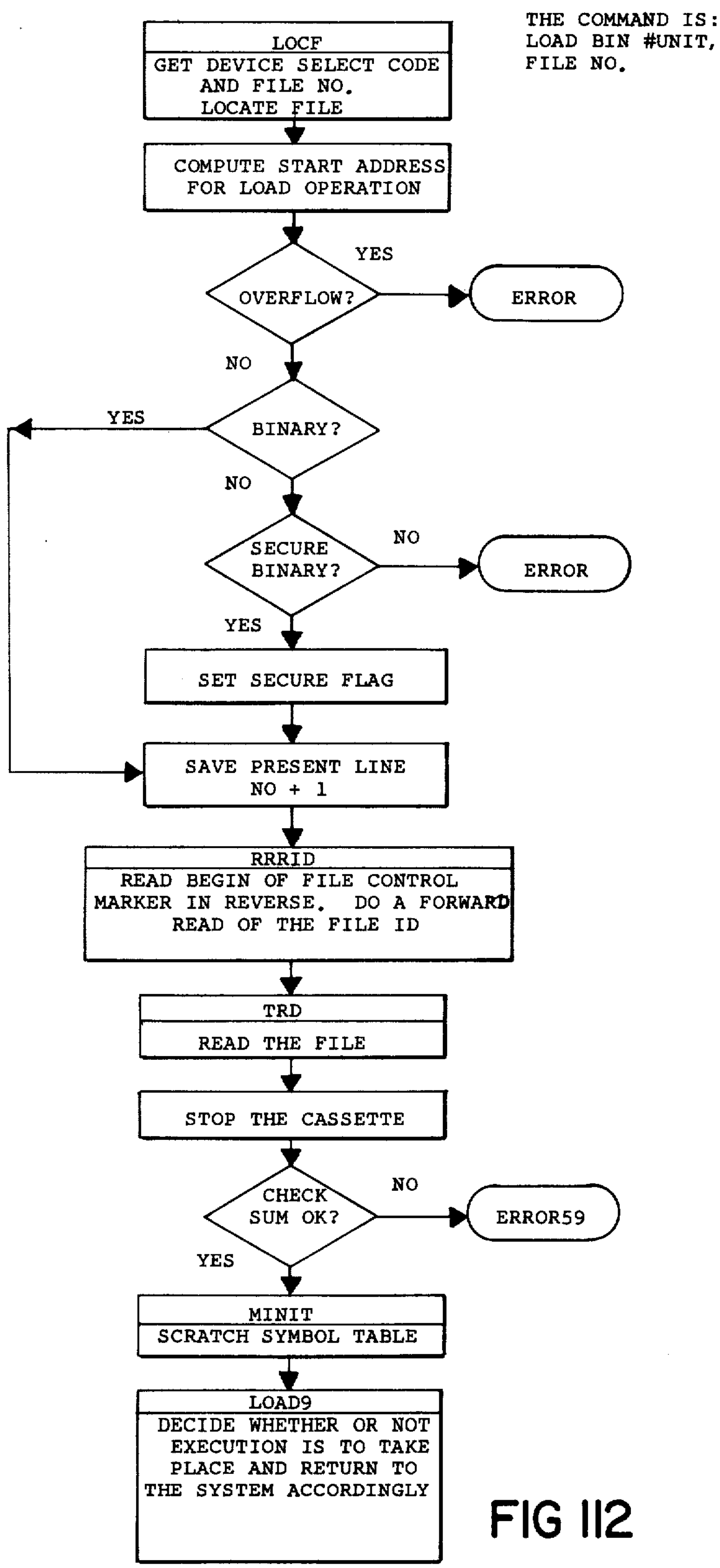

FIG. 112 is a flow chart of the load bin execution routine of FIG. 4D.

Figure 113:
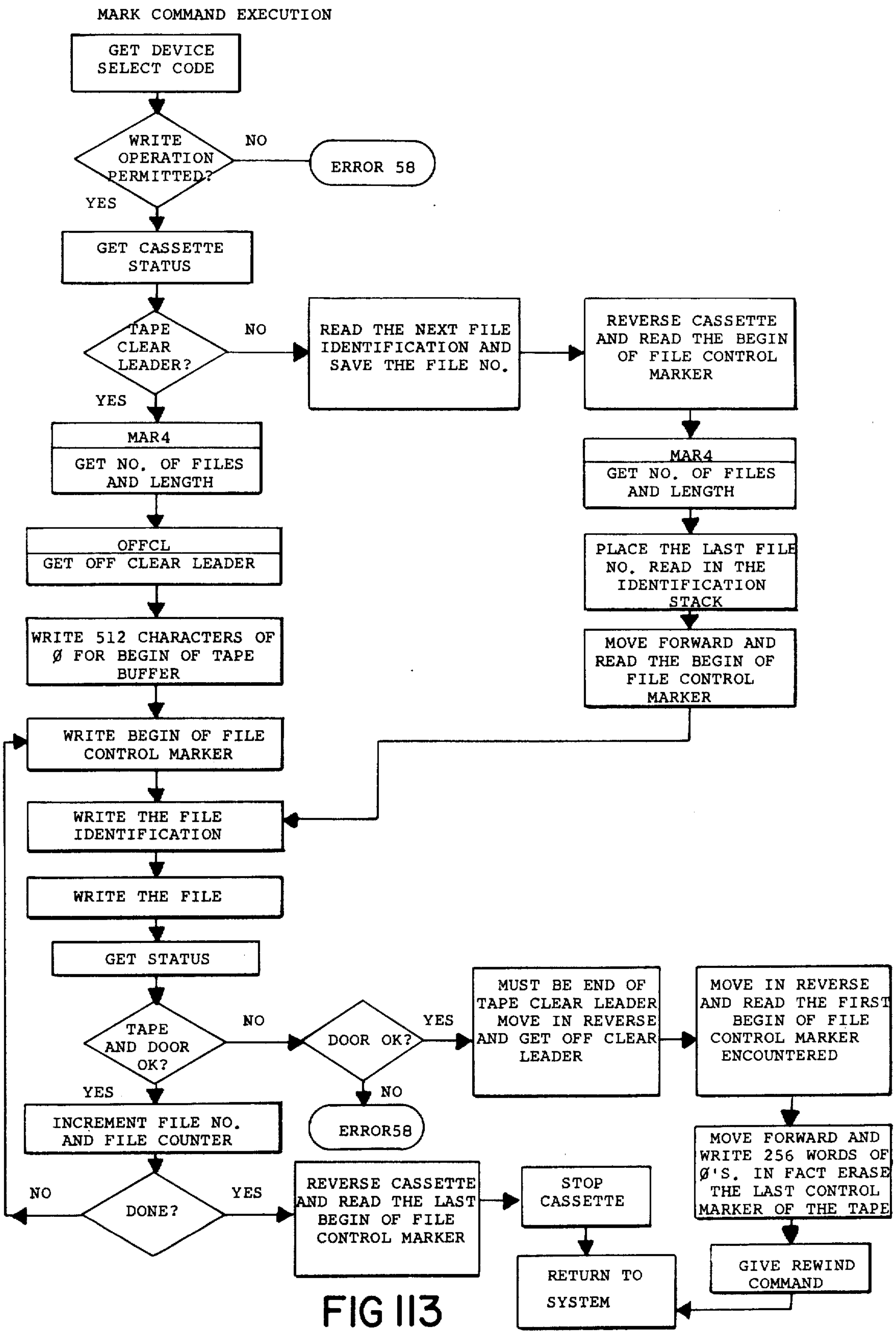

FIG. 113 is a flow chart of the mark execution routine of FIG. 4D.

Figure 114:
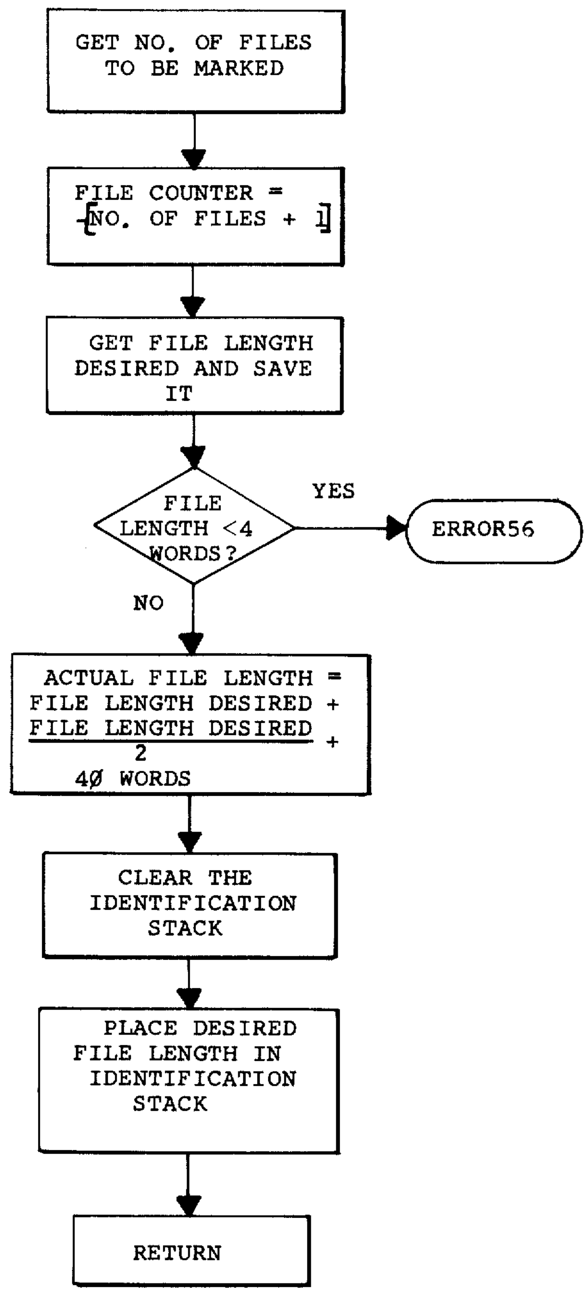

FIG. 114 is a flow chart of a subroutine called by the routine of FIG. 113.

Figure 115A:
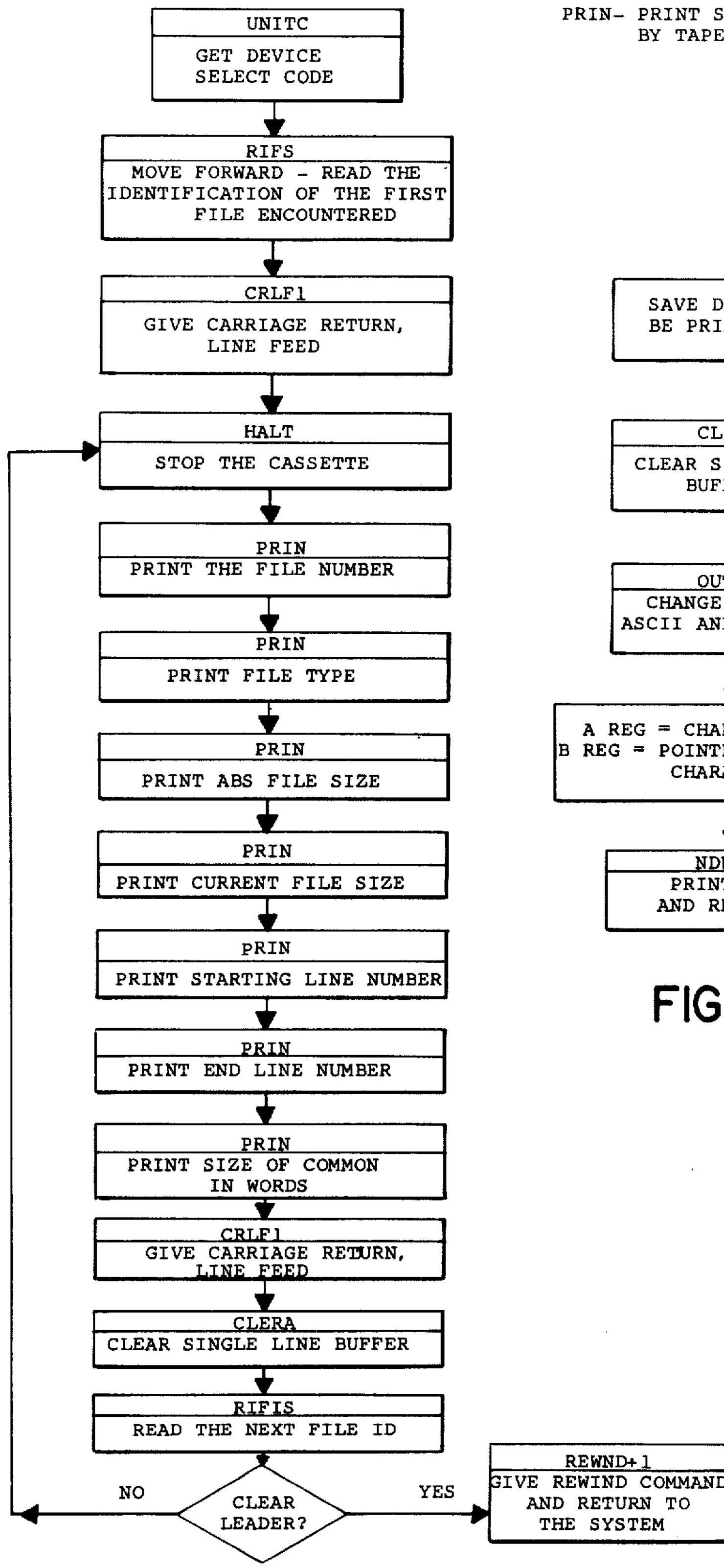

FIG. 115A is a flow chart of the list execution routine of FIG. 4D.

Figure 115B:
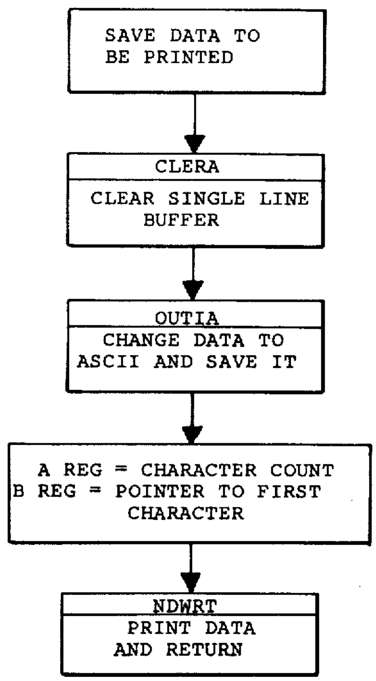

FIG. 115B is a flow chart of a subroutine called by the routine of FIG. 115A.

Figure 116:
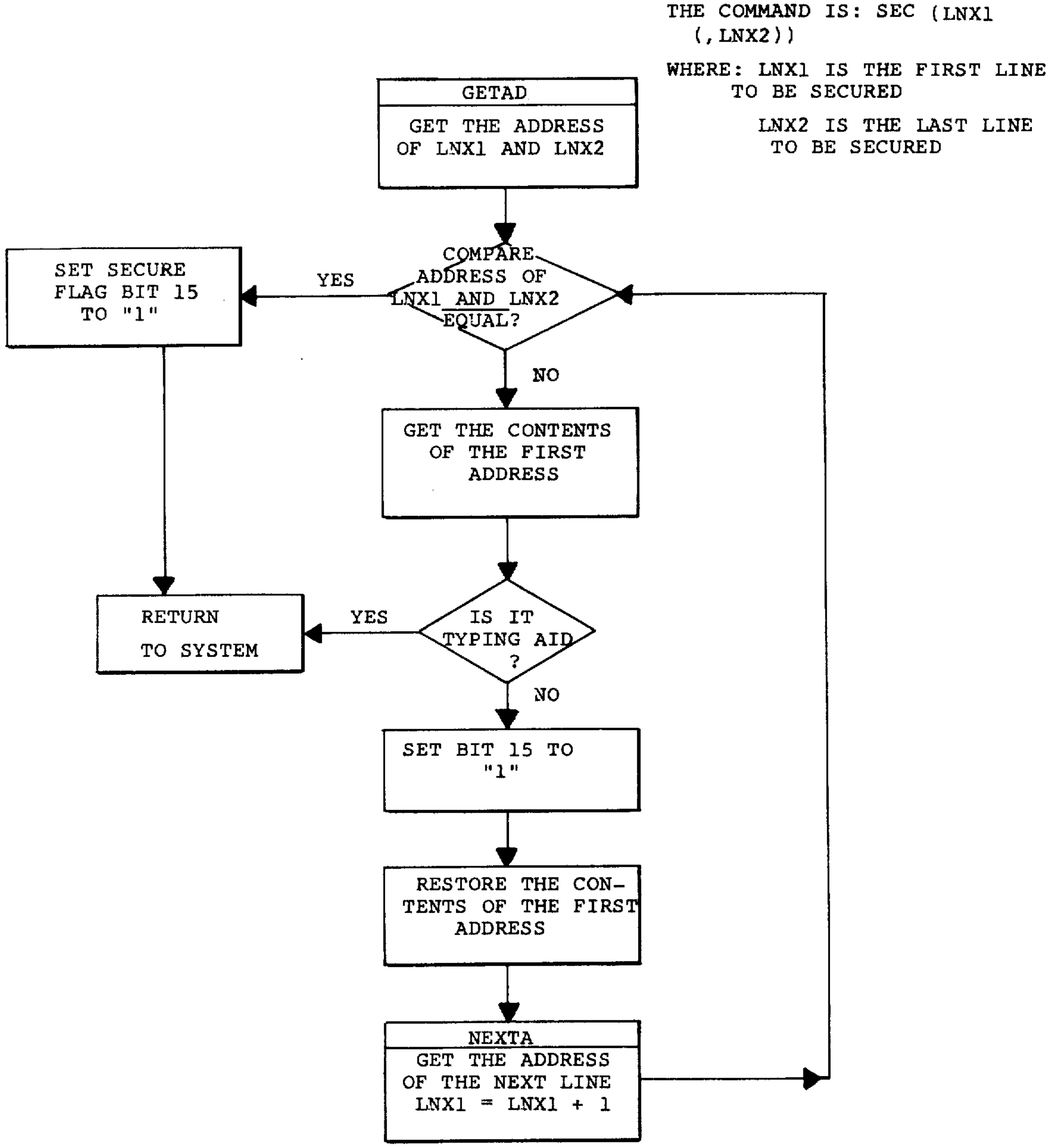

FIG. 116 is a flow chart of the secure routine of FIG. 4D.

Figure 117A:
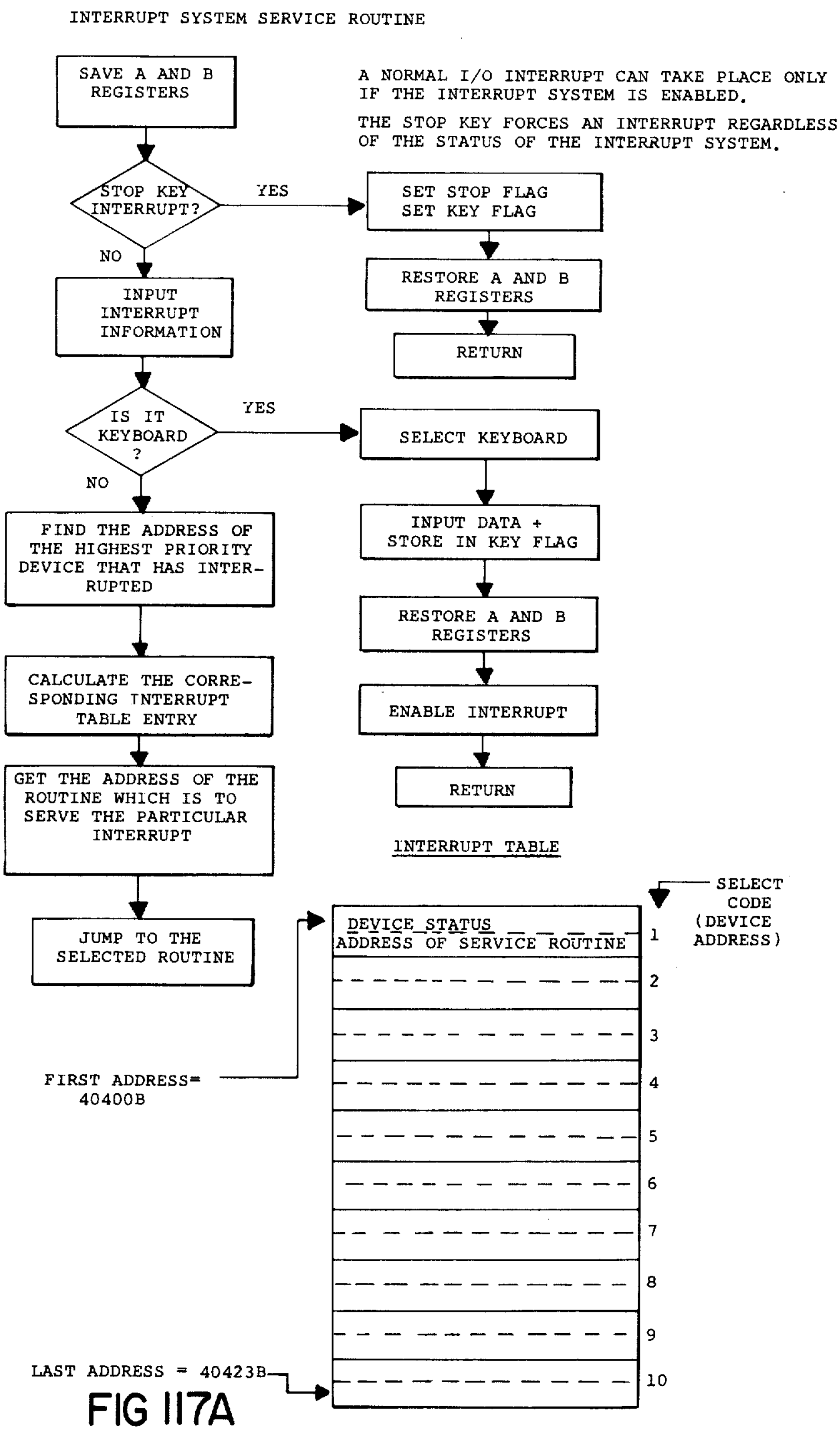
Figure 117B:
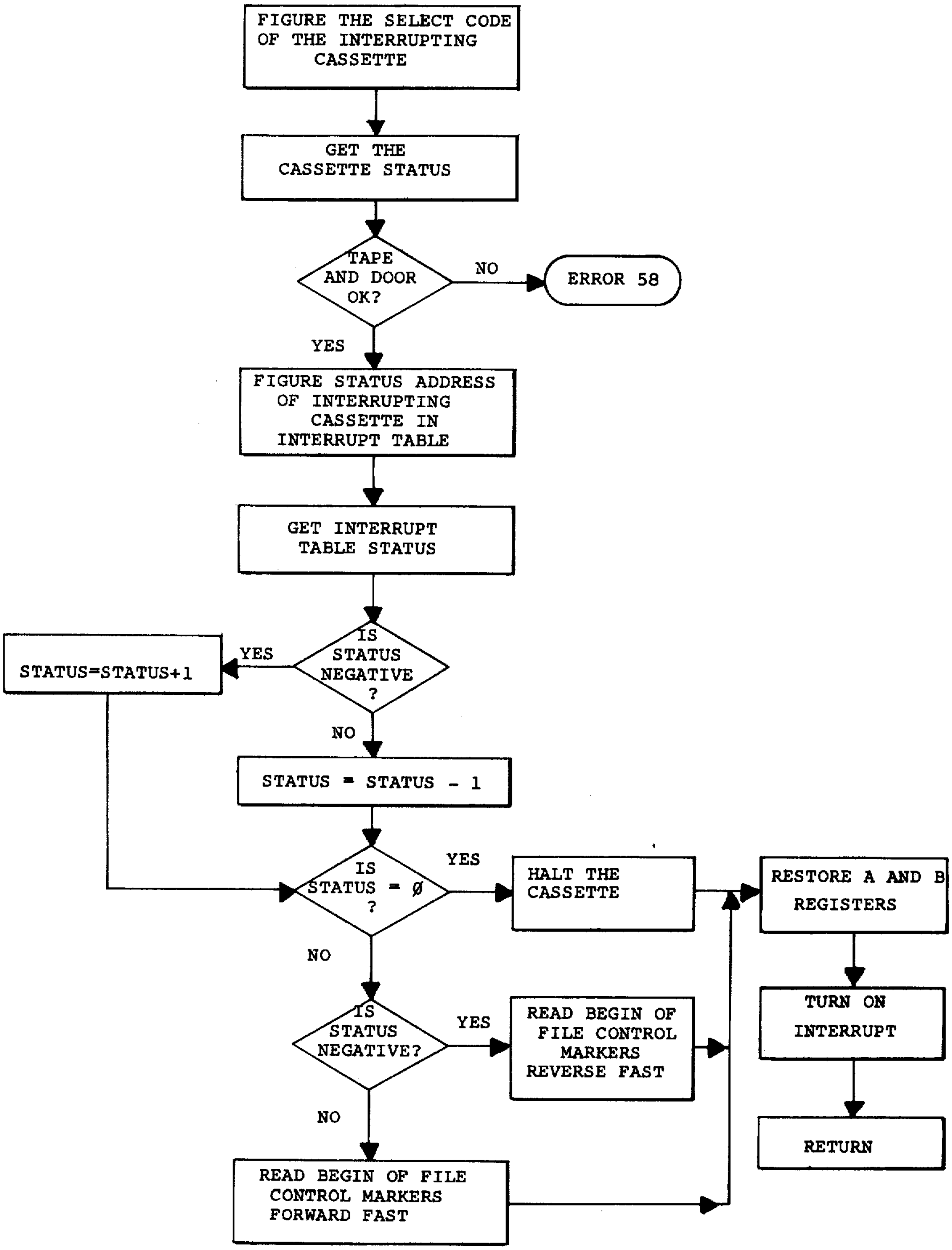

FIGS. 117A–B are a flow chart of the interrupt routine of FIG. 4D.

Figure 118A:
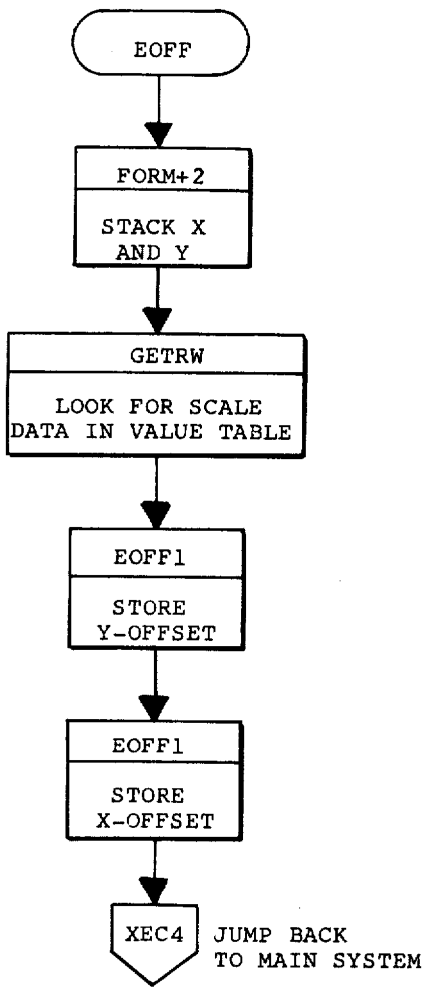
Figure 118B:
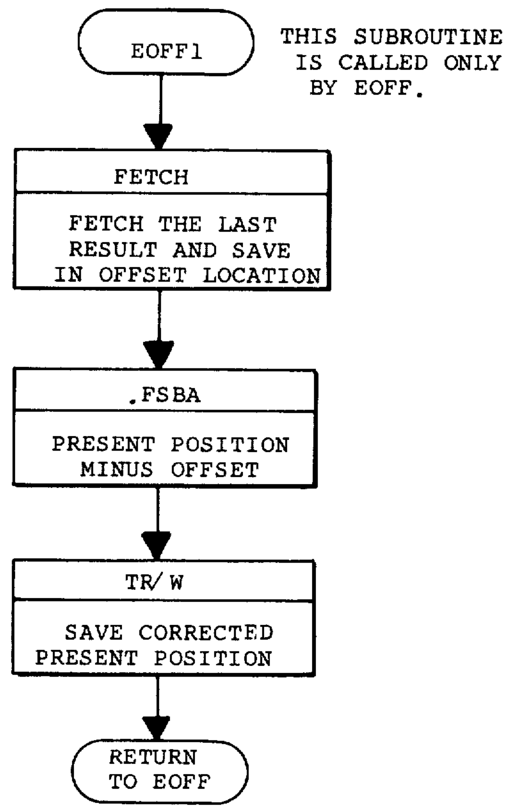

FIGS. 118A–B are a flow chart of a routine for performing an OFFSET command selectable when the plotter plug-in read-only memory module is employed with the calculator.

Figure 119:
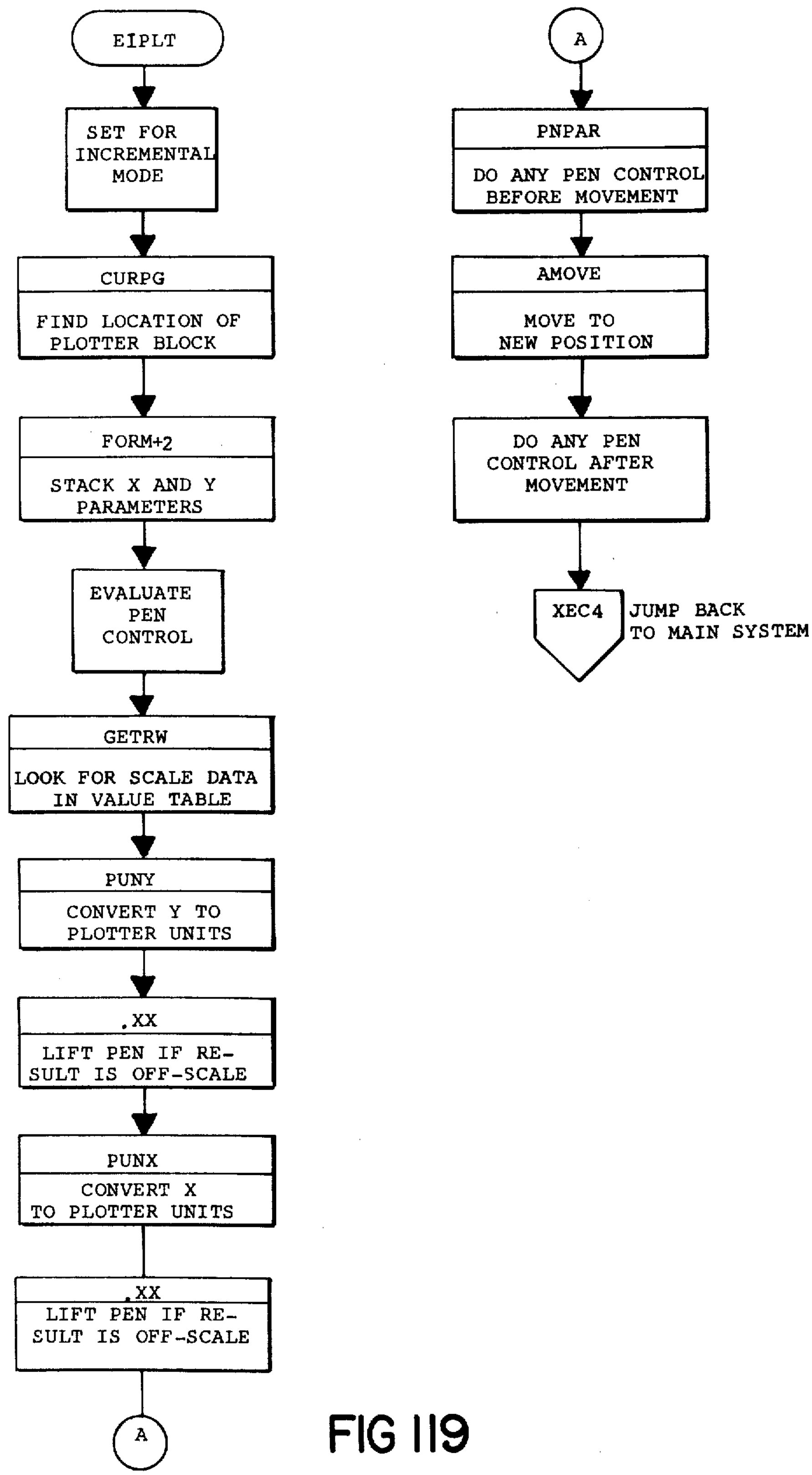

FIG. 119 is a flow chart of a routine for performing an IPLOT command selectable when the plotter plug-in read-only memory module is employed with the calculator.

Figure 120:
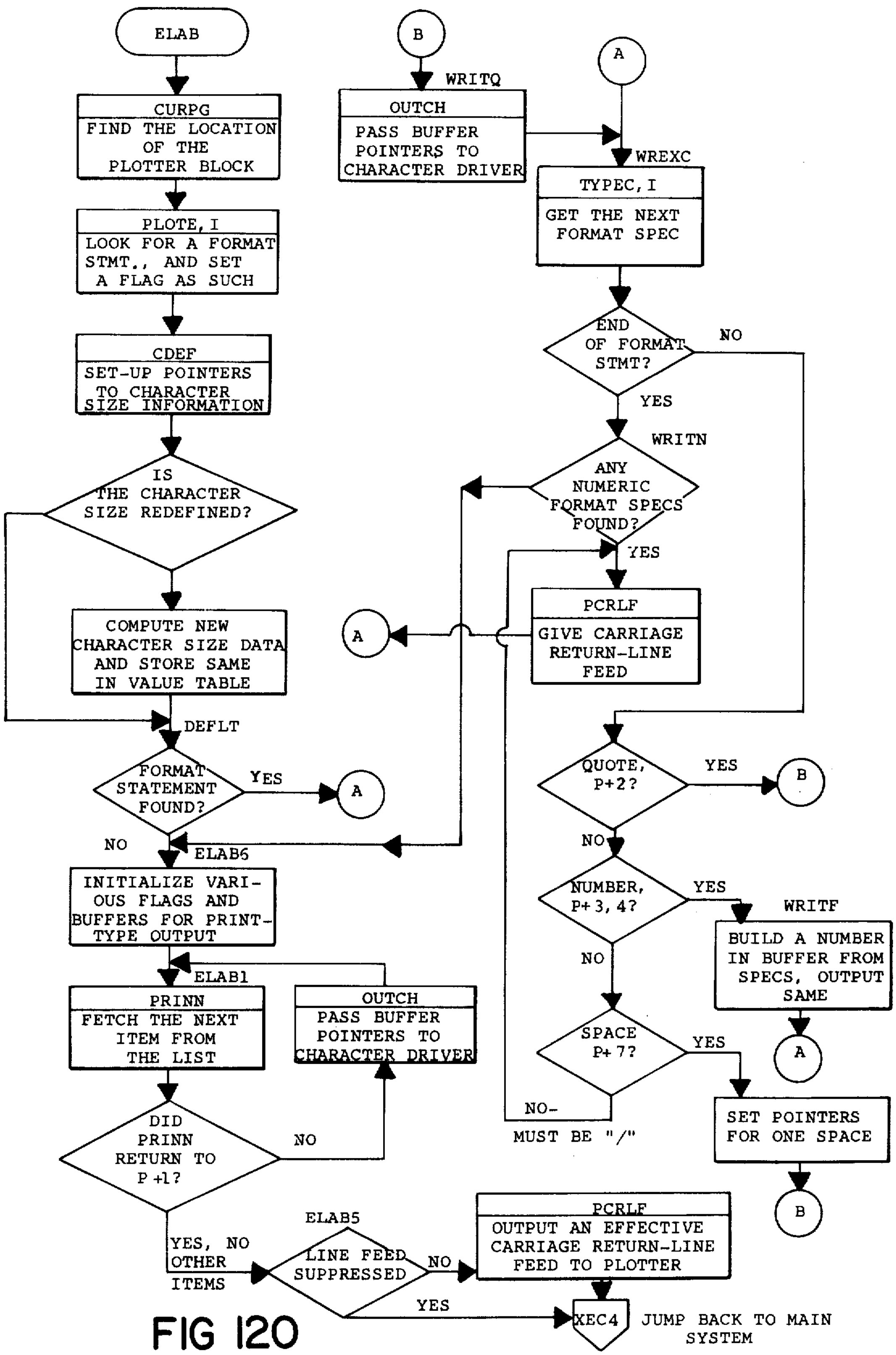

FIG. 120 is a flow chart of a routine for performing a LABEL command selectable when the plotter plug-in read-only memory module is employed with the calculator.

Figure 121:
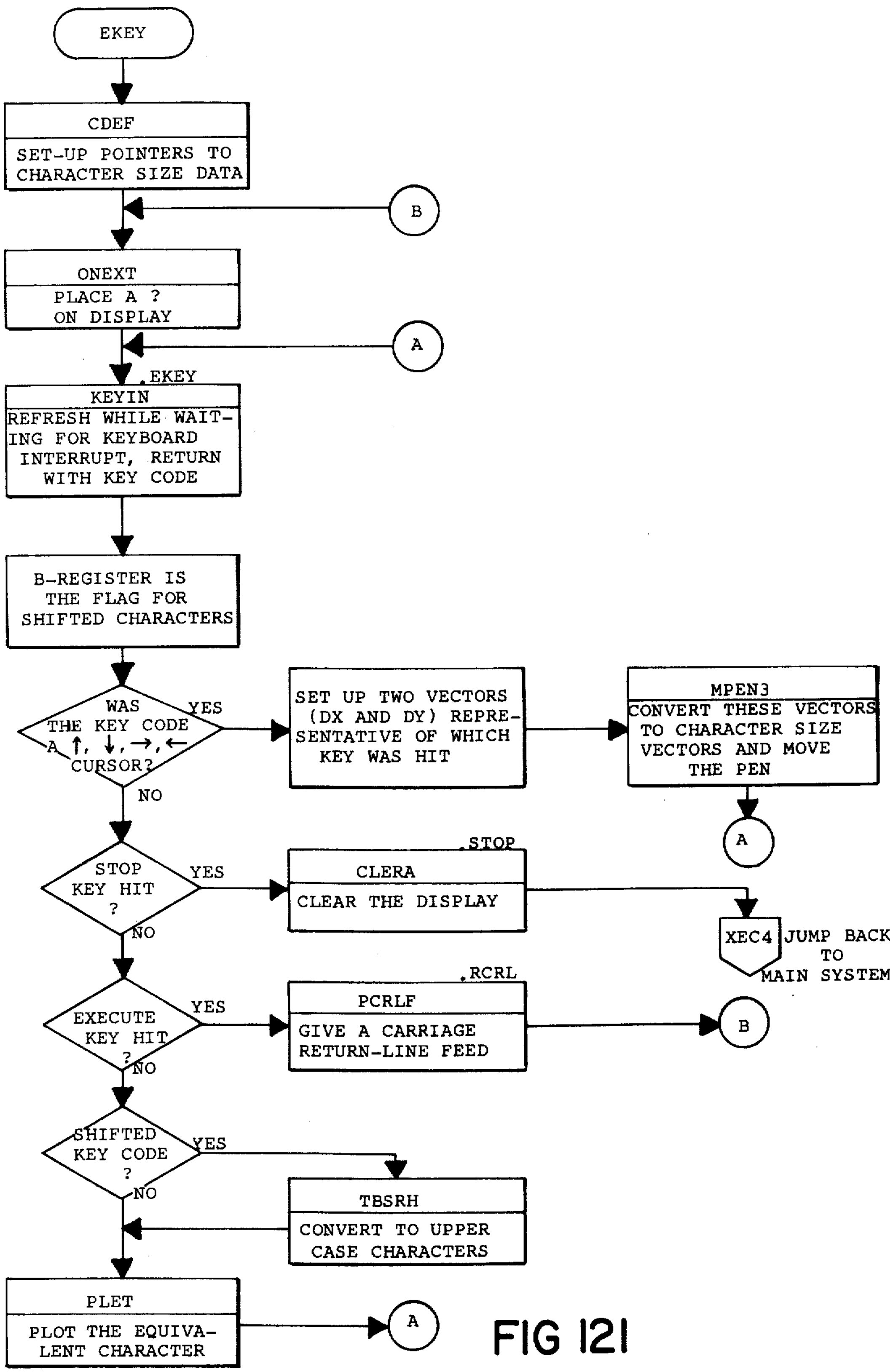

FIG. 121 is a flow chart of a routine for performing a LETTER command selectable when the plotter plug-in read-only memory module is employed with the calculator.

Figure 122:
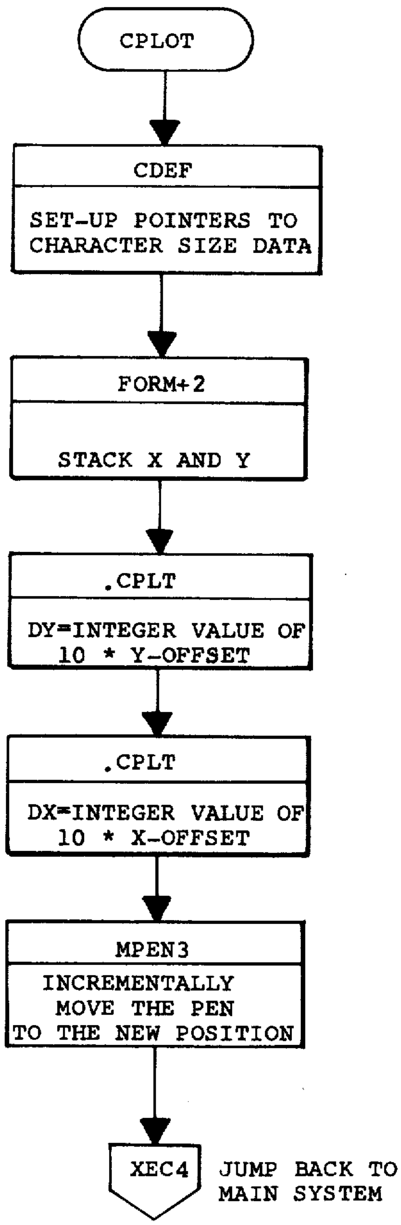

FIG. 122 is a flow chart of a routine for performing a CPLOT command selectable when the plotter plug-in read-only memory module is employed with the calculator.

Figure 123:
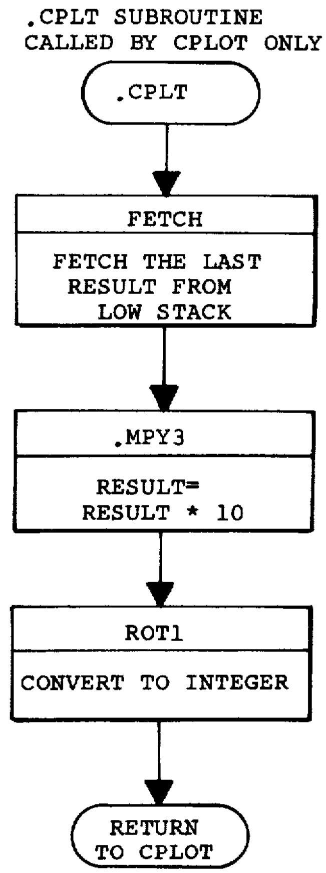

FIG. 123 is a flow chart of a subroutine employed by the routine of FIG. 122.

Figure 124:
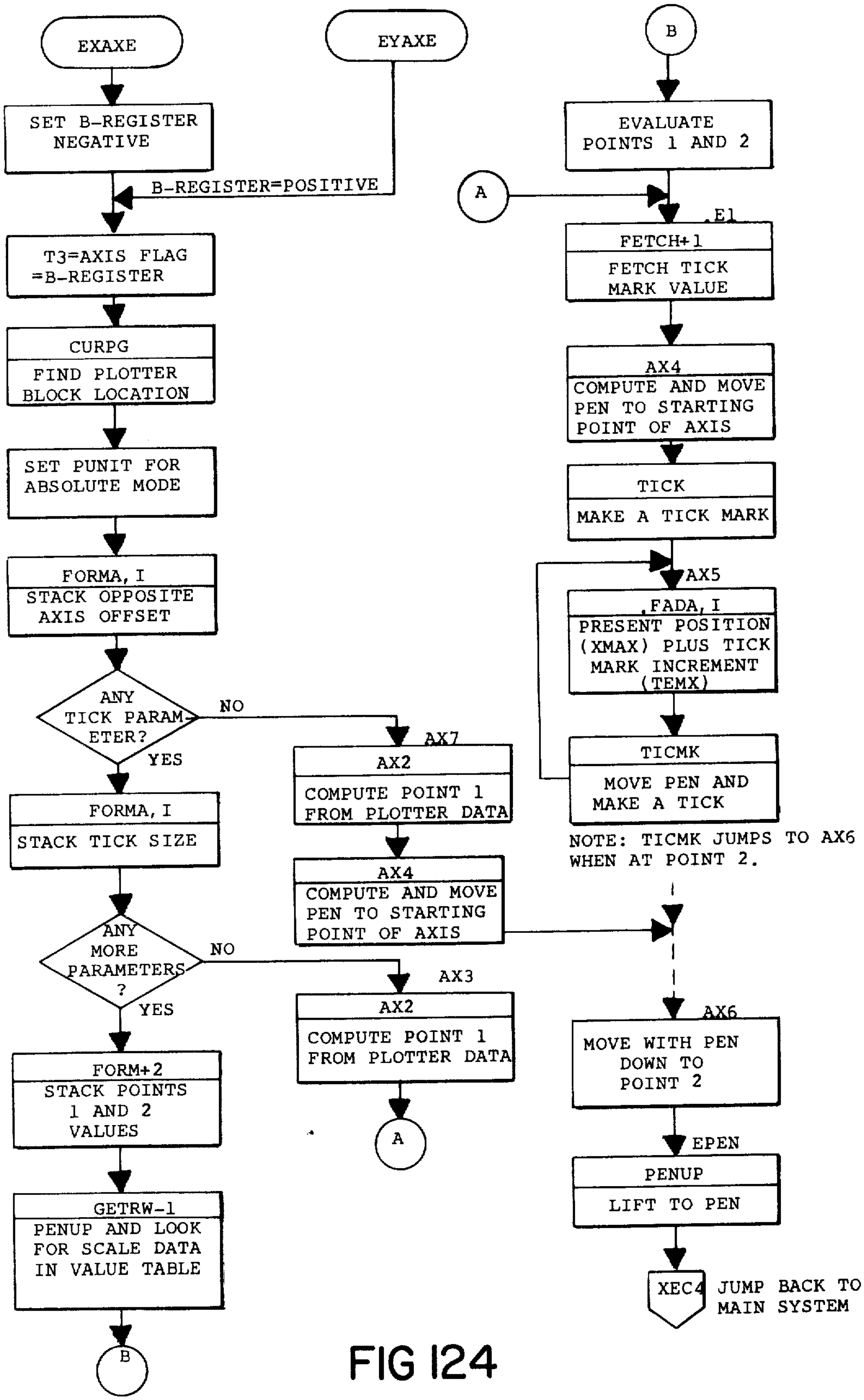

FIG. 124 is a flow chart of a routine for performing XAXIS and YAXIS commands selectable when the plotter plug-in read-only memory module is employed with the calculator.

Figure 125A:
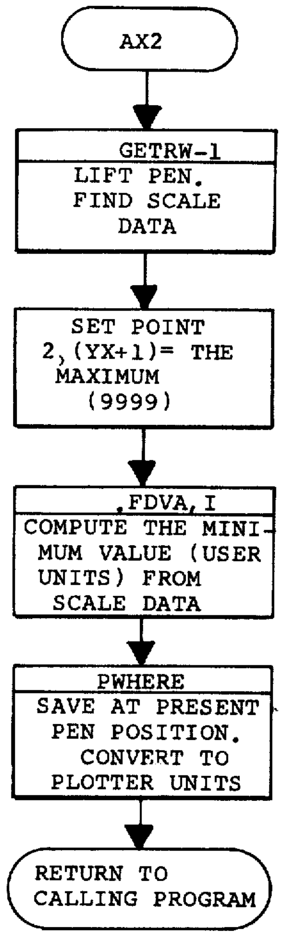
Figure 125B:
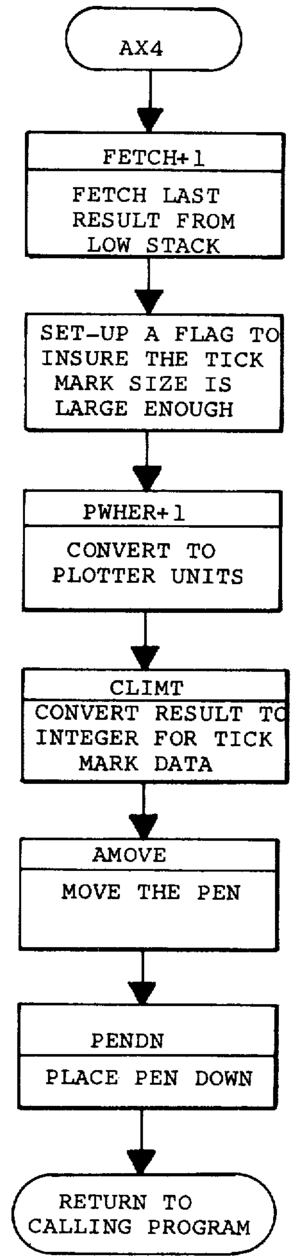
Figure 125C:
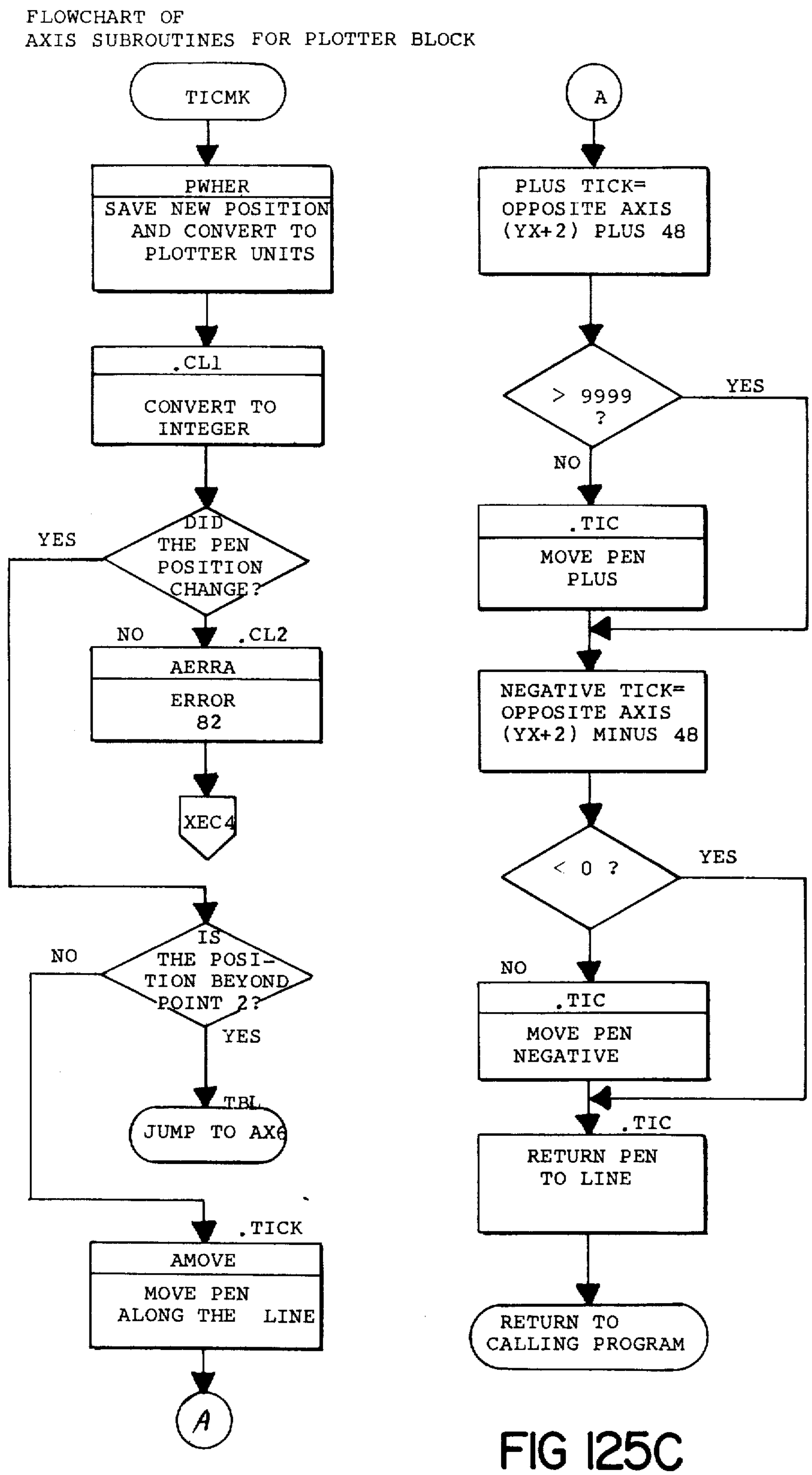

FIGS. 125A–C are flow charts of subroutines called by the routine of FIG. 124.

Figure 126A:
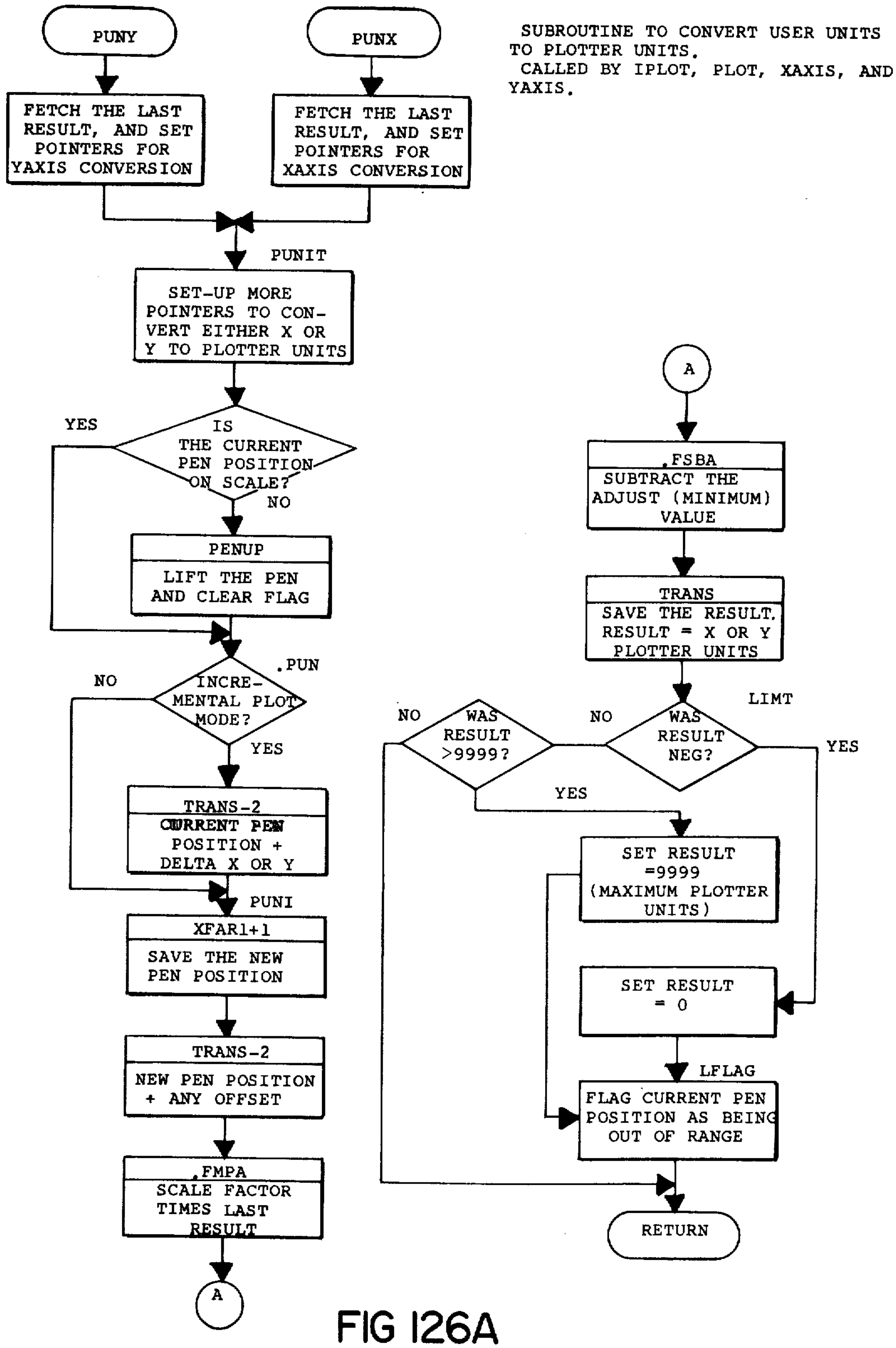
Figure 126B:
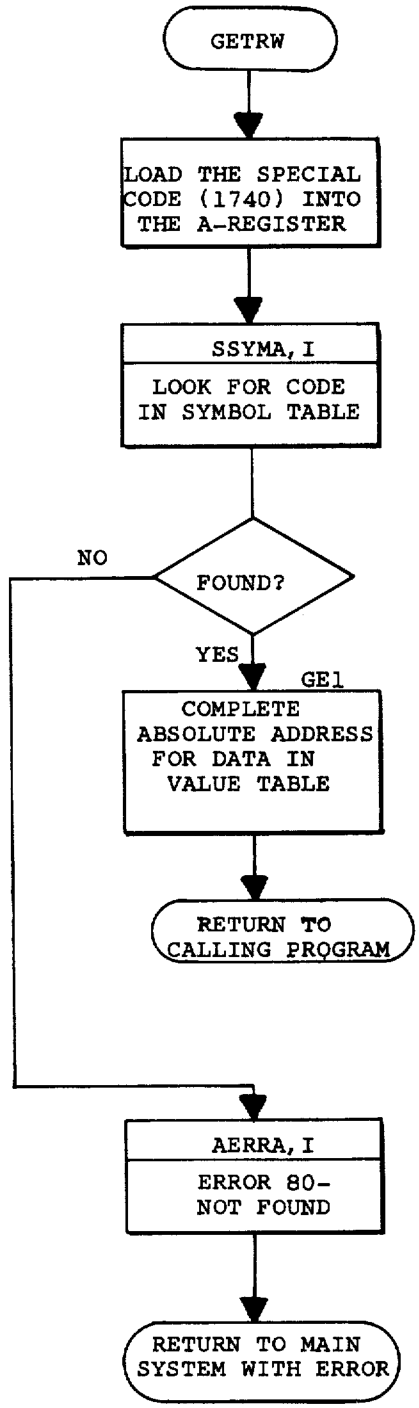
Figure 126C:
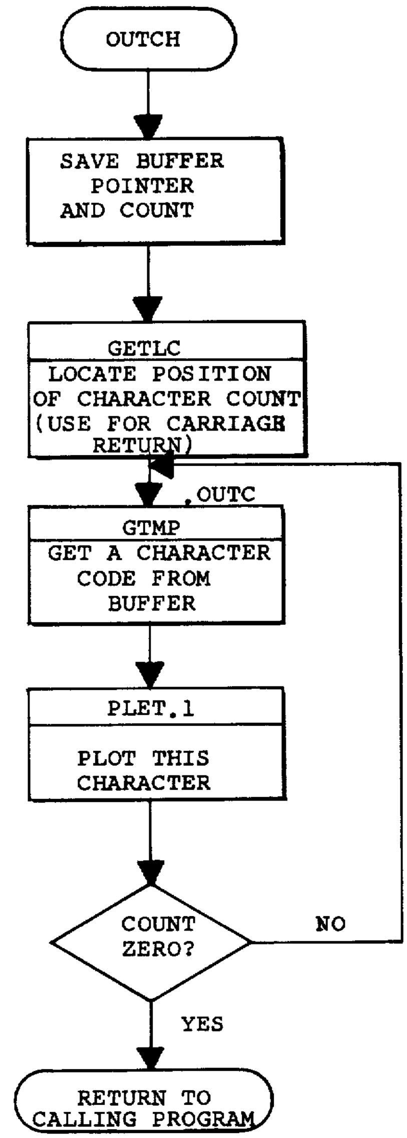

FIGS. 126A–C are flow charts of subroutines called by the routines of FIGS. 118–124.

Figure 127:
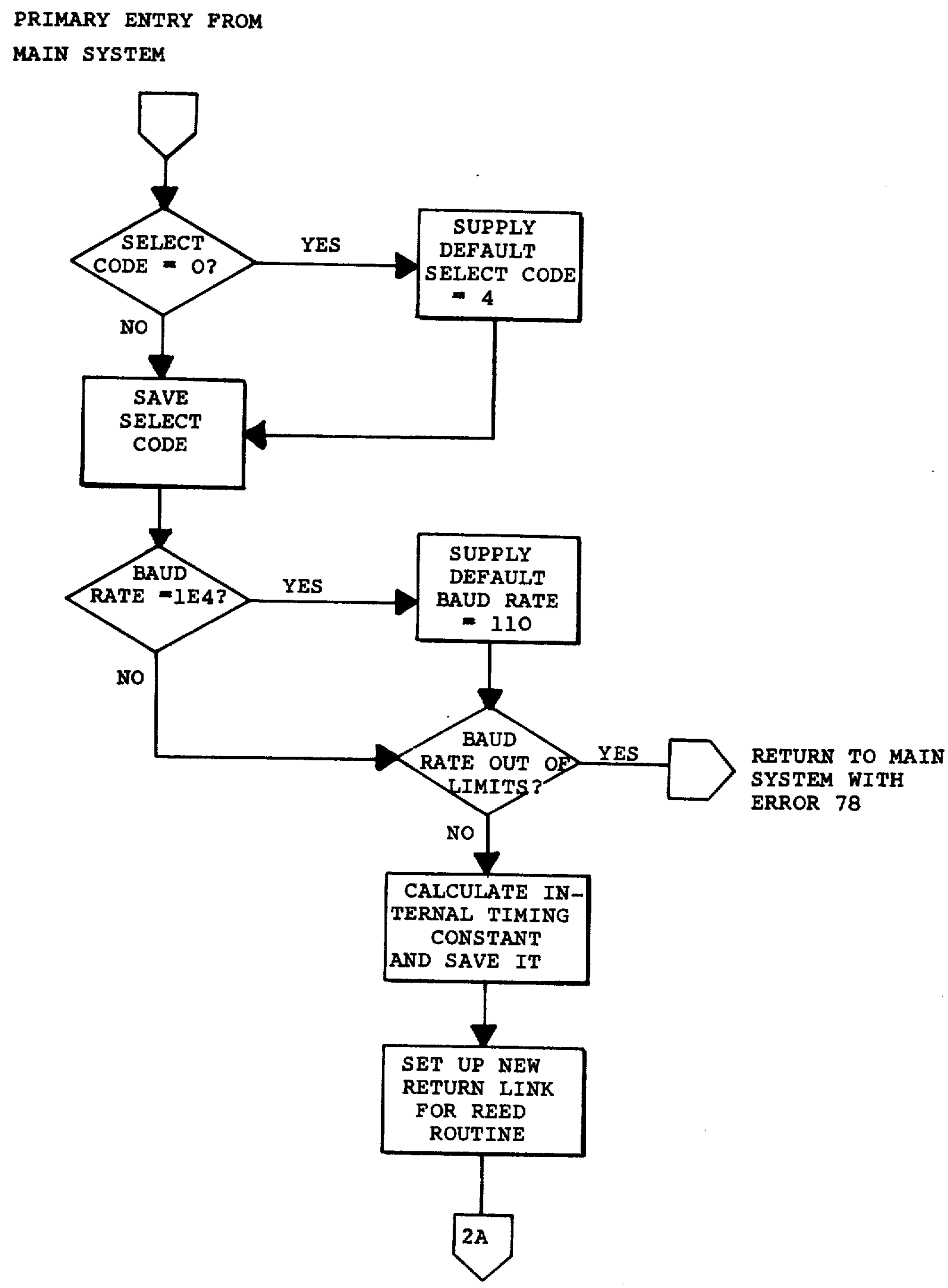

FIG. 127 is a flow chart of a primary entry routine employed when the terminal read-only memory module is plugged into the calculator.

Figure 128A:
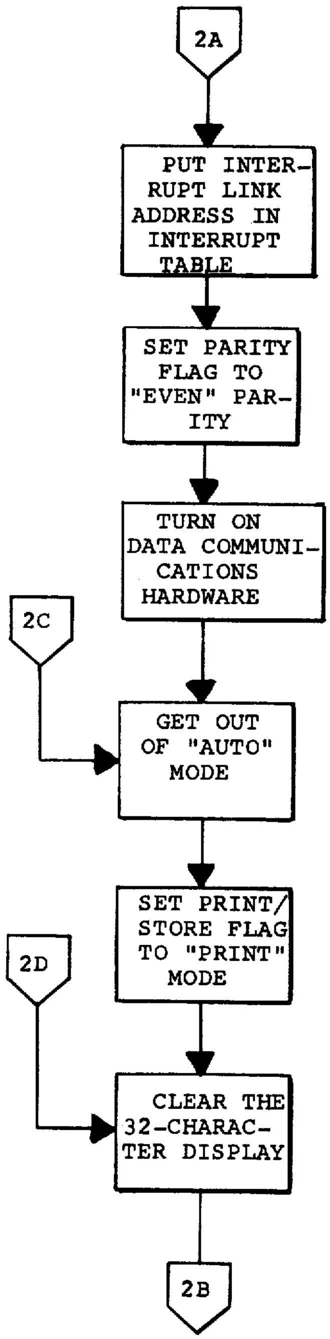
Figure 128B:
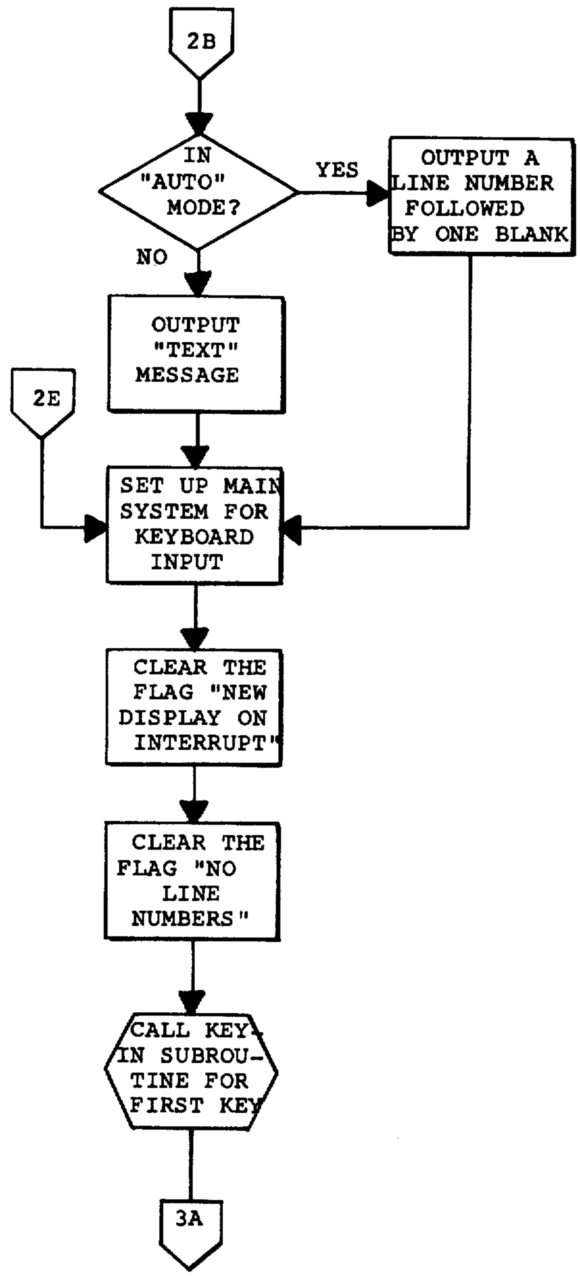
Figure 128C:
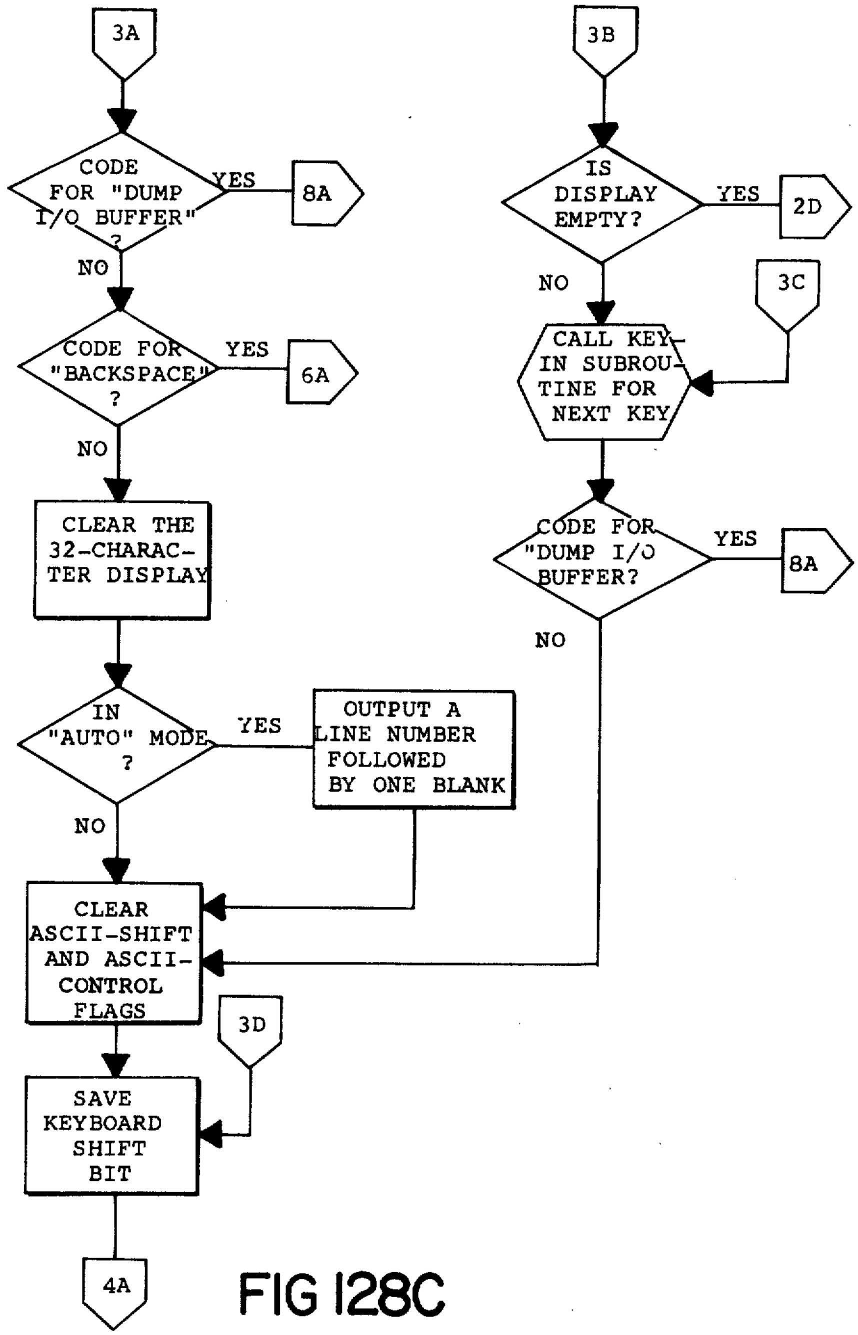
Figure 128D:
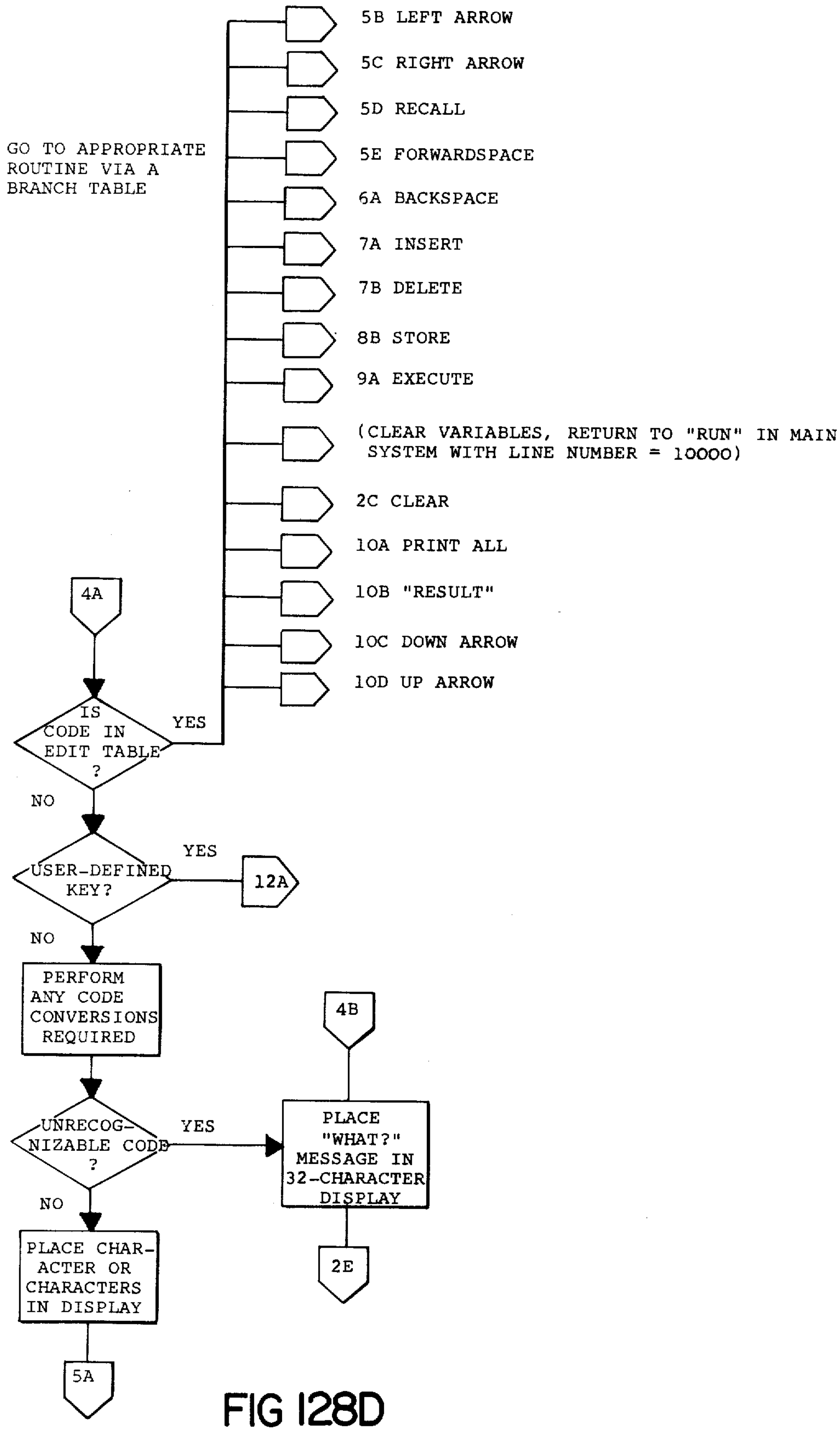
Figure 128E:
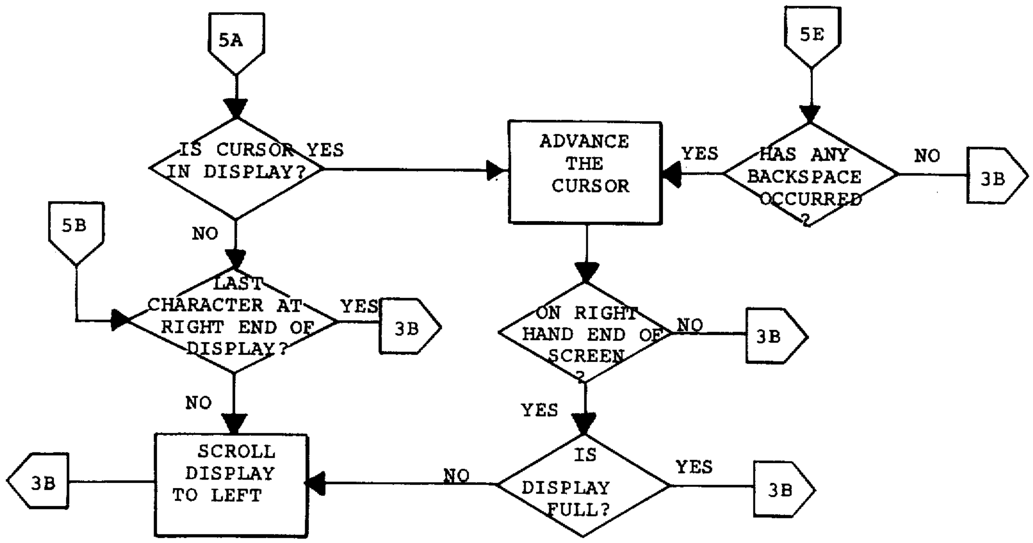
Figure 128F:
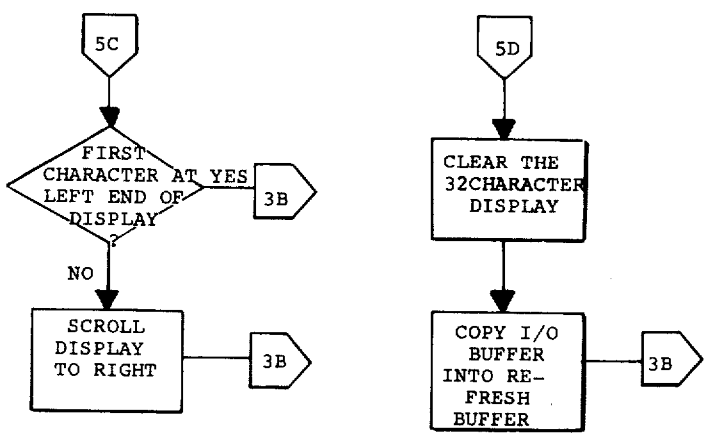
Figure 128G:
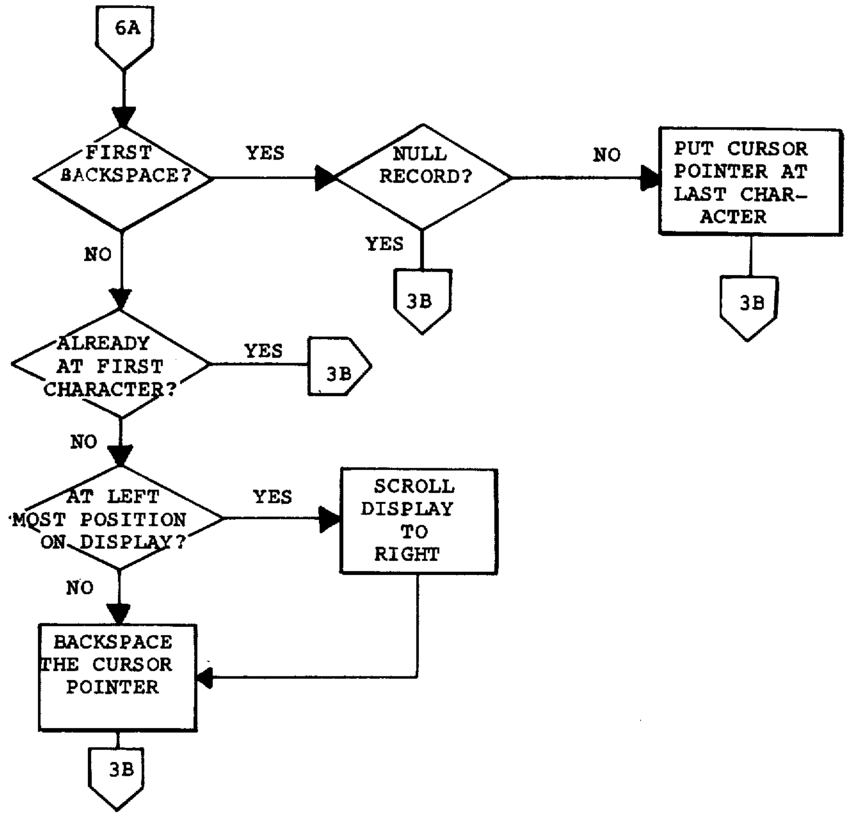
Figure 128G:
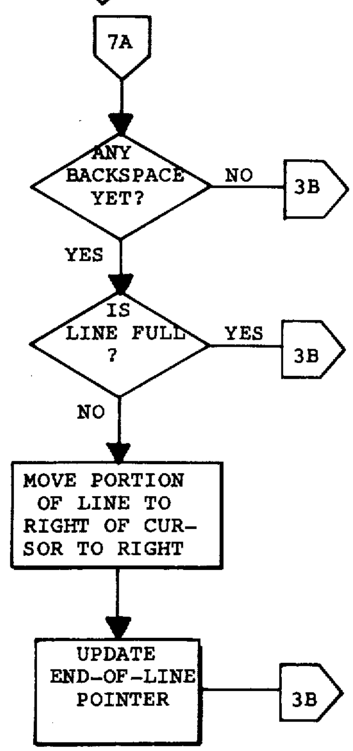
Figure 128H:
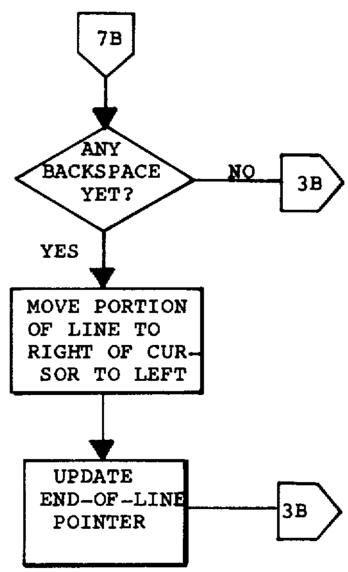
Figure 128I:
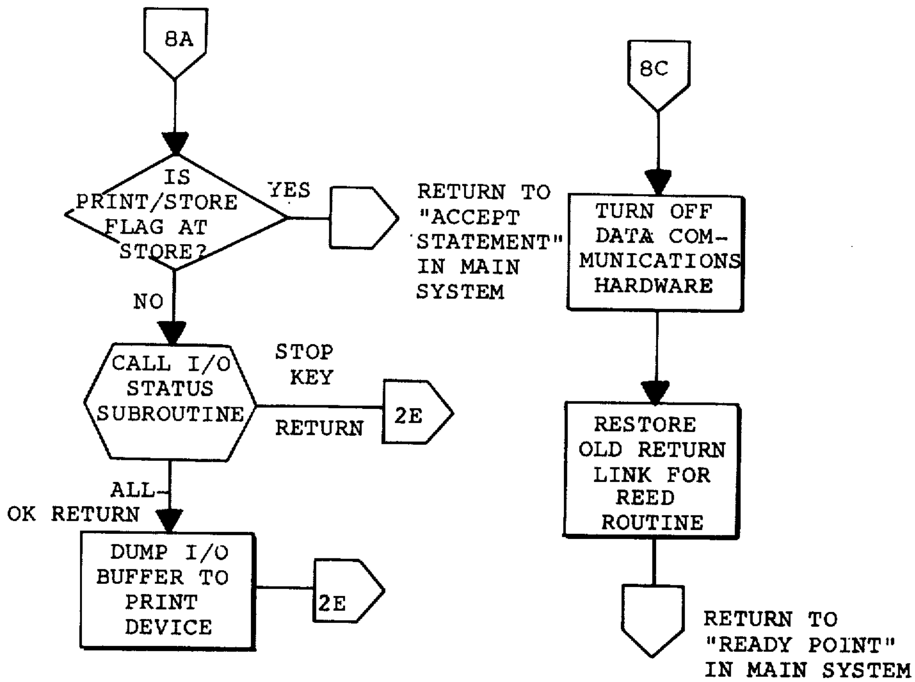
Figure 128J:
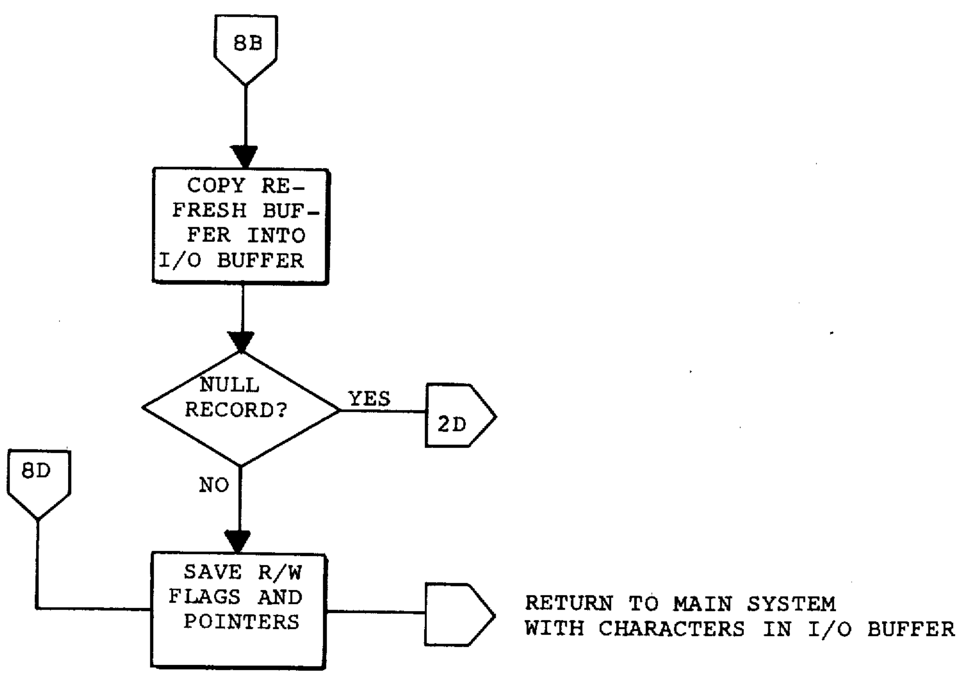
Figure 128K:
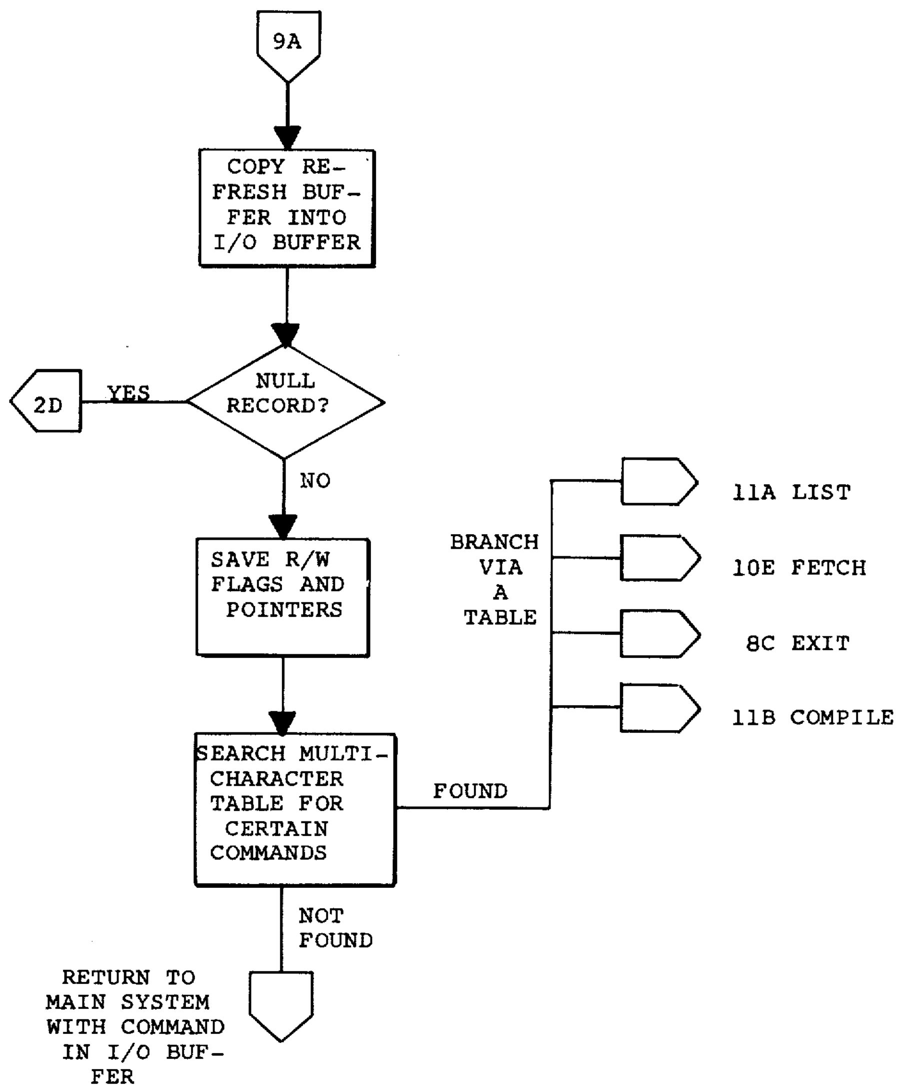
Figure 128L:
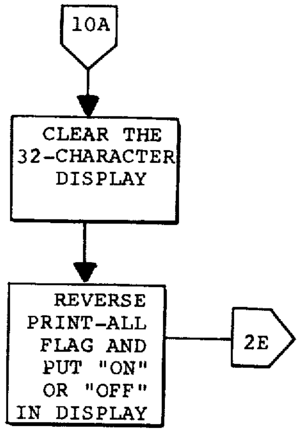
Figure 128M:
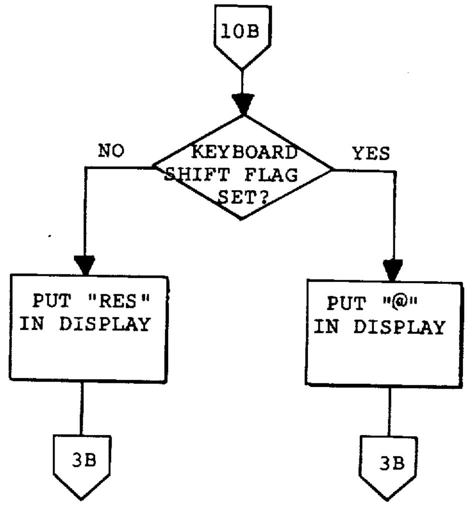
Figure 128N:
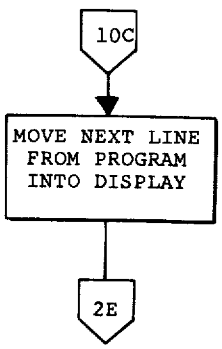
Figure 128O:
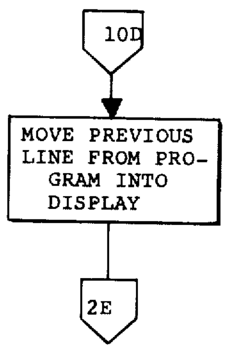
Figure 128P:
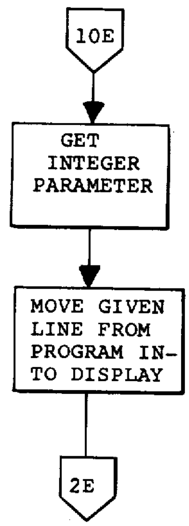
Figure 128Q:
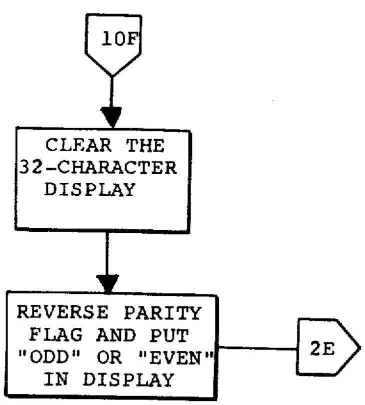
Figure 128R:
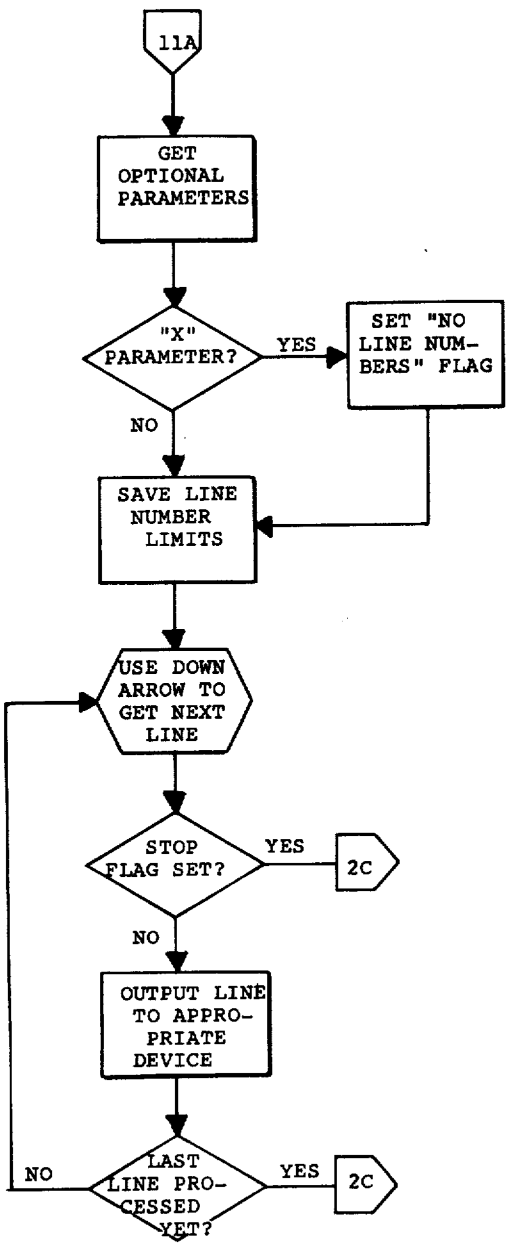
Figure 128S:
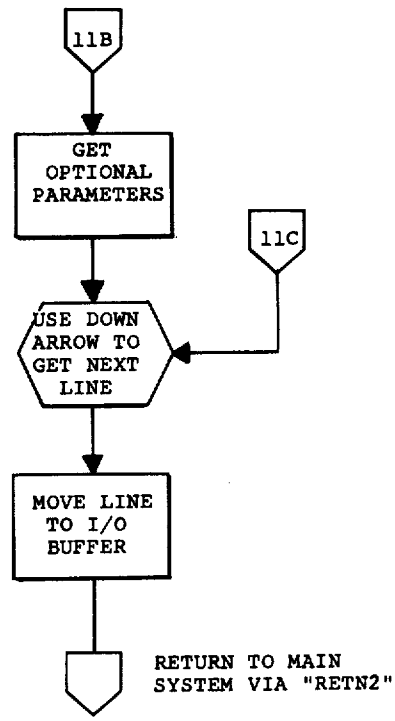
Figure 128T:
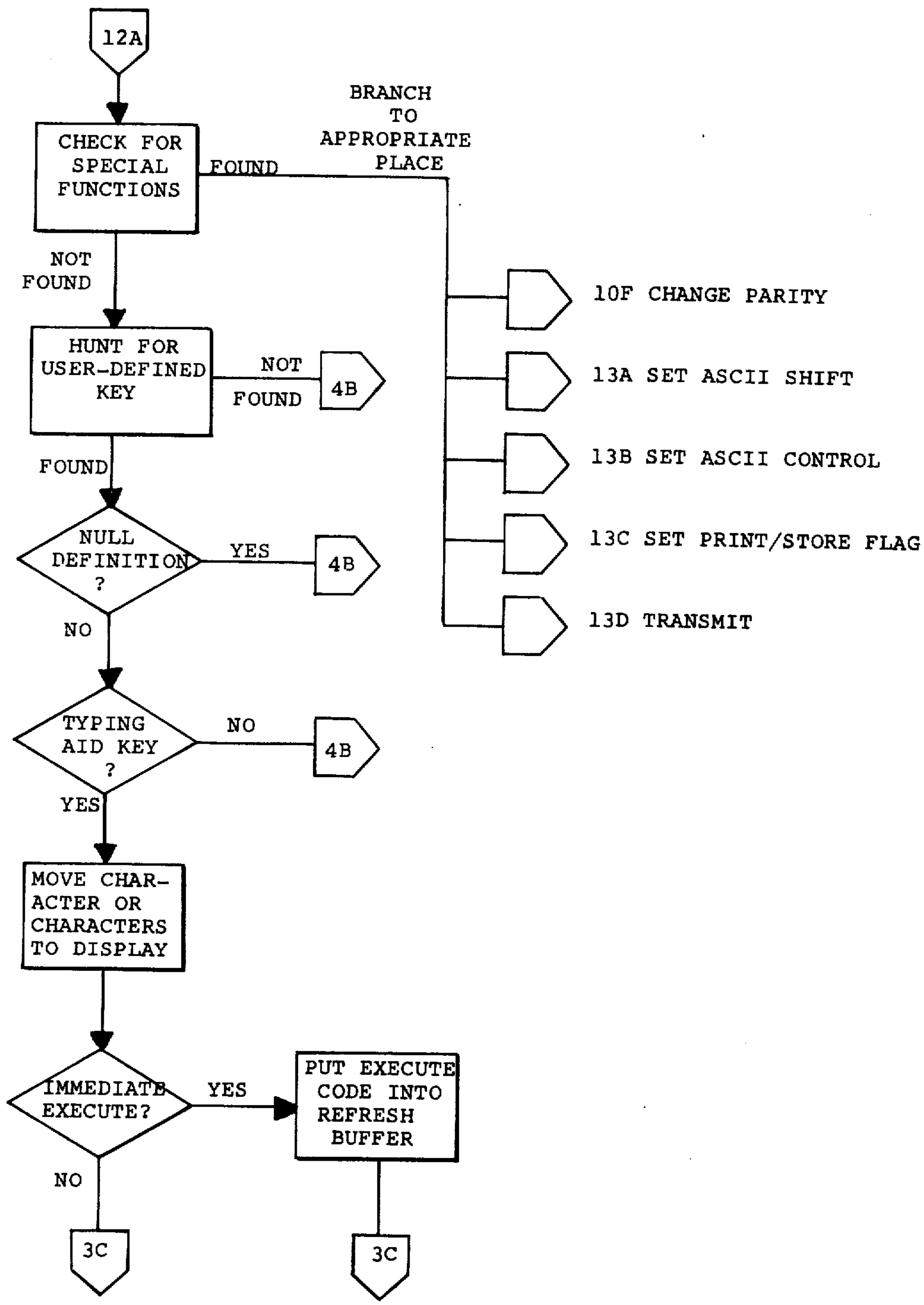
Figure 128U:
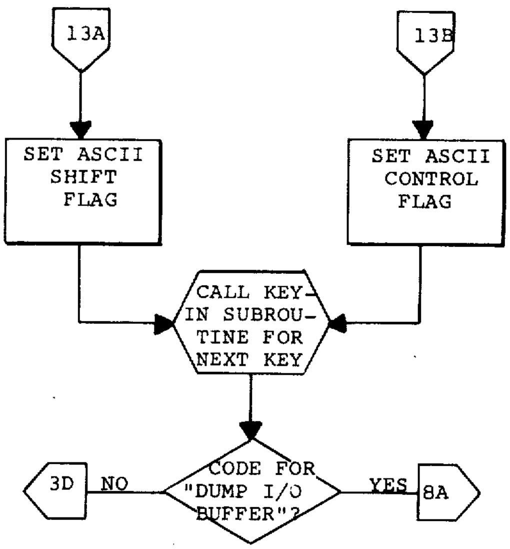
Figure 128V:
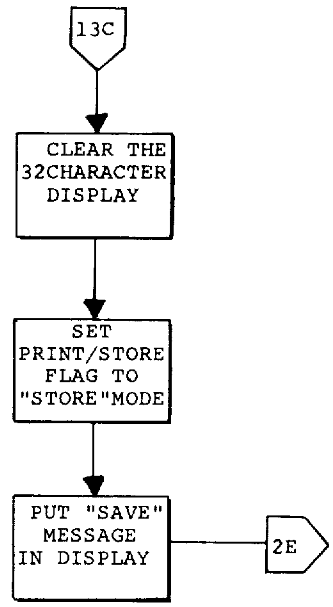
Figure 128W:
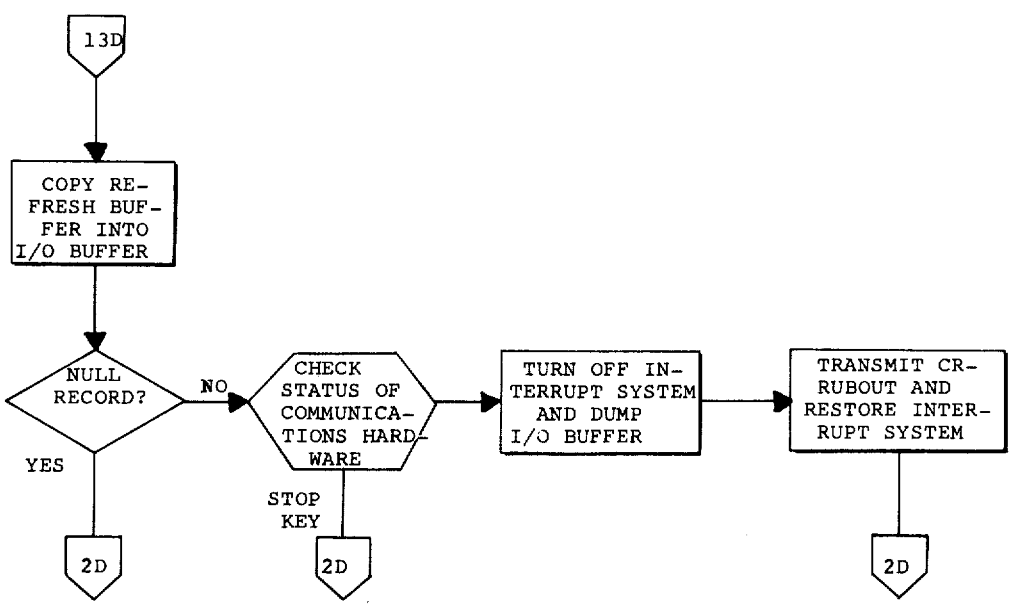

FIGS. 128A–W are a flow chart of a keyboard input and editing routine employed when the terminal read-only memory module is plugged into the calculator.

Figure 129A:
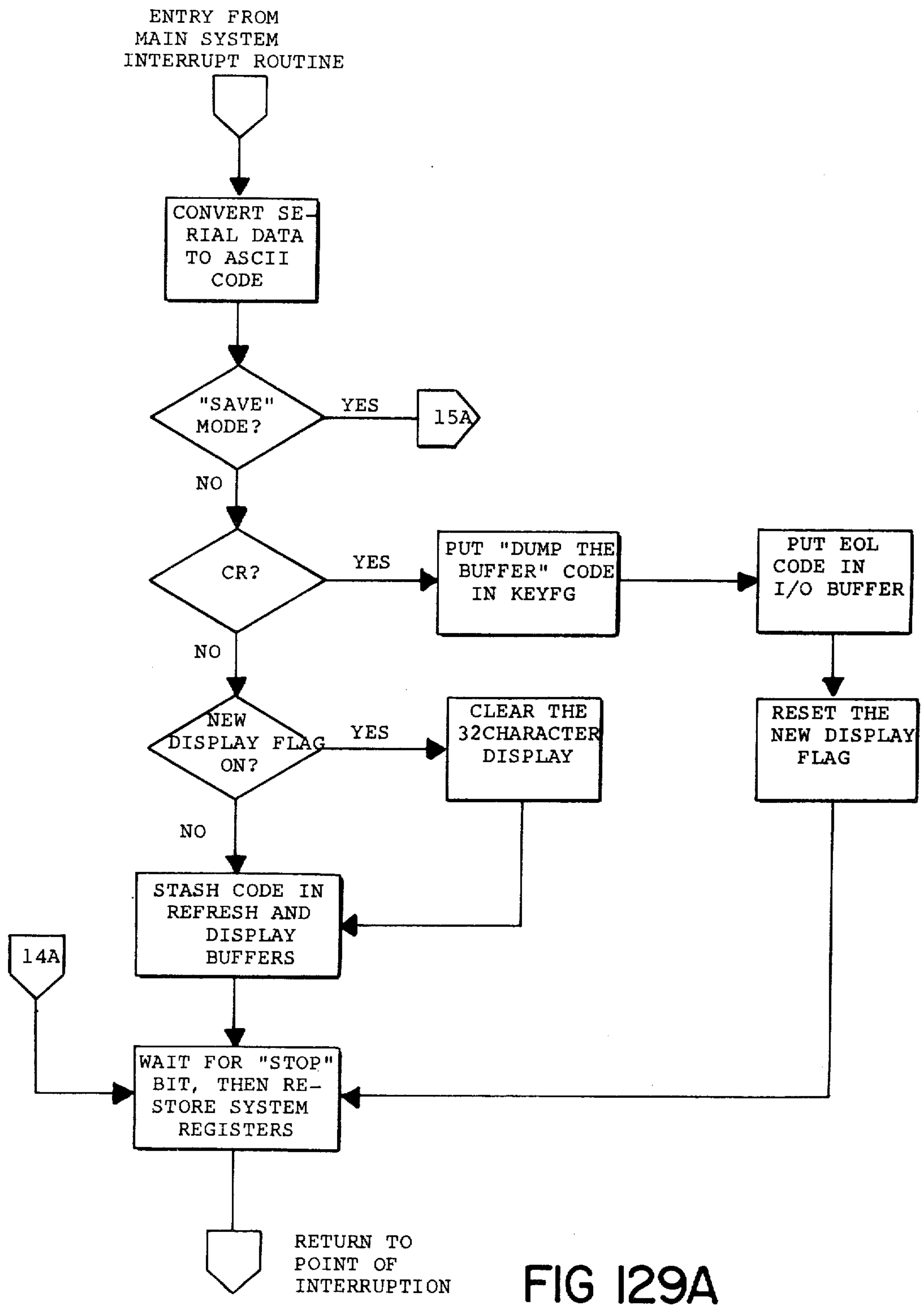
Figure 129B:
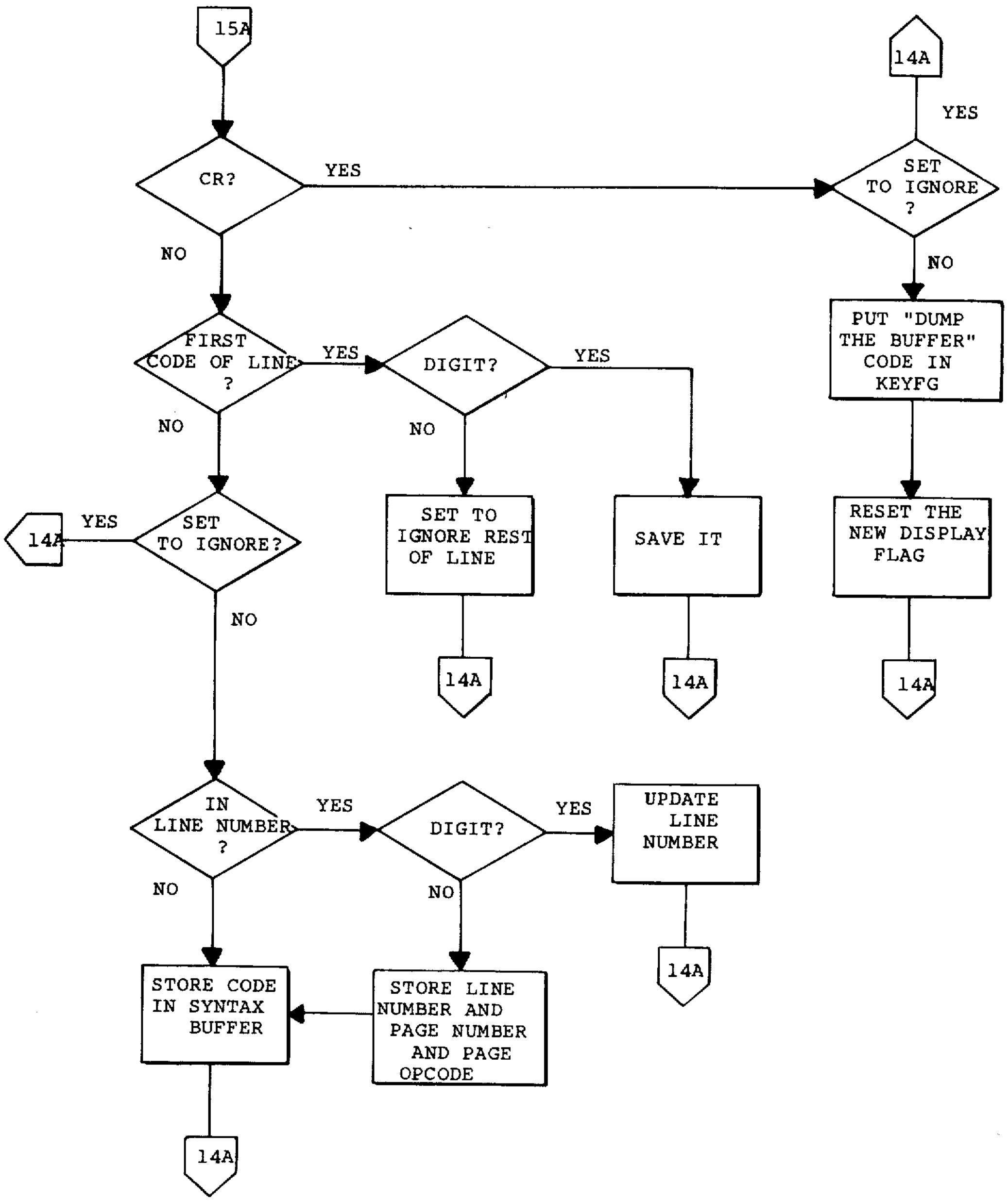

FIGS. 129A–B are a flow chart of a modem interrupt service routine employed when the terminal read-only memory module is plugged into the calculator.

Figure 130:
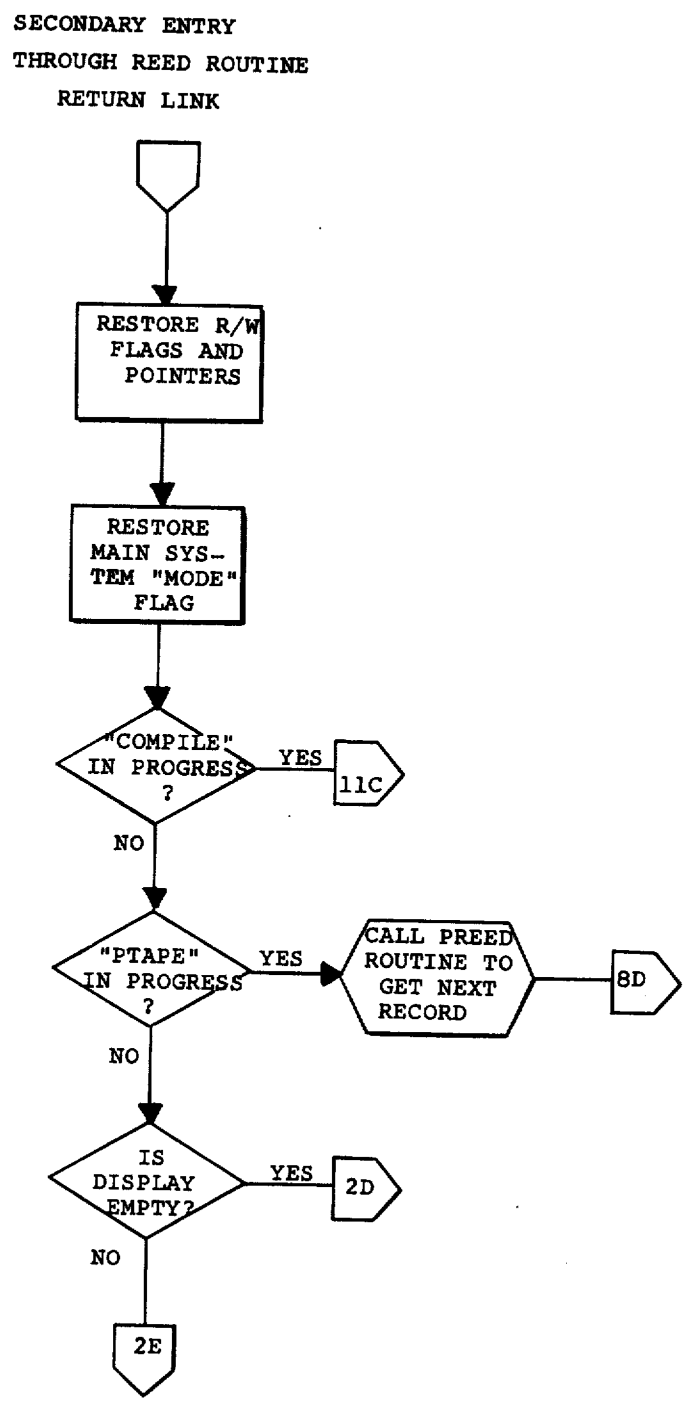

FIG. 130 is a flow chart of a secondary entry routine employed when the terminal read-only memory module is plugged into the calculator.

Figure 131:
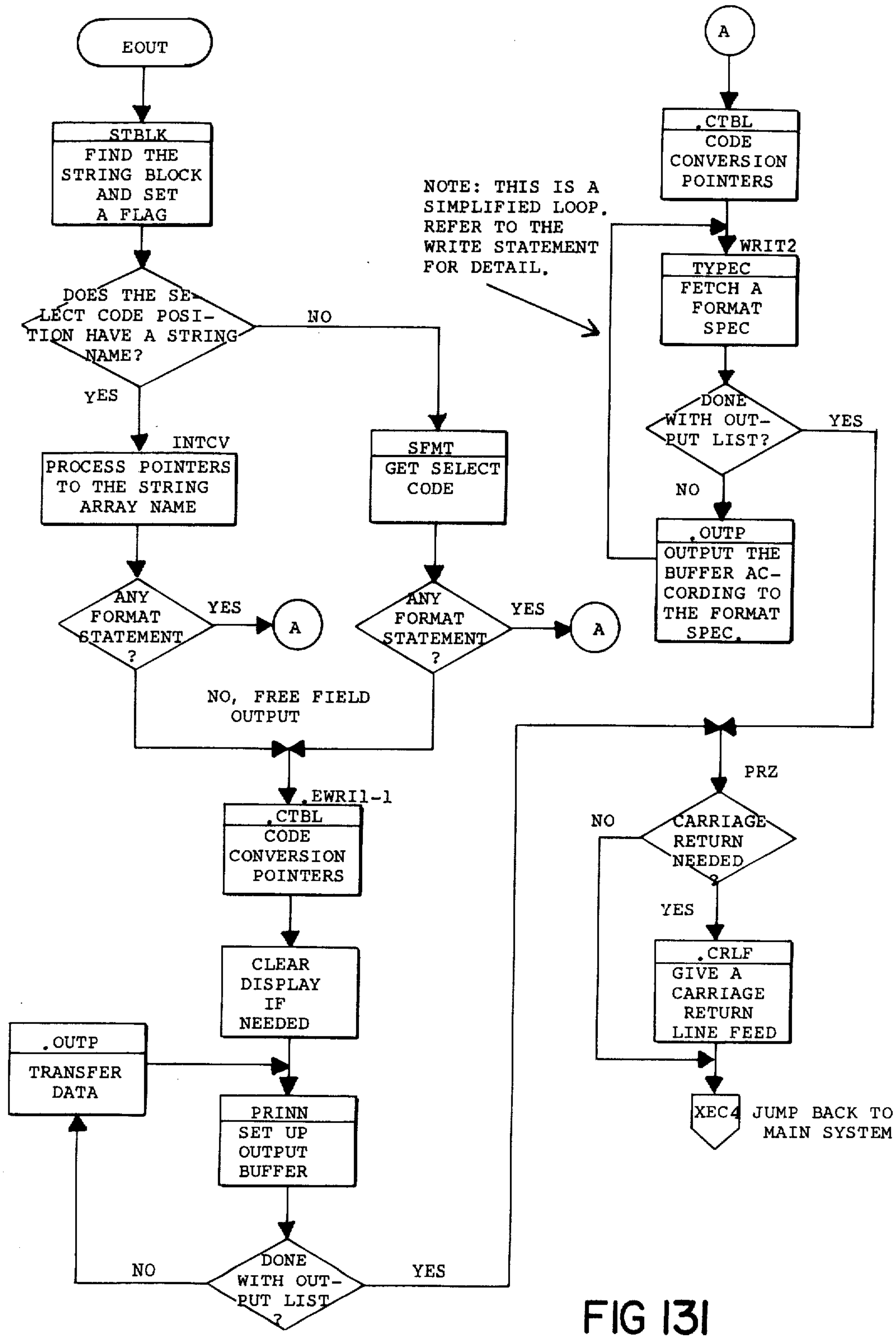
Figure 132A:
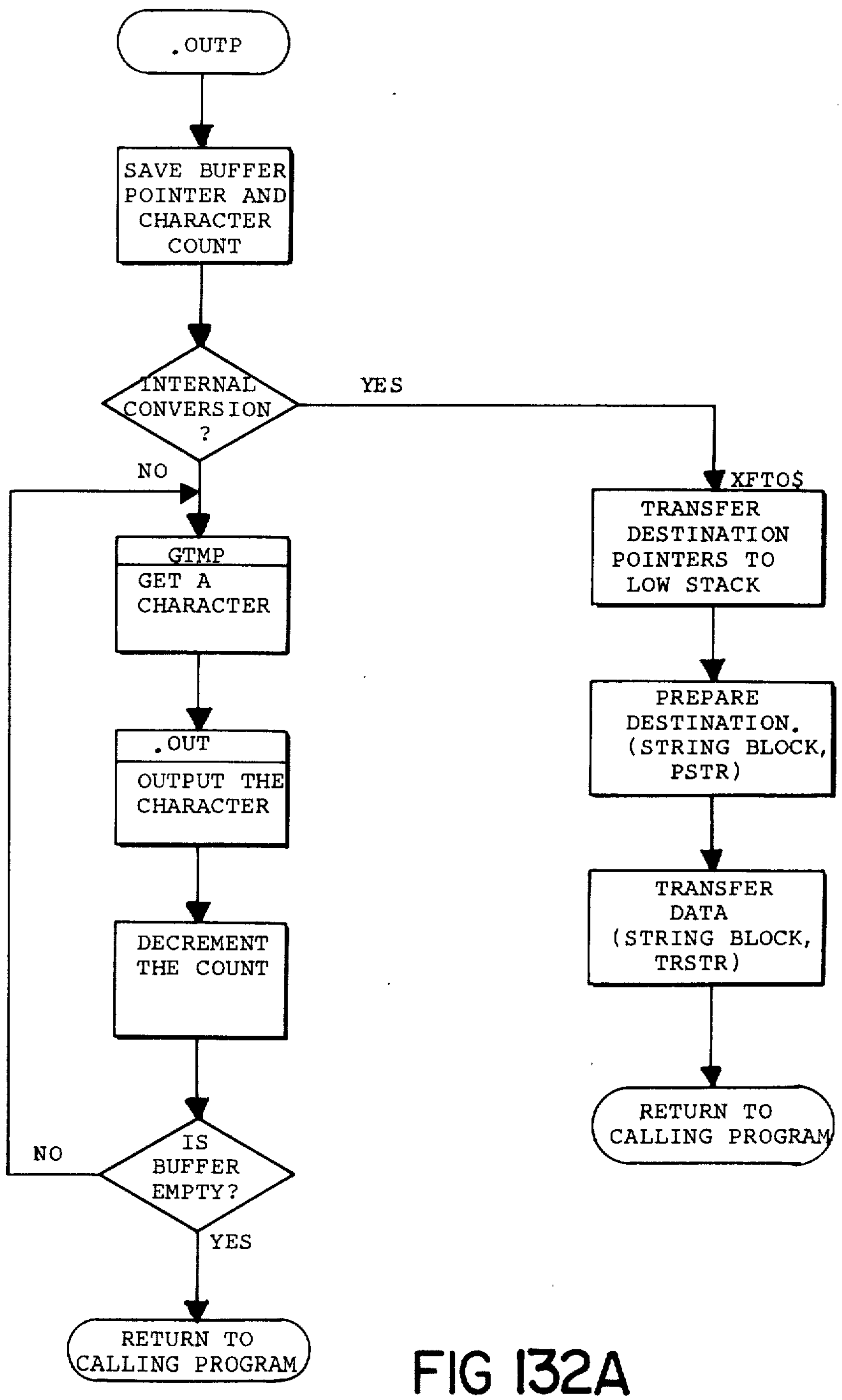
Figure 132B:
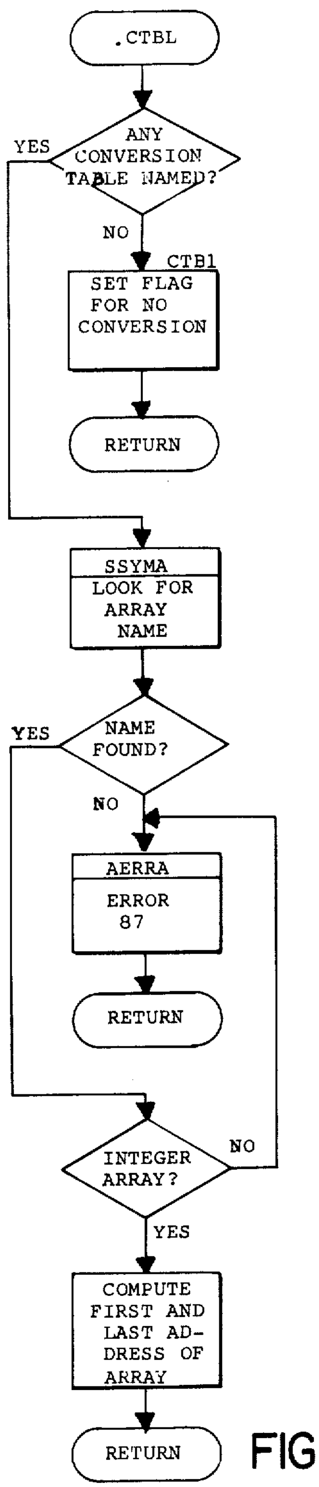
Figure 132C:
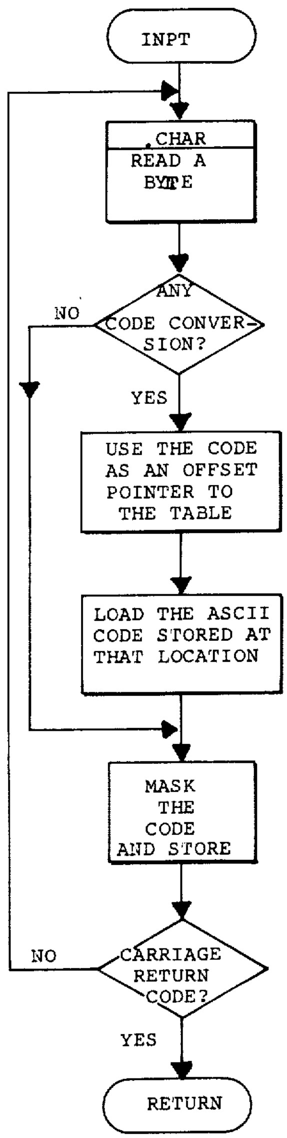
Figure 132D:
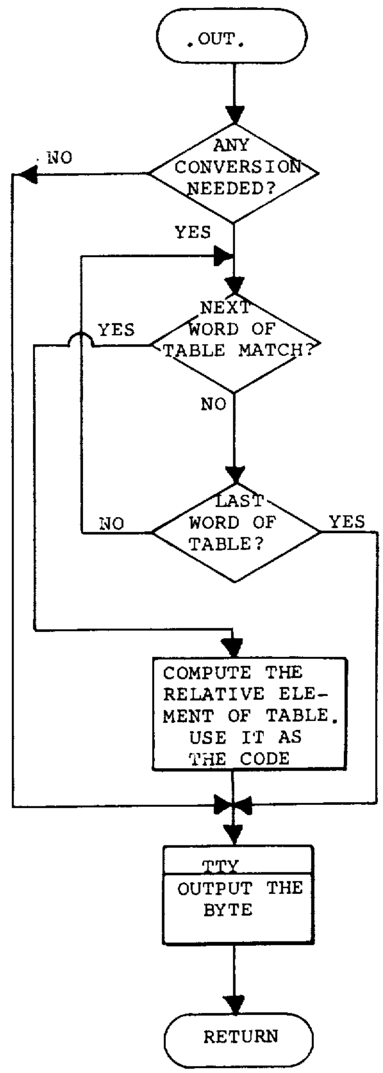

FIG. 131 is a flow chart of an output statment routine employed when the extended input-output read-only memory module is plugged into the calculator.

FIGS. 132A–D are flow charts of subroutines called by the routine of FIG. 131.

Figure 133:
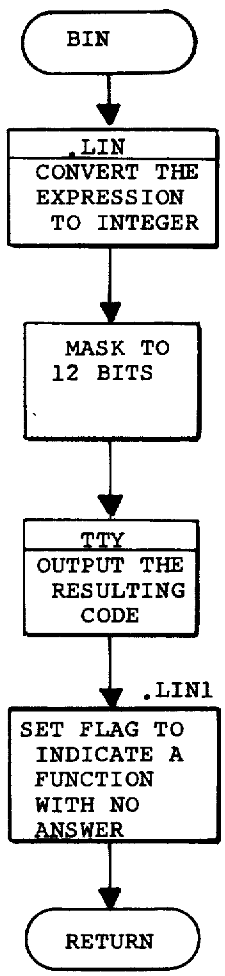

FIG. 133 is a flow chart of a BIN command selectable when the extended input-output plug-in read-only memory module is employed with the calculator.

Figure 134:
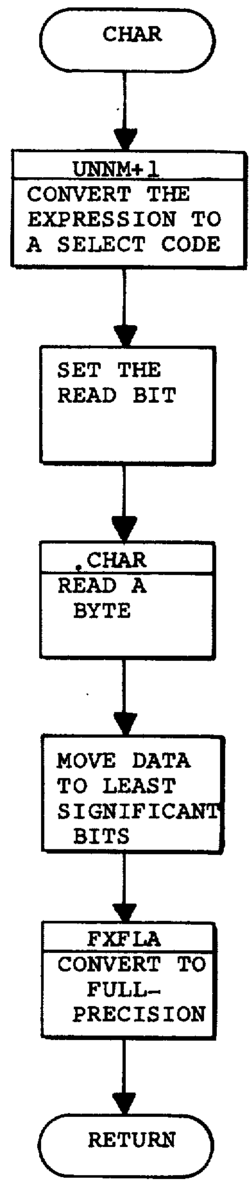

FIG. 134 is a flow chart of a CHAR command selectable when the extended input-output plug-in read-only memory module is employed with the calculator.

Figure 135:
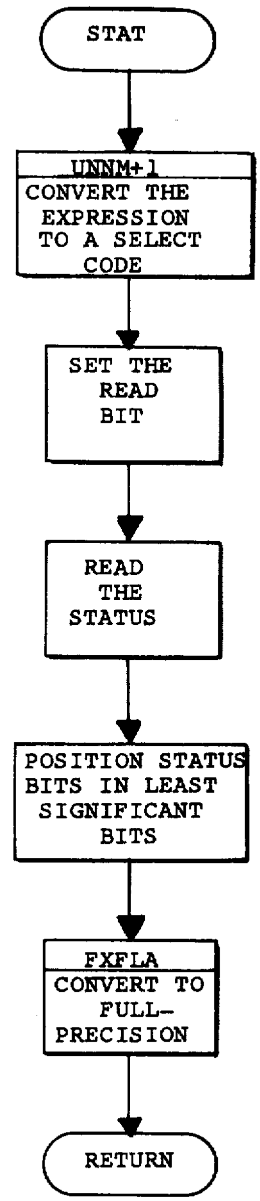

FIG. 135 is a flow chart of a STAT command selectable when the extended input-output plug-in read-only memory module is employed with the calculator.

Figure 136:
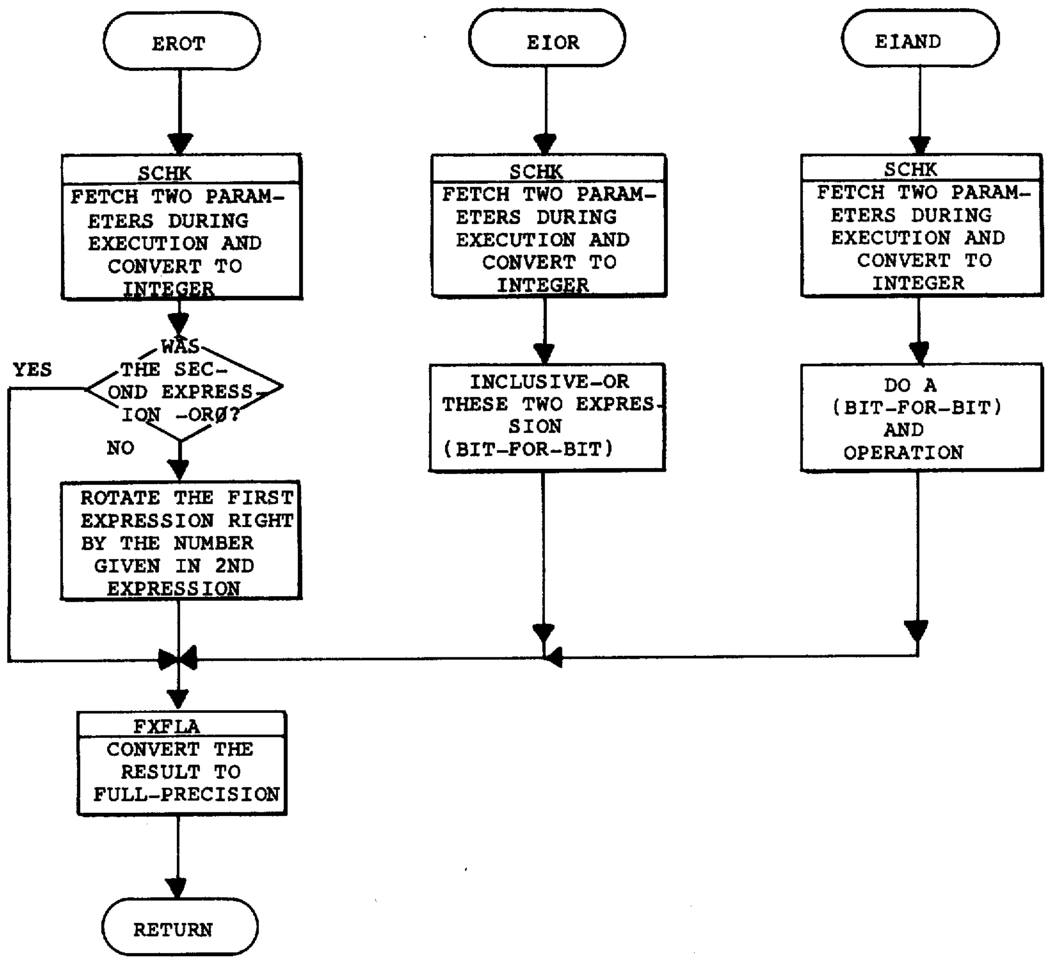

FIG. 136 is a flow chart of binary ROTATE, AND, and OR commands selectable when the extended input-output plug-in read-only memory module is employed with the calculator.

DESCRIPTION OF THE PREFERRED EMBODIMENT

GENERAL DESCRIPTION

Figure 1:
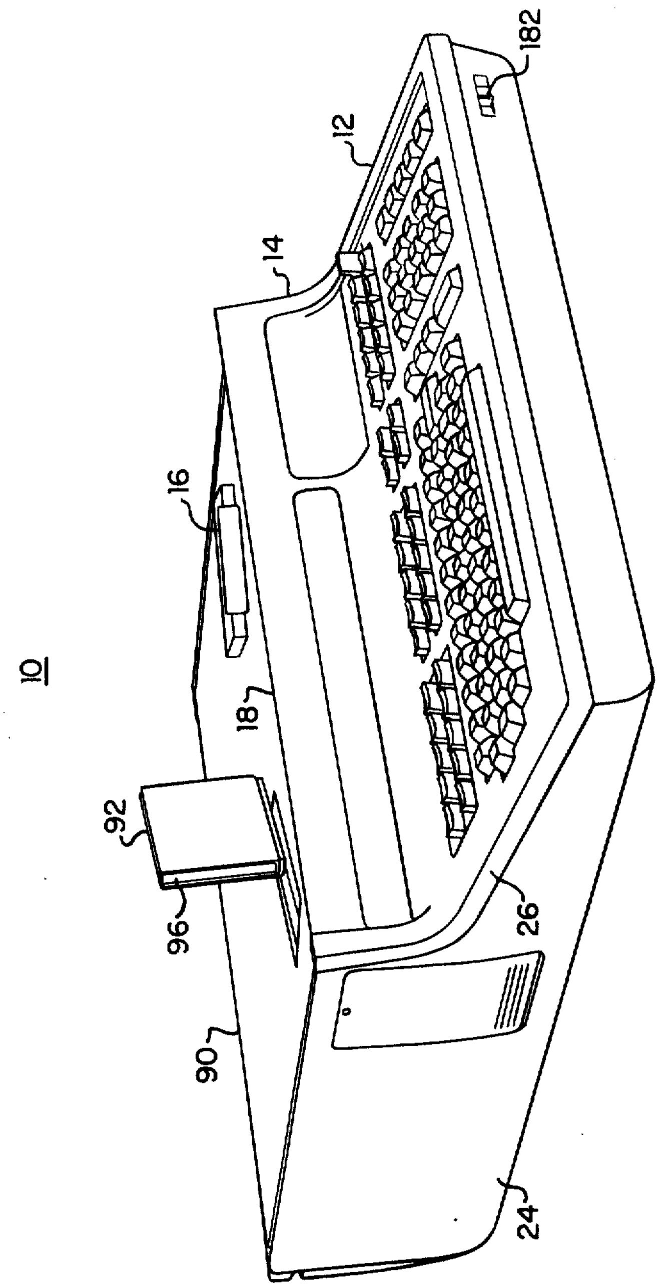
FIG. 1 is a front perspective view of an adaptable programmable calculator according to the preferred embodiment of this invention.
Figure 2:
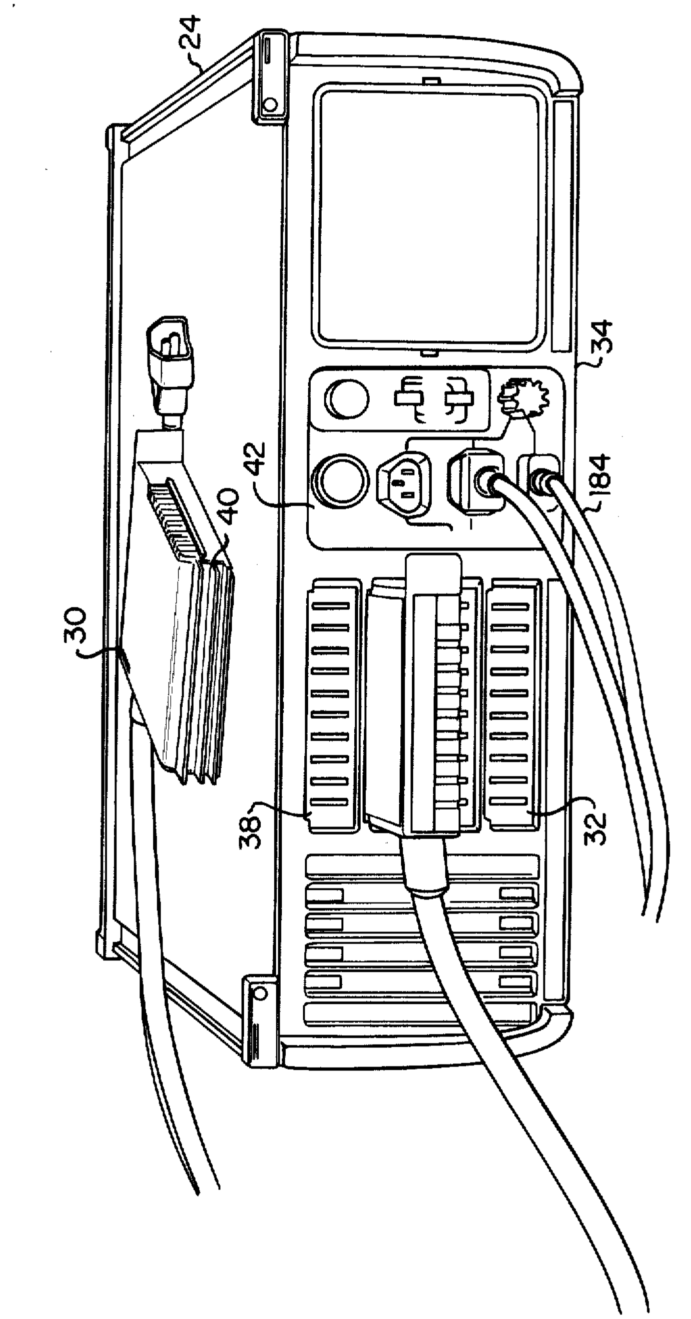
FIG. 2 is a rear perspective view of the adaptable programmable calculator of FIG. 1.

Referring to FIGS. 1 and 2, there is shown an adaptable programmmable calculator 10 including both a keyboard input unit 12 for entering information into and controlling the operation of the calculator and the magnetic tape cassette reading and recording unit 14 for recording information stored within the calculator onto one or more external tape cassettes 16 and for subsequently loading the information recorded on these and other similar magnetic tape cassettes back into the calculator. The calculator also includes a solid state output display unit 18 for displaying alphameric information stored within the calculator. All of these input and output units are mounted within a single calculator housing 24 adjacent to a curved front panel 26 thereof.

As shown in FIG. 2, a plurality of peripheral input and output units including, for example, a line printer, a digitizer, a marked card reader, an X-Y plotter, a typewriter, a teletypewriter, an extended read-write memory unit, a magnetic disc reading and recording unit, and a modem for connecting the calculator via telephone lines to a remotely located computer, may be connected to the calculator at the same time by simply inserting interface modules 30 associated with the selected peripheral units into any of four receptacles 32 provided therefor in a rear panel 34 of the calculator housing. As each interface module 30 is inserted into one of these receptacles, a spring-loaded door 38 at the entrance of the receptacle swings down allowing passage of the interface module. Once the interface module is fully inserted, a printed-circuit terminal board 40 contained within the interface module plugs into a mating edge connector mounted inside the calculator. If any of the selected peripheral units require AC line power, their power cords may be plugged into either of two AC power outlets 42 provided therefor at the rear panel of calculator housing 24.

Referring to the simplified block diagram shown in FIGS. 3A–B, it may be seen that the calculator also includes an input-output control unit 44 (hereinafter referred to as the I/O control unit) for controlling the transfer of information to and from the input and output units, a memory unit 46 for storing and manipulating information entered into the calculator and for storing routines and subroutines of basic instructions performed by the calculator, and a central processing unit 48 (hereinafter referred to as the CPU) for controlling the execution of the routines and subroutines of basic instructions stored in the memory unit as required to process information entered into or stored within the calculator. The calculator also includes a bus system comprising an $\overline{S}$-bus 50, a T-bus 52, and an $\overline{R}$-bus 54 for transferring information from the memory and I/O control units to the CPU, from the CPU to the memory and I/O control units, and between different portions of the CPU. It further comprises a power supply for supplying DC power to the calculator and peripheral units employed therewith and for issuing a control signal $\overline{POP}$ when power is supplied to the calculator.

The I/O control unit 44 includes an input-output register 56 (hereinafter referred to as the I/O register), associated I/O gating control circuitry 58, and input-output control logic 60 (hereinafter referred to as the I/O control), I/O register 56 comprises a universal sixteen-bit shift register into which information may be transferred either bit-serially from CPU 48 via T-bus 52 or in parallel from keyboard input unit 12, magnetic tape cassette reading and recording unit 14, and peripheral input units 28 such as the marked card reader via twelve input party lines 62. Information may be transferred from I/O register 46 either bit-serially to CPU 48 via $\overline{S}$-bus 50 or in parallel to magnetic tape cassette reading and recording unit 14, solid state output display unit 18, output printer unit 20, and peripheral output units 28 such as the X-Y plotter or the typewriter via sixteen output party lines 64.

I/O gating control circuitry 58 includes control circuits for controlling the transfer of information into and out of I/O register 56 in response to selected I/O qualifier control signals from CPU 48 and selected I/O control instructions from I/O control 60. It also includes an interrupt control circuit 65, a peripheral control circuit 66, a printer control circuit 68, and a display control circuit 69 for variously controlling the input and output units and issuing control signals QFG and EBT to I/O control 60 via two output lines 71 and 72. These last mentioned control circuits variously perfrom their control functions in response to control signal $\overline{POP}$ from the power supply, I/O qualifier control signals from CPU 48, I/O control instructions from I/O control 60, and control signals from keyboard input unit 12. Interrupt control circuit 65 initiates the transfer of information into I/O register 56 from keyboard input unit 12 or interrupting peripheral input units 28 such as the marked card reader and issues a qualifier control signal QNR to CPU 48 via output lines 73. Peripheral control circuit 66 enables interface modules 30 plugged into the calculator to respond to information from I/O register 56, control associated peripheral units 28, transfer information to and/or receive information from associated peripheral units 28, and in some cases intiate the transfer of information to I/O register 56 from the interface modules themselves. Printer control circuit 68 and display control circuit 69 enable output display unit 18, and output printer unit 20, respectively, to respond to information from I/O register 56.

When a basic I/O instruction obtained from memory unit 46 is to be executed, CPU 48 transfers control to I/O control 60 by issuing a pair of I/O microinstructions $\overline{PTR}$ and $\overline{XTR}$ thereto. In response to these I/O microinstructions from CPU 48, control signal $\overline{POP}$ from the power supply, control signals QFG and EBT from I/O gating control circuitry 58, and I/O qualifier and clock control signals from CPU 48, I/O control 60 selectively issues one or more I/O control instructions to gating control circuitry 58 as required to execute the basic I/O instructions designated by CPU 48 and issues control signals, $\overline{TTX}$, $\overline{XTR}$, QRD, and SCT to CPU 48 via output lines 74-77. The I/O qualifier control signals issued to I/O control 60 and gating control circuitry 58 by CPU 48 are derived from the basic I/O instruction to be executed. Those qualifier control signals issued to I/O control 60 designate the specific I/O control instructions to be issued by I/O control 60, while those issued to gating control circuitry 58 designate selected control circuits to be employed in executing the basic I/O instruction.

Memory unit 46 includes a modular random-access read-write memory 78 (hereinafter referred to as the RWM), a modular read-only memory 80 (hereinafter referred to as the ROM), a memory address register 82 (hereinafter referred to as the M-register), a memory access register 84 (hereinafter referred to as the T-register), and control circuitry 85 for these memories and registers. The RWM 78 and ROM 80 comprise MOS-type semiconductor memories. As shown in the memory map of FIGS. 4A–F the basic RWM 78 contains a dedicated system storage section of 256 sixteen-bit words extending from address 1400 to address 1777 and a separate user program and/or data storage section of 1792 sixteen-bit words extending from address 40400 to address 43777. All addresses on the memory map are represented in octal form.

An optional 2048 sixteen-bit words of RWM may be made available to the user at address 44000 to address 47777. This is accomplished by removing a top panel 90 of the calculator housing shown in FIG. 1, and inserting an additional printed circuit board containing the optional memory. The additional RWM is automatically accommodated by the calculator.

Figure 5A:
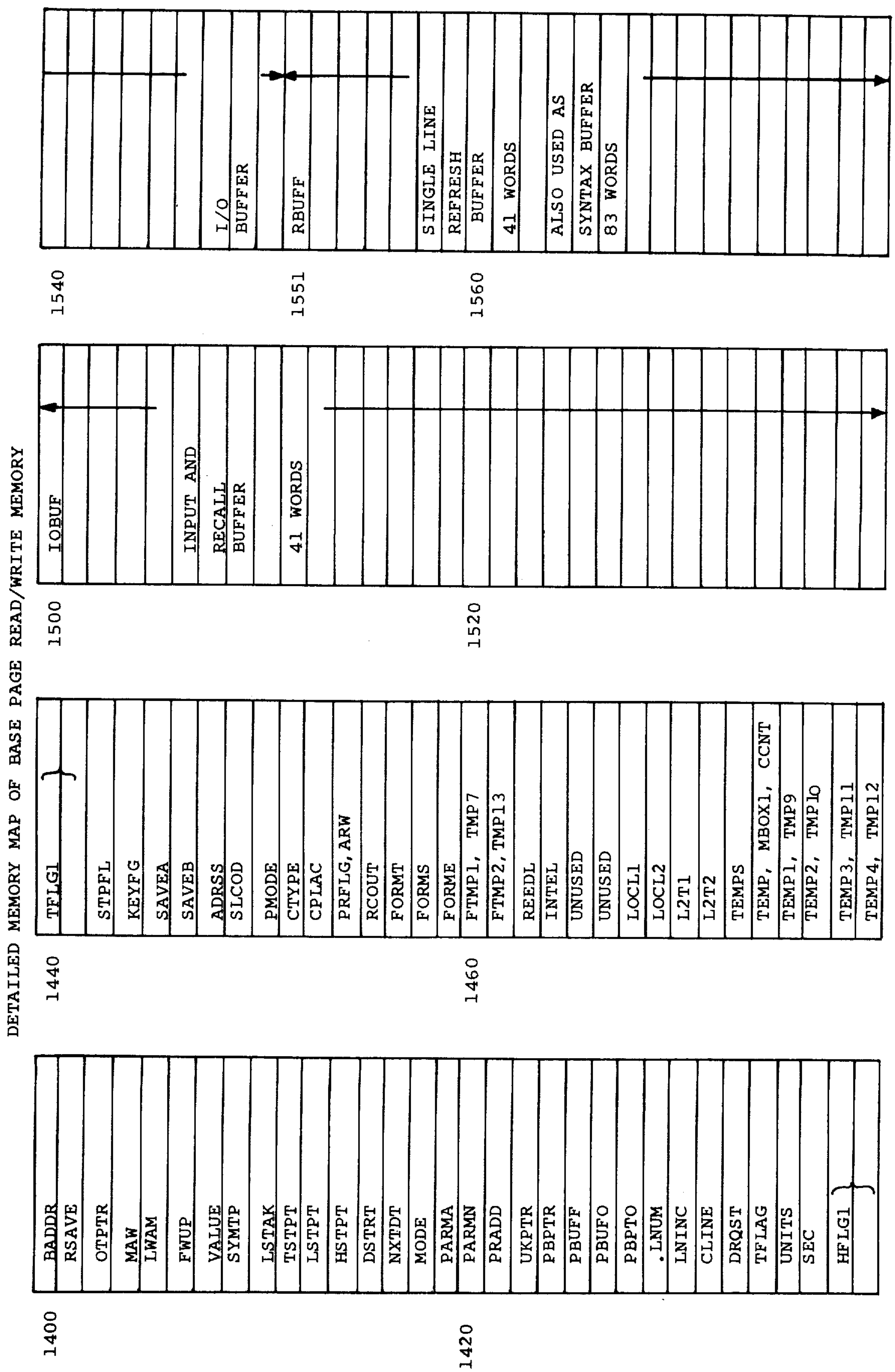
FIGS. 5A–B are a detailed memory map of the system read-write section of memory as shown in FIG. 4A.
Figure 5B:
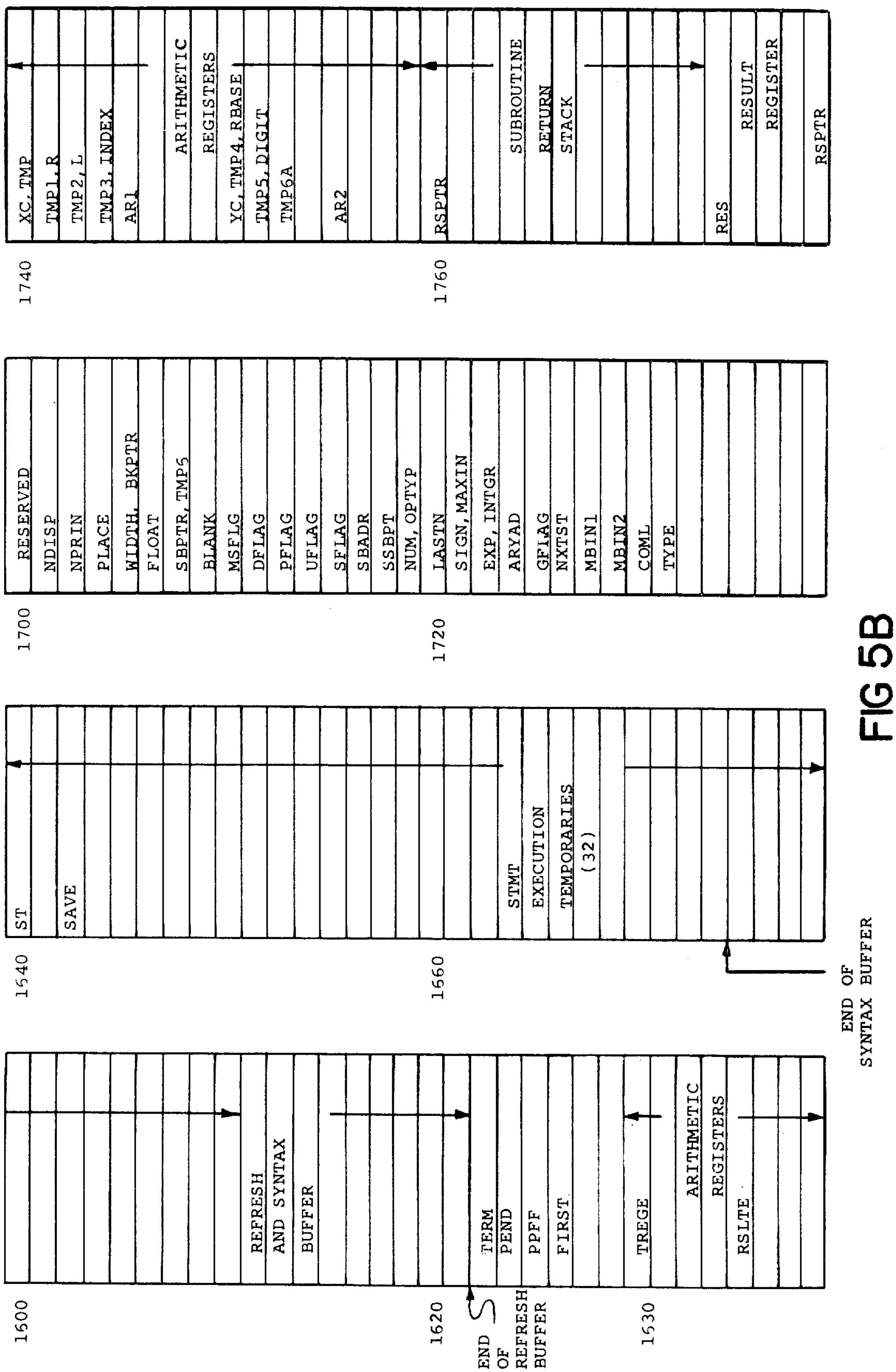
Figure 9:
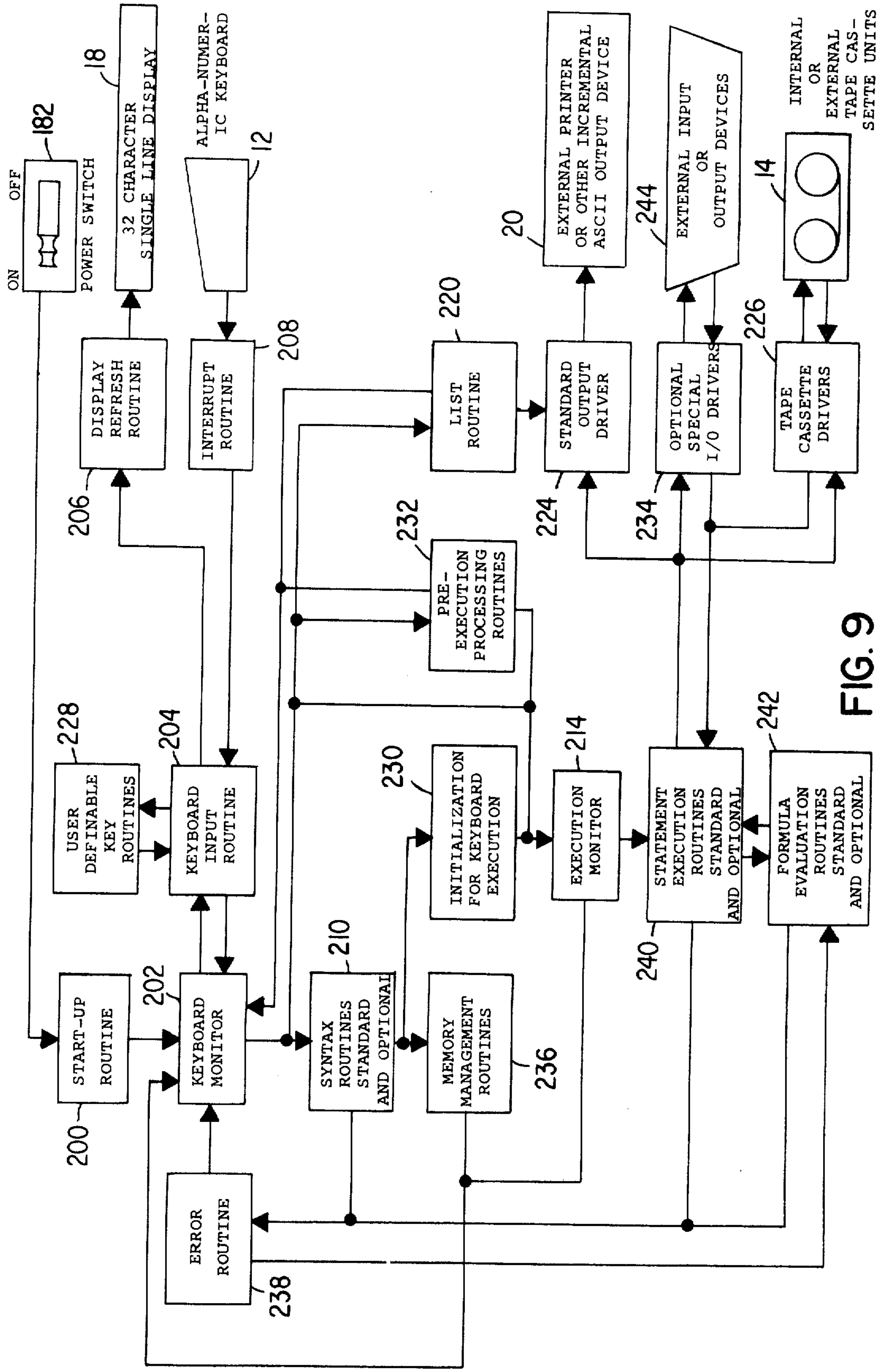
FIG. 9 is an overall firmware block diagram for the adaptable programmable calculator.
Figure 10A:
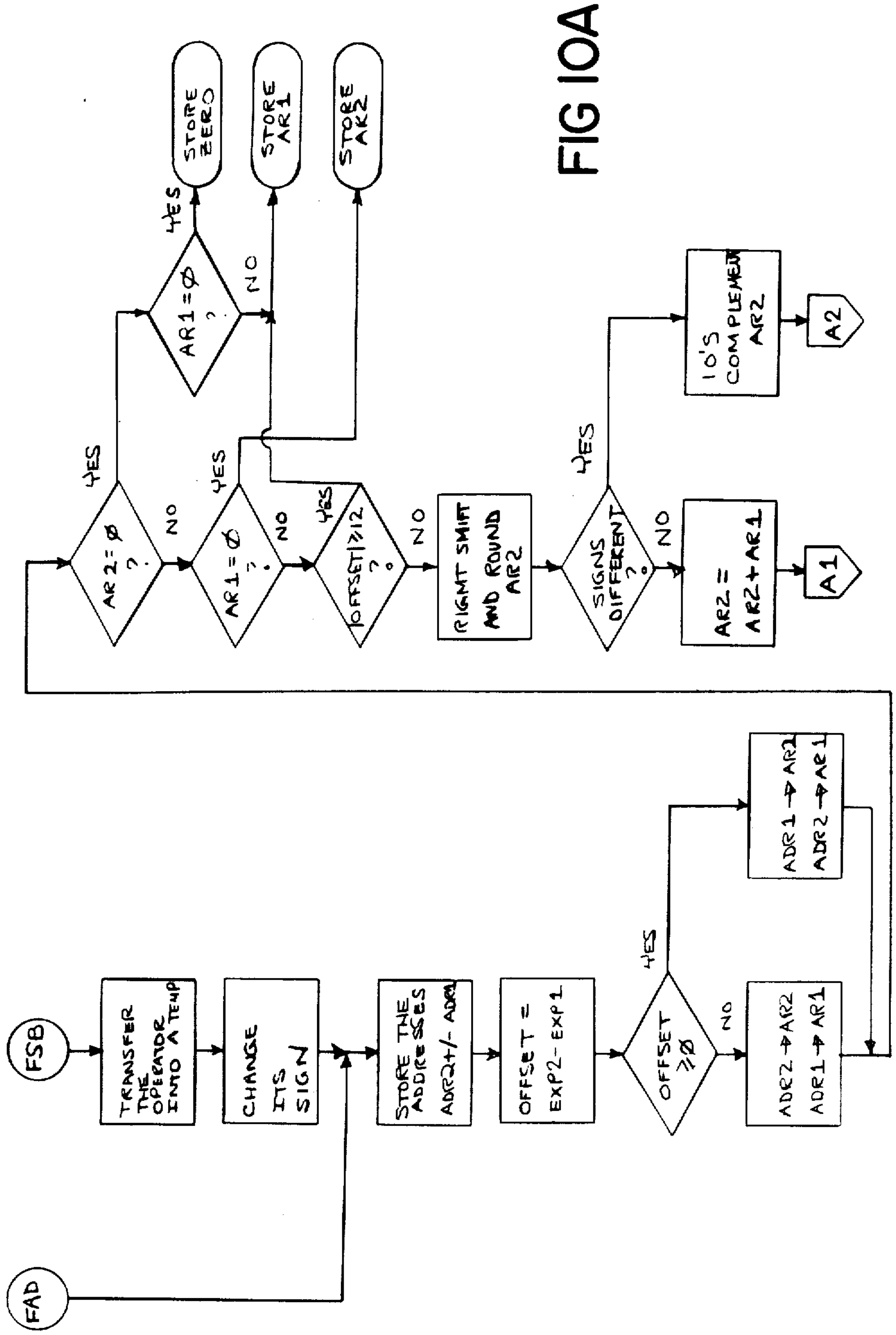
FIGS. 10A–C are flow charts of floating point add and subtract routines selectable by the execution monitor of FIG. 9.
Figure 10C:
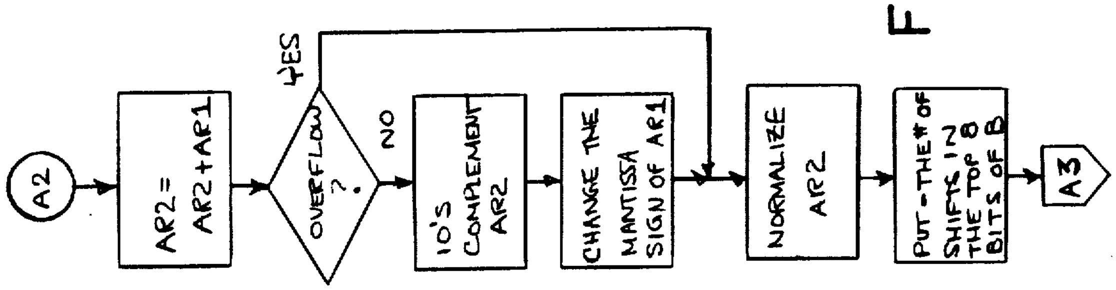
Figure 10B:
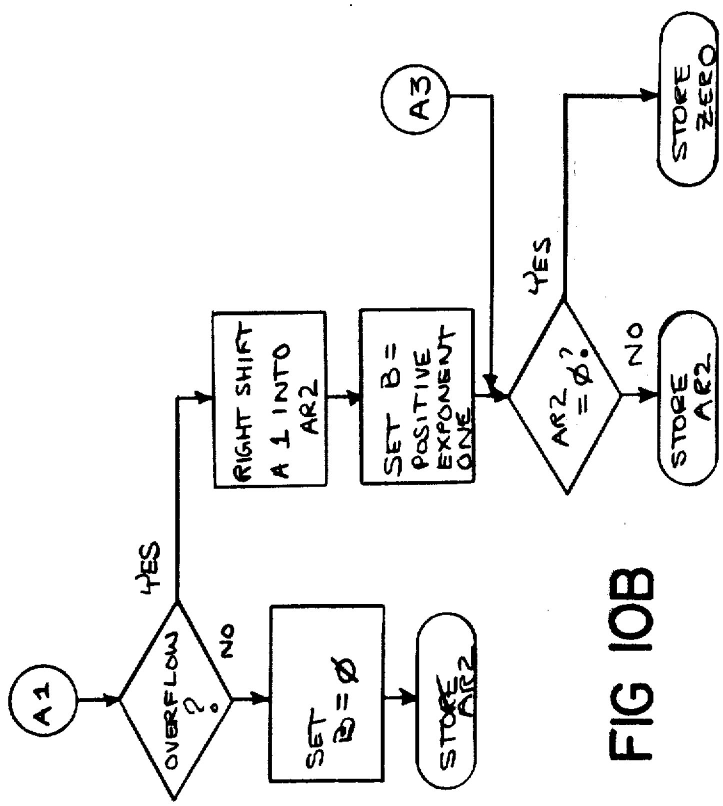
Figure 11:
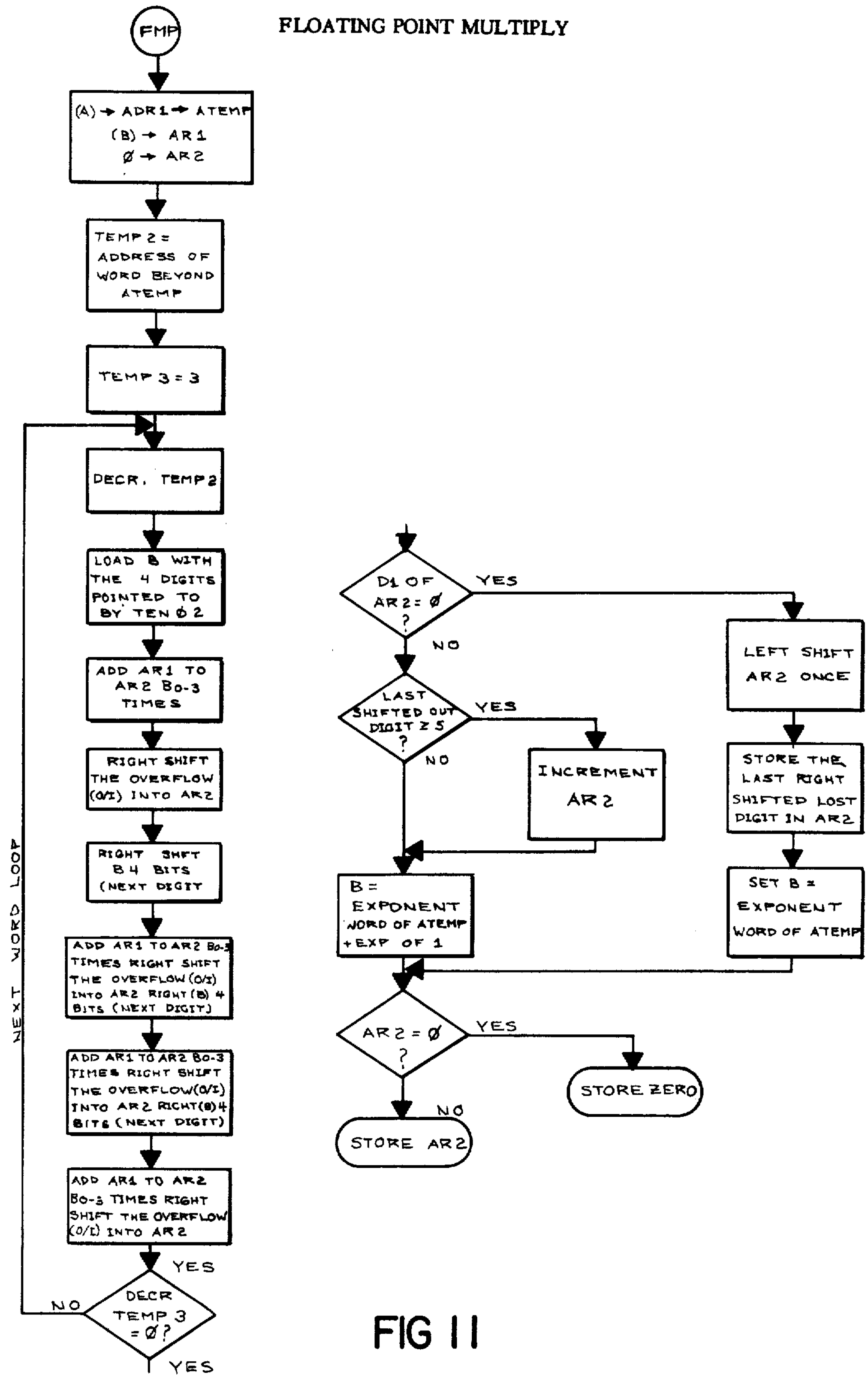
FIG. 11 is a flow chart of a floating point multiply routine selectable by the execution monitor of FIG. 9.
Figure 12A:
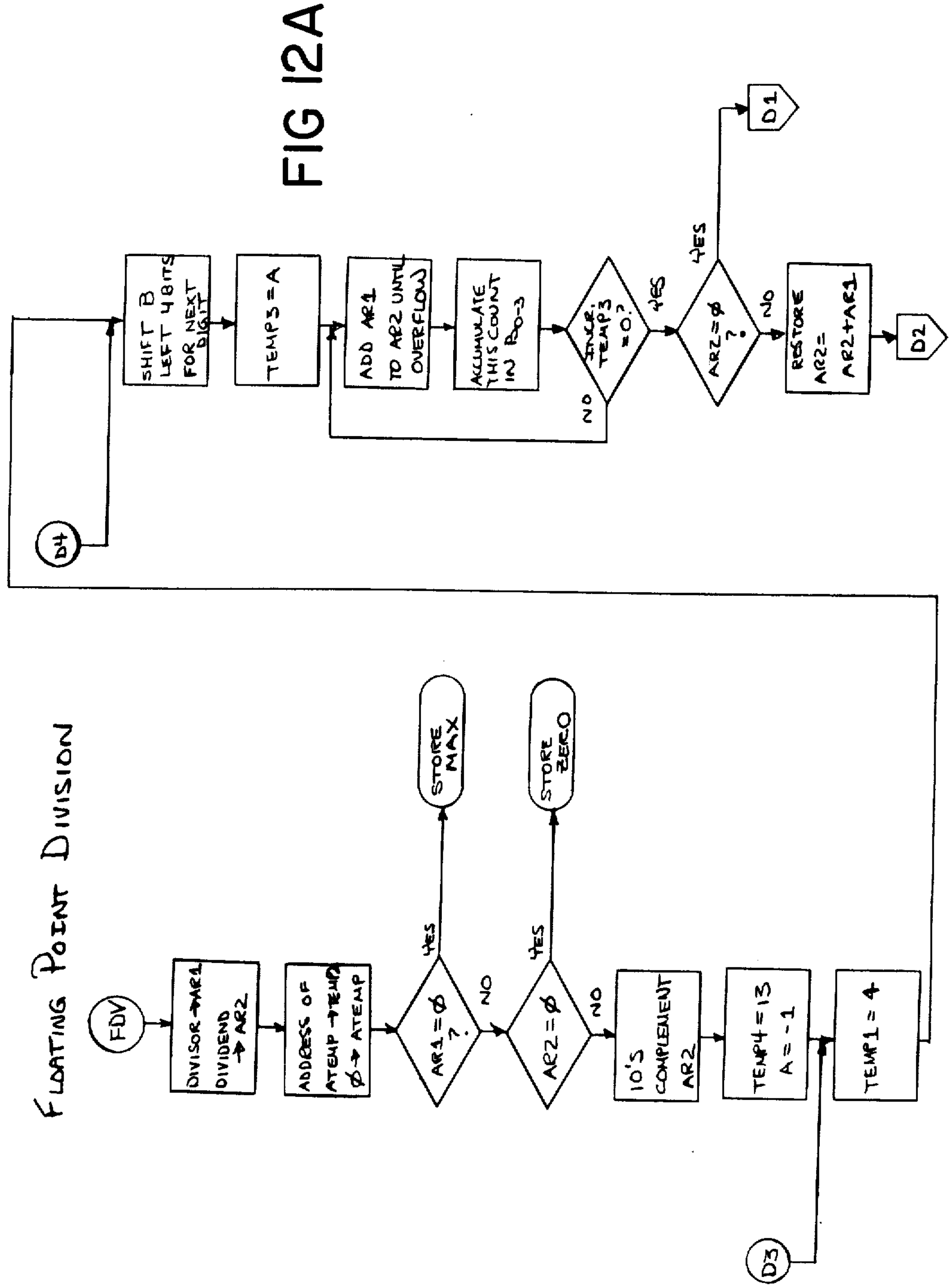
FIGS. 12A–B are a flow chart of a floating point divide routine selectable by the execution monitor of FIG. 9.
Figure 12B:
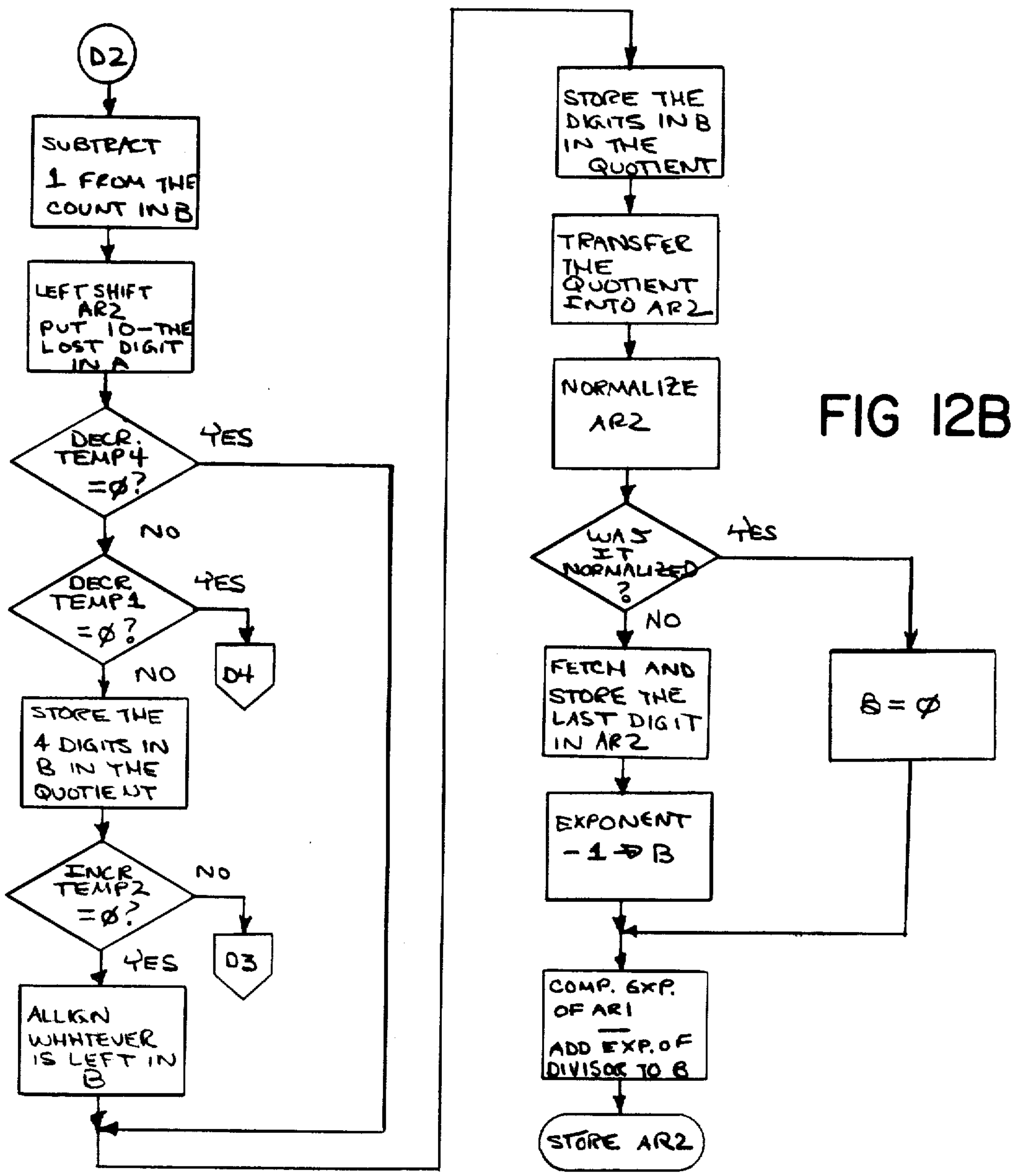
Figure 13A:
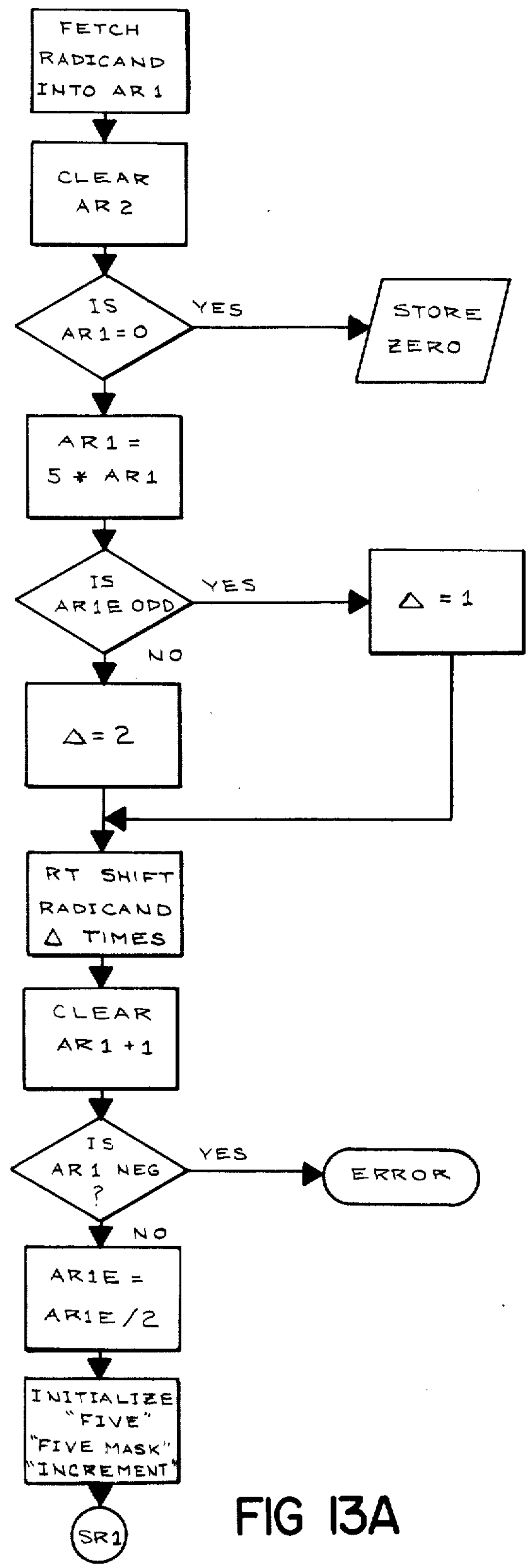
FIGS. 13A–C are a flow chart of a floating point square root routine selectable by the execution monitor of FIG. 9.
Figure 13B:
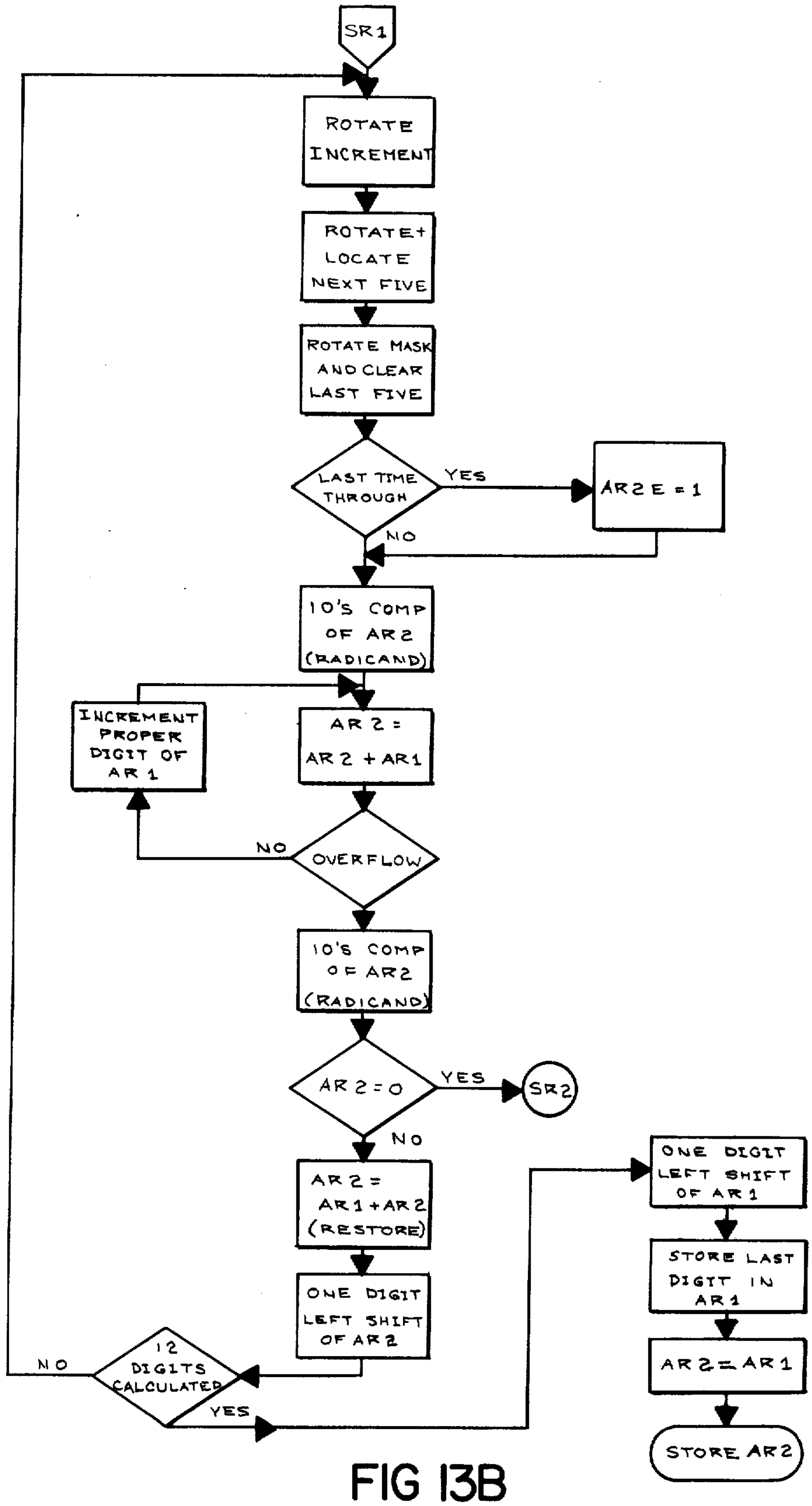
Figure 13C:
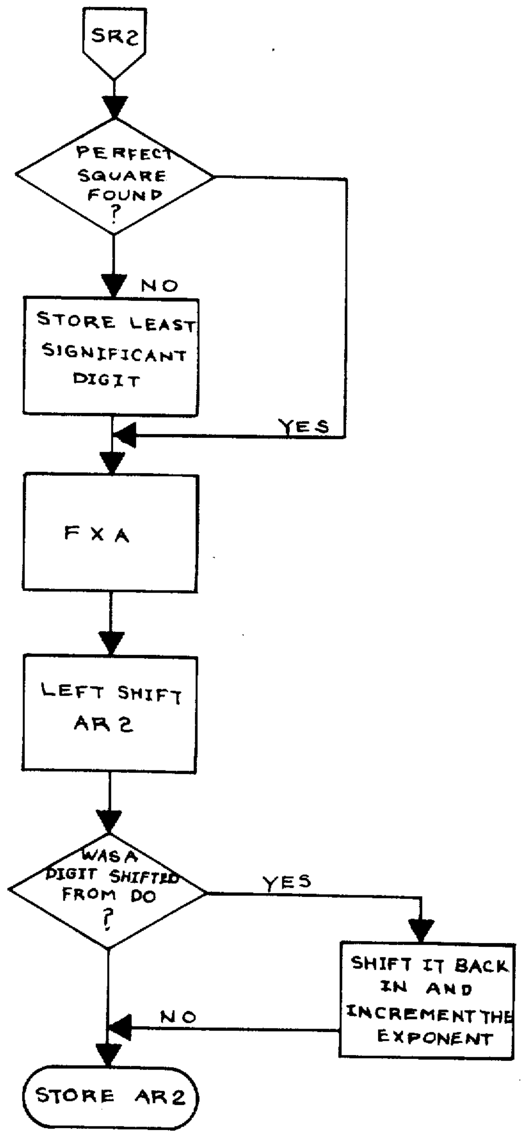

As shown in the more detailed memory map of FIGS. 5A–B, the RWM dedicated system storage section includes 52 words (addresses 1400–1463) containing information in the form of mnemonic variables which is employed by the firmware routines shown in FIG. 9. A more detailed description of these mnemonic variables is given on page 21 of the calculator basic system firmware listing located elsewhere in this specification. Addresses 1466–1477 and 1701–1737 are used as temporary storage by the various routines shown in FIG. 9. Addresses 1500–1550 comprise a 41-word buffer used to contain the input characters during syntax analysis. Addresses 1551–1621 comprise a 41-word buffer used by the single line display refresh routine of FIG. 9. These 41 words along with 42 additional words (addresses 1622–1673) are used as a syntax buffer during syntax analysis. Four of these words (addresses 1622–1625) are used as temporary registers by several of the statement execution routines of FIG. 9. Eight words (addresses 1630–1637) are used as two temporary floating point number registers by the formula evaluation routines of FIG. 9. Addresses 1640–1677 comprise 32 words which are used by the statement execution routines of FIG. 9. Eight words (addresses 1744–1747 and 1754–1757) are employed as AR1 and AR2 four-word working registers for performing binary-coded-decimal arithmetic. An additional eight words (addresses 1740–1743 and 1750–1753) are employed as working data registers $X_c$ and $Y_c$ for implementation of the trigonometric functions. These sixteen words (addresses 1740–1757) are used as temporary storage registers by all the routines of FIG. 9 except the statement execution and formula evaluation routines. A variable-length system subroutine stack (addresses 1760–1772) is employed for storing return addresses required by programs stored in ROM 80. Four words (addresses 1773–1776) are used to store the result of the latest keyboard computation. The last word in the system RWM (address 1777) is used to store a pointer indicating the next available location for the return address of the next subroutine call within the basic system. A complete assembly language description of the system RWM is included in pages 21–24 of the calculator basic system firmware listing.

Figure 6:
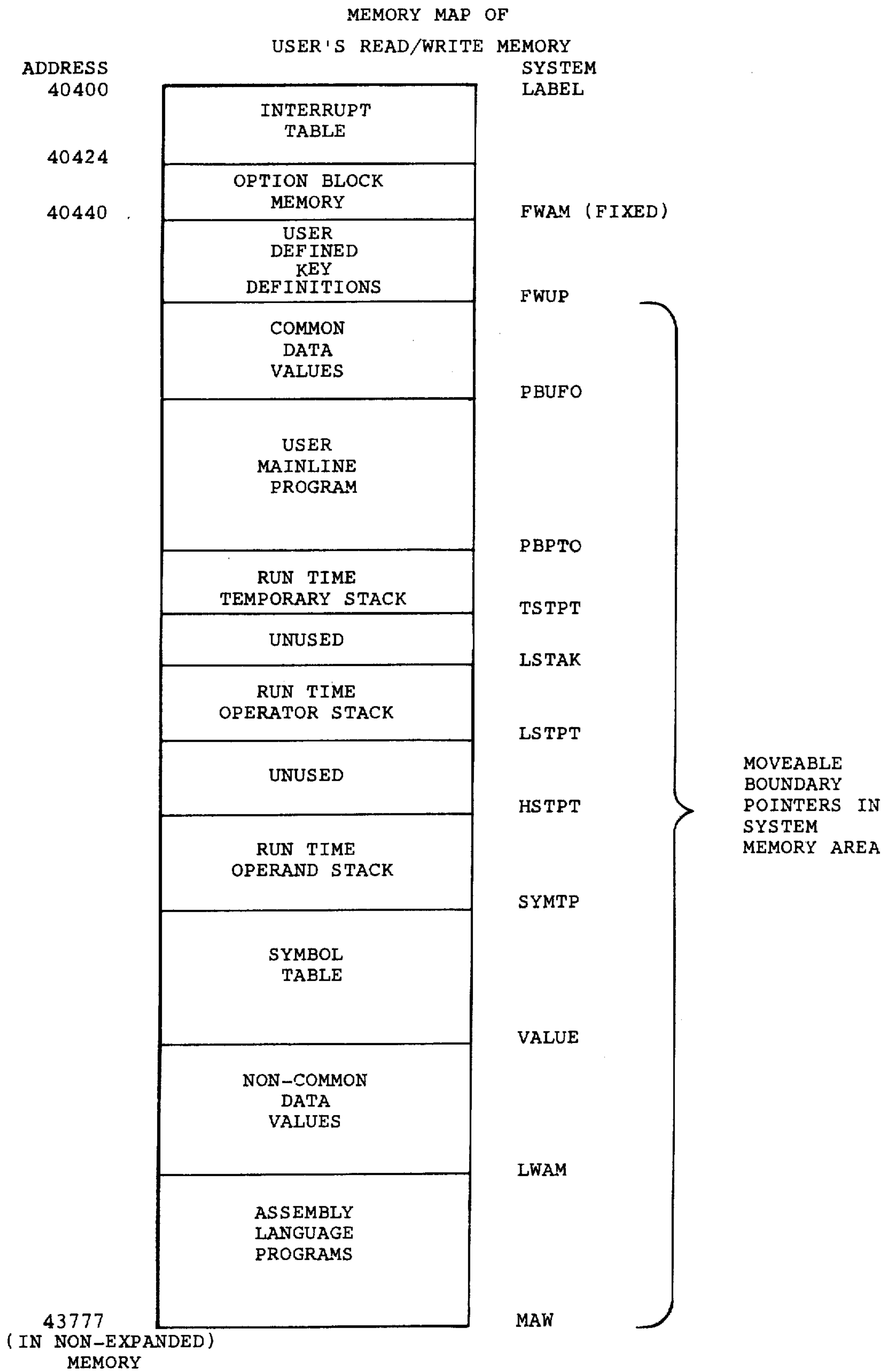
FIG. 6 is a detailed memory map of the user read/-write section of memory as shown in FIG. 4F.

As shown in the memory map of FIGS. 4A–F and the more detailed memory map of FIG. 6, user program and/or data storage section of RWM 78 contains 1760 words available to the user (as user addresses 40440–43777) for storing programs and/or data, 20 words dedicated for use by the interrupt routine of FIGS. 9 and 117A–B, and 12 words available for use by plug-in read-only memory modules. An additional 2048 sixteen-bit words may be available to the user (as user addresses 44000–47777).

Also, as shown in the memory map of FIGS. 4A–B, the basic ROM 80 contains 7680 sixteen-bit words extending from address 0000 to address 1377, form address 2000 to address 16777, and from address 40000 to address 40377. Routines and subroutines of basic instructions for performing the basic functions of the calculator and constants employed by thse routines and subroutines are stored in these portions of ROM 80. An additional 8192 sixteen-bit words of ROM may also be added at addresses 20000–37777 in steps of 512 and 1,024 words. This is accomplished by simply inserting plug-in ROM modules 92 into receptacles provided therefor within the calculator which are accessible through a door in the left panel of the calculator housing as illustrated in FIG. 1. As each plug-in ROM module 92 is inserted into one of these receptacles a printed circuit terminal board 96 contained within the plug-in ROM module plugs into a mating edge connector mounted inside the calculator. A handle pivotally mounted at the top end of each plug-in ROM module 92 facilitates removal of the plug-in ROM module once it has been fully inserted into one of the receptacles.

Routines and subroutines of basic instructions (and any needed constants) for enabling the calculator to perform many additional functions are stored in each plug-in ROM module 92. The user himself may therefore quickly and simply adapt the calculator to perform many additional functions oriented toward his specific needs by simply plugging ROM modules of his own choosing into the calculator. Added plug-in ROM modules are automatically accommodated by the calculator.

Referring again to FIGS. 3A–B, M-register 82 of the memory unit comprises a recirculating sixteen-bit serial shift register into which information may be transferred bit-serially from CPU 48 via T-bus 52 and out of which information may be transferred bit-serially to CPU 48 via $\overline{S}$-bus 50. Information shifted into M-register 82 may be employed to address any word in RWM 78 or ROM 80 via fifteen output lines 106.

T-register 84 of the memory unit comprises a recirculating sixteen-bit serial shift register into which information may be transferred either bit-serially from CPU 48 via T-bus 52 or in parallel from any addressed word in RWM 78 and ROM 80 via sixteen parallel input lines 108. Information may be transferred from T-register 84 either bit-serially to CPU 48 via $\overline{S}$-bus 50 or parallel to any addressed word in RWM 78 via sixteen parallel output lines 110. The four least significant bits of information contained in T-register 84 may comprise binary-coded-decimal information and may be transferred from the T-register in parallel to CPU 48 via three parallel output lines 112 taken with $\overline{S}$-bus 50.

The control circuitry 85 of the memory unit controls these transfers of information into and out of M-register 82 and T-register 84, controls the addressing and accessing of RWM 78 and ROM 80, and refreshes RWM 78. It performs these functions in response to memory microinstructions, memory clock pulses, and shift clock pluses from CPU 48.

CPU 48 includes a register unit 114, an arithmetic-logic unit 116 (hereinafter referred to as the ALU), a programmable clock 118, and a microprocessor 120. Register unit 114 comprises four recirculating sixteen-bit shift registers 122, 124, 126, and 128 and one four-bit shift register 130. Shift registers 122 and 124 serve as sixteen-bit serial accumulator registers (hereinafter referred to as the A-register and the B-register, respectively) into which information may be transferred bit-serially from ALU 116 via T-bus 52 and out of which information may be transferred bit-serially to ALU 116 via $\overline{R}$-bus 54. The four least significant bit positions of A-register 122 also serve as a four-bit parallel accumulator register into which four bits of binary-coded-decimal information may be transferred in parallel from ALU 116 via four parallel input lines 132 and out of which four bits of binary-coded-decimal information may also be transferred in parallel to ALU 116 via three parallel output lines 134 taken with $\overline{R}$-bus 54.

Shift register 126 serves as a sixteen-bit system program counter (hereinafter referred to as the P-register) into which information may be transferred bit-serially from ALU 116 via T-bus 52 and out of which information may be transferred bit-serially to ALU 116 via $\overline{R}$-bus 54. Information contained in the least significant bit position of P-register 126 may also be transferred as a qualifier control signal QPO to microprocessor 120 via output line 135.

Shift register 128 serves as a sixteen-bit qualifier register (hereinafter referred to as the Q-register) into which information may be transferred bit-serially from ALU 116 via T-bus 52 and out of which information may be transferred bit-serially to ALU 116 via $\overline{R}$-bus 54. Information contained in the five least significant bit positions of Q-register 128 is transferred to I/O gating control circuitry 58 as five one-bit I/O qualifier control signals Q00–Q04 via five parallel output lines 136, and information contained in the six next least significant bit positions of the Q-register is transferred to I/O control 60 as six one-bit I/O qualifier control signals Q05-Q10 via six parallel output lines 138. Similarly, information contained in the seven least significant, the ninth and eleventh least significant, and the most signifcant bit positions of Q-register 128 and information derived from the thirteenth, fourteenth, and fifteenth bit positions of the Q-register may be transferred to microprocessor 120 as eleven one-bit microprocessor qualifier control slignals Q00–Q06, Q08, Q10, Q15, and QMR via eleven output lines 140. Information contained in the twelfth through the fifteenth least significant bit positions of Q-register 128 may be transferred to microprocessor 120 as a four-bit primary address code via four parallel output lines 142.

Shift register 130 serves as a four-bit serial extend register (hereinafter referred to as the E-register) into which information may be transferred bit-serially either from ALU 116 via T-bus 52 or from the least significant bit position of T-register 84 via input line 144. Information may also be transferred out of E-register 130 to ALU 116 via $\overline{R}$-bus 54.

Register unit 114 also includes control circuitry 146 for controlling the transfer of parallel binary-coded-decimal information into and out of A-register 122 and the transfer of serial binary information into and out of A-register 122, B-register 124, P-register 126, Q-register 128, and E-register 130. This is accomplished in response to register microinstructions from microprocessor 120, control signals $\overline{TTX}$ and $\overline{XTR}$ from I/O control 60, and shift clock control pulses from programmable clock 118. Control circuitry 146 includes a flip-flop 148 (hereinafter referred to as the A/B flip-flop) for enabling the transfer of information into and out of either the A-register 122 or the B-register 124 as determined by the state of the A/B flip-flop. The state of A/B flip-flop 148 is initially determined by information Q11 transferred to the A/B flip-flop from the twelfth least significant bit position of Q-register 128 but may be subsequently complemented one or more times by microinstruction CAB from microprocessor 120.

ALU 116 may perform either one-bit serial binary arithmetic on data received from T-register 84 of M-register 82 via $\overline{S}$-bus 50 and/or from any register of register unit 114 via $\overline{R}$-bus 54 or four-bit parallel binary-coded-decimal arithmetic on data received from T-register 84 via output lines 112 taken with $\overline{S}$-bus 50 and/or from A-register 122 via output lines 134 taken with $\overline{R}$-bus 54. It may also perform logic operations on data received from memory unit 46 and/or register unit 114 via any of these lines. The arithmetic and logic operations performed are designated by ALU microinstructions from microprocessor 120 and are carried out in response to these microinstructions, shift clock control pulses from programmable clock 118, and control signal SCB from I/O control 60. Information is also transferred from ALU 116 to A-register 122 via output lines 132 or to I/O register 56, M-register 82, T-register 84, or any register or register unit 114 via T-bus 52 in response to microinstructions and control signals applied to these registers. If a carry results while ALU 116 is performing either one-bit serial binary arithmetic or four-bit parallel binary-coded-decimal arithmetic, the ALU issues a corresponding qualifier control signal QBC or QDC to microprocessor 120 via one of two output lines 152 and 154.

Programmable clock 118 incudes a crystal-controlled system clock 156, a clock decoder and generator 158, and a control gate 160. System clock 156 issues regularly recurring clock pulses to clock decoder and generator 158 via output line 162. In response to these regularly recurring clock pulses from system clock 156 and to four-bit clock codes from microprocessor 120, clock decoder and generator 158 issues trains of $n$ shift clock pulses to ALU 116, M-register 82, T-register 84, and all of the registers of register unit 114 via output line 164. These trains of $n$ shift clock pulses are employed for shifting a corresponding number of bits of serial information into or out of any of these registers or for shifting a carry bit in the ALU. The number $n$ of pulses in each of these trains may vary from one to sixteen as determined by the number of bits of serial information required during each operation to be performed. In response to a control signal $\overline{CCO}$ from microprocessor 120, control gate 160 prevents any shift clock pulses from being applied to the ALU or any of these registers. Upon completion of each train of $n$ shift clock pulses, clock decoder and generator 158 issues a ROM clock pulse to microprocessor 120 via output line 166 and an I/O clock pulse to I/O control 60 via output line 168. In response to the regularly recurring clock signal from system clock 56, clock decoder and generator 158 also issues correspondingly regularly recurring memory clock pulses to memory unit 46 via output line 170.

Microprocessor 120 selectively issues two I/O microinstructions to I/O control 60 via two output lines 172, six memory microinstructions to memory unit 46 via six output lines 174, thirteen register microinstructions to register unit 114 via thirteen output lines 176, and five ALU microinstructions to ALU 116 via five output lines 178. It also issues a four-bit clock code associated with each of these microinstructions to clock decoder 158 via four output lines 180. These microinstructions and associated clock codes are issued as determined by the control signal $\overline{POP}$ from the power supply, the eleven microprocessor qualifier control singals from Q-register 128, the four-bit primary address codes from Q-register 128, and the five microprocessor qualifier control signals from I/O control 60, interrupt control 65, ALU 116, and P-register 126.

Figure 7:
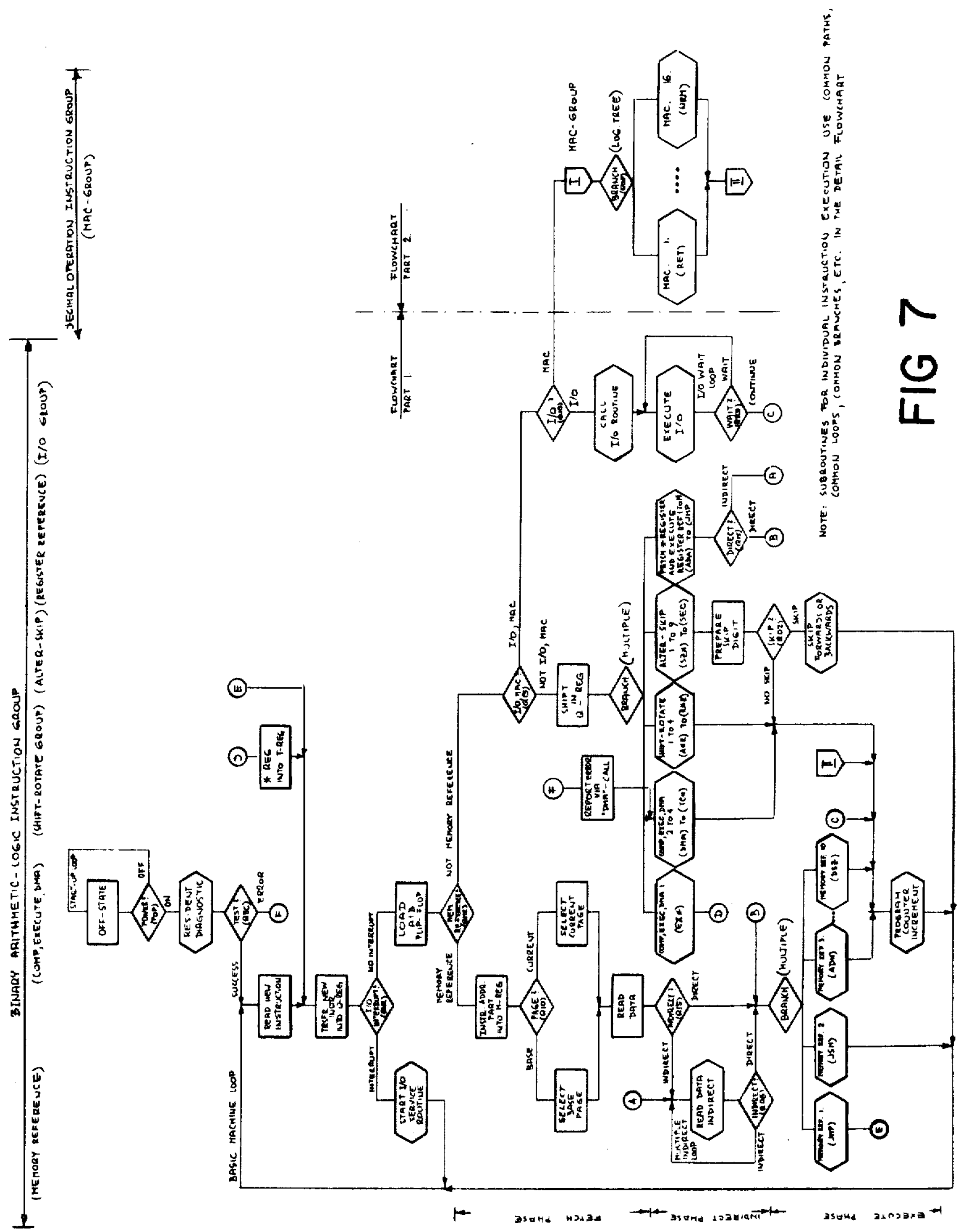
FIG. 7 is a simplified operational logic flow chart illustrating the operation of the microprocessor employed in the central processing unit of FIGS. 3A–B.

As shown in the simplified flow chart of FIG. 7, microprocessor 120 executes a hardware diagnostic routine (stored within the microprocessor itself) in response to the control signal $\overline{POP}$. Upon completion of this diagnostic routine, ALU 116 issues the qualifier control signal QBC indicating whether or not the diagnostic routine was successful. Microprocessor 120 thereupon responds to this qualifier control signal by entering the basic machine operating loop and issuing microinstructions causing a sixteen-bit instruction stored in ROM 80 to be loaded into T-registter 84 and transferred from there to Q-register 128. Microprocessor 120 thereupon sequentially responds to one or more additional qualifier control signals by issuing microinstructions and associated clock codes for executing the instruction then contained in Q-register 128. and causing another sixteen-bit instruction stored in ROM 80 to be loaded into T-register 84 and transferred from there to the Q-register. When an instruction requiring multiple branching is contained in Q-register 128, microprocessor 120 issues a pair of microinstructions $\overline{UTR}$ and $\overline{XTR}$ causing the microprocessor to respond to a four-bit primary address code from the Q-register by issuing additional microinstructions and associated clock codes for executing the instruction contained in the Q-register.

As illustrated by the basic machine operating loop shown in the flow chart of FIG. 7, microprocessor 120 initially responds to the qualifier control signal QNR either by issuing microinstructions and associated clock codes for interrupting the basic machine operating loop and executing an I/O service routine or by issuing microinstructions and associated clock codes for loading A/B flip-flop 148 with the information Q11 contained in Q-register 128. The manner in which microprocessor 120 responds is determined by the condition of the qualifier control signal QNR, which in turn indicates whether or not the basic machine operating loop should be interrupted.

Assuming the basic machine operating loop is not to be interrupted, microprocessor 120 loads the information Q11 into A/B flip-flop 148 and responds to the qualifier control signal QMR either by issuing microinstructions for transferring an address portion of the instruction contained in Q-register 128 from T-register 84 into M-register 82 or by responding to another qualifier control signal Q15. Again, the manner in which microprocessor 120 responds is determined by the condition of the qualifier control signal QMR, which in turn indicates whether or not the instruction contained in Q-register 128 is a memory reference instruction.

Assuming the instruction contained in Q-register 128 is a memory reference instruction, microprocessor 120 transfers the required address information into the M-register 82 and reponds to qualifier control signal Q10 either by issuing microinstructions and associated clock codes to select the base page of the memory (i.e. page 0) or by issuing microinstructions and associated clock codes to select the current page of the memory (i.e. the page from which the instruction contained in Q-register 128 was obtained). In either case, the microprocessor then issues microinstructions as required to read data from the preset page of the memory at the address designated by the address information last transferred into M-register 82. Upon completion of this operation, microprocessor 120 responds to qualifier control signal Q15 by issuing additional microinstructions and associated clock codes to execute an indirect memory access operation if the condition of this qualifier control signal indicates that the address information contained in M-register 82 is indirect.

Assuming the address information contained in M-register 82 is direct (or upon completion of the indirect memory access operation), microprocessor 120 issues microinstructions and associated clock codes causing the microprocessor itself to respond to a four-bit primary address code from the Q-register. The microprocessor responds by issuing additional microinstructions and associated clock codes for executing whichever one of ten possible memory reference instructions is contained in Q-register 128 and designated by the four-bit primary address code. Folowing execution of the designated memory reference instruction, microprocessor 120 issues microinstructions and associated clock codes causing another sixteen-bit instruction stored in ROM 80 to be loaded into T-register 84 and transferred from there to Q-register 128, thereby beginning another cycle of the basic machine operating loop.

As illustrted by other possible paths of the basic machine operating loop shown in FIG. 7, microprocessor 120 sequentially responds to other qualifier control signals when other types of instructions are contained in Q-register 128. For example, when an I/O instruction is contained in Q-register 128, microprocessor 120 sequentially responds to qualifier control signals QNR, QMR, Q15, Q10, and QRD by issuing microinstructions and associated clock codes to execute the I/O instruction. It should be noted that the microprocessor qualifier control signals not shown in the simplified flow chart of FIG. 7 are variously contained within those flow chart blocks requiring decisions as will hereinafter become apparent.

The calculator firmware operational diagram of FIG. 9 illustrates the basic components of the calculator firmware. These components comprise routines which reside in the calculator ROM 80 and serve to implement the definition of the calculator. Control information passing between routines is represented by solid lines on the drawing.

Referring to FIG. 9, it is shown that the calculator hardware units are controlled by firmware routines contained in ROM 80. These units comprise an on-off power switch 182, an alphanumeric keyboard input unit 12, a display unit 18, and a magnetic tape cassette reading and recording unit 14. The firmware routines also control an external printer 20, external tape cassette reading and recording units 14, and various other external input-output devices 244.

Figure 83:
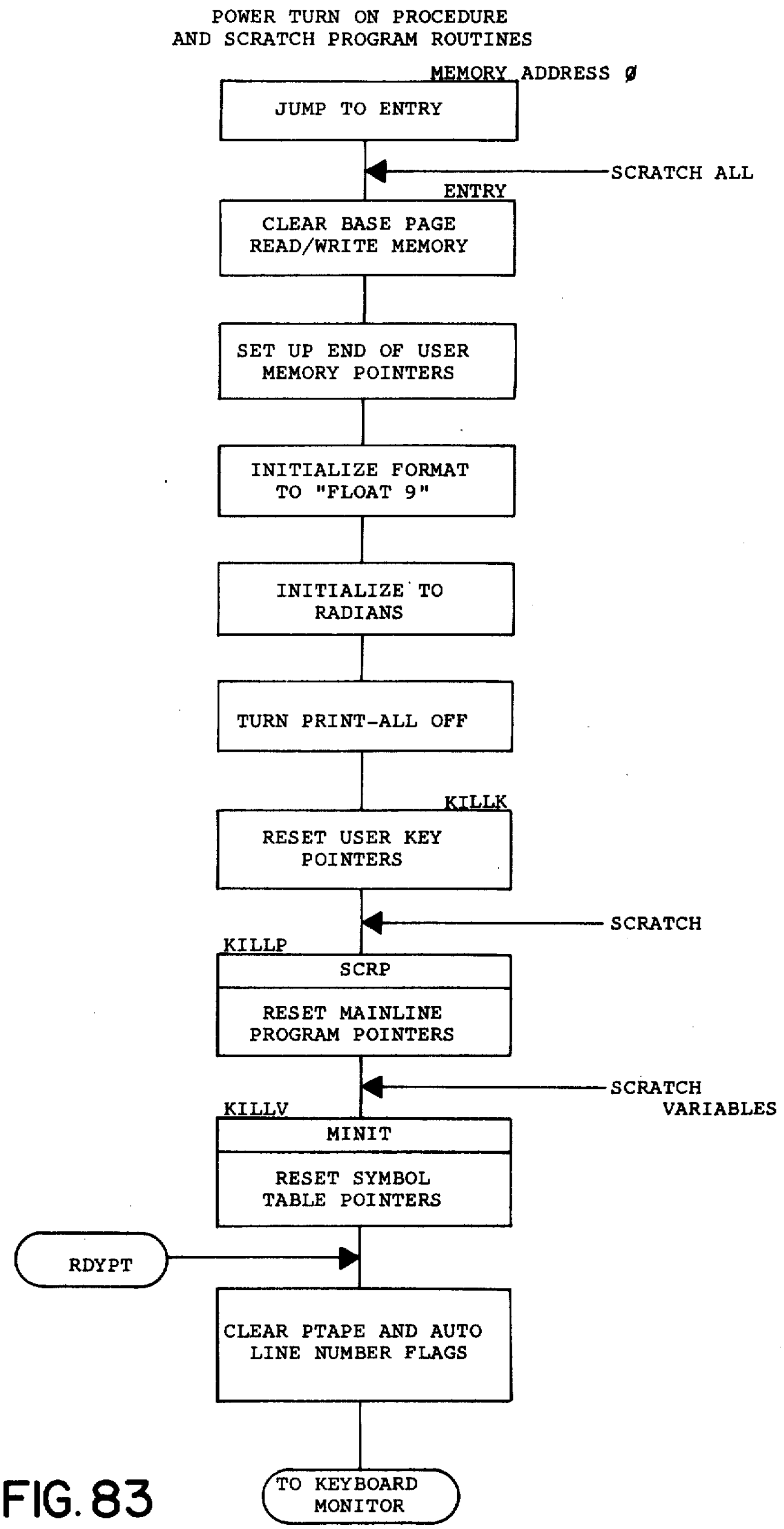
FIG. 83 is a flow chart of the turn-on routine which is a portion of the system monitor of FIG. 4B.
Figure 84A:
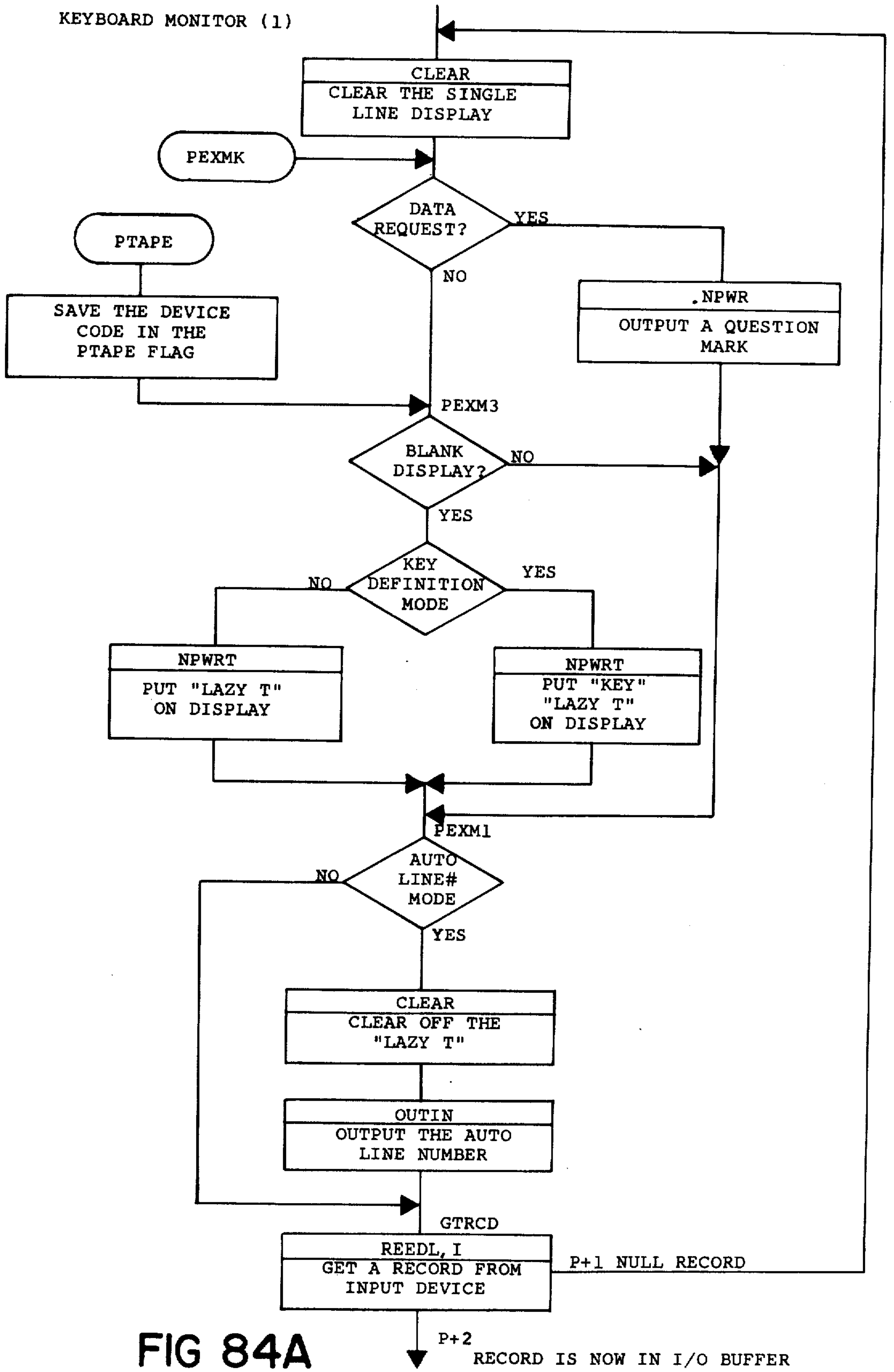
FIGS. 84A–D are a flow chart of a routine comprising another portion of the system monitor of FIG. 4B.
Figure 84B:
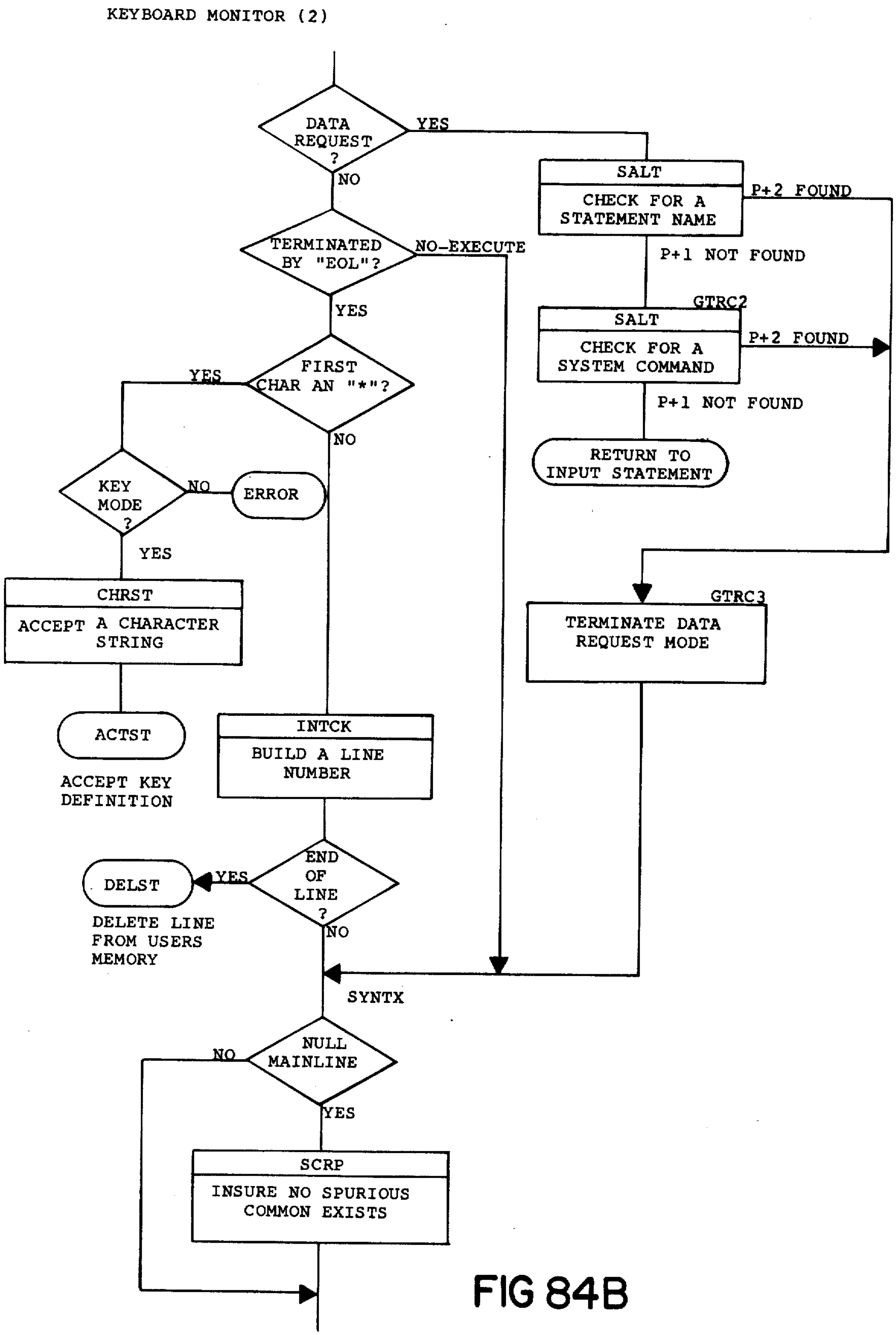
Figure 84C:
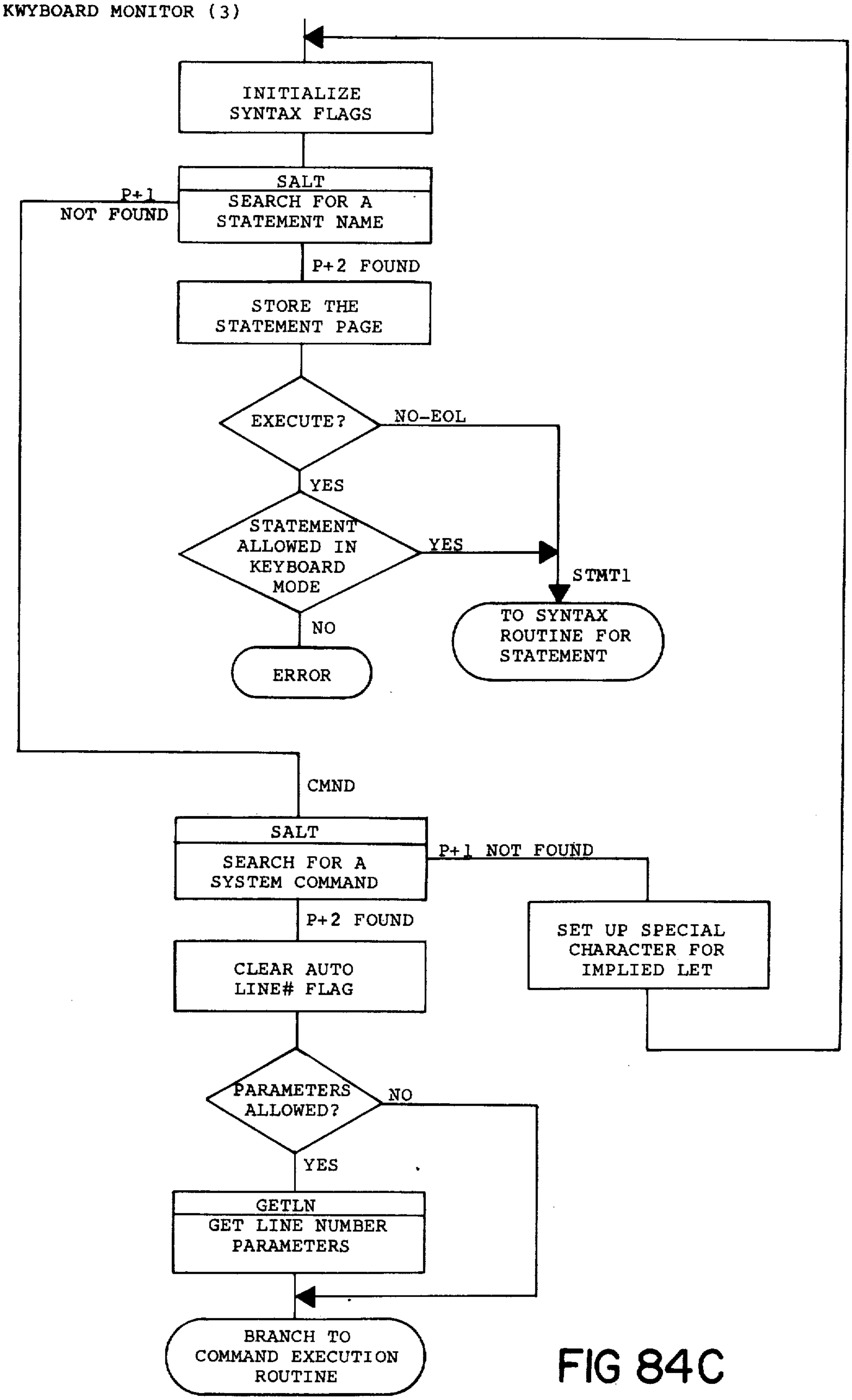
Figure 84D:
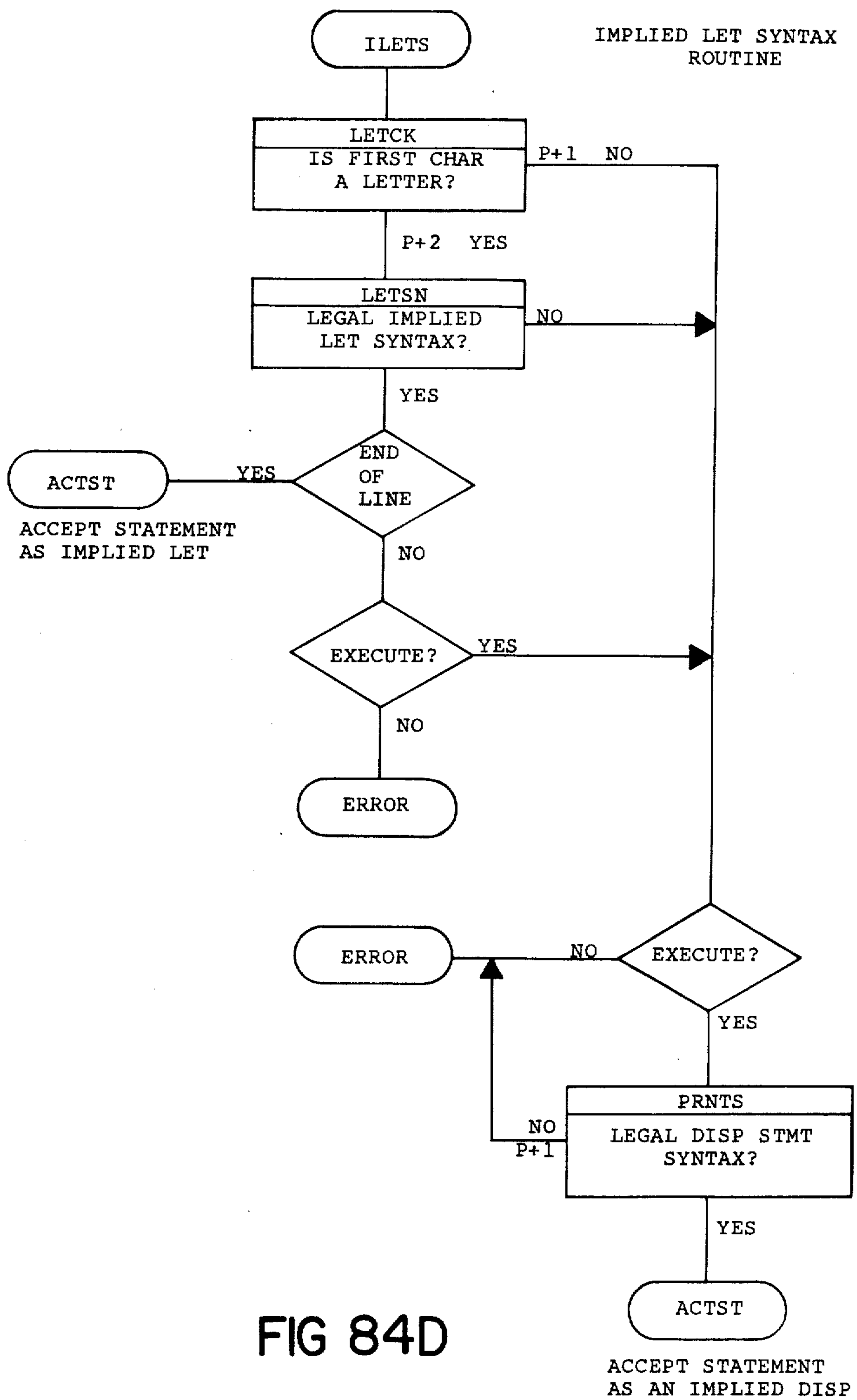

Operation of the calculator is begun by placing the on-off switch in the on position, thus forcing the hardware internal to the calculator to execute the instruction located at address 0000 of ROM 80. This instruction directs control to the start-up routine 200, which is shown in the flowchart of FIG. 83, and described in detail on page 53 of the basic system firmware listing. The purposes of this routine are to initialize RWM 78, set the stack pointer address at location 1777, set the keyboard execution numeric output format to float 9, initialize certain variables in the system RWM area for later use by other firmware routines, and initialize the various read-write pointers to the user read-write memory area shown in detail in the memory map of FIG. 6.

Figure 85:
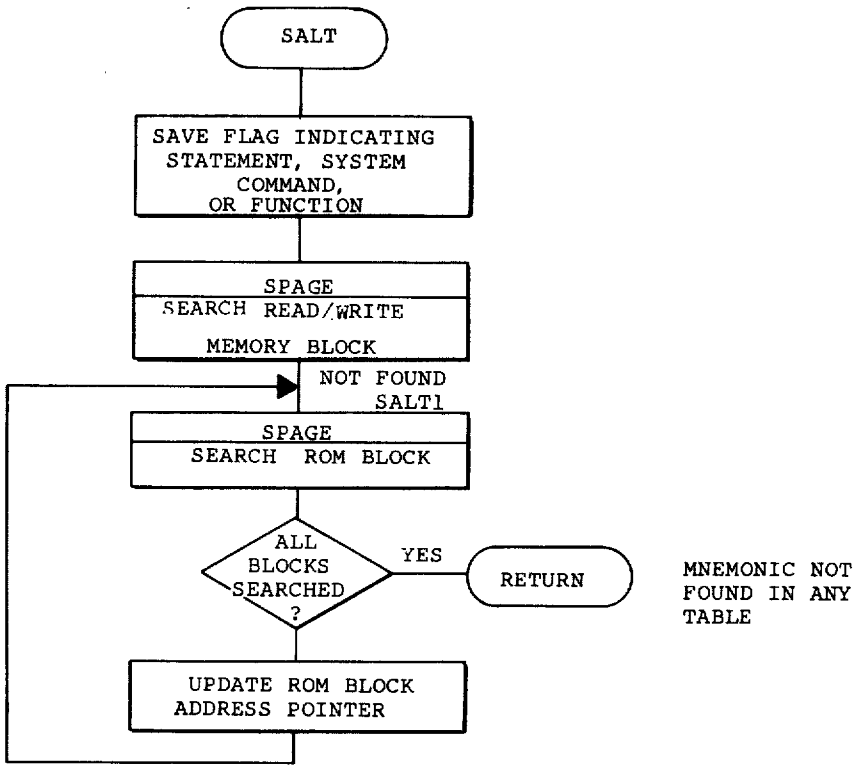
FIG. 85 is a flow chart of the system table scan routine of FIG. 4D.
Figure 86:
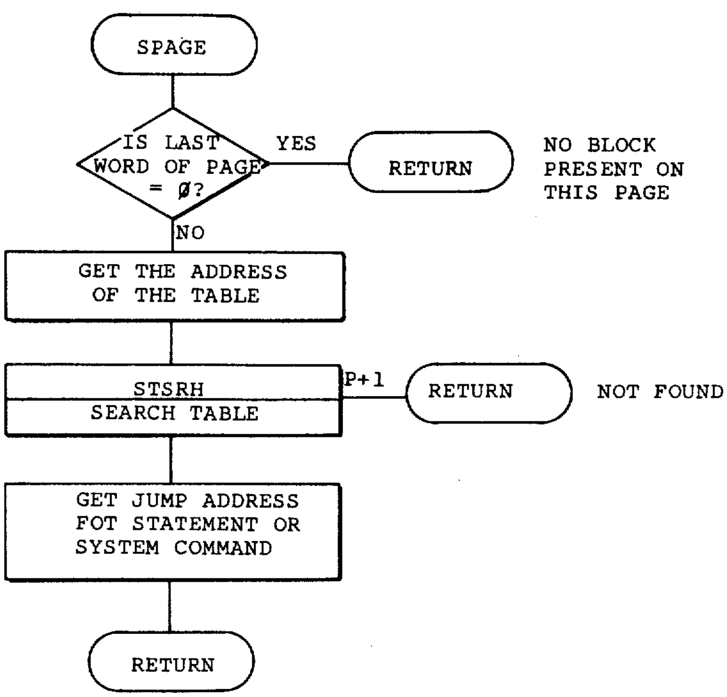
FIG 86 is a flow chart of a subroutine called by the routine of FIG. 85.
Figure 87:
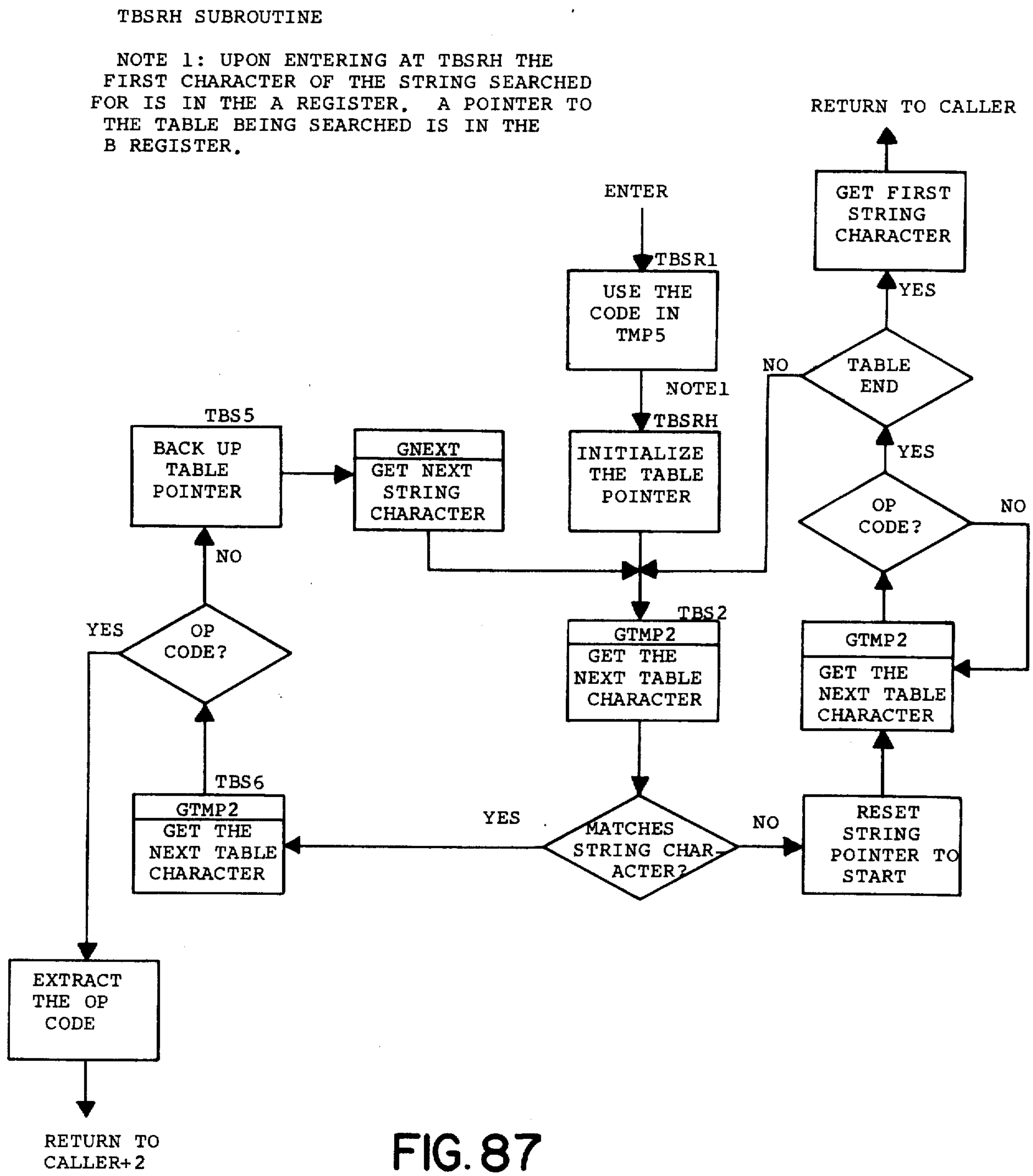
FIG. 87 is a flow chart of the table search routine of FIG. 4A.
Figure 88B:
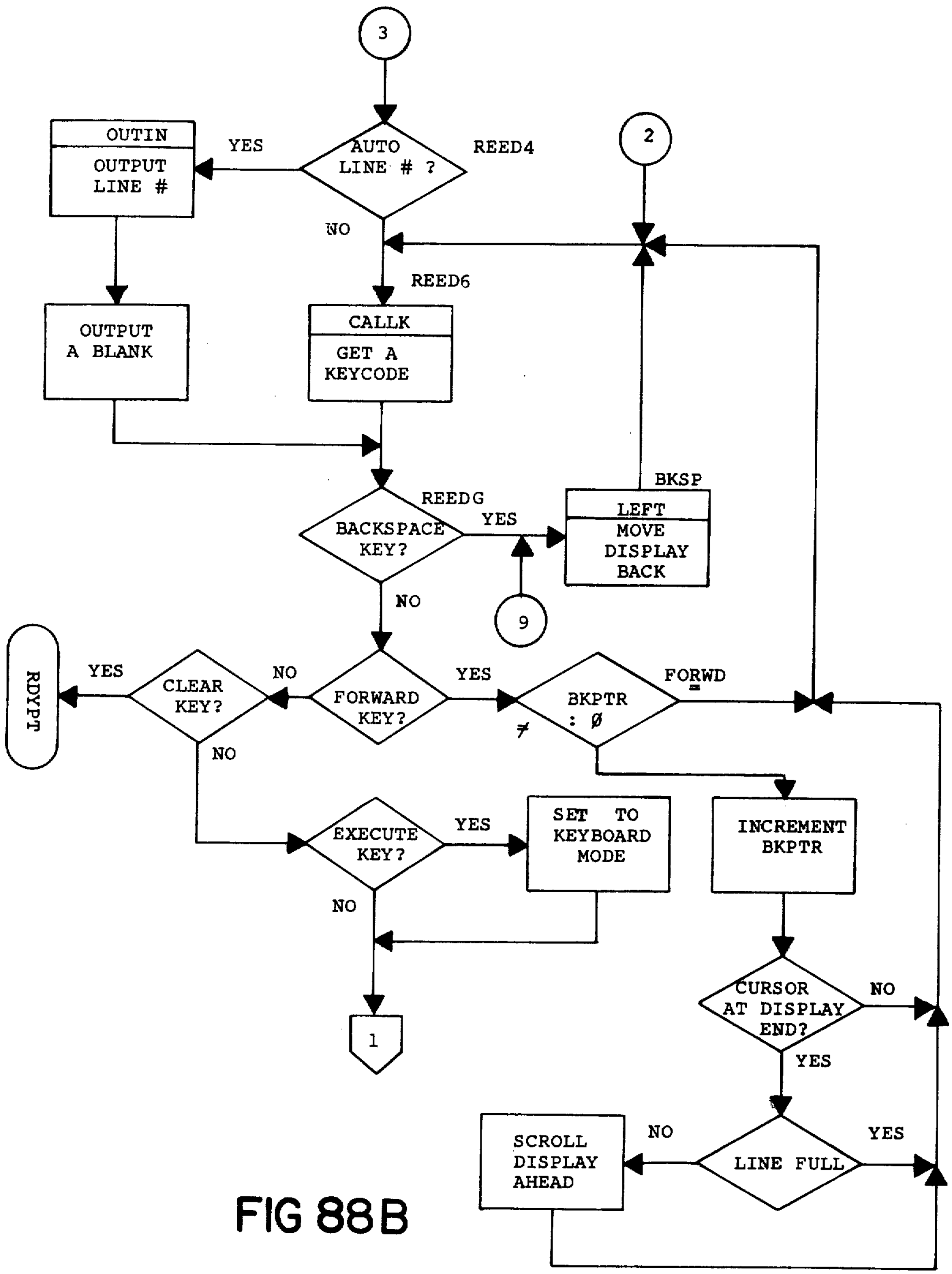
Figure 88C:
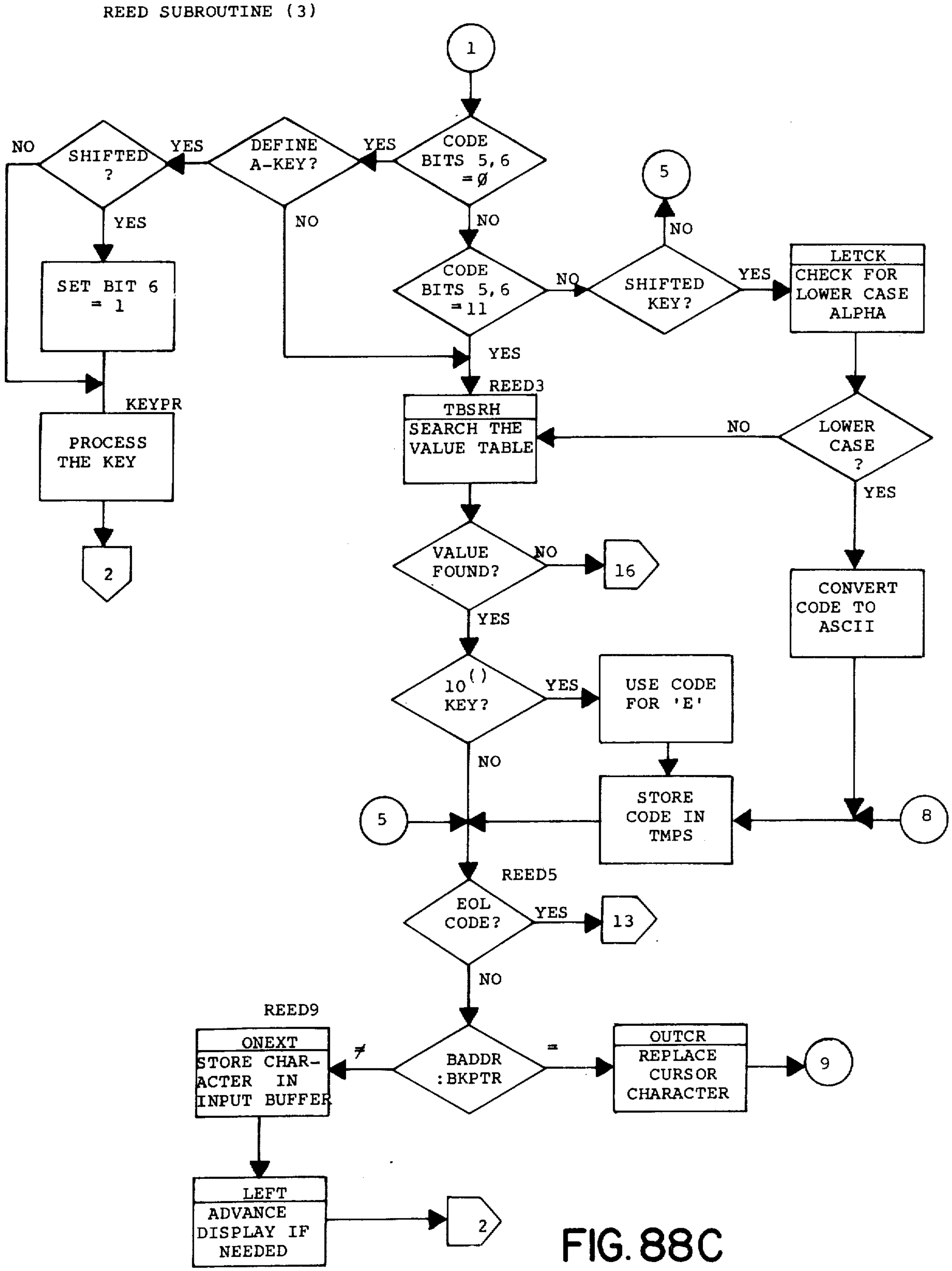
Figure 88D:
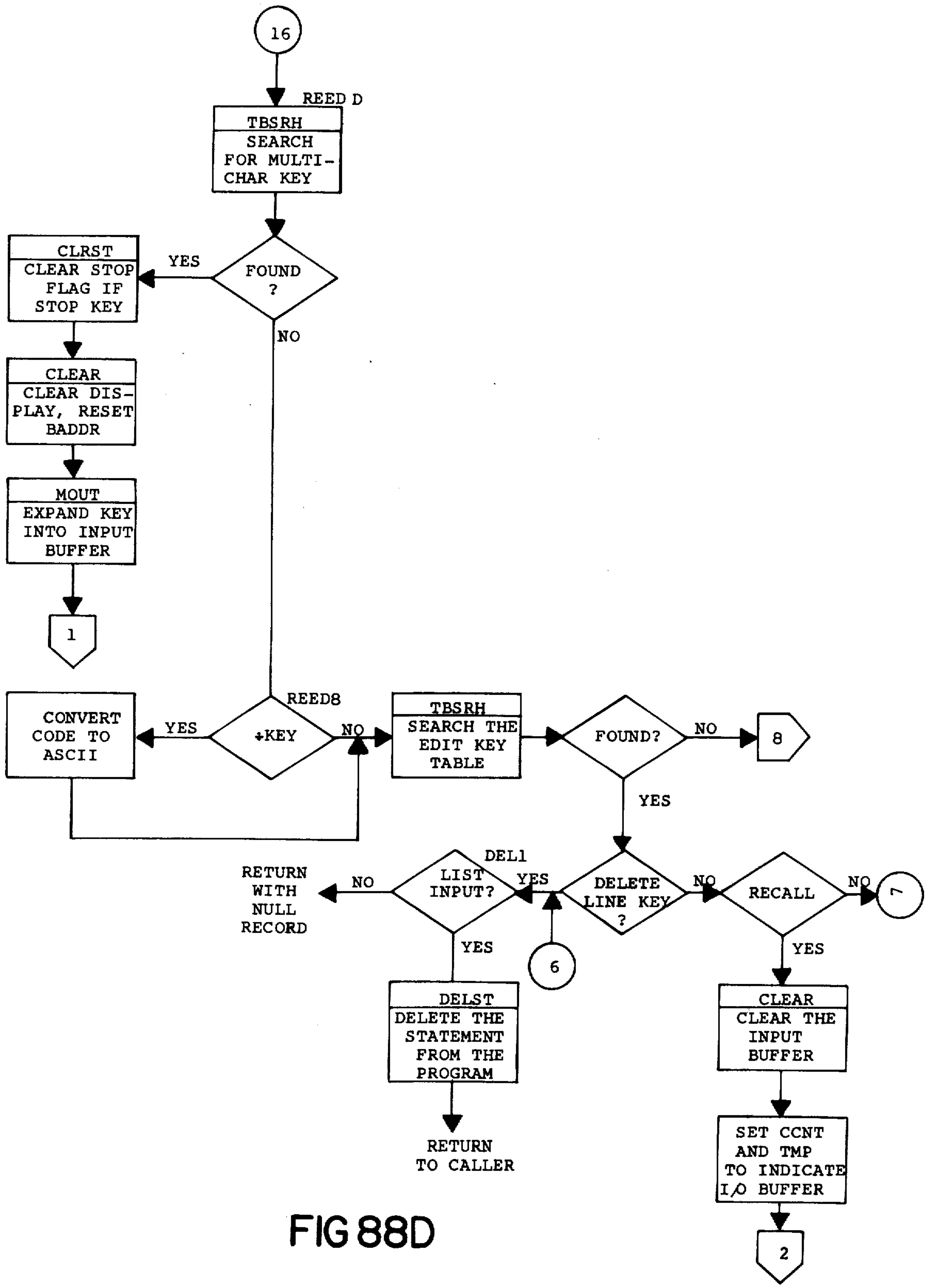
Figure 88E:
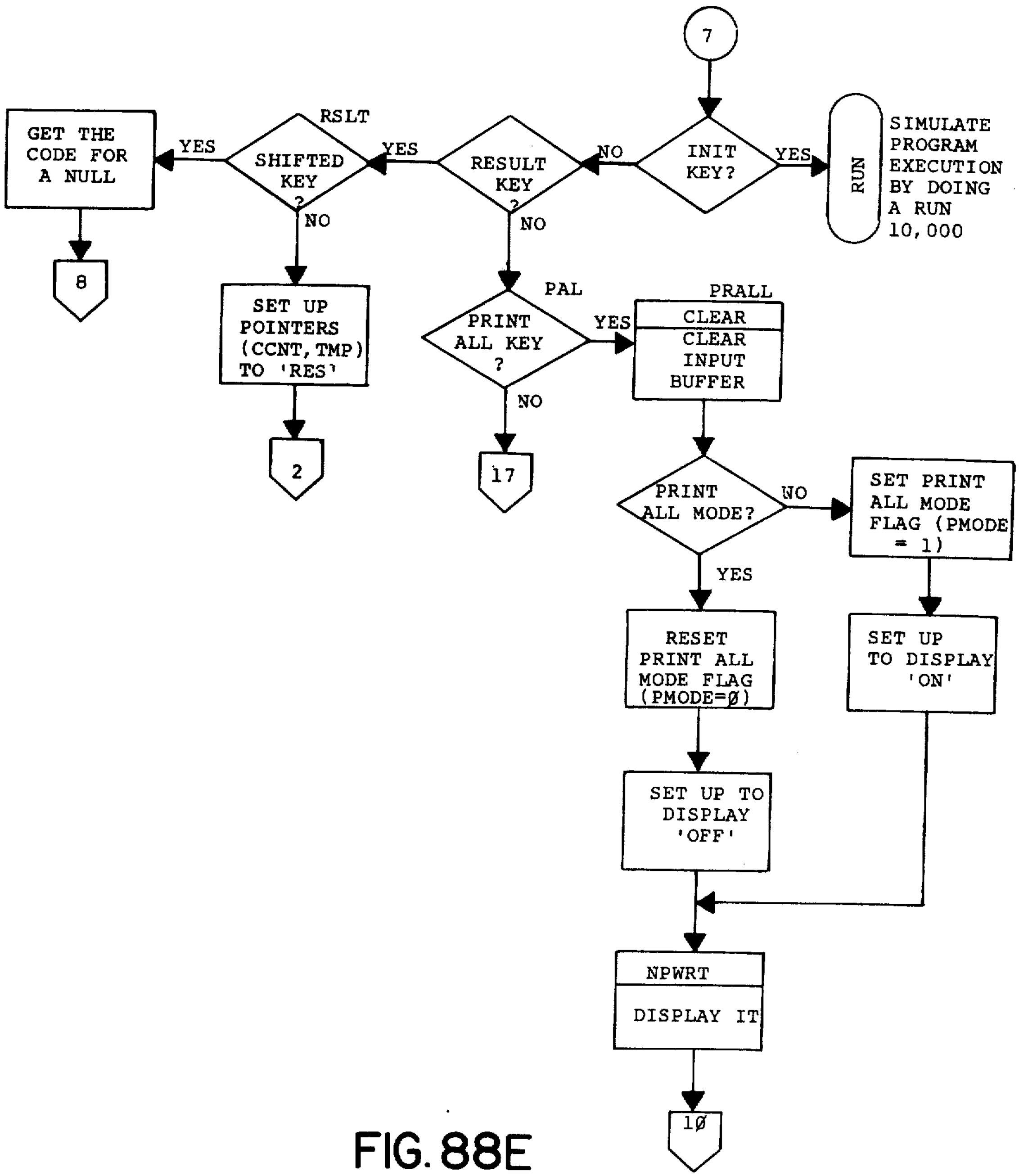
Figure 88F:
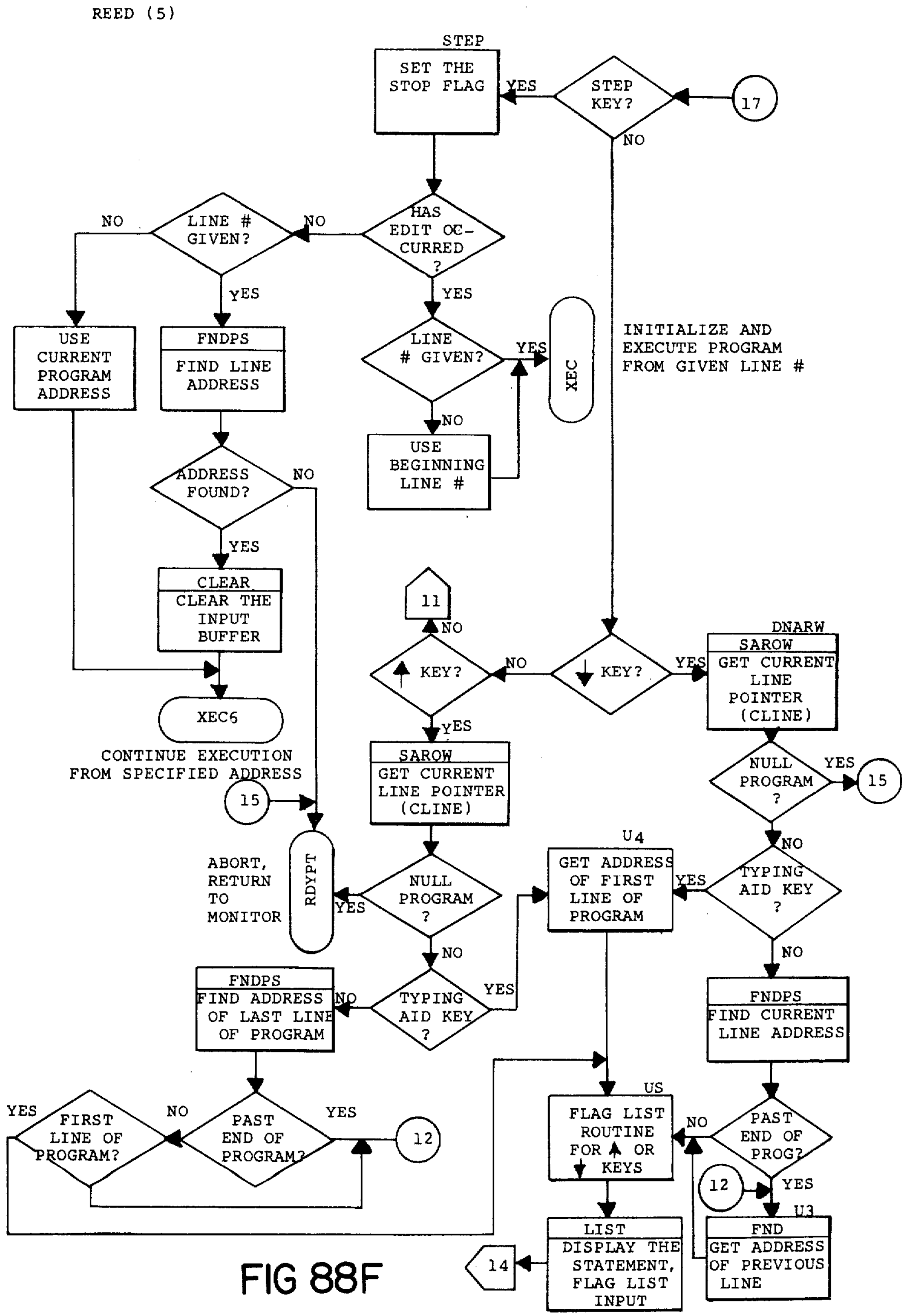
Figure 88G:
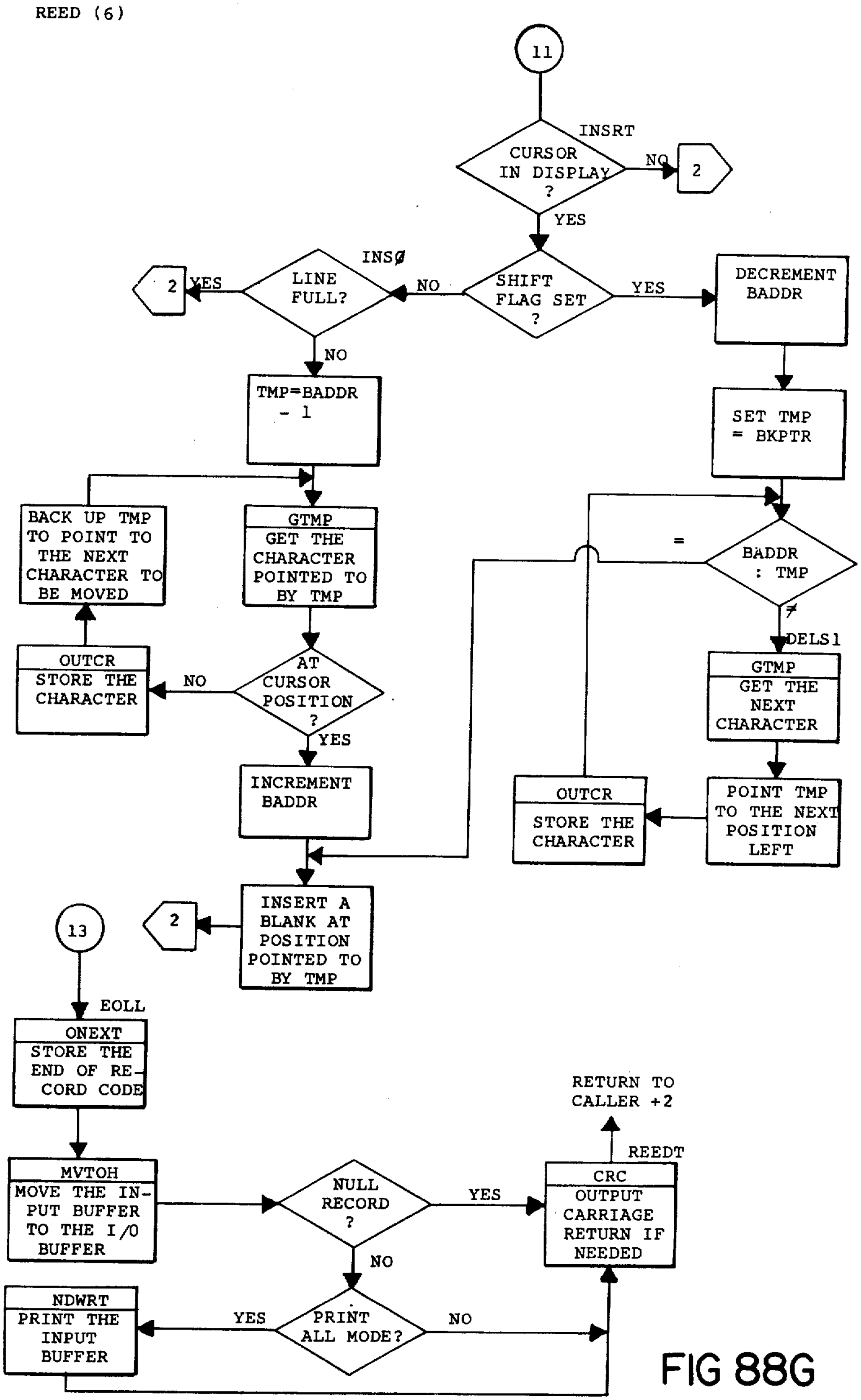
Figure 89A:
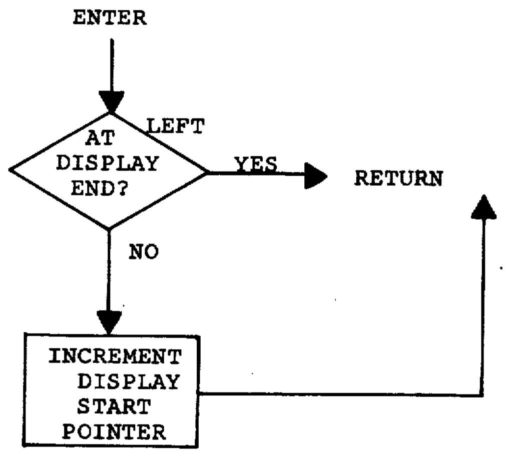
FIGS. 89A–B are flow charts of subroutines called by the routines of FIGS. 88A–G.
Figure 89B:
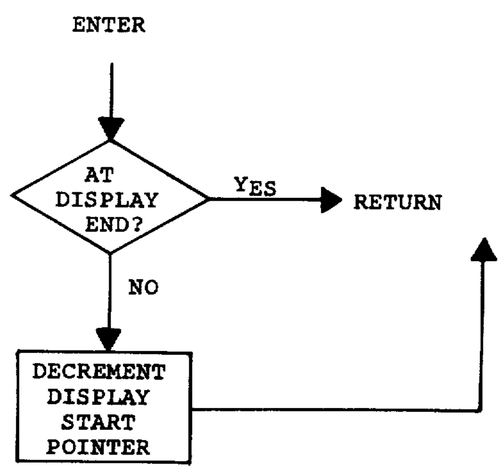
Figure 90:
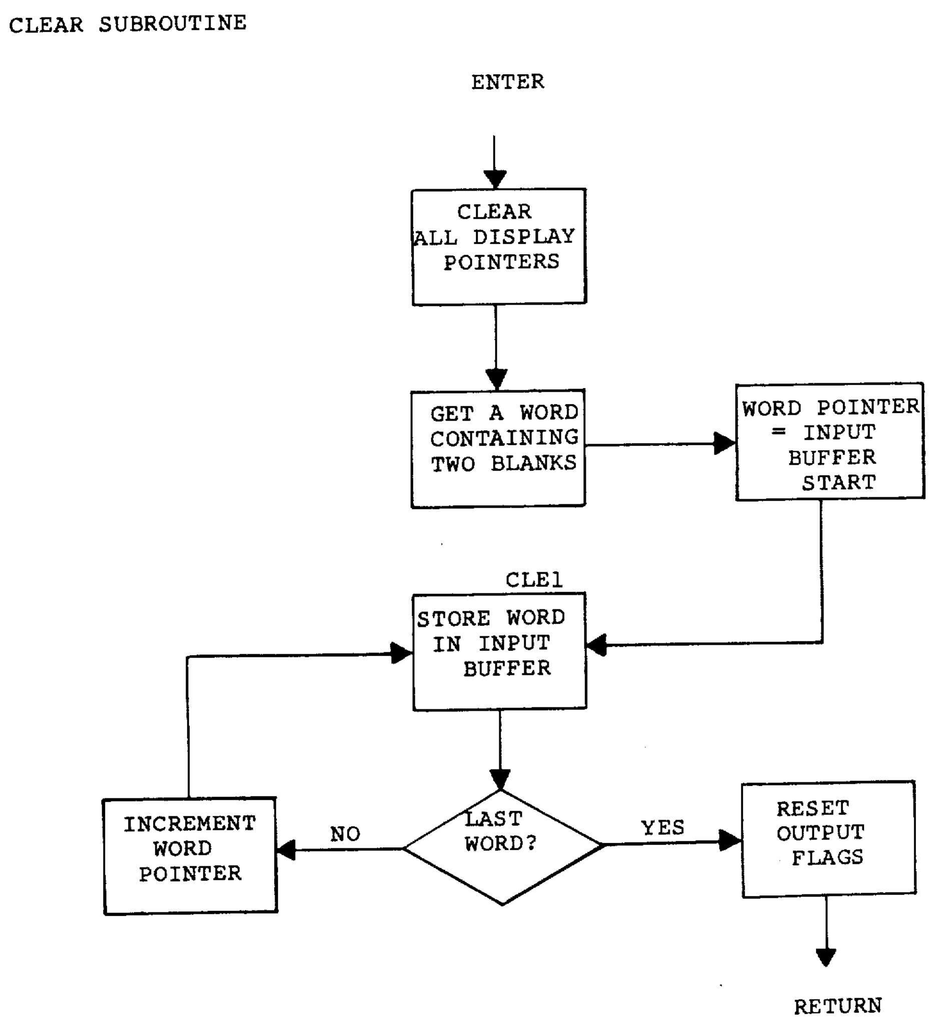
FIG. 90 is a flow chart of the clear subroutine called by various ones of the routines of FIGS. 4A–F.
Figure 91:
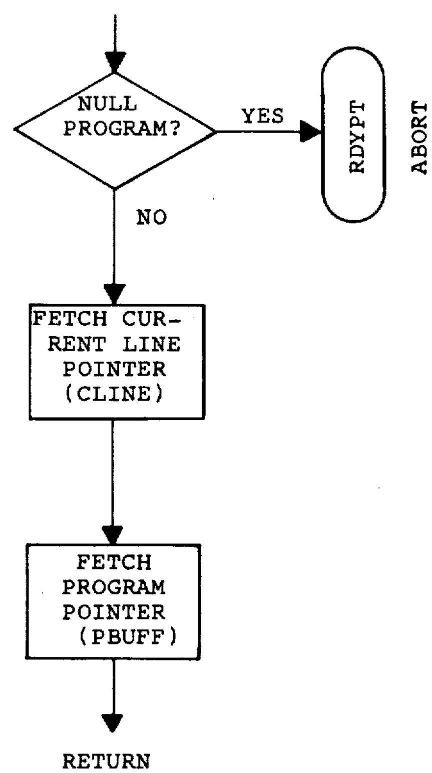
FIG. 91 is a flow chart of a subroutine called by the routine of FIG. 88F.
Figure 92:
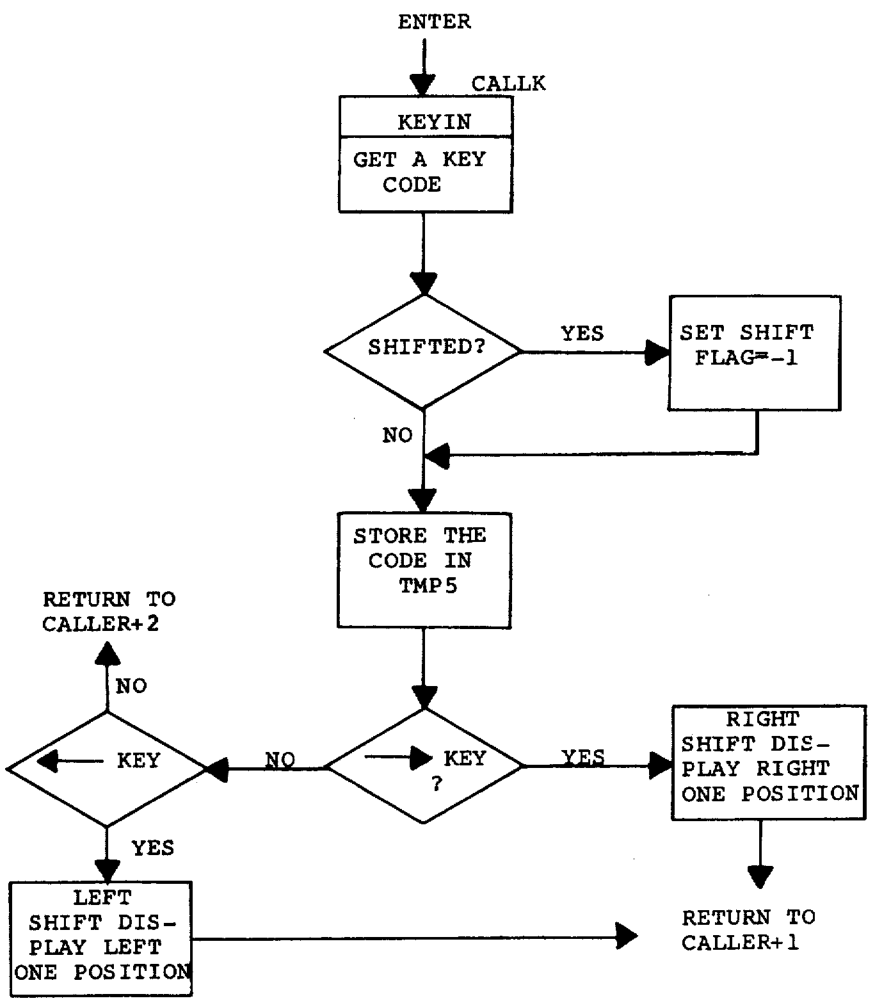
FIG. 92 is a flow chart of a subroutine called by the keyboard input routine of FIGS. 4A and 88A–G.
Figure 93:
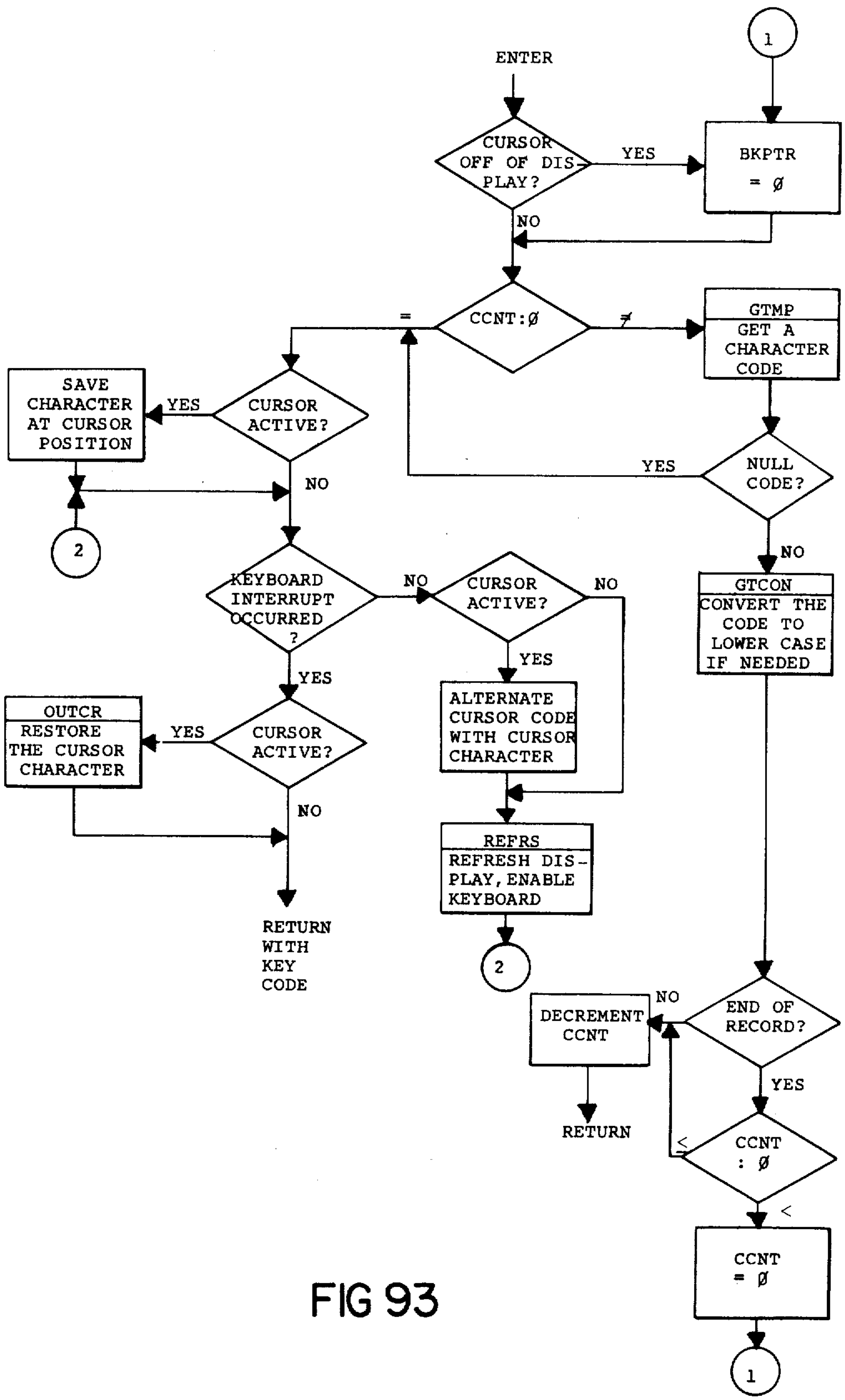
FIG. 93 is a flow chart of a keyboard driver subroutine called by the subroutine of FIG. 92.

After completion of the start-up routine, control is passed to the keyboard monitor routine 202 shown in the flowchart of FIGS. 84A-D and detailed on pages 53–56 of the basic system firmware listing. This routine initializes certain variables in the system RWM 78 for use by the keyboard input routine 204. It also outputs the automatic line number if necessary. It then calls for an input record from the keyboard input routine 204. When the keyboard input routine returns with a record the keyboard monitor routine searches the mnemonic tables in the assembly language program area shown in FIG. 6. It then searches the mnemonic tables in each of the plug-in read-only memory modules of FIG. 4E and finally searches the mnemonic tables of the main system ROM 80. A complete assembly language listing of each of the tables in read-only memory is given in the firmware listings. The subroutines which do the search of the mnemonic tables are detailed in the flowcharts of FIGS. 85, 86, and 87. If a match is found between the characters of the input record and any of the mnemonic tables, the keyboard monitor branches through a jump table to the appropriate syntax routine 210 for syntax analysis if the mnemonic is a statement, or branches through a jump table for execution if the mnemonic is a system command. A separate syntax analysis routine is provided for each statement and a separate execution routine is provided for each system command. Syntax and execution routines for statements and commands on an optional read-only memory module are contained in the firmware of that module. The assembly language program area is handled in the same fashion as the plug-in read-only memory module. If no mnemonic is found, control is passed to the implied LET syntax routine.

The keyboard input routine 204 is detailed in the flowcharts of FIGS. 88A–G, 89A–B, and 90–93. It calls on the display refresh routine 206 to refresh the 32 character single line display 18 between key entries. The display refresh routine is detailed on page 35 of the firmware listing. When a key is entered through the alphanumeric keyboard 12, the interrupt circuitry causes the calculator to execute the instruction at address 00002. This instruction causes a jump to the interrupt routine 208, which is detailed in the flowchart of FIGS. 117A–B and pages 257 and 258 of the firmware listing. The interrupt routine 208 saves the keycode in a memory location of the system RWM 78 and returns. The keyboard input routine 204 reads this memory word and decides what operations need to be performed for that particular keycode. The shift bit is stripped from the keycode and stored as a flag in a temporary location in system RWM 78. If the key requires that a mnemonic name be displayed, the single line display buffer shown in FIGS. 5A–B is cleared and the mnemonic name is entered. If an editing function is required, a routine is called to perform the editing function. If a user-definable key f0–f9 has been given, the user-definable key routine 228 is called. If an alphanumeric key has been given, the shift flag in RWM 78 is tested, and, if the shift has been given, the keycode is converted to the code for the shifted key. Then the keycode is inserted into the single line display buffer shown in FIGS. 5A–B, either at the end of the line or at the cursor position, if the cursor is within the line.

The user-definable key routines 228 perform the special operations for keys f0–f9. They are detailed in the flowcharts of FIGS. 99A–F and pages 43–47 of the firmware listing.

Figure 95:
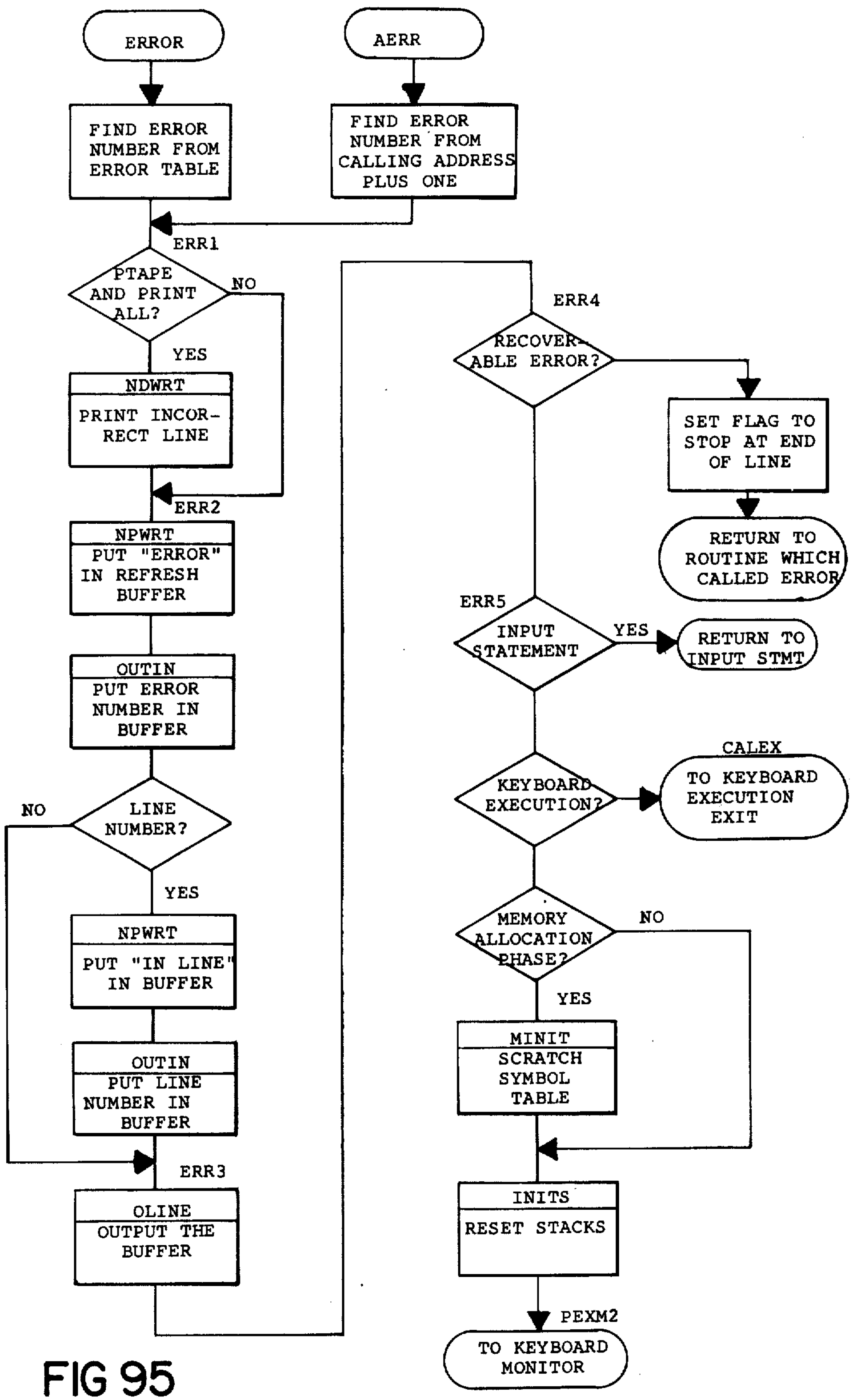
FIG. 95 is a flow chart of the error routine of FIG. 4B.
Figure 96A:
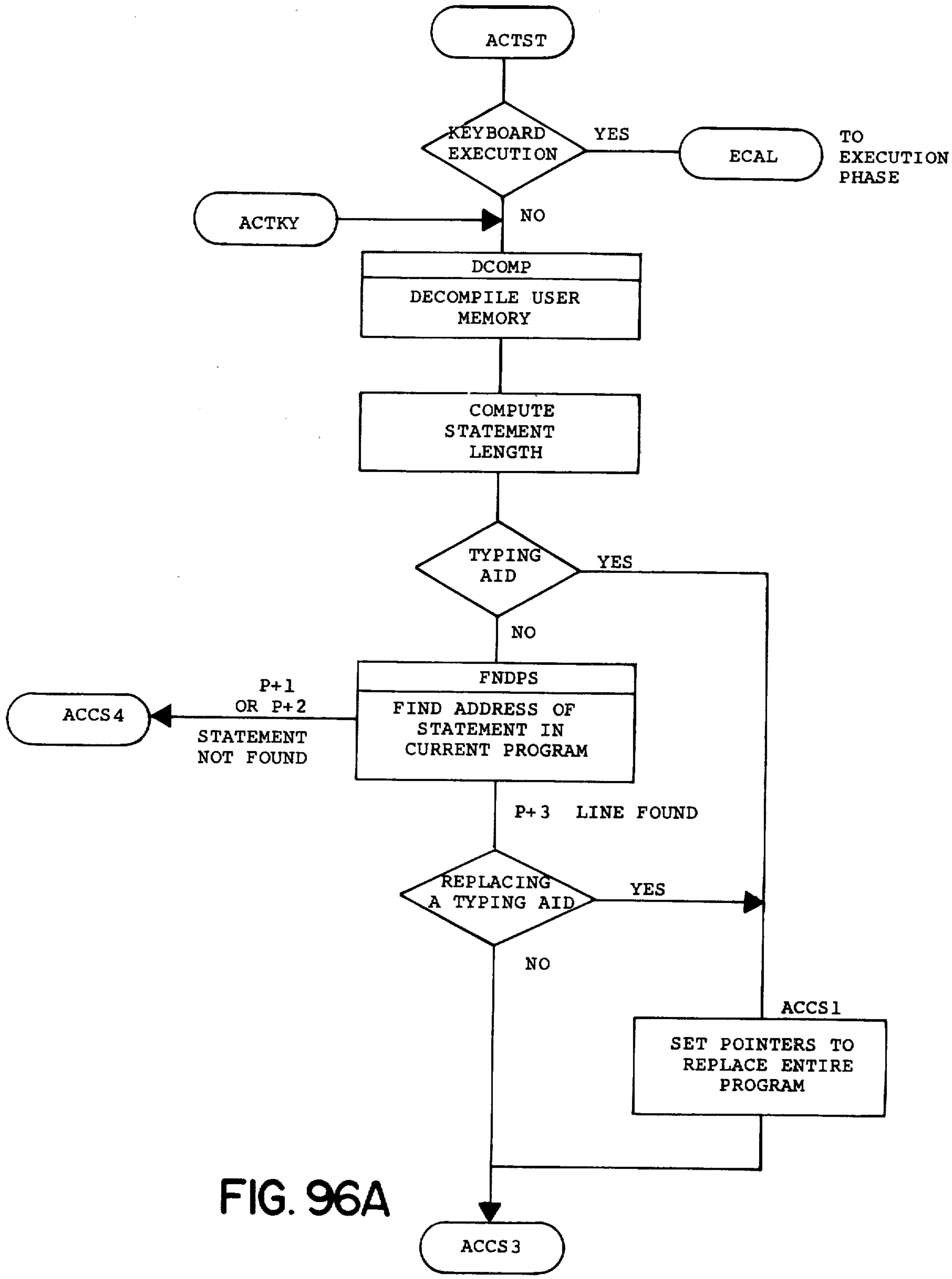
FIGS. 96A–D are flow charts of the program memory manager routines of FIG. 4B.
Figure 96B:
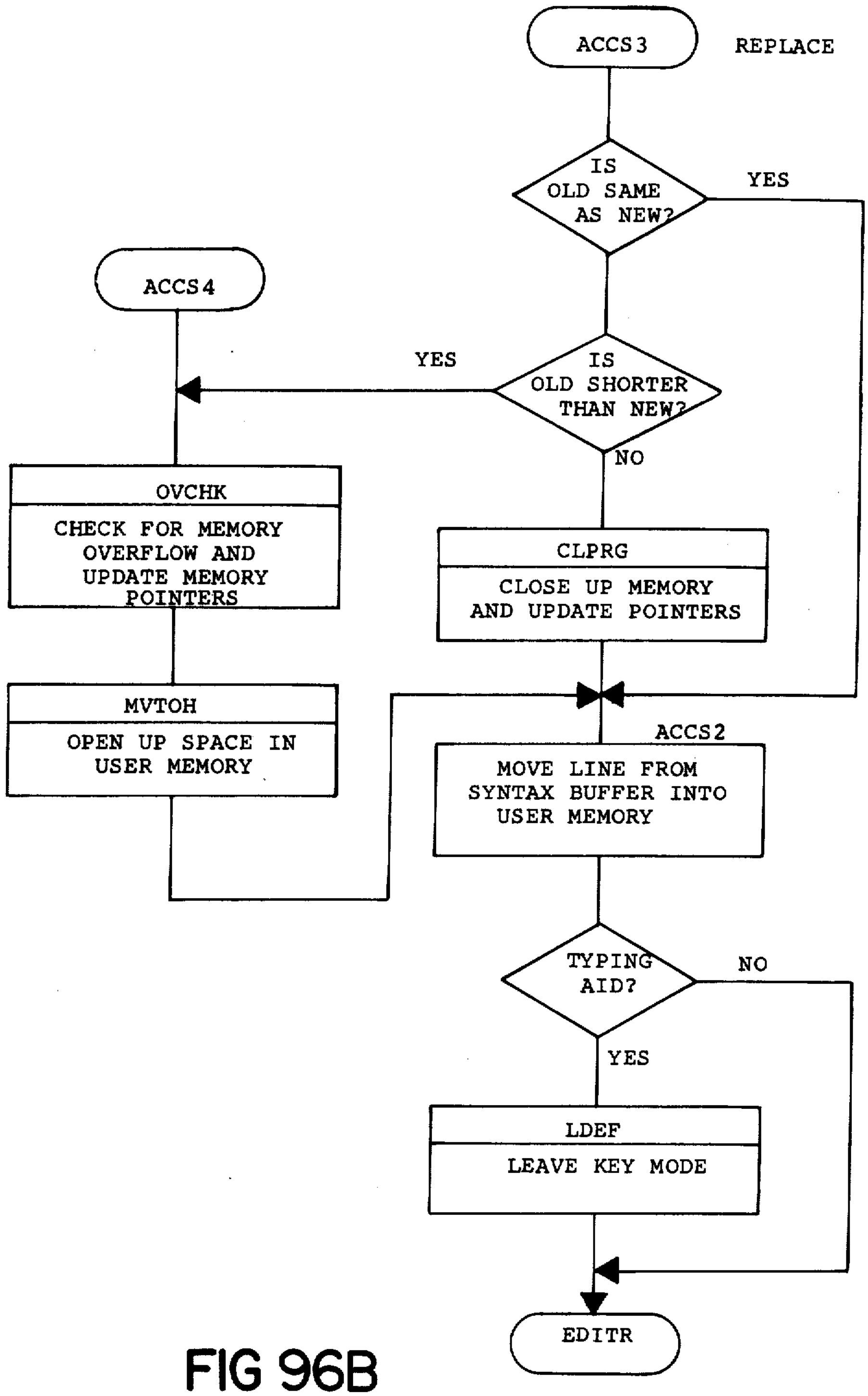
Figure 96C:
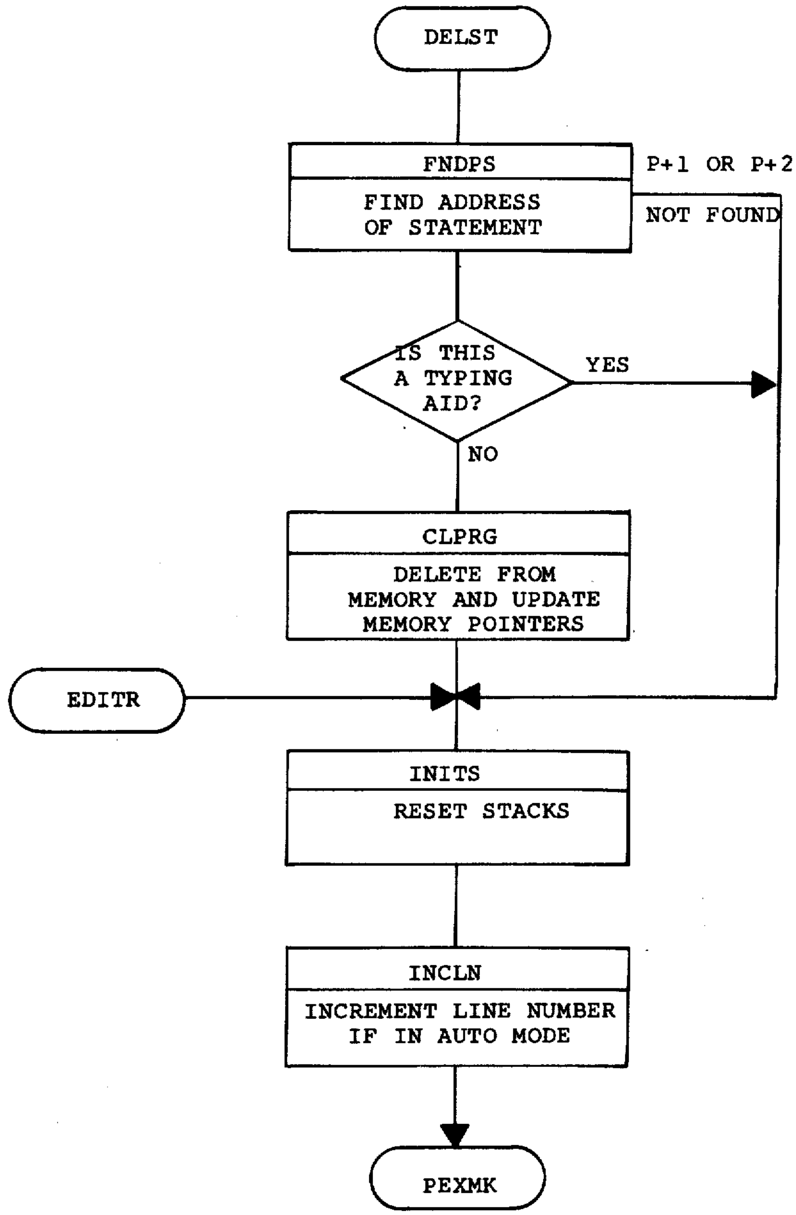
Figure 96D:
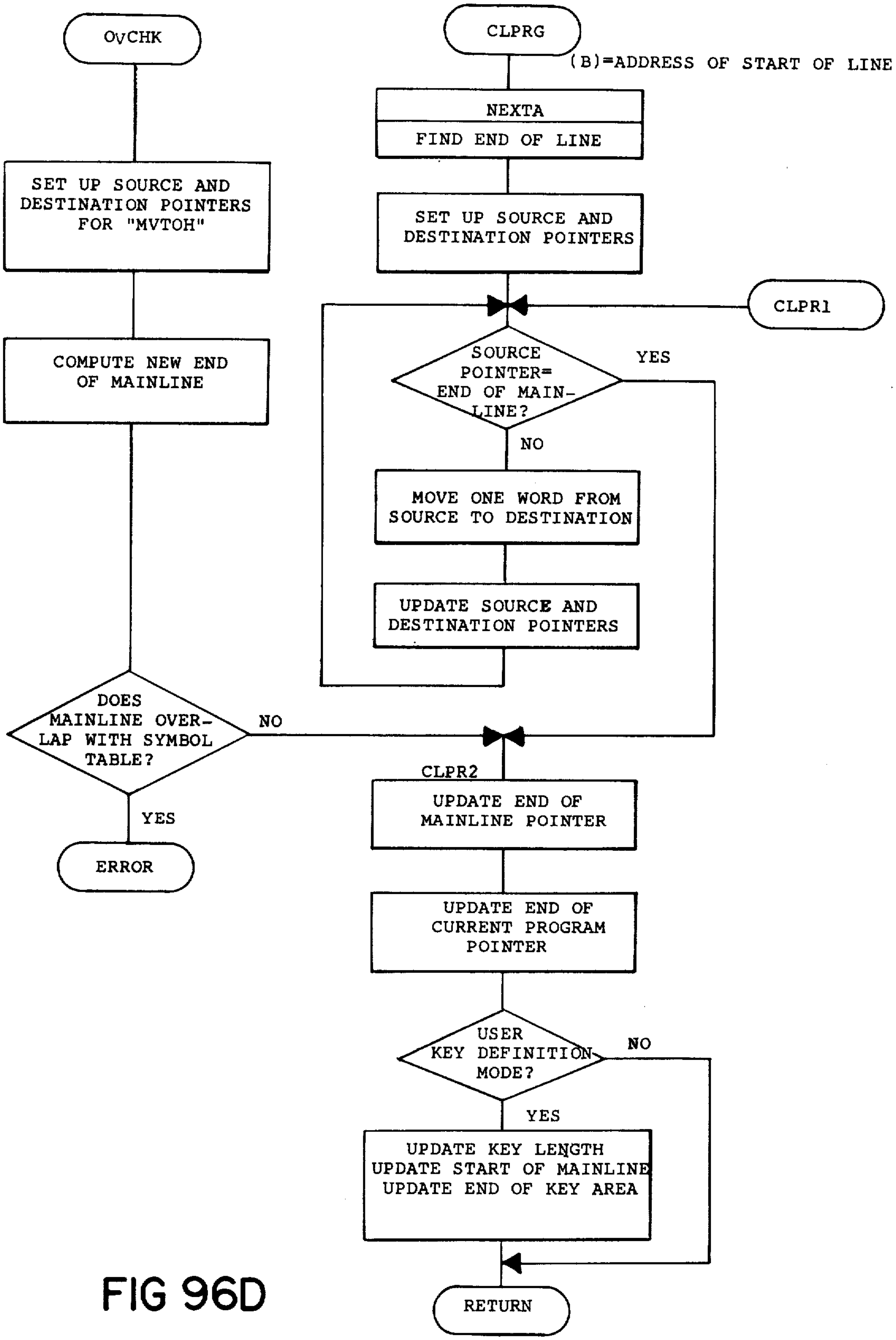
Figure 97:
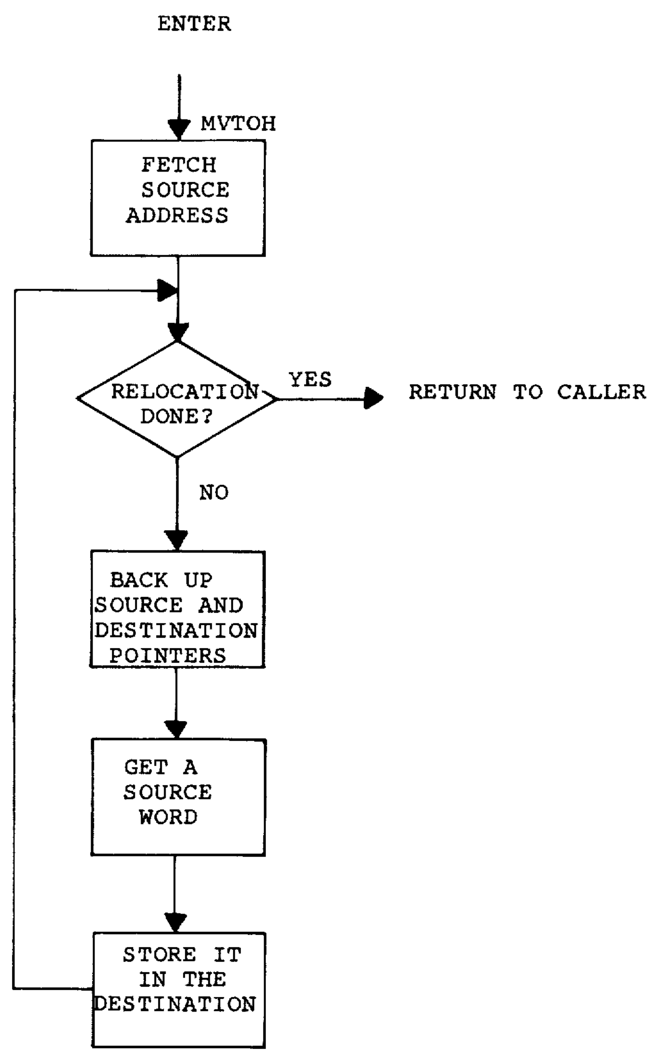
Figure 98:
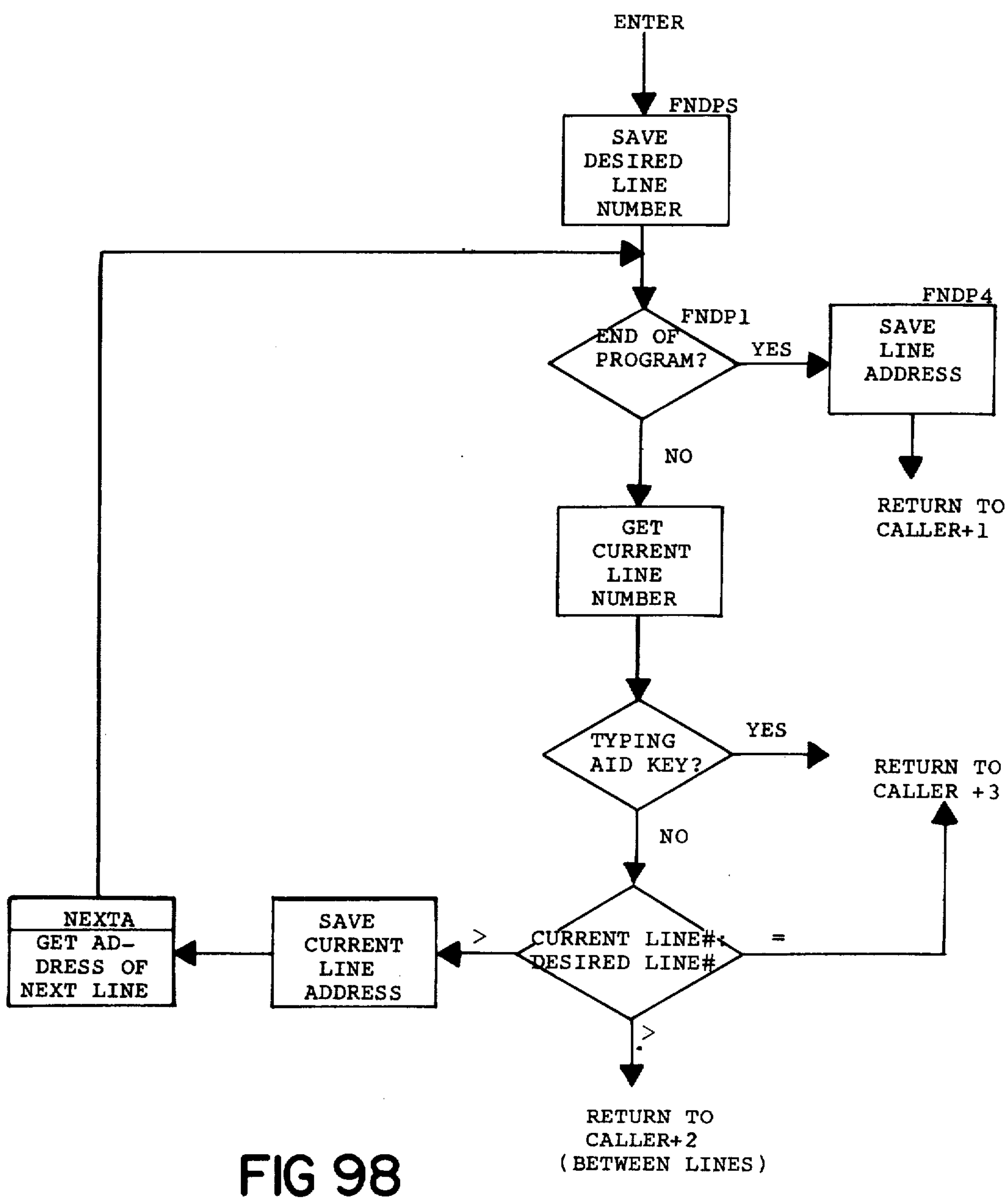
Figure 99A:
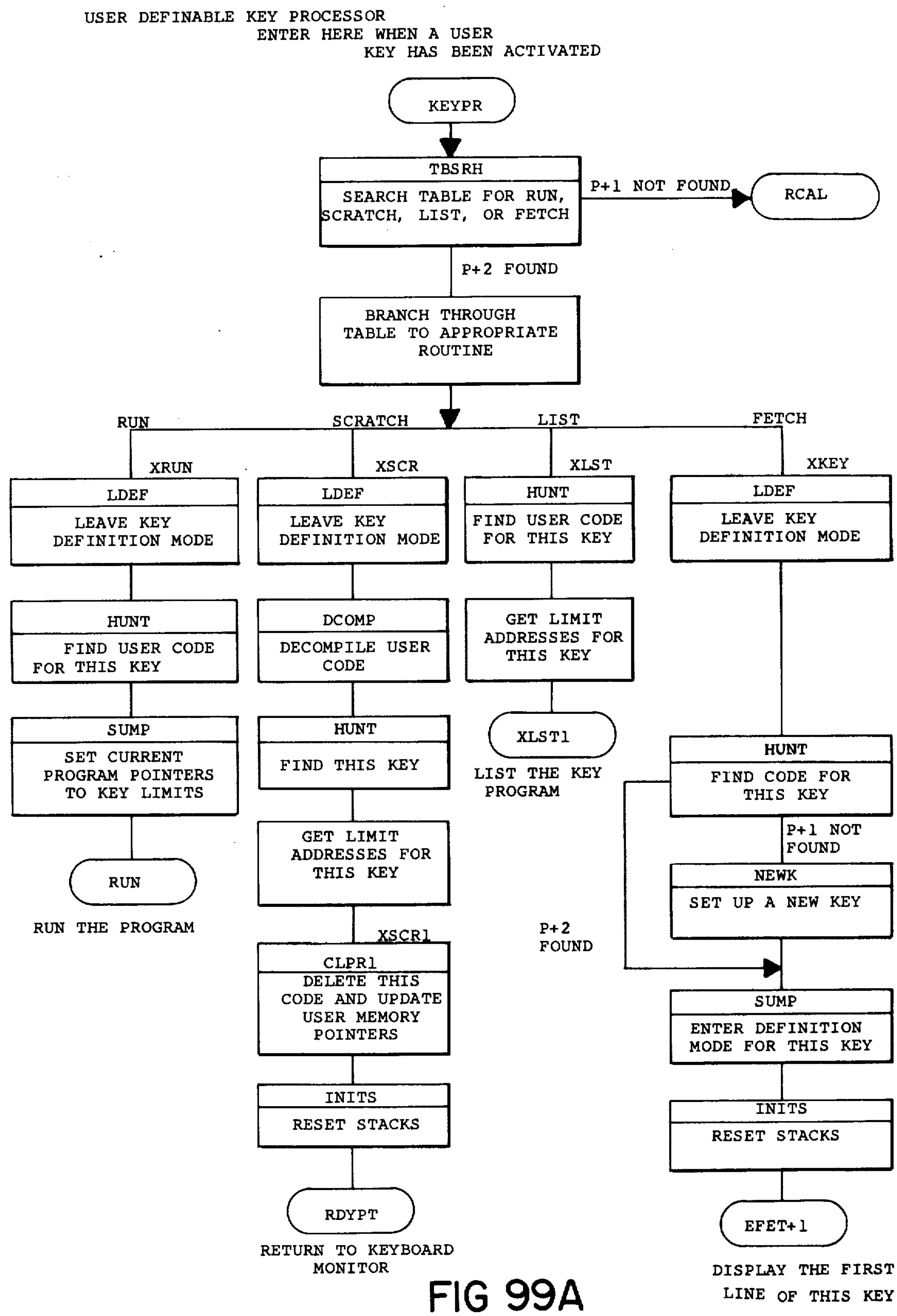
Figure 99B:
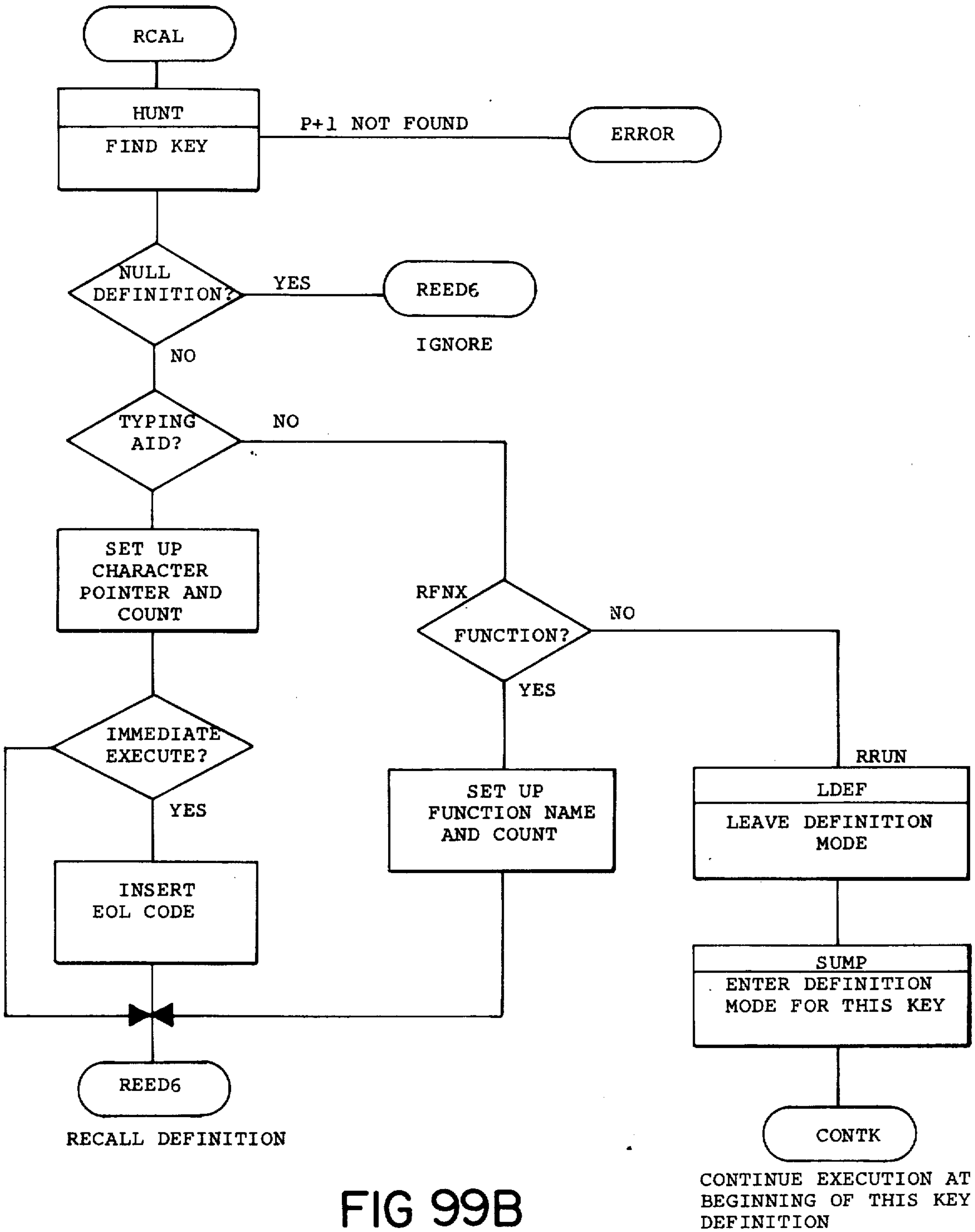
Figure 99C:
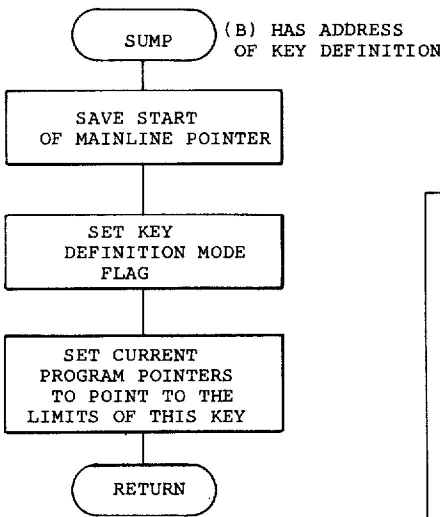
Figure 99D:
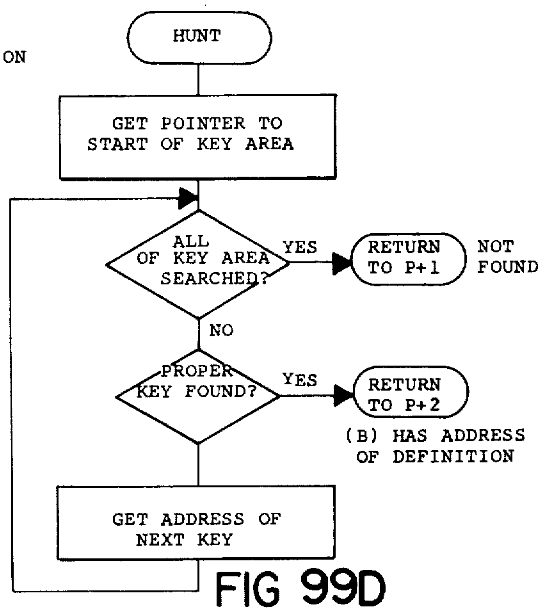
Figure 99E:
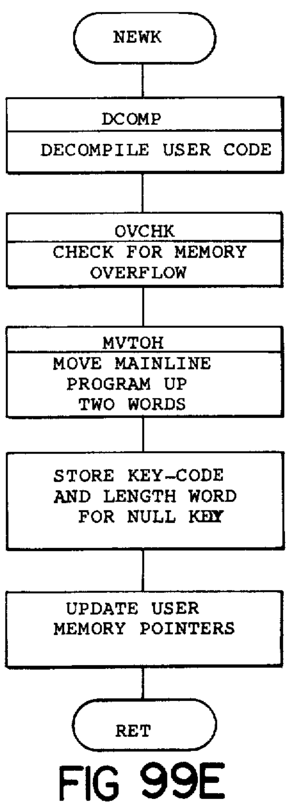
Figure 99F:
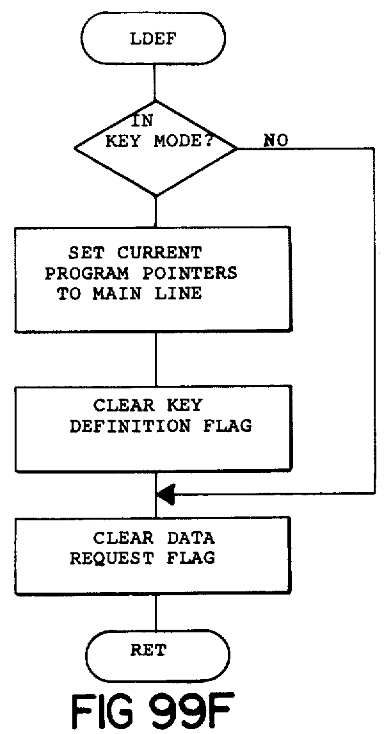

The syntax routines 210 translate the characters of the input record into an internal format which is more easily handled by the execution routines. If a syntax error is encountered control is passed to the error routine 238 which outputs an error message. The error routine is shown in the flowchart of FIG. 95 and the firmware listing at pages 58 and 59. If no error is found, control is passed to either the memory management routines 236, if the statement is to be stored in memory, or to the routine for initialization for keyboard execution if the statement is to be executed. The memory management routines are shown in the flowcharts of FIGS. 96A–D, 97, and 98 and pages 16 and 60–62 of the firmware listings. The routine 230 for initialization for keyboard execution serves to initialize the run time stacks shown in the memory map of FIG. 6. This routine is detailed in the flowchart of FIG. 100C and pages 109–110 of the firmware listing.

When the RUN command is given, or if the INIT key is actuated, control is passed to the pre-execution processing routines 232. These routines are detailed in pages 65–77 of the firmware listing. They serve to initialize the symbol table and non-common value table areas of the user read-write memory shown in FIG. 6.

Figure 100A:
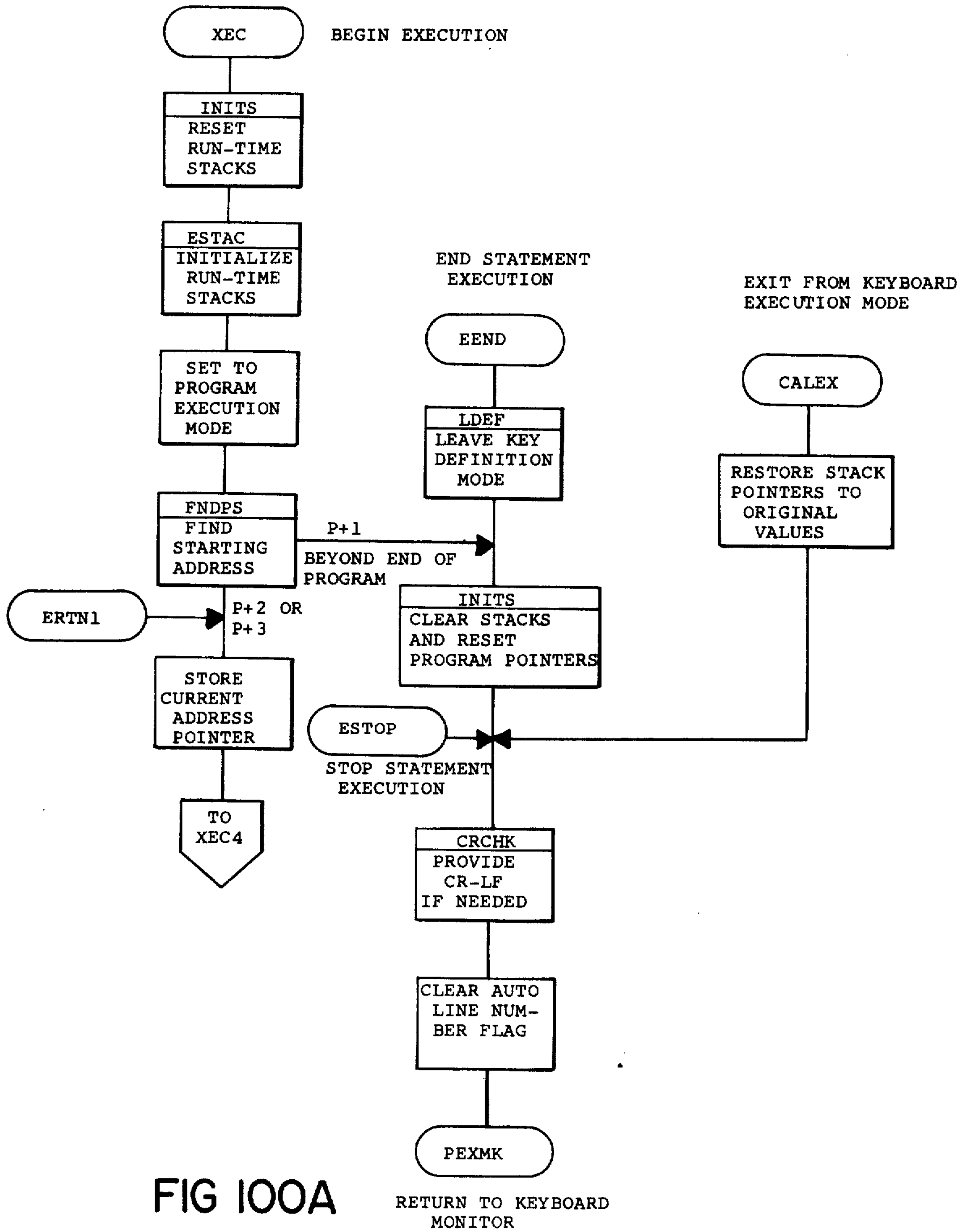
Figure 100B:
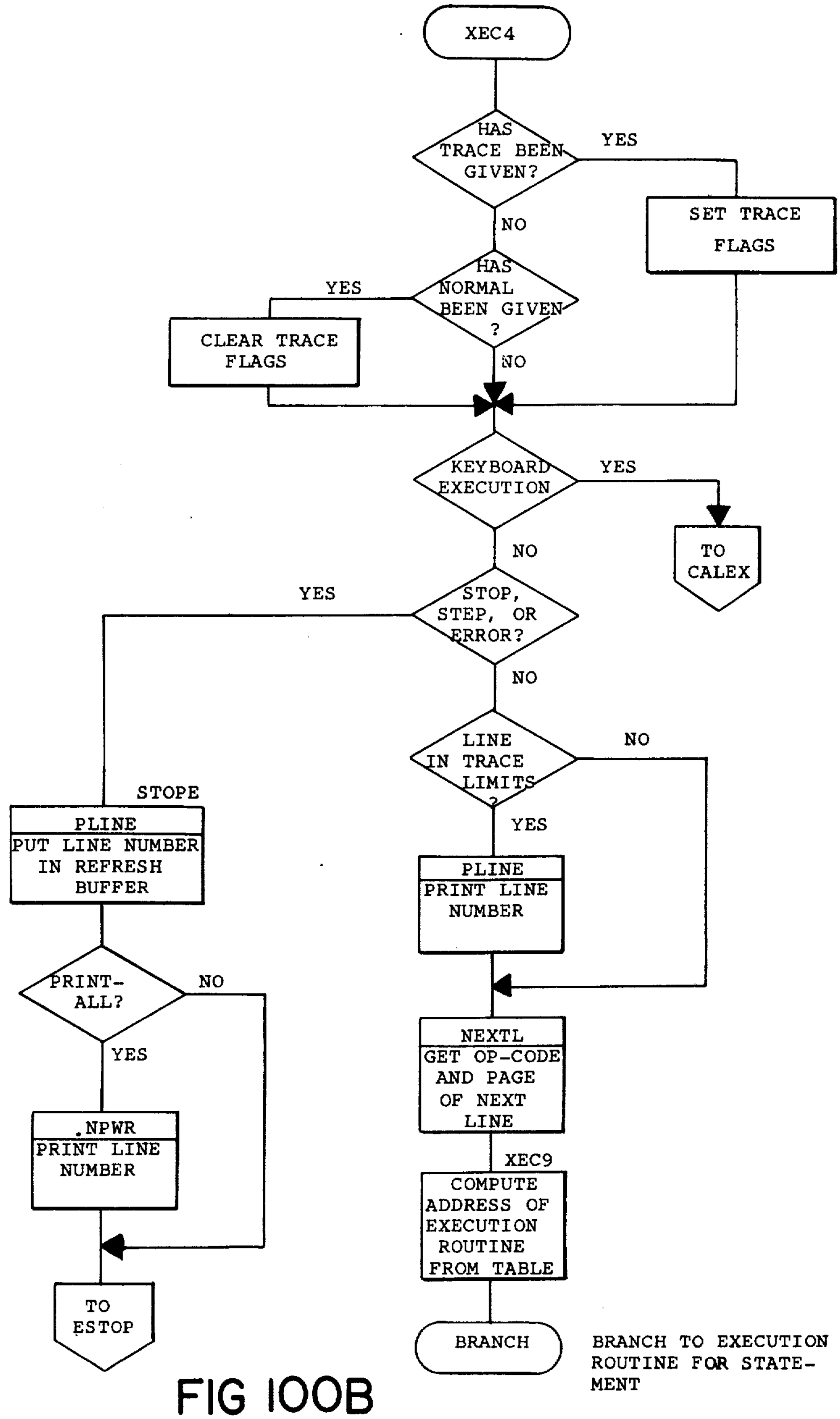
Figure 100C:
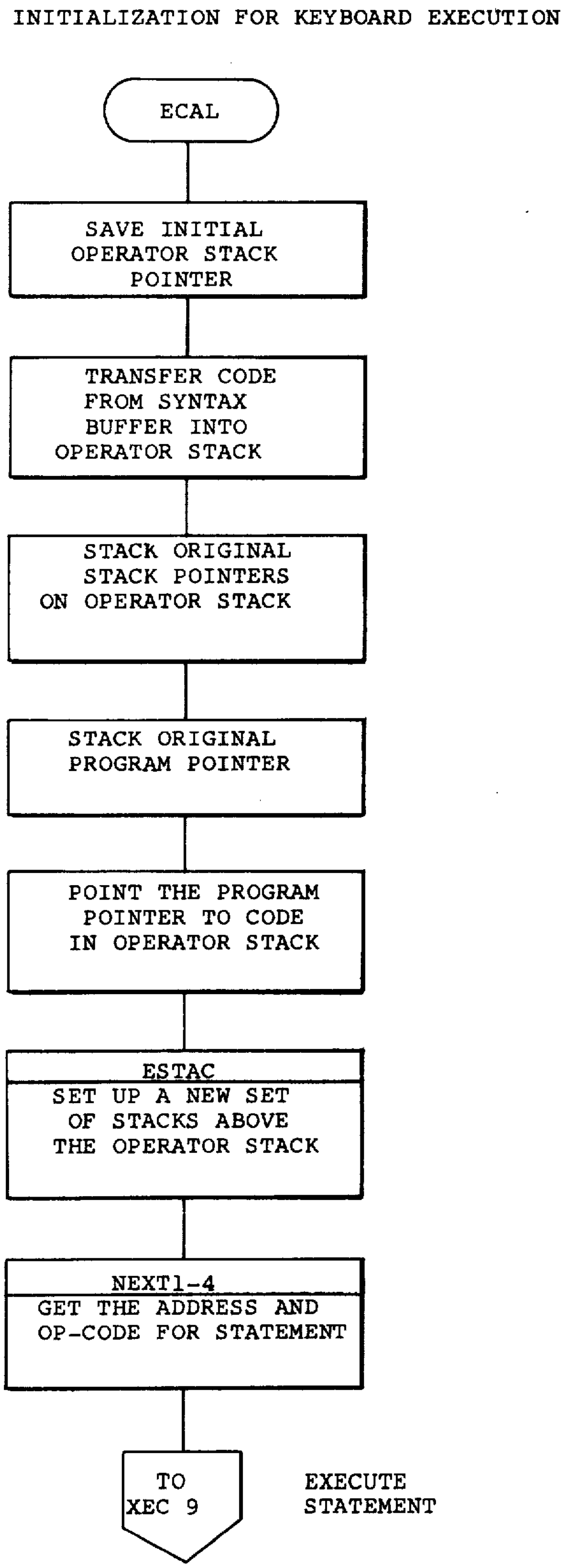
Figure 100D:
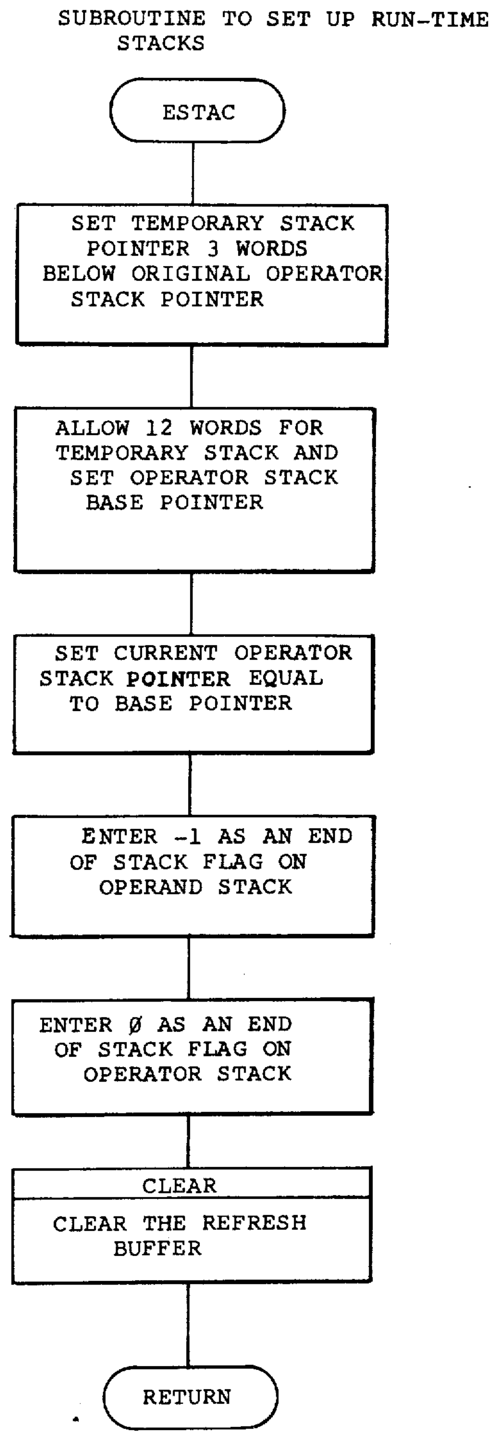

Control is next passed to the execution monitor 214, which is detailed in the flowchart of FIGS. 100A–B and pages 108–110 of the firmware listing. This routine initializes the run time stacks in the user read-write memory of FIG. 6 and initiates execution of a stored program beginning at the line number given by the user. After each statement is executed control is returned to the execution monitor, which prints the line number of the next line if the program is being executed in the trace mode. Step, stop, or error conditions are checked and program execution is terminated if any of these conditions exist. If program execution is to be continued, the jump address of the execution routine for the next statement of the program is computed, and control is passed to that routine.

Several of the statement execution routines 240 require evalution of arithmetic functions and expressions. This is done in the formula evaluation routines 242. Several of the statement execution routines 240 require input from or output to various external input-output devices 20 and 244. This is done by calling the standard output driver 224 or an optional special I/O driver 234. Several of the statement execution routines require input from or output to an internal or external tape cassette unit 14. This is done by calling the tape cassette drivers 226. The statement execution routines for the statements that communicate with the tape cassette units are detailed in the flowcharts of FIGS. 110–115 and pages 250–276 of the firmware listing.

Figure 94A:
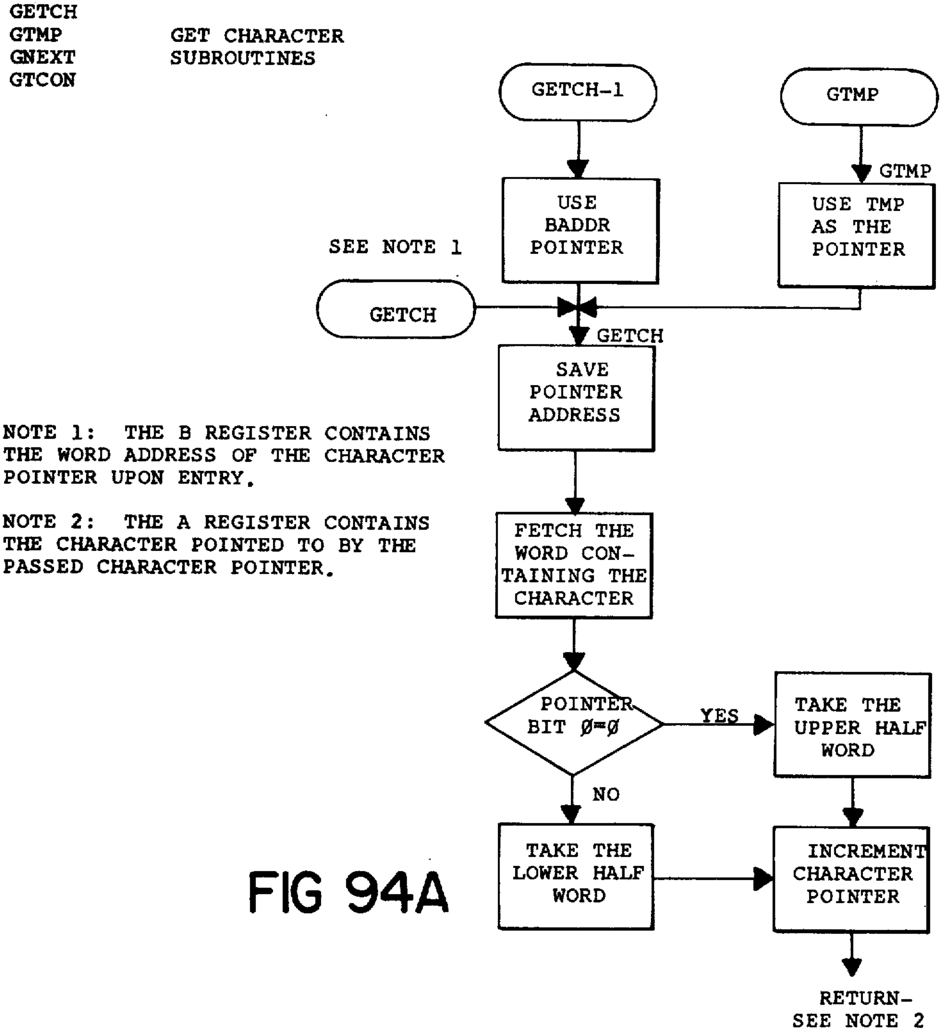
FIGS. 94A–F are flow charts of some of the general system subroutines of FIG. 4A.
Figure 94B:
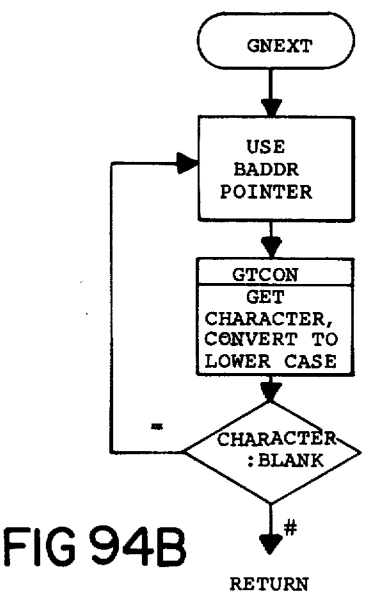
Figure 94C:
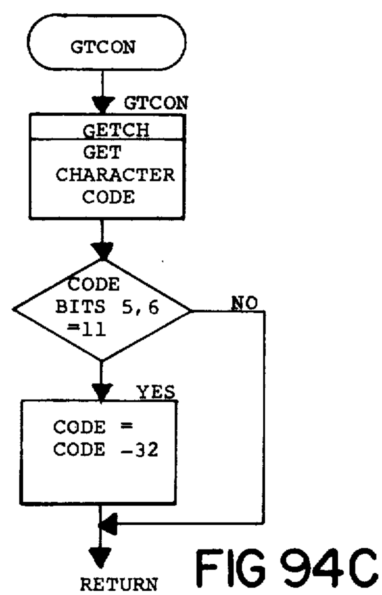
Figure 94D:
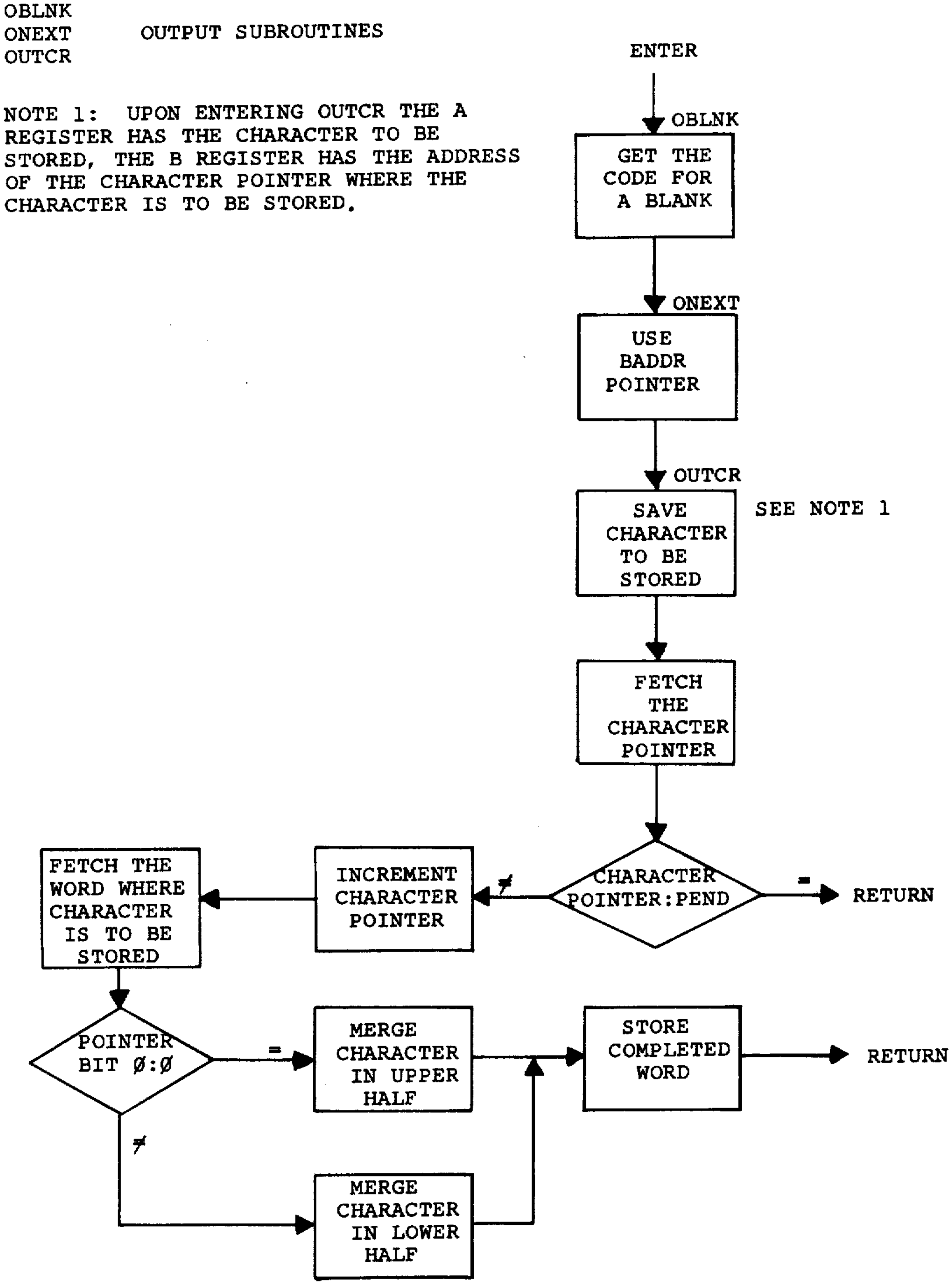
Figure 94E:
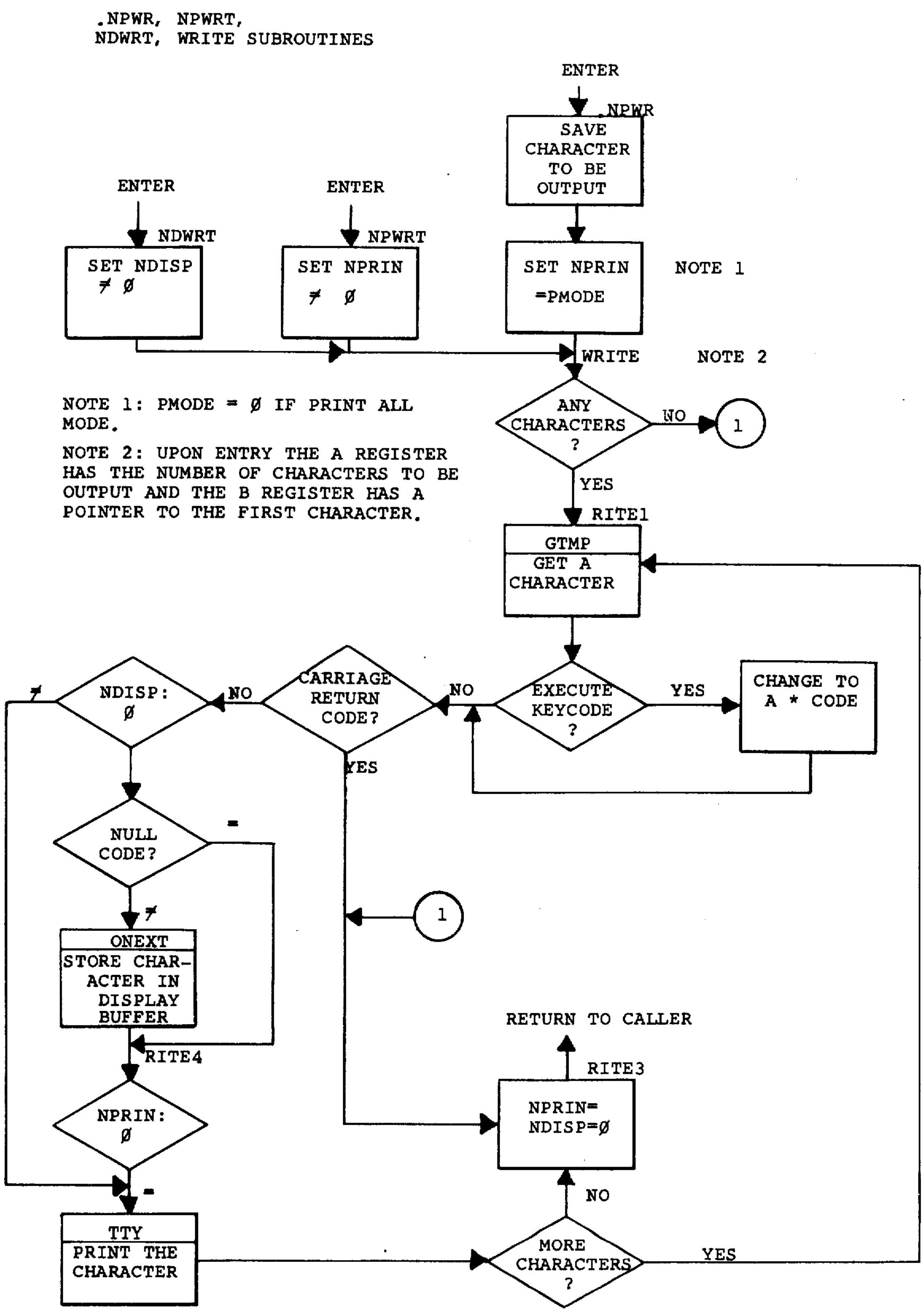
Figure 94F:
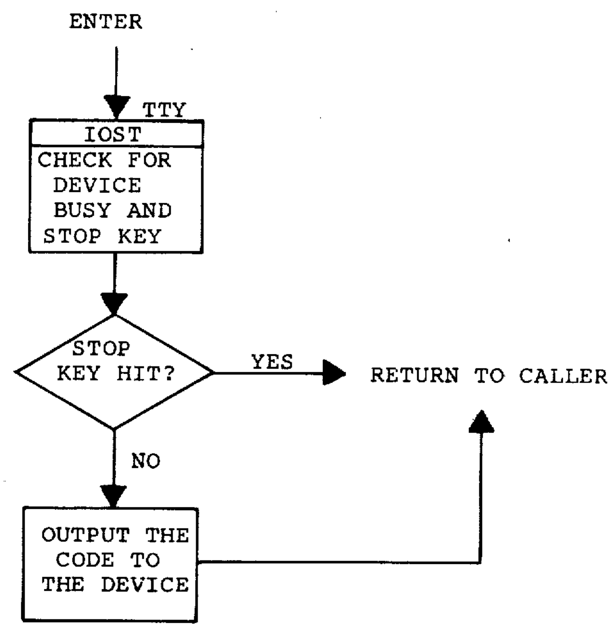

The list routine 220 is used when listing stored programs on either the single line display 18 or an external ASCII output device 20. The list routine is detailed on pages 78–82 of the firmware listing. Its function is to translate the stored program from the internal stored format into a string of ASCII characters which can be printed or displayed. To print a line of translated characters, the list routine calls on the standard output driver 242 which is detailed in FIG. 94E and pages 20 and 33 of the firmware listing.

Detailed assembly language information relating to all of the firmware routines and subroutines herein described may be obtained by referring to the memory map of FIGS. 4A–F and the basic system firmware listing located at a later point in this specification.

Communication with the routines in the various plug-in read-only memory modules is accomplished through a series of mnemonic tables and jump tables. The standard firmware, the cassette operating firmware, and each of the plug-in read-only memory modules all contain the following tables:

1. A statement mnemonic table
2. A statement syntax jump table
3. A statement execution jump table
4. A system command mnemonic table
5. A system command execution jump table
6. A function mnemonic table
7. A function execution jump table
8. A non-formula operator mnemonic table All of these tables, with the exception of the statement execution jump table, may appear anywhere within a memory module. The last five words in each module are used by the table scan routines of FIGS. 85–87 to find the actual location of the tables. The last word of each module contains a unique operation code word for that particular module. The second from the last word contains a relative address of the statement mnemonic table. The third from the last word contains a relative address of the system command mnemonic table. The fourth from the last word contains a relative address to the function mnemonic table. The fifth from the last word contains a relative address to the non-formula operator table. The jump tables for statement syntax, system command execution, and function execution are located directly above their respective mnemonic tables. The statement execution jump table is located directly above the fifth from the last word of each module. The complete set of tables for the standard firmware is shown in the firmware listings at pages 48–49, 103–104, 131, and 141.

Each of the mnemonic tables consists of a string of seven-bit ASCII character and six-bit operation code characters packed two characters per sixteen-bit word. The eighth bit of each character is used to indicate whether that character is ASCII or an operator code. A zero in the eighth bit indicates ASCII and a one indicates an operation code. The seventh bit of each operation code character is used to indicate whether that operation code is the last character in that table. The jump table address for each mnemonic is found by subtracting the operation code for that mnemonic from the startng address of the associated mnemonic table. The internal stored format for program statements consists of a series of operation codes, operand codes, and other special codes. The first word of each statement contains the line number of that statement in binary format. The second word contains both the operation code for that particular statement mnemonic and also the length of the statement. The length information is used by various firmware routines to scan from one statement to the next. The third word contains the operation code for the table or optional read-only memory module, and it also contains the first operand code. The remainder of the statement is stored with one operator code and one operand code in each word.

Formula operation codes from the table on page 132 of the firmware listing and mnemonic operation codes are stored in a five-bit field, bits 10–14. The operand codes are stored in two five-bit fields. Bits 5–9 are used to store the operand name. The name consists of an ASCII letter, A–Z, with its sixth and seventh bits removed. For example, the ASCII code for A is 1000001 and the five-bit operand code for A is 00001. Bits 0–4 are used to store the operand type. Bit 15 is used as a special flag bit. When bit 15 is set, the operand field is interpreted differently than when it is not set. The following table shows the various operand types and the special codes.

| OPERAND TYPE CODE | OPERAND TYPE (BIT 15=0) | MEANING IF BIT 15=1 |
|---|---|---|
| | Full Precision Variables | Constant follows in next word |
| 00000 | Simple variable | |
| 00001 | Array of 1 dimension | Fixed point decimal |
| 00010 | Array of 2 dimensions | Floating point decimal |
| 00011 | Array of unknown dimension | Binary integer |
| | Split Precision Variables | |
| 00100 | Simple variable | Binary line number |
| 00101 | Array of 1 dimension | |
| 00110 | Array of 2 dimensions | |
| | Integer Precision Variables | |
| 01000 | Simple variable | |
| 01001 | Array of 1 dimension | |
| 01010 | Array of 2 dimensions | |
| | Full Precision Variables Letter followed by digit | |
| 10000 | 0 | |
| 10001 | 1 | |
| 10010 | 2 | |
| 10011 | 3 | |
| 10100 | 4 | |
| 10101 | 5 | |
| 10110 | 6 | |
| 10111 | 7 | |
| 11000 | 8 | |
| 11001 | 9 | |
| 11110 | String Variable | |
| 11111 | User defined function | Bits 5-9 contain the operation code of a function in ROM |

As an example, the internal stored format for the following statements is shown in the table below:

```
10  DIM A[5]
20  LET B=C+FND(E)
30  GOTO  100
```

| 15 | 14–10 | 4–5 | 4–0 | |
|---|---|---|---|---|
| 0 | 00000 | 00000 | 01010 | 10 |
| 0 | 00010 | 00000 | 00111 | DIM op-code – Length 7 |
| 0 | 01010 | 00001 | 00001 | Table op-code – A \|dimension |
| 1 | 10100 | 00000 | 00011 | [ – integer follows |
| 0 | 00000 | 00000 | 00101 | 5 |

-continued

| | | | | |
|---|---|---|---|---|
| 0 | 00101 | 00000 | 00000 | J – null operand |
| 0 | 00000 | 00000 | 10100 | 20 |
| 0 | 10110 | 00000 | 00111 | LET op-code – Length 7 |
| 0 | 01010 | 00010 | 00000 | Table op-code – B |
| 0 | 00111 | 00011 | 00000 | = – C |
| 0 | 01001 | 00100 | 11111 | + – FND |
| 0 | 10101 | 00101 | 00000 | ( – E |
| 0 | 00100 | 00000 | 00000 | ) – null operand |
| 0 | 00000 | 00000 | 11110 | 30 |
| 0 | 00110 | 00000 | 00100 | GOTO op-code – Length 4 |
| 1 | 01010 | 00000 | 00100 | Table op-code – integer follows |
| 0 | 00000 | 00011 | 00100 | 100 |

KEYBOARD OPERATIONS

All operations performed by the calculator may be controlled or initiated by the keyboard input unit and/or by keycodes entered into the calculator from the keyboard input unit, the magnetic tape cassette reading and recording unit, or peripheral input units such as the marked card reader and stored as program steps in the program storage section of the RWM. An operational description of the keyboard input unit is therefore now given with specific reference to the perspective view of the calculator as in FIG. 1 and the plan view of the keyboard as in FIG. 8, except as otherwise indicated.

Line Switch

An on-off line switch 182, which may be considered as part of the keyboard input unit, controls the application of power to the calculator and hence initiation of the control signal $\overline{POP}$ from the power supply.

As shown in FIG. 2, the calculator may be operated at 240, 220, 120, or 100 volts +5%, −10% as determined by a pair of line voltage selector switches mounted at rear panel 34 of the calculator housing and at a line frequency within the range of 48 to 66 Hertz. The calculator is provided with a 6-amp fuse and either a 1-amp fuse for operation at a line voltage of 220 or 240 volts +5%, −10% or a 2-amp fuse for operation at a line voltage of 100 or 120 volts +5%, −10%. It is also provided with a three-conductor power cable 184 which, when plugged into an appropriate AC power outlet, grounds the calculator housing. The maximum power consumption of the calculator is 150 voltamps. No more than a total of 610 voltamps may be drawn from AC power outlets 42 provided for peripheral units.

EXECUTE

The EXECUTE (often referred to as EXEC) key, when pressed, will perform the indicated operations previously keyed in, if any, and display the result of any arithmetic statements on the 32-character display. (Although the display is only 32 characters, an 80-character line can be keyed in with automatic scrolling both for programs and for keyboard operations.) Most keys, when pressed, immediately cause their mnemonic to be displayed. However, pressing certain keys, such as PRT ALL (to be discussed later), allows a particular mode to be in effect till that mode is overridden.

FIXED N, FLOAT N

Immediately after either turn-on or *SCRATCH EXEC*, the user read/write memory area is cleared; numerical calculations that are executed will be displayed in float-nine notation. The values 2 and 12 in float-nine notation would appear as 2.000000000E+00 and 1.200000000E+01, respectively. Float 9 refers to the nine digits succeeding the decimal point; E symbolizes × 10 raised to the power of the two digits following the E.

NOTE

In this text, individual keyboard operations will be identified by being italicized; e.g., 3 + 2 *EXEC*. (On the display would appear 5.000000000E+00.)

You can specify the desired notation by pressing *FIXED N* or *FLOAT N* followed by the appropriate number from 0 through 11. The designated N indicates the number of digits to be displayed to the right of the decimal point after execution.

For example:

*FIXED N* 7 *EXEC*, then *1 2 3 4 5 6 . 7 EXEC*, displays 123456.7000000 or, *1 2 3 4 5 6 7 8 9 . 1 2 3 4 5 6 7 8 9 EXEC*, displays 123456789.1230000*

*FLOAT N* 5 *EXEC*, then 1 2 3 . 4 *EXEC* displays 1.23400E+02 or, . *1 2 3 4 5 6 7 EXEC* displays 1.23457E−01**

In fixed-*n* notation, a maximum of 12 digits will be displayed to the left of the decimal point; beyond that value the calculator reverts to float-*n* notation, with the number of digits displayed to the right of the decimal point determined by the particular fixed-*n*.

* The machine calculates to 12 significant digits regardless of the display length.

** Since only five digits can be displayed to the right of the decimal point the fifth digit is rounded.

The FIXED N and FLOAT N keys are not programmable; that is, they can be used only in keyboard operations. Output formatting under program control is accomplished by a format statement, which is discussed below.

The calculating range of the calculator is: $-9.99999999999 \times 10^{99}$ through $-10^{-99}$, 0, and $10^{-99}$ through $9.99999999999 \times 10^{99}$.

CLEAR, DELETE LINE

Pressing either *CLEAR* or *DELETE LINE* will erase whatever previously had been displayed during keyboard operations. Pressing either key will cause ⊢ (the Lazy T) to appear on the far left of the display, indicating that the calculator is available for new inputs. The difference between the two keys occurs when a stored program line is displayed; *DELETE LINE* will erase the line from the stored program, whereas *CLEAR* will only erase the display and not affect the program line itself. (A program line can also be deleted by keying in the line number followed by *END OF LINE*.)

RECALL

Pressing *RECALL* during keyboard operations allows the last line that was executed to be recalled to the display; pressing *RECALL* during program-inputting operations allows the last program line that was input to be recalled to the display. If an error message appears on the display when an attempt is made either to execute a line in keyboard mode or to input a program line into memory, pressing *RECALL* will allow the original line to be reviewed for editing purposes.

RESULT

Pressing *CLEAR RESULT EXEC* displays the numerical value of the last arithmetic statement that was executed. The RESULT key not only allows the result of the previously executed statement to be reviewed, but also can function as an accumulator during arithmetic operations; e.g., by pressing

*2 + 4 EXEC* (in FIXED 2 notation) displays 6.00, then pressing

3 + *RESULT EXEC* displays 9.00, then pressing

4 + *RESULT* + *RESULT EXEC* displays 22.00.

Keying in either *R E S* or *R E S U L T* has the same effect as pressing the *RESULT* key.

PRINT ALL

By pressing *PRINT ALL*, you can determine whether or not the calculator is in print all mode. If ON appears, both the expression and the result of any executed calculation will be typed on whichever printing device is plugged into the calculator; if OFF appears, the information will appear only on the display. Pressing the PRINT ALL key a second time causes the alternative mode to be in effect. In the print all mode, each program statement is printed when *END OF LINE* is pressed. All error messages are also printed.

BACK, FORWARD, INSERT

The *BACK* and *FORWARD* keys can be used to edit expressions on the display. Successive presses of the *BACK* key will move a blinking cursor to the desired location within the display. Editing can then be performed at this location. The *FORWARD* key performs the same function as the back key, but in the opposite direction.

At the location of the blinking cursor, the following editing can be performed:

1. A character can be inserted by pressing *INSERT*. (This opens up a space to the left of the cursor, thereupon moving the cursor to the location of the space; additional presses of the INSERT key will open up more spaces, with the cursor always positioning itself in the left-most space, thus allowing for the immediate insertion of more than one character.)
2. A character can be changed by overscoring it with another character.
3. A character can be deleted by pressing either the space bar or *SHIFT INSERT*, the only difference being that pressing *SHIFT INSERT* will close up the space of the deleted character.

Holding either BACK or FORWARD down for approximately 1.5 seconds will cause the cursor to move in rapid succession in the chosen direction.

Once a line is appropriately edited, it can be immediately executed without having to move the cursor to the end of the line.

→ , ←

When a line that is greater than 32 characters (80 characters maximum) is being input, the characters to the left of the display are pushed out of the display region to make room for the additional characters. To view the beginning of the input, press → (the right arrow); this operation moves the characters in the display to the right. Pressing ← (the left arrow) performs the reverse operation. Either arrow key, when held down for approximately 1.5 seconds, will repeat its operation in rapid succession.

ARITHMETIC

There are five basic numerical operators: add (+), subtract (−), multiply (×), divide (/), and exponentiate (↑). The order of execution, known as the hierarchy, is identical to the BASIC hierarchy described below. The BASIC functions described below are available on the Calculator simply by keying in the appropriate mnemonics. In addition, the value of $\pi$ can be obtained by keying in *P I*.

When operating on trigonometric functions, the calculator assumes the angle to be in radians unless otherwise stated. To express an angle in either degrees or grads, first clear the display, then press either *D E G EXEC* or *G R A D EXEC*, respectively; then key in the expression. To revert to radians, clear the display, then press *R A D EXEC*. Radians, degrees, and grads are also programmable commands.

VARIABLES

The simple scalar variables are A through Z and A0 through Z9 (286 total). Simple variables can be used in keyboard operations; e.g., pressing *A* 3 = 7 *EXEC* assigns the value of 7 to A3. Unless the value of A3 is then changed or erased from memory, pressing 4 * *A* 3 *EXEC* will display 28. If a variable is undefined, any attempt to use this variable in an expression (other than by assigning a value to it) will result in an error message.

An array is an ordered collection of numerical data. An array (subscripted) variable can have either one or two dimensions as indicated by the subscripts, which are presented as numbers within parentheses. A (m) is a one-dimensional array (or column vector) where m designates the row of the element; A(m,n) is a two-dimensional array where m designates the row and n designates the column of the element.

The maximum size of an array is limited by the available calculator memory. At normal 12-point precision, the effective memory limitation would be approximately a (30, 30) array.

Arrays should be referenced in either a common statement or a dimension statement before use in a program; if not, the program defaults to either a 10 element array for a singly subscripted array, or a 10 by 10 array for doubly subscripted arrays.

TAPE CASSETTES

The present Calculator is capable of operating with 10 tape cassettes: One cassette is available through the built-in (internal) cassette drive. Four peripheral cassette drives can be connected directly to the calculator through the four I/O slots in the rear panel. Five more peripheral cassette drives can be added if the user has an I/O expander box (in all, 11 peripheral devices can be added by having an expander box).

SYNTAX

The tape cassette commands have general syntactical rules which will be briefly described. The general command form, with minor variations, is:

COMMAND [UNIT] [FILE], or
COMMAND [UNIT] (FILE) [$LNX_1$ [$LNX_2$]]

Brackets [ ] indicate that the enclosed information is optional; parentheses ( ) indicate that the enclosed information is required with the particular command.

COMMAND — The various commands will be individually discussed.

UNIT — Individual units are referenced by the number sign, #, followed by the select code; the internal cassette is designated by #10 (if no select code is given, the internal cassette is assumed); the nine peripheral cassettes are identified by #1 through #9.

FILE — Files within individual cassettes are identified by file numbers; if no file is identified by number, the scratch-pad (or default) file, file 0, is assumed.

$LNX_1$ — indicates the beginning line number to be affected by the command.

$LNX_2$ — indicates either the line number where program execution is to begin following the command implementation, or the ending line number to be accessed in the command. In any command whose syntax allows $LNX_1$ and $LNX_2$, in order for $LNX_2$ to be designated, $LNX_1$ must have been specified.

All information to be input following the command must be separated by commas.

In keyboard mode, press *EXEC* after fulfilling the syntax requirements of a particular command to implement the command.

PREPARING A FRESH CASSETTE

To prepare a fresh cassette (one which has no markings), first open the cassette door by pressing downward on the switch on the far right of the keyboard; then insert the cassette (print-side up) into the slot built into the door; be certain that the tape is wound around the left spindle — if it is not, but you wish to prepare that side of the cassette anyway, simply close the door and press *REWIND*.

To store information onto the cassette, first mark the files that are to be used.

PROGRAMMABLE COMMANDS

The following tape cassette commands are programmable: mark, store, load, merge, store key, load key, store date, load data, load binary, rewind, find, and tlist. These commands can also be used in the keyboard mode. The secure command, on the other hand, can be used only in the keyboard mode.

MARK

The mark command produces the designated number of files and defines the file lengths (by the number of 16-bit words per file).

Syntax: MARK [UNIT] (No. of FILES) (LENGTH)

e.g., *MARK* #*10* , *5* , *1000 EXEC* — since unit #10 identifies the internal cassette, including it is superfluous; the 5 indicates the number of files to be made available; the 1000 signifies the number of 16-bit words per file.

Successive files on the tape can be marked with different word lengths as shown in the following example; *MARK* 3, 1000 *EXEC* then, *MARK* 2, 2000 *EXEC* will mark files 0, 1, 2 of the internal cassette with 1000-word lengths and will mark files 3, 4 of the same cassette with 2000-word lengths.

The length of a file can be changed; however, changing it will affect all the files following it by distorting their contents. To change the length of a particular file, first position the cassette at that file by using FIND (FIND will be discussed more thoroughly, later); then mark the file with the desired length. For Example: to mark file 12 of the internal cassette with 1000 words, press *FIND* 12 *EXEC* then press,

*MARK* 1, 1000 *EXEC* To mark files not previously marked (virgin files), first perform a TLIST; TLIST will be discussed thoroughly later; but for now, merely knowing that *TLIST* [*UNIT*] *EXEC* will list all the marked files, is sufficient. To mark virgin files, it is first necessary to mark the last file listed in TLIST*. As previously discussed, this file is located by the find command. Beginning with this file, successive virgin files can be marked by the methods previously discussed.

* The number of files referenced in TLIST is always one more than the number marked by the user.

To mark the beginning of a tape, be certain that the tape is completely rewound.

STORE

The store command will take the program line numbers in read/write memory, and put them in the designated tape location where they will be saved.

Syntax: STORE [UNIT] [FILE] or STORE [UNIT] (FILE) [$LNX_1$ [$LNX_2$]]

e.g., *STORE* #2 , 3 *EXEC*. select code #2 designates which cassette is being accessed; the program will then be stored on that cassette in file number 3.

In the store command, $LNX_1$ and $LNX_2$ are used to store a portion of the program: $LNX_1$ specifies the beginning line number to be stored; $LNX_2$ specifies the ending line number to be stored. If $LNX_2$ is not specified, the last line to be stored is assumed to be the highest-numbered program line.

For $LNX_2$ to be given, it is always necessary to have $LNX_1$; this is true for any cassette command. In addition, whenever $LNX_1$ is to be given, the file to be accessed must be identified; e.g.,

*STORE* 3, 60, 150 EXEC: file 3 of the internal cassette is located; program lines 60 through 150 in memory will then be stored into file 3.

Note

Once a cassette has been marked, any file that has been marked can be accessed by giving its designated file number in a command; e.g., if five files are marked, information can be stored in file 4 even though file 3 is a virgin (empty) file, by pressing *STORE* 4 *EXEC*.

LOAD, LINK

The load common will take a program that is stored on a cassette and put it into the memory area.

Syntax: LOAD [UNIT] [FILE] or,

LOAD [UNIT] (FILE) [$LNX_1$ [$LNX_2$]]

e.g.,

*LOAD EXEC* assumes the internal cassette, default file (file 0) is to be loaded into the calculator; any program previously in the 9830A memory will be erased.

*LOAD* 5 , 40 , 10 *EXEC* locates file 5 on the internal cassette; the entire program on this file is renumbered beginning at line number 40, and then the program is loaded into memory; program execution is initiated at line number 10. All program line numbers beginning at line 40, that were previously in memory, will be erased and replaced by the program being loaded; if the memory previously had line numbers 10, 20, 30, it will retain them.

In both the load and the merge command, the use of $LNX_1$ and $LNX_2$ can have various results. Rules for predicting the results are given at the conclusion of the merge command discussion.

By substituting LINK for LOAD in the previous syntax, the user can implement the link command. This command operates identically to the load command with one exception:

During program execution, if a load statement is encountered, the calculator functions as though *RUN EXEC* were pressed — that is, the old symbol table is destroyed and a new symbol table is built; on the other hand, if a link command is encountered, the calculator functions as though *CONT EXEC* were pressed — that is, all variables retain their previous values.

MERGE

The merge command attempts to take program line numbers from the cassette and position them in read/write memory in front of the program currently there, between consecutive line numbers in the program currently there, or behind the program currently there. However, if any line number of the program to be entered matches a line number currently in the program, an error will result. In addition, if the line numbers of the two programs are interwoven, an error will occur; e.g., if the program currently in memory has line numbers 10, 20, 30, 40 and if the program to be merged has line numbers 15, 25, 35, the merge command will cause an error message to occur even though no two line numbers matched.

Syntax: MERGE [UNIT] [FILE] or,
MERGE [UNIT] (FILE) [$LNX_1$ [$LNX_2$]]

e.g.,

*MERGE* # 2, 1, 200, 100 *EXEC* — file 1 of the cassette with select code # 2 is located; the entire program on this file is renumbered beginning at line number 200 ($LNX_1$) and then it is combined with the program currently in memory. Following implementation of the command, program execution will begin at line number 100 ($LNX_2$).

Either the merge or the load command can be used for stacking programs in read/write memory. The major difference between the two commands is as follows: LOAD will erase the line numbers previously in memory, beginning at the designated $LNX_1$; MERGE, on the other hand, will retain all line numbers previously in 9830A memory.

In both the load and the merge command, $LNX_1$ and $LNX_2$ are predictable. Regardless of the mode, $LNX_1$ renumbers the program line numbers of the accessed file to begin at $LNX_1$; the spacing between consecutive line numbers remains the same; all GO TO statements, etc. are properly adjusted to reflect the new line numbers; this program is then loaded into user memory.

In program mode:

1. If $LNX_2$ is given, program execution will continue at $LNX_2$.
2. If $LNX_2$ is not given, program execution will continue either at the next higher line number of the original program or at $LNX_1$, whichever comes first.

In keyboard mode:

1. If $LNX_2$ is given, program execution will begin at $LNX_2$.
2. If $LNX_2$ is not given, the calculator will halt after loading in the program.

STORE KEY, LOAD KEY

The store key command will take all user definable keys (upper left-hand region of the keyboard) that have been defined and put them on a cassette file, which will be tagged as a key file.

The load key command takes the user definable information from the cassette and positions it in memory such that each user definable key performs the same operation that it previously did before being stored on tape.

Syntax: STORE KEY [UNIT] (FILE)
LOAD KEY [UNIT] (FILE)

Spacing may arbitrarily be left between the words STORE and KEY and the words LOAD and KEY. In general, the HP Basic language ignores blank spaces (except, of course, in a quote field where every character and space is duplicated).

STORE DATA, LOAD DATA

The store data command takes a block of data from memory and puts it on a cassette. Normally, only arrays can be stored using this command; however, if no array is specified in the command, all data in the common statement of the program can be stored. The calculator allows simple variables in the common statement, as well as arrays; in fact, the common statement can accept simple variables, array variables, integer arrays and variables, and split arrays and variables.

The common statement acts like a dimension statement with the additional feature that data in common is saved from program to program.

The load data command takes the data that was previously stored on a cassette file, and loads it into mainline memory, If an array has been stored, then LOADDATA must specify an array; if LOADDATA does not specify an array, an error will result. If, on the other hand, the common area will be retrieved by the load data command (in this case, no particular array can be specified in the command, lest and error occur).

Syntax: STOREDATA [UNIT] (FILE) [ARRAY]
LOAD DATA [UNIT] (FILE) [ARRAY]

e.g.,

*STORE DATA* 6, *B EXEC* will locate file 6 on the internal cassette; then the B array in the current program will be stored in this file. (A simple variable cannot be stored in this manner.)

*LOADDATA* 6, *B EXEC* can then retrieve the B array and load it into memory whenever it is needed; the following command could be given, also:

*LOADDATA* 6, *C EXEC:* this would retrieve the B array and load it into memory in place of the C array, provided B and C are the same size and type.

Assume the common statement in a program looks like this: 1 COM A(8), B(5,5), D3, E.

Pressing: *STORE DATA* 2 *EXEC* will store all the common statement variables into file 2 of the internal cassette. Both the array variables and the simple variables will be retrieved by pressing: *LOAD DATA* 2 *EXEC*.

Pressing: *LOAD DATA* 2, *A EXEC* is illegal and causes an error since no particular array can be retrieved from a file if it was stored in common.

In all store and load data commands, the file to be accessed must be identified, even if it is the default file (file 0).

LOAD BIN

The load binary command will transfer binary information — assembly language program — from the cassette to the user memory. The assembly language program may be a system diagnostic, an I/O subroutine, or a simulated option block designed to perform some specific function.

The assembly language program cannot be listed or displayed.

Syntax: LOAD BIN [UNIT] (FILE)

Note

Files on cassettes are tagged as: program files, key files, data files, or binary files. If an attempt is made to load from a particular file and the load command incorrectly identifies the file tag, an error will occur; e.g., pressing *LOAD KEY* 1 *EXEC* when file 1 is a program file, causes an error message to appear.

REWIND

Pressing the *REWIND* key, located on the right-hand side of the keyboard, immediately rewinds the internal tape cassette to the clear leader.

To rewind any other cassette, *R E W I N D* must be typed in, followed by the select code of the particular cassette. (The internal cassette can also be rewound by typing in *R E W I N D EXEC.*)

*R E W I N D* must be typed if the command is to be used in the programming mode.

Syntax: REWIND [UNIT]

e.g.,

*R E W I N D* #2 *EXEC* will rewind the cassette with select code # 2.

FIND

The find command (previously mentioned in conjunction with the mark command) is used to locate a particular file. While the cassestte is searching for the file number, a laxy T appears on the display. During this interval, the cassette is searching under interrupt control, thus returning control of the calculator keyboard to the user. This feature allows for the execution of one portion of a large program, while another portion is being found — thereby improving access time.

When the specified file is found, the cassette tape halts.

Syntax: FIND [UNIT] (FILE)

e.g.,

*FIND* #3, 2 *EXEC* causes the cassette with select code #3 to search until file number 2 is located.

TLIST

Beginning with the current tape location, this command reads all subsequent file identifiers and prints out information concerning each file.

Syntax: TLIST [UNIT]

The information for each file, on the designated cassette, is printed out on one line. There are no column headers identifying the information in each line; the assumed headers are:

| File No. | File Type* (Code No.) | Absolute File Size (in words) | Actual File Size (in words) | Program Line Nos. (Beginning) ($LNX_1$) | (Ending) ($LNX_2$) | Common Area (in words) |
|---|---|---|---|---|---|---|

*The code numbers identifying the file types are as follows:
1 binary
2 data
3 program (source)
4 key In addition, if the file is secured, the number 2 appears in front of the code number (this applies only to binary, source, and key files); e.g., if 24 appears in the second column, the file is a secured key file.

If a file is a data file, $LNX_1$, is superfluous; in this case the data is described in this column as:

0 full precision
1 split precision
2 integer precision
3 common

If the file is not a program file, the last two columns will contain no information.

NON-PROGRAMMABLE COMMANDS

SECURE

This command has the capability of concealing program lines from potential users; that is, your program could be given to another, and that person could load and run it - however, he would not be able to fetch particular program lines for viewing purposes nor could he store the program on any other cassette file.

An attempt to fetch a secured program line will result in the line number appearing on the display, followed by an *; attempts to list the program will result in the secured line numbers appearing followed by an *.

If any lines in a program are secured, the entire program is considered to be secured; that is, even though certain program statements are visible, hone of the program can be reproduced onto another cassette file.

Syntax: SEC [$LNX_1$ [$LNX_2$]] or SECURE [$LNX_1$ [$LNX_2$]]

It is therefore, possible to secure specific lines within a program; e.g., pressing: *SEC* 30, 80 *EXEC*, followed by *STORE* 2 *EXEC* secures lines 30 through 80 of the program in memory and then stores both the secured and unsecured portions of the program into file 2 of the internal cassette.

When a program is initially secured, it can still be reproduced onto as many files as necessary; however, once the program is scratched from memory, (even though it can be loaded back into memory) it cannot be reporduced onto any cassette files.

When program lines are secured, the entire calculator is in the secured mode. Therefore, after the secured program is stored away, the user should press *SCRATCH A* before inputting other programs — thus, avoiding secured-program errors.

User definable keys (when not being used as typing aids) can be secured, too. Just press *FETCH (particular key) SEC EXEC* and the designated key will be secured.

Note

To protect all the information on a particular cassette, break one of the tabs on the top of the cassette; this makes the cassette inaccessible for further storage.

PROGRAMMING

The programming language of the Calculator is, with minor variations, BASIC as described below.

Instructions to the computer within a program are provided by program statements. Each statement in Basic has an associated line number which must appear in the left-most portion of the statement.* Statement line numbers appear in ascending order with 9999 being the largest possible line number.

*The length of a statement, including the line number and including appropriate spacing, can be up to 80 characters.

A program statement, which has been correctly keyed in, can be stored in read/write memory by pressing the *END OF LINE* (EOL) key. This key is situated in an area corresponding to the carriage return/line feed key on a teletype keyboard.

AUTO #

As previously mentioned, statement line numbers can be automatically input. In its simplest form, pressing *AUTO # EXEC* causes line number 10 to immediately appear on the display awaiting the program statement. The line numbers of additional statements will be in ascending order with a spacing of ten between consecutive line numbers. The AUTO # (AUTO) syntax and the examples to follow present some of the alternatives in automatic line numbering.

Syntax: AUTO # [$LNX_1$ [Spacing]]

$LNX_1$ is the beginning line number to be automatically input; the desired spacing between lines can then be input if $LNX_1$ is given. If no spacing is indicated, a spacing of 10 is assumed. E.g.,

| AUTO #30 EXEC | AUTO #40 , 2 EXEC | AUTO # EXEC |
|---|---|---|
| 30 | 40 | 10 |
| 40 | 42 | 20 |
| 50 | 44 | 30 |
| ⋮ | ⋮ | ⋮ |

When AUTO # is pressed, AUTO appears in the display.

Note

Although the CLEAR and DELETE LINE keys have previously been discussed, the following point should be made. If a program line currently being keyed in is found to be totally unacceptable (not worth salvaging by using the editing keys), it can be erased by using either the CLEAR or the DELETE LINE keys. However, if the pogram line numbers have been automatically input, pressing *CLEAR* not only erases the entire display but also eliminates the AUTO # mode, whereas pressing *DELETE LINE* erases only the program statement without affecting the line number itself.

PROGRAM VIEWING

There are two methods of viewing a program that is currently in memory:

1. List it on a printing device.
2. Bring it line-by-line to the display.

LIST

The list command has two specific applications: it can be used to provide a total listing of the programs in read/write memory, or it can be used to indicate the read/write memory available for inputting; e.g.,

*LIST EXEC* lists all program lines that are in memory on the user's standard printing device.

*LIST #3 EXEC* lists all program lines that are in memory on the peripheral with select code #3.

*LIST* 9999 *EXEC* causes the number of 16-bits words available in memory to be displayed.

↓, ↑

If a specific program line is in the display, pressing ↓ (down arrow) displays the next higher-numbered program line *; pressing ↑ (up arrow), on the other hand, displays the next lower-numbered program line. When no program line is currently in the display, pressing ↓ would display the successively higher line from the one most recently displayed, whereas ↑ would display the successively lower line.

*It should be noted that if a program line has more than 32 characters, the first 32 characters will be displayed; by pressing ←, the rest of the line can be viewed as the display is scrolled to the left. At the end of the line ⊦ appears.

FETCH

In addition to viewing a program line-by-line, specific program lines can be immediately brought to the display by using the fetch command.

Syntax: FETCH [$LNX_1$]

Where $LNX_1$ is the specific line number to be accessed; e.g.,

*FETCH EXEC* always displays the lowest-numbered program line.

*FETCH* 300 *EXEC* displays line 300 if it exists; if line 300 is not available (and there are other higher-numbered lines), the line immediately higher than 300 will be displayed; if there are no line numbers as high as 300, the highest-numbered line available in memory will be displayed.

PROGRAM EDITING

Any displayed program line can be edited by using the BACK, FORWARD, and INSERT keys.

The RECALL key, previously discussed, need only be briefly mentioned. A program line is keyed in; if an error message appears on the display when *EOL* is pressed, the program line can be reviewed by pressing *RECALL*. Appropriate editing can then be performed on the program line. The previously input line can always be recalled by pressing RECALL whether or not an error appears.

*CLEAR* and *DELETE LINE* have already been thoroughly discussed. However, to reiterate, there are two methods of deleting a program line currently in memory:

1. If the line is currently in the display, pressing *DELETE LINE* will erase it from memory (*CLEAR* only clears the display).
2. Any line in memory can be immediately deleted by keying in the appropriate line number followed by *EOL*.

DELETE

The delete command (to be distinguished from DELETE LINE) can selectively delete program lines.

Syntax: DELETE [$LNX_1$ [$LNX_2$]] or DEL [$LNX_1$ [$LNX_2$]]

Where $LNX_1$ is the first line to be delected and $LNX_2$ is the last line to be deleted:

e.g.,

*DELETE EXEC* deletes all program lines;

*DELETE* 40 *EXEC* deletes all statements beginning at line number 40;

*DELETE* 50, 80 *EXEC* deletes all lines numbered 50 through 80.

SCRATCH

The scratch command can erase a variety of things from memory:

e.g.,

*SCRATCH EXEC* erases all program lines and variables;

*SCRATCH A EXEC* erases everthing from memory — program lines, user definable keys, variables (identical to turning the calculator off, then on again);

*SCRATCH K EXEC* erases all user definable keys (user definable keys will be discussed later);

*SCRATCH V EXEC* erases all variables;

*SCRATCH* (*particular UD key*) erases the particular user definable key that was pressed — pressing *EXEC* is not required in this case.

Scratch can be accessed either by keying in the seven letters or by pressing *SCRATCH.*

RENUMBER

The renumber command will take all the program line numbers and renumber them.

Syntax: RENUMBER [$LNX_1$ [SPACING]] or REN [$LNX_1$ [SPACING]]

Where $LNX_1$ will be the new line number of the first program statement, and SPACING will be the spacing between consecutive line numbers:

e.g.,

REN EXEC will renumber all statements by numbering the first statement 10 with a spacing of 10 between statements;

*RENUMBER* 30 *EXEC* renumbers the first statement 30 with a spacing of 10 between statements;

*REN* 45, 20 *EXEC* renumbers the first statement 45 with a spacing of 20 between statements.

All statements in the program that reference another line number are appropriately corrected with the renumber command; e.g., GO TO 80 would be corrected to reference the line that replaced 80.

PROGRAM DEBUGGING

NORMAL, TRACE

The TRACE key can be used to determine the order of statement execution for a program that is currently running. Pressing *TRACE* during program execution causes the line numbers to be printed in the order in which they are accessed; then pressing *NORMAL* reverts the calculator to the normal mode. Thus, when a program is running, both *TRACE* and *NORMAL* are immediate execute keys.

When no program is running, to revert to either trace or normal mode requires pressing the appropriate key followed by *EXEC.* Trace mode can be set up to trace specific line numbers.

Syntax: TRACE [$LNX_1$ [$LNX_2$]]

Where $LNX_1$ is the first line number to be traced, and $LNX_2$ is the last line number to be traced;

e.g.,

*TRACE* 20 *EXEC* will trace beginning at line number 20 when the program is running.

*TRACE* 50, 60 *EXEC* will trace beginning at line number 50 and ending at line number 60, each time these line numbers are executed in the program.

STOP

The stop command can be a statement within a program (to be discussed later) and can be used as a debugging tool.

As a debugging tool, STOP is extremely valuable. A program that is running can be stopped at any time by pressing *STOP* (the current line number of the program will be displayed). If any program lines are then edited, the program must be rerun from the beginning, using the RUN key. If no editing has been performed, the program can continue where it left off if the CONT key (to be discussed in detail later) is pressed.

While a program is stopped, the values of variables can be checked to determine if the program is doing what was intended; e.g., pressing *A EXEC* would determine the present value of the simple variable A.

While a program is stopped, STOP* , can have another funtion. Pressing *STOP* displays STOP; then keying in either one line number or two line numbers separated by a comma — indicates that the calculator should stop program execution at these line numbers. Pressing *CONT EXEC* will then start program execution; e.g., *STOP* 80 *EXEC* then *CONT EXEC* or *RUN EXEC* will cause the program to halt at line number 80. Once a program is running under these conditions, there is one way to revert to normal program execution: After the program has halted, press *STOP EXEC,* then *CONT EXEC,* and the program will no longer stop at the given line numbers.

*When key is not being used as an immediate execute key, whether the key itself is pressed or whether the letters displayed on the key are individually keyed in, is generally arbitrary.

STEP

After a program is halted by a stop command, execution can continue by pressing *STEP.* STEP is always immediate execute; it causes the program to execute the appropriate statement and then to halt. Therefore, after each statement is executed, it can be checked to ensure that it performed the required function. When a particular function is considered satisfactory, either *CONT* or *STEP* can be pressed; CONT will execute the rest of the program while STEP will execute the next program statement only.

RUN, CONTINUE

Pressing RUN EXEC causes a program to begin execution at the first statement regardless of whether the program had previously been halted by a stop command; however, if the program had been halted by a stop command, pressing *CONT EXEC* will begin program execution where it had previously halted.

As previously mentioned if a program is edited after it has been halted, program execution is reinitialized at the first line by RUN EXEC*. However, if, during the halt, the values of variables are changed or other internally-programmed conditions are changed, then *CONT EXEC* must be pressed to keep these newly adjusted conditions intact. The following things can be done to the program while it is halted if, upon completion, the program is executed by pressing *CONT EXEC:*

1. Variables can be changed; e.g., $B=5$ *EXEC* sets the simple variable B equal to 5.
2. Angular units in trigonometric functions can be changed to measure in radians, degrees, or grads, depending on the user's requirements; e.g., *DEG EXEC* will assume all angles to be in degrees.

3. Write, print, and display statements can be input from the keyboard (these statements will be discussed later).
4. The data pointer, which indicates the next datum to be encountered, can be reset to the beginning of the data by typing *R E S T O R E EXEC.*
5. The program can go to a particular statement and be available for execution there, e.g., *GO TO* 80 EXEC sets the program line counter to 80 for either step-by-step or continuous execution. (If continuous execution is desired at line number 80, the continue command can be employed, as discussed below.) IF ... THEN can also access a particular line number.
6. Any calculator-keyboard statements can be executed.

A halted program can be executed beginning at any line number by using the continue command; e.g., *CONT* 95 *EXEC* will continue execution starting at line number 95.

*The initialize command, to be discussed later, is also legitimate.

A program can be run beginning at any line number; e.g., *RUN* 110 *EXEC* will begin program execution at line number 110.

NOTE

The major difference between *RUN* and *CONT* is that *RUN* initializes all variables in the program and reverts to all normal program modes, while *CONT* neither affects any variables nor affects any current program modes.

PROGRAM STATEMENTS

LET

As in Basic LET A = 6 is a legitimate statement; however, the implied let statement is also allowed. Thus, A = 6 is the same as LET A = 6.

GO TO, GO SUB

The GO TO and GO SUB statements are the same as in Basic; however, each statement has one additional feature called respectively, the computed GO TO and the computed GO SUB. In either case an expression is evaluated and the rounded integer value of the expression is determined; the integer then acts as a pointer to a particular line number from a parameter listing in the statement. Some examples should explain this feature more clearly:

(In all examples, the present value of T will be 2.)

20 GO TO T↑2–3 OF 250, 350, 450

Since the integer value of the expression is one, the first parameter following OF will be accessed (line number 250).

80 GO SUB T+2.5 OF 130, 260, 330, 370, 490

The rounded integer value of the expression is 5; therefore, the subroutine beginning at line number 490, the fifth parameter following OF, will be accessed. (Decimal values of 0.5 and above are always rounded) to the next higher integer value.)

Any legitimate expression can be used; if the rounded value is either less than 1 or greater than the number of parameters following OF, then the line number following the GO TO or GO SUB statement is executed.

PRINT

The calculator has one feature in the print statement not generally available in BASIC. Alphabetic information in a quote field can be printed in either upper or lower case letters. Printing in lower case is just the opposite of that on a regular typewriter; with shift or shift lock pressed, letters inside the quote field will be printed in lower case (the display, however, will still appear in upper case). If the "at" symbol (@) is required, press *SHIFT RESULT.* Quote fields in both the format and write statements also have this lower case feature available.

DISPLAY

The display statement performs the same function as a print statement; the difference is that the information appears on the display rather than on a printing device. Thus, when a permanent record of the information is desired, the print statement should be used. The syntax used is DISP.

FORMAT, WRITE

The format statement is a means of structuring program printouts in a specified manner. The write statement defines the variables, constants, etc. that will appear on the printout; it also determines the device to be printed upon and the particular format statement to be followed. The following examples should adequately explain the features in both the format and the write statements:

e.g.,

5 FORMAT F10.2

6 WRITE (15, 5) .7 printout will be ∧∧∧∧∧∧ 0.70 where the "∧" indicates a blank space.

F10.2 — the F refers to fixed-point format; 10 refers to the total field width reserved for the printout 2 refers to the number of digits to the right of the decimal point. Excess space to the right of the decimal point will be filled with zeros; one space is reserved for the decimal point; two spaces are reserved to the left of the decimal point, one for a digit preceding the decimal point, another for a sign (however, only minus signs are printed).

(15, 5 — in the write statement, the information within parentheses is required. 15 refers to the printing device to be used (select code 15 refers to the standard printer); 5 refers to the line number of the format statement that is being accessed (in this case line number 5). The format statement, which is being accessed, can appear anywhere in the program listing.

.7 — in the write statement, the information following the right parenthesis is to be printed according to the designated formats. The value is always right-justified within its field width.

e.g.,

20 A = 62.4

```
               1       2    3    4    5   6,8     9   10
25 FORMAT E12.2, F7.3, X, E8.1, /, 2F4.0, 3X, E9.0

260 WRITE (15, 25) 231, –61, –12.4, A, "∧IS∧THE∧VALUE∧of∧A", .4, A+3
                    1     2     4    6            7           8   10
```

printout will be:

-continued

```
      1            2     3    4
∧∧∧∧2∧31E+02-61.000∧-1.2E+01

∧∧62∧IS∧THE∧VALUE∧OF∧A∧∧∧0∧∧∧∧∧∧7.E+01
  6          7            8   9    10
```

The format statement, the write statement, and the printout all have individual fields referenced; interlinking fields are represented by corresponding reference numbers.

Since the write statement references the format statement numbered 25, values in the write statement will be formatted as specified in this format statement.

REFERENCES

1 E12.2 indicates exponential (floating-point) notation with a field width of 12 and two digits to the right of the decimal point. The printout displays the exact form. Remember the field width must be large enough to include a leading sign, the decimal point and E±XY. Since printouts from the write statement are right justified and since 231 takes up only 8 of the 12 character field width, the four blank spaces are to the left of the value.

2 The value −61 in the write statement totally fills the F7.3 field, therefore there is no space between this value and the previous value in the printout. Since F7.3 indicates three digits to the right of the decimal point, zeros are supplied in this case.

3 X indicates a space between values; therefore, the values supplied for the F7.3 and E8.1 formats will be separated in the printout by at least one space.

4 The value, −12.4 totally fills up E8.1, in fact, the last digit is suppressed since, with this field designation, only one digit can follow the decimal point.

5 / tells the printing device to skip one carriage return to the beginning of the next line.

6 2F4.0 specifies two consecutive fixed-point formats of F4.0 to be used for values in the write statement. The first format is for the value of A, which from program line number 20 if 62.4; when a fixed-point format specifies zero digits to the right of the decimal point, the value supplied is rounded to be an integer and the decimal point is suppressed — 62, in this case. Since the carriage return had previously been specified, this value is printed on the beginning of the next output line.

7 Quote fields are printed in the sequence in which they occur. Since this quote field is in the write statement, it is printed immediately after 62.4 is printed in F4.0 format. Note the space in front of IS; without this space, the printout would read 62IS instead of 62 IS. Quote fields can appear in either the format or write statements.

8 The value, .4 is also to be printed in F4.0 format. The rounded integer value of .4 is 0 is 0 — hence, the printout.

9 3X indicates there should be three spaces between the values supplied for the F4.0 and the E9.0 formats.

10 Expressions can be specified in write statements. The value of A+3 is 65.4; however, with this format, it will be rounded to 7.E+01. The decimal point is not suppressed in floating-point notation when zero is specified as the number of digits to the right of the decimal point.

If there are more values presented in the write statement than there are formats in the referenced format statement, the formats will be repeated; e.g.,

10 FORMAT F6.2, E10.2

20 WRITE (15, 10) 18, 21, 19.3, 29.6, .71 printout will be:

∧18.00 ∧∧2.10E+01

∧19.30 ∧∧2.96E+01

∧∧0.71

After the first two values are printed according to the specified formats, the output printer's carriage return is activated, then two more values are printed according to the same two specified formats, etc.

Formatting Rules:

In fixed-point format, F*m.n*, *m* stipulates total field width and *n* stipulates the number of digits to the right of the decimal point. If $n>0$, the minimum field width allowable is $m = n + 3$; e.g., F4.1 for a value of −.6 would print −0.6, which takes up the total field width of 4. If $n = 0$, the minimum field width is $m = 2$; e.g., F2.0 for a value of −7 would print −7, thus taking up the allotted field width.

In floating-point format, E*m.n*, *m* and *n* are the same as in fixed-point format. However, the minimum field width allowable is always $m = n + 7$.

The following are all allowed in format statements:

- F*m.n* — fixed-point formats;
- E*m.n* — floating-point formats (often called exponential or scientific notation);
- X — space;
- / — carriage return (for printing device);
- **** — quote field;
- B — binary format (where write statement could have octal number, the binary equivalent would be output).

All of the above can be duplicated any number of times by leading the symbol with the appropriate number.

The following are all allowed in write statements: constants, variables, expressions, and quote fields. It should be noted that a write statement can be input from keyboard mode; that is, the write statement can reference the line number of a format statement in memory without being in the program itself.

The maximum width of both the fixed-point and the floating-point fields in 9,999. However, the programmer is effectively restricted by the allowable characters per line of the printing device.

The information in the format statement must be separated by commas.

The information in the write statement must be separated either by commas or semicolons; generally it makes no difference. However, one additional feature of the write statement is that it can perform the identical operations as the print statement; the benefit is the ability of the write statement to select the device to be printed upon. To write on a punched tape photoreader with select code 2, the write statement could be set up in the following manner:

30 WRITE (2, *) A; B; C, D

The * indicates that no format statement is referenced; thus, WRITE acts like a PRINT statement: data will be left justified, semicolons pack the output fields, commas spread out the fields, etc.

P TAPE

As in BASIC, PTAPE causes the computer to read in a program from the punched tape photoreader. If the photoreader select code is 5, then pressing either *PTAPE # 5* or PTA # 5 will perform this task unless no photoreader is connected to the calculator. If a photoreader is not connected, the calculator will wait till one is hooked up to complete the command. During this time the display will be blank.

During the implementation of this command, lines being loaded into memory have their syntax checked; if a line is in error, it will be rejected — thus, only those lines with correct syntax are loaded into the calculator. To obtain a record of the rejected lines, it is necessary to put the calculator in the print-all mode prior to pressing PTA # 5; in print-all mode, all rejected lines are printed.

Note

To punch information onto paper tape, use the list command as discussed earlier.

MULTILINE FUNCTIONS

Multiline functions serve the same purpose as single-line functions with the added capability of being able to describe more sophisticated functions. In single-line functions the general form of the defining function is: *statement number DEF FN single letter A to Z (simple variable) = expression*

* The simple variable is a dummy variable which indicates where the actual argument of the function is used in the defining expression.

In multiline functions, the general form is the same aside from the equal sign and the expression; for in a multiline function, the expression can be spread out over many statement numbers. Thus, an extremely complicated expression can appear in a more simplified manner; additional flexibility is also gained in that the value of any variable within the expression can be computed for a given value of the argument of the function; e.g.,

```
10    W = .5
20    Y = 2
30    PRINT FNA (3)
40    STOP
50    DEF FNA (X)
60    Z = X ↑ 2 + Y ↑ 2
70    Q = Z + 3
80    D = Q/W
90    RETURN D
100   STOP
```

When this program is run, D will return a value of 32. The return statement returns the result of FNA (X) which, in this case, is equal to D. Line 40, the stop statement is needed to keep the calculator from trying to re-execute lines 50 through 90 after D is printed; without STOP in line 40, an error occurs in line 60 since a second pass beginning at line 50, would be made with X undefined.

Any variable evaluated in the expression can be returned by the return statement, and multiple return statements are allowed; e.g.,

```
10    X = 3
20    INPUT Y
30    WRITE (15,900) FNG (Y)
40    END
50    DEF FNG (Y)
60    Y = Y + 1
70    Z = Y ↑ 2*X
80    IF Z ≤ 100 THEN 110
90    PRINT "Z ="
100   RETURN Z
110   Q = Z ↑ 2
120   IF Q ≤ 100 THEN 150
130   PRINT "Q ="
140   RETURN Q
150   PRINT "Z IS"
160   RETURN Z
900   FORMAT F12.1
1000  END
```

In this example, a variable can be returned from three different lines (100, 140, 160) depending on the initial value of Y; Z can be returned from both lines 100 and 160 if the value of Y meets certain criteria.

Caution must be taken as to the placement of the statement that calls the function (in both examples, statement 30), and it is generally advisable to put a stop statement immediately after this statement (as in line 40 of both examples); otherwise, an undesirable loop may develop.

If correctly entered, the function of a function can be evaluated.

STOP, END

STOP was previously discussed, with emphasis on its program debugging capabilities. Now it will be discussed as a program statement, emphasizing the differences between it and the end statement.

When the program encounters a stop statement, it halts and is waiting; if *CONT EXEC* is then pressed, the program will continue with the statement following the STOP. This is not true if an end statement is encountered; the program will halt, but if *CONT EXEC* is pressed, the calculator will revert back to the lowest-numbered statement in memory. Therefore, the stop statement should be used between stacked programs that are to be run sequentially. When STOP is used in this manner, the values of simple variables can be passed from program to program.

A program should be terminated by encountering either a STOP or an END. The highest-numbered program statement need not be an end statement.

INPUTTING DATA

Program data can be input in three ways: the input statement, the read and data statements and the initialize command. The input statement and the read and data statements are thoroughly discussed below.

INITIALIZE

The INITIALIZE key, when pressed, allocates storage space in memory for array variables. After the required data is keyed in, the program can be executed by pressing *CONT EXEC;* remember — *RUN EXEC* erases the values of all variables, thereby requiring all variables to be defined in the program itself.

Simple variables can always be input in keyboard mode without using the INITIALIZE key, as long as *CONT EXEC* is pressed to run the program. Since array variables can be input in keyboard mode by using the initialize command, it is not necessary to define any variables in the program itself. It is still necessary, however, to identify arrays in either a dimension or a common statement.

USER—DEFINABLE KEYS

There are ten User-Definable Keys (UDK) in the upper left-hand block of the keyboard. There are, however, effectively 20 accessible UDK's since each key can be accessed normally or with the shift key held down.

To enter UDK mode, press *FETCH (particular UDK);* the display will then read, KEY indicating the mode. To exit from UDK mode, press *CLEAR E N D EXEC;* the scratch command can also be used to exit from UDK mode — this command will, of course, erase certain information in the process. UDK mode is automatically exited when certain sequences are followed; these cases will be discussed later.

The user-definable keys can be used effectively in three ways:

1. to represent text (where text can be used as a typing aid);
2. to represent functions (where different values can be passed to the function);
3. To represent programs.

REPRESENTING TEXT

If a key represents text, merely pressing the key will immediately display the text without erasing anything that was previously on the display. Thus, commonly used words and phrases can be put on keys to serve as typing aids. Text can be put on a key in the following manner.

First, access a key by pressing *FETCH (particular UDK).* Then, press * followed by a *character string* and finally *EOL.* Besides inputting the character string, pressing *EOL* in this sequence takes the user out of UDK mode. Any time the programmer wishes to use a character string, he must press the key into which the desired character string was input.

*The maximum length for the character string (including the *) is 80 characters.

If, for example, a key was accessed by *FETCH (particlar UDK);* then * *FORMAT* F10.2.,*X*, *E*10.1 *EOL* was input. If subsequently program line number 60 needed this format, pressing 60 *(particular UDK EOL* will put line number 60 into memory with the required format. A typing-aid key can be used as an immediate execute command if an * is placed both in front of the text and following the text;

e.g.,

*FETCH (UDK) LOADDATA* # 4, 6, B * *EOL*

This command will be immediately executed whenever the UDK is pressed.

To use a key that has text, merely press the key. Pressing *FETCH (particular UDK)* will display the * with the text; however, text can be edited if the fetch command is used. Pressing *FETCH* and then * will erase the old character string and then wait for new text to be input.

REPRESENTING FUNCTIONS

A user definable key can be used to represent functions —either single or multiline. In either case, after the key is accessed, the function must be preceded by a line number — input either manually or automatically.

After a key has been accessed, the following function could be input:

10 DEF FNA (X) = 7 * X =3 EOL

Whenever a value is to be passed to X (the argument of the function), first press the appropriate key; the display will read FNA. Then key in the appropiate value of the argument, which can be either a constant or an expression (e.g., 20), and press *EXEC;* the value of the function will then be displayed (in this case, 137). The same result could have been achieved by using the fetch command; however, FNA would not appear automatically on the display; it would have to be keyed in along with the argument; e.g., *FETCH (UDK) FNA* 20 *EXEC* would also display 137.

If a multiline function, DEF FND (Z), has been input, pressing the appropriate UDK causes FNB to be displayed; as before, passing a value to the argument, Z, and then pressing *EXEC* will compute and display the value of the function.

Functions in mainline memory and in a UDK can be called, regardless of the current operating mode.

If a function in the calculator is defined in more than one place, the first function found with the designated name will be accessed. If the user is in UDK mode, the calculator will search for the function in the following order:

1. The current UDK program will be checked.
2. The first line of each key (in the order defined) will be checked.
3. Mainline memory will be checked.

If the user is not in UDK mode, the order of the search will be steps 3 and 2, respectively.

REPRESENTING PROGRAMS

A UDK can be used to represent an entire program. Programming rules in UDK mode are consistent with those discussed above. There is one restriction, however; if a common statement is used, its size must be less than or equal to the size of the common statement in the mainline program — for there is only one common area allocated to memory.

To run a program that is represented in a UDK, it is advisable to press *RUN (particular UDK) or FETCH (UDK),* then *INIT (particular UDK).* The program can be continued merely by pressing the (particular UDK), but if there are array variables in the program, pressing only the key will cause these variables to be undefined (similar in this respect to the continue command, which neither destroys the old symbol table nor builds a new one). After executing the program, the calculator will exit from UDK mode.

Programs represented on a UDK generally use only simple variables for the obvious ease of handling.

To list program lines on a particular UDK, press: *LIST (particular UDK)*;
pressing *LIST EXEC* in the UDK mode will list the program lines on the key currently being accessed. To selectively list particular lines on the UDK, it is first necessary to *FETCH* a key; then use the list command as discussed below.

To load a program from a cassette file onto one particular key, first *FETCH* the key, then give the load command followed by *EXEC*. Program lines on a particular key can be stored onto the cassette in the same manner; text (as a typing aid), however, cannot be stored in this manner.

STORE KEY and LOAD KEY can be used for any UDK regardless of the information on the key. The use of these keys is discussed below.

STATEMENTS

This is a BASIC statement:
/10 INPUT A,B,C,D,E

Comments

A *statement* contains a maximum of 80 characters

A *statement* may also be called a line.

STATEMENT NUMBERS

Each BASIC statement begins with a statement number (in this example, 20):

20 LET S=(A+B+C+D+E)/5

Comments

The number is called a *statement number* or a *line number.*

The statement number is chosen by you, the programmer. It may be any integer from 1 to 9999 inclusive.

Each statement has a unique *statement number.* The computer uses the numbers to keep the statements in order.

Statements may be entered in any order; they are usually numbered by fives or tens so that additional statements can be easily inserted. The computer keeps them in numerical order no matter how they are entered. For example, if statements are input in the sequence 30,10,20; the computer arranges them in the order: 10,20,30.

INSTRUCTIONS

The statement then gives an instruction to the computer (in this example, PRINT):

30 PRINT S

Comments

*Instructions* are sometimes called *statement types* because they identify a type of statement. For example, the statement above is a "print" statement.

OPERANDS

If the instruction requires further details, operands (numeric details) are supplied (In this example, 10; on the previous page, "S"):

40 GO to 10

Comments

The *operands* specify what the instruction acts upon; for example, what is PRINTed, or where to GO.

A PROGRAM

| | |
|---|---|
| The sequence of BASIC statements given on the previous pages is called a **program.** The last statement in a program, as shown here, is an END statement. | 10 INPUT A,B,C,D,E<br>20 LET S=(A+B+C+D+E)/5<br>30 PRINT S<br>40 GO TO 10<br>50 END |

Comments

The last (highest numbered) statement in a program must be an END statement.

The END statement informs the computer that the program is finished.

FREE-FORM LANGUAGE

BASIC is a "free format" language--the computer ignores extra blank spaces in a statement. For example, these three statements are equivalent:

30 PRINT S
30 PRINT    S
30 PRINTS

Comments

When possible, leave a space between words and numbers in a statement. This makes a program easier for people to read.

TERM: SIMPLE VARIABLE

| | | |
|---|---|---|
| Defined in Basic as: | A letter (from A to Z); or a letter immediately followed by a digit (from 0 to 9). | |
| Examples: | A0 | B |
| | M5 | C2 |
| | Z9 | D |

Comments

Variables are used to represent numeric values. For instance, in the statement:

10 LET M5 = 96.7

M5 is a variable; 96.7 is the value of the variable M5.

There is one other type of variable in BASIC, the array (subscripted) variable; its use is explained in Section IV.

TERM: NUMBER

Defined in Basic as: A decimal number (the sign is optional) between 1E-99 and 9.99999999999E+99

Zero is included in this range.

Examples:

| | | | |
|---|---|---|---|
| −10008 | 5 | 3.14159 | 10E+37 |
| 126.257 | 0 | 10 E37 | 10E−37 |
| 16.01 | .06784 | −10 E37 | 1.0E+2 |

TERM: E NOTATION

Defined in Basic as: A means of expressing numbers having more than six decimal digits, in the form of a decimal number raised to some power of 10.

Examples: 1.00000E+06 is equal to 1,000,000 and is read: "1 times 10 to the sixth power" ($1\times10^6$).
1.02000E+04 is equal to 10,200
1.02000E−04 is equal to .000102

Comments

E notation is used to print numbers having more than six significant digits. It may also be used for input of any number.

When entering numbers in E notation, leading and trailing zeroes may be omitted from the number; the + sign and leading zeroes may be omitted from the exponent.

The precision of numbers is 12 decimals digits

TERM EXPRESSION

Defined in Basic as: A combination of variables, constants and operators which evalvates to a numeric value.

Examples: (P + 5)/27
(where P has previously been assigned a numeric value.)
Q − (N + 4)
(where Q and N have previously been assigned numeric values.)

TERM ARITHMETIC EVALUATION

Defined in Basic as: The process of calculating the value of an expression.

The ASSIGNMENT OPERATOR

Symbol: =

Examples:

```
10 LET A = B2 = C = 0
20 LET A9 = C5
30 LET Y = (N−(R+5))/T
40 LET N5 = A + B2
50 LET P5 = P6=P7=A=B=98.6
```

General Form: LET variable = expression

Purpose

Assigns an arithmetic or logical value to a variable.

Comments

When used as an assignment operator, = is read "takes the value of," rather than "equals". It is, therefore, possible to use assignment statements such as:

```
LET X = X+2
```

This is interpreted by BASIC as: LET X take the value of (the present value of) X, plus two.

Several assignments may be made in the same statement, as in statements 10 and 50 above.

See Section V, Logical Operations for a description of logical assignments.

RELATIONAL OPERATORS

Symbols: = # <> > < >= <=

Examples:

```
100 IF A=B THEN 900
110 IF A+B >C THEN 910
120 IF A+B < C+E THEN 920
130 IF C>=D*E THEN 930
140 IF C9<= G*H THEN 940
150 IF P2#C9 THEN 950
160 IF J <> K THEN 950
```

Purpose

Determines the logical relationship between two expressions, as

| | |
|---|---|
| equality: | = |
| inequality: | # or <> |
| greater than: | > |
| less than: | < |
| greater than or equal to: | >= |
| less than or equal to: | <= |

Comments

Note: It is not necessary for the novice to understand the nature of logical evaluation of relational operators, at this point. The comments below are for the experienced programmer.

Expressions using relational operators are logically evaluated, and assigned a value of true or false (the numeric value is 1 for true, and 0 for false).

When the = symbol is used in such a way that it might have either an assignment or a relational function, BASIC assumes it is an assignment operator. For a description of the assignment statement using logical operators, see Section V, Logical Operations.

ARITHMETIC OPERATORS

Symbols: ↑ * / + −

Examples:

```
40 LET N1 = X−5
50 LET C2 = N↑3
```

-continued

ARITHMETIC OPERATORS

```
60 LET A = (B—C)/4

70 LET X = ((P↑2)—(Y*X))/N+Q
```

Purpose

Represents an arithmetic operation, as:

| | |
|---|---|
| exponentiate: | ↑ |
| multiply: | * |
| divide: | / |
| add: | + |
| subtract: | − |

Comments

The "−" symbol is also used as a sign for negative numbers. It is good practice to group arithmetic operations with parentheses when unsure of the exact order of precedence. The order of precedence (hierarchy) is:

↑
* /
+ − with ↑ having the highest priority. Operators on the same level of priority are acted upon from left to right in a statement. See Order of Precedence in this Section for examples.

The symbols + and − are also used to indicate unary plus and unary minus. For example, negative numbers may be expressed in a statement without using parenthesis:

```
10 LET A1 = —B

20 LET C2 = D +−E

30 LET B5 = B ——C
```

See Order of Precedence in this section for examples or how unary + and unary − are interpreted.

THE AND OPERATOR

Symbol: AND
Examples:

```
60 IF A9<B1 AND C # 5 THEN 100
70 IF T7   T AND J=27 THEN 150
80 IF P1 AND R>1 AND N AND V2 THEN 10
90 PRINT X AND Y
```

Purpose

Forms a logical conjunction between two expressions. If both are true, the conjunction is true; if one or both are false, the conjunction is false.

Note: It is not necessary for the novice to understand how this operator works. The comments below are for experienced programmers.

Comments

The numeric value of true is 1, of false is 0.

All non-zero values are true. For example, statement 90 would print either a 0 or a 1 (the logical value of the expression X AND Y) rather than the actual numeric values of X and Y.

Control is transferred in an IF statement using AND, only when all parts of the AND conjunction are true. For instance, example statement 80 requires four true conditions before control is transferred to statement 10.

See Section V, Logical Operations for a more complete description of logical evaluation.

THE OR OPERATOR

Symbol: OR
Examples:

```
100 IF A>1 OR B<5 THEN 500
100 PRINT C OR D
120 LET D = X OR Y
130 IF (X AND Y) OR (P AND Q) THEN 600
```

Purpose

Forms the logical disjunction of two expressions. If either or both of the expressions are true, the OR disjunction is true; if both expressions are false, the OR disjunction is false.

NOTE: It is not necessary for the novice to understand how this operator works. The comments below are for experienced programmers.

Comments

The numeric values are: true = 1, false = 0.

All non-zero values are true; all zero values are false.

Control is transferred in an IF statement using OR, when either or both of the two expressions evaluate to true.

See Section V, Logical Operations for a more complete description of logical evaluation.

THE NOT OPERATOR

Symbol: NOT
Examples:

```
30 LET X = Y = 0
35 IF NOT A THEN 300
45 IF (NOT C) AND A THEN 400
55 LET B5 = NOT P
65 PRINT NOT (X AND Y)
70 IF NOT (A=B) THEN 500
```

Purpose

Logically evaluates the complement of a given expression.

NOTE: It is not necessary for the novice to understand how this operator works. The comments below are intended for experienced programmers.

Comments

If A = 0, then NOT A = 1; if A has a non-zero value, NOT A = 0.

The numeric values are: true = 1, false = 0; for example, statement 65 above would print 1, since the expression NOT (X AND Y) is true.

Note that the logical spsecifications of an expression may be changed by evaluating the complement. In statement 35 above, if A equals zero, the evaluation would be true (1); since A has a numeric value of 0, it has a logical value of false, making NOT A true.

See Section V, Logical Operations for a more complete description of logical evaluation.

ORDER OF PRECEDENCE
The order of performing operations is:

↑ highest precedence

NOT unary + unary
* /
+ −
Relational Operators
AND
OR lowest precedence

Comments

If two operators are on the same level, the order of execution is left to right, for example:

| | |
|---|---|
| 5 + 6*7 | is evaluated as: 5 + (6×7) |
| 7/14*2/5 | is evaluated as: $\frac{(7/14)\times 2}{5}$ |

Parentheses override the order of precedence in all cases, for example:

5 + (6×3) is evaluated as: 5 + 18 and

3 + (6+(2↑2)) is evaluated as: 3 + (6+4)

Unary + and − may be used; the parentheses are assumed by BASIC. For example:

A + + B is interpreted: A + (+B)

C − + D −5 is interpreted: C − (+D)−5

Leading unary + signs are omitted from output by BASIC, but remain in program listings.

STATEMENTS

Statements are instructions to the calculator. They are contained in numbered lines within a program, and execute in the order of their line numbers. Statements cannot be executed without running a program. They tell the calculator what to do while a program is running.

Here are some examples mentioned in Section I:

LET
PRINT
INPUT

Do not attempt to memorize every detail in the Statements subsection; there is too much material to master in a single session. By experimenting with the sample programs and attempting to write your own programs, you will learn more quickly than by memorizing.

THE LET STATEMENT

Examples:
```
10 LET A = 5.02
20 LET X = Y7 = Z = 0
30 LET B9 = 5* (X↑2)
40 LET D = (3*C2↑N)/(A*(N/2))
```

General Form:
statement number LET variable = number or expression or variable . . .

Purpose

Used to assign or specify the value of a variable. The value may be an expression, a number, or a variable.

Comments

The assignment statement must contain:

1. A statement number,
2. LET is optional
3. The variable to be assigned a value (for example, B9 in statement 30 above),
4. The assignment operator, an = sign,
5. The number, expression or variable to be assigned to the variable (for example, **5*(X↑2) in statement 30** above).

Statement 20 in the example above shows the use of an assignment to give the same value (0) to several variables. This is a useful feature for initializing variables in the beginning of a program.

REM

Examples:
```
10 REM--THIS IS AN EXAMPLE
20 REM: OF REM STATEMENTS
30 REM-----/////*****!!!!!
40 REM. STATEMENTS ARE NOT EXECUTED BY BASIC
```

General form: statement number REM any remark or series of characters

Purpose

Allows insertion of a line of remarks or comment in the listing of a program.

Comments

Must be preceded by a line number. Any series of characters may follow REM.

REM lines are part of a BASIC program and are printed when the program is listed or punched; however, they are ignored when the program is executing.

Remarks are easier to read if REM is followed by a punctuation mark, as in the example statements.

PRINT

This sample program gives a variety of examples of the PRINT statement. The results are shown below.
```
10 LET A=B=C=10
20 LET D1=E9=20
30 PRINT A,B,C,D1,E9
40 PRINT A/B,B/C/D1+E9
50 PRINT "NOTE THE POWER TO EVALUATE AN EXPRESSION AND PRINT THE"
60 PRINT "VALUE IN THE SAME STATEMENT."
70 PRINT
```

-continued

PRINT

```
 80 PRINT
 90 REM* "PRINT" WITH NO OPERAND CAUSES THE TELEPRINTER TO SKIP A LINE.
100 PRINT "'A' DIVIDED BY 'E9' =";A/E9
110 PRINT "11111", "22222", "33333", "44444", "55555", "66666"
120 PRINT "11111"; "22222"; "33333"; "44444"; "55555"; "66666"
130 END
```

RESULTS

```
RUN
10    10       10    20    20
 1    20.05
NOTE THE POWER TO EVALUATE AN EXPRESSION AND PRINT THE
VALUE IN THE SAME STATEMENT.
'A' DIVIDED BY 'E9' = .5
11111    22222    33333    44444    55555
66666
111112222233333444445555566666
```

NOTE: The "," and ";" used in statements 110 and 120 have very different effects on the format.

General Form:

statement number PRINT expression , expression , . . .

or statement number PRINT "any text" ; expression ; . . .

or statement number PRINT "text" ; expression ; "text" , "text" , . . .

or statement number PRINT any combination of text and/or expressions or statement number PRINT

Purpose

Causes the *expressions* or "*text*" to be output to the Printer

Causes the printer to skip a line when used without an operand.

Comments

Note the effects of, and; on the output of the sample program. If a comma is used to separate PRINT operands, five fields are printed per printer line. If semicolon is used, up to twelve packed numeric fields are output per printer line (72 characters). Text in quotes is printed literally.

NOTE: A variable name is considered as a simple expression by BASIC. For example, a statement for the first general form shown above might be:

100 PRINT A1, B2, C3 or

110 PRINT A, Z, X, T9 where the variables represent numeric expressions.

Remember that variable values must be defined in an assignment, INPUT, READ or FOR statement before being used in a PRINT statement.

Ending a PRINT statement with a semicolon causes the output to be printed on the same line, rather than generating a *return linefeed* after the statement is executed. For example, the sequence:

```
20 LET X = 1
30 PRINT X;
40 LET X=X+1
50 GO TO 30
```

produces output in this format:

```
 1  2  3  4  5  6  7  8  9  10 11 12
13 14 15 16 17 18 19 20 21  22 23 24
```

Similarly, ending a PRINT statement with a comma causes output to fill all five fields on a line before moving to the next line. The trailing comma in statement 30 in the sequence:

```
20 LET X = 1
30 PRINT X,
40 LET X=X+1
50 GO TO 30
.
.
.
```

produces output in this format:

```
 1        2        3        4        5
 6        7        8        9        10
11       12       13       14        15
```

A PRINT statement without an operand (statements 70 and 80 in the sample program) generates a *return linefeed*.

GO TO AND MULTIBRANCH GO TO

Examples:

```
10 LET X = 20
.
.
.
40 GO TO X+Y OF 410,420,430
50 GOTO 100
80 GOTO 10
90 GO TO N OF 100,150,180,190
```

-continued

GO TO AND MULTIBRANCH GO TO

General Form:
statement number GO TO statement number
statement number GO TO expression OF sequence of statement numbers

Purpose

GO TO transfers control to the statement specified.

GO TO *expression*...rounds the *expression* to an integer *n* and transfers control to the *n*th statement number following OF.

Comments

GO TO may be written: GOTO or GO TO.

Must be followed by the statement number to which control is transferred, or *expression* OF, and a sequence of statement numbers.

GO TO overrides the normal execution sequence of statements in a program.

If there is no statement number corresponding to the value of the *expression*, the GO TO is ignored.

Useful for repeating a task infinitely, or jumping (GOing TO) another part of a program if certain conditions are present.

GO TO should not be used to enter FOR-NEXT loops; doing so may produce unpredictable results or fatal errors.

GOSUB...RETURN

Example:

```
50 READ A2
60 IF A2<100 THEN 80
70 GOSUB 400
.
.
.
380 STOP (STOP frequently precedes the first statement of
a subroutine, to prevent accidental entry.)
390 REM--THIS SUBROUTINE ASKS FOR A 1 OR 0 REPLY.
400 PRINT "A2 IS>100"
410 PRINT "DO YOU WANT TO CONTINUE";
420 INPUT N
430 IF N # 0 THEN 450
440 LET A2 = 0
450 RETURN
.
.
.
600 END
```

General Form:
statement number GOSUB statement number starting subroutine
.
.
.
statement number RETURN

Purpose

GOSUB transfers control to the specified statement number.

RETURN transfers control to the statement following the GOSUB statement which transferred control.

GOSUB...RETURN eliminates the need to repeat frequently used groups of statements in a program.

MULTIBRANCH GOSUB

Examples:

```
20 GOSUB 3 OF 100,200,300,400,500
60 GOSUB N+1 OF 200,210,220
70 GOSUB N OF 80,180,280,380,480,580
```

General Form:
statement number GOSUB expression OF sequence of statement numbers . . .

Purpose

GOSUB *espression* rounds the *expression* to an integer *n* and transfers control to the *n*th statement number following OF.

Comments

Subroutines should be exited only with a RETURN statement.

The *expression* indicates which of the specified subroutines will be executed. For example, statement 20, above transfers control to the subroutine beginning with statement 300. The *expression* specifies which statement in the sequence of five statements is used as the starting one in the subroutine.

The *expression* is evaluated as an integer. Non-integer values are rounded to the nearest integer.

If the *expression* evaluates to a number greater than the number of statements specified, or less than 1, the GOSUB is ignored.

Statement numbers in the sequence following OF must be separated by commas.

IF...THEN

Sample Program:

```
10 LET N = 10
```

-continued

```
IF...THEN
20 READ X
30 IF X <=N THEN 60
40 PRINT "X IS OVER"; N
50 GO TO 100
60 PRINT "X IS LESS THAN OR EQUAL TO"; N
70 GO TO 20
80 STOP
.
.
.
```

General Form:
statement number IF expression relational op expression THEN statement number

Purpose

Transfers control to a specified statement if a specified condition is true.

Comments

Sometimes described as a conditional transfer; GO TO is implied by IF...THEN, if the condition is true. In the example above, if X<=10, the message in statement 60 is printed (statement 60 is executed).

Since numbers are not always represented exactly in the computer, the = operator should be used carefully in IF...THEN statements. Limits, such as <=,>=, etc. should be used in an IF expression, rather than =, whenever possible.

If the specified condition for transfer is not true, the program will continue executing in sequence. In the example above, if X>10, the message in statement 40 prints.

The relational operator is optional in logical evaluations.

See Section V, Logical Operations, for a more complete description of logical evaluation.

Purpose

Allows controlled repetition of a group of statements within a program.

Comments

*Initial value*, *final value* and *step value* may be any expression.

*STEP* and *step value* are optional; if no step value is specified, the computer will automatically increment by one each time it executes the loop.

How the loop works:
The simple variable is assigned the value of the *initial value;* the value of the simple variable is increased by 1 (or by the *step value*) each time the loop executes. When the value of the *simple variable* passes the *final value*, control is transferred to the statement following the NEXT statement.

The *initial*, *final*, and *step values* are all evaluated upon entry to the loop and remain unchanged after entry. For example,

```
FOR I = 1 TO I + 5
```

goes from 1 to 6; that is, the *final value* does not move as I increases with each pass through the loop.

```
          FOR...NEXT
Examples: 100 FOR P1 = 1 TO 5
          110 FOR Q1 = N TO X
          120 FOR R2 = N TO X STEP 2.5
          130 FOR S = 1 TO X STEP Y
          140 NEXT S
          150 NEXT R2
          160 NEXT Q1
          170 NEXT P1
Sample Program - Variable Number Of Loops
 40 PRINT "HOW MANY TIMES DO YOU WAT TO LOOP";
 50 INPUT A
 60 FOR J = 1 TO A
 70 PRINT "THIS IS LOOP"; J
 80 READ N1, N2, N3
 90 PRINT "THESE DATA ITEMS WERE READ:" N1; N2; N3
100 PRINT "SUM ="; (N1+N2+N3)
110 NEXT J
120 DATA 5, 6, 7, 8, 9, 10, 11, 12
130 DATA 13, 14, 15, 16, 17, 18, 19, 20, 21
140 DATA 22, 23, 24, 25, 26, 27, 28, 29, 30
150 DATA 31, 32, 33, 34
160 END
```

General Form:
statement number FOR simple variable = initial value TO final value or statement no. FOR simple var. = initial value TO final value STEP step value

.
.

statement number NEXT simple variable

NOTE: The same simple variable must be used in both the FOR and NEXT statements of a loop.

For further details on the STEP feature, see FOR...NEXT with STEP in Section III.

Try running the sample program if you are not sure what happens when FOR...NEXT loops are used in a program.

NESTING FOR...NEXT LOOPS

Several FOR...NEXT loops may be used in the same program; they may also be nested (placed inside one another). There are two important features of FOR...NEXT loops:

1. FOR...NEXT loops may be nested.

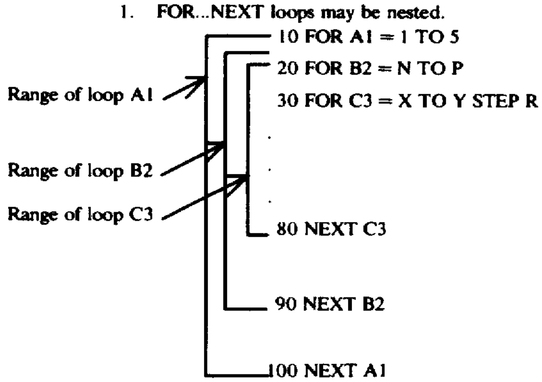

2. The range of FOR...NEXT loops may not overlap. The loops in the example above are nested correctly. This example shows improper nesting.

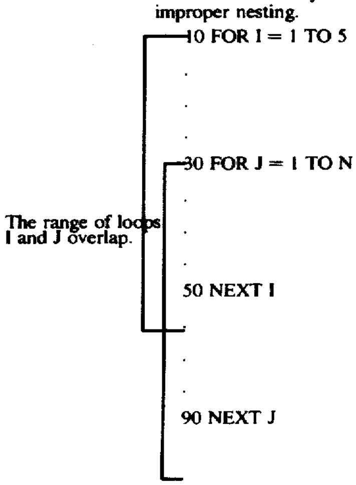

READ; DATA AND RESTORE

Sample Program using READ and DATA

```
15 FOR I=1 TO 5
20 READ A

40 LET X=A↑2
```

-continued

READ; DATA AND RESTORE

```
45 PRINT A;"SQUARED =";X
50 NEXT I
55 DATA 5.24,6.75,30.8,72.65,89.72
60 END
```

Each data item may be read only once in this program. TSB keeps track of data with a "pointer." When the first READ statement is encountered, the pointer indicates that the first item in the first DATA statement is to be read; the pointer is then moved to the second item of data, and so on.

In this example, after the loop has executed five times, the pointer remains at the end of the data list. To reread the data, it is necessary to react the pointer. A RESTORE statement moves the pointer back to the first data item.

Sample Program Using READ, DATA and RESTORE

```
20 FOR I=1 TO 5
30 READ A

40 LET X=A↑2
50 PRINT A; "SQUARED =";X
```

-continued

```
 60 NEXT I
 80 RESTORE
100 FOR J=1 TO 5
110 READ B
120 LET Y=B↑4
130 PRINT B; "TO READ FOR FOURTH POWER =";Y
140 NEXT J
150 DATA 5.24;6.75;30.8;72.65;89.72
160 END
```

General Form:

statement number READ variable , variable , . . .
statement number DATA number or string , number or string , . . .
statement number RESTORE
statement number RESTORE statement number

Purpose

The READ statement instructs TSB to read an item from a DATA statement.

The DATA statement is used for specifying data in a program. The data is read in sequence from first to last DATA statements, and from left to right within the DATA statement.

The RESTORE statement resets the pointer to the first data item, allowing data to be re-read.

RESTORE followed by a statement number resets the pointer to the first data item, beginning at the specified statement.

Comments

READ statements require at least one DATA statement in the same program.

Items in a DATA statement must be separated by commas. String and numeric data may be mixed.

DATA statements may be placed anywhere in a program. The data items will be read in sequence as required.

DATA statements do not execute; they merely specify data.

The RUN command automatically sets the pointer to the first data item.

If you are not sure of the effects of READ, DATA, and RESTORE, try running the sample programs.

One millisecond = 1/1000 second.

TERM: ROUTINE

Defined in Basic as: A sequence of program statements which produces a certain result.

Purpose

Routines are used for frequently performed operations, saving the programmer the work of defining an operation each time he uses it, and saving computer memory space.

Comments

A routine may also be called a program, subroutine, or sub-program.

The task performed by a routine is defined by the programmer.

TERM: STRING

Defined in Basic as: 0 to 255 printer characters enclosed by quotation marks (one line on a teleprinter terminal).

Comments

Sample strings:

ANY CHARACTERS!?*/---
TEXT 1234567...

Quotation marks may not be used within a string. Strings are used only in PRINT statements.

The statement number PRINT, and quotation marks

WAIT

Example: 900 WAIT (1000)
990 WAIT (3000)

General Form: statement number WAIT ( expression max. value of 32767 )

Purpose

Introduces delays into a program. WAIT causes the program to wait the specified number of milliseconds (maximum 32,767 milliseconds) before continuing execution.

Comments

The time delay produced by WAIT is not precisely the number of milliseconds specified because there is no provision to account for time elapsed during calculation or terminal-computer communication.

are not included in the 65 character count. Each statement may contain up to 72 characters. Maximum string length is 72 characters minus 6 characters for PRINT, two for the quotation marks, and the number of characters in the statement number.

TERM: FUNCTION

Defined in Basic as: The mathematical relationship between two variables (X and Y, for example) such that for each value of X there is one and only one value of Y.

Comments

The independent variable in a function is called an argument; the dependent variable is the function value. For instance, if X is the argument, the function value is the square root of X, and Y takes the value of the function.

TERM: ARRAY OR MATRIX

Defined in Basic as: An ordered collection of numeric data (numbers).

Comments

Arrays are divided into columns (vertical) and rows (horizontal):

```
C ROWS
O
L
U
M
N
S
```

Arrays may have one or two dimensions. For example,

```
1.0
2.1
3.2
4.3
```

is a one-dimensional array, while

```
6, 5, 4
3, 2, 1
0, 9, 8
```

is a two-dimensional array.

Array elements are referenced by their row and column position For instance, if the two examples above were arrays A and Z respectively, 2.1 would be A(2); similarly, 0 would be Z(3,1). The references to array elements are called subscripts, and set apart with parentheses. For example, P(1,5) references the fifth element of the first row of array P; 1 and 5 are the subscripts. In X(M,N) M and N are the subscripts.

TERM: WORD

Defined in Basic as: The amount of computer memory space occupied by two teleprinter characters.

Comments

Numbers require two words of memory space when stored as numbers. When used within a string, numbers require one-half word of space per character in the number.

SUBROUTINES AND FUNCTIONS

The following pages explain BASIC features useful for repetitive operations — subroutines, programmer-defined functions and standard functions.

The programmer-defined features, such as GOSUB, FOR...NEXT with STEP, and DEF FN become more useful as the user gains experience and learns to use them as shortcuts.

Standard mathematical and trigonometric functions are convenient timesavers for programmers at any level. They are treated as numeric expressions by BASIC.

FOR...NEXT WITH STEP

Examples:

```
20 FOR 15 = 1 TO 20 STEP 2
40 FOR N2 = 0 TO -10 STEP -2
80 FOR P = 1 TO N STEP X5

90 FOR X = N TO W STEP (N↑2-V)
```

General Form:

statement no. FOR simple var. = expression TO expression STEP expression

Purpose

Allows the user to specify the size of the increment of the FOR variable.

Comments

The step size need not be an integer. For instance,

```
100 FOR N = 1 TO 2 STEP .01
```

is a valud statement which produces approximately 100 loop executions, incrementing N by .01 each time.

A step size of 1 is assumed if STEP is omitted from a FOR statement.

A negative step size may be used, as shown in statement 40 above.

GENERAL MATHEMATICAL FUNCTIONS

Examples:

```
642 PRINT EXP(N); ABS(N)
652 IF RND (0)>=.5 THEN 900
662 IF INT (R) # 5 THEN 910
672 PRINT SQR (X); LOG (X)
```

General Form: The general mathematical functions may be used as expressions, or as parts of an expression.

Purpose

Facilitates the use of common mathematical functions by pre-defining them as:

ABS (*expression*) the absolute value of the expression;

EXP (*expression*) the constant *e* raised to the power of the expression value (in statement 642 above, e↑N)

INT (*expression*) the largest integer ≤ the expression;

LOG (*expression*) the logarithm of the positively valued expression to the base *e;*

RND (*expression*) a random number between 1 and 0; the expression is a dummy argument;

SQR (*expression*) the square root of the positively valued expression.

Comments

The RND function is restartable; the sequence of random numbers using RND is identical each time a program is RUN.

TRIGONOMETRIC FUNCTIONS

Examples:

```
500 PRINT SIN(X); COS(Y)
510 PRINT 3*SIN(B); TAN (C2)
520 PRINT ATN (22.3)
530 IF SIN (A2) <1 THEN 800
540 IF SIN (B3) = 1 AND SIN(X) <1 THEN 90
```

Purpose

Facilitates the use of common trigonometric functions by pre-defining them, as:

SIN (*expression*) the sine of the expression
COS (*expression*) the cosine of the expression
TAN (*expression*) the tangent of the expression
ATN (*expression*) the arctangent of the expression Comments The function is of the value of the expression (the value in parentheses, also called the argument).

The trigonometric functions may be used as expressions or parts of an expression.

The angle of the trigonometric functions can be specified as radians, degrees, or grads by executing a RAD, DEG, or GRAD statement. The calculator assumes radians if not specified.

THE TAB AND SGN FUNCTIONS

Examples:

```
500 IF SGN (X) # 0 THEN 800
510 LET Y = SGN(X)
520 PRINT TAB (5); A2; TAB (20)"TEXT"
530 PRINT TAB (N),X,Y,Z2
540 PRINT TAB (X+2) "HEADING"; R5
```

General Form: The TAB and SGN may be used as expressions, or parts of an expression. The function forms are:

TAB (expression indicating number of spaces to be moved)
SGN (expression)

Purpose

TAB (*expression*) is used only in a PRINT statement, and causes the terminal typeface to move to the space number specified by the expression (0 to 71). The *expression* value after TAB is rounded to the nearest integer. Expression values greater that 71 cause a *return linefeed* to be generated.

SGN (*expression*) returns a 1 if the expression is greater than 0, returns a 0 if the expression equals 0, returns a −1 if the expression is less than 0.

SECTION IV

MATRICES

This section explains matrix manipulation. It is intended to show the matrix capabilities of BASIC and assumes that the programmer has some knowledge of matrix theory.

TERM: MATRIX (ARRAY)

Defined in Basic as: An ordered collection of numeric data (numbers).

Matrix elements are referenced by subscripts following the matrix variable, indicating the row and column of the element. For example, if matrix A is:

1 2 3
4 5 6
7 8 9 the element 5 is referenced by A(2,2); likewise, 8 is A(3,2).

See Section III, Vocabulary for a more complete description of matrices

DIM

Examples:

```
110 DIM A (50), B(20,20)
120 DIM Z (5,20)
130 DIM S (5,25)
140 DIM R (4,4)
```

General Form:
statement number DIM matrix variable ( integer ) . . .
or
statement number DIM matrix variable ( integer , integer ) . . .

Purpose

Reserves working space in memory for a matrix.

The maximum integer value (matrix bound) is 255.

Comments

The integers refer to the number of matrix elements if only one dimension is supplied, or to the number of rows and columns respectively, if two dimensions are given.

A matrix (array) variable is any single letter from A to Z.

Arrays not mentioned in a DIM statement are assumed to have 10 elements if one-dimensional, or 10 rows and columns if two-dimensional.

The working size of a matrix may be smaller than its physical size. For example, an array declared 9 × 9 in a DIM statement may be used to store fewer than 81 elements; the DIM statement supplies only an upper bound on the number of elements.

The absolute maximum matrix size depends on the memory size of the computer.

MAT...ZER

Examples:

```
305 MAT A = ZER
310 MAT Z = ZER (N)
315 MAT X = ZER (30, 10)
320 MAT R = ZER (N, P)
```

General Form:
statement number MAT matrix variable = ZER
or
statement number MAT matrix variable = ZER ( expression )
or
statement number MAT matrix variable = ZER ( expression , expression )

Purpose

Sets all elements of the specified matrix equal to 0; a new working size may be established.

Comments

The new working size in a MAT...ZER is an implicit DIM statement, and may not exceed the limit set by the DIM statement on the total number of elements in an array.

Since 0 has a logical value of false, MAT...ZER is useful in logical initialization.

MAT...CON

Examples:

```
205 MAT C = CON
210 MAT A = CON (N,N)
220 MAT Z = CON (5,20)
```

-continued

MAT...CON

230 MAT Y = CON (50)

General Form:
statement number MAT matrix variable = CON
or
statement number MAT matrix variable = CON ( expression )
or
statement number MAT matrix variable = CON ( expression , expression )

Purpose

Sets up a matrix with all elements equal to 1; a new working size may be specified, within the limits of the original DIM statement on the total number of elements.

Comments

The new working size (an implicit DIM statement) may be omitted as in example statement 205.

Note that since 1 has a logical value of true, the MAT...CON statement is useful for logical initialization.

The expressions in new size specificatons should evaluate to integers. Non-integers are rounded to the nearest integer value.

PRINTING SINGLE MATRIX ELEMENTS

Examples:
```
800 PRINT A(3)
810 PRINT A(3,3);
820 PRINT F(X);E; C5;R(N)
830 PRINT G(X,Y)
840 PRINT Z(X,Y), Z(1,5), Z(X+N), Z(Y+M)
```

General Form:
statement number PRINT matrix variable (expression) . . .
or
statement number PRINT matrix variable (expression, expression) . . .

Purpose

Causes the specified matrix element(s) to be printed.

Comments

Expressions used as subscripts should evaluate to integers. Non-integers are rounded to the nearest integer value.

A trailing semicolon packs output into twelve elements per teleprinter line, if possible (statement 810 above). A trailing comma or *return* prints five elements per line.

Expressions (or subscripts) following the matrix variable designate the row and column of the matrix element. Do not confuse these with new working size specifications, such as those following a MAT IDN statement.

INPUTTING SINGLE MATRIX ELEMENTS

Examples:
```
600 INPUT A(5)
610 INPUT B(5,8)
620 INPUT R(X), N, A(3,3),S,T
630 INPUT Z(X,Y), P3, W
640 INPUT Z(X,Y), Z(X+1,Y+1), Z(X+R3,Y+S2)
```

General Form:
statement number INPUT matrix variable (expression) . . .
or

-continued

INPUTTING SINGLE MATRIX ELEMENTS statement number INPUT matrix variable (expression, expression) . . .

Purpose

Allows input of a specified matrix element from the keyboard.

Comments

The subscripts (in *expressions*) used after the matrix variable designate the row and column of the matrix element. Do not confuse these expressions with working size specifications, such as those following a MAT READ statement.

Expression used as subscripts should evaluate to integers. Non-integers are rounded to the nearest integer value.

Inputting, printing, and reading individual array elements are logically equivalent to simple variables and may be intermixed in INPUT, PRINT, and READ statements.

MAT PRINT

Examples:
```
500 MAT PRINT A
505 MAT PRINT A;
515 MAT PRINT A,B,C
520 MAT PRINT A,B,C;
```

General Form:
statement number MAT PRINT matrix variable
or
statement number MAT PRINT matrix variable, matrix variable . . .

Purpose

Causes an entire matrix to be printed, row by row, with double spacing between rows.

Comments

Matrices may be printed in packed rows up to 12 elements wide by using the ; separator, as in example statement 505.

READING MATRIX ELEMENTS

EXAMPLES:
```
900 READ A(6)
910 READ A(9,9)
920 READ C(X); P; R7
930 READ C(X,Y)
940 READ Z(X,Y), P(R2, S5), X(4)
```

General Form:
statement number READ matrix variable (expression)
or
statement number READ matrix variable (expression, expression) . . .

Purpose

Causes the specified matrix element to be read from the current DATA statement.

Comments

Expressions (used as subscripts) should evaluate to integers. Non-integers are rounded to the nearest integer.

Expressions following the matrix variable designate the row and column of the matrix element. Do not confuse these with working size specifications, such as those following MAT READ statement.

The MAT READ statement is used to read an entire matrix from DATA statements. See details in this section.

MAT READ

Examples: 350 MAT READ A
370 MAT READ B(5),C,D
380 MAT READ Z (5,8)
390 MAT READ N (P3,Q/)

General Form:
statement number MAT READ matrix variable
or
statement number MAT READ matrix variable (expression) . . .
or
statement number MAT READ matrix variable (expression, expression) . . .

Purpose

Reads an entire matrix from DATA statements. A new workking size may be specified, within the limits of the original DIM statement.

Comments

MAT READ causes the entire matrix to be filled from the current DATA statement in the row, column order 1,1; 1,2; 1,3; etc. In this case, the DIM statement controls the number of elements read.

MATRIX ADDITION

Examples: 310 MAT C = B + A
320 MAT X = X + Y
330 MAT P = N + M

General Form:
statement number MAT matrix variable = matrix variable + matrix variable

Purpose

Establishes a matrix equal to the sum of two matrices of identical dimensions; addition is performed element-by-element.

Comments

The resulting matrix must be previously mentioned in a DIM statement if it has more than 10 elements, or 10 × 10 elements if two-dimensional. Dimensions must be the same as the operand matrices.

The same matrix may appear on both sides of the = sign, as in example statement 320.

MATRIX SUBTRACTION

Examples: 550 MAT C = A − B
560 MAT B = B − Z
570 MAT X = X − A

General Form:
statement number MAT matrix variable = matrix variable − matrix variable

Purpose

Establishes a matrix equal to the difference of two matrices of identical dimensions; subtraction is performed element-by-element.

Comments

The resulting matrix must be previously mentioned in a DIM statement if it has more than 10 elements, or 10 × 10 elements if two-dimensional. Its dimension must be the same as the operand matrices.

The same matrix may appear on both sides of the = sign, as in example statement 560.

MATRIX MULTIPLICATION

Examples: 930 MAT Z = B * C
940 MAT X = A * A
950 MAT C = Z * B

General Form:
**statement number MAT matrix variable = matrix variable * matrix variable**

Purpose

Establishes a matrix equal to the product of the two specified matrices.

Comments

Following the rules of matrix multiplication, if the dimensions of matrix B = (P,N) and matrix C = (N,Q), multiplying matrix B by matrix C results in a matrix of dimensions (P,Q).

Note that the product matrix must have an appropriate working size.

The same matrix variable may not appear on both sides of the = sign.

SCALAR MULTIPLICATION

Examples:

```
110 MAT A = (5) * B
115 MAT C = (10) * C
120 MAT C = (N/3) * X
130 MAT P = (Q7*N5) * R
```

General Form:
**statement number MAT matrix variable = (expression) * matrix variable**

Purpose

Establishes a matrix equal to the product of a matrix multiplied by a specified expression (number); that is, each element of the original matrix is multiplied by the number.

Comments

The resulting matrix must be previously mentioned in a DIM statement if it contains more than 10 elements (10 × 10 if two-dimensional).

The same matrix variable may appear on both sides of the = sign.

Both matrices must have the same working size.

COPYING A MATRIX

Examples:

```
405 MAT B = A
410 MAT X = Y
420 MAT Z = B
```

General Form:
statement number MAT variable = matrix variable

Purpose

Copies a specified matrix into a matrix of the same dimensions; copying is performed element-by-element.

Comments

The resulting matrix must be previously mentioned in a DIM statement if it has more than 10 elements, or 10 × 10 if two-dimensional. It must have the same dimensions as the copied matrix.

IDENTITY MATRIX

Examples:

```
205 MAT A = IDN
210 MAT B = IDN (3,3)
215 MAT Z = IDN (Q5, Q5)
220 MAT S = IDN (6, 6)
```

General Form:
statement number MAT array variable = IDN
or
statement number MAT array variable = IDN (expression, expression)

Purpose

Establishes an identity matrix (all 0's, with a diagonal from left to right of all 1's); a new working size may be specified.

Comments

The IDN matrix must be two-dimensional and square.

Specifying a new working size has the effect of a DIM statement.
Sample identity matrix:
1 0 0 0 1 0 0 0 1

MATRIX TRANSPOSITION

Examples:

```
959 MAT Z = TRN (A)
969 MAT X = TRN (B)
979 MAT Z = TRN (C)
```

General Form:

-continued
MATRIX TRANSPOSITION
statement number MAT matrix variable = TRN (matrix variable)

Purpose

Establishes a matrix as the transposition of a specified matrix (transposes rows and columns).

Comments

Sample transposition:

| Original | | | Transposed | | |
|---|---|---|---|---|---|
| 1 | 2 | 3 | 1 | 4 | 7 |
| 4 | 5 | 6 | 2 | 5 | 8 |
| 7 | 8 | 9 | 3 | 6 | 9 |

Note that the dimensions of the resulting matrix must be the reverse of the original matrix. For instance, if A has dimensions of 6,5 and MAT C = TRN (A), C must have dimensions of 5,6.

Matrices cannot be transposed or inverted into themselves.

MATRIX INVERSION

Examples:

```
380 MAT A = INV(B)
390 MAT C = INV(A)
400 MAT Z = INV(Z)
```

General Form:
statement number MAT matrix variable = INV (matrix variable)

Purpose

Establishes a square matrix as the inverse of the specified square matrix of the same dimensions.

Comments

The inverse is the matrix by which you multiply the original matrix to obtain an identity matrix.

For example, $$\underset{\text{Original}}{\begin{pmatrix} 1 & 0 & 0 \\ 1 & 1 & 0 \\ 1 & 1 & 1 \end{pmatrix}} \times \underset{\text{Inverse}}{\begin{pmatrix} 1 & 0 & 0 \\ -1 & 1 & 0 \\ 0 & -1 & 1 \end{pmatrix}} = \underset{\text{Indentity}}{\begin{pmatrix} 1 & 0 & 0 \\ 0 & 1 & 0 \\ 0 & 0 & 1 \end{pmatrix}}$$

Number representaton in BASIC is accurate to 6–7 decimal digits; matrix elements are rounded accordingly.

SECTION V

LOGICAL OPERATIONS

LOGICAL VALUES AND NUMERIC VALUES

A distinction should be made between logical values and the numeric values produced by logical evaluation, when using the logical capability of BASIC.

The *logical value* of an expression is determined by definitions established in the user's program.

The *numeric values produced by logical evaluation* are assigned by BASIC. The user may not assign these values.

Logical value is the value of an expression or statement, using the criteria:

any nonzero expression value = true
any expression value of zero = false

When an expression or statement is logically evaluated, it is assigned one of two numeric values, either:

1, meaning the expression or statement is true,
or
0, meaning the expression or statement is false.

RELATIONAL OPERATORS

There are two ways to use the relational operators in logical evaluations:

1. As a simple check on the numeric value of an expression.

Examples:
```
150 IF B=7 THEN 600
200 IF A9 # 27.65 THEN 700
300 IF (Z/10)>0 THEN 800
```

When a statement is evaluated, if the IF condition is currently true (for example, B = 7 in statement 150), then control is transferred to the specified statement; if it is not true, control passes to the next statement in the program.

Note that the numeric value produced by the logical evaluation is unimportant when the relational operators are used in this way. The user is concerned only with the presence or absence of the condition indicated in the IF statement.

2. As a check on the numeric value produced by logically evaluating an expression, that is: true = 1, false = 0.

Examples:
```
610 LET X=27
615 PRINT X=27
620 PRINT X # 27
630 PRINT X>=27
```

The example PRINT statements give the numeric values produced by logical evaluation. For instance, statement 615 is interpreted by BASIC as "Print 1 if X equals 27, 0 if X does not equal 27." There are only two logical alternatives; 1 is used to represent true, and 0 false.

The numeric value of the logical evaluation is dependent on, but distinct from, the value of the expression. In the example above, X equals 27, but the numeric value of the logical expression X=27 is 1 since it describes a true condition.

BOOLEAN OPERATORS

There are two ways to use the Boolean Operators.

1. As logical checks on the value of an expression or expressions.

Examples:
```
510 IF A1 OR B THEN 670
520 IF B3 AND C9 THEN 680
530 IF NOT C9 THEN 690
540 IF X THEN 700
```

Statement 510 is interpreted: "If either A1 is true (has a non-zero value) or B is true (has a non-zero value), then transfer control to statement 670"

Similarly, statement 540 is interpreted: "If X is true (has a non-zero value), then transfer control to statement 700."

The Boolean operators evaluate expressions for their logical values only: these are true = any non-zero value, false = zero. For example, if B3 = 9 and C9 = –5, statement 520 would evaluate to true, since both B3 and C9 have a non-zero value.

2. As a check on the numeric value produced by logically evaluating an expression, that is: true = 1, false = 0.

Examples:
```
490 LET B = C = 7
500 PRINT B AND C
510 PRINT C OR B
520 PRINT NOT B
```

Statements 500 – 520 return a numeric value of either 1, indicating that the statement has a logical value of true, or 0, indicating a logical value of false.

Note that the criteria for determining the logical values are:

true = any non-zero expression value
false = an expression value of 0.

The numeric value 1 or 0 is assigned accordingly.

SECTION VI

SYNTAX REQUIREMENTS OF BASIC

Legend

::= "is defined as..."
| "or"
< > enclose an element of BASIC

Language Rules

1. The <com statement>, if any exists, must be the first statement presented and have the lowest sequence number; the last statement must be an <END statement>.
2. A sequence number may not exceed 9999 and must be non-zero.
3. Exponent integers may not have more than two digits.
4. A formal bound may not exceed 255 and must be non-zero.
5. A subroutine number must lie between 1 and 63, inclusive.
6. Strings may not contain the quote character (").

7. A <bound part> for an IDN must be doubly subscripted.
8. An array may not be inverted or transposed into itself.
9. An array may not be replaced by itself multiplied by another array.

SYNTAX REQUIREMENTS

```
<basic program>           ::= <program statement> |<basic program> <program statement>(1)

<program statement>       ::= <sequence number> <basic statement> carriage return

<sequence number>         ::= <integer>(2)

<basic statement>         ::= <let statement> |<dim statement> |<com statement> |
                              <def statement> |<rem statement> |<go to statement> |
                              <if statement>     |<for statement>    |<next statement> |
                              <gosub statement>|<return statement>|<end statement> |
                              <stop statement>  |<wait statement>   |<call statement> |
                              <data statement> |<read statement> |<restore statement> |
                              <input statement> |<print statement> |<mat statement>
<let statement>           ::= <let head> <formula>

<let head>                ::= LET <variable>= |<let head> <variable>=

<formula>                 ::= <conjunction> |<formula> OR <conjunction>

<conjunction>             ::= >boolean primary> |<conjunction> AND <boolean primary>

<boolean primary>         ::= <arithmetic expression> |<boolean primary>
                              <relational operator> <arithmetic expression>

<arithmetic expression>   ::= <arithmetic expression> – <term>
                              <term>  | <arithmetic expression> + <term>  |

<term>                    ::= <factor> |<term> * <factor> |<term> / <factor>

<factor>                  ::= <primary> |<sign> <primary> |NOT <primary>

<primary>                 ::= <operand> |<primary> ↑ <operand>

<relational operator>     ::= > |< |>= |<= |= | ≠ |<>

<operand>                 ::= <variable> |<unsigned number> |<system function> |
                              <function> |<formula operand>

<variable>                ::= <simple variable> |<subscripted variable>

<simple variable>         ::= <letter> |<letter> <digit>

<subscripted variable>    ::= <array identifier> <subscript head> <subscript>
                              <right bracet>

<array dentifier>         ::= <letter>

<subscript head>          ::= <left bracket> |<left bracket> <subscript>

<subscript>               ::= <formula>

<letter>                  ::= A |B |C |D |E |F |G |H |I |J |K |L |M |N |O |P |Q |R |S |T |U |V |W |X |Y |Z

<digit>                   ::= 0 |1 |2 |3 |4 |5 |7 |8 |9

<left bracet>             ::= ( |[

<right bracket>           ::= ) |]

<sign>                    ::= + |-
```

-continued

SYNTAX REQUIREMENTS

```
<unsigned number >       ::= <decimal part> |<decimal part> <exponent>

<decimal part>           ::= <integer> |<integer> . <integer> |. <integer>

<integer>                ::= <digit> |<integer> <digit>

<exponent<               ::= E <integer> |E<sign> <integer>(3)

<system function>        ::= <system function name> <parameterpart>

<system function name>   ::= SIN |COS |TAN |ATN |EXP |LOG |ABS |SQR |INT |RND |SGN

<parameter part>         ::= <left bracket> <actual parameter> <right bracket>

<actual parameter>       ::= <formula>

<function>               ::= FN <letter> <parameter part>

<formula operand>        ::= <left bracket> <formula> <right bracket>

<dim statement>          ::= DIM <formal array list>

<formal array list>      ::= <formal array> |<formal array list> , <formal array>

<formal array>           ::= <array identifier> <formal bound head> <formal bound>
                             <right bracket>

<formal bound head>      ::= <left bracket> |<left bracket> <formal bound> ,

<formal bound>           ::= <integer>(4)

<com statement>          ::= COM <formal array list>

<def statement>          ::= DEF FN <letter> <left bracket> <formal parameter><right bracket>=<formula>

<formal parameter>       ::= <simple variable>

<rem statement>          ::= REM <character string>

<character string>       ::= any teletype character except carriage return, alt mode,
                             escape, rubout, or line feed, or null, control B,
                             control C, left arrow

<goto statement>         ::= GO TO <sequence number>

<if statement>           ::= IF <formula> THEN <sequence number>

<for statement>          ::= <for head> |<for head> STEP <step size>

<for head>               ::= FOR <for variable>=<initial value> TO <limit value>

<for variable>           ::= <simple variable>

<initial value>          ::= <formula>

<limit value>            ::= <formula>

<step size>              ::= <formula>

<next statement>         ::= NEXT <for variable>

<gosub statement         ::= GOSUB <sequence number>

<return statement>       ::= RETURN

<end statement>          ::= END

<stop statement>         ::= STOP

<wait statement>         ::= WAIT <parameter part>

<call statement>         ::= CALL <call head> <right bracket>

<call head>              ::= <left bracket> <subroutine number> |<call head> ,
                             <actual parameter>

<subroutine number>      ::= <integer>(5)
```

-continued

<table>
<tr><th colspan="2">SYNTAX REQUIREMENTS</th></tr>
<tr><td><data statement></td><td>::= DATA <constant> |<data statement> , <constant></td></tr>
<tr><td><contstant></td><td>::= <unsigned number> |<sign> <unsigned number></td></tr>
<tr><td><read statement></td><td>::= READ <variable list></td></tr>
<tr><td><variable list></td><td>::= <variable> |<variable list> , <variable></td></tr>
<tr><td><rstore statement></td><td>::= RESTORE</td></tr>
<tr><td><input statement></td><td>::= INPUT <variable list></td></tr>
<tr><td><print statement></td><td>::= <print head> |<print head> <print formula></td></tr>
<tr><td><print head></td><td>::= PRINT |<print head> <print part></td></tr>
<tr><td><print part></td><td>::= <string> |<string> <delimiter> |<print formula><br><delimiter> |<print formula> <string> |<br><print formula> <string> <delimiter></td></tr>
<tr><td><string></td><td>::= "<character string>"(6)</td></tr>
<tr><td><delimiter></td><td>::= , |;</td></tr>
<tr><td><print formula></td><td>::= <formula> |TAB <parameter part></td></tr>
<tr><td><mat statement></td><td>::= MAT <mat body></td></tr>
<tr><td><mat body></td><td>::= <mat read> |<mat print> |<mat replacement></td></tr>
<tr><td><mat read></td><td>::= READ <actual array> |,5 <mat read> , <actual ar ray></td></tr>
<tr><td><actual array></td><td>::= <array identifier> |<array identifier> <bound part></td></tr>
<tr><td><bound part></td><td>::= <actual bound hed> <actual bound> <right bracet></td></tr>
<tr><td><actual bound head></td><td>::= <left bracket> |<left bracket> <actual bound> ,</td></tr>
<tr><td><actual bound></td><td>::= <formula></td></tr>
<tr><td><mat print></td><td>::= PRINT <mat print part> |PRINT <mat print part> <delimiter></td></tr>
<tr><td><mat print part></td><td>::= <array identifier> |<mat print part> <delimiter><br><array identifier></td></tr>
<tr><td><mat replacement></td><td>::= >array identifier>=<mat formula></td></tr>
<tr><td><mat formula></td><td>::= <array identifier> |<mat funtion> |<array identifier><br><mat operator> <array identifier> |<formula operand>*<br><array identifier></td></tr>
<tr><td><mat function></td><td>::= <mat°initialization> |< mat initialization> <bound part>|<br>INV <parameter>|TRN <array parameter></td></tr>
<tr><td><mat initialization></td><td>::= ZER |CON |IDN(7)</td></tr>
<tr><td><array parameter></td><td>::= <left bracket> <array identifier> <right bracket>(8)</td></tr>
<tr><td><mat operator></td><td>::= + |- |*(9)</td></tr>
</table>

STRINGS PLUG-IN READ-ONLY MEMORY MODULE

The strings plug-in read-only memory module makes available to the user all of the string variables functions and operations associated with standard BASIC programming language. Two additional functions not usually provided in most versions of BASIC language have been implemented. These include a POS function for determining the position of a substring within a string and a VAL function for determining the position of a substring within a string and a VAL function for determining the numeric value of a string. A discussion of these and other string functions and operations follows.

String

A set of 1 to 255 characters or the null string (no characters).

e.g. "ABCDEF"

"12345"

" "

String Variable

A variable used to store strings; consists of a single letter (A to Z) followed by a $.

e.g. A$; B$; Z$

Substring Variable

A single character or a set of contiguous characters from within a string variable. The substring is defined by a subscripted string variable. A single subscript specifies the first character of the substring and implies that all characters following are part of the substring. Two subscripts specify the first and last characters of the substring.

e.g. A$ = "ABCDEF"

A$(4) = DEF

A$(1,3) = ABC

DIM Statement

General Form:

*stmt # DIM string var ( # chars in string)*

Purpose:

Reserves storage space for strings longer than 1 character.

Comments:

The number of characters specified for a string in its DIM statement must be expressed as an integer from 1 to 255. Strings not mentioned in a DIM statement are assumed to have length 1. The length mentioned in the DIM statement specifies the maximum number of characters which may be assigned and is known as the physical length. The actual length is the actual number of characters which has been assigned.

e.g. DIM A$(10), B(5,5), B$(255)

Source String Semantic Description

A source string is an entity from which a string value is extracted. If no substring designator is specified for a string variable, the value of the source string is the entire logical string currently assigned to it. Substring designator expressions must be at least 1 in value and the second may be no smaller than one less than the first. If one subscript is given, the value is the entire logical string beginning at the character specified by the subscript. The subscript may be no larger than the actual length of the string plus 1. If two substring expressions are given, the source string value is the substring whose first and last characters are designated. If the specified substring extends beyond the logical length of the string, spaces are used to fill out the substring.

Assignment Statement

General Form:

*line # [LET] destination string = source string*

Destination String:

A destination string is an entire string variable or part of a string variable into which a source string is to be copied. The definition of the action depends on the number of substring subscripts specified in the destination string.

If no subscript qualifier is specified, the entire destination variable is replaced by the source string. The physical length of the destination string must be large enough to accommodate the entire source string.

If one substring subscript is specified, the entire value of the destination variable, beginning at the designated character, is replaced by the source string. That part of the destination variable preceding the subscript value is unchanged. The subscript value must be no more than one greater than the actual length of the destination variable.

If two subscripts are specified, the first substring subscript must be no more than one greater than the logical length of the destination variable, and the second subscript must be no greater than the physical length of the destination variable. The specified section of the destination string is replaced by the source string. If the source string is longer than the destination, it is truncated on the right. If the source string is shorter, as many trailing blanks are appended as necessary. The new actual length of the destination string is the larger of the old actual length and the second subscript.

String Input Statement

General Form:

*stmt # INPUT string or substring variable*

Purpose:

Allows string values to be entered from the keyboard.

Comments:

Numeric variables may be used in the same input statement as string variables. Placing a single string variable in an input statement allows the string value to be entered without enclosing it in quotation marks. If multiple string variables are used each string value must be enclosed in quotation marks, and the values separated by commas.

e.g. 10 INPUT A$, B$, C, Al, A$(1,5)

String Print Statement

General Form:

*stmt # PRINT string or substring variable,*

Purpose:

Causes the current value of the specified string or substring variable to be output on the standard output device.

Comments:

Strings and numeric values may be mixed in a print statement. Sring variables are specified identically to numeric variables. They are printed under the same format rules as quote fields. String and substring variables are printed as source strings.

A maximum of 72 characters can be printed using the print statement, i.e., all strings >72 characters are truncated at 72 characters.

String Read Statement

General Form:

stmt # READ string or substring variable

Purpose:

Causes the value of a specified string or substring variable to be read from a data statement.

Comments:

Mixed string and numeric values may be read. If the wrong data type is given in the data statement an error is given.

e.g. 10 READ A, B$(1, 10), C$, B

String If Statement

General Form:

stmt # IF str.var. rel.oper. string THEN stmt #

Purpose:

Compares two strings. If the specified condition is true, control is transferred to the specified statement.

Comments:

Strings are compared one character at a time, from left to right; the first difference determines the relation. If one string ends before a difference is found, the shortest string is considered the smaller one.

Characters are compared by their ASCII representations.

The relational operators allowed are:

=, ≠, <, >,<=, >=, < > e.g. 1Ø IF A$ = "SAM" THEN 2Ø

String Data Statement

General Form:

stmt # DATA "string text", "string text",

Purpose:

Specifies data in a program (string or/and numeric)

Comments:

String values must be enclosed by quotation marks and separated by commas.

String and numeric values may be mixed in a single data statement.

e.g. 10 DATA "ABC", 1.2, "DEF"

String Write Statement

General Form:

stmt # WRITE (device # , format stat # ) string or substring variable

Purpose:

Similar to the print statement but allows the specification of the output device and format statement. No field specifications are made for string variables in the format statement. They are treated identically to string constants (quote fields).

String Display Statement

General Form:

*stmt # DISP string or substring variable*

Purpose:

Identical to print statement except output device is 32 character display.

LEN Function

General Form:

LEN string or

LEN (string)

Purpose:

Obtain the length of a string for use in an arithmetic expression.

Comment:

The actual length is found which is not necessarily the same as the physical length reserved in the DIM statement.

e.g. LEN ("ABCD") = 4

POS Function

General Form:

POS string, string or

POS (string, string)

Purpose:

Determine the position of a substring within a string.

Comments:

If the second string argument is a part of the first, the value of the function is the position in the first string at which the second string starts. If the second string in the argument is not a part of the first, the value of the function is zero.

e.g. POS ("ABCD", "C") = 3

VAL Function

General Form:

VAL string or

VAL (string)

Purpose:

Determine the numeric value of a string.

Comments:

The VAL function converts a string of digits into a number. The string is converted into a number by the same rules used in a numeric input statement.

e.g. VAL ("123") = 123

ERROR MESSAGES FOR STRING OPTION BLOCK

70 — string IF error
71 — string function syntax error
72 — negative string length
73 — non-contiguous string
74 — string overflow
75 — data is of wrong type
76 — VAL function argument not numeric

<table>
<tr><th colspan="2">BNF SYNTAX DESCRIPTION</th></tr>
<tr><td><literal string></td><td>::="<character string 22 "</td></tr>
<tr><td><character string></td><td>::=<character> |character string><br><character></td></tr>
<tr><td><character></td><td>::=any ASCII character except NULL,<br>LINE FEED, RETURN</td></tr>
<tr><td><letter></td><td>::=A |B |X |Y |Z</td></tr>
<tr><td><sublist></td><td>::=expression> |expression>,<expression></td></tr>
<tr><td><string variable></td><td>::=<simple string variable> |<br><simple string variable>(<sublist>)</td></tr>
<tr><td><simple string variable></td><td>::=<letter>$</td></tr>
<tr><td>21 relational operator></td><td>::=< |<=|=|# |< >|>=|></td></tr>
<tr><td><assignment statement></td><td>::=<u>LET</u> <destination string>=<source string><br>|<destination string>=<source string></td></tr>
<tr><td><destination string></td><td>::=<string variable></td></tr>
<tr><td><source string></td><td>::=<string variable> |<literal string></td></tr>
<tr><td><IF statement></td><td>::=<u>IF</u><destination string><relational<br>operator><sourcestring> <u>THEN</u> <line<br>number></td></tr>
<tr><td><data statement></td><td>::=<u>DATA</u> <constant> |<data statement>,<br><constant></td></tr>
<tr><td><constant></td><td>::=<numeric constant> |<literal string></td></tr>
<tr><td><read statement></td><td>::=<u>INPUT</u> < variable list></td></tr>
<tr><td><variable list></td><td>::<read variable> |<variable list>,<br><read variable></td></tr>
<tr><td><read variable></td><td>::=<numeric variable> |<string variable></td></tr>
<tr><td><input statement></td><td>::=<u>INPUT</u><variable list></td></tr>
<tr><td><print statement></td><td>::=<print> |<print 2></td></tr>
<tr><td><print 1></td><td>::=<u>PRINT</u> |<print 2>, |<print 2>; |<print 3></td></tr>
<tr><td><print 2></td><td>::=<print 1><print expression> |<br><print 3></td></tr>
</table>

-continued

| BNF SYNTAX DESCRIPTION | |
|---|---|
| <print 3' | ::=(type statement><literal string> |
| <print expression> | ::=<expression> \|<source string> |
| WRITE and disp statements have the same syntax as the PRINT statement. | |
| <LEN function> | ::=LEN <source string> \|LEN(<source string>) |
| <VAL function> | ::=s,\|VAL<source string> \|VAL(<source string>) |
| <POS function> | ::=POS <source string>,<source string> \| POS(<source string>,<source string>) |

EXTENDED INPUT/OUTPUT PLUG-IN READ-ONLY MEMORY MODULE

The extended I/O read-only memory module (hereinafter referred to as the extended I/O ROM) provides additional functions and statements so that the calculator can be made compatible with a wide variety of peripheral devices. Added functions include decimal-to-binary and octal-to-decimal conversion, status code inquiry for peripheral devices, control of spacing and line feeds in output records, and others. Use of these functions requires no special programming techniques; once the ROM is plugged in, its functions and statements become a part of the calculator, in the same way as, for example, the square root function is part of the calculator.

Some read-only memory units decrease the amount of programmable memory avilable to the user by automatically requiring a portion of that memory for their own internal usage, but the extended I/O ROM has no such requirement and does not affect memory availability.

The following table describes the extended I/O ROM functions and statements. Parameters shown underlined in the table are explained immediately following the table. Parameters shown in brackets may or may not be included as parts of a statement.

| FUNCTION MNEMONIC | DESCRIPTION OF FUNCTION | SYNTAX |
|---|---|---|
| BIN | Converts decimal expression to its binary equivalent. For use in output-to-binary storage device; also provides increased control of print format. | BIN exp |
| OCT | Converts octal expression to decimal equivalent. For use in construction of code conversion tables; see "Conversion Tables". | OCT exp |
| STAT | Returns code of operational status (on, off, wait, etc.) for the device specified by the select code. | STAT select code |
| CHAR | Returns one byte of data from the device specified by the select code regardless of the data structure. | CHAR select code |
| LIN | Advances printer or typewriter the number of lines represented by the expression. | LIN exp |
| SPA | Advances printer or typewriter carriage the number of spaces represented by the expression. | SPA exp |
| ROT | Converts expression 1 to binary equivalent; performs rotation right the number of positions represented by expression 2; returns decimal equivalent. For use in special input or output code translation. | ROT (exp 1, exp 2) |
| INOR | Combines binary equivalents of expression 1 and expression 2 in an "inclusive or" logic operation. Returns decimal equivalent. For use in special input or output code translation. | INOR (exp 1, exp 2) |
| BIAND | Combines binary equivalents of expression 1 and expression 2 in an "and" logic operation. Returns decimal equivalent. For use in special input or output translation. | BIAND (exp 1, exp 2) |

| STATEMENT SYNTAX | DESCRIPTION OF STATEMENT |
|---|---|
| ENTER (select code or string name, format [, conversion table]) list [, FOR function] | Inputs data frm named device or string with optional conversion to ASCII code; includes capability for iteration. |
| OUTPUT (select code or string name, format [, converison table]) list | Outputs data to named device or string with optional conversion to ASCII code. |

| PARAMATER | EXPLANATION |
|---|---|
| exp | Expression |
| select code | A numeric code, from 1 to 15, uniquely representing the input or output device, as follows:<br>select code 1–9 User assignable.<br>select code 10 Cassette Memory.<br>select code 11–13 reserved.<br>select code 14 Plotter.<br>select code 15 Typewriter or Printer. |
| string name | A single letter followed by a "$". Valid only when String ROM is also plugged in. |
| format | To reference a FORMAT statement, the line number of that statement is shown; for free-form data, an asterisk (*) is shown. |
| conversion table | The variable or array name given to a conversion table. See heading "Conversion Tables". |
| list | A list of variables, literals, expressions or numerics separated by commas. |
| FOR functions | To input multiple data items from one record into an array. Syntax as follows: |

(FOR var 1=exp TO exp, [(FOR var 2= exp TO exp, ] array name(var 1 [, var 2 ] ) [ ) ] )

CONVERSION TABLES

Using a pre-established conversion table, a string of characters or an array of data can be converted from one code to another. The calculator makes use of standard ASCII* codes. Let us refer to all non-ASCII representation codes used by printers, card readers, paper tape readers, punches, typewriters, etc. as foreign codes.

* American Standard Code for Information Interchange.

A conversion table is defined in the BASIC language program DIM statement. Only single-dimensioned integer arrays are considered valid for use as conversion tables. In the following DIM statements, A and B are valid array structures for conversion tables, but C, D, and E are not.

DIM AI (150), CI(20, 30)

DIM BI (80), D(200), E(15, 15)

In order to insert conversion table information in the array, the foreign code must first be known. Suppose your paper tape reader uses EIA** coded tape. The chart following shows symbols and the equivalent tape punches for EIA code, with the octal code equivalent for each symbol.

** Electronic Industries Association Standard Code.

| STANDARD TAPE CHANNEL NUMBERS | | | | | | | | | SYMBOL | EIA OCTAL CODE |
|---|---|---|---|---|---|---|---|---|---|---|
| 8 | 7 | 6 | 5 | 4 | FEED | 3 | 2 | 1 | | |
| | | ● | | | • | | | | (ZERO) 0 — ) | 040 |
| | | | | | • | | | ● | 1 — _ | 001 |
| | | | | | • | | ● | | 2 — @ | 002 |
| | | | ● | | • | | ● | ● | 3 — # | 023 |
| | | | | | • | ● | | | 4 — $ | 004 |
| | | | ● | | • | ● | | ● | 5 — % | 025 |
| | | | ● | | • | ● | ● | | 6 — ' | 026 |
| | | | | | • | ● | ● | ● | 7 — & | 007 |
| | | | | ● | • | | | | 8 — ' | 010 |
| | | | ● | ● | • | | | ● | 9 — ( | 031 |
| | ● | ● | | | • | | | ● | a — A | 141 |
| | ● | ● | | | • | | ● | | b — B | 142 |
| | ● | ● | ● | | • | | ● | ● | c — C | 163 |
| | ● | ● | | | • | ● | | | d — D | 144 |
| | ● | ● | ● | | • | ● | | ● | e — E | 165 |
| | ● | ● | ● | | • | ● | ● | | f — F | 166 |
| | ● | ● | | | • | ● | ● | ● | g — G | 147 |
| | ● | ● | | ● | • | | | | h — H | 150 |
| | ● | ● | ● | ● | • | | | ● | i — I | 171 |

| STANDARD TAPE CHANNEL NUMBERS | | | | | | | | | SYMBOL | EIA OCTAL CODE |
|---|---|---|---|---|---|---|---|---|---|---|
| 8 | 7 | 6 | 5 | 4 | FEED | 3 | 2 | 1 | | |
| | ● | | ● | | • | | | ● | j — J | 121 |
| | ● | | ● | | • | | ● | | k — K | 122 |
| | ● | | | | • | | ● | ● | l — L | 103 |
| | ● | | ● | | • | ● | | | m — M | 124 |
| | ● | | | | • | ● | | ● | n — N | 105 |
| | ● | | | | • | ● | ● | | o — O | 106 |
| | ● | | ● | | • | ● | ● | ● | p — P | 127 |
| | ● | | ● | ● | • | | | | q — Q | 130 |
| | ● | | | ● | • | | | ● | r — R | 111 |
| | | ● | ● | | • | | ● | | s — S | 062 |
| | | ● | | | • | | ● | ● | t — T | 043 |
| | | ● | ● | | • | ● | | | u — U | 064 |
| | | ● | | | • | ● | | ● | v — V | 045 |
| | | ● | | | • | ● | ● | | w — W | 046 |
| | | ● | ● | | • | ● | ● | ● | x — X | 067 |
| | | ● | ● | ● | • | | | | y — Y | 070 |
| | | ● | | ● | • | | | ● | z — Z | 051 |
| | | | ● | | • | | | | SPACE | 020 |
| | ● | | | | • | | | | - — " | 100 |
| | | ● | ● | | • | | | ● | / — ? | 061 |
| | | | | ● | • | | ● | ● | STOP | 013 |
| | ● | | ● | ● | • | | ● | ● | | 133 |
| | | ● | ● | ● | • | | ● | ● | , — , | 073 |
| | ● | ● | | ● | • | | ● | ● | · — · | 153 |
| | | | | ● | • | ● | | | | |
| | | ● | | ● | • | ● | | | | |
| | ● | | | ● | • | ● | | | PUNCH ON | 114 |
| | ● | ● | | ● | • | ● | | | UPPER CASE | 174 |
| | ● | ● | | | • | | | | ; — : | 160 |
| | | ● | | ● | • | ● | ● | | TAB | 076 |
| | | | | ● | • | ● | ● | | CONTROL | 016 |
| | | ● | | ● | • | ● | ● | ● | PUNCH OFF | 067 |
| | | | | ● | • | ● | ● | ● | DATA SELECTOR (AUX.3) | 037 |
| | ● | | | ● | • | ● | ● | ● | FORM FEED (AUX. 4) | 117 |
| | | | | ● | • | | ● | | | |
| | ● | | | ● | • | | ● | | | |
| | | ● | | ● | • | | ● | | BACK SPACE | 062 |
| | | ● | | ● | • | ● | | ● | | |
| | ● | ● | | ● | • | ● | | ● | | |
| | ● | | | ● | • | ● | | ● | ADDRESS IDEN.(AUX.8) | 135 |
| | | | | ● | • | ● | | ● | | |
| | ● | ● | | ● | • | | ● | | LOWER CASE | 172 |
| | ● | ● | | ● | • | ● | ● | | | |
| | ● | | | ● | • | ● | ● | | | |
| | ● | ● | | ● | • | ● | ● | ● | TAPE FEED | 177 |
| ● | | | | | • | | | | CAR. RET. | 200 |

The following chart shows the ASCII symbols with their octal code equivalents.

| Symbol | ASCII Equivalent (octal) code) |
|---|---|
| (Space) | 040 |
| ! | 041 |
| # | 043 |
| $ | 044 |
| % | 045 |
| & | 046 |
| ' | 047 |
| ( | 050 |
| ) | 051 |
| * | 052 |
| + | 053 |
| , | 054 |
| – | 055 |
| . | 056 |
| / | 057 |
| 0 | 060 |
| 1 | 061 |
| 2 | 062 |
| 3 | 063 |
| 4 | 064 |
| 5 | 065 |
| 6 | 066 |
| 7 | 067 |
| 8 | 070 |
| 9 | 071 |
| : | 072 |
| ; | 073 |
| < | 074 |
| = | 075 |
| > | 076 |
| ? | 077 |
| @ | 100 |
| A | 101 |
| B | 102 |
| C | 103 |
| D | 104 |
| E | 105 |
| F | 106 |
| G | 107 |
| H | 110 |
| I | 111 |
| J | 112 |
| K | 113 |
| L | 114 |
| M | 115 |
| N | 117 |

-continued

| Symbol | ASCII Equivalent (octal) code) |
|---|---|
| O | 117 |
| P | 120 |
| Q | 121 |
| R | 122 |
| S | 123 |
| T | 124 |
| U | 125 |
| V | 126 |
| W | 127 |
| X | 130 |
| Y | 131 |
| Z | 132 |
| [ | 133 |
| \ | 134 |
| ] | 135 |

The following chart shows the information to be programmed into the conversion table.

| Symbol | EIA (octal equiv) | ASCII (octal equiv) | EIA Symbol | EIA (octal equiv) | ASCII (octal equiv) |
|---|---|---|---|---|---|
| Sp | 020 | 040 | A | 141 | 101 |
| ! | | 041 | B | 142 | 102 |
| # | | 043 | C | 163 | 103 |
| $ | | 045 | E | 165 | 105 |
| & | | 046 | F | 166 | 106 |
| ' | | 047 | G | 147 | 107 |
| | | | H | 150 | 110 |
| ( | | 050 | I | 171 | 111 |
| ) | | 051 | J | 121 | 112 |
| * | | 052 | K | 122 | 113 |
| + | | 053 | L | 103 | 114 |
| , | 073 | 054 | M | 124 | 115 |
| – | 100 | 055 | ~N | 105 | 116 |
| . | 153 | 056 | 0 | 106 | 117 |
| / | 061 | 057 | P | 127 | 120 |
| | | | Q | 130 | 121 |
| 0 | 040 | 060 | R | 111 | 122 |
| 1 | 001 | 061 | S | 62 | 123 |
| 2 | 002 | 062 | T | 43 | 124 |
| 3 | 023 | 063 | U | 64 | 125 |
| 4 | 004 | 064 | V | 45 | 126 |
| 5 | 025 | 065 | W | 46 | 127 |
| 6 | 026 | 066 | X | 67 | 130 |
| 7 | 007 | 067 | Y | 70 | 131 |
| 8 | 010 | 070 | Z | 51 | 132 |
| 9 | 031 | 071 | | | |
| | | | [ | | |
| : | | 072 | \ | | 133 |
| ; | | 073 | ] | | 134 |
| < | | 074 | | | 135 |
| = | | 075 | | | |
| > | | 076 | | | |
| ? | | 077 | | | |
| @ | | 100 | | | |
| C+RR | 200 | 012 | | | |

The conversion table portion of a BASIC program is shown on the chart below. Each statement defines one element in the conversion Table A with the use of the OCT function: the octal notation does not need to be translated to decimal. If decimal notation was supplied in the symbol tables, the OCT function could have been omitted; however, it is common to obtain symbol tables in the octal form rather than in decimal form.

```
10 DIM AI[128]
20 A[OCT20]=OCT40
30 A[OCT73]=OCT54
40 A[OCT100]=OCT55
50 A[OCT153]=OCT56
60 A[OCT61]=OCT57
70 A[OCT40]=OCT60
80 A[OCT1]=OCT61
90 A[OCT2]=OCT62
100 A[OCT23]=OCT63
110 A[OCT4]=OCT64
120 A[OCT25]=OCT65
```

```
130 A[OCT26]=OCT66
140 A[OCT7]=OCT67
150 A[OCT10]=OCT70
160 A[OCT31]=OCT71
170 A[OCT200]=OCT12
180 A[OCT141]=OCT101
190 A[OCT142]=OCT102
200 A[OCT163]=OCT103
210 A[OCT144]=OCT104
220 A[OCT165]=OCT105
230 A[OCT166]=OCT106
240 A[OCT147]=OCT107
250 A[OCT150]=OCT110
260 A[OCT171]=OCT111
270 A[OCT121]=OCT112
280 A[OCT122]=OCT113
290 A[OCT103]=OCT114
300 A[OCT124]=OCT115
310 A[OCT105]=OCT116
320 A[OCT106]=OCT117
330 A[OCT127]=OCT120
340 A[OCT130]=OCT121
350 A[OCT111]=OCT122
360 A[OCT62]=OCT123
370 A[OCT43]=OCT124
380 A[OCT64]=OCT125
390 A[OCT45]=OCT126
400 A[OCT46]=OCT127
410 A[OCT67]=OCT130
420 A[OCT70]=OCT131
430 A[OCT51]=OCT132
```

ENTER

When a CHAR request is keyed into the calculator for the paper tape reader, conversion is not done and the calculator will display the decimal equivalent of the EIA octal code for the symbol taken from the paper tape. In order to have automatic code conversion, the program must contain an ENTER statement.

410 ENTER (9, 420, A) B

B will be read and its ASCII equivalent found in the conversion table A. If data contained in a string is to be converted to ASCII code, the string name is used instead of the select code, and in this way conversion can be done internally as well as at time of input or output.

OUTPUT

For output of data in a foreign code, automatic code conversion is invoked by use of the OUTPUT statement.

500 OUTPUT (8, 510, A) B

The ASCII B will be found in the conversion table A and changed to the foreign code equivalent before output. Notice that the same conversion table A is used for input and output. The ENTER statement causes the calculator to look for ASCII code, (on the right of the equals (=) signs in the table), and assume that it is receiving foreign code; whereas the OUTPUT statement causes the calculator to assume it has ASCII code, and to look for the fogeign code (on the left of the equals (=) signs in the table above.

ERROR CODES

Program diagnostic or error conditions found in the Extended I/O ROM:

| NUMBER | EXPLANATION |
|---|---|
| ERROR 83 | End of data reached or data contains more than ten (10) blanks in a row. |
| ERROR 84 | Invalid format specification: format must be free format (*), E format or F format. |
| ERROR 85 | Numeric input syntax error: multiple decimal points, more than one E in E format, etc. |
| ERROR 86 | Conversion table not found. Check for integer initialization in DIM statement. |

TERMINAL PLUG-IN READ-ONLY MEMORY MODULE

The terminal plug-in read-only memory module that is available with the calculator allows the user to enter, store, and edit free-text. It also allows the user to communicate, either directly or through an external modem, with another calculator, a computer or a time-sharing computer system. The calculator may transmit or receive BASIC language programs or free-text.

To put the calculator into terminal mode, the user types in TERM and actuates the EXECUTE key. If he wants to use the calculator for data transmission, he can specify one or two optional parameters following the TERM mnemonic. The first parameter is the select code of the modem interface module. If another select code is not specified the calculator assumes select code four. The second parameter is the baud rate of the transmitted data. If not specified, the calculator will assume 110 baud which is the same rate as a standard ASR232 teletypewriter. For example, to transmit or receive on select code six at 300 baud, the user enters TERM, 6,300 followed by actuation of the EXECUTE key. The selectable baud rate is continuous in integer increments from 3 to 300. The conversion of characters from parallel to serial format is done automatically within the calculator firmware, so the modem interface circuitry is simplified and no switches are required to change baud rate.

While the calculator is operating in the terminal mode, lines of text may be entered from the keyboard terminated with the END-OF-LINE key. These lines must be preceded by a line number, but there is no syntax requirement for the remainder of the line. All of the line-by-line and character-by-character editing features of the calculator are available in this mode. These include listing, backspace, forward space, insert character, delete character, and display shift control. Automatic line numbering is also available. In addition, the tape cassette commands, the PTAPE command, the PRINT ALL command, and the LIST command operate normally. The LIST command syntax has been expanded to include LISTX, which means list without line numbers, as well as LIST # SC or LISTX # SC where SC is the select code of the modem interface, which means transmit the information through the modem to the remote system.

When the calculator is operating in the terminal mode, five of the user-definable keys take on special meaning. Key *f5* becomes a teletype shift key and *f6* becomes a teletype control key. These keys and the lower case shift key allow the user to generate any seven-bit ASCII code. To generate a teletype shift or control character, the user first actuates the *f5* or *f6* keys and then actuates the appropriate key on the alpha section of the keyboard. For example, to generate a control C, the *f6* key and the C key are actuated sequentially. No character is entered into the display until after the chosen alpha key is actuated. The character entered into the display may or may not be the same as the alpha character. For instance a shift O generates the symbol ⊣.

Key *f8* is used in the terminal mode to select even or odd parity for transmitted characters. When the terminal mode is first entered, even parity is assumed. The user may then convert to odd parity by actuating key *f8*. The display will then indicate ODD. To revert back to even parity the user actuates key *f8* again, and the display indicates EVEN.

Key *f9* is used in the terminal mode as a transmit key. To transmit a message through the modem interface, the message is typed into the display from the keyboard, and then the line is terminated by actuating key *f9*. The calculator then serializes the characters entered, and transmits them at the selected baud rate. For example, to obtain a listing of a program from a remote time-sharing computer service, the user enters LIST *f9*. The transmit key may also be used to enter the responses in a sign-on procedure for a time-sharing service.

Key *f7* is used to place the calculator into a mode for saving, in memory, an incoming program. For example, to receive and store a program from a time-sharing computer service, the user actuates key *f7* followed by LIST *f9*. As the program is listed from the time-sharing service, the lines are stored in the calculator's user memory as free-text. If the *f7* key is not actuated just prior to entering LIST *f9*, the program will be printed on the external line printer.

Once a program has been entered as free-text, either from a remote source or from the keyboard, and if it is a BASIC program, it may be checked for syntax errors and converted to BASIC program format in memory. This is done by typing COMP followed by actuation of the EXECUTE key. Any syntax errors will be listed, and only the lines which have correct BASIC syntax will be translated. Incorrect lines will remain in free-text format. After a program has been translated by the COMP command, it may be executed locally using any of the normal execution commands, i.e. RUN, CONT, etc. An attempt to execute an untranslated line will cause an error message (ERROR 79) to be displayed.

The receiving section of the modem driver routine operates under interrupt control which allows the user to execute programs locally and remotely at the same time. For example, the user may want to run a program on a time-sharing computer system that may take several minutes to complete. He may start that program by transmitting a RUN command. While that program is being executed, the calculator is free for normal keyboard operation or program execution. The only limitation in the mode is that the calculator may not use the display or printer at this same time as it is receiving information from the remote program.

PLOTTER PLUG-IN READ-ONLY MEMORY MODULE

The plotter plug-in read-only memory module enables the calculator to control an Hewlett-Packard 9862A calculator plotter, providing permanent graphic solutions to problems solved by the calculator.

In general, the plotter command set can be considered as consisting of two groups: plotting commands and writing commands. The user can specify any plotting units he pleases, the calculator then automatically scales those units to fit the chosen plotting area. Also, the calculator keyboard characters can be drawn in different sizes and directions.

The plotting commands enable the system to automatically scale user-units; draw X and Y axes of any length, anywhere in the plotting area; make any desired tic-marks on the axes; plot points or functions; lower or raise the pen, either before or after movement; temporarily translate the established origin to any point within the plotting area and then plot, still in user-units, with respect to the new origin; plot in increments (that is, in user-units, plot any point with respect to the current pen position).

The writing commands enable most calculator keyboard characters to be printed on the plotter. The user can specify the position, height and width of the characters, and the direction in which they will be printed. A centering command (CPLOT) enables labels to be centered on some particular point, thus simplifying labelling of axes and of specific points on the graph. The format of labels and numbers — field width, fixed or floating point, the number of digits following the decimal point, etc. — is specified by standard FORMAT statements. In addition, a unique LETTER command establishes a typewriter mode enabling the plotter to be controlled and positioned from the calculator keyboard, on a character-by-character basis; this allows the user to add extra labelling or individual comments to his graphs.

INITIALIZING THE PLOTTER

Before plotting, the plotter must be prepared and the physical limits of the plotting area must be established. The front-panel controls on the plotter are used for this purpose.

LINE AND CHART HOLD

The LINE pushbutton is the power switch for the plotter; press it to apply power, and press it again to remove power; the white LINE lamp lights whenever the plotter is ON.

Pressing CHART HOLD activates the electro-static paper hold-down mechanism. Pressing CHART HOLD again deactivates it. The plotter will not plot or letter, and the pen holder and arm will move freely in all directions when CHART HOLD is deactivated.

LOADING PAPER

To load paper, release CHART HOLD and manually move the pen arm all the way to one side of the plotter. Lay a sheet of paper on the plotting surface and smooth out any irregularities in the paper (you may also wish to ensure that the paper is squarely against the ridge at the bottom of the plotting surface); then activate CHART HOLD.

GRAPH LIMITS

The graph limit controls are used to determine the physical size of the plot.

LOWER LEFT and the two knobs to its left are used to determine the physical location of the lower left hand corner of the plotting area.

UPPER RIGHT and the two knobs to its right are used to determine the physical location of the upper right-hand corner of the plotting area. Together, the upper right-hand corner and the lower left-hand corner determine the size of the plotting area.

Also, altering the lower left-hand setting will translate the upper right-hand setting by the same direction and amount.

To specify the lower left-hand corner of the plotting area, press LOWER LEFT; the pen will move (without touching the paper) to the lower left-hand corner of the plotting area. This point can be set anywhere within the lower left-hand quarter of the plotting surface (platen) by adjusting the two knobs associated with LOWER LEFT. Once the lower left-hand corner has been set, the upper right-hand corner is set in the same general way by pressing UPPER RIGHT and adjusting the two knobs associated with it. Once the plotting area has been determined, it can be relocated by moving the position of the lower left-hand corner – the upper right-hand corner will track the change.

PLOTTING COMMANDS

NOTES:

1. All commands can be activated either from the keyboard or from a program except where noted.
2. All values in the following statements can be numbers, variables or expressions except where noted.
3. Any parameter enclosed in square brackets is optional as far as the statement containing it is concerned. However, program sense may dictate that the parameter be present in specific cases.

THE SCALE STATEMENT

SCALE Xmin, Xmax, Ymin, Ymax

Examples:

SCALE −10, 10, −5, 5

SCALE −4PI, 4PI, .3, 1.1 establishes the full-scale units for the plot. Xmin to Xmax and Ymin to Ymax correspond exactly to the limits of the horizontal and vertical edges, respectively, of the plotting area (the area is established mechanically as previously described). This also establishes the point, on or off the plotting area, where the original of the graph (0, 0) is located.

A SCALE statement must be executed before any plotting can occur. Once established the scale remains established until one of the following occurs:

A new SCALE statement is executed.

The program is initialized.

A SCRATCH OR SCRATCH A or SCRATCH V is executed.

The calculator is switched off.

The parameters (X, Y, etc.) in the SCALE statement must be given in the correct order. If the minimum or maximum values are switched no ERROR message will occur; however, subsequent plotting commands may not be executed properly.

The SCALE statement has no effect on the position of the pen.

THE PEN STATEMENT

PEN

The PEN statement is a stand-alone instruction requiring no parameter. It raises the pen without otherwise changing its position relative to the plotting area.

Instructions to raise or lower the pen, either before or after movement, can be easily included in several other statements (see PLOT and IPLOT) so there is no special lower pen instruction.

THE OFFSET STATEMENT

OFFSET X, Y

Example: OFFSET 3, −3

Temporarily offsets the origin (point 0, 0 established by the previous SCALE statement) by an amount, and in the direction, determined by the values (in user-units) of X and Y. All future plotting commands are then made with respect to the new origin until such time as that origin is again changed by means of, for example, a new OFFSET or a new SCALE statement.

The OFFSET statements are not accumulative; that is, a new offset is with respect to the original origin and not with respect to the last offset origin.

Offsetting greatly simplifies plotting, from the user's point of view, when it becomes necessary to divide the plotting area into several smaller segments and then make a separate plot in each segment. As the plot is made in each segment it is not necessary for the user to correct each point before plotting; instead OFFSET statement moves the origin to some convenient point within that segment so that the calculator automatically makes the necessary corrections for each point plotted.

THE AXIS STATEMENT

X AXIS Y-offset [, ±tic [, start point, end point]]

or

Y AXIS X-offset [, ±tic [, starting point, end point]]

X AXIS 3, 1, −4, 4

DRAWS an X-(or Y-) axis according to the parameters given in the AXIS statement. The pen is automatically raised both before and after drawing the axis.

(NOTE: The following describes the X-axis; the same information is applicable to the Y-axis if left and right for the X-axis are read as, respectively, bottom and top for the Y-axis.)

1. If no optional parameters are given, draws a straight line from left to right across the complete plotting area (from Xmin to Xmax). The line crosses the Y-axis at a point determined by the value of y-offset.
2. If a tic parameter is included then tic marks are made along the axis as it is drawn; the value for tic determines the spacing, in user-units, between tics. The first tic is drawn at the starting point of the line. The tic parameter is usually positive (the sign is not required), but occasionally a negative tic spacing is useful — see 4, below.
3. If the start point/end point parameters are given, then the axis is drawn only between the points specified — from the start point to the end point.
4. a. A negative tic spacing when no start point/end point parameters are given results in a tic only at the left end (Xmin) of the axis.
   b. If the start point parameter is more positive than (i.e., to the right of) the end point parameter, then the axis is drawn from right to left; in this case, negative tic spacing results in normal tic marks being drawn along the axis.
   c. With the start point/end point parameters the same as in *b* above, a positive tic spacing results in a tic only at the right end (Xmax) of the axis.

THE PLOT STATEMENT

PLOT X, Y [, control pen]

PLOT SIN(X), COS(X), −2

Moves the pen to the co-ordinate specified by the value of X and Y.

When no optional control pen parameter is given:

If the pen was raised, it moves to the point specified and then lowers.

If the pen was lowered, it remains lowered while moving to the point specified, thus drawing a line on the plotting surface.

The Control Pen Parameter

The value and sign of this parameter in the PLOT (and IPLOT) statements determines whether the pen will be raised or lowered before or after it moves to the specified point.

If the parameter is:

negative — control occurs after movement;

positive — control occurs before movement;

odd — raises pen if it was lowered;
even — lowers pen if it was raised.

The value of the control parameter can be any number in the range ±32,767. If the value is not an integer then it is automatically rounded up or down according to the value of the fractional part of the number; that is up for .5 or greater, or down for less then .5. (Rounding is the same as the standard rounding in the calculator; it is not the same as the INT function, where the value becomes that of the next lower integer.)

THE IPLOT STATEMENT

IPLOT deltaX, deltaY [, control pen]

IPLOT 2, −3A/4, 1

Moves the pen (from its current position) in the X direction and in the Y direction, by the amounts specified by deltaX and deltaY, respectively.

The control pen parameter is optional and operates exactly as described previously — see the PLOT STATEMENT.

Notice that the action of the IPLOT statement is such that it is as if, during the execution of that statement only, the origin (0, 0) of the graph is offset to the current position of the pen. Pen movement is then related to that offset origin.

The IPLOT statement is most useful when drawing regular geometric shapes such as, for example, a swastika (卍). In this case each point is more easily plotted with respect to the previous point, rather than with respect to the origin of the graph.

THE LABEL STATEMENT

LABEL (FORMAT statement number or *[, character heigth in %, Aspect ratio, angle of rotation [, paper heigth/paper width]]) print list Examples: LABEL (x, 2, 2, 9, 0, 8.5/11) "PLOTTER"

LABEL (100) 1, A, SIN(X)

The LABEL statement is used to write alpha and numeric characters with the plotter. Several parameters are allowed which can be used to control the size, shape, and angle of rotation of the character printed. The character height can be specified in percent of the paper height. The aspect ratio is the ratio of the character height to the character width before any rotation. The angle of rotation of characters printed can be given. This parameter can be given in degrees, radians, or grads and is dependent on a previously given DEG, RAD, or GRAD statement. A fourth parameter can be specified. This is the ratio of the actual measured height of the plot paper to the measured width as set by the upper right and lower left positions. This parameter is necessary to keep proper aspect ratio of characters printed on an angle on a non-square plot. If not specified, the calculator will assume character height = 2.5%, aspect ratio = 2, rotation = 0, and paper ratio = 1.

The format specification and the print list are the same as a WRITE statement. If a FORMAT statement number is specified, the print list is written on the plotter using the specification given in the FORMAT statement. All specifications are allowed except B. If an * is used, the print list will be written according to standard format. This includes the normal definition of comma and semi-colon spacing, string fields, TAB, etc.

The LABEL statement will start printing characters at the current pen position. Anytime an end of line is needed, the plotter pen will return to the character position directly below the first character of the current line, simulating a carriage return, line feed.

If the string variables option block is also plugged into the memory, then string variables are allowed in the print list.

THE LETTER STATEMENT

LETTER

When the LETTER statement is executed, the calculator enters a unique typewriter mode with the plotter as the printing device. While in this mode when the user hits any printing character on the keyboard, that character is immediately printed on the plotter at the current pen position. An EOL or EXECUTE will cause a carriage return, line-feed to be simulated. In addition, while in this mode the ↑, ↓, ←, and → keys can be used to position the pen. The ↑ and ↓ keys can cause the pen to move up or down one character position. The ← and → keys cause the pen to move left or right one character position. If the shift key is held down at the same time as a pen control key, the pen will move one-tenth of a character position. Character size, aspect ratio, and rotation can be specified by giving a LABEL statement prior to the LETTER statement.

THE CPLOT STATEMENT

CPLOT delta X characters, delta Y characters

Example: CPLOT 5, −.3

The CPLOT statement is similar to the IPLOT statement in that it moves the pen to a position relative to the current pen position. The difference is that the delta X and delta Y values are specified in character size units. In the example above the pen would move five character position down. This statement is particularly useful in positioning the pen when labeling a plot using the LABEL statement.

One character space is defined as follows:

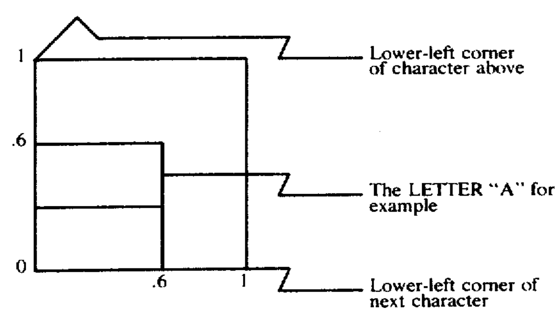

The error messages given by the plotter module are:

ERROR 80 — No scale statement executed before PLOT, IPLOT, OFFSET, or AXIS.

ERROR 81 — Character size too large (limited to = 20%) or binary mode not allowed.

ERROR 82 — OFFSET, POINT 1, or POINT 2 out of range during axis execution or tic increment in axis statement is too small.

MATRIX PLUG-IN READ-ONLY MEMORY MODULE

The Matrix read-only-memory module enables the calculator to understand the MAT statements of BASIC. These statements facilitate the matrix operations of addition, subtraction, initialization, scalar multiplication, matrix multiplication transposition, and inversion. A function additional to standard BASIC language matrix operations is provided for computing the determinate of a square matrix. The MAT READ and MAT PRINT commands facilitate entering data into an array and the printing thereof. The MAT INPUT command which appears in some versions of BASIC is not allowed. The matrix operations are allowed on split precision or integer arrays as well as full floating point arrays.

The operations performed by this matrix module are summarized below and additional information is provided above in Section IV, Matrices.

A. MAT READ
reads numeric information from DATA statements into an array
MAT READ A
MAT READ A(3,5)
MAT READ B, W(8),X,Y B. MAT PRINT
prints complete arrays
close packing specified with a semicolon
MAT PRINT A
MAT PRINT A;
MAT PRINT R,S;V;W C. ZER, CON, and IDN operations
ZER: initialize an array to all zeros
CON: initialize an array to all ones
IDN: initialize an array to the identity matrix
MAT A = ZER
MAT Q = CON(9)
MAT I — IDN(4,4)

D. MAT assignment statements
assign to a matrix the result of a MAT operation
1. MAT A = B
assigns elements of A from array B
2. MAT A = B ± C
performs indicated addition or subtraction and assigns result to A
any of A, B, and C may be the same matrix
3. MAT A = B * C
performs indicated multiplication and assigns result to A array A must be distinct from B or C
4. MAT A = (expression) * B
performs the indicated scalar multiply (each element of B is multiplied by the value of the expression) and assigns the result to A
5. MAT A = TRN(B)
assigns the transpose of B to A
array A must be distinct from B
6. MAT A = INV(B)
assigns the inverse of B to A
A and B may be the same matrix E. DET operation
calculates the determinant of a square matrix
MAT D4 = DET(A)

KEY CODES AND MNEMONICS

All of the keys of the keyboard input unit and their associated mnemonics and binary keycodes are listed in the Table below. Every key has one mnemonic and two keycodes, (namely, a shifted keycode and an unshifted keycode). Keycodes are applied to the CPU in eight-bit binary form. The first four bits of each keycode are given in the left-most vertical column of the table below and the next three bits of each keycode are given in the uppermost row of the table below. The eight bit of each keycode is the shift bit and is determined by whether or not the shift key of the keyboard input unit is depressed. Keycodes entered into the CPU from the keyboard input unit or from the program storage section of the memory unit are processed by the keyboard input routine 204 as generally described above in connection with FIG. 9 and as shown in detail in FIGS. 88A–G.

KEYCODE AND MNEMONIC TABLE

| | D0 | D1 | D2 | D3 | D4 | D5 | D6 | D7 |
|---|---|---|---|---|---|---|---|---|
| b6 | 0 | 0 | 0 | 0 | 1 | 1 | 1 | 1 |
| b5 | 0 | 0 | 1 | 1 | 0 | 0 | 1 | 1 |
| b4 | 0 | 1 | 0 | 1 | 0 | 1 | 0 | 1 |
| b3b2b1b0 | | | | | | | | |
| 0 0 0 0 | f0 | RECALL | SPACE | 0 | | P | | PA |
| 0 0 0 1 | f1 | FETCH | | 1 | A | Q | | STOP |
| 0 0 1 0 | f2 | BACK | | 2 | B | R | | EOL |
| 0 0 1 1 | f3 | FWD | | 3 | C | S | | DL |
| 0 1 0 0 | f4 | ↓ | | 4 | D | T | | FXD |
| 0 1 0 1 | f5 | ↑ | | 5 | E | U | | FLT |
| 0 1 1 0 | f6 | ← | | 6 | F | V | | SCRATCH |
| 0 1 1 1 | f7 | → | | 7 | G | W | | AUTO |
| 1 0 0 0 | f8 | LOAD | ( | 8 | H | X | | |
| 1 0 0 1 | f9 | STORE | ) | 9 | I | Y | | |
| 1 0 1 0 | LIST | INIT | X | * : | J | Z | CLR | |
| 1 0 1 1 | EXEC | / | + | + ; | K | | RESULT | |
| 1 1 0 0 | CONT | | , | | L | | | |
| 1 1 0 1 | STEP | STD | − | = | M | | | |

KEYCODE AND MNEMONIC TABLE-continued

| | D0 | D1 | D2 | D3 | D4 | D5 | D6 | D7 |
|---|---|---|---|---|---|---|---|---|
| b6 | 0 | 0 | 0 | 0 | 1 | 1 | 1 | 1 |
| b5 | 0 | 0 | 1 | 1 | 0 | 0 | 1 | 1 |
| b4 | 0 | 1 | 0 | 1 | 0 | 1 | 0 | 1 |
| 1 1 1 0 | TRACE | NORMAL | . | | N | ↑ | | |
| 1 1 1 1 | RUN | INSERT | ?<br>/ | | O | | ENTER EXP | |

BASIC INSTRUCTION SET

Every routine and subroutine of the calculator comprises a sequence of one or more of 71 basic sixteen-bit instructions listed below. These 71 instructions are all implemented serially by the micro-processor in a time period which varies according to the specific instruction, to whether or not it is indirect, and to whether or not the skip condition has been met.

Upon completion of the execution of each instruction, the program counter (P register) has been incremented by one except for instructions JMP, JSM, and the skip instructions in which the skip condition has been met. The M-register is left with contents identical to the P-register. The contents of the addressed memory location and the A and B registers are left unchanged unless specified otherwise.

memory Reference Group

The 14 memory reference instructions refer to the specific address in memory determined by the address field <*m*>, by the ZERO/CURRENT page bit, and by the DIRECT/INDIRECT bit. Page addressing and indirect addressing are both described in detail in the reference manuals for the Hewlett-Packard Model 2116 computer (hereinafter referred to as the HP 2116).

The address field <*m*> is a 10 bit field consisting of bits 0 through 9. The ZERO/CURRENT page bit is bit 10 and the DIRECT/INDIRECT bit is bit 15, except for reference to the A or B register in which case bit 8 becomes the DIRECT/INDIRECT bit. An indirect reference is denoted by a <, I> following the address <*m*>.

REGISTER REFERENCE OF A OR B REGISTER: If the location <A> or <B> is used in place of <*m*> for any memory reference instruction, the instruction will treat the contents of A or B exactly as it would be contents of location <*m*>. See the note below on the special restriction for direct register reference of A or B.

ADA *m*,I Add to A. The contents of the addressed memory location *m* are added (binary add) to contents of the A register, and the sum remains in the A register. If carry occurs from bit 15, the E register is loaded with 0001, otherwise E is left unchanged.

ADB *m*,I Add to B. Otherwise identical to ADA.

CPA *m*,I compare to A and skip if unequal. The contents of the addressed memory location are compared with the contents of the A register. If the two 16-bit words are different, the next instruction is skipped; that is, the P and M registers are advanced by two instead of one. Otherwise, the next instruction will be executed in normal sequence.

CPB *m*,I Compare to B and skip is unequal. Otherwise identical to CPA.

LDA *m*,I Load into A. The A register is loaded with the contents of the addressed memory location.

LDB *m*,I Load into B. The B register is loaded with the contents of the addressed memory location.

STA *m*,I Store A. The contents of the A register are stored into the addressed memory location. The previous contents of the addressed memory location are lost.

STB *m*,I Store B. Otherwise identical to STA.

IOR *m*,I Inclusive OR to A. The contents of the addressed location are combined with the contents of the A register as an INCLUSIVE OR logic operation.

ISZ *m*,I Increment and Skip if Zero. The ISZ instruction adds ONE to the contents of the addressed memory location. If the result of this operaion is ZERO, the next instruction is skipped, that is, the P and M registers are advanced by TWO instead of ONE. The incremental value is writted back into the addressed memory location. Use of ISZ with the A or B register is limited to indirect reference; see footnote on restrictions.

AND *m*,I Logical AND to A. The contents of the addressed location are combined with the contents of the A register as an AND logic operation.

DSZ *m*,I Decrement and Skip if Zero. The DSZ instruction subtracts ONE from the contents of the addressed memory location. If the result of this operation is zero, the next instruction is skipped. The decremented value is writted back into the addressed memory location. Use of DSZ with the A or B register is limited to indirect reference; see footnote on restrictions.

JSM *m*,I Jump to Subroutine. The JSM instruction permits jumping to a subroutine in either ROM or R/W memory. The contents of the P register is stored at the address contained in location 1777 (stack pointer). The contents of the stack pointer is incremented by one, and both M and P are loaded with the referenced memory location.

JMP *m*,I Jump. This instruction transfers control to the contents of the addressed location. That is, the referenced memory location is loaded into both M and P registers, effecting a jump to that location.

Shift-Rotate Group

The eight shift-rotate instructions all contain a 4 bit variable shift field <*n*> which permits a shift of one through 16 bits; that is, $1 \le n \le 16$. If <*n*> is omitted, the shift will be treated as a one bit shift. The shift code appearing in bits 8,7,6,5 is the binary code for $n-1$, except for SAL and SBL, in which cases the complementary code for $n-1$ is used.

AAR *n* Arithmethic right shift of A. The A register is shifted right *n* places with the sign bit (bit 15) filling all vacated bit positions. That is, the $n+1$ most significant bits become equal to the sign bit.

ABR *n* Arithmetic right shift of B. Otherwise identical to AAR.

SAR *n* Shift A right. The A register is shifted right *n* places with all vacated bit positions cleared. That is, the *n* most significant bits become equal to zero.

SBR *n* Shift B right. Otherwise identical to SAR.

SAL *n* Shift A left. The A register is shifted left *n* places with the *n* least significant bits equal to zero.

SBL *n* Shift B left. Otherwise identical to SAL.

RAR *n* Rotate A right. The A register is rotated right *n* places, with bit 0 rotated around to bit 15.

RBR *n* Rotate B right. Otherwise identical to RAR.

Alter-Skip Group

The sixteen alter-skip instructions all contain a 5-bit variable skip field <*n*> which, upon meeting the skip condition, permits a relative branch to any one of 32 locations. Bits 9,8,7,6,5 are coded for positive or negative relative branching in which the number <*n*> is the number to be added to the current address, (skip in forward direction), and the number <—*n*> is the number to be subtracted from the current address, (skip in negative direction). If <*n*> is omitted, it will be interpreted as a ONE.

| | | |
|---|---|---|
| <n>=0 | CODE=00000 | REPEAT SAME INSTRUCTION |
| <n>=1 | CODE=00001 | DO NEXT INSTRUCTION |
| <n>=2 | CODE=00010 | SKIP ONE INSTRUCTION |
| <n>=15 | CODE=01111 | ADD 15 TO ADDRESS |
| <n>=−1 | CODE=11111 | DO PREVIOUS INSTRUCTION |
| <n>=−16 | CODE=10000 | SUBTRACT 16 FROM ADDRESS |
| <n>=nothing | CODE=00001 | DO NEXT INSTRUCTION |

The alter bits consist of bits 10 and bits 4. The letter <S> following the instruction places a ONE in bit 10 which causes the tested bit to be set after the test. Similarly the letter <C> will place a ONE In bit 4 to clear the test bit. If both a set and clear bit are given, the set will take precedence. Alter bits do not apply to SZA, SZB, SIA, and SIB.

SZA *n* Skip if A zero. If all 16 bits of the A register are zero, skip to location defined by *n*.

SZB *n* Skip if B zero. Otherwise identical to SZA.

RZA *n* Skip if A not zero. This is a Reverse Sense skip of SZA

RZB *n* Skip if B not zero. Otherwise identical to RZA.

SIA *n* Skip if A zero; then increment A. The A register is tested for zero, then incremented by one. If all 16 bits of A were zero before incrementing, skip to location defined by *n*.

SIB *n* Skip if B zero; then increment B. Otherwise identical to SIA.

RIA *n* Skip if A not zero; then increment A. This is a Reverse Sense skip of SIA.

RIB *n* Skip if B not zero; then increment B. Otherwise identical to RIA.

SLA *n*,S/C Skip if Least Significant bit of A is zero. If the least significant bit (bit 0) of the A register is zero, skip to location defined by n. If either S or C is present, the test bit is altered accordingly after test.

SLB *n*,S/C Skip if Least Significant bit of B is zero. Otherwise identical to SLA.

SAM *n*,S/C Skip if A is Minus. If the sign bit (bit 15) of the A register is a ONE, skip to location defined by *n*. If either S or C is present, bit 15 is altered after the test.

SBM *n*,S/C Skip if B is Minus. Otherwise identical to SAM.

SAP *n*,S/C Skip if A is Positive. If the sign bit (bit 15) of the A register is a ZERO, skip to location defined by *n*. If either S or C is present, bit 15 is altered after the test.

SBP *n*,S/C Skip if B is Positive. Otherwise identical to SAP.

SES *n*,S/C Skip if Least Significant bit of E is Set. If bit O of the E register is a ONE, skip to location defined by *n*. If either S or C is present, the entire E register is set or cleared respectively.

SEC *n*,S/C Skip if Least Significant bit of E is Clear. If bit 0 of the E register is a ZERO, skip to location defined by *n*. If either S or C is present, the entire E register is set or cleared respectively.

Complement-Execute-DMA Group.

These seven instructions include complement operations and several special-purpose instructions chosen to speed up printing and extended memory operations.

CMA Complement A. The A register is replaced by its One's complement.

CMB Complement B. The B register is replaced by its One's complement.

TCA Two's Complement A. The A register is replaced by its One's Complement and incremented by one.

TCB Two's complement B. The B register is replaced by its One's Complement and incremented by one.

EXA Execute A. The contents of the A register are treated as the current instruction, and excuted in the normal manner. The A register is left unchanged unless the instruction code causes A to be altered.

EXB Execute B. Otherwise identical to EXA.

DMA Direct Memory Access. The DMA control in Extended Memory is enabled by setting the indirect bit in M and giving a WTM instruction. The next ROM clock transfers A → M and the following two cycles transfer B → M. ROM clock then remains inhibited until relased by DMA control.

Note: Special Restriction for Direct Register Reference of A or B

For the five register reference instructions which involve a write operation during execution, a register reference to A or B must be restricted to an INDIRECT reference. These instructions are STA, STB, ISZ, DSZ, and JSM. A DIRECT register reference to A or B with these instructions may result in program modification. (This is different from the hp 2116 in which a memory reference to the A or B register is treated as a reference to locations 0 or 1 respectively.) A reference to location 0 or 1 will actually refer to locations 0 or 1 in Read Only Memory.

Input/Output Group (IOG)

The eleven IOG instructions, when given with a select code, are used for the purpose of checking flags, setting or clearing flag and control flip-flops, and transferring data between the A/B registers and the I/O register.

STF <SC> Set the flag. Set the flag flip-flop of the channel indicated by select code <SC>.

CLF <SC> Clear the flag flip-flop of the channel indicated by select code <SC>.

SFC <SC> Skip if flag clear. If the flag flip-flop is clear in the channel indicated by <SC>, skip the next instruction.

SFS <SC> H/C Skip if flag set. If the flag flip-flop is set in the channel indicated by <SC>, skip the next instruction. H/C indicates if the flag flip-flop should be held or cleared after executing SFS.

CLC <SC> H/C Clear control. Clear the control flip-flop in the channel indicated by <SC>. H/C indicates if the flag flip-flop should be held or cleared after executing CLC.

STC <SC> H/C Set Control. Set the control flip-flop in the channel indicated by <SC>. H/C indicates if the flag flip-flop should be held or cleared after executing STC.

OT* <SC> H/C Output A or B. Sixteen bits from the A/B register are output to the I/O register. H/C allows holding or clearing the flag flop after execution of OT*. The different select codes allow different functions to take place after loading the I/O register.

SC=00 Data from the A or B register is output eight bits at a time for each OT* instruction given. The A or B register is rotated right eight bits.

SC=01 The I/O register is loaded with 16 bits from the A/B registers.

SC=02 Data from the A/B register is output one bit at a time for each OT* instruction for the purpose of giving data to the Magnetic Card Reader. The I/O register is unchanged.

SC=04 The I/O register is loaded with 16 bits from the A/B register and the control flip flop for the printer is then set.

SC=08 The I/O register is loaded with 16 bits from the A/B register and the control flip flop for the display is then set.

SC=16 The I/O register is loaded with 16 bits from the A/B register and then data in the I/O register is transferred to the switch latches.

LI* <01> H/C Load into A or B. Load 16 bits of data into the A/B register from the I/O register. H/C allows holding or clearing the flag flop after L1* has been executed.

LI* <00> The least significant 8 bits of the I/O register are loaded into the most significant locations in the A or B register.

MI* <01> H/C Merge into A or B. Merge 16 bits of data into the A/B register from the I/O register by inclusive or. H/C allows holding or clearing the flag flop after MT* has been executed.

MI* <00> The least significant 8 bits of the I/O register are combined by inclusive OR with the least significant 8 bits of the A or B register, and rotated to the most significant bit locations of the A or B register.

MAC Instruction Group

A total of 16 MAC instructions are available for operation a. with the whole floating-point data (like transfer, shifts, etc), or b. with two floating-point data words to speed up digit and word loops in arithmethic routines.

NOTE: $<A_{0-3}>$ means: contents of A-register bit 0 to 3

AR 1 is a mnemonix for arithmetic pseudo-register located in R/W memory on addresses 1744 to 1747 (octal)

AR 2 is a mnemonix for arithmetic pseudo-register located in R/W memory on addresses 1754 to 1757 (octal)

$D_i$ means: mantissas $i$-th decimal digit;
most significant digit is D1
least significant digit is D12
decimal point is located between D1 and D2

Every operation with mantissa means BCD-coded decimal operation.

RET Return 16-bit-number stored at highest occupied address in stack is transferred to P- and M-registers. Stack pointer (=next free address in stack) is decremented by one. <A>, <B>, <E> unchanged.

MOV Move overflow

The contents of E-register is transferred to $A_{0-3}$. Rest of A-register and E-register are filled by zeros. <B> unchanged.

CLR Clear a floating-point data register in R/W memory on location <A>

ZERO → <A>, <A>+1, <A>+2, <A>+3

<A>, >B>, <E> unchanged

EXF Floating-point data transfer in R/W memory from location <A> to location <B>.

Routine starts with exponent word transfer.
Data on location <A> is unchanged.
<E> unchanged.

MRX AR1 mantissa is shifted to right $n$-times. Exponent word remains unchanged.

$<B_{0-3}> = n$ (binary coded)

1st shift: $<A_{0-3}> \rightarrow D_1;\ D_i \rightarrow D_{i+1};\ D_{12}$ is lost
$j$th shift: $\theta \rightarrow D_1;\ D_i \rightarrow D_{i+1};\ D_{12}$ is lost
$n$th shift: $\theta \rightarrow D_1;\ D_i \rightarrow D_{i+1};\ D_{12} \rightarrow A_{0-3}$
$\theta \rightarrow E, A_{4-15}$
each shift: $<B_{0-3}> - 1 \rightarrow B_{0-3}$
$<B_{4-15}>$ unchanged MRY AR2 mantissa is shifted to right $n$-times. Otherwise identical to MRX MLS AR2 mantissa is shifted to left once. Exponent word remains unchanged.
$\theta \rightarrow D_{12};\ D_i \rightarrow D_{i-1};\ D_1 \rightarrow A_{0-3}$
<B> unchanged DRS AR1 mantissa is shifted to right once Exponent word remains unchanged
$\theta \rightarrow D_1;\ D_1 \rightarrow D_{i+1};\ D_{12} \rightarrow A_{0-3}$
ZERO → E and $A_{4-15}$
<B> unchanged DLS AR1 mantissa is shifted to left once. Exponent word remains unchanged.
$<A_{0-3}> \rightarrow D_{12};\ D_i \rightarrow D_{i-1};\ D_1 \rightarrow A_{0-3}$
$\theta \rightarrow E, A_{4-15}$
<B> unchanged FXA Fixed-point addition Mantissas in pseudo-registers AR2 and AR1 are added together and result in placed into AR2. Both exponent words remain unchanged. When overflow occurs 0001 is set into E-reg., in opposite case <E> will be zero.
<AR2> + <AR1> + DC → AR2
DC = $\theta$ if <E> was 0000 before routine execution
DC = 1 if <E> was 1111 before routine execution
<B>, <AR1> unchanged FMP Fast multiply Mantissas in pseudo-registers AR2 and AR1 are added together $<B_{0-3}>$-times and result is placed into AR2. Total decimal overflow is placed to $A_{0-3}$. Both exponent words remain unchanged.
$<AR2> + <AR1> * <B_{0-3}> + DC \rightarrow AR2$
DC = 0 if <E> was 0000 before routine execution
DC = 1 if <E> was 1111 before routine execution
ZERO → E, $A_{4-15}$
<AR1> unchanged FDV Fast divide Mantissas in pseudo-registers AR2 and AR1 are added together so many times until first decimal overflow occurs. Result is placed into AR2. Both exponent words remain unchanged. Each addition without overflow causes +1 increment of <B>.

1st addition: <AR2> + <AR1> + DC → AR2

DC = 0 if <E> was 0000 before routine execution

DC 32 1 if <E> was 1111 before routine execution next additions: <AR2> + <AR1> → AR2

ZERO → E

<AR1> unchanged

MX 10's complement of AR1 mantissa is placed back to AR1, and ZERO is set into E-register. Exponent word remains unchanged <B> unchanged

MY 10's complement of AR2 mantissa.

Otherwise identical to CMY

IDI Mantissa decimal increment.

Mantissa on location <A> is incremented by decimal ONE on $D_{12}$ level, result is placed back into the same location, and zero is set into E-reg.

Exponent word is unchanged.

When overflow occurs, result mantissa will be 1,000 0000 0000 (dec) and 0001 (bin) will be set into E-reg.

<B> unchanged.

NRM Normalization

Mantissa in pseudo-register AR2 is rotated to the left to get $D_1 \neq 0$. Number of these 4-bit left shifts is stored in $B_{0-3}$ in binary form (<$B_{4-15}$>=0)

when <$B_{0-3}$> = 0,1,2, . . . . , 11 (dec) ⇒ <E> = 0000

When <$B_{0-3}$> = 12 (dec) ⇒ mantissa is zero, and <E>= 0001

Exponent word remains unchanged

<A> unchanged.

The binary codes of all of the above instructions are listed in the following coding table, where * implies the A or B register, D/I means direct/indirect, A/B means A register/B register, Z/C means zero page (base page) (current page, H/S means hold test bit/set test bit, and H/C means hold test bit/clear test bit. D/I, A/B, Z/C, H/S and H/C are all coded as 0/1.

CODING TABLE

| GROUP | OCTAL | INSTR | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| MEMORY | -0---- | AD* | D/I | 0 | 0 | 0 | A/B | Z/C | ←MEMORY ADDRESS→ | | | | | | | | | |
| REFERENCE | -1---- | CP* | D/I | 0 | 0 | 1 | A/B | Z/C | | | | | | | | | | |
| GROUP | -2---- | LO* | D/I | 0 | 1 | 0 | A/B | Z/C | | | | | | | | | | |
| | -3---- | ST* | D/I | 0 | 1 | 1 | A/B | Z/C | | | | | | | | | | |
| | -4---- | IOR | D/I | 1 | 0 | 0 | 0 | Z/C | | | | | | | | | | |
| | -4---- | ISZ | D/I | 1 | 0 | 0 | 1 | Z/C | | | | | | | | | | |
| | -5---- | AND | D/I | 1 | 0 | 1 | 0 | Z/C | | | | | | | | | | |
| | -5---- | DSZ | D/I | 1 | 0 | 1 | 1 | Z/C | | | | | | | | | | |
| | -6---- | JSM | D/I | 1 | 1 | 0 | 0 | Z/C | | | | | | | | | | |
| | -6---- | JMP | D/I | 1 | 1 | 0 | 1 | Z/C | | | | | | | | | | |
| SHIFT- | 07---0 | A*R | 0 | 1 | 1 | | 1 | A/B | - | | - | ←SHIFT CODE→ | | | | 0 | 0 | 0 0 |
| ROTATE | 07---2 | S*R | 0 | 1 | 1 | | 1 | A/B | - | | - | | | | - | 0 | 0 | 1 0 |
| GROUP | 07---4 | S*L | 0 | 1 | 1 | | 1 | A/B | - | | - | | | | - | 0 | 1 | 0 0 |
| | 07---6 | R*R | 0 | 1 | 1 | | 1 | A/B | - | | - | | | | - | 0 | 1 | 1 0 |
| ALTER- | 07---0 | SZ* | 0 | 1 | 1 | 1 | A/B | 0 | ←SKIP CODE→ | | | | | 0 | 1 | 0 | 0 | 0 |
| SKIP | 07---0 | RZ* | 0 | 1 | 1 | 1 | A/B | 1 | | | | | | 0 | 1 | 0 | 0 | 0 |
| GROUP | 07---0 | SI* | 0 | 1 | 1 | 1 | A/B | 0 | | | | | | 1 | 1 | 0 | 0 | 0 |
| | 07---0 | RI* | 0 | 1 | 1 | 1 | A/B | 1 | | | | | | 1 | 1 | 0 | 0 | 0 |
| | 07---1 | SL* | 0 | 1 | 1 | 1 | A/B | H/S | | | | | | H/C | 1 | 0 | 0 | 1 |
| | 07---2 | S*M | 0 | 1 | 1 | 1 | A/B | H/S | | | | | | H/C | 1 | 0 | 1 | 0 |
| | 07---3 | S*P | 0 | 1 | 1 | 1 | A/B | H/S | | | | | | H/C | 1 | 0 | 1 | 1 |
| | 07---4 | SES | 0 | 1 | 1 | 1 | A/B | H/S | | | | | | H/C | 1 | 1 | 0 | 0 |
| | 07---5 | SEC | 0 | 1 | 1 | 1 | A/B | H/S | | | | | | H/C | 1 | 1 | 0 | 1 |
| D/I | 07--17 | ADA | 0 | 1 | 1 | 1 | A/B | - | - | D/I | 0 | 0 | 0 | 0 | 1 | 1 | 1 | 1 |
| REFERENCE | 07--37 | ADB | 0 | 1 | 1 | 1 | A/B | - | - | D/I | 0 | 0 | 0 | 1 | 1 | 1 | 1 | 1 |
| GROUP | 07--57 | CPA | 0 | 1 | 1 | 1 | A/B | - | - | D/I | 0 | 0 | 1 | 0 | 1 | 1 | 1 | 1 |
| | 07--77 | CPB | 0 | 1 | 1 | 1 | A/B | - | - | O/I | 0 | 0 | 1 | 1 | 1 | 1 | 1 | 1 |
| | 07--17 | LDA | 0 | 1 | 1 | 1 | A/B | - | - | D/I | 0 | 1 | 0 | 0 | 1 | 1 | 1 | 1 |
| | 07--37 | LDB | 0 | 1 | 1 | 1 | A/B | - | - | D/I | 0 | 1 | 0 | 1 | 1 | 1 | 1 | 1 |
| | 07-557 | STA | 0 | 1 | 1 | 1 | A/B | - | - | 1 | 0 | 1 | 1 | 0 | 1 | 1 | 1 | 1 |
| | 07-577 | STB | 0 | 1 | 1 | 1 | A/B | - | - | 1 | 0 | 1 | 1 | 1 | 1 | 1 | 1 | 1 |
| | 07--17 | IOR | 0 | 1 | 1 | 1 | A/B | - | - | D/I | 1 | 0 | 0 | 0 | 1 | 1 | 1 | 1 |
| | 07-637 | ISZ | 0 | 1 | 1 | 1 | A/B | - | - | 1 | 1 | 0 | 0 | 1 | 1 | 1 | 1 | 1 |
| | 07--57 | AND | 0 | 1 | 1 | 1 | A/B | - | - | D/I | 1 | 0 | 1 | 0 | 1 | 1 | 1 | 1 |
| | 07-677 | DSZ | 0 | 1 | 1 | 1 | A/B | - | - | 1 | 1 | 0 | 1 | 1 | 1 | 1 | 1 | 1 |
| | 07-717 | JSM | 0 | 1 | 1 | 1 | A/B | - | - | 1 | 1 | 1 | 0 | 0 | 1 | 1 | 1 | 1 |
| | 07--37 | JMP | 0 | 1 | 1 | 1 | A/B | - | - | D/I | 1 | 1 | 0 | 1 | 1 | 1 | 1 | 1 |
| COMP | 07-016 | EX* | 0 | 1 | 1 | 1 | A/B | - | - | - | - | - | 0 | 0 | 1 | 1 | 1 | 0 |
| EXECUTE | 070036 | DMA | 0 | 1 | 1 | 1 | 0 | - | - | - | - | - | 0 | 1 | 1 | 1 | 1 | 0 |
| DMA | 07-056 | CM* | 0 | 1 | 1 | 1 | A/B | - | - | - | - | - | 1 | 0 | 1 | 1 | 1 | 0 |
| | 07-076 | TC* | 0 | 1 | 1 | 1 | A/B | - | - | - | - | - | 1 | 1 | 1 | 1 | 1 | 0 |
| INPUT | 1727-- | STF | 1 | 1 | 1 | 1 | - | 1 | 0 | 1 | 1 | 1 | 1 | ←SELECT CODE→ | | | | |
| OUTPUT | 1737-- | CLF | 1 | 1 | 1 | 1 | - | 1 | 1 | 1 | 1 | 1 | 1 | | | | | |
| GROUP | 17-7-- | SFC | 1 | 1 | 1 | 1 | - | 1 | H/C | 1 | 1 | 1 | 0 | | | | | |
| | 17-5-- | SFS | 1 | 1 | 1 | 1 | - | 1 | H/C | 1 | 0 | 1 | 0 | | | | | |
| | 17-5-- | CLC | 1 | 1 | 1 | 1 | | 1 | H/C | 1 | 0 | 1 | 1 | | | | | |
| | 17-6-- | STC | 1 | 1 | 1 | 1 | - | 1 | H/C | 1 | 1 | 0 | 0 | | | | | |
| | 17-1-- | OT* | 1 | 1 | 1 | 1 | A/B | 1 | H/C | 0 | 0 | 1 | 1 | | | | | |
| | 17-2-- | LI* | 1 | 1 | 1 | 1 | A/B | 1 | H/C | 0 | 1 | 0 | 1 | | | | | |
| | 17-0-- | MI* | 1 | 1 | 1 | 1 | A/B | 1 | H/C | 0 | 0 | 0 | 1 | | | | | |
| MAC | 170402 | RET | 1 | 1 | 1 | 1 | 0 | 0 | 0 | 1 | 0 | 0 | 0 | 0 | 0 | 0 | 1 | 0 |
| GROUP | 170002 | MOV | 1 | 1 | 1 | 1 | 0 | 0 | 0 | 0 | 0 | 0 | 0 | 0 | 0 | 0 | 1 | 0 |

CODING TABLE-continued

| GROUP | OCTAL | INSTR | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| | 170000 | CLR | 1 | 1 | 1 | 1 | 0 | 0 | 0 | 00 | 0 | 0 | 0 | 0 | 0 | 0 | 0 | |
| | 170004 | XFR | 1 | 1 | 1 | 1 | 0 | 0 | 0 | 0 | 0 | 0 | 0 | 0 | 0 | 1 | 0 | 0 |
| | 174430 | MRX | 1 | 1 | 1 | 1 | 1 | 0 | 0 | 1 | 0 | 0 | 0 | 1 | 1 | 0 | 0 | 0 |
| | 174470 | MRY | 1 | 1 | 1 | 1 | 1 | 0 | 0 | 1 | 0 | 0 | 1 | 1 | 1 | 0 | 0 | 0 |
| | 171400 | MLS | 1 | 1 | 1 | 1 | 0 | 0 | 1 | 1 | 0 | 0 | 0 | 0 | 0 | 0 | 0 | 0 |
| | 170410 | DRS | 1 | 1 | 1 | 1 | 0 | 0 | 0 | 1 | 0 | 0 | 0 | 0 | 1 | 0 | 0 | 0 |
| | 175400 | DLS | 1 | 1 | 1 | 1 | 1 | 0 | 1 | 1 | 0 | 0 | 0 | 0 | 0 | 0 | 0 | 0 |
| | 170560 | FXA | 1 | 1 | 1 | 1 | 0 | 0 | 0 | 1 | 0 | 1 | 1 | 1 | 0 | 0 | 0 | 0 |
| | 171460 | FMP | 1 | 1 | 1 | 1 | 0 | 0 | 1 | 1 | 0 | 0 | 1 | 1 | 0 | 0 | 0 | 0 |
| | 170420 | FDV | 1 | 1 | 1 | 1 | 0 | 0 | 0 | 1 | 0 | 0 | 0 | 1 | 0 | 0 | 0 | 0 |
| | 174400 | CMX | 1 | 1 | 1 | 1 | 1 | 0 | 0 | 1 | 0 | 0 | 0 | 0 | 0 | 0 | 0 | 0 |
| | 170400 | CMY | 1 | 1 | 1 | 1 | 0 | 0 | 0 | 1 | 0 | 0 | 0 | 0 | 0 | 0 | 0 | 0 |
| | 170540 | MDI | 1 | 1 | 1 | 1 | 0 | 0 | 0 | 1 | 0 | 1 | 1 | 0 | 0 | 0 | 0 | 0 |
| | 171450 | NRM | 1 | 1 | 1 | 1 | 0 | 0 | 1 | 1 | 0 | 0 | 1 | 0 | 1 | 0 | 0 | 0 |

DETAILED LISTING OF ROUTINES AND SUBROUTINES OF BASIC INSTRUCTIONS

A complete listing of all of the routines and subroutines of basic instructions employed by the calculator and of all of the constants employed by these routines and subroutines is given below. All of these routines, subroutines, and constants are stored either in the basic ROM or in the plug-in ROM modules employed therewith. Each page within the listing is numbered at the upper left-hand corner, and its number within the specification as a whole is indicated at the bottom of the page. Each line of each page is separately numbered in the first column from the left-hand side of the page. This facilitates reference to different parts of the listing. Descriptive headings are also provided throughout the listing to identify routines, subroutines, groups of constants, different portions of the ROM, the plug-in ROM modules, etc. Each instruction of each routine or subroutine and each constant stored in the ROM or plug-in ROM modules is represented in octal form by six digits in the third column from the left-hand side of the page, and the address of the ROM location in which each such instruction or constant is stored is represented in octal form by five digits in the second column from the left-hand side of the page.

Mnemonic labels serving as symbolic addresses or names are given in the fourth column from the left-hand side of the page for most of the constants and many of the instructions to facilitate references to these constants and instructions and associated instructions. the mnemonic code of each basic instruction and of each pseudo instruction is given in the fifth column from the left-hand side of the page. As noted above, each basic instruction is employed as a step in a routine or subroutine of one or more basic instructions and therefore has an address in the ROM. Pseudo instructions such as ORG, EQU, etc. which appear (and are recognizable as not being one of the 71 basic machine instructions listed above) are used for control of the Assembler, which translates the symbolic/mnemonic coding of the fourth, fifth, and sixth columns into the address and contents of ROM registers which appear in the second and third columns. (See chapter 4 of the Hewlett-Packard "Assembler Programmer's Reference Manual" of April, 1970.) They are not employed as steps in the routines and subroutines performed by the calculator and therefore have no addresses in the ROM. Mnemonic operand codes are given in the sixth column from the left-hand side of the page, and descriptive comments are given to the right of the sixth column. The format, assembly, and use of the listing is explained in greater detail in the above-mentioned Hewlett-Packard "Assembler Programmer's Reference Manual".

In addition, cross-reference symbol tables are included directly below each group of routines and subroutines for providing an alphabetical listing of each of the mnemonic labels and operands. The number contained in the first column to the right of each mnemonic in the cross-reference table represents the line in the associated routine or subroutine listing at which that mnemonic appears as a label in column four. Subsequent columns beyond the first column to the right of each mnemonic in the cross-reference table represent the line in the associated routine or subroutine listing at which that mnemonic appears as an operand in column six.

#01 9830 MAIN SYSTEM SOFTWARE

```
                         ASMB,A,L,C
*  MAIN SYSTEM FIRMWARE LISTING  3-27-72
*
      00000                    ORG 0
*
      00000 164121             JMP START,I     START OF MONITOR
      00001 043060             OCT 43060       CONSTANT NEEDED BY PROCESSOR
      00002 161463             JSM INTFL,I     INTERRUPT
*
      00003 000000 C6          OCT 0           ONE
      00004 010000             OCT 010000      0000
      00005 000000             OCT 0           0000
*
      00006 000000 C5          OCT 000000      PI/2
      00007 012560             OCT 12560       1570
      00010 074543             OCT 074543      7963
      00011 023200             OCT 023200      2680
*
      00012 000001 .1          DEC 1
*
      00013 000400 C7          OCT 000400      180/PI
      00014 053451             OCT 053451      5729
```

```
00015 053571         OCT 053571      5779
00016 050450         OCT 050450      5128
*
00017 000002 .2      DEC 2
00020 000003 .3      DEC 3
00021 000004 .4      DEC 4
00022 000005 .5      DEC 5
00023 000006 .6      DEC 6
00024 000007 .7      DEC 7
00025 000010 .8      DEC 8
00026 000011 .9      DEC 9
00027 000013 .11     DEC 11
00030 000014 .12     DEC 12
00031 000015 CRTN    OCT 15
00031        EOL     EQU CRTN
00031        .13     EQU CRTN
********************
* POINTERS TO FUNCTIONS CONSTANTS
*
00027        DPERR   EQU .11         POINTER TO 180/PI
00023        PI/2    EQU .6          POINTER  TO PI/2
00020        ONE     EQU .3          POINTER TO THE CONSTANT ONE
*
********************
00032 000017 .15     DEC 15
00033 000020 .16     DEC 16
00034 000025 .21     DEC 21
00035 000026 .22     DEC 22
00036 000027 .23     DEC 23
00037 000034 .28     DEC 28
00040 000037 .31     DEC 31
00041 000040 .32     DEC 32
00042 000041 .33     DEC 33
00043 000042 .34     DEC 34
00044 000045 .37     DEC 37
00045 000050 .40     DEC 40
00046 000051 .41     DEC 41
00047 000053 .43     DEC 43
00050 000055 .45     DEC 45
00051 000056 .46     DEC 46
00052 000060 .48     DEC 48
00053 000072 .58     DEC 58
00054 000077 .63     DEC 63
00055 000111 I       OCT 111
00056 023420 .1E4    DEC 10000
00057 001750 .1000   DEC 1000
00060 000144 .100    DEC 100
00061 000012 .10     DEC 10
00061        LNFD    EQU .10
00062 100000 FLGBT   OCT 100000
00063 000143 .99     DEC 99
00064 100004 INTFL   OCT 100004
00065 076000 OPMSK   OCT 76000
00066 077777 INF     OCT 77777
00067 100037 TYPFL   OCT 100037
00070 101777 OPDMK   OCT 101777
00071 000105 E       OCT 105
00072 000106 F       OCT 106
00073 000123 S       OCT 123
00032        B17     EQU .15
00033        B20     EQU .16
00074 000022 B22     OCT 22
00075 000023 B23     OCT 23
00035        B26     EQU .22
00036        B27     EQU .23
00076 000036 B36     OCT 36
00040        B37     EQU .31
00043        B42     EQU .34
00077 000044 B44     OCT 44
00100 000052 B52     OCT 52
00053        B72     EQU .58
00101 000100 B100    OCT 100
00102 000133 B133    OCT 133
00103 000140 B140    OCT 140
00104 000177 B177    OCT 177
00105 000377 B377    OCT 377
00013        B400    EQU C7
00106 000777 B777    OCT 777
00107 001000 B1000   OCT 1000
00110 001400 B1400   OCT 1400
00111 001740 B1740   OCT 1740
00112 001760 B1760   OCT 1760
00113 001774 B1774   OCT 1774
00114 001775 B1775   OCT 1775
00115 001777 B1777   OCT 1777
00116 002000 OTOP    OCT 2000
00117 002400 B2400   OCT 2400
00120 003000 B3000   OCT 3000
00121 004000 B4000   OCT 4000
00122 006000 B6K     OCT 6000
```

```
00004        B10K  EQU C6+1
00004        RPOP  EQU B10K
00123 012000 B12K  OCT 12000
00123        RBOP  EQU B12K
00124 032000 EXPOP OCT 32000
00125 050000 LBOP  OCT 50000
00126 052000 LPOP  OCT 52000
00127 170000 B170K OCT 170000
00130 013777 FROMA OCT 13777
00131  37777 LROMA OCT 37777B    LAST ROM BLOCK
00132 177777 M1    DEC -1
00133 177776 M2    DEC -2
00134 177775 M3    DEC -3
00135 177774 M4    DEC -4
00136 177773 M5    DEC -5
00137 177772 M6    DEC -6
00140 177767 M9    DEC -9
00141 177766 M10   DEC -10
00142 177765 M11   DEC -11
00143 177764 M12   DEC -12
00144 177763 M13   DEC -13
00145 177762 M14   DEC -14
00146 177761 M15   DEC -15
00147 177751 M23   DEC -23
00150 177747 M25   DEC -25
00151 177740 M32   DEC -32
00152 177734 M36   DEC -36
00153 177720 M48   DEC -48
00154 177700 M64   DEC -64
00155 177660 M80   DEC -80
00156 177634 M100  DEC -100
00157 177400 M256  DEC -256
00160 176000 M1024 DEC -1024
00161 154360 MAXSN DEC -10000     -(MAXIMUM ALLOWABLE LINE NUMBER)
00162 043116 FN    ASC 1,FN
*
*  MATH CONSTANTS THAT ARE NEEDED ON BASE PAGE
*
00163 177401 ZAP   OCT 177401
00164 063440 MASK1 OCT 063440
00165 061400 MASK5 OCT 061400
*
00166 40440  FWAM  DEF 40440B     FIRST WORD R/W
00112        RSTKA EQU B1760       START OF RETURN STACK
00167 002454 WRITE DEF WRIT       PRINTER AND DISPLAY DRIVER
00170 002533 CLERA DEF CLEAR      CLEAR REFRESH BUFFER
00116        REED  EQU QTOP       KEYBOARD DRIVER QTOP IS = 2000B
00121        START EQU B4000
00171 004741 RUNA  DEF RUN        PHASE 2: SYMBOL TABLE
00172 010012 XEC4A DEF XEC4       STATEMENT EXECUTION EXIT
00173 004044 PEXMA DEF PEXMK
00174 004037 RDYDA DEF RDYPT
00122        LISTA EQU B6K
00175 003072 TSRHA DEF TBSRH      TABLE SEARCH
00176 007450 ELINA DEF OLINE      OUTPUT I/O BUFFER
00177 005305 SSYMA DEF SSYMT
00200 011433 OPCHA DEF OPCHK      CHECK FOR UNDEFINED OPERAND
00201 010563 FORMA DEF FORMX      EVALUATE FORMULA
00202 012040 FSCA  DEF FSC
00203 004511 ACTSA DEF ACTST
00204 004500 DELSA DEF DELST
00205 004355 AERRA DEF AERR
00206 004360 ERRA  DEF ERROR
00207 000000 INTFA BSS 1          KEYBOARD INTERRUPT LINK
00210 000000 OUTIA BSS 1          OUTPUT AN INTEGER
00211 003200 .BUFA DEF IOBUF+IOBUF   FIRST CHAR OF I/O BUFFER
00212 003322 .SLBF DEF RBUFF+RBUFF   FIRST CHAR OF REFRESH BUFFER
00213 001744 AR1A  DEF AR1
00214 001754 AR2A  DEF AR2
00215 001773 TMPOP DEF RES        RESULT REGISTER POINTER
00216 000000 .FADA BSS 1          ADD
00217 000000 .FSBA BSS 1          SUBTRACT
00220 000000 .FMPA BSS 1          MULTPY
00221 000000 .FDVA BSS 1          DIVIDE
00222 005447 ENTFA DEF ENTFN
00223 000000 .FSR  BSS 1          SQUARE ROOT
00224 000000 UPARA BSS 1          UP ARROW
00225 000000 FLTRA BSS 1
00226 000000 FLTFA BSS 1
00227 000000 FXFLA BSS 1
00230 000000 FLTSA BSS 1
00231 000000 SPLFA BSS 1
00232 000000 SNFLA BSS 1
00233 001551 BEND  DEF RBUFF      I/O BUFFER END
00233        SBUFA EQU BEND
00234 006353 NMOTA DEF NMOUT      NUMBER OUTPUT ROUTINE
00235 007027 FILLA DEF FILL       OUTPUT BLANKS
00236 003442 SLEND DEF RBUFF+RBUFF+80   REFRESH BUFFER END
00111        TMPA  EQU B1740
00110        BADRP EQU B1400      POINTER POINTER TO I/O BUFFER
```

#01 9830 MAIN SYSTEM SOFTWARE

```
*
00123        FOPBS EQU B12K
00237 016516 SALTA DEF SALT
00240 005257 MDIMA DEF MDIM
00241 010413 SYTSA DEF SYTSH
00242 005711 DCOMA DEF DCOMP
00243 000030 NUMCA BSS 1
00244 000000 NUMOA BSS 1
00245 007656 GTSTA DEF GETST
00246 012231 VAROA DEF VAROP
00247 010112 ECALA DEF ECAL       EXECUTE CALC MODE
00250 004625 OVCHA DEF UVCHK
00251 004575 CLPIA DEF CLPRI
00252 005416 ENTFA DEF ENTFR
00253 007672 CHRSA DEF CHRST
00254 003317 XSCRA DEF XSCRI      SCRATCH KEYS
00255 010040 XEC6A DEF XEC6
00256 010425 FDAAA DEF FDATA
00257 005660 FNDAA DEF FNDAD
00260 005671 FNDIA DEF FNDAI
00261 002547 IOSTA DEF IOST       I/O STATUS CHECK
00262 010467 INRFA DEF INRET
00263 003336 SUMPA DEF SUMP
00264 002504 CRCKA DEF CRCHK      OUTPUT SUPPRESSED CRLF
00265 016501 IOHEA DEF IOHED
00266 007240 OTCHA DEF OTCHK      CHECK FOR STRING
**********************************
*
00267 000000       BSS 1          CHECKSUM WORD****************
```

#01 9830--ERROR TABLE

```
00270 000625 E1   DEF SYSER   ROM CONFIGURATION ERROR
00271 000561      DEF FSCF4   MEMORY OVERFLOW
00272 004177      DEF NCALC   STMT NOT ALLOWED IN CALC MODE
00273 000726      DEF SYE25   MISSING OR BAD INTEGER
00274 004243 E5   DEF NSTMT   NO STATEMENT OR COMMAND RECOGNISED
00275 012134      DEF FSCF3   UNRECOGNISED OPERAND
00276 001152      DEF NOEOF   CHARS FOLLOW STMT LOGICAL END
00277 004307      DEF SYE15   MISSING PRINT DELIMETER
00300 004253      DEF UKERR   IMPROPER TYPING AID ASSIGNMENT
00301 003155 E10  DEF KERR    KEY UNDEFINED
00302 000000      BSS 1
00303 000000      BSS 1
00304 001165      DEF SYE12   SIGN GIVEN BUT NO NUMBER
00305 000511      DEF COMCF+1 MISSING COMMA
00306 000522 E15  DEF FSCF1   NO LEFT PAREN
00307 000535      DEF FSCF2   NO RIGHT PAREN
00310 016432      DEF ARRF1   MISSING SUBSCRIPT
00311 012452      DEF STRNP   STRING NOT PERMITTED
00312 007660      DEF NOST    MISSING OR BAD STRING
00313 007665 E20  DEF SYE14   NO CLOSING QUOTE
00314 012433      DEF SYNE4   MISSING OR BAD FUNCTION I.D.
00315 012515      DEF SYNE5   MISSING PARAMETER
00316 003504      DEF NDATA   MISSING OR BAD DATA ITEM
00317 007723      DEF SYNE7   MISSING THEN
00320 003565 E25  DEF MISOF   MISSING OF
00321 016461      DEF SYE13   MISSING VARIABLE
00322 012464      DEF SYNE8   MISSING FOR VARIABLE
00323 012473      DEF SYNE9   MISSING TO
00324 012500      DEF SYE10   MISSING STEP
00325 012522 E30  DEF SYNE6   MISSING ASSIGNMENT IN FOR STMT
00326 004273      DEF SYNE2   LET STMT HAS NO STORE
00327 003531      DEF FMTER   IMPROPER FORMAT SPEC
00330 016436      DEF SYNE3   MISPLACED COM STATEMENT
00331 005067      DEF CMERR   IMPROPER COM DECLARATION
00332 005037 E35  DEF MERS    ARRAY DOUBLY DEFINED
00333 005372      DEF SSYM3   PRECISION DOUBLY DEFINED
00334 005353      DEF SYME2   INCONSISTENT DIMENSIONS
00335 005157      DEF MER10   ARRAY HAS UNKNOWN DIMENSIONS
00336 005276      DEF MER9    DIMENSIONS TOO LARGE
00337 011440 E40  DEF ER8     OPERAND IS UNDEFINED
00340 005421      DEF NINIT   ARRAY OR STRING NOT INITIALIZED
00341 011240      DEF ER6     SUBSCRIPT EXCEEDS BOUNDS
00342 007372      DEF SCERR   SELECT CODE LESS THAN 1 OR GTR THAN 15
00343 010224      DEF NGOTO   LINE NOT FOUND OR IMPROPER STMT FOUND
00344 007064 E45  DEF TABER   STATEMENTS USING FORMAT CANNOT USE TAB
00345 007414      DEF FNEST   STATEMENTS USING FORMAT CANNOT BE NESTED
00346 010231      DEF ER3     IMPROPER RETURN
00347 010335      DEF BERR    IMPROPER FOR LOOP
00350 010444      DEF ER60    OUT OF DATA
00351 010041 E50  DEF MER11   LAST STMT IS NOT "END"
00352 000000      BSS 1
00353 000000      BSS 1
00354 000000      BSS 1
00355 000000      BSS 1
```

#01 BASE PAGE ROUTINES

```
*
*  MULTI EXIT POINT RETURNS
*
00356 060365 RETN3 JSM RET2        RETURN TO P+3
00357 031401 RETN2 STA RSAVE       RETURN TO P+2
00360 021777       LDA RSPTR
00361 000132       ADA M1
00362 070637       ISZ A,I         INCREMENT RETURN ADDRESS
00363 021401       LDA RSAVE       RESTORE (A)
00364 170402       RET
*
00365 031401 RET2  STA RSAVE
00366 021777       LDA RSPTR
00367 000133       ADA M2
00370 070637       ISZ A,I         INCREMENT RETURN ADDRESS
00371 021401       LDA RSAVE       RESTORE (A)
00372 170402       RET
*
00373 024212 ICNT  LDB .SLBF       GET SINGLE LINE CHARACTER COUNT
00374 074117 WBUFF LDA B
00375 070076       TCA
00376 001400       ADA BADDR       COMPUTE CHAR COUNT
00377 170402       RET
*
*  GET A PARAMETER IN (B) FROM P+1
*
00400 025777 GPARM LDB RSPTR
00401 004133       ADB M2
00402 074637       ISZ B,I
00403 074537       LDB B,I
00404 065375       JMP FIX+4
*
*  TRANSFER FROM AR2 TO AR1
*
00405 024213 XFAR1 LDB AR1A
00406 020214       LDA AR2A
00407 170004       XFR
00410 004134       ADB M3          RESTORE (B)
00411 170402       RET
*
*  CONVERT AND STORE AN OPERAND VALUE
*
*     AR2= SOURCE
*     (A)= DESTINATION TYPE
*     (B)= DESTINATION ADDRESS
*
00412 125413 RSULT LDB HSTPT,I
00413 045413       ISZ HSTPT
00414 121413       LDA HSTPT,I
00415 045413       ISZ HSTPT
00416 070206 STORE RAR 5           IF BIT 4=1
00417 071352       SAM XFAR1+1       IT IS FULL PRECISION
00420 070602       SAR 13          NO, GET PRECISION BITS
00421 071250       SZA XFAR1+1       FULL?
00422 035727       STB MBIN2       SAVE ADDRESS
00423 010012       CPA .1          NO, SPLIT?
00424 064441       JMP STOR2       YES
00425 060405 STOR1 JSM XFAR1       INTEGER: SAVE IN AR1
00426 160225       JSM FLTRA,I     CONVERT INTEGER
00427 064432       JMP INTOV       OVERFLOW EXIT
00430 135727       STB MBIN2,I     STORE INTEGER
00431 064444       JMP XFAR2       RESTORE AR2
00432 160205 INTOV JSM AERRA,I     EMIT OVERFLOW
00433 177627       DEC -105        INTEGER OVERFLOW
00434 024066       LDB INF         SET MAXIMUM POSITIVE INTEGER
00435 021744       LDA AR1         GET MANTISSA SIGN
00436 071511       SLA STOR1+3     POSITIVE?
00437 074076       TCB             NO
00440 064430       JMP STOR1+3
00441 060405 STOR2 JSM XFAR1       SAVE IN AR1
00442 025727       LDB MBIN2       RECALL ADDRESS
00443 160230       JSM FLTSA,I     CONVERT TO SPLIT AND STORE
*
00444 020213 XFAR2 LDA AR1A
00445 024214       LDB AR2A
00446 170004       XFR
00447 170402       RET
*  STORE AN OPERAND NAME AND TYPE
*
*     (A)= ASCII CODE FOR LETTER
*     ENTER AT STROP+1 WITH PRE:ADJUSTED OPERAND TYPE
*     EXIT* (A)= COMPLETED OPERATOR-OPERAND PAIR
*
00450 004151 STROP ADB M32         NUMERICALLY ADJUST OPERAND TYPE
00451 000154       ADA M64         GET 5 BIT CODE FOR OPERAND NAME
00452 070544       SAL 5           COMBINE THE
00453 074217       IOR B           TWO OPERAND PARTS AND THE
00454 141706       IOR SBPTR,I       OPERATOR-OPERAND PAIR
*
*  UPDATE SYNTAX BUFFER POINTER AND CHECK FOR OVERFLOW
```

#01 BASE PAGE ROUTINES

```
*
00455 131706        STA SBPTR,I    STORE (A) BEFORE UPDATE
00456 045706 SBPUD  ISZ SBPTR      UPDATE POINTER
00457 131706        STA SBPTR,I    SAVE (A)
00460 170402        RET
*
*  FIND AND STORE ONE-CHARACTER OPERATORS
*     (A)=SOURCE CHARACTER
*     (B)=NUMBER OF ENTRIES TO BE SEARCHED
*     P+1=STARTING TABLE ADDRESS-1
*
00461 024017 SYMC2  LDB .2         ALTERNATE ENTRY TO SEARCH TWO SYMBOLS
00462 064464        JMP SYMCK
00463 024012 SYMC1  LDB .1         ALTERNATE ENTRY TO SEARCH ONE SYMBOL
*
00464 035466 SYMCK  STB LOCL1      SAVE # TO BE SEARCHED
00465 031467        STA LOCL2      SAVE SOURCE CHARACTER
00466 060400        JSM GPARM      GET STARTING ADDRESS
00467 074070 SYM1   SIB *+1        INCREMENT TABLE ADDRESS
00470 074517        LDA B,I        GET TABLE ENTRY
00471 070342        SAR 8          POSITION IT
00472 011467        CPA LOCL2      MATCH SOURCE CHAR?
00473 064500        JMP SYM2       YES
00474 055466        DSZ LOCL1      NO, CONTINUE SEARCH?
00475 064467        JMP SYM1       YES
00476 021467        LDA LOCL2      NO, RESTORE CHARACTER
00477 170402        RET            RETURN TO P+2- NOT FOUND
00500 020123 SYM2   LDA FOPRS      COMPUTE
00501 070076        TCA
00502 074017        ADA B            OP-CODE
00503 064543        JMP STSRH+4    SHIFT-STORE-RETURN TO P+3
*
*  CHECK FOR A COMMA
*
00504 060463 COMCK  JSM SYMC1      CHECK FOR
00505 012001        DEF 12001B     COMMA-1
00506 170402        RET            NOT FOUND - RETURN TO P+1
00507 064357        JMP RETN2      FOUND- RETURN TO P+2
*
00510 060504 COMCE  JSM COMCK      CHECK FOR COMMA
00511 160206        JSM ERRA,I     ERROR IF NOT FOUND
00512 170402        RET
*
*  CHECK FOR LEFT PARENTHESIS
*
00513 060461 LPCK   JSM SYMC2      LEFT PAREN
00514 012023        DEF 12023B     LBRAC-1
00515 170402        RET            NO, RETURN TO P+1
00516 020126        LDA LPOP       YES, RECODE A LEFT
00517 064544        JMP STSRH+5      PAREN AND RETURN TO P+2
*
00520 061055        JSM GNEXT      GET NEXT CHAR
00521 060513 LPCKE  JSM LPCK       DEMAND A
00522 160206 FSCE1  JSM ERRA,I       LEFT PAREN OR BRACKET
00523 170402        RET
*
*  CHECK FOR RIGHT PARENTHESIS
*
00524 060461 RPCK   JSM SYMC2      RIGHT PAREN
00525 012003        DEF 12003B     PRAN-1
00526 170402        RET            NO, RETURN TO P+1
00527 020004        LDA RPOP       YES, RECODE A RIGHT
00530 060455        JSM SBPUD-1      PAREN AND INC SBPTR
00531 061055        JSM GNEXT      GET NEXT CHAR
00532 064357        JMP RETN2      RETURN TO P+2
*
00533 061055        JSM GNEXT      GET NEXT CHAR
00534 060524 RPCKE  JSM RPCK       DEMAND A RIGHT
00535 160206 FSCE2  JSM ERRA,I       LEFT PAREN OR BRACKET
00536 170402        RET
*
*  SEARCH TABLE AND STORE OP CODE IF FOUND
*
00537 160175 STSRH  JSM TSRHA,I    SEARCH TABLE
00540 170402        RET            NOT FOUND
00541 031466        STA LOCL1      SAVE OP CODE
00542 050040        AND B37        GET 5 BIT CODE
00543 070304        SAL 10         SHIFT AND
00544 131706        STA SBPTR,I      STORE OP CODE
00545 064357        JMP RETN2      RETURN TO P+2
*
*  SEARCH TABLE AND STORE EXPANDED OP CODE
*
00546 160175 STEXP  JSM TSRHA,I    SEARCH TABLE
00547 170402        RET
00550 070544        SAL 5          ASSEMBLE AND
00551 040045        IOR OPMSK        STORE
00552 064544        JMP STSRH+5
*
```

```
*  BUMP H-STACK POINTER AND CHECK FOR OVERFLOW
*
00553 055413 BHSTP DSZ HSTPT     DINC POINTER
00554 025413       LDB HSTPT
00555 074076       TCB
00556 005412       ADB LSTPT
00557 004017       ADB .2
00560 075012       SBM STSRH+1   OVERLAP?  RETURN IF NOT
00561 160206 MERR  JSM ERRA,I
*
00561        FSCE4 EQU MERR
*
*  STACK (B) ON L-STACK AND CHECK OVERFLOW
*
00562 025421       LDB PRADD
00563 045412 SLWST ISZ LSTPT     INC POINTER
00564 135412       STB LSTPT,I   STORE VALUE
00565 064554       JMP BHSTP+1   CHECK FOR OVERFLOW
*
*   FETCH TOP OF L-STACK
*
00566 031421       STA PRADD
00567 121412 UNSTK LDA LSTPT,I
00570 055412       DSZ LSTPT
00571 170402       RET
*
*  PREPARE FOR BRANCH THROUGH TABLE
*
00572 025421       LDB PRADD
00573 035472       STB TEMPS
00574 125472 NEXTL LDB TEMPS,I   READ AND SAVE
00575 074073       SBP *+1,C     CLEAR SECURITY BIT
00576 035427       STB .LNUM       CURRENT LINE NUMBER
00577 025472       LDB TEMPS     FIND ADDRESS
00600 061007       JSM NEXTA       OF NEXT STATEMENT
00601 035421       STB PRADD     SAVE IT
00602 045472       ISZ TEMPS
00603 125472       LDB TEMPS,I   READ OP CODE
00604 074073       SBP *+1,C
00605 045472       ISZ TEMPS
00606 074442 NEXTI SBR 10
00607 074076       TCB           GET NEGATIVE OF OP CODE
00610 035466       STB LOCL1     SAVE -(OP CODE)
00611 121472       LDA TEMPS,I
00612 050065       AND OPMSK     GET PAGE
00613 024130 FPAGE LDB FROMA     GET FIRST TABLE ADDRESS
00614 074457       CPA B,I       IS THIS THE PAGE?
00615 170402       RET           YES, (B) = LAST WORD OF PAGE
00616 014131       CPB LROMA     ALL ROM'S SEARCHED?
00617 064622       JMP FPAG1     YES, CHECK BINARY AREA
00620 004116       ADB UTOP      NO, CHECK NEXT ROM
00621 064614       JMP FPAGE+1
00622 025403 FPAG1 LDB MAW
00623 111403       CPA MAW,I     IS CODE IN R/W?
00624 170402       RET           YES, (B) = MAW
00625 160206 SYSER JSM ERRA,I    NO, THE PROPER BLOCK IS NOT IN
*
*
*
*  SAVE BADDR AND SBPTR
*
00626 025400 SAVBP LDB BADDR
00627 035715       STB SBADR
00630 025706       LDB SBPTR
00631 035716       STB SSBPT
00632 170402       RET
*
*  RESTORE BADDR AND SBPTR
*
00633 021715 RESB1 LDA SBADR
00634 031400       STA BADDR
00635 021716       LDA SSBPT
00636 031706       STA SBPTR
00637 170402       RET
*
00640 060633 RESBP JSM RESB1
00641 121706       LDA SBPTR,I   ERASE
00642 050065       AND OPMSK       OPERAND
00643 131706       STA SBPTR,I
00644 170402       RET
*
*  SCRATCH SYMBOL TABLE AND INITIALIZE STACKS
*
00645 025404 MINIT LDB LWAM
00646 035407       STB SYMTP
00647 035406       STB VALUE
00650 064653       JMP INITS+2
*
*  INITIALIZE STACKS FOR SYNTAX
*
```

```
00651 020662 INITS LDA HFLGA
00652 170000       CLR            CLEAR HALT AND TRACE FLAGS
00653 025426       LDB PBPTO      SCRATCH L-STACK
00654 004132       ADB M1
00655 035412       STB LSTPT
00656 025407 INITI LDB SYMTP      SCRATCH H-STACK
00657 074070       SIB *+1
00660 035413       STB HSTPT
00661 164242       JMP UCOMA,I    RESET DATA POINTERS
00662 001436 HFLGA DEF HFLGI
*
* SUBROUTINE TO BUILD A PROGRAM INTEGER LESS THAN 10000
*
00663 055400       DSZ BADDR      BACK UP POINTER
00664 024161 LNUM  LDB MAXSN      CALL PGINT WITH -10000
00665 145706       ISZ SBPTR,I    FLAG FOR RESEQUENCABLE INTEGER
*
* SUBROUTINE TO BUILD A PROGRAM INTEGER AND STORE IT
*   IN THE S-BUFFER AND FLAG THE PREVIOUS WORD
*   (B)=-(MAXIMUM ALLOWABLE INTEGER)
*
00666 121706 PGINT LDA SBPTR,I    SET
00667 072053       SAP *+1,S        "INTEGER
00670 000020       ADA .3              FOLLOWS"
00671 060455       JSM SBPUD-1           FLAG
00672 035477       STB TEMP4      SAVE UPPER LIMIT
00673 061055       JSM GNEXT
00674 064677       JMP INTCK+1
*
* SUBROUTINE TO BUILD AN INTEGER AND STORE IT IN SBUFFER
*   (A)=FIRST CHARACTER
*   (B)=-(MAXIMUM ALLOWABLE INTEGER)
*
00675 024161       LDB MAXSN      BUILD A LINE #
*
00676 035477 INTCK STB TEMP4      SAVE UPPER LIMIT
00677 074742       SBR 16         INITIALIZE
00700 035722       STB INTGR        PARTIAL RESULT
00701 060750       JSM DIGCK      1ST CHAR A DIGIT?
00702 064725       JMP SYE25-1    NO
00703 060750 INTCI JSM DIGCK      DIGIT?
00704 064716       JMP INTC2      NO
00705 021722       LDA INTGR      RECALL PARTIAL RESULT
00706 035722       STB INTGR      SAVE LATEST DIGIT
00707 024061       LDB .10        MULTIPLY PARTIAL
00710 061201       JSM IMPY       RESULT BY 10
00711 001722       ADA INTGR      ADD LATEST DIGIT
00712 070552       SAM SYE25-1    SKIP IF OVERFLOW
00713 031722       STA INTGR      STORE PARTIAL RESULT
00714 061055       JSM GNEXT      GET NEXT CHARACTER
00715 064703       JMP INTC1
00716 025722 INTC2 LDB INTGR      SKIP THROUGH LINK
00717 135706       STB SBPTR,I    STORE INTEGER
00720 074252       SZB SYE25-1    IF ZERO
00721 005477       ADB TEMP4      SUBTRACT LIMIT
00722 076153       SBP SYE25-1,S   SKIP IF TOO LARGE
00723 025722       LDB INTGR      RETURN WITH
00724 064456       JMP SBPUD        INTEGER IN (B); NEXT CHAR IN (A)
00725 045724       ISZ GFLAG      RETURN ON ERROR FLAG SET?
00726 160206 SYE25 JSM ERRA,I     NO
00727 064357       JMP RETN2      YES, RETURN TO P+2
*
* GET ADDRESSES FOR SYSTEM COMMANDS
*
*   RETURN: TEMP4= ADDRESS OF FIRST LINE
*           (B)= ADDRESS OF LAST LINE+1
*
00730 074070 GFTAD SIB *+1        ADD 1 TO SECOND TO
00731 035477       STB TEMP4        MAKE ADDRESS INCLUSIVE
00732 074076       TCB            IS FIRST
00733 070037       ADB A            GREATER
00734 075513       SBP SYE25      THAN SECOND
00735 061075       JSM FNDPS      FIND ADDRESS OF FIRST
00736 064740       JMP *+2
00737 064740       JMP *+1
*
* CALL FNDPS AND RETURN TO P+1
*
00740 021477       LDA TEMP4
00741 035477       STB TEMP4
00742 061075 FND   JSM FNDPS
00743 170402       RET
00744 170402       RET
00745 170402       RET
*
* CHECK IF CHAR IN (A) IS A DIGIT
*   RETURN TO P+1 IF NOT FOUND
*   RETURN TO P+2 IF FOUND; ASCII IN (A); DIGIT IN (B)
*
```

```
00746 030071 DLIMT OCT 30071      0-9
00747 040532 LLIMT OCT 40532      A-Z
00750 024746 DIGCK LDB DLIMT      LODA LIMITS FOR DIGITS
00751 064753       JMP LIMIT      CHECK LIMITS AND RETRUN
*
* CHECK IF CHAR IN (A) IS A LETTER
*    RETURN TO P+1 IF NOT FOUND
*    RETURN TOP+2 IF FOUND
*
00752 024747 LETCK LDB LLIMT      LOAD LIMITS FOR LETTER
*                  ENTER INTO LIMIT DIRECTLY
*
00753 035466 LIMIT STB LOCL1      SAVE LIMITS
00754 074346       RBR 8
00755 074342       SBR 8          GET UPPER LIMITS
00756 074056       CMB
00757 070037       ADB A          CODE EXCEEDS
00760 075253       SBP END+3      UPPER LIMIT?
00761 025466       LDB LOCL1      NO
00762 074342       SBR 8          GET LOWER LIMIT
00763 074076       TCB
00764 070037       ADB A          CODE LESS THAN
00765 075012       SBM END+3      LOWER LIMIT
00766 070137       LDB A          NO, CODE IN LIMITS
00767 004153       ADB M48       YES, RETURN TO P+2
00770 064357       JMP RETN2
*
*  GET OPERAND
*
00771 121472 GTOPP LDA TEMPS,I
00772 050070       AND OPDMK
00773 170402       RET
***
*
00774 000000       BSS 10
*
***
*
*
*
* COMPUTE ADDRESS OF NEXT LINE
*
01006 035466       STB LOCL1
01007 074117 NEXTA LDA B            SAVE ADDRESS OF CURRENT LINE
01010 070070       STA *+1        GET
01011 070517       LDA A,I           STATEMENT
01012 050104       AND B177            LENGTH
01013 070037       ADB A            COMPUTE ADDRESS OF NEXT LINE
01014 170402       RET
*
*
*    THIS SUBROUTINE STORES A CHARACTER
*    IN A BUFFER.  THE BUFFER POINTER
*    IS USED TO INDICATE WHERE IN THE
*    BUFFER THE CHARACTER IS TO BE STORED
*    THE BUFFER IS UNDISTURBED EXCEPT
*    WHERE THE POINTER POINTS.
*
*
*    ENTRY CONDITIONS:
*        (B)=BUFFER POINTER POINTER
*        (A)=CHARACTER TO BE STORED
*            RIGHT JUSTIFIED WITH LEADING 0'S
*
*
*
*
01015 020041 OBLNK LDA .32
01016 024110 ONEXT LDB BADRP        OPTIONAL ENTRY POINT
01017 031467 OUTCR STA LOCL2       SAVE CHARACTER TO BE STORED
01020 074517       LDA B,I         FETCH BUFFER POINTER
01021 011623       CPA PEND        AT I/O END?
01022 170402       RET             YES
01023 074637       ISZ B,I         BUMP BUFFER POINTER
01024 070137       LDB A
01025 074006       RBR 1
01026 070002       SAR 1
01027 070517       LDA A,I         FETCH BUFFER WORD
01030 074112       SBM *+2
01031 070346       RAR 8           SET A TO STORE IN LEFT HALF
01032 050157       AND M256
01033 041467       IOR LOCL2
01034 074132       SBM *+2,C
01035 070346       RAR 8           ROTATE IF FLAG WAS SET
01036 074557       STA B,I         STORE NEW BUFFER WORD
01037 170402       RET
*
*
*    THIS SUBROUTINE FETCHES
*    A CHARACTER FROM A BUFFER
```

```
*
*
*    ENTRY CONDITIONS:
*        (B)=BUFFER POINTER POINTER
*
*
*    EXIT CONDITIONS:
*        (A)=8-BIT CHARACTER
*        (B)=BUFFER POINTER POINTER
*
*
*
01040 024110       LDB BADRP     GET NEXT CHAR FROM I/O BUFFER
01041 035466 GETCH STB LOCL1     SAVE POINTER POINTER
01042 074517       LDA B,I       FETCH BUFFER POINTER
01043 070002       SAR 1
01044 070517       LDA A,I       FETCH TWO CHARACTERS
01045 074537       LDB B,I
01046 074111       SLB GET1     TOP HALF WORD?
01047 070346       RAR 8        NO, MOVE RIGHT HLAF TO LEFT
01050 070342 GET1  SAR 8        TAKE TOP HALF
01051 145466       ISZ LOCL1,I  BUMP POINTER
01052 170402       RET           YES
*
01053 024111 GTMP  LDB TMPA
01054 065041       JMP GETCH
*
*
01055 024110 GNEXT LDB BADRP    GET CHAR, AND CONVERT
01056 061362       JSM GTCON
01057 011707       CPA BLANK    BLANK?
01060 065055       JMP *-3      YES, IGNORE IT
01061 170402       RET          YES, RETURN TO P+1
*
* GET CHARACTER ROUTINES
*
01062 020233 GFRST LDA SBUFA
01063 031706       STA SBPTR    INITIALIZE SYNTAX BUFFER POINTER
01064 020211       LDA .BUFA    SET BUFFER POINTER TO START
01065 031400       STA BADDR    OF I/O BUFFER
01066 061055 GETSK JSM GNEXT    GET A CHARACTER
01067 010031       CPA EOL      END OF LINE?
01070 170402       RET          YES, RETURN TO P+1
01071 064357       JMP RETN2    NO, RETURN TO P+2
*
* FIND SEQUENTIAL POSITION OF LINE # GIVEN IN (A)
*
*    RETURN P+1:BEYOND END OF PROGRAM
*           P+2:BETWEEN LINES
*           P+3:FOUND
*           TEMP3=(B)=ADDRESS OF LINE OR NEXT LINE IN SEQUENCE
*           LSTLN=LINE NUMBER OF PREVIOUS LINE
*
01072 120233       LDA SBUFA,I  GET SYNTAX SEQUENCE #
01073 031431       STA CLINE    SAVE FOR LIST ROUTINE
01074 031427       STA .LNUM
01075 031476 FNDPS STA TEMP3    SAVE SEQUENCE #
01076 025424       LDB PBUFF
01077 015423 FNDP1 CPB PBPTR    END OF PROGRAM?
01100 065117       JMP FNDP4    YES, RETURN TO P+1
01101 074517       LDA B,I      GET CURRENT #
01102 070073       SAP *+1,C    CLEAR SECURE BIT
01103 070510       SZA FNDP2    EXIT P+3 IF TYPING AID KEY
01104 070076       TCA          SUBTRACT CURRENT # FROM
01105 001476       ADA TEMP3       DESIRED #
01106 070412       SAM FNDP3    CURRENT>DESIRED? IF YES, P+2
01107 070330       SIA FNDP2    EQUAL?  IF YES,P+3 (A)=1
01110 074517       LDA B,I      SAVE
01111 070073       SAP *+1,C
01112 031720       STA LASTN      CURRENT LINE
01113 061007       JSM NEXTA    COMPUTE ADDRESS OF NEXT LINE
01114 065077       JMP FNDP1
01115 060365 FNDP2 JSM RET2     P+3
01116 060365 FNDP3 JSM RET2     P+2
01117 035476 FNDP4 STB TEMP3    P+1, SAVE STATEMENT ADDRESS
01120 170402       RET
*
* MOVE WORDS TO HIGHER MEMORY
*
*    TEMP2=LAST WORD+1 OF SOURCE
*    TEMP3=FIRST WORD OF SOURCE
*    TEMP4=LAST WORD+1 OF DESTINATION
*
01121 025475 MVTOH LDB TEMP2    FETCH SOURCE ADDRESS
01122 015476       CPB TEMP3    ALL RELOCATION DONE?
01123 170402       RET
01124 055477       DSZ TEMP4    BACK UP DESTINATION POINTER
01125 004132       ADB M1       BACK UP SOURCE POINTER
01126 074517       LDA B,I      MOVE
01127 131477       STA TEMP4,I    WORD
```

```
01130 065122        JMP MVTOH+1
*
*  FETCH AN INTEGER ALLOWING ZERO
*
01131 020132 PGIN0 LDA M1       FLAG TO RETURN
01132 031724       STA GFLAG      ON OVERFLOW OR 0
01133 060666       JSM PGINT    FETCH INTEGER
01134 170402       RET          WITHIN LIMITS
01135 045706       ISZ SHPTR    OVERFLOW OR ZERO; UPDATE POINTER
01136 075710       SZB *-2      SKIP IF ZERO
01137 064726       JMP SYE25    MUST BE OVERFLOW
*
*  FETCH A LETTER
*     EXIT:P+1 IF  NEXT CHAR IS NOT A LETTER;CHAR IN (A)
*          P+2 IF LETTER; LETTER IN TEMP1; NEXT CHAR IN (A) AND TEMP2
*
01140 061055 LTR   JSM GNEXT
01141 060752       JSM LETCK    LETTER?
01142 170402       RET          NO, RETURN TO P+1
01143 031474       STA TEMP1    YES, SAVE IT
01144 061055       JSM GNEXT
01145 031475       STA TEMP2    SAVE SECOND CHARACTER
01146 064357       JMP RETN2    RETURN TO P+2
*
*  END AND RESTORE STATEMENT SYNTAX
*
01147 061055 ENDS  JSM GNEXT    CHECK FOR ADDITIONAL CHARACTERS
01150 045706       ISZ SHPTR
01151 061153 EOST  JSM EOLCK
01152 160206 NOEOF JSM ERRA,I
*
*  SUBROUTINE TO CHECK FOR EOL
*
01153 010031 EOLCK CPA EOL      EOL?
01154 164203       JMP ACTSA,I  YES, JUMP DIRECTLY TO ACTST
01155 170402       RET
*
*  INPUT A CONSTANT
*
01156 061166 CONST JSM GSIGN    GET SIGN
01157 035721       STB SIGN     STORE IT
01160 160243       JSM NUMCA,I  FETCH UNSIGNED NUMBER
01161 065163       JMP CONS3    NONE FOUND
01162 064357       JMP RETN2    FOUND, RETURN TO P+2
01163 025721 CONS3 LDB SIGN
01164 074610       SZB GSIGR    SKIP IF NO SIGN GIVEN
01165 160206 SYE12 JSM ERRA,I   SIGN GIVEN WITHOUT NUMBER
*
*  GET THE SIGN OF A NUMBER
*
01166 061055 GSIGN JSM GNEXT
01167 074742       SBR 16
01170 010047       CPA =43      "+"?
01171 074230       SIB GSIG1+1  YES
01172 010050       CPA =45      "-"?
01173 024132       LDB M1       YES
01174 074210 GSIG1 SZB GSIGR    SKIP IF NO SIGN GIVEN
01175 035470       STB L2T1     SAVE SIGN
01176 061055       JSM GNEXT    GET CHARACTER FOLLOWING SIGN
01177 025470       LDB L2T1     RECALL SIGN
01200 170402 GSIGR RET
*
*  MULTIPLY 2 INTEGERS IN (A) AND (B) AND RETURN
*    RESULT IN (A); IF PRODUCT > 32K, (A)<0
*
01201 031466 IMPY  STA MCAND    SAVE MULTIPLICAND
01202 070742       SAR 16       INITIALIZE PRODUCT
01203 074151 IMPY1 SLB *+3      SKIP IF MULTIPLIER BIT IS ZERO
01204 001466       ADA MCAND    ADD MULTIPLICAND TO PRODUCT
01205 071552       SAM IMPYR    SKIP IF RESULT >32K
01206 074002       SBR 1        SHIFT MULTIPLIER RIGHT
01207 075450       SZB IMPYR    RETURN IF FINISHED
01210 031467       STA PROD     SAVE PRODUCT
01211 021466       LDA MCAND    MULTIPLY
01212 001466       ADA MCAND      MULTIPLICAND
01213 071252       SAM IMPYR    SKIP IF RESULT >32K
01214 031466       STA MCAND         BY 2
01215 021467       LDA PROD     RECALL PRODUCT
01216 065203       JMP IMPY1
01200        IMPYR EQU GSIGR
*
*  EVALUATE FORMULA AND FETCH RESULT TO AR2
*
01217 160201 FETCH JSM FORMA,I  EVALUATE FORMULA
01220 160200       JSM OPCHA,I  GET ADDRESS OF RESULT
01221 045413       ISZ HSTPT
01222 045413       ISZ HSTPT    REMOVE FROM STACK
01223 074117       LDA B
01224 064445       JMP XFAR2+1  TRANSFER TO AR2
*
```

#01 BASE PAGE ROUTINES

```
*  SUBROUTINE TO LEAVE KEY DEFINITION MODE
*
   01225 021422 LDEF   LDA UKPTR
   01226 070410        SZA *+8
   01227 021425        LDA PBUFO
   01230 031424        STA PBUFF       RESTORE PBUFF
   01231 021426        LDA PBPTO
   01232 031423        STA PBPTR       RESTORE PBPTR
   01233 070742        SAR 16
   01234 031422        STA UKPTR       CLEAR USER KEY FLAG
   01235 031432        STA DRQST     CLEAR DATA REQUEST FLAG
   01236 170402        RET
*
*
************************************
*
*  MATH ROUTINES
*
*
*  STORE ROUTINES
*
   01237 074117 STAR2  LDA B         ADD THE EXPONENT OF
   01240 001744        ADA AR1E        AR1 AND THE B REGISTER.
   01241 050163        AND ZAP         CLEAR OUT BITS 1-7 AND
   01242 031754        STA AR2E      STORE IN AR2
*
   01243 074040        ABR 2         OFFSET THE TWO ABOVE
   01244 021744        LDA AR1E        QUANTITIES AND RE-ADD
   01245 070040        AAR 2           TO CHECK FOR A
   01246 074017        ADA B           MAXIMUM EXPONENT
   01247 070137        LDB A         SAVE THE SIGN OF THE EXPONENT
   01250 070113        SAP *+2       IF IT IS POSITIVE
   01251 070076        TCA             COMPLEMENT IT
   01252 000164        ADA MASK1     ADD A POSITIVE 100 TO IT
   01253 070312        SAM OF        SKIP IF AN OVERFLOW HAS OCCURED
*
   01254 025755 ZONK   LDB AR2E+1
   01255 076150        RZB ZONK1
   01256 020214 CLAR2  LDA AR2A      CLEAR AR2
   01257 170000        CLR
   01260 170402 ZONK1  RET
*
*
   01261 021754 OF     LDA AR2E      OTHERWISE SET UP BITS 0 AND 15 OF B
   01262 070111        SLA *+2         FOR MAX OR MIN ANSWER
   01263 076051        SLB *+1,S       AND ITS SIGN
*
   01264 074213        SHP OVFW
*
   01265 160205 UNFW   JSM AERRA,I
   01266 177633        DEC -101
   01267 065256        JMP CLAR2
*
   01270 061274 OVFW   JSM STMAX
   01271 160205        JSM AERRA,I
   01272 177634        DEC -100
   01273 170402        RET
*
   01274 061256 STMAX  JSM CLAR2
   01275 074352        SHM .OVFR
*
   01276 045757        ISZ AR2E+3
   01277 170400        CMY
   01300 020165        LDA MASK5
   01301 031754        STA AR2E
   01302 074111        SLB *+2
   01303 045754        ISZ AR2E
   01304 170402 .OVFR  RET
*
   01305 070742 ROUND  SAR 16        CLEAR THE A REGISTER AND
   01306 174470        MRY             PERFORM A RIGHT SHIFT B TIMES
   01307 000136        ADA M5        IF THE LAST SHIFTED
   01310 070175        SEC *+3,C     OUT DIGIT IS =>5 INCREMENT THE
   01311 020214        LDA AR2A
   01312 170540        MDI             MANTISSA
   01313 170402        RET           THEN RETURN
*
*
************************************
*
*
*
   01314 171400 ODGIT  MLS
   01315 000052        ADA .48
   01316 065016        JMP ONEXT
*
   01317 070537 SGNS   LDB A,I     GET EXPONENT WORD
   01320 070070        SIA *+1
   01321 070517        LDA A,I       GET MANTISSA
   01322 070210        SZA *+4       CHECK IF MANTISSA WAS ZERO
```

```
      01323 020012          LDA .1
      01324 074111          SLB *+2         SKIP IF SIGN IS 0
      01325 020132          LDA M1          OTHERWISE SET A = -1
      01326 070137          LDB A           TRANSFER A INTO B
      01327 170402          RET
*
      01330 031466 .NPWR STA LOCL1
      01331 021450          LDA PMODE
      01332 031702          STA NPRIN
      01333 021466          LDA LOCL1
      01334 164167          JMP WRITE,I
*
      01335 035702 NPWRT STB NPRIN
      01336 164167          JMP WRITE,I
*
      01337 035701 NDWRT STB NDISP
      01340 164167          JMP WRITE,I
*
      01341 160170          JSM CLERA,I
      01342 021450 CRLF  LDA PMODE
      01343 072450          RZA CR1
      01344 020031 CRLF1 LDA CRTN
      01345 061353          JSM TTY         OUTPUT CRTN
      01346 070742          SAR 16
      01347 160261          JSM IOSTA,I     STOP KEY?
      01350 020040          LDA .31         YES, SET CRLF SUPRESSED FLAG
      01351 031622          STA TERM
      01352 020061          LDA LNFD        OUTPUT LINE FEED
*
* GENERAL DRIVER
*
      01353 160261 TTY   JSM IOSTA,I     STOP KEY?
      01354 170402 CR1   RET             YES
      01355 041447          IOR SLCOD
      01356 172741          STF 1
      01357 172141          OTA 1
      01360 173601          STC 1,C
      01361 170402          RET
*
* CONVERT FROM LOWER CASE
*
      01362 061041 GTCON JSM GETCH
      01363 070137          LDB A
      01364 050103          AND B140
      01365 010103          CPA B140
      01366 004151          ADB M32
      01367 074117          LDA B
      01370 170402          RET
*
*     TEMP1 IS POINTING AT ADDRESS OF THE VARIABLE IN SYMOBL TABLE
*     ON RETURN (A) = TYPE CODE
*               (B) = ADDRESS
*
      01371 025474 FIX   LDB TEMP1
      01372 074517          LDA B,I
      01373 050040          AND B37
      01374 004132          ADB M1
      01375 074537          LDB B,I
      01376 170402          RET
*
*********************************************
*
      01377 000000          BSS 1       CHECKSUM WORD FOR ADD.'S 1000 TO 1377
*
*********************************************
*
```

9830--BASE PAGE READ-WRITE MEMORY

```
      01400                 ORG 1400B
      01400 000000 BADDR BSS 1    CURRENT CHAR POINTER
      01401 000000 RSAVF BSS 1     SAVE (A) IN RETN2
      01402 000000 OTPTR BSS 1    REFRESH POINTER
      01403 000000 MAW   BSS 1    LAST WORD OF R/W MEM
      01404 000000 LWAM  BSS 1    LAST WORD AVAILABLE FOR USER
      01405 000000 FWUP  BSS 1    FIRST WORD OF COMMON OR MAINLINE
      01406 000000 VALUF BSS 1    FIRST WORD -1 OF VALUE TABLE
      01407 000000 SYMTP BSS 1    FIRST WORD -1 OF SYMBOL TABLE
      01410 000000 LSTAK BSS 1    FIRST WORD OF OPERATOR STACK
      01411 000000 TSTPT BSS 1    TEMPORARY STACK POINTER
      01412 000000 LSTPT BSS 1    OPERATOR STACK POINTER
      01413 000000 HSTPT BSS 1    OPERAND STACK POINTER
      01414 000000 DSTPT BSS 1    DATA STATEMENT
      01415 000000 NXTDT BSS 1      POINTERS
      01416 000000 MODE  BSS 1    PROGRAM=01 KEYBOARD=1
      01417 000000 PARMA BSS 1    PARAMETER ADDRESS
      01420 000000 PARMN BSS 1    PARAMETER NAME
      01421 000000 PRADD BSS 1    LAST WORD+1 OF CURRENT STMT
```

```
01422 000000 UKPTR BSS 1     USER KEY POINTER
01423 000000 PBPTR BSS 1     LAST WORD OF CURRENT PROGRAM
01424 000000 PBUFF BSS 1     FIRST WORD OF CURRENT PROGRAM
01425 000000 PBUFO BSS 1     FIRST WORD OF MAINLINE
01426 000000 PBPTO BSS 1     LAST WORD+1 OF MAINLINE
01427 000000 .LNUM BSS 1     CURRENT LINE NUMBER
01430 000000 LNINC BSS 1     AUTO LINE INCREMENT
01431 000000 CLINE BSS 1     CURRENT LINE FOR LIST
01432 000000 DROST BSS 1     INPUT STMT FLAG
01433 000000 TFLAG BSS 1     PTAPE FLAG
01434 000000 UNITS BSS 1     TRIG UNITS
01435 000000 SEC   BSS 1     SECURE PROGRAM FLAG
01436 000000 HFLG1 BSS 2     STOP ADDRESSES
01440 000000 TFLG1 BSS 2     TRACE LIMIT ADDRESSES
01442 000000 STPFL BSS 1     STOP FLAG
01443 000000 KEYFG BSS 1     KEYBOARD FLAG
01444 000000 SAVEA BSS 1     INTERRUPT
01445 000000 SAVEB BSS 1
01446 000000 ADRSS BSS 1       TEMPORARIES
01447 000000 SLCOD BSS 1     SELECT CODE
01450 000000 PMODE BSS 1     PRINT-ALL FLAG
01451 000000 CTYPE BSS 1     KEYBOARD
01452 000000 CPLAC BSS 1       FORMAT FLAGS
01453 000000 PRFLG BSS 1     PRINT/DISP FLAG
01454 000000 RCOUT BSS 1     FORMAT
01455 000000 FORMT BSS 1
01456 000000 FORMS BSS 1
01457 000000 FORME BSS 1       STATEMENT FLAGS
01460 000000 FTMP1 BSS 1     CURRENT OPERATOR CODE
01461 000000 FTMP2 BSS 1     CURRENT OPERATOR PRECEDENCE
01462 000000 REFDL BSS 1      KEYBOARD DRIVER LINK
01463 000000 INTFL BSS 1      INTERRUPT LINK
01464 000000       BSS 2      UNUSED
*
*  TEMPORARIES
*
01466 000000 LOCL1 BSS 1
01467 000000 LOCL2 BSS 1
01470 000000 L2T1  BSS 1
01471 000000 L2T2  BSS 1
01472 000000 TEMPS BSS 1
01473 000000 TEMP  BSS 1
01473        HBOX1 EQU TEMP
01474 000000 TEMP1 BSS 1
01475 000000 TEMP2 BSS 1
01476 000000 TEMP3 BSS 1
01477 000000 TEMP4 BSS 1
*
*  BUFFERS
*
01500 000000 IOBUF BSS 41          INPUT AND RECALL BUFFER
01551 000000 RBUFF BSS 41          SINGLE LINE REFRESH BUFFER
*
*  PRINT ROUTINE FLAGS
*
01622 000000 TERM  BSS 1     CRLF FLAG
01623 000000 PEND  BSS 1     BUFFER OVERFLOW FLAG
01624 000000 PPFF  BSS 1     BUFFER POINTER OR TAB FLAG
01625 000000 FIRST BSS 1
01626 000000       BSS 2      UNUSED
*
*  MATH TEMPORARIES
*
01630 000000 TREGE BSS 4
01634 000000 RSLTE BSS 4
*
*  STATEMENT SYNTAX AND EXECUTION TEMPORARIES
*
01640 000000 ST    BSS 32
*
*  SYSTEM SYNTAX AND EXECUTION TEMPORARIES
*
01700 000000       BSS 1           SAVED FOR PROCESSOR
01701 000000 NDISP BSS 1
01702 000000 NPRIN BSS 1
01703 000000 PLACE BSS 1
01704 000000 WIDTH BSS 1
01705 000000 FLOAT BSS 1
01706 000000 SHPTR BSS 1
01707 000000 BLANK BSS 1
01710 000000 HSFLG BSS 1
01711 000000 DFLAG BSS 1
01712 000000 PFLAG BSS 1
01713 000000 UFLAG BSS 1
01714 000000 SFLAG BSS 1
01715 000000 SBADR BSS 1
01716 000000 SSHPT BSS 1
01717 000000 NUM   BSS 1
01717        OPTYP EQU NUM
01720 000000 LASTN BSS 1
```

```
#01  9830--BASE PAGE READ-WRITE MEMORY

#1721 #00000 SIGN  BSS 1
#1721        MAXIN EQU SIGN
#1722 #00000 EXP   BSS 1
#1722        INTGR EQU EXP
#1723 #00000 ARYAD BSS 1
#1724 #00000 GFLAG BSS 1
#1725 #00000 NXTST BSS 1
#1726 #00000 MBIN1 BSS 1
#1727 #00000 MBIN2 BSS 1
*
*  ARITHMETIC REGISTERS AND RETURN STACK
*
#1740              ORG 1740B
#1740 #00000 XC    BSS 4
#1744 #00000 AR1   BSS 4
#1750 #00000 YC    BSS 4
#1754 #00000 AR2   BSS 4
#1760 #00000 RSTAK BSS 11     RETURN STACK
#1773 #00000 RES   BSS 4      RESULT REGISTER
#1777 #00000 RSPTR BSS 1    RETURN STACK POINTER


#01  EQUATES

#1466        MCAND EQU LOCL1
#1467        PROD  EQU LOCL2
#1744        AR1E  EQU AR1
#1754        AR2E  EQU AR2
#1730        COML  EQU MBIN2+1
#1731        TYPE  EQU MBIN2+2
#1640        TERPP EQU ST
#1641        SPROD EQU ST+1
#1642        SAVE  EQU ST+2
#1453        ARW   EQU PRFLG
#1740        TMP   EQU XC
#1741        TMP1  EQU XC+1
#1742        TMP2  EQU XC+2
#1743        TMP3  EQU XC+3
#1750        TMP4  EQU YC
#1751        TMP5  EQU YC+1
#1706        TMP6  EQU SBPTR
#1752        TMP6A EQU YC+2
#1460        TMP7  EQU FTMP1
#1474        TMP9  EQU TEMPS+2
#1475        TMP10 EQU TEMPS+3
#1476        TMP11 EQU TEMPS+4
#1477        TMP12 EQU TEMPS+5
#1461        TMP13 EQU FTMP2
#1473        CCNT  EQU TEMPS+1
#1704        BKPTR EQU WIDTH
#1741        R     EQU TMP1
#1742        L     EQU TMP2
#1751        DIGIT EQU TMP5
#1743        INDEX EQU TMP3
#1750        RBASE EQU TMP4
*
*
#0047        PLUS  EQU .43
#0050        MINUS EQU .45
#0051        POINT EQU .46
#0052        B60   EQU .48
#0053        COLON EQU .58
#0077        DOLAR EQU B44
#0116        B2K   EQU UTOP
#0004        XFCA  EQU B10K


#01  KEYBOARD ENTRY AND DISPLAY

*
*     REED SUBROUTINE
*
*     ENTRY CONDITIONS: NONE
*
*     EXIT CONDITIONS:
*
*     AN INPUT RECORD IS IN THE I/O
*     BUFFER.  THE LAST CHAR IS AN EOL.
*
*
*     IF A DELETE LINE IS HIT
*     RETURN TO P+1, OTHERWISE
*     RETURN TO P+2.
*
*
#2000               ORG 2000B
*
```

```
*
02000 020236 REED1 LDA SLEND
02001 031623       STA PEND
02002 020062       LDA FLGAT
02003 031416       STA MODE      SET TO PROGRAM SYNTAX
02004 021433       LDA TFLAG
02005 070110       SZA *+2       PTAPE COMMAND?
02006 066617       JMP PREED
02007 031473       STA CCNT
02010 031704       STA BKPTR
*  GET FIRST KEY
02011 063046 REEDE JSM CALLK     GET FIRST KEY
02012 066011       JMP *-1
02013 013127       CPA DELIN
02014 066223       JMP DEL1
02015 025430       LDB LNINC
02016 010074       CPA B22       BACKSPACE?
02017 074112       SBM REE       YES. SKIP IF LIST INPUT
02020 066032       JMP REED7
02021 055400 REE   DSZ BADDR     YES. BACKUP POINTER
02022 045623       ISZ PEND
02023 020041       LDA .32
02024 061016       JSM ONEXT
02025 055400       DSZ BADDR     WIPE OUT LAZY-T
02026 055623       DSZ PEND      RESTORE END OF BUFFER POINTER
02027 070742       SAR 16
02030 031430       STA LNINC     GET OUT OF AUTO
02031 066045       JMP REED6
02032 062533 REED7 JSM CLEAR     CLEAR THE DISPLAY
02033 021430       LDA LNINC
02034 070153       SAP REED4      LIST WAS LAST?
02035 070742       SAR 16
02036 031430       STA LNINC     GET OUT OF AUTO
02037 070210 REED4 SZA REED6-2   AUTO LINE?
02040 025427       LDB .LNUM     YES OUTPUT #
02041 160210       JSM OUTIA.I
02042 045400       ISZ BADDR     OUTPUT A BLANK
02043 021751       LDA TMP5
02044 066047       JMP REEDG
*  GET NEXT KEY
02045 063046 REED6 JSM CALLK     GET NEXT KEY
02046 066045       JMP *-1
02047 010074 REEDG CPA B22       BACKSPACE?
02050 066707       JMP BKSP
02051 010075       CPA B23       FORWARD?
02052 066725       JMP FORWD     YES
02053 012436       CPA B152      CLEAR?
02054 067665       JMP ECLR      YES
02055 010027       CPA .11       EXECUTE KEY?
02056 045416       ISZ MODE     YES
02057 050103       AND MSK65
02060 072510       RZA REED2     BITS 5&6=0?
02061 021751       LDA TMP5      YES
02062 000141       ADA M10
02063 070413       SAP REED2+1   DEF KEY?
02064 025706       LDB TMP6
02065 074210       SZB *+4
02066 021751       LDA TMP5
02067 040101       IOR B100      SET SHIFT BIT FOR DEF-KEYS
02070 031751       STA TMP5
02071 067131       JMP KEYPR
02072 010103 REED2 CPA MSK65     BITS 5&6=1?
02073 066103       JMP REED3     YES
02074 021706       LDA TMP6      NO
02075 070610       SZA REED5     SHIFTED?
02076 021751       LDA TMP5
02077 060752       JSM LETCK     YES. LOWER CASE LETTER?
02100 066103       JMP REED3     NO
02101 040041       IOR .32       CONVERT CODE
02102 066110       JMP REED5-1
02103 026412 REED3 LDB VALUP
02104 063071       JSM TBSR1     CODE IN VALUE TABLE?
02105 066124       JMP REEDD     NO
02106 010022       CPA .5        ENTER EXPONENT?
02107 000101       ADA B100      YES. FORM ASCII E
02110 031751       STA TMP5
*
*  ALL CONVERSIONS COMPLETE
02111 021751 REED5 LDA TMP5
02112 010031       CPA CRTN
02113 066172       JMP EOLL    EXECUTE OR STORE
02114 025704       LDB BKPTR
02115 074210       SZB REED9     CURSOR?
02116 027122       LDB BKPTA     YES
02117 061017       JSM OUTCR     REPLACE CHARACTER
02120 066730       JMP FORWD+3   SCROLL IF NECESSARY
02121 061016 REED9 JSM ONEXT     PUT CHAR AT END OF LINE
02122 062737       JSM LEFT      SCROLL IF NECESSARY
02123 066045       JMP REED6
*
```

```
       02124 026373 REEDD LDB EXPTR      SEARCH FOR MULTI-CHAR KEY
       02125 063071       JSM TBSRI      FOUND?
       02126 066213       JMP REEDR      NO
       02127 031751       STA TMP5
       02130 062521       JSM CLRST      CLEAR FLAG IF "STOP"
       02131 062533       JSM CLEAR
       02132 026443       LDB COMTA
       02133 021751       LDA TMP5
       02134 162441       JSM MOUTA,I    OUTPUT FROM SYSTEM COMMAND TABLE
       02135 066045       JMP REED6
       02136 062533 PRALL JSM CLEAR      CLEAR BUFFER
       02137 021450       LDA PMODE
       02140 070130       SIA *+2
       02141 070742       SAR 16
       02142 031450       STA PMODE
       02143 026444       LDB OFFA       GET ADDRESS OF "OFF"
       02144 072110       RZA *+2        ON?
       02145 004020       ADB .3         YES, GET ADDRESS OF "ON "
       02146 020020       LDA .3
       02147 061335       JSM NPWRT
       02150 066011       JMP REEDE      GET FIRST KEY AGAIN
*
*  STEP AND CONT EXECUTION
*
       02151 031442 STEP  STA STPFL      SET POSITIVE NON-ZERO
       02152 070742       SAR 16
       02153 025421 CONT  LDB PRADD
       02154 074273       SBP CONT1,C    HAS AN EDIT OCCURRED?
       02155 072110       RZA CONTK      YES, LINE # GIVEN?
       02156 074517       LDA B,I         NO, EXECUTE FROM BEGINNING
       02157 031725 CONTK STA NXTST      YES, EXECUTE FROM BEGINNING
       02160 164004       JMP XECA,I
       02161 070250 CONT1 SZA *+5        LINE # GIVEN?
       02162 061075       JSM FNDPS      YES, FIND ADDRESS
       02163 164174       JMP RDYDA,I
       02164 066165       JMP *+1
       02165 035421       STB PRADD      STORE ADDRESS
       02166 062533       JSM CLEAR
       02167 031416       STA MODE       SET TO PROGRAM EXECUTION
       02170 025421       LDB PRADD
       02171 164255       JMP XEC6A,I    CONTINUE EXECUTION
*
*  PROCESS EXEC OR STORE
       02172 045623 EOLL  ISZ PEND       GUARANTEE ROOM FOR EOL
       02173 061016       JSM ONEXT
       02174 024233       LDB BEND
       02175 035477       STB TEMP4
       02176 024233       LDB SBUFA
       02177 035476       STB TEMP3
       02200 004046       ADB .41
       02201 061122       JSM MVTOM+1    MOVE INPUT RECORD TO I/O BUFF
       02202 060373       JSM ICNT
       02203 000132       ADA M1
       02204 070250       SZA REEDT      SKIP IF NULL RECORD
       02205 025450       LDB PMODE
       02206 074150       RZB REEDT
       02207 024211       LDB .BUFA
       02210 061337       JSM NDWRT
       02211 062502 REEDT JSM CRC
       02212 064357       JMP RETN2
*
       02213 013124 REEDR CPA B33        DIVIDE?
       02214 022437       LDA B57        YES, GET ASCII
       02215 026361       LDB EDIT2
       02216 063072       JSM TBSRH      CODE IN EDIT TABLE?
       02217 066110       JMP REED5-1    NO
       02220 002440       ADA BEER
       02221 070737       JMP A,I
*
*  DELETE LINE
       02222 170402 DEL2  RET
       02223 021430 DEL1  LDA LNINC
       02224 071713       SAP DEL2
       02225 021431       LDA CLINE
       02226 130233       STA SBUFA,I
       02227 070742       SAR 16
       02230 031430       STA LNINC
       02231 164204       JMP DELSA,I
*
*  RECALL
*
       02232 062533 EREC  JSM CLEAR
       02233 055473       DSZ CCNT       SET RECALL FLAG
       02234 024211       LDB .BUFA
       02235 035740 RSLT1 STB TMP        GET STARTING ADDRESS  OF IO BUFF
       02236 066045       JMP REED6
*
*  INITIALIZE VARIABLES
*
       02237 020056 INITV LDA .1E4
```

```
02240 164171        JMP RUNA,I     RUN 10000
*  RESULT KEY
02241 020101 RSLT   LDA B100       CODE FOR @
02242 025706        LDB TMP6
02243 074110        SZB *+2        SHIFTED?
02244 066110        JMP REED5-1    YES
02245 026445        LDB RESA
02246 020020 RENX1  LDA .3
02247 031473        STA CCNT       COUNT=3
02250 066235        JMP RSLT1
*
*
02251 066136 PAL    JMP PRALL
02252 066151 STPL   JMP STEP
*
*  FETCH EXECUTION
*
02253 000132 FFET   ADA M1
02254 031431        STA CLINE
*
*     THIS ROUTINE LISTS ONE LINE
*     OF THE PROGRAM. THE FIRST
*     LINE TO BE LISTED IS THE FIRST
*     LINE OF THE PROGRAM.
*
*
02255 062353 DNARW  JSM SAROW      CHECK FOR NULL PROGRAM
02256 074310        SZB U4         SKIP IF TYPING AID KEY
02257 070070        SIA *+1
02260 061075        JSM FNDPS      FIND LINE
02261 066277        JMP U3         PAST END OF PROGRAM
02262 066301        JMP U5-1       BETWEEN LINES
02263 066301        JMP U5-1
*
*     THIS ROUTINE LISTS ONE LINE
*     OF THE PROGRAM. THE FIRST LINE
*     TO BE LISTED IS THE LAST LINE
*     OF THE PROGRAM.
*
*
02264 021424 U4     LDA PBUFF      GET FIRST LINE
02265 066302        JMP U5
02266 062353 UPARW  JSM SAROW      CHECK FOR NULL PROG
02267 075650        SZB U4         SKIP IF TYPING AID
02270 072110        RZA U1         CLINE =0?
02271 020056        LDA .1E4       YES, FIND LAST LINE OF PROG
02272 061075 U1     JSM FNDPS      FIND LINE
02273 066277        JMP U3         PAST END OF PROG
02274 066275        JMP *+1        BETWEEN LINES
02275 015424        CPB PBUFF      FIRST LINE?
02276 066301        JMP U5-1        YES
02277 021720 U3     LDA LASTN      GET PREVIOUS LINE
02300 060742        JSM FND
02301 074117        LDA B          GET ADDRESS IN (A)
02302 074742 U5     SBR 16
02303 035453        STB ARW        FLAG LIST ROUTINE
02304 035460        STB TMP7
02305 167120        JMP LISTR,I
*
*  INSERT AND DELETE CHARACTER
*
02306 066045        JMP REED6
02307 025704 INSRT  LDB BKPTR
02310 075710        SZB INSRT-1    ANY BACKSPACE YET?
02311 025400        LDB BADDR
02312 021706        LDA TMP6
02313 070710        SZA INS0       SHIFT FLAG SET?
*  DELETE
02314 055400        DSZ BADDR      YES, DINC END OF LINE POINTER
02315 025704        LDB BKPTR
02316 035740        STB TMP        SET POINTER TO CURSOR CHARACTER
02317 025740 DELC1  LDB TMP
02320 015400        CPB BADDR      LAST CHAR?
02321 066347        JMP INS2+1     YES, OUTPUT A BLANK
02322 045740        ISZ TMP
02323 061053        JSM GTMP       GET CHARACTER
02324 055740        DSZ TMP
02325 055740        DSZ TMP
02326 024111        LDB TMPA       STORE SHIFTED LEFT ONE
02327 061017        JSM OUTCR
02330 066317        JMP DELC1
*  INSERT
02331 014236 INS0   CPB SLEND
02332 066045        JMP REED6       LINE FULL
02333 004132        ADB M1
02334 035740 INS1   STB TMP
02335 061053        JSM GTMP       GET CHARACTER
02336 025740        LDB TMP
02337 015704        CPB BKPTR      AT CURSOR POSITION?
02340 066346        JMP INS2       YES
```

#01 KEYBOARD ENTRY AND DISPLAY

```
02341 024111          LDB TMPA      NO, MOVE RIGHT 1 PLACE
02342 061017          JSM OUTCR
02343 025740          LDB TMP
02344 004134          ADB M3           BACK UP POINTER TO NEXT
02345 066334          JMP INS1           CHAR LEFT
02346 045400 INS2     ISZ BADDR        UPDATE END OF LINE POINTER
02347 020041          LDA .32
02350 024111          LDB TMPA
02351 061017          JSM OUTCR        INSERT A BLANK
02352 066045          JMP REFD6
*
*  SUBROUTINE FOR UP AND DOWN ARROW ROUTINES
*
02353 021424 SAROW LDA PBUFF
02354 011423       CPA PBPTR
02355 164174       JMP RDYDA,I   NULL PROGRAM ABORT
02356 021431       LDA CLINE
02357 125424       LDB PBUFF,I
02360 170402       RET
*
*    THIS SECTION CONTAINS TABLES,
*    POINTERS USED IN THE ABOVE ROUTINE
*
*
*
*
02361 004744 EDIT2 DEF *+*+2
02362 012643       DEF 12600B-EEB+UPARW
02363 012232       DEF 12200B-EEB+DNARW
02364 015214       DEF 15200B-EEB+INITV
02365 065616       DEF 65600B-EEB+RSLT
02366 006627       DEF 6600B-EEB+STPL
02367 017664       DEF 17600B-EEB+INSRT
02370 071600       DEF 71600B-EEB+DELI
02371 070226       DEF 70200B-EEB+PAL
02372 010307       DEF 10300B-EEB+EREC
02223           EEB  EQU DELI
*
*
*    EXPANDING DEY TABLE
*
*
02373 004770 EXPTR DEF *+*+2
02374 007601  OCT 7601        RUN
02375 014600  OCT 14600        STORE
02376 014220  OCT 14220       LOAD
02377 017207  OCT 17207       NORMAL
02400 006212  OCT 6212        CONTINUE
02401 007226  OCT 7226        TRACE
02402 077637  OCT 77637       STOP
02403 017216  OCT 17216       NORMAL
02404 010604  OCT 10604       FETCH
02405 072214  OCT 72214       FIXED
02406 072615  OCT 72615       FLOAT
02407 005203  OCT 5203        LIST
02410 073202  OCT 73202       SCRATCH
02411 073705  OCT 73705       AUTO
*
*
*    KEY VALUE TABLE
*
02412 005026 VALUP DEF *+*+2
02413 005615  OCT 5615        EOL
02414 071215  OCT 71215       STORE
02415 020240  OCT 20240       BLANK
02416 030641  OCT 30641       !
02417 032244  OCT 32244       $
02420 032645  OCT 32645       %
02421 067605  OCT 67605       E
02422 031643  OCT 31643       #
02423 031242  OCT 31242       "
02424 033246  OCT 33246       &
02425 033647  OCT 33647       '
02426 034250  OCT 34250       (
02427 034651  OCT 34651       )
02430 027677  OCT 27677       ?
02431 026274        OCT 26274       <
02432 027276        OCT 27276       >
02433 035252  OCT 35252       *
02434 035653  OCT 35653       +
02435 030355  OCT 30355       -
*
*
*
00103        MSK65 EQU B140
02436 000152 B152  OCT 152
02437 000057 B57   OCT 57
02440 002223 BEEB  DEF EEB
02441 006306 MOUTA DEF MCOUT
02442 003402 LPTR  DEF RBUFF+RBUFF+4B
```

```
02443 007062 COMTA DEF LBL1+LBL1+20
02444 005117 OFFA  DEF *+*+7
02445 005114 RESA  DEF *+*+2
02446 051105       ASC 4,RESOFFON
02447 051517
02450 043106
02451 047516
02452 020040 TOBLN OCT 20040
*
*
02453 000000       BSS 1            ***** CHECKSUM*****
*   WRITE SUBROUTINE
*
*   ENTRY CONDITIONS:
*
*        (A)=CHARACTER COUNT
*        (B)=POINTER TO FIRST CHAR
*        NPRIN#0 FOR PRINT ABORT
*        NDISP#0   PRINT ONLY
*
*
02454 070410 WRIT  SZA RIT3L      SKIP IF NULL COUNT
02455 031741       STA TMP1
02456 035740       STB TMP        INITIALIZE POINTER
02457 061053 RITE1 JSM GTMP       GET CHARACTER
02460 010027       CPA .11        EXECUTE?
02461 020100       LDA B52        YES, CHANGE TO * FOR KEY
02462 025701       LDB NDISP
02463 010031       CPA CRTN       CRTN CHARACTER?
02464 066476 RIT3L JMP RITE3      YES, ABORT
02465 076310       RZB RITE2-1    DISPLAY DISABLED?
02466 070150       SZA RITE4      NO, NULL?
02467 061016       JSM ONEXT      OUTPUT TO DISPLAY BUFFER
02470 021467       LDA LOCL2      RECALL CHARACTER
02471 025702 RITE4 LDB NPRIN
02472 076110       RZB RITE2      PRINT DISABLED?
02473 061353       JSM TTY        NO, PRINT CHAR
02474 055741 RITE2 DSZ TMP1       MORE CHARACTERS?
02475 066457       JMP RITE1      YES
02476 070742 RITE3 SAR 16         RESET FLAGS
02477 031702       STA NPRIN
02500 031701       STA NDISP
02501 170402 RETA  RET
*
02502 025450 CRC   LDB PMODE
02503 074350       SZB CRC1       PRINT ALL?
02504 025450 CRCHK LDB PMODE
02505 074150       SZB CRC2       PRINT ALL?
02506 025453       LDB PRFLG
02507 074352       SBM CTERM
02510 025622 CRC2  LDB TERM
02511 075410       SZB RETA
02512 172700 CRC1  SFC 0         WAIT UNTIL "STOP" KEY
02513 066512       JMP *-1          IS RELEASED
02514 062521       JSM CLRST     CLEAR "STOP" FLAG
02515 061344       JSM CRLF1
*
02516 074742 CTERM SBR 16
02517 035622       STB TERM
02520 170402       RET
*
02521 025442 CLRST LDB STPFL
02522 014040       CPB .31        SET FROM KEYBOARD?
02523 066525       JMP *+2        YES, CLEAR IT
02524 170402       RET
02525 074742       SBR 16
02526 035442       STB STPFL
02527 035433       STB TFLAG
02530 170402       RET
*
*
02531 027117 GTMP2 LDB TMP2A
02532 065041       JMP GETCH
*
*
*   THIS SUBROUTINE CLEARS THE DISPLAY
*
02533 070742 CLEAR SAR 16
02534 031704       STA BKPTR
02535 020212       LDA .SLBF
02536 031402       STA OTPTR
02537 031400       STA BADDR
02540 031625       STA FIRST
02541 024233       LDB BEND
02542 022452       LDA TOBLN
02543 074557 CLE1  STA B,I
02544 017123       CPB ENDW
02545 066476       JMP RITE3
02546 077670       RIB CLE1      NO
*
```

```
      I/O STATUS CHECK ROUTINE

02547 025442 IOST  LDB STPFL
02550 014040       CPB .31        STOP FLAG?
02551 170402       RET            YES
02552 025447       LDB SLCOD      NO
02553 172741       STF 1          TURN INTERRUPT OFF
02554 176141       OTB 1
02555 172741       STF 1          GET STATUS IN I/O REG
02556 177241       LIB 1,C        TURN INTERRUPT ON
02557 074406       RBR 9
02560 075353       SHP IOST       DEVICE BUSY?
02561 064357       JMP RETN2      NO



      THIS SUBROUTINE REFRESHES
      THE SINGLE LINE DISPLAY

02562 021402 REFRS LDA UTPTR
02563 031740       STA TMP
02564 000033       ADA .16
02565 031742       STA TMP2
02566 074742       SBR 16
02567 035741 RE1   STB TMP1
02570 024111       LDB TMPA
02571 061362       JSM GTCON
02572 070304 RE3   SAL 10
02573 031743       STA TMP3
02574 027117       LDB TMP2A
02575 061362       JSM GTCON
02576 050054 RE4   AND .63
02577 070604       SAL 4
02600 041743       IOR TMP3
02601 041741       IOR TMP1       FORM OUTPUT WORD
02602 173750       CLF 8          TURN DISPLAY OFF
02603 173741       CLF 1          INTERRUPT ON
02604 025443       LDB KEYFG
02605 172741       STF 1          INTERRUPT OFF
02606 074353       SBP RE2        INTERRUPT OCCURRED?
02607 025741       LDB TMP1
02610 014033       CPB .16
02611 066615       JMP RE2
02612 074070       SIB *+1
02613 172150       OTA 8
02614 066567       JMP RE1
02615 173741 RE2   CLF 1
02616 170402       RET            TURN INTERRUPT ON


      PTAPE COMMAND EXECUTION

      THIS ROUTINE READS PROGRAMS FROM
      THE PHOTOREADER. 10 OR MORE NULLS
      CONSTITUTE LEADER OR TRAILER WHICH
      ARE THE PROGRAM DELIMITERS.

      INPUT CODES:

        DATA  64 ASCII SET

        CONTROL

          176  ALT MODE=DELETE LINE
          33   ESC MODE=DELETE LINE
          137  LEFT ARROW=DELETE CHAR
          177  RUBOUT= IGNORE
          15   CRTN= IGNORE
          12   LNFD= END OF RECORD
      RETURN TO:

          P+1 IF NULL RECORD
          P+2 OTHERWISE
02617 070204 PREFD SAL 12
02620 031447       STA SLCOD
02621 020211       LDA .BUFA
02622 031400       STA BADDR
02623 020132       LDA M1
02624 031751       STA TMP5       CLEAR DELETE LINE FLAG
02625 020141       LDA M10
02626 031741       STA TMP1       SET FEED HOLE COUNTER


      GENERAL INPUT ROUTINE

02627 062547 P1    JSM IOST       STOP KEY?
02630 066704       JMP P7         YES
02631 020121       LDA B4000      GET INPUT STATUS BIT
02632 061355       JSM CR1+1      CALL FOR INPUT
02633 062547       JSM IOST
02634 066704 P4    JMP P7         STOP
02635 074117       LDA B
```

```
02636 070306          RAR 7
02637 050104          AND B177
02640 072310          RZA P3          NULL?
02641 045741          ISZ TMP1        10 FEED HOLES?
02642 066627          JMP P1          NO
02643 021742          LDA TMP2
02644 071413          SAP P4          TRAILER?
02645 066625          JMP P1-2        NO, LEADER
02646 031742 P3       STA TMP2        RESET LEADER FLAG
02647 010104          CPA B177        RUBOUT?
02650 066625          JMP P1-2        YES
02651 010031          CPA CRTN        CRTN?
02652 066625          JMP P1-2        YES, IGNORE
02653 013126          CPA B137        LEFT ARROW?
02654 066700          JMP P5          YES, BACKSPACE
02655 010061          CPA LNFD        LINE FEED?
02656 020031          LDA EOL        YES, CHANGE TO END OF LINE CHARACTER
02657 013124          CPA B33         ESCAPE MODE?
02660 066624          JMP P1-3        YES, SET DELETE FLAG
02661 013125          CPA B176        ALT MODE?
02662 066624          JMP P1-3        YES, DELETE
02663 061016          JSM ONEXT
02664 021467          LDA LOCL2
02665 010031          CPA EOL         END OF RECORD?
02666 066673          JMP P2          YES
02667 025400          LDB BADDR
02670 017130          CPB IOEND       FULL?
02671 055400 P6       DSZ BADDR
02672 066625          JMP P1-2
02673 020127 P2     LDA B170K
02674 031447          STA SLCOD       SET TO STANDARD PRINTER
02675 045751          ISZ TMP5        CHECK DELETE FLAG
02676 170402          RET             DELETE
02677 064357          JMP RETN2       ACCEPT
02700 025400 P5       LDB BADDR
02701 014211          CPB .BUFA       BUFFER EMPTY?
02702 066625          JMP P1-2        YES, IGNORE
02703 066671          JMP P6          NO, BACKSPACE
02704 020031 P7       LDA EOL
02705 061016          JSM ONEXT       PUT EOL CHAR IN BUFFER
02706 164174          JMP KDYDA,I     EXIT PTAPE MODE
*
*    BACKSPACE
*
02707 021704 BKSP     LDA BKPTR
02710 072350          RZA BK2         FIRST BACKSPACE?
02711 021400          LDA BADDR       YES
02712 010212          CPA .SLBF       NULL RECORD?
02713 066045          JMP REFD6       YES
02714 021400          LDA BADDR
02715 031704          STA BKPTR
02716 066723          JMP BK1-1       PUT POINTER AT LAST CHAR
02717 010212 BK2      CPA .SLBF       ALREADY AT FIRST CHAR?
02720 066045          JMP REFD6       YES
02721 011402          CPA OTPTR       LEFTMOST ON SCREEN?
02722 055402          DSZ OTPTR       YES, SCROLL
02723 055704          DSZ BKPTR       BACKSPACE CURSOR
02724 066045 BK1      JMP REFD6
*
*    FORWARD SPACE
*
02725 021704 FORWD LDA BKPTR
02726 070310          SZA FW1         SKIP IF NO BACKSPACE HAS OCCURRED
02727 045704          ISZ BKPTR
02730 021402          LDA OTPTR
02731 000041          ADA .32
02732 011704          CPA BKPTR       ON RIGHT OF SCREEN?
02733 011400          CPA BADDR       YES, LINE FULL?
02734 066045 FW1      JMP REFD6
02735 045402          ISZ OTPTR       NO, SCROLL
02736 066045          JMP REFD6
*
*    LEFT SUBROUTINE
*
*    SHIFT THE 32 CHARACTER DISPLAY LEFT
*
02737 021400 LEFT     LDA BADDR       IS THE LAST CHAR
02740 000151          ADA M32            ALREADY TO THE LEFT OF
02741 070076          TCA
02742 001402          ADA OTPTR          THE END OF DISPLAY?
02743 070113          SAP *+2
02744 045402          ISZ OTPTR       NO, SCROLL
02745 170402          RET
*
*    RIGHT SUBROUTINE
*
*    SHIFT THE 32 CHARACTER DISPLAY RIGHT
*    ONE POSITION. IF THE FIRST CHARACTER
*    IS IN THE LEFTMOST POSITION, ABORT.
```

```
*
02746 021402 RIGHT LDA OTPTR
02747 010212       CPA .SLBF
02750 170402       RET
02751 055402       DSZ OTPTR     NO
02752 170402       RET
*   KEYIN SUBROUTINE
*
*   THIS SUBROUTINE SCANS ALL
*   INPUT DEVICES SEARCHING FOR
*   AN INPUT CODE. IT REFRESHES
*   THE DISPLAY WHILE WAITING
*   EXIT WITH CODE IN (A)
*
02753 074742 KEYIN SBR 16
02754 021400       LDA HADDR
02755 011704       CPA BKPTR     CURSOR PAST END?
02756 035704       STB BKPTR     YES, CLEAR POINTER
02757 021473 KEYN7 LDA CCNT
02760 072110       RZA *+2
02761 067002       JMP KEYN1
02762 061053       JSM GTMP      GET CHARACTER
02763 031751       STA TMP5      SAVE UNCONVERTED CHAR
02764 070550       SZA KEYN1-3   EMPTY BUFFER?
02765 061363       JSM GTCON+1   CONVERT
02766 011751       CPA TMP5      DID CONVERSION OCCURR?
02767 066771       JMP *+2       NO
02770 043121       IOR B200      YES, SET SHIFT BIT
02771 025473       LDB CCNT
02772 010031       CPA EOL       END OF LINE?
02773 074212       SHM *+4       RECALL MODE?
02774 055473       DSZ CCNT      NO, DINC POINTER
02775 170402       RET
02776 170402       RET           RETURN WITH CHAR IN (A)
02777 074742       SHR 16
03000 035473       STB CCNT      RESET POINTER
03001 066756       JMP KEYN7-1
03002 031750 KEYN1 STA TMP4      SET CURSOR COUNTER TO ZERO
03003 063024       JSM KEYN6
03004 025704       LDB BKPTR
03005 074250       SZB KEYN3     CURSOR?
03006 027122       LDB BKPTA     YES
03007 061041       JSM GETCH
03010 031751       STA TMP5     SAVE CHAR AT CURSOR POSITION
03011 055704       DSZ BKPTR
03012 025443 KEYN3 LDB KEYFG
03013 074612       SHM KEYN2     HAS KEY INPUT OCCURRED?
03014 021704       LDA BKPTR     YES
03015 070250       SZA KEYN5     CURSOR?
03016 021751       LDA TMP5      YES, RESTORE CHARACTER
03017 027122       LDB BKPTA
03020 061017       JSM OUTCP
03021 055704       DSZ BKPTR
03022 021443 KEYN5 LDA KEYFG
03023 050105       AND B377
03024 024132 KEYN6 LDB M1
03025 035443       STB KEYFG     RESET KEY OCCURRED FLAG
03026 170402       RET
03027 025704 KEYN2 LDB BKPTR
03030 074610       SZB KEYN4     CURSOR?
03031 025750       LDB TMP4      YES
03032 004132       ADB M1
03033 014136       CPB M5
03034 024061       LDB .10
03035 035750       STB TMP4
03036 021751       LDA TMP5
03037 074113       SBP *+2
03040 020037       LDA .28
03041 027122       LDB BKPTA
03042 061017       JSM OUTCR     REPLACE CHARACTER WITH CURSOR
03043 055704       DSZ BKPTR
03044 062562 KEYN4 JSM REFRS
03045 067012       JMP KEYN3
*
*  CALL KEYIN AND EXECUTE RIGHT AND LEFT ARROWS
*
*  P+1=ARROW!  P+2=OTHERWISE
03046 062753 CALLK JSM KEYIN
03047 074742       SBR 16
03050 070346       RAR 8
03051 070133       SAP *+2,C     SHIFTED?
03052 024132       LDB M1        YES
03053 035706       STB TMP6
03054 070346       RAR 8
03055 031751       STA TMP5
03056 010036       CPA B27       RIGHT ARROW
03057 066746       JMP RIGHT     YES
03060 010035       CPA B26
03061 066737       JMP LEFT    LEFT ARROW
03062 064357       JMP RETN2
```

```
#01  KEYBOARD ENTRY AND DISPLAY

*
*     TABLE SEARCH ROUTINE
*
*
*     THIS SUBROUTINE COMPARES THE
*     INPUT STRING WITH STRINGS IN
*     A TABLE.  IF A SUCCESSFUL COMPARE
*     IS MADE AN 6-BIT CODE IS RETURNED
*
*     ENTRY CONDITIONS:
*          (A)=FIRST CHARACTER OF INPUT STRING
*          (B)=POINTER TO FIRST CHAR OF TABLE
*
*     EXIT CONDITIONS:
*        IF MATCH, RETURN TO P+2 WITH CODE
*        IN A OTHERWISE RETURN TO P+1
*
*
 03063 062531 TBS6  JSM GTMP2
 03064 070306       RAR 7
 03065 070511       SLA TBS5       OP CODE?
 03066 070402       SAR 9          YES, RIGHT JUSTIFY
 03067 050054       AND .63
 03070 064357       JMP RETN2
 03071 021751 TBSR1 LDA TMP5
 03072 031750 TBSRH STA TMP4        SAVE INPUT CHAR
 03073 035742       STB TMP2       INITIALIZE TABLE POINTER
 03074 025400       LDB BADDR
 03075 035752       STB TMP6A      SAVE INPUT POINTER
 03076 067101       JMP TBS2
 03077 055742 TBS5  DSZ TMP2
 03100 061055       JSM GNEXT      FETCH NEXT INPUT CHAR
 03101 031743 TBS2  STA TMP3       STORE CHARACTER
 03102 062531       JSM GTMP2
 03103 011743       CPA TMP3       CHARACTERS MATCH?
 03104 067063       JMP TBS6       YES, CONTINUE
 03105 025752       LDB TMP6A      NO, RESTORE BADDR
 03106 035400       STB BADDR
 03107 062531       JSM GTMP2
 03110 070306       RAR 7
 03111 071711       SLA *-2      CHAR IS OP CODE?
 03112 070153       SAP TBS4      LAST ENTRY?
 03113 021750       LDA TMP4      RESTORE FIRST CHARACTER
 03114 170402       RET            RETURN TO P+1
 03115 021750 TBS4  LDA TMP4
 03116 067101       JMP TBS2        CONTINUE
*
*    CONSTANTS, TEMPORARIES, ETC.
*    USED IN ABOVE ROUTINES
*
*
 03117 001742 TMP2A DEF TMP+2
 03120 006006 LISTR DEF LIST1
 03121 000200 B200  OCT 200
 03122 001704 BKPTA DEF BKPTR
 03123 001621 ENDW  DEF RBUFF+40
 03124 000033 B33   OCT 33
 03125 000176 B176  OCT 176
 03126 000137 B137  OCT 137
 03127 000163 DELIN OCT 163
 03130 003321 IOEND DEF IOBUF+IOBUF+81

     #01  DEFINE-A-KEY-ROUTINES

*
*    DEFINE-A-KEY-ROUTINES
*
*  THE FIRST WORD OF EACH DEFINITION CONTAINS THE
*  KEYCODE OF THAT KEY.  THE SECOND WORD CONTAINS THE LENGTH
*  OF THE DEFINITION PLUS 1.  WHILE IN DEFINITION MODE
*  "UKPTR" POINTS THE THE LENGTH WORD.
*
 03131 060626 KEYPR JSM SAVBP        SAVE BADDR
 03132 020212       LDA .SLBF
 03133 031400       STA BADDR
 03134 061055       JSM GNEXT        SET UP FOR TABLE SEARCH
 03135 027152       LDB KTBA
 03136 160175       JSM TSRHA,I      SEARCH TABLE
 03137 067153       JMP RCAL         NOT FOUND
 03140 074742       SBR 16
 03141 035432       STB URQST
 03142 050024       AND .7
 03143 003145       ADA JTBA         A-REG HAS OPCODE
 03144 070737       JMP A,I
*
 03145 103145 JTBA  DEF JTBL-1,I
 03146 003253 JTBL  DEF XRUN   RUN
 03147 003310       DEF XSCR   SCRATCH
```

#01 DEFINE-A-KEY-ROUTINES

```
03150 003330         DEF XLST   LIST
03151 003261         DEF XKEY   FETCH
*
03152 007155 KTBA    DEF KTBL+KTBL+1
03153 060633 RCAL    JSM RESR1       RESTORE BADDR
03154 063346         JSM HUNT        FIND THE LOCATION
03155 160206 KERR    JSM ERRA,I      NOT FOUND, ERROR
03156 074517         LDA B,I
03157 031466         STA LOCL1       SAVE LENGTH WORD
03160 070744         SAL 1
03161 000136         ADA M5          ASSUME ODD COUNT
03162 070113         SAP *+2       NULL DEFINITION?
03163 066045         JMP REED6     YES, IGNORE
03164 031473         STA CCNT      SAVE CHARACTER COUNT
03165 035470         STB L2T1        SAVE LOCATION
03166 074070         SIB *+1
03167 074517         LDA B,I         LOOK AT LINE #
03170 074070         SIB *+1
03171 070110         SZA *+2         IS THIS A TYPING AID?
03172 067222         JMP RFNX        NO
03173 074744         SBL 1           YES
03174 035740         STB TMP       SAVE CHARACTER POINTER
03175 074002         SBR 1
03176 005466         ADB LOCL1
03177 004134         ADB M3
03200 074517         LDA B,I         LOOK AT LAST WORD
03201 050105         AND B377
03202 070450         SZA *+9
*
03203 045473         ISZ CCNT      CORRECT COUNT
03204 010100         CPA ASTR1       CHECK FOR *
03205 067207         JMP *+2
03206 066045         JMP REED6
03207 074517         LDA B,I
03210 050157         AND M256
03211 040027         IOR AIEX1       IEX CODE
03212 067220         JMP *+6
*
03213 074517         LDA B,I
03214 013362         CPA ASTR2       CHECK FOR *
03215 067217         JMP *+2
03216 066045         JMP REED6
03217 023363         LDA AIEX2       IEX CODE
03220 074557         STA B,I
03221 066045         JMP REED6
*
03222 074517 RFNX    LDA B,I         CHECK FOR LEGITIMATE FUNCTION
03223 050065         AND K1          (076000)
03224 010004         CPA K2          (010000)
03225 076130         RIB *+2
03226 067246         JMP RRUN        NOT DEF
03227 074517         LDA B,I
03230 053357         AND K3          (176037)
03231 013360         CPA K4          (012037)
03232 067234         JMP *+2
03233 067246         JMP RRUN        NOT DEF
03234 020162         LDA FN
03235 031754         STA AR2         "FN"
03236 074517         LDA B,I
03237 070202         SAR 5           EXTRACT THE LETTER
03240 050040         AND .31
03241 040101         IOR B100
03242 070404         SAL 8
03243 031755         STA AR2+1       "X("
03244 027361         LDB ALCL1     GET POINTER
03245 066246         JMP RFNX1     SET UP COUNT
*
03246 061225 RRUN    JSM LDEF      LEAVE DEF MODE
03247 025470         LDB L2T1        YES, CAN RUN
03250 063336         JSM SUMP
03251 070742         SAR 16
03252 066157         JMP CONTK     CONTINUE FROM BEGINNING OF KEY
*
03253 061225 XRUN    JSM LDEF      INSURE NOT IN KEY MODE
03254 063346         JSM HUNT
03255 067155         JMP KERR      KEY UNDEFINED
03256 063336         JSM SUMP      SET UP PROGRAM POINTERS
03257 070742         SAR 16
03260 164171         JMP RUNA,I    RUN
*
*
03261 061225 XKEY    JSM LDEF        INSURE NOT IN DEFINITION MODE
03262 063346         JSM HUNT        FIND THE LOCATION
03263 063270         JSM NEWK        NOT FOUND, NEW KEY REQUIRED
03264 063336         JSM SUMP
03265 060651         JSM INITS       INITIALIZE STACKS
03266 070742         SAR 16
03267 066254         JMP EFET+1    FETCH FIRST LINE
*
03270 160242 NEWK    JSM DCOMA,I   DECOMPILE PROGRAM
```

```
03271 021405        LDA FWUP      ADD A NEW KEY TO DEFINITION AREA
03272 031476        STA TEMP3
03273 020017        LDA .2
03274 160250        JSM OVCHA,I     CHECK FOR OVERFLOW
03275 061121        JSM MVTOH       MOVE CORE
03276 021751        LDA TMPS
03277 131405        STA FWUP,I      STORE NEW KEY
03300 045405        ISZ FWUP
03301 025405        LDB FWUP
03302 045405        ISZ FWUP        UPDATE FWUP
03303 020012        LDA .1
03304 074557        STA B,I         INITIALIZE LENGTH WORD
03305 045424        ISZ PBUFF
03306 045424 NEWK1  ISZ PBUFF       UPDATE PBUFF
03307 170402        RET
*
* SCRATCH A KEY
*
03310 061225 XSCR   JSM LDEF        INSURE NOT IN DEFINITION MODE
03311 160242        JSM DCOMA,I   DECOMPILE
03312 063346        JSM HUNT        FIND THE LOCATION
03313 164174        JMP RDYDA,I     NOT FOUND, IGNORE
03314 074117        LDA B
03315 070437        ADB A,I         END OF AREA
03316 000132        ADA M1          START OF AREA
03317 031477 XSCR1  STA TEMP4
03320 160251        JSM CLPIA,I     CLOSE UP AREA
03321 021405        LDA FWUP
03322 074017        ADA B
03323 031405        STA FWUP        UPDATE FWUP
03324 005424        ADB PBUFF
03325 035424        STB PBUFF       UPDATE PBUFF
03326 060651        JSM INITS     INITIALIZE STACKS
03327 164174        JMP RDYDA,I     RETURN TO MONITOR
*
* LIST A DEFINITION
*
03330 063346 XLST   JSM HUNT        FIND THE LOCATION
03331 067615        JMP XLST1+1   NOT FOUND
03332 074117        LDA B
03333 070437        ADB A,I         END OF AREA
03334 070070        STA *+1         START OF AREA
03335 067614        JMP XLST1     LIST DEFINITION
*
* SET UP MISCELLANEOUS POINTERS
*
03336 021424 SUMP   LDA PBUFF
03337 031425        STA PBUFO       SAVE OLD PBUFF
03340 035422        STB UKPTR
03341 035424        STB PBUFF
03342 074517        LDA B,I
03343 070037        ADB A
03344 035423        STB PBPTR       ESTABLISH NEW PBPTR
03345 067306        JMP NEWK1
*
* SUBROUTINE TO FIND A DEFINED KEY AREA
*
* RETURN TO P+1 IF NOT FOUND
* RETURN TO P+2 IF FOUND WITH B-REG = ADDRESS OF LENGTH WORD
*
03346 024166 HUNT   LDB FWAM      START SEARCHING AT FWAM
03347 015405 HUN1   CPB FWUP
03350 170402        RET             UNDEFINED
03351 074517        LDA B,I
03352 074070        SIB *+1         EXTRACT THIS KEYCODE
03353 011751        CPA TMPS       AND COMPARE WITH DESIRED
03354 064357        JMP RETN2       FOUND IT
03355 074437        ADB B,I
03356 067347        JMP HUN1
*
* CONSTANTS
*
00065        K1     EQU UPMSK       (076000)
00004        K2     EQU B10K        (010000)
03357 176037 K3     OCT 176037
03360 012037 K4     OCT 012037
03361 003730 ALCL1  DEF AR2+AR2
00100        ASTR1  EQU B52
03362 025000 ASTR2  OCT 025000
00027        ATEX1  EQU .11
03363 005400 ATEX2  OCT 005400
```

#01 SYSTEM TABLES

```
*
*  NON-FORMULA OPERATORS
*
03364 052110 FOP13 ASC 2,THEN
03365 042516
```

#01 SYSTEM TABLES

```
03366 150117        OCT 150117    THEN: 20
03367 043321        OCT 043321    OF: 21
03370 043203 FTABL  OCT 43203     F: 3
03371 042704        OCT 42704     E: 4: EOT
03372 041206        OCT 41206     B: 6
03373 054207        OCT 54207     X: 7
03374 027710        OCT 27710     /: 10: EOT
03375 027311        OCT 27311     .: 11: EOT
03376 051524 FOPST  ASC 2,STEP
03377 042520
03400 156524        OCT 156524    STEP  35
03401 047736        OCT 047736    TO: 36
03402 047522 OR     ASC 1,OR
03403 113101        OCT 113101    OR: 26
03404 047104        ASC 1,ND
03405 153516        OCT 153516    AND: 27
03406 047524        ASC 1,OT
03407 154076 GTE    OCT 154076    NOT: 30
03410 036631        OCT 036631    >=: 31
03411 036075        ASC 1,<=
03412 115074        OCT 115074    <=: 32
03413 037320        OCT 037320    <>: 20
*
*  SYSTEM COMMAND JUMP TABLE
*
03414 004322        ABS FLT-*
03415 004322        ABS FIXED-*
03416 000437        ABS PTAPE-*
03417 176534 LBL1   ABS CONT-*
03420 001237        ABS DELET-*
03421 001244        ABS RENUM-*
03422 004335        ABS NORML-*
03423 004331        ABS TRACE-*
03424 000151        ABS AUTO-*
03425 176626        ABS EFET-*
03426 000155        ABS LISTC-*
03427 001212        ABS SCRAT-*
03430 001311        ABS RUN-*
*
*  SYSTEM COMMAND NAME TABLE
*
03431 051105 CMD13  ASC 1,RE
03432 047210        OCT 47210     REN: 001000
03433 042105        ASC 1,DE
03434 046271        OCT 046271    DELETE: 111001
03435 050124        ASC 1,PT
03436 040653        OCT 40653     PTAPE: 1011011
03437 043111        ASC 1,FI
03440 054214        OCT 54214     FIXED: 001100
03441 043114        ASC 1,FL
03442 052215        OCT 52215     FLOAT: 001101
03443 052122        ASC 2,TRAC
03444 040503
03445 042666        OCT 42666     TRACE: 110110
03446 047117        ASC 3,NORMAL
03447 051115
03450 040514
03451 103503        OCT 103503     NORMAL: 000111
03452 047516        ASC 1,ON
03453 052252        OCT 52252     CONT: 101010
03454 051524        ASC 2,STOP
03455 047520
03456 137501        OCT 137501     STOP: 111111 (NO JUMP)
03457 052524        ASC 1,UT
03460 047605        OCT 47605     AUTO 000101
03461 051524        ASC 2,STOR
03462 047522
03463 042600        OCT 42600      STORE: 000000 (NO JUMP)
03464 046117        ASC 2,LOAD
03465 040504
03466 110114 KTBL   OCT 110114     LOAD: 010000 (NO JUMP)
03467 044523        ASC 1,IS
03470 052203        OCT 52203      LIST: 000011
03471 051125        ASC 1,RU
03472 047241        OCT 047241     RUN: 100001
03473 051503        ASC 3,SCRATC
03474 051101
03475 052103
03476 044202        OCT 44202      SCRATCH: 000010
03477 043105        ASC 2,FETC
03500 052103
03501 044344        OCT 44344      FETCH: 100100
```

#01 SYNTAX

```
*
*  DATA STATEMENT SYNTAX
*
```

```
03502 045706 DATAS ISZ SBPTR
03503 061156       JSM CONST      LOOK FOR A NUMBER
03504 160206 NDATA JSM ERRA,I     NOT FOUND
03505 160244       JSM NUMOA,I    FOUND; STORE IN SYNTAX BUFFER
03506 060504 DATA2 JSM COMCK      COMMA?
03507 065151       JMP EOST       NO
03510 067502       JMP DATAS
*
*  FORMAT STATEMENT SYNTAX
*
03511 061055 FMTS  JSM GNEXT      GET FIRST CHAR OF NEXT SPEC
03512 060750       JSM DIGCK      DIGIT?
03513 067521       JMP FMTF       NO
03514 035724       STB GFLAG      YES, SET FOR ERROR ON OVERFLOW
03515 055400       DSZ BADDR      FETCH AND
03516 024161       LDB MAXSN        STORE
03517 060666       JSM PGINT      REPEAT FIELD
03520 067522       JMP *+2
03521 045706 FMTF  ISZ SBPTR      MOVE TO NEW WORD
03522 027552       LDB FADD       LOOK FOR
03523 060546       JSM STEXP        "F" OR "E"
03524 067537       JMP FMTB       NOT FOUND
03525 024161       LDB MAXSN      FOUND; FETCH AND
03526 060666       JSM PGINT      STORE FIELD WIDTH
03527 027553       LDB .ADD       LOOK FOR
03530 060546       JSM STEXP
03531 160206 FMTER JSM ERRA,I     NOT FOUND
03532 024161 FMTD  LDB MAXSN
03533 061131       JSM PGIN0      FETCH DIGIT FIELD, ALLOW 0
03534 061153 FMTC  JSM EOLCK      EOL?
03535 060510       JSM COMCE      NO, DEMAND A COMMA
03536 067511       JMP FMTS       GET NEXT SPEC
03537 027554 FMTB  LDB BADD
03540 060546       JSM STEXP      SEARCH FOR "B", "X", OR "/"
03541 067545       JMP FMTQT      NOT FOUND
03542 061055       JSM GNEXT      FOUND
03543 045706       ISZ SBPTR
03544 067534       JMP FMTC       DEMAND COMMA OR EOL
03545 010043 FMTQT CPA B42        QUOTE?
03546 067550       JMP *+2
03547 067531       JMP FMTER      NO
03550 160245       JSM GTSTA,I    YES, GET QUOTE FIELD
03551 067534       JMP FMTC
03552 006760 FADD  DEF FTABL+FTABL
03553 006772 .ADD  DEF FTABL+FTABL+10
03554 006764 BADD  DEF FTABL+FTABL+4
*
*  GOTO AND GOSUB STATEMENT SYNTAX
*
03555 060626 GOTOS JSM SAVBP      SAVE BADDR AND SBPTR
03556 055724       DSZ GFLAG      SET TO RETURN ON ERROR FROM INTCK
03557 060664       JSM LNUM       LOOK FOR A LINE NUMBER
03560 067572       JMP GOTO3      FOUND
03561 060640 GOTO1 JSM RESBP      RESTORE POINTERS
03562 160202       JSM FSCA,I     FETCH FORMULA
03563 027574       LDB OFA
03564 060546       JSM STEXP      STORE "OF" AS EXPANDED OPERATOR
03565 160206 MISOF JSM ERRA,I     NOT FOUND
03566 060664 GOTO2 JSM LNUM       FETCH LINE NUMBER
03567 061153       JSM EOLCK      EOL?
03570 060510       JSM COMCE      DEMAND A COMMA
03571 067566       JMP GOTO2
03572 061153 GOTO3 JSM EOLCK      EOL?
03573 067561       JMP GOTO1      NO, TRY FOR A FORMULA INSTEAD
03574 006755 OFA   DEF FOP13+FOP13+5
*
*  AUTO SYSTEM COMMAND
*
03575 063647 AUTO  JSM GETLN      GET OPTIONAL PARAMETERS
03576 020061       LDA .10
03577 024061       LDB .10
03600 031427       STA .LNUM      SET INITIAL LINE NUMBER
03601 035430       STB LNINC      SET INCREMENT
03602 164173       JMP PEXMA,I
*
*  LIST EXECUTION
*
03603 061055 LISTC JSM GNEXT      GET NEXT CHARACTER
03604 013627       CPA B43        "#"?
03605 067623       JMP LSTC2      YES
03606 055400       DSZ BADDR      RESET POINTER
03607 063647 LSTC1 JSM GETLN      GET OPTIONAL LINE #'S
03610 070742       SAR 16
03611 024056       LDB .1E4
03612 060730       JSM GETAD      GET ADDRESSES
03613 021477       LDA TEMP4
03614 160122 XLST1 JSM LISTA,I    LIST
03615 160170       JSM CLERA,I    CLEAR BUFFER
03616 025412       LDB LSTPT
03617 074076       TCB
```

#01 SYNTAX

```
03620 005413        ADB HSTPT     COMPUTE WORDS BETWEEN STACKS
03621 160210        JSM OUTIA,I   PUT IN BUFFER
03622 164173        JMP PEXMA,I
03623 060664 LSTC2  JSM LNUM      FETCH SELECT CODE
03624 074204        SBL 12
03625 035447        STB SLCOD
03626 067607        JMP LSTC1
03627 000043 B43    OCT 43
*
*  STOP STATEMENT SYNTAX
*
03630 065147        JMP ENDS
03631 021416 STOPS  LDA MODE
03632 071711        SLA STOPS-1   SKIP IF PROG
03633 063647        JSM GETLN     GET PARAMETERS
03634 020056        LDA .1E4
03635 024056        LDB .1E4      SET DEFAULT PARAMETERS
03636 060741        JSM FND-1     FIND ADDRESS OF FIRST
03637 015423        CPB PBPTR     PAST END OF PROG?
03640 074742        SBR 16        YES, CLEAR FLAG
03641 035436        STB HFLG1
03642 060740        JSM FND-2     FIND ADDRESS OF SECOND
03643 015423        CPB PBPTR
03644 074742        SBR 16
03645 035437        STB HFLG1+1
03646 164174        JMP RDYDA,I
*
*
*  SUBROUTINE TO BUILD AND STORE N>0 LINE NUMBERS
*    RETURN TO: P+1=NONE GIVEN
*               P+2:1 GIVEN (A)=NUMBER
*               P+3:2 GIVEN (A)=FIRST, (B)=SECOND
*    NUMBERS ARE STORED SEPARATED BY COMMAS IN S-BUFFER
*
03647 061066 GETLN  JSM GETSK     GET NEXT CHAR
03650 170402        RET           NONE GIVEN
03651 060750        JSM DIGCK     DIGIT?
03652 067647        JMP GETLN     NO, IGNOR IT
03653 060663        JSM LNUM-1    BUILD FIRST INTEGER
03654 035720        STB LASTN     SAVE 1ST #
03655 010031        CPA EOL       END OF LINE?
03656 067662        JMP GETL2     YES,RETURN TO P+2
03657 060365        JSM RET2      INCREMENT RETURN ADDRESS
03660 060510        JSM COMCE     FIND AND RECORD A COMMA
03661 060664        JSM LNUM      GET NEXT LINE NUMBER
03662 021720 GETL2  LDA LASTN     MOVE TO (A)
03663 064357 GETLR  JMP RETN2     RETURN TO P+2 OR P+3
*
03664 000000        BSS 1         *******CHECKSUM*******
*
*  CLEAR ROUTINE
*
03665 070742 ECLR   SAR 16
03666 031430        STA LNINC     CLEAR AUTO MODE
03667 170402        RET           RETURN TO P+1
*  3677 IS LAST
*  MATH TABLES HERE
```

#01 9830--MONITOR

```
*
04000               ORG 4000B
*
04000 020116 ENTRY  LDA UTOP      CLEAR THE BASE PAGE
04001 170000        CLR
04002 000135        ADA M4
04003 073710        RZA *-2
04004 024066        LDB INF       DETERMINE THE
04005 004160 MAWCK  ADB M1024
04006 074577        STB B,I
04007 074477        CPB B,I       LAST WORD OF R/W
04010 066012        JMP *+2       YES , IT WAS
04011 066005        JMP MAWCK     CHECK NEXT PAGE
*
*
04012 074557        STA B,I       INITIALIZE LAST WORD
04013 035403        STB MAW
04014 004132        ADB M1        SET THE POINTER
04015 035404        STB LWAM        TO THE LAST AVAILABLE WORD
04016 024116        LDB REED
04017 035462        STB REEDL     INITIALIZE KEYBOARD LINK
04020 024207        LDB INTEA
04021 035463        STB INTEL     INITIALIZE INTERRUPT LINK
04022 020026        LDA .9
04023 031452        STA CPLAC     SET DECIMAL SETTING TO 9
04024 031451        STA CTYPE     SET MODE TO "FLOAT"
04025 045434        ISZ UNITS     INITIALIZE TO RADIANS
04026 045450        ISZ PMODE     INITIALIZE TO NORMAL
04027 020166 KILLK  LDA FWAM      INITIALIZE START OF
```

#01 9830--MONITOR

```
04030 031405        STA FWUP       USER PROGRAM(SCRATCH KEYS)
04031 020112 KILLP  LDA RSTKA     INITIALIZE RETURN
04032 031777        STA RSPTR       POINTER
04033 062734        JSM SCRP      INITIALIZE PROGRAM POINTERS
04034 061233        JSM LOFF+6   RESET USER KEY POINTER
04035 060645 KILLV  JSM MINIT     INITIALIZE SYMBOL TABLE
04036 060651        JSM INITS     INITIALIZE STACKS AND FLAGS
04037 070742 RDYPT  SAR 16
04040 031433        STA TFLAG     CLEAR PTAPE FLAG
04041 031430        STA LNINC     SET TO MANUAL
*
04042 160170        JSM CLERA,I   CLEAR DISPLAY
04043 031622        STA TERM      RESET CRLF FLAG
04044 070742 PEXMK  SAR 16
04045 031701        STA NDISP
04046 031702        STA NPRIN
04047 021432 PEXM2  LDA UROST
04050 070510        SZA PEXM3     SKIP IF NOT DATA REQUEST
04051 020012        LDA .1
04052 026267        LDB UMRKA       PRINT A ?
04053 061330        JSM .NPWR
04054 066100        JMP PEXM1
*  PTAPE SYSTEM COMMAND
04055 031433 PTAPE  STA TFLAG     STORE DEVICE CODE
04056 072110        RZA *+2
04057 064726        JMP SYF25     SELECT CODE NOT GIVEN
04060 020132        LDA M1
04061 031742        STA TMP2      SET FLAG FOR LEADER
04062 070742 PEXM3  SAR 16
04063 031442        STA STPFL     CLEAR THE STEP-STOP FLAG
04064 020127        LDA H170K
04065 031447        STA SLCOD     SET TO STANDARD PRINTER
04066 021400        LDA BADDR
04067 010212        CPA .SLBF     BLANK SCREEN?
04070 066072        JMP *+2       YES
04071 066100        JMP PEXM1
04072 026264        LDB LTADD     GET ADDRESS OF LAZY-T
04073 021422        LDA UKPTR
04074 070170        SIA *+3       SKIP IF NOT KEY MODE (A)=1
04075 004134        ADB M3        GET ADDRESS OF KEY-LAZY-T
04076 020021        LDA .4
04077 061335        JSM NPWRT     WRITE ON DISPLAY
*
04100 024112 PEXM1  LDB RSTKA
04101 035777        STB RSPTR     RESET STACK
04102 020041 ALNUM  LDA .32
04103 031707        STA BLANK     SET TO IGNOR BLANKS
04104 021430        LDA LNINC
04105 070410        SZA GTRC1     SKIP IF MANUAL
04106 021701        LDA NDISP
04107 072350        RZA GTRC1+1   SKIP IF MESSAGE ON SCREEN
04110 160170        JSM CLERA,I   CLEAR OFF LAZY-T
04111 025427        LDB .LNUM
04112 160210        JSM OUTIA,I   PUT LINE # IN BUFFER
04113 045400        ISZ BADDR     OUTPUT A SPACE
04114 066116        JMP *+2
04115 031427 GTRC1  STA .LNUM     SET LINE # IF MANUAL
04116 161462 GTRCD  JSM REEDL,I   READ RECORD
04117 066042        JMP PEXMK-2   NULL RECORD
04120 061062        JSM GFRST     GET FIRST CHAR IN (A)
04121 066042        JMP PEXMK-2   NULL RECORD
04122 074742        SBR 16
04123 035724        STB GFLAG     SET FLAG FOR INTEGER ERROR
04124 025432        LDB UROST
04125 074730        SIB CKRCD     SKIP IF NOT DATA REQUEST
04126 035642        STB SAVE      SAVE RETURN ADDRESS
04127 074742        SBR 16
04130 035432        STB UROST     CLEAR THE INPUT FLAG
04131 035416        STB MODE      SET TO PROGRAM EXECUTION MODE
04132 160237        JSM SALTA,I   STATEMENT GIVEN?
04133 066260        JMP GTRC2     NO
04134 020127 GTRC3  LDA H170K     YES
04135 031447        STA SLCOD     SET TO STANDARD PRINTER
04136 022270        LDA CALSN
04137 031416        STA MODE      SET TO CALC SYNTAX MODE
04140 061062        JSM GFRST
04141 000000        NOP           *** CHECKSUM
04142 066154        JMP SYNTX
04143 025416 CKRCD  LDB MODE
04144 074111        SLB *+2       SKIP IF EOL
04145 066154        JMP SYNTX     EXECUTE: DONT ALLOW LINE #
04146 010100        CPA STAR      FIRST CHAR AN "*"?
04147 066251        JMP UKDEF     YES
04150 060675        JSM INTCK-1   BUILD A LINE #
04151 035427        STB .LNUM     STORE LINE #
*                  (A) CONTAINS NEXT CHAR
04152 010031        CPA EOL       END OF LINE?
04153 066500        JMP DELST     YES, DELETE LINE FROM CODE
*
04154 025426 SYNTX  LDB PBPTO     GET MAINLINE END POINTER
```

```
04155 015424         CPB PBUFF      NULL PROGRAM?
04156 062734         JSM SCRP       YES. INSURE NO SPURIOUS COMMON EXISTS
04157 024026         LDB .9         SET STORF FLAG FALSE
04160 035710         STB MSFLG        (DONT RECOGNISE ASSIGNMENT)
04161 025413         LDB HSTPT      INITIALIZE
04162 004132         ADB M1           THE S-STACK
04163 035472         STB TEMPS          POINTER
04164 074742         SBR 16
04165 035711         STB DFLAG      CLEAR DEFINE FLAG
04166 035714         STB SFLAG
04167 160237 STMT    JSM SALTA,I    SEARCH TABLES FOR STATEMENT
04170 066201         JMP CMND       NOT FOUND
04171 045706         ISZ SBPTR
04172 135706         STB SBPTR,I    STORE THE PAGE
04173 025416         LDB MODE
04174 074211         SLB STMT1      SKIP IF PROGRAM MODE
04175 070304         SAL 10         SHIFT OP CODE
04176 070112         SAM STMT1      SKIP IF STMT TYPE IS ALLOWED
04177 062360 NCALC   JSM ERROR      STMT NOT ALLOWED IN CALC
04200 165473 STMT1   JMP TEMP,I     BRANCH TO CODE FOR STATEMENT
04201 024132 CMND    LDB M1         SEARCH TABLES FOR
04202 160237         JSM SALTA,I      SYSTEM COMMAND
04203 066221         JMP ILET       NOT FOUND
04204 074742 CMNDF   SBR 16
04205 035431         STB CLINE      RESET POINTER FOR LIST
04206 035430         STB LNINC      RESET AUTO
04207 035416         STB MODE       SET TO PROG
04210 035442         STB STPFL      CLEAR "STEP" FLAG
04211 070142         SAR 4          GET # OF PARAMETERS ALLOWED
04212 070210         SZA JCMND      BRANCH IMMEDIATELY
04213 162733         JSM GETLA,I    GET LINE # PARAMETERS
04214 070742         SAR 16         NONE GIVEN.ASSUME 0
04215 024056         LDB .1E4       ONLY ONE GIVEN; ASSUME INFINITY
04216 161473 JCMND   JSM TEMP,I     BRANCH TO COMMAND EXECUTION
*  ALL COMMAND JUMP TO PEXMK OR RDYPT EXCEPT FETCH
*    WHICH JUMPS TO READ; THE FOLLOWING TWO INSTRUCTIONS
*    ARE RETURN EXITS FOR READ
04217 066042         JMP PEXMK-2
04220 066120         JMP GTRCD+2
*
04221 070742 ILET    SAR 16         GET SPEICAL CHAR FOR IMPLIED LET
04222 066164         JMP STMT-3     FIND BLOCK FOR IMPLIED LET
*
04223 055400 ILETS   DSZ BADDR
04224 061055         JSM GNEXT      RECALL CHARACTER
04225 055400         DSZ BADDR
04226 060752         JSM LETCK      LETTER?
04227 066234         JMP ILET1+1     NO. TRY INPLIED DISP
04230 060626         JSM SAVRP      SAVE POINTERS
04231 062274         JSM LETSN      TRY "LET" SNTAX
04232 066244         JMP NSTMT+1    OK. CHECK FOR EOL
04233 060640 ILET1   JSM RESRP      RESTORE POINTERS
04234 020125         LDA PRTOP      STORE CODE FOR
04235 055706         DSZ SBPTR
04236 131706         STA SBPTR,I       IMPLIED LET
04237 045706         ISZ SBPTR
04240 025416         LDB MODE
04241 074111         SLB NSTMT      SKIP IF PROG
04242 062315         JSM PRNTS      TRY "PRINT" SYNTAX
04243 062360 NSTMT   JSM ERROR      NO STATEMENT TYPE CAN BE FOUND
04244 061153         JSM EOLCK      END OF LINE?
04245 021416         LDA MODE       NO
04246 070111         SLA *+2
04247 066233         JMP ILET1      TRY PRINT SYNTAX IF CALC MODE
04250 065152         JMP NOEOF
*
04251 021422 UKDEF   LDA UKPTR      IN KEY DEFINITION MODE?
04252 072110         RZA *+2
04253 160206 UKERR   JSM ERRA,I     NO. DEFINITION NOT ALLOWED
04254 074742         SBR 16
04255 135706         STB SBPTR,I    SET A 0 LINE NUMBER
04256 160253         JSM CHRSA,I    ACCEPT AN ASCII STRING
04257 066522         JMP ACTKY      ACCEPT DEFINITION
*
04260 024132 GTRC2   LDB M1
04261 160237         JSM SALTA,I    SYSTEM COMMAND IN "INPUT"?
04262 165642         JMP SAVE,I     NO. RETURN DATA TO INPUT STMT
04263 066134         JMP GTRC3      YES. ABORT INPUT
*
04264 010555 LTADD   DEF ***+5
04265 045505         ASC 1,KE
04266 054437         OCT 54437      Y.LAZY-T
04267 000131 QMRKA   DEF .63+.63+1
04270 100001 CALSN   OCT 100001
00116        IMPOP   EQU GTOP       OP CODE 1
00125        PRTOP   EQU L30P       OP CODE 24
00100        STAR    EQU B52
00123        STDPG   EQU R80P
*
*  LET STATEMENT SYNTAX
```

#01 9830--MONITOR

```
*
04271 062274 LETS   JSM LETSN
04272 065151        JMP EOST
04273 160206 SYNE2  JSM ERRA,I
*
 LET SYNTAX SUBROUTINE
 EXIT P+1: STORE OCCURRED
      P+2: NO STORE OCCURRED
*
04274 055710 LETSN  DSZ MSFLG      ENABLE ASSIGNMENT
04275 160202        JSM FSCA,I     GET FORMULA
04276 025714        LDB SFLAG
04277 014133        CPB M2         DID A STORE OCCUR
04300 170402        RET            YES
04301 064357        JMP RETN2      NO
*
 WRITE AND PRINT STATEMENT SYNTAX
*
04302 160265 RITE   JSM IOHEA,I    GET DEVICE AND FORMAT
04303 060534        JSM RPCKF      GET RIGHT PAREN
04304 055400        DSZ BADDR
04305 055706        DSZ SBPTR
*
04306 062315 PRINS  JSM PRNTS      CHECK SYNTAX (TO ACTST IF OK)
04307 160206 SYE15  JSM ERRA,I     IMPROPER SYNTAX
*
 PRINT STATEMENT SYNTAX SUBROUTINE
*
04310 010043 PRIN1  CPA B42        QUOTE?
04311 066325        JMP PRIN2+4    YES
04312 060461        JSM SYMC2
04313 012001        DEF COMMA-1    COMMA OR SEMICOLON?
04314 066321        JMP PRIN2      NO
04315 024132 PRNTS  LDB M1
04316 035712        STB PFLAG      ENABLE FORMULA AND TAB
04317 061066        JSM GETSK
04320 065150        JMP EOST-1
04321 010043 PRIN2  CPA B42        QUOTE?
04322 066324        JMP *+2        YES
04323 066334        JMP PRIN3      NO
04324 045706        ISZ SBPTR
04325 160245        JSM GTSTA,I    RECORD STRING CONSTANT
04326 061153        JSM EOLCK      EOL?
04327 074742        SBR 16
04330 135706        STB SBPTR,I    CLEAR OUT NEXT WORD
04331 024132        LDB M1
04332 035712        STB PFLAG      ENABLE FORMULA
04333 066310        JMP PRIN1
04334 045712 PRIN3  ISZ PFLAG      TAB OR FORMULA PERMITTED?
04335 170402        RET            NO, RETURN, IMPROPER SYNTAX
04336 026354        LDB TABA
04337 160175        JSM ISRHA,I    LOOK FOR "TAB"
04340 066350        JMP PRIN4      NO
04341 070544        SAL 5
04342 040067        IOR TYPFI      SET PRE-DEFINED FUNCTION FLAGS
04343 060454        JSM SBPUD-2    STORE CODE FOR TAB
04344 024123        LDB RHOP
04345 135706        STB SBPTR,I
04346 160202        JSM FSCA,I     GET TAB FORMULA
04347 066352        JMP PRIN5
04350 055400 PRIN4  DSZ BADDR      BACK UP POINTER
04351 160202        JSM FSCA,I     FETCH FORMULA
04352 061153 PRIN5  JSM EOLCK      EOL?
04353 066310        JMP PRIN1      NO
04354 023773 TABA   DEF TAB+TAB+1
*
 OUTPUT ERROR # GIVEN IN P+1
*
04355 060405 AERR   JSM XFAR1      SAVE AR2 IN AR1
04356 060400        JSM GPARM      GET ERROR # IN (B)
04357 066370        JMP ERR1
*
 OUTPUT ERROR # FROM ERROR TABLE
*
04360 055777 ERROR  DSZ RSPTR
04361 121777        LDA RSPTR,I    ERROR SOURCE IN (A)
04362 026476        LDB ERRS       TABLE ADDRESS IN (B)
04363 074070        STB *+1        INC ADDRESS
04364 074457        CPA B,I        MATCH?
04365 074076        TCB            YES
04366 075653        SBP *-3        CONTINUE IF NO MATCH
04367 006476        ADB ERRS       COMPUTE NEGATIVE OF ERROR #
04370 035706 ERR1   STB SBPTR      SAVE -(ERROR #)
04371 021450        LDA PMODE
04372 072350        RZA ERR2
04373 021433        LDA TFLAG
04374 070250        SZA ERR2       SKIP IF NOT PTAPE
04375 020060        LDA .100
04376 024211        LDB .BUFA
04377 061337        JSM NDWRT      PRINT LINE IF PTAPE AND P-ALL
```

#01 9830--MONITOR

```
04400 061344             JSM CRLF1
04401 021416 ERR2        LDA MODE
04402 070112             SAM *+2          SKIP IF SYNTAX MODE
04403 160264             JSM CRCKA,I      TERMINATE CURRENT LINE
04404 160170             JSM CLERA,I      CLEAR BUFFER
04405 035622             STB TERM         SET UNTERMINATED FLAG
04406 020127             LDA B170K
04407 031447             STA SLCOD        SET TO STANDARD PRINTER
04410 020023             LDA .6
04411 026464             LDB EMSGA
04412 061335             JSM NPWRT        PUT "ERROR" IN BUFFER
04413 025706             LDB SHPTR
04414 074076             TCB
04415 160210             JSM OUTIA,I      OUTPUT POSITIVE ERROR #
04416 025427             LDB .LNUM        IS A LINE NUMBER
04417 074310             SZB ERR3           APPLICABLE
04420 020026             LDA .9
04421 026465             LDB LMSGA
04422 061335             JSM NPWRT        PUT "IN LINE " IN BUFFER
04423 025427             LDB .LNUM
04424 160210             JSM OUTIA,I      OUTPUT LINE #
04425 045400 ERR3        ISZ BADDR
04426 045400             ISZ BADDR        OUTPUT 2 BLANKS
04427 021433             LDA TFLAG
04430 072110             RZA *+2
04431 072053             SAP *+1,S        SET TO "PRINT" IF PTAPE
04432 031453             STA PRFLG        SET "DISP"FLAG
04433 160176             JSM ELINA,I      OUTPUT ERROR
04434 160264             JSM CRCKA,I      GIVE CRLF IF P-ALL OR PTAPE
04435 025706 ERR4        LDB SBPTR        RECALL -(ERROR #)
04436 014132             CPB M1           ERROR 1?
04437 066445             JMP ERN1         YES
04440 004063             ADB .99
04441 074313             SBP ERR5         SKIP IF NON-RECOVERABLE
04442 035442             STB STPFL        SET TO STOP AT END OF LINE
04443 035622             STB TERM         SET UNTERMINATED LINE FLAG
04444 064444             JMP XFAR2        RESTORE AR2 AND RETURN
*
04445 035421 ERN1        STB PRADD        SET TO ABORT DECOMPILE
04446 035416             STB MODE         SET TO SCRATCH SYMTAB
04447 021432 ERR5        LDA DRQST
04450 070110             SZA *+2          IN "INPUT" STATEMENT?
04451 165432             JMP DRQST,I      YES, RETURN
04452 021416             LDA MODE         FIND OUT WHERE ERROR OCCURRED
04453 010132             CPA M1           MFASE?
04454 066460             JMP ERET-2      YES
04455 070210             SZA ERET-1       SKIP IF PROGRAM EXECUTION
04456 070212             SAM ERET         SKIP IF SYNTAX PHASE
04457 166477             JMP CALXA,I      MUST HAVE BEEN CALC EXECUTION
04460 060645             JSM MINIT        SCRATCH INCOMPLETE SYMTAB
04461 060653             JSM INITS+2      SCRATCH STACKS AND RESET PROGRAM POINTERS
04462 045701 ERET        ISZ NDISP        SET TO NOT DISPLAY AUTO #
04463 066047             JMP PEXM2
04464 011154 EMSGA DEF ERRM+ERRM        POINTER TO "ERROR"
04465 011162 LMSGA DEF ERRM+ERRM+6      POINTER TO " IN LINE "
04466 042522 ERRM  ASC 8,ERROR  IN LINE
04467 051117
04470 051040
04471 020111
04472 047040
04473 046111
04474 047105
04475 020040
04476 000267 ERRS  DEF E1-1
04360        MERR  EQU ERROR          MFASE ERROR
04477 010070 CALXA DEF CALEX
```

#01 9830--UPDATE PROGRAM

```
*  DELETE STATEMENT FROM PROGRAM
*
04500 160242 DELST JSM DCOMA,I     DECOMPILE
04501 061072       JSM FNDPS-3     FIND STATEMENT TO BE DELETED
04502 066506       JMP EDITR       DOESNT EXIST
04503 066506       JMP EDITR
04504 070110       SZA EDITR       SKIP IF TYPING AID KEY
04505 062571       JSM CLPRG       CLOSE UP PROGRAM
04506 060651 EDITR JSM INITS        INITIALIZE STACK POINTERS
04507 062723       JSM INCLN       INCREMENT LINE NUMBER
04510 066042       JMP PEXMK-2
*
*  ACCEPT STATEMENT
*
04511 020112 ACTST LDA RSTKA
04512 031777       STA RSPTR       RESET RETURN STACK
04513 021416       LDA MODE
04514 070073       SAP *+1,C       SWITCH OUT OF
04515 031416       STA MODE          SYNTAX MODE
```

```
04516 070110       SZA *+2
04517 164247       JMP ECALA,I    JUMP TO CALC EXECUTION
04520 160242 ACTKY JSM DCOMA,I    DECOMPILE
04521 020233       LDA SBUFA
04522 070076       TCA            COMPUTE LENGTH
04523 001706       ADA SBPTR        OF STATEMENT
04524 031473       STA TEMP       SAVE LENGTH IN TEMP
04525 025551       LDB RBUFF      READ LINE #
04526 074450       SZB ACCS1      SKIP IF TYPING AID DEFINITION
04527 041552       IOR RBUFF+1    MERGE INTO OP-CODE WORD
04530 031552       STA RBUFF+1
04531 061072       JSM FNDPS-3    FIND ADDRESS IN PROGRAM
04532 066565       JMP ACCS4      APPEND
04533 066565       JMP ACCS4      INSERT
04534 070150       SZA ACCS1      SKIP IF REPLACING TYPING AID KEY
04535 061007       JSM NEXTA      NO, COMPUTE LENGTH AND END OF STATEMENT
04536 066544       JMP ACCS3
04537 021424 ACCS1 LDA PBUFF      SET POINTERS TO
04540 031476       STA TEMP3        REPLACE
04541 070076       TCA
04542 001423       ADA PBPTR          ENTIRE PROGRAM
04543 025423       LDB PBPTR
04544 070076 ACCS3 TCA            COMPARE
04545 001473       ADA TEMP           LENGTHS
04546 070250       SZA ACCS2      EQUAL
04547 070112       SAM *+2
04550 066566       JMP ACCS4+1    OLD LINE IS SHORTER
04551 021473       LDA TEMP       LONGER
04552 062573       JSM CLPRG+2     CLOSE UP PROGRAM
*  MOVE FROM S-BUFFER INTO PROGRAM
04553 024233 ACCS2 LDB SBUFA      INITIALIZE POINTER
04554 074517       LDA B,I
04555 131476       STA TEMP3,I      WORD
04556 045476       ISZ TEMP3
04557 055473       DSZ TEMP       FINISHED?
04560 077630       RIB ACCS2+1    NO
04561 121424       LDA PBUFF,I    YES
04562 072110       RZA *+2        0 LINE NUMBER?
04563 061225       JSM LDEF       YES, END KEY DEFINITION
04564 066506       JMP EDITR      NO
*   INSERT STATEMENT
04565 021473 ACCS4 LDA TEMP
04566 062625       JSM OVCHK      CHECK FOR OVERFLOW
04567 061121       JSM MVTOH      MOVE PROGRAM UP
04570 066553       JMP ACCS2
*
*  CLOSE UP PORGRAM
*    ADDRESS OF LINE BEING CHANGED IS IN TEMP3
*
04571 061007 CLPRG JSM NEXTA      GET ADDRESS OF FIRST WORD MOVED
04572 070742       SAR 16
04573 001476       ADA TEMP3      SKIP (A) LOCATIONS FORM TEMP3
04574 031477       STA TEMP4        AND SAVE DESTINATION ADDRESS
*  TEMP4= DESTINATION ADDR OF FIRST WORD
*  PBPTO= SOURCE ADDRESS OF LAST WORD +1
*  (B)= SOURCE ADDRESS OF FIRST WORD
04575 015426 CLPR1 CPB PBPTO      ALL OF PROGRAM MOVED?
04576 066603       JMP CLPR2      YES
04577 074517       LDA B,I        MOVE WORD FROM SOURCE
04600 131477       STA TEMP4,I      TO DESTINATION ADDRESS
04601 045477       ISZ TEMP4      INC DESTINATION AND
04602 077570       RIB CLPR1        SOURCE ADDRESSES THEN JUMP
04603 021477 CLPR2 LDA TEMP4      RECALL NEW PBPTO
04604 074076       TCB            COMPUTE NET CHANGE
04605 070037       ADB A            IN PROGRAM LENGTH
04606 031426       STA PBPTO      STORE NEW END OF MAINLINE
04607 021423       LDA PBPTR
04610 074017       ADA B
04611 031423       STA PBPTR      UPDATE END OF CURRENT PROGRAM
04612 021422       LDA UKPTR      GET KEY DEFINITION FLAG
04613 170450       SZA OVCHK-1    RETURN IF NOT IN KEY DEFINITION
04614 070517       LDA A,I
04615 074017       ADA B
04616 131422       STA UKPTR,I    UPDATE KEY LENGTH
04617 021425       LDA PBUFO
04620 074017       ADA B
04621 031425       STA PBUFO      UPDATE MAINLINE PBUFF
04622 005405       ADB FWUP
04623 035405       STB FWUP       UPDATE END OF KEY AREA POINTER
04624 170402       RET
*
*  CHECK FOR PROGRAM SPACE OVERFLOW
*   (A)= NEW WORD REQUIREMENT
04625 025426 OVCHK LDB PBPTO      SET SOURCE ADDRESS
04626 035475       STB TEMP2        FRO PROGRAM RELOCATION
04627 031711       STA OFLAG      SAVE COUNT
04630 070037       ADB A          SET DESTINATION
04631 035477       STB TEMP4        ADDRESS
04632 001426       ADA PBPTO      COMPUTE NEW END OF MAINLINE
04633 074076       TCB            ENOUGH SPACE FOR
```

#01 9830--UPDATE PROGRAM

```
04634 005407       ADB SYMTP      PROGRAM
04635 074113       SBP *+2         BUFFER: SKIP IF YES
04636 064561       JMP FSCF4     NO, SYNTAX OVERFLOW
04637 025711       LDB DFLAG     RECALL COUNT
04640 066606       JMP CLPR2+3
```

#01 9830--SYSTEM COMMANDS

```
*
*  SCRATCH SYSTEM COMMAND
*
04641 061055 SCRAT JSM GNEXT     GET NEXT CHAR
04642 000154       ADA M64
04643 010012       CPA .1         "A"?
04644 066020       JMP ENTRY     YES, SCRATCH ALL
04645 010027       CPA .11        "K"?
04646 066652       JMP SCRK      YES, SCRATCH KEYS
04647 010035       CPA .22        "V"?
04650 066035       JMP KILLV     YES, SCRATCH VARIABLES
04651 066031       JMP KILLP     OTHERWISE SCRATCH PROGRAM
04652 061225 SCRK  JSM LDEF     INSURE NOT IN KEY MODE
04653 063711       JSM DCOMP
04654 020166       LDA FWAM
04655 025405       LDB FWUP
04656 164254       JMP XSCRA,I   SCRATCH ALL KEYS
*
*  DELETE SYSTEM COMMAND
*
04657 060730 DELET JSM GETAD     GET ADDRESSES
04660 035476       STB TEMP3     SAVE SOURCE ADDRESS
04661 160242       JSM DCOMA,I   DECOMPILE
04662 025476       LDB TEMP3
04663 062575       JSM CLPR1     CLOSE UP PROGRAM
04664 066036       JMP RDYPT-1   RE INITIALIZE
*
*  RENUMBER SYSTEM COMMAND
*
04665 162733 RENUM JSM GETLA,I   GET OPTIONAL PARAMETERS
04666 020061       LDA .10
04667 024061       LDB .10
04670 031470       STA L2T1      SAVE STARTING LINE NUMBER
04671 035471       STB L2T2      SAVE INCREMENT
04672 063675       JSM COMPL     CONVERT OT ADDRESS FORMAT
04673 025471       LDB L2T2
04674 035430       STB LNINC     SET LINE INCREMENT
04675 024133       LDB M2        SET FLAG
04676 035471       STB L2T2        FOR 1ST PASS
04677 021470 RENM1 LDA L2T1      SET STARTING
04700 031427       STA .LNUM       LINE NUMBER
04701 025424       LDB PBUFF     INITIALIZE PROGRAM
04702 035472 RENM2 STB TEMPS       POINTER
04703 015423       CPB PBPTR     END OF PROGRAM
04704 066720       JMP RENM4     YES
04705 121472       LDA TEMPS,I
04706 070610       SZA RENM4+2   SKIP IF TYPING AID
04707 050062       AND FLGBT     GET SECURITY BIT
04710 041427       IOR .LNUM     MERGE IN NEW LINE #.
04711 024132       LDB M1
04712 015471       CPB L2T2      SECOND PASS?
04713 131472       STA TEMPS,I   YES, STORE NEW LINE #.
04714 025472 RENM3 LDB TEMPS     COMPUTE ADDRESS
04715 061007       JSM NEXTA       OF NEXT LINE
04716 062723       JSM INCLN     NO, INCREMENT .LNUM
04717 066702       JMP RENM2
04720 045471 RENM4 ISZ L2T2      FIRST PASS?
04721 066677       JMP RENM1     YES, NOW DO SECOND PASS
04722 066036       JMP RDYPT-1   DECOMPILE AND RETURN
*
*  INCREMENT LINE NUMBER
*
04723 021430 INCLN LDA LNINC
04724 001427       ADA .LNUM
04725 031427       STA .LNUM     UPDATE LINE NUMBER
04726 000161       ADA MAXSN     GREATER THAN 9999?
04727 070452       SAM INCLR     RETURN IF LESS THAN 9999
04730 070742       SAR 16
04731 031430       STA LNINC     SET TO MANUAL
04732 064726       JMP SYE25     JUMP TO IMPROPER INTEGER ERROR
04733 003647 GETLA DEF GETLN
*
*  INITIALIZE PROGRAM POINTERS
*
04734 025405 SCRP  LDB FWUP
04735 035424       STB PBUFF
04736 035423       STB PBPTR
04737 035426       STB PBPTO
04740 170402 INCLR RET
```

```
*
*  RUN SYSTEM COMMAND
*     (A)= STARTING LINE NUMBER
*
 04741 031725 RUN    STA NXTST      SAVE STARTING LINE NUMBER
 04742 060645        JSM MINIT      SCRATCH OLD SYMTAB
 04743 070742        SAR 16
 04744 031455        STA FORMT      CLEAR THE FORMAT FLAG
 04745 031432        STA DROST
 04746 020012        LDA .1
 04747 031434        STA UNITS      SET TO RADIANS
 04750 021424        LDA PBUFF
 04751 011423        CPA PBPTR      NULL PROGRAM?
 04752 164174        JMP RDYDA,I    YES
 04753 125424        LDB PBUFF,I
 04754 075710        SZB *-2        TYPING AID KEY?
 04755 031421        STA PRADD      INITIALIZE PROGRAM POINTER
 04756 021405        LDA FWUP
 04757 031730        STA COML       INITIALIZE COMMON POINTER
 04760 045412        ISZ LSTPT      SET L-STACK POINTER = PBPTR
 04761 020132        LDA M1         FLAG ERROR ROUTINE
 04762 031416        STA MODE         TO SCRATCH SYMTAB
*
*  SKIP TO BEGINNING OF NEXT STATEMENT
*
 04763 025421 MSKIP  LDB PRADD
 04764 021407        LDA SYMTP      GET POINTER FOR MILOP
 04765 015423        CPB PBPTR      END OF PROGRAM?
 04766 067122        JMP MILOP      YES
 04767 063601        JSM NXTOP      FETCH 1ST OPERAND IN NEXT STATEMENT
 04770 066763        JMP MSKIP      END OF STATEMENT
 04771 067106        JMP MLOP2      INTEGER, SKIP IT
 04772 031473 MSTND  STA MBOX1      VARIABLE OPERAND, SAVE IT
 04773 024132        LDB M1
 04774 035474        STB MBOX1+1    INITIALIZE DIMENSIONS TO UNDEFINED
 04775 063234        JSM FNTYP      FIND OPERAND TYPE
 04776 067106        JMP MLOP2      FUNCTION
 04777 020132        LDA M1         STRING
 05000 025731 MLOP7  LDB TYPE
 05001 014020        CPB MDMA       DIM?
 05002 074742 MLP72  SBR 16         YES, SET (B)=0
 05003 014017        CPB MCOMA      COM?
 05004 067112        JMP MLP71
 05005 070153        SAP *+3        SKIP IF SIMPLE VARIABLE
 05006 076150        RZB MLOP5      ARRAY, SKIP IF NOT DIM OR COM
 05007 067017        JMP MLOP8
 05010 076310        RZB ML2L       SKIP IF NOT DIM OR COM
*
*  PROCESS VARIABLE
 05011 063306 MLOP5  JSM SSYMT+1    SEARCH SYMBOL TABLE
 05012 067043        JMP MLOP9      NOT FOUND
 05013 021731        LDA TYPE       FOUND
 05014 010017        CPA MCOMA      COM STMT?
 05015 067037        JMP MERS       YES, DOUBLE DEFINITION
 05016 067106 ML2L   JMP MLOP2      NO, PROCESS NEXT WORD
*  COM OR DIM
*  (A)=-1 FOR 1 DIM OR STRING, -2 FOR 2 DIM
 05017 045472 MLOP8  ISZ TEMPS
 05020 045472        ISZ TEMPS
 05021 125472        LDB TEMPS,I    READ FIRST DIMENSION
 05022 004132        ADB M1         OFFSET BY 1
 05023 074404        SBL 8          PLACE IT IN LEFT HALF WORD
 05024 010132        CPA M1         2 DIMENSIONS
 05025 067032        JMP *+5        NO, SET SECOND DIM TO 1
 05026 045472        ISZ TEMPS
 05027 045472        ISZ TEMPS
 05030 105472        ADB TEMPS,I    ADD SECOND DIMENSION INTO RIGHT HALF
 05031 004132        ADB M1         OFFSET SECOND DIM
 05032 035474        STB MBOX1+1    STORE PACKED DIMENSIONS
 05033 063306        JSM SSYMT+1    SEARCH SYMBOL TABLE
 05034 067043        JMP MLOP9      NOT FOUND
 05035 004132        ADB M1         FOUND, (B)=ADDRESS
 05036 074637        ISZ B,I        ALREADY DIMENSIONED?
 05037 062360 MERS   JSM MERR       YES
 05040 021474        LDA MBOX1+1    STORE DIMENSIONS
 05041 074557        STA B,I
 05042 067106        JMP MLOP2
*  ENTER NEW SYMBOL INTO TABLE
 05043 063404 MLOP9  JSM ESYMT      ENTER INTO SYMBOL TABLE
 05044 021731        LDA TYPE
 05045 010017        CPA MCOMA      COM STMT?
 05046 067050        JMP MCOM1      YES
 05047 067106        JMP MLOP2      NO
*  ALLOCATE SPACE FOR COMMON VARIABLE
 05050 021473 MCOM1  LDA MBOX1      SET SIGN BIT IN
 05051 072053        SAP *+1,S        SYMBOL TABLE TO
 05052 074557        STA B,I            INDICATE COMMON
 05053 025474        LDB MBOX1+1    RECALL DIMENSIONS
 05054 063257        JSM MDIM       COMPUTE NUMBER OF WORDS NEEDED
 05055 025730        LDB COML       GET OLD COMMON POINTER
```

```
05056 074017        ADA B
05057 031730        STA COML      UPDATE COMMON POINTER
05060 021424        LDA PBUFF
05061 045422        ISZ UKPTR
05062 055422        DSZ UKPTR     KEY MODE?
05063 021425        LDA PBUFO     YES, GET FIRST WORD OF MAINLINE
05064 070056        CMA           MAXIMUM COMMON EXCEEDED?
05065 031730        ADA COML
05066 070112        SAM *+2
05067 062360 CMERR  JSM MERR      YES, TOO MUCH COMMON IN KEY
05070 021474        LDA MBOX1+1   READ DIMENSIONS
05071 010132        CPA M1        SIMPLE VARIABLE?
05072 067103        JMP MCOM2     YES
05073 074557        STA B,I       STORE FORMAL DIMENSIONS
05074 074070        SIB *+1
05075 021473        LDA MBOX1
05076 070206        RAR 5         IF BIT 4=1, IT MUST
05077 070212        SAM MCOM2       BE A STRING VARIABLE
05100 021474        LDA MBOX1+1   NO, MUST BE AN ARRAY
05101 074557        STA B,I       STORE ACTUAL DIMENSIONS
05102 074070        SIB *+1       POINT TO FIRST VARIABLE OF ARRAY
05103 021407 MCOM2  LDA SYMTP
05104 070070        SIA *+1
05105 070577        STB A,I       STORE ADDRESS IN SYMTAB
05106 063620 MLOP2  JSM NXTP1     GET NEXT OPERAND OF STMT
05107 066763        JMP MSKIP     END OF STMT
05110 067106        JMP MLOP2     INTEGER, SKIP IT
05111 066772        JMP MSTND     VARIABLE OPERAND
*  CHECK FOR LEGAL COM
05112 125424 MLP71  LDB PBUFF,I
05113 074073        SBP *+1,C
05114 015427        CPB .LNUM     IS THIS THE FIRST LINE?
05115 067002        JMP MLP72     YES
05116 164330        JMP E30+3,I   NO, MISPLACED COM
*
*  PHASE PART TWO
*
*  MOVE SYMTAB TO LOW MEMORY
05117 070537 MSLOP  LDB A,I       MOVE SYMBOL
05120 135412        STB LSTPT,I     TABLE WORD
05121 045412        ISZ LSTPT     INC DESTINATION POINTER
05122 011406 M1LOP  CPA VALUE     ALL OF TABLE MOVED?
05123 067125        JMP *+2       YES
05124 073570        RIA MSLOP     INC SOURCE POINTER
05125 070742        SAR 16
05126 031427        STA .LNUM     CLEAR LINE #
05127 025412        LDB LSTPT
05130 020062        LDA FLGBT     SET ALL PROSPECTIVE
05131 074557        STA B,I
05132 015406        CPB VALUE       VALUE TABLE WORDS
05133 067135        JMP *+2
05134 077670        RIB *-3           TO UNDEFINED VALUE
*  DURING THIS SECTION USE LSTAK AS SYMTAB POINTER
*    AND HSTPT AS VALUE TABLE POINTER
05135 035413        STB HSTPT     INITIALIZE VALUE TABLE POINTER
05136 021412        LDA LSTPT
05137 031410        STA LSTAK     INITIALIZE SYMBOL TABLE POINTER
*
05140 025410 M2LOP  LDB LSTAK
05141 015426        CPB PBPTO     MORE SYMBOLS?
05142 067216        JMP M4LOP     NO
05143 055410        DSZ LSTAK     YES, MOVE TO NEXT SYMBOL
05144 121410        LDA LSTAK,I   READ SYMBOL
05145 055410        DSZ LSTAK
05146 070233        SAP *+4,C     DEFINED IN COM?
05147 004132        ADB M1
05150 074557        STA B,I       YES, CLEAR FLAG
05151 067140        JMP M2LOP     BYPASS ALLOCATION PHASE
05152 031473        STA MBOX1     NO, SAVE SYMBOL
05153 063234        JSM FNTYP     FIND VARIABLE TYPE
05154 067140        JMP M2LOP     FUNCTION
05155 067160        JMP *+3       STRING
05156 010134        CPA M3       ARRAY OF UNKNOWN DIMENSIONS?
05157 062360 MER10  JSM MERR      YES
05160 031474        STA MBOX1+1   SAVE TYPE FLAG
05161 125410        LDB LSTAK,I   READ DIMENSIONS
05162 014132        CPB M1        DIMENSIONED?
05163 067165        JMP *+2       NO
05164 067173        JMP M3LOP     YES
05165 074742        SBR 16       LOAD STD DIM FOR STRING
05166 070213        SAP M3LOP-1   SKIP IF SIMPLE VARIABLE OR STRING
05167 027233        LDB B4400     LOAD STD DIMENSION FOR 1 DIM
05170 010133        CPA M2        2 DIMENSIONS?
05171 004026        ADB .9        YES, CORRECT FOR 2 DIMS
05172 135410        STB LSTAK,I
05173 021473 M3LOP  LDA MBOX1     RECALL SYMBOL
05174 063257        JSM MDIM      COMPUTE STORAGE REQUIRED
05175 070076        TCA
05176 025413        LDB HSTPT     MOVE VALUE TABLE POINTER
05177 063556        JSM MOVCK+1     AND CHECK FOR OVERFLOW
```

```
 05200 021474        LDA MBOX1+1   RECALL TYPE FLAG
 05201 025413        LDB HSTPT     GET NEW VALUE TABLE POINTER
 05202 074070        SIB *+1
 05203 010076        CPA B36       STRING?
 05204 067211        JMP M6LOP     YES
 05205 070353        SAP M6LOP+3   SKIP IF SIMPLE VARIABLE
 05206 121410        LDA LSTAK,I   GET DIMENSIONS AND STORE
 05207 074557        STA B,I         IN VALUE TABLE
 05210 074130        SIB *+2       INC POINTER
 05211 121410 M6LOP  LDA LSTAK,I   GET STRING DIMENSIONS
 05212 074557        STA B,I       STORE DIMENSION
 05213 074070        SIB *+1         IN VALUE TABLE
 05214 135410        STB LSTAK,I   STORE VALUE ADDRESS IN SYMTAB
 05215 067140        JMP M2LOP
*  CLEAN UP FOR EXECUTION
 05216 021413 M4LOP  LDA HSTPT
 05217 031406        STA VALUE     SET VALUE TABLE POINTER
 05220 025412        LDB LSTPT     MOVE SYMBOL
 05221 015426        CPB PHPTO
 05222 067230        JMP *+6
 05223 004132        ADB M1
 05224 074517        LDA B,I         TABLE BACK
 05225 131413        STA HSTPT,I
 05226 055413        DSZ HSTPT         TO HIGH
 05227 067221        JMP M4LOP+3         MEMORY
 05230 021413        LDA HSTPT
 05231 031407        STA SYMTP     SET SYMBOL TABLE POINTER
 05232 164004        JMP XECA,I    PHASE COMPLETE
*
 05233 004400 B4400  OCT 4400
*  DETERMINE THE TYPE OF AN OPERAND GIVEN IN (A)
*
*    RETURN P+1: FUNCTION
*           P+2: STRING
*           P+3: NUMERIC VARIABLE
*                (A)= POSITIVE IF SIMPLE VARIABLE
*                   = -1 IF SINGLE DIM ARRAY
*                   = -2 IF DOUBLE DIM
*                   = -3 IF UNKNOWN DIM
*
*                (B)= 4 IF FULL PRECISION
*                   = 2 IF SPLIT PRECISION
*                   = 1 IF INTEGER
*
 05234 050040 FNTYP  AND B37       ISOLATE TYPE
 05235 010076        CPA B36       STRING?
 05236 064357        JMP RETN2     YES
 05237 074742        SBR 16
 05240 010040        CPA B37       FUNCTION?
 05241 170402        RET           YES
 05242 024021        LDB .4        SET TO FULL PRECISION
 05243 070146        RAR 4
 05244 070171        SLA *+3,C     NUMBERED VARIABLE
 05245 070546        RAR 12        YES
 05246 064356        JMP RETN3
 05247 070133        SAP *+2,C     INTEGER?
 05250 004134        ADB M3        YES
 05251 070646        RAR 14
 05252 070131        SLA *+2,C     SPLIT PRECISION?
 05253 004133        ADB M2        YES
 05254 070646        RAR 14        RECALL NUMBER OF DIMENSIONS
 05255 070076        TCA             NEGATE
 05256 064356        JMP RETN3
*
*  COMPUTE STORAGE NEEDED BY A VARIABLE
*
*    (A)= SYMBOL
*    (B)= PACKED DIMENSIONS FOR ARRAY OR STRING
*
*    STORAGE NEEDED: STRING = (DIM1+1)/2 +1
*                    ARRAY= DIM1*DIM2* # OF WORDS/ELEM +2
*                    SIMPLE VARIABLE: # OF WORDS
*
*    EXIT (A)= STORAGE NEEDED
 05257 035470 MDIM   STB L2T1
 05260 063234        JSM FNTYP
 05261 067277        JMP MDIM2     FUNCTION (B)=0
 05262 067301        JMP MDIM1     STRING
 05263 070613        SAP MDIM2     ARRAY?
 05264 021470        LDA L2T1
 05265 050105        AND B377      MULTIPLY SECOND DIMENSION
 05266 070070        SIA *+1
 05267 061201        JSM IMPY      BY THE NUMBER OF WORDS PER ELEMENT
 05270 025470        LDB L2T1
 05271 074342        SBR 8
 05272 074070        SIB *+1
 05273 061201        JSM IMPY      MULTIPLY BY SECOND DIMENSION
 05274 000017        ADA .2        ADD WORDS FOR DIMENSIONS
 05275 070153        SAP MDIM2+1   GREATER THAN 32K?
 05276 062360 MER9   JSM MERR      YES, DIMENSIONS TOO LARGE
```

```
05277 074117 MDIM2 LDA B          MOVE RESULT TO (A)
05300 170402       RET
05301 074342 MDIM1 SBR 8
05302 004017       ADB .2         ADD 2 TO FORMAL DIMENSION
05303 074002       SBR 1          DIVIDE BY 2
05304 077570       RIB MDIM2      INCREMENT AND JUMP
*
* SEARCH SYMBOL TABLE
*
*    RETURN P+1 IF NOT FOUND
*           P+2 IF FOUND; ADDRESS IN B
*
*    IF BIT 4=1 THEN SYMBOL AND TYPE MUST MATCH EXACTLY
*
*    AN UNSPECIFIED PRECISION VARIABLE MATCHES A SPECIFIED PRECISION
*      AND THE SPECIFIED PRECISION IS INSERTED IN THE TABLE
*
*    AN ARRAY WITH UNSPECIFIED NUMBER OF DIMENSIONS MATCHES A
*       SPECIFIED ARRAY AND THE DIMENSION NUMBER IS PUT IN THE TABLE
*
*    AN INCONSISTENCY IN DIMENSIONS OR PRECISION CAUSES AN ERROR
*
05305 031473 SSYMT STA MBOX1
05306 021473       LDA MBOX1      (A)=SYMBOL TO BE FOUND
05307 050020       AND .3
05310 031466       STA STMP2      SAVE SIMPLE/ARRAY TYPE
05311 021473       LDA MBOX1
05312 050030       AND .12
05313 031467       STA STMP3      SAVE PRECISION TYPE
05314 021473       LDA MBOX1      RECALL VARIABLE
05315 024112       LDB B1760      GET MASK TO MASK OFF PRECISION
05316 070146       RAR 4
05317 070111       SLA *+2        BIT 4=1?
05320 024115       LDB B1777      YES, DONT MASK OFF ANY BITS
05321 070546       RAR 12         RESTORE VARIABLE
05322 074257       AND B          MASK
05323 035470       STB MASK       STORE MASK
05324 031471       STA STMP1      STORE PART OF SYMBOL TO MATCH
05325 014115       CPB B1777      MUST MATCH WHOLE SYMBOL?
05326 067373       JMP SVALU-1    YES, SEARCH AND RETURN FROM SVALU
05327 063373       JSM SVALU-1    NO, SEARCH FOR NAME ONLY
05330 170402       RET            NOT FOUND
05331 021466 SSYM1 LDA STMP2      SEARCHING FOR
05332 072350       RZA SSYM4      SIMPLE VARIABLE?
05333 074517       LDA B,I        YES, SIMPLE
05334 050020       AND .3           VARIABLE
05335 070410       SZA SM2L       FOUND?
05336 063402 SSYM6 JSM SVAL1      NO, CONTINUE SEARCH
05337 170402       RET
05340 067331       JMP SSYM1
* SEARCHING FOR AN ARRAY
*
05341 074517 SSYM4 LDA B,I
05342 050020       AND .3
05343 071550       SZA SSYM6      ARRAY FOUND?  SKIP IF NO
05344 011466       CPA STMP2      DO DIMENSIONS MATCH?
05345 067361 SM2L  JMP SSYM2      YES, NOW CHECK PRECISION
05346 010020       CPA .3         NO, TABLE VARIABLE UNSPECIFIED?
05347 067354       JMP SSYM5      YES
05350 021466       LDA STMP2      NO, SEARCH
05351 010020       CPA .3           VARIABLE UNSPECIFIED?
05352 067361       JMP SSYM2      YES, OK
05353 062360 SYMF2 JSM MERR       NO, INCONSISTENT DIMENSIONS
05354 074517 SSYM5 LDA B,I        INSERT
05355 050135       AND M4
05356 041466       IOR STMP2        DIMENSION NUMBER
05357 074557       STA B,I
05360 067361       JMP SSYM2          INTO TABLE
* PROPER TYPE FOUND, NOW CHECK FOR PROPER PRECISION
*
05361 021467 SSYM2 LDA STMP3
05362 070350       SZA SSYM3-1    SEARCH VARIABLE UNSPECIFIED?
05363 074517       LDA B,I        NO
05364 050030       AND .12
05365 072250       RZA SSYM3      TABLE VARIABLE UNSPECIFIED?
05366 021467       LDA STMP3      YES
05367 074617       IOR B,I
05370 074557       STA B,I        INSERT SPECIFICATION IN TABLE
05371 064357       JMP RETN2      FOUND
05372 062360 SSYM3 JSM MERR       PRECISION DOUBLY DEFINED
*
* SEARCH SYMBOL TABLE FOR A MATCH - (B),I AND MASK= STMP1
*
*   RET P+1 IF NO MATCH FOUND
*       P+2 IF MATCH FOUND, (B)= ADDRESS
05373 025406       LDB VALUE
05374 015407 SVALU CPB SYMTP      ALL TABLE SEARCHED?
05375 170402       RET            YES, NO MATCH FOUND
05376 074517       LDA B,I        NO, READ TABLE ENTRY
05377 051470       AND MASK       GET THE BITS TO BE COMPARED
```

```
05400 011471        CPA STMP1      MATCH?
05401 064357        JMP RETN2      YES, RET P+2, (B)= ADDRESS
05402 004133 SVAL1  ADB M2         UPDATE TABLE POINTER
05403 067374        JMP SVALU
01470         MASK  EQU L2T1
01471         STMP1 EQU L2T2
01466         STMP2 EQU LOCL1
01467         STMP3 EQU LOCL2
*
* ENTER 2 WORDS GIVEN IN MHOX1 AND MHOX1+1 INTO SYMBOL TABLE
*
05404 020133 ESYMT LDA M2         MOVE H-STACK
05405 025407        LDB SYMTP
05406 063555        JSM MOVCK        DOWN BY 2 WORDS
05407 074070        SIB *+1        ((B)= NEW SYMTP)
05410 021474        LDA MHOX1+1    TRANSFER WORDS INTO SYMTAB
05411 074557 ESYM1  STA B,I
05412 074070        SIB *+1
05413 021473        LDA MHOX1
05414 074557        STA B,I
05415 170402        RET
*
* ENTER A SIMPLE VARIABLE INTO SYMTAB AND VALUE TABLE
*
05416 021473 ENTER LDA MHOX1
05417 063234        JSM FNTYP      FIND OPERAND TYPE
05420 067437        JMP ENTE1      FUNCTION
05421 160206 NINIT  JSM ERRA,I     STRING, NOT INITIALIZED
05422 071752        SAM *-1        SIMPLE VARIABLE?
05423 025406        LDB VALUF      YES
05424 020137        LDA M6         NO, MOVE SYMTAB AND H-STACK
05425 063555        JSM MOVCK        DOWN BY 6 WORDS
05426 000135        ADA M4        COMPUTE ADDRESS OF VARIABLE
05427 031474        STA MHOX1+1
05430 070137        LDB A
05431 020062        LDA FLGBT
05432 074557        STA B,I        SET TO UNDEFINED
05433 004133        ADB M2         COMPUTE ADDRESS OF
05434 063410        JSM ESYMT+4      SYMTAB ENTRY AND ENTER
05435 035406        STB VALUF      UPDATE VALUE TABLE POINTER
05436 170402        RET
* SEARCH FOR A FUNCTION NOT FOUND IN SYMTAB
*
05437 025406 ENTE1  LDB VALUF      OPEN UP 2 WORD SPACE
05440 020133        LDA M2
05441 063555        JSM MOVCK
05442 025406        LDB VALUF
05443 004132        ADB M1
05444 035750        STB YC         SET UP ADDRESS POINTER
05445 070742        SAR 16         INITIALIZE ADDRESS WORD TO 0
05446 063411        JSM ESYM1      MAKE SYMTAB ENTRY
*
* SEARCH FOR FUNCTION WHICH HAS 0 ADDRESS
05447 063513 ENTEN  JSM SSTT       SAVE PROGRAM POINTERS
05450 025424        LDB PBUFF
05451 063524        JSM SERFN      SEARCH CURRENT PROGRAM FIRST
05452 024166        LDB FWAM      NOT FOUND
* SEARCH FIRST LINE OF EACH KEY
05453 015405 ENTE3  CPB FWUP       END OF KEY AREA?
05454 067503        JMP ENTE5      YES, NOT FOUND
05455 074070        SIB *+1
05456 074517        LDA B,I
05457 074070        SIB *+1
05460 010012        CPA .1         NULL KEY?
05461 067453        JMP ENTE3      YES
05462 035472        STB TEMPS
05463 121472        LDA TEMPS,I
05464 004132        ADB M1
05465 070610        SZA ENTE4+2    TYPING AID KEY?
05466 060602        JSM NEXT1-4    NO, GET PAGE AND OP CODE
05467 001466        ADA LOCL1
05470 013554        CPA DEFOP      DEF STMT?
05471 067473        JMP *+2        YES
05472 067477        JMP ENTE4      NO
05473 121472        LDA TEMPS,I
05474 050115        AND B1777
05475 011473        CPA MHOX1      IS IT THE FUNCTION WE WANT?
05476 067536        JMP SERF1      YES
05477 025472 ENTE4  LDB TEMPS      NO
05500 004134        ADB M3
05501 074437        ADB B,I        FIND NEXT KEY
05502 067453        JMP ENTE3
* SEARCH MAINLINE LAST
05503 021422 ENTE5  LDA UKPTR
05504 070250        SZA ENTE6      KEY MODE?
05505 025426        LDB PBPT0
05506 035423        STB PBPTR
05507 025425        LDB PBUF0      YES, SEARCH MAINLINE
05510 063524        JSM SERFN
05511 063543 ENTE6  JSM RSTT      NOT FOUND, UNDEFINED
```

```
*01  9830- PRE-EXECUTION PROCESSING

 05512 164337        JMP E40,I
*
*  SUBROUTINE TO SAVE PROGRAM POINTERS
*
 05513 025421 SSTT   LDB PRADD
 05514 035741        STB XC+1
 05515 025472        LDB TEMPS
 05516 035740        STB XC
 05517 025427        LDB .LNUM
 05520 035742        STB XC+2
 05521 025423        LDB PHPTR
 05522 035743        STB XC+3
 05523 170402 SERFR  RET
*
*  SUBROUTINE TO SEARCH A PROGRAM FOR A FUNCTION DEF
*
*  (B)=ADDRESS OF FIRST WORD OF PROGRAM
*  RETURN IF NOT FOUND
*  RETURN TO SECOND RETURN ON STACK IF FOUND: STORE ADDRESS IN XC+3,I
*
 05524 035421 SERFN  STB PRADD
 05525 023554        LDA DEFOP
 05526 160241        JSM SYTSA,I     SEARCH FOR DEF STMT
 05527 075613        SBP SERFR       FOUND?
 05530 121472        LDA TEMPS,I     YES
 05531 050115        AND B1777
 05532 011473        CPA MBOX1       IS IT THE FN WE WANT?
 05533 067535        JMP *+2         YES
 05534 067525        JMP SERFN+1
 05535 055777        DSZ RSPTR       FOUND, DINK RETURN OFF STACK
 05536 025472 SERF1  LDB TEMPS
 05537 004133        ADB M2
 05540 135750        STB YC,I        STORE ADDRESS IN SYMTAB
 05541 025750        LDB YC
 05542 074070        SIB *+1         GET SYMBOL TABLE ADDRESS
*
 05543 021740 RSTT   LDA XC         RESTORE PROGRAM POINTERS
 05544 031472        STA TEMPS
 05545 021741        LDA XC+1
 05546 031421        STA PRADD
 05547 021742        LDA XC+2
 05550 031427        STA .LNUM
 05551 021743        LDA XC+3
 05552 031423        STA PHPTR
 05553 170402        RET
*
 05554 011774 DEFOP  OCT 11774
*
*  MOVE H-STACK DOWN AND CHEKC FOR OVERFLOW
*
*     MOVE DOWN -(A) WORDS
*     (B)= ADDRESS OF LAST WORD MOVED
*
 05555 074070 MOVCK  SIB *+1
 05556 031726        STA MBIN1       SAVE SPACE REQUIREMENT
 05557 035466        STB LOCL1       SAVE LAST WORD + 1
 05560 001413        ADA HSTPT       COMPUTE NEW HSTPT
 05561 070137        LDB A
 05562 060555        JSM BHSTP+2     CHECK FOR OVERFLOW
 05563 070137        LDB A
 05564 021413        LDA HSTPT       GET OLD HSTPT
 05565 035413        STB HSTPT       STORE NEW HSTPT
 05566 035727        STB MBIN2       STORE SOURCE POINTER
 05567 011466 MOVC1  CPA LOCL1       ALL WORDS MOVED?
 05570 067575        JMP MOVC2       YES
 05571 070537        LDB A,I         MOVE
 05572 135727        STB MBIN2,I       WORD
 05573 045727        ISZ MBIN2
 05574 073570        RIA MOVC1       UPDATE POINTERS
 05575 025407 MOVC2  LDB SYMTP
 05576 005726        ADB MBIN1
 05577 035407        STB SYMTP       UPDATE SYMBOL TABLE POINTER
 05600 170402 NXTPR  RET
*  ROUTINE TO FETCH THE NEXT OPERAND FROM THE PROGRAM
*     TEMPS POINTS TO CURRENT WORD OF CODE: PRADD POINTS TO END OF LINE
*     CONSTANTS: STRING CONSTANTS: NON-RESEQUENCEABLE INTEGERS ARE SKIPPE
*     EXIT P+1: END OF LINE
*             P+2: RESEQUENCABLE INTEGER FOUND
*             P+3: VARIABLE OPERAND FOUND
 05601 060572 NXTOP  JSM NEXTL-2      COMPUTE END OF CURRENT LINE
 05602 005466        ADB LOCL1       ADD OP-CODE AND
 05603 007772        ADB MREM        CONSTANT TO PAGE TO GET
 05604 035731        STB TYPE          UNIQUE VALUE FOR STATEMENT TYPE
 05605 055472        DSZ TEMPS
 05606 121472        LDA TEMPS,I
 05607 050107        AND B1000       GET ASCII FLAG
 05610 073410        RZA NXTPR       ASCII?
 05611 067620        JMP NXTP1
*  PROCESS A STRING CONSTANT
 05612 125472 NXTP2  LDB TEMPS,I      COMPUTE
```

```
#5613 #74070          STB *+1
#5614 #74404          SBL 8             LENGTH OF
#5615 #74402          SBR 9               STRING
#5616 #05472          ADB TEMPS       SKIP TO
#5617 #35472          STB TEMPS         END OF CONSTANT
*  PROCESS NEXT WORD: RE-ENTER ROUTINE HERE AFTER
*    PROCESSING A VARIABLE OPERAND
#5620 #45472 NXTP1 ISZ TEMPS       SET TO NEXT WORD
#5621 #21472          LDA TEMPS
#5622 #11421          CPA PRADD       END OF CURRENT STMT?
#5623 170402          RET             YES
#5624 #70517          LDA A,I         READ CURRENT WORD
#5625 #70452          SAM NXTP3       SKIP IF SIGN BIT SET
#5626 #50065          AND OPMSK
#5627 #10116          CPA QTOP        QUOTE OPERATOR?
#5630 #67612          JMP NXTP2       YES, PROCESS STRING CONSTANT
#5631 #10065          CPA OPMSK       MULTI-CHARACTER-NON-FORMULA OPERATOR?
#5632 #67620 NXT1L JMP NXTP1       YES, NO OPERAND IN THIS WORD
#5633 #60771          JSM GTOPP       GET OPERAND
#5634 #71210          SZA NXTP1       SKIP IF NULL
#5635 #64356          JMP RETN3       RETURN TO P+3 WITH OPERAND IN (A)
*  PROCESS WORD WITH SIGN BIT SET
#5636 #50106 NXTP3 AND B777        GET TYPE AND CHARACTER COUNT IF CONSTANT
#5637 #70137          LDB A
#5640 #50040          AND B37         ISOLATE THE TYPE
#5641 #10021          CPA .4          RESEQUENCABLE INTEGER?
#5642 #67654          JMP NXTP4       YES
#5643 #71350          SZA NXT1L       SKIP IF PARAMETER
#5644 #00135          ADA M4
#5645 #71253          SAP NXT1L       SKIP IF PARAMETER OR FUNCTION
#5646 #74202          SBR 5           COMPUTE NUMBER OF
#5647 #04022          ADB .5            WORDS TO SKIP IF
#5650 #74042          SBR 2               CONSTANT
#5651 #10132          CPA M1          INTEGER?
#5652 #24012          LDB .1          YES, SKIP 1 WORD
#5653 #67616          JMP NXTP1-2
#5654 #45472 NXTP4 ISZ TEMPS       READ THE
#5655 121472          LDA TEMPS,I       INTEGER
#5656 #64357          JMP RETN2       RETURN TO P+2 WITH INTEGER IN (A)
*
*  ROUTINE TO FIND ALL RESEQUENCABLE LINE NUMBER REFERENCES IN A PROGRAM
*    EXIT: P+1  END OF PROGRAM FOUND
#5657 #67620          JMP NXTP1       NO
*             (A)= LINE NUMBER
*             (TEMPS)= ADDRESS OF LINE NUMBER
*
#5660 #31421 FNDAD STA PRADD       SAVE STARTING ADDRESS
#5661 #70517          LDA A,I       TYPING AID KEY?
#5662 #70150          SZA FNDA2+2     RETURN IF YES
#5663 #21421 FNDA2 LDA PRADD
#5664 #11423          CPA PRPTR       END OF PROGRAM?
#5665 170402          RET             YES
#5666 #63601          JSM NXTOP       NO, CONTINUE SEARCH
#5667 #67663          JMP FNDA2       END OF STATEMENT
#5670 #64357          JMP RETN2       LINE NUMBER FOUND
#5671 #63620 FNDA1 JSM NXTP1       CONTINUE SEARCH
#5672 #67663          JMP FNDA2
#5673 #64357          JMP RETN2
#5674 #67671          JMP FNDA1
*
*  ROUTINE TO CONVERT ALL STATEMENT REFERENCES INTO ADDRESS FORMAT
*    THE ADDRESS OF A STATEMENT REPLACES THE LINE NUMBER AND
*    THE SIGN BIT IS SET
*
#5675 #21424 COMPL LDA PBUFF       INITIALIZE TO START OF PROGRAM
#5676 #63660          JSM FNDAD       FIND FIRST LINE #
#5677 170402          RET
#5700 #70312          SAM COMP1
#5701 #61075          JSM FNDPS
#5702 #67703          JMP *+1
#5703 164343          JMP E45-1,I     NOT IN PROGRAM
#5704 #76053          SBP *+1,S       FOUND SET SIGN BIT
#5705 135472          STB TEMPS,I     REPLACE LINE NUMBER
#5706 #63671 COMP1 JSM FNDA1       CONTINUE SEARCH
#5707 170402          RET
#5710 #67700          JMP COMPL+3
*
*  ROUTINE TO CONVERT ALL STATEMENT REFERENCES INTO LINE NUMBER FORMAT
*
#5711 #25424 DCOMP LDB PBUFF
#5712 #35415          STB NXTDT       RESET DATA POINTERS
#5713 #35414          STB DSTRT
#5714 #70742          SAR 16
#5715 #31420          STA PARMN       CLEAR PARAMETER NAME
#5716 #76053          SBP *+1,S       SET DECOMPILE FLAG
#5717 #63514 DCOM1 JSM SSTT+1        SAVE POINTERS
#5720 #21421          LDA PRADD
#5721 #70113          SAP *+2         ALREADY DECOMPILED?
#5722 #67750          JMP DCOMF       YES, DECOMPILE FUNCTIONS ONLY
#5723 #20166          LDA FWAM
```

#01 9830- PRE-EXECUTION PROCESSING

```
05724 011405 DCMP5 CPA FWUP      END OF KEY AREA?
05725 067764       JMP DCMP4     YES, NOW DECOMPILE MAINLINE
05726 070070       SIA *+1
05727 070137       LDB A
05730 070437       ADB A,I
05731 070070       SIA *+1       COMPUTE START AND END OF KEY
05732 035423 DCMP6 STB PBPTR
05733 063660       JSM FNDAD     FIND ADDRESS WORDS
05734 067744       JMP DCMP2     END OF THIS PROGRAM
05735 070233 DCMP1 SAP DCMP3,C   SKIP IF ALREADY DECOMPILED
05736 070517       LDA A,I       READ LINE NUMBER
05737 070073       SAP *+1,C     CLEAR SECURE BIT
05740 131472       STA TEMPS,I   STORE LINE #
05741 063671 DCMP3 JSM FNDA1     FIND NEXT ADDRESS
05742 067744       JMP DCMP2
05743 067735       JMP DCMP1
* END OF CURRENT PROGRAM
05744 021423 DCMP2 LDA PBPTR
05745 011426       CPA PBPTO     END OF MAINLINE?
05746 067750       JMP DCOMF     YES
05747 067724       JMP DCMP5     NO, CONTINUE KEYS
* DECOMPILE FUNCTIONS IN SYMTAB BY SETTING THEIR ADDRESSES TO 0
05750 063543 DCOMF JSM RSTT      RESTORE PROGRAM POINTERS
05751 024040 DCMF1 LDB B37
05752 035470       STB MASK      SET UP MASK FOR FUNCTION TYPE
05753 035471       STB STMP1
05754 025406       LDB VALUE
05755 063374 DCMF2 JSM SVALU     SEARCH SYMTAB FOR FUNCTION
05756 170402       RET           END OF TABLE
05757 004132       ADB M1
05760 070742       SAR 16
05761 074557       STA B,I       SET ADDRESS TO ZERO
05762 004132       ADB M1
05763 067755       JMP DCMF2     FIND NEXT FUNCTION
*
* END OF KEY AREA
05764 021425 DCMP4 LDA PBUFO
05765 025422       LDB UKPTR
05766 076110       RZB *+2       KEY MODE?
05767 021424       LDA PBUFF     NO, START OF MAINLINE IS IN PBUFF
05770 025426       LDB PBPTO     GET END OF MAINLINE
05771 067732       JMP DCMP6
*
*
00020       MDMA  EQU .3         TYPE CODE FOR DIM
00017       MCOMA EQU .2
00012       MDEFA EQU .1
05772 164006 MREM ABS 5-13777B    OP CODE 5 ON STANDARD PAGE
*
05773 000000       BSS 1          CHECKSUM WORD*************
```

#01 LIST ROUTINE

```
*
*     THIS SUBROUTINE LISTS ALL OR
*     A PORTION OF THE PROGRAM.
*
*     ENTRY CONDITIONS:
*          (A)=FWA OF LIST
*          (B)=LWA+1 OF LIST
*          PBUFF=FWA OF PROGRAM
*          PBPTR=LWA+1 OF PROGRAM
*
06000             ORG 6000B
06000 031453 LIST  STA ARW       SET FLAG FOR LIST
06001 035460       STB TMP7      SAVE ENDING ADDRESS
06002 074057       CPA B         NULL LIST?
06003 066005       JMP *+2       YES
06004 061344       JSM CRLF1
06005 021453       LDA ARW
06006 031472 LIST1 STA TEMPS     SAVE STARTING ADDRESS
06007 031476       STA TMP11     SET FLAG FOR BLANK AFTER MCOUT
06010 070742       SAR 16
06011 031432       STA DRQST     CLEAR INPUT MODE
* LIST NEXT LINE
06012 160170 L1    JSM CLERA,I   CLEAR BUFFER
06013 025472       LDB TEMPS
06014 015460       CPB TMP7      FINISHED?
06015 170402       RET           YES
06016 062036       JSM LISTS     NO, PUT NEXT LINE IN BUFFER
06017 025453       LDB ARW
06020 076350       RZB L100      UP OR DOWN ARROW?
06021 020040       LDA .31       YES
06022 045623       ISZ PEND      GUARANTEE ROOM FOR LAZY-T
06023 061016       JSM ONEXT     OUTPUT LAZY-T
06024 020132       LDA M1
06025 031430       STA LNINC     FLAG REFD FOR LIST
06026 165462       JMP REEDL,I
```

```
#01  LIST ROUTINE

06027 060373 L100   JSM ICNT       COMPUTE COUNT
06030 061337        JSM NOWRT      OUTPUT TO PRINTER
06031 061344        JSM CRLF1
06032 021442        LDA STPFL
06033 010040        CPA .31        STOP KEY HIT?
06034 167517        JMP CRCLA,I    YES, ABORT
06035 066012        JMP L1
*
*  SUBROUTINE TO PUT NEXT LINE IN BUFFER
*
06036 061007 LISTS  JSM NEXTA      FIND END OF LINE
06037 035475        STB TMP10      SAVE END OF STMT
06040 020236        LDA SLEND
06041 031523        STA BEND       SET END OF BUFFER POINTER
06042 125472        LDB TEMPS,I
06043 074073        SBP *+1,C      CLEAR SECURE BIT
06044 035431        STB CLINE
06045 076650        RZB LLL        TYPING AID KEY?
06046 020100        LDA B52        YES, OUTPUT AN *
06047 061016        JSM ONEXT
06050 025460        LDB TMP7
06051 035475        STB TMP10      SET UP END OF LINE POINTER
06052 055472        DSZ TEMPS
06053 121472        LDA TEMPS,I
06054 000133        ADA M2
06055 070744        SAL 1          GET CHARACTER COUNT
06056 025472        LDB TEMPS
06057 004017        ADB .2
06060 074744        SBL 1          GET STARTING ADDRESS
06061 066276        JMP L28-3      OUTPUT STRING
*  OUTPUT STMT NUMBER AND TYPE
06062 160210 LLL    JSM OUTIA,I
06063 061015        JSM OBLNK
06064 121472        LDA TEMPS,I
06065 070213        SAP *+4        SECURE?
06066 020100        LDA B52        YES, OUTPUT A "*"
06067 061016        JSM ONEXT
06070 066277        JMP L28-2
06071 060602        JSM NEXT1-4    NO, GET PAGE AND TYPE
06072 035474        STB TMP9       STORE LAST ADDRESS OF PAGE
06073 055472        DSZ TEMPS
06074 121472        LDA TEMPS,I
06075 045472        ISZ TEMPS
06076 050107        AND B1000      GET ASCII FLAG
06077 031461        STA TMP13
06100 021466        LDA LOCL1      RECALL OP CODE
06101 010132        CPA M1         IMPLIED LET?
06102 066117        JMP L23        YES
06103 070076        TCA            GET OP-CODE
06104 004132        ADB M1         GET STMT NAME TABLE ADDRESS
06105 074437        ADB B,I
06106 074744        SBL 1          COMPUTE TABLE ADDRESS
*  OUTPUT MULTI-CHARACTER OPERATOR
06107 062306 L6     JSM MCOUT      OUTPUT NAME
06110 021461        LDA TMP13
06111 070110        SZA *+2        ASCII FORMAT?
06112 066266        JMP L25        YES
06113 021476        LDA TMP11
06114 070110        SZA *+2
06115 061015        JSM OBLNK
06116 035476        STB TMP11      RESET BLANK FLAG
*  OUTPUT NEXT OPERAND
06117 121472 L23    LDA TEMPS,I
06120 050067        AND TYPFL      ISOLATE OPERAND TYPE
06121 070472        SAM L4,C       SKIP IF CONSTANT OR FUNCTION
06122 031477        STA TMP12      SAVE TYPE
06123 121472        LDA TEMPS,I
06124 050065        AND OPMSK      WAS THE PREVIOUS OURATOR
06125 010065        CPA OPMSK        EXPANDED?
06126 066152        JMP L11        YES SKIP THIS FIELD
06127 062302        JSM GTOPD
06130 071710        SZA *-2        SKIP IF NULL OPERAND
06131 066221        JMP L15
*  OUTPUT CONSTANT
06132 010040 L4     CPA .31        PREDEFINED FUNCTION?
06133 066255        JMP L9         YES
06134 000132        ADA M1
06135 031705        STA FLOAT      SAVE FIX/FLOAT FLAG (0=FIX)
06136 000133        ADA M2
06137 070313        SAP L12        SKIP IF INTEGER
06140 160232        JSM SNFLA,I    CONVERT
06141 020133        LDA M2
06142 031703        STA PLACE      DECIMAL PLACES NOT SPECIFIED
06143 062353        JSM NMOUT      OUTPUT NUMBER FROM AR2
06144 066152        JMP L11
*  OUTPUT INTEGER
06145 045472 L12    ISZ TEMPS
06146 125472        LDB TEMPS,I    GET INTEGER
06147 074133        SBP *+2,C      COMPILED FORMAT?
```

001 LIST ROUTINE

```
06150 074537         LDB B,I        YES, READ LINE #
06151 160210         JSM OUTIA,I    OUTPUT INTEGER
*  CHECK FOR END OF STATEMENT
06152 045472 L11     ISZ TEMPS
06153 021472         LDA TEMPS
06154 011475         CPA TMP10
06155 170402         RET
*  OUTPUT NEXT OPERATOR
06156 121472         LDA TEMPS,I
06157 050065         AND OPMSK
06160 070442         SAR 10
06161 070510         SZA L13        SKIP IF NULL OPERATOR
06162 010012         CPA .1         QUOTE?
06163 066213         JMP L29        YES
06164 024034         LDB .21
06165 060753         JSM LIMIT      SINGLE CHARACTER OPERATOR?
06166 066174         JMP L3         NO
06167 000123         ADA FOPRS
06170 070517         LDA A,I
06171 070342         SAR 8          GET ASCII FROM TABLE
06172 061016         JSM ONEXT
06173 066117 L13     JMP L23        GO OUTPUT NEXT OPERAND
*  OUTPUT MULTI-CHAR OPERATOR
06174 031703 L3      STA PLACE      SAVE OPERATOR IN TEMP
06175 010040         CPA .31        EXPANDED OP?
06176 062302         JSM GTOPD      YES, GET OP CODE
06177 031704         STA WIDTH      SAVE
06200 070142         SAR 4
06201 031476         STA TMP11      SET FLAG FOR BLANK
06202 070110         SZA *+2        OUTPUT BLANK IF
06203 061015         JSM OBLNK        OP > 17B
06204 021703         LDA PLACE
06205 024130         LDB FROMA      GET STANDARD PAGE
06206 010040         CPA .31        EXPANDED OP?
06207 025474         LDB TMP9       YES, GET PAGE FOR STMT
06210 021704         LDA WIDTH
06211 004135         ADB M4
06212 066105         JMP L6-2       COMPUTE TABLE ADDR AND OUTPUT
*  OUTPUT QUOTE FIELD
06213 020043 L29     LDA .34
06214 061016         JSM ONEXT
06215 062647         JSM QUOTE
06216 020043         LDA .34
06217 061016         JSM ONEXT
06220 066153         JMP L11+1
*  OUTPUT OPERAND NAME AND TYPE
06221 021477 L15     LDA TMP12
06222 010040         CPA .31        FUNCTION?
06223 062251         JSM L16        YES
06224 062302 L8      JSM GTOPD
06225 000101         ADA B100
06226 061016         JSM ONEXT      OUTPUT LETTER NAME
06227 025477         LDB TMP12
06230 014040         CPB .31        FUNCTION?
06231 066152         JMP L11        YES
06232 020077         LDA DOLAR
06233 014076         CPB B36        STRING
06234 066241         JMP L19        YES
06235 074146         RBR 4
06236 074251         SLB L20        LETTER AND DIGIT?
06237 021477         LDA TMP12      YES, OUTPUT DIGIT
06240 040052         IOR .48
06241 061016 L19     JSM ONEXT
06242 066152         JMP L11
06243 074642 L20     SBR 14
06244 075710         SZB *-2        LETTER ONLY?
06245 020055         LDA I          NO
06246 075551         SLB L19        INTEGER?
06247 020073         LDA S          NO - SPLIT
06250 066241         JMP L19
*  OUTPUT "FN"
06251 020072 L16     LDA F
06252 061016         JSM ONEXT      OUTPUT F
06253 023522         LDA N
06254 065016         JMP ONEXT      OUTPUT N AND RETURN TO L8
*  OUTPUT PRE-DEFINED FUNCTION NAME
06255 062302 L9      JSM GTOPD      GET OP-CODE
06256 031467         STA LOCL2
06257 060605         JSM NEXT1-1    GET PAGE
06260 004134         ADB M3
06261 074437         ADB B,I
06262 021467         LDA LOCL2
06263 074744         SBL 1          COMPUTE TABLE ADDRESS
06264 062306         JSM MCOUT
06265 066117         JMP L23
*  OUTPUT REM STATEMENT
06266 021472 L25     LDA TEMPS
06267 070076         TCA
06270 001475         ADA TMP10
06271 070744         SAL 1
```

```
      #01  LIST ROUTINE

06272 000132         ADA M1        COMPUTE CHARACTER COUNT
06273 025472         LDB TEMPS
06274 074744         SBL 1
06275 074070         SIB *+1       COMPUTE STARTING ADDRESS
06276 062651         JSM STOUT     OUTPUT STRING TO BUFFER
06277 025475         LDB TMP10
06300 035472         STB TEMPS
06301 170402 L28     RET           LINE COMPLETE
*
*  GET OPERAND NAME
*
06302 121472 GTOPD LDA TEMPS,I
06303 050115         AND H1777
06304 070202         SAR 5
06305 170402         RET
      #01  OUTPUT TO BUFFER ROUTINES

*
*     THIS SUBROUTINE SEARCHES THE
*     MULTIPLE CHARACTER OP CODE
*     TABLE. IT RETURNS WITH THE
*     ASCII STRING IN THE SYNTAX
*     BUFFER.
*
*     ENTRY CONDITIONS:
*
*           (A)= OP CODE
*           (B)= POINTER TO FIRST
*                CHARACTER OF TABLE
*
*
06306 031741 MCOUT  STA TMP1       SAVE CODE
06307 035740        STB TMP
06310 070742 MC1    SAR 16
06311 031743        STA TMP3       COUNT=0
06312 061053 MC4    JSM GTMP
06313 070306        RAR 7
06314 070331        SLA MC2,C      OP CODE?
06315 070402        SAR 9          YES
06316 050040        AND .31
06317 011741        CPA TMP1       MATCH?
06320 066324        JMP MC3        YES
06321 066310        JMP MC1
06322 045743 MC2    ISZ TMP3
06323 066312        JMP MC4
06324 021743 MC3    LDA TMP3       GET COUNT
06325 025743        LDB TMP3
06326 074056        CMB
06327 005740        ADB TMP        COMPUTE STARTING ADDRESS
06330 066651        JMP STOUT
*
*    THIS SUBROUTINE ROUNDS THE NUMBER
*    IN AR2.  IF OVERFLOW OCCURSBUMP THE
*    EXPONENT AND SHIFT A ONE IN AS THE
*    MSD.  B HAS THE LEADING ZERO COUNT
*    FOR THE ROUNDING CONSTANT.
*
*
06331 021744 RND2   LDA AR1
06332 031754        STA AR2
06333 170402        RET
06334 061256 RND    JSM CLAR2
06335 020022        LDA .5
06336 174470        MRY            ROUND OFF LSD-1
06337 170560        FXA
06340 170002        MOV            SET A=E
06341 071410        SZA RND2
06342 024012        LDB .1
06343 174470        MRY            SHIFT IN A ONE
06344 020013        LDA B400
06345 001744        ADA AR1
06346 031754        STA AR2        BUMP EXPONENT
06347 070340        AAR 8
06350 010060        CPA .100       EXPONENT OVERFLOW?
06351 064444        JMP XFAR2
06352 055777        DSZ RSPTR
*
*
*
*    NUMOUT ROUTINE
*
*    THIS ROUTINE OUTPUTS A NORMALIZED
*    NUMBER FROM AR2 INTO A BUFFER/
*
*    PLACE = DIGITS FOLLOWING DECIMAL POINT
*    PLACE = -1  STANDARD FORMAT
*    PLACE = -2  LIST NUMBER
*    WIDTH = FIELD WIDTH
*    BADDR = OUTPUT BUFFER POINTER
```

*01 OUTPUT TO BUFFER ROUTINES

```
*    FLOAT = 1 SPECIFIES FLOATING POINT
*
*
06353 060405 NMOUT JSM XFAR1
06354 024012       LDB .1
06355 035751       STB DIGIT      INITIALIZE
06356 171400 NM3   MLS            SHIFT NEXT DIGIT
06357 070450       SZA NM1        DIGIT IS ZERO?
06360 021703       LDA PLACE
06361 070070       SIA *+1
06362 072250       RZA NM2        STANDARD FORMAT?
06363 014027       CPB .11
06364 066374       JMP NM4
06365 014030       CPB .12
06366 066374       JMP NM4
06367 035751 NM2   STB DIGIT
06370 074070 NM1   SIB *+1
06371 014031       CPB .13        LAST DIGIT?
06372 066374       JMP *+2        YES
06373 066356       JMP NM3        NO
06374 060444 NM4   JSM XFAR2
06375 021705       LDA FLOAT
06376 072110       RZA *+2        FIXED OR FLOAT?
06377 066467       JMP OFXD       FIXED
*
*
*    OUTPUT A FLOATING POINT NUMBER
*    THE NUMBER WILL HAVE THE FORM:
*
*    SX.XXXXXXXXXESXX
*
06400 025703 OFLT  LDB PLACE
06401 021416       LDA MODE
06402 070151       SLA *+3        SKIP IF PROG OR LIST
06403 035741       STB R
06404 066433       JMP FLT2+1
06405 074513       SBP FLT1       STANDARD FORMAT?
06406 014132       CPB M1         LIST NUMBER?
06407 066414       JMP FLT7       NO
06410 021751       LDA DIGIT      YES
06411 000132       ADA M1
06412 031741       STA R          R = DIGIT-1
06413 066435       JMP FLT5
06414 024022 FLT7  LDB .5         STD PRINTOUT--FLOAT 5
06415 035741 FLT11 STB R
06416 066432       JMP FLT2
06417 035741 FLT1  STB R
06420 076110       RZB *+2        ANY RIGHT DIGITS?
06421 004132       ADB M1         NO, ALLOW ONE LESS CHARACTER
06422 004024       ADB .7
06423 074076       TCB
06424 005704       ADB WIDTH
06425 074213       SBP FLT4
06426 020077 FLT3  LDA DOLAR      NO
06427 025704       LDB WIDTH
06430 067475       JMP MOUT
06431 063474 FLT4  JSM MOUT-1
06432 025741 FLT2  LDB R
06433 004017       ADB .2
06434 062334       JSM RND        ROUND THE NUMBER
06435 062637 FLT5  JSM OSIGN
06436 061314       JSM ODGIT      OUTPUT A DIGIT FROM AR2
06437 021741       LDA R
06440 070310       SZA FLT8     ANY RIGHT DIGITS?
06441 020051       LDA POINT
06442 061016       JSM ONEXT      YES, OUTPUT DECIMAL POINT
06443 061314 FLT6  JSM ODGIT
06444 055741       DSZ R          DINC R
06445 066443       JMP FLT6
06446 020071 FLT8  LDA E
06447 061016       JSM ONEXT
06450 025754       LDB AR2
06451 074340       ABR 8          GET EXPONENT
06452 020047       LDA PLUS
06453 074153       SBP FLT10      NEGAIVE EXPONENT?
06454 020050       LDA MINUS      YES
06455 074076       TCB
06456 035743 FLT10 STB INDEX      SAVE EXPONENT
06457 061016       JSM ONEXT
06460 025743       LDB INDEX
06461 004141       ADB M10
06462 074153       SBP FLT9       EXPONENT LT 10?
06463 020052       LDA B60
06464 061016       JSM ONEXT
06465 025743 FLT9  LDB INDEX
06466 164210       JMP OUTIA,I    OUTPUT EXPONENT
```

#01 OUTPUT TO BUFFER ROUTINES

```
*
*      OUTPUT A FIXED POINT NUMBER
*      IF IT WILL FIT IN THE SPECIFIED
*      FIELD. THE NORMALIZED NUMBER IS
*      IN REGISTER AR1.
*
*
06467 021754 OFXD  LDA AR2
06470 070340       AAR 8
06471 070070       SIA *+1
06472 031742       STA L
06473 074742       SBR 16
06474 035750       STB RBASE
06475 070076       TCA
06476 070152       SAM RL4
06477 035742       STB L
06500 031750       STA RBASE
06501 001751 RL4   ADA DIGIT
06502 070113       SAP *+2        DIGIT GE EXP?
06503 070742       SAR 16         NO, R=0
06504 031741       STA R          R=DIGIT+RBASE-L
06505 025703 RL3   LDB PLACE
06506 014133       CPB M2         LIST NUMBER?
06507 066567       JMP NN2        YES
06510 074313       SBP N2         STANDARD FORMAT?
06511 025741       LDB R          YES
06512 014027       CPB .11        11 RIGHT DIGITS?
06513 004133       ADB M2         YES, USE ONLY 9
06514 014061       CPB .10        10 RIGHT DIGITS?
06515 004132       ADB M1         YES, USE ONLY 9
06516 035741 N2    STB R
06517 074076       TCB
06520 005750       ADB RBASE
06521 074076       TCB
06522 005742       ADB L
06523 004143       ADB M12
06524 074353       SBP N1
06525 004031       ADB .13
06526 062334 N4    JSM RND        ROUND THE NUMBER
06527 066533       JMP N1
06530 025754 N6    LDB AR2
06531 074112       SBM N1        L GE 0?
06532 045742       ISZ L         YES, BUMP L
06533 021416 N1    LDA MODF
06534 025754       LDB AR2
06535 074340       ABR 8
06536 070311       SLA NN3        CALC MODE?
06537 004143       ADB M12        YES
06540 074513       SBP NN         OVERFLOW?
06541 005703       ADB PLACE      NO
06542 004030       ADB .12
06543 074313       SBP N7         UNDERFLOW?
06544 021703 NN3   LDA PLACE
06545 070313       SAP NN1        STANDARD FORMAT?
06546 004141       ADB M10
06547 074153       SBP NN         EXPONENT GT 9?
06550 004030       ADB .12
06551 074713 N7    SBP NN2        OVERFLOW?
06552 066400 NN    JMP OFLT       YES
06553 025741 NN1   LDB R
06554 074130       SIB *+2        R=0?
06555 004012       ADB .1         NO, B=R+2
06556 021742       LDA L          YES, B=R+1
06557 070130       SIA *+2        L=0?
06560 000132       ADA M1         NO
06561 070037       ADB A          YES, USE L=1
06562 074076       TCB
06563 005704       ADB WIDTH
06564 075312       SBM NN         NUMBER FITS IN FIELD?
06565 035461       STB TMP13
06566 063474       JSM MOUT-1
06567 062637 NN2   JSM OSIGN
06570 021742       LDA L
06571 025742       LDB L
06572 004144       ADB M13
06573 074112       SBM NN10       MORE THAN 12 DIGITS?
06574 020030       LDA .12        YES, USE ONLY 12
06575 031461 NN10  STA TMP13
06576 070510       SZA NN4
06577 061314 NN5   JSM ODGIT
06600 055461       DSZ TMP13       LAST LEFT DIGIT?
06601 066577       JMP NN5        NO
06602 025742       LDB L
06603 004143       ADB M12
06604 074312       SBM NN4+2
06605 074250       SZB NN4+2
06606 020052       LDA B60
06607 063475       JSM MOUT        FILL WITH ZEROES
06610 020052 NN4   LDA B60
06611 061016       JSM UNEXT
```

#01 OUTPUT TO BUFFER ROUTINES

```
06612 021741          LDA R
06613 072110          RZA *+2
06614 066636 NN11     JMP NN6
06615 020051          LDA POINT
06616 061016          JSM ONEXT
06617 025750          LDB RBASF
06620 074117          LDA B
06621 070076          TCA
06622 001741          ADA R
06623 070153          SAP *+3
06624 070742          SAR 16
06625 025741          LDB R
06626 031741          STA R        R=R-RBASF
06627 020052          LDA B60
06630 063475          JSM MOUT     FILL WITH ZEROES
06631 021741 NN7      LDA R
06632 070210          SZA NN6
06633 061314          JSM ODGIT
06634 055741          DSZ R        LAST RIGHT DIGIT?
06635 066631          JMP NN7      NO
06636 170402 NN6      RET          YES,DONE
*
*
*    THIS SUBROUTINE OUTPUTS THE MANTISSA SIGN
*
*    MANTISSA NEGATIVE----UNCONDITIONALLY OUTPUT -
*
*    MANTISSA POSITIVE
*         LIST NUMBER------OUTPUT NOTHING
*         OTHERWISE--------OUTPUT BLANK
*
*
06637 021754 OSIGN    LDA AR2
06640 070151          SLA OS1      MANTISSA POSITIVE?
06641 020050          LDA MINUS    NO
06642 065016          JMP ONEXT
06643 021703 OS1      LDA PLACE
06644 010133          CPA M2       LIST NUMBER?
06645 170402          RET          YES
06646 065015          JMP OBLNK
*
*    OUTPUT A QUOTE STRING
*
06647 063261 QUOTE    JSM QTCH1    GET CHAR COUNT AND ADDRESS
06650 000000          BSS 1        CHECKSUM WORD****(QTCH1 RETURNS TO P+2)
*
*
*    OUTPUT ANY STRING
*
*    ENTRY CONDITIONS:
*
*         A=NUMBER OF CHARACTERS
*         B=POINTER FIRST CHAR
*
06651 031466 STOUT    STA LOCL1    SAVE COUNT
06652 070742          SAR 16
06653 031701          STA NDISP    ENABLE DISPLAY
06654 020012          LDA .1
06655 065332          JMP .NPWR+2  DISABLE PRINT
```

#01 PRINT; DISP; AND WRITE COMMAND EXECUTION

```
*
*  SUBROUTINE TO PLACE NEXT PRINT FIELD IN BUFFER
*
*    RETURN P+1: END OF LINE (B)=0 FOR CRLF NOT SUPPRESSED
*           P+2: ITEM IN BUFFER (BADDR)=BUFFER POINTER
*
*
06656 063227 PRINN    JSM CKEOL    END OF LINE?
06657 074742          SBR 16       YES CRLF NOT SUPPRESSED
06660 170402          RET          YES CRLF SUPPRESSED
06661 063004          JSM PFORI    SET UP 72 CHAR LINE
06662 063240          JSM QTCHK    QUOTE FIELD NEXT?
06663 066674          JMP PR5      NO
06664 021471 QOV      LDA L2T2     RECALL COUNT
06665 003523          ADA M72
06666 070113          SAP *+2      MORE THAN 72 CHARS?
06667 070742          SAR 16       NO
06670 070076          TCA
06671 001471          ADA L2T2     TRUNCATE TO 72
06672 062651          JSM STOUT    OUTPUT STRING
06673 066731          JMP PR7
06674 121472 PR5      LDA TEMPS,I
06675 050070          AND OPDMK
06676 012732          CPA TABOP    TAB?
06677 067040          JMP ETAB     YES
06700 021453          LDA PRFLG
```

#01 PRINT, DISP, AND WRITE COMMAND EXECUTION

```
06701 010132        CPA M1
06702 066706        JMP *+4        KEYBOARD "LET"
06703 062773        JSM PFORM
06704 061220        JSM FETCH+1    EVALUATE EXPRESSION
06705 066707        JMP *+2
06706 062773        JSM PFORM      EVALUATE "LET"
06707 025622        LDB TERM
06710 076150        RZB *+3        CRLF GIVEN IN FUNCTION?
06711 160170        JSM CLERA,I    YES
06712 035622        STB TERM
06713 066721        JMP PR6        NO
*  BUFFER OVERFLOW
06714 025742 POV    LDB TMP2
06715 074110        SZB *+2
06716 066664        JMP OOV        OVERFLOW DURING STRING
06717 020215        LDA TMPOP      NO, RESTORE AR2
06720 060445        JSM XFAR2+1
06721 024132 PR6    LDB M1
06722 021416        LDA MODE
06723 070150        SZA PR11       SKIP IF PROG MODE
06724 025452        LDB CPLAC
06725 021451        LDA CTYPE      SET UP CALC FORMAT FLAGS
06726 063065 PR11   JSM GNUM1      PUT NUMBER IN BUFFER
06727 074742        SBR 16
06730 035742        STB TMP2       SET FLAG FOR NUMBER
06731 063052 PR7    JSM OVCK       CHECK FOR OVERFLOW
06732 100077 TAROP  OCT 100077     (OVCK RETURNS TO P+2)
06733 075052        SBM POV        SKIP IF OVERFLOW
06734 021472        LDA TEMPS
06735 011421        CPA PRADD      END OF LINE?
06736 064357        JMP RETN2      YES RETURN TO P+2
06737 121472        LDA TEMPS,I    NO, GET NEXT OPERATOR
06740 070073        SAP *+1,C
06741 070442        SAR 10
06742 000133        ADA M2         SET UP COMMA:SEMICOLON FLAG
06743 063027        JSM FILL       OUTPUT TRAILING BLANKS
06744 064357        JMP RETN2
*
*
*  PRINT DISP AND WRITE(N,*) ROUTINE
*
06745 020146 FPRIN LDA M15        SET UP SELECT CODE 15
06746 070076 FDISP TCA            NEG= DISP, -1= LET
06747 031453        STA PRFLG      SELECT CODE=PRINT OR WRITE
06750 025416 FWRI1 LDB MODE
06751 076150        RZB *+3        SKIP IF KEYBOARD MODE
06752 021622        LDA TERM
06753 072150        RZA *+3        SKIP IF BUFFER IS PARTIALLY FILLED
06754 160170        JSM CLERA,I    INITIALIZE BUFFER
06755 035622        STB TERM       INITIALIZE CRLF SUPPRESSED FLAG
06756 063227        JSM CKEOL      NULL LIST?
06757 066765        JMP PR2-1
06760 066765        JMP PR2-1      YES, GIVE CRLF
06761 062656 PR3    JSM PRINN      OUTPUT NEXT FIELD TO BUFFER
06762 066766        JMP PR2        END OF LINE
06763 063450        JSM OLINE      PRINT THE LATEST FIELD
06764 066761        JMP PR3
*
06765 074742        SBR 16
06766 035622 PR2    STB TERM       SET CRLF SUPPRESSED FLAG
06767 076150        RZB PR17       SKIP IF SUPPRESSED
06770 063007        JSM PRCHK      DISP?
06771 061344        JSM CRLF1      OUTPUT A CRLF
06772 164172 PR17   JMP XEC4A,I
*
*  SAVE PRINT FLAGS AND CALL FORMX
*
06773 025453 PFORM  LDB PRFLG
06774 060563        JSM SLWST
06775 025447        LDB SLCOD
06776 060563        JSM SLWST
06777 160201        JSM FORMA,I    EVALUATE FORMULA
07000 060567        JSM UNSTK
07001 031447        STA SLCOD      RESTORE SELECT CODE
07002 060567        JSM UNSTK
07003 031453        STA PRFLG      RESTORE PRINT FLAG
07004 023521 PFOR1  LDA LN72
07005 031623        STA PEND       SET UP 72 CHAR LINE
07006 170402        RET
07007 025450 PRCHK  LDB PMODE
07010 074310        SZB PRCHR      PRINT ALL?
07011 025453        LDB PRFLG      NO
07012 074213        SBP PRCHR      PRINT STMT?
07013 064357        JMP RETN2      NO
*    THIS SUBROUTINE FILLS A COMMA
*    OR SEMICOLON FIELD WITH BLANKS/
*    IF THE CURRENT LINE IS OVERFLOWED
*    IT IS OUTPUT AND A CRLF IS DONE/
*
```

#01 PRINT: DISP: AND WRITE COMMAND EXECUTION

```
*     ENTRY CONDITIONS:
*
*           A=0       IF COMMA FIELD
*           TMP2#0 IF QUOTE FIELD WAS PRINTED
*
 07014 021742 FILL1 LDA TMP2
 07015 070110       SZA *+2         SKIP IF NUMERIC
 07016 170402 PRCHR RET
 07017 061015       JSM OBLNK       INSURE AT LEAST 1 BLANK
 07020 025625       LDB FIRST       NO
 07021 074076       TCB
 07022 005400       ADB BADDR       GET OUTPUT COUNT
 07023 004137       ADB M6
 07024 074512       SBM FILL2
 07025 004134       ADB M3
 07026 067024       JMP *-2
 07027 073250 FILL  RZA FILL1       COMMA FIELD?
 07030 063014       JSM FILL1       YES, FIRST OUTPUT "@" SPACING
 07031 025400       LDB BADDR
 07032 007520       ADB MSLPT       GET OUTPUT COUNT
 07033 075150       SZB PRCHR       SKIP IF EXACT
 07034 004146       ADB M15
 07035 075713       SBP *-2
 07036 074076 FILL2 TCB
 07037 067474       JMP MOUT-1      OUTPUT BLANKS
*
*
*     TAB EXECUTION
*
*
 07040 045472 ETAB  ISZ TEMPS
 07041 062773       JSM PFORM
 07042 061220       JSM FETCH+1
 07043 160226       JSM FLTFA,I     TRUNCATE TO INTEGER
 07044 064357       JMP RETN2       OVERFLOW
 07045 075752       SBM *-1         NEGATIVE NUMBER?
 07046 074076       TCB
 07047 005400       ADB BADDR       COMPUTE # OF BLANKS NEEDED
 07050 007520       ADB MSLPT
 07051 063036       JSM FILL2
 07052 025400 OVCK  LDB BADDR
 07053 015623       CPB PEND        OVERFLOW?
 07054 067056       JMP ET1         YES
 07055 064357       JMP RETN2
 07056 160170 ET1   JSM CLERA,I
 07057 063007       JSM PRCHK       PRINT?
 07060 061344       JSM CRLF1       YES
 07061 024062       LDB FLGBT       SET (B) NEGATIVE FOR OVERFLOW
 07062 035622       STB TERM        SET CRLF SUPRESSED FLAG
 07063 064357       JMP RETN2
*
 07064 160206 TABER JSM ERRA,I      ERROR IF CALLED FROM WRITE STMT
*
*
 07065 035703 GNUM1 STB PLACE
 07066 031705       STA FLOAT
 07067 024215 GNUM  LDB TMPOP
 07070 060406       JSM XFAR1+1     SAVE RESULT
 07071 066353       JMP NMOUT       PUT NUMBER IN BUFFER
 07152 074073       SHP *+1,C
 07153 035456       STB FORMS       SET NUMERIC SPEC FOUND FLAG
 07154 125466       LDB LOCL1,I     GET DECIMAL SPEC
 07155 063356       JSM FSPR        UPDATE FORMAT POINTERS
 07156 031704       STA WIDTH
 07157 070353       SAP WRIT7       SKIP IF F OR E
*  OUTPUT B FIELD CHARACTER
 07160 160225       JSM FLTRA,I     CONVERT TO ROUNDED INTEGER
 07161 074742       SBR 16          OVERFLOW: USE 0
 07162 074117       LDA B
 07163 050105       AND B377        MASK TO 8 BITS
 07164 061353       JSM TTY         OUTPUT SINGLE CHAR
 07165 067216       JMP WRIT6
*  OUTPUT F OR E NUMBER
 07166 035703 WRIT7 STB PLACE
 07167 021412       LDA LSTPT       START TEMP BUFFER
 07170 070070       SIA *+1
 07171 070744       SAL 1
 07172 031400       STA BADDR         ABOVE LOW STACK
 07173 031706       STA SBPTR
 07174 021413       LDA HSTPT
 07175 070744       SAL 1
 07176 031623       STA PEND        SET END OF BUFFER AT H-STACK
 07177 021416       LDA MODE
 07200 031641       STA ST+1
 07201 070742       SAR 16
 07202 031416       STA MODE        SET FOR PROGRAM FORMAT
 07203 063067       JSM GNUM        OUTPUT NUMBER TO BUFFER
 07204 021641       LDA ST+1
 07205 031416       STA MODE
 07206 021400       LDA BADDR
```

#01 PRINT: DISP: AND WRITE COMMAND EXECUTION

```
      07207 011623        CPA PEND      OVERFLOW?
      07210 064561        JMP MERR
      07211 025706        LDB SBPTR
      07212 062374        JSM WBUFF     COMPUTE CHAR COUNT
      07213 061337        JSM NOWRT     PRINT THE BUFFER
      07214 025625        LDB FIRST
      07215 035400        STB BADDR     RESET BADDR
      07216 063227 WRIT6  JSM CKEOL     END OF STMT?
      07217 074742        SBR 16        YES, CRLF NOT SUPRESSED
      07220 067224        JMP WRITB     YES
      07221 067100        JMP WRIT2     NO
*  END OF WRITE STMT
      07222 055412        DSZ LSTPT
      07223 055412        DSZ LSTPT     UNSTACK FLAGS
      07224 070742 WRITB  SAR 16
      07225 031455        STA FORMT     SET FORMAT COMPLETE FLAG
      07226 066767        JMP PR2+1
*
*  CHECK FOR END OF OUTPUT LIST
*     P+1:  TEMPS=PRADD
*     P+2:  NULL OPERAND AND TEMPS+1=PRADD
*     P+3:  ALL OTHER
*
      07227 025472 CKEOL  LDB TEMPS
      07230 015421        CPB PRADD     END OF STMT?
      07231 170402        RET
      07232 060771        JSM GTOPP
      07233 072210        RZA CKE01     NULL OPERAND?
      07234 074070        SIB *+1       YES
      07235 015421        CPB PRADD     TEMPS+1=PRADD?
      07236 064357        JMP RETN2      YES
      07237 064356 CKE01  JMP RETN3     NO
*
*  CHECK TO SEE IF NEXT OPERATOR IS A QUOTE FIELD
*     P+1:  QUOTE NOT NEXT
*     P+2:  QUOTE NEXT:  (A)=LENGTH: (B)=POINTER: TEMPS UPDATED
*
      07240 121472 QTCHK  LDA TEMPS,I
      07241 050065        AND OPMSK     CURRENT OPERATOR
      07242 010116        CPA QTOP        A QUOTE?
      07243 067261        JMP QTCH1     YES
      07244 060771        JSM GTOPP
      07245 072410        RZA QTCH3     NULL OPERAND?
      07246 045472        ISZ TEMPS     YES, GET NEXT OPERATOR
      07247 121472        LDA TEMPS,I
      07250 050065        AND OPMSK
      07251 010116        CPA QTOP      QUOTE?
      07252 067261        JMP QTCH1     YES
      07253 055472        DSZ TEMPS     NO, RESTORE TEMPS
      07254 170402        RET           RETURN P+1
      07255 050040 QTCH3  AND B37
      07256 010076        CPA B36       STRING VARIABLE?
      07257 067276        JMP QTCH2     YES
      07260 170402        RET           NO, RET P+1
      07261 121472 QTCH1  LDA TEMPS,I
      07262 050104        AND B177      GET CHAR COUNT
      07263 031471        STA L2T2      SAVE
      07264 045472        ISZ TEMPS
      07265 025472        LDB TEMPS
      07266 074744        SBL 1         GET STARTING CHARADDRESS
      07267 035742        STB TMP2      SAVE
      07270 070037        ADB A
      07271 074070        SIB *+1
      07272 074002        SBR 1
      07273 035472        STB TEMPS     POINT TEMPS PAST END OF STRING
      07274 025742        LDB TMP2
      07275 064357        JMP RETN2
      07276 020121 QTCH2  LDA SBLOC
      07277 060613        JSM FPAGE     FIND STRING BLOCK PAGE
      07300 074117        LDA B
      07301 050065        AND OPMSK     GET STARTING ADDRESS OF PAGE
      07302 070737        JMP A,I       JUMP TO STRING PAGE
      00121        SBLOC EQU B4000      OP CODE 2
*
*  SUBROUTINE TO GET NEXT FORMAT SPEC
*
      07303 021454 TYPEC  LDA RCOUT
      07304 072450        RZA FSP1
      07305 025455        LDB FORMT
      07306 015457        CPB FORME
      07307 067353        JMP FSPN
*  SET UP NEW REPEAT COUNT
      07310 121455        LDA FORMT,I
      07311 045455        ISZ FORMT
      07312 070253        SAP FSP2
      07313 121455        LDA FORMT,I
      07314 045455        ISZ FORMT
      07315 000132 FSP1   ADA M1
      07316 031454        STA RCOUT
*  GET FORMAT SPEC: (FORMT) POINTS TO TYPE WORD
```

```
07317 121455 FSP2  LDA FORMT,I
07320 050065       AND OPMSK      READ TYPE
07321 025777       LDB RSPTR
07322 004132       ADB M1
07323 035401       STB RSAVE      SAVE ADDRESS OF RETURN
07324 025455       LDB FORMT
07325 035466       STB LOCL1
07326 010116       CPA QTOP       QUOTE FIELD?
07327 067340       JMP FSPQ       YES
07330 121455       LDA FORMT,I
07331 070202       SAR 5
07332 050040       AND B37
07333 070137       LDB A
07334 105401       ADB RSAVE,I
07335 004132       ADB M1
07336 135401 BASF  STB RSAVE,I
07337 170402       RET            RETURN TO P+(OP CODE)
07340 121466 FSPQ  LDA LOCL1,I
07341 050104       AND B177       GET CHAR COUNT
07342 031467       STA LOCL2      SAVE
07343 074070       STB *+1
07344 074744       SBL 1          COMPUTE STARTING CHARACTER ADDRESS
07345 074017       ADA B
07346 000132       ADA M1
07347 070002       SAR 1
07350 031466       STA LOCL1      COMPUTE AND SAVE ENDING WORD ADDRESS
07351 145401       ISZ RSAVE,I    SET TO RETURN TO P+2
07352 067357       JMP FSPR+1
*  END OF FORMAT STMT
07353 025456 FSPN  LDB FORMS      RESET TO START OF STMT
07354 035455       STB FORMT
07355 170402       RET
*
*
*
07356 031467 FSPR  STA LOCL2      SAVE (A)
07357 021454       LDA RCOUT
07360 072210       RZA FSPR1      END OF REPEAT COUNT?
07361 021466       LDA LOCL1      YES, UPDATE
07362 070070       SIA *+1
07363 031455       STA FORMT        FORMAT POINTER
07364 021467 FSPR1 LDA LOCL2      RESTORE (A)
07365 170402       RET
*
*  SET UP FORMAT STMT POINTERS FOR WRITE OR ENTER
*
07366 031640 SFMT  STA ST         SAVE FORMAT OP CODE
07367 045472       ISZ TEMPS
07370 061217       JSM FETCH      EVALUATE SELECT CODE
07371 160225       JSM FLTRA,I    CONVERT TO INTEGER
07372 160206 SCERR JSM ERRA,I     OVERVLOW
07373 074117       LDA B
07374 075710       SZB *-2
07375 074142       SBR 4
07376 077610       RZB *-4        CHECK FOR 1<SC<15
07377 031453       STA PRFLG      SAVE SELECT CODE
07400 070204       SAL 12
07401 031447       STA SLCOD
07402 035454 PLOTE STB RCOUT      SET REPEAT COUNT TO 0
07403 125472       LDB TEMPS,I
07404 045472       ISZ TEMPS
07405 074152       SBM *+3        FORMAT SPECIFIED
07406 045472       ISZ TEMPS
07407 170402       RET            NO, RETURN P+1
07410 121472       LDA TEMPS,I    YES
07411 070673       SAP SFMT2,C
07412 025455 SFMT1 LDB FORMT      ERROR IF STATEMENTS USING
07413 074110       SZB *+2        FORMATS NESTED?
07414 160206 FNEST JSM ERRA,I     YES
07415 070137       LDB A
07416 000017       ADA .2
07417 031455       STA FORMT      SET CURRENT FMT SPEC POINTER
07420 072053       SAP *+1,S      SET FLAG - - NO NUMERIC SPEC YET
07421 031456       STA FORMS
07422 061007       JSM NEXTA
07423 035457       STB FORME      SET POINTER TO END OF FMT STMT
07424 045472       ISZ TEMPS
07425 064357       JMP RETN2
*  FIND AND VERIFY FORMAT STMT
07426 061075 SFMT2 JSM FNDPS      FIND STATEMENT
07427 067430       JMP *+1
07430 164343 NOFMT JMP E45-1,I    NOT FOUND
07431 076053       SBP *+1,S      SET FLAG
07432 135472       STB TEMPS,I    STORE ADDRESS IN PLACE OF STMT #
07433 021476       LDA TEMP3
07434 070070       SIA *+1
07435 070537       LDB A,I        GET OP CODE
07436 070070       SIA *+1
07437 070517       LDA A,I        GET PAGE
```

*01 PRINT: DISP: AND WRITE COMMAND EXECUTION

```
07440 050065             AND OPMSK
07441 074442             SHR 10
07442 070037             ADB A          COMBINE
07443 021476             LDA TEMP3      RECALL STMT ADDRESS
07444 015640             CPB ST         IS THIS A FORMAT STMT?
07445 067412             JMP SFMT1      YES
07446 067430             JMP NOFMT      NO, ERROR
*
07447 012025 FMTOP OCT 12025

*   THIS ROUTINE TAKES A RECORD FROM
*   THE REFRESH BUFFER AND OUTPUTS IT
*   ON THE PRINTER.
*
*
07450 021625 OLINE LDA FIRST
07451 070076             TCA
07452 001400             ADA BADDR      GET CHAR COUNT
07453 070410             SZA OL1        BUFFER EMPTY?
07454 063007             JSM PRCHK      PRINT?
07455 067457             JMP *+2        YES
07456 067464             JMP OL2        NO
07457 025625             LDB FIRST      YES
07460 061337             JSM NDWRT
07461 021400 OL3         LDA BADDR
07462 031625             STA FIRST
07463 170402 OL1         RET
07464 024030 OL2         LDB .12
07465 035705             STB FLOAT      SAVE COUNT
07466 163516 EW2         JSM REFRA,I
07467 025443             LDB KEYFG      HAS A KEY BEEN ENTERED?
07470 075453             SBP OL3
07471 055705             DSZ FLOAT
07472 067466             JMP EW2
07473 067461             JMP OL3
*
*   THIS ROUTINE OUTPUTS THE CODE
*   IN A B TIMES
*
*
07474 020041             LDA .32
07475 074412 MOUT        SBM M01        COUNT NEGATIVE
07476 074350             SZB M01        OR ZERO?
07477 035740             STB TMP        NO, SAVE COUNT
07500 031752             STA TMP6A
07501 021752             LDA TMP6A
07502 061016 M02         JSM ONEXT
07503 055740             DSZ TMP
07504 067501             JMP M02-1
07505 170402 M01         RET            YES
*
*  WAIT EXECUTION
*
07506 061217 EWAIT JSM FETCH            GET COUNT
07507 160226             JSM FLTFA,I    CONVERT TO INTEGER
07510 164172 EW1         JMP XEC4A,I    OVERFLOW
07511 075752             SBM EW1
07512 074142             SHR 4          DIVIDE BY 16
07513 075650             SZB EW1
07514 063465             JSM EW2-1      REFRESH DISPLAY
07515 164172             JMP XEC4A,I
07516 002562 REFRA DEF REFRS
07517 002512 CRC1A DEF CRC1
07520 174456 MSLPT ABS -RBUFF-RBUFF
07521 003433 LN72  DEF RBUFF+RBUFF+73
07522 000116 N     OCT 116
07523 177670 M72   DEC -72
```

*01 SYNTAX TABLES

```
*
*  STATEMENT SYNTAX JUMP TABLE
*
07524 174556             ABS RITE-*
07525 171422             ABS ENDS-*     GRAD
07526 171421             ABS ENDS-*     DEG
07527 171420             ABS ENDS-*     RAD
07530 174541             ABS LETS-*
07531 173760             ABS FMTS-*
07532 174554             ABS PRINS-*    DISP
07533 006725             ABS READS-*    INPUT
07534 006732             ABS RSTRS-*
07535 174551             ABS PRINS-*
07536 006722             ABS READS-*
07537 173743             ABS DATAS-*
07540 002741             ABS WAITS-*
07541 174070             ABS STOPS-*
07542 171405             ABS ENDS-*
07543 002761             ABS RETNS-*
```

#01 SYNTAX TABLES

```
07544 174011        ABS GOTOS-*     GOSUB
07545 000147        ABS NEXTS-*
07546 002714        ABS FORS-*
07547 000151        ABS IFS-*
07550 174005        ABS GOTOS-*
07551 006721        ABS REMS-*
07552 002731        ABS DEFS-*
07553 006660        ABS COMS-*
07554 006702        ABS DIMS-*      DIM
07555 174446        ABS ILETS-*
*
*  STATEMENT NAME TABLE
*
07556 000241 SYN13 OCT 00241        IMPLIED LET OP CODE 100001
07557 046105       ASC 1,LE
07560 052266       OCT 52266        LET: OP CODE 110110
07561 042111       ASC 1,DI
07562 046602       OCT 046602       DIM:000010
07563 041517       ASC 1,CO
07564 046603       OCT 046603       COM:000011
07565 042105       ASC 1,DE
07566 043204       OCT 043204       DEF:000100
07567 051105       ASC 1,RE
07570 046645       OCT 046645       REM:100101
07571 043517       ASC 2,GOTO
07572 052117
07573 123111       OCT 123111       GOTO:100110
07574 043247       OCT 043247       IF:100111
07575 047105       ASC 2,NEXT
07576 054124
07577 104507       OCT 104507       NEXT:001001
07600 047523       ASC 2,OSUB
07601 052502
07602 105122       OCT 105122       GOSUB: 001010
07603 042524       ASC 2,ETUR
07604 052522
07605 047213       OCT 047213       RETURN: 001011
07606 042516       ASC 1,EN
07607 042254       OCT 042254       END:101100
07610 051524       ASC 2,STOP
07611 047520
07612 126527       OCT 126527       STOP:101101
07613 040511       ASC 1,AI
07614 052216       OCT 052216       WAIT:001110
07615 042101       ASC 2,DATA
07616 052101
07617 107522       OCT 107522       DATA:001111
07620 042501       ASC 1,EA
07621 042220       OCT 042220       READ: 010000
07622 050122       ASC 2,PRIN
07623 044516
07624 052261       OCT 052261       PRINT:110001
07625 042111       ASC 2,DISP
07626 051520
07627 132111       OCT 132111       DISP: 110100
07630 047120       ASC 2,NPUT
07631 052524
07632 111506       OCT 111506       INPUT: 010011
07633 047522       ASC 2,ORMA
07634 046501
07635 052225       OCT 52225        FORMAT: 010101
07636 043117       ASC 1,FO
07637 051210       OCT 51210        FOR: 001000
07640 051105       ASC 3,RESTOR
07641 051524
07642 047522
07643 042662       OCT 42662        RESTORE: 110010
07644 051101       ASC 1,RA
07645 042267       OCT 42267        RAD: 110111
07646 042105       ASC 1,DE
07647 043670       OCT 43670        DEG: 111000
07650 043522       ASC 2,GRAD
07651 040504
07652 134527       OCT 134527       GRAD: 111001
07653 051111       ASC 2,RITE
07654 052105
07655 175000       OCT 175000       WRITE: 111010

*  FETCH A STRING CONSTANT
*
*    START STRING IN NEXT WORD OF SYNTAX BUFFER, THEN RECORD
*      OPENING QUOTE AND THE STRING LENGTH.  EXIT WITH NEXT CHAR IN (A)
*    EXIT TO ERROR IF NO OPENING QUOTE
*    EXIT TO ERROR IF NO CLOSING QUOTE
*    ENTER AT GETST+3, IF OPENING QUOTE ALREADY FOUND
*
07656 010043 GETST CPA B42          OPENING QUOTE?
07657 067661       JMP *+2          YES
07660 160206 NOST  JSM ERRA,I       NO
07661 025706       LDB SBPTR        SAVE INITIAL SYNTAX
```

#01 SYNTAX

```
07662 035470        STB L2T1         BUFFER POINTER
07663 074742        SBR 16          SET TO START STORING IN LEFT HALF
07664 063672        JSM CHRST       GET STRING
07665 160206 SYE14  JSM ERRA,I        NO CLOSING QUOTE
07666 020116        LDA QTOP        STORE OPENING QUOTE
07667 001474        ADA TEMP1         AND THE
07670 131470        STA L2T1,I           STRING LENGTH
07671 065055        JMP GNEXT       GET NEXT CHAR AND RETURN
*
*  PROCESS A CHARACTER STRING
*
*     (A)=STRING TERMINATOR
*     (B)= CHARACTER POINTER: 1=START IN RIGHT HALF OF CURRENT WORD
*          0= START IN LEFT HALF OF NEXT WORD
*    EXIT:P+1 ON END OF LINE
*          P+2 ON TERMINATOR CHAR FOUND
*          (A)= NEXT CHARACTER
*          TEMP1= CHAR COUNT BIASED BY (B) ON ENTRY
*          SBPTR= NEXT WORD NOT IN STRING
*
07672 031475 CHRST  STA TEMP2       RECORD TERMINATOR CHARACTER
07673 035474 CHRS1  STB TEMP1       SAVE CHARACTER FLAG AND COUNTER
07674 061040        JSM GETCH-1     GET CHARACTER
07675 010031        CPA EOL
07676 067713        JMP CHRS3+1     EOL
07677 011475        CPA TEMP2       TERMINATOR?
07700 067712        JMP CHRS3       YES
07701 025474        LDB TEMP1
07702 074251        SLB CHRS2       SELECT WORD HALF
07703 141706        IOR SBPTR,I     RIGHT HALF, MERGE
07704 131706        STA SBPTR,I       WITH PREVIOUS CHAR
07705 077330        RIB CHRS1       ADVANCE COUNT
07706 067673        JMP CHRS1       JUMP ON 0 COUNT
07707 045706 CHRS2  ISZ SBPTR       LEFT HALF, ADVANCE POINTER
07710 070404        SAL 8           POSITION CHAR
07711 067704        JMP *-5
07712 060365 CHRS3  JSM RET2        SET TO RETURN TO P+2
07713 064456        JMP SBPUD       ADVANCE POINTER
*
*  NEXT STATEMENT SYNTAX
*
07714 160246 NEXTS  JSM VAROA,I     FETCH SIMPLE VARIABLE
07715 164322        JMP E25+2,I
07716 164322        JMP E25+2,I     NOT FOUND
07717 065151        JMP EOST
*
*  IF STATEMENT SYNTAX
*
07720 160202 IFS    JSM FSCA,I      GET DECISION FORMULA
07721 027726        LDB THENA       DEMAND "THEN"
07722 060546        JSM STEXP         AND STORE AS EXPANDED OPERATOR
07723 160206 SYNE7  JSM ERRA,I      NOT FOUND
07724 060664        JSM LNUM        DEMAND A SEQUENCE NUMBER
07725 065151        JMP EOST
07726 006750 THENA  DEF FOP13+FOP13
*
*  INITIALIZE THE TRIG UNITS
*
07727 024012 ERAD   LDB =1
07730 035434        STB UNITS
07731 164172        JMP XEC4A,I
07732 074742 EDEG   SBR 16
07733 067730        JMP ERAD+1
07734 024017 EGRAD  LDB =2
07735 067730        JMP ERAD+1
*
*  FLOAT AND FIXED SYSTEM COMMAND EXECUTION
*  (A)=0
*
07736 072051 FLT    SLA *+1,S       SET TO NON ZERO FOR FLOAT
07737 031451 FIXED  STA CTYPE       SET TO ZERO FOR FIXED
07740 061066        JSM GETSK       PARAMETER GIVEN?
07741 164174        JMP RDYDA,I     NO
07742 060750        JSM DIGCK       DIGIT?
07743 067740        JMP FIXED+1     NO, IGNOR IT
07744 055400        DSZ BADDR       YES, RESET POINTER
07745 024143        LDB M12
07746 061131        JSM PGIN0       GET DIGIT FIELD, ALLOW 0
07747 035452        STB CPLAC
07750 164174        JMP RDYDA,I
*
*  TRACE SYSTEM COMMAND EXECUTION
*
07751 024062 TRAC2  LDB FLGBT
07752 035441        STB IFLG1+1     SET -(MAXIMUM UPPER LIMIT)
07753 076330        RIB TRAC3       SET MAXIMUM (UPPER-LOWER LIMIT)
07754 071650 TRACE  SZA TRAC2       ANY PARAMETERS?
07755 060730        JSM GETAD       FIND ADDRESSES
07756 074076        TCB
```

#01 SYNTAX

```
*  NORMAL:  (B)=0; CLEAR TRACE FLAG
   07757 035441 NORML STB TFLG1+1    STORE -(UPPER LIMIT)
   07760 005477       ADB TEMP4
   07761 074076 TRAC3 TCB
   07762 035440       STB TFLG1      STORE ( UPPER LIMIT - LOWER LIMIT)
   07763 164174       JMP RDYDA,I
*
*
*  EXECUTE READ
*
   07764 160201 EREAD JSM FORMA,I    GET VARIABLE ADDRESS IN HSTPT
   07765 160256       JSM FDAAA,I    FIND DATA AND SAVE IN AR2
   07766 060412       JSM RSULT      STORE DATA
   07767 021421       LDA PRADD
   07770 011472       CPA TEMP5      MORE VARIABLES TO COME?
   07771 164172       JMP XEC4A,I    NO; RETURN
   07772 067764       JMP EREAD      YES; LOOP
```

#01 9830- PROGRAM EXECUTION

```
*
   10000              ORG 10000B
*
*  INITIALIZATION
*
   10000 020112 XEC   LDA RSTKA
   10001 031777       STA RSPTR      GUARANTEE EMPTY STACK
   10002 060653       JSM INITS+2    RESET STACK POINTERS
   10003 062162       JSM ESTAC      START NEW STACKS
   10004 031416       STA MODE       SET TO PROG (0)
   10005 021725 XEC3  LDA NXTST      GET STARTING STATEMENT NUMBER
   10006 061075       JSM FNDPS      FIND STARTING ADDRESS
   10007 066066       JMP EEND+1      BEYOND END OF PROG
   10010 066011       JMP *+1        BETWEEN LINES
   10011 035421 ERTN1 STB PRADD
*  PROCEED TO XEC4
*
*  EXECUTE NEXT PROGRAM STATEMENT
*
   10012 024062 XEC4  LDB FLGBT
   10013 021443       LDA KEYFG
   10014 050104       AND B177      MASK OFF SHIFT BIT
   10015 035443       STB KEYFG      RESET KEY FLAG
   10016 000145       ADA M14
   10017 072210       RZA *+4        TRACE KEY?
   10020 020066       LDA INF        YES, SET ALL TRACE
   10021 031440       STA TFLG1
   10022 066025       JMP XEC7
   10023 074742       SBR 16
   10024 010033       CPA B20        NORMAL KEY?
   10025 035441 XEC7  STB TFLG1+1    YES, CLEAR TRACE
   10026 025416       LDB MODE
   10027 074110       SZB *+2        KEYBOARD EXECUTION?
   10030 066070       JMP CALEX      YES, EXIT
   10031 025442       LDB STPFL
   10032 076150       RZB XEC5       SKIP IF STOP; STEP; OR ERROR
   10033 025421       LDB PRADD
   10034 015436       CPB HFLG1
   10035 066151 XEC5  JMP STOPF
   10036 015437       CPB HFLG1+1
   10037 066151       JMP STOPF      HALT IF ADDRESS = FLAG
   10040 015423 XEC6  CPB PBPTR      PAST END OF PROGRAM?
   10041 160206 MER11 JSM ERRA,I     YES, IMPROPER TERMINATION
   10042 005441       ADB TFLG1+1    ADD -(UPPER LIMIT)
   10043 074313       SBP XEC8       SKIP IF NOT IN TRACE LIMITS
   10044 005440       ADB TFLG1      ADD (UPPER LIMIT -(LOWER LIMIT))
   10045 074212       SBM XEC8
   10046 062136       JSM PLINE      OUTPUT LINE # TO BUFFER
   10047 061337       JSM NDWRT      PRINT ON PRINTER
   10050 061344       JSM CRLF1
   10051 060572 XEC8  JSM NEXTL-2    FIND OP-CODE AND PAGE
   10052 004135 XEC9  ADB M4      GET JUMP TABLE STARTING ADDRESS
   10053 005466       ADB LUCL1      ADD IN -(OP CODE)
   10054 074437       ADB B,I        ADD RELATIVE JUMP ADDRESS
   10055 074737       JMP B,I        JUMP TO STATEMENT EXECUTION
*
*  EXECUTE LET OR IMPLIED LET STATEMENT
*
   10056 026063 ELET  LDB DISPA      GET JUMP ADDRESS FOR DISP EXEC
   10057 021416       LDA MODE       GET CALC/PROG FLAG
   10060 073610       RZA ELET-2     SKIP IF CALC MODE
   10061 062563       JSM FORMX      PROG-  EVALUATE FORMULA
   10062 066012       JMP XEC4
   10063 013747 DISPA DEF DISP
*
*********************************
*
```

*01 9830- PROGRAM EXECUTION

```
       10064 000000        BSS 1          CHECKSUM WORD
*
**********************************
*
*
*  END EXECUTION
*
       10065 061225 EEND   JSM LDEF
       10066 060653        JSM INITS+2    RESET POINTERS AND STACKS
       10067 066106        JMP ESTOP
*
*  EXIT FOR CALC MODE
*
       10070 021421 CALEX  LDA PRADD
       10071 071652        SAM EEND+1     SKIP IF DECOMPILED
       10072 000020        ADA .3
       10073 031412        STA LSTPT      RESET STACK POINTER
       10074 060567        JSM UNSTK
       10075 060566        JSM UNSTK-1    RESTORE PROGRAM POINTER
       10076 031411        STA TSTPT      RESTORE T-STACK POINTER
       10077 060567        JSM UNSTK
       10100 031410        STA LSTAK      RESTORE
       10101 060567        JSM UNSTK
       10102 031412        STA LSTPT        L-STACK POINTERS
       10103 121413        LDA HSTPT,I
       10104 045413        ISZ HSTPT
       10105 071713        SAP *-2
       10106        ESTOP  EQU *
       10106 160264 CALX2  JSM CRCKA,I    YES, PROVIDE CR-LF IF NEEDED
       10107 070742        SAR 16
       10110 031430        STA LNINC      GET OUT OF AUTO
       10111 164173        JMP PEXMA,I
*
*  INITIALIZATION FOR KEYBOARD EXECUTION
*
       10112 025412 ECAL   LDB LSTPT
       10113 035472        STB TEMPS      SAVE ORIGINAL STACK POINTER
       10114 020233        LDA SHUFA
       10115 011706 ECAL1  CPA SHPTR      TRANSFER SYNTAX
       10116 066122        JMP ECAL2        BUFFER INTO
       10117 070537        LDB A,I            STACK AREA
       10120 060563        JSM SLWST
       10121 073630        RIA ECAL1
       10122 025472 ECAL2  LDB TEMPS
       10123 060563        JSM SLWST      STACK OLD LSTPT
       10124 021412        LDA LSTPT      GET NEW END OF LINE POINTER
       10125 025410        LDB LSTAK
       10126 060563        JSM SLWST      STACK LSTPT
       10127 025411        LDB TSTPT
       10130 060563        JSM SLWST      STACK TSTPT
       10131 060562        JSM SLWST-1    STACK OLD PRADD
       10132 031421        STA PRADD      SET PRADD TO END OF BUFFER
       10133 062162        JSM ESTAC      SET UP NEW STACKS
       10134 060602        JSM NEXT1-4    GET PAGE AND OP CODE
       10135 066052        JMP XEC9
*
*  PRINT CURRENT LINE NUMBER FOR TRACE AND STOP
*
       10136 160264 PLINF  JSM CRCKA,I    GIVE CRLF IF PRINT
       10137 160170        JSM CLFRA,I    CLEAR BUFFER
       10140 025421        LDB PRADD
       10141 015423        CPB PHPTR      PAST END OF PROG?
       10142 066146        JMP *+4        YES, DONT PRINT LINE #
       10143 125421        LDB PRADD,I
       10144 074073        SBP *+1,C
       10145 160210        JSM OUTIA,I    OUTPUT CURRENT LINE #
       10146 020053        LDA COLON
       10147 061016        JSM UNEXT      OUTPUT A :
       10150 064373        JMP ICNT       COMPUTE CHAR COUNT
*
*  STOP EXECUTION
*
       10151 074412 STOPE  SHM STP1       SKIP IF ERROR MESSAGE
       10152 062136        JSM PLINF      OUTPUT LINE # AND COMPUTE COUNT
       10153 031466        STA LOCL1      SAVE COUNT
       10154 021450        LDA PMODE
       10155 072210        RZA STP1       PRINT IF PRINT-ALL
       10156 035701        STB NDISP
       10157 061332        JSM .NPWR+2
       10160 061344        JSM CRLF1
       10161 066106 STP1   JMP ESTOP      RETURN TO MONITOR
*
*
*  INITIALIZE STACKS FOR EXECUTION
*
       10162 025412 ESTAC  LDB LSTPT      START AT OLD LSTPT
       10163 004134        ADB M3
       10164 035411        STB TSTPT      OFFSET T-STACK POINTER BY 4
       10165 004033        ADB .16
```

```
10166 035410        STB LSTAK     ALLOW 12 WORDS FOR T-STACK
10167 035412        STB LSTPT
10170 060553        JSM BHSTP
10171 074742        SBR 16
10172 135410        STB LSTAK,I
10173 035432        STB UROST
10174 024132        LDB M1
10175 135413        STB HSTPT,I
10176 164170        JMP CLERA,I   INITIALIZE THE PRINT BUFFER
*
*  EXECUTE  IF STATEMENT
*
10177 061217 EIF    JSM FETCH     EVALUATE FORMULA AND RETURN RESULT
10200 021755        LDA AR2+1     GET FIRST WORD OF MANTISSA
10201 070250        SZA EGOS4     SKIP IF FALSE
10202 062217 EGOS1  JSM EADD      GET ADDRESS
10203 025416        LDB MODE
10204 076150        RZB EGOS4+1   SKIP IF KEYBOARD MODE
10205 031421        STA PRADD     STORE IN PROGRAM POINTER
10206 066012 EGOS4  JMP XEC4
10207 025421        LDB PRADD
10210 004020        ADB .3        GET ADDRESS OF OLD PRADD
10211 035466        STB LOCL1
10212 125466        LDB LOCL1,I   GET OLD PRADD
10213 074113        SEP *+2
10214 072053        SAP *+1,S     SAVE DECOMPILE FLAG
10215 131466        STA LOCL1,I
10216 066012        JMP XEC4
*
*  SUBROUTINE TO GET ADDRESS
*
10217 045472 EADD   ISZ TEMPS
10220 121472        LDA TEMPS,I   GET LINE # OR ADDRESS
10221 070372        SAM EADD1,C    ADDRESS FORMAT?
10222 061075        JSM FNDPS     NO, GET ADDRESS
10223 066224        JMP *+1
10224 160206 NGOTO  JSM ERRA,I    NOT FOUND
10225 074117        LDA B         MOVE ADDRESS TO (A)
10226 076053        SEP *+1,S
10227 135472        STB TEMPS,I   STORE COMPILED FORMAT
10230 170402 EADD1  RET           ADDRESS IN (A)
*
*  EXECUTE RETURN
*
10231 160206 ER3    JSM ERRA,I   INCORRECT RETURN STATEMENT
10232 125412 ERTRN  LDB LSTPT,I   GET TOP OF RETURN STACK
10233 055412        DSZ LSTPT
10234 075650        SZB ER3       SKIP IF NO RETURN
10235 021472        LDA TEMPS
10236 070070        SIA *+1
10237 011421        CPA PRADD     RETURN A FORMULA?
10240 066243        JMP *+3       NO
10241 075413        SBP ER3       YES, FUNCTION RETURN ALLOWED?
10242 067106        JMP RETNN     YES, EXECUTE
10243 060771        JSM GTOPP     GET NEXT OPERAND
10244 073650        RZA *-3       RETURN AND SINGLE VARIABLE?
10245 075212        SBM ER3       NO, GOSUB RETURN ALLOWED?
10246 066011        JMP ERTN1     YES, SET RETURN ADDRESS
*
*      FOR STATEMENT
*
10247 011767 NOPCD OCT 11767   ENCODED OP CODE FOR "NEXT"
*
10250 060771 EFOR   JSM GTOPP     GET FOR-VARIABLE
10251 160177        JSM SSYMA,I       FIND IT IN SYMBOL TABLE
10252 160252        JSM ENTEA,I    NOT FOUND - ENTER IT
10253 035474        STB TEMP1     SAVE ABS ADDRESS ALSO
10254 021407        LDA SYMTP
10255 070076        TCA
10256 072037        ADB A         COMPUTE REALTIVE ADDRESS
10257 020141        LDA M10       MOVE HSTPT TO LOWER
10260 001413        ADA HSTPT     ADDRESS TO ACCOMODATE
10261 031413        STA HSTPT     THE NEW FOR VAR.
10262 031476        STA TEMP3     SAVE IT FOR MVTOH IF NEEDED.
10263 135413        STB HSTPT,I   SAVE RELATIVE SYMBOL TABLE POINTER
*
10264 060554        JSM BHSTP+1   OVERLAY?
*
10265 000061 EFOR2  ADA .10
10266 070537        LDB A,I      LOAD THE REALTIVE SYMBOL TABLE POINTER
10267 074512        SBM EFOR1     IF MINUS MEANS BOOTTOM OF HIGH STACK
10270 031475        STA TEMP2     SAVE THIS ADDRESS FOR MVTOH IF NEEDED
10271 115413        CPB HSTPT,I   IS THIS F.V. THE SAME ?
10272 066274        JMP *+2       YES - GO DELETE IT
10273 066265        JMP EFOR2     NO - LOOP BACK FOR NEXT ONE
*
10274 000061        ADA .10       SET UP LAST WORD OF DESTINATION
10275 031477        STA TEMP4
10276 061121        JSM MVTOH     DELETE IT AND MOVE REST TO HIGHER MEMORY
```

```
#01  9830- PROGRAM EXECUTION

10277 025477        LDB TEMP4
10300 035413        STB HSTPT      RESET HSTPT
*
10301 160201 EFORI  JSM FORMA.I
*
10302 061371        JSM FIX        GET (A) AND (B) FIXED UP
10303 060416        JSM STORE        STORE AR2 IN INITIAL VALUE TABLE
*
10304 061217        JSM FETCH      GET ENDING LIMIT
10305 025413        LDB HSTPT     TRANSFER END LIMIT
10306 074070        SIB *+1        TO HSTPT+1 THUR +4
10307 060406        JSM XFAR1+1
*
10310 020020        LDA UNE
10311 060445        JSM XFAR2+1    SET AR2=1
10312 021472        LDA TEMP5        IS THERE A STEP SIZE?
10313 011421        CPA PRADD
10314 066316        JMP *+2        NO, LEAVE 1 IN AR2
10315 061217        JSM FETCH      YES - GET IT
10316 025413        LDB HSTPT      TRANSFER STEP
10317 004022        ADB .5         SIZE
10320 060406        JSM XFAR1+1       TO HSTPT+4
*
10321 004021        ADB .4        STORE NEXT
10322 021421        LDA PRADD            EXECUTABLE
10323 074557        STA B,I            LINE ADDRESS IN HSTPT+9
*
*  FIND THE CORRESPONDING NEXT STATEMENT (TEMP5 AND PRADD
*  WILL BE UP-DATED ACCORDINGLY). THEN CHECK IF THE "FOR"
*  LIMITS ARE CORRECT FOR LOOPING. IF NOT - ERASE FOR INFORMATION
*  AND JMP TO XEC4 TO CONTINUE AFTER THE "NEXT" STATEMENT.
*  IF THE "FOR" LOOP WAS VALID, LOAD HSTPT+9(THE ADDRESS FOLLOWING
*  THE "FOR" STATEMENT) AND EXCUTE FROM THERE(XEC4+1).
*
*
10324 022247        LDA NUPCD       LOAD SERACH CODE
10325 062413        JSM SYTSH       FIND A NEXT STATEMENT
10326 074373        SBP BERR,C      B IS NEGATIVE IF FOUND
10327 062405        JSM TEST        GO CHECK IF SAME VARIABLE
10330 075613        SBP *-4        LOOP BACK UNLESS FOUND
*
10331 061371        JSM FIX       GET A AND B REG FIXED FOR
10332 063444        JSM UPCH1        FOR CONVERTING INT, SPLIT, OR FULL TO FULL
10333 035475        STB TEMP2
10334 066361        JMP FTEST        CHECK IF LOOP IS VALID
*
10335 160206 BERR  JSM ERRA,I     NO CORRESPONDING "NEXT" OR INCORRECT NESTING
*
*    NEXT STATEMENT
*
*
10336 125413 ENEXT LDB HSTPT,I      RECOVER SYMBOL TABLE ADDRESS
10337 075712        SBM BERR       ERROR BOTTOM OF STACK
10340 005407        ADB SYMTP
10341 035474        STB TEMP1      COMPUTE ABS ADDRESS OF VARIABLE
10342 062405        JSM TEST
10343 074252        SBM *+5        IF B IS -, GET OUT OF LOOP
10344 020061        LDA .10        IF + THE VARIABLE WASN'T FOUND
10345 001413        ADA HSTPT      SO DINC THE HSTPT
10346 031413        STA HSTPT      AND LOOP BACK
10347 066336        JMP ENEXT
*
*  TEMP1 IS POINTING AT SYMBOL IN SYMBLAOL TABLE
*  HSTPT+1 = ENDING LIMIT
*  HSTPT+5 = STEP SIZE
*
*
10350 061371        JSM FIX       FIX A AND B FOR
10351 063444        JSM UPCH1     CONVERT INT OR SPLIT TO FULL
10352 021413        LDA HSTPT      ON RETURN (B) IS POINTING AT NUMBER
10353 000022        ADA .5         LOAD (A) WITH STEP SIZE ADDRESS
10354 160216        JSM .FADA,I   *
*
10355 063454        JSM UPC1         SAVE AR2 AT 1470B
10356 035475        STB TEMP2     SAVE 1470B IN TEMP2
*
10357 061371        JSM FIX     FIX (A) AND (B)  FOR .XFR
10360 060416        JSM STORE       STORE ANSWER BACK IN VALUE TABLE
*
10361 025413 FTEST LDB HSTPT
10362 074070        SIB *+1          (B) = ADDRESS OF END LIMIT
10363 021413        LDA HSTPT         GET SIGN
10364 000022        ADA .5               OF STEP
10365 070517        LDA A,I                SIZE
10366 070151        SLA *+3
10367 021475        LDA TEMP2     STEP SIZE IS -, F.V.-END LIMIT = AR2
10370 066373        JMP *+3
10371 074117        LDA B        STEP SIZE IS +, END LIMIT-F.V. = AR2
10372 025475        LDB TEMP2
10373 160217        JSM .FSBA,I
*
```

```
       #01  9830- PROGRAM EXECUTION

10374 021413        LDA HSTPT     (A) IS POINTING AT NEXT
10375 000026        ADA .9        EXECUTABLE LINE ADDRESS
10376 025754        LDB AR2       TEST AR2 FOR + RESULT
10377 074211        SLB *+4
*
10400 070070        SIA *+1      AR2 WAS NEGATIVE, ERASE
10401 031413        STA HSTPT     "FOR" LOOP IMFORMATION
10402 066012        JMP XEC4        AND EXECUTE LINE AFTER "NEXT"
*
10403 070537        LDB A,I       AR2 WAS POSITIVE OR 0,
10404 066011        JMP ERTNI     EXECUTE STMT AFTER "FOR"
*
*    SUBROUTINES FOR "FOR" AND "NEXT" STATEMENTS.
*
10405 061371 TEST   JSM FIX        RETURN WITH TYPE CODE OF F.V.
10406 141472        IOR TEMPS,I    IN A.  IOR IN THE F.V. AND PAGE
10407 050115        AND B1777      REMOVE PAGE.
10410 111474        CPA TEMP1,I    DO THE VARIABLES AGREE?
10411 076053        SBP *+1,S     THEY WERE THE SAME, FLAG B
10412 170402        RET            DID NOT AGREE B IS +.
*
*    CALLING SEQUENCE FOR SYTSH
*
*      LDA OP CODE     (PAGE-OP CODE)
*      JSM SYTSH     (TEMPS IS POINTING AT LINE #.)
* ON RETURN
*         (B) = -, OP CODE FOUND  PRADD IS POINTING AT NEXT LINE #.
*                                   TEMPS IS POINTING AT PRADD+2
*            (B) =+    ERROR RETURN = OP CODE NOT FOUND
*
10413 031475 SYTSH STA TEMP2      SAVE SEARCH CODE
10414 025421        LDB PRADD
10415 015423        CPB PRPTR      CHECK IF END OF PROGRAM
10416 170402        RET            YES - RETURN WITH (B) +.
10417 035472        STB TEMPS      NO - SET TEMPS = PRADD
10420 060577        JSM NEXTL+3    LOOK AT THE NEXT STATEMENT.
10421 001466        ADA LOCL1      ENCODE PAGE AND OP CODE
10422 011475        CPA TEMP2      WAS IT = TO TEMP2(SEARCH CODE)?
10423 077553        SBP *-5,S      YES, RETURN WITH (B) NEGATIVE
10424 066414        JMP SYTSH+1    NO - LOOP BACK.

       #01  FORMULA EVALUATION ROUTINES

*
*
* FIND THE NEXT DATA ITEM AND MOVE IT TO AR2
*   NXTDT MUST BE POINTING AT THE NEXT DATA ITEM OR
*   EQUAL TO DSTRT.  IF EQUAL TO DSTRT FDATA WILL SEARCH
*   FOR THE NEXT DATA STATEMENT.
*
10425 062437 FDATA JSM SWITH     SAVE TEMPS, TEMPS = NXTDT
10426 021421        LDA PRADD
10427 031642        STA SAVE
10430 025472        LDB TEMPS
10431 015414        CPB DSTRT     IF NXTDT(TEMPS) AND DSTRT ARE =:
10432 066445        JMP .FDA1     GO FIND NEXT DATA STATEMENT
10433 160232        JSM SNFLA,I   OR CONVERT SYNTAX TO FULL
10434 045472        ISZ TEMPS
10435 021642        LDA SAVE
10436 031421        STA PRADD
10437 021472 SWITH LDA TEMPS
10440 025415        LDB NXTDT
10441 031415        STA NXTDT
10442 035472        STB TEMPS
10443 170402        RET
*
10444 160206 ER60  JSM ERRA,I     OUT OF DATA
10445 035421 .FDA1 STB PRADD
10446 022454        LDA DATCD     LOAD "DATA" STATEMENT SEARCH CODE
10447 062413        JSM SYTSH     FIND NEXT DATA STATEMENT
10450 075613        SBP ER60      IF (B) WAS +, NO MORE DATA FOUND
10451 025421        LDB PRADD
10452 035414        STB DSTRT
10453 066430        JMP FDATA+3  DATA WAS FOUND GO CHECK IF ANY DATA WITH IT
*
10454 011761 DATCD OCT 11761
*
* EXCUTE INPUT   *
*
10455 021622 FINPT LDA TERM
10456 072110        RZA *+2
10457 160170        JSM CLERA,I
10460 021472        LDA TEMPS
10461 000133        ADA M2
10462 031641        STA SPRDD      SAVE START OF INPUT STATEMENT
10463 021641        LDA SPRDD      SET PRADD TO START OF
10464 031421        STA PRADD        INPUT STATEMENT
10465 020262        LDA INREA      SET UP RETURN
10466 031432        STA DRQST      SET DATA REQUEST FLAG
10467 164173 INRET JMP PEXMA,I   CALL FOR DATA
10470 055400        DSZ BADDR
```

*01 FORMULA EVALUATION ROUTINES

```
10471 025641          LDB SPRDD
10472 061007          JSM NEXTA      SET PRADD BACK TO END
10473 035421          STB PRADD        OF INPUT STATEMENT
10474 021472          LDA TEMPS
10475 031640          STA TEPPP      SAVE START OF VARIABLE
10476 160201 .EINI JSM FORMA,I       GET THE ADDRESS OF THE VARIABLE IN HSTPT
10477 024017          LDB =2
10500 035706          STB SBPTR      AIM SBPTR AT ROM
10501 026532          LDB INCHA
10502 035432          STB UROST      SET FLAG IN CASE OF ERROR
10503 061156          JSM CONST      BUILD A NUMBER IN AR2
10504 066520          JMP INCHT-1    NO NUMBER FOUND, RESTORE H-STACK
10505 070742          SAR 16
10506 031432          STA UROST      CLEAR FLAG
10507 060412          JSM RSULT      SAVE AR2 AT HSTPT,I
10510 025472          LDB TEMPS
10511 015421          CPB PRADD      END OF STATEMENT?
10512 066530          JMP CXEC4      YES
10513 035640          STB TEPPP      RESET THE TEMPORARY POINTER
10514 055400          DSZ BADDR      NO - DINC BADDR TO LOOK AT THE LAST CHAR IN BUFF.
10515 061066          JSM GETSK      GET LAST CHAR.
10516 066526          JMP INCHI
10517 066476          JMP .EINI      P+2 RETURN - OTHER CHAR'S
*
10520 160170          JSM CLERA,I
10521 021640 INCHT LDA TEPPP
10522 031472          STA TEMPS      RESTORE VARIABLE POINTER
10523 045413          ISZ HSTPT
10524 045413          ISZ HSTPT
10525 066463          JMP INRET-4
*
10526 160170 INCHI JSM CLERA,I
10527 066463          JMP INRET-4
*
10530 160170 CXEC4 JSM CLERA,I
10531 066012          JMP XEC4
*
10532 010521 INCHA DEF INCHT
*
*  EXECUTE RESTORE STATEMENT
*
10533 125472 ERSTR LDB TEMPS,I
10534 021424          LDA PBUFF
10535 074113          SBP *+2        LINE GIVEN?
10536 062217          JSM EADD       YES, GET ADDRESS
10537 031415          STA NXTDT      SET UP DATA POINTERS
10540 031414          STA DSTRT
10541 066012          JMP XEC4
*
*  EVALUATE ARGUEMENT OF FUNCTION
*
10542 024032 EVARG LDB B17       INITIALIZE OPERATOR STACK
10543 066564          JMP FORMX+1      FOR FUNCTION
*
*  EVALUATE A FORMULA
*
*
*  STACK A CONSTANT
10544 050040 FORM6 AND B37
10545 010040          CPA B37        PRE-DEFINED FUNCTION?
10546 066664          JMP FORM7      YES
10547 055413          DSZ HSTPT      BUMP STACK POINTER
10550 063406          JSM RSCHK      ALLOT SPACE ON T-STACK
10551 160232          JSM SNFLA,I    CONVERT TO FLOATING
10552 045472 FORST ISZ TEMPS
10553 074742          SHR 16
10554 135413          STB HSTPT,I    STORE FULL PRECISION TYPE
10555 060553          JSM BHSTP
10556 025411          LDB TSTPT
10557 135413          STB HSTPT,I    STORE ADDRESS OF T-STACK
10560 020214          LDA AR2A
10561 170004          XFR            TRANSFER RESULT TO T-STACK
10562 066616 FOR2L JMP FORM2
*
*
10563 074742 FORMX SHR 16         INITIALIZE
10564 060563          JSM SLWST        OPERATOR STACK
*  PROCESS NEXT OPERAND
10565 121472 FORM1 LDA TEMPS,I    FETCH OPERAND
10566 050070          AND OPDMK
10567 070113          SAP *+2
10570 066544          JMP FORM6      CONSTANT OR FUNCTION
10571 045472          ISZ TEMPS      SET FOR NEXT WORD OF FORMULA
10572 071410          SZA FOR2L      SKIP IF NULL OPERAND
10573 055413          DSZ HSTPT      BUMP POINTER
10574 025420          LDB PARMN      GET PARAMETER NAME
10575 074504          SBL 6
10576 074242          SBR 6          MASK OFF PRECISION
10577 074057          CPA B          IS THIS OPERAND THE PARAMETER
10600 067116          JMP FPARM      YES
```

#01 FORMULA EVALUATION ROUTINES

```
*    STACK NON-FUNCTION VARIABLE OPERAND ADDRESS
10601 160177       JSM SSYMA,I   SEARCH FOR VARIABLE IN SYMTAB
10602 160252       JSM ENTEA,I   NOT FOUND, ENTER IT
10603 074517       LDA B,I
10604 050040       AND B37       FETCH TYPE
10605 004132       ADB M1
10606 035750       STB YC        SAVE ADDRESS-ADDRESS
10607 125750       LDB YC,I      READ ADDRESS
10610 010040       CPA B37
10611 066725       JMP FORM8     IT WAS A USER DEFINED FUNCTION!
10612 131413 FORMP STA HSTPT,I   SAVE TYPE ON H-STACK
10613 074117       LDA B         GET ADDRESS OF OPERAND
10614 060553       JSM BHSTP     BUMP POINTER
10615 131413       STA HSTPT,I   STORE ADDRESS ON OPERAND STACK
*    PROCESS NEXT OPERATOR
10616 021472 FORM2 LDA TEMPS     END OF
10617 011421       CPA PRADD       STATEMENT?
10620 066631       JMP FORM3     YES, FORCE END OF FORMULA
10621 121472       LDA TEMPS,I   EXTRACT
10622 070073       SAP *+1,C
10623 070442       SAR 10            NEXT
10624 070137       LDB A               OPERATOR
10625 000135       ADA M4        OP CODE LESS THAN 4?
10626 070152       SAM FORM3     IF YES, NON FORMULA OPERATOR
10627 000147       ADA M23       NO, GREATER THAN B32?
10630 070112       SAM *+2       NON-FORMULA OPERATOR?
10631 024012 FORM3 LDB .1        YES, USE CODE FOR QUOTE
10632 035460       STB FTMP1     SAVE CURRENT OP-CODE
10633 004123       ADB FOPRS     ADD OP CODE TO TABLE ADDRESS
10634 074517       LDA B,I       GET AND MASK
10635 050040       AND B37         PRECEDENCE
10636 031461       STA FTMP2     SAVE PRECEDENCE OF CURRENT OP
*    STACK PRESENT OR EXECUTE PREVIOUS OPERATOR
10637 121412 FORM4 LDA LSTPT,I   DOES OPERATOR ON
10640 050040       AND B37         TOP OF OPERATOR
10641 070056       CMA               STACK HAVE
10642 001461       ADA FTMP2           HIGHER
10643 070412       SAM FORM5             PRECEDENCE?
10644 025461 FORM9 LDB FTMP2     NO, STACK CURRENT OPERATOR
10645 014033       CPB B20       LEFT PAREN OR BRACKET?
10646 024012       LDB .1        YES, STACK PRECEDENCE OF 1
10647 021460       LDA FTMP1     COMBINE
10650 070304       SAL 10          PRECEDENCE
10651 070037       ADB A             WITH OP-CODE
10652 066564       JMP FORM1-1     AND STACK IT
10653 121412 FORM5 LDA LSTPT,I
10654 055412       DSZ LSTPT
10655 070442       SAR 10        COMPUTE JUMP ADDRESS
10656 003135       ADA ARBAS       FOR OPERATOR
*    AT THIS POINT (HSTPT,I)= ADDRESS OF THE TOP OPERAND
*       (HSTPT+1,I)= THE TYPE OF THE TOP OPERAND
10657 070737       JMP A,I       BRANCH TO ROUTINE
*
*    EVALUATE NON-ARGUEMENT FUNCTION
10660 055413 FOR72 DSZ HSTPT
10661 060553       JSM BHSTP     PLACE DUMMY ON STACK
10662 045472       ISZ TEMPS     POINT TO NEXT OPERATOR
10663 066707       JMP FOR71
*    EVALUATE PRE-DEFINED FUNCTION
10664 025777 FORM7 LDB RSPTR
10665 004132       ADB M1        TAKE RETURN ADDRESS OF
10666 074537       LDB B,I         FORMX OFF STACK AND
10667 055777       DSZ RSPTR
10670 060563       JSM SLWST         SAVE ON LOW STACK
10671 125472       LDB TEMPS,I   GET OP CODE
10672 074544       SBL 5
10673 060604       JSM NEXT1-2   CONFIGURE OP CODE AND GET PAGE
10674 004134       ADB M3
10675 074437       ADB B,I       GET TABLE STARTING ADDRESS
10676 005466       ADB LOCL1     ADD -(OP CODE)
10677 074437       ADB B,I       GET ACTUAL JUMP ADDRESS
10700 060563       JSM SLWST     STACK JUMP ADDRESS
10701 021466       LDA LOCL1
10702 000036       ADA .23
10703 070113       SAP *+2       ARGUEMENT REQUIRED?
10704 066660       JMP FOR72     NO
10705 062542       JSM EVARG     EVALUATE ARGUEMENT
10706 063433       JSM OPCHK     VERIFY RESULT
10707 063405 FOR71 JSM RSCHK-1   ALLOT SPACE ON T-STACK
10710 125412       LDB LSTPT,I
10711 055412       DSZ LSTPT     REMOVE ADDRESS FROM STACK
10712 074717       JSM B,I       BRANCH TO ROUTINE
*    RECORD RESULT OF FUNCTION
*
*    FUNCTIONS RETURN HERE WITH RESULT IN AR2
10713 045413 FOR10 ISZ HSTPT     POP ARGUEMENT BUT LEAVE STACK BUMPED 1
10714 121412       LDA LSTPT,I   UNSTACK RETURN ADDRESS
10715 055412       DSZ LSTPT
10716 025777       LDB RSPTR     GET RETURN ADDRESS
```

#01 FORMULA EVALUATION ROUTINES

```
10717 045777        ISZ RSPTR
10720 070173        SAP *+3,C      MORE ADDRESSES TO COME?
10721 074557        STA B,I        YES
10722 066714        JMP FOR10+1    GET NEXT RETURN ADDRESS
10723 074557        STA B,I        NO
10724 066553        JMP FORST+1
*  EVALUATE PROGRAMMER DEFINED FUNCTION
10725 076110 FORMB  RZB *+2        ADDRESS =0?
10726 160222        JSM ENTFA,I    YES, FIND FUNCTION
10727 074742        SBR 16         FLAG FIRST RETURN, SIGN=0
10730 021777 FMX80  LDA RSPTR
10731 000132        ADA M1
10732 074437        ADB A,I       COMBINE RETURN ADDRESS WITH FLAG
10733 055777        DSZ RSPTR
10734 060563        JSM SLWST      STACK ON L-STACK
10735 021777        LDA RSPTR
10736 010112        CPA RSTKA      ALL OF STACK MOVED?
10737 066742        JMP *+3        YES
10740 024062        LDB FLGBT
10741 066730        JMP FMX80
10742 020132        LDA M1
10743 131413        STA HSTPT,I    FLAG STACK FOR "FOR" LOOPS
10744 025411        LDB TSTPT
10745 060563        JSM SLWST      SAVE T-STACK POINTER
10746 125750        LDB TC,I
10747 060563        JSM SLWST      SAVE FUNCTION ADDRESS
10750 062542        JSM EVARG      EVALUATE ARGUEMENT
10751 021472        LDA TEMPS      SWITCH FORMULA
10752 125412        LDB LSTPT,I      POINTER TO FUNCTION FORMULA
10753 035472        STB TEMPS
10754 131412        STA LSTPT,I
10755 023100        LDA DSTRA      MOVE LSTPT UP 9 WORDS
10756 024026        LDB .9          AND TRANSFER DSTRT
10757 063122        JSM MOVST          THROUGH PBUFF
10760 170004        XFR                  TO L-STACK
10761 121413        LDA HSTPT,I    GET PARAMETER ADDRESS
10762 031417        STA PARMA
10763 011411        CPA TSTPT      IS PARAMETER ON T-STACK?
10764 063406        JSM RSCHK       YES, PROTECT IT
10765 025423        LDB PHPTR
10766 074076        TCB
10767 005472        ADB TEMPS
10770 074313        SBP FMX82      SKIP IF OUTSIDE PRESENT PROGRAM
10771 025424        LDB PBUFF
10772 074076        TCB
10773 005472        ADB TEMPS
10774 074112        SBM FMX82      SKIP IF OUTSIDE PRESENT PROGRAM
10775 067016        JMP FMX81
10776 061225 FMX82  JSM LDFF       INSURE NOT IN KEY MODE
10777 024166        LDB FWAM       FIND PROGRAM CONTAINING FUNCTION
11000 015405 FMX84  CPB FWUP       END OF KEYS?
11001 067013        JMP FMX83      YES, MUST BE MAINLINE
11002 074070        SIB *+1        POINT TO LENGTH WORD
11003 035474        STB TEMP1      SAVE START
11004 074437        ADB B,I        COMPUTE END
11005 074117        LDA B
11006 070076        TCA
11007 001472        ADA TEMPS
11010 071413        SAP FMX84      FUNCTION IN THIS KEY?
11011 025474        LDB TEMP1      YES
11012 160263        JSM SUMPA,I    YES, SET UP PROGRAM POINTERS
11013 025424 FMX83  LDB PBUFF      RESET DATA STMT POINTERS
11014 035414        STB DSTRT
11015 035415        STB NXTDT
11016 070742 FMX81  SAR 16
11017 031416        STA MODE       SET TO PROGRAM MODE
11020 025472        LDB TEMPS
11021 061007        JSM NEXTA
11022 035421        STB PRADD      SET POINTER TO END OF LINE
11023 045413        ISZ HSTPT
11024 125413        LDB HSTPT,I
11025 074244        SBL 11         GET PRECISION OF PARAMETER
11026 045413        ISZ HSTPT      DINK PARAMETER OFF STACK
11027 021472        LDA TEMPS
11030 000020        ADA .3
11031 070517        LDA A,I        FETCH PARAMETER NAME
11032 050115        AND B1777
11033 074217        IOR B          MERGE WITH PRECISION
11034 031420        STA PARMN
11035 025472        LDB TEMPS
11036 004022        ADB .5        POINT PAST PARAMETER
11037 015421        CPB PRADD      MULTI-LINE FUNCTION?
11040 067102        JMP EVMLF      YES
11041 035472        STB TEMPS      NO
*
11042 062563 FMX9   JSM FORMX      EVALUATE FUNCTION FORMULA
11043 121412        LDA LSTPT,I    FETCH OLD PBUFF
11044 027076        LDB PBUFA
11045 035477        STB TEMP4      INITIALIZE TRANSFER POINTER
11046 025412        LDB LSTPT
```

#01 FORMULA EVALUATION ROUTINES

```
11047 074070       SIB *+1
11050 035475       STB TEMP2
11051 004141       ADB M10
11052 035412       STB LSTPT    RESET STACK POINTER
11053 074070       SIB *+1
11054 011424       CPA PBUFF    WAS A KEY ENTERED?
11055 004017       ADB .2       NO, DONT RESTORE DATA POINTERS
11056 035476       STB TEMP3
11057 061121       JSM MVTOH    RESTORE PROGRAM POINTERS
11060 121412       LDA LSTPT,I
11061 055412       DSZ LSTPT
11062 031472       STA TEMPS    RESTORE PROGRAM POINTER
11063 121412       LDA LSTPT,I
11064 055412       DSZ LSTPT
11065 031411       STA TSTPT    RESTORE T-STACK POINTER
11066 063404       JSM STTOP    GET ADDRESS OF RESULT
11067 024214       LDB AR2A
11070 170004       XFR          TRANSFER
11071 121413       LDA HSTPT,I  REMOVE ANY UNTERMINATED
11072 010132       CPA M1       "FOR" INFORMATION
11073 066714       JMP FOR10+1
11074 045413       ISZ HSTPT
11075 067071       JMP *-4
11076 001425 PBUFA DEF PBUFF+1
11077 177771 M7    DEC -7
11100 001414 DSTRA DEF DSTRT
11101 001640 STADD DEF ST
*
*EVALUATE MULTI-LINE FUNCTION
11102 023101 EVMLF LDA STADD    TRANSFER FIRST 7 WORDS
11103 024025       LDB .8         OF EXECUTION TEMPRORARY AREA
11104 063122       JSM MOVST        TO L-STACK
11105 066012       JMP XEC4
*
11106 021412 RETNN LDA LSTPT
11107 003077       ADA M7       RESTORE EXECUTION
11110 031412       STA LSTPT
11111 072070       SIA *+1
11112 027101       LDB STADD      TEMPRORARIES
11113 170004       XFR
11114 170004       XFR
11115 067042       JMP FMX9
*
* SET UP ADDRESS AND TYPE FOR PARAMETER
11116 021420 FPARM LDA PARMN    PRECISION IS STORED IN
11117 070502       SAR 11         UPPER BITS
11120 025417       LDB PARMA
11121 066612       JMP FORMP
*
* TRANSFER WORDS TO LOW STACK
* (A)= TRANSFER STARTING ADDRESS
* (B)= # OF WORDS
*
11122 035467 MOVST STB LOCL2    SAVE COUNT
11123 025412       LDB LSTPT    SAVE OLD LSTPT
11124 035466       STB LOCL1
11125 005467       ADB LOCL2    ADD COUNT TO POINTER
11126 035412       STB LSTPT
11127 060554       JSM BHSTP+1  CHECK FOR OVERFLOW
11130 135412       STB LSTPT,I  STACK NEGATIVE FLAG FOR "RETURN" STMT
11131 025466       LDB LOCL1
11132 074070       SIB *+1
11133 170004       XFR          TRANSFER 4 WORDS
11134 064446       JMP XFAR2+2  TRANSFER 3 MORE AND RETURN
*
* FORMULA OPERATOR JUMP TABLE
*
11135 111136 ARBAS DEF *+1,I
11136 011432       DEF FORMR    EXECUTE END OF FORMULA
*
* THE FOLLOWING 3 TABLE WORDS ARE NOT USED
*
* QUOTE, COMMA, AND SEMI-COLON ARE END OF FORMULA OPERATORS
*
* CALL SUBTRACT
*
11137 063376 EFSB  JSM BINOP
11140 160217       JSM .FSBA,I
11141 067260       JMP FOR14
*
11142 011432       DEF FORMR    ')'
11143 011432       DEF FORMR    ']'
11144 011202       DEF ESCMA    SUBSCRIPT COMMA
11145 011171       DEF ESTR     ASSIGNMENT EQUAL
11146 000000    NOP   ************CHECKSUM WORD *************
11147 011256       DEF EFAD
11150 011137       DEF EFSB
11151 011272       DEF EFMP
11152 011275       DEF EFDV
11153 011300       DEF EPWR
```

#01 FORMULA EVALUATION ROUTINES

```
11154 011333         DEF EGTRT
11155 011336         DEF ELST
11156 011352         DEF ENEQL
11157 011344         DEF EEQL      LOGICAL EQUAL
11160 011303         DEF EUMIN     UNARY MINUS
11161 010637         DEF FORM4     UNARY PLUS
11162 011317         DEF ELBRC     '['
11163 010565         DEF FORM1     '('
11164 011357         DEF EOR
11165 011366         DEF EAND
11166 011716         DEF ENOT
11167 011341         DEF EGORE
11170 011347         DEF ELORE     '<='
*
* EXECUTE ASSIGNMENT EQUAL
*
11171 025461 ESTR   LDB FTMP2     IS NEXT OPERATOR AN
11172 074150        SZB *+3         END OF FORMULA?
11173 045412        ISZ LSTPT     NO, MULTIPLE STORE--RESTORE
11174 066644        JMP FORM9       STORE OPERATOR AND DEFER STORE
11175 055460        DSZ FTMP1     FIRST STORE EXECUTED?
11176 067200        JMP ESTR1     NO SOURCE IS ALREADY IN AR2
11177 061220        JSM FETCH+1   POP STACK AND MOVE SOURCE TO AR2
11200 060412 ESTR1  JSM RSULT     POP DESTINATION AND STORE
11201 066637        JMP FORM4
*
* EXECUTE SUBSCRIPT COMMA
*
11202 061220 ESCMA  JSM FETCH+1   CHECK COLUMN SUBSCRIPT
11203 160225        JSM FLTRA,I   ROUND TO INTEGER
11204 067240        JMP ER6       OVERFLOW
11205 004132        ADB M1        ADD OFFSET
11206 075712        SBM *-2       UNDERFLOW?
11207 135412        STB LSTPT,I   SAVE COLUMN SUBSCRIPT
11210 061220        JSM FETCH+1   CHECK ROW SUBSCRIPT
11211 160225        JSM FLTRA,I   ROUND TO INTEGER
11212 067240        JMP ER6
11213 004132        ADB M1
11214 075712        SBM *-2
11215 035471        STB L2T2    SAVE ROW SUBSCRIPT
11216 125413        LDB HSTPT,I     GET ACTUAL BOUNDS
11217 004132        ADB M1
11220 074517        LDA B,I
11221 050105        AND B377        EXTRACT COLUMN BOUND
11222 070070        SIA *+1
11223 031470        STA L2T1        SAVE IT
11224 074537        LDB B,I       EXTRACT ROW BOUND
11225 074342        SBR 8
11226 074070        SIB *+1
11227 074076        TCB
11230 005471        ADB L2T2
11231 074353        SBP ER6       ROW SUBSCRIPT LEGAL?
11232 025471        LDB L2T2      YES, RECALL ROW SUBSCRIPT
11233 061201        JSM IMPY      COMPUTE ROW DISPLACEMENT
11234 025470        LDB L2T1
11235 074076        TCB
11236 105412        ADB LSTPT,I     COLUMN SUBSCRIPT LEGAL?
11237 074112        SBM *+2
11240 160206 ER6    JSM ERRA,I    NO,ERROR
11241 101412        ADA LSTPT,I     YES, ADD IN COLUMN DISPLACEMENT
11242 025413        LDB HSTPT       FIND TYPE OF ARRAY
11243 074070        SIB *+1
11244 074537        LDB B,I
11245 074042        SBR 2         FIND # OF WORDS PER ELEMENT
11246 076110        RZB *+2       FULL PRECISION?
11247 070704        SAL 2         YES, MULTIPLY BY 4
11250 014012        CPB =1         SPLIT?
11251 070744        SAL 1         YES, MULTIPLY BY 2
11252 101413        ADA HSTPT,I
11253 131413        STA HSTPT,I   STORE ACTUAL ADDRESS OF ELEMENT
11254 055412        DSZ LSTPT       UNSTACK (
11255 066565        JMP FORM1
*
* CALL ADD
*
11256 063376 EFAD   JSM BINOP
11257 160216        JSM .FADA,I
* PROCEED TO FOR14
*
* OPERATORS CREATING INTERMEDIATE RESULTS RETURN HERE
*   WITH RESULT IN AR2
*
11260 020214 FOR14  LDA AR2A
11261 025411        LDB TSTPT     TRANSFER TO T-STACK
11262 170004        XFR
11263 021413        LDA HSTPT
11264 070070        SIA *+1       POINT TO PRECISION WORD
11265 074742        SBR 16
11266 070577        STB A,I       STORE FULL PRECISION
11267 025411        LDB TSTPT
```

```
11270 135413       STB HSTPT,I   STORE ADDRESS OF T-STACK
11271 066637       JMP FORM4
*
* CALL MULTIPLY
*
11272 063376 EFMP  JSM BINOP
11273 160220       JSM .FMPA,I
11274 067260       JMP FOR14
*
* CALL DIVIDE
*
11275 063376 EFDV  JSM BINOP
11276 160221       JSM .FDVA,I
11277 067260       JMP FOR14
*
* CALL EXPONENTIAL ARROW
*
11300 063376 EPWR  JSM BINOP
11301 160224       JSM UPARA,I
11302 067260       JMP FOR14
*
* CALL UNARY MINUS
*
11303 063404 EUMIN JSM STTOP      FETCH TOP ELEMENT OF STACK
11304 025411       LDB TSTPT
11305 170004       XFR            TRANSFER TO T-STACK
11306 000133       ADA M2
11307 070517       LDA A,I     READ FIRST WORD OF MANTISSA
11310 070250       SZA *+5        SKIP IF ZERO
11311 121411       LDA TSTPT,I
11312 072111       SLA *+2,S   REVERSE THE SIGN
11313 070071       SLA *+1,C
11314 131411       STA TSTPT,I
11315 067263       JMP FOR14+3
*
* EXECUTE LEFT BRACKET
*
11316 014002 SCCNT OCT 14002
*
11317 045412 ELBRC ISZ LSTPT      STACK A
11320 027316       LDB SCCNT        SUBSCRIPT COMMA
11321 060563       JSM SLWST          ON OPERATOR STACK
11322 063406       JSM RSCHK      STACK A 1 ON
11323 055413       DSZ HSTPT      OPERATOR
11324 060553       JSM HHSTP
11325 020020 TRUE  LDA ONE
11326 067261       JMP FOR14+1     STACK A 1 ON T-STACK
*
* COMPARE TOP OPERANDS OF STACK
*
11327 063376 COMPR JSM BINOP        GET OPERAND ADDRESSES
11330 160217       JSM .FSBA,I     SUBTRACT ONE FROM ANOTHER
11331 020214       LDA AR2A       POINT TO RESULT IN AR2
11332 065317       JMP SGNS     GET SGN IN (B)
*
* EXECUTE >
*
11333 063327 EGTRT JSM COMPR        COMPARE OPERANDS
11334 074753       SBP ENEQL+1    <?
11335 067354       JMP FALSE        YES
*
* EXECUTE <
*
11336 063327 ELST  JSM COMPR        COMPARE OPERANDS
11337 074056       CMB              REVERSE COMPARISON SENSE
11340 067342       JMP *+2
*
* EXECUTE >=
*
11341 063327 EGORE JSM COMPR        COMPARE OPERANDS
11342 075153       SBP TRUE       <?
11343 067354       JMP FALSE        YES
*
* EXECUTE =
*
11344 063327 EEQL  JSM COMPR        COMPARE OPERANDS
11345 075010       SZB TRUE       =?
11346 067354       JMP FALSE        NO
*
* EXECUTE <=
*
11347 063327 ELORE JSM COMPR        COMPARE OPERANDS
11350 075653       SBP EEQL+1     >=?
11351 067325 LTRUE JMP TRUE       NO
*
* EXECUTE # OR <>
*
11352 063327 ENEQL JSM COMPR        COMPARE OPERANDS
11353 077710       RZB LTRUE      #?
11354 021411 FALSE LDA TSTPT      CLEAR T-STACK ENTRY
11355 170000       CLR
```

#01 FORMULA EVALUATION ROUTINES

```
      11356 067263         JMP FOR14+3
*
* EXECUTE "OR"
*
      11357 063376 EOR     JSM BINOP
      11360 070070         SIA *+1
      11361 070517         LDA A,I         LOOK AT FIRST OPERAND
      11362 073350         RZA LTRUE     IF NON-ZERO, RESULT IS TRUE
      11363 074070 EOR2    SIB *+1         LOOK AT SECOND OPERAND
      11364 074537         LDB B,I
      11365 067353         JMP ENEQL+1
*
* EXECUTE "AND"
*
      11366 063376 EAND    JSM BINOP
      11367 070070         SIA *+1
      11370 070517         LDA A,I         LOOK AT FIRST OPERAND
      11371 071150         SZA FALSE     ZERO?
      11372 067363         JMP EOR2        NO

*
* PREPARE TO EXECUTE A BINARY OPERATOR
*
      11373 024057 BINO1   LDB .1000
      11374 060406         JSM XFAR1+1   TRANSFER TO SECOND TEMP(YC)
      11375 067401         JMP BINO2
      11376 063433 BINOP   JSM OPCHK
      11377 014111         CPB B1740     CONVERSION TEMPORARY?
      11400 067373         JMP BINO1     YES
      11401 035726 BINO2   STB MBIN1     SAVE ADDRESS IN TEMPORARY
      11402 045413         ISZ HSTPT       MOVE HIGH STACK POINTER
      11403 045413         ISZ HSTPT        TO DELETE OPERAND
*  PROCEED TO STTOP
*
*  FETCH TOP OF STACK
*
      11404 063433 STTOP   JSM OPCHK
      11405 035471         STB L2T2      SAVE SECOND ADDRESS
*  PROCEED TO RSCHK
*
* ALLOT SPACE FOR INTERMEDIATE RESULT
*
      11406 021411 RSCHK   LDA TSTPT       MOVE TEMPORARY POINTER
      11407 000021         ADA .4
      11410 031411         STA TSTPT
      11411 011410         CPA LSTAK     OVERFLOW INTO LOW STACK?
      11412 067414         JMP *+2       YES
      11413 067430         JMP RSCH2     NO
      11414 031476         STA TEMP3
      11415 000025         ADA .8
      11416 031410         STA LSTAK
      11417 021412         LDA LSTPT
      11420 070070         SIA *+1
      11421 031475         STA TEMP2
      11422 000024         ADA .7
      11423 031412 RSCH1   STA LSTPT
      11424 070070         SIA *+1
      11425 031477         STA TEMP4
      11426 060554         JSM BHSTP+1     TEST FOR OVERLAP WITH HIGH STACK
      11427 061121         JSM MVTOH     MOVE LOW STACK UP
      11430 021471 RSCH2   LDA L2T2      RECALL SECOND ADDRESS
      11431 025726         LDB MBIN1     RECALL FIRST ADDRESS
      11432 170402 FORMR   RET
*
* VERIFY LEGITIMACY OF OPERAND
*
      11433 125413 OPCHK   LDB HSTPT,I     GET OPERAND ADDRESS
      11434 015411         CPB TSTPT       IS IT TEMPORARY?
      11435 067460         JMP OPC3        YES
      11436 074517         LDA B,I         NO, GET EXPONENT WORD
      11437 010062         CPA FLGBT       IS OPERAND DEFINED?
      11440 160206 ER8     JSM ERRA,I    YES,ERROR
      11441 021413         LDA HSTPT       YES, GET TYPE
      11442 070070         SIA *+1
      11443 070517         LDA A,I
      11444 050037 OPCH1   AND .28       GET PRECISION BITS
      11445 071250         SZA FORMR     FULL PRECISION?
      11446 010021         CPA .4        NO, SPLIT?
      11447 067456         JMP OPC2      YES
      11450 070206         RAR 5
      11451 071052         SAM FORMR     NUMBERED VARIABLE?
      11452 074537         LDB B,I         NO, IT MUST BE INTEGER
      11453 160227         JSM FXFLA,I   RESULT IS IN AR2 NOW
      11454 024111 OPC1    LDB B1740
      11455 064406         JMP XFAR1+1   TRANSFER TO XC REGISTER
      11456 160231 OPC2    JSM SPLFA,I   CONVERT SPLIT TO FULL PRECISION
```

#01 FORMULA EVALUATION ROUTINES

```
11457 067454           JMP OPC1
11460 021411 OPC3      LDA TSTPT        DELETE TEMPORARY
11461 000135           ADA M4
11462 031411           STA TSTPT
11463 170402           RET
*  11464 IS LAST
*  MATH ROUTINES HERE
```

#01 FUNCTION TABLES

```
11707                  ORG 11707B
*
*  FUNCTION SYNTAX AND EXECUTION JUMP TABLE
*
11707 000002           ABS EPI-*
11710 000003           ABS ERES-*
11711 023715 EPI       LDA PIA
11712 064445           JMP XFAR2+1
11713 020215 ERES      LDA TMPOP
11714 064445           JMP XFAR2+1
11715 003764 PIA       DEF 3764B
*
*  EXECUTE "NOT"
*
11716 063404 ENOT      JSM STTOP
11717 070070           SIA *+1
11720 070537           LDB A,I
11721 067345           JMP EEQL+1
*
11722 000000           BSS 13           FUNCTION JUMP TABLE
11737 175125           ABS TABER-*      TAB
*
*  FUNCTION NAME TABLE
*
11740 042530 FTN13     ASC 1,EX
11741 050202           OCT 050202       EXP!OP CODE 2
11742 046117           ASC 1,LO
11743 043603           OCT 43603        LOG! OP CODE 3
11744 040502           ASC 1,AB
11745 051604           OCT 051604       ABS!OP CODE 4
11746 051521           ASC 1,SQ
11747 051205           OCT 051205       SQR!OP CODE 5
11750 044516           ASC 1,IN
11751 052206           OCT 052206       INT!OP CODE 6
11752 051507           ASC 1,SG
11753 047207           OCT 47207        SGN! 7
11754 051511           ASC 1,SI
11755 047210           OCT 047210       SIN! 10
11756 041517           ASC 1,CO
11757 051611           OCT 051611       COS! 11
11760 052101           ASC 1,TA
11761 047212           OCT 047212       TAN! 12
11762 040524           ASC 1,AT
11763 047213           OCT 047213       ATN! 13
11764 046107           ASC 1,LG
11765 052214           OCT 52214        LGT!14
11766 040523           ASC 1,AS
11767 047215           OCT 47215        ASN! 15
11770 040503           ASC 1,AC
11771 051616           OCT 51616        ACS! 16
11772 051105           ASC 1,RE
11773 051630           OCT 51630        RES! 30 (NO ARGUEMENT)
11774 050111           ASC 1,PI
11775 154524 TAB       OCT 154524       PI! 31 (NO ARGUEMENT)
11776 040502           OCT 40502
11777 140777           OCT 140777       TAB! 1
```

#01 FORMULA OPERATOR TABLE

```
12000                  ORG 12000B
12000 006774 STEPA     DEF FOPST+FOPST
*
*  FORMULA OPERATOR SEARCH AND PRECEDENCE TABEL
*  LEFT CHAR IS ASCII! RIGHT CHAR IS PRECEDENCE
*
12001 021000 QUOT      OCT 21000        OP CODE 1
12002 026000 COMMA     OCT 26000        2
12003 035400 SMCLN     OCT 35400        3
12004 024400 RPARN     OCT 24400        4
12005 056400 RBRAC     OCT 56400        5
12006 026002 SCMMA     OCT 26002        6
12007 036402 ASSOP     OCT 36402        7
12010 177377 M257      DEC -257         THIS IS NOT USED AS TABLE ENTRY
12011 025407 PLUSS     OCT 25407        11
12012 026407 MINS      OCT 26407        12
12013 025010 TIMES     OCT 25010        13
12014 027410 DIV       OCT 27410        14
12015 057013 EXPS      OCT 57013        15
12016 037005 GTR       OCT 37005        16
```

```
12017 036005 LSS    OCT 36005      17
12020 021405 UNEQL  OCT 21405      20
12021 036405 EQUAL  OCT 36405      21
12022 026412 UNMIN  OCT 26412      22
12023 025412 UPLUS  OCT 25412      23
12024 055420 LBRAC  OCT 55420      24
12025 024020 LPARN  OCT 24020      25
12026 000003 OROP   OCT 00003      26
12027 000004 ANDOP  OCT 00004      27
12030 000012 NOTOP  OCT 00012      30
12031 000005 GTREQ  OCT 00005      31
12032 000005 LSSEQ  OCT 00005      32
*
12033 000000        BSS 1              *******CHECKSUM*****
              LST
12034 007001 TOA    DEF FOPST+FOPST+5
12035 007004 ORA    DEF OR+OR
12036 007013 NOTA   DEF OR+OR+7
12037 007017 GTEA   DEF GTE+GTE+1
*
* CHECK SYNTAX OF A FORMULA
*
*    EXIT TO ERROR ON UNRECOGNISABLE OR INCORRECT INPUT
*    ON EXIT (A)= NEXT CHARACTER NOT IN FORMULA
*            (B)= 0
*    IF FIRST OPERAND  IS A STRING VARIABLE, EXIT TO ERROR
*      UNLESS STRING IS ENABLED BY SFLAG=SBPTR, THEN EXIT (B)=SFLAG=-1
*
*    MSFLG=8: LOOKING FOR "=" IN LET OR FOR STATEMENT
*    MSFLG=9: INTERPRET "=" AS A LOGICAL OPERATOR
*    IF A STORE IS FOUND, SFLAG=-2
*
12040 020012 FSC    LDA .1         SET LEFT PARENTHESIS
12041 131472        STA TEMPS,I      COUNT TO 0 (OFFSET BY 1)
12042 020132 FSC1   LDA M1         ENABLE UNARY
12043 031713        STA UFLAG        OPERATORS
* LOOK FOR AN OPERAND
12044 062231 FSC2   JSM VAROP      LOOK FOR VARIABLE OPERAND
12045 066114        JMP FSC7       FIRST CHAR NOT A LETTER
12046 066164        JMP FSC13-3    SUBSCRIPTED OR STRING VARIABLE
12047 060752        JSM LETCK      SIMPLE VARIABLE: FOLLOWED BY LETTER?
12050 066167        JMP FSC13      NO
* DOES "AND" OR "OR" FOLLOW SIMPLE VARIABLE?
12051 062217        JSM MCBCK      CHECK FOR "AND"OR"OR"ONLY:(B)#-1
* CHECK FOR FUNCTION INSTEAD OF SIMPLE VARIABLE
12052 062424        JSM FNCK       "FN"?
12053 066061        JMP FSC4       NO
12054 055400        DSZ BADDR      YES
12055 000154        ADA M64        GET FUNCTION NAME
12056 074742        SBR 16
12057 135706        STB SBPTR,I    CLEAR OUT NEXT WORD
12060 066074        JMP FSC3-1
12061 070342 FSC4   SAR 8          RECALL LAST CHAR
12062 055400        DSZ BADDR      BACK UP TO POINT AT SECOND CHAR
12063 024133        LDB M2         SEARCH ALL TABLES FOR
12064 160237        JSM SALTA,I      A PREDEFINED FUNCTION
12065 066143        JMP FSC11      NOT FOUND
12066 135706        STB SBPTR,I    STORE TABLE CODE
12067 070137        LDB A
12070 004147        ADB M23
12071 074076        TCB
12072 035474        STB TEMP1      SET NEGATIVE IF NO ARGUEMENT
12073 040116        IOR GTOP       SET FLAG FOR PRE-DEF FUNCTION
12074 070544        SAL 5          POSITION OP CODE
* ASSEMBLE AND STORE FUNCTION
12075 040040 FSC3   IOR B37        SET OPERAND TYPE FOR FUNCTION
12076 070137        LDB A
12077 055706        DSZ SBPTR      REPLACE
12100 060641        JSM RESBP+1      PREVIOUS OPERAND
12101 074217        IOR B              WITH FUNCTION
12102 131706        STA SBPTR,I
12103 045706        ISZ SBPTR
12104 021474        LDA TEMP1      RECALL ARGUEMENT FLAG
12105 070253        SAP FSC31       NORMAL ARITHMETIC ARGUEMENT?
12106 161473        JSM TEMP,I     NO, JUMP THROUGH SYNTAX/EXEC TABLE
12107 045706        ISZ SBPTR      RETURN HERE IF NO ARGUEMENT
12110 061055        JSM GNEXT
12111 066130        JMP FSC8       NO, CHECK FOR EOL NEXT
12112 031713 FSC31  STA UFLAG      DISABLE UNARY OPERATORS
12113 066140        JMP FSC10
* CHECK FOR LEFT PARENTHESIS
12114 045706 FSC7   ISZ SBPTR
12115 060513        JSM LPCK       CHECK FOR PAREN
12116 066123        JMP *+5        NOT FOUND
12117 145472 FSC5   ISZ TEMPS,I
12120 024026 FSC6   LDB .9         DISABLE ASSIGNMENT
12121 035710        STB MSFLG
12122 066042        JMP FSC1
```

```
*  CHECK FOR A NUMBER
   12123 074742        SBR 16          INITIALIZE
   12124 035721        STB SIGN          TO POSITIVE
   12125 160243        JSM NUMCA,I     FETCH AND BUILD CONSTANT
   12126 066133        JMP FSC9        NOT FOUND
   12127 160244        JSM NUMOA,I     STORE IN SYNTAX BUFFER
   12130 024026 FSC8   LDB .9
   12131 035710        STB MSFLG       DISABLE ASSIGNMENT
   12132 066167        JMP FSC13
*  CHECK FOR A UNARY OPERATOR
   12133 045713 FSC9  ISZ UFLAG       UNARY OPERATORS PERMITTED?
   12134 160206 FSCE3 JSM ERRA,I      NO, UNRECOGNISED OPERNAD
   12135 060461        JSM SYMC2       UNARY MINUS
   12136 012021        DEF UNMIN-1       OR UNARY PLUS?
   12137 066134        JMP FSCE3       NO
   12140 024026 FSC10 LDB .9
   12141 035710        STB MSFLG       DISABLE ASSIGNMENT
   12142 066044        JMP FSC2
*  CHECK FOR "NOT" RATHER THAN SIMPLE VARIABLE
   12143 045713 FSC11 ISZ UFLAG       "NOT" PERMITTED?
   12144 066212        JMP FSC14-1     NO
   12145 026036        LDB NOTA
   12146 060537        JSM STSRH       SEARCH FOR "NOT"
   12147 066212        JMP FSC14-1     NOT FOUND
   12150 055706        DSZ SBPTR       ERASE
   12151 060641        JSM RESBP+1       SPURIOUS
   12152 045706        ISZ SBPTR           OPERAND
   12153 066140        JMP FSC10
*
*  CHECK FOR RIGHT PARENTHESIS
*
   12154 060524 FSC12 JSM RPCK        RIGHT PAREN?
   12155 066213        JMP FSC14       NO
   12156 155472        DSZ TEMPS,I
   12157 066167        JMP FSC13       ((A)=NEXT CHAR)
   12160 055706        DSZ SBPTR       NO MATCHING LEFT PAREN
   12161 055400        DSZ BADDR       RESTORE
   12162 020046        LDA .41           PREVIOUS CONDITIONS
   12163 066215        JMP FSC14+2         AND RETURN
*  CHECK FOR A BINARY OPERATOR
   12164 024132        LDB M1          STRING VARIABLE
   12165 015714        CPB SFLAG         JUST FOUND?
   12166 170402        RET             YES
   12167 010031 FSC13 CPA EOL         END OF STMT?
   12170 066213        JMP FSC14       YES
   12171 031713        STA UFLAG       DISABLE UNARY OPERATORS
   12172 031474        STA TEMP1       SAVE CHAR
   12173 024132        LDB M1
   12174 062217        JSM MCBCK       CHECK FOR AND, OR, >=,<=,<>
   12175 025710        LDB MSFLG
   12176 060464        JSM SYMCK       SEARCH FOR
   12177 012010        DEF PLUSS-1       SINGLE CHAR OPERATOR
   12200 066204        JMP *+4         NOT FOUND
   12201 010124        CPA EXPOP       EXPONENTIATION?
   12202 066140        JMP FSC10       YES
   12203 066122        JMP FSC6        NO
   12204 060463        JSM SYMC1       NO, "=" ASSIGNMENT?
   12205 012006        DEF ASSOP-1
   12206 066154        JMP FSC12       NO
   12207 020133        LDA M2          YES, SET
   12210 031714        STA SFLAG         STORE OCCURRED FLAG
   12211 066042        JMP FSC1
*  END OF FORMULA
   12212 061055        JSM GNEXT       RECALL CHAR
   12213 155472 FSC14 DSZ TEMPS,I     ALL PARENS MATCHED?
   12214 064535        JMP FSCE2       MISSING RIGHT PAREN
   12215 074742        SBR 16
   12216 170402        RET             RETURN WITH (B)=0
*
*  CHECK FOR A MULTI-CHARACTER BINARY OPERATOR
*
*    (B)=-1: CHECK >=,<=,<> AS WELL AS AND,OR
*    EXIT TO FSC6 IF FOUND
*
   12217 135706 MCBCK STB SBPTR,I     SAVE FLAG
   12220 026035        LDB ORA         SEARCH FOR "AND" OR "OR"
   12221 060537        JSM STSRH
   12222 066225        JMP *+3         NOT FOUND
   12223 055777        DSZ RSPTR       DINC STACK POINTER
   12224 066120        JMP FSC6        RETURN
   12225 145706        ISZ SBPTR,I     CHECK REST OR OPERATORS?
   12226 170402        RET             NO
   12227 026037        LDB GTEA        CHECK FOR >=,<=,<>
   12230 066221        JMP MCBCK+2
*
*  SEEK A VARIABLE OPERAND
*          P+1: FIRST CHAR NOT A LETTER
*          P+2: ARRAY OR STRING VARIABLE FOUND
*          P+3: SIMPLE VARIABLE
*
```

#01 SYNTAX SUBROUTINES

```
*     (A)= NEXT CHAR FOLLOWING OPERAND
*     IF STRING IS FOUND AND SFLAG=SBPTR THEN SET SFLAG=-1
*          IF SFLAG#SBPTR THEN STRING IS NOT PERMITTED! ERROR
*
12231 061140 VAROP JSM LTR        LETTER?
12232 170402       RET             NO. RETURN TO P+1
12233 074742       SBR 16          INITIALIZE FOR
12234 035717       STB OPTYP         FULL PRECISION
12235 010077       CPA B44         IS NEXT CHAR "$"?
12236 066275       JMP VAR04       YES
12237 060750       JSM DIGCK       DIGIT?
12240 066250       JMP VAR01       NO
12241 070137       LDB A           YES. RESTORE ASCII
12242 021474       LDA TEMP1       RECALL LETTER
12243 035474       STB TEMP1       SAVE DIGIT
12244 060450       JSM STROP       COMBINE AND STORE OPERAND
12245 061055       JSM GNEXT
12246 031475       STA TEMP2       SAVE IT
12247 064356       JMP RETN3
12250 074742 VAR01 SBR 16
12251 010073       CPA S
12252 024021       LDB .4          OPTYP=4 FOR SPLIT PRECISION
12253 010055       CPA I
12254 024025       LDB .8          OPTYP=8 FOR INTEGER
12255 074350       SZB VAR06       SKIP IF FULL PRECISION
12256 055711       DSZ DFLAG       DIM OR COM?
12257 066261       JMP *+2         NO. SPLIT OR INTEGER INT ALLOWED
12260 035717       STB OPTYP       YES. STORE OPERAND TYPE
12261 045711       ISZ DFLAG       DIM OR COM?
12262 061055       JSM GNEXT       YES GET CHAR FOLLOWING PRECISION
12263 031475       STA TEMP2       STORE CHAR
12264 010045 VAR06 CPA .40         "("
12265 066275       JMP VAR04       YES
12266 010102       CPA B133        "["?
12267 066275       JMP VAR04       YES
12270 021474       LDA TEMP1       RECALL LETTER
12271 025717       LDB OPTYP
12272 060451       JSM STROP+1     COMBINE AND STORE SIMPLE VARIABLE
12273 021475 VAR03 LDA TEMP2       NO. RECALL NEXT CHAR
12274 064356       JMP RETN3       RETURN TO P+3
12275 062436 VAR04 JSM STRID       STORE STRING OR ARRAY OPERAND
12276 062301       JSM SBSCK       GET SUBSCRIPT
12277 074742       SBR 16          NO SUBSCRIPT. SET B=0
12300 064357       JMP RETN2
*
*  SUBSCRIPT SYNTAX
*
*     ARYAD POINTS TO ARRAY OPERAND
*     EXIT TO P+1 IF FIRST CHAR ISNOT "(" OR "[" OTHERWISE P+2
*     DFLAG=1 IF ANALYSING DIM OR COM STMT! 0 OTHERWISE
*     SFLAG=-1 FOR STRING OPERAND
*
*     ARRAY OPERANDS ARE MARKED AS ONE OR TWO DIMENITIONAL
*     MEMORY REQUIREMENT IS COMPUTED FOR COM STMT
*
12301 060513 SBSCK JSM LPCK        FIRST CHAR A "(" OR "["?
12302 170402       RET             NO
12303 020125       LDA LBOP        YES. RECORD
12304 131706       STA SBPTR,I       A LEFT BRACKET
12305 155723       DSZ ARYAD,I     SET ARRAY
12306 155723       DSZ ARYAD,I       TO / DIMENSION
12307 021711       LDA DFLAG       DIM OR COM?
12310 072110       RZA *+2
12311 066363       JMP SBSC3
12312 024157       LDB M256        ALLOW 255
12313 045714       ISZ SFLAG       STRING?
12314 004132       ADB M1          NO. ALLOW UP TO 256
12315 060666       JSM PGINT       GET AN INTEGER
12316 004132       ADB M1          OFFSET BY -1
12317 074404       SBL 8
12320 035474       STB TEMP1       SAVE DIMENSION
12321 025714       LDB SFLAG
12322 074450       SZB SBSC1       SKIP IF STRING
12323 060463       JSM SYMC1       LOOK FOR A COMMA
12324 012005       DEF SCMMA-1       A COMMA
12325 066333       JMP SBSC1       NOT FOUND
12326 145723       ISZ ARYAD,I     SET TO 2 DIMENSIONS
12327 026010       LDB M257        GET SECOND
12330 060666       JSM PGINT       DIMENSION
12331 004132       ADB M1          OFFSET BY -1
12332 066334       JMP SBSC1+1
12333 074742 SBSC1 SBR 16          SECOND DIM=1 OFFSET BY -1
12334 005474       ADB TEMP1       COMBINE DIMENSIONS
12335 035714       STB SFLAG       SAVE PACKED DIMENSIONS
12336 060534 SBSC2 JSM RPCKF       DEMAND ")" OR "]"
12337 024123       LDB RBOP        STORE
12340 055706       DSZ SBPTR
12341 135706       STB SBPTR,I       A RIGIT BRACKET
```

#01 SYNTAX SUBROUTINES

```
12342 045706        ISZ SBPTR
12343 025711        LDB UFLAG     DIM OR COM?
12344 076710        RZB SBSCP
*  RESTORE LOCAL QUANTITIES FOR FSC
12345 045472        ISZ TEMPS
12346 024112        LDB RSTKA     RESET
12347 035777        STB RSPTR       STACK POINTER
12350 066353        JMP FPOP1
12351 135777 FPOP2  STB RSPTR,I    STORE ON RETURN STACK
12352 045777        ISZ RSPTR
12353 125472 FPOP1  LDB TEMPS,I   GET WORD FROM S-STACK
12354 045472        ISZ TEMPS
12355 075633        SHP FPOP2,C   IF NEGATIVE; IT MUST BE MSFLG
12356 035710        STB MSFLG     RESTORE MSFLG
12357 125472        LDB TEMPS,I
12360 045472        ISZ TEMPS
12361 035713        STB UFLAG     RESTORE UFLAG
12362 064357 SBSCR  JMP RETN2     RETURN TO P+2
*  SAVE LOCAL QUANTITIES FOR FSC
12363 021713 SBSC3  LDA UFLAG
12364 062416        JSM DINCT     SAVE UFLAG ON THE S-STACK
12365 021710        LDA MSFLG
12366 072053        SAP *+1,S     SET FLAG
12367 062416        JSM DINCT     SAVE MSFLG
12370 055777 FRCU1  DSZ RSPTR
12371 121777        LDA RSPTR,I   GET RETURN ADDRESS
12372 062416        JSM DINCT     SAVE IT
12373 021777        LDA RSPTR
12374 010112        CPA RSTKA     ALL OF STACK MOVED?
12375 066377        JMP *+2       YES
12376 066370        JMP FRCU1
12377 021723        LDA ARYAD
12400 062416        JSM DINCT     SAVE ARRAY ADDRESS
12401 062416        JSM DINCT     DINK AGAIN AND CHECK OVERFLOW
12402 020026        LDA .9        DISABLE STORE MODE
12403 031710        STA MSFLG
12404 062040        JSM FSC       GET INDEX FORMULA
12405 045472        ISZ TEMPS     RESTORE
12406 125472        LDB TEMPS,I     ARRAY
12407 035723        STB ARYAD         ADDRESS
12410 060463        JSM SYMC1
12411 012005        DEF SCMMA-1   COMMA?
12412 066336        JMP SBSC2     NO
12413 145723        ISZ ARYAD,I   SET TO 2 DIMENSIONS
12414 062040        JSM FSC       GET SECOND INDEX FORMULA
12415 066336        JMP SBSC2
*
*  DECREMENT TEMPS AND CHECK FOR OVERFLOW
*
12416 055472 DINCT  DSZ TEMPS
12417 025472        LDB TEMPS
12420 015412        CPB LSTPT     OVERFLOW?
12421 064561        JMP FSCE4     YES
12422 131472        STA TEMPS,I   NO, SAVE (A) ON STACK
12423 170402        RET
*
*  CHECK FOR "FN" FOLLOWED BY A LETTER
*    EXIT P+1: NOT FOUND
*         P+2: FOUND, (A)=LETTER
*
12424 025474 FNCK   LDB TEMP1
12425 074404        SBL 8
12426 074217        IOR B
12427 010162        CPA FN        "FN"?
12430 066432        JMP *+2       YES
12431 170402        RET
12432 061140        JSM LTR       NEXT CHAR A LETTER?
12433 160206 SYNE4  JSM ERRA,I    NO
12434 021474        LDA TEMP1     YES, RECALL LETTER
12435 064357        JMP RETN2
*
*  RECORD A STRING OR ARRAY IDENTIFIER
*
12436 025706 STRID  LDB SBPTR     SET POINTER TO
12437 035723        STB ARYAD       ARRAY OR STRING OPERAND
12440 010077        CPA B44       NEXT CHAR "$"?
12441 066450        JMP STRI1     YES
12442 021474        LDA TEMP1     GET OPERAND LETTER
12443 025717        LDB OPTYP     SET THE TYPE TO FULL,SPLIT,OR INTEGER
12444 004020        ADB .3          WITH UNKNOWN DIMENSIONS
12445 060451        JSM STROP+1   COMBINE AND STORE
12446 021475        LDA TEMP2     RECALL FOLLOWING CHAR
12447 170402        RET
12450 015714 STRI1  CPB SFLAG     STRING VARIABLE ALLOWED?
12451 066453        JMP *+2       YES
12452 160206 STRNP  JSM ERRA,I      NO
12453 020132        LDA M1        SET FLAG
12454 031714        STA SFLAG       TO "STRING OCCURRED"
12455 021474        LDA TEMP1
12456 024076        LDB B36
12457 035723        STB ARYAD     POINT ADDRESS AT ROM
12460 060451        JSM STROP+1   STORE STRING OPERAND
12461 065055        JMP GNEXT     GET NEXT CHAR AND RETURN
```

```
*01  SYNTAX

*
*  FOR STATEMENT SYNTAX
*
 12462 062231 FORS   JSM VAROP      SEEK A SIMPLE VARIABLE
 12463 066464        JMP SYNE8
 12464 160206 SYNE8  JSM ERRA,I     NOT FOUND
 12465 060463        JSM SYMCI      SEEK "="
 12466 012006        DEF ASSOP-1
 12467 066522        JMP SYNE6      NOT FOUND
 12470 062040        JSM FSC        GET REST OF INITIAL FORMULA
 12471 026034        LDB TOA        SEEK "TO"
 12472 060537        JSM STSRH
 12473 160206 SYNE9  JSM ERRA,I     NOT FOUND
 12474 062040        JSM FSC        GET ENDING FORMULA
 12475 061153        JSM EOLCK      EOL?
 12476 026000 FORS1  LDB STEPA      SEEK "STEP"
 12477 060537        JSM STSRH
 12500 160236 SYE10  JSM ERRA,I     NOT FOUND
*
*  WAIT STATEMENT SYNTAX
*
 12501 062040 WAITS  JSM FSC        GET FORMULA
 12502 065151        JMP EOST       DEMAND END OF STMT
*
*  DEF STATEMENT SYNTAX
*
 12503 061140 DEFS   JSM LTR
 12504 066433        JMP SYNE4
 12505 062424        JSM FNCK       "FN" FOLLOWED BY LETTER?
 12506 066433        JMP SYNE4      NO
 12507 024040        LDA B17        YES RECORD
 12510 060451        JSM STROP+1      FUNCTION NAME
 12511 021475        LDA TEMP2
 12512 060521        JSM LPCKE      DEMAND LEFT PAREN
 12513 062231        JSM VAROP      FETCH SIMPLE VARIABLE
 12514 066515        JMP SYNE5
 12515 160206 SYNE5  JSM ERRA,I     NOT FOUND
 12516 060534        JSM RPCKE      DEMAND RIGHT PAREN
 12517 061153        JSM EOLCK      EOL?
 12520 060463        JSM SYMCI      DEMAND
 12521 012006        DEF ASSOP-1      AN "="
 12522 160206 SYNE6  JSM ERRA,I
 12523 066501        JMP WAITS      FETCH ASSIGNING FORMULA
*
*  RETURN STATEMENT SYNTAX
*
 12524 061066 RETNS  JSM GETSK      RETURN A  VALUE?
 12525 065150        JMP EOST-1     NO
 12526 055400        DSZ BADDR
 12527 066501        JMP WAITS      YES, GET A FORMULA
*  12533  IS LAST
*  MATH ROUTINES HERE

*01  STATEMENT EXECUTION JUMP TABLE

*
*  EXECUTION JUMP TABLE
*
 13741               ORG 13741B
 13741 173131        ABS EWRIT-*
 13742 173772        ABS EGRAD-*
 13743 173767        ABS EDEG-*
 13744 173763        ABS ERAD-*
 13745 174111        ABS ELET-*
 13746 174044        ABS XEC4-*     FORMAT
 13747 172777 DISP   ABS EDISP-*
 13750 174505        ABS EINPT-*
 13751 174562        ABS ENSTR-*
 13752 172773        ABS EPRIN-*
 13753 174011        ABS EREAD-*
 13754 174036        ABS XEC4-*     DATA
 13755 173531        ABS EWAIT-*
 13756 174130        ABS ESTOP-*
 13757 174106        ABS EEND-*
 13760 174252        ABS ERTRN-*
 13761 002577        ABS EGOSB-*
 13762 174354        ABS ENEXT-*
 13763 174265        ABS EFOR-*
 13764 174213        ABS EIF-*
 13765 002574        ABS EGOTO-*
 13766 174024        ABS XEC4-*     REM
 13767 174023        ABS XEC4-*     DEF
 13770 174022        ABS XEC4-*     COM
 13771 174021        ABS XEC4-*     DIM
 13772 174064        ABS ELET-*     IMPLIED LET
 13773 167371        ABS FOP13-*    NON-FORMULA OPERATOR TABLE
 13774 175744        ABS FTN13-*    FUNCTION TABLE
 13775 167434        ABS CMD13-*    SYSTEM COMMAND TABLE
 13776 173560        ABS SYN13-*    STATEMENT TABLE
 13777 012000        OCT 12000      TABLE OP-CODE
```

#01 SYNTAX

```
16410                 ORG 16410B
*
* CHECK SYNTAX OF DIM AND COM STATEMENTS
*
16410 045711 ARRYS ISZ DFLAG      SET DIM MODE FOR SBSCK
16411 021706       LDA SBPTR
16412 031710       STA MSFLG      SAVE POINTER
16413 031714       STA SFLAG      ENABLE STRING VARIABLES
16414 160246       JSM VAROA,I    FETCH I.D.
16415 164321       JMP E25+1,I    MISSING VARIABLE
16416 074610       SZB ARREI      ARRAY OR STRING; DIMENSIONED?
16417 031475       STA TEMP2
16420 121710       LDA MSFLG,I    FETCH IDENTIFIER
16421 025714       LDB SFLAG      FETCH PACKED DIMENSIONS
16422 160240       JSM MDIMA,I    COMPUTE SPACE REQUIRED
16423 001461       ADA FTMP2      UPDATE
16424 031461       STA FTMP2        COMMON POINTER
16425 021475       LDA TEMP2
16426 010031 ARRY1 CPA EOL        END OF STMT?
16427 170402       RET            YES
16430 060510       JSM COMCE      DEMAND A COMMA
16431 066411       JMP ARRYS+1    CONTINUE
16432 160206 ARREI JSM ERRA,I     NO DIMENSION ON STRING
*
* COM STMT SYNTAX AND STORAGE ALLOCATION
*
16433 025423 COMS  LDB PBPTR
16434 015424       CPB PBUFF      NULL PROGRAM?
16435 066437       JMP *+2
16436 160206 SYNE3 JSM ERRA,I     NO, ILLEGAL COM
16437 021422       LDA UKPTR
16440 072710       RZA DIMS       SKIP IF KEY; NO STORAGE ALLOCATION
16441 035461       STB FTMP2      INITIALIZE COMMON POINTER
16442 062410       JSM ARRYS       CHECK SYNTAX
16443 025404       LDB LWAM
16444 004156       ADB M100
16445 074076       TCB
16446 005461       ADB FTMP2      EXCEEDED MAXIMUM
16447 074112       SBM *+2          COMMON AREA?
16450 064561       JMP FSCE4      YES
16451 025461       LDB FTMP2      MOVE PROGRAM
16452 035424       STB PBUFF        POINTERS
16453 035423       STB PBPTR
16454 035426       STB PBPTO
16455 164203       JMP ACTSA,I
*
* DIM STMT SYNTAX
*
16456 062410 DIMS  JSM ARRYS      CHECK SYNTAX
16457 164203       JMP ACTSA,I
*
* READ AND INPUT STATEMENT SYNTAX
*
16460 160246 READS JSM VAROA,I    RECORD VARIABLE OPERAND
16461 160206 SYE13 JSM ERRA,I     NONE FOUND
16462 066463       JMP *+1
16463 060504       JSM COMCK      COMMA?
16464 065151       JMP EOST       NO
16465 066460       JMP READS      YES
*
* RESTORE STMT SYNTAX
*
16466 061056 RSTRS JSM GETSK      LINE # GIVEN?
16467 065150       JMP ENDS+1     NO
16470 060663       JSM LNUM-1     YES, GET LINE #
16471 065151       JMP EOST
*
* REM STATEMENT SYNTAX
*
16472 020107 REMS  LDA B1000
16473 041552       IOR RBUFF+1
16474 031552       STA RBUFF+1    SET ASCII BIT
16475 020031       LDA EOL        SET STATEMENT TERMINATOR
16476 024012       LDB .1         SET TO STORE IN LOW HALF
16477 160253       JSM CHRSA,I    RECORD REST TO STMT AS ASCII
16500 164203       JMP ACTSA,I
*
* GET SELECT CODE AND FORMAT #
*
16501 045706 IOHED ISZ SBPTR
16502 060520       JSM LPCKF-1     DEMAND LEFT BRACKET
16503 160202       JSM FSCA,I      GET SELECT CODE
16504 060510       JSM COMCE       DEMAND COMMA
16505 061055       JSM GNEXT
16506 045706       ISZ SBPTR
16507 060463       JSM SYMC1       LOOK FOR "#"
16510 012012       DEF TIMES-1
16511 066514       JMP *+3         NOT FOUND
16512 045706       ISZ SBPTR
16513 065055       JMP GNEXT
16514 055706       DSZ SBPTR
16515 064663       JMP LNUM-1
```

#01 SYNTAX

```
*
*  SEARCH ALL TABLES
*    (A)=FIRST CHAR    HADDR POINTS TO REST OF STRING
*    (B)=0     FOR STATEMENTS
*       =-1    FOR SYSTEM COMMANDS
*       =-2    FOR ARITHMETIC FUNCTIONS
*
16516 004132 SALT  ADB M1
16517 035473       STB TEMP      SAVE RELATIVE ADDRESS OF TABLE
16520 025403       LDB MAW       GET ADDRESS OF LAST
16521 062531       JSM SPAGE     SEARCH TABLE ON R/W PAGE
16522 024131       LDB LROMA     GET ADDRESS OF LAST ROM PAGE
16523 062531 SALT1 JSM SPAGE     SEARCH TABLE IN ROM
16524 025717       LDB NUM
16525 014130       CPB FROMA     ALL TABLES SEARCHED?
16526 170402       RET           YES
16527 004160       ADB M1024
16530 066523       JMP SALT1     NO, SEARCH NEXT PAGE
*
*  SEARCH TABLE ON A GIVEN PAGE
*    RET IF NOT FOUND
*    RET TO P+2 OF ROUTINE WHICH CALLED SALT IF FOUND
*      (A)= OP CODE
*      (B)= PAGE
*      (SRPTR,I)=SHIFTED OP CODE
*      (TEMP)=JUMP ADDRESS
*
16531 035717 SPAGE STB NUM       SAVE PAGE ADDRESS
16532 074537       LDB B,I       READ LAST WORD OF PAGE
16533 074310       SZB TSRET     RETURN IF ZERO
16534 025717       LDB NUM       GET TABLE
16535 005473       ADB TEMP        STARTING
16536 074437       ADB B,I           ADDRESS
16537 074744       SBL 1         POINT TO FIRST CHARACTER
16540 060537       JSM STSRH     SEARCH TABLE
16541 170402 TSRET RET           NOT FOUND, RETURN
16542 070442       SAR 10
16543 025473       LDB TEMP
16544 014133       CPB M2        GET 4 BIT CODE
16545 050032       AND B17         FOR SYSTEM COMMANDS
16546 005717       ADB NUM       GET TABLE
16547 074437       ADB B,I         ADDRESS
16550 070076       TCA           COMPUTE AND
16551 074017       ADA B         STORE
16552 070417       ADA A,I         ABSOLUTE
16553 031473       STA TEMP          JUMP ADDRESS
16554 125717       LDB NUM,I     GET OP CODE FOR THIS PAGE
16555 021466       LDA LOCL1     RECALL OP CODE
16556 055777       DSZ RSPTR     RETURN TO ROUTINE
16557 064357       JMP RETN2       WHICH CALLED SALT
```

#01 EXECUTION

```
*
*  EXECUTE GOTO AND GOSUB
*
16560 025421 EGOSB LDB PRADD     STACK RETURN ADDRESS
16561 060563 EGOTO JSM SLWST     STACK GARBAGE IF GOTO
16562 060771       JSM GTOPP     GET FIRST OPERAND
16563 010064       CPA INTFL
16564 066602       JMP EGOS2     YES, SIMPLE BRANCH
16565 061217       JSM FETCH     NO, COMPUTE BRANCH INDEX
16566 160225       JSM FLTRA,I   CONVERT TO INTEGER
16567 066606       JMP EGOS3     OVERFLOW
16570 004154       ADB M64
16571 074653       SBP EGOS3     SKIP IF GREATER THAN 64
16572 004054       ADB .63        RESTORE OFFSET BY -1
16573 074552       SBM EGOS3     SKIP IF RESULT WAS NEGATIVE OR 0
16574 074744       SBL 1         MULTIPLY BY 2
16575 005472       ADB TEMPS     COMPUTE
16576 035472       STB TEMPS       AND SAVE ADDRESS
16577 074056       CMB
16600 005421       ADB PRADD
16601 074252       SBM EGOS3     SKIP IF BEYOND END OF STATEMENT
16602 060567 EGOS2 JSM UNSTK     UNSTACK FLAG
16603 011421       CPA PRADD     WAS IT A GOSUB?
16604 045412       ISZ LSTPT     YES, RESTORE RETURN ADDRESS ON STACK
16605 166610       JMP EGS1A,I   EXECUTE BRANCH
16606 055412 EGOS3 DSZ LSTPT     OUT OF BOUNDS, DELETE FROM STACK
16607 164172       JMP XEC4A,I
16610 010202 EGS1A DEF EGOS1
*  16614B IS LAST
*  TAPE COMMAND SYNTAX FOLLOWS HERE
*
                   END
* NO ERRORS*
```

CROSS-REFERENCE TABLE

| | | | | | | | | | | | |
|---|---|---|---|---|---|---|---|---|---|---|---|
| .1 | 0020 | 0345 | 0393 | 1008 | 2178 | 2527 | 2960 | 3044 | 3459 | 3610 | 3712 |
| | 3853 | 3998 | 4024 | 4168 | 4256 | 4462 | 4927 | 5520 | 5534 | 5831 | 6150 |
| | 6644 | | | | | | | | | | |
| .10 | 0071 | 0072 | 0603 | 1962 | 2401 | 2402 | 2985 | 2986 | 4135 | 5210 | 5218 |
| | 5278 | | | | | | | | | | |
| .100 | 0070 | 2777 | 4004 | | | | | | | | |
| .1000 | 0069 | 5969 | | | | | | | | | |
| .11 | 0035 | 0043 | 1314 | 1651 | 2249 | 2962 | 4031 | 4133 | | | |
| .12 | 0036 | 3333 | 3379 | 4033 | 4157 | 4163 | 4183 | 4731 | | | |
| .13 | 0039 | 4037 | 4144 | | | | | | | | |
| .15 | 0048 | 0083 | | | | | | | | | |
| .16 | 0049 | 0084 | 1737 | 1757 | 5131 | | | | | | |
| .1F4 | 0068 | 1445 | 1492 | 2415 | 2437 | 2438 | 2631 | | | | |
| .2 | 0027 | 0391 | 0475 | 2170 | 3302 | 3308 | 3711 | 3779 | 4078 | 4685 | 4932 |
| | 5409 | 5679 | | | | | | | | | |
| .21 | 0050 | 3855 | | | | | | | | | |
| .22 | 0051 | 0087 | 2964 | | | | | | | | |
| .23 | 0052 | 0088 | 5567 | | | | | | | | |
| .28 | 0053 | 1966 | 6021 | | | | | | | | |
| .3 | 0028 | 0045 | 0582 | 1373 | 1374 | 1453 | 3330 | 3351 | 3359 | 3363 | 3366 |
| | 3710 | 5058 | 5153 | 5657 | 6466 | | | | | | |
| .31 | 0054 | 0090 | 1033 | 1688 | 1719 | 2138 | 3746 | 3756 | 3826 | 3865 | 3874 |
| | 3888 | 3894 | 3969 | | | | | | | | |
| .32 | 0055 | 0715 | 1287 | 1334 | 1543 | 1874 | 2554 | 4467 | 4467 | 4744 | |
| .33 | 0056 | | | | | | | | | | |
| .34 | 0057 | 0091 | 3880 | 3883 | | | | | | | |
| .37 | 0058 | | | | | | | | | | |
| .4 | 0029 | 2549 | 3265 | 3601 | 5244 | 5989 | 6023 | 6318 | | | |
| .40 | 0059 | 6328 | | | | | | | | | |
| .41 | 0060 | 1405 | 6243 | | | | | | | | |
| .43 | 0061 | 0880 | 1238 | | | | | | | | |
| .45 | 0062 | 0882 | 1239 | | | | | | | | |
| .46 | 0063 | 1240 | | | | | | | | | |
| .48 | 0064 | 1001 | 1241 | 3902 | | | | | | | |
| .5 | 0030 | 1339 | 3607 | 3993 | 4063 | 5241 | 5291 | 5303 | 5663 | | |
| .58 | 0065 | 0094 | 1242 | | | | | | | | |
| .6 | 0031 | 0044 | 2788 | | | | | | | | |
| .63 | 0066 | 1747 | 2012 | 2681 | 2681 | 6728 | | | | | |
| .7 | 0032 | 2070 | 4069 | 6000 | | | | | | | |
| .8 | 0033 | 5703 | 5495 | 6320 | | | | | | | |
| .9 | 0034 | 2503 | 2601 | 2796 | 3208 | 5313 | 5615 | 6203 | 6212 | 6221 | 6420 |
| .99 | 0074 | 2812 | | | | | | | | | |
| .ADD | 2376 | 2356 | | | | | | | | | |
| .BUFA | 0180 | 0776 | 1412 | 1439 | 1791 | 1843 | 2778 | | | | |
| .EIN1 | 5408 | 5425 | | | | | | | | | |
| .FADA | 0185 | 5292 | 5841 | | | | | | | | |
| .FDA1 | 5378 | 5366 | | | | | | | | | |
| .FDVA | 0188 | 5867 | | | | | | | | | |
| .FMPA | 0187 | 5861 | | | | | | | | | |
| .FSBA | 0186 | 5310 | 5751 | 5906 | | | | | | | |
| .FSR | 0190 | | | | | | | | | | |
| .LNUM | 1099 | 0501 | 0793 | 1300 | 2403 | 2561 | 2565 | 2593 | 2794 | 2799 | 2995 |
| | 3003 | 3018 | 3019 | 3156 | 3170 | 3494 | 3527 | | | | |
| .NPWR | 1014 | 2529 | 4257 | 5121 | | | | | | | |
| .OVER | 0985 | 0977 | | | | | | | | | |
| .SLBF | 0181 | 0308 | 1705 | 1856 | 1861 | 1900 | 2062 | 2542 | | | |
| A | 0000 | 0297 | 0304 | 0629 | 0664 | 0669 | 0671 | 0693 | 0695 | 0722 | 0725 |
| | 0754 | 0948 | 1004 | 1006 | 1011 | 1050 | 1423 | 2072 | 2192 | 2204 | 2220 |
| | 2923 | 2930 | 2945 | 3148 | 3163 | 3430 | 3543 | 3545 | 3551 | 3587 | 3599 |
| | 3623 | 3669 | 3670 | 3676 | 3859 | 4172 | 4584 | 4594 | 4626 | 4684 | 4701 |
| | 4703 | 4706 | 5083 | 5201 | 5211 | 5304 | 5321 | 5515 | 5537 | 5545 | 5595 |
| | 5658 | 5853 | 5882 | 5952 | 5962 | 6020 | 6056 | 6176 | 6184 | 6309 | 6708 |
| ACCS1 | 2876 | 2867 | 2873 | | | | | | | | |
| ACCS2 | 2889 | 2883 | 2894 | 2903 | | | | | | | |
| ACCS3 | 2881 | 2875 | | | | | | | | | |
| ACCS4 | 2900 | 2871 | 2872 | 2885 | | | | | | | |
| ACTKY | 2861 | 2671 | | | | | | | | | |
| ACTSA | 0174 | 0862 | 6615 | 6620 | 6646 | | | | | | |
| ACTST | 2854 | 0174 | | | | | | | | | |
| ADRSS | 1112 | | | | | | | | | | |
| AERR | 2758 | 0176 | | | | | | | | | |
| AERRA | 0176 | 0352 | 0967 | 0972 | | | | | | | |
| AIEX1 | 2249 | 2113 | | | | | | | | | |
| AIEX2 | 2250 | 2120 | | | | | | | | | |
| ALCL1 | 2246 | 2142 | | | | | | | | | |
| ALNUM | 2554 | | | | | | | | | | |
| ANDOP | 6125 | | | | | | | | | | |
| AR1 | 1198 | 0182 | 0355 | 1207 | 3989 | 4001 | | | | | |
| AR1A | 0182 | 0324 | 0363 | | | | | | | | |
| AR1E | 1207 | 0940 | 0945 | | | | | | | | |
| AR2 | 1200 | 0183 | 1208 | 2135 | 2141 | 2246 | 2246 | 3990 | 4002 | 4091 | 4114 |
| | 4147 | 4151 | 4230 | 5145 | 5314 | | | | | | |
| AR2A | 0183 | 0325 | 0364 | 0956 | 0991 | 5474 | 5689 | 5847 | 5907 | | |
| AR2E | 1208 | 0942 | 0954 | 0961 | 0979 | 0982 | 0984 | | | | |
| ARRAS | 5741 | 5542 | | | | | | | | | |
| ARRE1 | 6593 | 0251 | 6581 | | | | | | | | |
| ARRY1 | 6589 | | | | | | | | | | |
| ARRYS | 6575 | 6592 | 6604 | 6619 | | | | | | | |
| ARW | 1214 | 1502 | 3728 | 3733 | 3744 | | | | | | |

CROSS-REFERENCE TABLE

| | | | | | | | | | | | |
|---|---|---|---|---|---|---|---|---|---|---|---|
| RYAD | 1188 | 6357 | 6358 | 6374 | 6417 | 6425 | 6429 | 6461 | 6477 | | |
| SSOP | 6109 | 6263 | 6488 | 6521 | | | | | | | |
| STR1 | 2247 | 2108 | | | | | | | | | |
| STR2 | 2248 | 2117 | | | | | | | | | |
| UTO | 2400 | 2288 | | | | | | | | | |
| | 0000 | 0309 | 0318 | 0319 | 0376 | 0399 | 0409 | 0515 | 0691 | 0718 | 0721 |
| | 0732 | 0752 | 0755 | 0798 | 0805 | 0826 | 0915 | 0939 | 0947 | 1054 | 1062 |
| | 1065 | 1385 | 1500 | 1711 | 1807 | 2085 | 2094 | 2103 | 2111 | 2116 | 2121 |
| | 2124 | 2129 | 2136 | 2179 | 2191 | 2197 | 2208 | 2219 | 2233 | 2237 | 2489 |
| | 2490 | 2495 | 2768 | 2890 | 2917 | 2926 | 2931 | 2934 | 3107 | 3110 | 3121 |
| | 3125 | 3138 | 3144 | 3173 | 3191 | 3222 | 3225 | 3236 | 3305 | 3341 | 3350 |
| | 3358 | 3369 | 3372 | 3378 | 3382 | 3383 | 3394 | 3412 | 3415 | 3432 | 3457 |
| | 3476 | 3697 | 3730 | 3802 | 3841 | 3921 | 4203 | 4500 | 4592 | 4636 | 4666 |
| | 5029 | 5030 | 5169 | 5246 | 5308 | 5492 | 5497 | 5505 | 5523 | 5555 | 5562 |
| | 5564 | 5575 | 5585 | 5587 | 5637 | 5639 | 5660 | 5807 | 5811 | 5827 | 5955 |
| | 6015 | 6027 | 6187 | 6449 | 6692 | 6696 | 6705 | 6707 | | | |
| 100 | 0095 | 1324 | 1340 | 1448 | 2139 | 3891 | | | | | |
| 1000 | 0102 | 3571 | 3795 | 6640 | | | | | | | |
| 10K | 0114 | 0115 | 1245 | 2243 | | | | | | | |
| 12K | 0116 | 0117 | 0206 | | | | | | | | |
| 133 | 0096 | 6330 | | | | | | | | | |
| 137 | 2049 | 1821 | | | | | | | | | |
| 140 | 0097 | 1051 | 1052 | 1622 | | | | | | | |
| 1400 | 0103 | 0204 | | | | | | | | | |
| 152 | 1623 | 1312 | | | | | | | | | |
| 17 | 0083 | 5455 | 6703 | | | | | | | | |
| 170K | 0121 | 1837 | 2539 | 2580 | 2786 | | | | | | |
| 1740 | 0104 | 0203 | 5973 | 6029 | | | | | | | |
| 176 | 2048 | 1827 | | | | | | | | | |
| 1760 | 0105 | 0158 | 3336 | | | | | | | | |
| 177 | 0098 | 0694 | 1809 | 1817 | 4578 | 4632 | 4997 | | | | |
| 1774 | 0106 | | | | | | | | | | |
| 1775 | 0107 | | | | | | | | | | |
| 1777 | 0108 | 3339 | 3344 | 3471 | 3511 | 3943 | 5329 | 5659 | | | |
| 20 | 0084 | 5005 | 5533 | | | | | | | | |
| 200 | 2044 | 1926 | | | | | | | | | |
| 22 | 0085 | 1282 | 1308 | | | | | | | | |
| 23 | 0086 | 1310 | | | | | | | | | |
| 2400 | 0110 | | | | | | | | | | |
| 26 | 0087 | 1986 | | | | | | | | | |
| 27 | 0088 | 1984 | | | | | | | | | |
| 2K | 1244 | | | | | | | | | | |
| 3000 | 0111 | | | | | | | | | | |
| 33 | 2047 | 1417 | 1825 | | | | | | | | |
| 36 | 0089 | 3218 | 3260 | 3897 | 4574 | 6476 | | | | | |
| 37 | 0090 | 0456 | 1063 | 3259 | 3263 | 3600 | 3689 | 4573 | 4625 | 5462 | 5463 |
| | 5498 | 5502 | 5524 | 5528 | 6183 | 6511 | | | | | |
| 377 | 0099 | 1953 | 2104 | 3295 | 4501 | 5808 | | | | | |
| 400 | 0100 | 4000 | | | | | | | | | |
| 4000 | 0112 | 0162 | 1803 | 4595 | | | | | | | |
| 42 | 0091 | 2370 | 2717 | 2726 | 4865 | | | | | | |
| 43 | 2429 | 2410 | | | | | | | | | |
| 44 | 0092 | 1243 | 6305 | 6462 | | | | | | | |
| 4400 | 3244 | 3206 | | | | | | | | | |
| 52 | 0093 | 1652 | 2247 | 2685 | 3770 | 3787 | | | | | |
| 57 | 1624 | 1419 | | | | | | | | | |
| 60 | 1241 | 4102 | 4193 | 4195 | 4210 | | | | | | |
| 6K | 0113 | 0167 | | | | | | | | | |
| 72 | 0094 | | | | | | | | | | |
| 777 | 0101 | 3598 | | | | | | | | | |
| ADD | 2377 | 2364 | | | | | | | | | |
| ADDR | 1076 | 0311 | 0530 | 0539 | 0572 | 0777 | 1285 | 1289 | 1302 | 1511 | 1515 |
| | 1519 | 1542 | 1707 | 1792 | 1833 | 1835 | 1842 | 1855 | 1858 | 1876 | 1885 |
| | 1914 | 2017 | 2027 | 2063 | 2346 | 2412 | 2541 | 2563 | 2642 | 2644 | 2709 |
| | 2749 | 2801 | 2802 | 4386 | 4393 | 4412 | 4415 | 4509 | 4521 | 4528 | 4721 |
| | 4728 | 4944 | 5402 | 5422 | 6165 | 6171 | 6242 | 6529 | | | |
| ADRP | 0204 | 0716 | 0750 | 0766 | | | | | | | |
| ASE | 4629 | | | | | | | | | | |
| EFB | 1625 | 1422 | | | | | | | | | |
| END | 0198 | 0199 | 1401 | 1709 | | | | | | | |
| ERR | 5267 | 0282 | 5258 | 5273 | | | | | | | |
| HSTP | 0471 | 0486 | 3544 | 5134 | 5208 | 5471 | 5506 | 5549 | 5731 | 5899 | 6004 |
| INO1 | 5969 | 5974 | | | | | | | | | |
| INO2 | 5975 | 5971 | | | | | | | | | |
| INOP | 5972 | 5750 | 5840 | 5860 | 5866 | 5872 | 5905 | 5950 | 5969 | | |
| K1 | 1866 | 1860 | | | | | | | | | |
| K2 | 1861 | 1854 | | | | | | | | | |
| KPTA | 2045 | 1349 | 1940 | 1949 | 1967 | | | | | | |
| KPTR | 1230 | 1275 | 1347 | 1509 | 1516 | 1535 | 1704 | 1853 | 1859 | 1865 | 1870 |
| | 1872 | 1875 | 1915 | 1916 | 1938 | 1943 | 1946 | 1951 | 1957 | 1969 | 2045 |
| KSP | 1853 | 1309 | | | | | | | | | |
| LANK | 1173 | 0768 | 2555 | | | | | | | | |
| LNKA | 4467 | 4463 | | | | | | | | | |
| 5 | 0015 | | | | | | | | | | |
| 6 | 0011 | 0114 | | | | | | | | | |
| 7 | 0022 | 0100 | | | | | | | | | |
| ALEX | 5056 | 2838 | 5009 | | | | | | | | |
| ALLK | 1976 | 1277 | 1306 | | | | | | | | |
| ALSN | 2682 | 2582 | | | | | | | | | |
| ALX2 | 5071 | | | | | | | | | | |

CROSS-REFERENCE TABLE

| | | | | | | | | | | | |
|---|---|---|---|---|---|---|---|---|---|---|---|
| CALXA | 2838 | 2828 | | | | | | | | | |
| CCNT | 1229 | 1274 | 1438 | 1454 | 1917 | 1927 | 1930 | 1934 | 2091 | 2107 | |
| CHRS1 | 4890 | 4900 | 4901 | | | | | | | | |
| CHRS2 | 4902 | 4897 | | | | | | | | | |
| CHRS3 | 4905 | 4893 | 4895 | | | | | | | | |
| CHRSA | 0219 | 2670 | 6645 | | | | | | | | |
| CHRST | 4889 | 0219 | 4871 | | | | | | | | |
| CKEO1 | 4554 | 4550 | | | | | | | | | |
| CKEOL | 4546 | 4266 | 4335 | 4441 | 4472 | 4529 | | | | | |
| CKRCD | 2587 | 2573 | | | | | | | | | |
| CLAR2 | 0956 | 0969 | 0976 | 3992 | | | | | | | |
| CLF1 | 1711 | 1714 | | | | | | | | | |
| CLFAR | 1703 | 0160 | 1294 | 1361 | 1366 | 1393 | 1437 | | | | |
| CLERA | 0160 | 1026 | 2419 | 2520 | 2560 | 2784 | 3739 | 4293 | 4333 | 4419 | 5102 |
| | 5140 | 5393 | 5427 | 5434 | 5437 | | | | | | |
| CLINE | 1101 | 0792 | 1429 | 1465 | 1553 | 2623 | 3768 | | | | |
| CLP1A | 0217 | 2195 | | | | | | | | | |
| CLPR1 | 2915 | 0217 | 2920 | 2979 | | | | | | | |
| CLPR2 | 2921 | 2916 | 2953 | | | | | | | | |
| CLPRG | 2908 | 2847 | 2887 | | | | | | | | |
| CLRST | 1687 | 1360 | 1680 | | | | | | | | |
| CMD13 | 2296 | 6567 | | | | | | | | | |
| CMERR | 3134 | 0268 | | | | | | | | | |
| CMND | 2619 | 2610 | | | | | | | | | |
| CMNDF | 2622 | | | | | | | | | | |
| COLON | 1242 | 5109 | | | | | | | | | |
| COMCE | 0419 | 0248 | 2362 | 2392 | 2465 | 6591 | 6653 | | | | |
| COMCK | 0414 | 0419 | 2336 | 6627 | | | | | | | |
| COML | 1209 | 3053 | 3124 | 3126 | 3132 | | | | | | |
| COMMA | 6104 | 2720 | | | | | | | | | |
| COMP1 | 3649 | 3643 | | | | | | | | | |
| COMPL | 3640 | 2989 | 3651 | | | | | | | | |
| COMPR | 5905 | 5912 | 5918 | 5924 | 5930 | 5936 | 5942 | | | | |
| COMS | 6597 | 4800 | | | | | | | | | |
| COMTA | 1628 | 1362 | | | | | | | | | |
| CONS3 | 0872 | 0870 | | | | | | | | | |
| CONST | 0867 | 2333 | 5413 | | | | | | | | |
| CONT | 1382 | 2283 | | | | | | | | | |
| CONT1 | 1388 | 1383 | | | | | | | | | |
| CONTK | 1386 | 1384 | 2149 | | | | | | | | |
| CPLAC | 1116 | 2504 | 4305 | 4947 | | | | | | | |
| CR1 | 1040 | 1028 | 1804 | | | | | | | | |
| CRC | 1670 | 1414 | | | | | | | | | |
| CRC1 | 1678 | 1671 | 4768 | | | | | | | | |
| CRC1A | 4768 | 3757 | | | | | | | | | |
| CRC2 | 1676 | 1673 | | | | | | | | | |
| CRCHK | 1672 | 0228 | | | | | | | | | |
| CRCKA | 0228 | 2783 | 2808 | 5071 | 5101 | | | | | | |
| CRLF | 1027 | | | | | | | | | | |
| CRLF1 | 1029 | 1681 | 2780 | 3732 | 3754 | 4347 | 4421 | 4454 | 5025 | 5122 | |
| CRTN | 0037 | 0038 | 0039 | 1029 | 1345 | 1654 | 1819 | | | | |
| CTERM | 1683 | 1675 | | | | | | | | | |
| CTYPE | 1115 | 2505 | 4306 | 4939 | | | | | | | |
| CXFC4 | 5437 | 5420 | | | | | | | | | |
| DATA2 | 2336 | | | | | | | | | | |
| DATAS | 2332 | 2338 | 4798 | | | | | | | | |
| DATCD | 5386 | 5379 | | | | | | | | | |
| DCMF1 | 3689 | | | | | | | | | | |
| DCMF2 | 3693 | 3699 | | | | | | | | | |
| DCMP1 | 3675 | 3681 | | | | | | | | | |
| DCMP2 | 3683 | 3674 | 3680 | | | | | | | | |
| DCMP3 | 3679 | 3675 | | | | | | | | | |
| DCMP4 | 3702 | 3667 | | | | | | | | | |
| DCMP5 | 3666 | 3686 | | | | | | | | | |
| DCMP6 | 3672 | 3707 | | | | | | | | | |
| DCOM1 | 3661 | | | | | | | | | | |
| DCOMA | 0210 | 0567 | 2167 | 2188 | 2842 | 2861 | 2977 | | | | |
| DCOMF | 3688 | 3664 | 3685 | | | | | | | | |
| DCOMP | 3655 | 0210 | 2968 | | | | | | | | |
| DEFOP | 3532 | 3467 | 3507 | | | | | | | | |
| DEFS | 6507 | 4799 | | | | | | | | | |
| DEL1 | 1427 | 1280 | 1571 | 1574 | | | | | | | |
| DEL2 | 1426 | 1428 | | | | | | | | | |
| DELC1 | 1519 | 1527 | | | | | | | | | |
| DELET | 2975 | 2284 | | | | | | | | | |
| DELIN | 2050 | 1279 | | | | | | | | | |
| DELSA | 0175 | 1433 | | | | | | | | | |
| DELST | 2842 | 0175 | 2596 | | | | | | | | |
| DFLAG | 1175 | 2607 | 2944 | 2952 | 6322 | 6325 | 6359 | 6387 | 6575 | | |
| DIGCK | 0650 | 0597 | 0599 | 2343 | 2458 | 4942 | 6307 | | | | |
| DIGIT | 1233 | 4025 | 4035 | 4059 | 4124 | | | | | | |
| DIMS | 6619 | 4801 | 6602 | | | | | | | | |
| DINCT | 6435 | 6406 | 6409 | 6412 | 6418 | 6419 | | | | | |
| DISP | 6544 | 5039 | | | | | | | | | |
| DISPA | 5039 | 5034 | | | | | | | | | |
| DIV | 6114 | | | | | | | | | | |
| DLIMT | 0648 | 0650 | | | | | | | | | |
| DNARW | 1473 | 1566 | | | | | | | | | |
| DOLAR | 1243 | 3896 | 4073 | | | | | | | | |
| DPERR | 0043 | | | | | | | | | | |

CROSS-REFERENCE TABLE

| | | | | | | | | | | | |
|---|---|---|---|---|---|---|---|---|---|---|---|
| DRQST | 1102 | 0928 | 2069 | 2525 | 2572 | 2576 | 2820 | 2822 | 3443 | 3737 | 5137 |
| | 5400 | 5412 | 5416 | | | | | | | | |
| DSTRA | 5698 | 5614 | | | | | | | | | |
| DSTRT | 1088 | 3657 | 5365 | 5383 | 5449 | 5645 | 5698 | | | | |
| E | 0080 | 4089 | | | | | | | | | |
| E1 | 0235 | 2836 | | | | | | | | | |
| E10 | 0244 | | | | | | | | | | |
| E15 | 0249 | | | | | | | | | | |
| E20 | 0254 | | | | | | | | | | |
| E25 | 0259 | 4911 | 4912 | 6589 | | | | | | | |
| E30 | 0264 | 3158 | | | | | | | | | |
| E35 | 0269 | | | | | | | | | | |
| E40 | 0274 | 3486 | | | | | | | | | |
| E45 | 0279 | 3646 | 4696 | | | | | | | | |
| E5 | 0239 | | | | | | | | | | |
| E50 | 0284 | | | | | | | | | | |
| EADD | 5163 | 5147 | 5447 | | | | | | | | |
| EADD1 | 5172 | 5165 | | | | | | | | | |
| EAND | 5960 | 5773 | | | | | | | | | |
| ECAL | 5078 | 0215 | | | | | | | | | |
| ECAL1 | 5081 | 5085 | | | | | | | | | |
| ECAL2 | 5086 | 5082 | | | | | | | | | |
| ECALA | 0215 | 2860 | | | | | | | | | |
| ECLR | 2474 | 1313 | | | | | | | | | |
| EDEG | 4930 | 6540 | | | | | | | | | |
| EDTSP | 4327 | 6544 | | | | | | | | | |
| EDIT2 | 1564 | 1419 | | | | | | | | | |
| EDITR | 2848 | 2844 | 2845 | 2846 | 2898 | | | | | | |
| EER | 1574 | 1565 | 1566 | 1567 | 1568 | 1569 | 1570 | 1571 | 1572 | 1573 | 1625 |
| EEND | 5050 | 4988 | 5057 | 6552 | | | | | | | |
| EEQL | 5930 | 5767 | 5937 | 6057 | | | | | | | |
| EFAD | 5840 | 5759 | | | | | | | | | |
| EFDV | 5866 | 5762 | | | | | | | | | |
| EFET | 1464 | 2165 | 2289 | | | | | | | | |
| EFMP | 5860 | 5761 | | | | | | | | | |
| EFOR | 5195 | 6556 | | | | | | | | | |
| EFOR1 | 5224 | 5212 | | | | | | | | | |
| EFOR2 | 5210 | 5216 | | | | | | | | | |
| EFSB | 5750 | 5760 | | | | | | | | | |
| EGORE | 5924 | 5775 | | | | | | | | | |
| EGOS1 | 5147 | 6742 | | | | | | | | | |
| EGOS2 | 6736 | 6722 | | | | | | | | | |
| EGOS3 | 6740 | 6725 | 6727 | 6729 | 6735 | | | | | | |
| EGOS4 | 5151 | 5146 | 5149 | | | | | | | | |
| EGOSB | 6718 | 6554 | | | | | | | | | |
| EGOTO | 6719 | 6558 | | | | | | | | | |
| EGRAD | 4932 | 6539 | | | | | | | | | |
| EGS1A | 6742 | 6739 | | | | | | | | | |
| EGTRT | 5912 | 5764 | | | | | | | | | |
| EIF | 5144 | 6557 | | | | | | | | | |
| EINPT | 5391 | 6545 | | | | | | | | | |
| ELARC | 5894 | 5770 | | | | | | | | | |
| ELET | 5034 | 5036 | 6542 | 6563 | | | | | | | |
| ELINA | 0169 | 2807 | | | | | | | | | |
| ELORE | 5936 | 5776 | | | | | | | | | |
| ELST | 5918 | 5765 | | | | | | | | | |
| EMSGA | 2833 | 2789 | | | | | | | | | |
| ENDS | 0854 | 2433 | 4778 | 4779 | 4780 | 4791 | 6634 | | | | |
| ENDW | 2046 | 1712 | | | | | | | | | |
| ENEQL | 5942 | 5766 | 5913 | 5956 | | | | | | | |
| ENEXT | 5272 | 5281 | 6555 | | | | | | | | |
| ENOT | 6054 | 5774 | | | | | | | | | |
| ENTE1 | 3439 | 3422 | | | | | | | | | |
| ENTE3 | 3454 | 3460 | 3477 | | | | | | | | |
| ENTE4 | 3474 | 3464 | 3469 | | | | | | | | |
| ENTE5 | 3479 | 3455 | | | | | | | | | |
| ENTE6 | 3485 | 3480 | | | | | | | | | |
| ENTEA | 0218 | 5197 | 5496 | | | | | | | | |
| ENTER | 3420 | 0218 | | | | | | | | | |
| ENTFA | 0189 | 5591 | | | | | | | | | |
| ENTFN | 3449 | 0189 | | | | | | | | | |
| ENTRY | 2483 | 2961 | | | | | | | | | |
| EOL | 0038 | 0779 | 0861 | 1824 | 1831 | 1846 | 1928 | 2462 | 2595 | 4892 | 6249 |
| | 6589 | 6643 | | | | | | | | | |
| EOLCK | 0861 | 0856 | 2361 | 2391 | 2394 | 2659 | 2731 | 2751 | 6495 | 6519 | |
| EOLL | 1399 | 1346 | | | | | | | | | |
| EOR | 5950 | 5772 | | | | | | | | | |
| EOR2 | 5954 | 5964 | | | | | | | | | |
| EOST | 0856 | 2337 | 2691 | 2725 | 4913 | 4922 | 6503 | 6528 | 6628 | 6636 | |
| EPI | 6046 | 6044 | | | | | | | | | |
| EPRIN | 4326 | 6547 | | | | | | | | | |
| EPWR | 5872 | 5763 | | | | | | | | | |
| EQUAL | 6119 | | | | | | | | | | |
| ER3 | 5176 | 0281 | 5179 | 5184 | 5188 | | | | | | |
| ER6 | 5823 | 0276 | 5795 | 5801 | 5816 | | | | | | |
| ER60 | 5377 | 0283 | 5381 | | | | | | | | |
| ER8 | 6017 | 0274 | | | | | | | | | |
| ERAD | 4927 | 4931 | 4933 | 6541 | | | | | | | |
| ERRS | 2836 | 2766 | 2771 | | | | | | | | |
| EREAD | 4968 | 4974 | 6548 | | | | | | | | |

CROSS-REFERENCE TABLE

| | | | | | | | | | | | |
|---|---|---|---|---|---|---|---|---|---|---|---|
| EREC | 1437 | 1573 | | | | | | | | | |
| ERES | 6048 | 6045 | | | | | | | | | |
| ERET | 2831 | 2825 | 2826 | 2827 | | | | | | | |
| ERN1 | 2818 | 2811 | | | | | | | | | |
| ERR1 | 2772 | 2760 | | | | | | | | | |
| ERR2 | 2781 | 2774 | 2776 | | | | | | | | |
| ERR3 | 2801 | 2795 | | | | | | | | | |
| ERR4 | 2809 | | | | | | | | | | |
| ERR5 | 2820 | 2813 | | | | | | | | | |
| ERRA | 0177 | 0420 | 0433 | 0448 | 0477 | 0524 | 0618 | 0857 | 0874 | 2084 | 2134 |
| | 2358 | 2389 | 2667 | 2692 | 2713 | 3423 | 4426 | 4665 | 4683 | 4867 | 4872 |
| | 4920 | 5018 | 5168 | 5176 | 5267 | 5377 | 5823 | 6017 | 6217 | 6454 | 6472 |
| | 6486 | 6493 | 6498 | 6517 | 6522 | 6593 | 6600 | 6625 | | | |
| ERRM | 2835 | 2833 | 2833 | 2834 | 2834 | | | | | | |
| ERROR | 2764 | 0177 | 2617 | 2658 | 2837 | | | | | | |
| ERSTR | 5444 | 6546 | | | | | | | | | |
| ERTN1 | 4990 | 5189 | 5322 | | | | | | | | |
| ERTRN | 5177 | 6553 | | | | | | | | | |
| ESCMA | 5793 | 5756 | | | | | | | | | |
| ESTAC | 5128 | 4984 | 5095 | | | | | | | | |
| ESTOP | 5070 | 5052 | 5123 | 6551 | | | | | | | |
| ESTR | 5781 | 5757 | | | | | | | | | |
| ESTR1 | 5788 | 5786 | | | | | | | | | |
| ESYM1 | 3412 | 3446 | | | | | | | | | |
| ESYMT | 3407 | 3113 | 3434 | | | | | | | | |
| ET1 | 4419 | 4417 | | | | | | | | | |
| ETAB | 4405 | 4283 | | | | | | | | | |
| EUMIN | 5878 | 5768 | | | | | | | | | |
| EVARG | 5455 | 5570 | 5609 | | | | | | | | |
| EVMLF | 5702 | 5665 | | | | | | | | | |
| EW1 | 4760 | 4761 | 4763 | | | | | | | | |
| EW2 | 4733 | 4737 | 4764 | | | | | | | | |
| EWAIT | 4758 | 6550 | | | | | | | | | |
| EWRI1 | 4329 | 4440 | 4459 | | | | | | | | |
| EWRIT | 4438 | 6538 | | | | | | | | | |
| EXP | 1186 | 1187 | | | | | | | | | |
| EXPOP | 0118 | 6259 | | | | | | | | | |
| EXPS | 6115 | | | | | | | | | | |
| EXPTB | 1580 | 1356 | | | | | | | | | |
| F | 0081 | 3912 | | | | | | | | | |
| FADD | 2375 | 2351 | | | | | | | | | |
| FALSE | 5944 | 5914 | 5926 | 5932 | 5963 | | | | | | |
| FDAAA | 0222 | 4969 | | | | | | | | | |
| FDATA | 5361 | 0222 | 5384 | | | | | | | | |
| FETCH | 0911 | 4288 | 4407 | 4480 | 4663 | 4758 | 5144 | 5229 | 5239 | 5787 | 5793 |
| | 5799 | 6723 | | | | | | | | | |
| FILL | 4391 | 0201 | 4320 | | | | | | | | |
| FILL1 | 4380 | 4391 | 4392 | | | | | | | | |
| FILL2 | 4398 | 4388 | 4414 | | | | | | | | |
| FILLA | 0201 | | | | | | | | | | |
| FIRST | 1152 | 1708 | 4384 | 4527 | 4719 | 4726 | 4729 | | | | |
| FIX | 1061 | 0320 | 5226 | 5262 | 5288 | 5297 | 5327 | | | | |
| FIXED | 4939 | 2281 | 4943 | | | | | | | | |
| FLGBT | 0073 | 1269 | 3002 | 3172 | 3431 | 4422 | 4952 | 4995 | 5601 | 6016 | |
| FLOAT | 1171 | 3829 | 4041 | 4430 | 4484 | 4732 | 4736 | | | | |
| FLT | 4938 | 2280 | | | | | | | | | |
| FLT1 | 4066 | 4056 | | | | | | | | | |
| FLT10 | 4097 | 4094 | | | | | | | | | |
| FLT11 | 4064 | | | | | | | | | | |
| FLT2 | 4077 | 4055 | 4065 | | | | | | | | |
| FLT3 | 4073 | | | | | | | | | | |
| FLT4 | 4076 | 4072 | | | | | | | | | |
| FLT5 | 4080 | 4062 | | | | | | | | | |
| FLT6 | 4086 | 4088 | | | | | | | | | |
| FLT7 | 4063 | 4058 | | | | | | | | | |
| FLT8 | 4089 | 4083 | | | | | | | | | |
| FLT9 | 4104 | 4101 | | | | | | | | | |
| FLTFA | 0193 | 4408 | 4759 | | | | | | | | |
| FLTRA | 0192 | 0348 | 4498 | 4664 | 5794 | 5800 | 6724 | | | | |
| FLTSA | 0195 | 0361 | | | | | | | | | |
| FMTB | 2364 | 2353 | | | | | | | | | |
| FMTC | 2361 | 2369 | 2374 | | | | | | | | |
| FMTD | 2359 | | | | | | | | | | |
| FMTER | 2358 | 0266 | 2372 | | | | | | | | |
| FMTF | 2350 | 2344 | | | | | | | | | |
| FMTOP | 4712 | 4438 | | | | | | | | | |
| FMTQT | 2370 | 2366 | | | | | | | | | |
| FMTS | 2342 | 2363 | 4782 | | | | | | | | |
| FMX80 | 5593 | 5602 | | | | | | | | | |
| FMX81 | 5647 | 5630 | | | | | | | | | |
| FMX82 | 5631 | 5625 | 5629 | | | | | | | | |
| FMX83 | 5644 | 5634 | | | | | | | | | |
| FMX84 | 5633 | 5641 | | | | | | | | | |
| FMX9 | 5668 | 5714 | | | | | | | | | |
| FN | 0148 | 2134 | 6450 | | | | | | | | |
| FNCK | 6447 | 6163 | 6509 | | | | | | | | |
| FND | 0639 | 0665 | 0670 | 1499 | 2439 | 2443 | | | | | |
| FND1A | 0224 | | | | | | | | | | |
| FSC3 | 6183 | 6169 | | | | | | | | | |
| FSC31 | 6196 | 6191 | | | | | | | | | |
| FSC4 | 6170 | 6164 | | | | | | | | | |

CROSS-REFERENCE TABLE

| | | | | | | | | | | | |
|---|---|---|---|---|---|---|---|---|---|---|---|
| FSC5 | 6202 | | | | | | | | | | |
| FSC6 | 6203 | 6261 | 6285 | | | | | | | | |
| FSC7 | 6199 | 6156 | | | | | | | | | |
| FSC8 | 6212 | 6195 | | | | | | | | | |
| FSC9 | 6216 | 6210 | | | | | | | | | |
| FSCA | 0173 | 2386 | 2699 | 2747 | 2750 | 4917 | 6652 | | | | |
| FSCE1 | 0433 | 0249 | | | | | | | | | |
| FSCE2 | 0448 | 0250 | 6271 | | | | | | | | |
| FSCE3 | 6217 | 0240 | 6220 | | | | | | | | |
| FSCE4 | 0479 | 0236 | 2951 | 6438 | 6610 | | | | | | |
| FSP1 | 4611 | 4601 | | | | | | | | | |
| FSP2 | 4614 | 4608 | | | | | | | | | |
| FSPN | 4643 | 4604 | | | | | | | | | |
| FSPQ | 4631 | 4622 | | | | | | | | | |
| FSPR | 4649 | 4453 | 4461 | 4494 | 4641 | | | | | | |
| FSPR1 | 4655 | 4651 | | | | | | | | | |
| FTABL | 2258 | 2375 | 2375 | 2376 | 2376 | 2377 | 2377 | | | | |
| FTEST | 5300 | 5265 | | | | | | | | | |
| FTMP1 | 1122 | 1223 | 5521 | 5535 | 5785 | | | | | | |
| FTMP2 | 1123 | 1228 | 5525 | 5530 | 5532 | 5781 | 6586 | 6587 | 6603 | 6608 | 6611 |
| FTN13 | 6064 | 6566 | | | | | | | | | |
| FW1 | 1877 | 1871 | | | | | | | | | |
| FWAM | 0157 | 2230 | 2508 | 2969 | 3452 | 3665 | 5632 | | | | |
| FWUP | 1081 | 2168 | 2174 | 2175 | 2176 | 2177 | 2196 | 2198 | 2231 | 2509 | 2936 |
| | 2937 | 2970 | 3029 | 3052 | 3454 | 3666 | 5633 | | | | |
| FXFLA | 0194 | 6028 | | | | | | | | | |
| GETI1 | 0758 | 0756 | | | | | | | | | |
| GETAD | 0626 | 2416 | 2975 | 4956 | | | | | | | |
| GETCH | 0751 | 0763 | 1049 | 1698 | 1941 | 4891 | | | | | |
| GETL2 | 2467 | 2463 | | | | | | | | | |
| GETLA | 3025 | 2629 | 2984 | | | | | | | | |
| GETLN | 2456 | 2400 | 2413 | 2436 | 2459 | 3025 | | | | | |
| GETLR | 2468 | | | | | | | | | | |
| GETSK | 0778 | 2456 | 2724 | 4940 | 5423 | 6527 | 6633 | | | | |
| GETST | 4865 | 0213 | | | | | | | | | |
| GFLAG | 1189 | 0617 | 0833 | 2345 | 2382 | 2571 | | | | | |
| GFRST | 0774 | 2568 | 2584 | | | | | | | | |
| GNEXT | 0766 | 0431 | 0443 | 0446 | 0585 | 0608 | 0778 | 0844 | 0848 | 0854 | 0878 |
| | 0886 | 2021 | 2064 | 2342 | 2367 | 2409 | 2643 | 2958 | 4876 | 6194 | 6269 |
| | 6313 | 6326 | 6479 | 6654 | 6660 | | | | | | |
| GNUM | 4431 | 4518 | | | | | | | | | |
| GNUM1 | 4429 | 4307 | | | | | | | | | |
| GOTO1 | 2385 | 2395 | | | | | | | | | |
| GOTO2 | 2390 | 2393 | | | | | | | | | |
| GOTO3 | 2394 | 2384 | | | | | | | | | |
| GOTOS | 2381 | 4793 | 4797 | | | | | | | | |
| GPARM | 0316 | 0397 | 2759 | | | | | | | | |
| GSIGI | 0884 | 0881 | | | | | | | | | |
| GSIGN | 0878 | 0867 | | | | | | | | | |
| GSIGR | 0888 | 0873 | 0884 | 0907 | | | | | | | |
| GTCON | 1049 | 0767 | 1742 | 1746 | 1923 | | | | | | |
| GTE | 2272 | 6136 | 6136 | | | | | | | | |
| GTEA | 6136 | 6288 | | | | | | | | | |
| GTMP | 0762 | 1522 | 1533 | 1650 | 1920 | 3965 | | | | | |
| GTMP2 | 1697 | 2008 | 2023 | 2028 | | | | | | | |
| GTOPD | 3942 | 3822 | 3866 | 3890 | 3917 | | | | | | |
| GTOPP | 0677 | 3594 | 4549 | 4564 | 5186 | 5195 | 6720 | | | | |
| GTR | 6116 | | | | | | | | | | |
| GTRC1 | 2565 | 2557 | 2559 | | | | | | | | |
| GTRC2 | 2673 | 2579 | | | | | | | | | |
| GTRC3 | 2580 | 2676 | | | | | | | | | |
| GTRCD | 2566 | 2637 | | | | | | | | | |
| GTREQ | 6127 | | | | | | | | | | |
| GTSTA | 0213 | 2373 | 2730 | | | | | | | | |
| HFLGI | 1106 | 0568 | 2442 | 2446 | 5013 | 5015 | | | | | |
| HFLGA | 0568 | 0559 | | | | | | | | | |
| HSTPT | 1087 | 0336 | 0337 | 0338 | 0339 | 0471 | 0472 | 0566 | 0913 | 0914 | 2422 |
| | 2603 | 3179 | 3213 | 3216 | 3230 | 3237 | 3238 | 3240 | 3542 | 3546 | 3547 |
| | 4511 | 5067 | 5068 | 5139 | 5203 | 5204 | 5206 | 5214 | 5222 | 5230 | 5240 |
| | 5272 | 5279 | 5280 | 5290 | 5300 | 5302 | 5312 | 5318 | 5430 | 5431 | 5465 |
| | 5470 | 5473 | 5488 | 5504 | 5507 | 5548 | 5579 | 5604 | 5618 | 5652 | 5653 |
| | 5655 | 5691 | 5694 | 5805 | 5825 | 5833 | 5834 | 5850 | 5855 | 5898 | 5976 |
| | 5977 | 6012 | 6018 | | | | | | | | |
| HUN1 | 2231 | 2238 | | | | | | | | | |
| HUNT | 2230 | 2083 | 2152 | 2160 | 2189 | 2206 | | | | | |
| I | 0067 | 3907 | 6319 | | | | | | | | |
| ICNT | 0308 | 1407 | 3752 | 5111 | | | | | | | |
| IFS | 4917 | 4796 | | | | | | | | | |
| ILFT | 2639 | 2621 | | | | | | | | | |
| ILET1 | 2650 | 2646 | 2662 | | | | | | | | |
| ILETS | 2642 | 4802 | | | | | | | | | |
| IMPOP | 2683 | | | | | | | | | | |
| IMPY | 0893 | 0604 | 3297 | 3301 | 5818 | | | | | | |
| IMPY1 | 0895 | 0906 | | | | | | | | | |
| IMPYR | 0907 | 0897 | 0899 | 0903 | | | | | | | |
| INCHI | 5434 | 5424 | | | | | | | | | |
| INCHA | 5440 | 5411 | | | | | | | | | |
| INCHT | 5428 | 5414 | 5440 | | | | | | | | |
| INCLN | 3017 | 2849 | 3009 | | | | | | | | |
| INCLR | 3033 | 3021 | | | | | | | | | |

CROSS-REFERENCE TABLE

| | | | | | | | | | | | |
|---|---|---|---|---|---|---|---|---|---|---|---|
| INDEX | 1234 | 4097 | 4099 | 4104 | | | | | | | |
| INF | 0077 | 0354 | 2487 | 5001 | | | | | | | |
| INIT1 | 0564 | | | | | | | | | | |
| INITS | 0559 | 0555 | 2163 | 2201 | 2515 | 2830 | 2848 | 4983 | 5051 | | |
| INITV | 1445 | 1567 | | | | | | | | | |
| INREA | 0226 | 5399 | | | | | | | | | |
| INRET | 5401 | 0226 | 5432 | 5435 | | | | | | | |
| INS0 | 1529 | 1513 | | | | | | | | | |
| INS1 | 1532 | 1541 | | | | | | | | | |
| INS2 | 1542 | 1520 | 1536 | | | | | | | | |
| INSRT | 1509 | 1510 | 1570 | | | | | | | | |
| INTC1 | 0599 | 0609 | | | | | | | | | |
| INTC2 | 0610 | 0630 | | | | | | | | | |
| INTCK | 0594 | 0586 | 2592 | | | | | | | | |
| INTEA | 0178 | 2501 | | | | | | | | | |
| INTEL | 1125 | 0009 | 2502 | | | | | | | | |
| INTFL | 0075 | 6721 | | | | | | | | | |
| INTGR | 1187 | 0596 | 0601 | 0602 | 0605 | 0607 | 0610 | 0615 | | | |
| INTOV | 0352 | 0349 | | | | | | | | | |
| IOBUF | 1144 | 0180 | 0180 | 2051 | 2051 | | | | | | |
| IOEND | 2051 | 1834 | | | | | | | | | |
| IOHEA | 0229 | 2707 | | | | | | | | | |
| IOHED | 6650 | 0229 | | | | | | | | | |
| IOST | 1718 | 0225 | 1727 | 1801 | 1805 | | | | | | |
| IOSTA | 0225 | 1032 | 1039 | | | | | | | | |
| JCMND | 2632 | 2628 | | | | | | | | | |
| JTRA | 2074 | 2071 | | | | | | | | | |
| JTRL | 2075 | 2074 | | | | | | | | | |
| K1 | 2242 | 2125 | | | | | | | | | |
| K2 | 2243 | 2126 | | | | | | | | | |
| K3 | 2244 | 2130 | | | | | | | | | |
| K4 | 2245 | 2131 | | | | | | | | | |
| KERR | 2084 | 0244 | 2153 | | | | | | | | |
| KEYFG | 1109 | 1753 | 1944 | 1952 | 1955 | 4734 | 4996 | 4998 | | | |
| KEYIN | 1913 | 1976 | | | | | | | | | |
| KEYN1 | 1936 | 1919 | 1922 | | | | | | | | |
| KEYN2 | 1957 | 1945 | | | | | | | | | |
| KEYN3 | 1944 | 1939 | 1971 | | | | | | | | |
| KEYN4 | 1970 | 1958 | | | | | | | | | |
| KEYN5 | 1952 | 1947 | | | | | | | | | |
| KEYN6 | 1954 | 1937 | | | | | | | | | |
| KEYN7 | 1917 | 1935 | | | | | | | | | |
| KEYPR | 2061 | 1326 | | | | | | | | | |
| KILLK | 2508 | | | | | | | | | | |
| KILLP | 2510 | 2966 | | | | | | | | | |
| KILLV | 2514 | 2965 | | | | | | | | | |
| KTRA | 2080 | 2065 | | | | | | | | | |
| KTRL | 2319 | 2080 | 2080 | | | | | | | | |
| L | 1232 | 4117 | 4122 | 4141 | 4149 | 4169 | 4179 | 4180 | 4189 | | |
| L1 | 3739 | 3758 | | | | | | | | | |
| L100 | 3752 | 3745 | | | | | | | | | |
| L11 | 3844 | 3821 | 3836 | 3885 | 3895 | 3904 | | | | | |
| L12 | 3838 | 3831 | | | | | | | | | |
| L13 | 3862 | 3852 | | | | | | | | | |
| L15 | 3887 | 3824 | | | | | | | | | |
| L16 | 3912 | 3889 | | | | | | | | | |
| L19 | 3903 | 3898 | 3908 | 3910 | | | | | | | |
| L20 | 3905 | 3900 | | | | | | | | | |
| L23 | 3814 | 3799 | 3862 | 3925 | | | | | | | |
| L25 | 3927 | 3808 | | | | | | | | | |
| L28 | 3938 | 3781 | 3789 | | | | | | | | |
| L29 | 3880 | 3854 | | | | | | | | | |
| L2T1 | 1132 | 0885 | 0887 | 2092 | 2146 | 2997 | 2994 | 3289 | 3294 | 3298 | 3400 |
| | 4869 | 4875 | 5810 | 5819 | | | | | | | |
| L2T2 | 1133 | 2988 | 2990 | 2993 | 3005 | 3011 | 3401 | 4272 | 4277 | 4579 | 5804 |
| | 5815 | 5817 | 5983 | 6006 | | | | | | | |
| L3 | 3864 | 3857 | | | | | | | | | |
| L4 | 3826 | 3816 | | | | | | | | | |
| L6 | 3805 | 3878 | | | | | | | | | |
| L8 | 3890 | | | | | | | | | | |
| L9 | 3917 | 3827 | | | | | | | | | |
| LASTN | 1183 | 0807 | 1498 | 2461 | 2467 | | | | | | |
| LBL1 | 2283 | 1628 | 1628 | | | | | | | | |
| LBOP | 0119 | 2684 | 6355 | | | | | | | | |
| LBRAC | 6122 | | | | | | | | | | |
| LOFF | 0920 | 2145 | 2151 | 2159 | 2187 | 2513 | 2897 | 2967 | 5050 | 5631 | |
| LEFT | 1885 | 1353 | 1987 | | | | | | | | |
| LETCK | 0657 | 0845 | 1332 | 2645 | 6158 | | | | | | |
| LETS | 2690 | 4781 | | | | | | | | | |
| LETSN | 2698 | 2648 | 2690 | | | | | | | | |
| LIMIT | 0660 | 0651 | 3856 | | | | | | | | |
| LIST | 3728 | | | | | | | | | | |
| LIST1 | 3734 | 2043 | | | | | | | | | |
| LISTA | 0167 | 2418 | | | | | | | | | |
| LISTC | 2409 | 2290 | | | | | | | | | |
| LISTR | 2043 | 1504 | | | | | | | | | |
| LISTS | 3762 | 3743 | | | | | | | | | |
| LLIMT | 0649 | 0657 | | | | | | | | | |
| LLL | 3783 | 3769 | | | | | | | | | |
| LMSGA | 2834 | 2797 | | | | | | | | | |

CROSS-REFERENCE TABLE

| | | | | | | | | | | | |
|---|---|---|---|---|---|---|---|---|---|---|---|
| LN72 | 4770 | 4361 | | | | | | | | | |
| LNFD | 0072 | 1035 | 1823 | | | | | | | | |
| LNINC | 1100 | 1281 | 1292 | 1295 | 1298 | 1427 | 1432 | 2404 | 2475 | 2518 | 2556 |
| | 2624 | 2991 | 3017 | 3023 | 3750 | 5073 | | | | | |
| LNUM | 0573 | 2383 | 2390 | 2425 | 2460 | 2466 | 4921 | 6635 | 6662 | | |
| LOCL1 | 1130 | 0395 | 0403 | 0455 | 0511 | 0660 | 0666 | 0690 | 0751 | 0759 | 1014 |
| | 1017 | 1205 | 2086 | 2101 | 3402 | 3466 | 3541 | 3549 | 3566 | 3797 | 4253 |
| | 4470 | 4482 | 4486 | 4487 | 4488 | 4489 | 4493 | 4620 | 4631 | 4639 | 4652 |
| | 5028 | 5117 | 5154 | 5155 | 5158 | 5349 | 5563 | 5566 | 5728 | 5733 | 6711 |
| LOCL2 | 1131 | 0396 | 0401 | 0405 | 0717 | 0729 | 1206 | 1659 | 1830 | 3403 | 3918 |
| | 3922 | 4633 | 4649 | 4655 | 5726 | 5729 | | | | | |
| LPARN | 6123 | | | | | | | | | | |
| LPCK | 0425 | 0432 | 6200 | 6353 | | | | | | | |
| LPCKE | 0432 | 6514 | 6651 | | | | | | | | |
| LPOP | 0120 | 0428 | | | | | | | | | |
| LPTR | 1627 | | | | | | | | | | |
| LROMA | 0123 | 0517 | 5675 | | | | | | | | |
| LSS | 6117 | | | | | | | | | | |
| LSSEQ | 6128 | | | | | | | | | | |
| LSTAK | 1084 | 3181 | 3183 | 3186 | 3187 | 3188 | 3200 | 3209 | 3221 | 3224 | 3227 |
| | 5064 | 5089 | 5132 | 5136 | 5991 | 5996 | | | | | |
| LSTC1 | 2413 | 2428 | | | | | | | | | |
| LSTC2 | 2425 | 2411 | | | | | | | | | |
| LSTPT | 1086 | 0474 | 0484 | 0485 | 0491 | 0492 | 0563 | 2420 | 3054 | 3164 | 3165 |
| | 3171 | 3180 | 3232 | 4506 | 4534 | 4535 | 5059 | 5066 | 5078 | 5088 | 5128 |
| | 5133 | 5177 | 5178 | 5527 | 5539 | 5540 | 5573 | 5574 | 5580 | 5581 | 5611 |
| | 5613 | 5669 | 5672 | 5676 | 5682 | 5683 | 5685 | 5686 | 5707 | 5709 | 5727 |
| | 5730 | 5732 | 5783 | 5798 | 5821 | 5824 | 5835 | 5894 | 5997 | 6001 | 6437 |
| | 6738 | 6740 | | | | | | | | | |
| LTADD | 2678 | 2545 | | | | | | | | | |
| LTR | 0844 | 6301 | 6453 | 6507 | | | | | | | |
| LTRUE | 5938 | 5943 | 5953 | | | | | | | | |
| LWAM | 1080 | 0552 | 2498 | 6605 | | | | | | | |
| M1 | 0124 | 0296 | 0562 | 0825 | 0832 | 0883 | 1010 | 1064 | 1408 | 1464 | 1531 |
| | 1793 | 1954 | 1960 | 1980 | 2193 | 2497 | 2535 | 2604 | 2619 | 2673 | 2722 |
| | 2734 | 2810 | 2824 | 3004 | 3055 | 3068 | 3072 | 3095 | 3097 | 3102 | 3106 |
| | 3136 | 3190 | 3201 | 3235 | 3443 | 3463 | 3609 | 3695 | 3698 | 3749 | 3798 |
| | 3801 | 3828 | 3931 | 4057 | 4060 | 4068 | 4136 | 4171 | 4285 | 4302 | 4611 |
| | 4617 | 4628 | 4637 | 5138 | 5499 | 5554 | 5594 | 5603 | 5692 | 5796 | 5802 |
| | 5806 | 6152 | 6246 | 6253 | 6364 | 6366 | 6377 | 6473 | 6671 | | |
| M10 | 0131 | 1319 | 1795 | 4100 | 4161 | 5202 | 5675 | | | | |
| MDIM | 3289 | 0208 | 3123 | 3211 | | | | | | | |
| MDIM1 | 3307 | 3292 | | | | | | | | | |
| MDIM2 | 3305 | 3291 | 3293 | 3303 | 3310 | | | | | | |
| MDIMA | 0208 | 6585 | | | | | | | | | |
| MDMA | 3710 | 3074 | | | | | | | | | |
| MER10 | 3198 | 0272 | | | | | | | | | |
| MER11 | 5018 | 0284 | | | | | | | | | |
| MER5 | 3108 | 0269 | 3088 | | | | | | | | |
| MER8 | 0477 | 0479 | 4523 | | | | | | | | |
| MER9 | 3304 | 0273 | | | | | | | | | |
| MERR | 2837 | 3108 | 3134 | 3198 | 3304 | 3368 | 3385 | | | | |
| MINIT | 0552 | 2514 | 2829 | 3040 | | | | | | | |
| MINS | 6112 | | | | | | | | | | |
| MINUS | 1239 | 4095 | 4232 | | | | | | | | |
| MISOF | 2389 | 0259 | | | | | | | | | |
| ML2L | 3089 | 3081 | | | | | | | | | |
| MLOP2 | 3149 | 3066 | 3071 | 3089 | 3111 | 3117 | 3151 | | | | |
| MLOP5 | 3084 | 3079 | | | | | | | | | |
| MLOP7 | 3073 | | | | | | | | | | |
| MLOP8 | 3092 | 3080 | | | | | | | | | |
| MLOP9 | 3113 | 3085 | 3105 | | | | | | | | |
| MLP71 | 3154 | 3077 | | | | | | | | | |
| MLP72 | 3075 | 3157 | | | | | | | | | |
| MO1 | 4753 | 4745 | 4746 | | | | | | | | |
| MO2 | 4750 | 4752 | | | | | | | | | |
| MODE | 1090 | 1270 | 1315 | 1394 | 2434 | 2577 | 2583 | 2587 | 2613 | 2625 | 2655 |
| | 2660 | 2781 | 2819 | 2823 | 2856 | 2858 | 3056 | 4052 | 4150 | 4303 | 4329 |
| | 4514 | 4517 | 4520 | 4985 | 5007 | 5035 | 5148 | 5648 | | | |
| MOUT | 4745 | 4075 | 4076 | 4177 | 4194 | 4211 | 4399 | | | | |
| MOUTA | 1626 | 1364 | | | | | | | | | |
| MOVC1 | 3549 | 3554 | | | | | | | | | |
| MOVC2 | 3555 | 3550 | | | | | | | | | |
| MOVCK | 3539 | 3214 | 3409 | 3427 | 3441 | | | | | | |
| MOVST | 5726 | 5616 | 5704 | | | | | | | | |
| MREM | 3713 | 3567 | | | | | | | | | |
| MSFLG | 1174 | 2602 | 2698 | 6204 | 6213 | 6222 | 6255 | 6399 | 6407 | 6421 | 6577 |
| | 6583 | | | | | | | | | | |
| MSK65 | 1622 | 1316 | 1327 | | | | | | | | |
| MSKIP | 3060 | 3065 | 3150 | | | | | | | | |
| MSLPT | 4769 | 4394 | 4413 | | | | | | | | |
| MSTND | 3067 | 3152 | | | | | | | | | |
| MVTOH | 0821 | 0828 | 1406 | 2172 | 2902 | 5220 | 5681 | 6005 | | | |
| N | 4771 | 3914 | | | | | | | | | |
| N1 | 4150 | 4143 | 4146 | 4148 | | | | | | | |
| N2 | 4137 | 4131 | | | | | | | | | |
| N4 | 4145 | | | | | | | | | | |
| N6 | 4147 | | | | | | | | | | |
| N7 | 4164 | 4158 | | | | | | | | | |
| NCALC | 2617 | 0237 | | | | | | | | | |

CROSS-REFERENCE TABLE

| | | | | | | | | | | | |
|---|---|---|---|---|---|---|---|---|---|---|---|
| NDATA | 2334 | 0257 | | | | | | | | | |
| NDISP | 1167 | 1023 | 1653 | 1667 | 2523 | 2558 | 2831 | 4255 | 5120 | | |
| NDWRT | 1023 | 1413 | 2779 | 3753 | 4465 | 4477 | 4526 | 4727 | 5024 | | |
| NEWK | 2167 | 2161 | | | | | | | | | |
| NEWK1 | 2181 | 2222 | | | | | | | | | |
| NEXT1 | 0509 | 3465 | 3790 | 3919 | 5096 | 5560 | | | | | |
| NEXTA | 0691 | 0503 | 0808 | 2874 | 2908 | 3008 | 3762 | 4689 | 5404 | 5650 | |
| NEXTL | 0499 | 3565 | 5026 | 5348 | | | | | | | |
| NEXTS | 4910 | 4794 | | | | | | | | | |
| NGOTO | 5168 | 0278 | | | | | | | | | |
| NINIT | 3423 | 0275 | | | | | | | | | |
| NM1 | 4036 | 4027 | | | | | | | | | |
| NM2 | 4035 | 4030 | | | | | | | | | |
| NM3 | 4026 | 4039 | | | | | | | | | |
| NM4 | 4040 | 4032 | 4034 | | | | | | | | |
| NMOTA | 0200 | | | | | | | | | | |
| NMOUT | 4023 | 0200 | 3835 | 4433 | | | | | | | |
| NN | 4165 | 4155 | 4162 | 4175 | | | | | | | |
| NN1 | 4166 | 4160 | | | | | | | | | |
| NN10 | 4184 | 4182 | | | | | | | | | |
| NN11 | 4199 | | | | | | | | | | |
| NN2 | 4178 | 4130 | 4164 | | | | | | | | |
| NN3 | 4159 | 4153 | | | | | | | | | |
| NN4 | 4195 | 4185 | 4191 | 4192 | | | | | | | |
| NN5 | 4186 | 4188 | | | | | | | | | |
| NN6 | 4217 | 4199 | 4213 | | | | | | | | |
| NN7 | 4212 | 4216 | | | | | | | | | |
| NOFOF | 0857 | 0241 | 2663 | | | | | | | | |
| NOFMT | 4696 | 4710 | | | | | | | | | |
| NOPCD | 5193 | 5256 | | | | | | | | | |
| NORML | 4959 | 2286 | | | | | | | | | |
| NOST | 4867 | 0253 | | | | | | | | | |
| NOTA | 6135 | 6227 | | | | | | | | | |
| NOTOP | 6126 | | | | | | | | | | |
| NPRIN | 1168 | 1016 | 1020 | 1660 | 1666 | 2524 | | | | | |
| NPWRT | 1020 | 1375 | 2550 | 2790 | 2798 | | | | | | |
| NSTMT | 2658 | 0239 | 2649 | 2656 | | | | | | | |
| NUM | 1181 | 1182 | 6677 | 6691 | 6694 | 6704 | 6710 | | | | |
| NUMCA | 0211 | 0869 | 6209 | | | | | | | | |
| NUMOA | 0212 | 2335 | 6211 | | | | | | | | |
| NXT1L | 3593 | 3603 | 3605 | | | | | | | | |
| NXTDT | 1089 | 3656 | 5372 | 5373 | 5448 | 5646 | | | | | |
| NXTOP | 3565 | 3064 | 3628 | | | | | | | | |
| NXTP1 | 3583 | 3149 | 3573 | 3593 | 3595 | 3611 | 3618 | 3631 | | | |
| NXTP2 | 3575 | 3591 | | | | | | | | | |
| NXTP3 | 3598 | 3588 | | | | | | | | | |
| NXTP4 | 3612 | 3602 | | | | | | | | | |
| NXTPR | 3558 | 3572 | | | | | | | | | |
| NXTST | 1190 | 1386 | 3039 | 4986 | | | | | | | |
| OBLNK | 0715 | 3784 | 3811 | 3871 | 4237 | 4383 | | | | | |
| ODGIT | 1000 | 4081 | 4086 | 4186 | 4214 | | | | | | |
| OF | 0961 | 0952 | | | | | | | | | |
| OFA | 2396 | 2387 | | | | | | | | | |
| OFFA | 1629 | 1371 | | | | | | | | | |
| OFLT | 4051 | 4165 | | | | | | | | | |
| OFXD | 4114 | 4043 | | | | | | | | | |
| OL1 | 4730 | 4722 | | | | | | | | | |
| OL2 | 4731 | 4725 | | | | | | | | | |
| OL3 | 4728 | 4735 | 4738 | | | | | | | | |
| OLINE | 4719 | 0169 | 4340 | | | | | | | | |
| ONE | 0045 | 5234 | 5900 | | | | | | | | |
| ONEXT | 0716 | 1002 | 1288 | 1352 | 1400 | 1658 | 1829 | 1847 | 3748 | 3771 | 3789 |
| | 3861 | 3881 | 3884 | 3892 | 3903 | 3913 | 3915 | 4085 | 4090 | 4098 | 4103 |
| | 4196 | 4201 | 4233 | 4750 | 5110 | | | | | | |
| OPC1 | 6029 | 5294 | 6032 | | | | | | | | |
| OPC2 | 6031 | 6024 | | | | | | | | | |
| OPC3 | 6033 | 6014 | | | | | | | | | |
| OPCH1 | 6021 | 5263 | 5289 | | | | | | | | |
| OPCHA | 0171 | 0912 | | | | | | | | | |
| OPCHK | 6012 | 0171 | 5571 | 5972 | 5982 | | | | | | |
| OPDMK | 0079 | 0678 | 4281 | 5483 | | | | | | | |
| OPMSK | 0076 | 0466 | 0513 | 0546 | 2242 | 3589 | 3592 | 3819 | 3820 | 3850 | 4561 |
| | 4568 | 4593 | 4615 | 4704 | | | | | | | |
| OPTYP | 1182 | 6304 | 6324 | 6333 | 6465 | | | | | | |
| OR | 2267 | 6134 | 6134 | 6135 | 6135 | | | | | | |
| ORA | 6134 | 6281 | | | | | | | | | |
| OROP | 6124 | | | | | | | | | | |
| OS1 | 4234 | 4231 | | | | | | | | | |
| OSIGN | 4230 | 4080 | 4178 | | | | | | | | |
| OTPTR | 1078 | 1706 | 1735 | 1863 | 1864 | 1873 | 1878 | 1888 | 1890 | 1899 | 1902 |
| OUTCR | 0717 | 1350 | 1526 | 1538 | 1545 | 1950 | 1968 | | | | |
| OUTIA | 0179 | 1301 | 2423 | 2562 | 2793 | 2800 | 3783 | 3842 | 4105 | 5108 | |
| OVCHA | 0216 | 2171 | | | | | | | | | |
| OVCHK | 2942 | 0216 | 2901 | 2929 | | | | | | | |
| OVCK | 4415 | 4310 | | | | | | | | | |
| OVFW | 0971 | 0965 | | | | | | | | | |
| P1 | 1801 | 1812 | 1815 | 1818 | 1820 | 1826 | 1828 | 1836 | 1844 | | |
| P2 | 1837 | 1832 | | | | | | | | | |
| P3 | 1816 | 1810 | | | | | | | | | |
| P4 | 1806 | 1814 | | | | | | | | | |

CROSS-REFERENCE TABLE

| | | | | | | | | | | | |
|---|---|---|---|---|---|---|---|---|---|---|---|
| P5 | 1842 | 1822 | | | | | | | | | |
| P6 | 1835 | 1845 | | | | | | | | | |
| P7 | 1846 | 1802 | 1806 | | | | | | | | |
| PAL | 1459 | 1572 | | | | | | | | | |
| PARMA | 1091 | 5619 | 5719 | | | | | | | | |
| PARMN | 1092 | 3659 | 5489 | 5661 | 5717 | | | | | | |
| PBPTO | 1098 | 0561 | 0924 | 2598 | 2915 | 2924 | 2942 | 2947 | 3032 | 3184 | 3233 |
| | 3481 | 3684 | 3706 | 6614 | | | | | | | |
| PBPTR | 1095 | 0796 | 0925 | 1551 | 2221 | 2440 | 2444 | 2879 | 2880 | 2925 | 2927 |
| | 2998 | 3031 | 3047 | 3062 | 3482 | 3496 | 3529 | 3626 | 3672 | 3683 | 5017 |
| | 5104 | 5345 | 5622 | 6597 | 6613 | | | | | | |
| PBUFA | 5596 | 5670 | | | | | | | | | |
| PBUFF | 1096 | 0795 | 0923 | 1487 | 1496 | 1550 | 1554 | 2180 | 2181 | 2199 | 2200 |
| | 2215 | 2218 | 2599 | 2876 | 2895 | 2996 | 3030 | 3046 | 3049 | 3127 | 3154 |
| | 3450 | 3640 | 3655 | 3705 | 5445 | 5626 | 5644 | 5678 | 5696 | 6598 | 6612 |
| PBUFO | 1097 | 0922 | 2216 | 2933 | 2935 | 3130 | 3483 | 3702 | | | |
| PEND | 1150 | 0719 | 1268 | 1286 | 1290 | 1399 | 3747 | 3765 | 4362 | 4416 | 4513 |
| | 4522 | | | | | | | | | | |
| PEXM1 | 2552 | 2530 | 2544 | | | | | | | | |
| PEXM2 | 2525 | 2832 | | | | | | | | | |
| PEXM3 | 2537 | 2526 | | | | | | | | | |
| PEXMA | 0165 | 2405 | 2424 | 5074 | 5401 | | | | | | |
| PEXMK | 2522 | 0165 | 2567 | 2569 | 2636 | 2850 | | | | | |
| PFLAG | 1176 | 2723 | 2735 | 2737 | | | | | | | |
| PFOR1 | 4361 | 4269 | | | | | | | | | |
| PFORM | 4352 | 4287 | 4290 | 4406 | 4479 | | | | | | |
| PGIN0 | 0832 | 2360 | 4946 | | | | | | | | |
| PGINT | 0580 | 0834 | 2348 | 2355 | 6365 | 6376 | | | | | |
| PI/2 | 0044 | | | | | | | | | | |
| PIA | 6050 | 6046 | | | | | | | | | |
| PLACE | 1169 | 3834 | 3864 | 3872 | 4028 | 4051 | 4128 | 4156 | 4159 | 4234 | 4429 |
| | 4505 | | | | | | | | | | |
| PLINE | 5101 | 5023 | 5116 | | | | | | | | |
| PLOTE | 4673 | | | | | | | | | | |
| PLUS | 1238 | 4093 | | | | | | | | | |
| PLUSS | 6111 | 6257 | | | | | | | | | |
| PMODE | 1114 | 1015 | 1027 | 1367 | 1370 | 1410 | 1670 | 1672 | 2507 | 2773 | 4365 |
| | 5118 | | | | | | | | | | |
| POINT | 1240 | 4084 | 4200 | | | | | | | | |
| POV | 4297 | 4312 | | | | | | | | | |
| PPFF | 1151 | | | | | | | | | | |
| PR11 | 4307 | 4304 | | | | | | | | | |
| PR17 | 4348 | 4345 | | | | | | | | | |
| PR2 | 4344 | 4336 | 4337 | 4339 | 4539 | | | | | | |
| PR3 | 4338 | 4341 | | | | | | | | | |
| PR5 | 4280 | 4271 | | | | | | | | | |
| PR6 | 4302 | 4295 | | | | | | | | | |
| PR7 | 4310 | 4279 | | | | | | | | | |
| PRADD | 1093 | 0483 | 0490 | 0497 | 0504 | 1382 | 1392 | 1395 | 2818 | 3051 | 3060 |
| | 3490 | 3506 | 3525 | 3585 | 3622 | 3625 | 3662 | 4314 | 4547 | 4552 | 4971 |
| | 4992 | 5012 | 5056 | 5094 | 5103 | 5106 | 5150 | 5152 | 5182 | 5237 | 5245 |
| | 5344 | 5362 | 5370 | 5378 | 5382 | 5398 | 5405 | 5419 | 5510 | 5651 | 5664 |
| | 6718 | 6734 | 6737 | | | | | | | | |
| PRALL | 1366 | 1458 | | | | | | | | | |
| PRCHK | 4365 | 4346 | 4420 | 4723 | | | | | | | |
| PRCHR | 4382 | 4366 | 4368 | 4395 | | | | | | | |
| PRFED | 1789 | 1273 | | | | | | | | | |
| PRFLG | 1117 | 1214 | 1674 | 2806 | 4284 | 4328 | 4352 | 4360 | 4367 | 4670 | |
| PRIN1 | 2717 | 2736 | 2752 | | | | | | | | |
| PRIN2 | 2726 | 2718 | 2721 | | | | | | | | |
| PRIN3 | 2737 | 2728 | | | | | | | | | |
| PRIN4 | 2749 | 2741 | | | | | | | | | |
| PRIN5 | 2751 | 2748 | | | | | | | | | |
| PRINN | 4266 | 4338 | | | | | | | | | |
| PRINS | 2712 | 4783 | 4786 | | | | | | | | |
| PRNTS | 2722 | 2657 | 2712 | | | | | | | | |
| PROD | 1206 | 0900 | 0905 | | | | | | | | |
| PRTOP | 2684 | 2651 | | | | | | | | | |
| PTAPE | 2532 | 2282 | | | | | | | | | |
| QMRKA | 2681 | 2528 | | | | | | | | | |
| QOV | 4272 | 4299 | | | | | | | | | |
| QTCH1 | 4577 | 4242 | 4563 | 4570 | | | | | | | |
| QTCH2 | 4590 | 4575 | | | | | | | | | |
| QTCH3 | 4573 | 4565 | | | | | | | | | |
| QTCHA | 0230 | | | | | | | | | | |
| QTCHK | 4560 | 0230 | 4270 | 4475 | | | | | | | |
| QTOP | 0109 | 0161 | 0519 | 1244 | 2483 | 2683 | 3590 | 4562 | 4569 | 4621 | 4873 |
| | 6180 | | | | | | | | | | |
| QUOT | 6103 | | | | | | | | | | |
| QUOTE | 4242 | 3882 | | | | | | | | | |
| R | 1231 | 4054 | 4061 | 4064 | 4066 | 4077 | 4082 | 4087 | 4127 | 4132 | 4137 |
| | 4166 | 4197 | 4205 | 4208 | 4209 | 4212 | 4215 | | | | |
| RBASE | 1235 | 4119 | 4123 | 4139 | 4202 | | | | | | |
| RBOP | 0117 | 2686 | 2745 | 6383 | | | | | | | |
| RBRAC | 6107 | | | | | | | | | | |
| RBUFF | 1145 | 0181 | 0181 | 0198 | 0202 | 0202 | 1627 | 1627 | 2046 | 2866 | 2868 |
| | 2869 | 4769 | 4769 | 4770 | 4770 | 6641 | 6642 | | | | |
| RCAL | 2082 | 2067 | | | | | | | | | |
| RCOUT | 1118 | 4600 | 4612 | 4650 | 4673 | | | | | | |
| RDYDA | 0166 | 1390 | 1552 | 1848 | 2190 | 2202 | 2447 | 3048 | 4941 | 4948 | 4963 |

CROSS-REFERENCE TABLE

| | | | | | | | | | | | |
|---|---|---|---|---|---|---|---|---|---|---|---|
| RDYPT | 2516 | 0166 | 2980 | 3013 | | | | | | | |
| RE1 | 1740 | 1761 | | | | | | | | | |
| RE2 | 1762 | 1755 | 1758 | | | | | | | | |
| RE3 | 1743 | | | | | | | | | | |
| RE4 | 1747 | | | | | | | | | | |
| READS | 6624 | 4784 | 4787 | 6629 | | | | | | | |
| REF | 1285 | 1283 | | | | | | | | | |
| REFD | 0161 | 2499 | | | | | | | | | |
| REFD1 | 1267 | | | | | | | | | | |
| REFD2 | 1327 | 1317 | 1320 | | | | | | | | |
| REED3 | 1336 | 1328 | 1333 | | | | | | | | |
| REFD4 | 1299 | 1296 | | | | | | | | | |
| REED5 | 1344 | 1330 | 1335 | 1421 | 1451 | | | | | | |
| REFD6 | 1306 | 1293 | 1299 | 1354 | 1365 | 1441 | 1508 | 1530 | 1546 | 1857 | 1862 |
| | 1866 | 1877 | 1879 | 2090 | 2110 | 2119 | 2122 | | | | |
| REED7 | 1294 | 1284 | | | | | | | | | |
| REED8 | 1417 | 1358 | | | | | | | | | |
| REED9 | 1352 | 1348 | | | | | | | | | |
| REFDD | 1356 | 1338 | | | | | | | | | |
| REFDE | 1277 | 1376 | | | | | | | | | |
| REFDG | 1308 | 1304 | | | | | | | | | |
| REEDL | 1124 | 2500 | 2566 | 3751 | | | | | | | |
| REFDT | 1414 | 1409 | 1411 | | | | | | | | |
| REFRA | 4767 | 4733 | | | | | | | | | |
| REFRS | 1735 | 1970 | 4767 | | | | | | | | |
| REMS | 6640 | 4798 | | | | | | | | | |
| RENM1 | 2994 | 3012 | | | | | | | | | |
| RENM2 | 2997 | 3010 | | | | | | | | | |
| RENM3 | 3007 | | | | | | | | | | |
| RENM4 | 3011 | 2999 | 3001 | | | | | | | | |
| RENUM | 2984 | 2285 | | | | | | | | | |
| RES | 1202 | 0184 | | | | | | | | | |
| RESA | 1630 | 1452 | | | | | | | | | |
| RESB1 | 0538 | 0544 | 2082 | | | | | | | | |
| RESBP | 0544 | 2385 | 2650 | 6186 | 6231 | | | | | | |
| RET2 | 0301 | 0293 | 0810 | 0811 | 2464 | 4905 | | | | | |
| RETA | 1668 | 1677 | | | | | | | | | |
| RETN2 | 0294 | 0417 | 0444 | 0459 | 0619 | 0673 | 0781 | 0850 | 0871 | 1415 | 1728 |
| | 1841 | 1988 | 2013 | 2236 | 2468 | 2703 | 3261 | 3384 | 3397 | 3614 | 3630 |
| | 3633 | 4315 | 4321 | 4369 | 4409 | 4418 | 4424 | 4553 | 4589 | 4692 | 6340 |
| | 6403 | 6456 | 6713 | | | | | | | | |
| RETN3 | 0293 | 3269 | 3277 | 3596 | 4554 | 6315 | 6336 | | | | |
| RETNN | 5707 | 5185 | | | | | | | | | |
| RETNS | 6527 | 4792 | | | | | | | | | |
| RFNX | 2124 | 2097 | | | | | | | | | |
| RFNX1 | 1453 | 2143 | | | | | | | | | |
| RIGHT | 1899 | 1985 | | | | | | | | | |
| RIT3L | 1655 | 1647 | | | | | | | | | |
| RITE | 2707 | 4777 | | | | | | | | | |
| RITE1 | 1650 | 1664 | | | | | | | | | |
| RITE2 | 1663 | 1656 | 1661 | | | | | | | | |
| RITE3 | 1665 | 1655 | 1713 | | | | | | | | |
| RITE4 | 1660 | 1657 | | | | | | | | | |
| RL3 | 4128 | | | | | | | | | | |
| RL4 | 4124 | 4121 | | | | | | | | | |
| RND | 3992 | 4079 | 4145 | | | | | | | | |
| RND2 | 3989 | 3997 | | | | | | | | | |
| ROUND | 0987 | | | | | | | | | | |
| RPARN | 6106 | | | | | | | | | | |
| RPCK | 0438 | 0447 | 6237 | | | | | | | | |
| RPCKE | 0447 | 2708 | 6382 | 6518 | | | | | | | |
| RPOP | 0115 | 0441 | | | | | | | | | |
| RRUN | 2145 | 2128 | 2133 | | | | | | | | |
| RSAVE | 1077 | 0294 | 0298 | 0301 | 0305 | 4618 | 4627 | 4629 | 4640 | | |
| RSCH1 | 6001 | | | | | | | | | | |
| RSCH2 | 6006 | 5993 | | | | | | | | | |
| RSCHK | 5988 | 5466 | 5572 | 5621 | 5897 | | | | | | |
| RSLT | 1448 | 1568 | | | | | | | | | |
| RSLT1 | 1440 | 1455 | | | | | | | | | |
| RSLTE | 1158 | | | | | | | | | | |
| RSPTR | 1203 | 0295 | 0302 | 0316 | 2511 | 2553 | 2764 | 2765 | 2855 | 3515 | 4006 |
| | 4616 | 4982 | 5553 | 5556 | 5582 | 5583 | 5593 | 5596 | 5598 | 6284 | 6392 |
| | 6394 | 6395 | 6410 | 6411 | 6413 | 6712 | | | | | |
| RSTAK | 1201 | | | | | | | | | | |
| RSTKA | 0158 | 2510 | 2552 | 2854 | 4981 | 5599 | 6391 | 6414 | | | |
| RSTRS | 6633 | 4785 | | | | | | | | | |
| RSTT | 3522 | 3485 | 3688 | | | | | | | | |
| RSULT | 0336 | 4970 | 5417 | 5788 | | | | | | | |
| RUN | 3039 | 0163 | 2292 | | | | | | | | |
| RUNA | 0163 | 1446 | 2156 | | | | | | | | |
| S | 0082 | 3909 | 6317 | | | | | | | | |
| SALT | 6671 | 0207 | | | | | | | | | |
| SALT1 | 6676 | 6681 | | | | | | | | | |
| SALTA | 0207 | 2578 | 2609 | 2620 | 2674 | 6173 | | | | | |
| SAROW | 1550 | 1473 | 1489 | | | | | | | | |
| SAVBP | 0530 | 2061 | 2381 | 2647 | | | | | | | |
| SAVE | 1213 | 2574 | 2675 | 5363 | 5369 | | | | | | |
| SAVEA | 1110 | | | | | | | | | | |
| SAVEB | 1111 | | | | | | | | | | |
| SBADR | 1179 | 0531 | 0538 | | | | | | | | |

CROSS-REFERENCE TABLE

| | | | | | | | | | | | |
|---|---|---|---|---|---|---|---|---|---|---|---|
| SHLOC | 4595 | 4590 | | | | | | | | | |
| SHPTR | 1172 | 0377 | 0381 | 0382 | 0383 | 0458 | 0532 | 0541 | 0545 | 0547 | 0574 |
| | 0580 | 0611 | 2775 | 0836 | 0855 | 1221 | 2332 | 2350 | 2368 | 2611 | 2612 |
| | 2652 | 2653 | 2654 | 2669 | 2710 | 2729 | 2733 | 2746 | 2772 | 2791 | 2809 |
| | 2864 | 4510 | 4524 | 4868 | 4898 | 4899 | 4902 | 5081 | 5410 | 6168 | 6175 |
| | 6185 | 6188 | 6189 | 6193 | 6199 | 6230 | 6232 | 6241 | 6280 | 6286 | 6356 |
| | 6384 | 6385 | 6386 | 6460 | 6576 | 6650 | 6655 | 6659 | 6661 | | |
| SHPUD | 0382 | 0442 | 0583 | 0616 | 2744 | 4906 | | | | | |
| SHSC1 | 6379 | 6370 | 6373 | 6378 | | | | | | | |
| SHSC2 | 6382 | 6428 | 6431 | | | | | | | | |
| SHSC3 | 6405 | 6361 | | | | | | | | | |
| SHSCK | 6353 | 6338 | | | | | | | | | |
| SHSCR | 6403 | 6388 | | | | | | | | | |
| SHUFA | 0199 | 0774 | 0791 | 1403 | 1430 | 2862 | 2889 | 5080 | | | |
| SCCNT | 5892 | 5895 | | | | | | | | | |
| SCFRR | 4665 | 0277 | | | | | | | | | |
| SCMMA | 6128 | 6372 | 6427 | | | | | | | | |
| SCRAT | 2958 | 2291 | | | | | | | | | |
| SCRK | 2967 | 2963 | | | | | | | | | |
| SCRP | 3029 | 2512 | 2600 | | | | | | | | |
| SEC | 1105 | | | | | | | | | | |
| SFRF1 | 3516 | 3473 | | | | | | | | | |
| SFRFN | 3506 | 3451 | 3484 | 3514 | | | | | | | |
| SFRFR | 3498 | 3509 | | | | | | | | | |
| SFLAG | 1178 | 2608 | 2700 | 6247 | 6266 | 6363 | 6369 | 6391 | 6470 | 6474 | 6578 |
| | 6584 | | | | | | | | | | |
| SFMT | 4661 | 4439 | | | | | | | | | |
| SFMT1 | 4681 | 4709 | | | | | | | | | |
| SFMT2 | 4694 | 4680 | | | | | | | | | |
| SGNS | 1004 | 5908 | | | | | | | | | |
| SIGN | 1184 | 0868 | 0872 | 1185 | 6208 | | | | | | |
| SLCOD | 1113 | 1041 | 1721 | 1790 | 1838 | 2427 | 2540 | 2581 | 2787 | 4354 | 4358 |
| | 4672 | | | | | | | | | | |
| SLEND | 0202 | 1267 | 1529 | 3764 | | | | | | | |
| SLWST | 0484 | 4353 | 4355 | 4448 | 4471 | 5084 | 5087 | 5090 | 5092 | 5093 | 5480 |
| | 5557 | 5565 | 5597 | 5606 | 5608 | 5896 | 6719 | | | | |
| SM2L | 3362 | 3352 | | | | | | | | | |
| SMCLN | 6105 | | | | | | | | | | |
| SNFLA | 0197 | 3832 | 5367 | 5467 | | | | | | | |
| SPAGF | 6691 | 6674 | 6676 | | | | | | | | |
| SPLFA | 0196 | 6031 | | | | | | | | | |
| SPRDD | 1212 | 5396 | 5397 | 5403 | | | | | | | |
| SSAPT | 1180 | 0533 | 0540 | | | | | | | | |
| SSTT | 3490 | 3449 | 3661 | | | | | | | | |
| SSYM1 | 3348 | 3355 | | | | | | | | | |
| SSYM2 | 3376 | 3362 | 3367 | 3373 | | | | | | | |
| SSYM3 | 3385 | 0270 | 3377 | 3380 | | | | | | | |
| SSYM4 | 3358 | 3349 | | | | | | | | | |
| SSYM5 | 3369 | 3364 | | | | | | | | | |
| SSYM6 | 3353 | 3360 | | | | | | | | | |
| SSYMA | 0170 | 5196 | 5495 | | | | | | | | |
| SSYMT | 3328 | 0170 | 3084 | 3104 | | | | | | | |
| ST | 1162 | 1211 | 1212 | 1213 | 4515 | 4519 | 4661 | 4708 | 5699 | | |
| STADD | 5699 | 5702 | 5711 | | | | | | | | |
| STAR | 2685 | 2590 | | | | | | | | | |
| STAR2 | 0939 | | | | | | | | | | |
| START | 0162 | 0007 | | | | | | | | | |
| STOPG | 2686 | | | | | | | | | | |
| STEP | 1380 | 1459 | | | | | | | | | |
| STEPA | 6098 | 6496 | | | | | | | | | |
| STEXP | 0463 | 2352 | 2357 | 2365 | 2388 | 4919 | | | | | |
| STMAX | 0976 | 0971 | | | | | | | | | |
| STMP1 | 3401 | 3343 | 3396 | 3691 | | | | | | | |
| STMP2 | 3402 | 3331 | 3348 | 3361 | 3365 | 3371 | | | | | |
| STMP3 | 3403 | 3334 | 3376 | 3381 | | | | | | | |
| STMT | 2609 | 2640 | | | | | | | | | |
| STMT1 | 2618 | 2614 | 2616 | | | | | | | | |
| STOPE | 5115 | 5014 | 5016 | | | | | | | | |
| STOPS | 2434 | 2435 | 4790 | | | | | | | | |
| STOR1 | 0347 | 0356 | 0358 | | | | | | | | |
| STOR2 | 0359 | 0346 | | | | | | | | | |
| STORE | 0340 | 5227 | 5298 | | | | | | | | |
| STOUT | 4253 | 3935 | 3979 | 4278 | | | | | | | |
| STP1 | 5123 | 5115 | 5119 | | | | | | | | |
| STPFL | 1108 | 1380 | 1687 | 1692 | 1718 | 2538 | 2626 | 2814 | 3755 | 5010 | |
| STPL | 1459 | 1569 | | | | | | | | | |
| STRI1 | 6470 | 6463 | | | | | | | | | |
| STRID | 6460 | 6337 | | | | | | | | | |
| STRNP | 6472 | 0252 | | | | | | | | | |
| STROP | 0373 | 6312 | 6334 | 6467 | 6478 | 6512 | | | | | |
| STSRH | 0453 | 0410 | 0429 | 0467 | 0476 | 6228 | 6282 | 6492 | 6497 | 6698 | |
| STTOP | 5982 | 5688 | 5878 | 6054 | | | | | | | |
| SUMP | 2215 | 0227 | 2147 | 2154 | 2162 | | | | | | |
| SUMPA | 0227 | 5643 | | | | | | | | | |
| SVAL1 | 3398 | 3353 | | | | | | | | | |
| SVALU | 3392 | 3345 | 3346 | 3399 | 3693 | | | | | | |
| SWITH | 5371 | 5361 | | | | | | | | | |
| SYF10 | 6498 | 0263 | | | | | | | | | |
| SYF12 | 0874 | 0247 | | | | | | | | | |
| SYF13 | 6625 | 0260 | | | | | | | | | |

CROSS-REFERENCE TABLE

| | | | | | | | | | | | |
|---|---|---|---|---|---|---|---|---|---|---|---|
| SYE14 | 4872 | 0254 | | | | | | | | | |
| SYE15 | 2713 | 0242 | | | | | | | | | |
| SYE25 | 0618 | 0238 | 0598 | 0606 | 0612 | 0614 | 0630 | 0838 | 2534 | 3024 | |
| SYM1 | 0398 | 0404 | | | | | | | | | |
| SYM2 | 0407 | 0402 | | | | | | | | | |
| SYMC1 | 0393 | 0414 | 6262 | 6371 | 6426 | 6487 | 6520 | 6656 | | | |
| SYMC2 | 0391 | 3425 | 0438 | 2719 | 6218 | | | | | | |
| SYMCK | 0395 | 0392 | 6256 | | | | | | | | |
| SYME2 | 3368 | 0271 | | | | | | | | | |
| SYMTP | 1083 | 0553 | 0564 | 2949 | 3061 | 3146 | 3241 | 3392 | 3408 | 3555 | 3557 |
| | 5199 | 5274 | | | | | | | | | |
| SYN13 | 4806 | 6568 | | | | | | | | | |
| SYNE2 | 2692 | 0265 | | | | | | | | | |
| SYNE3 | 6600 | 0267 | | | | | | | | | |
| SYNE4 | 6454 | 0255 | 6508 | 6510 | | | | | | | |
| SYNE5 | 6517 | 0256 | 6516 | | | | | | | | |
| SYNE6 | 6522 | 0264 | 6489 | | | | | | | | |
| SYNE7 | 4920 | 0258 | | | | | | | | | |
| SYNE8 | 6486 | 0261 | 6485 | | | | | | | | |
| SYNE9 | 6493 | 0262 | | | | | | | | | |
| SYNTX | 2598 | 2586 | 2589 | | | | | | | | |
| SYSER | 0524 | 0235 | | | | | | | | | |
| SYTSA | 0209 | 3508 | | | | | | | | | |
| SYTSH | 5343 | 0209 | 5257 | 5352 | 5380 | | | | | | |
| TA9 | 6093 | 2753 | 2753 | | | | | | | | |
| TARA | 2753 | 2739 | | | | | | | | | |
| TABER | 4426 | 0279 | 6060 | | | | | | | | |
| TABOP | 4311 | 4282 | | | | | | | | | |
| TBS2 | 2022 | 2019 | 2035 | | | | | | | | |
| TBS4 | 2034 | 2031 | | | | | | | | | |
| TBS5 | 2020 | 2010 | | | | | | | | | |
| TBS6 | 2008 | 2025 | | | | | | | | | |
| THSR1 | 2014 | 1337 | 1357 | | | | | | | | |
| THSRH | 2015 | 0168 | 1420 | | | | | | | | |
| TEMP | 1135 | 1136 | 2618 | 2632 | 2865 | 2882 | 2886 | 2893 | 2900 | 6192 | 6672 |
| | 6695 | 6701 | 6709 | | | | | | | | |
| TEMP1 | 1137 | 0847 | 1061 | 4874 | 4890 | 4896 | 5198 | 5275 | 5330 | 5636 | 5642 |
| | 6179 | 6190 | 6252 | 6310 | 6311 | 6332 | 6368 | 6380 | 6447 | 6455 | 6464 |
| | 6475 | | | | | | | | | | |
| TEMP2 | 1138 | 0821 | 0849 | 2943 | 4889 | 4894 | 5213 | 5264 | 5295 | 5306 | 5309 |
| | 5343 | 5350 | 5674 | 5999 | 6314 | 6327 | 6335 | 6468 | 6513 | 6582 | 6588 |
| TEMP3 | 1139 | 0794 | 0802 | 0812 | 0822 | 1404 | 2169 | 2877 | 2891 | 2892 | 2910 |
| | 2976 | 2978 | 4699 | 4707 | 5205 | 5680 | 5994 | | | | |
| TEMP4 | 1140 | 0584 | 0594 | 0613 | 0627 | 0637 | 0638 | 0824 | 0827 | 1402 | 2194 |
| | 2417 | 2911 | 2918 | 2919 | 2921 | 2946 | 4960 | 5219 | 5221 | 5671 | 6003 |
| TEMPS | 1134 | 0498 | 0499 | 0502 | 0505 | 0506 | 0508 | 0512 | 0677 | 1224 | 1225 |
| | 1226 | 1227 | 1229 | 2605 | 2997 | 3000 | 3006 | 3007 | 3092 | 3093 | 3094 |
| | 3099 | 3100 | 3101 | 3461 | 3462 | 3470 | 3474 | 3492 | 3510 | 3516 | 3523 |
| | 3569 | 3570 | 3575 | 3579 | 3580 | 3583 | 3584 | 3612 | 3613 | 3648 | 3678 |
| | 3734 | 3740 | 3766 | 3774 | 3775 | 3778 | 3785 | 3792 | 3793 | 3794 | 3814 |
| | 3818 | 3838 | 3839 | 3844 | 3845 | 3849 | 3927 | 3932 | 3937 | 3942 | 4280 |
| | 4313 | 4316 | 4405 | 4443 | 4546 | 4560 | 4566 | 4567 | 4571 | 4577 | 4580 |
| | 4581 | 4587 | 4662 | 4674 | 4675 | 4677 | 4679 | 4691 | 4698 | 4972 | 5079 |
| | 5086 | 5163 | 5164 | 5171 | 5180 | 5236 | 5328 | 5347 | 5364 | 5368 | 5371 |
| | 5374 | 5394 | 5406 | 5418 | 5429 | 5444 | 5468 | 5482 | 5486 | 5509 | 5512 |
| | 5550 | 5558 | 5610 | 5612 | 5624 | 5628 | 5640 | 5649 | 5656 | 5662 | 5666 |
| | 5684 | 6151 | 6202 | 6239 | 6270 | 6390 | 6396 | 6397 | 6400 | 6401 | 6423 |
| | 6424 | 6435 | 6436 | 6439 | 6731 | 6732 | | | | | |
| TEPPP | 1211 | 5407 | 5421 | 5428 | | | | | | | |
| TERM | 1149 | 1034 | 1676 | 1684 | 2521 | 2785 | 2815 | 4291 | 4294 | 4331 | 4334 |
| | 4344 | 4423 | 5391 | | | | | | | | |
| TEST | 5327 | 5259 | 5276 | | | | | | | | |
| TFLAG | 1103 | 1271 | 1693 | 2517 | 2532 | 2775 | 2803 | | | | |
| TFLG1 | 1107 | 4953 | 4959 | 4962 | 5002 | 5006 | 5019 | 5021 | | | |
| THENA | 4923 | 4918 | | | | | | | | | |
| TIMES | 6113 | 6657 | | | | | | | | | |
| TMP | 1215 | 1440 | 1517 | 1518 | 1521 | 1523 | 1524 | 1532 | 1534 | 1539 | 1649 |
| | 1736 | 2042 | 2099 | 3962 | 3978 | 4747 | 4751 | | | | |
| TMP1 | 1216 | 1231 | 1648 | 1663 | 1740 | 1750 | 1756 | 1796 | 1811 | 3961 | 3970 |
| TMP10 | 1225 | 3763 | 3773 | 3846 | 3929 | 3936 | | | | | |
| TMP11 | 1226 | 3735 | 3809 | 3812 | 3869 | | | | | | |
| TMP12 | 1227 | 3817 | 3887 | 3893 | 3901 | | | | | | |
| TMP13 | 1228 | 3796 | 3806 | 4176 | 4184 | 4187 | | | | | |
| TMP2 | 1217 | 1232 | 1738 | 1813 | 1816 | 2016 | 2020 | 2536 | 4297 | 4309 | 4380 |
| | 4583 | 4588 | | | | | | | | | |
| TMP2A | 2042 | 1697 | 1745 | | | | | | | | |
| TMP3 | 1218 | 1234 | 1744 | 1749 | 2022 | 2024 | 3964 | 3973 | 3975 | 3976 | |
| TMP4 | 1219 | 1235 | 1936 | 1959 | 1963 | 2015 | 2032 | 2034 | | | |
| TMP5 | 1220 | 1233 | 1303 | 1318 | 1323 | 1325 | 1331 | 1341 | 1344 | 1359 | 1363 |
| | 1794 | 1839 | 1921 | 1924 | 1942 | 1948 | 1964 | 1983 | 2014 | 2173 | 2235 |
| TMP6 | 1221 | 1321 | 1329 | 1449 | 1512 | 1981 | | | | | |
| TMP6A | 1222 | 2019 | 2026 | 4748 | 4749 | | | | | | |
| TMP7 | 1223 | 1503 | 3729 | 3741 | 3772 | | | | | | |
| TMP9 | 1224 | 3791 | 3875 | | | | | | | | |
| TMPA | 0203 | 0762 | 1525 | 1537 | 1544 | 1741 | | | | | |
| TMPOP | 0184 | 4300 | 4431 | 6048 | | | | | | | |
| TOA | 6133 | 6491 | | | | | | | | | |
| TOBLN | 1632 | 1710 | | | | | | | | | |
| TRAC2 | 4952 | 4955 | | | | | | | | | |
| TRAC3 | 4961 | 4954 | | | | | | | | | |

CROSS-REFERENCE TABLE

| | | | | | | | | | | | |
|---|---|---|---|---|---|---|---|---|---|---|---|
| TRACE | 4955 | 2287 | | | | | | | | | |
| TREGE | 1157 | | | | | | | | | | |
| TRUE | 5900 | 5925 | 5931 | 5938 | | | | | | | |
| TSRET | 6699 | 6693 | | | | | | | | | |
| TSRHA | 0168 | 0453 | 0463 | 2066 | 2740 | | | | | | |
| TSTPT | 1085 | 5062 | 5091 | 5130 | 5472 | 5605 | 5620 | 5687 | 5848 | 5854 | 5879 |
| | 5884 | 5887 | 5944 | 5988 | 5990 | 6013 | 6033 | 6035 | | | |
| TTY | 1039 | 1030 | 1662 | 4502 | | | | | | | |
| TYPE | 1210 | 3073 | 3086 | 3114 | 3568 | | | | | | |
| TYPEC | 4600 | 4444 | | | | | | | | | |
| TYPFL | 0078 | 2743 | 3815 | | | | | | | | |
| U1 | 1493 | 1491 | | | | | | | | | |
| U3 | 1498 | 1477 | 1494 | | | | | | | | |
| U4 | 1487 | 1474 | 1490 | | | | | | | | |
| U5 | 1501 | 1478 | 1479 | 1488 | 1497 | | | | | | |
| UFLAG | 1177 | 6153 | 6196 | 6216 | 6225 | 6251 | 6402 | 6405 | | | |
| UKDEF | 2665 | 2591 | | | | | | | | | |
| UKERR | 2667 | 0243 | | | | | | | | | |
| UKPTR | 1094 | 0920 | 0927 | 2217 | 2546 | 2665 | 2928 | 2932 | 3128 | 3129 | 3479 |
| | 3703 | 6601 | | | | | | | | | |
| UNFOL | 6118 | | | | | | | | | | |
| UNFW | 0967 | | | | | | | | | | |
| UNITS | 1104 | 2506 | 3045 | 4928 | | | | | | | |
| UNMIN | 6120 | 6219 | | | | | | | | | |
| UNSTK | 0491 | 4357 | 4359 | 4481 | 4483 | 5060 | 5061 | 5063 | 5065 | 6736 | |
| UPARA | 0191 | 5873 | | | | | | | | | |
| UPARW | 1489 | 1565 | | | | | | | | | |
| UPLUS | 6121 | | | | | | | | | | |
| VALUE | 1082 | 0554 | 1166 | 3174 | 3231 | 3391 | 3425 | 3435 | 3439 | 3442 | 3692 |
| VALUP | 1599 | 1336 | | | | | | | | | |
| VAR01 | 6316 | 6308 | | | | | | | | | |
| VAR03 | 6335 | | | | | | | | | | |
| VAR04 | 6337 | 6306 | 6329 | 6331 | | | | | | | |
| VAR06 | 6328 | 6321 | | | | | | | | | |
| VAROA | 0214 | 4910 | 6579 | 6624 | | | | | | | |
| VAROP | 6301 | 0214 | 6155 | 6484 | 6515 | | | | | | |
| WAITS | 6502 | 4789 | 6523 | 6530 | | | | | | | |
| WBUFF | 0309 | 4525 | | | | | | | | | |
| WIDTH | 1170 | 1230 | 3867 | 3876 | 4071 | 4074 | 4174 | 4495 | | | |
| WRIT | 1647 | 0159 | | | | | | | | | |
| WRIT2 | 4444 | 4455 | 4466 | 4532 | | | | | | | |
| WRIT4 | 4472 | 4478 | | | | | | | | | |
| WRIT5 | 4479 | 4476 | | | | | | | | | |
| WRIT6 | 4529 | 4503 | | | | | | | | | |
| WRIT7 | 4505 | 4496 | | | | | | | | | |
| WRIT8 | 4536 | 4474 | 4531 | | | | | | | | |
| WRITA | 4490 | 4485 | | | | | | | | | |
| WRITE | 0159 | 1018 | 1021 | 1024 | | | | | | | |
| WRITF | 4470 | 4449 | | | | | | | | | |
| WRITN | 4456 | 4445 | | | | | | | | | |
| WRITQ | 4465 | 4446 | | | | | | | | | |
| WRITS | 4454 | 4456 | | | | | | | | | |
| WRITX | 4461 | 4451 | | | | | | | | | |
| XC | 1197 | 1215 | 1216 | 1217 | 1218 | 3491 | 3493 | 3495 | 3497 | 3522 | 3524 |
| | 3526 | 3528 | | | | | | | | | |
| XEC | 4981 | | | | | | | | | | |
| XEC3 | 4986 | | | | | | | | | | |
| XEC4 | 4995 | 0164 | 5038 | 5151 | 5159 | 5319 | 5438 | 5450 | 5705 | 6543 | 6549 |
| | 6559 | 6560 | 6561 | 6562 | | | | | | | |
| XEC4A | 0164 | 4348 | 4760 | 4765 | 4929 | 4973 | 6741 | | | | |
| XEC5 | 5014 | 5011 | | | | | | | | | |
| XEC6 | 5017 | 0221 | | | | | | | | | |
| XEC6A | 0221 | 1396 | | | | | | | | | |
| XEC7 | 5006 | 5003 | | | | | | | | | |
| XEC8 | 5026 | 5020 | 5022 | | | | | | | | |
| XEC9 | 5027 | 5097 | | | | | | | | | |
| XECA | 1245 | 1387 | 1242 | | | | | | | | |
| XFAR1 | 0324 | 0341 | 0343 | 0347 | 0359 | 2758 | 4023 | 4432 | 5232 | 5242 | 5974 |
| | 6030 | | | | | | | | | | |
| XFAR2 | 0363 | 0351 | 0916 | 2816 | 4005 | 4040 | 4301 | 5235 | 5736 | 6047 | 6049 |
| XKEY | 2159 | 2078 | | | | | | | | | |
| XLST | 2206 | 2077 | | | | | | | | | |
| XLST1 | 2418 | 2207 | 2211 | | | | | | | | |
| XRUN | 2151 | 2075 | | | | | | | | | |
| XSCR | 2187 | 2076 | | | | | | | | | |
| XSCR1 | 2194 | 0220 | | | | | | | | | |
| XSCRA | 0220 | 2971 | | | | | | | | | |
| YC | 1199 | 1219 | 1220 | 1222 | 3444 | 3518 | 3519 | 5500 | 5501 | 5607 | |
| ZAP | 0152 | 0941 | | | | | | | | | |
| ZONK | 0954 | | | | | | | | | | |
| ZONK1 | 0958 | 0955 | | | | | | | | | |

```
#01  9830 MATH ROUTINES

0001              ASMB,A,L,C
0003*  MATH ROUTINES 3-20-72
0004*
0005  00000              ORG 0
```

```
*
00000 164121          JMP START,I   START OF MONITOR
00001 043060          OCT 43060     CONSTANT NEEDED BY PROCESSOR
00002 000000          BSS 1
*
00003 000000 C6       OCT 0         ONE
00004 010000          OCT 010000    0000
00005 000000          OCT 0         0000
*
00006 000000 C5       OCT 000000    PI/2
00007 012560          OCT 12560     1570
00010 074543          OCT 074543    7963
00011 023200          OCT 023200    2680
*
00012 000001 .1       DEC 1
*
00013 000400 C7       OCT 000400    180/PI
00014 053451          OCT 053451    5729
00015 053571          OCT 053571    5779
00016 050450          OCT 050450    5128
*
00017 000002 .2       DEC 2
00020 000003 .3       DEC 3
00021 000004 .4       DEC 4
00022 000005 .5       DEC 5
00023 000006 .6       DEC 6
00024 000007 .7       DEC 7
00025 000010 .8       DEC 8
00026 000011 .9       DEC 9
00027 000013 .11      DEC 11
00030 000014 .12      DEC 12
00031 000015 CRTN     OCT 15
00031        EOL      EQU CRTN
00031        .13      EQU CRTN
*
* POINTERS TO FUNCTIONS CONSTANTS
*
00027        OPERR EQU .11      POINTER TO 180/PI
00023        PI/2  EQU .6       POINTER  TO PI/2
00020        ONE   EQU .3       POINTER TO THE CONSTANT ONE
*
*
00032 000017 .15      DEC 15
00033 000020 .16      DEC 16
00034 000025 .21      DEC 21
00035 000026 .22      DEC 22
00036 000027 .23      DEC 23
00037 000034 .28      DEC 28
00040 000037 .31      DEC 31
00041 000040 .32      DEC 32
00042 000041 .33      DEC 33
00043 000042 .34      DEC 34
00044 000045 .37      DEC 37
00045 000050 .40      DEC 40
00046 000051 .41      DEC 41
00047 000053 .43      DEC 43
00050 000055 .45      DEC 45
00051 000056 .46      DEC 46
00052 000060 .48      DEC 48
00053 000072 .58      DEC 58
00054 000077 .63      DEC 63
00055 000111 I        OCT 111
00056 023420 .1E4     DEC 10000
00057 001750 .1000    DEC 1000
00060 000144 .100     DEC 100
00061 000012 .10      DEC 10
00061        LNFD     EQU .10
00062 100000 FLGBT    OCT 100000
00063 000143 .99      DEC 99
00064 100004 INTFL    OCT 100004
00065 076000 OPMSK    OCT 76000
00066 077777 INF      OCT 77777
00067 100037 TYPFL    OCT 100037
00070 101777 OPDMK    OCT 101777
00071 000105 E        OCT 105
00072 000106 F        OCT 106
00073 000123 S        OCT 123
00032        B17      EQU .15
00033        B20      EQU .16
00074 000022 B22      OCT 22
00075 000023 B23      OCT 23
00035        B26      EQU .22
00036        B27      EQU .23
00076 000036 B36      OCT 36
00040        B37      EQU .31
00043        B42      EQU .34
00077 000044 B44      OCT 44
00100 000052 B52      OCT 52
00053        B72      EQU .58
00101 000100 B100     OCT 100
```

#01 9830 MATH ROUTINES

```
00102 000133 B133   OCT 133
00103 000144 B144   OCT 144
00104 000177 B177   OCT 177
00105 000377 B377   OCT 377
00013        B400   EQU C7
00106 000777 B777   OCT 777
00107 001000 B1000  OCT 1000
00110 001400 B1400  OCT 1400
00111 001740 B1740  OCT 1740
00112 001760 B1760  OCT 1760
00113 001774 B1774  OCT 1774
00114 001775 B1775  OCT 1775
00115 001777 B1777  OCT 1777
00116 002000 OTOP   OCT 2000
00117 002400 B2400  OCT 2400
00120 003000 B3000  OCT 3000
00121 004000 B4000  OCT 4000
00122 006000 B6K    OCT 6000
00004        B10K   EQU C6+1
00004        RPOP   EQU B10K
00123 012000 B12K   OCT 12000
00123        RAOP   EQU B12K
00124 032000 EXPOP  OCT 32000
00125 050000 LAOP   OCT 50000
00126 052000 LPOP   OCT 52000
00127 170000 B17MK  OCT 170000
00130 013777 FROMA  OCT 13777
00131 000000 LROMA  BSS 1
00132 177777 M1     DEC -1
00133 177776 M2     DEC -2
00134 177775 M3     DEC -3
00135 177774 M4     DEC -4
00136 177773 M5     DEC -5
00137 177772 M6     DEC -6
00140 177767 M9     DEC -9
00141 177766 M10    DEC -10
00142 177765 M11    DEC -11
00143 177764 M12    DEC -12
00144 177763 M13    DEC -13
00145 177762 M14    DEC -14
00146 177761 M15    DEC -15
00147 177751 M23    DEC -23
00150 177747 M25    DEC -25
00151 177740 M32    DEC -32
00152 177734 M36    DEC -36
00153 177720 M48    DEC -48
00154 177700 M64    DEC -64
00155 177660 M80    DEC -80
00156 177634 M100   DEC -100
00157 177400 M256   DEC -256
00160 176000 M1024  DEC -1024
00161 154360 MAXSN  DEC -10000     -(MAXIMUM ALLOWABLE LINE NUMBER)
00162 043116 FN     ASC 1,FN
*
*  MATH CONSTANTS THAT ARE NEEDED ON BASE PAGE
*
00163 177401 ZAP    OCT 177401
00164 063440 MASK1  OCT 063440
00165 061400 MASK5  OCT 061400
*
00166 000000 FWAM   BSS 1
00112        RSTKA  EQU B1760      START OF RETURN STACK
00167 000000 WRITE  BSS 1          PRINTER AND DISPLAY DRIVER
00170 000000 CLERA  BSS 1          CLEAR SCREEN
00116        RFED   EQU OTOP       KEYBOARD DRIVER OTOP IS = 2000B
00121        START  EQU B4000
00171 000000 RUNA   BSS 1          PHASE Z:SYMBOL TABLE AND STORAGE
00172 000000 XEC4A  BSS 1
00173 000000 PEXMA  BSS 1
00174 000000 RDYDA  BSS 1
00122        LISTA  EQU B6K
00175 000000 TSRHA  BSS 1          TABLE SEARCH
00176 000000 ELINA  BSS 1          OUTPUT I/O BUFFER
00177 000000 SSYMA  BSS 1          SEARCH SYMBOL TABLE FOR SYMBOL
00200 000000 OPCHA  BSS 1
00201 000000 FORMA  BSS 1
00202 000000 FSCA   BSS 1
00203 000000 ACTSA  BSS 1
00204 000000 DELSA  BSS 1
00205 000000 AERRA  BSS 1          ALTERNATE ENTRY FOR ERROR
00206 000000 ERRA   BSS 1
00207 000000 INTEA  BSS 1
00210 017036 OUTIA  DEF OUTIN      OUTPUT AN INTEGER
00211 000000 .BUFA  BSS 1          FIRST CHAR OF I/O BUFFER
00212 000000 .SLBF  BSS 1           REFRESH BUFFER POINTER
00213 001744 AR1A   DEF AR1
00214 001754 AR2A   DEF AR2
00215 000000 TMPOP  BSS 1
00216 011500 .FADA  DEF FAD
```

#01 9830 MATH ROUTINES

```
00217 011466 .FSBA DEF FSB        SUBTRACT
00220 016311 .FMPA DEF FMP        MULTPLY
00221 011576 .FDVA DEF FDV        DIVIDE
00222 000000 ENTEA BSS 1
00223 016162 .FSR  DEF FSR
00224 016054 UPARA DEF UPARO      UP ARROW
00225 017021 FLTRA DEF FLTRF
00226 017001 FLTFA DEF FLTFX
00227 017055 FXFLA DEF FXFLT
00230 017121 FLTSA DEF FLTSP
00231 016365 SPLFA DEF SPLFL
00232 017331 SNFLA DEF SNFLT      SYNTAX FORMAT TO FLOATING
00233 000000 BEND  BSS 1            I/O BUFFER END
00233        SBUFA EQU BEND
00234 000000 NMOTA BSS 1             NUMBER OUTPUT ROUTINE LINK
00235 000000 FILLA BSS 1               SUPPLY NEEDED BLANKS ON OUTPUT
00236 000000 SLEND BSS 1             REFRESH BUFFER END
00111        TMPA  EQU B1740
00110        BADRP EQU B1400         POINTER POINTER TO I/O BUFFER
*
00123        FOPBS EQU B123
00237 000000 SALTA BSS 1
00240 000000 MDIMA BSS 1
00241 000000 SYTSA BSS 1
00242 000000 DCOMA BSS 1
00243 017154 NUMCA DEF NUMCK
00244 017266 NUMOA DEF NUMOP
00245 000000 GTSTA BSS 1
00246 000000 VAROA BSS 1
00247 000000 FCALA BSS 1
00250 000000 OVCHA BSS 1
00251 000000 CLPIA BSS 1
00252 000000 ENTFA BSS 1
00253 000000 CHRSA BSS 1
00254 000000 XSCRA BSS 1
00255 000000 XFC6A BSS 1
00256 000000 FDAAA BSS 1
00257 000000 FNDAA BSS 1
00260 000000 FNDIA BSS 1
00261 000000 IOSTA BSS 1
00262 000000 INREA BSS 1
00263 000000 SUMPA BSS 1
00264 000000 CRCKA BSS 1
00265 000000 IOHEA BSS 1
00266 000000 QTCHA BSS 1
*************************************************
*
00267 000000       BSS 1       CHECKSUM WORD FOR FIRST 512 BLOCK
```

#01 9830--ERROR TABLE

```
00270 000000 E1    BSS 1
00271 000000       BSS 1
00272 000000       BSS 1
00273 000000       BSS 1
00274 000000 E5    BSS 1
00275 000000       BSS 1
00276 000000       BSS 1
00277 000000       BSS 1
00300 000000       BSS 1
00301 000000 E10   BSS 1
00302 017255       DEF NUMER
00303 017172       DEF NUMCP+1
00304 000000       BSS 1
00305 000000       BSS 1
00306 000000 E15   BSS 1
00307 000000       BSS 1
00310 000000       BSS 1
00311 000000       BSS 1
00312 000000       BSS 1
00313 000000 E20   BSS 1
00314 000000       BSS 1
00315 000000       BSS 1
00316 000000       BSS 1
00317 000000       BSS 1
00320 000000 E25   BSS 1
00321 000000       BSS 1
00322 000000       BSS 1
00323 000000       BSS 1
00324 000000       BSS 1
00325 000000 E30   BSS 1
00326 000000       BSS 1
00327 000000       BSS 1
00330 000000       BSS 1
00331 000000       BSS 1
00332 000000 E35   BSS 1
00333 000000       BSS 1
00334 000000       BSS 1
```

```
#01 9830--ERROR TABLE

00335 000000        BSS 1
00336 000000        BSS 1
00337 000000 E44    BSS 1
00340 000000        BSS 1
00341 000000        BSS 1
00342 000000        BSS 1
00343 000000        BSS 1
00344 000000 E45    BSS 1
00345 000000        BSS 1
00346 000000        BSS 1
00347 000000        BSS 1
00350 000000        BSS 1
00351 000000 E50    BSS 1
00352 013355        DEF ER47     LOG OF A NEGATIVE NUMBER
00353 016207        DEF ER48     SQUARE ROOT OF A NEGATIVE NUMBER
00354 016053        DEF ER49     ZERO TO THE ZERO POWER
00355 016141        DEF ER50      NEGATIVE NUMBER RAISED TO A NON-INTEGER POWER

#01 9830--BASE PAGE READ-WRITE MEMORY

01400               ORG 1400B
01400 000000 BADDR BSS 1    CURRENT CHAR POINTER
01401 000000 RSAVE BSS 1         SAVE (A) FOR RETN2
01402 000000 OTPTR BSS 1    REFRESH POINTER
01403 000000 MAW   BSS 1    LAST WORD OF R/W MEM
01404 000000 LWAM  BSS 1    LAST WORD AVAILABLE FOR USER
01405 000000 FWUP  BSS 1    FIRST WORD OF COMMON OR MAINLINE
01406 000000 VALUE BSS 1    FIRST WORD -1 OF VALUE TABLE
01407 000000 SYMTP BSS 1    FIRST WORD -1 OF SYMBOL TABLE
01410 000000 LSTAK BSS 1    FIRST WORD OF OPERATOR STACK
01411 000000 TSTPT BSS 1    TEMPORARY STACK POINTER
01412 000000 LSTPT BSS 1    OPERATOR STACK POINTER
01413 000000 HSTPT BSS 1    OPERAND STACK POINTER
01414 000000 DSTRT BSS 1    DATA STATEMENT
01415 000000 NXTDT BSS 1      POINTERS
01416 000000 MODE  BSS 1    PROGRAM=0; KEYBOARD=1
01417 000000 PARMA BSS 1    PARAMETER ADDRESS
01420 000000 PARMN BSS 1    PARAMETER NAME
01421 000000 PRADD BSS 1    LAST WORD+1 OF CURRENT STMT
01422 000000 UKPTR BSS 1    USER KEY POINTER
01423 000000 PRPTR BSS 1    LAST WORD OF CURRENT PROGRAM
01424 000000 PBUFF BSS 1    FIRST WORD OF CURRENT PROGRAM
01425 000000 PBUFO BSS 1    FIRST WORD OF MAINLINE
01426 000000 PRPTO BSS 1    LAST WORD+1 OF MAINLINE
01427 000000 .LNUM BSS 1    CURRENT LINE NUMBER
01430 000000 LNINC BSS 1    AUTO LINE INCREMENT
01431 000000 CLINE BSS 1    CURRENT LINE FOR LIST
01432 000000 DRQST BSS 1    INPUT STMT FLAG
01433 000000 TFLAG BSS 1    PTAPE FLAG
01434 000000 UNITS BSS 1    TRIG UNITS
01435 000000 SEC   BSS 1    SECURE PROGRAM FLAG
01436 000000 HFLG1 BSS 2    STOP ADDRESSES
01440 000000 TFLG1 BSS 2    TRACE LIMIT ADDRESSES
01442 000000 STPFL BSS 1    STOP FLAG
01443 000000 KEYFG BSS 1    KEYBOARD FLAG
01444 000000 SAVEA BSS 1    INTERRUPT
01445 000000 SAVEB BSS 1
01446 000000 ADRSS BSS 1      TEMPORARIES
01447 000000 SLCOD BSS 1    SELECT CODE
01450 000000 PMODE BSS 1    PRINT-ALL FLAG
01451 000000 CTYPE BSS 1    KEYBOARD
01452 000000 CPLAC BSS 1      FORMAT FLAGS
01453 000000 PRFLG BSS 1    PRINT/DISP FLAG
01454 000000 RCOUT BSS 1    FORMAT
01455 000000 FORMT BSS 1
01456 000000 FORMS BSS 1
01457 000000 FORME BSS 1      STATEMENT FLAGS
01460 000000 FTMP1 BSS 1    CURRENT OPERATOR CODE
01461 000000 FTMP2 BSS 1    CURRENT OPERATOR PRECEDENCE
01462 000000 REFOL BSS 1
01463 000000 INTFL BSS 1
01464 000000       BSS 2         UNUSED
*
*  TEMPORARIES
*
01466 000000 LOCL1 BSS 1
01467 000000 LOCL2 BSS 1
01470 000000 L2T1  BSS 1
01471 000000 L2T2  BSS 1
01472 000000 TEMPS BSS 1
01473 000000 .TEMP BSS 1
01473        MBOX1 EQU .TEMP
01474 000000 TEMP1 BSS 1
01475 000000 TEMP2 BSS 1
01476 000000 TEMP3 BSS 1
01477 000000 TEMP4 BSS 1
*
*  BUFFERS
*
```

#01 9830--BASE PAGE READ-WRITE MEMORY

```
01500 000000 IOBUF  BSS 41          INPUT AND RECALL BUFFER
01551 000000 RBUFF  BSS 41          SINGLE LINE REFRESH BUFFER
*
*  PRINT ROUTINE FLAGS
*
01622 000000 TERM   BSS 1      CRLF FLAG
01623 000000 PEND   BSS 1      BUFFER OVERFLOW FLAG
01624 000000 PPFF   BSS 1      BUFFER POINTER OR TAB FLAG
01625 000000 FIRST  BSS 1
01626 000000        BSS 2           UNUSED
*
*       MATH TEMPORARIES
*
01630 000000 TREGE  BSS 4
01634 000000 RSLTE  BSS 4
*
*  STATEMENT SYNTAX AND EXECUTION TEMPORARIES
*
01640 000000 ST     BSS 32
*
*  SYSTEM SYNTAX AND EXECUTION TEMPORARIES
*
01700 000000        BSS 1           SAVED FOR PROCESSOR
01701 000000 NOISP  BSS 1
01702 000000 NPRIN  BSS 1
01703 000000 PLACE  BSS 1
01704 000000 WIDTH  BSS 1
01705 000000 FLOAT  BSS 1
01706 000000 SBPTR  BSS 1
01707 000000 BLANK  BSS 1
01710 000000 MSFLG  BSS 1
01711 000000 DFLAG  BSS 1
01712 000000 PFLAG  BSS 1
01713 000000 UFLAG  BSS 1
01714 000000 SFLAG  BSS 1
01715 000000 SBADR  BSS 1
01716 000000 SSHPT  BSS 1
01717 000000 NUM    BSS 1
01717        OPTYP  EQU NUM
01720 000000 LASTN  BSS 1
01721 000000 .SIGN  BSS 1
01721        MAXIN  EQU .SIGN
01722 000000 EXP    BSS 1
01722        INTGR  EQU EXP
01723 000000 ARYAD  BSS 1
01724 000000 GFLAG  BSS 1
01725 000000 NXTST  BSS 1
01726 000000 MBIN1  BSS 1
01727 000000 MBIN2  BSS 1
*
*  ARITHMETIC REGISTERS AND RETURN STACK
*
01740               ORG 1740B
01740 000000 XC     BSS 4
01744 000000 AR1    BSS 4
01750 000000 YC     BSS 4
01754 000000 AR2    BSS 4
01760 000000 RSTAK  BSS 11          RETURN STACK
01773 000000 RES    BSS 4           RESULT REGISTOR
01777 000000 RSPTR  BSS 1      RETURN STACK POINTER
*
```

#01 NON-COMMON BASE PAGE ROM

```
01744        AR1E   EQU AR1
01754        AR2E   EQU AR2
00136        N5     EQU M5
01237        STAR2  EQU 1237B
01305        ROUND  EQU 1305B
01261        OF     EQU 1261B
01274        STMAX  EQU 1274B
*
00356        RETN3  EQU 356B
00357        RETN2  EQU 357B
00365        RET2   EQU 365B
00373        ICNT   EQU 373B
00374        WBUFF  EQU 374B
00400        GPARM  EQU 400B
00405        XFAR1  EQU 405B
00412        RSULT  EQU 412B
00416        STORE  EQU 416B
00425        STOR1  EQU 425B
00444        XFAR2  EQU 444B
00450        STROP  EQU 450B
00456        SBPUD  EQU 456B
00461        SYMC2  EQU 461B
00463        SYMC1  EQU 463B
00464        SYMCK  EQU 464B
```

#01 NON-COMMON BASE PAGE ROM

```
00504          COMCK  EQU 504B
00512          COMCF  EQU 512B
00513          LPCK   EQU 513B
00521          LPCKF  EQU 521B
00524          RPCK   EQU 524B
00534          RPCKF  EQU 534B
00535          FSCF2  EQU 535B
00537          STSPH  EQU 537B
00546          STEXP  EQU 546B
00553          RHSTP  EQU 553B
00561          MERA   EQU 561B
00561          FSCF4  EQU 561B
00563          SLWST  EQU 563B
00567          UNSTK  EQU 567B
00574          NEXTL  EQU 574B
00606          NEXTI  EQU 606B
00613          FPAGE  EQU 613B
00626          SAVBP  EQU 626B
00633          RESBI  EQU 633B
00640          RESBP  EQU 640B
00645          MINIT  EQU 645B
00651          INITS  EQU 651B
00664          LNUM   EQU 664B
00666          PGINT  EQU 666B
00676          INTCK  EQU 676B
00726          SYE25  EQU 726B
00730          GETAD  EQU 730B
00742          END    EQU 742B
00750          DIGCK  EQU 750B
00752          LETCK  EQU 752B
00753          LIMIT  EQU 753B
00771          GTOPP  EQU 771B
01007          NEXTA  EQU 1007B
01015          OBLNK  EQU 1015B
01016          ONEXT  EQU 1016B
01017          OUTCR  EQU 1017B
01041          GETCH  EQU 1041B
01053          GTMP   EQU 1053B
01055          GNEXT  EQU 1055B
01062          GFRST  EQU 1062B
01066          GETSK  EQU 1066B
01075          ENDPS  EQU 1075B
01121          MVTOH  EQU 1121B
01131          PGIN0  EQU 1131B
01140          LTR    EQU 1140B
01147          ENDS   EQU 1147B
01151          EOST   EQU 1151B
01152          NOEOF  EQU 1152B
01153          EOLCK  EQU 1153B
01156          CONST  EQU 1156B
01165          SYE12  EQU 1165B
01166          GSIGN  EQU 1166B
01201          IMPY   EQU 1201B
01217          FETCH  EQU 1217B
01225          LOFF   EQU 1225B
01254          ZONK   EQU 1254B
01256          CLAR2  EQU 1256B
01314          ODGIT  EQU 1314B
01317          SGNS   EQU 1317B
01330          .NPWR  EQU 1330B
01335          NPWRT  EQU 1335B
01337          NOWRT  EQU 1337B
01342          CRLF   EQU 1342B
01344          CRLF1  EQU 1344B
01351          TTY    EQU 1351B
01362          GTCON  EQU 1362B
01371          FIX    EQU 1371B
```

#01 CONSTANTS AND EQUATES FOR BOTH

```
                        LST
*       MIKE WINGERT
*       AND GENE BURMEISTER 8-24-71
*
*
************************************
*
* BASE PAGE CONSTANTS
*
00012          P1     EQU .1
00017          P2     EQU .2
00021          P4     EQU .4
00022          P5     EQU .5
00025          P8     EQU .8
00030          P12    EQU .12
00031          P13    EQU CRTN
00032          P15    EQU .15
00013          P256   EQU B400
```

#01 CONSTANTS AND EQUATES FOR BOTH

```
00132          N1    EQU M1
00141          N10   EQU M10
00157          N256  EQU M256
00057          ATEMP EQU .1000      POINTER TO YC REGISTOR
00004          D1000 EQU B10K
*
*************************************
*
* SHARED READ/WRITE
*
01701          TEMPA EQU 1701B
01466          TEMP5 EQU LOCL1
*
*
*************************************
*
* R/W MEMORY AREA
*
01702          ADR1  EQU 1702B
01703          ADR2  EQU 1703B
01703          ADR3  EQU ADR2
01704          TEMP  EQU 1704B      TEMPORARY
01705          TABL0 EQU TEMP+1     CORDIC CONSTANT
01706          GFG   EQU TEMP+2     G FLAG
01707          SHIFT EQU TEMP+3     SHIFT FACTOR
01710          COUNT EQU TEMP+4     BCD DATA STORAGE
01711          RCPFG EQU TEMP+5     RECIPROCAL FLAG
01712          FNCFG EQU TEMP+6     FUNCTION FLAG
01713          RY1   EQU TEMP+7     REGISTER ADDRESS STORAGE
01714          SAVE  EQU TEMP+8     TEMPORARY
01715          RY2   EQU TEMP+9     REGISTER ADDRESS STORAGE
01716          SIGN  EQU TEMP+10    EXPONENT WORD STORAGE
01717          DIGIT EQU TEMP+11    DIGIT STACK POINTER
01720          WRDN  EQU TEMP+12    START OF DIGIT STACK
01734          ADRYE EQU 1734B
*
*
*************************************
*
***     LABELS
*
00023          P6    EQU .6         +6
00024          P7    EQU .7         +7
00061          P10   EQU .10           +10
00133          N2    EQU M2         -2
00135          N4    EQU M4         -4
00143          N12   EQU M12        -12
00062          D8000 EQU FLGBT         BCD 8000
*
* LINKAGE TO ARITHMETIC
*
00216          ADD   EQU .FADA      FLOATING ADD ROUTINE
00220          MLT   EQU .FMPA      FLOATING MULTIPLY ROUTINE
00221          DVD   EQU .FDVA      FLOATING DIVIDE ROUTINE
*
*
*************************************
*
```

#01 LOG CONSTANTS AT 11600B

```
03700                  ORG 3700B
*
*
*************************************
*
* ROM AREA
*
03700 000000 C1    OCT 000000     LN(2)
03701 003223       OCT 003223     0693
03702 012161       OCT 012161     1471
03703 100126       OCT 100126     8056
*
03704 000000       DEC 0000       LN(1.1)
03705 004523       OCT 004523     0953
03706 010027       OCT 010027     1017
03707 114004       OCT 114004     9804
*
03710 000000       DEC 0000       LN(1.01)
03711 004625       OCT 004625     0995
03712 001460       OCT 001460     0330
03713 102462       OCT 102462     8532
*
03714 000000       DEC 0000       LN(1.001)
03715 004631       OCT 004631     0999
03716 050003       OCT 050003     5003
03717 031410       OCT 031410     3308
*
23720 000000       DEC 0000       LN(1.0001)
```

*01 LOG CONSTANTS AT 11600B

```
03721 004631          OCT 004631     0999
03722 112400          OCT 112400     9500
03723 001463          OCT 001463     0333
*
03724 000000          OCT 000000     LN(1.00001)
03725 004631          OCT 004631     0999
03726 114520          OCT 114520     9950
03727 000003          OCT 000003     0003
*
03730 000000 C2       OCT 000000      LN(10)
03731 021402          OCT 021402      2302
03732 054120          OCT 054120      5850
03733 111400          OCT 111400     9300
*
***
*
03734 000000          DEC 0000       ARCTAN(1)
03735 003605          OCT 003605     0785
03736 034601          OCT 034601     3981
03737 061500          OCT 061500     6340
*
03740 000000          DEC 0000       ARCTAN(.1)
03741 004626          OCT 004626     0996
03742 064145          OCT 064145     6865
03743 022221          OCT 022221     2491
*
03744 000000          DEC 0000       ARC TAN (.01)
03745 004631          OCT 004631     09999
03746 113146          OCT 113146     9666
03747 064147          OCT 064147     6867
*
03750 000000          DEC 0000       ARCTAN(.001)
03751 004631          OCT 004631     0999
03752 114626          OCT 114626     9996
03753 063147          OCT 063147     6667
*
03754 000000          OCT 000000     ARCTAN(.0001)
03755 004631          OCT 004631     0999
03756 114631          OCT 114631     9999
03757 113147          OCT 113147     9667
*
03760 000000          OCT 000000     ARCTAN(.00001)
03761 004631          OCT 004631     0999
03762 114631          OCT 114631     9999
03763 114627          OCT 114627     9997
*
03764 000000 C3       OCT 0000000     PI
03765 030501          OCT 030501      3141
03766 054446          OCT 054446      5926
03767 051540          OCT 051540     5360
*
03770 000002 C4       OCT 0000000     2PI
03771 061203          OCT 061203      6283
03772 014123          OCT 014123      1853
03773 003440          OCT 003440      0720
*
03774 000400 C8       OCT 000400      200/PI
03775 061546          OCT 061546     6366
03776 014567          OCT 014567     1977
03777 021545          OCT 021545     2365
```

*01 FUNCTIONS FOR 9830

```
12533                 ORG 12533B
*
12533 003774 GPERR DEF C8        ADDRESS OF 200/PI
00035        P22   EQU .22
00060        P100  EQU .100
00144        N13   EQU M13
00156        N100  EQU M100
12534 003730 LN10  DEF C2        ADDRESS OF LN10
12535 003764 PI    DEF C3        ADDRESS OF PI
12536 003770 TWOPI DEF C4        ADDRESS OF 2PI
12537 001720 AWRDN DEF WRDN      TOP OF THE DIGIT STACK
00111        ADRX  EQU B1740     ADDRESS OF REGISTER X
12540 001734 ADRY  OCT 1734      ADDRESS OF REGISTER Y
12540        ADR0  EQU ADRY      ADDRESS OF REGISTOR THETE
12541 001630 TREG  DEF TREGE     ADDRESS OF REGISTOR T
12542 001634 RSLT  DEF RSLTE     ADDRESS OF THE ORIGNAL ARGUMENT
00110        EP3   EQU B1400      EXPONENT POSITIVE 3
00013        D0100 EQU B400       BCD 0100
00033        D0010 EQU B20        BCD 0010
00121        GRAF  EQU B4000      EXPONENT POSITIVE 8
12543 176400 EN3   OCT 176400    EXPONENT NEGATIVE 3
12544 172000 EN12  OCT 172000    EXPONENT NEGATIVE 12
12545 003674 THETL DEF C1-4      ADDRESS OF LOG CONSTANT TABLE
12546 003724 THETT DEF C2-4      ADDRESS OF TRIG. CONSTANT TALE
03012        RAD   EQU P1        RADIAN CODE
```

```
      00017          GRA    EQU P2         GRAD CODE
*
*  ADDITITONAL CONSTANTS FOR MATH
*
      02117          AD5    EQU B2400
      02145          N14    EQU M14
*
*
*************************************
*
***     PROGRAM SURROUTINES
*
*
*************************************
*
* INITIALIZE ROUTINE
*
 12547 035712 INIT   STB FNCFG      STORE THE FUNCTION FLAG
*
 12550 031703        STA ADR2       STORE THE ADDRESS OF THE ARGUMENT
 12551 121703        LDA ADR2,I     SAVE THE ORIGINAL EXPONENT
 12552 031716        STA SIGN         WORD IN SIGN
*
 12553 021703        LDA ADR2       SAVE THE ANSWER OF THE RESULT
 12554 026542        LDB RSLT
 12555 035703        STB ADR2
 12556 170004        XFR              SO IT IS SURELY IN A R/W TEMPORARY
*
 12557 022542 RTT    LDA RSLT       LOAD THE ARGUMENT
 12560 024214        LDB AR2A       INTO THE AR2 WORKING REGISTER
 12561 170004        XFR
*
 12562 066635        JMP ZERO       JUMP TO DETERMINE IF IT IS ZERO
*
*
*************************************
*
* NORMALIZE TWO ARGUMENTS
*
 12563 035702 DIV    STB ADR1       SAVE THE ADDRESS IN B
 12564 062575        JSM NORM       NORMALIZE THE NO. SPECIFIED IN A
 12565 026541        LDB TREG       TRANSFER IT INTO
 12566 170004        XFR              A TEMPORARY
 12567 021702        LDA ADR1       LOAD THE OTHER ADDRESS
 12570 062575        JSM NORM       NORMALIZE IT
 12571 026542 ITR    LDB RSLT       TRANSFER IT INTO THE
 12572 020214        LDA AR2A       RESULT REGISTOR AND RET
 12573 170004        XFR
 12574 170402        RET
*
*
*************************************
*
* NORMALIZE A SINGLE ARGUMENT
*
 12575 062560 NORM   JSM RTT+1      TRANSFER THE ARGUMENT SPECIFIED IN A INTO AR2
 12576 171450        NRM            NORMALIZE IT
 12577 074404        SBL 8          ALLIGN THE SHIFT COUNT IN B
 12600 074076        TCB            COMPLEMENT IT
 12601 005754        ADB AR2E       ADD THE EXPONENT WORD TO IT
 12602 035754        STB AR2E       RESTORE THE EXPONENT WORD
 12603 020214        LDA AR2A    LOAD THE ADD. OF THE ARGUMENT
 12604 170402        RET              AND RETURN
*
*
*************************************
*
* REDUCE ONE NUMBER TO A FRACTIONAL PART OF ANOTHER
*
 12605 062727 FRAC   JSM FDV1       DIVIDE THE ARGUMENT BY THE SPECIFIED CONSTANT
*
 12606 025754        LDB AR2E       LOAD THE EXPONENT WORD OF THE RESULT
 12607 070742        SAR 16         CLEAR THE COUNT WORD
 12610 031710        STA COUNT        FOR STORING THE INTEGER PART
 12611 074252        SBM *+5        SKIP IF THE EXPONENT IS NEGATIVE
*
 12612 004157        ADB N256       SUBTRACT 1 FROM THE EXPONENT
 12613 171400        MLS            LEFT SHIFT THE ARGUMENT
 12614 001710        ADA COUNT      STORE THE LEFT
 12615 070604        SAL 4            SHIFTED DIGIT
 12616 031710        STA COUNT        IN COUNT
 12617 075553        SBP *-5        SKIP IF THE EXPONENT IS STILL POSITIVE
 12620 035754        STB AR2E       STORE THE NEW EXPONENT WORD
*
 12621 062576        JSM NORM+1     JUMP TO NORMALIZE THE ARGUMENT
*
 12622 021702        LDA ADR1       MULTIPLY THIS FRACTIONAL
 12623 066750        JMP .FMP-1      PART OF THE ORIGINAL SPECIFIED CONSTANT
*
*
```

```
*************************************
*
* UNNORMALIZE AN ARGUMENT
*
12624 025754 UNRM  LDB AR2E       LOAD THE EXPONENT WORD
12625 074413       SRP ZERO       SKIP IF THE EXPONENT IS POSITIVE
12626 074340       ABR 8          ALLIGN AND COMPLEMENT
12627 074076       TCB              THE EXPONENT
12630 074117       LDA B          DUPLICATE IT AND
12631 000143       ADA N12          CHECK TO SEE IF IT
12632 070112       SAM *+2          IS GREATER THAN 12
12633 024031       LDB P13        SET B = 13 IF IT IS
*
12634 061305       JSM ROUND SHIFT AND COUNT  THE ARGUMENT
*
*
*************************************
*
* DETERMINE WHETHER AN ARGUMENT IS ZERO
*
12635 070075 ZERO  SEC *+1,C      CLEAR THE E REGISTER
12636 021755       LDA AR2E+1     ADD THE 12 DIGITS
12637 001756       ADA AR2E+2       OF AR2 TOGETHER
12640 001757       ADA AR2E+3       IN A
12641 072154       SES *+3,S      SKIP IF THE REGISTER OVERFLOWED AND SET F
12642 072110       RZA *+2        CLEAR E
12643 070075       SEC *+1,C      SKIP IF A IS NOT ZERO
12644 025754       LDB AR2E       LOAD THE EXPONENT WORD INTO B
12645 170402       RET              AND RETURN
*
*
*************************************
*
* RECIPROCATE AN ARGUMENT
*
12646 062571 RECIP JSM ITR
12647 020020       LDA ONE        SET THE DIVIDEND = 1
12650 025703       LDB ADR3
12651 066731       JMP .FDV+1
*
*
*************************************
*
* INITIALIZE ROUTINE FOR THE TRIG FUNCTIONS
*
*
12714 074742 STN   SBR 16         CLEAR THE G FLAG
12715 035706       STB GFG          AND THE TEMP
12716 035704       STB TEMP         LOCATION
12717 062547       JSM INIT       FETCH THE ARGUMENT AND INITTALIZE OTHER FLAGS
*
12720 025434       LDB UNITS      LOAD THE UNITS WORD
12721 074250       SZB DTOR       IF IT IS SET TO DEGREES JUMP TO CONVERT TO RAD.
12722 014012       CPB RAD        IF IT SAYS NOT RADIANS CONVERT
12723 170402       RET              IT FROM GRADS TO RADIANS
*
12724 026533 GTOR  LDB GPERR      LOAD THE ADDRESS OF 200/PI
12725 066727       JMP DTOR+1       DIVIDE IT INTO THE ARGUMENT
*
*
*************************************
*
* LINK ROUTINE TO FLOATING DIVIDE
*
12726 024027 DTOR  LDB DPERR      LOAD THE ADDRESS OF 180/PI
12727 021703 FDVI  LDA ADR3
12730 031703 .FDV  STA ADR2
12731 160221       JSM DVD.I      DO THE DIVIDE
12732 066737       JMP SANS       STORE THE RESULT
*
*
*************************************
*
* LINK ROUTINE TO FLOATING ADD
*
12733 022542 FADI  LDA RSLT
12734 035702 .FAD  STB ADR1
12735 031703       STA ADR2
12736 160216       JSM ADD.I      DO THE ADD
12737 020214 SANS  LDA AR2A
12740 025703       LDB ADR3
12741 170004       XFR
12742 170402       RET
*
*
*************************************
*
* LINK ROUTINE TO FLOATING MULTIPLY
*
```

```
12743 020027 RTOD  LDA UPERR     LOAD THE ADDRESS OF 180/PI
12744 026541       LDB TREG      TRANSFER THIS QUANTITY INTO A
12745 170004       XFR           TEMPORARY IN ORDER TO
12746 045633       ISZ TREGE+3   INCREMENT DIGIT 12 BY 1
12747 022541       LDA TREG      SET (A) TO THE POINTER TO TREG
12750 024214       LDB AR2A      SET B = ADD. OF AR2
*
*
12751 160220 .FMP  JSM MLT,I
12752 066737       JMP SANS      STORE THE ANSWER
*
*
************************************
*
* REGISTER TRANSFER SUBROUTINES
*
12753 020020 OTO   LDA ONE       SET A = THE ADDRESS OF FLOATING ONE
12754 024213 XAR1  LDB AR1A      TRANSFER IT INTO AR1 AND RETURN
12755 170004       XFR
12756 170402       RET
*
12757 020020 OTT   LDA ONE       SET A = THE ADDRESS OF FLOATING ONE
12760 066560       JMP RIT+1     TRANSFER FLOATING ONE INTO AR2
************************************
*
***      MAIN PROGRAMS
*
***********************
*
*      FIND THE SINE OF AN ARGUMENT
*
12761 062714 SIN   JSM STN       FETCH THE ARGUMENT AND INITIALIZE FLAGS
12762 045704       ISZ TEMP      SET TEMP = 1
12763 063054       JSM TAN+1     CALCULATE THE TANGENT OF THE ARGUMENT
*
12764 072150       RZA *+3       SKIP IF OVERFLOW DID NOT OCCUR
12765 062757       JSM OTT       IF TAN WAS INFINITY
12766 066773       JMP .CS       SET + OR - ONE INTO AR2
12767 062737       JSM SANS
12770 070742       SAR 16        LET THE FUNCTION FLAG BE 0
12771 062652       JSM SCRT      JUMP TO CALCULATE SQR(1+XX)
*
12772 062730       JSM .FDV      DIVIDE THE ORIGINAL NO. BY THIS QUANTITY
*
12773 021754 .CS   LDA AR2E      LOAD THE EXPONENT WORD WORD OF THE RESULT
12774 072051       SLA *+1,S     SET THE MANTISSA SIGN BIT
12775 025711       LDB RCPFG     LOAD THE RECIPROCAL FLAG INTO B
12776 004133       ADB N2        SUBTRACT 2 FROM IT
12777 074702       SBR 15        LET BIT 0 = 1 IF THE RESULT WAS NEGATIVE
13000 005716       ADB SIGN      ADD THE ORIGINAL MANTISSA SIGN BIT TO THIS
13001 074111       SLB *+2       IF THE RESULTANT LOW BIT IS
13002 070071       SLA *+1,C       ZERO CLEAR THE MANTISSA SIGN BIT OF THE ANSWER
13003 074742       SBR 16        SET B = 0 AND JUMP
13004 070112       SAM *+2
13005 035757       STB AR2+3
13006 067202       JMP OUT         TO THE STORE ROUTINE
*
************************************
*
* FIND THE COSINE OF AN ARGUMENT
*
13007 062714 COS   JSM STN       FETCH THE ARGUMENT IN RADIANS
13010 021754       LDA AR2E      CHECK THE EXPONENT
13011 070340       AAR 8
13012 000142       ADA M11       IF LESS THAN 11
13013 070112       SAM *+2       SKIP
13014 066757       JMP OTT       OTHERWISE ASSUME A FULL CIRCLE
13015 024023       LDB PI/2
13016 062733       JSM FAD1      ADD PI/2 TO THE ARGUMENT
13017 066762       JMP SIN+1     JUMP TO SINE ROUTINE
*
**************************************
13020 000000       BSS 1       CHECKSUM WORD
*
***************************************
*
*
*
************************************
*
* FIND THE ARCCOSINE OF AN ARGUMENT
*
13021 024132 ACS   LDB N1      LET THE FUNCTION FLAG BE -1
13022 063032       JSM ASNS+1    JUMP TO THE ARCSINE ROUTINE
13023 021706       LDA GFG       LOAD THE ORIGINAL EXPONENT WORD
13024 070211       SLA ACSC      SKIP IF THE MANTISSA SIGN BIT IS 0
13025 062571       JSM ITR     OTHERWISE FETCH ANSWER
13026 026535       LDB PI
13027 062733       JSM FAD1
13030 067256 ACSC  JMP EATN      JUMP TO CONVERT TO THE PROPER UNITS
```

```
*
*
***********************************
*
* SUBROUTINE FOR THE ARC ROUTINES
*
 13031 024012 ASNS  LDB P1       LET THE FUNCTION FLAG BE 1
 13032 035710       STB COUNT    STORE THE FUNCTION FLAG
 13033 070537       LDB A,I      SAVE THE EXPONENT WORD
 13034 035706       STB GFG        FOR FUTURE REFERENCES
 13035 062550       JSM INIT+1     FETCH THE ARGUMENT AND INITIALIZE THE FLAGS
 13036 062653       JSM SQRT+1     CALCULATE SQR (1+OR-XX)
 13037 074070       SIB *+1        LOAD THE FIRST 4 DIGITS
 13040 074537       LDB B,I          OF THE NUMBER SPECIFIED BY THE ADDRESS IN B
 13041 076210       RZB *+4        SKIP IF THEY ARE NOT ZERO
 13042 061256       JSM CLAR2      * CLEAR AR2
 13043 021716       LDA SIGN       * LOAD A WITH THE ORIGNAL SIGN
 13044 067244       JMP ROOT+3     JUMP TO ATNS ROUTINE TO STORE +- PI/2
*
 13045 062674       JSM SQRT1      JUMP TO FETCH THE DIVIDE ADDRESSES OF SQRT
 13046 062731       JSM .FDV+1     DIVIDE  THE RESULTS OF SQRT
 13047 021703       LDA ADR3       SET THE ADDRESS OF THE RESULT
 13050 067206       JMP ATNS       JUMP TO THE ARCTANGENT ROUTINE
*
*
***********************************
*
* FIND THE ARCSINE OF AN ARGUMENT
*
 13051 063031 ASN   JSM ASNS       CALCULATE THE ANSWER IN RADIANS
 13052 067256       JMP EATN       CONVERT IT TO THE PROPER UNITS
*
*
***********************************
*
* FIND THE TANGENT OF AN ARGUMENT
*
 13053 062714 TAN   JSM SIN        FETCH THE ARGUMENT IN RADIANS AND INITIALIZE FLAGS
 13054 024012       LDB P1         SET THE RECIPROCAL
 13055 035711       STB RCPFG        FLAG TO 1
 13056 025754       LDB AR2E       LOAD THE EXPONENT WORD
 13057 035716       STB SIGN
 13060 074153       SBP *+3        SKIP IF THE EXPONENT IS POSITIVE
 13061 045706 GET3  ISZ GFG      OTHERWISE SET GFG=1 AND
 13062 067116       JMP GET          DO NOT SCALE
 13063 026536       LDB TWOPI      SCALE THE ARGUMENT TO
 13064 062605       JSM FRAC         WITHIN ONE CIRCLE
 13065 062635       JSM ZERO       DETERMINE IF THE RESULT IS ZERO
 13066 070635       SEC FAL1,C      STORE ZERO IF IT IS
 13067 075512       SBM GET3     SKIP IF THE EXPONENT IS NOW NONZERO
*
 13070 020023       LDA PI/2       LOAD PI/2
 13071 062754       JSM XAR1       INTO AR1
 13072 170400       CMY            COMPLEMENT IT
 13073 074742       SBR 16         SUBTRACT AR 1 FROM AR2
 13074 170420       FDV              UNTIL AR2 GOES NEGATIVE
 13075 035711       STB RCPFG      STORE THE NO. OF SHIFTS BEFORE OVERFLOW
 13076 062635       JSM ZERO       DETERMINE IF AR2 IS NOW ZERO
 13077 070434       SES *+8,C      SKIP IF IT IS NOT ZERO
*
 13100 025711       LDB RCPFG      SKIP IF THE NO. OF SUBTRACTS
 13101 074111       SLB *+2          ABOVE WAS EVEN
 13102 065256 FAL1  JMP CLAR2      STORE ZERO IF ODD - EXIT HERE FOR SIN 0, COS 90,TAN
*    EXIT BELOW FOR SIN 90, COS 0, AND TAN 90
 13103 025754       LDB AR2E       LOAD THE EXPONENT WORD
 13104 055704       DSZ TEMP       STORE MAX NO. IF THE SIN
 13105 065274       JMP STMAX      ROUTINE WAS NOT CALLED
 13106 170402       RET            OTHERWISE RETURN WITH A=0
*
 13107 062576       JSM NORM+1     NORMALIZE AR2
*
 13110 074312       SBM GET        SKIP IF THE NEW EXPONENT IS NEGATIVE
 13111 020157       LDA N256       MAKE THE EXPONENT
 13112 041716       IOR SIGN         MINUS ONE AND
 13113 031754       STA AR2E         ORIGINAL MANTISSA SIGN BIT
 13114 031716       STA SIGN       STORE THIS ALSO OVER THE ORIGINAL EXPONENT
*
 13115 067121       JMP GET+3      JUMP TO AVOID THE OFFSET BELOW
 13116 035716 GET   STB SIGN       STORE THE NEW EXPONENT WORD
 13117 024012       LDB P1         SET B=1 AND
 13120 061305       JSM ROUND      JUMP TO RIGHT SHIFT AR2
*
 13121 063523       JSM ATD        INITIALIZE THE DIGIT STACK POINTER
*
 13122 021754       LDA AR2E       LOAD THE EXPONENT WORD
 13123 070240       AAR 6          MULTIPLY THE EXPONENT WORD BY 4
 13124 070076       TCA            COMPLEMENT IT
 13125 002546       ADA THETT      ADD IT TO THE TRIG TABLE LINK IN A
 13126 025754       LDB AR2E       LOAD THE EXPONENT WORD
 13127 074340       ABR 8          ALLIGN THE EXPONENT WORD
```

#01 FUNCTIONS FOR 9830

```
     13130 004024         ADB P7        AND ADD 7 TO IT
     13131 074453         SBP .T.       SKIP IF THE RESULT IS POSITIVE
*
     13132 171450         NRM           NORMALIZE AR2
     13133 062571         JSM ITR       TRANSFER AR2 INTO THE RESULT LOCATION
     13134 025711         LDB RCPFG     LOAD THE NO. OF SUBTRACTS FROM ABOVE
     13135 074111         SLB *+2       SKIP IF IT IS EVEN
     13136 067200         JMP OUT-2     IF ODD JUMP TO THE STORE ROUTINE
     13137 062646         JSM RECIP     RECIPROCATE THE RESULT
     13140 025711         LDB RCPFG     LOAD THE NO. OF SUBTRACTS
     13141 067200         JMP OUT-2     JUMP TO THE STORE ROUTINE
     13142 075410 .T.     SZB *-8       SKIP BACK IF THE EXPONENT WAS -7
*
     13143 063431         JSM IN        EXECUTE PHASE I
*
     13144 021754         LDA AR2E      LOAD THE EXPONENT WORD
     13145 000013         ADA P256      INCREMENT THE EXPONENT BY 1
     13146 070340         AAR 8         SHIFT TO THE LOW 8 BITS IN A
     13147 074742         SBR 16        SET THE EXPONENT
     13150 035754         STB AR2E        WORD OF AR2 TO.0
     13151 070137         LDB A         SET B EQUAL TO 6
     13152 070076         TCA             MINUS THE
     13153 004023         ADB P6          6 REGISTER
     13154 063457         JSM IN2       EXECUTE PHASE II
*
     13155 021711         LDA RCPFG     LOAD THE RECIPROCAL FLAG
     13156 070211         SLA *+4       SKIP IF IT IS EVEN
     13157 020213         LDA AR1A      SET A TO THE ADD. OF CORDIC X
     13160 025713         LDB RY1       SET B TO THE ADDRESS OF CORDIC Y
     13161 067164         JMP *+3       JUMP TO NORMALIZE THESE
     13162 021713         LDA RY1       SET A TO THE ADDRESS OF CORDIC Y
     13163 024213         LDB AR1A      SET B TO THE ADD. OF CORDIC X
     13164 062563         JSM DIV       JUMP TO NORMALIZE THESE QUANTITIES
     13165 022542         LDA RSLT      LOAD THE ADDRESS OF THE DIVISOR
     13166 026541         LDB TREG      LOAD THE ADDRESS OF THE DIVIDEND
     13167 062730         JSM .FDV       JUMP TO THE DIVIDE ROUTINE
*
     13170 025716         LDB SIGN      LOAD THE EXPONENT ORIGINAL EXPONENT WORD INTO A
     13171 005711         ADB RCPFG     ADD THE RECIPROCAL FLAG TO THE MANTISSA SIGN BIT
     13172 004013         ADB P256      INCREMENT THE EXPONENT BY 1
     13173 021711         LDA RCPFG     LOAD THE RECIPROCAL FLAG INTO B
     13174 070111         SLA *+2       SKIP IF IT IS EVEN
     13175 067200         JMP OUT-2     JUMP TO THE STORE ROUTINE
     13176 074076         TCB           COMPLEMENT B AND
     13177 004033         ADB D0010       PROPOGATE BIT 7 INTO  THE EXPONENT
     13200 005706         ADB GFG       ADD THE G FLAG TO THE MANTISSA SIGN INB
     13201 021754         LDA AR2E      STORE THE EXPONENT WORD OF AR2
     13202 031744 OUT     STA AR1F        IN AR1 FOR THE STORE ROUTINE
*
     13203 022542         LDA RSLT      RESET THE RETURN
     13204 031703         STA ADR3        LOCATION ADDRESS
*
     13205 065237 ZOR     JMP STAR2      JUMP TO THE STORE ROUTINE
*
*
***********************************
*
* ARCTANGENT SUBROUTINE
*
     13206 024062 ATNS    LDB D8000     LOAD THE ARCTANGENT FLAG - BCD 8000
     13207 062547         JSM INIT      JUMP TO FETCH THE ARGUMENT AND INITIALIZE THE FLAGS
*
     13210 071655         SEC ZOR       RETURN IF IT IS ZERO
     13211 074312         SBM OK+1      SKIP IF THE EXPONENT IS NEGATIVE
     13212 006544         ADB EN12      IF THE EXPONENT IS LESS THAN 12
     13213 074152         SBM OK          JUMP TO CONTINUE
     13214 061256 FAP     JSM CLAR2    OTHERWISE SET AR2 = 0 AND JUMP TO
     13215 067241         JMP POOT      STORE AN ANSWER OF PI/2
*
     13216 062646 OK      JSM RECIP     RECIPROCATE THE ARGUMENT
*
     13217 062704         JSM CLER      CLEAR THE DIGIT STACK
     13220 021754         LDA AR2E      SET THE A REGISTER EQUAL
     13221 070300         AAR 7           TO 22 - 2* THE EXPONENT
     13222 070076         TCA             TO BE USED AS A SHIFT
     13223 000035         ADA P22         FACTOR IN PHASE II
     13224 024030         LDB P12       SET B = 12 TO BE USED AS A LOOP COUNT
*
     13225 063457         JSM IN2       EXECUTE PHASE II
     13226 021754         LDA AR2E      SAVE THE EXPONENT
     13227 031714         STA SAVE        OF AR2 IN SAVE
     13230 070340         AAR 8         SET A EQUAL TO
     13231 070076         TCA             6 MINUS THE EXPONENT
     13232 000023         ADA P6          TO BE USED AS A LOOP COUNT
*
     13233 000144         ADA N13         IN PHASE III
     13234 070112         SAM *+2       IF THIS QUANTITY IS GREATER
     13235 020132         LDA N1          THAN 12 SET THE
     13236 000031         ADA P13         A REGISTER TO 12
     13237 026535         LDB PI        LET B = THE ADDRESS OF THE TRIG CORDIC TABLE
```

```
#01  FUNCTIONS FOR 9830

      13240 063654         JSM IN3       EXECUTE PHASE III
*
      13241 021716 POOT    LDA SIGN      LOAD THE ORIGINAL EXPONENT WORD
      13242 031754         STA AR2F        AND STORE IT IN AR2
      13243 070452         SAM GONO      SKIP IF THE EXPONENT IS NEGATIVE
*
      13244 050012         AND P1        OTHERWISE CLEAR ALL BUT THE MANTISSA
      13245 031754         STA AR2F        SIGN BIT IN THE EXPONENT WORD
      13246 025714         LDB SAVE      LOAD THE EXPONENT FROM AFTER THE RECIPROCATION
      13247 062625         JSM UNRM+1    UNNORMALIZE AR2
*
      13250 020023         LDA PI/2      SET PI/2 IN THE
      13251 062754         JSM XAR1      AR1 TEMPOARY
*
      13252 170400         CMY           CALCULATE
      13253 170560         FXA             AR2=AR1-AR2
*
      13254 066576 GONO    JMP NORM+1    NORMALIZE THE RESULT
*
*
***********************************
*
* FIND THE ARCTANGENT OF AN ARGUMENT
*
      13255 063296 ATN     JSM ATNS      JUMP TO CALCULATE THE ANSWER IN RADIANS
*
      13256 025434 EATN    LDB UNITS     LOAD THE UNITS MODE WORD
      13257 076110         RZB *+2       IF IT IS SET TO DEGREES
      13260 062743         JSM RTOD        CONVERT THE ANSWER TO DEGREES
      13261 022533         LDA GPERR     IF GRADS ARE SET
      13262 014017         CPB GRA         CONVERT THE ANSWER
      13263 062744         JSM RTOD+1      TO GRADS
*
      13264 074742 SOUT    SHR 16        CLEAR B AND RETURN
      13265 067201         JMP OUT-1       THRU THE STORE ROUTINE
*
*
***********************************
* RAISE NAPERIAN E TO A POWER
*
      13266 021703         LDA ADR2
      13267 062751         JSM .FMP
      13270 021703         LDA ADR3
      13271 024012 .EXP    LDB P1       LET THE FUNCTION FLAG BE 1
      13272 062547         JSM INIT      FETCH THE ARGUMENT AND INITIALIZE THE FLAGS
      13273 006543         ADB EN3       IF THE EXPONENT IS 3 OR GREATER
      13274 074413         SBP STM1-1      JUMP TO THE STORE MAX ROUTINE
*
      13275 026534         LDB LN10      SUBTRACT AS MANY WHOLE LN10'S
      13276 062605         JSM FRAC        FROM THE NO. AS POSSIBLE
      13277 062624         JSM UNRM      UNNORMALIZE THE RESULT
*
      13300 021710         LDA COUNT     LOAD THE NO. OF SUBTRACTS FROM ABOVE
      13301 070542         SAR 12        ISOLATE THE FIRST DIGIT
      13302 070210         SZA STM1+1    IF IT IS NOT ZERO
      13303 025716         LDB SIGN      LOAD THE EXPWORD OF THE ORIGNAL ARGUMENT
      13304 074044         SBL 15        POSITION THE SIGN BIT AND JUMP TO
      13305 065264 STM1    JMP OF+3      THE OVERFLOW/UNDERFLOW ROUTINE
*
      13306 025710         LDB COUNT     LOAD THE NO. OF LN10'S
      13307 074434         SBL 8         ISOLATE THE UNITS DIGIT
      13310 074142         SBR 4          OF IT IN B
      13311 021710         LDA COUNT     ISOLATE THE TENS DIGIT
      13312 070342         SAR 8           OF IT IN A
      13313 070344         SAL 9         MULTIPLY THE A REGISTER
      13314 070037         ADB A           BY 10 AND ADD IT
      13315 070704         SAL 2           TO B
      13316 070037         ADB A         THIS QUANTITY WILL BE THE EXPONENT
      13317 035711         STB RCPFG       OF THE UNNORMALIZED ANSWER
*
      13320 062704         JSM CLER      CLEAR THE DIGIT STACK
      13321 063523         JSM ATD       INITIALIZE THE DIGIT
      13322 055717         DSZ DIGIT       STACK POINTER
      13323 022545         LDA THETL     PUT THE ADDRESS OF THE LOG CONSTANT STACK IN A
      13324 024023         LDB P6        SET B = 6 LOOPS
      13325 063431         JSM IN        EXECUTE PHASEI
*
      13326 024136         LDB N5        TRANSFER THE LAST
      13327 045717         ISZ DIGIT       SIX DIGITS OF THE
      13330 171400         MLS             REDUCED ARGUMENT
      13331 131717         STA DIGIT,I     INTO THE DIGIT STACK
      13332 077670         RIB *-3         FROM AR2
*
      13333 062753         JSM OTO       SET AR1 = 1
      13334 063603         JSM PTJ       EXECUTE PHASE IV
*
      13335 021711 BACK    LDA RCPFG     STORE THE EXPONENT CALCULATED
      13336 031754         STA AR2F        ABOVE IN AR2
      13337 171450         NRM           NORMALIZE THE ANSWER
*
```

```
 13340 021716        LDA SIGN      IF THE ORIGINAL ARGUMENT
 13341 070111        SLA *+2         WAS NEGATIVE RECIPROCATE
 13342 062646        JSM RECIP       THE ANSWER
 13343 067264        JMP SOUT      JUMP TO THE STORE ROUTINE
*
*
*************************************
*
* FIND THE NATURAL LOGARITHM OF AN ARGUMENT
*
 13344 024132 LNX    LDB N1        SET THE FUNCTION FLAG TO -1
 13345 062547        JSM INIT      FETCH THE ARGUMENT AND INITIALIZE THE FLAGS
*
 13346 070314        SES *+6
 13347 160205        JSM AERRA,I
 13350 177632        DEC -102
 13351 024012        LDB P1      SET THE FUNCTION FLAG TO 1
 13352 035712        STB FNCFG       FNCFG IS FLAGED TO RETURN -9.9E99 WHEN LOG10 CALL.
 13353 065274        JMP STMAX
 13354 074111        SLB *+2
 13355 160206 ER47   JSM ERRA,I
*
 13356 062704        JSM CLER      CLEAR THE DIGIT STACK
 13357 063603        JSM PTJ       EXECUTE PHASE IV
 13360 055717        DSZ DIGIT     DECREMENT THE DIGIT STACK POINTER
*
 13361 020023        LDA P6        LET I = 6 LOOPS
 13362 026534        LDB LN10      LET B = THE ADDRESS OF THE LOG CONSTANT STACK
*
 13363 063654        JSM IN3       EXECUTE PHASE III
*
 13364 026540        LDB ADR0      SAVE THE MANTISSA OF THE ANSWER IN
 13365 020214        LDA AR2A      IN A TEMPORARY
 13366 170004        XFR
*
 13367 062757        JSM OTT       SET AR2 = 1
*
 13370 021716        LDA SIGN      LOAD THE ORIGINAL EXPONENT
 13371 000013        ADA P256      INCREMENT IT
 13372 070153        SAP *+3       IF IT IS NEGATIVE
 13373 070071        SLA *+1,C       CLEAR THE MANTISSA SIGN
 13374 070076        TCA             AND COMPLEMENT IT
 13375 070342        SAR 8         SHIFT IT TO THE LOW 8 BITS
*
 13376 000156        ADA N100      SUBTRACT 100 FROM IT
 13377 024013        LDB D0100     SET B = BCD 0100
 13400 070153        SAP *+3       SKIP IF THE EXPONENT IS POSITIVE
 13401 000060        ADA P100      OTHERWISE RESTORE IT AND
 13402 074742        SBR 16          CLEAR B
*
 13403 000141        ADA N10       SUBTRACT 10 FROM IT
 13404 070152        SAM *+3       SKIP IF IT IS NEGATIVE
 13405 004033        ADB D0010     OTHERWISE ADD BCD 0010 TO B
 13406 067403        JMP *-3       JUMP BACK TO ADD AGAIN
 13407 000061        ADA P10       RESTORE A
*
 13410 070037        ADB A         ADD THE ONES LEFT TO B
 13411 035755        STB AR2E+1    STORE THIS WORD AS THE FIRST 4 DIGITS OF AR2
*
 13412 020110        LDA EP3       SET THE EXPONENT
 13413 031754        STA AR2E         OF AR2 TO +3
 13414 062576        JSM NORM+1    NORMALIZE AR2
*
 13415 022534        LDA LN10      MULTIPLY AR2 BY
 13416 062750        JSM .FMP-1     LOG OF 10
*
 13417 021703        LDA ADR3      NORMALIZE THIS AND THE
*
 13420 026540        LDB ADR0        RESULT OF THE
 13421 062563        JSM DIV         CORDIC ITERATION
*
 13422 146542        ISZ RSLT,I    NEGATE THE MANTISSA QUANTITY
*
 13423 021716        LDA SIGN      IF THE EXPONENT OF THE
 13424 070113        SAP *+2         ORIGINAL WAS NEGATIVE
 13425 045630        ISZ TREGE       NEGATE THE LN10 MULTIPLE
 13426 022541        LDA TREG      ADD THESE TWO
 13427 026542        LDB RSLT        QUANTITIES FOR THE
 13430 066734        JMP .FAD      FINAL ANSWER
*
*
*************************************
*
* CORDIC LOOP
*
*
*************************************
*
* PHASE I
*
```

```
13431 031705 IN     STA TABL0     STORE THE TABLE ADDRESS
13432 035707        STB SHIFT     STORE THE NO. OF LOOPS
*
13433 062635 PTA    JSM ZERO      DETERMINE IF THE ARGUMENT IS ZERO
13434 070154        SES *+3       IF IT IS INCREMENT THE
13435 145717        ISZ DIGIT,I     LAST DIGIT IN THE STACK
13436 170402        RET             AND RETURN
*
13437 170400        CMY           COMPLEMENT THE ARGUMENT
*
13440 045717        ISZ DIGIT     INCREMENT THE DIGIT STACK POINTER
*
13441 020021        LDA P4        FETCH THE NEXT CONSTANT
13442 001705        ADA TABL0     FETCH THE NEXT CONSTANT
13443 031705        STA TABL0     INTO AR1
13444 024213        LDB AR1A
13445 170004        XFR
*
13446 074004        SBL 16        ADD AR1 TO AR2
13447 170420        FDV             UNTIL OVERFLOW
*
13450 135717        STB DIGIT,I   STORE THE NO. OF SUBTRACTS BEFORE OVERFLOW
*
13451 170400        CMY           RESTORE THE
13452 170560        FXA             ARGUMENT TO ITS LAST NEGATIVE VALUE
*
13453 171400        MLS           LEFT SHIFT THE ARGUMENT
*
13454 055707        DSZ SHIFT     DECREMENT THE LOOP COUNTER
13455 067433        JMP PTA       CONTINUE IF IT IS NONZERO
13456 170402        RET           OTHERWISE RETURN
*
*
*************************************
*
* PHASE II
*
13457 031714 IN2    STA SAVE      STORE THE SHIFT FACTOR
13460 035707        STB SHIFT     STORE THE LOOP COUNT
13461 062753        JSM OTO       SET AR1 = 1
*
13462 022540        LDA ADRY      INITIALIZE RY1 AND RY2
13463 031713        STA RY1         TO THE ADDRESSES OF
13464 020111        LDA ADRX        TWO TEMPORARIES FOR
13465 031715        STA RY2         INTERMEDIATE STORAGE
*
13466 025712        LDB FNCFG     SKIP TO PTE IF THE ATN
13467 076650        RZB PTE         IS BEING CALCULATED
13470 067525 PTL1   JMP PTL       OTHERWISE GO TO PTL
*
13471 076710 PTB    RZB PTN
13472 067534        JMP PTC
*
13473 055717 PTD    DSZ DIGIT     DECREMENT THE DIGIT STACK POINTER
13474 025712        LDB FNCFG     SKIP TO PTL IF THE
13475 075550        SZB PTL1        TAN IS BEING CALCULATED
*
13476 021755 PTO    LDA AR2E+1    LOAD THE FIRST FOUR DIGITS OF AR2
13477 070542        SAR 12        ISOLATE THE FIRST ONE
13500 070150        SZA *+3         AND SKIP IF IT IS ZERO
13501 170410        DRS           OTHERWISE RIGHT SHIFT
13502 067507        JMP PTN         AR2 AND JUMP TO PTN
13503 171400        MLS           LEFT SHIFT AR2 ONCE
13504 020214 PTE    LDA AR2A      STORE THE NEW VALUE
13505 025713        LDB RY1         OF Y IN
13506 170004        XFR             RY1
*
13507 174400 PTN    CMX           NEGATE AR1 = X
13510 170560        FXA           AR2 = AR2-AR1    (Y-X)
13511 070314        SES *+6       SKIP ON OVERFLOW
13512 021713        LDA RY1       OTHERWISE RESTORE
13513 024214        LDB AR2A      AR2 WITH ITS
13514 170004        XFR             LAST VALUE
13515 174400        CMX           RECOMPLEMENT AR1 = X
13516 067600 PTF1   JMP PTF       JUMP TO PTF
*
13517 174400        CMX           RECOMPLEMENT AR1
*
13520 062635        JSM ZERO      DETERMINE IF AR2 = 0
13521 070634        SES PTM,C     SKIP IF IT IS NOT
13522 155717        DSZ DIGIT,I   IF IT IS ZERO DECREMENT THE
13523 022537 ATD    LDA AWRDN       LAST DIGIT AND FINALIZE THE
13524 066712        JMP CK-1        DIGIT STACK POINTER AND RETURN
13525 024012 PTL    LDB P1        RIGHT SHIFT AND ROUND UP
13526 061305        JSM ROUND     AR1 ONCE
*
13527 020214        LDA AR2A      STORE THIS
13530 025713        LDB RY1         NEW Y IN
13531 170004        XFR             RY1
*
```

#01 FUNCTIONS FOR 9830

```
13532 121717      LDA DIGIT,I   IF THE PRESENT DIGIT IS ZERO FOR
13533 071150      SZA PTF1        THE TAN JUMP TO PTF
*
13534 170560 PTC  FXA           OTHERWISE CALCULATE AR2=AR2+ARY   (Y=Y+X)
*
13535 021713 PTM  LDA RY1       EXCHANGE THE NEW
13536 025715      LDB RY2         AND OLD VALUES
13537 031715      STA RY2         OF Y BY EXCHANGING
13540 035713      STB RY1         THEIR ADDRESSES
13541 020214      LDA AR2A      STORE THE NEW
13542 170004      XFR             Y INTO AR2
*
13543 021715      LDA RY2       FETCH THE VALUE
13544 024214      LDB AR2A      OF Y USED IN THE LAST LOOP
13545 170004      XFR
*
13546 021712      LDA FNCFG     LOAD THE FUNCTION FLAG
13547 025707      LDB SHIFT     LOAD THE LOOP COUNTER
13550 004132      ADB N1        SUBTRACT 1 FROM IT
13551 074744      SHL 1         MULTIPLY IT BY 2
*
13552 070150      SZA *+3       SKIP IF TAN
13553 074076      TCB           COMPLEMENT IT AND
13554 067556      JMP *+2         JUMP
13555 005714      ADB SAVE      ADD THE SHIFT FACTOR TO IT
13556 005714      ADB SAVE        TWICE IF TAN AND ONCE IF ATN
*
13557 074117      LDA B         IF THE RESULTING
13560 000143      ADA N12         VALUE IS 12 OR
13561 070453      SAP PTK         MORE SKIP TO PTK
*
13562 061305      JSM ROUND     RIGHT SHIFT AR2 B TIMES AND ROUND UP
*
13563 025712      LDB FNCFG     LOAD THE FUNCTION FLAG
13564 076110      RZB *+2         AND COMPLEMENT AR2 IF
13565 170400      CMY             THE TAN IS BEING CALCULATED
13566 170560      FXA           ADD THE SHIFTED Y TO X FOR A NEW X
*
13567 020214      LDA AR2A      STORE THE NEW VALUE OF X
13570 024213      LDB AR1A      BACK IN AR1
13571 170004      XFR
*
13572 021713 PTK  LDA RY1       FETCH THE LAST
13573 024214      LDB AR2A      CALCULATED VALUE OF Y INTO AR2
13574 170004      XFR
*
13575 025712      LDB FNCFG     LOAD THE FUNCTION FLAG
13576 155717      DSZ DIGIT,I   DECREMENT THE PRESENT DIGIT
13577 067471      JMP PTB       JUMP TO PTB IF IT IS NOT ZERO
*
13600 055707 PTF  DSZ SHIFT     OTHERWISE DECREMENT THE LOOP COUNTER
13601 067473      JMP PTD       JUMP TO PTD IF NOT FINISHED
13602 170402      RET           OTHERWISE RETURN
*
*
*********************************
*
* PHASE III
*
13603 022537 PTJ  LDA AWRDN     INITIALIZE THE
13604 031717      STA DIGIT       DIGIT STACK POINTER
*
13605 020030      LDA P12       INITIALIZE THE
13606 031707      STA SHIFT       LOOP COUNT TO 12
13607 025712      LDB FNCFG     JUMP TO PTS IF THE
13610 074312      SBM PTS         LN IS BEING CALCULATED
13611 062757      JSM OTT       DUPLICATE AR1 IN AR2
*
13612 025712 PTR  LDB FNCFG     JUMP TO PTI IF THE
13613 074353      SBP PTI         EXP IS BEING CALCULATED
13614 174400      CMX           SUBTRACT
13615 170560      FXA             AR1 FROM AR2
13616 020214 PTS  LDA AR2A      DUPLICATE AR2, THE NEW X, IN AR1
13617 024213      LDB AR1A
13620 170004      XFR
13621 067624      JMP PTH-2     JUMP
*
13622 121717 PTI  LDA DIGIT,I   SKIP IF THE PRESENT
13623 070750      SZA GOON-1      DIGIT IN THE STACK IS ZERO
*
13624 020061      LDA P10       INITIALIZE THE INNER
13625 031705      STA TABL0       LOOP COUNT TO 10
13626 025707 PTH  LDB SHIFT     SUBTRACT THE OUTER
13627 074076      TCB             LOOP COUNT FROM 12
13630 004030      ADB P12         FOR THE SHIFT FACTOR
13631 070742      SAR 16        RIGHT SHIFT AR1
13632 174430      MRX             THIS MANY TIMES
*
13633 025712      LDB FNCFG     IF THE EXP IS BEING CALCULATED
13634 014012      CPB P1          SET THE OVERFLOW BIT IF THE
```

#01 FUNCTIONS FOR 9830

```
13635 000136        ADA N5        LAST SHIFTED DIGIT IS >=5
*
13636 170560        FXA           CALCULATE THE NEW X
*
13637 070454        SES PTG       SKIP ON OVERFLOW
13640 055705        DSZ TABL0     OTHERWISE DECREMENT THE INNER LOOP COUNTER
13641 067643        JMP GOON      JUMP BACK IF THIS DIGIT COUNT
13642 067650        JMP PTG         IS LESS THAN 10
*
13643 020214 GOON   LDA AR2A      DUPLICATE THE NEW VALUE
13644 024213        LDB AR1A      OF X IN AR1
13645 170004        XFR
*
13646 155717        DSZ DIGIT,I   DECREMENT THE STACK DIGIT
13647 067626        JMP PTH       JUMP TO PTN IF IT IS NOT ZERO
13650 045717 PTG    ISZ DIGIT     OTHERWISE INCREMENT THE DIGIT STACK POINTER
13651 055707        DSZ SHIFT     DECREMENT THE MAIN LOOP COUNTER
13652 067612        JMP PTR       JUMP TO PTR IF NOT FINISHED
13653 170402        RET           OTHERWISE RETURN
*
*
*********************************
*
* PHASE IV
*
13654 035705 IN3    STB TABL0     STORE THE CONSTANT TABLE ADDRESS
13655 031704        STA TEMP      STORE THE SHIFT FACTOR
13656 031707        STA SHIFT     STORE THE LOOP COUNT
*
13657 020214        LDA AR2A
13660 170000        CLR          CLEAR AR2
*
13661 121717 PTP    LDA DIGIT,I   LOAD THE PRESENT DIGIT FROM THE STACK
13662 070076        TCA           COMPLEMENT IT
13663 024012        LDB P1        SHIFT IT INTO
13664 174470        MRY             AR2
13665 025712        LDB FNCFG     LOAD THE FUNCTION FLAG
13666 074151        SLB *+3       SKIP IF LN
13667 055717        DSZ DIGIT     ESTABLISH WHERE THE NEXT DIGIT
13670 067672        JMP *+2
13671 045717        ISZ DIGIT     IS.
13672 055707        DSZ SHIFT     DECREMENT THE LOOP COUNTER
13673 067661        JMP PTP       JUMP BACK IF IT IS NONZERO
*
13674 070742        SAR 16        ESTABLISH THE NEW LOOP
13675 025704        LDB TEMP        COUNTER AS 12
13676 074076        TCB           MINUS THE LAST
13677 004030        ADB P12         INITIAL ONE AND
13700 035707        STB SHIFT       SHIFT AR2 RIGHT
13701 174470        MRY             THIS MANY TIMES
*
13702 020135 PTQ    LDA N4        FETCH THE NEXT CONSTANT
13703 001705        ADA TABL0     INTO AR1
13704 031705        STA TABL0
13705 024213        LDB AR1A
13706 170004        XFR
13707 070742        SAR 16        CLEAR A
13710 025707        LDB SHIFT     SKIP IF THE LOOP COUNT
13711 076110        RZB *+2       IS NOT ZERO
13712 170402        RET           OTHERWISE RETURN
13713 004132        ADB N1        SHIFT AR1 THE LOOP COUNT
13714 174430        MRX             MINUS 1 TIMES
*
13715 000136        ADA N5        IF THE LAST SHIFTED
13716 070175        SEC *+3,C       OUT DIGIT IS = 75
13717 020213        LDA AR1A      INCREMENT THE
13720 170540        MDI             CONSTANT IN AR1
*
13721 125717        LDB DIGIT,I   LOAD THE PRESENT DIGIT
13722 074076        TCB           COMPLEMENT IT
13723 171460        FMP           ADD AR1 INTO AR2 THIS MANY TIMES
*
13724 025712        LDB FNCFG
13725 074151        SLB *+3
13726 055717        DSZ DIGIT
13727 067731        JMP *+2
13730 045717        ISZ DIGIT
13731 055707        DSZ SHIFT     DECREMENT THE LOOP COUNTER
13732 067702        JMP PTQ       JUMP BACK IF IT IS NOT ZERO
13733 170402        RET           OTHERWISE RETURN
*
**********************************
*
* FIND THE LOG BASE TEN OF AN ARGUMENT
*
13734 063344 LOG    JSM LNX       TAKE THE NATURAL LOG OF THE ARGUMENT
13735 026534        LDB LN10
13736 055712        DSZ FNCFG       ZERO DIVIDE THE RESULT
13737 066727        JMP DTOR+1      BY LN10
13740 170402        RET           OTHERWISE RETURN WITH THE MAX NO.
*
*  LAST WORD AVAILABLE 13740B
```

```
*
* MATH ROUTINES BEGIN HERE
*
*
 11465                  ORG 11465B
*
 11465 077764 MASK2 OCT 77764
*
************************************
*
* FLOATING POINT SUBTRACT
*
*
 11466 031703 FSB    STA ADR2
 11467 074117        LDA B
 11470 024057        LDB ATEMP
 11471 035702        STB ADR1
 11472 170004        XFR
 11473 120057        LDA ATEMP,I
 11474 072111        SLA *+2,S      * CHANGE THE SIGN
 11475 070071        SLA *+1,C      * AND ADD
 11476 130057        STA ATEMP,I
 11477 067502        JMP FAD+2
*
*
************************************
*
* FLOATING POINT ADDITION
*
*
 11500 031703 FAD    STA ADR2
 11501 035702        STB ADR1
 11502 125702        LDB ADR1,I     "SUBTRACT" ENTRY POINT
 11503 074340        ABR B            SUBTRACT THE
 11504 074076        TCB              EXPONENT OF THE
 11505 121703        LDA ADR2,I       SECOND ARGUMENT FROM
 11506 070340        AAR B            THE FIRST ARGUMENT
 11507 070037        ADB A            AND STORE THIS OFFSET
 11510 035701        STB TEMPA        IN A TEMPORARY
*
 11511 021703        LDA ADR2       LOAD THE ADDRESS OF THE FIRST ARGUMENT
 11512 074253        SBP *+5        JUMP IF THE 1ST ARI. IS LARGER
 11513 024214        LDB AR2A
 11514 170004        XFR            TRANSFER THE SMALLER NUMBER INTO AR2
 11515 024213        LDB AR1A       LOAD THE ADDRESS OF
 11516 067522        JMP *+4        AR1 AND JUMP
 11517 024213        LDB AR1A       TRANSFER THE LARGER NUMBER INTO AR1
 11520 170004        XFR
 11521 024214        LDB AR2A       TRANSFER THE OTHER
 11522 021702        LDA ADR1         ARGUMENT INTO THE
 11523 170004        XFR              OTHER WORKING REGISTER
*
*
 11524 021755        LDA AR2E+1     JUMP IF THE SMALLER
 11525 070510        SZA BNZ          ARGUMENT IS ZERO TO STORE THE LARGER
*
 11526 021745        LDA AR1E+1     JUMP IF THE LARGER
 11527 072110        RZA *+2          NUMBER IS NON-ZERO
 11530 065254        JMP ZONK       STORE THE LARGER ARGUMENT
*
*
 11531 021701        LDA TEMPA      LOAD THE OFFSET
 11532 070113        SAP *+2          AND COMPLEMENT IT
 11533 070076        TCA              IF ITS NEGATIVE
 11534 070137        LDB A          IF THE OFFSET IS GREATER
 11535 003465        ADA MASK2        THAN ELEVEN THEN
 11536 070253        SAP *+5        JUMP TO STORE THE
 11537 020213 BNZ   LDA AR1A       LARGER NUMBER
 11540 024214        LDB AR2A
 11541 170004        XFR
 11542 065254        JMP ZONK
*
*
 11543 061305        JSM ROUND      RIGHT JUSTIFY AND ROUND THE SMALLER ARGUMENT
*
 11544 021744        LDA AR1E       ADD THE SIGNS OF THE
 11545 001754        ADA AR2E         TWO MANTISSAS AND
 11546 070511        SLA INTLK      JUMP IF SAME
*
*
*
 11547 170400        CMY            THEY HAVE ULIKE SIGNS SO COMPLEMENT THE LARGER
 11550 170560        FXA            ADD THE MANTISSAS
 11551 070154        SES *+3        IF A CARRY DIGIT IS GENERATED
 11552 170400        CMY              COMPLEMENT THE ANSWER AND
 11553 045744        ISZ AR1E         CHANGE THE SIGN OF THE LARGER ARGUMENT
 11554 171450        NRM            NORMALIZE THE ANSWER;PUT THE NO. OF SHIFTS IN B
 11555 074076        TCB            COMPLEMENT AND ALLIGN THE
 11556 074404        SBL B            NO. OF SHIFTS
 11557 067572        JMP .FAD.      JUMP TO STORE ROUTINE IF NOT ZERO
```

```
*
 11560 070074 INTLK SES *+1,C      CLEAR THE E REGISTER
 11561 170560       FXA            ADD THE MANTISSAS
 11562 070214       SES *+4        IF NO CARRY IS GENERATED
 11563 021744       LDA AR1E         LET THE EXPONENT WORD OF THE
 11564 031754       STA AR2E       LARGER ARGUMENT
 11565 065254       JMP ZONK       JUMP TO THE STORE ROUTINE
 11566 170002       MOV            ELSE SHIFT A ONE INTO
 11567 070137       LDB A            THE MOST SIGNIFICANT
 11570 174470       MRY              LOCATION OF THE ANSWER
 11571 024013       LDB P256       LOAD B WITH THE EXPONENT CORRECTION
*
 11572 021755 .FAD. LDA AR2E+1
 11573 070110       SZA *+2        IF THE MANTISSA WAS 0 CLEAR AR2
 11574 065237       JMP STAR2
 11575 065256       JMP CLAR2
*
*
**********************************
*
* FLOATING POINT DIVISION
*
*
 11576 035702 FDV   STB ADR1
 11577 031703       STA ADR2
*
 11600 024214       LDB AR2A       PUT THE DIVIDEND INTO AR2
 11601 170004       XFR
*
 11602 021702       LDA ADR1       PLACE THE DIVISOR INTO AR1
 11603 024213       LDB AR1A
 11604 170004       XFR
*
 11605 020057       LDA ATEMP      INITIALIZE THE WORD
 11606 031475       STA TEMP2        POINTER FOR THE QUOTIENT
 11607 170000       CLR            CLEAR THE QUOTIENT REGISTER
*
*
*
 11610 021745       LDA AR1F+1
 11611 072310       RZA GOOD
 11612 160295       JSM AERRA,I
 11613 177631       DEC -103
 11614 025754       LDB AR2F       LOAD THE DIVIDEND WORD
 11615 074073       SBP *+1,C        AND COFAR THE SIGN BIT
 11616 065274       JMP STMAX
*
 11617 021755 GOOD  LDA AR2E+1
 11620 072110       RZA *+2
 11621 065254       JMP ZONK
*
 11622 170400       CMY            COMPLEMENT THE DIVISOR
 11623 020132       LDA N1         INITIAL FIRST DIVIDEND DIGIT TO -1
 11624 024144       LDB M13        INITIALIZE THE DIGIT
 11625 035477       STB TEMP4        COUNT TO 13
*
 11626 024135 NWWD  LDB M4         SET THE WORD DIGIT
 11627 035701       STB TEMPA        COUNT TO 4
*
 11630 074604 NXDG  SBL 4          CLEAR LOCATION FOR NEXT CALCULATED DIGIT AND ALLIGN
 11631 031476       STA TEMP3      STORE FIRST DIVIDEND DIGIT
*
 11632 170420 DINC  FDV            SUBTRACT DIVISOR FROM DIVIDEND UNTIL OVERFLOW
 11633 074070       SIB *+1        INCREMENT THIS COUNT
 11634 045476       ISZ TEMP3      INCREMENT FIRST DIVIDEND DIGIT
 11635 067632       JMP DINC       JUMP BACK IF NOT ZERO
*
 11636 021755       LDA AR2E+1     JUMP OUT OF
 11637 001756       ADA AR2E+2       MAIN LOOP
 11640 001757       ADA AR2E+3       IF DIVIDEND
 11641 072150       RZA NO           IS ZERO (I.E. AN
 11642 070134       SES NO,C         EXACT QUOTIENT
 11643 067663       JMP YES          WAS FOUND)
*
 11644 170400 NO    CMY            OTHERWISE RESTORE THE
 11645 170560       FXA              DIVIDEND TO ITS LAST POSITIVE VALUE
 11646 004132       ADB N1         SUBTRACT ONE FROM THE LAST CALCULATED DIGIT
 11647 170400       CMY            COMPLEMENT THE DIVIDEND AGAIN
*
 11650 171400       MLS            SHIFT THE DIVIDEND LEFT ONE DIGIT
 11651 000141       ADA N10        LET THE NEW FIRST DIGIT BE THE ONE SHIFTED OUT-10
*
 11652 045477       ISZ TEMP4      INCREMENT THE DIGIT COUNT
 11653 070112       SAM *+2        JUMP OUT OF LOOP IF DONE OR
 11654 067665       JMP DONE         IF DIVISOR HAS A NON BCD DIGIT
 11655 045701       ISZ TEMPA      INCREMENT WORD DIGIT COUNT
 11656 067630       JMP NXDG       JUMP BACK THRU LOOP IF NON ZERO
 11657 135475       STB TEMP2,I    GLSE STORE LAST 4 DIGITS IN QUOTIENT
 11660 045475       ISZ TEMP2      INCREMENT THE QUOTIENT WORD POINTER
 11661 067626       JMP NWWD         AND JUMP BACK
```

#01 MATH ROUTINED FOR 9830. CALLED 'MATH'

```
*
      11662 074604          SBL 4          ALLIGN THE LAST DIGIT
      11663 045701 YES      ISZ TEMPA      IF A PERFECT QUOTIENT
      11664 067662          JMP *-2          WAS FOUND
*
      11665 135475 DONE     STB TEMP2,I    STORE THE LAST 4 DIGITS
      11666 020057          LDA ATEMP      TRANSFER
      11667 000132          ADA N1           THE QUOTIENT
      11670 024214          LDB AR2A       INTO A
      11671 170004          XFR            WORKING REGISTOR
*
      11672 171450          NRM            NORMALIZE THE ANSWER
      11673 074310          SZB .GOON       SKIP IF IT WAS NORMALIZED  (B=0)
*
      11674 021753          LDA AR2E-1     LOAD LAST DIGIT
      11675 050032          AND P15          AND STORE IT
      11676 031757          ADA AR2E+3       IN THE
      11677 031757          STA AR2E+3       QUOTIENT
      11700 024157          LDB N256       LOAD AN EXP OF -1 INTO B
*
      11701 105703 .GOON    ADB ADR2,I
      11702 021744          LDA AR1E
      11703 070076          TCA               EXPONENT OF
      11704 000017          ADA P2            THE DIVISOR AND PASS INTO
      11705 031744          STA AR1E          THE STORE ROUTINE
      11706 065237          JMP STAR2
*
*
*************************************
*
      11707                 ORG 11707B
      11707 000000          BSS 11         RESERVED FOR OTHER POINTERS
      11722 001077          ABS ACS-*
      11723 001126          ABS ASN-*
*************************************
*
* LINKAGE
*
      11724 002010          ABS LOG-*     LOG BASE 10
      11725 001330          ABS ATN-*     ARC TANGENT
      11726 001125          ABS TAN-*     TANGENT
      11727 001060          ABS COS-*     COSINE
      11730 001031          ABS SIN-*     SINE
      11731 005123          ABS SGN-*     SIGN
      11732 004046          ABS INT-*     INTEGER VALUE
      11733 004227          ABS FSR-*     SQUARE ROOT
      11734 005155          ABS ABS-*     ABSOLUTE VALUE
      11735 001407          ABS LNX-*     NATURAL LOG
      11736 001333          ABS .EXP-*    E TO THE POWER
*
*
```

#01 NUMBER CONVERSION ROUTINES

```
      17000                 ORG 17000B
*
      01256         CLRA2 EQU CLAR2
      00051         LDVSR EQU .46        POINTER TO .1E4
      01471         DIVSR EQU L2T2
      17000 037400 B37.4 OCT 37400
*
* CONVERT FULL-PRECISION FLOATING NUMBER TO INTEGER
*
* FLOATING NUMBER IS IN AR2
*
*      JSM FLTFX
*      ---        ERROR EXIT (OVERFLOW)
*      ---        NORMAL RETURN WITH RESULT IN (B)
*
* NEGATIVE INTEGER IN 2'S COMPLEMENT FORM
*
      17001 074742 FLTFX SBR 16       CLEAR B
      17002 021754       LDA AR2      LOOK AT EXPONENT
      17003 070652       SAM PP2      DONE IF FRACTIONAL
      17004 000157 FLT1  ADA M256       ELSE DECREMENT 10'S EXPONENT
      17005 031471       STA L2T2      AND SAVE IT.
      17006 020061       LDA .10        *10
      17007 061201       JSM IMPY
*
*    ON RETURN THE A-REG IS SET NEGATIVE ON OVERFLOW, TESTING
*    IS NOT MADE UNTIL THE NEXT DIGIT IS ADDED IN.
*
      17010 070137       LDB A
      17011 171400       MLS             NEXT DIGIT
      17012 070037       ADB A          ADD NEW DIGIT
      17013 074352 FLT2  SBM RET1         OVERFLOW?
      17014 021471       LDA L2T2       RECALL EXPONENT
      17015 071353       SAP FLT1        LOOP IF POSITIVE
      17016 070111       SLA *+2         TEST MANTISSA SIGN
      17017 074076       TCB
      17020 064357 PP2   JMP RETN2
*
```

```
*    CONVERT FULL-PRECISION FLOATING NUMBER TO ROUNDED INTEGER
*
*     FLOATING NUMBER IN AR2
*       JSM FLTRF
*     --- ERROR EXIT
*       ---   NORMAL RETURN WITH RESULT IN B
*
17021 063001 FLTRF JSM FLTFX     GO GET INTEGER
17022 064444 RET1  JMP XFAR2     P+1 RETURN FOR OVERFLOW ERRORS
17023 076210       RZB *+4       IS (B) =0?
17024 031471       STA L2T2      YES, SAVE AR2 EXP AT L2T2
17025 000013       ADA B400      ADD EXP OF 1 TO CHECK IF<.1
17026 071512       SAM PP2       IF EXP IS STILL NEGATIVE RETURN
17027 171400       MLS          GET MS FRACTIONAL DIGIT
17030 000136       ADA M5       ADD -5
17031 071352       SAM PP2      DONE IF .LT. 5
17032 074113       SBP *+2       IS B POSITIVE ?
17033 074076       TCB          NO - MAKE IT SO
17034 074070       SIB *+1      ADD 1 FOR ROUNDING
17035 067013       JMP FLT2     USE FLTFX TO RESTORE SIGN,
*                  AND OVERFLOW TEST
*
*
*
*  OUTPUT AN INTEGER GIVEN IN (B) TO THE I/O BUFFER
*
17036 063055 OUTIN JSM FXFLT
17037 035470       STB L2T1          (B) = EXPONENT WORD OF AR2
17040 061314       JSM ODGIT
17041 025470       LDB L2T1        LOOK AT EXPONENT
17042 004157       ADB M256        DECREMENT 10'S EXPONENT
17043 075613       SBP *-4       LOOP IF POSITIVE
17044 170402 .RI   RET
*
*  TRANSFER A BCD DIGIT INTO D12 OF AR2
*
17045 031470       STA L2T1       ALTERNATE ENTRY POINT
17046 171400 XFER  MLS
17047 021757       LDA AR2+3
17050 041470       IOR L2T1
17051 031757       STA AR2+3
17052 170402       RET
*
**************************************************
*
17053 000000       BSS 1        CHECKSUM WORD FOR THIS 256 WORD BLOCK
*
**************************************************
*
*    SIGN ROUTINE
*
*    ON RETURN AR2 = 1 IF ARG WAS +, 0 IF 0, AND -1 IF NEGATIVE
*
17054 061317 SGN   JSM SGNS       SGN FLOWS INTO FXFLT
*
* CONVERT INTEGER TO FULL-PRECISION FLOATING NUMBER
* FLOATING NUMBER BUILT IN AR2
*
*     LDB N
*     JSM FXFLT
*
17055 061256 FXFLT JSM CLRA2       CLEAR AR2
17056 075310       SZB .RI       RETURN IF B IS ZERO
17057 074153       SBP *+3       AND GET ABSOLUTE VALUE
17060 074076       TCB          MAKE B POSITIVE
17061 045754       ISZ AR2      NOTE THE SIGN OF THE INTEGER
17062 020051       LDA LDVSR        INITIALIZE THE DIVISOR POINTER
17063 031471       STA DIVSR
17064 121471 FXFL  LDA DIVSR,I
17065 070513       SAP .IK
17066 035470       STB L2T1
17067 063046      JSM XFER     UNITS POSITION
17070 171450      NRM
17071 004142      ADB M11        COMPUTE EXPONENT
17072 074076      TCB               PLACEMENT
17073 074404      SBL 8          SHIFT B LEFT 8
17074 005754      ADB AR2     MERGE IN THE SIGN BIT
17075 035754      STB AR2        STORE IT IN AR2
17076 170402      RET
17077 070076 .IK  TCA
17100 031467      STA LOCL2        SAVE NEGATIVE DIVISOR
17101 020132      LDA M1
17102 070070      SIA *+1          INCREMENT INTEGER COUNTER
17103 005467      ADB LOCL2
17104 075713      SBP *-2
17105 105471      ADB DIVSR,I       RESTORE DIVIDEND
17106 063045      JSM XFER-1     MERGE A INTO D12 SLOT
17107 045471      ISZ DIVSR        ADVANCE TO NEXT DIVISOR IN TABLE
17110 067064      JMP FXFL
******************************
```

```
#01  NUMBER CONVERSION ROUTINES

* ABSOLUTE VALUE
*
17111 060445 ABS    JSM XFAR2+1
17112 025754        LDB AR2
17113 074071        SLB *+1,C
17114 067075        JMP .IK-2
*
******************************
*
* CONVERT FULL-PRECISION FLOATING NUMBER TO SPLIT
*
* FLOATING NUMBER IS IN AR2
*      LDB ADDRESS FOR SPLIT
*      JSM FLTSP
*
17115 160205 SPLUF JSM AERRA,I     THE EXPONENT = 10XXXXXX
17116 177625       DEC -107       THIS IS AN UNDERFLOW CONDITION
17117 061256       JSM CLRA2         CONDITION SO CLEAR AR2
17120 067122       JMP FLTSP+1       AR2 IS ZERO - PROCEED
*
17121 035727 FLTSP STB MBIN2       SAVE STARTING ADD. OF SPLIT
17122 021754       LDA AR2        GET SIGN
17123 050012       AND .1            OF MANTISSA
17124 031726       STA MBIN1       AND SAVE
17125 025754       LDB AR2        LOAD EXPONENT FOR OVERFLOW CHECK
17126 074706       RBR 15         POSITION BIT 15 IN LSB
17127 074111       SLB *+2        IS BIT 15 = 1?
17130 075273       SBP SPLUF,C    YES - IF BIT 14 =1; CONTINUE
17131 074333       SBP OK1,C      NO - IF BIT 14 = 0; JUMP OVER ERROR
*
17132 160205       JSM AERRA,I    OVERFLOW ERROR
17133 177626       DEC -106
17134 061274       JSM STMAX      SET AR2 = THE MAX NUMBER
17135 023000       LDA B37,4       SET EXPONENT
17136 031754       STA AR2           = E63
*
17137 024017 OK1   LDB .2
17140 070742       SAR 16
17141 174470       MRY             SHIFT AR2 MANTISSA RIGHT
17142 021754       LDA AR2         PICK UP EXPONENT WORD
17143 070300       AAR 7           SHIFT OFF 7 BITS
17144 041726       IOR MBIN1      ADD IN MANTISSA SIGN
17145 070404       SAL 8
17146 041755       IOR AR2+1       ADD IN FIRST TWO DIGITS
17147 131727       STA MBIN2,I  STASH FIRST WORD
17150 045727       ISZ MBIN2
17151 021756       LDA AR2+2
17152 131727       STA MBIN2,I      STASH SECOND WORD
17153 170402       RET
*
*
*   BUILD A NUMBER IN AR2
*     FIRST CHARACTER IN A
*
17154 070137 NUMCK LDB A
17155 061256       JSM CLRA2          CLEAR AR2
17156 020132       LDA M1
17157 031745       STA EXCNT     SET EXPONENT COUNT TO -1
17160 031746       STA DPFLG     SET DECIMAL POINT FLAG TO -1
17161 020143       LDA M12
17162 031744       STA SIGDG     SET SIGNIFICANT DIGIT COUNT TO -12
17163 074117       LDA B         RECALL CHARACTER
17164 067175       JMP NUMC1
*
*  PROCESS A DECIMAL POINT
*
17165 021746 .ANUM LDA DPFLG     DECIMAL POINT YET ?
17166 072250       RZA NUMC1-2    NO - SET NUMBER FOUND AND GET NEXT CHAR.
17167 055745       DSZ EXCNT       YES - DECR. EXPONENT COUNT
17170 067174       JMP NUMC1-1
17171 045746 NUMCP ISZ DPFLG     SET FLAG
17172 160206       JSM ERRA,I    FLAG ALREADY SET, 2 DECIMAL POINTS
17173 045754       ISZ AR2       SET EXPONENT NON-ZERO; NUMBER FOUND
17174 061055       JSM GNEXT     GET NEXT CHAR.
17175 060750 NUMC1 JSM DIGCK     DIGIT?
17176 067215       JMP NUMC2       NO - IT'S NOT A DIGIT
17177 076210       RZB NUMCD     ZERO?
17200 021744       LDA SIGDG     YES.
17201 010143       CPA M12       ANY SIGNIFICANT DIGITS YET?
17202 067165       JMP .ANUM      NO - NON-SIGNIFICANT ZERO
*  PROCESS A SIGNIFICANT DIGIT
17203 021746 NUMCD LDA DPFLG     DECIMAL POINT FOUND YET?
17204 070150       SZA *+3
17205 045745       ISZ EXCNT     NO, INC COUNT
17206 067207       JMP *+1
17207 021744       LDA SIGDG     12 DIGITS
17210 070230       SIA NUML1       FOUND YET?  IF YES SKIP
17211 031744       STA SIGDG     UPDATE COUNT
17212 035470       STB L2T1         MERGE LATEST DIGIT
17213 063046       JSM XFER          INTO D12 OF AR2
17214 067173 NUML1 JMP NUMC1-2
*
```

*01 NUMBER CONVERSION ROUTINES

```
*  PROCESS NON-DIGIT MANTISSA CHAR
*
*
 17215 010051 NUMC2 CPA .46        DECIMAL POINT?
 17216 067171       JMP NUMCP      YES
 17217 025754       LDB AR2
 17220 076110       RZB *+2        ANY MANTISSA FOUND?
 17221 170402       RET            NO, RETURN TO P+1
 17222 010071       CPA E          "E"?
 17223 067250       JMP NUMCE      YES
 17224 074742       SBR 16         NO, SET 0 EXPONENT
 17225 072053       SAP *+1,S      SET FIXED POINT FLAG
*  CHARACTER IS NOT PART OF NUMBER
 17226 045746 NUMC3 ISZ DPFLG      COMPLEMENT EXPONENT
 17227 067231       JMP *+2
 17230 074076       TCB              IF NEGATIVE
 17231 005745       ADB EXCNT      ADD EXPONENT DUE TO DECIMAL PLACEMENT
 17232 035745       STB EXCNT      STORE EXPONENT
 17233 171450       NRM            LEFT JUSTIFY MANTISSA
 17234 025745       LDB EXCNT      RECALL EXPONENT
 17235 074404       SBL 8          LEFT JUSTIFY EXPONENT
 17236 045721       ISZ .SIGN      .SIGN WAS SET IN "CONST" ROUTINE.
 17237 067241       JMP *+2
 17240 074070       SIB *+1        ADD IN SIGN OF MANTISSA
 17241 070115       SEC *+2        IF MANTISSA IS 0
 17242 074742       SBR 16           THEN SET EXPONENT TO 0
 17243 035754       STB AR2        STORE EXPONENT WORD
 17244 004021       ADB .4         SET FLOATING FLAG (BIT 2)
 17245 070133       SAP *+2,C      LEAVE (B) AT .4 IF THERE WAS AN EXPONENT
 17246 004133       ADB M2         NO, SET FIXED FLAG (BIT1)
 17247 064357       JMP RETN2      RETURN TO P+2
*  PROCESS EXPONENT
 17250 024132 NUMCE LDB M1
 17251 035724       STB GFLAG      SET INTCK TO RETURN ON ERROR
 17252 061166       JSM GSIGN      GET EXPONENT SIGN
 17253 035746       STB DPFLG      SAVE IT
 17254 060750       JSM DIGCK      DIGIT?
 17255 160206 NUMER JSM ERRA,I     NO, MISSING EXPONENT
 17256 025745       LDB EXCNT      COMPUTE -(ABSOLUTE VALUE
 17257 004156       ADB M100          OF MAX. ALLOWALE EXPONENT)
 17260 060676       JSM INTCK      GET ABSOLUTE VALUE OF EXPONENT
 17261 067264       JMP *+3
 17262 077550       RZB NUMER         EXPONENT OVERFLOW
 17263 067226       JMP NUMC3         EXPONENT OF ZERO GIVEN
 17264 055706       DSZ SBPTR       RESET BUFFER POINTER
 17265 067226       JMP NUMC3      EXPONENT OF ZERO GIVEN
 01744        SIGDG EQU AR1
 01745        EXCNT EQU AR1+1
 01746        DPFLG EQU AR1+2
*
*  CONVERT A NUMBER IN AR2 INTO SYNTAX FORMAT AND STORE IT
*    (B)= EXPONENT WORD
*     (A) = NEXT CHARCTER, MUST BE SAVED.
*
 17266 031474 NUMOP STA TEMP1
 17267 074117       LDA B
 17270 050105       AND B377       GET MANTISSA SIGN AND FLOAT FLAG
 17271 070006       RAR 1          POSITION FLAG AND MOVE SIGN TO BIT 15
 17272 072113       SAP *+2,S
 17273 040107       IOR B1000      SET MANTISSA SIGN IN BIT 9
 17274 024030       LDB .12
 17275 005744       ADB SIGDG      GET SIGNIFICANT DIGIT COUNT
 17276 076110       RZB *+2
 17277 074070       SIB *+1        IF 0, SET TO 1
 17300 074544       SBL 5          MOVE TO OPERAND FIELD
 17301 074217       IOR B          MERGE
 17302 055706       DSZ SBPTR
 17303 141706       IOR SBPTR,I    COMBINE WITH OPERAND
 17304 131706       STA SBPTR,I      AND STORE
 17305 074202 NUMO1 SBR 5          COMPUTE NUMBER OF
 17306 004022       ADB .5
 17307 074042       SBR 2            WORDS TO BE TRANSFERRED +1
 17310 035477       STB TEMP4      SAVE COUNT
 17311 021754       LDA AR2
 17312 050157       AND M256       GET EXPONENT
 17313 025755       LDB AR2+1
 17314 074342       SBR 8
 17315 074217      IOR B          COMBINE WITH D1 AND D2
 17316 060456       JSM SBPUD      UPDATE POINTER
 17317 171400       MLS
 17320 171400       MLS            SHIFT MANTISSA
 17321 024214       LDB AR2A       GET MANTISSA ADDRESS
 17322 074070 NUMO2 SIB *+1        UPDATE MANTISSA ADDRESS
 17323 074517       LDA B,I   GET READY TO STORE WORD IN SYN. BUFF.
 17324 060456       JSM SBPUD      UPDATE SYNTAX ADDRESS
 17325 055477       DSZ TEMP4      MORE WORDS TO BE TRANSFERRED?
 17326 067322       JMP NUMO2        YES
 17327 021474       LDA TEMP1      NO, RECALL CHAR AND RETURN
 17330 170402       RET
```

#01 NUMBER CONVERSION ROUTINES

```
*     SNFLT   ROUTINE
*
*    THIS ROUTINE TRANSFERS A
*    NUMBER IN SYNTAX FORMAT TO
*    AR2 AND STORES IT IN STANDARD
*    FORMAT
*
*    ENTRY CONDITIONS:
*
*        TEMPS=WORD POINTER TO
*              START OF NUMBER
*
*    EXIT CONDITIONS:
*
*        TEMPS=WORD POINTER TO FIRST
*              WORD FOLLOWING NUMBER
*          AR2=NUMBER IN STANDARD FORM
*
*
 17331 021472 SNFLT LDA TEMPS
 17332 070070       SIA *+1        TRANSFER THE NUMBER
 17333 024214       LDB AR2A       INTO AR2
 17334 170004       XFR
*
 17335 121472       LDA TEMPS,I
 17336 031470       STA L2T1
 17337 070202       SAR 5
 17340 050032       AND B17        GET THE # OF DIGITS
 17341 000022       ADA .5
 17342 070042       SAR 2          COMPUTE HOW MANY WORDS THIS IS
 17343 070137       LDB A
 17344 001472       ADA TEMPS
 17345 031472       STA TEMPS      MOVE TEMPS TO THE LAST WORD OF THE NUMBER
 17346 004214       ADB AR2A
 17347 070742       SAR 16
 17350 014112       CPB B1760
 17351 067355       JMP *+4
 17352 074557       STA B,I        CLEAR THE REMAINDER OF
 17353 074070       SIB *+1        THE MANTISSA DIGITS
 17354 067350       JMP *-4
*
 17355 024017       LDB .2         RIGHT SHIFT AR2
 17356 174470       MRY            TWO PLACES
 17357 021754       LDA AR2
 17360 070404       SAL 8
 17361 041755       IOR AR2+1      MERGE INTO AR2+1 DIGITS ONE AND TWO
 17362 031755       STA AR2+1
 17363 021754       LDA AR2        LOAD THE EXPONENT
 17364 050157       AND M256       AND MASK
 17365 025470       LDB L2T1
 17366 074402       SBR 9          INCLUDE THE SIGN BIT
 17367 074111       SLB *+2
 17370 070070       SIA *+1
 17371 031754       STA AR2
 17372 170402       RET
***********************************
```

#01 MORE 9830 FUNCTIONS

```
******************************************
 16000                  ORG 16000B
*
*
* INTEGER ROUTINE
*
 16000 062015 INT   JSM FDFRC      TRANSFER ARG. INTO AR1. AND TEST FOR FRACTIONAL
 16001 066005       JMP *+4        P+1. FRACTIONAL ARGUMENT
*
 16002 060444       JSM XFAR2      P+2. NON FRACTIONAL ARG.
 16003 171450       NRM            TRANSFER TO AR2. AND NORMALIZE
 16004 065254       JMP ZONK
*
 16005 062002       JSM INT+2
 16006 025744       LDB AR1        LOAD (B) WITH THE EXPONENT
 16007 074113       SBP *+2        IF THE EXPONENT WAS NEGATIVE
 16010 061256       JSM CLAR2      CLEAR AR2
 16011 075551       SLB INT+4      RETURN IF THE ARG WAS +.
 16012 020214       LDA AR2A       THE ARGUMENT WAS - AND IT HAD A
 16013 024020       LDB ONE        FRACTIONAL PART
 16014 164217       JMP .FSBA,I    SO SUBTRACT ONE FROM IT
*
**********************************************
*
*
*    SUBROUTINE FOR INT AND UPARROW
*
 16015 024213 FDFRC LDB AR1A
 16016 170004       XFR
 16017 020012       LDA .1         SET THE FLAG
```

#01 MORE 9830 FUNCTIONS

```
16020 031714        STA SAVE
16021 025744        LDB AR1         LOAD THE EXPONENT
16022 074512        SHM UP1+7       EXIT IF EXP IS FRACTIONAL
16023 074340        ABR 8
16024 004142        ADB M11
*
16025 074313 UP1    SBP *+6         MUST BE AN INTEGER IF (B) IS +
16026 170410        DRS             RIGHT SHIFT AR1
16027 074070        SIB *+1
16030 071650        SZA UP1         SKIP BACK IS SHIFTED DIGIT WAS ZERO
16031 045714        ISZ SAVE        OTHERWISE INCR. THE FLAG FOR FRACTIONAL PART
16032 066025        JMP UP1         SKIP BACK TO FINISH INTEGERATION
16033 055714        DSZ SAVE        SKIP IF THERE WAS NO FRACTIONAL PART
16034 170402        RET             P+1 RETURN FOR FRACTIONAL PART
16035 064357        JMP RETN2       P+2 RETURN IF IT WAS AN INTEGER
*
16036 001734 ADRYY  OCT 1734        ADDRESS OF REGISTOR Y
16037 013344 ILNX   DEF LNX
16040 012550 IINIT  DEF INIT+1
16041 013266 I.EXP  DEF .EXP-3
*
*  RET4 IS USED WHEN THE NUMBER IS ZERO
*
16042 021741 RET4   LDA XC+1        LOAD DIGITS 1-4 OF THE POWER
16043 070410        SZA ER49        IF THE POWER IS ZERO ERROR 49
16044 021740        LDA XC          LOAD THE EXPONENT OF THE POWER
16045 074742        SBR 16          CLEAR (B) FOR STMAX ROUTINE
16046 070211        SLA *+4         RETURN IF THE POWER IS POSITIVE: AR2 = 0
16047 061274        JSM STMAX       SET AR2 = +9.9999E99: NEGATIVE POWER
16050 160205        JSM AERRA,I
16051 177630        DEC -104
16052 170402        RET
*
16053 160206 ER49   JSM ERRA,I      0+0 ERROR
*
*********************
*
* RAISE A NUMBER TO A POWER
*
*********************
*
16054 035702 UPARO  STB ADR1        STORE THE ADDRES OF THE POWER,(A) IS SAVED BY INIT
*
16055 162040        JSM IINIT,I
16056 021702        LDA ADR1        TRANSFER THE POWER INTO
16057 024111        LDB B1740       XC REGISTOR
16060 170004        XFR
16061 071055        SEC RET4        STORE ZERO IF IT IS ZERO
*
16062 021702        LDA ADR1        LOAD THE ADDRESS OF THE POWER
16063 062015        JSM FDFRC       GO CHECK IF THERE IS A FRACTIONAL PART
16064 066137        JMP .UPA1       YES THERE WAS
*
16065 025747 UP3    LDB AR1+3       SAVE THE D12 DIGIT IN CASE THERE
16066 035714        STB SAVE        IS AN OVERFLOW IN FLTFA
16067 021702        LDA ADR1
16070 060445        JSM XFAR2+1
16071 160226        JSM FLTFA,I     CONVERT AR2 TO AN INTEGER
16072 066153        JMP UP4         IT'S AN INTEGER BUT TO LARGE
*
*     RAISE AN ARGUMENT TO AN INTEGER POWER
*
16073 035714 IPWR   STB SAVE
16074 074113        SBP *+2
16075 074076        TCB
16076 035710        STB COUNT       SAVE THE ABS(POWER)
16077 020020        LDA ONE
16100 026036        LDB ADRYY       INITIALIZE THE RESULT TO ONE
16101 170004        XFR
16102 021703        LDA ADR2
16103 024057        LDB ATEMP       PLACE THE BASE IN REGISTOR Y
16104 170004        XFR
*
16105 021710 IPW1   LDA COUNT       LOAD THE POWER
16106 070411        SLA IPW2        IS THE POWER ODD?
*
16107 020057        LDA ATEMP       YES
16110 026036        LDB ADRYY
16111 160220        JSM .FMPA,I     MULTIPY BY PARTIAL RESULT
16112 026036        LDB ADRYY
16113 020214        LDA AR2A        AND PLACE IT BACK
16114 170004        XFR
16115 021710        LDA COUNT
*
16116 070002 IPW2   SAR 1           EVEN POWER ENTRY POINT, DIVIDE POWER BY 2
16117 031710        STA COUNT       AND RESTORE
*
16120 070410        SZA DPW         IF THE POWER IS ZERO, JUMP TO EXIT PART
*
16121 020057        LDA ATEMP
```

```
#01  MORE 9830 FUNCTIONS

16122 024057         LDB ATEMP
16123 160220         JSM .FMPA,I   THE POWER WAS EVEN SO MULTIPY
16124 024057         LDB ATEMP     IT BY ITSELF
16125 020214         LDA AR2A      AND PLACE IT BACK
16126 170004         XFR
16127 066105         JMP IPW1
*
16130 021714 DPW     LDA SAVE      ALMOST DONE
16131 070152         SAM *+3       WAS THE SIGN OF THE EXPONENT NEG?
16132 022036         LDA ADRYY     NO, TRANSFER THE ANSWER INTO AR2
16133 064445         JMP XFAR2+1
16134 020020         LDA ONE       YES, TAKE THE RECIPICAL OF THE ANSWER
16135 026036         LDB ADRYY
16136 164221         JMP .FDVA,I
*
*
*
*
16137 125703 .UPA1  LDB ADR2,I    LOAD THE EXPONENT WORD OF THE BASE
16140 074131         SLB UP2,C     SKIP IF IT IS POSITIVE
*
*
16141 160206 ER50    JSM ERRA,I    (-BASE) ↑ (FRACTIONAL EXPONENT)
*
*
16142 035714 UP2     STB SAVE
16143 021703         LDA ADR2      LOAD THE ADDRESS OF THE BASE
16144 162037         JSM ILNX,I    TAKE NATURAL LOG OF THE BASE
16145 024111         LDB B1740     LOAD THE ADDRESS OF THE EXPONENT(SAVED IN XC)
16146 162041         JSM I.EXP,I   EXP ( POWER * LOG ( BASE ))
*
16147 021714         LDA SAVE      LOAD THE LAST DIGIT OF THE ORIGNAL EXPOENET
16150 070451         SLA OVER
16151 045754         ISZ AR2       NEGATE THE ANSWER IF IT IS ODD
16152 065254         JMP ZONK      STORE ANSWER
*
*
*     INTEGER POWER, BUT GREATER THAN 32676
*
16153 125703 UP4     LDB ADR2,I
16154 074131         SLB *+2,C
16155 066157         JMP *+2
16156 035714         STB SAVE       THE BASE WAS +, SO CLEAR BIT 0
16157 135703         STB ADR2,I     TAKE THE ABS(BASE)
16160 066143         JMP UP2+1
*
*
16161 170402 OVER    RET
*
* FLOATING SQUARE ROOT
*
*
16162 024213 FSR     LDB AR1A
16163 170004         XFR
16164 020214         LDA AR2A
16165 170000         CLR
*
16166 021745         LDA AR1F+1     IF THE ARGUMENT
16167 071510         SZA OVER         IS ZERO RETURN
*
*
16170 024022         LDB P5         MULTIPLY THE ARGUMENT
16171 171460         FMP              BY 5
16172 025744         LDB AR1F       RIGHT SHIFT THE ARGUMENT
16173 074444         SBL 7            ONCE IF THE EXPONENT IS
16174 074112         SBM *+2          ODD AND TWICE IF ITS EVEN
16175 074070         SIB *+1      AND ONCE MOR IF A CARRY
16176 074070         SIB *+1      EXISTS FROM THE MULTIPLY
*
16177 061306         JSM ROUND+1    ROUND IF THE LAST SHIFTED DIGIT IS >=5
*
16200 020213         LDA AR1A       INITIALIZE THE ANSWER
16201 070070         SIA *+1        ANSWER WORD POINTER 1 AND 2
16202 031701         STA TEMPA        TO THE SECOND WORD OF THE
16203 031476         STA TEMP3        WORKING REGISTER
16204 170000         CLR            CLEAR THE WORKING REGISTER
*
16205 021744         LDA AR1F       IF THE RADICAND IS
16206 070131         SLA *+2,C      NEGATIVE - RETURN.
16207 160206 ER48     JSM ERRA,I
*
16210 070000         AAR 1          DIVIDE THE EXPONENT WORD BY 2,
16211 050163         AND ZAP          CLEAR BITS 1-7
16212 031744         STA AR1F         AND STORE
*
16213 020117         LDA AD5        INITIALIZE THE
16214 031475         STA TEMP2        'FIVE' WORD    TO 0500
16215 020004         LDA D1000      INITIALIZE THE
16216 031477         STA TEMP4        'N'  WORD      TO 0100
*
```

```
#01  MORE 9830 FUNCTIONS

16217 021477 CONT  LDA TEMP4      IF THE LOW DIGIT OF THE
16220 070111       SLA *+2          'N'    WORD IS A 1 THEN
16221 045476       ISZ TEMP3        INCREMENT POINTER 2
16222 070146       RAR 4          ROTATE THE 'N'    WORD ONE
16223 031477       STA TEMP4        BCD AND REPLACE
*
16224 021475       LDA TEMP2      MASK OUT THE LAST
16225 070056       CMA              FIVE FROM THE
16226 151701       AND TEMPA,I      WORKING
16227 131701       STA TEMPA,I      REGISTER
*
16230 021475       LDA TEMP2      IF THE LOW DIGIT OF THE
16231 070111       SLA *+2          'FIVE' WORD IS A 5 THEN
16232 045701       ISZ TEMPA        INCREMENT POINTER 1
16233 070146       RAR 4          ROTATE THE 'FIVE' WORD
16234 031475       STA TEMP2        ONE BCD AND REPLACE
16235 101701       ADA TEMPA,I    LOCATE THE NEXT FIVE INTO
16236 131701       STA TEMPA,I      THE WORKING REGISTER
*
16237 125476       LDB TEMP3,I    LOAD THE WORKING REGISTER WORD TO BE INCREMENTED INT
16240 170400       CMY            COMPLEMENT THE ARGUMENT
*
16241 020061       LDA P10        SET THE INCREMENT
16242 031466       STA TEMP5        COUNTER = 10
*
16243 135476       STB TEMP3,I    STORE B INTO THE WORKING REGISTER
16244 170560       FXA            ADD THE WORKING REGISTER TO THE ARGUMENT
16245 005477       ADB TEMP4      INCREMENT THE PROPER DIGIT OF B
16246 055466       DSZ TEMP5      DECREMENT THE INCREMENT COUNTER AND EXIT LOOP IF ZER
16247 071635       SEC *-4,C      IF NO OVERFLOW OCCURRED JUMP BACK INTO LOOP
*
16250 170400       CMY            COMPLEMENT THE ARGUMENT
*
16251 021755       LDA AR2E+1     JUMP OUT OF THE
16252 001756       ADA AR2E+2       MAIN LOOP IF
16253 001757       ADA AR2E+3       AN PERFECT SQUARE
16254 070134       SES *+2,C        HAS BEEN
16255 070350       SZA PFSQ         FOUND
*
16256 170560       FXA            RESTORE THE ARGUMENT
16257 171400       MLS            SHIFT THE ARGUMENT LEFT ONCE
*
16260 021476       LDA TEMP3      IF 12 DIGITS HAVE
16261 010057       CPA ATEMP        BEN CALCULATED
16262 066302       JMP LSTLP        EXIT FROM MAIN LOOP
16263 066217       JMP CONT         ELSE CONTINUE
*
16264 025701 PFSQ  LDB TEMPA      A PERFECT SQUARE HAS BEEN FOUND
16265 014057       CPB .1000
16266 066272       JMP *+4        DO NOT STORE THE LAST DIGIT
16267 004025       ADB P8           SO INCREMENT THE LEAST SIGNIFICANT
16270 021475       LDA TEMP2        DIGIT (A5) OF THE WORKING REGISTER
16271 074557       STA B,I          BY 5 AND
16272 170560       FXA              THEN LEFT SHIFT
16273 171400       MLS              IT ONCE
*
16274 070250       SZA *+5        IF A DIGIT WAS SHIFTED OU
16275 070137       LDB A
16276 174470       MRY            SHIFT IT BACK IN AND INCREMENT THE EXPONENT
16277 024013       LDB P256
16300 065237       JMP STAR2
16301 065240       JMP STAR2+1    OTHERWISE STORE THE ANSWER AND RETURN
*
16302 021750 LSTLP LDA AR1E+4     LOCATE THE LAST DIGIT
16303 070542       SAR 12           ALLIGN IT
16304 175400       DLS              AND SHIFT IT INTO THE ANSWER
16305 020213       LDA AR1A
16306 024214       LDB AR2A
16307 170004       XFR
16310 065254       JMP ZONK
*
*
**********************************
*
* FLOATING POINT MULTIPLY
*
*
16311 031702 FMP   STA ADR1
16312 074117       LDA B
16313 024213       LDB AR1A       TRANSFER THE MULTIPLICAND INTO A
16314 170004       XFR              TEMPORARY
*
16315 021702       LDA ADR1       TRANSFER THE MULTIPLIER
16316 024057       LDB ATEMP      INTO A TEMPORARY
16317 170004       XFR
16320 020214       LDA AR2A
16321 170000       CLR            INITIALIZE WORD POINTER FOR THE
16322 031475       STA TEMP2      MULTIPLIER AND CLEAR AR2
*
```

```
16323 020134        LDA M3        INITIALIZE THE
16324 031476        STA TEMP3       WORD COUNT TO 3
*
16325 055475 NXWD   DSZ TEMP2     DECREMENT THE WORD POINTER
16326 125475        LDB TEMP2,I   LOAD 4 DIGITS OF THE MULTIPLIER
*
16327 171460        FMP           ACCUMULATE THE PRESENT DIGIT MULTIPLICAND
16330 004145        ADB N14       SET BITS 0-3 =0001 IN B
16331 174470        MRY           ALLIGN THE TEMP ANSWER FOR NEXT DIGIT
16332 074142        SBR 4         SHIFT IN THE NEXT MULTIPLIER DIGIT
*
16333 171460        FMP
16334 004145        ADB N14
16335 174470        MRY
16336 074142        SBR 4
*
16337 171460        FMP
16340 004145        ADB N14
16341 174470        MRY
16342 074142        SBR 4
*
16343 171460        FMP
16344 004145        ADB N14
16345 174470        MRY
*
16346 045476        ISZ TEMP3     INCREMENT THE WORD COUNT AND
16347 066325        JMP NXWD        JUMP IF NON ZERO
*
16350 025755        LDB AR2E+1    SKIP IF THE FIRST
16351 074542        SBR 12          DIGIT OF THE ANSWER
16352 076350        RZB *+7         IS NOT ZERO
*
16353 070137        LDB A         IT IS ZERO SO
16354 171400        MLS             NORMALIZE ANSWER
16355 005757        ADB AR2E+3    PICK UP THE 12TH DIGIT
16356 035757        STB AR2E+3      WHICH WAS SHIFTED OUT ABOVE
*
16357 124057        LDB ATEMP,I   LOAD THE EXPONENT WORD OF THE
16360 065237        JMP STAR2       MULTIPLIER AND EXIT TO RETURN ANSWER
*
16361 061307        JSM ROUND+2   ROUND UP ANSWER IF 13TH DIGIT IS >=5
16362 124057        LDB ATEMP,I   LOAD EXPONENT OF THE MULTIPLIER
16363 004013        ADB P256      INCREMENT IT
16364 065237        JMP STAR2     EXIT TO RETURN ANSWER
*
*
*  CONVERT SPLIT TO FULL-PRECISION FLOATING POINT NUMBER
*
*  LDB ADDRESS OF SPLIT
*  JSM SPLFL
*
*  FULL FLOATING POINT NUMBER IN AR2 ON RETURN
*
16365 061256 SPLFL  JSM CLAR2     CLEAR AR2
16366 074517        LDA B,I       LOAD EXPONENT , SIGN, D1 AND D2
16367 031754        STA AR2       SAVE TEMPORARLY IN AR2
16370 050105        AND B377      MASK D1 AND D2
16371 031755        STA AR2+1     AND STORE
16372 074070        SIB *+1
16373 074517        LDA B,I
16374 031756        STA AR2+2     STORE D3 THUR D6
16375 171450        NRM
16376 074742        SBR 16        FIX
16377 021754        LDA AR2        UP
16400 070340        AAR 8           THE
16401 070131        SLA *+2,C        FULL
16402 074070        SIB *+1           EXPONENT
16403 070444        SAL 7
16404 074217        IOR B
16405 031754        STA AR2
16406 170402        RET
*
16407 000000        BSS 1         *** CHECKSUM WORD ***
*
                    END
*  NO ERRORS*
```

CROSS-REFERENCE TABLE

| | | | | |
|---|---|---|---|---|
| .1 | 0020 | 0522 | 2063 | 2311 |
| .10 | 0071 | 0072 | 0574 | 1934 |
| .100 | 0070 | 0685 | | |
| .1000 | 0069 | 0534 | 2542 | |
| .11 | 0035 | 0043 | | |
| .12 | 0036 | 0527 | 2195 | |
| .13 | 0039 | | | |
| .15 | 0048 | 0083 | 0529 | |
| .16 | 0049 | 0084 | | |
| .1E4 | 0068 | | | |

CROSS-REFERENCE TABLE

| | | | | | | | | | | | |
|---|---|---|---|---|---|---|---|---|---|---|---|
| .2 | 0027 | 0523 | 2077 | 2266 | | | | | | | |
| .21 | 0050 | | | | | | | | | | |
| .22 | 0051 | 0087 | 0684 | | | | | | | | |
| .23 | 0052 | 0088 | | | | | | | | | |
| .28 | 0053 | | | | | | | | | | |
| .3 | 0028 | 0045 | | | | | | | | | |
| .31 | 0054 | 0090 | | | | | | | | | |
| .32 | 0055 | | | | | | | | | | |
| .33 | 0056 | | | | | | | | | | |
| .34 | 0057 | 0091 | | | | | | | | | |
| .37 | 0058 | | | | | | | | | | |
| .4 | 0029 | 0524 | 2161 | | | | | | | | |
| .40 | 0059 | | | | | | | | | | |
| .41 | 0060 | | | | | | | | | | |
| .43 | 0061 | | | | | | | | | | |
| .45 | 0062 | | | | | | | | | | |
| .46 | 0063 | 1915 | 2137 | | | | | | | | |
| .48 | 0064 | | | | | | | | | | |
| .5 | 0030 | 2525 | 2205 | 2253 | | | | | | | |
| .58 | 0065 | 0094 | | | | | | | | | |
| .6 | 0031 | 0044 | 0572 | | | | | | | | |
| .63 | 0066 | | | | | | | | | | |
| .7 | 0032 | 0573 | | | | | | | | | |
| .8 | 0033 | 0526 | | | | | | | | | |
| .9 | 0034 | | | | | | | | | | |
| .99 | 0074 | | | | | | | | | | |
| .ANUM | 2108 | 2121 | | | | | | | | | |
| .BUFA | 0180 | | | | | | | | | | |
| .CS | 0989 | 0982 | | | | | | | | | |
| .EXP | 1262 | 1908 | 2332 | | | | | | | | |
| .FAD | 0930 | 1388 | | | | | | | | | |
| .FAD. | 1780 | 1767 | | | | | | | | | |
| .FADA | 0185 | 0582 | | | | | | | | | |
| .FDV | 0920 | 0836 | 0987 | 1056 | 1162 | | | | | | |
| .FDVA | 0188 | 0584 | 2416 | | | | | | | | |
| .FMP | 0952 | 0794 | 0856 | 1260 | 1374 | | | | | | |
| .FMPA | 0187 | 0583 | 2391 | 2404 | | | | | | | |
| .FSBA | 0186 | 2302 | | | | | | | | | |
| .FSR | 0190 | 0866 | | | | | | | | | |
| .GOON | 1879 | 1871 | | | | | | | | | |
| .IK | 2030 | 2020 | 2046 | | | | | | | | |
| .LNUM | 0314 | | | | | | | | | | |
| .NPWR | 0504 | | | | | | | | | | |
| .R1 | 1982 | 2013 | | | | | | | | | |
| .SIGN | 0399 | 0400 | 2155 | | | | | | | | |
| .SLBF | 0181 | | | | | | | | | | |
| .T. | 1138 | 1128 | | | | | | | | | |
| .TEMP | 0350 | 0351 | | | | | | | | | |
| .UPA1 | 2421 | 2364 | | | | | | | | | |
| A | 0000 | 1044 | 1147 | 1284 | 1286 | 1366 | 1715 | 1742 | 1776 | 1940 | 1942 |
| | 2096 | 2255 | 2551 | 2615 | | | | | | | |
| ABS | 2043 | 1906 | | | | | | | | | |
| ACS | 1028 | 1892 | | | | | | | | | |
| ACSC | 1035 | 1031 | | | | | | | | | |
| ACTSA | 0174 | | | | | | | | | | |
| ADS | 0710 | 2489 | | | | | | | | | |
| ADD | 0582 | 0932 | | | | | | | | | |
| ADR0 | 0694 | 1341 | 1378 | | | | | | | | |
| ADR1 | 0549 | 0746 | 0750 | 0793 | 0930 | 1694 | 1709 | 1710 | 1727 | 1792 | 1798 |
| | 2354 | 2357 | 2362 | 2368 | 2571 | 2576 | | | | | |
| ADR2 | 0550 | 0551 | 0726 | 0727 | 0730 | 0732 | 0920 | 0931 | 1259 | 1691 | 1708 |
| | 1713 | 1718 | 1793 | 1879 | 2382 | 2421 | 2429 | 2442 | 2446 | | |
| ADR3 | 0551 | 0835 | 0919 | 0934 | 1057 | 1177 | 1261 | 1376 | | | |
| ADRSS | 0327 | | | | | | | | | | |
| ADRX | 0692 | 0848 | 0851 | 0872 | 0876 | 1445 | | | | | |
| ADRY | 0693 | 0694 | 1443 | | | | | | | | |
| ADRYE | 0565 | | | | | | | | | | |
| ADRYY | 2329 | 2380 | 2390 | 2392 | 2412 | 2415 | | | | | |
| AERRA | 0176 | 1324 | 1810 | 2056 | 2071 | 2342 | | | | | |
| AR1 | 0413 | 0182 | 0421 | 2180 | 2181 | 2182 | 2296 | 2313 | 2366 | | |
| AR1A | 0182 | 0961 | 1154 | 1158 | 1416 | 1531 | 1566 | 1593 | 1638 | 1649 | 1722 |
| | 1724 | 1745 | 1799 | 2309 | 2456 | 2475 | 2560 | 2573 | | | |
| AR1E | 0421 | 1174 | 1734 | 1753 | 1763 | 1772 | 1808 | 1880 | 1883 | 2461 | 2467 |
| | 2481 | 2487 | 2557 | | | | | | | | |
| AR2 | 0415 | 0183 | 0422 | 0999 | 1930 | 1988 | 1990 | 2016 | 2027 | 2028 | 2044 |
| | 2062 | 2065 | 2075 | 2080 | 2084 | 2087 | 2114 | 2139 | 2160 | 2208 | 2210 |
| | 2268 | 2270 | 2271 | 2272 | 2278 | 2436 | 2638 | 2640 | 2643 | 2646 | 2652 |
| AR2A | 0183 | 0736 | 0753 | 0768 | 0847 | 0855 | 0865 | 0933 | 0949 | 1342 | 1465 |
| | 1473 | 1488 | 1501 | 1505 | 1530 | 1535 | 1565 | 1592 | 1613 | 1720 | 1726 |
| | 1746 | 1795 | 1867 | 2216 | 2246 | 2258 | 2300 | 2393 | 2406 | 2458 | 2561 |
| | 2579 | | | | | | | | | | |
| AR2E | 0422 | 0766 | 0767 | 0778 | 0789 | 0801 | 0819 | 0820 | 0821 | 0825 | 0989 |
| | 1007 | 1077 | 1101 | 1111 | 1121 | 1125 | 1142 | 1146 | 1173 | 1200 | 1207 |
| | 1221 | 1225 | 1306 | 1367 | 1370 | 1459 | 1731 | 1754 | 1773 | 1780 | 1812 |
| | 1816 | 1836 | 1837 | 1838 | 1873 | 1875 | 1876 | 2527 | 2528 | 2529 | 2611 |
| | 2617 | 2618 | | | | | | | | | |
| ARYAD | 0403 | | | | | | | | | | |
| ASN | 1065 | 1893 | | | | | | | | | |
| ASNS | 1042 | 1029 | 1065 | | | | | | | | |
| ATD | 1483 | 1119 | 1290 | | | | | | | | |

CROSS-REFERENCE TABLE

| | | | | | | | | | | | |
|---|---|---|---|---|---|---|---|---|---|---|---|
| ATFMP | 0534 | 1693 | 1696 | 1699 | 1802 | 1865 | 2383 | 2389 | 2402 | 2403 | 2405 |
| | 2537 | 2577 | 2620 | 2624 | | | | | | | |
| ATN | 1242 | 1899 | | | | | | | | | |
| ATNS | 1187 | 1058 | 1242 | | | | | | | | |
| AWRDN | 0691 | 0884 | 1483 | 1552 | | | | | | | |
| B | 0000 | 0805 | 1049 | 1519 | 1692 | 2103 | 2190 | 2200 | 2212 | 2218 | 2262 |
| | 2546 | 2572 | 2637 | 2642 | 2651 | | | | | | |
| B100 | 0095 | | | | | | | | | | |
| B1000 | 0102 | 2194 | | | | | | | | | |
| B10K | 0114 | 0115 | 2535 | | | | | | | | |
| B12K | 0116 | 0117 | 0206 | | | | | | | | |
| B133 | 0096 | | | | | | | | | | |
| B140 | 0097 | | | | | | | | | | |
| B1400 | 0103 | 0204 | 0697 | | | | | | | | |
| B17 | 0083 | 2252 | | | | | | | | | |
| B170K | 0121 | | | | | | | | | | |
| B1740 | 0104 | 0203 | 0692 | 2358 | 2431 | | | | | | |
| B1760 | 0105 | 0158 | 2260 | | | | | | | | |
| B177 | 0098 | | | | | | | | | | |
| B1774 | 0106 | | | | | | | | | | |
| B1775 | 0107 | | | | | | | | | | |
| B1777 | 0108 | | | | | | | | | | |
| B20 | 0084 | 0699 | | | | | | | | | |
| B22 | 0085 | | | | | | | | | | |
| B23 | 0086 | | | | | | | | | | |
| B2400 | 0110 | 0710 | | | | | | | | | |
| B26 | 0087 | | | | | | | | | | |
| B27 | 0088 | | | | | | | | | | |
| B3000 | 0111 | | | | | | | | | | |
| B36 | 0089 | | | | | | | | | | |
| B37 | 0090 | | | | | | | | | | |
| B37.4 | 1917 | 2074 | | | | | | | | | |
| B377 | 0099 | 2191 | 2639 | | | | | | | | |
| B400 | 0100 | 0530 | 0698 | 1961 | | | | | | | |
| B4000 | 0112 | 0162 | 0700 | | | | | | | | |
| B42 | 0091 | | | | | | | | | | |
| B44 | 0092 | | | | | | | | | | |
| B52 | 0093 | | | | | | | | | | |
| B6K | 0113 | 0167 | | | | | | | | | |
| B72 | 0094 | | | | | | | | | | |
| B777 | 0101 | | | | | | | | | | |
| BACK | 1305 | | | | | | | | | | |
| BADDR | 0291 | | | | | | | | | | |
| BADRP | 0204 | | | | | | | | | | |
| BEND | 0198 | 0199 | | | | | | | | | |
| BHSTP | 0454 | | | | | | | | | | |
| BLANK | 0388 | | | | | | | | | | |
| BNZ | 1745 | 1732 | | | | | | | | | |
| C1 | 0598 | 0703 | | | | | | | | | |
| C2 | 0628 | 0688 | 0704 | | | | | | | | |
| C3 | 0665 | 0689 | | | | | | | | | |
| C4 | 0670 | 0690 | | | | | | | | | |
| C5 | 0015 | | | | | | | | | | |
| C6 | 0011 | 0114 | | | | | | | | | |
| C7 | 0022 | 0100 | | | | | | | | | |
| C8 | 0675 | 0683 | | | | | | | | | |
| CHRSA | 0219 | | | | | | | | | | |
| CK | 0891 | 1484 | | | | | | | | | |
| CLAR2 | 0501 | 0854 | 1051 | 1099 | 1194 | 1783 | 1914 | 2298 | 2636 | | |
| CLFR | 0884 | 1199 | 1289 | 1332 | | | | | | | |
| CLFRA | 0160 | | | | | | | | | | |
| CLINE | 0316 | | | | | | | | | | |
| CLP1A | 0217 | | | | | | | | | | |
| CLRA2 | 1914 | 2012 | 2058 | 2097 | | | | | | | |
| COMCE | 0446 | | | | | | | | | | |
| COMCK | 0445 | | | | | | | | | | |
| CONST | 0494 | | | | | | | | | | |
| CONT | 2494 | 2539 | | | | | | | | | |
| COS | 1006 | 1901 | | | | | | | | | |
| COUNT | 0556 | 0780 | 0785 | 0787 | 0845 | 0858 | 0870 | 1043 | 1271 | 1278 | 1281 |
| | 2378 | 2386 | 2395 | 2398 | | | | | | | |
| CPLAC | 0331 | | | | | | | | | | |
| CRCKA | 0228 | | | | | | | | | | |
| CRLF | 0507 | | | | | | | | | | |
| CRLF1 | 0508 | | | | | | | | | | |
| CRTN | 0037 | 0038 | 0039 | 0528 | | | | | | | |
| CTYPE | 0330 | | | | | | | | | | |
| D0010 | 0699 | 1171 | 1362 | | | | | | | | |
| D0100 | 0698 | 1355 | | | | | | | | | |
| D1000 | 0535 | 2491 | | | | | | | | | |
| D8000 | 0578 | 1187 | | | | | | | | | |
| DCOMA | 0210 | | | | | | | | | | |
| DELSA | 0175 | | | | | | | | | | |
| DFLAG | 0390 | | | | | | | | | | |
| DIGCK | 0473 | 2116 | 2170 | | | | | | | | |
| DIGIT | 0563 | 0890 | 1291 | 1297 | 1299 | 1334 | 1406 | 1411 | 1422 | 1455 | 1482 |
| | 1492 | 1539 | 1553 | 1570 | 1596 | 1598 | 1616 | 1622 | 1624 | 1652 | 1658 |
| | 1660 | | | | | | | | | | |
| DINC | 1831 | 1834 | | | | | | | | | |
| DIV | 0746 | 1159 | 1379 | | | | | | | | |

CROSS-REFERENCE TABLE

| | | | | | | | | | | | |
|---|---|---|---|---|---|---|---|---|---|---|---|
| DIVSR | 1916 | 2018 | 2019 | 2036 | 2038 | | | | | | |
| DONE | 1864 | 1853 | | | | | | | | | |
| DPERR | 0043 | 0918 | 2944 | | | | | | | | |
| DPFLG | 2182 | 2100 | 2108 | 2112 | 2123 | 2147 | 2169 | | | | |
| DPW | 2410 | 2400 | | | | | | | | | |
| DROST | 0317 | | | | | | | | | | |
| DSTRT | 0303 | | | | | | | | | | |
| DTOR | 0918 | 0906 | 0911 | 1672 | | | | | | | |
| DVD | 0584 | 2921 | | | | | | | | | |
| E | 0080 | 2142 | | | | | | | | | |
| E1 | 0235 | | | | | | | | | | |
| E10 | 0244 | | | | | | | | | | |
| E15 | 0249 | | | | | | | | | | |
| E20 | 0254 | | | | | | | | | | |
| E25 | 0259 | | | | | | | | | | |
| E30 | 0264 | | | | | | | | | | |
| E35 | 0269 | | | | | | | | | | |
| E40 | 0274 | | | | | | | | | | |
| E45 | 0279 | | | | | | | | | | |
| E5 | 0239 | | | | | | | | | | |
| E50 | 0284 | | | | | | | | | | |
| EATN | 1244 | 1035 | 1066 | | | | | | | | |
| ECALA | 0215 | | | | | | | | | | |
| ELTNA | 0169 | | | | | | | | | | |
| EN12 | 0702 | 1192 | | | | | | | | | |
| EN3 | 0701 | 1264 | | | | | | | | | |
| ENDS | 0490 | | | | | | | | | | |
| ENTFA | 0218 | | | | | | | | | | |
| ENTFA | 0189 | | | | | | | | | | |
| EOL | 0038 | | | | | | | | | | |
| EOLCK | 0493 | | | | | | | | | | |
| EOST | 0491 | | | | | | | | | | |
| EP3 | 0597 | 1369 | | | | | | | | | |
| ER47 | 1330 | 0285 | | | | | | | | | |
| ER48 | 2483 | 0286 | | | | | | | | | |
| ER49 | 2346 | 0287 | 2337 | | | | | | | | |
| ER50 | 2425 | 0288 | | | | | | | | | |
| ERRA | 0177 | 1330 | 2113 | 2171 | 2346 | 2425 | 2483 | | | | |
| EXCNT | 2181 | 2099 | 2110 | 2125 | 2150 | 2151 | 2153 | 2172 | | | |
| EXP | 0401 | 0402 | | | | | | | | | |
| EXPOP | 0118 | | | | | | | | | | |
| F | 0081 | | | | | | | | | | |
| FAD | 1708 | 0185 | 1700 | | | | | | | | |
| FAD1 | 0929 | 0863 | 1013 | 1034 | | | | | | | |
| FALI | 1099 | 1085 | | | | | | | | | |
| FAP | 1194 | | | | | | | | | | |
| FDAAA | 0222 | | | | | | | | | | |
| FDFRC | 2309 | 2288 | 2363 | | | | | | | | |
| FDV | 1792 | 0188 | | | | | | | | | |
| FDV1 | 0919 | 0776 | | | | | | | | | |
| FETCH | 0498 | | | | | | | | | | |
| FILLA | 0201 | | | | | | | | | | |
| FIRST | 0367 | | | | | | | | | | |
| FIX | 0511 | | | | | | | | | | |
| FLGBT | 0073 | 0578 | | | | | | | | | |
| FLOAT | 0386 | | | | | | | | | | |
| FLT1 | 1932 | 1945 | | | | | | | | | |
| FLT2 | 1943 | 1969 | | | | | | | | | |
| FLTFA | 0193 | 2370 | | | | | | | | | |
| FLTFX | 1929 | 0193 | 1957 | | | | | | | | |
| FLTRA | 0192 | | | | | | | | | | |
| FLTRF | 1957 | 0192 | | | | | | | | | |
| FLTSA | 0195 | | | | | | | | | | |
| FLTSP | 2061 | 0195 | 2059 | | | | | | | | |
| FMP | 2571 | 0187 | | | | | | | | | |
| FN | 0148 | | | | | | | | | | |
| FNCFG | 0558 | 0724 | 1327 | 1448 | 1456 | 1508 | 1525 | 1538 | 1557 | 1561 | 15 |
| | 1620 | 1656 | 1671 | | | | | | | | |
| FND | 0472 | | | | | | | | | | |
| FND1A | 0224 | | | | | | | | | | |
| FNDAA | 0223 | | | | | | | | | | |
| FNDPS | 0486 | | | | | | | | | | |
| FOPBS | 0206 | | | | | | | | | | |
| FORMA | 0172 | | | | | | | | | | |
| FORMF | 0336 | | | | | | | | | | |
| FORMS | 0335 | | | | | | | | | | |
| FORMT | 0334 | | | | | | | | | | |
| FPAGE | 0461 | | | | | | | | | | |
| FRAC | 0776 | 1083 | 1268 | | | | | | | | |
| FROMA | 0122 | | | | | | | | | | |
| FS9 | 1691 | 0186 | | | | | | | | | |
| FSCA | 0173 | | | | | | | | | | |
| FSCE2 | 0451 | | | | | | | | | | |
| FSCE4 | 0456 | | | | | | | | | | |
| FSR | 2456 | 0190 | 1905 | | | | | | | | |
| FTMP1 | 0337 | | | | | | | | | | |
| FTMP2 | 0338 | | | | | | | | | | |
| FWAM | 0157 | | | | | | | | | | |
| FWUP | 0296 | | | | | | | | | | |

CROSS-REFERENCE TABLE

| | | | | | | | | | |
|---|---|---|---|---|---|---|---|---|---|
| FXFL | 2019 | 2039 | | | | | | | |
| FXFLA | 0194 | | | | | | | | |
| FXFLT | 2012 | 0194 | 1976 | | | | | | |
| GET | 1115 | 1081 | 1108 | 1114 | | | | | |
| GET3 | 1080 | 1086 | | | | | | | |
| GETAD | 0471 | | | | | | | | |
| GETCH | 0481 | | | | | | | | |
| GETSK | 0485 | | | | | | | | |
| GFG | 0554 | 0901 | 1030 | 1045 | 1080 | 1172 | | | |
| GFLAG | 0404 | 2167 | | | | | | | |
| GFRST | 0484 | | | | | | | | |
| GNEXT | 0483 | 2115 | | | | | | | |
| GONO | 1235 | 1222 | | | | | | | |
| GOOD | 1816 | 1809 | | | | | | | |
| GOON | 1592 | 1571 | 1589 | | | | | | |
| GPARM | 0434 | | | | | | | | |
| GPERR | 0683 | 2910 | 1247 | | | | | | |
| GRA | 0706 | 1248 | | | | | | | |
| GRAF | 0700 | 0852 | | | | | | | |
| GSIGN | 0496 | 2168 | | | | | | | |
| GTCON | 0510 | | | | | | | | |
| GTMP | 0482 | | | | | | | | |
| GTOPP | 0476 | | | | | | | | |
| GTOR | 0910 | | | | | | | | |
| GTSTA | 0213 | | | | | | | | |
| HFLG1 | 0321 | | | | | | | | |
| HSTPT | 0302 | | | | | | | | |
| I | 0067 | | | | | | | | |
| I.EXP | 2332 | 2432 | | | | | | | |
| ICNT | 0432 | | | | | | | | |
| IINIT | 2331 | 2356 | | | | | | | |
| ILNX | 2330 | 2430 | | | | | | | |
| IMPY | 0497 | 1935 | | | | | | | |
| IN | 1401 | 1140 | 1294 | | | | | | |
| IN2 | 1439 | 1150 | 1206 | | | | | | |
| IN3 | 1609 | 1218 | 1339 | | | | | | |
| INF | 0077 | | | | | | | | |
| INIT | 0724 | 0903 | 1046 | 1188 | 1263 | 1321 | 2331 | | |
| INITS | 0466 | | | | | | | | |
| INREA | 0226 | | | | | | | | |
| INT | 2288 | 1904 | 2295 | 2299 | | | | | |
| INTCK | 0469 | 2174 | | | | | | | |
| INTEA | 0178 | | | | | | | | |
| INTEL | 0340 | | | | | | | | |
| INTFL | 0075 | | | | | | | | |
| INTGR | 0402 | | | | | | | | |
| INTLK | 1769 | 1755 | | | | | | | |
| IOBUF | 0359 | | | | | | | | |
| IOHEA | 0229 | | | | | | | | |
| IOSTA | 0225 | | | | | | | | |
| IPW1 | 2386 | 2408 | | | | | | | |
| IPW2 | 2397 | 2387 | | | | | | | |
| IPWR | 2375 | | | | | | | | |
| ITR | 0752 | 0833 | 0868 | 1032 | 1131 | | | | |
| KEYFG | 0324 | | | | | | | | |
| L2T1 | 0347 | 1977 | 1979 | 1986 | 1989 | 2021 | 2130 | 2250 | 2274 |
| L2T2 | 0348 | 1916 | 1933 | 1944 | 1960 | | | | |
| LASTN | 0398 | | | | | | | | |
| LBOP | 0119 | | | | | | | | |
| LDEF | 0499 | | | | | | | | |
| LDVSR | 1915 | 2017 | | | | | | | |
| LETCK | 0474 | | | | | | | | |
| LIMIT | 0475 | | | | | | | | |
| LISTA | 0167 | | | | | | | | |
| LN10 | 0688 | 1267 | 1337 | 1373 | 1670 | | | | |
| LNFD | 0072 | | | | | | | | |
| LNINC | 0315 | | | | | | | | |
| LNUM | 0467 | | | | | | | | |
| LNX | 1320 | 1669 | 1907 | 2330 | | | | | |
| LOCL1 | 0345 | 0542 | | | | | | | |
| LOCL2 | 0346 | 2031 | 2034 | | | | | | |
| LOG | 1669 | 1898 | | | | | | | |
| LPCK | 0447 | | | | | | | | |
| LPCKE | 0448 | | | | | | | | |
| LPOP | 0120 | | | | | | | | |
| LROMA | 0123 | | | | | | | | |
| LSTAK | 0299 | | | | | | | | |
| LSTLP | 2557 | 2538 | | | | | | | |
| LSTPT | 0301 | | | | | | | | |
| LTR | 0489 | | | | | | | | |
| LWAM | 0295 | | | | | | | | |
| M1 | 0124 | 0531 | 2032 | 2098 | 2166 | | | | |
| M10 | 0131 | 0532 | | | | | | | |
| M100 | 0144 | 0687 | 2173 | | | | | | |
| M1024 | 0146 | | | | | | | | |
| M11 | 0132 | 1009 | 2024 | 2316 | | | | | |
| M12 | 0133 | 0577 | 2101 | 2120 | | | | | |
| M13 | 0134 | 0686 | 1822 | | | | | | |
| M14 | 0135 | 0711 | | | | | | | |
| M15 | 0136 | | | | | | | | |

CROSS-REFERENCE TABLE

| | | | | | | | | | | |
|---|---|---|---|---|---|---|---|---|---|---|
| M2 | 0125 | 0575 | 2163 | | | | | | | |
| M23 | 0137 | | | | | | | | | |
| M25 | 0138 | | | | | | | | | |
| M256 | 0145 | 0533 | 1932 | 1980 | 2209 | 2273 | | | | |
| M3 | 0126 | 2583 | | | | | | | | |
| M32 | 0139 | | | | | | | | | |
| M36 | 0140 | | | | | | | | | |
| M4 | 0127 | 0576 | 1825 | | | | | | | |
| M48 | 0141 | | | | | | | | | |
| M5 | 0128 | 0423 | 1964 | | | | | | | |
| M6 | 0129 | | | | | | | | | |
| M64 | 0142 | | | | | | | | | |
| M80 | 0143 | | | | | | | | | |
| M9 | 0130 | | | | | | | | | |
| MASK1 | 0153 | | | | | | | | | |
| MASK2 | 1684 | 1743 | | | | | | | | |
| MASK5 | 0154 | | | | | | | | | |
| MAW | 0294 | | | | | | | | | |
| MAXIN | 0400 | | | | | | | | | |
| MAXSN | 0147 | | | | | | | | | |
| MBIN1 | 0406 | 2064 | 2082 | | | | | | | |
| MBIN2 | 0407 | 2061 | 2085 | 2086 | 2088 | | | | | |
| MBOX1 | 0351 | | | | | | | | | |
| MDIMA | 0209 | | | | | | | | | |
| MERB | 0455 | | | | | | | | | |
| MINIT | 0465 | | | | | | | | | |
| MLT | 0583 | 0952 | | | | | | | | |
| MODE | 0305 | | | | | | | | | |
| MSFLG | 0389 | | | | | | | | | |
| MVTOH | 0487 | | | | | | | | | |
| N1 | 0531 | 0889 | 1028 | 1215 | 1320 | 1510 | 1644 | 1821 | 1845 | 1866 |
| N10 | 0532 | 1360 | 1849 | | | | | | | |
| N100 | 0687 | 1354 | | | | | | | | |
| N12 | 0577 | 0806 | 1520 | | | | | | | |
| N13 | 0686 | 1213 | | | | | | | | |
| N14 | 0711 | 2590 | 2595 | 2600 | 2605 | | | | | |
| N2 | 0575 | 0885 | 0992 | | | | | | | |
| N256 | 0533 | 0783 | 1109 | 1877 | | | | | | |
| N4 | 0576 | 1635 | | | | | | | | |
| N5 | 0423 | 1296 | 1583 | 1647 | | | | | | |
| NDISP | 0382 | | | | | | | | | |
| NDWRT | 0506 | | | | | | | | | |
| NEXT1 | 0460 | | | | | | | | | |
| NEXTA | 0477 | | | | | | | | | |
| NEXTL | 0459 | | | | | | | | | |
| NMOTA | 0200 | | | | | | | | | |
| NO | 1843 | 1839 | 1840 | | | | | | | |
| NOEOF | 0492 | | | | | | | | | |
| NORM | 0762 | 0747 | 0751 | 0791 | 1106 | 1235 | 1371 | | | |
| NPRIN | 0383 | | | | | | | | | |
| NPWRT | 0505 | | | | | | | | | |
| NUM | 0396 | 0397 | | | | | | | | |
| NUMC1 | 2116 | 2104 | 2109 | 2111 | 2132 | | | | | |
| NUMC2 | 2137 | 2117 | | | | | | | | |
| NUMC3 | 2147 | 2177 | 2179 | | | | | | | |
| NUMCA | 0211 | | | | | | | | | |
| NUMCD | 2123 | 2118 | | | | | | | | |
| NUMCE | 2166 | 2143 | | | | | | | | |
| NUMCK | 2096 | 0211 | | | | | | | | |
| NUMCP | 2112 | 0246 | 2138 | | | | | | | |
| NUMER | 2171 | 0245 | 2176 | | | | | | | |
| NUML1 | 2132 | 2128 | | | | | | | | |
| NUMO1 | 2204 | | | | | | | | | |
| NUMO2 | 2217 | 2221 | | | | | | | | |
| NUMOA | 0212 | | | | | | | | | |
| NUMOP | 2189 | 0212 | | | | | | | | |
| NWWD | 1825 | 1858 | | | | | | | | |
| NXDG | 1828 | 1855 | | | | | | | | |
| NXTDT | 0304 | | | | | | | | | |
| NXTST | 0405 | | | | | | | | | |
| NXWD | 2586 | 2609 | | | | | | | | |
| OBLNK | 0478 | | | | | | | | | |
| ODGIT | 0502 | 1978 | | | | | | | | |
| OF | 0426 | 1276 | | | | | | | | |
| OK | 1197 | 1191 | 1193 | | | | | | | |
| OK1 | 2077 | 2069 | | | | | | | | |
| ONE | 0045 | 0834 | 0862 | 0960 | 0965 | 2301 | 2379 | 2414 | | |
| ONEXT | 0479 | | | | | | | | | |
| OPCHA | 0171 | | | | | | | | | |
| OPDMK | 0079 | | | | | | | | | |
| OPMSK | 0076 | | | | | | | | | |
| OPTYP | 0397 | | | | | | | | | |
| OTO | 0960 | 1302 | 1441 | | | | | | | |
| OTPTR | 0293 | | | | | | | | | |
| OTT | 0965 | 0981 | 1011 | 1345 | 1559 | | | | | |
| OUT | 1174 | 1000 | 1134 | 1137 | 1169 | 1252 | | | | |
| OUTCR | 0480 | | | | | | | | | |
| OUTIA | 0179 | | | | | | | | | |
| OUTIN | 1976 | 0179 | | | | | | | | |
| OVCHA | 0216 | | | | | | | | | |

CROSS-REFERENCE TABLE

| | | | | | | | | | | | |
|---|---|---|---|---|---|---|---|---|---|---|---|
| OVER | 2451 | 2435 | 2462 | | | | | | | | |
| P1 | 0522 | 0705 | 1042 | 1075 | 1116 | 1224 | 1262 | 1326 | 1485 | 1582 | 1618 |
| P10 | 0574 | 1364 | 1573 | 2516 | | | | | | | |
| P100 | 0685 | 1357 | | | | | | | | | |
| P12 | 0527 | 1204 | 1555 | 1577 | 1631 | | | | | | |
| P13 | 0528 | 0808 | 1216 | | | | | | | | |
| P15 | 0529 | 1874 | | | | | | | | | |
| P2 | 0523 | 0706 | 1882 | | | | | | | | |
| P22 | 0684 | 1203 | | | | | | | | | |
| P256 | 0530 | 1143 | 1166 | 1348 | 1778 | 2553 | 2625 | | | | |
| P4 | 0524 | 0887 | 1413 | | | | | | | | |
| P5 | 0525 | 2465 | | | | | | | | | |
| P6 | 0572 | 1149 | 1211 | 1293 | 1336 | | | | | | |
| P7 | 0573 | 1127 | | | | | | | | | |
| P8 | 0526 | 2544 | | | | | | | | | |
| PARMA | 0306 | | | | | | | | | | |
| PARMN | 0307 | | | | | | | | | | |
| PBPTO | 0313 | | | | | | | | | | |
| PBPTP | 0310 | | | | | | | | | | |
| PBUFF | 0311 | | | | | | | | | | |
| PBUFO | 0312 | | | | | | | | | | |
| PEND | 0365 | | | | | | | | | | |
| PEXMA | 0165 | | | | | | | | | | |
| PFLAG | 0391 | | | | | | | | | | |
| PFSQ | 2541 | 2531 | | | | | | | | | |
| PGIN0 | 0488 | | | | | | | | | | |
| PGINT | 0468 | | | | | | | | | | |
| PI | 0689 | 1033 | 1217 | | | | | | | | |
| PI/2 | 0044 | 1012 | 1088 | 1229 | | | | | | | |
| PLACE | 0384 | | | | | | | | | | |
| PMODE | 0329 | | | | | | | | | | |
| POOT | 1220 | 1053 | 1195 | | | | | | | | |
| PP2 | 1948 | 1931 | 1962 | 1965 | | | | | | | |
| PPFF | 0366 | | | | | | | | | | |
| PRADD | 0308 | | | | | | | | | | |
| PRFLG | 0332 | | | | | | | | | | |
| PTA | 1404 | 1430 | | | | | | | | | |
| PTB | 1452 | 1540 | | | | | | | | | |
| PTC | 1495 | 1453 | | | | | | | | | |
| PTD | 1455 | 1543 | | | | | | | | | |
| PTE | 1465 | 1449 | | | | | | | | | |
| PTF | 1542 | 1476 | | | | | | | | | |
| PTF1 | 1476 | 1493 | | | | | | | | | |
| PTG | 1598 | 1587 | 1590 | | | | | | | | |
| PTH | 1575 | 1568 | 1597 | | | | | | | | |
| PTI | 1570 | 1562 | | | | | | | | | |
| PTJ | 1552 | 1303 | 1333 | | | | | | | | |
| PTK | 1534 | 1521 | | | | | | | | | |
| PTL | 1485 | 1450 | | | | | | | | | |
| PTL1 | 1450 | 1457 | | | | | | | | | |
| PTM | 1497 | 1481 | | | | | | | | | |
| PTN | 1469 | 1452 | 1463 | | | | | | | | |
| PTO | 1459 | | | | | | | | | | |
| PTP | 1616 | 1626 | | | | | | | | | |
| PTQ | 1635 | 1662 | | | | | | | | | |
| PTR | 1561 | 1600 | | | | | | | | | |
| PTS | 1565 | 1558 | | | | | | | | | |
| QTCHA | 0230 | | | | | | | | | | |
| QTOP | 0109 | 0161 | | | | | | | | | |
| RAD | 0705 | 0907 | | | | | | | | | |
| RAX | 0875 | 0871 | | | | | | | | | |
| RBOP | 0117 | | | | | | | | | | |
| RBUFF | 0360 | | | | | | | | | | |
| RCOUT | 0333 | | | | | | | | | | |
| RCPFG | 0557 | 0991 | 1076 | 1093 | 1097 | 1132 | 1136 | 1152 | 1165 | 1167 | 1287 |
| | 1305 | | | | | | | | | | |
| RDYDA | 0166 | | | | | | | | | | |
| RECIP | 0833 | 1135 | 1197 | 1311 | | | | | | | |
| REFD | 0161 | | | | | | | | | | |
| REFDL | 0339 | | | | | | | | | | |
| RES | 0417 | | | | | | | | | | |
| RESB1 | 0463 | | | | | | | | | | |
| RESBP | 0464 | | | | | | | | | | |
| RET1 | 1958 | 1943 | | | | | | | | | |
| RET2 | 0431 | | | | | | | | | | |
| RET4 | 2336 | 2360 | | | | | | | | | |
| RETN2 | 0430 | 1948 | 2164 | 2326 | | | | | | | |
| RETN3 | 0429 | | | | | | | | | | |
| ROUND | 0425 | 0810 | 1117 | 1486 | 1523 | 1751 | 2473 | 2623 | | | |
| RPCK | 0449 | | | | | | | | | | |
| RPCKE | 0450 | | | | | | | | | | |
| RPOP | 0115 | | | | | | | | | | |
| RSAVE | 0292 | | | | | | | | | | |
| RSLT | 0696 | 0731 | 0735 | 0752 | 0860 | 0873 | 0875 | 0929 | 1160 | 1176 | 1381 |
| | 1387 | | | | | | | | | | |
| RSLTE | 0373 | 0696 | | | | | | | | | |
| RSPTR | 0418 | | | | | | | | | | |
| RSTAK | 0416 | | | | | | | | | | |
| RSTKA | 0158 | | | | | | | | | | |
| RSULT | 0436 | | | | | | | | | | |

CROSS-REFERENCE TABLE

| | | | | | | | | | | | |
|---|---|---|---|---|---|---|---|---|---|---|---|
| RTOD | 0944 | 1246 | 1249 | | | | | | | | |
| RTT | 0735 | 0762 | 0966 | | | | | | | | |
| RUNA | 0163 | | | | | | | | | | |
| RY1 | 0559 | 1155 | 1157 | 1444 | 1466 | 1472 | 1489 | 1497 | 1500 | 1534 | |
| RY2 | 0561 | 1446 | 1498 | 1499 | 1504 | | | | | | |
| S | 0082 | | | | | | | | | | |
| SALTA | 0207 | | | | | | | | | | |
| SANS | 0933 | 0922 | 0953 | 0983 | | | | | | | |
| SAVBP | 0462 | | | | | | | | | | |
| SAVE | 0560 | 1208 | 1226 | 1439 | 1516 | 1517 | 2312 | 2322 | 2324 | 2367 | 2375 |
| | 2410 | 2428 | 2434 | 2445 | | | | | | | |
| SAVEA | 0325 | | | | | | | | | | |
| SAVEB | 0326 | | | | | | | | | | |
| SBADR | 0394 | | | | | | | | | | |
| SBPTR | 0387 | 2178 | 2201 | 2202 | 2203 | | | | | | |
| SBPUD | 0441 | 2213 | 2219 | | | | | | | | |
| SHUFA | 0199 | | | | | | | | | | |
| SCRT | 0845 | 0985 | 1047 | | | | | | | | |
| SCRT1 | 0870 | 1055 | | | | | | | | | |
| SEC | 0320 | | | | | | | | | | |
| SFLAG | 0393 | | | | | | | | | | |
| SGN | 2004 | 1903 | | | | | | | | | |
| SGNS | 0503 | 2004 | | | | | | | | | |
| SHIFT | 0555 | 1402 | 1429 | 1440 | 1509 | 1542 | 1556 | 1575 | 1599 | 1611 | 1625 |
| | 1632 | 1641 | 1661 | | | | | | | | |
| SIGDG | 2180 | 2102 | 2119 | 2127 | 2129 | 2196 | | | | | |
| SIGN | 0562 | 0728 | 0994 | 1052 | 1078 | 1110 | 1112 | 1115 | 1164 | 1220 | 1274 |
| | 1309 | 1347 | 1383 | | | | | | | | |
| SIN | 0976 | 1014 | 1902 | | | | | | | | |
| SLCOD | 0328 | | | | | | | | | | |
| SLEND | 0202 | | | | | | | | | | |
| SLWST | 0457 | | | | | | | | | | |
| SNFLA | 0197 | | | | | | | | | | |
| SNFLT | 2244 | 0197 | | | | | | | | | |
| SOUT | 1251 | 1312 | | | | | | | | | |
| SPLFA | 0196 | | | | | | | | | | |
| SPLFL | 2636 | 0196 | | | | | | | | | |
| SPLUF | 2056 | 2068 | | | | | | | | | |
| SSBPT | 0395 | | | | | | | | | | |
| SSYMA | 0170 | | | | | | | | | | |
| ST | 0377 | | | | | | | | | | |
| STAR2 | 0424 | 1179 | 1782 | 1884 | 2554 | 2555 | 2621 | 2626 | | | |
| START | 0162 | 0007 | | | | | | | | | |
| STEXP | 0453 | | | | | | | | | | |
| STM1 | 1276 | 1265 | 1273 | | | | | | | | |
| STMAX | 0427 | 1103 | 1328 | 1814 | 2073 | 2341 | | | | | |
| STN | 0900 | 0976 | 1006 | 1074 | | | | | | | |
| STOR1 | 0438 | | | | | | | | | | |
| STORE | 0437 | | | | | | | | | | |
| STPFL | 0323 | | | | | | | | | | |
| STROP | 0440 | | | | | | | | | | |
| STSRH | 0452 | | | | | | | | | | |
| SUMPA | 0227 | | | | | | | | | | |
| SYE12 | 0495 | | | | | | | | | | |
| SYE25 | 0470 | | | | | | | | | | |
| SYMC1 | 0443 | | | | | | | | | | |
| SYMC2 | 0442 | | | | | | | | | | |
| SYMCK | 0444 | | | | | | | | | | |
| SYMTP | 0298 | | | | | | | | | | |
| SYTSA | 0209 | | | | | | | | | | |
| TABL0 | 0553 | 1401 | 1414 | 1415 | 1574 | 1588 | 1609 | 1636 | 1637 | | |
| TAN | 1074 | 0978 | 1900 | | | | | | | | |
| TEMP | 0552 | 0553 | 0554 | 0555 | 0556 | 0557 | 0558 | 0559 | 0560 | 0561 | 0562 |
| | 0563 | 0564 | 0902 | 0977 | 1102 | 1610 | 1629 | | | | |
| TEMP1 | 0352 | 2189 | 2222 | | | | | | | | |
| TEMP2 | 0353 | 1803 | 1856 | 1857 | 1864 | 2490 | 2500 | 2505 | 2509 | 2545 | 2581 |
| | 2586 | 2587 | | | | | | | | | |
| TEMP3 | 0354 | 1829 | 1833 | 2478 | 2496 | 2513 | 2519 | 2536 | 2584 | 2608 | |
| TEMP4 | 0355 | 1823 | 1851 | 2207 | 2220 | 2492 | 2494 | 2498 | 2521 | | |
| TEMP5 | 0542 | 2517 | 2522 | | | | | | | | |
| TEMPA | 0541 | 1716 | 1739 | 1826 | 1854 | 1861 | 2477 | 2502 | 2503 | 2507 | 2510 |
| | 2511 | 2541 | | | | | | | | | |
| TEMPS | 0349 | 2244 | 2249 | 2256 | 2257 | | | | | | |
| TERM | 0364 | | | | | | | | | | |
| TFLAG | 0318 | | | | | | | | | | |
| TFLG1 | 0322 | | | | | | | | | | |
| THETL | 0703 | 1292 | | | | | | | | | |
| THETT | 0704 | 1124 | | | | | | | | | |
| TMPA | 0203 | | | | | | | | | | |
| TMPOP | 0184 | | | | | | | | | | |
| TREG | 0695 | 0748 | 0945 | 0948 | 1161 | 1386 | | | | | |
| TREGE | 0372 | 0695 | 0947 | 1385 | | | | | | | |
| TSRHA | 0168 | | | | | | | | | | |
| TSTPT | 0300 | | | | | | | | | | |
| TTY | 0509 | | | | | | | | | | |
| TWOPI | 0698 | 1082 | | | | | | | | | |
| TYPFL | 0078 | | | | | | | | | | |
| UFLAG | 0392 | | | | | | | | | | |
| UKPTR | 0309 | | | | | | | | | | |
| UNITS | 0319 | 0905 | 1244 | | | | | | | | |

CROSS-REFERENCE TABLE

```
UNRM    0801      1227      1269
UNSTK   0458
UP1     2318      2314      2321      2323
UP2     2428      2422      2447
UP3     2366
UP4     2442      2371
UPARA   0191
UPARO   2354      0191
VALUE   0297
VAROA   0214
WBUFF   0433
WIDTH   0385
WRDN    0564      0691
WRITE   0159
XAR1    0961      1089      1230
XC      0412      2336      2338
XEC4A   0164
XEC6A   0221
XFAR1   0435
XFAR2   0439      1958      2043      2291      2369      2413
XFER    1987      2022      2037      2131
XSCRA   0220
YC      0414
YES     1861      1841
ZAP     0152      2486
ZERO    0818      0739      0802      1084      1094      1404      1480
ZONK    0500      1736      1748      1774      1818      2293      2437      2563
ZOR     1179      1190

          #01  9830
```

```
0001                  ASMB,A,B,L
0003*
0004*
0005*
0006*
0007*                 ****    9830A TAPE CASSETTE SYSTEM   ****
0008*
0009*
0010*
0011  00000                     ORG 0
0012*
0013  00000 164121              JMP START,I    START OF MONITOR
0014  00001 043060              OCT 43060      CONSTANT NEEDED BY PROCESSOR
0015  00002 000000              BSS 1        FOR INTERPT
0016*
0017  00003 000000 C6           OCT 0          ONE
0018  00004 010000              OCT 010000     0000
0019  00005 000000              OCT 0          0000
0020*
0021  00006 000300 C5           OCT 0000000    PI/2
0022  00007 012560              OCT 12560      1570
0023  00010 074543              OCT 074543     7963
0024  00011 023200              OCT 023200     2680
0025*
0026  00012 000001 .1           DEC 1
0027*
0028  00013 000400 C7           OCT 000400     180/PI
0029  00014 053451              OCT 053451     5729
0030  00015 053571              OCT 053571     5779
0031  00016 050450              OCT 050450     5128
0032*
0033  00017 000002 .2           DEC 2
0034  00020 000003 .3           DEC 3
0035  00021 000004 .4           DEC 4
0036  00022 000005 .5           DEC 5
0037  00023 000006 .6           DEC 6
0038  00024 000007 .7           DEC 7
0039  00025 000010 .8           DEC 8
0040  00026 000011 .9           DEC 9
0041  00027 000013 .11          DEC 11
0042  00030 000014 .12          DEC 12
0043  00031 000015 CRTN         OCT 15
0044  00031        EOL          EQU CRTN
0045  00031        .13          EQU CRTN
0046*******************
0047* POINTERS TO FUNCTIONS CONSTANTS
0048*
0049  00027        DPERR EQU .11       POINTER TO 180/PI
0050  00023        PI/2  EQU .6        POINTER  TO PI/2
0051  00020        ONE   EQU .3        POINTER TO THE CONSTANT ONE
0052*
0053*******************
0054  00032 000017 .15          DEC 15
0055  00033 000020 .16          DEC 16
0056  00034 000025 .21          DEC 21
0057  00035 000026 .22          DEC 22
```

#01 9830

```
00036 000027 .23    DEC 23
00037 000034 .28    DEC 28
00040 000037 .31    DEC 31
00041 000040 .32    DEC 32
00042 000041 .33    DEC 33
00043 000042 .34    DEC 34
00044 000045 .37    DEC 37
00045 000050 .40    DEC 40
00046 000051 .41    DEC 41
00047 000053 .43    DEC 43
00050 000055 .45    DEC 45
00051 000056 .46    DEC 46
00052 000060 .48    DEC 48
00053 000072 .58    DEC 58
00054 000077 .63    DEC 63
00055 000111 I      OCT 111
00056 023420 .1E4   DEC 10000
00057 001750 .1000  DEC 1000
00060 000144 .100   DEC 100
00061 000012 .10    DEC 10
00061        LNFD   EQU .10
00062 100000 FLGBT  OCT 100000
00063 000143 .99    DEC 99
00064 100004 INTFL  OCT 100004
00065 076000 OPMSK  OCT 76000
00066 077777 INF    OCT 77777
00067 100037 TYPFL  OCT 100037
00070 101777 OPDMK  OCT 101777
00071 000105 E      OCT 105
00072 000106 F      OCT 106
00073 000123 S      OCT 123
00032        B17    EQU .15
00033        B20    EQU .16
00074 000022 B22    OCT 22
00075 000023 B23    OCT 23
00035        B26    EQU .22
00036        B27    EQU .23
00076 000036 B36    OCT 36
00040        B37    EQU .31
00043        B42    EQU .34
00077 000044 B44    OCT 44
00100 000052 B52    OCT 52
00053        B72    EQU .58
00101 000100 B100   OCT 100
00102 000133 B133   OCT 133
00103 000140 B140   OCT 140
00104 000177 B177   OCT 177
00105 000377 B377   OCT 377
00013        B400   EQU C7
00106 000777 B777   OCT 777
00107 001000 B1000  OCT 1000
00110 001400 B1400  OCT 1400
00111 001740 B1740  OCT 1740
00112 001760 B1760  OCT 1760
00113 001774 B1774  OCT 1774
00114 001775 B1775  OCT 1775
00115 001777 B1777  OCT 1777
00116 002000 OTOP   OCT 2000
00117 002400 B2400  OCT 2400
00120 003000 B3000  OCT 3000
00121 004000 B4000  OCT 4000
00122 006000 B6K    OCT 6000
00004        B10K   EQU C6+1
00004        RPOP   EQU B10K
00123 012000 B12K   OCT 12000
00123        RBOP   EQU B12K
00124 032000 EXPOP  OCT 32000
00125 050000 LROP   OCT 50000
00126 052000 LPOP   OCT 52000
00127 170000 B170K  OCT 170000
00130 013777 FROMA  OCT 13777
00131 000000 LROMA  BSS 1
00132 177777 M1     DEC -1
00133 177776 M2     DEC -2
00134 177775 M3     DEC -3
00135 177774 M4     DEC -4
00136 177773 M5     DEC -5
00137 177772 M6     DEC -6
00140 177767 M9     DEC -9
00141 177766 M10    DEC -10
00142 177765 M11    DEC -11
00143 177764 M12    DEC -12
00144 177763 M13    DEC -13
00145 177762 M14    DEC -14
00146 177761 M15    DEC -15
00147 177751 M23    DEC -23
00150 177747 M25    DEC -25
00151 177740 M32    DEC -32
00152 177734 M36    DEC -36
00153 177720 M48    DEC -48
```

```
#01 9830

 00154 177700 M64   DEC -64
 00155 177660 M80   DEC -80
 00156 177634 M100  DEC -100
 00157 177400 M256  DEC -256
 00160 176000 M1024 DEC -1024
 00161 154360 MAXSN DEC -10000    -(MAXIMUM ALLOWABLE LINE NUMBER)
 00162 043116 FN    ASC 1,FN
*
*  MATH CONSTANTS THAT ARE NEEDED ON BASE PAGE
*
 00163 177401 ZAP   OCT 177401
 00164 063440 MASK1 OCT 063440
 00165 061400 MASK5 OCT 061400
*
 00166 000000 FWAM  BSS 1         FIRST WORD OF AVAILABLE MEM
 00112        RSTKA EQU B1760      START OF RETURN STACK
 00167 000000 WRITE BSS 1         PRINTER AND DISPLAY DRIVER
 00170 000000 CLERA BSS 1         CLEAR SCREEN
 00116        REED  EQU QTOP      KEYBOARD DRIVER QTOP IS = 20008
 00121        START EQU B4000
 00171 000000 RUNA  BSS 1
 00172 000000 XFC4A BSS 1
 00173 000000 PEXMA BSS 1
 00174 000000 RDYDA BSS 1
 00122        LISTA EQU B6K
 00175 000000 TSRHA BSS 1         TABLE SEARCH
 00176 000000 ELINA BSS 1         OUTPUT I/O BUFFER
 00177 000000 SSYMA BSS 1         SEARCH SYMBOL TABLE FOR SYMBOL
 00200 000000 OPCHA BSS 1
 00201 000000 FORMA BSS 1
 00202 000000 FSCA  BSS 1
 00203 000000 ACTSA BSS 1
 00204 000000 DELSA BSS 1
 00205 000000 AERRA BSS 1         ALTERNATE ENTRY FOR ERROR
 00206 000000 ERRA  BSS 1
 00207 014560 INTEA DEF ISERV
 00210 000000 OUTIA BSS 1         OUTPUT AN INTEGER
 00211 000000 .BUFA BSS 1         FIRST CHAR OF I/O BUFFER
 00212 000000 .SLBF BSS 1          REFRESH BUFFER POINTER
 00213 001744 AR1A  DEF AR1
 00214 001754 AR2A  DEF AR2
 00215 000000 TMPOP BSS 1
 00216 000000 .FADA BSS 1         ADD
 00217 000000 .FSBA BSS 1         SUBTRACT
 00220 000000 .FMPA BSS 1         MULTPY
 00221 000000 .FDVA BSS 1         DIVIDE
 00222 000000 FNTFA BSS 1
 00223 000000 .FSR  BSS 1         SQUARE ROOT
 00224 000000 UPARA BSS 1         UP ARROW
 00225 000000 FLTRA BSS 1
 00226 000000 FLTFA BSS 1
 00227 000000 FXFLA BSS 1
 00230 000000 FLTSA BSS 1
 00231 000000 SPLFA BSS 1
 00232 000000 SNFLA BSS 1
 00233 000000 BEND  BSS 1         I/O BUFFER END
 00233        SBUFA EQU BEND
 00234 000000 NMOTA BSS 1         NUMBER OUTPUT ROUTINE LINK
 00235 000000 FILLA BSS 1           SUPPLY NEEDED BLANKS ON OUTPUT
 00236 000000 SLEND BSS 1         REFRESH BUFFER END
 00111        TMPA  EQU B1740
 00110        BADRP EQU B1400     POINTER POINTER TO I/O BUFFER
*
 00123        FOPBS EQU B12K
 00237 000000 SALTA BSS 1
 00240 000000 MDIMA BSS 1
 00241 000000 SYTSA BSS 1
 00242 000000 DCOMA BSS 1
 00243 000000 NUMCA BSS 1
 00244 000000 NUMOA BSS 1
 00245 000000 GTSTA BSS 1
 00246 000000 VAROA BSS 1
 00247 000000 ECALA BSS 1
 00250 000000 OVCHA BSS 1
 00251 000000 CLPIA BSS 1
 00252 000000 ENTEA BSS 1
 00253 000000 CHRSA BSS 1
 00254 000000 XSCRA BSS 1
 00255 000000 XFC6A BSS 1
 00256 000000 FDAAA BSS 1
 00257 000000 FNDAA BSS 1
 00260 000000 FNDIA BSS 1
 00261 000000 IOSTA BSS 1
 00262 000000 INREA BSS 1
 00263 000000 SUMPA BSS 1
 00264 000000 CRCKA BSS 1
 00265 000000 IOHEA BSS 1
 00266 000000 QTCHA BSS 1
**********************************
*
 00267 000000       BSS 1         CHECKSUM WORD*****************
```

#01 9830--ERROR TABLE

```
00270 000000 E1    BSS 1
00271 000000       BSS 1
00272 000000       BSS 1
00273 000000       BSS 1
00274 000000 E5    BSS 1
00275 000000       BSS 1
00276 000000       BSS 1
00277 000000       BSS 1
00300 000000       BSS 1
00301 000000 E10   BSS 1
00302 000000       BSS 1
00303 000000       BSS 1
00304 000000       BSS 1
00305 000000       BSS 1
00306 000000 E15   BSS 1
00307 000000       BSS 1
00310 000000       BSS 1
00311 000000       BSS 1
00312 000000       BSS 1
00313 000000 E20   BSS 1
00314 000000       BSS 1
00315 000000       BSS 1
00316 000000       BSS 1
00317 000000       BSS 1
00320 000000 E25   BSS 1
00321 000000       BSS 1
00322 000000       BSS 1
00323 000000       BSS 1
00324 000000       BSS 1
00325 000000 E30   BSS 1
00326 000000       BSS 1
00327 000000       BSS 1
00330 000000       BSS 1
00331 000000       BSS 1
00332 000000 E35   BSS 1
00333 000000       BSS 1
00334 000000       BSS 1
00335 000000       BSS 1
00336 000000       BSS 1
00337 000000 E40   BSS 1
00340 000000       BSS 1
00341 000000       BSS 1
00342 000000       BSS 1
00343 000000       BSS 1
00344 000000 E45   BSS 1
00345 000000       BSS 1
00346 000000       BSS 1
00347 000000       BSS 1
00350 000000       BSS 1
00351 000000 E50   BSS 1
00352 000000       BSS 1
00353 000000       BSS 1
00354 000000       BSS 1
00355 000000       BSS 1
```

#01 9830--BASE PAGE READ-WRITE MEMORY

```
01400              ORG 1400B
01400 000000 BADDR BSS 1     CURRENT CHAR POINTER
01401 000000 RSAVE BSS 1          SAVE (A) FOR RETN2
01402 000000 OTPTR BSS 1     REFRESH POINTER
01403 000000 MAW   BSS 1     LAST WORD OF R/W MEM
01404 000000 LWAM  BSS 1     LAST WORD AVAILABLE FOR USER
01405 000000 FWUP  BSS 1     FIRST WORD OF COMMON OR MAINLINE
01406 000000 VALUE BSS 1     FIRST WORD -1 OF VALUE TABLE
01407 000000 SYMTP BSS 1     FIRST WORD -1 OF SYMBOL TABLE
01410 000000 LSTAK BSS 1     FIRST WORD OF OPERATOR STACK
01411 000000 TSTPT BSS 1     TEMPORARY STACK POINTER
01412 000000 LSTPT BSS 1     OPERATOR STACK POINTER
01413 000000 HSTPT BSS 1     OPERAND STACK POINTER
01414 000000 DSTRT BSS 1     DATA STATEMENT
01415 000000 NXTDT BSS 1       POINTERS
01416 000000 MODE  BSS 1     PROGRAM=0; KEYBOARD=1
01417 000000 PARMA BSS 1     PARAMETER ADDRESS
01420 000000 PARMN BSS 1     PARAMETER NAME
01421 000000 PRADD BSS 1     LAST WORD+1 OF CURRENT STMT
01422 000000 UKPTR BSS 1     USER KEY POINTER
01423 000000 PRPTR BSS 1     LAST WORD OF CURRENT PROGRAM
01424 000000 PRUFF BSS 1     FIRST WORD OF CURRENT PROGRAM
01425 000000 PRUFO BSS 1     FIRST WORD OF MAINLINE
01426 000000 PRPTO BSS 1     LAST WORD+1 OF MAINLINE
01427 000000 .LNUM BSS 1     CURRENT LINE NUMBER
01430 000000 LNINC BSS 1     AUTO LINE INCREMENT
01431 000000 CLINE BSS 1     CURRENT LINE FOR LIST
01432 000000 DRQST BSS 1     INPUT STMT FLAG
01433 000000 TFLAG BSS 1     PTAPE FLAG
01434 000000 UNITS BSS 1     TRIG UNITS
01435 000000 SEC   BSS 1     SECURE PROGRAM FLAG
```

```
#01  9830--BASE PAGE READ-WRITE MEMORY

01436 000000 HFLG1 BSS 2     STOP ADDRESSES
01440 000000 TFLG1 BSS 2     TRACE LIMIT ADDRESSES
01442 000000 STPFL BSS 1     STOP FLAG
01443 000000 KEYFG BSS 1     KEYBOARD FLAG
01444 000000 SAVEA BSS 1     INTERRUPT
01445 000000 SAVEB BSS 1
01446 000000 ADRSS BSS 1       TEMPORARIES
01447 000000 SLCOD BSS 1     SELECT CODE
01450 000000 PMODE BSS 1     PRINT-ALL FLAG
01451 000000 CTYPE BSS 1     KEYBOARD
01452 000000 CPLAC BSS 1       FORMAT FLAGS
01453 000000 PRFLG BSS 1     PRINT/DISP FLAG
01454 000000 RCOUT BSS 1     FORMAT
01455 000000 FORMT BSS 1
01456 000000 FORMS BSS 1
01457 000000 FORME BSS 1       STATEMENT FLAGS
01460 000000 FTMP1 BSS 1     CURRENT OPERATOR CODE
01461 000000 FTMP2 BSS 1     CURRENT OPERATOR PRECEDENCE
01462 000000 REEDL BSS 1
01463 000000 INTEL BSS 1
01464 000000       BSS 2       UNUSED
*
*  TEMPORARIES
*
01466 000000 LOCL1 BSS 1
01467 000000 LOCL2 BSS 1
01470 000000 L2T1  BSS 1
01471 000000 L2T2  BSS 1
01472 000000 TEMPS BSS 1
01473 000000 TEMP  BSS 1
01473        MBOX1 EQU TEMP
01474 000000 TEMP1 BSS 1
01475 000000 TEMP2 BSS 1
01476 000000 TEMP3 BSS 1
01477 000000 TEMP4 BSS 1
*
*  BUFFERS
*
01500 000000 IOBUF BSS 41         INPUT AND RECALL BUFFER
01551 000000 RBUFF BSS 41         SINGLE LINE REFRESH BUFFER
*
*  PRINT ROUTINE FLAGS
*
01622 000000 TERM  BSS 1     CRLF FLAG
01623 000000 PEND  BSS 1     BUFFER OVERFLOW FLAG
01624 000000 PPFF  BSS 1     BUFFER POINTER OR TAB FLAG
01625 000000 FIRST BSS 1
01626 000000       BSS 2      UNUSED
*
*  MATH TEMPORARIES
*
01630 000000 TREGE BSS 4
01634 000000 RSLTE BSS 4
*
*  STATEMENT SYNTAX AND EXECUTION TEMPORARIES
*
01640 000000 ST    BSS 32
*
*  SYSTEM SYNTAX AND EXECUTION TEMPORARIES
*
01700 000000       BSS 1          SAVED FOR PROCESSOR
01701 000000 NDISP BSS 1
01702 000000 NPRIN BSS 1
01703 000000 PLACE BSS 1
01704 000000 WIDTH BSS 1
01705 000000 FLOAT BSS 1
01706 000000 SBPTR BSS 1
01707 000000 BLANK BSS 1
01710 000000 MSFLG BSS 1
01711 000000 DFLAG BSS 1
01712 000000 PFLAG BSS 1
01713 000000 UFLAG BSS 1
01714 000000 SFLAG BSS 1
01715 000000 SBADR BSS 1
01716 000000 SSBPT BSS 1
01717 000000 NUM   BSS 1
01717        OPTYP EQU NUM
01720 000000 LASTN BSS 1
01721 000000 SIGN  BSS 1
01721        MAXIN EQU SIGN
01722 000000 EXP   BSS 1
01722        INTGR EQU EXP
01723 000000 ARYAD BSS 1
01724 000000 GFLAG BSS 1
01725 000000 NXTST BSS 1
01726 000000 MBIN1 BSS 1
01727 000000 MBIN2 BSS 1
*
*  ARITHMETIC REGISTERS AND RETURN STACK
*
```

#01 9830--BASE PAGE READ-WRITE MEMORY

```
01740               ORG 1740B
01740 000000 XC     BSS 4
01744 000000 AR1    BSS 4
01750 000000 YC     BSS 4
01754 000000 AR2    BSS 4
01760 000000 RSTAK  BSS 11      RETURN STACK
01773 000000 RES    BSS 4       RESULT REGISTER
01777 000000 RSPTR  BSS 1     RETURN STACK POINTER
00356        RETN3  EQU 356B
00357        RETN2  EQU 357B
00365        RET2   EQU 365B
00373        ICNT   EQU 373B
00374        WBUFF  EQU 374B
00400        GPARM  EQU 400B
00405        XFAR1  EQU 405B
00412        RSULT  EQU 412B
00416        STORE  EQU 416B
00425        STOR1  EQU 425B
00444        XFAR2  EQU 444B
00450        STROP  EQU 450B
00456        SBPUD  EQU 456B
00461        SYMC2  EQU 461B
00463        SYMC1  EQU 463B
00464        SYMCK  EQU 464B
00504        COMCK  EQU 504B
00510        COMCE  EQU 510B
00513        LPCK   EQU 513B
00521        LPCKF  EQU 521B
00524        RPCK   EQU 524B
00534        RPCKE  EQU 534B
00535        FSCE2  EQU 535B
00537        STSRH  EQU 537B
00546        STEXP  EQU 546B
00553        BHSTP  EQU 553B
00561        MERR   EQU 561B
00561        FSCE4  EQU 561B
00563        SLWST  EQU 563B
00567        UNSTK  EQU 567B
00574        NEXTL  EQU 574B
00606        NEXT1  EQU 606B
00613        FPAGE  EQU 613B
00626        SAVBP  EQU 626B
00633        RESB1  EQU 633B
00640        RESBP  EQU 640B
00645        MINIT  EQU 645B
00651        INITS  EQU 651B
00664        LNUM   EQU 664B
00666        PGINT  EQU 666B
00676        INTCK  EQU 676B
00726        SYE25  EQU 726B
00730        GETAD  EQU 730B
00742        FND    EQU 742B
00750        DIGCK  EQU 750B
00752        LFTCK  EQU 752B
00753        LIMIT  EQU 753B
00771        GTOPP  EQU 771B
01007        NEXTA  EQU 1007B
01015        OBLNK  EQU 1015B
01016        ONEXT  EQU 1016B
01017        OUTCR  EQU 1017B
01041        GETCH  EQU 1041B
01053        GTMP   EQU 1053B
01055        GNEXT  EQU 1055B
01062        GFRST  EQU 1062B
01066        GETSK  EQU 1066B
01075        FNOPS  EQU 1075B
01121        MVTOH  EQU 1121B
01131        PGIN0  EQU 1131B
01140        LTR    EQU 1140B
01147        ENDS   EQU 1147B
01151        EOST   EQU 1151B
01152        NOEOF  EQU 1152B
01153        EOLCK  EQU 1153B
01156        CONST  EQU 1156B
01165        SYE12  EQU 1165B
01166        GSIGN  EQU 1166B
01201        TMPY   EQU 1201B
01217        FETCH  EQU 1217B
01225        LDEF   EQU 1225B
01254        ZONK   EQU 1254B
01256        CLAR2  EQU 1256B
01314        ODGIT  EQU 1314B
01317        SGNS   EQU 1317B
01330        .NPWR  EQU 1330B
01335        NPWRT  EQU 1335B
01337        NDWRT  EQU 1337B
01342        CRLF   EQU 1342B
01344        CRLF1  EQU 1344B
01351        TTY    EQU 1351B
01362        GTCON  EQU 1362B
01371        FIX    EQU 1371B
```

#01 9830A TAPE CASSETTE SYSTEM

```
                                   LST
*                CTAPE   3-20-72-9:30
       14000               ORG 140000
*
*  SYSTEM COMMAND TABLE
*
       14000 000003        ABS ESEC-*
       14001 051505 CMNDT  ASC 1,SE       SECURE, OPCODE 1
       14002 041761        OCT 41761      C, OPCODE
       14003 060730 ESEC   JSM GETAD      A=LNX1,B=LNX2
       14004 035647        STB TAP1       TEMPOR, LNX2 ADDR
       14005 025477        LDB TEMP4      LNX1 ADDR
       14006 015647 ESEC3  CPB TAP1         DONE ?
       14007 066016        JMP ESEC6
       14010 074517        LDA B,I
       14011 070410        SZA ESEC4       SKIP IF TYPING AID
       14012 072053        SAP *+1,S      SET BIT 15
       14013 074557        STA B,I        RESTORE LINE
       14014 061007        JSM NEXTA      NO, GET NEXT LINE
       14015 066006        JMP ESEC3
       14016 021435 ESEC6  LDA SECFL
       14017 040062        IOR FLGBT      SET BIT 15
       14020 031435        STA SECFL      CUSTOMER SECURING PROG
       14021 164174 ESEC4  JMP RDYDA,I        ET TO SYSTEM
*
*
       14022 000000        BSS 1              ********** C.S.***********
*
*
*     SUB-TABLE FOR STORE AND LOAD
*
*
       14023 041111 SUBT   ASC 1,BI       BIN OPCODE 24
       14024 047264        OCT 47264      N, OPCODE
       14025 045505        ASC 1,KE       KEY, OPCODE 20
       14026 054660        OCT 54660      Y, OPCODE
       14027 042101        ASC 2,DATA     DATA, OPCODE 21
       14030 052101
       14031 170400        OCT 170400     OPCODE, EOT
*
*
*     SYNTAX SERVICE SUBR
*
*
       14032 061055 SERV   JSM GNEXT
       14033 060456        JSM SBPUD
       14034 010031        CPA EOL        EOL ?
       14035 170402        RET
       14036 055706        DSZ SBPTR
       14037 055400        DSZ BADDR
       14040 160202        JSM FSCA,I     GEET NO. OR EXPRESSION
       14041 064357        JMP RETN2
*
*
*
*
*                          EXECUTION
*
*
*
*
*     ALOAD - ALL LOAD EXECT ENTRY
*
*
       14042 060771 ALOAD  JSM GTOPP      GET OPERAND
       14043 072510        RZA LOADP       SKIP IF OPERAND GIVEN
       14044 045472        ISZ TEMPS
       14045 121472        LDA TEMPS,I
       14046 013732        CPA DATOP       DATA OPCODE?
       14047 067172        JMP LDATA       YES
       14050 013733        CPA KEYOP      KEU OPCODE?
       14051 067315        JMP LKEY        YES
       14052 013734        CPA BINOP      BINARY OPCODE?
       14053 067421        JMP LBIN       YES
       14054 055472        DSZ TEMPS
*
*
*   LOADP - LOAD PROGRAM
*
*
       14055 062070 LOADP  JSM LOAD2
       14056 062102        JSM LOADB
       14057 060645        JSM MINIT       SRATCH SYMBOL TABLE
       14060 021660        LDA TAP7
       14061 062160        JSM LOAD3
       14062 021416 LOAD9  LDA MODE
       14063 070150        SZA *+3
       14064 060651        JSM INITS      RESET STACKS
       14065 164174        JMP RDYDA,I     KEYB-RET TOSYSTEM-DO NOT EXECUTE
       14066 021661        LDA TAP8        SEC LINE #
```

```
14067 164171        JMP RUNA,I
*
*
*
14070 062300 LOAD2 JSM SFLOC
14071 027745       LDB TAPAD     TEMPOR, ADDR
14072 021472 LO3   LDA TEMPS     STATEMENT POINTER
14073 011421       CPA PRADD     EOL FOLLOWS?
14074 170402       RET           YES, PROCESS
14075 045472       ISZ TEMPS     POINT TO LINE #
14076 121472       LDA TEMPS,I   LINE #
14077 074557       STA B,I       TAP7-TAP8, LINE #S
14100 045472       ISZ TEMPS
14101 077470       RIB LO3       LOOK FOR SECOND LINE #
*
*
*
14102 021661 LOAD8 LDA TAP8
14103 070110       SZA *+2
14104 066126       JMP LOAD7-2      LNX2 GIVEN
14105 021416       LDA MODE
14106 070110       SZA *+2       SKIP ON PROGRAM
14107 066130       JMP LOAD7     DO NOT EXECUTE
14110 121421       LDA PRADD,I   GET NEXT LINE #
14111 070072       SAM *+1,C      CLEAR SEC BIT
14112 025421       LDB PRADD
14113 015423       CPB PBPTR
14114 020056       LDA .1E4         10000
14115 070076       TCA
14116 001660       ADA TAP7      LNX1 - LINE # FOR START LOAD
14117 070213       SAP *+4       NEXT LINE OK
14120 021660       LDA TAP7       START AT FIRST LINE OF LOADED PROG.
14121 031661       STA TAP8      FOR START OF EXECUTION
14122 066126       JMP *+4
14123 021427       LDA .LNUM       PRESENT L.N.
14124 070070       SIA *+1
14125 031661       STA TAP8       START AT NEXT N+N+LINE
14126 070742       SAR 16
14127 031416       STA MODE       EXECUTE
14130 025421 LOAD7 LDB PRADD
14131 163756       JSM DCMIA,I        DECOMPILE
14132 021666       LDA ID80+2    FILE TYPE
14133 010020       CPA .3        SOURCE?
14134 066142       JMP *+6
14135 010036       CPA .23      SEC SOURCE ?
14136 066140       JMP *+2       YES
14137 067325       JMP ERR7      TYPE ERROR
14140 024106       LDB B777
14141 035435       STB SECFL     SET SECURE FLAG
14142 021424       LDA PBUFF
14143 011423       CPA PBPTR     NULL PROG?
14144 066151       JMP LO12       YES
14145 121424       LDA PBUFF,I   TYPING AID RESIDENT?
14146 072150       RZA LO12
14147 160205 ERR8  JSM AERRA,I   OVERLAY ERROR
14150 177701       DEC -63
14151 025660 LO12  LDB TAP7
14152 074210       SZB *+4      START LINE SPECIFIED ?
14153 025670       LDB ID80+4    YES, COMPUTE DIFF
14154 074076       TCB           BETWEEN SPECIFIED
14155 005660       ADB TAP7      AND ACTUAL LINE #
14156 035663       STB OFSET     TEMPOR
14157 170402       RET
*
*
*
14160 061075 LOAD3 JSM FNDPS     FIND ADDR OF START LINE
14161 066271       JMP LO6      L.N. BEYOND END OF PROGR
14162 066163       JMP *+1       L.N. BETWEEN PROGRAM LINES
14163 035650       STB TAP2    L. N.    EXACTLY FOUND - STORE START ADDR
14164 035477       STB TEMP4     SAVE FOR CLP1A
14165 025423       LDB PBPTR
14166 160251       JSM CLP1A,I        DEL FROM HERE TO END OF PROGR
*
*
*
14167 021671 LOAD4 LDA ID80+5     END LINE #
14170 001663       ADA OFSET
14171 000012       ADA .1
14172 060742       JSM FND      FIND ADDR OF END LINE
14173 015650       CPB TAP2     SAVE AS START ADDR
14174 066176       JMP *+2      YES
14175 066147       JMP ERR8     NO, OVERLAY
14176 035660       STB TAP7     TEMPOR
*
*    CHECK FOR LEGAL COMMON AND OVERFLOW
*          UPDATE POINTERS
*
14177 021672 COMON LDA ID80+6     LOADING COMMON?
14200 072210       RZA YCOMN
14201 021665       LDA ID80+1     NO COMMON
```

```
14202 160250          JSM OVCHA,I        UPDATE PROGRAM POINTERS
14203 066231          JMP KCOMN
14204 025660 YCOMN LDB TAP7        YES
14205 015424          CPB PBUFF       LOADING AT FIRST LINE?
14206 066210          JMP *+2         YES
14207 164330          JMP E30+3,I       NO, MISPLACED COM
14210 025422          LDB UKPTR
14211 076350          RZB COM1
14212 025405          LDB FWUP
14213 035424          STB PBUFF
14214 035426          STB PBPTO
14215 035423          STB PBPTR
14216 035476          STB TEMP3
14217 066221          JMP *+2
14220 070742 COM1  SAR 16          DO NOT ALLOCATE SPACE FOR COMMON
14221 001665          ADA IDB0+1      ADD PROGR SIZE TO COMMON SIZE
14222 160250          JSM OVCHA,I     CHECK OVERFLOW AND UPDATE POINTERS
14223 021422          LDA UKPTR
14224 072250          RZA KCOMN       SKIP IF KEY
14225 021424          LDA PBUFF
14226 001672          ADA IDB0+6      UPDATE PBUFF
14227 031424          STA PBUFF
14230 031660          STA TAP7        UPDATE LOAD ADDR
14231 061121 KCOMN JSM MVTOH       OPEN UP SPACE
*
*   LOAD THE FILE
*
14232 063105          JSM RRRID        REV READ HOF; READ IMMDT FILE ID
14233 021660          LDA TAP7          START ADDR
14234 025665          LDB IDB0+1      CURR FILE SIZE
14235 070037          ADB A           END ADDR
14236 062717          JSM TRD         READ FILE
14237 063031          JSM HALT
14240 070115          SEC *+2
14241 067100          JMP ERR4        CHECK SUM ERROR
*
*   ADD OFFSET TO ALL LINE NUMBER REFERENCES
*
14242 021423          LDA PBPTR
14243 031647          STA TAP1        SAVE END OF PROG POINTER
14244 021654          LDA TAP5
14245 031423          STA PBPTR       SET TO END OF LOADED AREA
14246 021653          LDA TAP4        POINTER TO START OF LOADED AREA
14247 160257          JSM FNDAA,I     FIND FIRST LINE /# REF
14250 066256          JMP L04
14251 001663          ADA OFSET       ADD OFFSET
14252 131472          STA TEMP5,I     RESTORE
14253 160260          JSM FND1A,I     FIND NEXT REF
14254 066256          JMP L04         END OF LOADED AREA
14255 066251          JMP *-4
*
*
*   ADD OFFSET TO ALL LINE NUMBERS LOADED
*
14256 025653 L04   LDB TAP4        POINT TO START OF LOADED AREA
14257 015423          CPB PBPTR       END OF LOADED AREA?
14260 066266          JMP L05         YES
14261 074517          LDA B,I         GET LOADED LINE NUMBER
14262 001663          ADA OFSET       ADD OFFSET
14263 074557          STA B,I         STORE NEW LINE #
14264 061007          JSM NEXTA       COMPUTE ADDR OF NEXT LINE
14265 066257          JMP L04+1
14266 025647 L05   LDB TAP1
14267 035423          STB PBPTR       RESTORE END OF PROGR POINTER
14270 170402          RET
*
*   APPEND
*
14271 035660 L06   STB TAP7         START ADDR
14272 025671          LDB IDB0+5         END LINE #
14273 005663          ADB OFSET
14274 004161          ADB MAXSN        FINAL LINE #
14275 074112          SHM *+2              EXCEED 9999?
14276 164273          JMP E5-1,I       YES
14277 066177          JMP COMON
*
*
*   SUBR FOR FILE LOCATING
*
*
14300 062457 SFLOC JSM UNITC
14301 021472          LDA TEMP5
14302 011421          CPA PRADD      END OF STATEMENT?
14303 066312          JMP SF2        YES, PROCESS
14304 062510          JSM FILEC      NO
14305 031644          STA TFILE
14306 074742          SBR 16
14307 035660          STB TAP7
14310 035661          STB TAP8
14311 067123          JMP LOCF2        LOC  FILE AND RET
14312 074742 SF2   SBR 16
```

```
#01  9830A TAPE CASSETTE SYSTEM

14313 035660        STB TAP7
14314 035661        STB TAP8
14315 035644        STB TFILE       FILE 0
14316 067123        JMP LOCF2

 ALSTOR - ALL STORE EXECUTION ENTRY

14317 060771 ASTOR JSM GTOPP      GET OPERAND
14320 072510       RZA STORP      SKIP IF OPERAND GIVEN
14321 045472       ISZ TEMPS
14322 121472       LDA TEMPS,I
14323 013732       CPA DATOP      DATA OPCODE?
14324 067216       JMP SDATA      YES
14325 013733       CPA KEYOP      KEY OPCODE?
14326 067403       JMP SKEY       YES
14327 013734       CPA BINOP      BINARY OPCODE?
14330 167755       JMP ERR0,I
14331 055472       DSZ TEMPS

   STORP - STORE PROGRAM

14332 062300 STORP JSM SFLOC
14333 062071       JSM L03-1
14334 063025       JSM WPERM
14335 025421       LDB PRADD
14336 163756       JSM DCMIA,I      DECOMPILE
14337 121424       LDA PBUFF,I
14340 070072       SAM *+1,C        ASSUME FIRST LINE #
14341 025660       LDB TAP7         FIRST LINE #
14342 074110       SZB *+2
14343 021660       LDA TAP7
14344 025661       LDB TAP8      SECOND LINE #
14345 076110       RZB *+2       SKIP IF GIVEN
14346 024056       LDB .1E4      ASSUME LAST LINE IN PROGRAM
14347 060730       JSM GETAD     GET ADDR LIMITS
14350 015477       CPB TEMP4
14351 067242       JMP ERR5         NULL PROGRAM
14352 121477       LDA TEMP4,I
14353 070072       SAM *+1,C
14354 031670       STA ID80+4        IN FILE ID
14355 021477       LDA TEMP4     START OF STORE AREA
14356 031472       STA TEMPS     LOW LIMIT
14357 031650       STA TAP2      LOW LIMIT
14360 035660       STB TAP7      HIGH LIMIT
14361 060602       JSM NEXT1-4
14362 001466       ADA LOCL1
14363 013746       CPA TCOM      IS IT COMMON ?
14364 066366       JMP *+2       YES
14365 066373       JMP *+6       NO
14366 025405       LDB FWUP      START OF USER AREA
14367 074076       TCB
14370 005424       ADB PBUFF     FIND SIZE OF COMMON
14371 035672       STB ID80+6    IN FILE ID BUFF
14372 066375       JMP *+3
14373 074742       SBR 16
14374 035672       STB ID80+6    ZERO COMMON
14375 025720       LDB LASTN     LAST LINE #
14376 035671       STB ID80+5    IN FILE ID BUFF
14377 025660       LDB TAP7      TEMPR, END ADDR
14400 021650       LDA TAP2      TEMPR, START ADDR
14401 063237       JSM SDAT2
14402 063463       JSM SECCK
14403 024020       LDB .3      UNSEC SOURCE
14404 070113       SAP *+2
14405 024036       LDB .23     SEC SOURCE
14406 035666       STB ID80+2
14407 067231       JMP SDAT3+2

 MERGE EXECUTION

14410 025472 MERGE LDB TEMPS
14411 004133       ADB M2        ADDR OF MERGE LINE
14412 074517       LDA B,I       MERGE LINE NO.
14413 070072       SAM *+1,C      CLEAR SEC BIT
14414 031630       STA TREGE        TEMPOR
14415 062070       JSM LOAD2
14416 021661       LDA TAP8
14417 072310       RZA L07-2     LNX2 GIVEN
14420 021416       LDA MODE
14421 072310       RZA L07     DO NOT EXECUTE
14422 021630       LDA TREGE
```

```
14423 000012        ADA .1        POINT TO NEXT LINE
14424 031661        STA TAPR      LINE FOR START EXECUTION
14425 070742        SAR 16
14426 031416        STA MODE      EXECUTE
14427 062130 LO7    JSM LOAD7
14430 060645        JSM MINIT
14431 021670        LDA IDB0+4    START L.N.
14432 001663        ADA OFSET
14433 061075        JSM FNDPS     FIND START ADDR
14434 066442        JMP MERG1
14435 066437        JMP *+2
14436 066147        JMP ERRA      OVERLAY ERROR
14437 035650        STB TAP2      SAVE ADDR
14440 062167        JSM LOAD4
14441 066062        JMP LOAD9
14442 062271 MERG1  JSM LO6
14443 066062        JMP LOAD9
*
*
      LINK  EXECUTION
*
*
14444 062070 LINK   JSM LOAD2
14445 062102        JSM LOADR
14446 021660        LDA TAP7
14447 062160        JSM LOAD3
14450 021416        LDA MODE
14451 070150        SZA *+3
14452 060651        JSM INITS      RESET STACKS
14453 164174        JMP RDYDA,I    KEYB-RET TO SYSTEM- DONOT EXECUTE
14454 021661        LDA TAPR       SEC LINE #
14455 031725        STA NXTST
14456 164004        JMP XECA,I
*
*
 UNIT NO CONFIGURATION
*
*
14457 060771 UNITC  JSM GTOPP          GET OPERAND
14460 072510        RZA F5         NO # PRESENT
14461 045472        ISZ TEMPS
14462 021472        LDA TEMPS
14463 011421        CPA PRADD
14464 066472        JMP F5
14465 121472        LDA TEMPS,I
14466 050065        AND UPMSK
14467 013742        CPA NUMS       IS IT #?
14470 066475        JMP GUNT       GET UNIT
14471 055472        DSZ TEMPS
14472 023735 F5     LDA B120K      ASSUME INTERNAL
14473 031645        STA TUNIT      UNIT TEMPOR
14474 170402        RET
14475 061217 GUNT   JSM FETCH      EVALUATE FORMULA
14476 160225        JSM FLTRA,I    CONVERT TO INTEGER
14477 164342 UOVF   JMP E40+3,I
14500 075752        SBM *-1
14501 074117        LDA B         SAVE UNIT IN A REG
14502 004142        ADB M11      UNIT<11 ?
14503 075613        SBP UOVF
14504 070204        SAL 12         POSITION UNIT NO.
14505 072110        RZA *+2
14506 066477        JMP UOVF
14507 066473        JMP F5+1
*
*
 FILE NO. CONFIGURATION
*
*
14510 061217 FILEC  JSM FETCH        EVALUATE FORMULA
14511 160225        JSM FLTRA,I    CONVERT TO INTEGER
14512 066514        JMP *+2
14513 074153        SBP *+3        RET ON POSITIVE
14514 160205 ERR1   JSM AERRA,I    WRONG FILE NO.
14515 177710        DEC -56
14516 074117        LDA B
14517 170402        RET            WITH FILE NO IN A REG
*
*
 FINDE - FIND EXECUTION
*
*
14520 062457 FINDE  JSM UNITC         GET UNIT NO.
14521 070542        SAR 12          POSITUON UNIT
14522 062554        JSM FITAS
14523 000012        ADA .1       FIG. TABLE ADDR OF SERV SUBR
14524 027744        LDB CASIN     CASST INTRPT SUBRT ADDR
14525 070577        STB A,I
14526 062510        JSM FILEC       GET FILE
14527 031644        STA TFILE
14530 063106 FIND3  JSM RIFS
```

#01 9830A TAPE CASSETTE SYSTEM

```
*
*
*
14531 025664 DIREC LDB FILEN        FILE NO.I FROM ID BUFF
14532 074076       TCB             MAKE FILE NO READ NEG.
14533 005644       ADB TFILE         FILE WANTED
14534 004132       ADB M1          SUBTR. ONE TO STOP FRONT OF CERRECT FILE
14535 062552       JSM FITA3
14536 070577       STB A,I         STORE FILE DIFF IN STATUS
14537 076210       RZB DI3
14540 063031       JSM HALT         FILE LOCATED
14541 173741 DI2   CLF 1          TURN ON INTERPT
14542 164172       JMP XEC4A,I           BACK TO SYSTEM
14543 074212 DI3   SBM *+4
14544 023747       LDA RCFF        READ CONTRL FORW FASR+T
14545 063033       JSM COUTP+1
14546 066541       JMP DI2
14547 023750       LDA RCRF        READ CONTRL REV FAST
14550 063033       JSM COUTP+1
14551 066541       JMP DI2
*
*   FITAS - FIG. INTRPT TABLE ADDR FOR STATUS
*
14552 021645 FITA3 LDA TUNIT
14553 070542       SAR 12
14554 000132 FITAS ADA M1
14555 070744       SAL 1
14556 003743       ADA ITRAS       INTRPT TABLE BASE
14557 170402       RET
*
*
*   ISERV - INTERRUPT SERVICE SUBR
*
*
14560 031444 ISERV STA SAVEA
14561 035445       STB SAVEB
14562 172700       SFC 0
14563 066611       JMP IS2         MUST BE STOP
14564 172241       LIA 1           INPUT INTERPT ADDRESSES
14565 070504       SAL 6
14566 070242       SAR 6           CLEAR 6 MSB
14567 072410       RZA ISE4
14570 023736       LDA KEYBD
14571 172160       OTA 16
14572 172741       STF 1
14573 172240       LIA 0
14574 070342       SAR 8
14575 031443       STA KEYFG
14576 066651       JMP RESTR
14577 074742 ISE4  SBR 16
14600 035446       STB IADDR        TEMPR INTRPT ADDR
14601 070006       RAR 1           POSITION NEXT H.P. BIT
14602 045446       ISZ IADDR       INCRM COUNT
14603 071713       SAP *-2         CONTINUE
14604 021446       LDA IADDR
14605 062554       JSM FITAS
14606 000012       ADA .1           FIG. TABLE ADDR OF SERV SUBR
14607 070537       LDB A,I
14610 074737       JMP B,I         GO TO SERVICE SUBR
14611 020040 IS2   LDA .31
14612 031442       STA STPFL
14613 020104       LDA B177
14614 031443       STA KEYFG
14615 021444 IS3   LDA SAVEA
14616 025445       LDB SAVEB
14617 170402       RET
*
*
*   IST0 - STATUS OF FIND COMMAND
*
*
*    POSITIVE FILE DIFF FOR FORW  AND NEG FOR REV DIRECTION
*
*
14620 021446 IST0  LDA IADDR
14621 070204       SAL 12           FIGURE SELECT CODE
14622 063003       JSM STAT+2      GET STATUS
14623 063027       JSM STACK       STATUS CHECK
14624 021446       LDA IADDR
14625 062554       JSM FITAS
14626 070537       LDB A,I          LOAD FILE STATUS
14627 074152       SBM *+3
14630 004132       ADB M1          ADD -1 FOR FORW DIRECTIN
14631 066633       JMP IST1
14632 004012       ADB .1          ADD +1 FOR REV DIRECTION
14633 070577 IST1  STB A,I           RESTORE UPDATED STATUS
14634 076110       RZB *+2
14635 067020       JMP INSTP         FILE LOCATED
14636 021446       LDA IADDR
14637 070204       SAL 12          FIG. SELECT. CODE
14640 074252       SBM *+5
```

```
      14641 043747        IOR RCFF       READ-CONTROL-FORW-FAST
      14642 063034        JSM COUTP+2
      14643 172741        STF 1
      14644 066650        JMP COINT      COMMAND OUTPUT .  INTRPT TURN ON
      14645 043750        IOR RCRF       READ-CONTROL-REV-FAST
      14646 063034        JSM COUTP+2
      14647 172741        STF 1          CLEAR CONTROL
*
*
*
*
*
      14650 063034 COINT  JSM COUTP+2
*
*
*       RESTORE REGISTERS
*
*
      14651 062615 RESTR  JSM IS3
      14652 173741        CLF 1
      14653 170402        RET
*
*
*  BASIC DATA WRITER
*
*
      14654 031653 TWR    STA TAP4       STORE LOW ADDRESS LIMIT
      14655 035654        STB TAP5       STORE THE HIGH LIMIT
      14656 021645 TWR1   LDA TUNIT      UNIT NO.
      14657 040116        IOR WDFS       WRITE DATA FORW SLOW
      14660 070075        SEC *+1,C      CLEAR E
      14661 074742 TWR4   SBR 16
      14662 035655        STB TAP6       CLEAR CHECK:SUM REG
      14663 025653        LDB TAP4       LOAD INITIAL POINTER VALUE
      14664 172501        SFS 1
      14665 066664        JMP *-1
      14666 172141        OTA 1
      14667 121653        LDA TAP4,I
      14670 066674        JMP NWL2
      14671 074517 NWL    LDA B,I        LOAD A TRANSFER WORD
      14672 172501 NWL1   SFS 1          SKIP IF READY
      14673 066672        JMP *-1
      14674 172140 NWL2   OTA 0          WRITE 8 BITS
      14675 073655        SEC NWL1,S     WRITE 8 MORE BITS IF E=0
      14676 001655        ADA TAP6       UPDATE CHECK-SUM
      14677 031655        STA TAP6
      14700 070075        SEC *+1,C      CLEAR E
      14701 015654        CPB TAP5       AREA TRANSFERRED?
      14702 066705        JMP COUT       YES, OUTPUT CHECK-SUM
      14703 077330        RIB NWL        WRITE MORE
      14704 066671        JMP NWL        JUMP IF B=0
      14705 021655 COUT   LDA TAP6       LOAD CHECK-SUM
      14706 172501        SFS 1
      14707 066706        JMP *-1
      14710 172140        OTA 0          OUTPUT 8 BITS
      14711 073655        SEC *-3,S
      14712 025442        LDB STOP
      14713 074150        SZB *+3
      14714 063031        JSM HALT
      14715 067016        JMP ERR3       IMPROPER STOP
      14716 170402        RET
*
*
*  BASIC DATA READER
*
*
      14717 031653 TRD    STA TAP4       STORE START OF BUFFER AREA
      14720 035654        STB TAP5       STORE THE HIGH LIMIT
      14721 021645 TRD1   LDA TUNIT      UNIT NO.
      14722 172141        OTA 1            READ DATA FORW SLOW
      14723 172601        STC 1          ENABLE CASST
      14724 070742        SAR 16
      14725 031655        STA TAP6       CLEAR CHECK SUM REG
      14726 021653        LDA TAP4       LOAD INITIAL POINTER VALUE
      14727 070075 TRL    SEC *+1,C      CLEAR ERROR FLAG
      14730 172501        SFS 1          SKIP IF DONE
      14731 066730        JMP *-1
      14732 176240        LIB 0          INPUT 8 BITS
      14733 073655        SEC *-3,S      GET NEXT 8 BBITS
      14734 011654        CPA TAP5       AREA TRANSFERED?
      14735 066742        JMP CHCK       YES, RETURN AFTER CHECKING RESULT
      14736 070577        STB A,I        STORE THE READ WORD
      14737 005655        ADB TAP6       UPDATE CHECK SUM WORD
      14740 035655        STB TAP6
      14741 073330        RIA TRL        READ MORE
      14742 015655 CHCK   CPB TAP6       CHECK-SUM OK?
      14743 070075        SEC *+1,C      CLEAR ERROR FLAG
      14744 172741        STF 1          TURN OFF CEO
      14745 170402        RET
*
*
```

#01 9830A TAPE CASSETTE SYSTEM

```
*  WRFIL - WRITE A FILE
*  THE FILE HAS BEEN LOCATED
*  BACK UP AND WRITE NEW ID AND FILE
*
 14746 063610 WRFIL JSM RRBOF
 14747 062776       JSM CSTOP
 14750 020121 WRF3  LDA RCFS       READ CONTRL FORW SLOW
 14751 063037       JSM BOFCK
 14752 017740       CPB MARK
 14753 066755       JMP *+2
 14754 066750       JMP WRF3       KEEP LOOKING
 14755 062656       JSM TWR1        WRITE ID
 14756 021650       LDA TAP2       START ADDR
 14757 025660       LDB TAP7       END ADDR
 14760 004132       ADB M1       ADJUST COUNTER FOR WRITE ROUTINE
 14761 062654       JSM TWR         WRITE FILE BODY
 14762 172501       SFS 1
 14763 066762       JMP *-1        WAIT
 14764 067031       JMP HALT
*
*
*  STATE - GET STATUS
*
*
 14765 063001 STATE JSM STAT
 14766 074406       RBR 9        POSITION POWER ON BIT
 14767 074153       SBP STAT5      CAST NOT ON OR NOT PRESENT
 14770 074046       RBR 2          POSITION CLR + OPEN DOOR BITS
 14771 074111       SLB *+2
 14772 067014 STAT5 JMP STAC3
 14773 074112       SBM *+2
 14774 066776       JMP *+2
 14775 064357       JMP RETN2      CLEAR LEADER
 14776 025442 CSTOP LDB STOP       CHECK STOP
 14777 074350       SZB STAT4
 15000 067606       JMP GBACK      STOP CASST + GO BACK TO SYSTM
*
*
*
 15001 021645 STAT  LDA TUNIT
 15002 172741       STF 1          TURN OFF INTERPT
 15003 172141       OTA 1          LOAD I/O REG WITH SELECT CODE
 15004 172741       STF 1          LOAD I/O REG WITH STATUS
 15005 176241       LIB 1          INPUT STATUS INFO
 15006 170402 STAT4 RET
*
*
*  STACK - STATUS CHECK
*
*
 15007 074506 STACK RBR 11      POSITION CLEAR LEADER + OPEN DOOR BITS
 15010 074112       SBM *+2     CHECK CLEAR LEADER
 15011 075651       SLB STAT4        CHECK OPEN DOOR
 15012 063020       JSM INSTP
 15013 067016       JMP ERR3
 15014 063031 STAC3 JSM HALT            STOP CASST
 15015 173741       CLF 1         TURN ON INTERPT
 15016 160205 ERR3  JSM AERRA,I
 15017 177706       DEC -58
*
*
*     INSTP - STOP FROM INTRPT ROUTINE
*
*
 15020 021446 INSTP LDA IADDR
 15021 070204       SAL 12         FIG. SEL CODE
 15022 040117       IOR STOPC
 15023 063034       JSM COUTP+2
 15024 066651       JMP RESTR
*
*
*  WPERM - IS WRITE PERMITTED?
*
*
 15025 063001 WPERM JSM STAT
 15026 074504       SBL 6          POSITION WRITE PERMIT
 15027 074353       SBP COUT1
 15030 067014       JMP STAC3           NOT PERMITTED
*
*
*        HALT SUBR
*
*
 15031 020117 HALT  LDA STOPC         CONSTANT
*
*
*  COMMAND OUTPUT
*
*  ENTRY: COMMAND CONSTANT IN A REG.
*
```

```
*
 15032 172741 COUTP STF 1        TURN OFF INTERPT
 15033 041645       IOR TUNIT
 15034 172141       OTA 1          OUTPUT COMMAND
 15035 172601       STC 1          ENABLE CAST
 15036 170402 COUT1 RET
*
*
  BOFCK - CHECK FOR BOF
*
*
 15037 063032 BOFCK JSM COUTP
 15040 172501       SFS 1
 15041 067046       JMP BSTP
 15042 176241       LIB 1        INPUT CONTRL CHAR
 15043 074404       SBL 8
 15044 074342       SBR 8        CLEAR B MSB
 15045 170402       RET
 15046 025442 BSTP  LDB STOP
 15047 075450       SZB BOFCK+1         WAIT FOR BOF
 15050 067606       JMP GBACK           STOP CASST + GO BACK TO SYSTEM
*
*
  RIFID - READ IMMDT FILE ID
*
*
 15051 063031 RIFID JSM HALT
 15052 062765       JSM STATE
 15053 067055       JMP *+2
 15054 063656       JSM OFFCL         GET OFF CLR LDR
 15055 020133 RIFI5 LDA M2
 15056 031643       STA TAP0
 15057 023751       LDA IDBA      ID BUFF ADDR
 15060 031653       STA TAP4
 15061 023753       LDA EOBID      END OF BUFF FOR ID
 15062 031654       STA TAP5
 15063 062776 RIF4  JSM CSTOP
 15064 020121       LDA RCFS       READ CONTRL FORW SLOW
 15065 063037       JSM BOFCK
 15066 017740       CPB MARK       BOF?
 15067 067073       JMP RD1        READ ID
 15070 062765       JSM STATE
 15071 067063       JMP RIF4
 15072 170402       RET          CLEAR LEADER
 15073 062721 RD1   JSM TRD1           READ FILE ID
 15074 070114       SES *+2        ERROR?
 15075 064357       JMP RETN2        NO
 15076 045643       ISZ TAP0
 15077 067103       JMP RIF6
 15100 063031 ERR4  JSM HALT
 15101 160205       JSM AERRA,I          CHECK SUM ERROR
 15102 177705       DEC -59
 15103 063610 RIF6  JSM RRBOF
 15104 067057       JMP RIFI5+2             TRY AGAIN
*
*
*
 15105 063610 RRRID JSM RRBOF      REV READ BOF
 15106 063051 RIFS  JSM RIFID        READ IMMDT FILE ID
 15107 067016       JMP ERR3       CLR LDR
 15110 170402       RET
*
*
*
  LOCF - LOCATE A FILE
*
 15111 045472 LOCF  ISZ TEMPS
 15112 121472       LDA TEMPS,I
 15113 050065       AND OPMSK
 15114 013742       CPA NUMS       IS IT  # ?
 15115 067120       JMP *+3
 15116 062472       JSM F5         ASSUME INTERNAL
 15117 067121       JMP *+2
 15120 062475       JSM GUNT       GET UNIT NO.
 15121 062510       JSM FILEC      GET FILE
 15122 031644       STA TFILE
 15123 063106 LOCF2 JSM RIFS
 15124 020133       LDA M2
 15125 031647       STA TAP1     FLAG FOR FILE LOCATION
 15126 025664 LOCF1 LDB FILEN    FILE NO. FROM ID BUFF
 15127 015644       CPB TFILE
 15130 067031 LOCF3 JMP HALT      FILE LOCATED, RET
 15131 074076       TCB          MAKE FIL NO. READ NEG.
 15132 005644       ADB TFILE       FILE WANTED
 15133 004132       ADB M1
 15134 035653       STB TAP4        SAVE DIFF
 15135 076110       RZB *+2
 15136 067162       JMP FVERF       FILE LOCATED
 15137 074153       SBP *+3
 15140 023750       LDA RCRF       READ CONTRL REV FAST
```

```
15141 067145       JMP GDIR-1
15142 074076       TCB              MAKE DIFF NEG.
15143 035653       STB TAP4
15144 023747       LDA RCFF         READ CONTRL FORW FAST
15145 031654       STA TAP5
15146 021654 GDIR  LDA TAP5
15147 062776       JSM CSTOP
15150 063037       JSM BOFCK
15151 017740       CPB MARK
15152 067156       JMP GDIR2
15153 062765       JSM STATE
15154 067146       JMP GDIR       LOK+OK FOR BOF
15155 067016       JMP ERR3        CLR LDR
15156 045653 GDIR2 ISZ TAP4
15157 067146       JMP GDIR         CONTINUE LOOKING
15160 020160       LDA DEL2              15.6 MS DELAY
15161 072030       RIA *
*
*
*
15162 063106 FVERF JSM RIFS        READ IMMDT FILE ID
15163 021644       LDA TFILE
15164 011664       CPA ID80
15165 067031       JMP HALT       FILE LOCATED. T+RETURN
15166 045647       ISZ TAP1
15167 067126       JMP LOCF1        TRY AGAIN
15170 063031       JSM HALT
15171 066514       JMP ERR1          FILE NOT FOUND
*
*
*  LDATA- LOAD DATA EXECUTION
*
*
15172 063111 LDATA JSM LOCF
15173 063256       JSM ARYLS
15174 025652       LDB TAP3         TEMPR. PRECISION
15175 015670       CPB ID80+4
15176 067201       JMP *+3          PRECISION OK
15177 160205 ERR6  JSM AERRA.I       WORNG PRECISION
15200 177703       DEC -61
15201 070056       CMA
15202 001665       ADA ID80+1         CHECK SIZE
15203 070112       SAM *+2
15204 067242       JMP ERR5
15205 063105       JSM RRRID        REV READ BOF; READ IMMDT FILE ID
15206 021650       LDA TAP2         POINT TOSTART OF LOAD AREA
15207 025665       LDB ID80+1       FILE SIZE
15210 070037       ADB A             POINT TO END OF LOAD AREA
15211 062717       JSM TRD         READ THE FILE
15212 063031       JSM HALT
15213 070115       SEC *+2
15214 067100       JMP ERR4         CHECK SUM FRROR
15215 067654       JMP SYSRF         SYSTEM RET
*
*
*          SDATA - STORE DATA
*
*
15216 063252 SDATA JSM ISTOR
15217 063256       JSM ARYLS
15220 025650       LDB TAP2          TEMPOR. ARRAY START ADDR
15221 070037       ADB A           COMPUTE END ADDR
15222 021652       LDA TAP3          TEMPOR. PRECISION
15223 031670       STA ID80+4         STORE IN ID TABLE
15224 035660       STB TAP7          TEMPOR. END ADDR
15225 021650       LDA TAP2
15226 063237       JSM SDAT2
*
*
*
15227 020017 SDAT3 LDA .2        TYPE = DATA
15230 031666       STA ID80+2          IN FILE ID BUFF
15231 023751       LDA IDBA         POINT TO REG. OF ID
15232 031653       STA TAP4
15233 023754       LDA EBIDW         POINT TO END OF ID
15234 031654       STA TAP5
15235 062746       JSM WRFIL        FRITE THE FILE
15236 067654       JMP SYSRF          SYSTEM RET
*
*      ENTER: AREG=START ADDR, BREG=END ADDR
*
15237 070076 SDAT2 TCA
15240 070037       ADB A            FIND FILE FIZE NEEDED
15241 076150       RZB *+3          SKIP IF NON-ZERO
15242 160205 ERR5  JSM AERRA.I      WRONG FILF SIZE
15243 177704       DEC -60
15244 075712       SBM *-2          ERROR IF NEG
15245 035665       STB ID80+1
15246 074076       TCB
15247 005667       ADB ID80+3         ABS FILF SIZE ON TAPE
```

```
15250 075512       SBM ERR5      SIZE ERROR
15251 170402       RET
*
*
*  ISTOR - INITLZ FOR STORE
*
*
15252 063111 ISTOR JSM LOCF
15253 063025       JSM WPERM
15254 023752       LDA IDB4A
15255 067647       JMP RE3-1      CLEAR 4 CENTER WORDS + RET
*
*
*ARYLS - DATA ARRAY CALCULATIONS
*
*
15256 021472 ARYLS LDA TEMPS
15257 011421       CPA PRADD     END OF STMT?
15260 067302       JMP ARCOM     YES, MUST BE COMMON
15261 060771       JSM GTOPP     NO, GET ARRAY NAME
15262 160177       JSM SSYMA,I   SEARCH SYMBOL TABLE
15263 164340       JMP E40+1,I      NOT FOUND
15264 074517       LDA B,I       READ NAME AND TYPE
15265 031661       STA TAP8      TEMPR
15266 050040       AND B37
15267 070042       SAP 2
15270 031652       STA TAP3      TEMPR, PRECISION
15271 004132       ADB M1
15272 074517       LDA B,I       GET ARRAY ADDR
15273 031650       STA TAP2
15274 000132       ADA M1
15275 070537       LDB A,I       READ CURR DIMENSION
15276 021661       LDA TAP8
15277 160240       JSM MDIMA,I   COMPUTE THE SIZE
15300 000133       ADA M2
15301 170402       RET
15302 020020 ARCOM LDA .3
15303 031652       STA TAP3      SET COMMON TYPE
15304 021405       LDA FWUP
15305 031650       STA TAP2      SET START ADDR
15306 070076       TCA
15307 025422       LDB UKPTR
15310 074150       SZB *+3       KEY?
15311 001425       ADA PBUFO     YES
15312 170402       RET
15313 001424       ADA PBUFF     COMPUTE SIZE OF COMMON
15314 170402       RET
*
*
*  LKEY - LOAD KEYS
*
*
15315 063111 LKEY  JSM LOCF
15316 025421       LDB PRADD
15317 163756       JSM DCM1A,I      DECOMPILE
15320 021666       LDA IDB0+2    FILE TYPE
15321 010021       CPA .4        KEY?
15322 067331       JMP *+7
15323 013741       CPA .24          SEC KEY ?
15324 067327       JMP *+3
15325 160205 ERR7  JSM AERRA,I   TYPE ERROR
15326 177702       DEC -62
15327 024106       LDB B777
15330 035435       STB SECFL     SET SEC FLAG
15331 021416       LDA MODE
15332 072350       RZA LKEY4     CALC MODE?
15333 021427       LDA .LNUM     NO
15334 070070       SIA *+1
15335 031661       STA TAP8       SAVE CURRENT LINE #+1
15336 021422       LDA UKPTR
15337 070110       SZA *+2       KEY MODE
15340 066147       JMP ERR8      YES, OVEPLAY ERROR
15341 061225 LKEY4 JSM LOEF      INSURE NOT IN KEY MODE
15342 021405       LDA FWUP
15343 070076       TCA
15344 000166       ADA FWAM      COMPUTE - CURR KEY SIZE
15345 001665       ADA IDB0+1    COMPUTE DIFFERENCE (NEW-OLD)
15346 072110       RZA *+2
15347 067371       JMP LKEY9
15350 070412       SAM LKEY5     NEW KEYS LARGER?
15351 160250       JSM OVCHA,I      YES CHECK FOR OVERFLOW
15352 021405       LDA FWUP
15353 031476       STA TEMP3     SET PROGRAM RELOCATION POINTER
15354 035470       STB L2T1
15355 061121       JSM MVTOH     MOVE MAINLINE AND COMMON
15356 025470       LDB L2T1
15357 067364       JMP LKEY6
15360 001405 LKEY5 ADA FWUP
15361 031477       STA TEMP4     COMPUTE NEW END OF KEYS
15362 025405       LDB FWUP
15363 160251       JSM CLP1A,I   CLOSE UP PROGRAM
```

#01 9830A TAPE CASSETTE SYSTEM

```
15364 021424 LKEY6 LDA PBUFF
15365 074017       ADA B
15366 031424       STA PBUFF      UPDATE START OF MAINLINE
15367 005405       ADB FWUP
15370 035405       STB FWUP         UPDATE END OF KEY AREA
15371 063105 LKEY9 JSM RRRID      REV READ BOF; READ IMMDT FIELD
15372 020166       LDA FWAM       START OF KEY AREA
15373 025665       LDB IDB0+1     FILE SIZE
15374 070037       ADB A          END OF KEY AREA
15375 062717       JSM TRD        READ THE FILE
15376 063031       JSM HALT
15377 070115       SEC *+2
15400 067100       JMP ERR4       CHECK SUM ERROR
15401 060651       JSM INITS      RESET STACKS
15402 066062       JMP LOAD9
*
*
* SKEY - STORE KEYS
*
*
15403 063252 SKEY  JSM ISTOR
15404 025421       LDB PRADD
15405 163756       JSM DCM1A,I
15406 063463       JSM SECCK
15407 024021       LDB .4         UNSEC KEY
15410 070113       SAP *+2
15411 027741       LDB .24         SEC KEY
15412 035666       STB IDB0+2     INFILE ID BUFF
15413 020166       LDA FWAM       START OF KEY AREA
15414 031650       STA TAP2       TEMPOR
15415 025405       LDB FWUP       END OF KEY AREA+1
15416 035660       STB TAP7       END OF KEY AREA
15417 063237       JSM SDAT2
15420 067231       JMP SDAT3+2
*
*
*     LBIN - LOAD BINARY
*
*
15421 063111 LBIN  JSM LOCF
15422 021403       LDA MAW        POINTER
15423 025665       LDB IDB0+1     FILE SIZE
15424 074076       TCB
15425 074017       ADA B         FIG. MEMORY START ADDR
15426 070137       LDB A        SAVE A
15427 070076       TCA
15430 001426       ADA PBPTO      POINTER
15431 070112       SAM *+2
15432 064561       JMP MERR       OVERFLOW
15433 021666       LDA IDB0+2     FILE TYPE
15434 010012       CPA .1         BINARY?
15435 067443       JMP LBI2        YES , UNSEC
15436 010034       CPA .21         SEC BIN ?
15437 067441       JMP *+2
15440 067325       JMP ERR7
15441 020106       LDA B777
15442 031435       STA SECFL      SET SEC FLAG
15443 021427 LBI2  LDA .LNUM       PRESENT L.N.
15444 070070       SIA *+1
15445 031661       STA TAP8
15446 076070       RIB *+1
15447 035404       STB LWAM        POINTER
15450 063105       JSM RRRID      REV READ BOF; READ IMMDT FILE ID
15451 021404       LDA LWAM
15452 025665       LDB IDB0+1     FILE SIZE
15453 070037       ADB A          END OF BIN
15454 062717       JSM TRD        READ THE FILE
15455 063031       JSM HALT
15456 070115       SEC *+2
15457 067100       JMP ERR4       CHECK SUM ERROR
15460 055404       DSZ LWAM
15461 060645       JSM MINIT      SCRATCH SYMBOL TABLE
15462 066062       JMP LOAD9
*
*
*     SECCK - SECURE CHECK
*
*
15463 021435 SECCK LDA SECFL
15464 050106       AND B777
15465 070150       SZA *+3
15466 160205       JSM AERRA,I        SEC NOT ALLOWED
15467 177707       DEC -57
15470 021435       LDA SECFL      RET WITH SEC FLG IN A
15471 170402       RET
*
*
*    WRZE - WRITE ZEROS
*
*
```

#01 9830A TAPE CASSETTE SYSTEM

```
15472 024013 WRZE  LDB B400
15473 074744       SBL 1        CONVERT WORD COUNT TO CH. COUNT
15474 074076       TCB          NEG. COUNT
15475 021645       LDA TUNIT
15476 040116       IOR WDFS      WRITE DATA FORW SLOW
15477 172501       SFS 1
15500 067477       JMP *-1
15501 172141       OTA 1
15502 070742 WRZE1 SAR 16
15503 172501       SFS 1
15504 067503       JMP *-1
15505 172140       OTA 0
15506 077630       RIB WRZE1
15507 170402       RET
*
*
* MARKE - MARK TAPE EXECUTION
*
*
15510 062457 MARKE JSM UNITC      GET UNIT NO.
15511 063025       JSM WPERM
15512 062765       JSM STATE     GET STATUS
15513 067631       JMP MAR3       NO CLEAR LEADER
15514 063524       JSM MAR4
15515 063656 MAR2  JSM OFFCL     GET OFF CLEAR LEADER
15516 020116       LDA WDFS      WRITE - DATA - FORW - SLOW
15517 063032       JSM COUTP     COMMAND OUTPUT
15520 063472       JSM WRZE       WRITE 256 WORDS OF 0
15521 172501       SFS 1
15522 067521       JMP *-1      STILL WRITING
15523 067547       JMP MCONT
*
*
*
15524 062510 MAR4  JSM FILEC     GET NO. OF FILES TO BE MARKED
15525 000012       ADA .1         WRITE N+1 FILES
15526 070076       TCA            MAKE FILE COUNT NEG.
15527 031644       STA TFILE
15530 062510       JSM FILEC      GET LENGTH OF FILE
15531 031653       STA TAP4       ABS SIZE
15532 070137       LDB A
15533 074002       SBR 1          FIND LENGTH/2
15534 000135       ADA M4
15535 070113       SAP *+2
15536 066514       JMP ERR1       FILE TOO SMALL
15537 021653       LDA TAP4
15540 074017       ADA B
15541 000045       ADA .40          40 WORDS ADDITIONAL BUFF
15542 031657       STA TLENG      LENGTH TEMPOR
15543 063644       JSM IDCLR
15544 021653       LCA TAP4         ABS SIZE
15545 031667       STA IDB0+3
15546 170402       RET
*
*
*
15547 023730 MCONT LDA WCFS       WRITE -CONTROL -FORW-SLOW
15550 041645       IOR TUNIT
15551 172141       OTA 1
15552 172601       STC 1         ENABLE CASRT
15553 023751 MCON2 LDA IDBA        POINTER TO BEGIN OF ID
15554 027754       LDB EBIDW        POINT TO END OF ID
15555 062654       JSM TWR         WRITE THE FILE ID
15556 025657       LDB TLENG       LOAD ACTUAL FILE LENGTH
15557 063473       JSM WRZE+1        WRITE THE FILE
15560 172501       SFS 1
15561 067560       JMP *-1          WAIT . IF STILL WRITING
15562 172741       STF 1
15563 172241       LIA 1             INPUT STATUS
15564 050122       AND B6K           ISOLATE OPEN DOOR+CLR LLR
15565 070610       SZA MC2             SKIP IF OK
15566 070506       RAR 11            POSITION STATUS BITS
15567 070151       SLA *+3
15570 063031 ER3   JSM HALT
15571 067016       JMP ERR3
15572 020107 MC3   LDA RDRS      READ DAR+TA REV SLOW
15573 063657       JSM OFFCL+1       GET OFF CLEAR LEADER-EOT
15574 063610       JSM RRBOF
15575 063472       JSM WRZE          ERASE LAST BOF
15576 172501       SFS 1
15577 067576       JMP *-1           WAIT IF STILL WRITING
15600 063652       JSM REWND+1     GIVE COMMAND AND RETURN TO SYSTEM
15601 045664 MC2   ISZ IDB0        INCRM FILE NO.
15602 045644       ISZ TFILF       INCRM FILF COUNTER
15603 067547       JMP MCONT       CONTINUE
15604 024151       LDB M32
15605 063611       JSM RRBOF+1         BYPASS 32 CH. + REV. READ BOF
15606 063031 GRACK JSM HALT
15607 067654       JMP SYSRE          SYSTEM RET
*
*
```

*01 9830A TAPE CASSETTE SYSTEM

```
*  RRBOF - REVERS READ BOF
*
*
 15610 024146 RRBOF LDB MIS
 15611 020107       LDA RDRS     READ-DATA-REV-SLOW
 15612 063032       JSM COUTP
 15613 172501       SFS 1
 15614 067613       JMP *-1
 15615 172240       LIA 0
 15616 077670       RIB *-3
 15617 023731       LDA RCRS     READ-CONTRL-REV-SLOW
 15620 063037       JSM BOFCK
 15621 017740       CPB MARK      BOF?
 15622 067626       JMP DEL65
 15623 062765       JSM STATE     GET STATUS
 15624 067610       JMP RRBOF     KEEP LOOKING
 15625 067016       JMP ERR3     BOT - CLR LDR
 15626 023737 DEL65 LDA DEL1          75 MS DELAY
 15627 072030       RIA *
 15630 170402       RET
*
*
*
 15631 063106 MAR3  JSM RIFS        READ IMMDT FILE ID
 15632 063610       JSM RRBOF     REV. READ BOF
 15633 025664       LDB ID80      SAVE LAST FILE NO.
 15634 035643       STB TAP0       TEMPOR
 15635 063524       JSM MAR4
 15636 025643       LDB TAP0
 15637 035664       STB ID80
 15640 020121       LDA RCFS     READ CONTROL FORW SLOWW
 15641 063037       JSM BOFCK
 15642 017740       CPB MARK      BOF ?
 15643 067553       JMP MCON2      WRITE MORE FILES
*
*
*  IDCLR - CLEAR ID BUFF
*
*
 15644 023751 IDCLR LDA IDBA
 15645 170000       CLR          CLEAR FILE NO. - ABS SIZE
 15646 000021       ADA .4
 15647 170000       CLR       CLEAR STARTING LN + 3 WORDS
 15650 170402 RE3   RET
*
*
*  REWND - GIVE COMMAND AND RETURN TO SYSTEM
*
*
 15651 062457 REWND JSM UNITC     GET UNIT NO.
 15652 020110       LDA RDRF      READ-DATA-REV-FAST
 15653 063032       JSM COUTP
 15654 173741 SYSRE CLF 1        TURN ON INTRPT
 15655 164172       JMP XEC4A,I   RETURN TO SYSTEM
*
*
*  OFFCL - GET OFF CLEAR LEADER
*
*
 15656 020003 OFFCL LDA RDFS    READ DATA FORW SLOW
 15657 024124       LDB DLCNT    DELAY COUNT
 15660 035652       STB TAP3      TEMPR
 15661 063032       JSM COUTP     COMMAND OUTPUT
 15662 063001 OF1   JSM STAT    GET STATUS
 15663 074544       SBL 5         POSITION CLEAR LEADER BIT
 15664 075213       SBP RE3
 15665 045652       ISZ TAP3      INCRM DELAY
 15666 067662       JMP OF1       WAIT
 15667 067016       JMP ERR3      MUST BE EOT
*
*
*  LISTF - TAPE LIST EXECUTION
*
*
 15670 062457 LISTE JSM UNITC
 15671 063106       JSM RIFS
 15672 061344       JSM CRLF1
 15673 063031 LI2   JSM HALT
 15674 025664       LDB ID80
 15675 063720       JSM PRIN      PRINT FILE NO.
 15676 025666       LDB ID80+2
 15677 063720       JSM PRIN      FILE TYPE
 15700 025667       LDB ID80+3
 15701 063720       JSM PRIN      RPINT ABS FILE SIZE
 15702 025665       LDB ID80+1
 15703 063720       JSM PRIN      CUR SIZE
 15704 025670       LDB ID80+4
 15705 063720       JSM PRIN      START LINE NO.
 15706 025671       LDB ID80+5
 15707 063720       JSM PRIN      END LINE NO.
```

```
15710 025672        LDB IDB0+6
15711 063720        JSM PRIN        NO. OF WORDS IN COMON
15712 061344        JSM CRLF1
15713 160170        JSM CLERA,I
15714 031453        STA PRFLG          CL. FLAG FO CRLF
15715 063055        JSM RIFI5
15716 067652        JMP REWND+1          RET TO SYSTEM + REWIND
15717 067673        JMP LI2            CONTINUE LIST
15720 035647 PRIN   STB TAP1
15721 160170        JSM CLERA,I     CLEAR SINGLE LINE BUFF
15722 025647        LDB TAP1
15723 045400        ISZ BADDR
15724 160210        JSM OUTIA,I     MAKE ASCII AND STORE
15725 020022        LDA CCNT        CHARACTER COUNT
15726 024212        LDB .SLBF       POINT TO FIRST CHAR.
15727 065337        JMP NOWPT       PRINT
*
*
*
*
*
*
*
*  DEFINITIONS
*
*
00003               RDFS  EQU C6            ZERO
15730 006074 WCFS   OCT 6074
15731 005000 RCRS   OCT 5000
00110               RDRF  EQU B1400
00107               RDRS  EQU B1000
01657               TLENG EQU 1657B
00124               DLCNT EQU EXPOP              32000B
15732 077040 DATOP  OCT 77040
15733 077000 KEYOP  OCT 77000
15734 077200 BINOP  OCT 77200
15735 120000 B120K  OCT 120000
15736 140000 KEYBD  OCT 140000
00004               XECA  EQU B10K
00160               B176K EQU M1024
15737 166272 DEL1   DEC -4934
00160               DEL2  EQU M1024
15740 000074 MARK   OCT 74
15741 000030 .24    DEC 24
00022               CCNT  EQU .5
15742 040000 NUMS   OCT 40000
01645               TUNIT EQU 1645B
01644               TFILE EQU 1644B
01446               IADDR EQU AURSS
15743 040400 ITBAS  DEF 44400B
01643               TAP0  EQU 1643B
01647               TAP1  EQU 1647B
01650               TAP2  EQU 1650B
15744 014620 CASIN  DEF IST0
01664               FILEN EQU 1664B
01652               TAP3  EQU 1652B
01653               TAP4  EQU 1653B
01654               TAP5  EQU 1654B
01655               TAP6  EQU 1655B
01660               TAP7  EQU 1660B
01661               TAP8  EQU 1661B
15745 001660 TAPAD  DEF 1660B
15746 011775 TCOM   OCT 11775
01435               SECFL EQU SEC
01663               OFSET EQU 1663B
15747 004400 RCFF   OCT 4400
00121               RCFS  EQU B4000
15750 005400 RCRF   OCT 5400
15751 001664 IDBA   DEF 1664B
01664               IDB0  EQU 1664B
15752 001670 IDB4A  DEF 1670B
15753 001700 EOBID  DEF 1700B
15754 001677 EBIDW  DEF 1677B        END OF ID BUFF FOR WRITE
00116               WDFS  EQU QTOP
00013               RDFF  EQU B400
00245               GETSA EQU GTSTA
01442               STOP  EQU STPFL
00117               STOPC EQU B2400
15755 016747 ERR0   DEF ERROR
15756 005717 DCM1A  DEF 5717B
*
*  TABLE LINKS
*
15762               ORG 15762B
15762 176462        ABS LINK-*
15763 176334        ABS ASTOR-*
15764 176534        ABS FINDE-*
15765 177703        ABS LISTE-*
15766 177663        ABS REWND-*
15767 177521        ABS MARKE-*
```

#01 9830A TAPE CASSETTE SYSTEM

```
15770 176052          ABS ALOAD-*
15771 176417          ABS MERGE-*
15772 000000          BSS 1                         ******* CHECK SUM ***********
15773 176030          ABS SUBT-*
15774 162111          ABS B377-*
15775 176004          ABS CMNDT-*
15776 000630          ABS SNMT-*
15777 014000          OCT 14000
*
*
*     SYNTAX
*
16615                 ORG 16615B
*  SYNTAX JUMP TABLE
16615 000041          ABS MLOST-*
16616 000064          ABS ELOST-*
16617 000051          ABS FIMAR-*
16620 000124          ABS REWLT-*
16621 000123          ABS REWLT-*
16622 000046          ABS FIMAR-*
16623 000057          ABS ELOST-*
16624 000032          ABS MLOST-*
16625 000031 B31     OCT 31
*  SYNTAX TABLE
16626 043111 SNMT    ASC 2,FIND       FIND, OPCODE 7
16627 047104
16630 123522          OCT 123522       OPCODE, R
16631 042527          ASC 2,EWIN       REWIND, OPCODE 5
16632 044516
16633 042245          OCT 42245        D,OPCODE
16634 046505          ASC 2,MERG       MERGE, OPCODE 2
16635 051107
16636 042642          OCT 42642        E,OPCODE
16637 051524          ASC 2,STOR            STORE,  OPCODE 10
16640 047522
16641 042650          OCT 42650           E, OPCODE
16642 046117          ASC 2,LOAD       LOAD OPCODE 3
16643 040504
16644 121515          OCT 121515       OPCODE, M
16645 040522          ASC 1,AR         MARK, OPCODE 4
16646 045644          OCT 45644        K, OPCODE
16647 052114          ASC 2,TLIS       TLIST, OPCODE 6
16650 044523
16651 052246          OCT 52246           T, OPCODE
16652 046111          ASC 2,LINK          LINK ,  OPCODE 11
16653 047113
16654 164400          OCT 164400          OPCODE, ET
*
*
*  MERGE, LOAD, STORE SYNTAX CHECK
*
*
16655 062764 ML      JSM UNIT1        DECRM POINTERS
16656 062751 MLOST   JSM UNIT
16657 066661          JMP MA           NO UNIT GIVEN
16660 062770          JSM COMEL        COMA? NO, EOL
16661 162773 MA      JSM SERVA,I
16662 065153          JMP EOLCK        0+EOL? ACCEPT
16663 062770          JSM COMEL        FILE NO. GIVEN
16664 060664          JSM LNUM          GET LINE #1
16665 062770          JSM COMEL
16666 060664          JSM LNUM            GET LINE #2
16667 065151          JMP EOST
*
*
*  FIND AND MARK SYNTAX CHECK
*
*
16670 062751 FIMAR   JSM UNIT
16671 066673          JMP AA           NO UNIT GIVEN
16672 060510          JSM COMCE        COMA? NO, ERROR
16673 160202 AA      JSM FSCA,I       GET FILE
16674 025473          LDB TEMP
16675 014024          CPB .7           FIND?
16676 065151          JMP EOST         ACCEPT STATEMENT
16677 060510          JSM COMCE
16700 160202          JSM FSCA,I
16701 065151          JMP EOST
*
*
*  ENTRY FOR ALL LOAD AND STORE
*
*
16702 021466 ELOST   LDA LOCL1
16703 050040          AND B37
16704 031473          STA TEMP         TEMPOR, OPCODE
16705 060456          JSM SBPUD        INCRM POINTER SBPTR
16706 061055          JSM GNEXT        GET NEXT CHARACTER
16707 026774          LDB SUBTA        ADDR OF SUB-TABLE
16710 060546          JSM STEXP
```

```
     *01  9830A TAPE CASSETTE SYSTEM

1948  16711 066655        JMP ML         LOAD, STORE
1949  16712 070202        SAR 5          POSITION KEY OR DATA OPCODE
1950  16713 050040        AND B37
1951  16714 001473        ADA TEMP       FIGURE EXACT OPCODE
1952  16715 031473        STA TEMP
1953*
1954*
1955*     LOADK,STOREK,LOADD,STORED,LOADB,STOREB,SYNTAX CHECK
1956*
1957*
1958  16716 062754        JSM UNIT2
1959  16717 066741        JMP LA         NO UNIT GIVEN
1960  16720 060510        JSM COMCE      COMA? NO, ERROR
1961  16721 162773 LA1    JSM SERVA,I
1962  16722 066747        JMP ERROR      EOL AFTER COMA
1963  16723 025473        LDB TEMP
1964  16724 016625        CPB B31          STORE DATA ?
1965  16725 066731        JMP *+4        YES
1966  16726 016775        CPB BB24        LOAD DATA ?
1967  16727 066731        JMP *+2        YES
1968  16730 065151        JMP EOST       DEMAND EOL
1969  16731 062770        JSM COMEL      COMA? NO, EOL
1970  16732 061140        JSM LTR        CHECK FOR ARRAY
1971  16733 066747        JMP ERROR
1972  16734 021474        LDA TEMP1      LETTER: LOAD VARIABLE NAME
1973  16735 024020        LDB .3         ASSUME ARRAY
1974  16736 060451        JSM STROP+1    PUT IN MEMORY
1975  16737 021475        LDA TEMP2      LOAD FOLLOWING CHARACTER
1976  16740 065151        JMP EOST
1977  16741 070742 LA     SAR 16
1978  16742 060456        JSM SBPUD
1979  16743 066721        JMP LA1
1980*
1981*
1982*  REWIND AND TLIST SYNTAX CHECK
1983*
1984*
1985  16744 062751 REWLI  JSM UNIT
1986  16745 065147        JMP ENDS
1987  16746 065151        JMP EOST       ACCEPT STATEMENT
1988  16747 160205 ERROR  JSM AERRA,I
1989  16750 177711        DEC -55
1990*
1991*
1992*   UNIT SYNTAX CHECK
1993*
1994*
1995  16751 021466 UNIT   LDA LOCL1
1996  16752 050040        AND B37        RECALL OPCODE
1997  16753 031473        STA TEMP       OPCODE TEMPORARY
1998  16754 060456 UNIT2  JSM SBPUD      GET NEW SYNTAX WORD
1999  16755 061055        JSM GNEXT      GET NEW CHARACTER
2000  16756 060463        JSM SYMC1      CHECK FOR #
2001  16757 012017       OCT 12017
2002  16760 066764        JMP UNIT1      NO
2003  16761 066762        JMP FS         YES
2004  16762 160202 FS     JSM FSCA,I     GET UNIT
2005  16763 064357        JMP RETN2
2006  16764 055706 UNIT1  DSZ SBPTR
2007  16765 055400        DSZ BADDR
2008  16766 170402        RET
2009*
2010*
2011*  COMA-EOL CHECK
2012*
2013*
2014  16767 061055 COMA   JSM GNEXT
2015  16770 060504 COMEL  JSM COMCK      COMA?
2016  16771 065151        JMP EOST       NO
2017  16772 170402        RET
2018*
2019*     DEFINITIONS
2020*
2021  16773 014032 SERVA  DEF SERV
2022  16774 030046 SUBTA  DEF SUBT+SUBT
2023  16775 000024 BB24   OCT 24
2024                      END
*  NO ERRORS*
```

CROSS-REFERENCE TABLE

| | | | | | | | | |
|---|---|---|---|---|---|---|---|---|
| .1 | 0026 | 0677 | 0871 | 0955 | 1017 | 1045 | 1554 | 1629 |
| .10 | 0077 | 0078 | | | | | | |
| .100 | 0076 | | | | | | | |
| .1000 | 0075 | | | | | | | |
| .11 | 0041 | 0049 | | | | | | |
| .12 | 0042 | | | | | | | |
| .13 | 0045 | | | | | | | |

CROSS-REFERENCE TABLE

| | | | | | | | | | | | |
|---|---|---|---|---|---|---|---|---|---|---|---|
| .15 | 0054 | 0089 | | | | | | | | | |
| .16 | 0055 | 0090 | | | | | | | | | |
| .1F4 | 0074 | 0626 | 0821 | | | | | | | | |
| .2 | 0033 | 1393 | | | | | | | | | |
| .21 | 0056 | 1556 | | | | | | | | | |
| .22 | 0057 | 0093 | | | | | | | | | |
| .23 | 0058 | 0094 | 0643 | 0852 | | | | | | | |
| .24 | 1818 | 1471 | 1530 | | | | | | | | |
| .28 | 0059 | | | | | | | | | | |
| .3 | 0034 | 0051 | 0641 | 0850 | 1449 | 1973 | | | | | |
| .31 | 0060 | 0096 | 1020 | | | | | | | | |
| .32 | 0061 | | | | | | | | | | |
| .33 | 0062 | | | | | | | | | | |
| .34 | 0063 | 0097 | | | | | | | | | |
| .37 | 0064 | | | | | | | | | | |
| .4 | 0035 | 1469 | 1528 | 1726 | | | | | | | |
| .40 | 0065 | 1641 | | | | | | | | | |
| .41 | 0066 | | | | | | | | | | |
| .43 | 0067 | | | | | | | | | | |
| .45 | 0068 | | | | | | | | | | |
| .46 | 0069 | | | | | | | | | | |
| .48 | 0070 | | | | | | | | | | |
| .5 | 0036 | 1819 | | | | | | | | | |
| .58 | 0071 | 0100 | | | | | | | | | |
| .6 | 0037 | 0050 | | | | | | | | | |
| .63 | 0072 | | | | | | | | | | |
| .7 | 0038 | 1931 | | | | | | | | | |
| .8 | 0039 | | | | | | | | | | |
| .9 | 0040 | | | | | | | | | | |
| .99 | 0080 | | | | | | | | | | |
| .BUFA | 0186 | | | | | | | | | | |
| .FADA | 0191 | | | | | | | | | | |
| .FDVA | 0194 | | | | | | | | | | |
| .FMPA | 0193 | | | | | | | | | | |
| .FSBA | 0192 | | | | | | | | | | |
| .FSR | 0196 | | | | | | | | | | |
| .LNUM | 0320 | 0633 | 1479 | 1561 | | | | | | | |
| .NPWR | 0500 | | | | | | | | | | |
| .SLBF | 0187 | 1789 | | | | | | | | | |
| A | 0000 | 0720 | 0957 | 0969 | 1018 | 1041 | 1046 | 1133 | 1370 | 1384 | 1405 |
| | 1444 | 1512 | 1548 | 1569 | 1634 | | | | | | |
| AA | 1929 | 1927 | | | | | | | | | |
| ACTSA | 0180 | | | | | | | | | | |
| ADRSS | 0333 | 1823 | | | | | | | | | |
| AERRA | 0182 | 0653 | 0943 | 1200 | 1283 | 1361 | 1407 | 1473 | 1585 | 1988 | |
| ALOAD | 0573 | 1865 | | | | | | | | | |
| AR1 | 0419 | 0188 | | | | | | | | | |
| AR1A | 0188 | | | | | | | | | | |
| AR2 | 0421 | 0189 | | | | | | | | | |
| AR2A | 0189 | | | | | | | | | | |
| ARCOM | 1449 | 1431 | | | | | | | | | |
| ARYAD | 0409 | | | | | | | | | | |
| ARYLS | 1429 | 1357 | 1382 | | | | | | | | |
| ASTOR | 0793 | 1860 | | | | | | | | | |
| B | 0000 | 0524 | 0527 | 0610 | 0747 | 0749 | 0862 | 0927 | 0945 | 1019 | 1091 |
| | 1435 | 1441 | 1505 | 1547 | 1640 | | | | | | |
| B100 | 0101 | | | | | | | | | | |
| B1000 | 0108 | 1805 | | | | | | | | | |
| B10K | 0120 | 0121 | 1813 | | | | | | | | |
| B120K | 1811 | 0920 | | | | | | | | | |
| B12K | 0122 | 0123 | 0212 | | | | | | | | |
| B133 | 0102 | | | | | | | | | | |
| B140 | 0103 | | | | | | | | | | |
| B1400 | 0109 | 0210 | 1804 | | | | | | | | |
| B17 | 0089 | | | | | | | | | | |
| B170K | 0127 | | | | | | | | | | |
| B1740 | 0110 | 0209 | | | | | | | | | |
| B1760 | 0111 | 0164 | | | | | | | | | |
| B176K | 1814 | | | | | | | | | | |
| B177 | 0104 | 1022 | | | | | | | | | |
| B1774 | 0112 | | | | | | | | | | |
| B1775 | 0113 | | | | | | | | | | |
| B1777 | 0114 | | | | | | | | | | |
| B20 | 0090 | | | | | | | | | | |
| B22 | 0091 | | | | | | | | | | |
| B23 | 0092 | | | | | | | | | | |
| B2400 | 0116 | 1852 | | | | | | | | | |
| B26 | 0093 | | | | | | | | | | |
| B27 | 0094 | | | | | | | | | | |
| B3000 | 0117 | | | | | | | | | | |
| B31 | 1887 | 1964 | | | | | | | | | |
| B36 | 0095 | | | | | | | | | | |
| B37 | 0096 | 1437 | 1942 | 1950 | 1996 | | | | | | |
| B377 | 0105 | 1869 | | | | | | | | | |
| B400 | 0106 | 1594 | 1849 | | | | | | | | |
| B4000 | 0118 | 0168 | 1841 | | | | | | | | |
| B42 | 0097 | | | | | | | | | | |
| B44 | 0098 | | | | | | | | | | |
| B52 | 0099 | | | | | | | | | | |
| B6K | 0119 | 0173 | 1663 | | | | | | | | |

CROSS-REFERENCE TABLE

| | | | | | | | | | | | |
|---|---|---|---|---|---|---|---|---|---|---|---|
| B72 | 0100 | | | | | | | | | | |
| B777 | 0107 | 0646 | 1475 | 1559 | 1583 | | | | | | |
| BADDR | 0297 | 0558 | 1786 | 2007 | | | | | | | |
| BADRP | 0210 | | | | | | | | | | |
| BB24 | 2023 | 1966 | | | | | | | | | |
| BEND | 0204 | 0205 | | | | | | | | | |
| BHSTP | 0450 | | | | | | | | | | |
| BINOP | 1810 | 0581 | 0801 | | | | | | | | |
| BLANK | 0394 | | | | | | | | | | |
| BOFCK | 1244 | 1150 | 1252 | 1271 | 1330 | 1696 | 1716 | | | | |
| BSTP | 1251 | 1246 | | | | | | | | | |
| C5 | 0021 | | | | | | | | | | |
| C6 | 0017 | 0120 | 1801 | | | | | | | | |
| C7 | 0028 | 0106 | | | | | | | | | |
| CASIN | 1828 | 0956 | | | | | | | | | |
| CCNT | 1819 | 1788 | | | | | | | | | |
| CHCK | 1137 | 1132 | | | | | | | | | |
| CHRSA | 0225 | | | | | | | | | | |
| CLAR2 | 0497 | | | | | | | | | | |
| CLERA | 0166 | 1778 | 1784 | | | | | | | | |
| CLINE | 0322 | | | | | | | | | | |
| CLP1A | 0223 | 0671 | 1503 | | | | | | | | |
| CMNDT | 0517 | 1870 | | | | | | | | | |
| COINT | 1064 | 1055 | | | | | | | | | |
| COM1 | 0704 | 0697 | | | | | | | | | |
| COMA | 2014 | | | | | | | | | | |
| COMCE | 0442 | 1928 | 1933 | 1960 | | | | | | | |
| COMCK | 0441 | 2015 | | | | | | | | | |
| COMEL | 2015 | 1913 | 1916 | 1918 | 1969 | | | | | | |
| COMON | 0687 | 0764 | | | | | | | | | |
| CONST | 0490 | | | | | | | | | | |
| COUT | 1103 | 1100 | | | | | | | | | |
| COUT1 | 1238 | 1219 | | | | | | | | | |
| COUTP | 1234 | 0976 | 0979 | 1053 | 1057 | 1064 | 1210 | 1244 | 1620 | 1690 | 1736 |
| | 1747 | | | | | | | | | | |
| CPLAC | 0337 | | | | | | | | | | |
| CRCKA | 0234 | | | | | | | | | | |
| CRLF | 0503 | | | | | | | | | | |
| CRLF1 | 0504 | 1761 | 1777 | | | | | | | | |
| CRTN | 0043 | 0044 | 0045 | | | | | | | | |
| CSTOP | 1176 | 1148 | 1269 | 1329 | | | | | | | |
| CTYPE | 0336 | | | | | | | | | | |
| DATOP | 1808 | 0577 | 0797 | | | | | | | | |
| DCM1A | 1854 | 0639 | 0813 | 1467 | 1526 | | | | | | |
| DCOMA | 0216 | | | | | | | | | | |
| DEL1 | 1815 | 1702 | | | | | | | | | |
| DEL2 | 1816 | 1338 | | | | | | | | | |
| DEL65 | 1702 | 1698 | | | | | | | | | |
| DELSA | 0181 | | | | | | | | | | |
| DFLAG | 0396 | | | | | | | | | | |
| DI2 | 0972 | 0977 | 0980 | | | | | | | | |
| DI3 | 0974 | 0970 | | | | | | | | | |
| DIGCK | 0469 | | | | | | | | | | |
| DIREC | 0964 | | | | | | | | | | |
| DLCNT | 1807 | 1745 | | | | | | | | | |
| DPERR | 0049 | | | | | | | | | | |
| DROST | 0323 | | | | | | | | | | |
| DSTRT | 0309 | | | | | | | | | | |
| E | 0086 | | | | | | | | | | |
| E1 | 0241 | | | | | | | | | | |
| E10 | 0250 | | | | | | | | | | |
| E15 | 0255 | | | | | | | | | | |
| E20 | 0260 | | | | | | | | | | |
| E25 | 0265 | | | | | | | | | | |
| E30 | 0270 | 0695 | | | | | | | | | |
| E35 | 0275 | | | | | | | | | | |
| E40 | 0280 | 0925 | 1434 | | | | | | | | |
| E45 | 0285 | | | | | | | | | | |
| E5 | 0245 | 0763 | | | | | | | | | |
| E50 | 0290 | | | | | | | | | | |
| EBIDW | 1847 | 1397 | 1655 | | | | | | | | |
| ECALA | 0221 | | | | | | | | | | |
| ELINA | 0175 | | | | | | | | | | |
| ELOST | 1941 | 1880 | 1885 | | | | | | | | |
| ENDS | 0486 | 1986 | | | | | | | | | |
| ENTEA | 0224 | | | | | | | | | | |
| ENTFA | 0195 | | | | | | | | | | |
| EOBID | 1846 | 1267 | | | | | | | | | |
| EOL | 0044 | 0555 | | | | | | | | | |
| EOLCK | 0489 | 1915 | | | | | | | | | |
| EOST | 0487 | 1920 | 1932 | 1935 | 1968 | 1976 | 1987 | 2016 | | | |
| ER3 | 1667 | | | | | | | | | | |
| ERR0 | 1853 | 0802 | | | | | | | | | |
| ERR1 | 0943 | 1350 | 1638 | | | | | | | | |
| ERR3 | 1200 | 1111 | 1197 | 1292 | 1335 | 1668 | 1701 | 1753 | | | |
| ERR4 | 1282 | 0724 | 1374 | 1516 | 1573 | | | | | | |
| ERR5 | 1407 | 0824 | 1366 | 1413 | | | | | | | |
| ERR6 | 1361 | | | | | | | | | | |
| ERR7 | 1473 | 0645 | 1558 | | | | | | | | |
| ERR8 | 0653 | 0681 | 0882 | 1484 | | | | | | | |
| ERRA | 0183 | | | | | | | | | | |

CROSS-REFERENCE TABLE

| | | | | | | | | | | | |
|---|---|---|---|---|---|---|---|---|---|---|---|
| ERROR | 1988 | 1853 | 1962 | 1971 | | | | | | | |
| ESEC | 0519 | 0516 | | | | | | | | | |
| ESEC3 | 0522 | 0529 | | | | | | | | | |
| ESEC4 | 0533 | 0525 | | | | | | | | | |
| ESEC6 | 0530 | 0523 | | | | | | | | | |
| EXP | 0407 | 0408 | | | | | | | | | |
| EXPOP | 0124 | 1807 | | | | | | | | | |
| F | 0087 | | | | | | | | | | |
| F5 | 0920 | 0910 | 0914 | 0933 | 1304 | | | | | | |
| FDAAA | 0228 | | | | | | | | | | |
| FETCH | 0494 | 0923 | 0939 | | | | | | | | |
| FILEC | 0939 | 0774 | 0958 | 1307 | 1628 | 1632 | | | | | |
| FILEN | 1829 | 0964 | 1312 | | | | | | | | |
| FILLA | 0207 | | | | | | | | | | |
| FIMAR | 1926 | 1881 | 1884 | | | | | | | | |
| FIND3 | 0960 | | | | | | | | | | |
| FINDE | 0952 | 1861 | | | | | | | | | |
| FIRST | 0373 | | | | | | | | | | |
| FITA3 | 0984 | 0968 | | | | | | | | | |
| FITAS | 0986 | 0954 | 1016 | 1040 | | | | | | | |
| FIX | 0507 | | | | | | | | | | |
| FLGBT | 0079 | 0531 | | | | | | | | | |
| FLOAT | 0392 | | | | | | | | | | |
| FLTFA | 0199 | | | | | | | | | | |
| FLTRA | 0198 | 0924 | 0940 | | | | | | | | |
| FLTSA | 0201 | | | | | | | | | | |
| FN | 0154 | | | | | | | | | | |
| FND | 0468 | 0678 | | | | | | | | | |
| FNDIA | 0230 | 0737 | | | | | | | | | |
| FNDAA | 0229 | 0733 | | | | | | | | | |
| FNDPS | 0482 | 0665 | 0879 | | | | | | | | |
| FOPBS | 0212 | | | | | | | | | | |
| FORMA | 0178 | | | | | | | | | | |
| FORME | 0342 | | | | | | | | | | |
| FORMS | 0341 | | | | | | | | | | |
| FORMT | 0340 | | | | | | | | | | |
| FPAGE | 0457 | | | | | | | | | | |
| FROMA | 0128 | | | | | | | | | | |
| FS | 2004 | 2003 | | | | | | | | | |
| FSCA | 0179 | 0559 | 1929 | 1934 | 2004 | | | | | | |
| FSCE2 | 0447 | | | | | | | | | | |
| FSCE4 | 0452 | | | | | | | | | | |
| FTMP1 | 0343 | | | | | | | | | | |
| FTMP2 | 0344 | | | | | | | | | | |
| FVERF | 1343 | 1320 | | | | | | | | | |
| FWAM | 0163 | 1488 | 1510 | 1532 | | | | | | | |
| FWUP | 0302 | 0698 | 0837 | 1451 | 1486 | 1494 | 1500 | 1502 | 1507 | 1508 | 1534 |
| FXFLA | 0200 | | | | | | | | | | |
| GBACK | 1681 | 1178 | 1253 | | | | | | | | |
| GDIR | 1328 | 1323 | 1334 | 1337 | | | | | | | |
| GDIR2 | 1336 | 1332 | | | | | | | | | |
| GFTAD | 0467 | 0519 | 0822 | | | | | | | | |
| GETCH | 0477 | | | | | | | | | | |
| GETSA | 1850 | | | | | | | | | | |
| GETSK | 0481 | | | | | | | | | | |
| GFLAG | 0410 | | | | | | | | | | |
| GFRST | 0480 | | | | | | | | | | |
| GNEXT | 0479 | 0553 | 1945 | 1999 | 2014 | | | | | | |
| GPARM | 0430 | | | | | | | | | | |
| GSIGN | 0492 | | | | | | | | | | |
| GTCON | 0506 | | | | | | | | | | |
| GTMP | 0478 | | | | | | | | | | |
| GTOPP | 0472 | 0573 | 0793 | 0909 | 1432 | | | | | | |
| GTSTA | 0219 | 1850 | | | | | | | | | |
| GUNT | 0923 | 0918 | 1306 | | | | | | | | |
| HALT | 1226 | 0722 | 0971 | 1110 | 1161 | 1198 | 1259 | 1282 | 1314 | 1346 | 1349 |
| | 1372 | 1514 | 1571 | 1667 | 1681 | 1762 | | | | | |
| HFLG1 | 0327 | | | | | | | | | | |
| HSTPT | 0308 | | | | | | | | | | |
| I | 0073 | | | | | | | | | | |
| IADDR | 1823 | 1011 | 1013 | 1015 | 1035 | 1039 | 1049 | 1207 | | | |
| ICNT | 0428 | | | | | | | | | | |
| IDR0 | 1844 | 0640 | 0657 | 0675 | 0687 | 0689 | 0705 | 0710 | 0719 | 0759 | 0827 |
| | 0840 | 0843 | 0845 | 0853 | 0877 | 1345 | 1359 | 1364 | 1369 | 1386 | 1394 |
| | 1410 | 1412 | 1468 | 1489 | 1511 | 1531 | 1545 | 1553 | 1568 | 1645 | 1676 |
| | 1710 | 1714 | 1763 | 1765 | 1767 | 1769 | 1771 | 1773 | 1775 | | |
| IDR4A | 1845 | 1422 | | | | | | | | | |
| IDRA | 1843 | 1265 | 1395 | 1654 | 1724 | | | | | | |
| IDCLR | 1724 | 1643 | | | | | | | | | |
| IMPY | 0493 | | | | | | | | | | |
| INF | 0083 | | | | | | | | | | |
| INITS | 0462 | 0596 | 0899 | 1517 | | | | | | | |
| INREA | 0232 | | | | | | | | | | |
| INSTP | 1207 | 1048 | 1196 | | | | | | | | |
| INTCK | 0465 | | | | | | | | | | |
| INTEA | 0184 | | | | | | | | | | |
| INTEL | 0346 | | | | | | | | | | |
| INTFL | 0081 | | | | | | | | | | |
| INTGR | 0408 | | | | | | | | | | |
| IOBUF | 0365 | | | | | | | | | | |
| IOHEA | 0235 | | | | | | | | | | |

CROSS-REFERENCE TABLE

| | | | | | | | | |
|---|---|---|---|---|---|---|---|---|
| IOSTA | Ø231 | | | | | | | |
| IS2 | 1Ø2Ø | Ø998 | | | | | | |
| IS3 | 1Ø24 | 1Ø7Ø | | | | | | |
| ISE4 | 1Ø1Ø | 1ØØ2 | | | | | | |
| ISERV | Ø995 | Ø184 | | | | | | |
| ISTØ | 1Ø35 | 1828 | | | | | | |
| IST1 | 1Ø46 | 1Ø44 | | | | | | |
| ISTOR | 142Ø | 1381 | 1524 | | | | | |
| ITRAS | 1824 | Ø988 | | | | | | |
| KCOMN | Ø713 | Ø691 | Ø7Ø8 | | | | | |
| KEYBD | 1812 | 1ØØ3 | | | | | | |
| KEYFG | Ø33Ø | 1ØØ8 | 1Ø23 | | | | | |
| KEYOP | 18Ø9 | Ø579 | Ø799 | | | | | |
| L2T1 | Ø353 | 1496 | 1498 | | | | | |
| L2T2 | Ø354 | | | | | | | |
| LA | 1977 | 1959 | | | | | | |
| LA1 | 1961 | 1979 | | | | | | |
| LASTN | Ø4Ø4 | Ø844 | | | | | | |
| LBI2 | 1561 | 1555 | | | | | | |
| LBIN | 1543 | Ø582 | | | | | | |
| LBOP | Ø125 | | | | | | | |
| LDATA | 1356 | Ø578 | | | | | | |
| LDEF | Ø495 | 1485 | | | | | | |
| LETCK | Ø47Ø | | | | | | | |
| LI2 | 1762 | 1782 | | | | | | |
| LIMIT | Ø471 | | | | | | | |
| LINK | Ø893 | 1859 | | | | | | |
| LISTA | Ø173 | | | | | | | |
| LISTE | 1759 | 1862 | | | | | | |
| LKEY | 1465 | Ø58Ø | | | | | | |
| LKEY4 | 1485 | 1478 | | | | | | |
| LKEY5 | 15ØØ | 1492 | | | | | | |
| LKEY6 | 15Ø4 | 1499 | | | | | | |
| LKEY9 | 15Ø9 | 1491 | | | | | | |
| LNFD | ØØ78 | | | | | | | |
| LNINC | Ø321 | | | | | | | |
| LNUM | Ø463 | 1917 | 1919 | | | | | |
| LO12 | Ø655 | Ø65Ø | Ø652 | | | | | |
| LO3 | Ø6Ø5 | Ø612 | Ø81Ø | | | | | |
| LO4 | Ø744 | Ø734 | Ø738 | Ø751 | | | | |
| LO5 | Ø752 | Ø746 | | | | | | |
| LO6 | Ø758 | Ø666 | Ø886 | | | | | |
| LO7 | Ø875 | Ø867 | Ø869 | | | | | |
| LOAD2 | Ø6Ø3 | Ø589 | Ø865 | Ø893 | | | | |
| LOAD3 | Ø665 | Ø593 | Ø896 | | | | | |
| LOAD4 | Ø675 | Ø884 | | | | | | |
| LOAD7 | Ø638 | Ø618 | Ø621 | Ø875 | | | | |
| LOAD8 | Ø616 | Ø59Ø | Ø894 | | | | | |
| LOAD9 | Ø594 | Ø885 | Ø887 | 1518 | 1576 | | | |
| LOADP | Ø589 | Ø574 | | | | | | |
| LOCF | 1299 | 1356 | 142Ø | 1465 | 1543 | | | |
| LOCF1 | 1312 | 1348 | | | | | | |
| LOCF2 | 13Ø9 | Ø779 | Ø784 | | | | | |
| LOCF3 | 1314 | | | | | | | |
| LOCL1 | Ø351 | Ø833 | 1941 | 1995 | | | | |
| LOCL2 | Ø352 | | | | | | | |
| LPCK | Ø443 | | | | | | | |
| LPCKE | Ø444 | | | | | | | |
| LPOP | Ø126 | | | | | | | |
| LPOMA | Ø129 | | | | | | | |
| LSTAK | Ø3Ø5 | | | | | | | |
| LSTPT | Ø3Ø7 | | | | | | | |
| LTR | Ø485 | 197Ø | | | | | | |
| LWAM | Ø3Ø1 | 1565 | 1567 | 1574 | | | | |
| M1 | Ø13Ø | Ø967 | Ø986 | 1Ø43 | 1157 | 1317 | 144Ø | 1443 |
| M1Ø | Ø137 | | | | | | | |
| M1ØØ | Ø15Ø | | | | | | | |
| M1Ø24 | Ø152 | 1814 | 1816 | | | | | |
| M11 | Ø138 | Ø928 | | | | | | |
| M12 | Ø139 | | | | | | | |
| M13 | Ø14Ø | | | | | | | |
| M14 | Ø141 | | | | | | | |
| M15 | Ø142 | 1688 | | | | | | |
| M2 | Ø131 | Ø861 | 1263 | 131Ø | 1447 | | | |
| M23 | Ø143 | | | | | | | |
| M25 | Ø144 | | | | | | | |
| M256 | Ø151 | | | | | | | |
| M3 | Ø132 | | | | | | | |
| M32 | Ø145 | 1679 | | | | | | |
| M36 | Ø146 | | | | | | | |
| M4 | Ø133 | 1636 | | | | | | |
| M48 | Ø147 | | | | | | | |
| M5 | Ø134 | | | | | | | |
| M6 | Ø135 | | | | | | | |
| M64 | Ø148 | | | | | | | |
| M8Ø | Ø149 | | | | | | | |
| M9 | Ø136 | | | | | | | |
| MA | 1914 | 1912 | | | | | | |
| MAR2 | 1618 | | | | | | | |
| MAR3 | 17Ø8 | 1616 | | | | | | |
| MAR4 | 1628 | 1617 | 1712 | | | | | |

CROSS-REFERENCE TABLE

| | | | | | | | | | | | |
|---|---|---|---|---|---|---|---|---|---|---|---|
| MARK | 1817 | 1151 | 1272 | 1331 | 1697 | 1717 | | | | | |
| MARKE | 1613 | 1864 | | | | | | | | | |
| MASKI | 0159 | | | | | | | | | | |
| MASKS | 0160 | | | | | | | | | | |
| MAW | 0300 | 1544 | | | | | | | | | |
| MAXIN | 0406 | | | | | | | | | | |
| MAXSN | 0153 | 0761 | | | | | | | | | |
| MBIN1 | 0412 | | | | | | | | | | |
| MBIN2 | 0413 | | | | | | | | | | |
| MBOX1 | 0357 | | | | | | | | | | |
| MC2 | 1676 | 1664 | | | | | | | | | |
| MC3 | 1669 | | | | | | | | | | |
| MCON2 | 1654 | 1718 | | | | | | | | | |
| MCONT | 1650 | 1624 | 1678 | | | | | | | | |
| MDIMA | 0214 | 1446 | | | | | | | | | |
| MERB | 0451 | 1552 | | | | | | | | | |
| MERGI | 0886 | 0880 | | | | | | | | | |
| MERGE | 0860 | 1866 | | | | | | | | | |
| MINIT | 0461 | 0591 | 0876 | 1575 | | | | | | | |
| ML | 1910 | 1948 | | | | | | | | | |
| MLOST | 1911 | 1879 | 1886 | | | | | | | | |
| MODE | 0311 | 0594 | 0619 | 0637 | 0868 | 0874 | 0897 | 1477 | | | |
| MSFLG | 0395 | | | | | | | | | | |
| MVTOH | 0483 | 0713 | 1497 | | | | | | | | |
| NDISP | 0388 | | | | | | | | | | |
| NDWRT | 0502 | 1790 | | | | | | | | | |
| NEXT1 | 0456 | 0832 | | | | | | | | | |
| NEXTA | 0473 | 0528 | 0750 | | | | | | | | |
| NEXTL | 0455 | | | | | | | | | | |
| NMOTA | 0206 | | | | | | | | | | |
| NOEOF | 0488 | | | | | | | | | | |
| NPRIN | 0389 | | | | | | | | | | |
| NPWRT | 0501 | | | | | | | | | | |
| NUM | 0402 | 0403 | | | | | | | | | |
| NUMCA | 0217 | | | | | | | | | | |
| NUMOA | 0218 | | | | | | | | | | |
| NUMS | 1820 | 0917 | 1302 | | | | | | | | |
| NWL | 1091 | 1101 | 1102 | | | | | | | | |
| NWL1 | 1092 | 1095 | | | | | | | | | |
| NWL2 | 1094 | 1090 | | | | | | | | | |
| NXTOT | 0310 | | | | | | | | | | |
| NXTST | 0411 | 0902 | | | | | | | | | |
| OBLNK | 0474 | | | | | | | | | | |
| ODGIT | 0498 | | | | | | | | | | |
| OF1 | 1748 | 1752 | | | | | | | | | |
| OFFCL | 1744 | 1262 | 1618 | 1670 | | | | | | | |
| OFSET | 1839 | 0660 | 0676 | 0735 | 0748 | 0760 | 0878 | | | | |
| ONE | 0051 | | | | | | | | | | |
| ONEXT | 0475 | | | | | | | | | | |
| OPCHA | 0177 | | | | | | | | | | |
| OPDMK | 0085 | | | | | | | | | | |
| OPMSK | 0082 | 0916 | 1301 | | | | | | | | |
| OPTYP | 0403 | | | | | | | | | | |
| OTPTR | 0299 | | | | | | | | | | |
| OUTCR | 0476 | | | | | | | | | | |
| OUTIA | 0185 | 1787 | | | | | | | | | |
| OVCHA | 0222 | 0690 | 0706 | 1493 | | | | | | | |
| PARMA | 0312 | | | | | | | | | | |
| PARMN | 0313 | | | | | | | | | | |
| PBPTO | 0319 | 0700 | 1550 | | | | | | | | |
| PBPTR | 0316 | 0625 | 0649 | 0670 | 0701 | 0728 | 0731 | 0745 | 0753 | | |
| PBUFF | 0317 | 0648 | 0651 | 0693 | 0699 | 0709 | 0711 | 0814 | 0839 | 1458 | 1504 |
| | 1506 | | | | | | | | | | |
| PBUFO | 0318 | 1456 | | | | | | | | | |
| PEND | 0371 | | | | | | | | | | |
| PEXMA | 0171 | | | | | | | | | | |
| PFLAG | 0397 | | | | | | | | | | |
| PGIN0 | 0484 | | | | | | | | | | |
| PGINT | 0464 | | | | | | | | | | |
| PI/2 | 0050 | | | | | | | | | | |
| PLACE | 0390 | | | | | | | | | | |
| PMODE | 0335 | | | | | | | | | | |
| PPFF | 0372 | | | | | | | | | | |
| PRADD | 0314 | 0606 | 0622 | 0624 | 0638 | 0772 | 0812 | 0913 | 1430 | 1466 | 1525 |
| PRFLG | 0338 | 1779 | | | | | | | | | |
| PRIN | 1783 | 1764 | 1766 | 1768 | 1770 | 1772 | 1774 | 1776 | | | |
| QTCHA | 0236 | | | | | | | | | | |
| QTOP | 0115 | 0167 | 1848 | | | | | | | | |
| RBOP | 0123 | | | | | | | | | | |
| RBUFF | 0366 | | | | | | | | | | |
| RCFF | 1840 | 0975 | 1052 | 1326 | | | | | | | |
| RCFS | 1841 | 1149 | 1270 | 1715 | | | | | | | |
| RCOUT | 0339 | | | | | | | | | | |
| RCRF | 1842 | 0978 | 1056 | 1322 | | | | | | | |
| RCRS | 1803 | 1695 | | | | | | | | | |
| RD1 | 1277 | 1273 | | | | | | | | | |
| RDFF | 1849 | | | | | | | | | | |
| RDFS | 1801 | 1744 | | | | | | | | | |
| RDRF | 1804 | 1735 | | | | | | | | | |
| RDRS | 1805 | 1669 | 1689 | | | | | | | | |

CROSS-REFERENCE TABLE

| | | | | | | | | |
|---|---|---|---|---|---|---|---|---|
| RDYDA | 0172 | 0533 | 0597 | 0900 | | | | |
| RE3 | 1728 | 1423 | 1750 | | | | | |
| REED | 0167 | | | | | | | |
| REEDL | 0345 | | | | | | | |
| RES | 0423 | | | | | | | |
| RESB1 | 0459 | | | | | | | |
| RESBP | 0460 | | | | | | | |
| RESTR | 1070 | 1009 | 1211 | | | | | |
| RET2 | 0427 | | | | | | | |
| RETN2 | 0426 | 0560 | 1175 | 1279 | 2005 | | | |
| RETN3 | 0425 | | | | | | | |
| REWLI | 1985 | 1882 | 1883 | | | | | |
| REWND | 1734 | 1675 | 1781 | 1863 | | | | |
| RIF4 | 1269 | 1275 | | | | | | |
| RIF6 | 1285 | 1281 | | | | | | |
| RIFI5 | 1263 | 1286 | 1780 | | | | | |
| RIFID | 1259 | 1291 | | | | | | |
| RIFS | 1291 | 0960 | 1309 | 1343 | 1708 | 1760 | | |
| RPCK | 0445 | | | | | | | |
| RPCKE | 0446 | | | | | | | |
| RPOP | 0121 | | | | | | | |
| RRBOF | 1688 | 1147 | 1285 | 1290 | 1671 | 1680 | 1700 | 1709 |
| RRRID | 1290 | 0717 | 1367 | 1509 | 1566 | | | |
| RSAVE | 0298 | | | | | | | |
| RSLTE | 0379 | | | | | | | |
| RSPTR | 0424 | | | | | | | |
| RSTAK | 0422 | | | | | | | |
| RSTKA | 0164 | | | | | | | |
| RSULT | 0432 | | | | | | | |
| RUNA | 0169 | 0599 | | | | | | |
| S | 0088 | | | | | | | |
| SALTA | 0213 | | | | | | | |
| SAVBP | 0458 | | | | | | | |
| SAVEA | 0331 | 0995 | 1024 | | | | | |
| SAVEB | 0332 | 0996 | 1025 | | | | | |
| SBADR | 0400 | | | | | | | |
| SBPTR | 0393 | 0557 | 2006 | | | | | |
| SBPUD | 0437 | 0554 | 1944 | 1978 | 1998 | | | |
| SBUFA | 0205 | | | | | | | |
| SDAT2 | 1404 | 0848 | 1389 | 1536 | | | | |
| SDAT3 | 1393 | 0854 | 1537 | | | | | |
| SDATA | 1381 | 0798 | | | | | | |
| SEC | 0326 | 1838 | | | | | | |
| SECCK | 1582 | 0849 | 1527 | | | | | |
| SECFL | 1838 | 0530 | 0532 | 0647 | 1476 | 1560 | 1582 | 1587 |
| SERV | 0553 | 2021 | | | | | | |
| SERVA | 2021 | 1914 | 1961 | | | | | |
| SF2 | 0780 | 0773 | | | | | | |
| SFLAG | 0399 | | | | | | | |
| SFLOC | 0770 | 0603 | 0809 | | | | | |
| SGNS | 0499 | | | | | | | |
| SIGN | 0405 | 0406 | | | | | | |
| SKEY | 1524 | 0800 | | | | | | |
| SLCOD | 0334 | | | | | | | |
| SLEND | 0208 | | | | | | | |
| SLWST | 0453 | | | | | | | |
| SNFLA | 0203 | | | | | | | |
| SNMT | 1889 | 1871 | | | | | | |
| SPLFA | 0202 | | | | | | | |
| SSBPT | 0401 | | | | | | | |
| SSYMA | 0176 | 1433 | | | | | | |
| ST | 0383 | | | | | | | |
| STAC3 | 1198 | 1172 | 1220 | | | | | |
| STACK | 1193 | 1038 | | | | | | |
| START | 0168 | 0013 | | | | | | |
| STAT | 1182 | 1037 | 1167 | 1217 | 1748 | | | |
| STAT4 | 1187 | 1177 | 1195 | | | | | |
| STAT5 | 1172 | 1169 | | | | | | |
| STATE | 1167 | 1260 | 1274 | 1333 | 1615 | 1699 | | |
| STEXP | 0449 | 1947 | | | | | | |
| STOP | 1851 | 1108 | 1176 | 1251 | | | | |
| STOPC | 1852 | 1209 | 1226 | | | | | |
| STOR1 | 0434 | | | | | | | |
| STORE | 0433 | | | | | | | |
| STORP | 0809 | 0794 | | | | | | |
| STPFL | 0329 | 1021 | 1851 | | | | | |
| STROP | 0436 | 1974 | | | | | | |
| STSRH | 0448 | | | | | | | |
| SUBT | 0542 | 1868 | 2022 | 2022 | | | | |
| SUBTA | 2022 | 1946 | | | | | | |
| SUMPA | 0233 | | | | | | | |
| SYE12 | 0491 | | | | | | | |
| SYE25 | 0466 | | | | | | | |
| SYMC1 | 0439 | 2000 | | | | | | |
| SYMC2 | 0438 | | | | | | | |
| SYMCK | 0440 | | | | | | | |
| SYMTP | 0304 | | | | | | | |
| SYSRE | 1737 | 1375 | 1400 | 1682 | | | | |
| SYTSA | 0215 | | | | | | | |
| TAP0 | 1825 | 1264 | 1280 | 1711 | 1713 | | | |

CROSS-REFERENCE TABLE

```
TAP1    1826    0520    0522    0729    0752    1311    1347    1783    1785
TAP2    1827    0668    0679    0830    0847    0883    1155    1368    1383    1388    1442
        1452    1533
TAP3    1830    1358    1385    1439    1450    1746    1751
TAP4    1831    0732    0744    1078    1085    1089    1118    1125    1266    1318    1325
        1336    1396    1633    1639    1644
TAP5    1832    0730    1079    1099    1119    1131    1268    1327    1328    1398
TAP6    1833    1084    1096    1097    1103    1124    1134    1135    1137
TAP7    1834    0592    0628    0630    0655    0659    0682    0692    0712    0718    0758
        0777    0781    0816    0818    0831    0846    0895    1156    1387    1535
TAP8    1835    0598    0616    0631    0635    0778    0782    0819    0866    0872    0901
        1436    1445    1481    1563
TAPAD   1836    0604
TCOM    1837    0834
TEMP    0356    0357    1930    1943    1951    1952    1963    1997
TEMP1   0358    1972
TEMP2   0359    1975
TEMP3   0360    0702    1495
TEMP4   0361    0521    0669    0823    0825    0828    1501
TEMPS   0355    0575    0576    0583    0605    0608    0609    0611    0736    0771    0795
        0796    0803    0829    0860    0911    0912    0915    0919    1299    1300    1429
TERM    0370
TFILE   1822    0775    0783    0959    0966    1308    1313    1316    1344    1631    1677
TFLAG   0324
TFLG1   0328
TLENG   1806    1642    1657
TMPA    0209
TMPOP   0190
TRD     1118    0721    1371    1513    1570
TRD1    1120    1277
TREGE   0378    0864    0870
TRL     1126    1136
TSRHA   0174
TSTPT   0306
TTY     0505
TUNIT   1821    0921    0984    1080    1120    1182    1235    1597    1651
TWR     1078    1158    1656
TWR1    1080    1154
TWR4    1083
TYPFL   0084
UFLAG   0398
UKPTR   0315    0696    0707    1454    1482
UNIT    1995    1911    1926    1985
UNIT1   2006    1910    2002
UNIT2   1998    1958
UNITC   0909    0770    0952    1613    1734    1759
UNITS   0325
UNSTK   0454
UOVF    0925    0929    0932
UPARA   0197
VALUE   0303
VAROA   0220
WBUFF   0429
WCFS    1802    1650
WDFS    1848    1081    1598    1619
WIDTH   0391
WPERM   1217    0811    1421    1614
WRF3    1149    1153
WRFIL   1147    1399
WRITE   0165
WRZE    1594    1621    1658    1672
WRZE1   1602    1606
XC      0418
XEC4A   0170    0973    1738
XEC6A   0227
XECA    1813    0903
XFAR1   0431
XFAR2   0435
XSCRA   0226
YC      0420
YCOMN   0692    0688
ZAP     0158
ZONK    0496
```

#01 MATRIX BLOCK

```
0501                       LST
0502  20000                ORG 20000B
0503*
0504* MATRIX BLOCK
0505*
0506  12001          QUOTF EQU 12001B       TABLE OF EQUATES FOR SYNTAX
0507  12002          COMMA EQU QUOTF+1
0508  12007          ASSOP EQU QUOTF+6
0509  12011          PLUS  EQU QUOTF+8
0510  12013          TIMES EQU QUOTF+10
0511*
0512*
0513  20000 000256 ID      ABS DETT-*       DETERMINANT JUMP TABLE
```

#01 MATRIX BLOCK

```
*
 20001 000100        ABS REDS-*         SYNTAX JUMP TABLE
 20002 000041        ABS MATS-*
 20003 000000        NOP              ** CHECKSUM WORD **
*
 20004 046501 SYSNT  OCT 046501         MA       STATEMENT-NAME TABLE
 20005 052242        OCT 052242         T (2)
 20006 051105        OCT 051105         RE
 20007 042111        OCT 042111         DI
 20010 046603        OCT 046603         M (3)
*
 20011 046501        OCT 046501         MA
 20012 052040        OCT 052040         T
 20013 050122        OCT 050122         PR
 20014 044516        OCT 044516         IN
 20015 052204        OCT 052204         T (4)
 20016 046501        OCT 046501         MA
 20017 052040        OCT 052040         T
 20020 051105        OCT 051105         RE
 20021 040504        OCT 040504         AD
 20022 142400        OCT 142400           (5)    END
*
 20023 052122 NFOPT  OCT 052122         TR       NON-FORMULA OPERATOR TABLE
 20024 047201        OCT 047201         N (1)
 20025 044516        OCT 044516         IN
 20026 053202        OCT 053202         V (2)
 20027 055105        OCT 055105         ZE
 20030 051203        OCT 051203         R (3)
 20031 041517        OCT 041517         CO
 20032 047204        OCT 047204         N (4)
 20033 044504        OCT 044504         ID
 20034 047305        OCT 047305         N (5)    END
*
 20035 042105 FUNCT  OCT 042105         DE       FUNCTION-NAME TABLE
 20036 052335        OCT 052335         T (29)   END
*
 20037 000777 BN777  OCT 777            NULL TABLE
*
 20040 177771 M7     DEC -7
 20041 026000 B26K   OCT 26000
 20042 000046 NFOPA  DEF NFOPT+NFOPT-ID-ID
*
* MAT STATEMENT SYNTAX
*
 20043 021717 MATS   LDA NUM            GET PAGE INFO
 20044 070442        SAR 10
 20045 070244        SAL 11
 20046 031660        STA T8
*
 20047 055706        DSZ SBPTR          MOVE S-BUFFER POINTER
 20050 061055        JSM GNEXT          GET FIRST CHARACTER
 20051 026220        LDB SUBTA          GET SUBSIDIARY TABLE ADDRESS
 20052 005660        ADB T8
 20053 060537        JSM STSRH          DO SEARCH FOR "PRINT" OR "READ"
 20054 066107        JMP MATS2          NOT FOUND
 20055 045706        ISZ SBPTR
 20056 010004        CPA B10K           PRINT?
 20057 066066        JMP MATS0          YES
*
* MAT READ SYNTAX
*
 20060 062227 MATS1  JSM ARRID          RECORD ARRAY
 20061 062240        JSM MATSB          IF SUBSCRIPT, RECORD IT
 20062 066064        JMP *+2            NOP
 20063 061153        JSM EOLCK          END-OF-STATEMENT?
 20064 060510        JSM COMCE          NO, DEMAND COMMA
 20065 066060        JMP MATS1
*
* MAT PRINT SYNTAX
*
 20066 062227 MATS0  JSM ARRID          RECORD ARRAY
 20067 061153        JSM EOLCK          END-OF-STATEMENT?
 20070 060461        JSM SYMC2          NO, LOOK FOR COMMA OR SEMICOLON
 20071 012001        DEF COMMA-1
 20072 164277        JMP E10-2,I        NOT FOUND, ERROR 8
 20073 061066        JSM GETSK          END-OF-STATEMENT?
 20074 066077        JMP *+3            YES
 20075 055400        DSZ BADDR          NO
 20076 066066        JMP MATS0
 20077 045706        ISZ SBPTR
 20100 164203        JMP ACTSA,I
*
* REDIM SYNTAX
*
 20101 062227 REDS   JSM ARRID          RECORD ARRAY
 20102 062240        JSM MATSB          RECORD SUBSCRIPT
 20103 066105        JMP *+2            NOP
 20104 164306        JMP E15,I          NONE FOUND, ERROR 15
 20105 060510        JSM COMCE          DEMAND COMMA
 20106 066101        JMP REDS
```

#01 MATRIX BLOCK

```
*
* OTHER SYNTAX
*
20107 045706 MATS2 ISZ SBPTR
20110 061141       JSM LTR+1     LETTER?
20111 164321       JMP E25+1,I   NO, ERROR 26
20112 021706       LDA SBPTR     SAVE CHARACTER ADDRESS
20113 031723       STA ARYAD
20114 062231       JSM ARRI      RECORD ARRAY
20115 060463       JSM SYMCI     LOOK FOR "="
20116 012006       DEF ASSOP-1
20117 164325       JMP E30,I     NOT FOUND, ERROR
20120 061055       JSM GNEXT
20121 045706       ISZ SBPTR
20122 026042       LDB NFOPA     SEARCH NON-FORMULA OPERATOR TABLE
20123 005660       ADB T8
20124 060546       JSM STEXP
20125 066147       JMP MATS8     NOT FOUND, MUST BE ARITHMETIC
20126 045706       ISZ SBPTR
20127 070202       SAR 5
20130 050040       AND B37       RETRIEVE OPCODE
20131 031661       STA T9
20132 000134       ADA M3        INV OR TRN?
20133 070252       SAM MATS3     YES
20134 061066       JSM GETSK     NO, END-OF-STATEMENT?
20135 164203       JMP ACTSA,I   YES
20136 062240       JSM MATSR     NO, GO RECORD SUBSCRIPT
20137 065152       JMP NOEOF
*
* INV & TRN SYNTAX
*
20140 061055 MATS3 JSM GNEXT
20141 060521       JSM LPCKF     DEMAND LEFT PARENTHESIS
20142 062227       JSM ARRID     RECORD ARRAY
20143 060534       JSM RPCKF     DEMAND RIGHT PARENTHESIS
20144 055661       DSZ T9        TRN?
20145 065151       JMP EOST      NO
20146 066205       JMP LHSC      GO CHECK PREVIOUS ARRAY IDENTIFIER
*
20147 061141 MATS8 JSM LTR+1     LETTER?
20150 066154       JMP MATS4     NO, IT MUST BE SCALAR MULTIPLY
20151 060752       JSM LETCK     LETTER?
20152 066164       JMP MATS5     NO, IT MUST BE MAT ARITHMETIC
20153 164326       JMP E30+1,I   YES, ERROR 31

*
* SCALAR MULTIPLY SYNTAX
*
20154 060521 MATS4 JSM LPCKF     DEMAND LEFT PARENTHESIS
20155 160202       JSM FSCA,I    FETCH FORMULA
20156 060534       JSM RPCKF     DEMAND RIGHT PARENTHESIS
20157 060463       JSM SYMCI     LOOK FOR "*"
20160 012012       DEF TIMES-1
20161 164326       JMP E30+1,I   NOT FOUND, ERROR 31
20162 062227       JSM ARRID     RECORD ARRAY
20163 065151       JMP EOST
*
* MAT ARITHMETIC SYNTAX
*
20164 055706 MATS5 DSZ SBPTR
20165 062231       JSM ARRI      RECORD ARRAY
20166 061153       JSM EOLCK     END-OF-STATEMENT?
20167 024020       LDB .3        NO, SEARCH FOR "+" "-" OR "*"
20170 060464       JSM SYMCK
20171 012010       DEF PLUS-1
20172 164326       JMP E30+1,I   NOT FOUND, ERROR 31
20173 074742       SBR 16        SET B FOR PFLAG
20174 012041       CPA B26K      "*"?
20175 066212       JMP MATS7     YES
*
20176 035712 MATS6 STB PFLAG     SET PFLAG
20177 062227       JSM ARRID     RECORD SECOND ARRAY
20200 010031       CPA EOL       END-OF-STATEMENT?
20201 066203       JMP *+2       YES
20202 065152       JMP NOEOF     NO, ERROR
20203 045712       ISZ PFLAG     WAS OPERATOR A "*"?
20204 164203       JMP ACTSA,I   NO
20205 125723 LHSC  LDB ARYAD,I   YES, RETRIEVE PREVIOUS ARRAY
20206 074504       SBL 6
20207 015473       CPB TEMP      SAME AS LEFT HAND SIDE?
20210 164326       JMP E30+1,I   YES, ERROR (IMPROPER ASSIGNMENT)
20211 065151       JMP EOST      NO
*
20212 121723 MATS7 LDA ARYAD,I   RETRIEVE ARRAY IDENTIFIER
20213 070504       SAL 6
20214 024132       LDB M1        SET B FOR PFLAG
20215 011473       CPA TEMP      SAME AS LEFT HAND SIDE?
20216 164326       JMP E30+1,I   YES, ERROR (IMPROPER ASSIGNMENT)
20217 066176       JMP MATS6     NO
```

#01 MATRIX BLOCK

```
20220 000442 SUBTA DEF SUBTB+SUBTB-ID-ID
20221 050122 SUBTB OCT 050122      PR
20222 044516       OCT 044516      IN
20223 052204       OCT 052204      T (4)
20224 051105       OCT 051105      RE
20225 040504       OCT 040504      AD
20226 142400       OCT 142400        (5)   END
*
* SUBROUTINE TO FETCH ARRAY IDENTIFIER AND RECORD IT
*
20227 061140 ARRID JSM LTR         LETTER?
20230 164321       JMP E25+1,I     NO. ERROR 26
20231 021474 ARRI  LDA TEMP1       RECORD ARRAY IDENTIFIER
20232 024020       LDB .3          OF UNKNOWN DIMENSIONS
20233 060451       JSM STROP+1
20234 070504       SAL 6
20235 031473       STA TEMP
20236 021475       LDA TEMP2       RETRIEVE FOLLOWING CHARACTER
20237 170402       RET
*
* SUBROUTINE TO FETCH MAT SUBSCRIPT AND RECORD IT
*
20240 060513 MATSB JSM LPCK        LOOK FOR LEFT PARENTHESIS
20241 064357       JMP RETN2       NOT FOUND, RETURN TO P+2
20242 024125       LDA LBOP        CHANGE ( TO [
20243 131706       STA SBPTR,I
20244 160202       JSM FSCA,I      FETCH SUBSCRIPT
20245 060504       JSM COMCK       LOOK FOR COMMA
20246 066250       JMP *+2         NOT FOUND
20247 160202       JSM FSCA,I      FOUND, FETCH SECOND SUBSCRIPT
20250 060534       JSM RPCKE       DEMAND RIGHT PARENTHESIS
20251 055706       DSZ SBPTR
20252 024123       LDB RBOP        CHANGE ) TO ]
20253 135706       STB SBPTR,I
20254 045706       ISZ SBPTR
20255 065153       JMP EOLCK       CHECK FOR END-OF-STATEMENT
*
* DETERMINANT
*
20256 021416 DETT  LDA MODE
20257 070453       SAP DETX        SYNTAX OR EXECUTION?
*
20260 023777       LDA OPCOD       GET MAT OPCODE
20261 131706       STA SBPTR,I
20262 045706       ISZ SBPTR
20263 061055       JSM GNEXT
20264 060521       JSM LPCKE       DEMAND LEFT PARENTHESIS
20265 062227       JSM ARRID       RECORD ARRAY
20266 060534       JSM RPCKE       DEMAND RIGHT PARENTHESIS
20267 064356       JMP RETN3
*
*
20270 023726 DETX  LDA B1A         SAVE FIRST SEVEN TEMPORARIES
20271 024024       LDB .7
20272 162335       JSM MOVST,I
20273 021412       LDA LSTPT       SET UP FOR DETERMINANT EXECUTION
20274 031656       STA T6
20275 121472       LDA TEMPS,I
20276 045472       ISZ TEMPS
20277 045472       ISZ TEMPS
20300 063541       JSM INFO1       ESTABLISH INFORMATION VECTOR
20301 021642       LDA B1+2
20302 031645       STA B3+2
20303 063564       JSM COMP1       EXTRACT DIMENSIONS
20304 011653       CPA T3
20305 066307       JMP *+2
20306 067120       JMP MERR5       MATRIX NOT SQUARE
*
20307 061201       JSM IMPY        N*N
20310 025640       LDB B1
20311 035643       STB B3
20312 076110       RZB *+2         GET # OF TEMPORARY WORDS NEEDED
20313 070704       SAL 2
20314 014012       CPB .1
20315 070744       SAL 1
20316 025412       LDB LSTPT
20317 074070       SIB *+1
20320 035644       STB B3+1
20321 074017       ADA B
20322 063130       JSM XIN2+1      GO CALCULATE DETERMINANT
20323 066324       JMP *+1         DET=0 RETURN
20324 021656       LDA T6
20325 002040       ADA M7
20326 031412       STA LSTPT
20327 070070       SIA *+1
20330 027726       LDB B1A         RESTORE FIRST SEVEN TEMPORARIES
20331 170004       XFR
20332 170004       XFR
20333 023731       LDA DELA
20334 064445       JMP XFAR2+1
*
20335 011122 MOVST DEF 111228
```

#01 MATRIX BLOCK

```
*
* EXECUTE MAT PRINT
*
20336 021416 EMATP LDA MODE        SAVE MODE FLAG
20337 031656       STA T6
20340 121472 MTP3  LDA TEMPS,I
20341 045472       ISZ TEMPS
20342 063541       JSM INFO1       ESTABLISH INFORMATION VECTOR
20343 121472       LDA TEMPS,I
20344 070442       SAR 10          GET FORMAT INDICATOR
20345 074742       SBR 16
20346 035453       STB PRFLG       INDICATE "PRINT"
20347 010020       CPA .3
20350 024020       LDB .3          3 IS ;    0 IS ,
20351 021472       LDA TEMPS
20352 011421       CPA PRADD       FALSE ALARM?
20353 074742       SBR 16          YES, IT WAS PART OF NEXT STATEMENT
20354 035655       STB T5
20355 021642       LDA B1+2        SET UP ROUNDS INFO
20356 025642       LDB B1+2
20357 063565       JSM COMPR
*
20360 020132       LDA M1
20361 031703       STA PLACE
20362 022442       LDA LN72
20363 031623       STA PEND
*
20364 020012       LDA .1          START THE PRINT OPERATION
20365 031646       STA T1
20366 020012 MTP1  LDA .1
20367 031652       STA T2
20370 160170       JSM CLERA,I     CLEAR BUFFER
20371 063600 MTP2  JSM GETT1       GET AN ARRAY ELEMENT
20372 070742       SAR 16
20373 031705       STA FLOAT       INDICATE FIXED-POINT FORMAT
20374 031416       STA MODE
20375 160234       JSM NMOTA,I
20376 025400       LDB BADDR
20377 015623       CPB PEND        CHECK FOR OVERFLOW
20400 066435       JMP OVFW
20401 070742       SAR 16          SIGNAL NUMERIC (NOT QUOTE) TO FILL ROUTINE
20402 031742       STA XC+2
20403 021655       LDA T5          CHECK THE FORMAT INDICATOR
20404 160235       JSM FILLA,I     SUPPLY NEEDED BLANKS
20405 160176       JSM ELINA,I     OUTPUT ONE FIELD
20406 021442       LDA STPFL       CHECK STOP FLAG
20407 010040       CPA .31
20410 066437       JMP MTPX
20411 021652       LDA T2
20412 011654       CPA T4
20413 066416       JMP *+3
20414 045652       ISZ T2
20415 066371       JMP MTP2
20416 061344       JSM CRLF1       DOUBLE-SPACE BETWEEN ROWS
20417 061344       JSM CRLF1

20420 021646       LDA T1
20421 011653       CPA T3
20422 066425       JMP *+3
20423 045646       ISZ T1
20424 066366       JMP MTP1
20425 061344       JSM CRLF1       EXTRA SPACE AFTER MATRICES
20426 025472       LDB TEMPS       CHECK FOR MORE ARRAYS TO BE PRINTED
20427 015421       CPB PRADD
20430 066437       JMP MTPX
20431 121472       LDA TEMPS,I
20432 050115       AND B1777       CHECK FOR TRAILING FORMAT INDICATOR
20433 070210       SZA MTPX
20434 066340       JMP MTP3
*
20435 061344 OVFW  JSM CRLF1
20436 066370       JMP MTP2-1
*
20437 021656 MTPX  LDA T6          RESTORE MODE
20440 031416       STA MODE
20441 164172       JMP XEC4A,I
*
20442 003433 LN72  DEF RBUFF+RBUFF+73

*
* EXECUTE MAT READ
*
20443 121472 EMATR LDA TEMPS,I
20444 045472       ISZ TEMPS
20445 027730       LDB B3A
20446 063542       JSM INFOV       ESTABLISH INFORMATION VECTOR
20447 121472       LDA TEMPS,I
20450 050065       AND OPMSK
20451 010125       CPA LBOP        IS IT [ ?
20452 063625       JSM REDIR       YES, GO REDIMENSION
20453 063563       JSM COMP2
20454 022462       LDA EMRX        GO EXECUTE DATA TRANSFERS
```

#01 MATRIX BLOCK

```
20455 062617         JSM COMM
20456 025472         LDB TEMPS
20457 015421         CPB PRADD
20460 164172         JMP XEC4A,I      DONE
20461 066443         JMP EMATR
*
20462 062463 EMRX    JSM *+1
20463 160256         JSM FDAAA,I
*

* SUBROUTINE TO STASH AN ARRAY ELEMENT
*

* ELEMENT IS IN AR2
*

* ROW & COLUMN VALUES ARE IN T1 AND T2
*
20464 027730 STASH LDB B3A         FIND TARGET ADDRESS
20465 063705         JSM WHERE
20466 021643         LDA B3           FIND TYPE OF ARRAY
20467 064421         JMP STORE+3
*
*

* EXECUTE REDIM
*
20470 121472 EREDM LDA TEMPS,I
20471 045472         ISZ TEMPS
20472 027730         LDB B3A
20473 063542         JSM INFOV        ESTABLISH INFORMATION VECTOR
20474 063625         JSM REDIR        GO REDIMENSION
20475 025472         LDB TEMPS
20476 015421         CPB PRADD
20477 164172         JMP XEC4A,I      DONE
20500 066470         JMP EREDM
20501 121472 EMATX LDA TEMPS,I     GET DESTINATION ARRAY
20502 045472         ISZ TEMPS
20503 027730         LDB B3A
20504 063542         JSM INFOV        ESTABLISH INFORMATION VECTOR
20505 121472         LDA TEMPS,I
20506 045472         ISZ TEMPS
20507 050115         AND B1777
20510 072310         RZA MATX1        REGULAR MAT ASSIGNMENT?
20511 121472         LDA TEMPS,I      NO
20512 070442         SAR 10
20513 010040         CPA .31          SCALAR MULTIPLY?
20514 066531         JMP MATX0        NO
20515 066644         JMP ESMY         YES
*
20516 063541 MATX1 JSM INFO1        ESTABLISH INFORMATION VECTOR
20517 025472         LDB TEMPS
20520 015421         CPB PRADD        STATEMENT EXHAUSTED?
20521 066605         JMP EMRP         YES, GO DO MAT REPLACEMENT
20522 121472         LDA TEMPS,I      NO, GET SECOND OPERAND
20523 027727         LDB B2A
20524 063542         JSM INFOV        ESTABLISH INFORMATION VECTOR
20525 121472         LDA TEMPS,I      THEN GET MAT OPERATOR
20526 070442         SAR 10
20527 000134         ADA M3
20530 066535         JMP MATJ
*
20531 121472 MATX0 LDA TEMPS,I     IDENTIFY SPECIAL NON-FORMULA OPERATOR
20532 045472         ISZ TEMPS
20533 070202         SAR 5
20534 050040         AND .31
20535 022537 MATJ  ADA XTBL1
20536 070016         EXA              BRANCH TO PROPER ROUTINE
20537 066537 XTBL1 JMP *
20540 066722         JMP ETRN    TRN
20541 067110         JMP EINV    INV
20542 066553         JMP EZER    ZER
20543 066550         JMP ECON    CON
20544 066562         JMP EIDN    IDN
*
20545 066671         JMP EADD    +
20546 066673         JMP ESUB    -
20547 065760         JMP EMUL    *
```

```
*  EXECUTE ZER AND CON
*
   20550 063622 ECON   JSM REDIM      REDIMENSION IF NECESSARY
   20551 024004        LDB B10K
   20552 066555        JMP *+3
   20553 063622 EZER   JSM REDIM      REDIMENSION IF NECESSARY
   20554 074742        SBR 16
   20555 061256        JSM CLAR2      SET UP AR2
   20556 035755        STB AR2+1
   20557 063563        JSM COMP2      SET UP BOUNDS INFO
   20560 062611        JSM CMR1       DO THE TRANSFERS
   20561 164172        JMP XEC4A,I    DONE
*

*  EXECUTE IDN
*
   20562 063622 EIDN   JSM REDIM      REDIMENSION IF NECESSARY
   20563 061256        JSM CLAR2      SET UP AR2
   20564 063563        JSM COMP2      SET UP BOUNDS INFO
   20565 011653        CPA T3         CHECK FOR SQUARE MATRIX
   20566 066570        JMP *+2
   20567 067120        JMP MERR5
   20570 062611        JSM CMR1       TRANSFER THE ZEROS
   20571 024004        LDB B10K
   20572 035755        STB AR2+1
   20573 020012        LDA .1         TRANSFER THE ONES
   20574 031646        STA T1
   20575 031652        STA T2
   20576 062464 EID3   JSM STASH
   20577 021646        LDA T1
   20600 011653        CPA T3
   20601 164172        JMP XEC4A,I    DONE
   20602 045646        ISZ T1
   20603 045652        ISZ T2
   20604 066576        JMP EID3
*

*  EXECUTE REPLACEMENT
*
   20605 021642 EMRP   LDA B1+2       CHECK FOR COMPATIBLE DIMENSIONS
   20606 063564        JSM COMP1
   20607 062613        JSM CMR4       DO THE TRANSFERS
   20610 164172        JMP XEC4A,I
*

*  COMMON ROUTINE TO TRANSFER B3 + AR2
*
   20611 022641 CMR1   LDA ERPX
   20612 066617        JMP COMM
*

*  COMMON ROUTINE TO TRANSFER B3 + B1
*
   20613 021641 CMR4   LDA B1+1       CHECK FOR REDUNDANT TRANSFER
   20614 011644        CPA B3+1
   20615 170402        RET
   20616 022640        LDA ETRX
*

*  COMMON ROUTINE MAT EXECUTION (EXCEPT MULTIPLY, INVERSE, & PRINT)
*
*      LDA PAGE ADDRESS OF SOME ROUTINE
*      JSM COMM
*
   20617 031655 COMM   STA T5
   20620 020012        LDA .1         INITIALIZE OUTER LOOP
   20621 031646        STA T1
   20622 020012 COM1   LDA .1         INITIALIZE INNER LOOP
   20623 031652        STA T2
   20624 021655 COM2   LDA T5
   20625 070016        EXA            JSM TO DESIGNATED ROUTINE
   20626 021652        LDA T2
   20627 011654        CPA T4
   20630 066633        JMP *+3
```

```
20631 045652       ISZ T2
20632 066624       JMP COM2
20633 021646       LDA T1
20634 011653       CPA T3
20635 170402       RET
20636 045646       ISZ T1
20637 066622       JMP COM1
*
*
20640 062642 ETRX  JSM *+2
20641 062643 ERPX  JSM *+2
20642 063600       JSM GETI1
20643 066464       JMP STASH
*


* EXECUTE SCALAR MULTIPLY
*
20644 061217 ESMY  JSM FETCH        EVALUATE EXPRESSION
20645 045472       ISZ TEMPS
20646 121472       LDA TEMPS,I
20647 063541       JSM INFO1        ESTABLISH INFORMATION VECTOR
20650 020214       LDA AR2A
20651 027734       LDB TF1A
20652 170004       XFR
20653 021642       LDA B1+2         CHECK FOR COMPATIBLE DIMENSIONS
20654 063564       JSM COMP1
20655 022660       LDA ESMX         DO THE SCALAR MULTIPLY
20656 062617       JSM COMM
20657 164172       JMP XEC4A,I
*
20660 062661 ESMX  JSM *+1
20661 063600       JSM GETI1
20662 020214       LDA AR2A
20663 027735       LDB TF2A
20664 170004       XFR
20665 023734       LDA TF1A
20666 027735       LDB TF2A
20667 160220       JSM .FMPA,I
20670 066464       JMP STASH
*


* EXECUTE ADD AND SUBTRACT
*
20671 020216 EADD  LDA .FADA
20672 066674       JMP *+2
20673 020217 ESUB  LDA .FSBA
20674 031656       STA T6
20675 021642       LDA B1+2         CHECK FOR COMPATIBLE DIMENSIONS
20676 011651       CPA B2+2
20677 066701       JMP *+2
20700 067567       JMP MERR8
20701 063564       JSM COMP1
20702 022705       LDA EASX         DO THE ADD OR SUBTRACT
20703 062617       JSM COMM
20704 164172       JMP XEC4A,I
*
20705 062706 EASX  JSM *+1
20706 063600       JSM GETI1
20707 020214       LDA AR2A
20710 027734       LDB TF1A
20711 170004       XFR
20712 063602       JSM GETI2
20713 020214       LDA AR2A
20714 027735       LDB TF2A
20715 170004       XFR
20716 023734       LDA TF1A
20717 027735       LDB TF2A
20720 161656       JSM T6,I
20721 066464       JMP STASH
*


* EXECUTE TRANSPOSE
*
*     DOES A(I,J) + A(J,I)
*
20722 121472 ETRN  LDA TEMPS,I
20723 063541       JSM INFO1        ESTABLISH INFORMATION VECTOR
20724 063563       JSM COMP2        CHECK FOR COMPATIBLE DIMENSIONS
20725 031656       STA T6
20726 035655       STB T5
20727 021642       LDA B1+2
20730 025642       LDB B1+2
20731 063565       JSM COMPR
20732 011655       CPA T5
20733 066735       JMP *+2
```

```
#01   MATRIX BLOCK

20734 067567          JMP MERRB
20735 015656          CPB T6
20736 066740          JMP *+2
20737 067567          JMP MERRB
20740 022743          LDA ETNX         DO THE TRANSPOSE
20741 062617          JSM COMM
20742 164172          JMP XEC4A,I
*
20743 062744 ETNX     JSM *+1
20744 063600          JSM GETI1
20745 062747          JSM REVRS
20746 062464          JSM STASH
*
20747 021646 REVRS LDA T1          SWAP INDEX POINTERS
20750 025652          LDB T2
20751 031652          STA T2
20752 035646          STB T1
20753 021653          LDA T3
20754 025654          LDB T4
20755 031654          STA T4
20756 035653          STB T3
20757 170402          RET
*
* EXECUTE MULTIPLY
*
* B3(I,K) = SUM B1(I,P)*B2(P,K) FOR P = 1 TO N
*
20760 021642 EMUL     LDA B1+2         CHECK FOR COMPATIBLE DIMENSIONS
20761 025642          LDB B1+2
20762 063565          JSM COMPR        B1 IS (M,N)
20763 031656          STA T6           T6=N
20764 035661          STB T9           T9=M
20765 021651          LDA B2+2
20766 025651          LDB B2+2
20767 063565          JSM COMPR        B2 IS (N,L)
20770 015656          CPB T6
20771 066773          JMP *+2
20772 067567          JMP MERRB        N'S NOT SAME
20773 031656          STA T6           T6=L
20774 035660          STB T8           SAVE N
20775 063563          JSM COMP2        B3 IS (M,L)
20776 015661          CPB T9
20777 067001          JMP *+2
21000 067567          JMP MERRB
21001 011656          CPA T6
21002 067004          JMP *+2
21003 067567          JMP MERRB
21004 061256          JSM CLAR2        ZERO B3
21005 062611          JSM CMR1
21006 021660          LDA T8
21007 031653          STA T3           T3=N
21010 020012          LDA .1           DO THE MULTIPLY
21011 031656          STA T6           T6=I
21012 020012 EML3     LDA .1
21013 031652          STA T2           T2=K
21014 020012 EML4     LDA .1
21015 031646          STA T1           T1=P
21016 063602 EML5     JSM GETI2        B2(P,K)
21017 020214          LDA AR2A
21020 027735          LDB TF2A
21021 170004          XFR
21022 021653          LDA T3           SWAP N,L
21023 025654          LDB T4
21024 031654          STA T4           T4=N
21025 035653          STB T3           T3=L
21026 021656          LDA T6           PERMUTE P,K,I
21027 025646          LDB T1
21030 031646          STA T1           T1=I
21031 021652          LDA T2
21032 035652          STB T2           T2=P
21033 031656          STA T6           T6=K
21034 063600          JSM GETI1        B1(I,P)
21035 020214          LDA AR2A
21036 027734          LDB TF1A
21037 170004          XFR
21040 023734          LDA TF1A
21041 027735          LDB TF2A
21042 160220          JSM .FMPA,I      CALL TO MULTIPLY
21043 020214          LDA AR2A
21044 027735          LDB TF2A
21045 170004          XFR
21046 021653          LDA T3           SWAP L,N
21047 025654          LDB T4
21050 031654          STA T4           T4=L
21051 035653          STB T3           T3=N
21052 021652          LDA T2           SWAP P,K
21053 025656          LDB T6
21054 031656          STA T6           T6=P
21055 035652          STB T2           T2=K
21056 063604          JSM GETI3        B3(I,K)
```

```
21057 020214            LDA AR2A
21060 027734            LDB TF1A
21061 170004            XFR
21062 023734            LDA TF1A
21063 027735            LDB TF2A
21064 160216            JSM .FADA.I     CALL TO ADD
21065 062464            JSM STASH
21066 021646            LDA T1          SWAP I.P
21067 025656            LDB T6
21070 031656            STA T6          T6=I
21071 035646            STB T1          T1=P
21072 015653            CPB T3          CHECK P
21073 067076            JMP *+3
21074 045646            ISZ T1
21075 067016            JMP EML5
21076 021652            LDA T2
21077 011654            CPA T4          CHECK K
21100 067103            JMP *+3
21101 045652            ISZ T2
21102 067014            JMP EML4
21103 021656            LDA T6
21104 011661            CPA T9          CHECK I
21105 164172            JMP XEC4A.I     DONE
21106 045656            ISZ T6
21107 067012            JMP EML3
*
* EXECUTE INVERSE
*
*     USES GAUSS-JORDAN WITH ROW INTERCHANGE
*
21110 021412 EINV       LDA LSTPT       SET UP FOR INVERSE EXECUTION
21111 031656            STA T6
21112 121472            LDA TEMPS.I
21113 063541            JSM INFO1       ESTABLISH INFORMATION VECTOR
21114 021642            LDA B1+2        CHECK FOR COMPATIBLE DIMENSIONS
21115 063564            JSM COMP1
21116 011653            CPA T3
21117 067122            JMP *+3
21120 160205 MERR5      JSM AERRA.I     MATRIX NOT SQUARE
21121 177676            DEC -66
*
21122 063127            JSM XIN2        CALL DET/INV EXECUTION
21123 067736            JMP MER10       SINGULAR MATRIX
21124 021656            LDA T6
21125 031412            STA LSTPT       RESTORE LSTPT
21126 164172            JMP XEC4A.I
*
*
21127 021412 XIN2       LDA LSTPT  .    RESERVE INTERCHANGE VECTOR
21130 031676            STA ADL
21131 001654            ADA T4
21132 031412            STA LSTPT       SAVE NEW LSTPT
21133 060554            JSM BHSTP+1     CHECK FOR OVERLAP
21134 062613            JSM CMR4        COPY B1 INTO B3
21135 020020            LDA ONE         SET DEL = 1.0
21136 027731            LDB DELA
21137 170004            XFR
21140 020012            LDA .1          DO THE INVERSE
21141 031653 EIN1       STA T3          T3=K
21142 070137            LDB A
21143 005676            ADB ADL
21144 074557            STA B.I         L(K)=K
21145 031646            STA T1
21146 031652            STA T2
21147 063604            JSM GETI3
21150 020214            LDA AR2A
21151 027732            LDB BIGA        BIG=A(K,K)
21152 170004            XFR
21153 023732 EIN3       LDA BIGA        SEARCH FOR LARGEST ELEMENT
21154 027734            LDB TF1A
21155 170004            XFR
21156 021630            LDA TF1
21157 070131            SLA *+2,C       FORM ABS(BIG)
21160 031630            STA TF1
21161 063604            JSM GETI3
21162 020214            LDA AR2A
21163 027735            LDB TF2A
21164 170004            XFR
21165 020214            LDA AR2A
21166 027733            LDB HLDA
21167 170004            XFR
21170 021634            LDA TF2
21171 070131            SLA *+2,C       FORM ABS(A(I,K))
21172 031634            STA TF2
21173 023734            LDA TF1A
21174 027735            LDB TF2A
21175 160217            JSM .FSBA.I     ABS(BIG)-ABS(A(I,K))
21176 021754            LDA AR2
21177 070411            SLA *+8
21200 023733            LDA HLDA
```

```
21201 027732        LDB BIGA
21202 170004        XFR             BIG=A(I,K)
21203 021646        LDA T1
21204 025653        LDB T3
21205 005676        ADB ADL
21206 074557        STA B,I         L(K)=I
21207 021646        LDA T1          CHECK I
21210 011654        CPA T4
21211 067214        JMP EEIR
21212 045646        ISZ T1
21213 067153        JMP EIN3
21214 025653 EEIR   LDB T3          INTERCHANGE ROWS
21215 005676        ADB ADL
21216 074517        LDA B,I
21217 011653        CPA T3
21220 067261        JMP DCPV
21221 031655        STA T5          T5=J
21222 020012        LDA .1
21223 031652        STA T2          T2=I
21224 021653 EIN4   LDA T3
21225 031646        STA T1
21226 063604        JSM GETI3
21227 021755        LDA AR2+1       FORM U-
21230 070250        SZA *+5
21231 021754        LDA AR2
21232 072111        SLA *+2,S
21233 070071        SLA *+1,C
21234 031754        STA AR2
21235 020214        LDA AR2A
21236 027733        LDB HLDA        HLD=-A(K,I)
21237 170004        XFR
21240 021655        LDA T5
21241 031646        STA T1
21242 063604        JSM GETI3
21243 021653        LDA T3
21244 031646        STA T1
21245 062464        JSM STASH       A(K,I)=A(J,I)
21246 023733        LDA HLDA
21247 024214        LDB AR2A
21250 170004        XFR
21251 021655        LDA T5
21252 031646        STA T1
21253 062464        JSM STASH       A(J,I)=HLD
21254 021652        LDA T2          CHECK I
21255 011654        CPA T4
21256 067261        JMP DCPV
21257 045652        ISZ T2
21260 067224        JMP EIN4
21261 023732 DCPV   LDA BIGA        DIVIDE COLUMN BY MINUS PIVOT VALUE
21262 027734        LDB TF1A
21263 170004        XFR
21264 021630        LDA TF1
21265 070131        SLA *+2,C       FORM ABS(BIG)
21266 031630        STA TF1
21267 023735        LDA TF2A
21270 170000        CLR
21271 027740        LDB EPSF
21272 035634        STB TF2
21273 024004        LDB B10K
21274 035635        STB TF2+1       TOLERANCE = 1E-48
21275 023734        LDA TF1A
21276 027735        LDB TF2A
21277 160217        JSM .FSBA,I
21300 021754        LDA AR2
21301 070211        SLA *+4
21302 023731        LDA DELA
21303 170000        CLR
21304 170402        RET             SINGULAR MATRIX DETECTED
21305 021653        LDA T3
21306 031652        STA T2          T2=K
21307 020012        LDA .1
21310 031646        STA T1          T1=I
21311 021653 EIN6   LDA T3
21312 011646        CPA T1
21313 067332        JMP EIN7
21314 063604        JSM GETI3
21315 020214        LDA AR2A
21316 027734        LDB TF1A
21317 170004        XFR
21320 023734        LDA TF1A
21321 027732        LDB BIGA
21322 160221        JSM .FDVA,I
21323 021755        LDA AR2+1       FORM U-
21324 070250        SZA *+5
21325 021754        LDA AR2
21326 072111        SLA *+2,S
21327 070071        SLA *+1,C
21330 031754        STA AR2
21331 062464        JSM STASH       A(I,K)=-A(I,K)/BIG
21332 021646 EIN7   LDA T1          CHECK I
```

#01 MATRIX BLOCK

```
21333 011654       CPA T4
21334 067337       JMP REDU
21335 045646       ISZ T1
21336 067311       JMP EIN6
21337 020012 REDU  LDA .1         REDUCE MATRIX
21340 031646       STA T1         T1=I
21341 031655       STA T5         T5=I
21342 021653 EIN8  LDA T3
21343 011646       CPA T1
21344 067411       JMP EIN11
21345 031652       STA T2         T2=K
21346 063604       JSM GETI3
21347 020214       LDA AR2A
21350 027733       LDB HLDA       HLD=A(I,K)
21351 170004       XFR
21352 020012       LDA .1
21353 031652       STA T2         T2=J
21354 021653 EIN9  LDA T3
21355 011652       CPA T2
21356 067404       JMP EIN10
21357 031646       STA T1         T1=K
21360 063604       JSM GETI3
21361 020214       LDA AR2A
21362 027734       LDB TF1A
21363 170004       XFR
21364 023733       LDA HLDA
21365 027734       LDB TF1A
21366 160220       JSM .FMPA,I
21367 020214       LDA AR2A
21370 027734       LDB TF1A       HLD*A(K,J)
21371 170004       XFR
21372 021655       LDA T5
21373 031646       STA T1         T1=I
21374 063604       JSM GETI3
21375 020214       LDA AR2A
21376 027735       LDB TF2A
21377 170004       XFR
21400 023734       LDA TF1A
21401 027735       LDB TF2A
21402 160216       JSM .FADA,I
21403 062464       JSM STASH      A(I,J)=HLD*A(K,J)+A(I,J)
21404 021652 EIN10 LDA T2         CHECK J
21405 011654       CPA T4
21406 067411       JMP *+3
21407 045652       ISZ T2
21410 067354       JMP EIN9
21411 021646 EIN11 LDA T1         CHECK I
21412 011654       CPA T4
21413 067417       JMP *+4
21414 045646       ISZ T1
21415 045655       ISZ T5
21416 067342       JMP EIN8
21417 021653       LDA T3         DIVIDE ROW BY PIVOT
21420 031646       STA T1         T1=K
21421 020012       LDA .1
21422 031652       STA T2         T2=J
21423 021653 EIN12 LDA T3
21424 011652       CPA T2
21425 067436       JMP EIN13
21426 063604       JSM GETI3
21427 020214       LDA AR2A
21430 027734       LDB TF1A
21431 170004       XFR
21432 023734       LDA TF1A
21433 027732       LDB BIGA
21434 160221       JSM .FDVA,I
21435 062464       JSM STASH      A(K,J)=A(K,J)/BIG
21436 021652 EIN13 LDA T2         CHECK J
21437 011654       CPA T4
21440 067443       JMP *+3
21441 045652       ISZ T2
21442 067423       JMP EIN12
21443 023731       LDA DELA       PRODUCT OF PIVOTS
21444 027732       LDB BIGA
21445 160220       JSM .FMPA,I
21446 020214       LDA AR2A
21447 027731       LDB DELA
21450 170004       XFR
21451 023734       LDA TF1A
21452 170030       CLR
21453 024044       LDB B10K
21454 035631       STB TF1+1
21455 023734       LDA TF1A
21456 027732       LDB BIGA
21457 160221       JSM .FDVA,I
21460 021653       LDA T3
21461 031646       STA T1
21462 031652       STA T2
21463 062464       JSM STASH      A(K,K)=1./BIG
21464 021653       LDA T3         CHECK K
21465 011654       CPA T4
```

#01 MATRIX BLOCK

```
21466 067471        JMP *+3
21467 070070        SIA *+1
21470 067141        JMP EINI
21471 055653 EIN14 DSZ T3          FINAL ROW INTERCHANGE
21472 067474        JMP *+2
21473 064357        JMP RETN2      DONE
21474 025653        LDB T3
21475 005676        ADB ADL
21476 074517        LDA B,I
21477 011653        CPA T3
21500 067471        JMP EIN14
21501 031655        STA T5         T5=L(K)
21502 020012        LDA .1
21503 031646        STA T1         T1=J
21504 021653 EIN15 LDA T3
21505 031652        STA T2         T2=K
21506 063604        JSM GETI3
21507 020214        LDA AR2A
21510 027733        LDB HLDA       HLD=A(J,K)
21511 170004        XFR
21512 021655        LDA T5
21513 031652        STA T2         T2=I
21514 063604        JSM GETI3
21515 021755        LDA AR2+1      FORM U-
21516 070250        SZA *+5
21517 021754        LDA AR2
21520 072111        SLA *+2,S
21521 070071        SLA *+1,C
21522 031754        STA AR2
21523 021653        LDA T3
21524 031652        STA T2         T2=K
21525 062464        JSM STASH      A(J,K)=-A(J,I)
21526 021655        LDA T5
21527 031652        STA T2         T2=I
21530 023733        LDA HLDA
21531 024214        LDB AR2A
21532 170004        XFR
21533 062464        JSM STASH      A(J,I)=HLD
21534 021646        LDA T1         CHECK J
21535 011654        CPA T4
21536 067471        JMP EIN14
21537 045646        ISZ T1
21540 067504        JMP EIN15
*
* SUBROUTINE TO EXTRACT ARRAY INFORMATION
*
*     LDA NAME INFORMATION
*     LDB INFORMATION VECTOR ADDRESS
*     JSM INFOV
*
21541 027726 INFOI LDB BIA         ALTERNATE ENTRY FOR BI
21542 035657 INFOV STB T7          TEMPORARY SAVE
21543 050115        AND B1777
21544 160177        JSM SSYMA,I    SEARCH SYMBOL TABLE
21545 164340        JMP E40+1,I    ERROR, NOT FOUND (UNDEFINED OPERAND)
21546 074517        LDA B,I        GET TYPE INFORMATION
21547 050040        AND .31        ISOLATE TYPE-FIELD
21550 070042        SAR 2          LOOK AT SIZE
21551 131657        STA T7,I        AND SAVE IT
21552 045657        ISZ T7
21553 004132        ADB M1
21554 074517        LDA B,I        GET VALUE TABLE ADDRESS
21555 131657        STA T7,I        AND SAVE AS BASE ADDRESS
21556 045657        ISZ T7
21557 000132        ADA M1
21560 070517        LDA A,I        GET ACTUAL DIMENSIONS
21561 131657        STA T7,I        AND SAVE THEM
21562 170402        RET
*
* SUBROUTINE TO EXTRACT AND COMPARE DIMENSIONS OF TWO MATRICES
*
*     LDA DIMENSION INFORMATION #1
*     LDB DIMENSION INFORMATION #2
*     JSM COMPR
*
21563 021645 COMP2 LDA B3+2
21564 025645 COMP1 LDB B3+2
21565 074057 COMPR CPA B           EQUAL?
21566 067571        JMP *+3        YES
21567 160205 MERRH JSM AERRA,I     INCOMPATIBLE DIMENSIONS
21570 177673        DEC -59
21571 074342        SBR 8
21572 074070        SIB *+1
21573 035653        STB T3         SAVE # OF ROWS
21574 050105        AND B377
21575 070070        SIA *+1
21576 031654        STA T4         SAVE # OF COLUMNS
21577 170402        RET
```

#01 MATRIX BLOCK

```
*
* SUBROUTINE TO OBTAIN AN ARRAY ELEMENT
*
* ELEMENT PLACED IN AR2
*
* ROW & COLUMN VALUES ARE IN T1 AND T2
*
*     JSM GETI(N)
*
21600 027726 GETI1 LDB B1A
21601 067605       JMP *+4
21602 027727 GETI2 LDB B2A
21603 067605       JMP *+2
21604 027730 GETI3 LDB B3A
21605 063705       JSM WHERE
21606 074517       LDA B,I          CHECK IF UNDEFINED
21607 010062       CPA FLGBT
21610 164337       JMP E40,I        ERROR, NOT DEFINED (NO VALUE ASSIGNED)
21611 121657       LDA T7,I         FIND TYPE OF ARRAY
21612 072110       RZA *+2
21613 067620       JMP GTRL         REAL
21614 010012       CPA .1
21615 164231       JMP SPLFA,I      SPLIT
21616 074537       LDB B,I
21617 164227       JMP FXFLA,I      INTEGER
21620 074117 GTRL  LDA B
21621 364445       JMP XFAR2+1
*
* SUBROUTINE TO REDIMENSION AN ARRAY
*
21622 021472 REDIM LDA TEMPS
21623 011421       CPA PRADD
21624 170402       RET
21625 063673 REDIR JSM MCKS         GET ROW DIMENSION
21626 035646       STB T1           SAVE TT
21627 024012       LDB .1           LOAD DEFAULT COLUMN COUNT
21630 121472       LDA TEMPS,I      HOW MANY DIMENSIONS?
21631 050065       AND OPMSK
21632 010121       CPA B4000
21633 063673       JSM MCKS
21634 045472       ISZ TEMPS
21635 035652       STB T2           SAVE COLUMN DIMENSION
21636 021646       LDA T1           RECALL ROW DIMENSION
21637 061201       JSM IMPY
21640 031657       STA T7           SAVE NEW PRODUCT
21641 025644       LDB B3+1         RECALL FORMAL DIMENSIONS
21642 004133       ADB M2
21643 074517       LDA B,I
21644 070137       LDB A
21645 050105       AND B377
21646 074342       SBR 8
21647 070070       STA *+1
21650 074070       STB *+1
21651 061201       JSM IMPY         RETURNS WITH FORMAL PRODUCT
21652 070056       CMA
21653 001657       ADA T7           COMPARE WITH NEW PRODUCT
21654 070112       SAM *+2          NEW>OLD?
21655 067703       JMP MERR7        YES, ERROR
21656 021646       LDA T1           NO, ESTABLISH NEW ACTUAL DIMENSIONS
21657 025652       LDB T2
21660 031653       STA T3           FIRST INTO T3 & T4
21661 035654       STB T4
21662 000132       ADA M1
21663 004132       ADB M1
21664 070404       SAL 8            THEN PACK THE DIMENSIONS
21665 074217       IOR B
21666 025644       LDB B3+1         GET VALUE TABLE ADDRESS
21667 004132       ADB M1
21670 074557       STA B,I          STASH PACKED DIMENSIONS
21671 031645       STA B3+2
21672 170402       RET
*
*
21673 061217 MCKS  JSM FETCH        EVALUATE SUBSCRIPT EXPRESSION
21674 160225       JSM FLTRA,I      CONVERT TO ROUNDED INTEGER
21675 067703       JMP MERR7        INTEGER OVERFLOW
21676 074117       LDA B
21677 000132       ADA M1           <1?
21700 070152       SAM *+3          YES
21701 000157       ADA M256         >256?
21702 071412       SAM MCKS-1
21703 160205 MERR7 JSM AERRA,I      NEW DIMENSIONS IMPOSSIBLE
21704 177675       DEC -67
*
* SUBROUTINE TO COMPUTE ADDRESS OF A MATRIX ELEMENT
*
* ROW & COLUMN VALUES ARE IN T1 AND T2 RESPECTIVELY
*
*     LDB INFORMATION VECTOR ADDRESS
*     JSM WHERE
*
```

```
1664* RETURNS WITH ADDRESS IN (A) & (B)
1665*
1666* ADDRESS = BASE+SIZE*(T4*(T1-1)+(T2-1))
1667*
1668  21705 035657 WHERE  STB T7          TEMPORARY SAVE
1669  21706 021646        LDA T1
1670  21707 020132        ADA M1
1671  21710 025654        LDB T4
1672  21711 061201        JSM IMPY        RETURNS WITH T4*(T1-1)
1673  21712 001652        ADA T2
1674  21713 000132        ADA M1
1675  21714 125657        LDB T7,I
1676  21715 076110        RZB *+2
1677  21716 070704        SAL 2
1678  21717 014012        CPB .1
1679  21720 070744        SAL 1
1680  21721 025657        LDB T7
1681  21722 074070        SIB *+1
1682  21723 074417        ADA B,I
1683  21724 070137        LDB A
1684  21725 170402        RET
1686*
1687* MATRIX CONSTANTS
1688*
1689  21726 001640 B1A    DEF B1
1690  21727 001647 B2A    DEF B2
1691  21730 001643 B3A    DEF B3
1692  21731 001662 DELA   DEF DEL
1693  21732 001666 BIGA   DEF BIG
1694  21733 001672 HLDA   DEF HLD
1695  21734 001630 TF1A   DEF TF1
1696  21735 001634 TF2A   DEF TF2
1697*
1698  21736 160205 MER10  JSM AERRA,I     SINGULAR MATRIX
1699  21737 177674        DEC -68
1700*
1701  21740 150000 EPSE   OCT 150000      EXPONENT FOR SINGULARITY TOLERANCE
1702  00025        LEFT   EQU 21766B-*
1703*
1704*
1705  01640               ORG 1640B
1706*
1707  01640 000000 B1     BSS 3           B1 & B3 MUST COME FIRST
1708  01643 000000 B3     BSS 3
1709  01646 000000 T1     NOP
1710  01647 000000 B2     BSS 3
1711  01652 000000 T2     NOP
1712  01653 000000 T3     NOP
1713  01654 000000 T4     NOP
1714  01655 000000 T5     NOP
1715  01656 000000 T6     NOP
1716  01657 000000 T7     NOP
1717  01660 000000 T8     NOP
1718  01661 000000 T9     NOP
1719  01662 000000 DEL    BSS 4
1720  01666 000000 BIG    BSS 4
1721  01672 000000 HLD    BSS 4
1722  01676 000000 ADL    NOP
1723*
1724  01630               ORG 1630B
1725*
1726  01630 000000 TF1    BSS 4
1727  01634 000000 TF2    BSS 4
1728*
1729  01640 070053        SAP *+1         CONVENIENT "NOP" FOR REFERENCE
1731  21766               ORG 21766B
1732*
1733  21766 176455        ABS EMATR-*     MAT READ EXECUTION
1734  21767 176347        ABS EMATP-*     MAT PRINT EXECUTION
1735  21770 176500        ABS EREDM-*     REDIM EXECUTION
1736  21771 176510        ABS EMATX-*     MAT ARITHMETIC EXECUTION
1737  21772 000000        NOP            ** CHECKSUM WORD **
1738*
1739  21773 176030        ABS NFOPT-*     NON-FORMULA OPERATOR TABLE
1740  21774 176041        ABS FUNCT-*     FUNCTION-NAME TABLE
1741  21775 176042        ABS BN777-*     COMMAND-NAME TABLE (NULL TABLE)
1742  21776 176006        ABS SYSNT-*     STATEMENT-NAME TABLE
1743  21777 006000 OPCOD  OCT 6000        MAT OPCODE=3
1744                      END
*  NO ERRORS*
```

CROSS-REFERENCE TABLE

```
.1     0020  0770  0817  0819  0982  1019  1021  1164  1166  1168  1261
       1313  1367  1392  1403  1443  1493  1592  1607  1678
.10    0071  0072
.100   0070
.1000  0069
```

CROSS-REFERENCE TABLE

| | | | | | | | | | | | |
|---|---|---|---|---|---|---|---|---|---|---|---|
| .11 | 0035 | 0043 | | | | | | | | | |
| .12 | 0036 | | | | | | | | | | |
| .13 | 0039 | | | | | | | | | | |
| .15 | 0048 | 0083 | | | | | | | | | |
| .16 | 0049 | 0084 | | | | | | | | | |
| .1E4 | 0068 | | | | | | | | | | |
| .2 | 0027 | | | | | | | | | | |
| .21 | 0050 | | | | | | | | | | |
| .22 | 0051 | 0087 | | | | | | | | | |
| .23 | 0052 | 0088 | | | | | | | | | |
| .28 | 0053 | | | | | | | | | | |
| .3 | 0028 | 0045 | 0668 | 0709 | 0802 | 0803 | | | | | |
| .31 | 0054 | 0090 | 0836 | 0925 | 0944 | 1538 | | | | | |
| .32 | 0055 | | | | | | | | | | |
| .33 | 0056 | | | | | | | | | | |
| .34 | 0057 | 0091 | | | | | | | | | |
| .37 | 0058 | | | | | | | | | | |
| .4 | 0029 | | | | | | | | | | |
| .40 | 0059 | | | | | | | | | | |
| .41 | 0060 | | | | | | | | | | |
| .43 | 0061 | | | | | | | | | | |
| .45 | 0062 | | | | | | | | | | |
| .46 | 0063 | | | | | | | | | | |
| .48 | 0064 | | | | | | | | | | |
| .5 | 0030 | | | | | | | | | | |
| .58 | 0065 | 0094 | | | | | | | | | |
| .6 | 0031 | 0044 | | | | | | | | | |
| .63 | 0066 | | | | | | | | | | |
| .7 | 0032 | 0750 | | | | | | | | | |
| .8 | 0033 | | | | | | | | | | |
| .9 | 0034 | | | | | | | | | | |
| .99 | 0074 | | | | | | | | | | |
| .BUFA | 0180 | | | | | | | | | | |
| .FADA | 0185 | 1070 | 1208 | 1427 | | | | | | | |
| .FDVA | 0188 | 1378 | 1454 | 1473 | | | | | | | |
| .FMPA | 0187 | 1065 | 1190 | 1415 | 1463 | | | | | | |
| .FSBA | 0186 | 1072 | 1291 | 1359 | | | | | | | |
| .FSR | 0190 | | | | | | | | | | |
| .LNUM | 0314 | | | | | | | | | | |
| .NPWR | 0492 | | | | | | | | | | |
| .SLBF | 0181 | | | | | | | | | | |
| A | 0000 | 1263 | 1547 | 1620 | 1683 | | | | | | |
| ACTSA | 0174 | 0595 | 0631 | 0682 | | | | | | | |
| ADL | 1722 | 1253 | 1264 | 1299 | 1308 | 1488 | | | | | |
| ADRSS | 0327 | | | | | | | | | | |
| AERRA | 0176 | 1242 | 1561 | 1653 | 1698 | | | | | | |
| AR1 | 0411 | 0182 | | | | | | | | | |
| AR1A | 0182 | | | | | | | | | | |
| AR2 | 0413 | 0183 | 0966 | 0981 | 1292 | 1318 | 1320 | 1323 | 1360 | 1379 | 1381 |
| | 1384 | 1504 | 1506 | 1509 | | | | | | | |
| AR2A | 0183 | 1049 | 1060 | 1085 | 1089 | 1171 | 1185 | 1191 | 1203 | 1269 | 1280 |
| | 1283 | 1324 | 1334 | 1373 | 1400 | 1410 | 1416 | 1422 | 1449 | 1464 | 1498 |
| | 1516 | | | | | | | | | | |
| ARRI | 0708 | 0614 | 0666 | | | | | | | | |
| ARRID | 0706 | 0576 | 0585 | 0599 | 0639 | 0660 | 0677 | 0744 | | | |
| ARYAD | 0401 | 0613 | 0683 | 0689 | | | | | | | |
| ASSOP | 0508 | 0616 | | | | | | | | | |
| B | 0000 | 0775 | 1265 | 1300 | 1309 | 1489 | 1537 | 1543 | 1559 | 1586 | 1594 |
| | 1596 | 1619 | 1637 | 1640 | 1648 | 1682 | | | | | |
| B1 | 1707 | 0758 | 0766 | 0808 | 0809 | 0995 | 1008 | 1052 | 1074 | 1107 | 1108 |
| | 1140 | 1141 | 1238 | 1689 | | | | | | | |
| B100 | 0095 | | | | | | | | | | |
| B1000 | 0102 | | | | | | | | | | |
| B10K | 0114 | 0115 | 0571 | 0961 | 0980 | 1355 | 1469 | | | | |
| B12K | 0116 | 0117 | 0206 | | | | | | | | |
| B133 | 0096 | | | | | | | | | | |
| B140 | 0097 | | | | | | | | | | |
| B1400 | 0103 | 0204 | | | | | | | | | |
| B17 | 0083 | | | | | | | | | | |
| B170K | 0121 | | | | | | | | | | |
| B1740 | 0104 | 0203 | | | | | | | | | |
| B1760 | 0105 | 0158 | | | | | | | | | |
| B177 | 0098 | | | | | | | | | | |
| B1774 | 0106 | | | | | | | | | | |
| B1775 | 0107 | | | | | | | | | | |
| B1777 | 0108 | 0856 | 0921 | 1534 | | | | | | | |
| B1A | 1689 | 0749 | 0782 | 1532 | 1580 | | | | | | |
| B2 | 1710 | 1075 | 1145 | 1146 | 1690 | | | | | | |
| B20 | 0084 | | | | | | | | | | |
| B22 | 0085 | | | | | | | | | | |
| B23 | 0086 | | | | | | | | | | |
| B2400 | 0110 | | | | | | | | | | |
| B26 | 0087 | | | | | | | | | | |
| B26K | 0553 | 0673 | | | | | | | | | |
| B27 | 0088 | | | | | | | | | | |
| B2A | 1690 | 0934 | 1582 | | | | | | | | |
| B3 | 1708 | 0759 | 0767 | 0774 | 0899 | 1009 | 1557 | 1558 | 1617 | 1638 | 1641 |
| | 1691 | | | | | | | | | | |
| B3000 | 0111 | | | | | | | | | | |
| B36 | 0089 | | | | | | | | | | |
| B37 | 0090 | 0626 | | | | | | | | | |

CROSS-REFERENCE TABLE

| | | | | | | | | | |
|---|---|---|---|---|---|---|---|---|---|
| B377 | 0099 | 1566 | 1621 | | | | | | |
| B3A | 1691 | 0874 | 0897 | 0907 | 0917 | 1594 | | | |
| B400 | 0102 | | | | | | | | |
| B4000 | 0112 | 0162 | 1610 | | | | | | |
| B42 | 0091 | | | | | | | | |
| B44 | 0092 | | | | | | | | |
| B52 | 0093 | | | | | | | | |
| B6K | 0113 | 0167 | | | | | | | |
| B72 | 0094 | | | | | | | | |
| B777 | 0101 | | | | | | | | |
| BADDR | 0291 | 0592 | 0827 | | | | | | |
| BADRP | 0204 | | | | | | | | |
| BEND | 0198 | 0199 | | | | | | | |
| BHSTP | 0442 | 1256 | | | | | | | |
| BIG | 1720 | 1693 | | | | | | | |
| BIGA | 1693 | 1270 | 1273 | 1295 | 1345 | 1377 | 1453 | 1462 | 1472 |
| BLANK | 0386 | | | | | | | | |
| BN777 | 0550 | 1741 | | | | | | | |
| C5 | 0015 | | | | | | | | |
| C6 | 0011 | 0114 | | | | | | | |
| C7 | 0022 | 0100 | | | | | | | |
| CHRSA | 0219 | | | | | | | | |
| CLAR2 | 0489 | 0965 | 0974 | 1160 | | | | | |
| CLERA | 0160 | 0821 | | | | | | | |
| CLINE | 0316 | | | | | | | | |
| CLP1A | 0217 | | | | | | | | |
| CMP1 | 1003 | 0968 | 0979 | 1161 | | | | | |
| CMP4 | 1008 | 0997 | 1257 | | | | | | |
| COM1 | 1021 | 1034 | | | | | | | |
| COM2 | 1023 | 1029 | | | | | | | |
| COMCE | 0434 | 0580 | 0603 | | | | | | |
| COMCK | 0433 | 0723 | | | | | | | |
| COMM | 1018 | 0882 | 1004 | 1055 | 1080 | 1117 | | | |
| COMMA | 0507 | 0588 | | | | | | | |
| COMP1 | 1558 | 0760 | 0996 | 1053 | 1078 | 1239 | | | |
| COMP2 | 1557 | 0880 | 0967 | 0975 | 1104 | 1153 | | | |
| COMPR | 1559 | 0810 | 1109 | 1142 | 1147 | | | | |
| CONST | 0482 | | | | | | | | |
| CPLAC | 0331 | | | | | | | | |
| CRCKA | 0228 | | | | | | | | |
| CRLF | 0495 | | | | | | | | |
| CPLF1 | 0496 | 0843 | 0844 | 0851 | 0860 | | | | |
| CRTN | 0037 | 0038 | 0039 | | | | | | |
| CTYPE | 0330 | | | | | | | | |
| DCOMA | 0210 | | | | | | | | |
| DCPV | 1345 | 1311 | 1341 | | | | | | |
| DEL | 1719 | 1692 | | | | | | | |
| DELA | 1692 | 0785 | 1259 | 1362 | 1461 | 1465 | | | |
| DELSA | 0175 | | | | | | | | |
| DETT | 0736 | 0513 | | | | | | | |
| DETX | 0749 | 0737 | | | | | | | |
| DFLAG | 0388 | | | | | | | | |
| DIGCK | 0461 | | | | | | | | |
| DPERR | 0043 | | | | | | | | |
| DROST | 0317 | | | | | | | | |
| DSTRT | 0303 | | | | | | | | |
| E | 0080 | | | | | | | | |
| E1 | 0235 | | | | | | | | |
| E10 | 0244 | 0589 | | | | | | | |
| E15 | 0249 | 0602 | | | | | | | |
| E20 | 0254 | | | | | | | | |
| E25 | 0259 | 0611 | 0707 | | | | | | |
| E30 | 0264 | 0617 | 0649 | 0659 | 0671 | 0686 | 0693 | | |
| E35 | 0269 | | | | | | | | |
| E40 | 0274 | 1536 | 1588 | | | | | | |
| E45 | 0279 | | | | | | | | |
| E5 | 0239 | | | | | | | | |
| E50 | 0284 | | | | | | | | |
| EADD | 1070 | 0954 | | | | | | | |
| EASX | 1083 | 1079 | | | | | | | |
| ECALA | 0215 | | | | | | | | |
| ECON | 0960 | 0951 | | | | | | | |
| EEIR | 1307 | 1303 | | | | | | | |
| EID3 | 0985 | 0991 | | | | | | | |
| EIDN | 0973 | 0952 | | | | | | | |
| EIN1 | 1262 | 1482 | | | | | | | |
| EIN10 | 1429 | 1407 | | | | | | | |
| EIN11 | 1434 | 1397 | | | | | | | |
| EIN12 | 1445 | 1460 | | | | | | | |
| EIN13 | 1456 | 1447 | | | | | | | |
| EIN14 | 1484 | 1491 | 1521 | | | | | | |
| EIN15 | 1495 | 1523 | | | | | | | |
| EIN3 | 1273 | 1305 | | | | | | | |
| EIN4 | 1315 | 1343 | | | | | | | |
| EIN6 | 1369 | 1390 | | | | | | | |
| EIN7 | 1386 | 1371 | | | | | | | |
| EIN8 | 1395 | 1439 | | | | | | | |
| EIN9 | 1405 | 1433 | | | | | | | |
| EINV | 1234 | 0949 | | | | | | | |
| ELINA | 0169 | 0834 | | | | | | | |

CROSS-REFERENCE TABLE

| | | | | | | | | | | | |
|---|---|---|---|---|---|---|---|---|---|---|---|
| EMATP | 0793 | 1734 | | | | | | | | | |
| EMATR | 0872 | 0886 | 1733 | | | | | | | | |
| EMATX | 0915 | 1736 | | | | | | | | | |
| EML3 | 1166 | 1227 | | | | | | | | | |
| EML4 | 1168 | 1222 | | | | | | | | | |
| EML5 | 1170 | 1217 | | | | | | | | | |
| EMRP | 0995 | 0932 | | | | | | | | | |
| EMRX | 0888 | 0881 | | | | | | | | | |
| EMUL | 1140 | 0956 | | | | | | | | | |
| ENDS | 0478 | | | | | | | | | | |
| ENTEA | 0218 | | | | | | | | | | |
| ENTFA | 0189 | | | | | | | | | | |
| EOL | 0038 | 0678 | | | | | | | | | |
| EOLCK | 0481 | 0579 | 0586 | 0667 | 0731 | | | | | | |
| EOST | 0479 | 0642 | 0661 | 0687 | | | | | | | |
| EPSE | 1701 | 1353 | | | | | | | | | |
| EREDM | 0905 | 0913 | 1735 | | | | | | | | |
| ERPX | 1038 | 1003 | | | | | | | | | |
| ERRA | 0177 | | | | | | | | | | |
| ESMX | 1058 | 1054 | | | | | | | | | |
| ESMY | 1045 | 0927 | | | | | | | | | |
| ESUB | 1072 | 0955 | | | | | | | | | |
| ETNX | 1120 | 1116 | | | | | | | | | |
| ETRN | 1102 | 0948 | | | | | | | | | |
| ETRX | 1037 | 1011 | | | | | | | | | |
| EXP | 0399 | 0400 | | | | | | | | | |
| EXPOP | 0118 | | | | | | | | | | |
| EZER | 0963 | 0950 | | | | | | | | | |
| F | 0081 | | | | | | | | | | |
| FDAAA | 0222 | 0889 | | | | | | | | | |
| FETCH | 0486 | 1045 | 1645 | | | | | | | | |
| FILLA | 0201 | 0833 | | | | | | | | | |
| FIRST | 0365 | | | | | | | | | | |
| FIX | 0499 | | | | | | | | | | |
| FLGBT | 0073 | 1587 | | | | | | | | | |
| FLOAT | 0384 | 0824 | | | | | | | | | |
| FLTFA | 0193 | | | | | | | | | | |
| FLTRA | 0192 | 1646 | | | | | | | | | |
| FLTSA | 0195 | | | | | | | | | | |
| FN | 0148 | | | | | | | | | | |
| FND | 0460 | | | | | | | | | | |
| FND1A | 0224 | | | | | | | | | | |
| FNDAA | 0223 | | | | | | | | | | |
| FNDPS | 0474 | | | | | | | | | | |
| FOPBS | 0206 | | | | | | | | | | |
| FORMA | 0172 | | | | | | | | | | |
| FORME | 0336 | | | | | | | | | | |
| FORMS | 0335 | | | | | | | | | | |
| FORMT | 0334 | | | | | | | | | | |
| FPAGE | 0449 | | | | | | | | | | |
| FROMA | 0122 | | | | | | | | | | |
| FSCA | 0173 | 0655 | 0722 | 0725 | | | | | | | |
| FSCE2 | 0439 | | | | | | | | | | |
| FSCE4 | 0444 | | | | | | | | | | |
| FTMP1 | 0337 | | | | | | | | | | |
| FTMP2 | 0338 | | | | | | | | | | |
| FUNCT | 0547 | 1740 | | | | | | | | | |
| FWAM | 0157 | | | | | | | | | | |
| FWUP | 0296 | | | | | | | | | | |
| FXFLA | 0194 | 1595 | | | | | | | | | |
| GETAD | 0459 | | | | | | | | | | |
| GETCH | 0469 | | | | | | | | | | |
| GETI1 | 1580 | 0822 | 1039 | 1059 | 1084 | 1121 | 1184 | | | | |
| GETI2 | 1582 | 1088 | 1170 | | | | | | | | |
| GETI3 | 1584 | 1202 | 1268 | 1279 | 1317 | 1329 | 1372 | 1399 | 1409 | 1421 | 1448 |
| | 1497 | 1503 | | | | | | | | | |
| GETSK | 0473 | 0590 | 0630 | | | | | | | | |
| GFLAG | 0402 | | | | | | | | | | |
| GFRST | 0472 | | | | | | | | | | |
| GNEXT | 0471 | 0565 | 0618 | 0637 | 0742 | | | | | | |
| GPARM | 0422 | | | | | | | | | | |
| GSIGN | 0484 | | | | | | | | | | |
| GTCON | 0498 | | | | | | | | | | |
| GTMP | 0470 | | | | | | | | | | |
| GTOPP | 0464 | | | | | | | | | | |
| GTRL | 1596 | 1591 | | | | | | | | | |
| GTSTA | 0213 | | | | | | | | | | |
| HFLG1 | 0321 | | | | | | | | | | |
| HLD | 1721 | 1694 | | | | | | | | | |
| HLDA | 1694 | 1284 | 1294 | 1325 | 1333 | 1401 | 1413 | 1499 | 1515 | | |
| HSTPT | 0302 | | | | | | | | | | |
| I | 0067 | | | | | | | | | | |
| ICNT | 0420 | | | | | | | | | | |
| IO | 0513 | 0554 | 0554 | 0696 | 0696 | | | | | | |
| IMPY | 0485 | 0765 | 1615 | 1625 | 1672 | | | | | | |
| INF | 0077 | | | | | | | | | | |
| INFO1 | 1532 | 0757 | 0797 | 0929 | 1048 | 1103 | 1237 | | | | |
| INFOV | 1533 | 0875 | 0908 | 0918 | 0935 | | | | | | |
| INITS | 0454 | | | | | | | | | | |
| INREA | 0226 | | | | | | | | | | |

CROSS-REFERENCE TABLE

| | | | | | | | | | | | |
|---|---|---|---|---|---|---|---|---|---|---|---|
| INTCK | 0457 | | | | | | | | | | |
| INTEA | 0178 | | | | | | | | | | |
| INTFL | 0075 | | | | | | | | | | |
| INTGR | 0400 | | | | | | | | | | |
| IOBUF | 0357 | | | | | | | | | | |
| IOHEA | 0229 | | | | | | | | | | |
| IOSTA | 0225 | | | | | | | | | | |
| KEYFG | 0324 | | | | | | | | | | |
| L2T1 | 0345 | | | | | | | | | | |
| L2T2 | 0346 | | | | | | | | | | |
| LASTN | 0396 | | | | | | | | | | |
| LBOP | 0119 | 0720 | 0878 | | | | | | | | |
| LDFF | 0487 | | | | | | | | | | |
| LEFT | 1702 | | | | | | | | | | |
| LFTCK | 0462 | 0647 | | | | | | | | | |
| LHSC | 0683 | 0643 | | | | | | | | | |
| LIMIT | 0463 | | | | | | | | | | |
| LISTA | 0167 | | | | | | | | | | |
| LN72 | 0867 | 0814 | | | | | | | | | |
| LNFD | 0072 | | | | | | | | | | |
| LNINC | 0315 | | | | | | | | | | |
| LNUM | 0455 | | | | | | | | | | |
| LOCL1 | 0343 | | | | | | | | | | |
| LOCL2 | 0344 | | | | | | | | | | |
| LPCK | 0435 | 0718 | | | | | | | | | |
| LPCKE | 0436 | 0638 | 0654 | 0743 | | | | | | | |
| LPOP | 0120 | | | | | | | | | | |
| LROMA | 0123 | | | | | | | | | | |
| LSTAK | 0299 | | | | | | | | | | |
| LSTPT | 0301 | 0752 | 0772 | 0780 | 1234 | 1248 | 1252 | 1255 | | | |
| LTR | 0477 | 0610 | 0645 | 0706 | | | | | | | |
| LWAM | 0295 | | | | | | | | | | |
| M1 | 0124 | 0691 | 0812 | 1542 | 1546 | 1634 | 1635 | 1639 | 1649 | 1670 | 1674 |
| M10 | 0131 | | | | | | | | | | |
| M100 | 0144 | | | | | | | | | | |
| M1024 | 0146 | | | | | | | | | | |
| M11 | 0132 | | | | | | | | | | |
| M12 | 0133 | | | | | | | | | | |
| M13 | 0134 | | | | | | | | | | |
| M14 | 0135 | | | | | | | | | | |
| M15 | 0136 | | | | | | | | | | |
| M2 | 0125 | 1618 | | | | | | | | | |
| M23 | 0137 | | | | | | | | | | |
| M25 | 0138 | | | | | | | | | | |
| M256 | 0145 | 1651 | | | | | | | | | |
| M3 | 0126 | 0628 | 0938 | | | | | | | | |
| M32 | 0139 | | | | | | | | | | |
| M36 | 0140 | | | | | | | | | | |
| M4 | 0127 | | | | | | | | | | |
| M48 | 0141 | | | | | | | | | | |
| M5 | 0128 | | | | | | | | | | |
| M6 | 0129 | | | | | | | | | | |
| M64 | 0142 | | | | | | | | | | |
| M7 | 0552 | 0779 | | | | | | | | | |
| M83 | 0143 | | | | | | | | | | |
| M9 | 0130 | | | | | | | | | | |
| MASK1 | 0153 | | | | | | | | | | |
| MASK5 | 0154 | | | | | | | | | | |
| MATJ | 0945 | 0939 | | | | | | | | | |
| MATS | 0559 | 0516 | | | | | | | | | |
| MATS0 | 0585 | 0572 | 0593 | | | | | | | | |
| MATS1 | 0576 | 0581 | | | | | | | | | |
| MATS2 | 0609 | 0569 | | | | | | | | | |
| MATS3 | 0637 | 0629 | | | | | | | | | |
| MATS4 | 0654 | 0646 | | | | | | | | | |
| MATS5 | 0665 | 0648 | | | | | | | | | |
| MATS6 | 0676 | 0694 | | | | | | | | | |
| MATS7 | 0689 | 0674 | | | | | | | | | |
| MATS8 | 0645 | 0623 | | | | | | | | | |
| MATSB | 0718 | 0577 | 0600 | 0632 | | | | | | | |
| MATX0 | 0941 | 0926 | | | | | | | | | |
| MATX1 | 0929 | 0922 | | | | | | | | | |
| MAW | 0294 | | | | | | | | | | |
| MAXIN | 0398 | | | | | | | | | | |
| MAKSN | 0147 | | | | | | | | | | |
| MBTN1 | 0404 | | | | | | | | | | |
| MBTN2 | 0405 | | | | | | | | | | |
| HOX1 | 0349 | | | | | | | | | | |
| CKS | 1645 | 1605 | 1611 | 1652 | | | | | | | |
| DTMA | 0208 | | | | | | | | | | |
| ER10 | 1698 | 1246 | | | | | | | | | |
| ERB | 0443 | | | | | | | | | | |
| ERR5 | 1242 | 0763 | 0978 | | | | | | | | |
| ERR7 | 1653 | 1629 | 1647 | | | | | | | | |
| ERR8 | 1561 | 1077 | 1112 | 1115 | 1150 | 1156 | 1159 | | | | |
| INIT | 0453 | | | | | | | | | | |
| ODE | 0305 | 0736 | 0793 | 0825 | 0864 | | | | | | |
| OVST | 0788 | 0751 | | | | | | | | | |
| SFLG | 0387 | | | | | | | | | | |
| TP1 | 0819 | 0850 | | | | | | | | | |
| TP2 | 0822 | 0842 | 0861 | | | | | | | | |

CROSS-REFERENCE TABLE

| | | | | | | | | | | |
|---|---|---|---|---|---|---|---|---|---|---|
| MTP3 | 0795 | 0858 | | | | | | | | |
| MTPX | 0863 | 0837 | 0854 | 0857 | | | | | | |
| MVTOH | 0475 | | | | | | | | | |
| NDTSP | 0380 | | | | | | | | | |
| NOWRT | 0494 | | | | | | | | | |
| NEXTI | 0448 | | | | | | | | | |
| NEXTA | 0465 | | | | | | | | | |
| NEXTL | 0447 | | | | | | | | | |
| NEOPA | 0554 | 0620 | | | | | | | | |
| NEOPT | 0536 | 0554 | 0554 | 1739 | | | | | | |
| NMOTA | 0200 | 0826 | | | | | | | | |
| NOFOF | 0480 | 0633 | 0680 | | | | | | | |
| NPRIN | 0381 | | | | | | | | | |
| NPWRT | 0493 | | | | | | | | | |
| NUM | 0394 | 0395 | 0559 | | | | | | | |
| NUMCA | 0211 | | | | | | | | | |
| NUMOA | 0212 | | | | | | | | | |
| NXTDT | 0304 | | | | | | | | | |
| NXTST | 0403 | | | | | | | | | |
| OBLNK | 0466 | | | | | | | | | |
| ODGIT | 0490 | | | | | | | | | |
| ONE | 0045 | 1258 | | | | | | | | |
| ONEXT | 0467 | | | | | | | | | |
| OPCHA | 0171 | | | | | | | | | |
| OPCOD | 1743 | 0739 | | | | | | | | |
| OPDMK | 0079 | | | | | | | | | |
| OPMSK | 0076 | 0877 | 1609 | | | | | | | |
| OPTYP | 0395 | | | | | | | | | |
| OTPTR | 0293 | | | | | | | | | |
| OUTCR | 0468 | | | | | | | | | |
| OUTIA | 0179 | | | | | | | | | |
| OVCHA | 0216 | | | | | | | | | |
| OVFW | 0860 | 0829 | | | | | | | | |
| PARMA | 0306 | | | | | | | | | |
| PARMN | 0307 | | | | | | | | | |
| PBPTO | 0313 | | | | | | | | | |
| PBPTR | 0310 | | | | | | | | | |
| PBUFF | 0311 | | | | | | | | | |
| PBUFO | 0312 | | | | | | | | | |
| PEND | 0363 | 0815 | 0828 | | | | | | | |
| PEXMA | 0165 | | | | | | | | | |
| PFLAG | 0389 | 0676 | 0681 | | | | | | | |
| PGIN0 | 0476 | | | | | | | | | |
| PGINT | 0456 | | | | | | | | | |
| PI/2 | 0044 | | | | | | | | | |
| PLACE | 0382 | 0613 | | | | | | | | |
| PLUS | [illegible] | 0670 | | | | | | | | |
| PMODE | 0329 | | | | | | | | | |
| PPFF | 0364 | | | | | | | | | |
| [illegible] | 0388 | 0805 | 0853 | 0884 | 0911 | 0931 | 1603 | | | |
| [illegible] | 0332 | 0601 | | | | | | | | |
| QTCHA | 0230 | | | | | | | | | |
| QTOP | 0129 | 0161 | | | | | | | | |
| [illegible] | 0536 | 0507 | 0508 | 0509 | 0510 | | | | | |
| [illegible] | 117 | 0728 | | | | | | | | |
| [illegible] | 0358 | 0867 | 0867 | | | | | | | |
| [illegible] | 0333 | | | | | | | | | |
| RDYDA | 0166 | | | | | | | | | |
| [illegible] | 1642 | 0960 | 0963 | 0973 | | | | | | |
| [illegible] | 1645 | 0879 | 0909 | | | | | | | |
| REOS | 0594 | 0515 | 0604 | | | | | | | |
| REDU | 1392 | 1388 | | | | | | | | |
| REED | 0161 | | | | | | | | | |
| RES | 0415 | | | | | | | | | |
| RESBI | 0451 | | | | | | | | | |
| RESBP | 0452 | | | | | | | | | |
| RET2 | 0419 | | | | | | | | | |
| RETN2 | 0418 | 0719 | 1486 | | | | | | | |
| RETN3 | 0417 | 0746 | | | | | | | | |
| REVRS | 1125 | 1122 | | | | | | | | |
| RPCK | 0437 | | | | | | | | | |
| RPCKE | 0438 | 0640 | 0656 | 0726 | 0745 | | | | | |
| RPOP | 0115 | | | | | | | | | |
| RSAVE | 0292 | | | | | | | | | |
| RSLTE | 0371 | | | | | | | | | |
| RSPTR | 0416 | | | | | | | | | |
| RSTAK | 0414 | | | | | | | | | |
| RSTKA | 0158 | | | | | | | | | |
| RSULT | 0424 | | | | | | | | | |
| RUNA | 0163 | | | | | | | | | |
| S | 0082 | | | | | | | | | |
| SALTA | 0207 | | | | | | | | | |
| SAVBP | 0450 | | | | | | | | | |
| SAVEA | 0325 | | | | | | | | | |
| SAVEB | 0326 | | | | | | | | | |
| SHADR | 0392 | | | | | | | | | |
| SBPTR | 0385 | 0564 | 0570 | 0594 | 0609 | 0612 | 0619 | 0624 | 0665 | 0721 | 0727 |
| | 0729 | 0730 | 0740 | 0741 | | | | | | |
| SHPUD | 0429 | | | | | | | | | |
| SBUFA | 0199 | | | | | | | | | |

CROSS-REFERENCE TABLE

| | | | | | | | | | | | |
|---|---|---|---|---|---|---|---|---|---|---|---|
| SEC | 0320 | | | | | | | | | | |
| SFLAG | 0391 | | | | | | | | | | |
| SGNS | 0491 | | | | | | | | | | |
| SIGN | 0397 | 0398 | | | | | | | | | |
| SLCOD | 0328 | | | | | | | | | | |
| SLEND | 0202 | | | | | | | | | | |
| SLWST | 0445 | | | | | | | | | | |
| SNFLA | 0197 | | | | | | | | | | |
| SPLFA | 0196 | 1593 | | | | | | | | | |
| SSBPT | 0393 | | | | | | | | | | |
| SSYMA | 0170 | 1535 | | | | | | | | | |
| ST | 0375 | | | | | | | | | | |
| START | 0162 | 0007 | | | | | | | | | |
| STASH | 0897 | 0985 | 1040 | 1066 | 1095 | 1123 | 1209 | 1332 | 1338 | 1385 | 1428 |
| | 1455 | 1477 | 1512 | 1518 | | | | | | | |
| STEXP | 0441 | 0622 | | | | | | | | | |
| STOR1 | 0426 | | | | | | | | | | |
| STORE | 0425 | 0900 | | | | | | | | | |
| STPFL | 0323 | 0835 | | | | | | | | | |
| STROP | 0428 | 0710 | | | | | | | | | |
| STSRH | 0440 | 0568 | | | | | | | | | |
| SUBTA | 0696 | 0566 | | | | | | | | | |
| SUBTB | 0697 | 0696 | 0696 | | | | | | | | |
| SUMPA | 0227 | | | | | | | | | | |
| SYF12 | 0483 | | | | | | | | | | |
| SYF25 | 0458 | | | | | | | | | | |
| SYMC1 | 0431 | 0615 | 0657 | | | | | | | | |
| SYMC2 | 0430 | 0587 | | | | | | | | | |
| SYMCK | 0432 | 0669 | | | | | | | | | |
| SYMTP | 0298 | | | | | | | | | | |
| SYSNT | 0519 | 1742 | | | | | | | | | |
| SYTSA | 0209 | | | | | | | | | | |
| T1 | 1709 | 0818 | 0846 | 0849 | 0983 | 0986 | 0989 | 1020 | 1030 | 1033 | 1125 |
| | 1128 | 1169 | 1179 | 1180 | 1210 | 1213 | 1216 | 1266 | 1297 | 1301 | 1304 |
| | 1316 | 1328 | 1331 | 1337 | 1368 | 1370 | 1386 | 1389 | 1393 | 1396 | 1408 |
| | 1420 | 1434 | 1437 | 1442 | 1475 | 1494 | 1519 | 1522 | 1606 | 1614 | 1630 |
| | 1669 | | | | | | | | | | |
| T2 | 1711 | 0820 | 0838 | 0841 | 0984 | 0990 | 1022 | 1025 | 1028 | 1126 | 1127 |
| | 1167 | 1181 | 1182 | 1198 | 1201 | 1218 | 1221 | 1267 | 1314 | 1339 | 1342 |
| | 1366 | 1398 | 1404 | 1406 | 1429 | 1432 | 1444 | 1446 | 1456 | 1459 | 1476 |
| | 1496 | 1502 | 1511 | 1514 | 1613 | 1631 | 1673 | | | | |
| T3 | 1712 | 0761 | 0847 | 0976 | 0987 | 1031 | 1129 | 1132 | 1163 | 1174 | 1177 |
| | 1194 | 1197 | 1214 | 1240 | 1262 | 1298 | 1307 | 1310 | 1315 | 1330 | 1365 |
| | 1369 | 1395 | 1405 | 1441 | 1445 | 1474 | 1478 | 1484 | 1487 | 1490 | 1495 |
| | 1510 | 1565 | 1632 | | | | | | | | |
| T4 | 1713 | 0839 | 1026 | 1130 | 1131 | 1175 | 1176 | 1195 | 1196 | 1219 | 1254 |
| | 1302 | 1340 | 1387 | 1430 | 1435 | 1457 | 1479 | 1520 | 1569 | 1633 | 1671 |
| T5 | 1714 | 0807 | 0832 | 1018 | 1023 | 1106 | 1110 | 1312 | 1327 | 1336 | 1394 |
| | 1419 | 1438 | 1492 | 1501 | 1513 | | | | | | |
| T6 | 1715 | 0753 | 0778 | 0794 | 0863 | 1073 | 1094 | 1105 | 1113 | 1143 | 1148 |
| | 1151 | 1157 | 1165 | 1178 | 1183 | 1199 | 1200 | 1211 | 1212 | 1223 | 1226 |
| | 1235 | 1247 | | | | | | | | | |
| T7 | 1716 | 1533 | 1540 | 1541 | 1544 | 1545 | 1548 | 1589 | 1616 | 1627 | 1668 |
| | 1675 | 1680 | | | | | | | | | |
| T8 | 1717 | 0562 | 0567 | 0621 | 1152 | 1162 | | | | | |
| T9 | 1718 | 0627 | 0641 | 1144 | 1154 | 1224 | | | | | |
| TEMP | 0348 | 0349 | 0685 | 0692 | 0712 | | | | | | |
| TEMP1 | 0350 | 0708 | | | | | | | | | |
| TEMP2 | 0351 | 0713 | | | | | | | | | |
| TEMP3 | 0352 | | | | | | | | | | |
| TEMP4 | 0353 | | | | | | | | | | |
| TEMPS | 0347 | 0754 | 0755 | 0756 | 0795 | 0796 | 0798 | 0804 | 0852 | 0855 | 0872 |
| | 0873 | 0876 | 0883 | 0905 | 0906 | 0910 | 0915 | 0916 | 0919 | 0920 | 0923 |
| | 0930 | 0933 | 0936 | 0941 | 0942 | 1046 | 1047 | 1102 | 1236 | 1602 | 1608 |
| | 1612 | | | | | | | | | | |
| TERM | 0362 | | | | | | | | | | |
| TF1 | 1726 | 1276 | 1278 | 1348 | 1350 | 1470 | 1695 | | | | |
| TF1A | 1695 | 1050 | 1063 | 1086 | 1092 | 1186 | 1188 | 1204 | 1206 | 1274 | 1289 |
| | 1346 | 1357 | 1374 | 1376 | 1411 | 1414 | 1417 | 1425 | 1450 | 1452 | 1467 |
| | 1471 | | | | | | | | | | |
| TF2 | 1727 | 1286 | 1288 | 1354 | 1356 | 1696 | | | | | |
| TF2A | 1696 | 1061 | 1064 | 1090 | 1093 | 1172 | 1189 | 1192 | 1207 | 1281 | 1290 |
| | 1351 | 1358 | 1423 | 1426 | | | | | | | |
| TFLAG | 0318 | | | | | | | | | | |
| TFLG1 | 0322 | | | | | | | | | | |
| TIMES | 0510 | 0658 | | | | | | | | | |
| TMPA | 0203 | | | | | | | | | | |
| TMPOP | 0184 | | | | | | | | | | |
| TREGE | 0370 | | | | | | | | | | |
| TSPHA | 0168 | | | | | | | | | | |
| TSTPT | 0300 | | | | | | | | | | |
| TTY | 0497 | | | | | | | | | | |
| TYPFL | 0078 | | | | | | | | | | |
| UFLAG | 0390 | | | | | | | | | | |
| UKPTR | 0309 | | | | | | | | | | |
| UNITS | 0319 | | | | | | | | | | |
| UNSTK | 0446 | | | | | | | | | | |
| UPARA | 0191 | | | | | | | | | | |
| VALUF | 0297 | | | | | | | | | | |
| VAROA | 0214 | | | | | | | | | | |

CROSS-REFFRENCE TABLE

```
WBUFF   0421
WHERE   1668     0898     1585
WIDTH   0383
WRITE   0159
XC      0410     0831
XEC4A   0164     0865     0885     0912     0969     0988     0998     1056     1081     1118     1225
        1249
XEC6A   0221
XFAR1   0423
XFAR2   0427     0786     1597
XIN2    1252     0776     1245
XSCRA   0220
XT9L1   0947     0945
YC      0412
ZAP     0152
ZONK    0488
```

#01 STRING OPTION BLOCK

```
                          LST

     22000          ORG 22000B


         LINKS FOR THE MAIN SYSTEM AND
         OTHER OPTION BLOCKS


     22000 066006 ID1    JMP MSL        MAIN SYSTEM LINK
     22001 066034        JMP SVARO
     22002 067357        JMP GADD
     22003 067421        JMP PSTR
     22004 066610        JMP TRSTR
     22005 067334        JMP .FDA1



         EVALUATE A STRING VARIABLE
         FOR THE PRINT ROUTINE

         UPON EXIT:

           B=STRING STARTING ADDRESS
           A=STRING LENGTH
           RETURN TO P+2

     22006 063357 MSL    JSM GADD       GET STRING ADDRESS
     22007 024133        LDB M2         EVALUATE SOURCE
     22010 063421        JSM PSTR         STRING
     22011 035471        STB L2T2
     22012 074117        LDA B          PUT COUNT IN A
     22013 025742        LDB TMP2       CHAR POINTER IN B
     22014 064357        JMP RETN2      RETURN TO P+2


         LET STATEMENT SYNTAX
         LOOK FOR SOURCE STRING =

     22015 062340 LETS   JSM SAVEP
     22016 062034        JSM SVARO      VARIABLE?
     22017 066064        JMP ABORT      NO
     22020 066064        JMP ABORT      NUMERIC
     22021 060463        JSM SYMC1      STRING
     22022 012020        OCT 12020      =?
     22023 164325        JMP E30,I      NO



         LOOK FOR A DESTINATION STRING


     22024 062034 LTSYM  JSM SVARO      VARIABLE?
     22025 066030        JMP QUOCK      NO, LOOK FOR QUOTE FEILD
     22026 164312        JMP E20-1,I    NUMERIC
     22027 065151        JMP EOST       YES, DEMAND END
     22030 045706 QUOCK  ISZ SBPTR
     22031 160245        JSM GTSTA,I    GET A STRING CONSTANT
     22032 065151        JMP EOST





         SVARO SUBROUTINE

           EXIT CONDITIONS:

             RETURN TO:
               P+1  NO VARIABLE FOUND
               P+2  NUMERIC VARIABLE
               P+3  STRING VARIABLE
```

#01 STRING OPTION BLOCK

```
*
22033 062340       JSM SAVEP      SAVE PAGE
22034 061140 SVARO JSM LTR        LETTER?
22035 170402       RET            NO
22036 010077       CPA B44        $?
22037 066041       JMP *+2        YES
22040 064357       JMP RETN2      NO
22041 045644       ISZ ST+4       SET STRING OCCURRED FLAG
22042 163610       JSM STRI2,I    STORE OPERAND
22043 060513       JSM LPCK       (?
22044 064356       JMP RETN3      NO
22045 020125       LDA LBOP
22046 131706       STA SBPTR,I    RECORD RIGHT BRACKET
22047 020026       LDA .9
22050 031710       STA MSFLG      ENABLE LOGICL =
22051 160202       JSM FSCA,I     GET FIRST INDEX
22052 060463       JSM SYMC1      LOOK FOR A COMMA
22053 012001       OCT 12001
22054 066056       JMP *+2        NOT FOUND
22055 160202       JSM FSCA,I     FOUND
22056 060534       JSM RPCKE      DEMAND RIGHT PAREN
22057 024123       LDB RBOP
22060 055706       DSZ SBPTR
22061 135706       STB SBPTR,I    RECORD A RIGHT BRACKET
22062 045706       ISZ SBPTR
22063 064356       JMP RETN3      YES
*
*    THIS ROUTINE RETURNS SYNTAX CONTROL TO OTHER
*    OPTION BLOCKS AND THE MAIN SYSTEM
*
*
22064 061064 ABORT JSM GFRST+2
22065 061055 AB3   JSM GNEXT      GET NEXT SYNTAX CHAR
22066 025416       LDB MODE
22067 074151       SLB *+3        CALC MODE?
22070 024233       LDB SBUFA
22071 066077       JMP AB1        YES
22072 060750       JSM DIGCK      CHAR IS DIGIT?
22073 066075       JMP *+2        NO
22074 066065       JMP ABORT+1    YES, LOOK FOR MORE
22075 024233       LDB SBUFA
22076 074070       SIB *+1
22077 035706 AB1   STB SBPTR      RESET SYNTAX BUFFER POINTER
22100 024132       LDB M1
22101 035473       STB TEMP       SEARCH FOR STATEMENTS
22102 025640       LDB ST
22103 035717       STB NUM        RESTORE PAGE
22104 074742       SBR 16
22105 035714       STB SFLAG
22106 035711       STB DFLAG
22107 015643       CPB ST+3       IMPLIED LET?
22110 070742       SAR 16
22111 163602       JSM SALT,I     SEARCH ALL PAGES
22112 066112       JMP *          CHECKSUM WORD
22113 167601       JMP STMTA,I
*
*
*
*    IF STATEMENT SYNTAX
*
22114 062033 IFSYN JSM SVARO-1    VARIABLE?
22115 066064       JMP ABORT      NO
22116 066064       JMP ABORT      NUMERIC
22117 026146       LDB GTEA
22120 005640       ADB ST
22121 005640       ADB ST
22122 060546       JSM STEXP      RELOP?
22123 066143       JMP IFERR      NO
22124 045706       ISZ SBPTR      YES
22125 070742       SAR 16
22126 131706       STA SBPTR,I
22127 062034 IF1   JSM SVARO      VARIABLE?
22130 066133       JMP IF3        NO
22131 066143       JMP IFERR      NUMERIC
22132 066134       JMP IF2        YES
22133 160245 IF3   JSM GTSTA,I    STRING CONSTANT?
22134 026145 IF2   LDB THENA      YES, DEMAND THEN
22135 005640       ADB ST
22136 005640       ADB ST
22137 060546       JSM STEXP        AND STORE AS EXPANDED OPERATOR
22140 164317       JMP E20+4,I    NOT FOUND
22141 060664       JSM LNUM     DEMAND A SEQUENCE NUMBER
22142 065151       JMP EOST
22143 160205 IFERR JSM AERRA,I    STRING IF ERROR
22144 177672       DEC -70
22145 174722 THENA ABS THEN+THEN-ID-ID
22146 174727 GTEA  ABS GTE+GTE+1-ID-ID
*
*
*
```

```
    IMPLIED DISP, LET SYNTAX

22147 062340 IMPLT JSM SAVEP
22150 031643       STA ST+3        SET IMPLIED LET FLAG
22151 055400       DSZ BADDR
22152 061055       JSM GNEXT
22153 055400       DSZ BADDR
22154 060752       JSM LETCK       LETTER?
22155 066167       JMP ILET1+1     NO, TRY IMPLIED DISP
22156 060626       JSM SAVBP       SAVE POINTERS
22157 062034       JSM SVARO       VARIABLE?
22160 066166       JMP ILET1       NO
22161 066166       JMP ILET1       NUMERIC
22162 060463       JSM SYMC1       STRING
22163 012020       OCT 12020       =?
22164 066166       JMP ILET1       NO
22165 066024       JMP LTSYM       YES
22166 060640 ILET1 JSM RESBP       RESTORE POINTERS
22167 024123       LDB PRTOP       STORE
22170 055706       DSZ SBPTR         CODE FOR
22171 135706       STB SBPTR,I         IMPLIED LET
22172 045706       ISZ SBPTR
22173 025416       LDB MODE
22174 074111       SLB NSTMT       SKIP IF PROG MODE
22175 062227       JSM PRNTS       PRINT STATEMENT?
22176 066200 NSTMT JMP ILET2       NO
22177 066213       JMP PRIN1       YES
22200 025644 ILET2 LDB ST+4        STRING
22201 074110       SZB *+2           OCCURRED?
22202 164274       JMP E5,I        YES
22203 066064       JMP ABORT
00123       PRTOP EQU B12K

    WRITE STATEMENT SYNTAX

22204 160265 WRTS  JSM IOHEA,I     GET DEVICE AND FORMAT
22205 060534       JSM RPCKE       GET RIGHT PAREN
22206 055400       DSZ BADDR
22207 055706       DSZ SBPTR

22210 062340 PRINS JSM SAVEP
22211 062227       JSM PRNTS       PRINT SYNTAX?
22212 066216       JMP PRIN2
22213 025644 PRIN1 LDB ST+4        YES, STRING OCCURRED?
22214 074250       SZB ABADD       NO
22215 065151       JMP EOST        YES
22216 025644 PRIN2 LDB ST+4
22217 074110       SZB *+2         STRING OCCURRED?
22220 164277       JMP E5+3,I      YES
22221 066064 ABADD JMP ABORT       NO

    PRINT STATEMENT SYNTAX

22222 010043 PRSYN CPA B42         QUOTE FIELD?
22223 066237       JMP PR2+4       YES
22224 060461       JSM SYMC2       NO
22225 012001       OCT 12001       COMMA OR SEMICOLON?
22226 066233       JMP PR2         NO
22227 024132 PRNTS LDB M1
22230 035712       STB PFLAG       ENABLE FORMULA AND TAB
22231 061066       JSM GETSK
22232 066300       JMP PR1         END OF LINE
22233 010043 PR2   CPA B42         QUOTE?
22234 066236       JMP *+2         YES
22235 066247       JMP PR3         NO
22236 045706       ISZ SBPTR
22237 160245       JSM GTSTA,I     RECORD STRING CONSTANT
22240 010031       CPA EOL         EOL?
22241 064357       JMP RETN2       YES
22242 074742       SBR 16
22243 135706       STB SBPTR,I     CLEAR OUT NEXT WORD
22244 024132       LDB M1
22245 035712       STB PFLAG
22246 066222       JMP PRSYN
22247 045712 PR3   ISZ PFLAG       TAB OR FORMULA PERMITTED?
22250 170402       RET
22251 027603       LDB TABA
22252 160175       JSM TSRHA,I     TAB?
22253 066263       JMP PR4         NO
22254 070544       SAL 5           YES
```

#01 STRING OPTION BLOCK

```
22255 040067           IOR TYPFL      SET PRE-DEFINED FUNCTION FLAGS
22256 060454           JSM SBPUD-2    STORE
22257 024123           LDB RBOP
22260 135706           STB SBPTR,I
22261 160202           JSM FSCA,I     GET TAB FORMULA
22262 066275           JMP PR5
22263 055400 PR4       DSZ BADDR      BACK UP POINTER
22264 021400           LDA BADDR
22265 031645           STA ST+5       SAVE BADDRR
22266 062034           JSM SVARO       VARIABLE?
22267 066272           JMP PR6        NO
22270 066272           JMP *+2        NUMERIC
22271 066275           JMP PR5        STRING
22272 021645 PR6       LDA ST+5
22273 031400           STA BADDR      RESTORE BADDR
22274 160202           JSM FSCA,I     FETCH FORMULA
22275 010031 PR5       CPA EOL        EOL?
22276 064357           JMP RETN2
22277 066222           JMP PRSYN      NO
22300 045706 PR1       ISZ SBPTR
22301 064357           JMP RETN2
*
*
*    READ AND INPUT STATEMENT SYNTAX
*
22302 062340 READS     JSM SAVEP
22303 062034           JSM SVARO      VARIABLE?
22304 066315           JMP READ3
22305 066311           JMP READ1      NUMERIC
22306 060504 READ2     JSM COMCK      COMMA?
22307 066213           JMP PRIN1      NO
22310 066303           JMP READS+1    YES
22311 163600 READ1     JSM VAR1,I
22312 066312           JMP *          CONSTANT STORAGE
22313 066306           JMP READ2
22314 066306           JMP READ2
22315 025644 READ3     LDB ST+4
22316 074110           SZB *+2        STRING OCCURRED?
22317 164321           JMP E25+1,I    YES
22320 066064           JMP ABORT      NO
*
*
*    DATA STATEMENT SYNTAX
*
22321 062340 DATAS     JSM SAVEP
22322 045706           ISZ SBPTR
22323 061156           JSM CONST      LOOK FOR A NUMBER
22324 066331           JMP DATA1      NOT FOUND
22325 160244           JSM NUMOA,I    FOUND , STORE
22326 060504 DATA2     JSM COMCK      COMMA?
22327 066213           JMP PRIN1      NO
22330 066322           JMP DATAS+1
22331 045644 DATA1     ISZ ST+4
22332 010043           CPA B42        QUOTE?
22333 066335           JMP *+2        YES
22334 164316           JMP E20+3,I    NO
22335 160245           JSM GTSTA,I    STRING CONSTANT?
22336 066326           JMP DATA2      YES
22337 066064           JMP ABORT      NO, ERROR
*
*
22340 021717 SAVEP     LDA NUM
22341 031640           STA ST
22342 031643           STA ST+3       RESET IMPLIED LET FLAG
22343 070742           SAR 16
22344 031644           STA ST+4       RESET STRING OCCURRED FLAG
22345 170402           RET
*
*    NON-FORMULA OPERATORS
*
22346 046105 LEN       ASC 1,LE
22347 047215           OCT 47215      N, OPCODF 15
22350 052110 THEN      ASC 2,THEN
22351 042516
22352 150074 GTE       OCT 150074     20,<
22353 036602           OCT 36602      =,2
22354 037075           ASC 1,>=
22355 101443           OCT 101443     3,#
22356 102074           OCT 102074     4,<
22357 037204           OCT 37204      >,4
22360 036605           OCT 36605      =,5
22361 036206           OCT 36206      <,6
22362 037307           OCT 37307      >,7
*
*
*    EXECUTE LEN STATEMENT
*
*
22363 062450 ELEN      JSM CKMOD
22364 160227 ELEN1     JSM FXFLA,I      PUT NUMBER IN AR2
```

```
22365 045472 ELEN2 ISZ TEMPS
22366 170402       RET
*
*     CHECK LEN FUNCTION SYNTAX
*
*
22367 062536 LENS  JSM GVAR      GET FIRST PARAMETER
22370 066446       JMP LENER
22371 066446       JMP LENER     NO
22372 025646 LENS1 LDB PTR2
22373 135472       STB TEMPS,I     FLAG FOR FSC
22374 060534       JSM RPCKE     )?
22375 025651       LDB TEMP6      RESTORE STRING
22376 035644       STB ST+4         OCCURRED FLG
22377 064356       JMP RETN3     YES
22400 045706 LENS2 ISZ SBPTR
22401 160245       JSM GTSTA,I   SEEK STRING CONSTANT
22402 066372       JMP LENS1
*
*
22403 021416 EINDX LDA MODE
22404 070113       SAP *+2       SYNTAX MODE?
22405 066462       JMP INDXS     YES
22406 062550       JSM GPTRS
22407 035640       STB CP0
22410 031646       STA PTR2
22411 024133       LDB M2
22412 063421       JSM PSTR
22413 076110       RZB *+2       NULL STRING?
22414 066434       JMP EIND3     YES
22415 035647       STB TMPRE
22416 031644       STA INTMP
22417 025640       LDB CP0
22420 035654       STB TNULL
22421 027645 EIND2 LDB PTR1A
22422 061041       JSM GETCH
22423 031641       STA CP1
22424 027731       LDB TMP2A
22425 061041       JSM GETCH
22426 011641       CPA CP1
22427 066436       JMP EIND1
22430 021646       LDA PTR2
22431 031645       STA PTR1
22432 055647       DSZ TMPRE
22433 066417       JMP EIND2-2
22434 074742 EIND3 SBR 16
22435 066364       JMP ELEN1
22436 055654 EIND1 DSZ TNULL
22437 066421       JMP EIND2
22440 025644       LDB INTMP
22441 005640       ADB CP0
22442 074076       TCB
22443 005742       ADB TMP2
22444 004012       ADB .1
22445 066364       JMP ELEN1
*
*
22446 160205 LENER JSM AERRA,I
22447 177671       DEC -71
*
*
22450 021416 CKMOD LDA MODE
22451 070153       SAP *+3       SYNTAX MODE?
22452 055777       DSZ RSPTR     YES
22453 066367       JMP LENS
22454 045472 CKM1  ISZ TEMPS
22455 125472       LDB TEMPS,I
22456 074442       SBR 10
22457 014012       CPB .1        QUOTE?
22460 066572       JMP GP1       YES
22461 066563       JMP GP2       NO
*
22462 062536 INDXS JSM GVAR      VARIABLE?
22463 066446       JMP LENER
22464 066446       JMP LENER     NUMERIC
22465 060504 INDS2 JSM COMCK     STRING, COMMA?
22466 164305       JMP E15-1,I   NO
22467 062034       JSM SVARO     YES, VARIABLE?
22470 066400       JMP LENS2     NO, LOOK FOR QUOTE FEILD
22471 164312       JMP E20-1,I    NUMERIC
22472 066372       JMP LENS1     STRING
*
22473 066465       JMP INDS2
*
*
22474 062450 EVAL  JSM CKMOD
22475 025400       LDB BADDR
22476 060563       JSM SLWST     SAVE BADDR
22477 031645       STA PTR1
22500 045654       ISZ TNULL     NULL STRING?
```

```
22501 066503       JMP *+2       NO
22502 066534       JMP VALER     YES
22503 021412       LDA LSTPT     SET BUFFER
22504 070070       STA *+1         START TO
22505 070744       SAL 1             LOW STACK
22506 031400       STA BADDR           POINTER PLUS 1
22507 031646       STA PTR2      SAVE BUFFER START
22510 021413       LDA HSTPT     SET BUFFER
22511 070744       SAL 1           END TO HIGH
22512 031623       STA PEND          STACK POINTER PLUS 1
22513 027645 EVAL1 LDB PTR1A
22514 061041       JSM GETCH     GET A SOURCE CHAR
22515 061016       JSM ONEXT     PUT IN BUFFER
22516 021400       LDA BADDR
22517 011623       CPA PEND      OVERFLOW?
22520 064561       JMP MERR      YES, ERROR
22521 045654       ISZ TNULL     NO,DONE?
22522 066513       JMP EVAL1     NO
22523 020055       LDA I         TERMINATE THE BUFFER
22524 061016       JSM ONEXT       WITH A NON-DIGIT CHARACTER
22525 021646       LDA PTR2
22526 031400       STA BADDR     INITIALIZE BADDR
22527 061156       JSM CONST
22530 066534       JMP VALER
22531 060567       JSM UNSTK
22532 031400       STA BADDR     RESTORE BADDR
22533 066365       JMP ELEN2
22534 160205 VALER JSM AERRA,I
22535 177664       DEC -76
*
*
*
*
22536 121472 GVAR  LDA TEMPS,I   GET LEFT PAREN COUNT
22537 031646       STA PTR2        AND SAVE
22540 021644       LDA ST+4      SAVE STRING
22541 031651       STA TEMP6       OCCURRED FLAG
22542 061055       JSM GNEXT     GET NEXT CHAR
22543 055400       DSZ BADDR
22544 045706       ISZ SHPTR
22545 060521       JSM LPCKE     DEMAND LEFT PAREN
22546 045400       ISZ BADDR
22547 066034       JMP SVARO
*
*    STATEMENT EXECUTION
*
*
*    LET EXECUTION
*
*
*
22550 063357 GPTRS JSM GADD
22551 121472       LDA TEMPS,I
22552 045472       ISZ TEMPS
22553 031644       STA INTMP     SAVE RELATIONAL OPERATOR
22554 125472       LDB TEMPS,I
22555 074442       SBR 10
22556 014012       CPB =1        QUOTE?
22557 066572       JMP GP1       YES
22560 050065       AND OPMSK     NO
22561 010065       CPA OPMSK     NON-FORMULA OPERATOR?
22562 045472       ISZ TEMPS     YES
22563 055472 GP2   DSZ TEMPS
22564 063357       JSM GADD      GET SOURCE STRING ADDRESS
22565 024133       LDB M2
22566 063421       JSM PSTR      EVALUATE SOURCE STRING
22567 035647 XFER  STB TMPRE     SAVE LENGTH
22570 031645       STA PTR1
22571 170402       RET
22572 063551 GP1   JSM GQUOT     GET QUOTE FIELD
22573 066567       JMP XFER
*
22574 062550 LTEX  JSM GPTRS     GET DEST STRING POINTERS
22575 024132 LT4   LDB M1        NO
22576 063421       JSM PSTR      EVALUATE DESTINATION STRING
22577 074410       SZB LT2+1     NULL STRING?
22600 021416       LDA MODE
22601 070250       SZA LT2       CALC MODE?
22602 160170       JSM CLERA,I   YES
22603 021647       LDA TMPRE
22604 025645       LDB PTR1
22605 061330       JSM .NPWR     DISPLAY THE STRING
22606 062610 LT2   JSM TRSTR
22607 164172       JMP XEC4A,I
*
*
*    STRING TRANSFER SUBROUTINE
*
*
22610 021645 TRSTR LDA PTR1
```

#01 STRING OPTION BLOCK

```
22611 070076        TCA
22612 001742        ADA TMP2
22613 070413        SAP TR1         FORWARD TRANSFER?
22614 045654 TR2    ISZ TNULL       YES
22615 066617        JMP *+2         YES
22616 170402        RET
22617 063255        JSM FSCH        GET NEXT SOURCE CHAR
22620 027731 LT5    LDB TMP2A
22621 061017        JSM OUTCR       STORE IT
22622 066614        JMP TR2         LOOK FOR MORE
22623 021654 TR1    LDA TNULL
22624 070070        SIA *+1
22625 070056        CMA
22626 070137        LDB A
22627 005645        ADB PTR1
22630 035645        STB PTR1        POINT TO END OF SOURCE
22631 001742        ADA TMP2
22632 031742        STA TMP2        POINT TO END OF DEST
22633 021654        LDA TNULL
22634 070056        CMA
22635 025647        LDB TMPRE
22636 074076        TCB
22637 070037        ADB A
22640 074113        SBP *+2         TOO MUCH SOURCE?
22641 074742        SBR 16          YES, NO BLANKS NEEDED
22642 035647        STB TMPRE       STORE BLANK COUNT
22643 045654 TR4    ISZ TNULL
22644 066646        JMP *+2
22645 170402        RET
22646 025647        LDB TMPRE
22647 074250        SZB TR3         MORE BLANKS?
22650 020041        LDA .32         YES
22651 055647        DSZ TMPRE
22652 066653        JMP *+1
22653 066657        JMP TR5
22654 027645 TR3    LDB PTR1A
22655 061041        JSM GETCH
22656 055645        DSZ PTR1
22657 027731 TR5    LDB TMP2A
22660 061017        JSM OUTCR
22661 055742        DSZ TMP2
22662 055742        DSZ TMP2
22663 055645        DSZ PTR1
22664 066643        JMP TR4         NO
*
22665 045654 FINCH  ISZ TNULL       MORE TRANSFER STRING
22666 066670        JMP *+2         YES
22667 170402        RET             NO
22670 061040        JSM GETCH-1
22671 010031        CPA EOL         END OF LINE?
22672 170402        RET             YES
22673 010043        CPA B42         YES, QUOTE?
22674 170402        RET             YES
22675 027731        LDB TMP2A       NO,
22676 061017        JSM OUTCR          STORE IT
22677 066665        JMP FINCH
*
*
*
     INPUT STATEMENT EXECUTION
*
*
22700 063013 EINPT  JSM ESAVE       SAVE CURRENT PAGE ADDRESS
22701 020112        LDA RSTKA
22702 031777        STA RSPTR       RESET STACK
22703 021622        LDA TERM
22704 072110        RZA *+2
22705 160170        JSM CLERA,I
22706 021472        LDA TEMPS
22707 000133        ADA M2
22710 031641        STA SPRDD       SAVE START OF INPUT STATEMENT
22711 021641 EIN2   LDA SPRDD
22712 031421        STA PRADD         INPUT STATEMENT
22713 021472        LDA TEMPS
22714 031640        STA TEPPP
22715 121472        LDA TEMPS,I
22716 050040        AND B37
22717 010076        CPA B36         STRING VARIABLE?
22720 067017        JMP INSTR       YES
22721 023010        LDA INLNK
22722 001643        ADA SAVE
22723 031432        STA DRQST       SET UP RETURN LINK
22724 164173 INRET  JMP PEXMA,I     CALL FOR INPUT
22725 055400        DSZ BADDR
22726 025641        LDB SPRDD
22727 061007        JSM NEXTA       SET PRADD BACK TO END
22730 035421        STB PRADD         OF INPUT STATEMENT
22731 021472        LDA TEMPS
22732 031640        STA TEPPP       SAVE START OF VARIABLE
22733 160201 .EIN1  JSM FORMA,I     GET THE ADDRESS OF THE VARIABLE I N HSTPT
```

```
22734 024017       LDB .2
22735 035706       STB SBPTR      AIM SBPTR AT ROM
22736 027007       LDB INLN1
22737 005643       ADB SAVE
22740 035432       STB DRQST
22741 061156       JSM CONST      BUILD A NUMBER IN AR2
22742 066765       JMP INCH5      P+1 - NO NUMBER FOUND, SO INC HSTPTP
22743 070742       SAR 16
22744 031432       STA DRQST      CLEAR FLAG
22745 060412       JSM RSULT      SAVE ARE AT HSTPT,I
22746 025472       LDB TEMPS
22747 015421       CPB PRADD      END OF STATEMENT
22750 067011       JMP CXEC4      YES
22751 035640 EIN3  STB TEPPP      RESET THE TEMPORARY POINTER
22752 055400       DSZ BADDR      NO - DINC BADDR TO LOOK AT THE LAST CHAR IN BUFF.
22753 061066       JSM GETSK      GET LAST CHAR.
22754 067005       JMP INCH1
22755 013642       CPA B54        COMMA?
22756 066760       JMP *+2        YES
22757 066777       JMP INCH2      NO
22760 121472       LDA TEMPS,I
22761 050040       AND B37
22762 010076       CPA B36        STRING VARIABLE?
22763 067024       JMP EIN4       YES
22764 066733       JMP .EIN1      NO
*
22765 160170 INCH5 JSM CLERA,I
22766 023643       LDA .17
22767 027712       LDB ER3A
22770 063137       JSM ER4+2
22771 063135       JSM ER4
22772 021640 INCHT LDA TEPPP
22773 031472       STA TEMPS      RESTORE VARIABLE POINTER
22774 045413       ISZ HSTPT
22775 045413       ISZ HSTPT
22776 066711       JMP EIN2
*
22777 160170 INCH2 JSM CLERA,I
23000 020034       LDA .21
23001 027725       LDB ER1A
23002 063137       JSM ER4+2
23003 063135       JSM ER4
23004 066711       JMP EIN2
*
23005 160170 INCH1 JSM CLERA,I
23006 066711       JMP EIN2
23007 000772 INLN1 ABS INCHT-ID1
23010 000724 INLNK ABS INRET-ID1
*
23011 160170 CXEC4 JSM CLERA,I
23012 164172       JMP XEC4A,I
*
*     SAVE PAGE ADDRESS DURING EXECUTION
*
23013 074117 ESAVE LDA B
23014 050160       AND B174K
23015 031643       STA SAVE
23016 170402       RET
*
*
23017 070742 INSTR SAR 16
23020 031701       STA NDISP
23021 031702       STA NPRIN
23022 031707       STA BLANK      DON'T IGNORE BLANKS
23023 063142       JSM INCAL
23024 063357 EIN4  JSM GADD       GET STRING ADDRESS
23025 025412       LDB LSTPT      EXTRACT
23026 004133       ADB M2           PHYSICAL
23027 074517       LDA B,I            LENGTH OF
23030 070002       SAR 1
23031 000132       ADA M1                 DESTINATION
23032 070517       LDA A,I                  STRING
23033 070342       SAR 8
23034 070076       TCA
23035 004012       ADB .1         SUBTRACT FIRST
23036 074417       ADA B,I          SUBSCRIPT
23037 000132       ADA M1
23040 070076       TCA            STORE IT AS END OF
23041 031647       STA TMPRE        UNSPECIFIED DEST STRING
23042 024132       LDB M1         PREPARE
23043 063421       JSM PSTR         DESTINATION STRING
23044 021742       LDA TMP2
23045 031645       STA PTR1
23046 025654       LDB TNULL      SAVE LENGTH
23047 035644       STB INTMP        ALLOWANCE
23050 061055       JSM GNEXT
23051 067055       JMP EIN5
23052 063142 EIN14 JSM INCAL      GET INPUT RECORD
23053 061062       JSM GFRST
23054 067054       JMP *          CHECKSUM WORD
```

```
23055 025645 EIN5  LDB PTR1
23056 035742       STB TMP2       RESTORE STRING POINTER
23057 010043       CPA B42        QUOTE?
23060 067062       JMP *+2        YES
23061 055400       DSZ BADDR      NO
23062 062665       JSM FINCH      TRANSFER THE STRING
23063 074742       SBR 16         ALL REQUESTED
23064 015654       CPB TNULL        CHARACTERS TRANSFERRED?
23065 067112       JMP EIN21      YES
23066 015656       CPB PS1        NO, TRANSFER LENGTH SPECIFIED
23067 067106       JMP EIN20      NO
23070 031644       STA INTMP      SAVE EOR CHAR
23071 070742       SAR 16
23072 031647       STA TMPRE
23073 001654       ADA TNULL        TRANSFER
23074 000132       ADA M1
23075 031654       STA TNULL
23076 062614       JSM TR2
23077 010031 EIN18 CPA EOL        TRANSFER ENDED BY EOL?
23100 067102       JMP EINP6      YES
23101 061055 EIN19 JSM GNEXT      NO, WAS A "
23102 025641 EINP6 LDB SPRDD
23103 061007       JSM NEXTA      SET PRADD BACK TO
23104 035421       STB PRADD        END OF INPUT STATEMENT
23105 066746       JMP EIN3-3     LOOK FOR END
23106 125651 EIN20 LDB TEMP6,I    SET LOGICAL
23107 005654       ADB TNULL        TO ACTUAL
23110 135651       STB TEMP6,I        STRING LENGTH
23111 067077       JMP EIN18
23112 015656 EIN21 CPB PS1        LENGTH OF TRANSFER SPECIFIED?
23113 067121       JMP EIN15      NO
23114 061066 EIN16 JSM GETSK      YES, END OF LINE?
23115 067102       JMP EINP6      YES
23116 010043       CPA B42
23117 067101       JMP EIN19      YES
23120 067114       JMP EIN16      NO, LOOK FOR " OR EOL
23121 061066 EIN15 JSM GETSK      EOL?
23122 067102       JMP EINP6      YES
23123 010043       CPA B42        NO, CLOSING QUOTE?
23124 067101       JMP EIN19      YES
23125 021644       LDA INTMP      NO, DESTINATION STRING EXCEEDED
23126 031654       STA TNULL      RESTORE DESTINATION
23127 160170       JSM CLERA,I
23130 020033       LDA .16
23131 027726       LDB ER2A
23132 063137       JSM ER4+2
23133 063135       JSM ER4
23134 067052       JMP EIN14
*
*
*
23135 020025 ER4   LDA .8
23136 027724       LDB ER4A
23137 005643       ADB SAVE
23140 005643       ADB SAVE
23141 065330       JMP .NPWR
*
23142 020012 INCAL LDA .1
23143 031432       STA DRQST
23144 027727       LDB QMRKA
23145 061330       JSM .NPWR      OUTPUT A?
23146 161462       JSM REEDL,I    GET INPUT RECORD
23147 067164       JMP INC1       NULL RECORD
23150 061062       JSM GFRST
23151 067164       JMP INC1       YES
23152 021432       LDA DRQST
23153 072210       RZA *+4        EXECUTION EXIT OCCURRED?
23154 020041       LDA .32        YES
23155 031707       STA BLANK
23156 167613       JMP REEDY,I
23157 074742       SBR 16
23160 035432       STB DRQST
23161 035416       STB MODE
23162 055400       DSZ BADDR
23163 170402       RET
23164 021432 INC1  LDA DRQST
23165 070150       SZA INC2       EXECUTION EXIT OCCURRED?
23166 160170       JSM CLERA,I    NO
23167 067142       JMP INCAL
23170 167612 INC2  JMP REEDX,I
*
*
*
*
*    IF STATEMENT EXECUTION
*
*
23171 062550 IFEX  JSM GPTRS      GET STRING PARAMETERS
23172 074056       CMB
23173 035640       STB CP0
```

```
23174 020133       LDA M2        LENGTH
23175 063421       JSM PSTR      PREPARE TEST STRING
23176 035641       STB CP1       SAVE ACTUAL LENGTH
23177 045640 COMP2 ISZ CP0       MORE SPECIFIED STRING?
23200 067203       JMP COMP3     YES
23201 074742       SBR 16        NO, LOAD A
23202 067206       JMP COMP4       NULL CHARACTER
23203 027645 COMP3 LDB PTR1A
23204 061041       JSM GETCH
23205 070137       LDB A
23206 045654 COMP4 ISZ TNULL     MORE SPECIFIED TEST STRING?
23207 067216       JMP COMP6     YES
23210 070742       SAR 16        NO
23211 074076 COMP5 TCB           COMPARE
23212 074017       ADA B           CHARACTERS
23213 072110       RZA *+2       EXIT ON NOT EQUAL
23214 077150       RZB COMP2     OR BOTH NULL CHARACTERS
23215 067231       JMP BRANC     EXIT TO BRANCH
23216 021641 COMP6 LDA CP1       MORE ACTUAL
23217 072150       RZA COMP7       TEST STRING?
23220 020041       LDA .32       NO
23221 067211       JMP COMP5
23222 000132 COMP7 ADA M1
23223 031641       STA CP1
23224 035650       STB ST+8
23225 027731       LDB TMP2A     EXTRACT NEXT
23226 061041       JSM GETCH       TEST
23227 025650       LDB ST+8
23230 067211       JMP COMP5         CHARACTER
*
23231 070137 BRANC LDB A
23232 021644       LDA INTMP
23233 050070       AND OPDMK
23234 070202       SAR 5
23235 074153       SBP BR1       LESS THAN?
23236 070211       SLA GOTOE     YES, EVEN OP CODE?
23237 164172       JMP XEC4A,I   NO
23240 076310 BR1   RZB BR2       EQUAL?
23241 010022       CPA .5        YES, - OP?
23242 167577 GOTOE JMP EGOS1,I   YES
23243 000135       ADA M4
23244 071712       SAM *-2
23245 164172       JMP XEC4A,I
23246 010023 BR2   CPA .6        <?
23247 164172       JMP XEC4A,I
23250 010022       CPA .5        =?
23251 164172       JMP XEC4A,I
23252 010017       CPA .2
23253 164172       JMP XEC4A,I
23254 167577       JMP EGOS1,I
*
*
23255 025647 FSCH  LDB TMPRE
23256 076150       RZB *+3       OUT OF STRING?
23257 020041       LDA .32       YES, GET A
23260 170402       RET             BLANK
23261 004132       ADB M1
23262 035647       STB TMPRE
23263 027645       LDB PTR1A
23264 065041       JMP GETCH
                   LST
*
23265 121472 EREAD LDA TEMPS,I
23266 050040       AND B37
23267 010076       CPA B36       STRING VARIABLE?
23270 067310       JMP RDSTR     YES
23271 160201       JSM FORMA,I   NO, GET VARIABLE ADDRESS
23272 163611 ER1   JSM SWITH,I   EXCHANGE TEMPS AND NXTDT
23273 015414       CPB DSTRT     NEED NEW DATA STATEMENT?
23274 063334       JSM .FDA1     YES
23275 163611       JSM SWITH,I   NO
23276 125415       LDB NXTDT,I
23277 074152       SBM *+3       NUMERIC DATA IS NEXT?
23300 160205       JSM AERRA,I   NO
23301 177665       DEC -75
23302 160256       JSM FDAAA,I   YES
23303 060412       JSM RSULT
23304 021421 ER2   LDA PRADD
23305 011472       CPA TEMPS     MORE VARIABLES?
23306 164172       JMP XEC4A,I
23307 067265       JMP EREAD
23310 063357 RDSTR JSM GADD      GET STRING VARIABLE PARAMETERS
23311 163611       JSM SWITH,I
23312 025472 ER3   LDB TEMPS
23313 015414       CPB DSTRT     NEED NEW DATA STMT?
23314 063334       JSM .FDA1     YES
23315 045472       ISZ TEMPS
23316 125472       LDB TEMPS,I
23317 074442       SBR 10
23320 014012       CPB .1        QUOTE?
```

```
23321 067324         JMP *+3        YES
23322 160205         JSM AERRA,I    YES
23323 177665         DEC -75
23324 063551         JSM GQUOT      NO
23325 035647         STB TMPRE
23326 031645         STA PTR1
23327 024132         LDB M1         PREPARE
23330 063421         JSM PSTR         DESTINATION STRING
23331 062610         JSM TRSTR      TRANSFER THE STRING
23332 163611         JSM SWITH,I
23333 067304         JMP ER2
*
*
23334 021421 .FDA1  LDA PRADD
23335 031644         STA INTMP
23336 035421         STB PRADD
23337 025421 FD2     LDB PRADD
23340 015423         CPB PBPTR      END OF PROGRAM?
23341 164350         JMP E50-1,I    OUT OF DATA
23342 035472         STB TEMPS
23343 060577         JSM NEXTL+3
23344 001466         ADA LOCL1      ENCODE PAGE AND OP CODE
23345 013732         CPA MSDAT      MAIN SYSTEM DATA STMT?
23346 067352         JMP FD3        YES
23347 013733         CPA STDAT      NO, STRING DATA STMT?
23350 067352         JMP FD3        YES
23351 067337         JMP FD2        NO, KEEP LOOKING
23352 025421 FD3     LDB PRADD
23353 035414         STB DSTRT
23354 025644         LDB INTMP
23355 035421         STB PRADD
23356 170402         RET
*
*
*    GADD SUBROUTINE
*
*    FETCH STRING ADDRESS FROM SYMBOL TABLE
*
*    ENTRY CONDITIONS:
*
*       A=OPERAND
*       TEMPS POINTS TO STRING NAME
*
*    EXIT CONDITIONS:
*
*       STRING ADDRESS AND SUBSCRIPTS ARE
*       ON LOW STACK
*
23357 060771 GADD    JSM GTOPP      GET OPERAND
23360 063567         JSM GSYMB      GET SYMBOL ADDRESS
23361 004132         ADB M1
23362 074537         LDB B,I
23363 074744         SBL 1
23364 060563         JSM SLWST      PUT ON STACK
23365 045472         ISZ TEMPS
23366 021472         LDA TEMPS
23367 011421         CPA PRADD      OUT OF CODE?
23370 067375         JMP GA2
23371 121472         LDA TEMPS,I
23372 050065         AND OPMSK      GET OP CODE
23373 010125         CPA LBOP       SUBSCRIPTED?
23374 067401         JMP GA1        YES
23375 074742 GA2     SBR 16         NO
23376 060563         JSM SLWST
23377 024132         LDB M1
23400 064563         JMP SLWST
23401 063412 GA1     JSM SUBEV      EVALUATE SUBSCRIPTS
23402 055472         DSZ TEMPS
23403 121472         LDA TEMPS,I
23404 070442         SAR 10
23405 050040         AND B37
23406 010017         CPA .2         COMMA?
23407 067412         JMP SUBEV      YES
23410 045472         ISZ TEMPS
23411 067377         JMP GA1-2      NO
*
*    SUBEV SUBROUTINE
*
*    EVALUATE AN EXPRESSION, CONVERT TO
*    AN INTEGER, STORE ON LOW STACK
*
23412 061217 SUBEV   JSM FETCH      EVALUATE EXPRESSION
23413 160225         JSM FLTRA,I    CONVERT TO INTEGER
23414 164341         JMP E40+2,I
23415 004132         ADB M1
23416 075712         SBM *-2        0 OR NEGATIVE?
23417 045472         ISZ TEMPS
23420 064563         JMP SLWST      NO
*
```

```
*
*      PSTR SUBROUTINE
*
*      EVALUATE A STRING OPERAND
*
*      ENTRY CONDITIONS:
*
*        B=-2 FOR SOURCE STRINGS
*         B=-1 FOR DESTINATION STRING
*         LOW STACK HAS SECOND SUBSCRIPT.
*         FIRST SUBSCRIPT, STRING ADDRESS,
*         RESPECTIVELY.
*         TMPRE=SOURCE LENGTH
*
*      EXIT CONDITIONS:
*
*         TMP2=STRING POINTER
*         B=LENGTH
*         TEMP6=STRING LENGTH WORD POINTER
*         A=TMP2 IF SOURCE STRING
*       TNULL=1,S COMPLEMENT OF REQUESTED LENGTH
*
*
23421 035655 PSTR   STB PS0        SAVE MODE FLAG
23422 025412        LDB LSTPT
23423 004134        ADB M3
23424 035412        STB LSTPT      BUMP LOW STACK POINTER
23425 004012        ADB .1
23426 035656        STB PS1        SET FLAG POSITIVE
23427 074517        LDA B,I        GET STRING ADDRESS
23430 031742        STA TMP2       SAVE IT
23431 070002        SAR 1
23432 000132        ADA M1         GET LENGTH WORD POINTER
23433 031651        STA TEMP6      SAVE IT
23434 004012        ADB .1
23435 074517        LDA B,I        GET FIRST SUBSCRIPT
23436 031652        STA MPT        SAVE IT
23437 001742        ADA TMP2       RECORD STRING
23440 031742        STA TMP2         START POINTER
23441 004012 PS2    ADB .1
23442 074517        LDA B,I        GET SECOND SUBSCRIPT
23443 070513        SAP PSTR2      SPECIFIED?
23444 011655        CPA PS0        NO, SOURCE MODE?
23445 067451        JMP PSTR1      NO
23446 121651        LDA TEMP6,I    YES
23447 050105        AND B377       GET ACTUAL STRING LENGTH
23450 067454        JMP PSTR2-1
23451 031656 PSTR1  STA PS1        SET FLAG TO -1
23452 021647        LDA TMPRE      COMPUTE END OF
23453 001652        ADA MPT        STRING DESIGNATOR
23454 000132        ADA M1
23455 031653 PSTR2  STA NUT        SAVE IT
23456 070056        CMA
23457 001652        ADA MPT
23460 000132        ADA M1
23461 070152        SAM PSTR8      NEGATIVE LENGTH?
23462 160205        JSM AERRA,I    YES
23463 177670        DEC -72
23464 031654 PSTR8  STA TNULL      SAVE 1,S COMPLEMENT OF LENGTH
23465 121651        LDA TEMP6,I    DOES
23466 050105        AND B377         START OF
23467 070056        CMA            CHARACTER
23470 045655        ISZ PS0              RELATE TO
23471 070070        SIA *+1                PREVIOUS STRING
23472 001652        ADA MPT                  VALUE
23473 070112        SAM *+2
23474 067515        JMP PSTR3
23475 121651        LDA TEMP6,I    YES
23476 045655        ISZ PS0        DESTINATION MODE?
23477 070346        RAR 8          YES, USE PHYSICAL LENGTH
23500 050105        AND B377       NO USE ACTUAL LENGTH
23501 000012        ADA .1
23502 070076        TCA
23503 001653        ADA NUT
23504 024012        LDB .1
23505 015655        CPB PS0        SOURCE MODE?
23506 067525        JMP PSTR5      NO
23507 025654        LDB TNULL      SPECIFIED SOURCE
23510 000012        ADA .1           STRING CONTAINED
23511 070452        SAM PSTR4          WITHIN DEFINED SOURCE STRING?
23512 004012        ADB .1         NO,
23513 070037        ADB A            CORRECT LENGTH
23514 067522        JMP PSTR4
23515 021655 PSTR3  LDA PS0        SOURCE MODE?
23516 072150        RZA PSTR4-1    YES
23517 160205        JSM AERRA,I    NO
23520 177667        DEC -73
23521 024132        LDB M1
23522 021742 PSTR4  LDA TMP2       NO, GET STRING POINTER
23523 074056        CMB
```

#01 STRING OPTION BLOCK

```
      23524 170402       RET
      23525 070152 PSTR5 SAM *+3          OVERFLOW?
      23526 160205       JSM AERRA,I      YES
      23527 177666       DEC -74
      23530 045656       ISZ PS1          NO, STRING END SPECIFIED?
      23531 067543       JMP PSTR7        YES
      23532 045653       ISZ NQT
      23533 067534       JMP *+1
      23534 121651 PSTR6 LDA TEMP6,I      NO
      23535 050157       AND M256           RESET
      23536 041653       IOR NQT              STRING
      23537 131651       STA TEMP6,I            ACTUAL LENGTH
      23540 050105       AND B377
      23541 070137       LDB A
      23542 170402       RET
      23543 121651 PSTR7 LDA TEMP6,I      IS NEW
      23544 050105       AND B377           DESTINATION
      23545 070076       TCA                  STRINT
      23546 001653       ADA NQT                LONGER
      23547 071153       SAP PSTR6-2              THAN OLD?
      23550 170402       RET              NO
*
*
      23551 121472 GQUOT LDA TEMPS,I
      23552 050105       AND B377         GET STRING LENGTH
      23553 070137       LDB A
      23554 021472       LDA TEMPS
      23555 000012       ADA .1
      23556 031651       STA TEMP6
      23557 074117       LDA B
      23560 070070       SIA *+1
      23561 070002       SAR 1
      23562 001651       ADA TEMP6
      23563 031472       STA TEMPS        UPDATE TEMPS
      23564 021651       LDA TEMP6
      23565 070744       SAL 1
      23566 170402       RET
*
*
*
*     FIND VARIABLE ADDRESS
*
      23567 160177 GSYMB JSM SSYMA,I      SYMBOL IN TABLE?
      23570 160340       JSM E40+1,I       NO
      23571 170402       RET
*
*
*
      23572 164172 EDATA JMP XEC4A,I
      23573 066574 EILET JMP LTEX
      23574 167604 WREX  JMP RITE,I
*
      23575 167605 PREX  JMP PRINT,I
*
      23576 167606 DSPEX JMP DISP,I
*
*
*
*
*
*     LINKS THAT MOVE WITH MONIT
*
      23577 010202 EGOS1 OCT 10202
      23600 012233 VAR1  OCT 12233
      23601 004171 STMTA OCT 4171
      23602 016524 SALT  OCT 16524
      23603 023773 TARA  OCT 23773
      23604 007072 RITE  OCT 7072
      23605 006745 PRINT OCT 6745
      23606 006746 DISP  OCT 6746
      23607 012436 STRID OCT 12436
      23610 012455 STRI2 OCT 12455
      23611 010437 SWITH OCT 10437
      23612 004117 REEDX OCT 4117
      23613 004120 REEDY OCT 4120
*
*
*
      23614 176660       ABS EVAL-*
      23615 176566       ABS EINDX-*
      23616 176545       ABS ELEN-*
      23617 046511 ERIL  ASC 11,MISSING COMMA, RETYPE
      23620 051523
      23621 044516
      23622 043440
      23623 041517
      23624 046515
      23625 040454
      23626 020122
      23627 042524
```

#01 STRING OPTION BLOCK

```
      23630 054520
      23631 042440
      23632 041101 ER2L  ASC 8,BAD STRING INPUT
      23633 042040
      23634 051524
      23635 051111
      23636 047107
      23637 020111
      23640 047120
      23641 052524
      23642 000054 B54   OCT 54
      23643 000021 .17   DEC 17
      23644 000377 NTAB  OCT 377
      23645 001645 PTR1A DEF PTR1
      23646 046105 FTAB  ASC 1,LE
      23647 047230       OCT 47230      N, OPCODE 30
      23650 050117       ASC 1,PO
      23651 051631       OCT 51631      S, OPCODE 31
      23652 053101       ASC 1,VA
      23653 046332       OCT 46332      L, OPCODE 32
*
*
*
*
*    SYNTAX JUMP TABLE
*
*
      23654 176141       ABS LETS-*
      23655 176425       ABS READS-*
      23656 176424       ABS READS-*     INPUT
      23657 176442       ABS DATAS-*
      23660 176330       ABS PRINS-*     DISP
      23661 176233       ABS IFSYN-*
      23662 176322       ABS WRTS-*
      23663 176325       ABS PRINS-*
      23664 176263       ABS IMPLT-*
*
*    SYNTAX TABLE
*
      23665 051105 SYN   ASC 2,READ
      23666 040504
      23667 104111       OCT 104111     OPCODE 8,I
      23670 047120       ASC 2,NPUT
      23671 052524
      23672 103504       OCT 103504     OPCODE 7,D
      23673 040524       ASC 1,AT
      23674 040606       OCT 40606      A, OPCODE 6
      23675 000241       OCT 241        IMPLIED LET
      23676 042111       ASC 2,DISP
      23677 051520
      23700 122511       OCT 122511      OPCODE 5,I
      23701 043204       OCT 43204      F, OPCODE 4
      23702 053522       ASC 2,WRIT
      23703 044524
      23704 042643       OCT 42643      E, OPCODE 3
      23705 050122       ASC 2,PRIN
      23706 044516
      23707 052242       OCT 52242      PRINT, OPCODE 2
      23710 046105       ASC 1,LE       LE
      23711 052351       OCT 52351      T, OPCODE 11
*
*
*
      23712 003626 ER3A ABS *+*+2-ID1-ID1
      23713 041101       ASC 9,BAD NUMERIC INPUT,
      23714 042040
      23715 047125
      23716 046505
      23717 051111
      23720 041440
      23721 044516
      23722 050125
      23723 052054
      23724 003453 ER4A  ABS ER1L+ER1L+13-ID1-ID1
      23725 003436 ER1A  ABS ER1L+ER1L-ID1-ID1
      23726 003464 ER2A  ABS ER2L+ER2L-ID1-ID1
      01640              CP0   EQU ST
      01641              CP1   EQU ST+1
      00160              B174K EQU M1024
      23727 000131 QMRKA DEF .63+.63+1
      01644              INTMP EQU ST+4
      23730 174716 LENA  ABS LEN+LEN-ID-ID
      01645              PTR1  EQU ST+5
      01646              PTR2  EQU ST+6
      01647              TMPRE EQU ST+7
      01742              TMP2  EQU XC+2
      01640              TEPPP EQU ST
      01641              SPRDD EQU ST+1
      01643              SAVE EQU ST+3
      01651              TEMP6 EQU ST+9
```

#01 STRING OPTION BLOCK

```
      01652        MPT   EQU ST+10
      01653        NQT   EQU ST+11
      01654        TNULL EQU ST+12
      01655        PS0   EQU ST+13
      01656        PS1   EQU ST+14
      23731 001742 TMP2A DEF TMP2
      23732 011761 MSDAT OCT 11761
      23733 003772 STDAT OCT 3772
      01462        REEDL EQU 1462B
*
*
      23762              ORG 23762B
*
*
*     STATEMENT EXECUTION TABLE
*
      23762 176612       ABS LTEX-*
      23763 177302       ABS EREAD-*
      23764 176714       ABS EINPT-*
      23765 177605       ABS EDATA-*
      23766 177610       ABS DSPEX-*
      23767 177202       ABS IFEX-*
      23770 177604       ABS WREX-*
      23771 177604       ABS PREX-*
      23772 177601       ABS EILET-*
*
*
      23773 176353       ABS LEN-*
      23774 177652       ABS FTAB-*
      23775 177647       ABS NTAB-*
      23776 177667       ABS SYN-*
      23777 004000 ID    OCT 4000
                         END
*  NO ERRORS*
```

CROSS-REFERENCE TABLE

| | | | | | | | | | | | |
|---|---|---|---|---|---|---|---|---|---|---|---|
| .1 | 0020 | 0896 | 0911 | 0992 | 1190 | 1263 | 1385 | 1506 | 1513 | 1518 | 1550 |
| | 1553 | 1557 | 1559 | 1596 | | | | | | | |
| .10 | 0071 | 0072 | | | | | | | | | |
| .100 | 0070 | | | | | | | | | | |
| .1000 | 0069 | | | | | | | | | | |
| .11 | 0035 | 0043 | | | | | | | | | |
| .12 | 0036 | | | | | | | | | | |
| .13 | 0039 | | | | | | | | | | |
| .15 | 0048 | 0083 | | | | | | | | | |
| .16 | 0049 | 0084 | 1249 | | | | | | | | |
| .17 | 1653 | 1143 | | | | | | | | | |
| .1E4 | 0068 | | | | | | | | | | |
| .2 | 0027 | 1116 | 1343 | 1460 | | | | | | | |
| .21 | 0050 | 1154 | | | | | | | | | |
| .22 | 0051 | 0087 | | | | | | | | | |
| .23 | 0052 | 0088 | | | | | | | | | |
| .28 | 0053 | | | | | | | | | | |
| .3 | 0028 | 0045 | | | | | | | | | |
| .31 | 0054 | 0090 | | | | | | | | | |
| .32 | 0055 | 1056 | 1273 | 1316 | 1350 | | | | | | |
| .33 | 0056 | | | | | | | | | | |
| .34 | 0057 | 0091 | | | | | | | | | |
| .37 | 0058 | | | | | | | | | | |
| .4 | 0029 | | | | | | | | | | |
| .40 | 0059 | | | | | | | | | | |
| .41 | 0060 | | | | | | | | | | |
| .43 | 0061 | | | | | | | | | | |
| .45 | 0062 | | | | | | | | | | |
| .46 | 0063 | | | | | | | | | | |
| .48 | 0064 | | | | | | | | | | |
| .5 | 0030 | 1334 | 1341 | | | | | | | | |
| .58 | 0065 | 0094 | | | | | | | | | |
| .6 | 0031 | 0044 | 1339 | | | | | | | | |
| .63 | 0066 | 1708 | 1708 | | | | | | | | |
| .7 | 0032 | | | | | | | | | | |
| .8 | 0033 | 1257 | | | | | | | | | |
| .9 | 0034 | 0585 | | | | | | | | | |
| .99 | 0074 | | | | | | | | | | |
| .BUFA | 0180 | | | | | | | | | | |
| .EIN1 | 1115 | 1140 | | | | | | | | | |
| .FADA | 0185 | | | | | | | | | | |
| .FDA1 | 1399 | 0514 | 1365 | 1381 | | | | | | | |
| .FDVA | 0188 | | | | | | | | | | |
| .FMPA | 0187 | | | | | | | | | | |
| .FSBA | 0186 | | | | | | | | | | |
| .FSR | 0190 | | | | | | | | | | |
| .LNUM | 0314 | | | | | | | | | | |
| .NPWR | 0492 | 1016 | 1261 | 1266 | | | | | | | |
| .SLBF | 0181 | | | | | | | | | | |

CROSS-REFERENCE TABLE

| | | | | | | | | | | | |
|---|---|---|---|---|---|---|---|---|---|---|---|
| A | 0000 | 1038 | 1047 | 1187 | 1305 | 1326 | 1560 | 1582 | 1594 | | |
| AB1 | 0615 | 0609 | | | | | | | | | |
| AB3 | 0605 | | | | | | | | | | |
| ABADD | 0718 | 0713 | | | | | | | | | |
| ABORT | 0604 | 0541 | 0542 | 0612 | 0634 | 0635 | 0693 | 0718 | 0793 | 0812 | |
| ACTSA | 0174 | | | | | | | | | | |
| ADRSS | 0327 | | | | | | | | | | |
| AERRA | 0176 | 0656 | 0900 | 0960 | 1369 | 1387 | 1535 | 1564 | 1571 | | |
| AR1 | 0411 | 0182 | | | | | | | | | |
| AR1A | 0182 | | | | | | | | | | |
| AR2 | 0413 | 0183 | | | | | | | | | |
| AR2A | 0183 | | | | | | | | | | |
| ARYAD | 0401 | | | | | | | | | | |
| B | 0000 | 0531 | 1170 | 1184 | 1191 | 1310 | 1440 | 1508 | 1514 | 1519 | 1598 |
| B100 | 0095 | | | | | | | | | | |
| B1000 | 0102 | | | | | | | | | | |
| B10K | 0114 | 0115 | | | | | | | | | |
| B12K | 0116 | 0117 | 0206 | 0694 | | | | | | | |
| B133 | 0096 | | | | | | | | | | |
| B140 | 0097 | | | | | | | | | | |
| B1400 | 0103 | 0204 | | | | | | | | | |
| B17 | 0083 | | | | | | | | | | |
| B170K | 0121 | | | | | | | | | | |
| B1740 | 0104 | 0203 | | | | | | | | | |
| B174K | 1707 | 1171 | | | | | | | | | |
| B1760 | 0105 | 0158 | | | | | | | | | |
| B177 | 0098 | | | | | | | | | | |
| B1774 | 0106 | | | | | | | | | | |
| B1775 | 0107 | | | | | | | | | | |
| B1777 | 0108 | | | | | | | | | | |
| B20 | 0084 | | | | | | | | | | |
| B22 | 0085 | | | | | | | | | | |
| B23 | 0086 | | | | | | | | | | |
| B2400 | 0110 | | | | | | | | | | |
| B26 | 0087 | | | | | | | | | | |
| B27 | 0088 | | | | | | | | | | |
| B3000 | 0111 | | | | | | | | | | |
| B36 | 0089 | 1103 | 1138 | 1360 | | | | | | | |
| B37 | 0090 | 1102 | 1137 | 1359 | 1459 | | | | | | |
| B377 | 0099 | 1524 | 1539 | 1549 | 1581 | 1585 | 1593 | | | | |
| B400 | 0100 | | | | | | | | | | |
| B4000 | 0112 | 0162 | | | | | | | | | |
| B42 | 0091 | 0727 | 0736 | 0807 | 1076 | 1208 | 1239 | 1244 | | | |
| B44 | 0092 | 0576 | | | | | | | | | |
| B52 | 0093 | | | | | | | | | | |
| B54 | 1652 | 1133 | | | | | | | | | |
| B6K | 0113 | 0167 | | | | | | | | | |
| B72 | 0094 | | | | | | | | | | |
| B777 | 0101 | | | | | | | | | | |
| BADDR | 0291 | 0667 | 0669 | 0705 | 0760 | 0761 | 0768 | 0929 | 0938 | 0946 | 0954 |
| | 0958 | 0971 | 0974 | 1109 | 1130 | 1210 | 1279 | | | | |
| BADRP | 0204 | | | | | | | | | | |
| BEND | 0198 | 0199 | | | | | | | | | |
| BHSTP | 0442 | | | | | | | | | | |
| BLANK | 0386 | 1179 | 1274 | | | | | | | | |
| BR1 | 1333 | 1330 | | | | | | | | | |
| BR2 | 1339 | 1333 | | | | | | | | | |
| BRANC | 1326 | 1313 | | | | | | | | | |
| C5 | 0015 | | | | | | | | | | |
| C6 | 0011 | 0114 | | | | | | | | | |
| C7 | 0022 | 0100 | | | | | | | | | |
| CHRSA | 0219 | | | | | | | | | | |
| CKM1 | 0908 | | | | | | | | | | |
| CKMOD | 0904 | 0841 | 0928 | | | | | | | | |
| CLAR2 | 0489 | | | | | | | | | | |
| CLERA | 0160 | 1013 | 1093 | 1142 | 1153 | 1160 | 1165 | 1248 | 1283 | | |
| CLINE | 0316 | | | | | | | | | | |
| CLP1A | 0217 | | | | | | | | | | |
| COMCE | 0434 | | | | | | | | | | |
| COMCK | 0433 | 0783 | 0803 | 0918 | | | | | | | |
| COMP2 | 1299 | 1312 | | | | | | | | | |
| COMP3 | 1303 | 1300 | | | | | | | | | |
| COMP4 | 1306 | 1302 | | | | | | | | | |
| COMP5 | 1309 | 1317 | 1324 | | | | | | | | |
| COMP6 | 1314 | 1307 | | | | | | | | | |
| COMP7 | 1318 | 1315 | | | | | | | | | |
| CONST | 0482 | 0800 | 0955 | 1121 | | | | | | | |
| CP0 | 1705 | 0867 | 0875 | 0893 | 1295 | 1299 | | | | | |
| CP1 | 1706 | 0879 | 0882 | 1298 | 1314 | 1319 | | | | | |
| CPLAC | 0331 | | | | | | | | | | |
| CRCKA | 0228 | | | | | | | | | | |
| CRLF | 0495 | | | | | | | | | | |
| CRLF1 | 0496 | | | | | | | | | | |
| CRTN | 0037 | 0038 | 0039 | | | | | | | | |
| CTYPE | 0330 | | | | | | | | | | |
| CXEC4 | 1165 | 1128 | | | | | | | | | |
| DATA1 | 0806 | 0801 | | | | | | | | | |
| DATA2 | 0803 | 0811 | | | | | | | | | |
| DATAS | 0798 | 0805 | 1672 | | | | | | | | |
| DCOMA | 0210 | | | | | | | | | | |

CROSS-REFERENCE TABLE

| | | | | | | | | |
|---|---|---|---|---|---|---|---|---|
| DELSA | 0175 | | | | | | | |
| DFLAG | 0388 | 0622 | | | | | | |
| DIGCK | 0461 | 0610 | | | | | | |
| DISP | 1638 | 1623 | | | | | | |
| DPERR | 0043 | | | | | | | |
| DRQST | 0317 | 1107 | 1120 | 1124 | 1264 | 1271 | 1277 | 1281 |
| DSPEX | 1623 | 1739 | | | | | | |
| DSTRT | 0303 | 1364 | 1380 | 1414 | | | | |
| E | 0080 | | | | | | | |
| E1 | 0235 | | | | | | | |
| E10 | 0244 | | | | | | | |
| E15 | 0249 | 0919 | | | | | | |
| E20 | 0254 | 0554 | 0653 | 0809 | 0922 | | | |
| E25 | 0259 | 0792 | | | | | | |
| E30 | 0264 | 0545 | | | | | | |
| E35 | 0269 | | | | | | | |
| E40 | 0274 | 1472 | 1612 | | | | | |
| E45 | 0279 | | | | | | | |
| E5 | 0239 | 0692 | 0717 | | | | | |
| E50 | 0284 | 1404 | | | | | | |
| ECALA | 0215 | | | | | | | |
| EDATA | 1617 | 1738 | | | | | | |
| EGOS1 | 1631 | 1335 | 1345 | | | | | |
| EILET | 1618 | 1743 | | | | | | |
| EIN14 | 1203 | 1253 | | | | | | |
| EIN15 | 1242 | 1236 | | | | | | |
| EIN16 | 1237 | 1241 | | | | | | |
| EIN18 | 1224 | 1234 | | | | | | |
| EIN19 | 1226 | 1240 | 1245 | | | | | |
| EIN2 | 1097 | 1151 | 1158 | 1161 | | | | |
| EIN20 | 1231 | 1216 | | | | | | |
| EIN21 | 1235 | 1214 | | | | | | |
| EIN3 | 1129 | 1230 | | | | | | |
| EIN4 | 1181 | 1139 | | | | | | |
| EIN5 | 1206 | 1202 | | | | | | |
| EIND1 | 0890 | 0883 | | | | | | |
| EIND2 | 0877 | 0887 | 0891 | | | | | |
| EIND3 | 0888 | 0872 | | | | | | |
| EINDX | 0863 | 1648 | | | | | | |
| EINP6 | 1227 | 1225 | 1238 | 1243 | | | | |
| EINPT | 1088 | 1737 | | | | | | |
| ELEN | 0841 | 1649 | | | | | | |
| ELEN1 | 0842 | 0889 | 0897 | | | | | |
| ELEN2 | 0843 | 0959 | | | | | | |
| ELINA | 0169 | | | | | | | |
| ENDS | 0478 | | | | | | | |
| ENTEA | 0218 | | | | | | | |
| ENTFA | 0189 | | | | | | | |
| EOL | 0038 | 0741 | 0770 | 1074 | 1224 | | | |
| EOLCK | 0481 | | | | | | | |
| EOST | 0479 | 0555 | 0558 | 0655 | 0714 | | | |
| ER1 | 1363 | | | | | | | |
| ER1A | 1703 | 1155 | | | | | | |
| ER1L | 1650 | 1702 | 1702 | 1703 | 1703 | | | |
| ER2 | 1373 | 1396 | | | | | | |
| ER2A | 1704 | 1250 | | | | | | |
| ER2L | 1651 | 1704 | 1704 | | | | | |
| ER3 | 1379 | | | | | | | |
| ER3A | 1700 | 1144 | | | | | | |
| ER4 | 1257 | 1145 | 1146 | 1156 | 1157 | 1251 | 1252 | |
| ER4A | 1702 | 1258 | | | | | | |
| EREAD | 1358 | 1376 | 1736 | | | | | |
| ERRA | 0177 | | | | | | | |
| ESAVE | 1170 | 1088 | | | | | | |
| EVAL | 0928 | 1647 | | | | | | |
| EVAL1 | 0943 | 0950 | | | | | | |
| EXP | 0399 | 0400 | | | | | | |
| EXPOP | 0118 | | | | | | | |
| F | 0081 | | | | | | | |
| FD2 | 1402 | 1412 | | | | | | |
| FD3 | 1413 | 1409 | 1411 | | | | | |
| FDAAA | 0222 | 1371 | | | | | | |
| FETCH | 0486 | 1470 | | | | | | |
| FILLA | 0201 | | | | | | | |
| FINCH | 1070 | 1080 | 1211 | | | | | |
| FIRST | 0365 | | | | | | | |
| FIX | 0499 | | | | | | | |
| FLGBT | 0073 | | | | | | | |
| FLOAT | 0384 | | | | | | | |
| FLTFA | 0193 | | | | | | | |
| FLTRA | 0192 | 1471 | | | | | | |
| FLTSA | 0195 | | | | | | | |
| FN | 0148 | | | | | | | |
| FND | 0460 | | | | | | | |
| FND1A | 0224 | | | | | | | |
| FNDAA | 0223 | | | | | | | |
| FNDPS | 0474 | | | | | | | |
| FOPBS | 0206 | | | | | | | |
| FORMA | 0172 | 1115 | 1362 | | | | | |
| FORME | 0336 | | | | | | | |
| FORMS | 0335 | | | | | | | |

CROSS-REFERENCE TABLE

| | | | | | | | | | | | |
|---|---|---|---|---|---|---|---|---|---|---|---|
| FORMT | 0334 | | | | | | | | | | |
| FPAGE | 0449 | | | | | | | | | | |
| FROMA | 0122 | | | | | | | | | | |
| FSCA | 0173 | 0587 | 0591 | 0758 | 0769 | | | | | | |
| FSCE2 | 0439 | | | | | | | | | | |
| FSCE4 | 0444 | | | | | | | | | | |
| FSCH | 1348 | 1031 | | | | | | | | | |
| FTAB | 1656 | 1747 | | | | | | | | | |
| FTMP1 | 0337 | | | | | | | | | | |
| FTMP2 | 0338 | | | | | | | | | | |
| FWAM | 0157 | | | | | | | | | | |
| FWUP | 0296 | | | | | | | | | | |
| FXFLA | 0194 | 0842 | | | | | | | | | |
| GA1 | 1455 | 1450 | 1463 | | | | | | | | |
| GA2 | 1451 | 1446 | | | | | | | | | |
| GADD | 1437 | 0511 | 0527 | 0986 | 0998 | 1181 | 1377 | | | | |
| GETAD | 0459 | | | | | | | | | | |
| GETCH | 0469 | 0878 | 0881 | 0944 | 1061 | 1073 | 1304 | 1322 | 1355 | | |
| GETSK | 0473 | 0734 | 1131 | 1237 | 1242 | | | | | | |
| GFLAG | 0402 | | | | | | | | | | |
| GFRST | 0472 | 0604 | 1204 | 1269 | | | | | | | |
| GNEXT | 0471 | 0605 | 0668 | 0970 | 1201 | 1226 | | | | | |
| GOTOE | 1335 | 1331 | | | | | | | | | |
| GP1 | 1004 | 0912 | 0993 | | | | | | | | |
| GP2 | 0997 | 0913 | | | | | | | | | |
| GPARM | 0422 | | | | | | | | | | |
| GPTRS | 0986 | 0866 | 1007 | 1293 | | | | | | | |
| GQUOT | 1592 | 1004 | 1389 | | | | | | | | |
| GSIGN | 0484 | | | | | | | | | | |
| GSYMB | 1611 | 1438 | | | | | | | | | |
| GTCON | 0498 | | | | | | | | | | |
| GTE | 0827 | 0659 | 0659 | | | | | | | | |
| GTEA | 0659 | 0636 | | | | | | | | | |
| GTMP | 0470 | | | | | | | | | | |
| GTOPP | 0464 | 1437 | | | | | | | | | |
| GTSTA | 0213 | 0557 | 0648 | 0740 | 0810 | 0859 | | | | | |
| GVAR | 0966 | 0849 | 0915 | | | | | | | | |
| HFLG1 | 0321 | | | | | | | | | | |
| HSTPT | 0302 | 0940 | 1149 | 1150 | | | | | | | |
| I | 0067 | 0951 | | | | | | | | | |
| ICNT | 0420 | | | | | | | | | | |
| ID | 1750 | 0658 | 0658 | 0659 | 0659 | 1710 | 1710 | | | | |
| ID1 | 0509 | 1162 | 1163 | 1700 | 1700 | 1702 | 1702 | 1703 | 1703 | 1704 | 1704 |
| IF1 | 0644 | | | | | | | | | | |
| IF2 | 0649 | 0647 | | | | | | | | | |
| IF3 | 0648 | 0645 | | | | | | | | | |
| IFERR | 0656 | 0640 | 0646 | | | | | | | | |
| IFEX | 1293 | 1740 | | | | | | | | | |
| IFSYN | 0633 | 1674 | | | | | | | | | |
| ILET1 | 0680 | 0671 | 0674 | 0675 | 0678 | | | | | | |
| ILET2 | 0690 | 0688 | | | | | | | | | |
| IMPLT | 0665 | 1677 | | | | | | | | | |
| IMPY | 0485 | | | | | | | | | | |
| INC1 | 1281 | 1268 | 1270 | | | | | | | | |
| INC2 | 1285 | 1282 | | | | | | | | | |
| INCAL | 1263 | 1180 | 1203 | 1284 | | | | | | | |
| INCH1 | 1160 | 1132 | | | | | | | | | |
| INCH2 | 1153 | 1135 | | | | | | | | | |
| INCH5 | 1142 | 1122 | | | | | | | | | |
| INCHT | 1147 | 1162 | | | | | | | | | |
| INDS2 | 0918 | 0925 | | | | | | | | | |
| INDXS | 0915 | 0865 | | | | | | | | | |
| INF | 0077 | | | | | | | | | | |
| INITS | 0454 | | | | | | | | | | |
| INLN1 | 1162 | 1118 | | | | | | | | | |
| INLNK | 1163 | 1105 | | | | | | | | | |
| INREA | 0226 | | | | | | | | | | |
| INRET | 1108 | 1163 | | | | | | | | | |
| INSTR | 1176 | 1104 | | | | | | | | | |
| INTCK | 0457 | | | | | | | | | | |
| INTEA | 0178 | | | | | | | | | | |
| INTFL | 0075 | | | | | | | | | | |
| INTGR | 0400 | | | | | | | | | | |
| INTMP | 1709 | 0874 | 0892 | 0989 | 1200 | 1217 | 1246 | 1327 | 1400 | 1415 | |
| IOBUF | 0357 | | | | | | | | | | |
| IOHEA | 0229 | 0703 | | | | | | | | | |
| IOSTA | 0225 | | | | | | | | | | |
| KEYFG | 0324 | | | | | | | | | | |
| L2T1 | 0345 | | | | | | | | | | |
| L2T2 | 0346 | 0530 | | | | | | | | | |
| LASTN | 0396 | | | | | | | | | | |
| LBOP | 0119 | 0583 | 1449 | | | | | | | | |
| LDEF | 0487 | | | | | | | | | | |
| LEN | 0824 | 1710 | 1710 | 1746 | | | | | | | |
| LENA | 1710 | | | | | | | | | | |
| LENER | 0900 | 0850 | 0851 | 0916 | 0917 | | | | | | |
| LENS | 0849 | 0907 | | | | | | | | | |
| LENS1 | 0852 | 0860 | 0923 | | | | | | | | |
| LENS2 | 0858 | 0921 | | | | | | | | | |
| LETCK | 0462 | 0670 | | | | | | | | | |

CROSS-REFERENCE TABLE

| | | | | | | | | | | | |
|---|---|---|---|---|---|---|---|---|---|---|---|
| LETS | 0539 | 1669 | | | | | | | | | |
| LIMIT | 0463 | | | | | | | | | | |
| LISTA | 0167 | | | | | | | | | | |
| LNFD | 0072 | | | | | | | | | | |
| LNINC | 0315 | | | | | | | | | | |
| LNUM | 0455 | 0654 | | | | | | | | | |
| LOCL1 | 0343 | 1407 | | | | | | | | | |
| LOCL2 | 0344 | | | | | | | | | | |
| LPCK | 0435 | 0581 | | | | | | | | | |
| LPCKE | 0436 | 0973 | | | | | | | | | |
| LPOP | 0120 | | | | | | | | | | |
| LROMA | 0123 | | | | | | | | | | |
| LSTAK | 0299 | | | | | | | | | | |
| LSTPT | 0301 | 0935 | 1182 | 1503 | 1505 | | | | | | |
| LT2 | 1017 | 1010 | 1012 | | | | | | | | |
| LT4 | 1008 | | | | | | | | | | |
| LT5 | 1032 | | | | | | | | | | |
| LTEX | 1007 | 1618 | 1735 | | | | | | | | |
| LTR | 0477 | 0574 | | | | | | | | | |
| LTSYM | 0552 | 0679 | | | | | | | | | |
| LWAM | 0295 | | | | | | | | | | |
| M1 | 0124 | 0616 | 0732 | 0745 | 1008 | 1186 | 1192 | 1195 | 1221 | 1318 | 1352 |
| | 1392 | 1439 | 1453 | 1473 | 1511 | 1529 | 1533 | 1566 | | | |
| M10 | 0131 | | | | | | | | | | |
| M100 | 0144 | | | | | | | | | | |
| M1024 | 0146 | 1707 | | | | | | | | | |
| M11 | 0132 | | | | | | | | | | |
| M12 | 0133 | | | | | | | | | | |
| M13 | 0134 | | | | | | | | | | |
| M14 | 0135 | | | | | | | | | | |
| M15 | 0136 | | | | | | | | | | |
| M2 | 0125 | 0528 | 0869 | 0999 | 1095 | 1183 | 1296 | | | | |
| M23 | 0137 | | | | | | | | | | |
| M25 | 0138 | | | | | | | | | | |
| M256 | 0145 | 1578 | | | | | | | | | |
| M3 | 0126 | 1504 | | | | | | | | | |
| M32 | 0139 | | | | | | | | | | |
| M36 | 0140 | | | | | | | | | | |
| M4 | 0127 | 1336 | | | | | | | | | |
| M48 | 0141 | | | | | | | | | | |
| M5 | 0128 | | | | | | | | | | |
| M6 | 0129 | | | | | | | | | | |
| M64 | 0142 | | | | | | | | | | |
| M80 | 0143 | | | | | | | | | | |
| M9 | 0130 | | | | | | | | | | |
| MASK1 | 0153 | | | | | | | | | | |
| MASK5 | 0154 | | | | | | | | | | |
| MAW | 0294 | | | | | | | | | | |
| MAXIN | 0398 | | | | | | | | | | |
| MAXSN | 0147 | | | | | | | | | | |
| MBIN1 | 0404 | | | | | | | | | | |
| MBIN2 | 0405 | | | | | | | | | | |
| MBOX1 | 0349 | | | | | | | | | | |
| MDIMA | 0208 | | | | | | | | | | |
| MER8 | 0443 | 0948 | | | | | | | | | |
| MINIT | 0453 | | | | | | | | | | |
| MODE | 0305 | 0606 | 0685 | 0863 | 0904 | 1011 | 1278 | | | | |
| MPT | 1719 | 1515 | 1528 | 1532 | 1543 | | | | | | |
| MSDAT | 1725 | 1408 | | | | | | | | | |
| MSFLG | 0387 | 0586 | | | | | | | | | |
| MSL | 0527 | 0509 | | | | | | | | | |
| MVTOH | 0475 | | | | | | | | | | |
| NDISP | 0380 | 1177 | | | | | | | | | |
| NDWRT | 0494 | | | | | | | | | | |
| NEXT1 | 0448 | | | | | | | | | | |
| NEXTA | 0465 | 1111 | 1228 | | | | | | | | |
| NEXTL | 0447 | 1406 | | | | | | | | | |
| NMOTA | 0200 | | | | | | | | | | |
| NOEOF | 0480 | | | | | | | | | | |
| NPRIN | 0381 | 1178 | | | | | | | | | |
| NPWRT | 0493 | | | | | | | | | | |
| NOT | 1720 | 1530 | 1552 | 1575 | 1579 | 1587 | | | | | |
| NSTMT | 0688 | 0686 | | | | | | | | | |
| NTAB | 1654 | 1748 | | | | | | | | | |
| NUM | 0394 | 0395 | 0619 | 0815 | | | | | | | |
| NUMCA | 0211 | | | | | | | | | | |
| NUMOA | 0212 | 0802 | | | | | | | | | |
| NXTDT | 0304 | 1367 | | | | | | | | | |
| NXTST | 0403 | | | | | | | | | | |
| OBLNK | 0466 | | | | | | | | | | |
| ODGIT | 0490 | | | | | | | | | | |
| ONE | 0045 | | | | | | | | | | |
| ONEXT | 0467 | 0945 | 0952 | | | | | | | | |
| OPCHA | 0171 | | | | | | | | | | |
| OPDMK | 0079 | 1328 | | | | | | | | | |
| OPMSK | 0076 | 0994 | 0995 | 1448 | | | | | | | |
| OPTYP | 0395 | | | | | | | | | | |
| OTPTR | 0293 | | | | | | | | | | |
| OUTCR | 0468 | 1033 | 1064 | 1079 | | | | | | | |
| OUTIA | 0179 | | | | | | | | | | |

CROSS-REFERENCE TABLE

| | | | | | | | | | | | |
|---|---|---|---|---|---|---|---|---|---|---|---|
| OVCHA | 0216 | | | | | | | | | | |
| PARMA | 0306 | | | | | | | | | | |
| PARMN | 0307 | | | | | | | | | | |
| PBPTO | 0313 | | | | | | | | | | |
| PBPTR | 0310 | 1403 | | | | | | | | | |
| PBUFF | 0311 | | | | | | | | | | |
| PBUFO | 0312 | | | | | | | | | | |
| PEND | 0363 | 0942 | 0947 | | | | | | | | |
| PEXMA | 0165 | 1108 | | | | | | | | | |
| PFLAG | 0389 | 0733 | 0746 | 0748 | | | | | | | |
| PGIN0 | 0476 | | | | | | | | | | |
| PGINT | 0456 | | | | | | | | | | |
| PI/2 | 0044 | | | | | | | | | | |
| PLACE | 0382 | | | | | | | | | | |
| PMODE | 0329 | | | | | | | | | | |
| PPFF | 0364 | | | | | | | | | | |
| PR1 | 0773 | 0735 | | | | | | | | | |
| PR2 | 0736 | 0728 | 0731 | | | | | | | | |
| PR3 | 0748 | 0738 | | | | | | | | | |
| PR4 | 0760 | 0752 | | | | | | | | | |
| PR5 | 0770 | 0759 | 0766 | | | | | | | | |
| PR6 | 0767 | 0764 | | | | | | | | | |
| PRADD | 0308 | 1098 | 1112 | 1127 | 1229 | 1373 | 1399 | 1401 | 1402 | 1413 | 1416 |
| | 1445 | | | | | | | | | | |
| PREX | 1621 | 1742 | | | | | | | | | |
| PRFLG | 0332 | | | | | | | | | | |
| PRIN1 | 0712 | 0689 | 0784 | 0804 | | | | | | | |
| PRIN2 | 0715 | 0711 | | | | | | | | | |
| PRINS | 0709 | 1673 | 1676 | | | | | | | | |
| PRINT | 1637 | 1621 | | | | | | | | | |
| PRNTS | 0732 | 0687 | 0710 | | | | | | | | |
| PRSYN | 0727 | 0747 | 0772 | | | | | | | | |
| PRTOP | 0694 | 0681 | | | | | | | | | |
| PS0 | 1722 | 1502 | 1521 | 1541 | 1547 | 1554 | 1562 | | | | |
| PS1 | 1723 | 1215 | 1235 | 1507 | 1526 | 1573 | | | | | |
| PS2 | 1518 | | | | | | | | | | |
| PSTR | 1502 | 0512 | 0529 | 0870 | 1000 | 1009 | 1196 | 1297 | 1393 | | |
| PSTR1 | 1526 | 1522 | | | | | | | | | |
| PSTR2 | 1530 | 1520 | 1525 | | | | | | | | |
| PSTR3 | 1562 | 1545 | | | | | | | | | |
| PSTR4 | 1567 | 1558 | 1561 | 1563 | | | | | | | |
| PSTR5 | 1570 | 1555 | | | | | | | | | |
| PSTR6 | 1577 | 1588 | | | | | | | | | |
| PSTR7 | 1584 | 1574 | | | | | | | | | |
| PSTR8 | 1537 | 1534 | | | | | | | | | |
| PTR1 | 1711 | 0885 | 0931 | 1002 | 1015 | 1024 | 1039 | 1040 | 1062 | 1067 | 1198 |
| | 1206 | 1391 | 1655 | | | | | | | | |
| PTR1A | 1655 | 0877 | 0943 | 1060 | 1303 | 1354 | | | | | |
| PTR2 | 1712 | 0852 | 0868 | 0884 | 0939 | 0953 | 0967 | | | | |
| QMRKA | 1708 | 1265 | | | | | | | | | |
| QTCHA | 0230 | | | | | | | | | | |
| QTOP | 0109 | 0161 | | | | | | | | | |
| QUOCK | 0556 | 0553 | | | | | | | | | |
| RBOP | 0117 | 0593 | 0756 | | | | | | | | |
| RBUFF | 0358 | | | | | | | | | | |
| RCOUT | 0333 | | | | | | | | | | |
| RDSTR | 1377 | 1361 | | | | | | | | | |
| RDYDA | 0166 | | | | | | | | | | |
| READ1 | 0786 | 0782 | | | | | | | | | |
| READ2 | 0783 | 0788 | 0789 | | | | | | | | |
| READ3 | 0790 | 0781 | | | | | | | | | |
| READS | 0779 | 0785 | 1670 | 1671 | | | | | | | |
| REED | 0161 | | | | | | | | | | |
| REEDL | 1727 | 1267 | | | | | | | | | |
| REEDX | 1642 | 1285 | | | | | | | | | |
| REEDY | 1643 | 1275 | | | | | | | | | |
| RES | 0415 | | | | | | | | | | |
| RESB1 | 0451 | | | | | | | | | | |
| RESBP | 0452 | 0680 | | | | | | | | | |
| RET2 | 0419 | | | | | | | | | | |
| RETN2 | 0418 | 0533 | 0578 | 0742 | 0771 | 0774 | | | | | |
| RETN3 | 0417 | 0582 | 0597 | 0857 | | | | | | | |
| RITE | 1636 | 1619 | | | | | | | | | |
| RPCK | 0437 | | | | | | | | | | |
| RPCKE | 0438 | 0592 | 0704 | 0854 | | | | | | | |
| RPOP | 0115 | | | | | | | | | | |
| RSAVE | 0292 | | | | | | | | | | |
| RSLTE | 0371 | | | | | | | | | | |
| RSPTR | 0416 | 0906 | 1090 | | | | | | | | |
| RSTAK | 0414 | | | | | | | | | | |
| RSTKA | 0158 | 1089 | | | | | | | | | |
| RSULT | 0424 | 1125 | 1372 | | | | | | | | |
| RUNA | 0163 | | | | | | | | | | |
| S | 0082 | | | | | | | | | | |
| SALT | 1634 | 0625 | | | | | | | | | |
| SALTA | 0207 | | | | | | | | | | |
| SAVBP | 0450 | 0672 | | | | | | | | | |
| SAVE | 1717 | 1106 | 1119 | 1172 | 1259 | 1260 | | | | | |
| SAVEA | 0325 | | | | | | | | | | |

CROSS-REFERENCE TABLE

| | | | | | | | | | | | |
|---|---|---|---|---|---|---|---|---|---|---|---|
| SAVEB | 0326 | | | | | | | | | | |
| SAVEP | 0815 | 0539 | 0573 | 0665 | 0709 | 0779 | 0798 | | | | |
| SBADR | 0392 | | | | | | | | | | |
| SBPTR | 0385 | 0556 | 0584 | 0594 | 0595 | 0596 | 0615 | 0641 | 0643 | 0682 | 0683 |
| | 0684 | 0706 | 0739 | 0744 | 0757 | 0773 | 0799 | 0858 | 0972 | 1117 | |
| SBPUD | 0429 | 0755 | | | | | | | | | |
| SBUFA | 0199 | 0608 | 0613 | | | | | | | | |
| SEC | 0320 | | | | | | | | | | |
| SFLAG | 0391 | 0621 | | | | | | | | | |
| SGNS | 0491 | | | | | | | | | | |
| SIGN | 0397 | 0398 | | | | | | | | | |
| SLCOD | 0328 | | | | | | | | | | |
| SLEND | 0202 | | | | | | | | | | |
| SLWST | 0445 | 0930 | 1442 | 1452 | 1454 | 1476 | | | | | |
| SNFLA | 0197 | | | | | | | | | | |
| SPLFA | 0196 | | | | | | | | | | |
| SPRDD | 1716 | 1096 | 1097 | 1110 | 1227 | | | | | | |
| SSRPT | 0393 | | | | | | | | | | |
| SSYMA | 0170 | 1611 | | | | | | | | | |
| ST | 0375 | 0579 | 0618 | 0623 | 0637 | 0638 | 0650 | 0651 | 0666 | 0690 | 0712 |
| | 0715 | 0762 | 0767 | 0790 | 0806 | 0816 | 0817 | 0819 | 0856 | 0968 | 1320 |
| | [illegible] | 1705 | 1706 | 1709 | 1711 | 1712 | 1713 | 1715 | 1716 | 1717 | 1718 |
| | 1719 | 1720 | 1721 | 1722 | 1723 | | | | | | |
| START | 0162 | 0007 | | | | | | | | | |
| STDAT | 1726 | 1410 | | | | | | | | | |
| STEXP | 0441 | 0639 | 0652 | | | | | | | | |
| STMTA | 1633 | 0627 | | | | | | | | | |
| STORI | 0426 | | | | | | | | | | |
| STORE | 0425 | | | | | | | | | | |
| STPFL | 0323 | | | | | | | | | | |
| STRI2 | 1640 | 0580 | | | | | | | | | |
| STRID | 1639 | | | | | | | | | | |
| STROP | 0428 | | | | | | | | | | |
| STSRH | 0440 | | | | | | | | | | |
| SUBEV | 1470 | 1455 | 1461 | | | | | | | | |
| SUMPA | 0227 | | | | | | | | | | |
| SVARO | 0574 | 0510 | 0540 | 0552 | 0633 | 0644 | 0673 | 0763 | 0780 | 0920 | 0975 |
| SWITH | 1641 | 1363 | 1366 | 1378 | 1395 | | | | | | |
| SYE12 | 0483 | | | | | | | | | | |
| SYE25 | 0458 | | | | | | | | | | |
| SYMC1 | 0431 | 0543 | 0588 | 0676 | | | | | | | |
| SYMC2 | 0430 | 0729 | | | | | | | | | |
| SYMCK | 0432 | | | | | | | | | | |
| SYMTP | 0298 | | | | | | | | | | |
| SYN | 1681 | 1749 | | | | | | | | | |
| SYTSA | 0209 | | | | | | | | | | |
| TABA | 1635 | 0750 | | | | | | | | | |
| TEMP | 0348 | 0349 | 0617 | | | | | | | | |
| TEMP1 | 0350 | | | | | | | | | | |
| TEMP2 | 0351 | | | | | | | | | | |
| TEMP3 | 0352 | | | | | | | | | | |
| TEMP4 | 0353 | | | | | | | | | | |
| TEMP6 | 1718 | 0855 | 0969 | 1231 | 1233 | 1512 | 1523 | 1538 | 1546 | 1577 | 1580 |
| | 1584 | 1597 | 1601 | 1603 | | | | | | | |
| TEMPS | 0347 | 0843 | 0853 | 0908 | 0909 | 0966 | 0987 | 0988 | 0990 | 0996 | 0997 |
| | 1094 | 1099 | 1101 | 1113 | 1126 | 1136 | 1148 | 1358 | 1374 | 1379 | 1382 |
| | 1383 | 1405 | 1443 | 1444 | 1447 | 1456 | 1457 | 1462 | 1475 | 1592 | 1595 |
| | 1602 | | | | | | | | | | |
| TEPPP | 1715 | 1100 | 1114 | 1129 | 1147 | | | | | | |
| TERM | 0362 | 1091 | | | | | | | | | |
| TFLAG | 0318 | | | | | | | | | | |
| TFLG1 | [illegible] | | | | | | | | | | |
| THEN | 0826 | 0658 | 0658 | | | | | | | | |
| THENA | 0658 | 0649 | | | | | | | | | |
| TMP2 | 1714 | 0532 | 0895 | 1026 | 1041 | 1042 | 1065 | 1066 | 1197 | 1207 | 1509 |
| | 1516 | 1517 | 1567 | 1724 | | | | | | | |
| TMP2A | 1724 | 0880 | 1032 | 1063 | 1078 | 1321 | | | | | |
| TMPA | 0203 | | | | | | | | | | |
| TMPOP | 0184 | | | | | | | | | | |
| TMPRE | 1713 | 0873 | 0886 | 1001 | 1014 | 1045 | 1050 | 1054 | 1057 | 1194 | 1219 |
| | 1348 | 1353 | 1390 | 1527 | | | | | | | |
| TNULL | 1721 | 0876 | 0890 | 0932 | 0949 | 1028 | 1035 | 1043 | 1051 | 1070 | 1199 |
| | 1213 | 1220 | 1222 | 1232 | 1247 | 1306 | 1537 | 1556 | | | |
| TR1 | 1035 | 1027 | | | | | | | | | |
| TR2 | 1028 | 1034 | 1223 | | | | | | | | |
| TR3 | 1060 | 1055 | | | | | | | | | |
| TR4 | 1051 | 1068 | | | | | | | | | |
| TR5 | 1063 | 1059 | | | | | | | | | |
| TREGE | 0370 | | | | | | | | | | |
| TRSTR | 1024 | 0513 | 1017 | 1394 | | | | | | | |
| TSRHA | 0168 | 0751 | | | | | | | | | |
| TSTPT | 0300 | | | | | | | | | | |
| TTY | 0497 | | | | | | | | | | |
| TYPFL | 0078 | 0754 | | | | | | | | | |
| UFLAG | 0390 | | | | | | | | | | |
| UKPTR | 0309 | | | | | | | | | | |
| UNITS | 0319 | | | | | | | | | | |
| UNSTK | 0446 | 0957 | | | | | | | | | |
| UPARA | 0191 | | | | | | | | | | |
| VALER | 0960 | 0934 | 0956 | | | | | | | | |

CROSS-REFERENCE TABLE

```
VALUE  0297
VAR1   1632     0786
VAROA  0214
WBUFF  0421
WIDTH  0383
WREX   1619     1741
WRITE  0159
WRTS   0703     1675
XC     0410     1714
XEC4A  0164     1018     1166     1332     1338     1340     1342     1344     1375     1617
XEC6A  0221
XFAR1  0423
XFAR2  0427
XFER   1001     1005
XSCRA  0220
YC     0412
ZAP    0152
ZONK   0488
```

#01 9830--BASE PAGE READ-WRITE MEMORY

```
0507                      LST
0508*
0509*  R/W TEMPORARIES
0510*
0511  01640               ORG 1640B
0512*
0513  01640 000000 YH     BSS 1
0514  01641 000000 XH     BSS 1
0515  01642 000000 XW     BSS 1
0516  01643 000000 YW     BSS 1
0517  01644 000000 CP3    BSS 1
0518  01645 000000 CP4    BSS 1
0519  01646 000000 T3     BSS 1
0520  01647 000000 T1     BSS 1
0521*
0522  01650 000000 XN     BSS 4
0523  01654 000000 XX     BSS 4
0524  01660 000000 YN     BSS 4
0525  01664 000000 YX     BSS 4
0526*
0527  01670 000000 Z1     BSS 4
0528  01674 000000 Z2     BSS 4
0529*
0530*  THESE FOUR WORDS ARE NOT SAFE DURING FUNCTIONS
0531*
0532  01734               ORG 1734B
0533  01734 000000 DX     BSS 1
0534  01735 000000 DY     BSS 1
0535  01736 000000 CPX    BSS 1
0536  01737 000000 CPY    BSS 1
0537*
0538  01473        CCNT   EQU TEMPS+1
0539  01477        TEMPS  EQU TEMPS+5
0540  01734        CP2    EQU DX
0541  01735        CPT    EQU DY
0542  01736        T4     EQU CPX
0543  01737        T2     EQU CPY
```

#01 9830 PLOTTER BLOCK

```
0545  22000               ORG 22000B
0546*
0547*
0548*    THE PLOT BLOCK HAS ABSOLUTE ADDRESSES TO THE
0549*    FOLLOWING BASIC SYSTEM SUBROUTINES
0550*
0551*    COS
0552*    SIN
0553*    RITE  WRITE STATEMENT SYNTAX
0554*    PRINN  PRINT STATEMENT EXCUTION
0555*    SCER1  FORMAT EXCUTION
0556*    MOVCK  MOVE THE SYMBOL TO LOWER MEMORY
0557*    TYPEC
0558*    QTCHK
0559*    FSPR
0560*    CKEOL
0561*    PFORM
0562*    KEYIN
0563*    VALUP
0564*    TBSR1
0565*
0566*  SPECIAL SYMBOL CODE'S USED IN THIS BLOCK ARE AS FOLLOWS:
0567*
0568*  B1740 SCALING INFORMATION
0569*  B1760 CHARACTER DEFINITION
0570*   1660 CARRIAGE RETURN INFORMATION
0571*
```

```
#01  9830 PLOTTER BLOCK

          CODE STARTED 10-26-71

          RELATIVE ADDRESSES TO SCALEING IMFORMATION IS AS FOLLOWS

           0 = X SCALE FACTOR
           4 = Y SCALE FACTOR
           8 = X ADJUST
          12 = Y ADJUST
          16 = X PRESENT POSITION
          20 = Y PRESENT POSITION
          24 = X OFFSET
          28 = Y OFFSET

            CONSTANTS AND EQUATES


22000 001400 N9/6  OCT 1400        1666.66  ** DON'T MOVE - IT'S RELATIVE ADDRESS = 0
22001 013146       OCT 13146
22002 063146       OCT 63146
22003 063146       OCT 63146

22004 001400       OCT 1400        9999  ** DON'T MOVE, IT'S RELATIVE ADDRFSS =4
22005 114631       OCT 114631
22006 000000       OCT 0
22007 000000       OCT 0


            GET THE PEN CONTROL PARAMETER

22010 025654 PNPAR LDB XX          RECALL THE PEN CONTROL
22011 074113       SBP *+2         IF PSITIVE DO CONTROL NOW
22012 170402       RET             IT'S NEGTIVE SOPEN CONTROL AFTER
22013 075750 .P1   SZB *-1         IF ZERO, NO PEN CONTROL
22014 074251       SLB PENDN

22015 062032 PENUP JSM STATU
22016 075613       SBP .P1-1
22017 020017       LDA .2
22020 066024       JMP PENDN+3
22021 062032 PENDN JSM STATU
22022 075412       SBM .P1-1
22023 020020       LDA .3
22024 070246       RAR 6

22025 062032 BUSY  JSM STATU
22026 074644       SBL 3
22027 075713       SBP BUSY
22030 043737       IOR SC16
22031 065356       JMP TTY+3
22032 027737 STATU LDB SC16
22033 172741       STF 1
22034 176141       OTB 1
22035 172741       STF 1
22036 177241       LIB 1,C
22037 074546       RBR 12
22040 170402       RET

22041 070742 AMOVE SAR 16
22042 031477       STA TEMP5      ALTERNATE ENTRY FOR ABINCRMENTAL MOVE

22043 023500 MOVE  LDA XMIN
22044 062070       JSM .M
22045 040107       IOR B1000
22046 062025       JSM BUSY
22047 021754       LDA AR2
22050 050105       AND B377
22051 040013       IOR B400
22052 062025       JSM BUSY
22053 023502       LDA YMIN
22054 062070       JSM .M
22055 040013       IOR B400
22056 062025       JSM BUSY
22057 021754       LDA AR2
22060 050105       AND B377
22061 040013       IOR B400
22062 041477       IOR TEMP5
22063 062025       JSM BUSY

22064 025442       LDB STPFL
22065 014040       CPB .31        STOP KEY HIT
22066 066554       JMP EPEN       YES
22067 170402       RET            NO

22070 060445 .M    JSM XFAR2+1
22071 160225       JSM FLTRA,I
22072 001654 XMAX  DEF XX
22073 074117       LDA B
22074 074212       SBM *+4
22075 004161       ADB MAXSN
22076 074112       SBM *+2
```

```
#01  9830 PLOTTER BLOCK

22077 023514       LDA .9999
22100 031754 STOR2 STA AR2
22101 070342       SAR 8
22102 170402       RET
*
*      FIND THE ADDRESS OF THE R/W WORDS .
*      ON RETURN THE ADDRESS OF THE 1ST WORD IS IN B AND T1.
*
22103 062015        JSM PENUP
22104 020111 GETRW LDA STEAL      LOAD THE CODE WORD
22105 160177       JSM SSYMA,I    LOOK FOR IT IN SYMBOL TABLE
22106 066113       JMP *+5        NOT FOUND
22107 004132 GE1   ADB M1
22110 074537       LDB B,I
22111 035647       STB T1
22112 170402       RET
*
22113 160205       JSM AERRA,I
22114 177660       DEC -80        NO SCALE COMMAND EXECUTED BEFORE PLOT, FCT
*
*
*      TRANSFER ROUTINES
22115 021646 WHERE LDA T3
22116 070352       SAM TXM
*
22117 027502 TYM   LDB YMIN
22120 064406       JMP XFAR1+1
*
22121 027504 TYX   LDB YMAX
22122 064406       JMP XFAR1+1
*
22123 021646 OWHER LDA T3
22124 071552       SAM TYM        SKIP TO TYM IF IN XAXIS MODE
22125 027500 TXM   LDB XMIN
22126 064406       JMP XFAR1+1
*
22127 026072 TXX   LDB XMAX
22130 064406       JMP XFAR1+1
*
22131 027772 TEMXX LDB TEMX
22132 064406       JMP XFAR1+1
*
22133 021737       LDA T2
22134 160216       JSM .FADA,I
22135 025737 TRANS LDB T2
22136 064406       JMP XFAR1+1
*
*
22137 000051       ABS SPEN-*     LETTER EYNTAX
22140 000165       ABS OFFS-*     CPLOT SYNTAX
22141 000102       ABS SCALE-*    SCALE SYNTAX
22142 000047       ABS SAXIS-*
22143 000046       ABS SAXIS-*    XAXIS SYNTAX
22144 000103       ABS PLOT-*     PLOT SYNTAX
22145 000100       ABS OFFS-*
22146 000042       ABS SPEN-*
22147 000051       ABS LABEL-*
22150 000077       ABS PLOT-*
22151 000000       BSS 1          *** CHECKSUM WORD ***
*
22152 044520 SNAME ASC 1,IP       IPLOT
22153 046117       ASC 1,LO
22154 052242       OCT 52242      T
22155 046101       ASC 1,LA       LABEL
22156 041105       ASC 1,BE
22157 046243       OCT 46243      L
22160 050105       ASC 1,PE       PEN
22161 047244       OCT 47244      N
22162 047506       ASC 3,OFFSET
22163 043123
22164 042524
22165 122520       OCT 122520     P
22166 046117       ASC 1,LO       PLOT
22167 052246       OCT 52246      T; OP CODE 6
22170 054101       ASC 1,XA       XAXIS
22171 054111       ASC 1,XI
22172 051647       OCT 51647      S
22173 054501       ASC 1,YA       YAXIS
22174 054111       ASC 1,XI
22175 051650       OCT 51650      S
22176 051503       ASC 2,SCAL     SCALE ; OP CODE 9
22177 040514
22200 042651       OCT 42651      E; OP CODE 9
22201 041520       ASC 2,CPLO
22202 046117
22203 052252       OCT 52252      T; OP CODE 10
22204 046105       ASC 3,LETTER   FREE MODE
22205 052124
22206 042522
22207 165400       OCT 165400     OP CODE 11
*
*      END OF SNYTAX NAME TABLE
*
```

#01 SYNTAX CODE FOR 9830 PLOTTER

```
      PEN STATEMENT SYNTAX

22210 065147 SPEN  JMP ENDS

      AXIS SYNTAX

22211 160202 SAXIS JSM FSCA,I    DEMAND AN OPPSITIE ORGIN
22212 060504       JSM COMCK     ,?
22213 065151       JMP EOST      NO DEMAND EOL
22214 160202       JSM FSCA,I    YES, DEMAND A TIC PARAMETER
22215 060504       JSM COMCK
22216 065151       JMP EOST
22217 066245       JMP OFFS

      LABEL STATEMENT SYNTAX

22220 060456 LABEL JSM SBPUD     UPDATE POINTER
22221 060520       JSM LPCKE-1   DEMAND LEFT PAREN.
22222 061055       JSM GNEXT
22223 060456       JSM SBPUD
22224 060463       JSM SYMC1     CHECK FOR "*"
22225 012012       DEF 12012B
22226 066240       JMP LAB2      NOT FOUND , MUST BE NUMBER
22227 060456       JSM SBPUD
22230 061055       JSM GNEXT
22231 060504 LAB3  JSM COMCK    FOUND, NOW CHECK FOR OPTIONAL PARAMETERS
22232 066237       JMP LAB1      P+1 , NO OPTIONS, GO DEMAND A RIGHT PAREN.
22233 062254       JSM FORM3     P+2, OPTIONS ARE THERE
22234 060504       JSM COMCK     CHECK IF PAPER DEMENSIONS ARE PRESENT
22235 066237       JMP LAB1      NO
22236 160202       JSM FSCA,I    YES, GET AFORMULA
22237 167562 LAB1  JMP RITE,I
22240 055706 LAB2  DSZ SBPTR
22241 060663       JSM LNUM-1
22242 066231       JMP LAB3

      SCALE STATEMENT SYNTAX

22243 062256 SCALE JSM FORM2
22244 060510       JSM COMCE
22245 062256 OFFS  JSM FORM2
22246 065151       JMP EOST

      PLOT AND IPLOT STATEMENT SYNTAX

22247 062256 PLOT  JSM FORM2     DEMAND X AND Y COOR.
22250 060504       JSM COMCK     CHECK FOR COMMA
22251 065151       JMP EOST      "," NOT FOUND, DEMAND E.O.S.
22252 160202       JSM FSCA,I    PROCESS OPTIONAL PEN COMMAND
22253 065151       JMP EOST      DEMAND E.O.S.

22254 160202 FORM3 JSM FSCA,I
22255 060510       JSM COMCE     DEMAND ,
22256 160202 FORM2 JSM FSCA,I
22257 060510       JSM COMCE     DEMAND ,
22260 164202       JMP FSCA,I
```

#01 EXECUTION PHASE OF 9830 PLOTTER BLOCK

```

22261 160201 FORM  JSM FORMA,I
22262 160201       JSM FORMA,I
22263 160201       JSM FORMA,I
22264 164201       JMP FORMA,I

      SCALE EXECUTION

00111        STEAL EQU B1740

22265 062652 ESCAL JSM CURPG     GET CURRENT PAGE
22266 062261       JSM FORM     STACK 4 FORMULA

22267 020111       LDA STEAL     LOAD SYMBOL FOR R/W WORDS
22270 160177       JSM SSYMA,I   CHECH IF PLOTTER WORDS ARE SAVED ALREADY
22271 066273       JMP *+2       NO, ENTER SAME
22272 066306       JMP ES1       YES, SKIP ENTRY
22273 025406       LDB VALUE     ENTER PLOTTER R/W WORDS INTO STACKS
22274 023520       LDA M34       MOVE DOWN 34 PLACES, 32 FOR VALUES

 MOVE H-STACK DOWN AND CHEKC FOR OVERFLOW

   MOVE DOWN -(A) WORDS
   (B) = ADDRESS+1 OF THE LAST WORD TO BE MOVED

22275 163666       JSM MOVCK,I

22276 003520       ADA M34
22277 070137       LDB A         POINTER TO VALUE TABLE
22300 000017       ADA .2        POINTER TO 1ST WORD OF R/W
22301 074557       STA B,I       STORE ADDRESS POINTER TO PLOTTER R/W
22302 074070       SIB *+1
```

```
PAGE 0619 #01  EXECUTION PHASE OF 9830 PLOTTER BLOCK

22303 020111        LDA STEAL       LOAD PLOTTER R/W CODE
22304 074557        STA B,I
22305 035406        STB VALUE
*
22306 062107 ES1    JSM GE1         LOAD THE ADDRESS POINTER TO 1ST WORD OF PLOTTER R/W
22307 035737        STB T2          SAVE B TEMPORARLY FOR ZERING
22310 070742        SAR 16          CLEAR A
22311 027554        LDB M31
22312 131737        STA T2,I        ZERO 33 WORDS OF R/W
22313 045737        ISZ T2
22314 077730        RIB *-2         LOOP BACK IF NOT ZERO
*
*
*  COMPUTE THE SCALE FACTOR = 9999/(YMAX-YMIN)
*  AND YADJUST = -(S.F.*YMIN)
*
22315 020021        LDA .4          * SET-UP Y SCALE FACTOR
22316 062322        JSM SCAL        *
22317 070004        SAL 16          *
22320 062322        JSM SCAL        *
22321 164172        JMP XEC4A,I     RETURN TO MONITOR
*
*  SCAL ROUTINE IS USED FOR X AND Y SCALE FACTORS
*   AND ADJUST VALUES
*
22322 031735 SCAL   STA CPT
22323 061220        JSM FETCH+1     RECALL THE MAX
22324 062127        JSM TXX
22325 061220        JSM FETCH+1     RECALL THE MIN
22326 062117        JSM TYM
22327 024033        LDB .16
22330 062344        JSM TR/W-1
22331 022072        LDA XMAX
22332 160217        JSM .FSBA,I     (MAX-MIN)
22333 062125        JSM TXM
22334 020021        LDA .4          RELATIVE ADDRESS TO 9999
22335 041645        IOR CP4         INCLUDE CURRENT PAGE
22336 160221        JSM .FDVA,I     9999/(MAX-MIN)
22337 025735        LDB CPT         CPT = POINTER TO FIRST WORD IN R/W FOR X OR Y
22340 062345        JSM TR/W        PLACE THE S.F. IN THE STACK
22341 023502        LDA YMIN
22342 160220        JSM .FMPA,I     S.F. * MIN
22343 024025        LDB .8          SET(B) = ADJUST LOCATION POINTER
22344 005735        ADB CPT
22345 005647 TR/W   ADB T1
22346 064406        JMP XFAR1+1
*
*       OFFSET COMMAND EXECUTION
*
22347 062263 EOFF   JSM FORM+2
22350 062104        JSM GETRW
22351 023532        LDA B24
22352 062356        JSM EOFF1
22353 020033        LDA .16
22354 062356        JSM EOFF1
22355 164172        JMP XEC4A,I
*
22356 031735 EOFF1  STA CPT
22357 061220        JSM FETCH+1
22360 062343        JSM TR/W-2
22361 074117        LDA B
22362 002610        ADA M8
22363 160217        JSM .FSBA,I
22364 025735        LDB CPT
22365 066345        JMP TR/W
*
*
22366 021646 PWHER  LDA T3          PWHER IS USED BY AXIS EXCUTION
22367 070352        SAM PUNX+1
22370 066372        JMP PUNY+1
*
*  ROUTINE TO GET A PARAMETER AND CONVERT IT TO PLOTTER UNITS
*
22371 061220 PUNY   JSM FETCH+1
22372 020021        LDA .4
22373 027502        LDB YMIN
22374 066400        JMP PUNIT
*
*PUNX FETCHES A PARAMETER AND CONVERTS IT TO PLOTTER UNITS
*
22375 061220 PUNX   JSM FETCH+1
22376 070742        SAR 16          SET A = TO AN OFFSET SO THAT A+T1 = 1ST WORD
22377 027500        LDB XMIN
22400 001647 PUNIT  ADA T1
22401 031734        STA CP2         STORE POINTER TO 1ST X OR Y VALUE
22402 000033        ADA .16
22403 031736        STA T4          SAVE POINTER TO PRESENT POSITION
22404 035737        STB T2          STORE POINTER TO XMIN OR YMIN
22405 060406        JSM XFAR1+1     TRANSFER AR2 TO XMIN OR YMIN
22406 121736        LDA T4,I        LOAD THE EXP WORD OF THE PRESENT POSITION
```

```
22407 070006          RAR 1
22410 070231          SLA .PUN,C     IS BIT 1 = 1 ?
22411 070706          RAR 15         YES, CLEAR IT, AND GIVE PENUP
22412 131736          STA T4,I
22413 062015          JSM PENUP
22414 021644 .PUN     LDA CP3
22415 070153          SAP PUN1       SKIP IF IN ABS MODE
22416 025736          LDB T4
22417 062133          JSM TRANS-2    X/YMIN = LAST POSITION + DX/DY IF IN INCR.
*
22420 025736 PUN1     LDB T4
22421 060406          JSM XFAR1+1    REPLACE PRESENY POSITION WITH NEW VALUE
22422 004025          ADB .8
22423 062133          JSM TRANS-2    NEW POSITION + OFFSET
22424 021734          LDA CP2
22425 160220          JSM .FMPA,I    S.F.*NEW POSITION
22426 062135          JSM TRANS
22427 074117          LDA B
22430 025734          LDB CP2
22431 004025          ADB .8
22432 160217          JSM .FSBA,I    SUBTRACT THE ADJUST VALUE
22433 062135          JSM TRANS      SAVE THIS ANSWER (PLOTTER UNITS) IN XMIN OR YMIN
22434 074742          SBR 16         CLEAR (B) FOR A FALG IF OUT OF RANGE
*
22435 021754 LIMT     LDA AR2
22436 070451          SLA XLT2       WAS THE RESULT NEGATIVE
22437 021737          LDA T2         YES - CLEAR X OR Y MIN
22440 170000          CLR
22441 024033 LFLAG    LDB .16        FLAG PRESENT PEN POSITION
22442 005734          ADB CP2
22443 074517          LDA B,I
22444 040017          IOR .2
22445 074557          STA B,I
22446 170402          RET
*
22447 003512 XLT2     ADA EXPM4      THE RESULT WAS NOT NEGATIVE , NOW CHECK IF
22450 071712          SAM *-2        <9999?
22451 020021          LDA .4         OTHERWISE SET XMIN OR YMIN (RELATIVE ADD. TO 9999)
22452 041645          IOR CP4
22453 025737          LDB T2         TO 9999
22454 170004          XFR
22455 066441          JMP LFLAG      AND FLAG THE LAST POSITION
*
22456 075410 .XX      SZB XLT2-1
22457 024133          LDB M2
22460 035654          STB XX
22461 066015          JMP PENUP
*   PLOT AND IPLOT EXECUTION
*
22462 076052 EIPLT    SBM *+1,S
22463 035644 EPLOT    STB CP3
22464 074072          SBM *+1,C
22465 062652          JSM CURPG
22466 062263          JSM FORM+2     STACK X, AND Y
22467 021472          LDA TEMPS
22470 011421          CPA PRADD      PEN CONTROL?
22471 066474          JMP *+3
22472 061217          JSM FETCH
22473 160225          JSM FLTRA,I
22474 024133          LDB M2
22475 035654          STB XX
*
22476 062104          JSM GETRW
*
22477 062371          JSM PUNY       FETCH Y
22500 062456          JSM .XX        CHECK IF PEN IS OFF-SCALE
22501 062375          JSM PUNX       FETCH X
22502 062456          JSM .XX        CHECK IF PEN IS OFF-SCALE
22503 062010          JSM PNPAR      CHECK FOR ANY PEN CONTROL BEFORE MOVEMENT
22504 062041          JSM AMOVE      SET ABS FLAG AND MOVE PEN
22505 025654          LDB XX         LOAD THE PEN CONTROL WORD
22506 074113          SBP *+2
22507 062013          JSM .P1        AND CHECK FOR ANY PEN MOVEMENT AFTERWARDS
22510 164172          JMP XEC4A,I
*
*   X AND Y AXIS EXECUTION
*
22511 076053 EXAXE    SBP *+1,S
22512 035646 EYAXE    STB T3
22513 074072          SBM *+1,C
22514 062652          JSM CURPG
22515 035644          STB CP3        SET PUNIT FOR ABS MODE
22516 160201          JSM FORMA,I    STACK ORIGIN
22517 021472          LDA TEMPS
22520 011421          CPA PRADD      ORIGIN ONLY?
22521 066546          JMP AX7
22522 160201          JSM FORMA,I    STACK TICK
22523 021472          LDA TEMPS
```

```
*01  EXECUTION PHASE OF 9830 PLOTTER BLOCK

22524 011421          CPA PRADD     ORIGIN, TICK ONLY?
22525 066556          JMP AX3       YES
22526 062263          JSM FORM+2    STACK POINT 1 AND 2
22527 062103          JSM GETRW-1   DO PENUP AND GET THE R/W ADDRESS
22530 062604          JSM CLIMT-2   RECALL POINT 2
22531 035665          STB YX+1
22532 061220          JSM FETCH+1
22533 062127          JSM TXX       SAVE THE STARTING POINT
22534 062605          JSM CLIMT-1
22535 061220 .E1      JSM FETCH+1   FETCH THE TICK PARAMETER
22536 062131          JSM TEMXX
*
*   YX = MIN VALUE IN PLOTTER UNITS
*   YX+1 = MAX VALUE IN PLOTTER UNITS
*   XMAX HAS PRESENT PEN POSITION
*   TEMX HAS THE TICK INCREMENT
*
*
22537 062573 SLOOP JSM AX4
22540 062633          JSM .TICK     PUT  PEN DOWN AND MAKE A TICK AT THE MIN POINT
22541 022072 AX5      LDA XMAX
22542 027772          LDB TEMX
22543 160216          JSM .FADA,I   COMPUTE THE NEXT POINT
22544 062614          JSM TICMK     GO TO THE TICMK ROUTINE TO CONVERT TO P.U.
22545 066541          JMP AX5       MOVE THE PEN AND MAKE A TIC THEN LOOP BACK
*
22546 062560 AX7      JSM AX2       NO TICKS OR NIN AND MAX
22547 062573          JSM AX4
*
22550 025665 AX6      LDB YX+1      TICMK WILL COME HERE IF IT GOES BEYOND MAX VALUE
22551 160227          JSM FXFLA,I
22552 062115          JSM WHERE
22553 062602          JSM .AX4
22554 062015 EPEN     JSM PENUP     DO PENUP, PEN EXCUTION ALSO
22555 164172          JMP XEC4A,I   AND RETURN
*
*
*       SUBROUTINES FOR AXIS EXECUTION
*
22556 062560 AX3      JSM AX2
22557 066535          JMP .E1
*
22560 062103 AX2      JSM GETRW-1   DO PENUP AND GET THE R/W ADDRESS
22561 023514          LDA .9999
22562 031665          STA YX+1      (B) = POINTER TO SCALE FACTOR
22563 021646          LDA T3
22564 070112          SAM *+2
22565 004021          ADB .4
22566 074117          LDA B
22567 000025          ADA .8
22570 160221          JSM .FOVA,I   ADJUST / SCALE FACTOR
22571 062127          JSM TXX
22572 066366          JMP PWHER
*
22573 061220 AX4      JSM FETCH+1   RECALL THE OPPSITIE ORIGIN
22574 021646          LDA T3
22575 031664          STA YX        INITIALIZE YX TO A VALUE ABOVE 9999
22576 070076          TCA
22577 062367          JSM PWHER+1
22600 062606          JSM CLIMT
22601 035666          STB YX+2
22602 062041 .AX4     JSM AMOVE
22603 066021          JMP PENDN
*
22604 061220          JSM FETCH+1
22605 062366          JSM PWHER
22606 076210 CLIMT    RZB .CL2      IF (B) # 0 , THEN OUT OF RANGE
22607 160225 .CL1     JSM FLTRA,I   PLOTTER UNITS DID NOT OVERFLOW,SO
22610 177770 MR       DEC -8
22611 170402          RET           RETURN AFTER CONVERTING TO INTEGER
22612 160205 .CL2     JSM AERRA,I
22613 177656          DEC -82       ERROR IF XO, YO, OR THE MIN , MAX VALUES OFF-SCALE
*
*     TICMK MOVES PEN AND THEN MAKES A TICK MARK
*      AR2 HAS THE NEXT TICK POSITION, TEMY+1 HAS THE CONSTANT ORIGIN
*
22614 062127 TICMK    JSM TXX
22615 062366          JSM PWHER
22616 062607          JSM .CL1
22617 015664          CPB YX        DID THE VALUE CHANGE?
22620 066612          JMP .CL2      NO, MUST BE A ZERO TICK OR XMAX + TICK = XMAX
22621 035664          STB YX        STORE A GOOD VALUE FOR THE 1ST INCREMENT
22622 021670          LDA Z1        LOAD THE SIGN OF THE TICK
22623 074076          TCB
22624 005665          ADB YX+1
22625 074150          SZB *+3       DO A TICK IF ZERO
22626 070111          SLA *+2
22627 076212          SBM .TICK,S   - DIRECTION
22630 074153          SBP .TICK     + DIRECTION
22631 055777 TBL      DSZ RSPTR
```

#01 EXECUTION PHASE OF 9830 PLOTTER BLOCK

```
22632 066550       JMP AX6       FINISH THE AXIS AND RETURN
22633 062041 .TICK JSM AMOVE
22634 025666       LDB YX+2      RECALL THE OPSITIE AXIS
22635 004052       ADB .48
22636 074117       LDA B
22637 000161       ADA MAXSN     (-10000)
22640 070113       SAP *+2
22641 062647       JSM .TIC      OUTPUT PLUS TICK
22642 024153       LDB M48
22643 005666       ADB YX+2
22644 074112       SBM *+2
22645 062647       JSM .TIC
22646 025666       LDB YX+2
22647 160227 .TIC  JSM FXFLA,I
22650 062123       JSM OWHER
22651 066041       JMP AMOVE
*
*
22652 074442 CURPG SBR 10
22653 074304       SBL 10
22654 035645       STB CP4
22655 170402       RET
*
22656 026072 ROT2  LDB XMAX
22657 160221       JSM .FDVA,I    / A.R
22660 062131 ROT4  JSM TEMXX
22661 023504 ROT1  LDA YMAX
22662 160220       JSM .FMPA,I     * HEIGHT
22663 160225       JSM FLTRA,I      CONVERT TO INTGER
22664 066672       JMP PRERR     OVERFLOW RETURN
22665 074117       LDA B
22666 070112       SAM *+2
22667 070076       TCA
22670 000122       ADA B6K
22671 071213       SAP CURPG+3   RETURN
22672 160205 PRERR JSM AERRA,I
22673 177657       DEC -81       CHARACTER SIZE TO BIG, OR BINARY FORMAT NOT ALLOWED
*
*    SET DEFAULT HEIGHT APPROX = 1.5%, A.R. =2
*
22674 062652 CDEF  JSM CURPG
22675 062015       JSM PENUP
22676 020112       LDA B1760
22677 160177       JSM SSYMA,I   SERACH THE SYMBOL TABLE FOR CHAR DEFINITION
22700 066720       JMP .CDEF
22701 062107       JSM GE1        FOUND
22702 035640       STB YH
22703 074070       SIB *+1
22704 035641       STB XH
22705 074070       SIB *+1
22706 035642       STB XW
22707 074070       SIB *+1
22710 035643       STB YW
22711 023502 GETLC LDA PPPOS
22712 160177       JSM SSYMA,I   SET UP A LOCATION FOR CRLF'S
22713 066715       JMP *+2
22714 066107       JMP GE1
22715 160252       JSM ENTEA,I
22716 062107       JSM GE1
22717 067376       JMP .PC
*
22720 160252 .CDEF JSM ENTEA,I
22721 062701       JSM CDEF+5
22722 021640       LDA YH
22723 170000       CLR
22724 020105       LDA B377
22725 131640       STA YH,I
22726 020104       LDA B177
22727 131642       STA XW,I
22730 170402       RET
*
22731 020020 ELAB3 LDA ONE
22732 060445       JSM XFAR2+1
22733 066757       JMP .ELAB
*
*    LETTING SUBROUTINE TO SET-UP CHARACTER DEFINITION
*
22734 062652 ELAB  JSM CURPG     SAVE CURRENT PAGE
22735 045472       ISZ TEMPS
22736 023516       LDA FMTOP
22737 031640       STA 1640B     SET OP CODE FOR FORMAT SREACH
22740 074742       SBR 16       SET REPEAT COUNT TO ZERO
22741 163572       JSM PLOTE,I   GO CHECK FOR FORMAT STATEMENT
22742 074742       SBR 16        P+1, NOT FOUND
22743 035646       STB T3        P+2, FOUND
22744 062675       JSM CDEF+1
22745 121472       LDA TEMPS,I
22746 050065       AND OPMSK     CHECK IF THERE ARE MORE PARAMETERS
22747 010004       CPA RPOP      WAS IT A RIGHT PAREN
22750 067023       JMP DEFLT
*
```

```
22751 062262       JSM FORM+1    STACK 3 FORMULA'S
22752 121472       LDA TEMPS,I
22753 050065       AND OPMSK     GET NEXT OPERAND
22754 010004       CPA RPOP      WAS IT A PAREN
22755 066731       JMP ELAB3     DEFAULT THE PAPER RATIO
22756 061217       JSM FETCH     FETCH THE PAPER RATIO
22757 062125 .ELAB JSM TXM
22760 061220       JSM FETCH+1   ROTATION
22761 062117       JSM TYM
22762 061220       JSM FETCH+1   ASPECT RATIO
22763 062127       JSM TXX
22764 061220       JSM FETCH+1   HEIGHT
22765 063352       JSM .MPY3     REDUCE HEIGHT BY 1/10
22766 062121       JSM TYX
*
*     PROCESS CHARACTER DIMENSION
*
22767 021645       LDA CP4
22770 160220       JSM .FMPA,I
22771 062121       JSM TYX
22772 023502       LDA YMIN
22773 163566       JSM SIN,I
22774 027522       LDB TEMY
22775 060406       JSM XFAR1+1
22776 023502       LDA YMIN
22777 163570       JSM COS,I
23000 062117       JSM TYM       YMIN = COS
*
23001 062661       JSM ROT1      YH = 9999/6 * H * COS TH
23002 135640       STB YH,I
*
23003 023522       LDA TEMY      SIN TH
23004 062656       JSM ROT2      XH = 9999/6 * H/A.R. * SIN TH
23005 135641       STB XH,I
*
23006 023502       LDA YMIN      COS TH
23007 027500       LDB XMIN
23010 160220       JSM .FMPA,I
23011 062131       JSM TEMXX
23012 023772       LDA TEMX
23013 062656       JSM ROT2      XW = 9999/6 * H/A.R. * COS TH * PH/PW
23014 135642       STB XW,I
*
23015 027500       LDB XMIN
23016 074637       ISZ B,I       SET PAPER RATIO NEGATIVE FOR -(RESULT)
23017 023522       LDA TEMY
23020 160220       JSM .FMPA,I   YW = 9999/6 * H * SIN TH * PH/PW
23021 062660       JSM ROT4
23022 135643       STB YW,I
*
23023 021646 DEFLT LDA T3
23024 070110       SZA ELAB6
23025 067054       JMP WREXC-3
*
*     PRINT SYNTAX EXECUTION
*
23026 025416 ELAB6 LDB MODE
23027 076150       RZB *+3
23030 021622       LDA TERM
23031 072150       RZA *+3
23032 160170       JSM CLERA,I
23033 035622       STB TERM
23034 020146       LDA M15
23035 031453       STA PRFLG
23036 163510       JSM CKEOL,I
23037 067177       JMP ELAB5
23040 067177       JMP ELAB5
23041 163574 ELAB1 JSM PRINN,I   SET THE BUFFER
23042 067177       JMP ELAB5     END OF LINE
23043 021625 ELAB4 LDA FIRST
23044 070076       TCA
23045 001400       ADA BADDR
23046 071550       SZA ELAB1
23047 025625       LDB FIRST
23050 063203       JSM OUTCH     OUTPUT THE BUFFER
23051 021400       LDA BADDR
23052 031625       STA FIRST
23053 067041       JMP ELAB1
*
*     FORMAT TYPE EXCUTION
*
23054 163510       JSM CKEOL,I
23055 000153 B153  OCT 153
23056 035472       STB TEMPS
23057 163652 WREXC JSM TYPEC,I   GET NEXT FORMAT SPEC
23060 067072       JMP WRITN     P+1, END OF FORMAT
23061 067102       JMP WRITQ     P+2 QUOTE
23062 074742       SBR 16        P+3 FIXED FORMAT
23063 060563       JSM SLWST     P+4 STACK FLAG 0-F; +=E, -=BINARY
```

#01 EXECUTION PHASE OF 9830 PLOTTER BLOCK

```
23064 067104       JMP WRITF     P+5 (CODE 5 NOT USED)
23065 066672       JMP PRERR     BINARY MODE NOT ALLOWED
23066 067077       JMP WRITX     X:
23067 163540       JSM FSPR,I
23070 063370       JSM PCRLF+1   /: CRLF
23071 067057       JMP WREXC
*
23072 075753 WRITN SBP *-1
23073 074742       SBR 16        CLEAR FORMAT NESTING FLAG
23074 035455       STB FORMT
23075 067026       JMP ELAB6
*
23076 000103 BLNKA DEF .32*.32+1
23077 163540 WRITX JSM FSPR,I
23100 020012       LDA .1
23101 027076       LDB BLNKA
23102 063203 WRITQ JSM OUTCH
23103 067057       JMP WREXC
*
*
23104 025466 WRITF LDB LOCL1     STACK POINTER
23105 060563       JSM SLWST
23106 163510       JSM CKEOL,I
23107 074742       SBR 16
23110 067173       JMP WREND-2
23111 163564       JSM QTCHK,I   QUOTE NEXT IN WRITE?
23112 067115       JMP WRIT5     P+1 NO
23113 063203       JSM OUTCH     P+2, YES (A) = LENTGH, (B) = POINTER
23114 067106       JMP WRITF+2
*
23115 163526 WRIT5 JSM PFORM,I
23116 061220       JSM FETCH+1
23117 060567       JSM UNSTK
23120 031466       STA LOCL1     RECALL FORMAT STATEMENT POINTER
23121 060567       JSM UNSTK
23122 031705       STA FLOAT     RECALL E, F OR B FLAG
23123 045466       ISZ LOCL1
23124 121466       LDA LOCL1,I
23125 045466       ISZ LOCL1
23126 045466       ISZ LOCL1
23127 025456 WRIT8 LDB FORMS
23130 074073       SBP *+1,C
23131 035456       STB FORMS     SET NUMERIC SPEC FOUND FLAG
23132 125466       LDB LOCL1,I   EGT DECIMAL SPEC
23133 163540       JSM FSPR,I    UPDATE FORMAT POINTERS
23134 031704       STA WIDTH
*
23135 035703 WRIT7 STB PLACE
23136 021412       LDA LSTPT     START TEMP BUFFER
23137 070070       SIA *+1
23140 070744       SAL 1
23141 031400       STA BADDR
23142 031706       STA SBPTR
23143 021413       LDA HSTPT
23144 070744       SAL 1
23145 031623       STA PEND
23146 021416       LDA MODE      SET END OF BUFFER AT HIGH STACK
23147 031737       STA T2
23150 070742       SAR 16
23151 031416       STA MODE      SET FOR PROGRAM FORMAT
23152 024215       LDB TMPOP     *
23153 060406       JSM XFAR1+1   * OUTPUT NUMBER TO BUFFER
23154 160234       JSM NMOTA,I   *
23155 021737       LDA T2
23156 031416       STA MODE      RESTORE THE MODE FLAG
23157 021400       LDA BADDR
23160 011623       CPA PEND      OVERFLOW?
23161 064561       JMP MER8
23162 025706       LDB SBPTR
23163 060374       JSM WBUFF
23164 063203       JSM OUTCH
23165 025625       LDB FIRST
23166 035400       STB BADDR     RESET BADDR
*
23167 163510 WRIT6 JSM CKEOL,I   IS THIS THE END OF STATEMENT?
23170 074742       SBR 16        P+1, YES CRLF NOT SURPPRESSED
23171 067175       JMP WREND     #P+2, YES
23172 067057       JMP WREXC     P+3, NO RETURN FOR MORE
*
23173 055412       DSZ LSTPT
23174 055412       DSZ LSTPT
23175 070742 WREND SAR 16
23176 031455       STA FORMT
*
23177 074110 ELAB5 SZB *+2
23200 066554       JMP EPEN
23201 063367       JSM PCRLF
23202 164172       JMP XEC4A,I
*
```

*01 EXECUTION PHASE OF 9830 PLOTTER BLOCK

```
23203 031741 OUTCH STA XC+1
23204 035740       STB XC
23205 062711       JSM GETLC     SET-UP T1(POINTER TO CRLF) IT MAY BE KILLED
23206 061053 .OUTC JSM GTMP
23207 063213       JSM PLET-1
23210 055741       DSZ XC+1
23211 067206       JMP .OUTC
23212 170402       RET
*
*      CHARACTER ROUTINE
*
23213 061363       JSM GTCON+1    CONVERT FROM LOWER CASE
23214 003620 PLET  ADA M137B     CHECK IF > 137B
23215 070153       SAP *+3        SKIP IF THE CODE WAS >172B
23216 000054       ADA .63        (877) WITHIN RANGE ADJUST SO THAT 40B =0
23217 070113       SAP *+2
23220 170402       RET            RETURN IF NOT A VALID CHARACTER
23221 155647       DSZ T1,I       BUMP THE CHARACTER COUNT FOR CRLF
23222 074742       SBR 16
23223 035736       STB CPX
23224 035737       STB CPY
23225 070744       SAL 1          MULTIPY BY 2
23226 003476       ADA VTABE      ADD IN THE VECTOR TABLE POINTER
23227 001645       ADA CP4        ADD IN CURRENT PAGE
23230 024213       LDB AR1A
23231 170004       XFR            TRANSFER THE TWO WORD VECTOR TO AR1+1 AR1+2
23232 024132       LDB M1
23233 035747       STB AR1+3      SET THE 9TH BLOCK TO GIVE END OF CHAR
23234 175400 PL1   DLS
23235 013530       CPA B16        WAS THIS THE CCODE FOR SPEACIAL TABLE
23236 067250       JMP STABL      YES
23237 070046       RAR 2
23240 070137       LDB A
23241 074642       SBR 14
23242 050020       AND .3
23243 010020       CPA .3
23244 067264       JMP .PL2        END OF CHARACTER DEFINITION
23245 063302       JSM MPEN
23246 062021       JSM PENDN
23247 067234       JMP PL1
*
*      SPECIAL TABLE ROUTINE
*
23250 021745 STABL LDA AR1+1
23251 070142       SAR 4
23252 050115       AND B1777
23253 041645       IOR CP4
23254 070744       SAL 1
23255 031750       STA YC
23256 024057 STAB2 LDB .1000
23257 061041       JSM GETCH
23260 031466       STA LOCL1
23261 070306       RAR 7
23262 070353       SAP *+7
23263 070251       SLA *+5
*
23264 062015 .PL2  JSM PENUP
23265 070004       SAL 16
23266 024061       LDB .10
23267 067310       JMP MPEN2
*
23270 062021       JSM PENDN
23271 070111       SLA *+2
23272 062015       JSM PENUP
23273 021466       LDA LOCL1
23274 070106       RAR 3
23275 070137       LDB A
23276 074602       SBR 13
23277 050024       AND .7
23300 063310       JSM MPEN2
23301 067256       JMP STAB2
*
23302 031466 MPEN  STA LOCL1
23303 070744       SAL 1
23304 001466       ADA LOCL1      DELTA Y * 3 IN STANDARD MODE
23305 035466       STB LOCL1
23306 074744       SBL 1
23307 005466       ADB LOCL1       DELTA X * 3 IN STANDARD MODE
*
23310 031466 MPEN2 STA LOCL1
23311 021736       LDA CPX
23312 035736       STB CPX
23313 070076       TCA
23314 074017       ADA B
23315 031734       STA DX         DELTA X
23316 021466       LDA LOCL1
23317 025737       LDB CPY
23320 031737       STA CPY
23321 074076       TCB
23322 070037       ADB A
```

#01 EXECUTION PHASE OF 9830 PLOTTER BLOCK

```
23323 035735 MPEN3 STB DY          DELTA Y
23324 121640       LDA YH,I
23325 125641       LDB XH,I
23326 063336       JSM MPY1        D.Y. = YH * D.Y. + XH * D.X.
23327 062117       JSM TYH
23330 121643       LDA YW,I
23331 125642       LDB XW,I
23332 063336       JSM MPY1        D.X. = YW * D.Y. + XW * D.X.
23333 062125       JSM TXH
23334 020107       LDA B1000
23335 066042       JMP MOVE-1
*
23336 031470 MPY1  STA L2T1
23337 021734       LDA DX
23340 063355       JSM MPY2
23341 035471       STB L2T2
23342 025470       LDB L2T1
23343 021735       LDA DY
23344 063355       JSM MPY2
23345 005471       ADB L2T2
23346 160227       JSM FXFLA,I
23347 125647       LDB T1,I
23350 014017       CPB .2          WAS THIS VECTOR FLAGED AS A CRLF
23351 170402       RET             YES!
23352 020157 .MPY3 LDA M256
23353 001754       ADA AR2
23354 066100       JMP STOR2
*
23355 070153 MPY2  SAP *+3
23356 070076       TCA
23357 074076       TCB
23360 035466       STB LOCL1
23361 074742       SBR 16
23362 070076       TCA
23363 070170       SIA *+3
23364 005466       ADB LOCL1
23365 073770       RIA *-1
23366 170402       RET
*    LETTER AND LABEL ROUTINES
*
23367 160170 PCRLF JSM CLERA,I
23370 121647       LDA T1,I
23371 031734       STA DX
23372 020017       LDA .2          SET THE FLAG SO MPEN3 DOESN'T REDUCE BY 1/10TH
23373 131647       STA T1,I
23374 024132       LDB M1
23375 063323       JSM MPEN3
23376 074742 .PC   SBR 16
23377 135647       STB T1,I
23400 170402       RET
*
*    LETTER EXECUTION
*
23401 062674 EKEY  JSM CDEF        GET CURRENT PAGE, CHARACTER LINKS AND CRLF
23402 074742       SBR 16
23403 035473       STB CCNT
23404 020054       LDA .63
23405 061016       JSM ONEXT
23406 163673 .EKEY JSM KEYIN,I
23407 024141       LDB M10
23410 070346       RAR 8
23411 070133       SAP *+2,C
23412 024132       LDB M1
23413 070346       RAR 8
23414 010034       CPA .21         UP ARROW (25B)
23415 067446       JMP .EK2
23416 013532       CPA B24         DOWN ARROW (24B)
23417 067447       JMP .EK1
23420 010036       CPA B27         RIGHT ARROW ( 27B)
23421 067453       JMP .EK4
23422 010035       CPA B26         LEFT ARROW (26B)
23423 067454       JMP .EK3
23424 010104       CPA B177        STOP KEY?
23425 067442       JMP .STOP       YES
23426 010027       CPA .11
23427 067457       JMP .RCRL
23430 013534       CPA B157
23431 020071       LDA E
23432 074311       SLB *+6
23433 013055       CPA B153
23434 020101       LDA B100
23435 127506       LDB VALUP,I
23436 163524       JSM TBSRH,I
23437 067440       JMP *+1
23440 063214       JSM PLET
23441 067406       JMP .EKEY
*
23442 074742 .STOP SBR 16
23443 035442       STB STPFL
```

#01 EXECUTION PHASE OF 9830 PLOTTER BLOCK

```
23444 160170        JSM CLERA,I
23445 164172        JMP XEC4A,I
*
23446 074076 .EK2   TCB                UP ARROW
23447 070742 .EK1   SAR 16             DN ARROW
23450 031734        STA DX
23451 063323        JSM MPEN3
23452 067406        JMP .EKEY
23453 074076 .EK4   TCB                RIGHT ARROW
23454 035734 .EK3   STB DX             LEFT ARROW
23455 074742        SBR 16
23456 067451        JMP .EK1+2
23457 063367 .RCRL  JSM PCRLF
23460 067402        JMP EKEY+1
*
*       CHARACTER PLOT
*
23461 062674 CPLOT JSM CDEF
23462 062263        JSM FORM+2
23463 063471        JSM .CPLT
23464 035735        STB DY
23465 063471        JSM .CPLT
23466 035734        STB DX
23467 063324        JSM MPEN3+1
23470 164172        JMP XEC4A,I
*
23471 061220 .CPLT JSM FETCH+1
23472 020013        LDA C7               MULT RESULT BY 10
23473 063353        JSM .MPY3+1
23474 066663        JMP ROT1+2
```

#01 LETTER AND NUMBER VECTOR TABLE

```
*
* LETTER VECTOR TABLE
*
*
23475 167715        JMP BLKN,I        SPACE 40B
23476 001474 VTABE DEF *-2-N9/6
23477 167713        JMP EXCH,I        !
23500 001650 XMIN DEF XN
23501 167746        JMP QUOTE,I       " 42B
23502 001660 YMIN  DEF YN
23503 167716        JMP NUMBR,I       #
23504 001664 YMAX  DEF YX
23505 167734        JMP DOLLR,I       $
23506 002412 VALUP DEF 2412B          ABS ADDRESS
23507 167701        JMP PERCT,I
23510 007227 CKEOL DEF 7227B          ABS ADDRESS
23511 167723        JMP AMP,I         &
23512 176000 EXPM4 OCT 176000
23513 112700        OCT 112700        '
23514 023417 .9999 DEC 9999
23515 167740        JMP LPARN,I       S.T. POINTER FOR (
23516 012025 FMTOP OCT 12025
23517 167743        JMP RPARN,I       S.T. POINTER FOR )
23520 177736 M34   DEC -34
23521 167674        JMP MULT,I        *
23522 001674 TEMY  DEF Z2
23523 167676        JMP PLUS,I
23524 003072 TBSRH DEF 3072B
23525 002700        DEC 1472            ,
23526 006773 PFORM DEF 6773B         ABS ADDRESS
23527 043300        DEC 18112           -
23530 000016 B16   OCT 16
23531 016000        DEC 7168            .
23532 000024 B24   OCT 24
23533 005300        DEC 2752            /
23534 000157 B157  OCT 157
23535 004242        OCT 4242,5300       0
23536 005300
23537 014700        DEC 6592            1
23540 007356 FSPR  DEF 7356B         ABS ADDRESS
23541 105145        OCT 105145,1300     2
23542 001300
23543 105145        DEC -30107,25100    3
23544 061014
23545 102152        DEC -31638,11264    4
23546 026000
23547 124105        OCT 124105,20300    5
23550 020300
23551 124106        DEC -22458,8268     6
23552 020114
23553 105034        OCT 105034          7
23554 177741 M31 DEC -31
23555 044246        DEC 18598,16422     8
23556 040046
23557 001250        DEC 680,18112       9
23560 043300
```

PAGE 0037 #01 LETTER AND NUMBER VECTOR TABLE

```
23561 167710        JMP COLON,I     :
23562 004303 RITE   DEF 4303B       RITE+1 ABS ADDRESS
23563 167707        JMP SCOLN,I     ;
23564 007240 QTCHK  DEF 7240B       ABS ADDRESS
23565 112034        DEC -27620      <
23566 012761 SIN    DEF 12761B      ABS ADDRESS
23567 167720        JMP EQUAL,I     =
23570 013007 COS    DEF 13007B      ABS ADDRESS
23571 113034        DEC -27108      >
23572 007402 PLOTE  DEF 7402B      ABS ADDRESS
23573 167727        JMP QUES,I      ?
23574 006656 PRINN  DEF 6656B
23575 004242        OCT 4242,12554      @ 100B
23576 012554
23577 004242        DEC 2210,25792      A
23600 062300
23601 004245        DEC 2213,17952      B
23602 043040
23603 124501        DEC -22207,11264    C
23604 026000
23605 004226        DEC 2198,4288       D
23606 010300
23607 124105        DEC -22459,16428    E
23610 040054
23611 124105        DEC -22459,16576    F
23612 040300
23613 124002        DEC -22526,26048    G
23614 062700
23615 004106        DEC 2118,-23872     H
23616 121300
23617 014700        DEC 6592            I
23620 177641 M137B  OCT -137
23621 121004        DEC -24060,-16384   J
23622 140000
23623 004112        DEC 2122,17088      K
23624 041300
23625 100054        DEC -32724          L
23626 000000        BSS 1          CHECK SUM WORD
23627 004132        DEC 2138,11264      M
23630 026000
23631 004052        DEC 2090,-16384     N
23632 140000
23633 004242        DEC 2210,3072       O
23634 006000
23635 004246        DEC 2214,19456      P
23636 046000
23637 020212        DEC 8330,9664       Q
23640 022700
23641 004246        DEC 2214,17708      R
23642 042454
23643 001144        DEC 612,-30016      S
23644 105300
23645 105221        DEC -30063,-16384   T
23646 140000
23647 100052        DEC -32726,-16384   U
23650 140000
23651 100654        DEC -32340          V
23652 007303 TYPEC  DEF 7303B      ABS ADDRESS
23653 100122        DEC -32686,-21504   W
23654 126000
23655 005130        DEC 2648,11264      X
23656 026000
23657 102645        DEC -31323,7168     Y
23660 016000
23661 105002        DEC -30206,-16384   Z
23662 140000
23663 010211        OCT 10211,140000    133B
23664 140000
23665 101300        OCT 101300
23666 005555 MOVCK  DEF 5555B
23667 011251        OCT 11251,140000    135 B
23670 140000
23671 014511        OCT 14511,66000     136B
23672 066000
*
23502          PPPOS EQU YMIN
*
*  MORE ABS ADRESSESS
*
23673 002753 KEYIN DEF 2753B
*
*       SPECIAL SYMBOL VECTOR TABLE
*
*       BIT 15 =1 PENUP BEFORE MOVEMENT
*       BIT 14 = 1 PEN DOWN BEFORE MOVEMENT
*       BITS 13,12,11 = Y COOR. OF 1ST LOCATION
*       BIT 10,9,8    = X COOR. OF 1ST LOCATION
*       BIT 7 = 1 PENUP
*       BIT 6 = 1 PEN DOWN
```

#01 LETTER AND NUMBER VECTOR TABLE

```
*      BIT 5,4,0 = Y OF 2ND
*      BIT 2,1,0 = X OF 2ND
*
*     PEN CONDITIONS
*
*   PEN UP ON ENTRY
*   PEN UP ON EXIT
*   A 7 IN Y INDICATES END OF CHAR.
*
*   THIS TABLE WORKS ON A 7X7 MATRIX (6-0)
*
23674 104555 MULT  OCT 104555,124515
23675 124515
23676 101563 PLUS  OCT 101563,114136,140000  +
23677 114136
23700 140000
23701 073161 PERCT OCT 73161,24041,25061  %
23702 024041
23703 025061
23704 112514       OCT 112514,2416,12700
23705 002416
23706 012700
23707 000523 SCOLN OCT 523            ; 73B
23710 011523 COLON OCT 11523,125553,140000  : 72B
23711 125553
23712 140000
23713 031523 EXCM  OCT 31523                 !  41B
23714 101503       OCT 101503
23715 140000 BLKN  OCT 140000
23716 131102 NUMBR OCT 131102,102164      #
23717 102164
23720 110126 EQUAL OCT 110126                =
23721 123140       OCT 123140
23722 140000       OCT 140000
23723 003152 AMP   OCT 3152         &
23724 031454       OCT 31454
23725 010403       OCT 10403
23726 012700       OCT 12700
23727 024562 QUES  OCT 24562        ?
23730 031454       OCT 31454
23731 022033       OCT 22033
23732 011603       OCT 11603
23733 041700       OCT 41700
23734 004515 DOLLR OCT 4515              $ 44B
23735 024455       OCT 24455
23736 131503       OCT 131503
23737 160000 SC16  OCT 160000
23740 001511 LPARN OCT 1511
23741 014051       OCT 14051
23742 031700       OCT 31700
23743 001515 RPARN OCT 1515
23744 017055       OCT 17055
23745 031700       OCT 31700
23746 021162 QUOTE OCT 21162        "
23747 132144       OCT 132144
23750 140000       OCT 140000
*
*
23760              ORG 23760B
*
*      STATEMENT EXECUTION JUMP TABLE
*
23760 177421       ABS EKEY-*
23761 177500       ABS CPLOT-*
23762 176303       ABS ESCAL-*
23763 176527       ABS EYAXE-*
23764 176525       ABS EXAXE-*
23765 176476       ABS EPLOT-*
23766 176361       ABS EOFF-*
23767 176565       ABS EPEN-*
23770 176744       ABS ELAB-*
23771 176471       ABS EIPLT-*
23772 001670 TEMX  DEF Z1         OP CODE 1 IS NOT USED, SO USE IT FOR A CONSTANT
*
23773 176636       ABS TBL-*
23774 176635       ABS TBL-*
23775 176634       ABS TBL-*
23776 176154       ABS SNAME-*
23777 010000       OCT 10000      CODE TO IDENTIFY THE OPTION BLOCK
```

CROSS-REFERENCE TABLE

```
.1      0020    1308
.10     0071    0072    1441
.100    0070
.1000   0069    1432
.11     0035    0043    1548
.12     0036
```

CROSS-REFERENCE TABLE

| | | | | | | | | | | | |
|---|---|---|---|---|---|---|---|---|---|---|---|
| .13 | 0039 | | | | | | | | | | |
| .15 | 0048 | 0083 | | | | | | | | | |
| .16 | 0049 | 0084 | 0871 | 0895 | 0928 | 0961 | | | | | |
| .1E4 | 0068 | | | | | | | | | | |
| .2 | 0027 | 0610 | 0838 | 0964 | 1495 | 1517 | | | | | |
| .21 | 0050 | 1538 | | | | | | | | | |
| .22 | 0051 | 0087 | | | | | | | | | |
| .23 | 0052 | 0088 | | | | | | | | | |
| .28 | 0053 | | | | | | | | | | |
| .3 | 0028 | 0045 | 0614 | 1417 | 1418 | | | | | | |
| .31 | 0054 | 0090 | 0652 | | | | | | | | |
| .32 | 0055 | 1306 | 1306 | | | | | | | | |
| .33 | 0056 | | | | | | | | | | |
| .34 | 0057 | 0091 | | | | | | | | | |
| .37 | 0058 | | | | | | | | | | |
| .4 | 0029 | 0857 | 0876 | 0917 | 0970 | 1070 | | | | | |
| .40 | 0059 | | | | | | | | | | |
| .41 | 0060 | | | | | | | | | | |
| .43 | 0061 | | | | | | | | | | |
| .45 | 0062 | | | | | | | | | | |
| .46 | 0063 | | | | | | | | | | |
| .48 | 0064 | 1116 | | | | | | | | | |
| .5 | 0030 | | | | | | | | | | |
| .58 | 0065 | 0094 | | | | | | | | | |
| .6 | 0031 | 0044 | | | | | | | | | |
| .63 | 0066 | 1397 | 1530 | | | | | | | | |
| .7 | 0032 | 1451 | | | | | | | | | |
| .8 | 0033 | 0883 | 0945 | 0952 | 1072 | | | | | | |
| .9 | 0034 | | | | | | | | | | |
| .99 | 0074 | | | | | | | | | | |
| .9999 | 1613 | 0663 | 1066 | | | | | | | | |
| .AX4 | 1084 | 1055 | | | | | | | | | |
| .BUFA | 0180 | | | | | | | | | | |
| .CDEF | 1175 | 1158 | | | | | | | | | |
| .CL1 | 1090 | 1101 | | | | | | | | | |
| .CL2 | 1093 | 1089 | 1103 | | | | | | | | |
| .CPLT | 1589 | 1582 | 1584 | | | | | | | | |
| .E1 | 1032 | 1063 | | | | | | | | | |
| .EK1 | 1567 | 1541 | 1574 | | | | | | | | |
| .EK2 | 1566 | 1539 | | | | | | | | | |
| .EK3 | 1572 | 1545 | | | | | | | | | |
| .EK4 | 1571 | 1543 | | | | | | | | | |
| .EKEY | 1532 | 1559 | 1570 | | | | | | | | |
| .ELAB | 1211 | 1187 | | | | | | | | | |
| .FADA | 0185 | 0706 | 1045 | | | | | | | | |
| .FDVA | 0188 | 0878 | 1073 | 1138 | | | | | | | |
| .FMPA | 0187 | 0882 | 0948 | 1141 | 1223 | 1242 | 1251 | | | | |
| .FSBA | 0186 | 0874 | 0904 | 0953 | | | | | | | |
| .FSR | 0190 | | | | | | | | | | |
| .LNUM | 0314 | | | | | | | | | | |
| .M | 0656 | 0634 | 0642 | | | | | | | | |
| .MPY3 | 1497 | 1217 | 1591 | | | | | | | | |
| .NPWR | 0498 | | | | | | | | | | |
| .OUTC | 1386 | 1389 | | | | | | | | | |
| .P1 | 0605 | 0609 | 0613 | 1006 | | | | | | | |
| .PC | 1521 | 1173 | | | | | | | | | |
| .PL2 | 1439 | 1419 | | | | | | | | | |
| .PUN | 0938 | 0934 | | | | | | | | | |
| .RCRL | 1575 | 1549 | | | | | | | | | |
| .SLBF | 0181 | | | | | | | | | | |
| .STOP | 1561 | 1547 | | | | | | | | | |
| .TIC | 1126 | 1120 | 1124 | | | | | | | | |
| .TICK | 1114 | 1042 | 1110 | 1111 | | | | | | | |
| .XX | 0977 | 0999 | 1001 | | | | | | | | |
| A | 0000 | 0837 | 1415 | 1449 | 1472 | | | | | | |
| ACTSA | 0174 | | | | | | | | | | |
| ADRSS | 0327 | | | | | | | | | | |
| AERRA | 0176 | 0680 | 1093 | 1149 | | | | | | | |
| AMOVE | 0630 | 1003 | 1084 | 1114 | 1128 | | | | | | |
| AMP | 1728 | 1610 | | | | | | | | | |
| AR1 | 0413 | 0182 | 1410 | 1426 | | | | | | | |
| AR1A | 0182 | 1407 | | | | | | | | | |
| AR2 | 0415 | 0183 | 0637 | 0645 | 0664 | 0957 | 1498 | | | | |
| AR2A | 0183 | | | | | | | | | | |
| ARYAD | 0403 | | | | | | | | | | |
| AX2 | 1065 | 1049 | 1062 | | | | | | | | |
| AX3 | 1062 | 1024 | | | | | | | | | |
| AX4 | 1077 | 1041 | 1050 | | | | | | | | |
| AX5 | 1043 | 1047 | | | | | | | | | |
| AX6 | 1052 | 1113 | | | | | | | | | |
| AX7 | 1049 | 1020 | | | | | | | | | |
| B | 0000 | 0659 | 0676 | 0839 | 0842 | 0902 | 0950 | 0963 | 0965 | 1071 | 1117 |
| | 1144 | 1249 | 1466 | | | | | | | | |
| B100 | 0095 | 1554 | | | | | | | | | |
| B1000 | 0102 | 0635 | 1482 | | | | | | | | |
| B10K | 0114 | 0115 | | | | | | | | | |
| B12K | 0116 | 0117 | 0206 | | | | | | | | |
| B133 | 0096 | | | | | | | | | | |
| B140 | 0097 | | | | | | | | | | |

CROSS-REFERENCE TABLE

| | | | | | | | | |
|---|---|---|---|---|---|---|---|---|
| B1400 | 0103 | 0204 | | | | | | |
| B153 | 1287 | 1553 | | | | | | |
| B157 | 1629 | 1550 | | | | | | |
| B16 | 1625 | 1412 | | | | | | |
| B17 | 0083 | | | | | | | |
| B170K | 0121 | | | | | | | |
| B1740 | 0104 | 0203 | 0817 | | | | | |
| B1760 | 0105 | 0158 | 1156 | | | | | |
| B177 | 0098 | 1181 | 1546 | | | | | |
| B1774 | 0106 | | | | | | | |
| B1775 | 0107 | | | | | | | |
| B1777 | 0108 | 1428 | | | | | | |
| B20 | 0084 | | | | | | | |
| B22 | 0085 | | | | | | | |
| B23 | 0086 | | | | | | | |
| B24 | 1627 | 0893 | 1540 | | | | | |
| B2400 | 0110 | | | | | | | |
| B26 | 0087 | 1544 | | | | | | |
| B27 | 0088 | 1542 | | | | | | |
| B3000 | 0111 | | | | | | | |
| B36 | 0089 | | | | | | | |
| B37 | 0090 | | | | | | | |
| B377 | 0099 | 0638 | 0646 | 1179 | | | | |
| B400 | 0100 | 0639 | 0643 | 0647 | | | | |
| B4000 | 0112 | 0162 | | | | | | |
| B42 | 0091 | | | | | | | |
| B44 | 0092 | | | | | | | |
| B52 | 0093 | | | | | | | |
| B6K | 0113 | 0167 | 1147 | | | | | |
| B72 | 0094 | | | | | | | |
| B777 | 0101 | | | | | | | |
| BADDR | 0291 | 1276 | 1280 | 1345 | 1359 | 1366 | | |
| BADRP | 0204 | | | | | | | |
| BEND | 0198 | 0199 | | | | | | |
| BHSTP | 0444 | | | | | | | |
| BLANK | 0388 | | | | | | | |
| BLKN | 1723 | 1598 | | | | | | |
| BLNKA | 1306 | 1309 | | | | | | |
| BUSY | 0617 | 0619 | 0636 | 0640 | 0644 | 0649 | | |
| C5 | 0015 | | | | | | | |
| C6 | 0011 | 0114 | | | | | | |
| C7 | 0022 | 0100 | 1590 | | | | | |
| CCNT | 0538 | 1529 | | | | | | |
| CDEF | 1154 | 1176 | 1199 | 1527 | 1580 | | | |
| CHRSA | 0219 | | | | | | | |
| CKEOL | 1609 | 1269 | 1286 | 1316 | 1368 | | | |
| CLAR2 | 0492 | | | | | | | |
| CLERA | 0160 | 1265 | 1514 | 1563 | | | | |
| CLIMT | 1089 | 1027 | 1031 | 1082 | | | | |
| CLINE | 0316 | | | | | | | |
| CLP1A | 0217 | | | | | | | |
| COLON | 1720 | 1642 | | | | | | |
| COMCE | 0436 | 0791 | 0804 | 0806 | | | | |
| COMCK | 0435 | 0759 | 0762 | 0777 | 0780 | 0798 | | |
| CONST | 0484 | | | | | | | |
| COS | 1649 | 1230 | | | | | | |
| CP2 | 0540 | 0927 | 0947 | 0951 | 0962 | | | |
| CP3 | 0517 | 0938 | 0984 | 1016 | | | | |
| CP4 | 0518 | 0877 | 0971 | 1134 | 1222 | 1406 | 1429 | |
| CPLAC | 0331 | | | | | | | |
| CPLOT | 1580 | 1757 | | | | | | |
| CPT | 0541 | 0866 | 0879 | 0884 | 0899 | 0905 | | |
| CPX | 0535 | 0542 | 1402 | 1463 | 1464 | | | |
| CPY | 0536 | 0543 | 1403 | 1469 | 1470 | | | |
| CRCKA | 0228 | | | | | | | |
| CRLF | 0501 | | | | | | | |
| CRLF1 | 0502 | | | | | | | |
| CRTN | 0037 | 0038 | 0039 | | | | | |
| CTYPE | 0330 | | | | | | | |
| CURPG | 1132 | 0819 | 0986 | 1015 | 1148 | 1154 | 1191 | |
| DCOMA | 0210 | | | | | | | |
| DEFLT | 1255 | 1203 | | | | | | |
| DELSA | 0175 | | | | | | | |
| DFLAG | 0390 | | | | | | | |
| DIGCK | 0463 | | | | | | | |
| DOLLR | 1737 | 1606 | | | | | | |
| DPERR | 0043 | | | | | | | |
| DRQST | 0317 | | | | | | | |
| DSTRT | 0303 | | | | | | | |
| DX | 0533 | 0540 | 1467 | 1486 | 1516 | 1568 | 1572 | 1585 |
| DY | 0534 | 0541 | 1473 | 1490 | 1583 | | | |
| E | 0080 | 1551 | | | | | | |
| E1 | 0235 | | | | | | | |
| E10 | 0244 | | | | | | | |
| E15 | 0249 | | | | | | | |
| E20 | 0254 | | | | | | | |
| E25 | 0259 | | | | | | | |
| E30 | 0264 | | | | | | | |
| E35 | 0269 | | | | | | | |

CROSS-REFERENCE TABLE

| | | | | | | | | | | |
|---|---|---|---|---|---|---|---|---|---|---|
| E40 | 0274 | | | | | | | | | |
| E45 | 0279 | | | | | | | | | |
| E5 | 0239 | | | | | | | | | |
| E50 | 0284 | | | | | | | | | |
| ECALA | 0215 | | | | | | | | | |
| EIPLT | 0983 | 1765 | | | | | | | | |
| EKEY | 1527 | 1576 | 1756 | | | | | | | |
| ELAB | 1191 | 1764 | | | | | | | | |
| ELAB1 | 1272 | 1277 | 1282 | | | | | | | |
| ELAB3 | 1185 | 1209 | | | | | | | | |
| ELAB4 | 1274 | | | | | | | | | |
| ELAB5 | 1378 | 1270 | 1271 | 1273 | | | | | | |
| ELAB6 | 1261 | 1256 | 1304 | | | | | | | |
| ELINA | 0169 | | | | | | | | | |
| ENDS | 0480 | 0754 | | | | | | | | |
| ENTEA | 0218 | 1171 | 1175 | | | | | | | |
| ENTFA | 0189 | | | | | | | | | |
| EOFF | 0891 | 1762 | | | | | | | | |
| EOFF1 | 0899 | 0894 | 0896 | | | | | | | |
| EOL | 0038 | | | | | | | | | |
| EOLCK | 0483 | | | | | | | | | |
| EOST | 0481 | 0760 | 0763 | 0793 | 0799 | 0801 | | | | |
| EPEN | 1056 | 0653 | 1379 | 1763 | | | | | | |
| EPLOT | 0984 | 1761 | | | | | | | | |
| EQUAL | 1725 | 1648 | | | | | | | | |
| ERRA | 0177 | | | | | | | | | |
| ES1 | 0845 | 0825 | | | | | | | | |
| ESCAL | 0819 | 1758 | | | | | | | | |
| EXAXE | 1012 | 1760 | | | | | | | | |
| EXCM | 1721 | 1600 | | | | | | | | |
| EXP | 0401 | 0402 | | | | | | | | |
| EXPM4 | 1611 | 0968 | | | | | | | | |
| EXPOP | 0118 | | | | | | | | | |
| EYAXE | 1013 | 1759 | | | | | | | | |
| F | 0081 | | | | | | | | | |
| FDAAA | 0222 | | | | | | | | | |
| FETCH | 0488 | 0867 | 0869 | 0900 | 0916 | 0923 | 0991 | 1029 | 1032 | 1077 | 1087 |
| | 1210 | 1212 | 1214 | 1216 | 1325 | 1589 | | | | |
| FILLA | 0201 | | | | | | | | | |
| FIRST | 0367 | 1274 | 1278 | 1281 | 1365 | | | | | |
| FIX | 0505 | | | | | | | | | |
| FLGBT | 0073 | | | | | | | | | |
| FLOAT | 0386 | 1329 | | | | | | | | |
| FLTFA | 0193 | | | | | | | | | |
| FLTRA | 0192 | 0657 | 0992 | 1090 | 1142 | | | | | |
| FLTSA | 0195 | | | | | | | | | |
| FMTOP | 1615 | 1193 | | | | | | | | |
| FN | 0148 | | | | | | | | | |
| FND | 0462 | | | | | | | | | |
| FNDIA | 0224 | | | | | | | | | |
| FNDAA | 0223 | | | | | | | | | |
| FNDPS | 0476 | | | | | | | | | |
| FOPBS | 0206 | | | | | | | | | |
| FORM | 0810 | 0820 | 0891 | 0987 | 1025 | 1205 | 1581 | | | |
| FORM2 | 0805 | 0790 | 0792 | 0797 | | | | | | |
| FORM3 | 0803 | 0779 | | | | | | | | |
| FORMA | 0172 | 0810 | 0811 | 0812 | 0813 | 1017 | 1021 | | | |
| FORME | 0336 | | | | | | | | | |
| FORMS | 0335 | 1334 | 1336 | | | | | | | |
| FORMT | 0334 | 1303 | 1376 | | | | | | | |
| FPAGE | 0451 | | | | | | | | | |
| FROMA | 0122 | | | | | | | | | |
| FSCA | 0173 | 0758 | 0761 | 0782 | 0800 | 0803 | 0805 | 0807 | | |
| FSCE2 | 0441 | | | | | | | | | |
| FSCE4 | 0446 | | | | | | | | | |
| FSPR | 1632 | 1297 | 1307 | 1338 | | | | | | |
| FTMP1 | 0337 | | | | | | | | | |
| FTMP2 | 0338 | | | | | | | | | |
| FWAM | 0157 | | | | | | | | | |
| FWUP | 0296 | | | | | | | | | |
| FXFLA | 0194 | 1053 | 1126 | 1493 | | | | | | |
| GE1 | 0675 | 0845 | 1159 | 1170 | 1172 | | | | | |
| GETAD | 0461 | | | | | | | | | |
| GETCH | 0471 | 1433 | | | | | | | | |
| GETLC | 1167 | 1385 | | | | | | | | |
| GETRW | 0672 | 0892 | 0996 | 1026 | 1065 | | | | | |
| GETSK | 0475 | | | | | | | | | |
| GFLAG | 0404 | | | | | | | | | |
| GFRST | 0474 | | | | | | | | | |
| GNEXT | 0473 | 0770 | 0776 | | | | | | | |
| GPARM | 0424 | | | | | | | | | |
| GSIGN | 0486 | | | | | | | | | |
| GTCON | 0504 | 1394 | | | | | | | | |
| GTMP | 0472 | 1386 | | | | | | | | |
| GTOPP | 0466 | | | | | | | | | |
| GTSTA | 0213 | | | | | | | | | |
| HFLG1 | 0321 | | | | | | | | | |
| HSTPT | 0302 | 1347 | | | | | | | | |
| I | 0067 | | | | | | | | | |

CROSS-REFERENCE TABLE

| | | | | | | | | | | | |
|---|---|---|---|---|---|---|---|---|---|---|---|
| ICNT | 0422 | | | | | | | | | | |
| IMPY | 0487 | | | | | | | | | | |
| INF | 0077 | | | | | | | | | | |
| INITS | 0456 | | | | | | | | | | |
| INREA | 0226 | | | | | | | | | | |
| INTCK | 0459 | | | | | | | | | | |
| INTEA | 0178 | | | | | | | | | | |
| INTEL | 0340 | | | | | | | | | | |
| INTFL | 0075 | | | | | | | | | | |
| INTGR | 0402 | | | | | | | | | | |
| IOBUF | 0359 | | | | | | | | | | |
| IOHEA | 0229 | | | | | | | | | | |
| IOSTA | 0225 | | | | | | | | | | |
| KEYFG | 0324 | | | | | | | | | | |
| KEYIN | 1694 | 1532 | | | | | | | | | |
| L2T1 | 0347 | 1485 | 1489 | | | | | | | | |
| L2T2 | 0348 | 1488 | 1492 | | | | | | | | |
| LAB1 | 0783 | 0778 | 0781 | | | | | | | | |
| LAB2 | 0784 | 0774 | | | | | | | | | |
| LAB3 | 0777 | 0786 | | | | | | | | | |
| LABEL | 0768 | 0720 | | | | | | | | | |
| LASTN | 0398 | | | | | | | | | | |
| LBOP | 0119 | | | | | | | | | | |
| LDEF | 0489 | | | | | | | | | | |
| LETCK | 0464 | | | | | | | | | | |
| LFLAG | 0961 | 0974 | | | | | | | | | |
| LIMIT | 0465 | | | | | | | | | | |
| LIMT | 0957 | | | | | | | | | | |
| LISTA | 0167 | | | | | | | | | | |
| LNFD | 0072 | | | | | | | | | | |
| LNINC | 0315 | | | | | | | | | | |
| LNUM | 0457 | 0785 | | | | | | | | | |
| LOCL1 | 0345 | 1314 | 1327 | 1330 | 1331 | 1332 | 1333 | 1337 | 1434 | 1447 | 1455 |
| | 1457 | 1458 | 1460 | 1462 | 1468 | 1504 | 1508 | | | | |
| LOCL2 | 0346 | | | | | | | | | | |
| LPARN | 1741 | 1614 | | | | | | | | | |
| LPCK | 0437 | | | | | | | | | | |
| LPCKE | 0438 | 0769 | | | | | | | | | |
| LPOP | 0120 | | | | | | | | | | |
| LROMA | 0123 | | | | | | | | | | |
| LSTAK | 0299 | | | | | | | | | | |
| LSTPT | 0301 | 1342 | 1373 | 1374 | | | | | | | |
| LTR | 0479 | | | | | | | | | | |
| LWAM | 0295 | | | | | | | | | | |
| M1 | 0124 | 0675 | 1409 | 1519 | 1536 | | | | | | |
| M10 | 0131 | 1533 | | | | | | | | | |
| M100 | 0144 | | | | | | | | | | |
| M1024 | 0146 | | | | | | | | | | |
| M11 | 0132 | | | | | | | | | | |
| M12 | 0133 | | | | | | | | | | |
| M13 | 0134 | | | | | | | | | | |
| M137B | 1664 | 1395 | | | | | | | | | |
| M14 | 0135 | | | | | | | | | | |
| M15 | 0136 | 1267 | | | | | | | | | |
| M2 | 0125 | 0978 | 0993 | | | | | | | | |
| M23 | 0137 | | | | | | | | | | |
| M25 | 0138 | | | | | | | | | | |
| M256 | 0145 | 1497 | | | | | | | | | |
| M3 | 0126 | | | | | | | | | | |
| M31 | 1639 | 0848 | | | | | | | | | |
| M32 | 0139 | | | | | | | | | | |
| M34 | 1617 | 0827 | 0836 | | | | | | | | |
| M36 | 0140 | | | | | | | | | | |
| M4 | 0127 | | | | | | | | | | |
| M48 | 0141 | 1121 | | | | | | | | | |
| M5 | 0128 | | | | | | | | | | |
| M6 | 0129 | | | | | | | | | | |
| M64 | 0142 | | | | | | | | | | |
| M8 | 1091 | 0903 | | | | | | | | | |
| M80 | 0143 | | | | | | | | | | |
| M9 | 0130 | | | | | | | | | | |
| MASK1 | 0153 | | | | | | | | | | |
| MASK5 | 0154 | | | | | | | | | | |
| MAW | 0294 | | | | | | | | | | |
| MAXIN | 0400 | | | | | | | | | | |
| MAXSN | 0147 | 0661 | 1118 | | | | | | | | |
| MBIN1 | 0406 | | | | | | | | | | |
| MBIN2 | 0407 | | | | | | | | | | |
| MBOX1 | 0351 | | | | | | | | | | |
| MDIMA | 0208 | | | | | | | | | | |
| MER8 | 0445 | 1361 | | | | | | | | | |
| MINIT | 0455 | | | | | | | | | | |
| MODE | 0305 | 1261 | 1350 | 1353 | 1358 | | | | | | |
| MOVCK | 1686 | 0834 | | | | | | | | | |
| MOVE | 0633 | 1483 | | | | | | | | | |
| MPEN | 1455 | 1420 | | | | | | | | | |
| MPEN2 | 1462 | 1442 | 1452 | | | | | | | | |
| MPEN3 | 1473 | 1520 | 1569 | 1586 | | | | | | | |
| MPY1 | 1485 | 1476 | 1480 | | | | | | | | |
| MPY2 | 1501 | 1487 | 1491 | | | | | | | | |

CROSS-REFERENCE TABLE

| | | | | | | | | |
|---|---|---|---|---|---|---|---|---|
| MSFLG | 0389 | | | | | | | |
| MULT | 1715 | 1618 | | | | | | |
| MVTOH | 0477 | | | | | | | |
| N9/6 | 0588 | 1599 | | | | | | |
| NDISP | 0382 | | | | | | | |
| NDWRT | 0500 | | | | | | | |
| NEXTI | 0450 | | | | | | | |
| NEXTA | 0467 | | | | | | | |
| NEXTL | 0449 | | | | | | | |
| NMOTA | 0200 | 1356 | | | | | | |
| NOEOF | 0482 | | | | | | | |
| NPRIN | 0383 | | | | | | | |
| NPWRT | 0499 | | | | | | | |
| NUM | 0396 | 0397 | | | | | | |
| NUMBR | 1724 | 1604 | | | | | | |
| NUMCA | 0211 | | | | | | | |
| NUMOA | 0212 | | | | | | | |
| NXTDT | 0304 | | | | | | | |
| NXTST | 0405 | | | | | | | |
| OBLNK | 0468 | | | | | | | |
| ODGIT | 0496 | | | | | | | |
| OF | 0493 | | | | | | | |
| OFFS | 0792 | 0713 | 0718 | 0764 | | | | |
| ONE | 0045 | 1185 | | | | | | |
| ONEXT | 0469 | 1531 | | | | | | |
| OPCHA | 0171 | | | | | | | |
| OPDMK | 0079 | | | | | | | |
| OPMSK | 0076 | 1201 | 1207 | | | | | |
| OPTYP | 0397 | | | | | | | |
| OTPTR | 0293 | | | | | | | |
| OUTCH | 1383 | 1279 | 1310 | 1321 | 1364 | | | |
| OUTCR | 0470 | | | | | | | |
| OUTIA | 0179 | | | | | | | |
| OVCHA | 0216 | | | | | | | |
| OWHER | 0694 | 1127 | | | | | | |
| PARMA | 0306 | | | | | | | |
| PARMN | 0307 | | | | | | | |
| PBPTO | 0313 | | | | | | | |
| PBPTR | 0310 | | | | | | | |
| PBUFF | 0311 | | | | | | | |
| PBUFO | 0312 | | | | | | | |
| PCRLF | 1514 | 1298 | 1380 | 1575 | | | | |
| PEND | 0365 | 1349 | 1360 | | | | | |
| PENDN | 0612 | 0606 | 0611 | 1085 | 1421 | 1444 | | |
| PENUP | 0608 | 0671 | 0937 | 0980 | 1056 | 1155 | 1439 | 1446 |
| PERCT | 1717 | 1608 | | | | | | |
| PEXMA | 0165 | | | | | | | |
| PFLAG | 0391 | | | | | | | |
| PFORM | 1623 | 1324 | | | | | | |
| PGIN0 | 0478 | | | | | | | |
| PGINT | 0458 | | | | | | | |
| PI/2 | 0044 | | | | | | | |
| PL1 | 1411 | 1422 | | | | | | |
| PLACE | 0384 | 1341 | | | | | | |
| PLET | 1395 | 1387 | 1558 | | | | | |
| PLOT | 0797 | 0717 | 0721 | | | | | |
| PLOTE | 1651 | 1196 | | | | | | |
| PLUS | 1716 | 1620 | | | | | | |
| PMODE | 0329 | | | | | | | |
| PNPAR | 0602 | 1002 | | | | | | |
| PPFF | 0366 | | | | | | | |
| PPPOS | 1690 | 1167 | | | | | | |
| PRADD | 0308 | 0989 | 1019 | 1023 | | | | |
| PRERR | 1149 | 1143 | 1295 | | | | | |
| PRFLG | 0332 | 1268 | | | | | | |
| PRINN | 1653 | 1272 | | | | | | |
| PUN1 | 0943 | 0939 | | | | | | |
| PUNIT | 0926 | 0919 | | | | | | |
| PUNX | 0923 | 0911 | 1000 | | | | | |
| PUNY | 0916 | 0912 | 0998 | | | | | |
| PWHER | 0910 | 1075 | 1081 | 1088 | 1100 | | | |
| QTCHA | 0230 | | | | | | | |
| QTCHK | 1645 | 1319 | | | | | | |
| QTOP | 0109 | 0161 | | | | | | |
| QUES | 1732 | 1652 | | | | | | |
| QUOTE | 1747 | 1602 | | | | | | |
| RBOP | 0117 | | | | | | | |
| RBUFF | 0360 | | | | | | | |
| RCOUT | 0333 | | | | | | | |
| RDYDA | 0166 | | | | | | | |
| REED | 0161 | | | | | | | |
| REEDL | 0339 | | | | | | | |
| RES | 0417 | | | | | | | |
| RESB1 | 0453 | | | | | | | |
| RESBP | 0454 | | | | | | | |
| RET2 | 0421 | | | | | | | |
| RETN2 | 0420 | | | | | | | |
| RETN3 | 0419 | | | | | | | |
| RITE | 1643 | 0783 | | | | | | |
| ROT1 | 1140 | 1233 | 1592 | | | | | |

CROSS-REFERENCE TABLE

| | | | | | | | | | | | |
|---|---|---|---|---|---|---|---|---|---|---|---|
| ROT2 | 1137 | 1237 | 1245 | | | | | | | | |
| ROT4 | 1139 | 1252 | | | | | | | | | |
| ROUND | 0495 | | | | | | | | | | |
| RPARN | 1744 | 1616 | | | | | | | | | |
| RPCK | 0439 | | | | | | | | | | |
| RPCKE | 0440 | | | | | | | | | | |
| RPOP | 0115 | 1202 | 1208 | | | | | | | | |
| RSAVE | 0292 | | | | | | | | | | |
| RSLTE | 0373 | | | | | | | | | | |
| RSPTR | 0418 | 1112 | | | | | | | | | |
| RSTAK | 0416 | | | | | | | | | | |
| RSTKA | 0158 | | | | | | | | | | |
| RSULT | 0426 | | | | | | | | | | |
| RUNA | 0163 | | | | | | | | | | |
| S | 0082 | | | | | | | | | | |
| SALTA | 0207 | | | | | | | | | | |
| SAVBP | 0452 | | | | | | | | | | |
| SAVEA | 0325 | | | | | | | | | | |
| SAVEB | 0326 | | | | | | | | | | |
| SAXIS | 0758 | 0715 | 0716 | | | | | | | | |
| SBADR | 0394 | | | | | | | | | | |
| SBPTR | 0387 | 0784 | 1346 | 1362 | | | | | | | |
| SBPUD | 0431 | 0768 | 0771 | 0775 | | | | | | | |
| SBUFA | 0199 | | | | | | | | | | |
| SC16 | 1740 | 0620 | 0622 | | | | | | | | |
| SCAL | 0866 | 0858 | 0860 | | | | | | | | |
| SCALE | 0790 | 0714 | | | | | | | | | |
| SCOLN | 1719 | 1644 | | | | | | | | | |
| SEC | 0320 | | | | | | | | | | |
| SFLAG | 0393 | | | | | | | | | | |
| SGNS | 0497 | | | | | | | | | | |
| SIGN | 0399 | 0400 | | | | | | | | | |
| SIN | 1647 | 1226 | | | | | | | | | |
| SLC0D | 0328 | | | | | | | | | | |
| SLEND | 0202 | | | | | | | | | | |
| SLOOP | 1041 | | | | | | | | | | |
| SLWST | 0447 | 1293 | 1315 | | | | | | | | |
| SNAME | 0724 | 1771 | | | | | | | | | |
| SNFLA | 0197 | | | | | | | | | | |
| SPEN | 0754 | 0712 | 0719 | | | | | | | | |
| SPLFA | 0196 | | | | | | | | | | |
| SSBPT | 0395 | | | | | | | | | | |
| SSYMA | 0170 | 0673 | 0823 | 1157 | 1168 | | | | | | |
| ST | 0377 | | | | | | | | | | |
| STAB2 | 1432 | 1453 | | | | | | | | | |
| STABL | 1426 | 1413 | | | | | | | | | |
| STAR2 | 0490 | | | | | | | | | | |
| START | 0162 | 0007 | | | | | | | | | |
| STATU | 0622 | 0608 | 0612 | 0617 | | | | | | | |
| STEAL | 0817 | 0672 | 0822 | 0841 | | | | | | | |
| STEXP | 0443 | | | | | | | | | | |
| STMAX | 0494 | | | | | | | | | | |
| STOR1 | 0428 | | | | | | | | | | |
| STOR2 | 0664 | 1499 | | | | | | | | | |
| STORE | 0427 | | | | | | | | | | |
| STPFL | 0323 | 0651 | 1562 | | | | | | | | |
| STROP | 0430 | | | | | | | | | | |
| STSRH | 0442 | | | | | | | | | | |
| SUMPA | 0227 | | | | | | | | | | |
| SYE12 | 0485 | | | | | | | | | | |
| SYE25 | 0460 | | | | | | | | | | |
| SYMC1 | 0433 | 0772 | | | | | | | | | |
| SYMC2 | 0432 | | | | | | | | | | |
| SYMCK | 0434 | | | | | | | | | | |
| SYMTP | 0298 | | | | | | | | | | |
| SYTSA | 0209 | | | | | | | | | | |
| T1 | 0520 | 0677 | 0885 | 0926 | 1400 | 1494 | 1515 | 1518 | 1522 | | |
| T2 | 0543 | 0705 | 0707 | 0846 | 0849 | 0850 | 0930 | 0959 | 0972 | 1351 | 1357 |
| T3 | 0519 | 0685 | 0694 | 0910 | 1013 | 1068 | 1078 | 1198 | 1255 | | |
| T4 | 0542 | 0929 | 0932 | 0936 | 0940 | 0943 | | | | | |
| TBL | 1112 | 1768 | 1769 | 1770 | | | | | | | |
| TBSRH | 1621 | 1556 | | | | | | | | | |
| TEMP | 0350 | 0351 | | | | | | | | | |
| TEMP1 | 0352 | | | | | | | | | | |
| TEMP2 | 0353 | | | | | | | | | | |
| TEMP3 | 0354 | | | | | | | | | | |
| TEMP4 | 0355 | | | | | | | | | | |
| TEMP5 | 0539 | 0631 | 0648 | | | | | | | | |
| TEMPS | 0349 | 0538 | 0539 | 0988 | 1018 | 1022 | 1192 | 1200 | 1206 | 1288 | |
| TEMX | 1766 | 0702 | 1044 | 1244 | | | | | | | |
| TEMXX | 0702 | 1033 | 1139 | 1243 | | | | | | | |
| TEMY | 1619 | 1227 | 1236 | 1250 | | | | | | | |
| TERM | 0364 | 1263 | 1266 | | | | | | | | |
| TFLAG | 0318 | | | | | | | | | | |
| TFLG1 | 0322 | | | | | | | | | | |
| TICMK | 1099 | 1046 | | | | | | | | | |
| TMPA | 0203 | | | | | | | | | | |
| TMPOP | 0184 | 1354 | | | | | | | | | |
| TR/W | 0885 | 0872 | 0880 | 0901 | 0906 | | | | | | |
| TRANS | 0707 | 0941 | 0946 | 0949 | 0954 | | | | | | |

CROSS-REFERENCE TABLE

```
TREGE  0372
TSRHA  0168
TSTPT  0300
TTY    0503   0621
TXH    0696   0686   0875   1211   1481
TXX    0699   0868   1030   1074   1099   1215
TYM    0688   0695   0870   1213   1231   1477
TYPEC  1679   1289
TYPFL  0078
TYX    0691   1218   1224
UFLAG  0392
UKPTR  0309
UNITS  0319
UNSTK  0448   1326   1328
UPARA  0191
VALUE  0297   0826   0843
VALUP  1607   1555
VARDA  0214
VTABE  1599   1405
WBUFF  0423   1363
WHERE  0685   1054
WIDTH  0385   1339
WREND  1375   1318   1370
WREXC  1289   1257   1299   1311   1371
WRIT5  1324   1320
WRIT6  1368
WRIT7  1341
WRITB  1334
WRITE  0159
WRITF  1314   1294   1322
WRITN  1301   1290
WRITQ  1310   1291
WRITX  1307   1296
XC     0412   1383   1384   1388
XEC4A  0164   0861   0897   1007   1057   1381   1564   1587
XEC6A  0221
XFAR1  0425   0689   0692   0697   0700   0703   0708   0886   0931   0944   1228
       1355
XFAR2  0429   0656   1186
XH     0514   1162   1238   1475
XLT2   0968   0958   0977
XMAX   0658   0699   0873   1043   1137
XMIN   1601   0633   0696   0925   1241   1248
XN     0522   1601
XSCRA  0220
XW     0515   1164   1182   1246   1479
XX     0523   0602   0658   0979   0994   1004
YC     0414   1431
YH     0513   1160   1177   1180   1234   1474
YMAX   1605   0691   1140
YMIN   1603   0641   0688   0881   0918   1225   1229   1240   1690
YN     0524   1603
YW     0516   1166   1253   1478
YX     0525   1028   1052   1067   1079   1083   1102   1104   1107   1115   1122
       1125   1605
Z1     0527   1105   1766
Z2     0528   1619
ZAP    0152
ZONK   0491
```

#01 TERMINAL OPTION BLOCK

```
0503                      LST
0504  22000               ORG 22000B
0505*
0506* TERMINAL OPTION BLOCK
0507*
0508  22000 000052 TO     ABS XTRM-*        COMMAND JUMP TABLE
0509*
0510  22001 052105 COMTB  OCT 052105        TE
0511  22002 051115        OCT 051115        RM
0512  22003 170400        OCT 170400          (1)    END    ALLOWS TWO INTEGERS
0513*
0514*
0515  22004 001757        ABS ERRX-*        SYNTAX JUMP TABLE
0516  22005 000000        NOP              ** CHECKSUM WORD **
0517*
0518  22006 020302 SYSNT  OCT 020302          (2)    END
0519*
0520*
0521  22007 000777 BN777  OCT 777
0522*
0523*
0524  22010 005032 VALUP  DEF 2415B+2415B
0525  22011 002617 PPEED  DEF 2617B
0526  22012 002753 KEYIN  DEF 2753B
0527  22013 003647 GETLN  DEF 3647B
0528  22014 006036 LISTS  DEF 6036B
0529  22015 006306 MCOUT  DEF 6306B
```

#01 TERMINAL OPTION BLOCK

```
0530*
0531*
0532* SECONDARY ENTRY FROM MAIN SYSTEM THRU REED LINK
0533*
0534  22016 000017 REIA  DEF *+1-TO
0535*
0536  22017 023647       LDA AT1S
0537  22020 027646       LDB AT1
0538  22021 170004       XFR                RESTORE CRITICAL PARAMETERS
0539  22022 170004       XFR
0540  22023 020062       LDA FLGPT
0541  22024 031416       STA MODE           RESTORE MODE FLAG
0542*
0543  22025 021433       LDA TFLAG
0544  22026 010132       CPA M1             CHECK FOR COMPILE
0545  22027 067104       JMP XCOM1
0546  22030 070210       SZA *+4            CHECK FOR PTAPE
0547  22031 162011       JSM PREED,I
0548  22032 066031       JMP *-1            (NULL RECORD)
0549  22033 066517       JMP EOL1
0550*
0551  22034 024212       LDB .SLBF
0552  22035 074056       CMB
0553  22036 005400       ADB BADDR
0554  22037 004132       ADB M1             BADDR-.SLBF-2
0555  22040 074113       SBP *+2            IS DISPLAY EMPTY?
0556  22041 066134       JMP RE1            YES
0557  22042 066147       JMP R17            NO, PRESERVE SYSTEM MESSAGE
0559*
0560* "WHAT?" MESSAGE
0561*
0562  22043 062542 WHAT  JSM MTIB           SAVE MYSTERIOUS LINE
0563  22044 160170       JSM CLERA,I        CLEAR THE DISPLAY
0564  22045 020022       LDA .5
0565  22046 027765       LDB WHAM
0566  22047 066145       JMP R10
0567*
0568*
0569  22050 000156 .110  DEC 110            CONSTANTS USED TO CHECK BAUD RATE
0570  22051 174702 M1598 DEC -1598
0571*
0572  22052 072110 XTRM  RZA *+2            TEST FOR DEFAULT SELECT CODE (4)
0573  22053 020021       LDA .4
0574  22054 070204       SAL 12             SAVE SELECT CODE
0575  22055 031651       STA T1
0576  22056 014056       CPB .1F4           TEST FOR DEFAULT BAUD RATE (110)
0577  22057 026050       LDB .110
0578  22060 074117       LDA B
0579  22061 000134       ADA M3
0590  22062 070153       SAP *+3
0591  22063 160225 TERR1 JSM AERRA,I        ERROR, INVALID BAUD RATE
0592  22064 177662       DEC -78
0593  22065 002251       ADA M1598
0594  22066 071653       SAP *-3
0585  22067 160227       JSM FXFLA,I        CALCULATE TIMING CONSTANT
0586  22070 020214       LDA AR2A
0587  22071 027650       LDB TF1A
0588  22072 170034       XFR
0589  22073 021717       LDA NUM
0590  22074 070442       SAR 10
0591  22075 070244       SAL 11
0592  22076 031654       STA T4             SAVE PAGE INFO
0593  22077 070002       SAR 1
0594  22100 031655       STA T5             TEMPORARY
0595  22101 003651       ADA TCON
0596  22102 027650       LDB TF1A
0597  22103 160221       JSM .FDVA,I
0598  22104 160225       JSM FLTRA,I
0599  22105 066105       JMP *              OVERFLOW (SHOULD NEVER HAPPEN)
0600  22106 004025       ADB .8
0601  22107 035652       STB T2             SAVE TIMING CONSTANT
0602*
0603  22110 025655       LDB T5
0604  22111 006016       ADB REIA           FORM NEW REED LINK
0605  22112 035462       STB REEDL
0606*
0607  22113 021651       LDA T1
0608  22114 070502       SAR 11             2 * SELECT CODE
0609  22115 003335       ADA INTAD            + ADDRESS OF INTERRUPT TABLE - 1
0610  22116 025655       LDB T5
0611  22117 007336       ADB INTSA
0612  22120 070577       STB A,I            PUT INTERRUPT LINK ADDRESS IN TABLE
0614  22121 070742       SAR 16
0615  22122 031653       STA T3             SET TO "EVEN" PARITY
0616*
0617  22123 023641       LDA B4001          TURN ON CARRIER
0618  22124 041651       IOR T1
0619  22125 172741       STF 1
0620  22126 172141       OTA 1
0621  22127 173601       STC 1,C
```

#01 TERMINAL OPTION BLOCK

```
*
22130 070742 RE0   SAR 16
22131 031430       STA LNINC      GET OUT OF AUTO
22132 031431       STA CLINE      INDICATE TOP OF PROGRAM
22133 031655       STA T5         SET PRINT/STORE TO "PRINT"
*
22134 160170 RE1   JSM CLERA,I    CLEAR THE DISPLAY
22135 021430       LDA LNINC
22136 070250       SZA *+5        AUTO MODE?
22137 025427       LDB .LNUM      YES, OUTPUT LINE NUMBER
22140 160210       JSM OUTIA,I
22141 045400       ISZ BADDR        FOLLOWED BY ONE BLANK
22142 066147       JMP R17
*
22143 020021       LDA .4         NO, SUPPLY "TEXT" MESSAGE
22144 027223       LDB MSSG1
22145 005654 R10   ADB T4
22146 061335       JSM NPWRT
*
22147 024236 R17   LDB SLEND      SET UP FOR KEYBOARD INPUT
22150 035623       STB PEND         FOR OUTCR
22151 070742       SAR 16
22152 031442       STA STPFL        CLEAR STOP FLAG
22153 031473       STA CCNT         MULTIPLE CHARACTERS VIA KEYIN
22154 031704       STA BKPTR        CURSOR POINTER
22155 031707       STA BLANK        DO NOT IGNORE BLANKS
22156 031657       STA T7         SAY OK TO CLEAR DISPLAY ON INTERRUPT
22157 031660       STA T8         CLEAR NO-LINE-NUMBERS FLAG
*
22160 162012       JSM KEYIN,I    CALL FOR FIRST KEY
22161 010105       CPA B377       DUMP I/O BUFFER?
22162 066346       JMP DIOB       YES
22163 010074       CPA B22        BACKSPACE?
22164 066420       JMP BKSP       YES
22165 031661       STA T9
*
22166 160170       JSM CLERA,I    CLEAR THE DISPLAY
22167 021430       LDA LNINC
22170 070210       SZA *+4        AUTO MODE?
22171 025427       LDB .LNUM      YES, OUTPUT LINE NUMBER
22172 160210       JSM OUTIA,I
22173 045400       ISZ BADDR        FOLLOWED BY ONE BLANK
22174 021661       LDA T9
22175 066204       JMP R36
22176 020212 RE6   LDA .SLBF
22177 011400       CPA BADDR      DISPLAY EMPTY?
22200 066134       JMP RE1
22201 162012 R46   JSM KEYIN,I    CALL FOR NEXT KEY
22202 010105       CPA B377       DUMP I/O BUFFER?
22203 066346       JMP DIOB       YES
22204 024104 R36   LDB B177
22205 035663       STB CTFLG      CLEAR ASCII-CNTRL FLAG
22206 074742       SBR 16
22207 035662       STB SHFLG      CLEAR ASCII-SHIFT FLAG
22210 074742 R26   SBR 16
22211 070346       RAR 8
22212 070133       SAP *+2,C      TEST BIT 7 FOR SHIFT
22213 024132       LDB M1
22214 035472       STB TEMPS      SET SHIFT FLAG
22215 070346       RAR 8
22216 031661       STA T9         INITIAL CODE WITHOUT SHIFT BIT
*
22217 027656       LDB EDITP
22220 005654       ADB T4
22221 160175       JSM TSRHA,I    CODE IN EDIT TABLE?
22222 066245       JMP R16        NO
22223 002225       ADA *+2
22224 070016       EXA            YES, GO EXECUTE IMMEDIATELY
*
22225 066226       JMP *+1
22226 066564       JMP OTPT   0   EXECUTE
22227 066043       JMP WHAT   1   STEP
22230 066402       JMP RECL   2   RECALL
22231 066420       JMP BKSP   3   BACKSPACE
22232 066435       JMP FORD   4   FORWARDSPACE
22233 066715       JMP DNRW   5   DOWNARROW
22234 066722       JMP UPRW   6   UPARROW
22235 066332       JMP LEFT   7   LEFTARROW
22236 066341       JMP RITE   8   RIGHTARROW
22237 066677       JMP CLVR   9   CLEAR VAR
22240 066450       JMP INDL   10  INSERT/DELETE
22241 066130       JMP RE0    11  CLEAR
22242 066662       JMP REST   12  ACC
22243 066622       JMP PALL   13  PRINT ALL
22244 066513       JMP EOLL   14  EOL
22245 025472 R16   LDB TEMPS
22246 000141       ADA M10        DEFINED KEY?
22247 070253       SAP RE2        NO
22250 074150       SZB *+3        SHIFT?
22251 003644       ADA .74        YES
22252 031661       STA T9
22253 067122       JMP KEYPR
```

#01 TERMINAL OPTION BLOCK

```
*
22254 003642 RE2   ADA M22       CODE < 40B?
22255 070612       SAM R13       YES
22256 000154       ADA M64       CODE < 140B?
22257 070353       SAP RE3       NO
*
22260 074250       SZB *+5       SHIFT?
22261 000040       ADA .31       YES, LOWER CASE LETTER?
22262 070212       SAM RE3       NO
22263 003645       ADA .97       YES
22264 031661       STA T9
22265 066314       JMP RE5
*
22266 021661 RE3   LDA T9
22267 026010       LDB VALUP
22270 160175       JSM TSRHA,I   CODE IN VALUE TABLE?
22271 066300 R13   JMP RDD       NO
22272 000151       ADA M32       CODE < 40B?
22273 070113       SAP *+2       NO
22274 000101       ADA B100      YES
22275 000041       ADA .32
22276 031661       STA T9
22277 066314       JMP RE5
*
22300 021661 RDD   LDA T9
22301 027676       LDB MULTP
22302 005654       ADB T4
22303 160175       JSM TSRHA,I   CODE IN MULTI-CHARACTER TABLE?
22304 066043       JMP WHAT      NO, QUESTION IT
22305 031661       STA T9
22306 160170       JSM CLERA,I   CLEAR THE DISPLAY
22307 021661       LDA T9
22310 027714       LDB MULTN
22311 005654       ADB T4
22312 162015       JSM MCOUT,I   OUTPUT THE MNEMONIC
22313 066176       JMP RE6
22314 021661 RE5   LDA T9        ALL CONVERSION COMPLETE
22315 051662       AND SHFLG     EXCEPT FOR ASCII-SHIFT & ASCII-CNTRL
22316 070056       CMA
22317 070137       LDB A
22320 021661       LDA T9
22321 041662       IOR SHFLG
22322 074257       AND B
22323 051663       AND CTFLG
22324 025704       LDB BKPTR
22325 074210       SZB RE9       CURSOR?
22326 027637       LDB BKPTA     YES
22327 061017       JSM OUTCR     REPLACE CHARACTER
22330 066440       JMP FW2       SCROLL IF NECESSARY
*
22331 061016 RE9   JSM UNEXT     PUT CHARACTER AT END OF LINE
*                                  AND SCROLL IF NECESSARY
* LEFTARROW
*
22332 021400 LEFT  LDA HADDR     IS LAST CHARACTER AT RIGHT END OF DISPLAY?
22333 000151       ADA M32
22334 070076       TCA
22335 001402       ADA OTPTR
22336 070113       SAP *+2
22337 045402       ISZ OTPTR     NO, SCROLL
22340 066176       JMP RE6
*
* RIGHTARROW
*
22341 021402 RITE  LDA OTPTR     IS FIRST CHARACTER AT LEFT END OF DISPLAY?
22342 010212       CPA .SLBF
22343 066176       JMP RE6
22344 055402       DSZ OTPTR     NO, SCROLL
22345 066176       JMP RE6
*
* DUMP I/O BUFFER FOR MODEM MESSAGE
*
22346 021655 DIOB  LDA T5
22347 070110       SZA *+2
22350 164203       JMP ACTSA,I
*
22351 024211       LDB .BUFA
22352 035740       STB TMP
*
22353 160261       JSM IOSTA,I   IS PRINTER BUSY?
22354 066147       JMP R17       (STOP KEY RETURN)
*
22355 021740 DIO2  LDA TMP       GET A CHARACTER
22356 025740       LDB TMP
22357 070002       SAR 1
22360 070517       LDA A,I
22361 074111       SLB *+2
22362 070346       RAR 8
22363 070342       SAR 8
```

#01 TERMINAL OPTION BLOCK

```
      22364 010031        CPA EOL         IS IT EOL?
      22365 066374        JMP DIO3        YES
      22366 041447        IOR SLCOD       NO, OUTPUT IT
      22367 172741        STF 1
      22370 172141        OTA 1
      22371 173601        STC 1,C
      22372 045740        ISZ TMP
      22373 066355        JMP DIO2
*
      22374 020061 DIO3   LDA LNFD
      22375 041447        IOR SLCOD
      22376 172741        STF 1
      22377 172141        OTA 1
      22400 173601        STC 1,C
      22401 066147        JMP R17
*
* RECALL
*
      22402 160170 RECL   JSM CLERA,I     CLEAR THE DISPLAY
      22403 024211        LDB .BUFA
      22404 035740        STB TMP
      22405 061053 REC1   JSM GTMP        GET A CHARACTER
      22406 010031        CPA EOL
      22407 066176        JMP RE6         DONE
      22410 061016        JSM ONEXT       OUTPUT TO DISPLAY
      22411 021400        LDA BADDR
      22412 000151        ADA M32
      22413 070076        TCA
      22414 001402        ADA OTPTR
      22415 070113        SAP *+2
      22416 045402        ISZ OTPTR
      22417 066405        JMP REC1
*
* BACKSPACE CURSOR
*
      22420 021704 BKSP   LDA BKPTR
      22421 072310        RZA BK2         FIRST BACKSPACE?
      22422 021400        LDA BADDR       YES
      22423 010212        CPA .SLBF       NULL RECORD?
      22424 066176 BK3    JMP RE6         YES
      22425 031704        STA BKPTR
      22426 066433        JMP BK1         PUT POINTER AT LAST CHARACTER
*
      22427 010212 BK2    CPA .SLBF       ALREADY AT FIRST CHARACTER?
      22430 066176        JMP RE6         YES
      22431 011402        CPA OTPTR       LEFTMOST ON SCREEN?
      22432 055402        DSZ OTPTR       YES, SCROLL
      22433 055704 BK1    DSZ BKPTR       BACKSPACE CURSOR
      22434 066176        JMP RE6
*
* FORWARDSPACE CURSOR
*
      22435 021704 FORD   LDA BKPTR
      22436 071310        SZA BK3         IGNORE IF NO BACKSPACE HAS OCCURRED
      22437 045704        ISZ BKPTR
      22440 021402 FW2    LDA OTPTR
      22441 000041        ADA .32
      22442 011704        CPA BKPTR       ON RIGHT OF SCREEN?
      22443 011400        CPA BADDR       YES, LINE FULL?
      22444 066176        JMP RE6
      22445 045402        ISZ OTPTR       NO, SCROLL
      22446 066176        JMP RE6
*
* INSERT/DELETE
*
      22447 066176        JMP RE6
      22450 025704 INDL   LDB BKPTR       CHECK CURSOR POSITION
      22451 075710        SZB *-2         ANY BACKSPACE YET?
      22452 021472        LDA TEMPS
      22453 070650        SZA INSR        SHIFT FLAG SET?
*
* DELETE
*
      22454 055400        DSZ BADDR       YES, MOVE END-OF-LINE POINTER
      22455 035740        STB TMP
      22456 015400 DLC1   CPB BADDR       LAST CHARACTER?
      22457 066507        JMP INS2+1      YES, OUTPUT A BLANK
      22460 045740        ISZ TMP
      22461 061053        JSM GTMP        GET CHARACTER
      22462 055740        DSZ TMP
      22463 055740        DSZ TMP         STORE SHIFTED LEFT ONE
      22464 024111        LDB TMPA
      22465 061017        JSM OUTCR
      22466 025740        LDB TMP
      22467 066456        JMP DLC1
*
* INSERT
*
```

```
22470 025400 INSR  LDB BADDR
22471 014236       CPB SLEND
22472 066176       JMP RE6          LINE FULL
22473 004132       ADB M1
22474 035740 INS1  STB TMP
22475 061053       JSM GTMP         GET CHARACTER
22476 025740       LDB TMP
22477 015704       CPB BKPTR        AT CURSOR POSITION?
22500 066506       JMP INS2         YES
22501 024111       LDB TMPA         NO, MOVE RIGHT ONE
22502 061017       JSM OUTCR
22503 025740       LDB TMP
22504 004134       ADB M3           BACK UP TO NEXT CHARACTER TO LEFT
22505 066474       JMP INS1
*
22506 045400 INS2  ISZ BADDR        UPDATE END-OF-LINE POINTER
22507 020041       LDA .32
22510 024111       LDB TMPA
22511 061017       JSM OUTCR        INSERT A BLANK
22512 066176       JMP RE6
*
* PROCESS STORE KEY
*
22513 062542 EOLL  JSM MTIB         MOVE RECORD TO I/O BUFFER
22514 060373       JSM ICNT         GET CHARACTER COUNT
22515 010012       CPA .1
22516 066134       JMP RE1          IGNORE NULL RECORD
*
22517 062552 EOL1  JSM CRIT         SAVE CRITICAL PARAMETERS
22520 061062       JSM GFRST        GET FIRST CHARACTER
22521 066134       JMP RE1          (NULL RECORD RETURN)
22522 060750       JSM DIGCK        DIGIT?
22523 066620       JMP MAINS        NO, GIVE TO SYSTEM
*
22524 060675       JSM INTCK-1      BUILD LINE #
22525 035427       STB .LNUM        STORE LINE #
22526 010031       CPA EOL          END OF LINE?
22527 164204       JMP DELSA,I      YES, DELETE LINE
22530 023640       LDA B5K          OPCODE 2 W/SPECIAL BIT
22531 131706       STA SBPTR,I
22532 045706       ISZ SBPTR
22533 023777       LDA OPCOD
22534 131706       STA SBPTR,I
22535 055400       DSZ BADDR
22536 020031       LDA EOL
22537 024012       LDB .1
22540 160253       JSM CHRSA,I
22541 164203       JMP ACTSA,I
*
*
* SUBROUTINE TO MOVE RECORD TO I/O BUFFER
*
22542 045623 MTIB  ISZ PEND         GUARANTEE ROOM FOR EOL
22543 020031       LDA EOL
22544 061016       JSM ONEXT        STORE EOL
22545 024233       LDB BEND
22546 035476       STB TEMP3
22547 035477       STB TEMP4
22550 004046       ADB .41
22551 065122       JMP MVTOH+1      MOVE THE RECORD AND RETURN
*
* SUBROUTINE TO SAVE CRITICAL PARAMETERS (T1 THRU T7)
*
22552 025450 CRIT  LDB PMODE
22553 076210       RZB *+4          PRINT ALL?
22554 024211       LDB .BUFA        YES
22555 061337       JSM NOWRT        (A-REG HAS COUNT)
22556 061344       JSM CRLF1
*
22557 023646       LDA AT1
22560 027647       LDB AT1S
22561 170004       XFR
22562 170004       XFR
22563 170402       RET
*
* PROCESS EXECUTE KEY
*
22564 062542 OTPT  JSM MTIB         MOVE RECORD TO I/O BUFFER
22565 060373       JSM ICNT         GET CHARACTER COUNT
22566 010012       CPA .1
22567 066134       JMP RE1          IGNORE NULL RECORD
*
22570 062552       JSM CRIT         SAVE CRITICAL PARAMETERS
22571 061062       JSM GFRST        GET FIRST CHARACTER
22572 000000       NOP              (NULL RECORD RETURN)
22573 027714       LDB MULTN
22574 005654       ADB T4
22575 160175       JSM TSRHA,I      SEARCH MULTI-CHARACTER TABLE
22576 066620       JMP MAINS        NOT FOUND, GIVE TO MAIN SYSTEM
22577 002601       ADA *+2
22600 070016       EXA
```

#01 TERMINAL OPTION BLOCK

```
*
22601 066602        JMP *+1
22602 067013        JMP XLIST 0  LIST
22603 066620        JMP MAINS 1  CONT
22604 066620        JMP MAINS 2  TRACE
22605 066620        JMP MAINS 3  RUN
22606 066710        JMP XFECH 4  FETCH
22607 066620        JMP MAINS 5  LOAD
22610 066620        JMP MAINS 6  STORE
22611 066620        JMP MAINS 7  NORMAL
22612 066620        JMP MAINS 8  FIX
22613 066620        JMP MAINS 9  FLT
22614 066620        JMP MAINS 10 SCRATCH
22615 066620        JMP MAINS 11 AUTO
22616 066701        JMP XEXIT 12 EXIT ("STOP" KEY)
*
22617 067067        JMP XCOMP 13 COMP
*
22620 045416 MAINS  ISZ MODE          INDICATE CALC MODE
22621 064357        JMP RETN2         RETURN TO MAIN SYSTEM
*
* PRINT ALL
*
22622 160170 PALL   JSM CLERA,I       CLEAR THE DISPLAY
22623 021450        LDA PMODE         REVERSE THE FLAG
22624 070130        SIA *+2
22625 070742        SAR 16
22626 031450        STA PMODE
22627 026634        LDB MON
22630 070110        SZA *+2
22631 026637        LDB MOF
22632 020020        LDA .3
22633 066145        JMP R10
*
22634 001472 MON    DEF *+*+2-ID-ID
22635 047516        ASC 2,ON
22636 020040
22637 001500 MOF    DEF *+*+2-ID-ID
22640 047506        ASC 2,OFF
22641 043040
*
* CHANGE PARITY
*
22642 160170 EVOD   JSM CLERA,I       CLEAR THE DISPLAY
22643 021653        LDA T3            REVERSE THE FLAG
22644 072113        SAP *+2,S
22645 070073        SAP *+1,C
22646 031653        STA T3
22647 026654        LDB MEV
22650 070113        SAP *+2
22651 026657        LDB MOD
22652 020021        LDA .4
22653 066145        JMP R10
*
22654 001532 MEV    DEF *+*+2-ID-ID
22655 042526        ASC 2,EVEN
22656 042516
22657 001540 MOD    DEF *+*+2-ID-ID
22660 047504        ASC 2,ODD
22661 042040
*
* ACC
*
22662 021472 REST   LDA TEMPS         CHECK SHIFT FLAG
22663 070210        SZA *+4
22664 020101        LDA B100          USE "@"
22665 031661        STA T9
22666 066314        JMP RES
*
22667 020020        LDA .3            USE "RES"
22670 026674        LDB RESM
22671 025654        ADB T4
22672 061335        JSM NPWRT
22673 066176        JMP RE6
*
22674 001572 RESM   DEF *+*+2-ID-ID
22675 051105        ASC 2,RES
22676 051440
*
* CLEAR VAR
*
22677 020056 CLVR   LDA .1E4
22700 164171        JMP RUNA,I
*
* EXIT FROM TERMINAL MODE
*
22701 021651 XEXIT  LDA T1            TURN OFF CARRIER
22702 172741        STF 1
22703 172141        OTA 1
```

#01 TERMINAL OPTION BLOCK

```
22704 173601         STC 1,C
22705 024116         LDB QTOP         (=20000B)
22706 035462         STB REEDL        RESTORE REED LINK
22707 164174         JMP RDYDA,I

*
* FETCH
*
22710 162013 XFECH JSM GETLN,I        GET PARAMETER
22711 020012         LDA .1
22712 066713         JMP *+1          NOP
22713 000132         ADA M1
22714 031431         STA CLINE
*
* DOWNARROW
*
22715 025424 DNRW   LDB PBUFF        CHECK FOR NULL PROGRAM
22716 015423         CPB PBPTR
22717 066134         JMP RE1
22720 062731         JSM DNRWS
22721 066726         JMP UPR1
*
* UPARROW
*
22722 025424 UPRW   LDB PBUFF        CHECK FOR NULL PROGRAM
22723 015423         CPB PBPTR
22724 066134         JMP RE1
22725 062737         JSM UPRWS
22726 070742 UPR1   SAR 16
22727 031430         STA LNINC        GET OUT OF AUTO
22730 065147         JMP R17
*
* DOWNARROW SUBROUTINE
*
22731 021431 DNRWS LDA CLINE
22732 070070         SIA *+1
22733 061075         JSM FNDPS        FIND LINE
22734 066747         JMP U3           PAST END OF PROGRAM
22735 066753         JMP U5           BETWEEN LINES
22736 066753         JMP U5
*
* UPARROW SUBROUTINE
*
22737 021431 UPRWS LDA CLINE
22740 072110         RZA *+2          CLINE=0?
22741 020056         LDA .1E4         YES, FIND LAST LINE OF PROGRAM
22742 061075         JSM FNDPS        FIND LINE
22743 066747         JMP U3           PAST END OF PROGRAM
22744 066745         JMP *+1          BETWEEN LINES
22745 015424         CPB PBUFF        FIRST LINE?
22746 066753         JMP U5           YES
*
22747 021720 U3     LDA LASTN        GET PREVIOUS LINE
22750 060742         JSM FND
22751 070742         SAR 16
22752 031656         STA T6
*
22753 035661 U5     STB T9           SAVE ADDRESS
22754 035472         STB TEMPS
*
* SUBROUTINE TO OUTPUT A LINE TO DISPLAY BUFFER
*
* LOCATION IS IN T3
*
22755 160170 LNOUT JSM CLERA,I        CLEAR THE DISPLAY
22756 125661         LDB T9,I         GET LINE #
22757 045661         ISZ T9
22760 035431         STB CLINE        UPDATE CLINE
*
22761 021661         LDA T9
22762 070070         SIA *+1
22763 070517         LDA A,I
22764 050065         AND OPMSK        (076000)
22765 013777         CPA OPCOD        TEXT?
22766 066771         JMP *+3          YES
22767 025472         LDB TEMPS
22770 166014         JMP LISTS,I
*
22771 021660         LDA T8           GET NO-LINE-NUMBERS FLAG
22772 072110         RZA *+2
22773 160210         JSM OUTIA,I      OUTPUT LINE #
22774 121661         LDA T9,I
22775 045661         ISZ T9
22776 025661         LDB T9
22777 050104         AND B177         CALCULATE CHARACTER COUNT
23000 000134         ADA M3
23001 070037         ADB A
23002 070744         SAL 1
23003 074537         LDB B,I
23004 074404         SBL 8
```

```
23005 074110          SZA *+2
23006 070070          SIA *+1
23007 025661          LDB T9         CALCULATE CHARACTER POINTER
23010 074744          SBL 1
23011 074070          SIB *+1
23012 065335          JMP NPWRT      OUTPUT TO BUFFER
*
* LIST ROUTINE
*
23013 061055 XLIST    JSM GNEXT      GET NEXT CHARACTER
23014 013062          CPA B130       "X"?
23015 067051          JMP XLIS3      YES
23016 013063          CPA B43        "#"?
23017 067053          JMP XLIS4      YES
23020 055400          DSZ BADDR      NO, RESET POINTER
23021 162013 XLIS1    JSM GETLN,I    GET OPTIONAL LINE NUMBERS
23022 020012          LDA .1
23023 024056          LDB .1E4
23024 000132          ADA M1
23025 031431          STA CLINE
23026 035656          STB T6         SAVE ENDING LINE NUMBER
23027 025424          LDB PBUFF      CHECK FOR NULL PROGRAM
23030 015423          CPB PBPTR
23031 066130          JMP RE0
*
23032 062731 XLIS2    JSM DNRWS      OUTPUT LINE TO DISPLAY BUFFER
23033 025431          LDB CLINE
23034 074076          TCB
23035 005656          ADB T6         T6 - CLINE
23036 074152          SBM *+3
23037 025442          LDB STPFL      CHECK STOP FLAG
23040 014040          CPB .31
23041 067064          JMP LOUT
23042 021651          LDA T1
23043 011447          CPA SLCOD      CHECK SELECT CODES
23044 067057          JMP XLIS5
*
23045 060373          JSM ICNT       GET CHARACTER COUNT
23046 061337          JSM NOWRT      PRINT THE LINE
23047 061344          JSM CRLF1
23050 067032          JMP XLIS2
*
23051 045660 XLIS3    ISZ T8         SET NO-LINE-NUMBERS FLAG
23052 067013          JMP XLIST
23053 060664 XLIS4    JSM LNUM       FETCH SELECT CODE
23054 074204          SBL 12
23055 035447          STB SLCOD
23056 067021          JMP XLIS1
*
23057 062542 XLIS5    JSM MTIB       MOVE RECORD TO I/O BUFFER
23060 063246          JSM MDRVR      CALL MODEM DRIVER
23061 067032          JMP XLIS2
*
23062 000130 B130     OCT 130
23063 000043 B43      OCT 43
*
23064 024127 LOUT     LDB B170K
23065 035447          STB SLCOD
23066 066130          JMP RE0
*
* COMPILE ROUTINE
*
23067 020132 XCOMP    LDA M1
23070 031433          STA TFLAG
23071 020041          LDA .32
23072 031707          STA BLANK
23073 162013          JSM GETLN,I    GET OPTIONAL LINE NUMBERS
23074 020012          LDA .1
23075 024056          LDB .1E4
23076 000132          ADA M1
23077 031431          STA CLINE
23100 035656          STB T6         SAVE ENDING LINE NUMBER
23101 025424          LDB PBUFF      CHECK FOR NULL PROGRAM
23102 015423          CPB PBPTR
23103 067117          JMP XCOM2      DONE
*
23104 062731 XCOM1    JSM DNRWS      OUTPUT LINE TO DISPLAY BUFFER
23105 025431          LDB CLINE
23106 074076          TCB
23107 005656          ADB T6         T6 - CLINE
23110 074352          SBM XCOM2
*
23111 062542          JSM MTIB       MOVE LINE TO I/O BUFFER
23112 023646          LDA AT1
23113 027647          LDB AT1S
23114 170004          XFR
23115 170004          XFR
23116 064357          JMP RETN2      GO COMPILE
*
23117 070742 XCOM2    SAR 16
23120 031433          STA TFLAG
23121 066130          JMP RE0
```

```
*
* PROCESS DEFINED KEY
*
23122 021661 KEYPR LDA T9          CHECK FOR SPECIAL FUNCTION
23123 010022       CPA .5
23124 067212       JMP SETAS       SET ASCII-SHIFT
23125 010023       CPA .6
23126 067215       JMP SETAC       SET ASCII-CNTRL
23127 010024       CPA .7
23130 067226       JMP PRST        SET PRINT/STORE
23131 010025       CPA .8
23132 066642       JMP EVOD        CHANGE PARITY
23133 010026       CPA .9
23134 067237       JMP XMIT        TRANSMIT
*
23135 024166       LDB FWAM        SEARCH FOR KEY, STARTING AT FWAM
23136 015405 KEY1  CPB FWUP
23137 066043       JMP WHAT        UNDEFINED
23140 074517       LDA B,I
23141 074070       SIB *+1
23142 011661       CPA T9
23143 067146       JMP *+3         FOUND IT
23144 074437       ADB B,I
23145 067136       JMP KEY1        KEEP SEARCHING
*
23146 074517       LDA B,I
23147 074070       SIB *+1
23150 010012       CPA .1          NULL DEFINITION?
23151 066043       JMP WHAT        YES
23152 031466       STA LOCL1       NO, SAVE LENGTH WORD
23153 074517       LDA B,I
23154 074070       SIB *+1
23155 070110       SZA *+2         IS THIS A TYPING AID?
23156 066043       JMP WHAT        NO
23157 074744       SBL 1           YES
23160 035740       STB TMP         SAVE CHARACTER POINTER
23161 021466       LDA LOCL1
23162 070744       SAL 1
23163 000136       ADA M5          ASSUME ODD COUNT
23164 031473       STA CCNT        SAVE CHARACTER COUNT
23165 070037       ADB A
23166 074517       LDA B,I         LOOK AT LAST WORD
23167 050105       AND B377
23170 070450       SZA *+9
23171 045473       ISZ CCNT        CORRECT COUNT
23172 010100       CPA ASTR1       CHECK FOR *
23173 067175       JMP *+2
23174 066201       JMP R46
23175 074517       LDA B,I
23176 050157       AND M256
23177 040027       IOR AIEX1       IEX CODE
23200 067206       JMP *+6
23201 074517       LDA B,I
23202 013210       CPA ASTR2       CHECK FOR *
23203 067205       JMP *+2
23204 066201       JMP R46
23205 023211       LDA AIEX2       IEX CODE
23206 074557       STA B,I
23207 066201       JMP R46         EXECUTE IMMEDIATELY
*
00100        ASTR1 EQU B52
23210 025000 ASTR2 OCT 025000
00027        AIEX1 EQU .11
23211 005400 AIEX2 OCT 005400
*
*
23212 024033 SETAS LDB B20
23213 035662       STB SHFLG
23214 067217       JMP *+3
23215 024054 SETAC LDB .63
23216 035663       STB CTFLG
23217 162012       JSM KEYIN,I
23220 010105       CPA B377        DUMP I/O BUFFER?
23221 066346       JMP DIOB        YES
23222 066210       JMP R26
*
23223 002450 MSSG1 DEF *+*+2-ID-ID
23224 052105       ASC 2,TEXT
23225 054124
*
23226 160170 PRST  JSM CLERA,I     CLEAR THE DISPLAY
23227 020062       LDA FLGBT
23230 031655       STA T5
23231 027234       LDB STMS
23232 020021       LDA .4
23233 066145       JMP R10
*
23234 002472 STMS  DEF *+*+2-ID-ID
23235 051501       ASC 2,SAVE
23236 053105
```

#01 TERMINAL OPTION BLOCK

```
*
*
      23237 062542 XMIT  JSM MTIB       MOVE RECORD TO I/O BUFFER
      23240 060373       JSM ICNT       GET CHARACTER COUNT
      23241 010012       CPA .1
      23242 066134       JMP RE1        IGNORE NULL RECORD
*
      23243 062552       JSM CRIT
      23244 063246       JSM MDRVR      CALL MODEM
      23245 066134       JMP RE1
*
* MODEM OUTPUT DRIVER
*
      23246 021651 MDRVR LDA T1         GET SELECT CODE
      23247 043641       IOR B4001
      23250 063625       JSM IOST       WAIT FOR MODEM TO BE READY
      23251 170402       RET            STOP-FLAG RETURN
*
      23252 172741       STF 1          TURN OFF INTERRUPT
      23253 020211       LDA .BUFA      SET TO START OF I/O BUFFER
      23254 031400       STA BADDR
*
      23255 021400 MDR1  LDA BADDR
      23256 025400       LDB BADDR
      23257 070002       SAR 1
      23260 070517       LDA A,I        FETCH TWO CHARACTERS
      23261 074111       SLB *+2
      23262 070346       RAR 8
      23263 070342       SAR 8
      23264 010031       CPA EOL        IS IT EOL?
      23265 067271       JMP MDR3       YES
      23266 063277       JSM MDRS       NO
      23267 045400       ISZ BADDR
      23270 067255       JMP MDR1
*
      23271 020031 MDR3  LDA CRTN       OUTPUT CRTN
      23272 063277       JSM MDRS
      23273 020104       LDA B177       OUTPUT RUBOUT
      23274 063277       JSM MDRS
      23275 173741       CLF 1
      23276 170402       RET
*
* SERIALIZING SUBROUTINE
*
      23277 031661 MDRS  STA T9
      23300 025653       LDB T3         INCLUDE PARITY
      23301 070111       SLA *+2
      23302 004062       ADB FLGBT
      23303 070002       SAR 1
      23304 073650       RZA *-3
      23305 021661       LDA T9
      23306 074342       SBR 8
      23307 074017       ADA B
      23310 040110       IOR B1400      INCLUDE STOP BITS
      23311 070744       SAL 1
      23312 031661       STA T9
      23313 025652       LDB T2         SET UP BIT COUNTER
      23314 004106       ADB B777       SWITCH TO SINGLE STOP BIT @ 130 BAUD
      23315 074700       AHR 15
      23316 004141       ADB M10
      23317 035470       STB L2T1
      23320 041651 MDR2  IOR T1         "OR" IN SELECT CODE
      23321 040121       IOR B4000      "OR" IN S03
      23322 172141       OTA 1          LOAD I/O REGISTER
      23323 172601       STC 1          OUTPUT THE DATA
      23324 172741       STF 1
      23325 021661       LDA T9         SHIFT DATA RIGHT
      23326 070002       SAR 1
      23327 031661       STA T9         SAVE SHIFTED DATA
      23330 025652       LDB T2         LOAD TIMING CONSTANT
      23331 076030       RIB *          LOOP FOR TIMING
      23332 045470       ISZ L2T1       INCREMENT BIT COUNTER
      23333 067320       JMP MDR2
      23334 170402       RET
*
* SERVICE MODEM INTERRUPTS
*
      23335 040377 INTAD DEF 40377B     ADDRESS OF INTERRUPT TABLE - 1
      23336 001337 INTSA DEF *+1-ID
*
      23337 074742       SBR 16         INITIALIZE DATA WORD
      23340 023643       LDA M8         SET UP BIT COUNTER
      23341 031446       STA ADRSS
      23342 021652       LDA T2
      23343 070000       AAR 1          LOAD HALF-WAIT
      23344 000042       ADA .33        ALLOW FOR DELAY IN INTERRUPT ROUTINE
      23345 072030       RIA *          LOOP FOR TIMING
*
```

#01 TERMINAL OPTION BLOCK

```
23346 021651 MOU1  LDA T1          GET SELECT CODE
23347 043641       IOR B4001
23350 172141       OTA 1
23351 172601       STC 1           SAMPLE
23352 172741       STF 1
23353 172241       LIA 1
23354 074002       SBR 1           POSITION OLD DATA WORD
23355 070111       SLA *+2
23356 004062       ADB FLGBT
23357 021652       LDA T2          LOAD TIMING CONSTANT
23360 072030       RIA *           LOOP FOR TIMING
23361 045446       ISZ ADRSS
23362 067346       JMP MOU1
23363 074422       SBR 9
23364 035446       STB ADRSS       SAVE CODE
*
23365 021655       LDA T5
23366 072110       SZA *+2
23367 067507       JMP MOSS
*
23370 014031       CPB CRTN
23371 067463       JMP SCRN
23372 004151       ADB M32         CODE < 40B?
23373 074152       SBM *+3         YES
23374 004154       ADB M64         CODE < 140B?
23375 074112       SBM *+2         YES
23376 067450       JMP INT2
*
23377 021657       LDA T7          OK TO CLEAR DISPLAY?
23400 072210       RZA *+4
23401 160170       JSM CLERA,I     CLEAR THE DISPLAY
23402 020211       LDA .BUFA
23403 031657       STA T7
*
23404 021400       LDA BADDR       STASH IN DISPLAY BUFFER
23405 010236       CPA SLEND
23406 067450       JMP INT2        AT END OF BUFFER
23407 025400       LDB BADDR
23410 045400       ISZ BADDR
23411 074006       RBR 1
23412 070002       SAR 1
23413 070517       LDA A,I         FETCH WORD IN BUFFER
23414 074112       SBM *+2
23415 070346       RAR 8
23416 050157       AND M256
23417 041446       IOR ADRSS
23420 074132       SBM *+2,C
23421 070346       RAR 8
23422 074557       STA B,I
*
23423 021400       LDA BADDR       SCROLL IF NECESSARY
23424 000151       ADA M32
23425 070076       TCA
23426 001402       ADA OTPTR
23427 070113       SAP *+2
23430 045402       ISZ OTPTR
*
23431 021657 MOU2  LDA T7          STASH IN I/O BUFFER
23432 013506       CPA IOEND
23433 067450       JMP INT2        AT END OF BUFFER
23434 025657       LDB T7
23435 045657       ISZ T7
23436 074006       RBR 1
23437 070002       SAR 1
23440 070517       LDA A,I         FETCH WORD IN BUFFER
23441 074112       SBM *+2
23442 070346       RAR 8
23443 050157       AND M256
23444 041446       IOR ADRSS
23445 074132       SBM *+2,C
23446 070346       RAR 8
23447 074557       STA B,I
*
23450 021651 INT2  LDA T1          GET SELECT CODE
23451 043641       IOR B4001
23452 172141       OTA 1
23453 172601       STC 1
23454 172741       STF 1
23455 172241       LIA 1
23456 071511       SLA INT2        WAIT FOR STOP BIT
23457 021444       LDA SAVEA       RESTORE A-REG
23460 025445       LDB SAVEB       RESTORE B-REG
23461 173741       CLF 1           RESTORE INTERRUPT
23462 170402       RET
*
23463 020105 SCRN  LDA B377
23464 031443       STA KEYFG       SAY TO DUMP I/O BUFFER
*
23465 021657       LDA T7          PUT EOL IN I/O BUFFER
23466 072110       RZA *+2
```

#01 TERMINAL OPTION BLOCK

```
23467 020211        LDA .BUFA
23470 070137        LDB A
23471 074006        RBR 1
23472 070002        SAR 1
23473 070517        LDA A,I
23474 074112        SBM *+2
23475 070346        RAR 8
23476 050157        AND M256
23477 040031        IOR EOL
23500 074132        SBM *+2,C
23501 070346        RAR 8
23502 074557        STA B,I
23503 070742        SAR 16
23504 031657        STA T7
23505 067450        JMP INT2
*
23506 003320 IOEND  DEF IOBUF+IOBUF+80
*
*
* STORE FROM INTERRUPT
*
23507 014031 MDSS   CPB CRTN
23510 067606        JMP MDS5
23511 004151        ADB M32         CODE < 40B?
23512 074152        SBM *+3         YES
23513 004154        ADB M64         CODE < 140B?
23514 074112        SBM *+2         YES
23515 067450        JMP INT2
*
23516 021657        LDA T7
23517 072610        RZA MDS2
23520 021446        LDA ADRSS       PROCESS FIRST CODE
23521 060750        JSM DIGCK       DIGIT?
23522 067530        JMP MDS1        NO
23523 035722        STB INTGR       YES, SAVE IT
23524 024233        LDB SBUFA
23525 035706        STB SBPTR
23526 020133        LDA M2
23527 067531        JMP *+2
23530 020132 MDS1   LDA M1
23531 031657        STA T7
23532 067450        JMP INT2
*
23533 010132 MDS2   CPA M1          IGNORE?
23534 067450        JMP INT2        YES
23535 010133        CPA M2          IN LINE NUMBER?
23536 067557        JMP MDS3
23537 021657 MDST   LDA T7          NO, STORE CHARACTER
23540 010236        CPA SLEND
23541 067450        JMP INT2        AT END OF BUFFER
23542 025657        LDB T7
23543 045657        ISZ T7
23544 074006        RBR 1
23545 070002        SAR 1
23546 070517        LDA A,I         FETCH WORD IN BUFFER
23547 074112        SBM *+2
23550 070346        RAR 8
23551 050157        AND M256
23552 041446        IOR ADRSS
23553 074132        SBM *+2,C
23554 070346        RAR 8
23555 074557        STA B,I
23556 067450        JMP INT2
*
23557 021446 MDS3   LDA ADRSS       PROCESS LINE NUMBER
23560 060750        JSM DIGCK       DIGIT?
23561 067571        JMP MDS4        NO
23562 021722        LDA INTGR
23563 070704        SAL 2
23564 001722        ADA INTGR
23565 070744        SAL 1
23566 074017        ADA B
23567 031722        STA INTGR
23570 067450        JMP INT2
*
23571 021722 MDS4   LDA INTGR
23572 031427        STA .LNUM
23573 131706        STA SBPTR,I     STORE LINE NUMBER
23574 045706        ISZ SBPTR
23575 023640        LDA 95K
23576 131706        STA SBPTR,I     STORE SPECIAL OPCODE
23577 045706        ISZ SBPTR
23600 023777        LDA OPCOD
23601 131706        STA SBPTR,I     STORE PAGE CODE
23602 024212        LDB .SLBF
23603 004022        ADB .5
23604 035657        STB T7
23605 067537        JMP MDST
*
23606 021657 MDS5   LDA T7          PROCESS CRTN
```

#01 TERMINAL OPTION BLOCK

```
  23607 070550        SZA MDS6
  23610 010132        CPA M1
  23611 067622        JMP MDS6
  23612 010133        CPA M2
  23613 067622        JMP MDS6
  23614 021657        LDA T7
  23615 070002        SAR 1
  23616 070070        SIA *+1
  23617 031706        STA SBPTR
  23620 020175        LDA B377
  23621 031443        STA KEYFG
  23622 070742 MDS6   SAR 16
  23623 031657        SIA T7
  23624 067450        JMP INT2
*
* I/O STATUS ROUTINE
*
* LDA SELECT CODE (SAVED)
* JSM IOST
*
* RETURN TO P+1 IF STOP FLAG
*             P+2 OTHERWISE
*
  23625 025442 IOST   LDB STPFL         CHECK STOP FLAG
  23626 014040        CPB .31
  23627 170402        RET
*
  23630 172741        STF 1             TURN OFF INTERRUPT SYSTEM
  23631 172141        OTA 1             OUTPUT SELECT CODE
  23632 172741        STF 1             LOAD DEVICE STATUS
  23633 177241        LIB 1,C            AND TURN ON INTERRUPT
  23634 074406        RBR 9
  23635 075413        SBP IOST          LOOP IF BUSY (TESTS SI0)
  23636 064357        JMP RETN2
  23637 001704 BKPTA  DEF BKPTR
  23640 005000 B5K    OCT 5000
  23641 004001 B4001  OCT 4001
  23642 177752 M22    DEC -22
  23643 177770 M8     DEC -8
  23644 000112 .74    DEC 74
  23645 000141 .97    DEC 97
*
  23646 001651 AT1    DEF T1
  23647 040424 AT1S   DEF 40424B
  23650 001662 TF1A   DEF TF1
  23651 001652 TCON   DEF *+1-ID        CONSTANT FOR TIMING LOOP
  23652 002001        OCT 002001  10+4
  23653 062531        OCT 062531  6559
  23654 021451        OCT 021451  2329
  23655 104511        OCT 104511  8949
*
* EDIT KEY TABLE (IMMEDIATE EXECUTION)
*
  23656 003536 EDITP  DEF *+*+2-ID-ID
  23657 005600        OCT 05600 EXECUTE        13  0
  23660 006601        OCT 06601 STEP           15  1
  23661 010202        OCT 10202 RECALL         20  2
  23662 011203        OCT 11203 BACKSPACE      22  3
  23663 011604        OCT 11604 FORWARDSPACE   23  4
  23664 012205        OCT 12205 DOWNARROW      24  5
  23665 012606        OCT 12606 UPARROW        25  6
  23666 013207        OCT 13207 LEFTARROW      26  7
  23667 013610        OCT 13610 RIGHTARROW     27  8
  23670 015211        OCT 15211 CLEAR VAR      32  9
  23671 017612        OCT 17612 INSERT/DELETE  37 10
  23672 065213        OCT 65213 CLEAR         152 11
  23673 065614        OCT 65614 ACC           153 12
  23674 070215        OCT 70215 PRINT ALL     160 13
  23675 071316        OCT 71316 FOL           162 14    END
*
* MULTI-CHARACTER KEY TABLE
*
  23676 003576 MULTP  DEF *+*+2-ID-ID
  23677 005200        OCT 05200 LIST      12 0
  23700 006201        OCT 06201 CONT      14 1
  23701 007202        OCT 07202 TRACE     16 2
  23702 007603        OCT 07603 RUN       17 3
  23703 010604        OCT 10604 FETCH     21 4
  23704 014205        OCT 14205 LOAD      30 5
  23705 014606        OCT 14606 STORE     31 6
  23706 017207        OCT 17207 NORMAL    36 7
  23707 072210        OCT 72210 FIX      164 8
  23710 072611        OCT 72611 FLT      165 9
  23711 073212        OCT 73212 SCRATCH  166 10
  23712 073613        OCT 73613 AUTO     167 11
  23713 077714        OCT 77714 EXIT     177 12    END
*
* MULTI-CHARACTER MNEMONIC TABLE
*
  23714 003632 MULTN  DEF *+*+2-ID-ID
```

#01 TERMINAL OPTION BLOCK

```
1715  23715 046111        OCT 046111  L    I
1716  23716 051524        OCT 051524  S    T
1717  23717 100103        OCT 100103  (0)  C
1718  23720 047516        OCT 047516  O    N
1719  23721 052201        OCT 052201  T    (1)
1720  23722 052122        OCT 052122  T    R
1721  23723 040503        OCT 040503  A    C
1722  23724 042602        OCT 042602  E    (2)
1723  23725 051125        OCT 051125  R    U
1724  23726 047203        OCT 047203  N    (3)
1725  23727 043105        OCT 043105  F    E
1726  23730 052103        OCT 052103  T    C
1727  23731 044204        OCT 044204  H    (4)
1728  23732 046117        OCT 046117  L    O
1729  23733 040504        OCT 040504  A    D
1730  23734 102523        OCT 102523  (5)  S
1731  23735 052117        OCT 052117  T    O
1732  23736 051105        OCT 051105  R    E
1733  23737 103116        OCT 103116  (6)  N
1734  23740 047522        OCT 047522  O    R
1735  23741 046501        OCT 046501  M    A
1736  23742 046207        OCT 046207  L    (7)
1737  23743 043111        OCT 043111  F    I
1738  23744 054210        OCT 054210  X    (8)
1739  23745 043114        OCT 043114  F    L
1740  23746 052211        OCT 052211  T    (9)
1741  23747 051503        OCT 051503  S    C
1742  23750 051101        OCT 051101  R    A
1743  23751 052103        OCT 052103  T    C
1744  23752 044212        OCT 044212  H    (10)
1745  23753 040525        OCT 040525  A    U
1746  23754 052117        OCT 052117  T    O
1747  23755 105505        OCT 105505  (11)E
1748  23756 054111        OCT 054111  X    I
1749  23757 052214        OCT 052214  T    (12)
1750  23760 041517        OCT 041517  C    O
1751  23761 046520        OCT 046520  M    P
1752  23762 146400        OCT 146400  (13)       END
1754  23763 160205 ERRX   JSM AERRA,I      MODE ERROR
1755  23764 177661        DEC -79
1756*
1757  23765 003754 WHAM   DEF ***+2-ID-ID
1758  23766 053510        ASC 3,WHAT?
      23767 040524
      23770 037440
1759  00000        LEFF   EQU 23771B-*
1760*
1761  01651               ORG 1651B
1762*
1763  01740        TMP    EQU XC
1764  01473        CCNT   EQU TEMPS+1
1765  01704        BKPTR  EQU WIDTH
1766*
1767  01651 000000 T1     NOP              SELECT CODE
1768  01652 000000 T2     NOP              TIMING CONSTANT
1769  01653 000000 T3     NOP              PARITY INDICATOR
1770  01654 000000 T4     NOP              PAGE INFO
1771  01655 000000 T5     NOP              PRINT/STORE FLAG
1772  01656 000000 T6     NOP              FOR LISTING
1773  01657 000000 T7     NOP              OK/NOT OK TO CLEAR DISPLAY ON INTERRUPT
1774  01660 000000 T8     NOP              NO-LINE-NUMBERS FLAG
1775  01661 000000 T9     NOP
1776*
1777  01662 000000 TF1    BSS 4            FLOATING TEMPORARY
1778  01662        SHFLG  EQU TF1
1779  01663        CTFLG  EQU TF1+1
1780*
1781  23771               ORG 23771B
1782*
1783  23771 177772        ABS ERRX-*       EXECUTION JUMP TABLE
1784  23772 000000        NOP             ** CHECKSUM WORD **
1785*
1786  23773 176014        ABS BN777-*      NON-FORMULA OPERATOR TABLE (NULL TABLE)
1787  23774 176013        ABS BN777-*      FUNCTION-NAME TABLE (NULL TABLE)
1788  23775 176004        ABS COMTB-*      COMMAND-NAME TABLE
1789  23776 176010        ABS SYSNT-*      STATEMENT-NAME TABLE
1790  23777 016000 OPCOD  OCT 16000
1791                      END
*  NO ERRORS*
```

CROSS-REFERENCE TABLE

| | | | | | | | | | |
|---|---|---|---|---|---|---|---|---|---|
| .1 | 0020 | 0925 | 0945 | 0980 | 1087 | 1186 | 1238 | 1291 | 1356 |
| .10 | 0071 | 0072 | | | | | | | |
| .100 | 0070 | | | | | | | | |
| .1000 | 0069 | | | | | | | | |
| .11 | 0035 | 0043 | 1326 | | | | | | |
| .110 | 0569 | 0577 | | | | | | | |

CROSS-REFERENCE TABLE

| | | | | | | | | | | | |
|---|---|---|---|---|---|---|---|---|---|---|---|
| .12 | 0036 | | | | | | | | | | |
| .13 | 0039 | | | | | | | | | | |
| .15 | 0048 | 0083 | | | | | | | | | |
| .16 | 0049 | 0084 | | | | | | | | | |
| .1E4 | 0068 | 0576 | 1070 | 1123 | 1187 | 1239 | | | | | |
| .2 | 0027 | | | | | | | | | | |
| .21 | 0050 | | | | | | | | | | |
| .22 | 0051 | 0087 | | | | | | | | | |
| .23 | 0052 | 0088 | | | | | | | | | |
| .28 | 0053 | | | | | | | | | | |
| .3 | 0028 | 0045 | 1024 | 1059 | | | | | | | |
| .31 | 0054 | 0090 | 0723 | 1201 | 1647 | | | | | | |
| .32 | 0055 | 0736 | 0866 | 0915 | 1235 | | | | | | |
| .33 | 0056 | 1440 | | | | | | | | | |
| .34 | 0057 | 0091 | | | | | | | | | |
| .37 | 0058 | | | | | | | | | | |
| .4 | 0029 | 0573 | 0636 | 1042 | 1347 | | | | | | |
| .40 | 0059 | | | | | | | | | | |
| .41 | 0060 | 0958 | | | | | | | | | |
| .43 | 0061 | | | | | | | | | | |
| .45 | 0062 | | | | | | | | | | |
| .46 | 0063 | | | | | | | | | | |
| .48 | 0064 | | | | | | | | | | |
| .5 | 0032 | 0564 | 1268 | 1618 | | | | | | | |
| .58 | 0065 | 0094 | | | | | | | | | |
| .6 | 0031 | 0044 | 1270 | | | | | | | | |
| .63 | 0066 | 1333 | | | | | | | | | |
| .7 | 0032 | 1272 | | | | | | | | | |
| .74 | 1663 | 0713 | | | | | | | | | |
| .8 | 0033 | 0600 | 1274 | | | | | | | | |
| .9 | 0034 | 1276 | | | | | | | | | |
| .97 | 1664 | 0725 | | | | | | | | | |
| .99 | 0074 | | | | | | | | | | |
| .BUFA | 0184 | 0794 | 0829 | 0965 | 1372 | 1474 | 1533 | | | | |
| .FADA | 0185 | | | | | | | | | | |
| .FDVA | 0188 | 0597 | | | | | | | | | |
| .FMPA | 0187 | | | | | | | | | | |
| .FSBA | 0186 | | | | | | | | | | |
| .FSR | 0190 | | | | | | | | | | |
| .LNUM | 0314 | 0631 | 0661 | 0935 | 1609 | | | | | | |
| .NPWR | 0494 | | | | | | | | | | |
| .SLBF | 0181 | 0551 | 0667 | 0782 | 0848 | 0853 | 1617 | | | | |
| A | 0200 | 0612 | 0756 | 0803 | 1150 | 1165 | 1304 | 1378 | 1484 | 1507 | 1534 |
| | 1537 | 1587 | | | | | | | | | |
| ACTSA | 0174 | 0792 | 0947 | | | | | | | | |
| ADRSS | 0327 | 1437 | 1454 | 1457 | 1488 | 1511 | 1564 | 1591 | 1597 | | |
| AERRA | 0176 | 0581 | 1754 | | | | | | | | |
| AIEX1 | 1326 | 1314 | | | | | | | | | |
| AIEX2 | 1327 | 1320 | | | | | | | | | |
| AR1 | 0413 | 0182 | | | | | | | | | |
| AR1A | 0182 | | | | | | | | | | |
| AR2 | 0415 | 0183 | | | | | | | | | |
| AR2A | 0183 | 0586 | | | | | | | | | |
| ARYAD | 0403 | | | | | | | | | | |
| ASTR1 | 1324 | 1309 | | | | | | | | | |
| ASTR2 | 1325 | 1317 | | | | | | | | | |
| AT1 | 1666 | 0537 | 0969 | 1254 | | | | | | | |
| AT15 | 1667 | 0536 | 0970 | 1255 | | | | | | | |
| B | 0000 | 0578 | 0759 | 1167 | 1282 | 1286 | 1289 | 1294 | 1305 | 1312 | 1316 |
| | 1321 | 1486 | 1491 | 1514 | 1544 | 1594 | 1604 | | | | |
| B100 | 0095 | 0735 | 1055 | | | | | | | | |
| B1000 | 0102 | | | | | | | | | | |
| B10K | 0114 | 0115 | | | | | | | | | |
| B12K | 0116 | 0117 | 0206 | | | | | | | | |
| B130 | 1223 | 1190 | | | | | | | | | |
| B133 | 0096 | | | | | | | | | | |
| B140 | 0097 | | | | | | | | | | |
| B1400 | 0103 | 0204 | 1407 | | | | | | | | |
| B17 | 0083 | | | | | | | | | | |
| B170K | 0121 | 1226 | | | | | | | | | |
| B1740 | 0104 | 0203 | | | | | | | | | |
| B1760 | 0105 | 0158 | | | | | | | | | |
| B177 | 0098 | 0673 | 1163 | 1390 | | | | | | | |
| B1774 | 0106 | | | | | | | | | | |
| B1775 | 0107 | | | | | | | | | | |
| B1777 | 0108 | | | | | | | | | | |
| B20 | 0084 | 1330 | | | | | | | | | |
| B22 | 0085 | 0654 | | | | | | | | | |
| B23 | 0086 | | | | | | | | | | |
| B2400 | 0110 | | | | | | | | | | |
| B26 | 0087 | | | | | | | | | | |
| B27 | 0088 | | | | | | | | | | |
| B3000 | 0111 | | | | | | | | | | |
| B36 | 0089 | | | | | | | | | | |
| B37 | 0090 | | | | | | | | | | |
| B377 | 0099 | 0652 | 0671 | 1306 | 1336 | 1528 | 1632 | | | | |
| B400 | 0100 | | | | | | | | | | |
| B4000 | 0112 | 0162 | 1416 | | | | | | | | |
| B4001 | 1662 | 0617 | 1367 | 1444 | 1517 | | | | | | |
| B42 | 0091 | | | | | | | | | | |

CROSS-REFERENCE TABLE

| | | | | | | | | | | |
|---|---|---|---|---|---|---|---|---|---|---|
| 1224 | 1182 | | | | | | | | | |
| 0092 | | | | | | | | | | |
| 0093 | 1324 | | | | | | | | | |
| 1659 | 0938 | 1612 | | | | | | | | |
| 0113 | 0167 | | | | | | | | | |
| 0094 | | | | | | | | | | |
| 0101 | 1411 | | | | | | | | | |
| 0291 | 0553 | 0633 | 0663 | 0668 | 0771 | 0835 | 0847 | 0868 | 0884 | 0886 |
| 0899 | 0914 | 0943 | 1184 | 1373 | 1375 | 1376 | 1385 | 1477 | 1480 | 1481 |
| 1493 | | | | | | | | | | |
| 0204 | | | | | | | | | | |
| 0198 | 0199 | 0955 | | | | | | | | |
| 0444 | | | | | | | | | | |
| 0857 | 0851 | | | | | | | | | |
| 0853 | 0846 | | | | | | | | | |
| 0849 | 0863 | | | | | | | | | |
| 1658 | 0763 | | | | | | | | | |
| 1765 | 0646 | 0761 | 0845 | 0850 | 0857 | 0862 | 0864 | 0867 | 0877 | 0906 |
| 1658 | | | | | | | | | | |
| 0845 | 0655 | 0696 | | | | | | | | |
| 0388 | 0647 | 1236 | | | | | | | | |
| 0521 | 1786 | 1787 | | | | | | | | |
| 0015 | | | | | | | | | | |
| 0011 | 0114 | | | | | | | | | |
| 0022 | 0100 | | | | | | | | | |
| 1764 | 0645 | 1303 | 1308 | | | | | | | |
| 0219 | 0946 | | | | | | | | | |
| 0491 | | | | | | | | | | |
| 0160 | 0563 | 0628 | 0658 | 0746 | 0828 | 1016 | 1034 | 1143 | 1343 | 1473 |
| 0316 | 0625 | 1090 | 1112 | 1121 | 1146 | 1189 | 1196 | 1241 | 1248 | |
| 0217 | | | | | | | | | | |
| 1070 | 0702 | | | | | | | | | |
| 0436 | | | | | | | | | | |
| 0435 | | | | | | | | | | |
| 0510 | 1788 | | | | | | | | | |
| 0484 | | | | | | | | | | |
| 0331 | | | | | | | | | | |
| 0228 | | | | | | | | | | |
| 0963 | 0928 | 0983 | 1359 | | | | | | | |
| 0497 | | | | | | | | | | |
| 0498 | 0967 | 1209 | | | | | | | | |
| 0037 | 0038 | 0039 | 1388 | 1463 | 1554 | | | | | |
| 1779 | 0674 | 0760 | 1334 | | | | | | | |
| 0330 | | | | | | | | | | |
| 0210 | | | | | | | | | | |
| 0175 | 0937 | | | | | | | | | |
| 0399 | | | | | | | | | | |
| 0463 | 0931 | 1565 | 1598 | | | | | | | |
| 0800 | 0814 | | | | | | | | | |
| 0816 | 0808 | | | | | | | | | |
| 0790 | 0653 | 0672 | 1337 | | | | | | | |
| 0886 | 0895 | | | | | | | | | |
| 1094 | 0698 | | | | | | | | | |
| 1112 | 1097 | 1195 | 1247 | | | | | | | |
| 0043 | | | | | | | | | | |
| 0317 | | | | | | | | | | |
| 0303 | | | | | | | | | | |
| 0080 | | | | | | | | | | |
| 0235 | | | | | | | | | | |
| 0244 | | | | | | | | | | |
| 0249 | | | | | | | | | | |
| 0254 | | | | | | | | | | |
| 0259 | | | | | | | | | | |
| 0264 | | | | | | | | | | |
| 0269 | | | | | | | | | | |
| 0274 | | | | | | | | | | |
| 0279 | | | | | | | | | | |
| 0239 | | | | | | | | | | |
| 0284 | | | | | | | | | | |
| 0215 | | | | | | | | | | |
| 1677 | 0685 | | | | | | | | | |
| 0169 | | | | | | | | | | |
| 0480 | | | | | | | | | | |
| 0218 | | | | | | | | | | |
| 0189 | | | | | | | | | | |
| 0038 | 0807 | 0832 | 0936 | 0944 | 0953 | 1382 | 1541 | | | |
| 0928 | 0549 | | | | | | | | | |
| 0483 | | | | | | | | | | |
| 0923 | 0707 | | | | | | | | | |
| 0481 | | | | | | | | | | |
| 0177 | | | | | | | | | | |
| 1754 | 0515 | 1783 | | | | | | | | |
| 1034 | 1275 | | | | | | | | | |
| 0401 | 0402 | | | | | | | | | |
| 0118 | | | | | | | | | | |
| 0081 | | | | | | | | | | |
| 0222 | | | | | | | | | | |
| 0488 | | | | | | | | | | |
| 0201 | | | | | | | | | | |
| 0367 | | | | | | | | | | |

CROSS-REFERENCE TABLE

| | | | | | | | | | | |
|---|---|---|---|---|---|---|---|---|---|---|
| FIX | 0501 | | | | | | | | | |
| FLGRT | 0073 | 0540 | 1344 | 1401 | 1451 | | | | | |
| FLOAT | 0386 | | | | | | | | | |
| FLTFA | 0193 | | | | | | | | | |
| FLTRA | 0192 | 0598 | | | | | | | | |
| FLTSA | 0195 | | | | | | | | | |
| FN | 0148 | | | | | | | | | |
| FND | 0462 | 1131 | | | | | | | | |
| FND1A | 0224 | | | | | | | | | |
| FNDAA | 0223 | | | | | | | | | |
| FNDPS | 0476 | 1114 | 1124 | | | | | | | |
| FORBS | 0206 | | | | | | | | | |
| FORD | 0862 | 0697 | | | | | | | | |
| FORMA | 0172 | | | | | | | | | |
| FORMF | 0336 | | | | | | | | | |
| FORMS | 0335 | | | | | | | | | |
| FORMT | 0334 | | | | | | | | | |
| FPAGE | 0451 | | | | | | | | | |
| FROMA | 0122 | | | | | | | | | |
| FSCA | 0173 | | | | | | | | | |
| FSCE2 | 0441 | | | | | | | | | |
| FSCE4 | 0446 | | | | | | | | | |
| FTMP1 | 0337 | | | | | | | | | |
| FTMP2 | 0338 | | | | | | | | | |
| FW2 | 0865 | 0765 | | | | | | | | |
| FWAM | 0157 | 1279 | | | | | | | | |
| FWUP | 0296 | 1280 | | | | | | | | |
| FXFLA | 0194 | 0585 | | | | | | | | |
| GETAD | 0461 | | | | | | | | | |
| GETCH | 0471 | | | | | | | | | |
| GETLN | 0527 | 1086 | 1185 | 1237 | | | | | | |
| GETSK | 0475 | | | | | | | | | |
| GFLAG | 0404 | | | | | | | | | |
| GFRST | 0474 | 0929 | 0984 | | | | | | | |
| GNEXT | 0473 | 1179 | | | | | | | | |
| GPARM | 0424 | | | | | | | | | |
| GSIGN | 0486 | | | | | | | | | |
| GTCON | 0500 | | | | | | | | | |
| GTMP | 0472 | 0831 | 0889 | 0904 | | | | | | |
| GTOPP | 0466 | | | | | | | | | |
| GTSTA | 0213 | | | | | | | | | |
| HFLG1 | 0321 | | | | | | | | | |
| HSTPT | 0302 | | | | | | | | | |
| I | 0067 | | | | | | | | | |
| ICNT | 0422 | 0924 | 0979 | 1207 | 1355 | | | | | |
| ID | 0508 | 0534 | 1027 | 1027 | 1029 | 1045 | 1045 | 1047 | 1047 | 1065 |
| | 1065 | 1340 | 1340 | 1350 | 1350 | 1433 | 1669 | 1677 | 1677 | 1697 |
| | 1697 | | | | | | | | | |
| | 1714 | 1714 | 1757 | 1757 | | | | | | |
| IMPY | 0487 | | | | | | | | | |
| INDL | 0877 | 0703 | | | | | | | | |
| INF | 0077 | | | | | | | | | |
| INITS | 0456 | | | | | | | | | |
| INREA | 0226 | | | | | | | | | |
| INS1 | 0903 | 0912 | | | | | | | | |
| INS2 | 0914 | 0887 | 0907 | | | | | | | |
| INSR | 0899 | 0880 | | | | | | | | |
| INT2 | 1516 | 1469 | 1479 | 1502 | 1522 | 1547 | 1560 | 1574 | 1577 | 1582 |
| | 1595 | | | | | | | | | |
| | 1606 | 1636 | | | | | | | | |
| INTAD | 1432 | 0609 | | | | | | | | |
| INTCK | 0459 | 0934 | | | | | | | | |
| INTFA | 0178 | | | | | | | | | |
| INTFL | 0340 | | | | | | | | | |
| INTFL | 0075 | | | | | | | | | |
| INTGR | 0402 | 1567 | 1600 | 1602 | 1605 | 1608 | | | | |
| INTSA | 1433 | 0611 | | | | | | | | |
| IOBUF | 0359 | 1549 | 1549 | | | | | | | |
| IOEND | 1549 | 1501 | | | | | | | | |
| IOHFA | 0229 | | | | | | | | | |
| IOST | 1546 | 1368 | 1655 | | | | | | | |
| IOSTA | 0225 | 0797 | | | | | | | | |
| KEY1 | 1280 | 1287 | | | | | | | | |
| KEYFG | 0324 | 1529 | 1633 | | | | | | | |
| KEYIN | 0526 | 0651 | 0670 | 1335 | | | | | | |
| KEYPR | 1267 | 0715 | | | | | | | | |
| L2T1 | 0347 | 1414 | 1425 | | | | | | | |
| L2T2 | 0348 | | | | | | | | | |
| LASTN | 0398 | 1130 | | | | | | | | |
| LBOP | 0119 | | | | | | | | | |
| LDEF | 0489 | | | | | | | | | |
| LEFF | 1759 | | | | | | | | | |
| LEFT | 0771 | 0700 | | | | | | | | |
| LFTCK | 0464 | | | | | | | | | |
| LIMIT | 0465 | | | | | | | | | |
| LISTA | 0167 | | | | | | | | | |
| LISTS | 0528 | 1155 | | | | | | | | |
| LNED | 0072 | 0816 | | | | | | | | |
| LNINC | 0315 | 0624 | 0629 | 0659 | 1107 | | | | | |
| LNOUT | 1143 | | | | | | | | | |
| LNUM | 0457 | 1214 | | | | | | | | |
| LOCL1 | 0345 | 1293 | 1300 | | | | | | | |

CROSS-REFERENCE TABLE

| | | | | | | | | | | | |
|---|---|---|---|---|---|---|---|---|---|---|---|
| LOCL2 | 0346 | | | | | | | | | | |
| LOUT | 1226 | 1202 | | | | | | | | | |
| LPCK | 0437 | | | | | | | | | | |
| LPCKE | 0438 | | | | | | | | | | |
| LPOP | 0120 | | | | | | | | | | |
| LROMA | 0123 | | | | | | | | | | |
| LSTAK | 0299 | | | | | | | | | | |
| LSTPT | 0301 | | | | | | | | | | |
| LTR | 0479 | | | | | | | | | | |
| LWAM | 0295 | | | | | | | | | | |
| M1 | 0124 | 0544 | 0554 | 0680 | 0902 | 1089 | 1188 | 1233 | 1240 | 1572 | 1576 |
| | 1624 | | | | | | | | | | |
| M10 | 0131 | 0710 | 1413 | | | | | | | | |
| M100 | 0144 | | | | | | | | | | |
| M1024 | 0146 | | | | | | | | | | |
| M11 | 0132 | | | | | | | | | | |
| M12 | 0133 | | | | | | | | | | |
| M13 | 0134 | | | | | | | | | | |
| M14 | 0135 | | | | | | | | | | |
| M15 | 0136 | | | | | | | | | | |
| M159R | 0570 | 0583 | | | | | | | | | |
| M2 | 0125 | 1570 | 1578 | 1626 | | | | | | | |
| M22 | 1661 | 0717 | | | | | | | | | |
| M23 | 0137 | | | | | | | | | | |
| M25 | 0138 | | | | | | | | | | |
| M256 | 0145 | 1313 | 1487 | 1510 | 1540 | 1590 | | | | | |
| M3 | 0126 | 0579 | 0911 | 1164 | | | | | | | |
| M32 | 0139 | 0733 | 0772 | 0836 | 1465 | 1494 | 1556 | | | | |
| M36 | 0140 | | | | | | | | | | |
| M4 | 0127 | | | | | | | | | | |
| M48 | 0141 | | | | | | | | | | |
| M5 | 0128 | 1302 | | | | | | | | | |
| M6 | 0129 | | | | | | | | | | |
| M64 | 0142 | 0719 | 1467 | 1558 | | | | | | | |
| M8 | 1662 | 1436 | | | | | | | | | |
| M80 | 0143 | | | | | | | | | | |
| M9 | 0130 | | | | | | | | | | |
| MAINS | 1012 | 0932 | 0989 | 0995 | 0996 | 0997 | 0999 | 1000 | 1001 | 1002 | 1003 |
| | 1004 | 1005 | | | | | | | | | |
| MASK1 | 0153 | | | | | | | | | | |
| MASK5 | 0154 | | | | | | | | | | |
| MAW | 0294 | | | | | | | | | | |
| MAXIN | 0400 | | | | | | | | | | |
| MAXSN | 0147 | | | | | | | | | | |
| MBIN1 | 0406 | | | | | | | | | | |
| MBIN2 | 0407 | | | | | | | | | | |
| MBOX1 | 0351 | | | | | | | | | | |
| MCOUT | 0529 | 0750 | | | | | | | | | |
| MDIMA | 0208 | | | | | | | | | | |
| MDR1 | 1375 | 1386 | | | | | | | | | |
| MDR2 | 1415 | 1426 | | | | | | | | | |
| MDR3 | 1388 | 1383 | | | | | | | | | |
| MDRS | 1398 | 1384 | 1389 | 1391 | | | | | | | |
| MDRVR | 1366 | 1220 | 1360 | | | | | | | | |
| MDS1 | 1572 | 1566 | | | | | | | | | |
| MDS2 | 1576 | 1563 | | | | | | | | | |
| MDS3 | 1597 | 1579 | | | | | | | | | |
| MDS4 | 1608 | 1599 | | | | | | | | | |
| MDS5 | 1622 | 1555 | | | | | | | | | |
| MDS6 | 1634 | 1623 | 1625 | 1627 | | | | | | | |
| MDSS | 1554 | 1461 | | | | | | | | | |
| MDST | 1582 | 1620 | | | | | | | | | |
| MDU1 | 1443 | 1455 | | | | | | | | | |
| MDU2 | 1500 | | | | | | | | | | |
| MERR | 0445 | | | | | | | | | | |
| MEV | 1045 | 1039 | | | | | | | | | |
| MINIT | 0455 | | | | | | | | | | |
| MOD | 1047 | 1041 | | | | | | | | | |
| MODE | [illegible] | 0541 | 1210 | | | | | | | | |
| MOF | 1229 | 1223 | | | | | | | | | |
| MON | 1227 | 1221 | | | | | | | | | |
| MSFLG | 0389 | | | | | | | | | | |
| MSSG1 | 1342 | 0637 | | | | | | | | | |
| MTIR | 0952 | 0562 | 0923 | 0978 | 1219 | 1253 | 1354 | | | | |
| MULTN | 1716 | 0748 | 0546 | | | | | | | | |
| MULTP | 1697 | 0741 | | | | | | | | | |
| MVTOH | 0477 | 0959 | | | | | | | | | |
| NDISP | 0382 | | | | | | | | | | |
| NDWRT | 0496 | 0966 | 1208 | | | | | | | | |
| NEXT1 | 0452 | | | | | | | | | | |
| NEXTA | 0467 | | | | | | | | | | |
| NEXTI | 0449 | | | | | | | | | | |
| NMOTA | [illegible] | | | | | | | | | | |
| NOEOF | 1482 | | | | | | | | | | |
| NPRTN | 0391 | | | | | | | | | | |
| NPWPT | 0495 | 0639 | 1062 | 1174 | | | | | | | |
| NUM | 0396 | 0397 | 0589 | | | | | | | | |
| NUMCA | 0211 | | | | | | | | | | |
| NUMOA | 0212 | | | | | | | | | | |
| NXTOT | 0234 | | | | | | | | | | |

CROSS-REFERENCE TABLE

| | | | | | | | | | | | |
|---|---|---|---|---|---|---|---|---|---|---|---|
| NXTST | [illegible] | | | | | | | | | | |
| [illegible] | [illegible] | | | | | | | | | | |
| [illegible] | [illegible] | | | | | | | | | | |
| [illegible] | [illegible] | | | | | | | | | | |
| [illegible] | [illegible] | [illegible] | [illegible] | Ø954 | | | | | | | |
| [illegible] | [illegible] | | | | | | | | | | |
| [illegible] | [illegible] | [illegible] | 1152 | 1615 | | | | | | | |
| [illegible] | [illegible] | | | | | | | | | | |
| [illegible] | [illegible] | [illegible] | | | | | | | | | |
| [illegible] | [illegible] | | | | | | | | | | |
| [illegible] | [illegible] | [illegible] | | | | | | | | | |
| [illegible] | [illegible] | [illegible] | [illegible] | [illegible] | Ø784 | Ø838 | Ø84Ø | Ø855 | Ø856 | Ø865 | Ø87Ø |
| | [illegible] | [illegible] | | | | | | | | | |
| [illegible] | [illegible] | [illegible] | [illegible] | [illegible] | Ø917 | | | | | | |
| [illegible] | [illegible] | [illegible] | [illegible] | 1159 | | | | | | | |
| [illegible] | [illegible] | | | | | | | | | | |
| [illegible] | [illegible] | [illegible] | | | | | | | | | |
| [illegible] | [illegible] | | | | | | | | | | |
| [illegible] | [illegible] | | | | | | | | | | |
| [illegible] | [illegible] | | | | | | | | | | |
| [illegible] | [illegible] | [illegible] | [illegible] | 1192 | 1244 | | | | | | |
| [illegible] | [illegible] | [illegible] | [illegible] | 1127 | 1191 | 1243 | | | | | |
| [illegible] | [illegible] | | | | | | | | | | |
| [illegible] | [illegible] | [illegible] | [illegible] | | | | | | | | |
| [illegible] | [illegible] | | | | | | | | | | |
| PFLAG | Ø391 | | | | | | | | | | |
| PGINØ | 3479 | | | | | | | | | | |
| PGINT | Ø458 | | | | | | | | | | |
| PI/2 | Ø944 | | | | | | | | | | |
| PLACE | Ø384 | | | | | | | | | | |
| PMODE | Ø329 | Ø963 | 1Ø17 | 1Ø2Ø | | | | | | | |
| PPFF | Ø366 | | | | | | | | | | |
| PRADD | Ø339 | | | | | | | | | | |
| PREFD | Ø525 | Ø547 | | | | | | | | | |
| PRFLG | Ø332 | | | | | | | | | | |
| PRST | 1342 | 1273 | | | | | | | | | |
| QTCHA | Ø233 | | | | | | | | | | |
| QTOP | Ø199 | Ø161 | 1Ø79 | | | | | | | | |
| R1Ø | Ø638 | Ø566 | 1Ø25 | 1Ø43 | 1348 | | | | | | |
| R13 | Ø732 | Ø718 | | | | | | | | | |
| R16 | Ø709 | Ø688 | | | | | | | | | |
| R17 | Ø641 | Ø557 | Ø634 | Ø798 | Ø821 | 11Ø8 | | | | | |
| R26 | Ø477 | 1138 | | | | | | | | | |
| R36 | Ø673 | Ø665 | | | | | | | | | |
| R46 | Ø674 | 1311 | 1319 | 1322 | | | | | | | |
| RBOP | Ø117 | | | | | | | | | | |
| RBUFF | Ø36Ø | | | | | | | | | | |
| RCOUT | Ø333 | | | | | | | | | | |
| RDD | Ø74Ø | Ø732 | | | | | | | | | |
| RDYDA | Ø166 | 1Ø81 | | | | | | | | | |
| RFØ | Ø627 | Ø736 | 1193 | 1228 | 1262 | | | | | | |
| RF1 | Ø628 | Ø556 | Ø669 | Ø926 | Ø93Ø | Ø981 | 1Ø96 | 11Ø4 | 1357 | 1361 | |
| RF1A | Ø534 | Ø684 | | | | | | | | | |
| RF2 | Ø717 | Ø711 | | | | | | | | | |
| RF3 | Ø729 | Ø72Ø | Ø724 | | | | | | | | |
| RF5 | Ø753 | Ø727 | Ø738 | 1Ø57 | | | | | | | |
| RF6 | Ø667 | Ø751 | Ø777 | Ø743 | Ø785 | Ø833 | Ø849 | Ø854 | Ø858 | Ø869 | Ø871 |
| | Ø876 | Ø941 | Ø918 | 1Ø63 | | | | | | | |
| RF9 | Ø767 | Ø762 | | | | | | | | | |
| RFC1 | Ø931 | Ø841 | | | | | | | | | |
| RFCL | Ø929 | Ø695 | | | | | | | | | |
| RFFD | Ø161 | | | | | | | | | | |
| RFFDL | Ø339 | Ø975 | 1Ø8Ø | | | | | | | | |
| RFS | Ø417 | | | | | | | | | | |
| RFSB1 | Ø453 | | | | | | | | | | |
| RFSBP | Ø454 | | | | | | | | | | |
| RFSM | 1265 | 1Ø6Ø | | | | | | | | | |
| REST | 1353 | Ø7Ø5 | | | | | | | | | |
| RET2 | Ø421 | | | | | | | | | | |
| RETN2 | Ø42Ø | 1Ø11 | 1258 | 1656 | | | | | | | |
| RETN3 | Ø419 | | | | | | | | | | |
| RITE | Ø791 | Ø741 | | | | | | | | | |
| RPCK | Ø439 | | | | | | | | | | |
| RPCKF | Ø442 | | | | | | | | | | |
| RPOP | Ø115 | | | | | | | | | | |
| RSAVE | Ø292 | | | | | | | | | | |
| RSLTE | Ø373 | | | | | | | | | | |
| RSPTR | Ø418 | | | | | | | | | | |
| RSTAK | Ø416 | | | | | | | | | | |
| RSTKA | Ø158 | | | | | | | | | | |
| RSULT | Ø426 | | | | | | | | | | |
| RUNA | Ø163 | 1Ø71 | | | | | | | | | |
| S | ØØ82 | | | | | | | | | | |
| SALTA | Ø2Ø7 | | | | | | | | | | |
| SAVBP | Ø452 | | | | | | | | | | |
| SAVEA | Ø325 | 1523 | | | | | | | | | |
| SAVEB | Ø326 | 1524 | | | | | | | | | |
| SBADR | Ø394 | | | | | | | | | | |
| SBPTR | Ø387 | Ø939 | Ø94Ø | Ø942 | 1569 | 161Ø | 1611 | 1613 | 1614 | 1616 | 1631 |
| SBPUD | Ø431 | | | | | | | | | | |

CROSS-REFERENCE TABLE

| | | | | | | | | | | | |
|---|---|---|---|---|---|---|---|---|---|---|---|
| SBUFA | 0199 | 1568 | | | | | | | | | |
| SCRN | 1529 | 1464 | | | | | | | | | |
| SEC | 0322 | | | | | | | | | | |
| SETAC | 1333 | 1271 | | | | | | | | | |
| SETAS | 1332 | 1269 | | | | | | | | | |
| SFLAG | 0393 | | | | | | | | | | |
| SGNS | 0493 | | | | | | | | | | |
| SHFLG | 1778 | 0676 | 0754 | 0758 | 1331 | | | | | | |
| SIGN | 0399 | 0490 | | | | | | | | | |
| SLCOD | 0328 | 0809 | 0817 | 1204 | 1216 | 1227 | | | | | |
| SLEND | 0202 | 0641 | 0900 | 1478 | 1581 | | | | | | |
| SLWST | 0447 | | | | | | | | | | |
| SNFLA | 0197 | | | | | | | | | | |
| SPLFA | 0196 | | | | | | | | | | |
| SS3PT | 0395 | | | | | | | | | | |
| SSYMA | 0170 | | | | | | | | | | |
| ST | 0377 | | | | | | | | | | |
| START | 0162 | 0487 | | | | | | | | | |
| STEXP | 0443 | | | | | | | | | | |
| STMS | 1353 | 1346 | | | | | | | | | |
| STOR1 | 0429 | | | | | | | | | | |
| STORE | 0427 | | | | | | | | | | |
| STPFL | 0323 | 0644 | 1240 | 1645 | | | | | | | |
| STPOP | 0433 | | | | | | | | | | |
| STSRH | 0442 | | | | | | | | | | |
| SUMPA | 0227 | | | | | | | | | | |
| SYE12 | 0435 | | | | | | | | | | |
| SYE25 | 0460 | | | | | | | | | | |
| SYMC1 | 0433 | | | | | | | | | | |
| SYMC2 | 0432 | | | | | | | | | | |
| SYMCK | 0434 | | | | | | | | | | |
| SYMTP | 0208 | | | | | | | | | | |
| SYSNT | 0519 | 1789 | | | | | | | | | |
| SYTSA | 0209 | | | | | | | | | | |
| T1 | 1767 | 0575 | 0607 | 0618 | 1075 | 1203 | 1366 | 1415 | 1443 | 1516 | 1666 |
| T2 | 1768 | 0631 | 1410 | 1423 | 1439 | 1452 | | | | | |
| T3 | 1769 | 0615 | 1035 | 1038 | 1399 | | | | | | |
| T4 | 1770 | 0592 | 0638 | 0686 | 0742 | 0749 | 0987 | 1061 | | | |
| T5 | 1771 | 0594 | 0603 | 0610 | 0626 | 0790 | 1345 | 1459 | | | |
| T6 | 1772 | 1133 | 1190 | 1198 | 1242 | 1250 | | | | | |
| T7 | 1773 | 0648 | 1471 | 1475 | 1500 | 1503 | 1504 | 1531 | 1546 | 1562 | 1573 |
| | 1582 | 1583 | 1584 | 1619 | 1622 | 1628 | 1635 | | | | |
| T8 | 1774 | 0649 | 1157 | 1212 | | | | | | | |
| T9 | 1775 | 0656 | 0664 | 0683 | 0714 | 0726 | 0729 | 0737 | 0740 | 0745 | 0747 |
| | 0753 | 0757 | 1056 | 1135 | 1144 | 1145 | 1148 | 1160 | 1161 | 1162 | 1171 |
| | 1267 | 1284 | 1398 | 1404 | 1409 | 1420 | 1422 | | | | |
| TCON | 1669 | 0595 | | | | | | | | | |
| TEMP | 0352 | 0351 | | | | | | | | | |
| TEMP1 | 0352 | | | | | | | | | | |
| TEMP2 | 0353 | | | | | | | | | | |
| TEMP3 | 0354 | 0956 | | | | | | | | | |
| TEMP4 | 0355 | 0957 | | | | | | | | | |
| TEMPS | 0349 | 0681 | 0709 | 0879 | 1053 | 1136 | 1154 | 1764 | | | |
| TERM | 0364 | | | | | | | | | | |
| TERR1 | 0581 | | | | | | | | | | |
| TE1 | 1777 | 1668 | 1778 | 1779 | | | | | | | |
| TE1A | 1668 | 0597 | 0596 | | | | | | | | |
| TFLAG | 0318 | 0543 | 1234 | 1261 | | | | | | | |
| TFLG1 | 0322 | | | | | | | | | | |
| TMP | 1763 | 0795 | 0800 | 0801 | 0813 | 0830 | 0885 | 0888 | 0890 | 0891 | 0894 |
| | 0903 | 0905 | 0910 | 1294 | | | | | | | |
| TMPA | 0203 | 0892 | 0908 | 0916 | | | | | | | |
| TMPOP | 0184 | | | | | | | | | | |
| TREGF | 0372 | | | | | | | | | | |
| TSRHA | 0168 | 0697 | 0731 | 0743 | 0989 | | | | | | |
| TSTPT | 0305 | | | | | | | | | | |
| TTY | 0499 | | | | | | | | | | |
| TYPFL | 0378 | | | | | | | | | | |
| U3 | 1132 | 1115 | 1125 | | | | | | | | |
| U5 | 1135 | 1116 | 1117 | 1128 | | | | | | | |
| UFLAG | 0392 | | | | | | | | | | |
| UKPTR | 0309 | | | | | | | | | | |
| UNITS | 0315 | | | | | | | | | | |
| UNSTK | 0448 | | | | | | | | | | |
| UPARA | 0191 | | | | | | | | | | |
| UPR1 | 1136 | 1098 | | | | | | | | | |
| UPRW | 1102 | 0699 | | | | | | | | | |
| UPRWS | 1121 | 1105 | | | | | | | | | |
| VALUF | 0297 | | | | | | | | | | |
| VALUP | 0524 | 0730 | | | | | | | | | |
| VAROA | 0214 | | | | | | | | | | |
| WBUFF | 0423 | | | | | | | | | | |
| WHAM | 1757 | 0565 | | | | | | | | | |
| WHAT | 0562 | 0694 | 0744 | 1281 | 1292 | 1297 | | | | | |
| WIDTH | 0395 | 1765 | | | | | | | | | |
| WRITE | 0159 | | | | | | | | | | |
| XC | 0412 | 1763 | | | | | | | | | |
| XCOM1 | 1247 | 0545 | | | | | | | | | |
| XCOM2 | 1260 | 1245 | 1251 | | | | | | | | |
| XCOMP | 1233 | 1088 | | | | | | | | | |

CROSS-REFERENCE TABLE

```
C4A   1164
C6A   2221
XIT   1175   1446
AR1   0425
AR2   0429
ECH   1266   1998
TS1   1195   1217
TS2   1195   1213   1221
TS3   1212   1181
TS4   1214   1183
TS5   1219   1225
TST   1179   1004   1213
ATT   1254   1277
SCPA  0220
FOM   0572   0598
      0414
AP    0152
DNK   0402
```

#01 EXTENDED I/O BLOCK'S CONSTANTS, SYNTAX, AND LINKAGES

```
508                              LST
509*    BASE PAGE EQUATES AND TEMPORARIES
510*
511  01641                       ORG 1641B
512*
513  01641 000000 T5     BSS 1
514  01642 000000 T8     BSS 1
515  01643 000000 TREND BSS 1
516  01644 000000 T1     BSS 1
517  01645 000000        BSS 1
518  01645         PTR1  EQU 1645B
519  01646 000000 RLFLG BSS 1
520  01647 000000 TW     BSS 1
521  01647         TMPRE EQU 1647B
522  01650 000000 TX     BSS 1
523  01651 000000 TD     BSS 1
524  01652 000000 MF     BSS 1
525  01653 000000 SD     BSS 1
526  01654 000000 DP     BSS 1
527  01654         TNULL EQU 1654B
528  01655 000000 EX     BSS 1
529  01656 000000 T2     BSS 1
530  01657 000000 T3     BSS 1
531  01660 000000 T6     BSS 1
532  01661 000000 T7     BSS 1
533  01662 000000 T9     BSS 1
534  01663 000000 .FLP   BSS 1
535*
536  01665                ORG 1665B
537  01665 000000 FLOOP BSS 1
538*
539*    LOCAL TEMPORARIES FOR IMLIED "FOR" LOOP IS AS FOLLOWS:
540*
541*    WORD 1 ADDRESS OF VARIABLE
542*    WORD 2 NAME OF VARIABLE
543*    WORD 3 FINAL VALUE (INTEGER FORM)
544*    WORD 4 STEP SIZE          "         "
545*    WORD 5 ADDRESS OF 1ST WORD AFTER FOR STMT.
546*
547  01666 000000 .FLOP BSS 5          FIRST LOOP BLOCK
548  01673 000000       BSS 5           SECOND LOOP BLOCK
549*
550  01700 000000 .BADR BSS 1
551  00051        ASC.  EQU .46
552  00047        ASCP  EQU .43
553  00050        ASCM  EQU .45
554  01712        .SIGN EQU 1712B
555  00074        .18   EQU -22
557  22000              ORG 22000B
558*
559* FORMATTED I/O BLOCK
560*
561  12001        QUOTE EQU 12001B
562  12007        ASSOP EQU QUOTE+6
563*
564*
565  22000 000213 IO    ABS SOUT-*     OUTPUT SYNTAX
566  22001 000117       ABS SGET-*
567  22002 000270       ABS CMDS-*
568  22003 000000       BSS 1
569*
570  22004 041515 SYSNT ASC 1,CMD
571  22005 042242       OCT 42242      D: OPCODE 2
572  22006 042516       ASC 2,ENTER
     22007 052105
573  22010 051243       OCT 51243      R: OP CODE 3
574  22011 047525       ASC 3,OUTPUT
     22012 052120
```

```
   22013 052524
   22014 162377 NULL  OCT 162377    OP CODE 4: NULL
*
*
   22015 043117 NFOPT OCT 043117      FO      NON-FORMULA OPERATOR TABLE
   22016 051220       OCT 051220      R (16)
   22017 052117       OCT 052117      TO
   22020 110523       OCT 110523        (17) S
   22021 052105       OCT 052105       TE
   22022 050322       OCT 50322     P (19)
*
*
   22023 000331       ABS EIAND-*
   22024 000324       ABS EIOR-*
   22025 000313       ABS EROT-*
   22026 000441       ABS STAT-*
   22027 000452       ABS CHAR-*
   22030 000500       ABS BIN-*
   22031 000457       ABS LIN-*
   22032 000472       ABS SPA-*
   22033 000410       ABS EOCT-*
*
   22034 001661 FLOP  DEF .FLOP-5
   22035 150000 .SC13 OCT 150000
   22036 177770 MB    DEC -8
   22037 154000 SC13  OCT 154000   SELECT CODE 13 FOR ASCII BUSS
   22040 001652 AMF   DEF MF
   22041 000137 AROW  OCT 137        LEFT ARROW
   22042 000176 ALTM  OCT 176        ALT MODE
   22043 000033 ESCM  OCT 33         ESC MODE
   22044 000105 ASCE  OCT 105        E
   22045 031166 B3116 OCT 31166
   22046 000120 .80   DEC 80
   22047 002001 B2001 OCT 2001
   22050 100700 STEC  OCT -77100
   22051 012025 FMTOP OCT 12025
   22052 000021 .17   DEC 17
   22053 007777 BIT12 OCT 7777
   22054 000032 NFOPA DEF NFOPT+NFOPT-ID-ID
*
*
   22055 047503 FUNNT ASC 1,OCT
   22056 052222       OCT 52222        T:22
   22057 051520       ASC 1,SPA
   22060 040623       OCT 40623        A:23
   22061 046111       ASC 1,LIN
   22062 047224       OCT 47224        N:24
   22063 041111       ASC 1,BIN
   22064 047225       OCT 47225        N:25
   22065 041510       ASC 2,CHAR
   22066 040522
   22067 113123       OCT 113123       26:STAT
   22070 052101       ASC 1,TAT
   22071 052227       OCT 52227        T:27
   22072 051117       ASC 1,ROT
   22073 052230       OCT 52230        T:30
   22074 044516       ASC 2,INOR
   22075 047522
   22076 114502       OCT 114502       31:BIAND
   22077 044501       ASC 2,IAND
   22100 047104
   22101 155000       OCT 155000       32: NULL
*
*
*  MORE ABSOLUTE LINKS TO THE BASIC SYSTEM
*
   22102 004304 RITE  DEF 4304B
   22103 007474 MOUTA DEF 7474B
   22104 006656 PRINN DEF 6656B
   22105 007366 SFMT  DEF 7366B
   22106 007303 TYPEC DEF 7303B
   22107 007240 QTCHK DEF 7240B
   22110 006773 PFORM DEF 6773B
   22111 007007 PRCHK DEF 7007B
   22112 007227 CKEOL DEF 7227B
   22113 011444 OPCH1 DEF 11444B
   22114 007356 FSPR  DEF 7356B
   22115 012233 VAR01 DEF 12233B     ADDRESS OF VAROP+2
   22116 016504 IOHED DEF 16504B
   22117 007402 PLOTE  DEF 7402B
*
* GET STATEMENT SYNTAX
*
   22120 070742 SGET   SAR 16
   22121 031656        STA T2           CLEAR NEST COUNTER
   22122 021717        LDA NUM
   22123 050065        AND OPMSK
   22124 070744        SAL 1
   22125 031642        STA T8           SAVE PAGE INFO
   22126 062247        JSM STBLK
```

```
*
 22127 062434        JSM IOHD        GET (S.C.,FMT#
*
 22130 060513 SGP1   JSM LPCK         LOOK FOR LEFT BRACKET
 22131 066171        JMP SGP4         NOT FOUND
 22132 061055        JSM GNEXT
 22133 045706        ISZ SBPTR
 22134 062422        JSM NFOP         LOOK FOR "FOR"
 22135 164307        JMP E15+1,I      NOT FOUND
 22136 010033        CPA .16          FOR?
 22137 066141        JMP *+2          YES
 22140 164307        JMP E15+1,I      NO, ERROR
 22141 045656        ISZ T2           INCREMENT NEST COUNTER
 22142 160246        JSM VAROA,I      GO LOOK FOR A VARIABLE
 22143 164321        JMP E25+1,I      NONE FOUND, ERROR
 22144 164321        JMP E25+1,I      SUBSCRIPT, ERROR
 22145 060463        JSM SYMCI        FOUND ONE, LOOK FOR "="
 22146 012006        DEF ASSOP-1
 22147 164324        JMP E25+4,I
 22150 160202        JSM FSCA,I       GO LOOK FOR A FORMULA
 22151 062422        JSM NFOP         LOOK FOR "TO"
 22152 164322        JMP E25+2,I      NOT FOUND, ERROR
 22153 012052        CPA .17          TO?
 22154 066156        JMP *+2          YES
 22155 164322        JMP E25+2,I      NO, ERROR
 22156 160202        JSM FSCA,I       GO LOOK FOR A FORMULA
 22157 062422        JSM NFOP         LOOK FOR "STEP"
 22160 066165        JMP SGP2         NOT FOUND
 22161 010074        CPA .18          STEP?
 22162 066164        JMP *+2          YES
 22163 164323        JMP E25+3,I      NO, ERROR
 22164 160202        JSM FSCA,I       GO LOOK FOR A FORMULA
 22165 060510 SGP2   JSM COMCF        DEMAND A COMMA
 22166 061055 SGP3   JSM GNEXT
 22167 045706        ISZ SBPTR
 22170 066130        JMP SGP1
*
 22171 055400 SGP4   DSZ BADDR
 22172 055706        DSZ SBPTR
 22173 062233        JSM SVARA      LOOK FOR A VARIABLE (STRING ALLOWED)
 22174 010031 BACK   CPA EOL          END-OF-STATEMENT?
 22175 066201        JMP NESC         YES
 22176 060504        JSM COMCK        LOOK FOR A COMMA
 22177 066205        JMP SGP5         NOT FOUND
 22200 066166        JMP SGP3
*
 22201 021656 NESC   LDA T2           CHECK NEST COUNTER
 22202 072110        RZA *+2
 22203 164203        JMP ACTSA,I      STATEMENT IS OK
 22204 164301        JMP E10,I
*
 22205 060534 SGP5   JSM RPCKE        DEMAND A RIGHT BRACKET
 22206 055656        DSZ T2           DECREMENT NEST COUNTER
 22207 066210        JMP *+1          ALLOW FOR SKIP
 22210 025656        LDB T2
 22211 075153        SBP BACK
 22212 164302        JMP E10+1,I
*
*    OUTPUT STMT SYNTAX
*
 22213 062247 SOUT   JSM STBLK
 22214 072150        RZA *+3
 22215 062434        JSM IOHD       STRING BLOCK NOT IN DO STRANDARD SYNTAX
 22216 166102        JMP RITE,I
 22217 045706        ISZ SBPTR
 22220 060520        JSM LPCKE-1    STRING BLOCK IN, TRY INTERNAL CONVERSION
 22221 161641        JSM T5,I       LOOK FOR STRING VARIABLE
 22222 066230        JMP SOUT2      P+1
 22223 066227        JMP SOUT1      P+2
 22224 162116 SOUT3  JSM IOHED,I    P+3, STRING ARRAY NAME FOUND
 22225 062435        JSM IOHD+1
 22226 166102        JMP RITE,I
*
 22227 154110 SOUT1  DSZ BADRP,I
 22230 154110 SOUT2  DSZ BADRP,I
 22231 160202        JSM FSCA,I   CHECK SELECT CODE
 22232 066224        JMP SOUT3
*
*    CHECK SYNTAX ON NUMERIC OR STRING VARIABLES
*
 22233 025641 SVARA  LDB T5
 22234 076250        RZB RECO2      IS STRING BLOCK IN?
 22235 160246        JSM VAROA,I    NO, ERROR IF ANY STRINGS
 22236 164307        JMP E15+1,I    P+1, NO LETTER FOUND
 22237 170402        RET            P+2, ARRAY VARIABLE FOUND AND STORED
 22240 170402        RET            P+3, SIMPLE    "      "     "     "
*
 22241 161641 RECO2  JSM T5,I       YES, TRY STRING BLOCK FIRST
 22242 164307        JMP E15+1,I    P+1, NO LETTER FOUND
 22243 162115        JSM VAR01,I    P+2; MUST BE NUMERIC OR ARRAY VARIABLE
```

```
22244 170402        RET           P+3, STRING VARIABLE FOUND AND STORED
22245 170402        RET
22246 170402        RET
*
*   LOOK FOR THE STRING BLOCK ANS SAVE IT'S ADDRESS
*
22247 020121 STBLK  LDA B4000
22250 024130        LDB FROMA
22251 074457        CPA B,I
22252 066264        JMP FPAG2
22253 014131        CPB LROMA
22254 066257        JMP FPAG1
22255 004116        ADB QTOP
22256 066251        JMP *-5
22257 025403 FPAG1  LDB MAW
22260 111403        CPA MAW,I
22261 066264        JMP FPAG2
22262 074742        SBR 16
22263 066267        JMP *+4
22264 074442 FPAG2  SBR 10
22265 074304        SBL 10
22266 074070        SIB *+1
22267 035641        STB T5
22270 074117        LDA B
22271 170402        RET
22345 070006        RAR 1
22346 077770        RIB *-1       LOOP , ROTATING (A) ONE BIT UNTIL DONE
22347 066357        JMP ESTO      EXIT LOOP
*
22350 062361 EIOR   JSM SCHK
22351 021644        LDA T1        T1 IOR T2
22352 041656        IOR T2
22353 066357        JMP ESTO
*
22354 062361 EIAND  JSM SCHK
22355 021644 EAND   LDA T1          T1 AND T2
22356 051656        AND T2
22357 070137 ESTO   LDB A
22360 164227        JMP FXFLA,I
*
22361 021416 SCHK   LDA MODE
22362 070552        SAM .SCHK     SKIP IF SYNTAX PHASE
*
22363 061217        JSM FETCH
22364 160225        JSM FLTRA,I
22365 024062        LDB FLGRT     IF OVERFLOW USE 100000 OCTAL
22366 035644        STB T1
22367 061217        JSM FETCH
22370 160225        JSM FLTRA,I
22371 164273        JMP E5-1,I
22372 035656        STB T2
22373 045472        ISZ TEMPS
22374 170402        RET
*
*   CHECK SYNTAX OF FUNCTIONS
*
22375 055777 .SCHK  DSZ RSPTR
22376 121472        LDA TEMPS,I
22377 031641        STA ST+1    SAVE LEFT BRACKET COUNT
22400 061055        JSM GNEXT
22401 045706        ISZ SBPTR
22402 060521        JSM LPCKE
22403 160202        JSM FSCA,I
22404 060510        JSM COMCE
22405 160202        JSM FSCA,I
22406 025641        LDB ST+1
22407 135472        STB TEMPS,I
22410 060534        JSM RPCKE
22411 064356        JMP RETN3
*
*
* MISCELLANEOUS ROUTINES & ETC.
*
* SUBROUTINE TO RECORD CODE-CONVERSION TABLE
*
22412 060510 RTBL   JSM COMCE       DEMAND COMMA
22413 061140        JSM LTR         LETTER?
22414 164307        JMP E15+1,I     NO, ERROR
22415 021474        LDA TEMP1       RECORD ARRAY IDENTIFIER
22416 024020        LDB .3          OF UNKNOWN DIMENSIONS
22417 060451        JSM STROP+1
22420 021475        LDA TEMP2       RETRIEVE FOLLOWING CHARACTER
22421 170402        RET
*
* SUBROUTINE TO FIND A NON-FORMULA OPERATOR
*
22422 026054 NFOP   LDB NFOPA       GET NON-FORMULA OPERATOR TABLE ADDRESS
22423 005642        ADB T8
22424 060546        JSM STEXP       DO TABLE SEARCH
22425 170402        RET             NOT FOUND
```

#01 EXTENDED I/O BLOCK'S CONSTANTS, SYNTAX, AND LINKAGES

```
22426 060456        JSM SBPUD
22427 074742        SBR 16
22430 135706        STB SBPTR,I
22431 070202        SAR 5
22432 050040        AND .31
22433 064357        JMP RETN2
*
* RECORD I/O HEADING
*
22434 160265 IOHD   JSM IOHEA,I    GET (S.C.,*
22435 060524        JSM RPCK       RIGHT PAREN?
22436 066440        JMP *+2        NO
22437 065153        JMP EOLCK      YES, IF EOL RETURN TO BASIC SYSTEM
22440 062412        JSM RTBL       CHECK FOR CONVERSION TABLE
22441 060534        JSM RPCKE      DEMMAND RIGHT BRACKET
22442 065153        JMP EOLCK      CHECK FOR EOL AND RETURN IF NOT
```

#01 FORMATTED INPUT BLOCK EXECUTION

```
*
* EVALUATE OCT EXPRESSION
*
22443 060445 EOCT   JSM XFAR2+1
22444 074742        SBR 16
22445 021754        LDA AR2          GET EXPONENT
22446 070652        SAM *+13          AND TEST IT
22447 000157 EOC1   ADA M256
22450 031466        STA LOCL1
22451 074117        LDA B            CHECK FOR POSSIBLE OVERFLOW
22452 070602        SAR 13
22453 072550        RZA *+11
22454 171400        MLS              GET NEXT DIGIT
22455 074606        RBR 13
22456 070037        ADB A            ADD IN NEW DIGIT
22457 050025        AND .8           TEST FOR LEGAL OCTAL DIGIT
22460 072310        RZA *+6
22461 021466        LDA LOCL1
22462 071253        SAP EOC1
*
22463 070111        SLA *+2          SKIP IF +
22464 074076        TCB
22465 164227        JMP FXFLA,I      DONE
*
22466 164273        JMP E5-1,I       ERROR
*
22467 060445 STAT   JSM XFAR2+1
22470 063461        JSM UNNM+1
22471 040121        IOR B4000
22472 172741        STF 1
22473 172141        OTA 1
22474 172741        STF 1
22475 177241        LIB 1,C
22476 074604        SBL 4
22477 074542        SBR 12
22500 164227        JMP FXFLA,I
*
22501 060445 CHAR   JSM XFAR2+1
22502 063461        JSM UNNM+1
22503 040121        IOR B4000
22504 063447        JSM .CHAR
22505 074073        SBP *+1,C
22506 074302        SBR 7
22507 164227        JMP FXFLA,I
*
22510 062536 LIN    JSM .LIN       OUTPUT X LINE FEEDS AND CARRIAGE RETURNS
22511 076150        RZB *+3
22512 062546        JSM .LIN2
22513 066533        JMP .LIN1       IF ARG =0, GIVE CARRIAGE RETURN
22514 070112        SAM *+2
22515 062546        JSM .LIN2       IF ARG IS NEGATIVE SKIP CARRIAGE RETURN
22516 020061        LDA LNFD
22517 162111        JSM PRCHK,I
22520 061353        JSM TTY
22521 055644        DSZ T1
22522 066516        JMP *-4
22523 066533        JMP .LIN1
*
22524 062536 SPA    JSM .LIN       OUTPUT X SPACES
22525 070312        SAM .LIN1
22526 162103        JSM MOUTA,I
22527 066533        JMP .LIN1
*
22530 062536 BIN    JSM .LIN       OUTPUT THE BINARY CODE FOR X
22531 052053        AND BIT12
22532 061353        JSM TTY
22533 020132 .LIN1  LDA M1
22534 031755        STA AR2+1
22535 170402        RET
```

001 FORMATTED INPUT BLOCK EXECUTION

```
*
22536 060445 .LIN  JSM XFAR2+1
22537 160226       JSM FLTFA,I
22540 164273       JMP E5-1,I
22541 074117       LDA B
22542 074113       SBP *+2
22543 074076       TCB
22544 035644       STB T1
22545 170402       RET
*
22546 020031 .LIN2 LDA CRTN
22547 162111       JSM PRCHK,I
22550 061353       JSM TTY
22551 070742       SAR 16
22552 031622       STA TERM
22553 170402       RET
*
* EXECUTE GET STATEMENT
*
22554 062247 EGET  JSM STBLK      CHECK IF STRING BLOCK IS IN.
22555 045472       ISZ TEMPS
22556 063460       JSM UNNM
22557 040121       IOR B4000
22560 031644       STA T1
22561 022051       LDA FMTOP
22562 031640       STA ST
22563 074742       SBR 16
22564 162117       JSM PLOTF,I
22565 074742       SBR 16         P+1, NOT FOUND- FREE FIELD INPUT
22566 035662       STB T9         P+2, FOUND FORMATTED INPUT
*
22567 063471       JSM .CTBL      CHECK FOR CONVERSION TABLE
*
22570 022034       LDA FLOP
22571 031665       STA FLOOP      INITIALIZE FOR LOOP POINTER
*
22572 063073       JSM RREC         READ AN INPUT RECORD
22573 025662       LDB T9
22574 076510       RZB EGE1
*
*    FREE FIELD INPUT
*
22575 062723       JSM NADD       GET THE VARIABLE
22576 061156 .EGE1 JSM CONST      FETCH A NUMBER
22577 066603       JMP *+4        NO NUMBER FOUND, ZERO IT, AND THE REMAINING NOS.
22600 060412       JSM RSULT      NO - STORE IT
22601 066575       JMP .EGE1-1    LOOP
22602 062723       JSM NADD
22603 061256       JSM CLAR2      SET THE REMAINING VARIABLIES TO ZERO
22604 060412       JSM RSULT
22605 066602       JMP *-3        LOOP
*
*    FORMATTED INPUT
*
22606 021456 EGE1  LDA FORMS
22607 070073       SAP *+1,C
22610 031456       STA FORMS
22611 062723 EGE2  JSM NADD
22612 162106 EGE3  JSM TYPEC,I    GET A FORMAT SPEC.
22613 066631       JMP ESLH+1     P+1, END OF FORMAT, READ NEXT RECORD AND JUMP TO EGE
22614 066623       JMP E71        P+2, QUOTE FIELD NOT ALLOWED
22615 066642       JMP EFMT         3 F
22616 066642       JMP EFMT         4 E
22617 066623       JMP E71          5 $
22620 066633       JMP BFMT         6 B
22621 066625       JMP ESKP         7 X
22622 066630       JMP ESLH         8 /
22623 160205 E71   JSM AERRA,I      INVALID FORMAT SPECIFICATION
22624 177654       DEC -84
*
22625 162114 ESKP  JSM FSPR,I
22626 063055       JSM NBYT
22627 066612       JMP EGE3
*
22630 162114 ESLH  JSM FSPR,I
22631 063073       JSM RREC       READ A NEW RECORD
22632 066612       JMP EGE3
*
22633 162114 BFMT  JSM FSPR,I
22634 063055       JSM NBYT         GET NEXT BYTE
22635 010061       CPA LNFD       IF LINE FEED USE ZERO
22636 070742       SAR 16
22637 070137       LDB A
22640 160227       JSM FXFLA,I      CONVERT TO F.P.
22641 066670       JMP EFM3+1
*
22642 045466 EFMT  ISZ LOCL1
22643 121466       LDA LOCL1,I    GET W SPEC
22644 045466       ISZ LOCL1
22645 045466       ISZ LOCL1
```

#01 FORMATTED INPUT BLOCK EXECUTION

```
22646 070076         TCA
22647 031647         STA TW
22650 125466         LDB LOCL1,I   GET D SPEC
22651 074017         ADA B
22652 070056         CMA
22653 070404         SAL 8
22654 031651         STA TD
22655 162114         JSM FSPR,I
22656 021647         LDA TW          SET FIELD WIDTH
22657 031650         STA TX
22660 070742         SAR 16          CLEAR IGNORE-D FLAG
22661 031662         STA T9
22662 063153         JSM NMBR        CALL FOR REAL NUMBER
22663 021662         LDA T9          ANY . OR E?
22664 072150         RZA EFM3        YES
22665 021651         LDA TD          NO, ADJUST EXPONENT
22666 031754         STA AR2
22667 061254 EFM3    JSM ZONK
22670 060412         JSM RSULT
22671 066611         JMP EGE2
*
*
22672 050040 .NADD   AND B37        FIND NUMERIC OR STRING VARIABLE
22673 010076         CPA B36        STRING NEXT?
22674 066676         JMP *+2        YES
22675 164201         JMP FORMA,I    NO, GET THE VARIABLE 'S ADDRESS
22676 021641         LDA T5
22677 072110         RZA *+2
22700 164311         JMP E15+3,I     STRINGS NOT AVAILABLE
22701 000012         ADA .1          JSM GADD ON THE STRING BLOCK
22702 070717         JSM A,I
22703 021400         LDA BADDR
22704 031645         STA PTR1       PTR1 = CURRENT WORD OF BUFFER
22705 070076         TCA
22706 001623         ADA PEND
22707 031647         STA TMPRE      TMPRE = REMAINING LENGTH OF THE BUFFER
22710 024132         LDB M1
22711 020017         LDA .2          JSM PSTR (S.B.), PREPARE DESTINATION
22712 001641         ADA T5
22713 070717         JSM A,I
22714 021654         LDA TNULL
22715 070056         CMA
22716 001400         ADA BADDR
22717 031400         STA BADDR
22720 020020         LDA .3          JSM TRSTR(S.B.), TRANSFER DATA
22721 001641         ADA T5
22722 070717         JSM A,I
*
*     TRANSFER COMPLETE GO GET NEXT VARIABLE
*
*
* SUBROUTINE TO GET AN ADDRESS
*
22723 021472 NADD   LDA TEMPS
22724 011421         CPA PRADD         DONE?
22725 067443         JMP EXIT
22726 121472 NAD1    LDA TEMPS,I
22727 010121         CPA B4000      "," ?
22730 066742         JMP PFOR       GO SET UP FOR LOOP
22731 010004         CPA B10K       RIGHT PAREN.?
22732 066734         JMP *+2
22733 066672         JMP .NADD
*
22734 021472         LDA TEMPS      IS IT
22735 070070         SIA *+1        FOLLOWED BY
22736 070517         LDA A,I
22737 010126         CPA LPOP       ( LEFT PAREN.?
22740 066742         JMP PFOR       YES , GO SET FOR LOOP
22741 067003         JMP TFOR       NO, MUST BE DURING EXCUTION OF FOR LOOP
*
22742 021665 PFOR    LDA FLOOP
22743 000022         ADA .5         BUMP FOR LOOP POINTER
22744 031665         STA FLOOP
22745 021472         LDA TEMPS
22746 000020         ADA .3
22747 031472         STA TEMPS      MOVE TEMPS PASS "FOR"
22750 160201         JSM FORMA,I    EVALUATE STARTING VALUE
22751 021413         LDA HSTPT
22752 000133         ADA M2
22753 025665         LDB FLOOP
22754 170004         XFR            MOVE THE VARIABLE NAME AND ADDRESS TO
22755 004132         ADB M1         THE LOOP BLOCK
22756 035663         STB .FLP       SET .FLP TO FLOOP+2
22757 045472         ISZ TEMPS      "TO"
22760 061217         JSM FETCH      EVALUATE FINAL VALUE
22761 160225         JSM FLTRA,I
22762 164273         JMP E5-1,I
22763 074076         TCB
22764 135663         STB .FLP,I     SAVE "FINAL"
22765 045663         ISZ .FLP
```

#01 FORMATTED INPUT BLOCK EXECUTION

```
22766 024012            LDB .1
22767 121472            LDA TEMPS,I
22770 002050            ADA STEC
22771 072250            RZA *+5        ANY STEP ?
22772 045472            ISZ TEMPS      YES, MOVE PASS "STEP"
22773 061217            JSM FETCH
22774 160225            JSM FLTRA,I
22775 164273            JMP E5-1,I
22776 135663            STB .FLP,I     SAVE STEP
22777 045663            ISZ .FLP
23000 025472            LDB TEMPS
23001 135663            STB .FLP,I     SAVE THE ADDRESS AFTER FOR LOOP INFORMATION
23002 066726            JMP NAD1
*
*
23003 025665 TFOR       LDB FLOOP
23004 074070            SIB *+1
23005 061372            JSM FIX+1
23006 031660            STA T6
23007 010025            CPA .8        WAS IT AN INTEGER?
23010 067015            JMP *+5       YES
23011 162113            JSM OPCH1,I
23012 074117            LDA B
23013 060445            JSM XFAR2+1
23014 160225            JSM FLTRA,I
23015 074537            LDB B,I        FOR VARIABLE IN (B), NO OVERFLOW
23016 021665            LDA FLOOP
23017 000020            ADA .3
23020 070437            ADB A,I        ADD THE STEP SIZE TO B
23021 021660            LDA T6
23022 002036            ADA M8
23023 072210            RZA *+4       IF NOT AN INTEGER SKIP 4
23024 121665            LDA FLOOP,I   YES IT WAS AN INTEGER
23025 070577            STB A,I
23026 067036            JMP .TFOR
23027 035660            STB T6
23030 160227            JSM FXFLA,I
23031 025665            LDB FLOOP
23032 074070            SIB *+1
23033 061372            JSM FIX+1
23034 060416            JSM STORE
23035 025660            LDB T6
23036 021665 .TFOR      LDA FLOOP
23037 000017            ADA .2
23040 070437            ADB A,I        CHECK IF AT FINAL VALUE
23041 074110            SZB *+2
23042 074313            SBP *+6
23043 021665            LDA FLOOP      NO
23044 000021            ADA .4
23045 170517            LDA A,I
23046 031472            STA TEMPS
23047 066726            JMP NAD1
*
23050 045472            ISZ TEMPS
23051 021665            LDA FLOOP
23052 000136            ADA M5
23053 031665            STA FLOOP      DONE WITH LOOP BUMP TEMPS, AND LOOP POINTER
23054 066723            JMP NADD
*
*
* SUBROUTINE #1 TO GET A BYTE
*
23055 061040 NBYT       JSM GETCH-1     GET A CHARACTER
23056 010061            CPA LNFD
23057 155466            DSZ LOCL1,I
23060 170402            RET
*
* SUBROUTINE #2 TO GET A BYTE
*
23061 021650 NBYB       LDA TX          CHECK FIELD WIDTH COUNTER
23062 072170            RIA *+3
23063 020061            LDA LNFD        RETURN LINEFEED IF AT END
23064 170402            RET
*
23065 031650            STA TX
23066 063055            JSM NBYT      GET CHARACTER
23067 010041            CPA .32
23070 067061            JMP NBYB      IGNORE BLANKS
23071 170402            RET
23072 164271 MEOV       JMP E1+1,I    MEMORY OVERFLOW
*
* SUBROUTINE TO READ ONE ASCII RECORD INTO BUFFER
*
23073 021412 RREC       LDA LSTPT
23074 000061            ADA .10       ALLOW 10 WORDS IN LOW-STACK FOR FORMT
23075 070744            SAL 1
23076 031400            STA BADDR
23077 031706            STA SBPTR
23100 002046            ADA .80
23101 031623            STA PEND
```

#01 FORMATTED INPUT BLOCK EXECUTION

```
23102 070002         SAR 1
23103 070076         TCA
23104 001413         ADA HSTPT
23105 071252         SAM MEOV
*
23106 020141         LDA M10        SET FOR 10 BLANKS
23107 031466         STA LOCL1       THE CARD READER ONLY GIVES 10
23110 063321         JSM INPT
23111 072310         RZA RRE1+1     SKIP IF NOT A BLANK
23112 045466         ISZ LOCL1
23113 067110         JMP *-3
*
23114 160205         JSM AERRA,I    ERROR 83 - END OF TAPE
23115 177655         DEC -83
*
*
23116 063321 RRE1    JSM INPT         CALL FOR INPUT
23117 010061         CPA LNFD         IS IT LINEFEED?
23120 067131         JMP BFND         YES STORE IN BUFFER AND RETURN
23121 012041         CPA AROW         IS IT LEFT-ARROW?
23122 067142         JMP BKUP         YES, BACK UP
23123 012042         CPA ALTM         IS IT ALT MODE?
23124 067147         JMP SKND         YES, RE-READ RECORD
23125 012043         CPA ESCM         IS IT ESC MODE?
23126 067147         JMP SKND         YES, RE-READ RECORD
23127 061016         JSM ONEXT       NO, STORE IN BUFFER
23130 067116         JMP RRE1
*
23131 045623 BFND    ISZ PEND         MOVE END POINTER
23132 020031         LDA EOL
23133 061016         JSM ONEXT
23134 021400         LDA BADDR
23135 000132         ADA M1         SET PEND TO THE EOL CHAR.
23136 031623         STA PEND
23137 021706         LDA SBPTR
23140 031400         STA BADDR
23141 170402         RET
*
23142 021400 BKUP    LDA BADDR
23143 011706         CPA SBPTR
23144 067116         JMP RRE1         DON'T GO BEYOND START OF BUFFER
23145 055400         DSZ BADDR       BACK UP
23146 067116         JMP RRE1
*
23147 063321 SKND    JSM INPT         SKIP TO END OF RECORD
23150 010061         CPA LNFD
23151 067073         JMP RREC         RE-READ
23152 067147         JMP *-3
*
*
* SUBROUTINE TO BUILD A NUMBER IN AR2
*
23153 061256 NMBR    JSM CLAR2        SET AR2 = 0.
23154 022040         LDA AMF
23155 170000         CLR              CLEAR WORK AREA
23156 020132         LDA M1
23157 031660         STA T6           M=-1
23160 020030         LDA .12
23161 031661         STA T7           N=12
*
23162 063061         JSM NBYB         GET FIRST CHARACTER
23163 024132         LDB M1
23164 010050         CPA ASCM         IS IT -?
23165 074742         SBR 16           YES
23166 035712         STB .SIGN
23167 010050         CPA ASCM         BYPASS - OR +
23170 067172         JMP *+2
23171 010047         CPA ASCP
*
23172 063061 NMB1    JSM NBYB         GET NEXT CHARACTER
23173 060750         JSM DIGCK        IS IT A DIGIT?
23174 067222         JMP NMB3         NO
23175 045652         ISZ MF           YES
23176 076350         RZB NMB2         IS IT ZERO?
23177 021653         LDA SD           YES, ANY SIGNIFICANT DIGITS YET?
23200 072310         RZA NMB2+1       YES
23201 021654         LDA DP           NO, ANY DECIMAL POINT YET?
23202 071410         SZA NMB1         NO, IGNORE THIS ZERO
23203 055660         DSZ T6           YES, M=M-1
23204 067172         JMP NMB1
*
23205 045653 NMB2    ISZ SD           SIGNIFICANT DIGIT (1-9)
23206 021654         LDA DP
23207 072150         RZA *+3          IS DP=0?
23210 045660         ISZ T6           YES, M=M+1
23211 067212         JMP *+1          (NOP)
23212 021661         LDA T7           IS N=0?
23213 070310         SZA *+6          YES, IGNORE REMAINING DIGITS
23214 055661         DSZ T7           NO, N=N-1
23215 067216         JMP *+1          (NOP)
```

```
23216 171400        MLS
23217 005757        ADB AR2+3        INCLUDE DIGIT IN AR2
23220 035757        STB AR2+3
23221 067172        JMP NMB1
*
23222 010051 NMB3   CPA ASC.         DECIMAL POINT?
23223 067251        JMP NMB5         YES
23224 012044        CPA ASCE         EEX?
23225 067256        JMP NMB6         YES
23226 021652        LDA MF           NO. IS MF=0?
23227 072150        RZA *+3       IF MF IS ZERO,AND THERE WAS A (-) SIGN - ERROR
23230 025712        LDB .SIGN
23231 074710        SZB E73
23232 021660        LDA T6           NO. TEST FOR EXPONENT OVERFLOW
23233 070137 NMB4   LDB A
23234 074113        SBP *+2
23235 074076        TCB
23236 004156        ADB M100
23237 074413        SBP E73          OVERFLOW. ERROR
23240 171450        NRM
23241 070254        SES *+5          SKIP IF ZERO MANTISSA
23242 070404        SAL 8
23243 045712        ISZ .SIGN        TEST MANTISSA SIGN (-1 = +)
23244 070070        SIA *+1
23245 031754        STA AR2
23246 170402        RET
*
23247 160205 E73    JSM AERRA,I      NUMBER SYNTAX ERROR
23250 177652        DEC -86
23251 031662 NMB5   STA T9           SET IGNORE-D FLAG
23252 021654        LDA DP           TEST DP FLAG
23253 073610        RZA E73          SET ALREADY. ERROR
23254 045654        ISZ DP
23255 067172        JMP NMB1
*
23256 031662 NMB6   STA T9           SET IGNORE-D FLAG
23257 021652        LDA MF
23260 072250        RZA *+5          MANTISSA DIGITS ENTERED
23261 021654        LDA DP           ANY DECIMAL POINT?
23262 073250        RZA E73          YES. BUT NO MANTISSA DIGITS. ERROR
23263 020020        LDA ONE          NO. SET AR2 = 1.
23264 060445        JSM XFAR2+1
23265 063061        JSM NBYB         GET NEXT CHARACTER
23266 024132        LDB M1
23267 010050        CPA ASCM         IS IT -?
23270 074742        SBR 16           YES
23271 035654        STB DP           USE DP FOR EXPONENT SIGN
23272 010050        CPA ASCM         BYPASS - OR +
23273 067275        JMP *+2
23274 010047        CPA ASCP
23275 063061        JSM NBYB         GET NEXT CHARACTER
23276 060750        JSM DIGCK        DIGIT?
23277 067247        JMP E73          NO. ERROR
23300 035655 NMB7   STB EX           YES
23301 063061        JSM NBYB         GET NEXT CHARACTER
23302 060750        JSM DIGCK        DIGIT?
23303 067313        JMP NMB8         NO
23304 021655        LDA EX           YES
23305 070744        SAL 1
23306 031466        STA LOCL1
23307 070704        SAL 2
23310 001466        ADA LOCL1
23311 070037        ADB A
23312 067300        JMP NMB7
*
23313 021655 NMB8   LDA EX
23314 025654        LDB DP
23315 076110        RZB *+2          ADJUST EXPONENT SIGN
23316 070076        TCA
23317 001660        ADA T6
23320 067233        JMP NMB4
*
* INPUT DRIVER
*
* T1 HAS SELECT CODE
*
23321 021644 INPT   LDA T1
23322 063447        JSM .CHAR     GET A CHAR IN B
23323 074117        LDA B
23324 070073        SAP *+1,C
23325 170302        SAR 7            MASK DATA
23326 025642        LDB T8           CONVERSION NEEDED?
23327 070510        SZA RET1      IF(A) = 0. DON'T CONVERT
23330 074310        SZB *+6       IF(B) IS 0. SKIP CONVERSION
23331 000132        ADA M1
23332 070037        ADB A            YES. TREAT INPUT CODE AS ADDRESS
23333 074517        LDA B,I
23334 070113        SAP *+2
23335 067505        JMP E79
23336 050104        AND B177
```

#01 FORMATTED INPUT BLOCK EXECUTION

```
 23337 010031        CPA CRTN
 23340 067321        JMP INPT        IGNORE CARRIAGE RETURNS
 23341 170402 RETI   RET           RETURN DATA IN A-REGISTER
*
* OUTPUT DRIVER
*
* T2 HAS SELECT CODE
*
* LDA DATA
* JSM OTPT
*
 23342 031466 OTPT   STA LOCLI
 23343 021656        LDA T2
 23344 063431        JSM IOST        CHECK I/O STATUS
 23345 041466        IOR LOCLI     GET DATA
 23346 065356        JMP TTY+3      STF 1, OTA 1, STC 1, AND RETURN
*
 23347 000143 LINEF  DEF .10*.10+1
 23350 000063 CARRF  DEF CRTN*CRTN+1
*
 23351 027350 .CRLF  LDB CARRF      CARRIAGE RETURN
 23352 063354        JSM *+2
 23353 027347        LDB LINEF      LINE FEED
 23354 020012        LDA .1
 23355 067374        JMP .OUTP
*
 23356 025642 .OUT.  LDB T8
 23357 074510        SZB OUT1
 23360 074457        CPA B,I
 23361 067365        JMP *+4
 23362 015643        CPB TBEND
 23363 170402        RET           IF NO MATCH FOUND - ASSUME A NULL CHARACTER
 23364 077630        RIB *-4
 23365 021642        LDA T8
 23366 070076        TCA
 23367 074017        ADA B
 23370 070070        SIA *+1
 23371 065353 OUT1   JMP TTY
*
 23372 025706        LDB SHPTR
 23373 060374        JSM WBUFF
 23374 031741 .OUTP  STA XC+1
 23375 035740        STB XC
 23376 025641        LDB T5
 23377 076350        RZB XFTO$      ANY INTERNAL CONVERSION
 23400 070250        SZA *+5
 23401 061053        JSM GTMP
 23402 063356 .OUTT  JSM .OUT.      NO - OUTPUT THE DATA TO THE DEVICE
 23403 055741        DSZ XC+1
 23404 067401        JMP *-3
 23405 170402        RET
*
 23406 031647 XFTO$  STA TMPRE
 23407 025740        LDB XC
 23410 035645        STB PTR1       PLACE THE COUNT AND ADDRESS IN TMPRE, PTR1
 23411 022034        LDA FLOP
 23412 025412        LDB LSTPT      TRANSFER THE SUBSCRIPTS TO THE LSTPT
 23413 074070        SIB *+1
 23414 170004        XFR
 23415 004132        ADB M1
 23416 035412        STB LSTPT      BUMP THE LOW STACK POINTER
 23417 021647        LDA TMPRE
 23420 001662        ADA T9
 23421 031662        STA T9
 23422 021641        LDA T5
 23423 000017        ADA .2          JSM PSTR
 23424 024132        LDB M1
 23425 070717        JSM A,I        PREPARE THE DESTINATION
 23426 021641        LDA T5
 23427 000020        ADA .3          JSM TRSTR, TRANSFER DATA
 23430 070737        JMP A,I
*
* CHECK I/O STATUS
*
* LDA SELECT CODE (SAVED)
* JSM IOST
*
 23431 025442 IOST   LDB STPFL       CHECK STOP FLAG
 23432 014040        CPB .31
 23433 067443        JMP FXIT
 23434 172741        STF 1           TURN OFF INTERRUPT SYSTEM
 23435 172141        OTA 1           OUTPUT SELECT CODE
 23436 172741        STF 1           LOAD DEVICE STATUS
 23437 177241        LIB 1,C          AND TURN ON INTERRUPT
 23440 074406        RBR 9
 23441 075413        SHP IOST        LOOP IF BUSY
 23442 170402        RET
*
* EXIT ROUTINE
*
```

*01 FORMATTED INPUT BLOCK EXECUTION

```
23443 070742 FXIT  SAR 16
23444 031455       STA FORMT
23445 160170       JSM CLFRA,I
23446 164172       JMP XEC4A,I
*
23447 012037 .CHAR CPA SC13      SELECT CODE 13 ?
23450 067452       JMP *+2        YES, SKIP
23451 063456       JSM CEO-1      NO, SET CONTROL FIRST
23452 063431       JSM IOST       GET A BYTE
23453 012037       CPA SC13       SELECT CODE 13 ?
23454 065356       JMP TTY+3      YES, SET CONTROL AFTER
23455 170402       RET
*
23456 063431       JSM IOST
23457 065356 CEO   JMP TTY+3      SET CONTROL
*
* SAVE STACK POINTERS
* EVALUATE AND CHECK UNIT #
*
23460 061217 UNNM  JSM FETCH
23461 160225       JSM FLTRA,I
23462 164342       JMP E40+3,I
23463 074117       LDA B
23464 075710       SZB *-2          ERROR, ZERO SELECT CODE
23465 074142       SBR 4
23466 077610       RZB *-4          ERROR, SELECT CODE >15 OR <0
23467 070146       RAR 4
23470 170402       RET
*
* GET OPTIONAL CONVERSION TABLE
*
23471 121472 .CTBL LDA TEMPS,I
23472 050065       AND OPMSK
23473 010004       CPA RPOP       ANY CONVERSION TABLE
23474 067514       JMP CTB1       NO, STORE ZERO
23475 121472       LDA TEMPS,I      YES, GET ARRAY NAME
23476 050115       AND B1777
23477 160177       JSM SSYMA,I      SEARCH TABLE
23500 067505       JMP E79          ERROR, NOT FOUND
23501 074517       LDA B,I          GET TYPE INFORMATION
23502 050037       AND .28
23503 010025       CPA .8           INTEGER?
23504 067507       JMP *+3
*
23505 160205 E79   JSM AERRA,I      NO SUCH TABLE OR UNSUITABLE TABLE
23506 177651       DEC -87
*
23507 004132       ADB M1
23510 074517       LDA B,I          GET BASE ADDRESS OF TABLE
23511 063515       JSM CTB1+1     GO COMPUTE LAST ADDRESS
23512 045472       ISZ TEMPS
23513 170402       RET
*
23514 070742 CTB1  SAR 16
23515 031642       STA TB
23516 071650       SZA CTB1-1     RETURN IF NOT CONVERSION
23517 000132       ADA M1
23520 070517       LDA A,I
23521 070137       LDB A          GET ROW AND COLUMN INFORMATION
23522 074342       SBR 8
23523 074070       SIB *+1        (B) = # OF ROW
23524 050105       AND B377
23525 070070       SIA *+1        (A) = # OF COLUMNS
23526 061201       JSM IMPY
23527 001642       ADA TB
23530 031643       STA TBEND      SAVE THE END OF TABLE ADDRESS
23531 170402       RET
*
*     PREPARE FOR INTERNAL CONVERSION
*
23532 072110 INTCV RZA *+2
23533 164311       JMP E15+3,I    STRING BLOCK NOT AVAILABE
23534 000012       ADA .1
23535 070717       JSM A,I         JSM GADD  , PROCESS POINTERS TO DESTINATIONS
23536 021412       LDA LSTPT      GADD SET'S UP STRING POINTERS ON LOW STACK.
23537 000133       ADA M2         THEY MUST BE SAVED.
23540 026034       LDB FLOP
23541 170004       XFR
23542 000135       ADA M4
23543 031412       STA LSTPT
23544 022051       LDA FMTOP
23545 031640       STA ST
23546 074742       SBR 16
23547 162117       JSM PLOTE,I    LOOK FOR A FORMAT STATEMENT
23550 067722       JMP EWRT1-1    P+1, NOT FOUND, USE PRINT EXECUTION
23551 067567       JMP .EOUT+1    P+2, FOUND
*
*     OUTPUT STATEMENT EXECUTION
*
23552 062247 EOUT  JSM STBLK      LOOK FOR THE STRING BLOCK
```

```
*21  FORMATTED INPUT BLOCK EXECUTION

23553 045472       ISZ TEMPS
23554 125472       LDB TEMPS,I
23555 074244       SBL 11
23556 074542       SHR 12
23557 014032       CPB .15        STRING ARRAY ROOM?
23560 067532       JMP INTCV      YES
23561 055472       DSZ TEMPS      NO
23562 074742       SBR 16
23563 035641       STB T5
23564 022051       LDA FMTOP
23565 162105       JSM SFMT,I     SET UP DEVICE AND FORMAT CODES
23566 067722 .FOUT JMP EWRI1-1   NO FORMAT SPECIFIED
23567 063471       JSM .CTBL      CHECK CONVERSION TABLE
23570 162112       JSM CKEOL,I    NULL LIST ?
23571 000163 BLNKA DEF .32+.32+1 IMPOSSIBLE STATE - WORD USED AS A CONSTANT
23572 035472       STB TEMPS      YES, SET TEMPS=PRADD
23573 162106 WRIT2 JSM TYPEC,I   GET NEXT FORMAT SPEC
23574 067606       JMP WRITN      END OF FORMAT
23575 067615       JMP WRITQ      QUOTE FIELD
23576 074742       SBR 16         SET FLAG FOR FIXED
23577 060563       JSM SLWST      STACK FLAG: 0=F, +=E, -=B
23600 067617       JMP WRITF      (CODE 5 IS NOT USED)
23601 077713       SBP *-2,S      SET B FLAG
23602 067612       JMP WRITX      X:
*  END OF FORMAT STATEMENT
23603 162114       JSM FSPR,I     /: UPDATE FORMAT POINTER
23604 063351 WRITS JSM .CRLF
23605 067573       JMP WRIT2
23606 075713 WRITN SBP WRITS      ANY NUMERIC SPEC FOUND?
23607 074742       SBR 16
23610 035455       STB FORMT      CLEAR FORMAT NESTING FLAG
23611 067723       JMP EWRI1      NO, GOTO STANDARD FORMAT
*  X FIELD
23612 162114 WRITX JSM FSPR,I     UPDATE FORMAT POINTER
23613 020012       LDA .1
23614 027571       LDB BLNKA
*  QUOTE FIELD
23615 063374 WRITQ JSM .OUTP     OUTPUT TO DEVICE
23616 067573       JMP WRIT2
*
*  OUTPUT F,E, OR B FIELD
23617 025466 WRITF LDB LOCL1
23620 060563       JSM SLWST      STACK FORMAT STMT POINTER
23621 162112 WRIT4 JSM CKEOL,I   END OF WRITE STMT?
23622 074742       SHR 16         YES, CRLF NOT SUPRESSED
23623 067715       JMP WRIT8-2    YES
23624 162107       JSM QTCHK,I    QUOTE NEXT IN WRITE
23625 067630       JMP WRIT5      NO
23626 063374       JSM .OUTP      YES, OUTPUT IT
23627 067621       JMP WRIT4
*
23630 162110 WRIT5 JSM PFORM,I    SAVE FLAGS AND
23631 061222       JSM FETCH,I      EVALUATE FORMULA
23632 060567       JSM UNSTK      RECALL FORMAT STMT POINTER
23633 031466       STA LOCL1
23634 060567       JSM UNSTK      RECALL E,F, OR B FLAG
23635 031705       STA FLOAT
23636 070252       SAM WRITB      SKIP IF B
23637 045466       ISZ LOCL1
23640 121466       LDA LOCL1,I    GET FIELD WIDTH SPEC
23641 045466       ISZ LOCL1
23642 045466       ISZ LOCL1
23643 025456 WRITB LDB FORMS
23644 074073       SBP *+1,C
23645 035456       STB FORMS      SET NUMERIC SPEC FOUND FLAG
23646 125466       LDB LOCL1,I    GET DECIMAL SPEC
23647 162114       JSM FSPR,I     UPDATE FORMAT POINTERS
23650 031724       STA WIDTH
23651 070353       SAP WRIT7      SKIP IF E OR F
*  OUTPUT B FIELD CHARACTER
23652 160225       JSM FLTRA,I    CONVERT TO ROUNDED INTEGER
23653 074742       SHR 16         OVERFLOW: USE 0
23654 074117       LDA B
23655 052053       AND BIT12      MASKTHE LOWER 12 BITS
23656 061353       JSM TTY        OUTPUT SINGLE CHAR
23657 067711       JMP WRIT6
*  OUTPUT E OR F NUMBER
23660 035703 WRIT7 STB PLACE
23661 021412       LDA LSTPT      START TEMP BUFFER
23662 000061       ADA .10
23663 070070       SIA *+1
23664 070744       SAL 1
23665 031400       STA BADDR        ABOVE LOW STACK
23666 031706       STA SBPTR
23667 021413       LDA HSTPT
23670 070744       SAL 1
23671 031623       STA PEND       SET END OF BUFFER AT H-STACK
23672 021416       LDA MODF
23673 031641       STA ST+1
```

```
1715  23674 070742          SAR 16
1716  23675 031416          STA MODE      SET FOR PROGRAM FORMAT
1717  23676 024215          LDB TMPOP
1718  23677 060406          JSM AFARI+1
1719  23700 160234          JSM NMOTA,I   OUTPUT A NUMBER TO THE BUFFER
1720  23701 021641          LDA ST+1
1721  23702 031416          STA MODE
1722  23703 021400          LDA BADDR
1723  23704 011623          CPA PEND      OVERFLOW?
1724  23705 064561          JMP MERR
1725  23706 063372          JSM .OUTP-2   COMPUTE LENGTH AND OUTPUT  THE BUFFER
1726  23707 025625          LDB FIRST
1727  23710 035400          STB BADDR     RESET BADDR
1728  23711 162112 WRIT6    JSM CKEOL,I    END OF STMT?
1729  23712 074742          SBR 16        YES, CRLF NOT SUPRESSED
1730  23713 067717          JMP WRITB     YES
1731  23714 067573          JMP WRIT2     NO
1732*  END OF WRITE STMT
1733  23715 055412          DSZ LSTPT
1734  23716 055412          DSZ LSTPT     UNSTACK FLAGS
1735  23717 070742 WRITB    SAR 16
1736  23720 031455          STA FORMT     SET FORMAT COMPLETE FLAG
1737  23721 067747          JMP PR2+1
1738*
1739  23722 063471          JSM .CTRL
1740  23723 025416 EWRI1    LDB MODE
1741  23724 076150          RZB *+3
1742  23725 021622          LDA TERM
1743  23726 072150          RZA *+3
1744  23727 160170          JSM CLERA,I
1745  23730 162112          JSM CKEOL,I
1746  23731 067745          JMP PR2-1
1747  23732 067745          JMP PR2-1
1748  23733 162104 PR3      JSM PRINN,I
1749  23734 067746          JMP PR2
1750  23735 021625          LDA FIRST
1751  23736 070076          TCA
1752  23737 001400          ADA BADDR
1753  23740 025625          LDB FIRST
1754  23741 063374          JSM .OUTP
1755  23742 021400          LDA BADDR
1756  23743 031625          STA FIRST
1757  23744 067733          JMP PR3
1758*
1759  23745 074742          SBR 16
1760  23746 035622 PR2      STB TERM
1761  23747 076150          RZB PR17
1762  23750 162111          JSM PRCHK,I
1763  23751 063351          JSM .CRLF
1764  23752 164172 PR17     JMP XEC4A,I
1765*
1766*
1767*
1768  23767                 ORG 23767B
1769  23767 177563          ABS EOUT-*
1770  23770 176564          ABS EGET-*      GET EXECUTION
1771  23771 176314          ABS CMD-*     ASCII BUSS EXECUTION
1772  23772 000000          BSS 1           ** CHECKSUM WORD  ******
1773*
1774  23773 176022          ABS NFOPT-*     NON-FORMULA OPERATOR TABLE
1775  23774 176061          ABS FUNNT-*     FUNCTION-NAME TABLE
1776  23775 176017          ABS NULL-*    COMMAND - NAME TABLE (NULL)
1777  23776 176006          ABS SYSNT-*     STATEMENT-NAME TABLE
1778  23777 026000 PAGE     OCT 26000
1779*
1780                        END
*  NO ERRORS*
```

CROSS-REFERENCE TABLE

| | | | | | | | |
|---|---|---|---|---|---|---|---|
| .1 | 0020 | 1108 | 1169 | 1466 | 1608 | 1660 | |
| .10 | 0071 | 0072 | 1255 | 1460 | 1460 | 1705 | |
| .100 | 0070 | | | | | | |
| .1000 | 0069 | | | | | | |
| .11 | 0035 | 0043 | | | | | |
| .12 | 0036 | 1319 | | | | | |
| .13 | 0039 | | | | | | |
| .15 | 0048 | 0083 | 1630 | | | | |
| .16 | 0049 | 0084 | 0671 | | | | |
| .17 | 0610 | 0684 | | | | | |
| .18 | 0555 | 0690 | | | | | |
| .1E4 | 0068 | | | | | | |
| .2 | 0027 | 1116 | 1212 | 1508 | | | |
| .21 | 0050 | | | | | | |
| .22 | 0051 | 0087 | | | | | |
| .23 | 0052 | 0088 | | | | | |
| .28 | 0053 | 1575 | | | | | |
| .3 | 0028 | 0045 | 0889 | 1123 | 1153 | 1196 | 1512 |
| .31 | 0054 | 0090 | 0904 | 1522 | | | |
| .32 | 0055 | 1246 | 1640 | 1640 | | | |

CROSS-REFERENCE TABLE

| | | | | | | | | | | |
|---|---|---|---|---|---|---|---|---|---|---|
| .33 | 0056 | | | | | | | | | |
| .34 | 0057 | 0091 | | | | | | | | |
| .37 | 0058 | | | | | | | | | |
| .4 | 0029 | 1217 | | | | | | | | |
| .40 | 0059 | | | | | | | | | |
| .41 | 0060 | | | | | | | | | |
| .43 | 0061 | 0552 | | | | | | | | |
| .45 | 0062 | 0553 | | | | | | | | |
| .46 | 0063 | 0551 | | | | | | | | |
| .48 | 0064 | | | | | | | | | |
| .5 | 0030 | 1150 | | | | | | | | |
| .58 | 0065 | 0094 | | | | | | | | |
| .6 | 0031 | 0044 | | | | | | | | |
| .63 | 0066 | | | | | | | | | |
| .7 | 0032 | | | | | | | | | |
| .8 | 0033 | 0932 | 1188 | 1576 | | | | | | |
| .80 | 0606 | 1259 | | | | | | | | |
| .9 | 0034 | | | | | | | | | |
| .99 | 0074 | | | | | | | | | |
| .BADR | 0550 | | | | | | | | | |
| .BUFA | 0180 | | | | | | | | | |
| .CHAR | 1539 | 0957 | 1430 | | | | | | | |
| .CRLF | 1463 | 1652 | 1763 | | | | | | | |
| .CTRL | 1566 | 1018 | 1638 | 1739 | | | | | | |
| .EGEI | 1030 | 1033 | | | | | | | | |
| .EOUT | 1637 | 1621 | | | | | | | | |
| .FADA | 0185 | | | | | | | | | |
| .FDVA | 0188 | | | | | | | | | |
| .FLOP | 0547 | 0596 | | | | | | | | |
| .FLP | 0534 | 1161 | 1167 | 1168 | 1177 | 1178 | 1180 | | | |
| .FMPA | 0187 | | | | | | | | | |
| .FSBA | 0186 | | | | | | | | | |
| .FSR | 0190 | | | | | | | | | |
| .LIN | 0987 | 0962 | 0975 | 0980 | | | | | | |
| .LIN1 | 0983 | 0965 | 0973 | 0976 | 0978 | | | | | |
| .LIN2 | 0996 | 0964 | 0967 | | | | | | | |
| .LNUM | 0314 | | | | | | | | | |
| .NADD | 1101 | 1140 | | | | | | | | |
| .NPWR | 0498 | | | | | | | | | |
| .OUT. | 1469 | 1490 | | | | | | | | |
| .OUTP | 1484 | 0803 | 0811 | 1467 | 1663 | 1674 | 1725 | 1754 | | |
| .OUTT | 1490 | | | | | | | | | |
| .SC13 | 0597 | 0797 | | | | | | | | |
| .SCHK | 0865 | 0850 | | | | | | | | |
| .SIGN | 0554 | 1326 | 1363 | 1374 | | | | | | |
| .SLBF | 0181 | | | | | | | | | |
| .TFOR | 1211 | 1203 | | | | | | | | |
| A | 0000 | 0846 | 0931 | 1070 | 1109 | 1118 | 1125 | 1144 | 1197 | 1202 | 1213 |
| | 1218 | 1366 | 1414 | 1438 | 1510 | 1513 | 1592 | 1593 | 1609 | |
| ACTSA | 0174 | 0710 | | | | | | | | |
| ADRSS | 0327 | | | | | | | | | |
| AERRA | 0176 | 1054 | 1273 | 1379 | 1579 | | | | | |
| ALTM | 0602 | 1282 | | | | | | | | |
| AMF | 0600 | 1315 | | | | | | | | |
| AR1 | 0413 | 0182 | | | | | | | | |
| AR1A | 0182 | | | | | | | | | |
| AR2 | 0415 | 0183 | 0922 | 0984 | 1094 | 1353 | 1354 | 1376 | | |
| AR2A | 0183 | | | | | | | | | |
| AROW | 0601 | 1280 | | | | | | | | |
| ARYAD | 0403 | | | | | | | | | |
| ASC. | 0551 | 1357 | | | | | | | | |
| ASCE | 0604 | 1359 | | | | | | | | |
| ASCM | 0553 | 1324 | 1327 | 1396 | 1399 | | | | | |
| ASCP | 0552 | 1329 | 1401 | | | | | | | |
| ASSOP | 0562 | 0679 | | | | | | | | |
| B | 0002 | 0760 | 0775 | 0821 | 0926 | 0990 | 1081 | 1191 | 1194 | 1431 | 1439 |
| | 1471 | 1478 | 1557 | 1574 | 1583 | 1698 | | | | |
| B100 | 0095 | | | | | | | | | |
| B1000 | 0102 | 0804 | | | | | | | | |
| B10K | 0114 | 0115 | 1138 | | | | | | | |
| B12K | 0116 | 0117 | 0206 | | | | | | | |
| B133 | 0096 | | | | | | | | | |
| B140 | 0097 | | | | | | | | | |
| B1400 | 0103 | 0204 | | | | | | | | |
| B17 | 0083 | | | | | | | | | |
| B170K | 0121 | | | | | | | | | |
| B1740 | 0104 | 0203 | | | | | | | | |
| B1760 | 0105 | 0158 | | | | | | | | |
| B177 | 0098 | 1442 | | | | | | | | |
| B1774 | 0106 | | | | | | | | | |
| B1775 | 0107 | | | | | | | | | |
| B1777 | 0108 | 1571 | | | | | | | | |
| B20 | 0084 | | | | | | | | | |
| B2001 | 0607 | | | | | | | | | |
| B22 | 0085 | 0555 | | | | | | | | |
| B23 | 0086 | | | | | | | | | |
| B2400 | 0110 | | | | | | | | | |
| B26 | 0087 | | | | | | | | | |
| B27 | 0088 | | | | | | | | | |
| B3000 | 0111 | | | | | | | | | |
| B3116 | 0605 | | | | | | | | | |

CROSS-REFERENCE TABLE

| | | | | | | | | | | | |
|---|---|---|---|---|---|---|---|---|---|---|---|
| B36 | 0089 | 1102 | | | | | | | | | |
| B37 | 0090 | 1101 | | | | | | | | | |
| B377 | 0099 | 1596 | | | | | | | | | |
| B400 | 0100 | 0799 | | | | | | | | | |
| B4000 | 0112 | 0162 | 0758 | 0945 | 0956 | 1009 | 1136 | | | | |
| B42 | 0091 | | | | | | | | | | |
| B44 | 0092 | | | | | | | | | | |
| B52 | 0093 | | | | | | | | | | |
| B6K | 0113 | 0167 | | | | | | | | | |
| B72 | 0094 | | | | | | | | | | |
| B777 | 0101 | | | | | | | | | | |
| BACK | 0702 | 0717 | | | | | | | | | |
| BADDR | 0291 | 0699 | 1110 | 1121 | 1122 | 1257 | 1292 | 1296 | 1299 | 1302 | 1708 |
| | 1722 | 1727 | 1752 | 1755 | | | | | | | |
| BADRP | 0204 | 0735 | 0736 | | | | | | | | |
| BEND | 0198 | 0199 | | | | | | | | | |
| BFMT | 1066 | 1051 | | | | | | | | | |
| BFND | 1289 | 1279 | | | | | | | | | |
| BHSTP | 0444 | | | | | | | | | | |
| BIN | 0980 | 0591 | | | | | | | | | |
| BIT12 | 0611 | 0981 | 1699 | | | | | | | | |
| BKUP | 1299 | 1281 | | | | | | | | | |
| BLANK | 0388 | | | | | | | | | | |
| BLNKA | 1640 | 1661 | | | | | | | | | |
| C5 | 0015 | | | | | | | | | | |
| C6 | 0011 | 0114 | | | | | | | | | |
| C7 | 0022 | 0100 | | | | | | | | | |
| CARPF | 1461 | 1463 | | | | | | | | | |
| CEO | 1548 | 1541 | | | | | | | | | |
| CHAR | 0954 | 0590 | | | | | | | | | |
| CHRSA | 0219 | | | | | | | | | | |
| CKFOL | 0645 | 1639 | 1669 | 1728 | 1745 | | | | | | |
| CLAR2 | 0492 | 1035 | 1314 | | | | | | | | |
| CLFRA | 0160 | 1536 | 1744 | | | | | | | | |
| CLINF | 0316 | | | | | | | | | | |
| CLPIA | 0217 | | | | | | | | | | |
| CMD | 0796 | 0815 | 1771 | | | | | | | | |
| CMDS | 0781 | 0567 | 0791 | | | | | | | | |
| COMCE | 0436 | 0694 | 0872 | 0885 | | | | | | | |
| COMCK | 0435 | 0704 | 0789 | | | | | | | | |
| CONST | 0484 | 1030 | | | | | | | | | |
| CPLAC | 0331 | | | | | | | | | | |
| CRCKA | 0228 | | | | | | | | | | |
| CRLF | 0501 | | | | | | | | | | |
| CRLF1 | 0502 | | | | | | | | | | |
| CRTN | 0037 | 0038 | 0039 | 0996 | 1443 | 1461 | 1461 | | | | |
| CTR1 | 1588 | 1569 | 1584 | 1590 | | | | | | | |
| CTYPE | 0330 | | | | | | | | | | |
| DCOMA | 0210 | | | | | | | | | | |
| DELSA | 0175 | | | | | | | | | | |
| DFLAG | 0390 | | | | | | | | | | |
| DIGCK | 0463 | 1332 | 1403 | 1407 | | | | | | | |
| DP | 0526 | 1338 | 1344 | 1382 | 1384 | 1390 | 1398 | 1418 | | | |
| DPERR | 0043 | | | | | | | | | | |
| DRQST | 0317 | | | | | | | | | | |
| DSTRT | 0303 | | | | | | | | | | |
| E | 0080 | | | | | | | | | | |
| E1 | 0235 | 1250 | | | | | | | | | |
| E10 | 0244 | 0711 | 0718 | | | | | | | | |
| E15 | 0249 | 0670 | 0673 | 0745 | 0750 | 0887 | 1107 | 1607 | | | |
| E20 | 0254 | | | | | | | | | | |
| E25 | 0259 | 0676 | 0677 | 0680 | 0683 | 0686 | 0692 | | | | |
| E30 | 0264 | | | | | | | | | | |
| E35 | 0269 | | | | | | | | | | |
| E40 | 0274 | 1556 | | | | | | | | | |
| E45 | 0279 | | | | | | | | | | |
| E5 | 0239 | 0819 | 0858 | 0941 | 0989 | 1165 | 1176 | | | | |
| E50 | 0284 | | | | | | | | | | |
| E71 | 1054 | 1047 | 1050 | | | | | | | | |
| E73 | 1379 | 1364 | 1370 | 1383 | 1391 | 1404 | | | | | |
| E79 | 1579 | 1441 | 1573 | | | | | | | | |
| EAND | 0844 | | | | | | | | | | |
| ECALA | 0215 | | | | | | | | | | |
| EFM3 | 1095 | 1072 | 1092 | | | | | | | | |
| EFMT | 1074 | 1048 | 1049 | | | | | | | | |
| EGE1 | 1041 | 1025 | | | | | | | | | |
| EGE2 | 1044 | 1097 | | | | | | | | | |
| EGE3 | 1045 | 1060 | 1064 | | | | | | | | |
| EGET | 1006 | 1770 | | | | | | | | | |
| EIAND | 0843 | 0586 | | | | | | | | | |
| EIOR | 0839 | 0587 | | | | | | | | | |
| ELINA | 0169 | | | | | | | | | | |
| ENDS | 0480 | | | | | | | | | | |
| ENTEA | 0218 | | | | | | | | | | |
| ENTFA | 0189 | | | | | | | | | | |
| EOC1 | 0924 | 0935 | | | | | | | | | |
| EOCT | 0920 | 0594 | | | | | | | | | |
| EOL | 0038 | 0702 | 1290 | | | | | | | | |
| EOLCK | 0483 | 0912 | 0915 | | | | | | | | |
| EOST | 0481 | 0790 | | | | | | | | | |

CROSS-REFERENCE TABLE

| | | | | | | | | | | | |
|---|---|---|---|---|---|---|---|---|---|---|---|
| EOUT | 1625 | 1769 | | | | | | | | | |
| EROT | 0829 | 0589 | | | | | | | | | |
| ERRA | 0177 | | | | | | | | | | |
| ESCM | 0603 | 1284 | | | | | | | | | |
| ESKP | 1058 | 1052 | | | | | | | | | |
| ESLH | 1062 | 1046 | 1053 | | | | | | | | |
| ESTO | 0846 | 0836 | 0841 | | | | | | | | |
| EWRI1 | 1740 | 1620 | 1637 | 1657 | | | | | | | |
| EX | 0528 | 1405 | 1409 | 1417 | | | | | | | |
| EXP | 0401 | 0402 | | | | | | | | | |
| EXPOP | 0118 | | | | | | | | | | |
| F | 0081 | | | | | | | | | | |
| FDAAA | 0222 | | | | | | | | | | |
| FETCH | 0488 | 0852 | 0856 | 1163 | 1174 | 1554 | 1678 | | | | |
| FILLA | 0201 | | | | | | | | | | |
| FIRST | 0367 | 1726 | 1750 | 1753 | 1756 | | | | | | |
| FIX | 0505 | 1186 | 1208 | | | | | | | | |
| FLGBT | 0073 | 0854 | | | | | | | | | |
| FLOAT | 0386 | 1682 | | | | | | | | | |
| FLOOP | 0537 | 1021 | 1149 | 1151 | 1158 | 1184 | 1195 | 1201 | 1206 | 1211 | 1216 |
| | 1223 | 1225 | | | | | | | | | |
| FLOP | 0596 | 1020 | 1498 | 1612 | | | | | | | |
| FLTEA | 0193 | 0988 | | | | | | | | | |
| FLTRA | 0192 | 0853 | 0857 | 1164 | 1175 | 1193 | 1555 | 1696 | | | |
| FLTSA | 0195 | | | | | | | | | | |
| FMTOP | 0609 | 1011 | 1616 | 1635 | | | | | | | |
| FN | 0148 | | | | | | | | | | |
| FND | 0462 | | | | | | | | | | |
| FND1A | 0224 | | | | | | | | | | |
| FNDAA | 0223 | | | | | | | | | | |
| FNDPS | 0476 | | | | | | | | | | |
| FOPBS | 0206 | | | | | | | | | | |
| FORMA | 0172 | 1104 | 1155 | | | | | | | | |
| FORME | 0336 | | | | | | | | | | |
| FORMS | 0335 | 1041 | 1043 | 1688 | 1690 | | | | | | |
| FORMT | 0334 | 1535 | 1656 | 1736 | | | | | | | |
| FPAG1 | 0766 | 0763 | | | | | | | | | |
| FPAG2 | 0771 | 0761 | 0768 | | | | | | | | |
| FPAGE | 0451 | | | | | | | | | | |
| FROMA | 0122 | 0759 | | | | | | | | | |
| FSCA | 0173 | 0681 | 0687 | 0693 | 0737 | 0871 | 0873 | | | | |
| FSCE2 | 0441 | | | | | | | | | | |
| FSCE4 | 0446 | | | | | | | | | | |
| FSPR | 0647 | 1058 | 1062 | 1066 | 1085 | 1651 | 1659 | 1692 | | | |
| FTMP1 | 0337 | | | | | | | | | | |
| FTMP2 | 0338 | | | | | | | | | | |
| FUNNT | 0615 | 1775 | | | | | | | | | |
| FWAM | 0157 | | | | | | | | | | |
| FWUP | 0296 | | | | | | | | | | |
| FXFLA | 0194 | 0847 | 0939 | 0952 | 0960 | 1071 | 1205 | | | | |
| FXIT | 1534 | 1134 | 1523 | | | | | | | | |
| GETAD | 0461 | | | | | | | | | | |
| GETCH | 0471 | 1232 | | | | | | | | | |
| GETSK | 0475 | | | | | | | | | | |
| GFLAG | 0404 | | | | | | | | | | |
| GFRST | 0474 | | | | | | | | | | |
| GNEXT | 0473 | 0667 | 0695 | 0784 | 0868 | | | | | | |
| GPARM | 0424 | | | | | | | | | | |
| GSIGN | 0486 | | | | | | | | | | |
| GTCON | 0504 | | | | | | | | | | |
| GTMP | 0472 | 1489 | | | | | | | | | |
| GTOPP | 0466 | | | | | | | | | | |
| GTSTA | 0213 | 0788 | | | | | | | | | |
| HFLG1 | 0321 | | | | | | | | | | |
| HSTPT | 0302 | 1156 | 1263 | 1710 | | | | | | | |
| I | 0067 | | | | | | | | | | |
| ICNT | 0422 | | | | | | | | | | |
| ID | 0565 | 0612 | 0612 | | | | | | | | |
| IMPY | 0487 | 1598 | | | | | | | | | |
| INF | 0077 | | | | | | | | | | |
| INITS | 0456 | | | | | | | | | | |
| INPT | 1429 | 1268 | 1277 | 1305 | 1444 | | | | | | |
| INREA | 0226 | | | | | | | | | | |
| INTCK | 0459 | | | | | | | | | | |
| INTCV | 1606 | 1631 | | | | | | | | | |
| INTEA | 0178 | | | | | | | | | | |
| INTEL | 0340 | | | | | | | | | | |
| INTFL | 0075 | | | | | | | | | | |
| INTGR | 0402 | | | | | | | | | | |
| IOBUF | 0359 | | | | | | | | | | |
| IOHD | 0909 | 0663 | 0724 | 0732 | | | | | | | |
| IOHEA | 0229 | 0909 | | | | | | | | | |
| IOHED | 0649 | 0731 | | | | | | | | | |
| IOST | 1521 | 1456 | 1529 | 1542 | 1547 | | | | | | |
| IOSTA | 0225 | | | | | | | | | | |
| KEYFG | 0324 | | | | | | | | | | |
| L2T1 | 0347 | | | | | | | | | | |
| L2T2 | 0348 | | | | | | | | | | |
| LASTN | 0398 | | | | | | | | | | |
| LBOP | 0119 | | | | | | | | | | |

CROSS-REFERENCE TABLE

| | | | | | | | | | | | |
|---|---|---|---|---|---|---|---|---|---|---|---|
| LDEF | 0489 | | | | | | | | | | |
| LETCK | 0464 | | | | | | | | | | |
| LIMIT | 0465 | | | | | | | | | | |
| LIN | 0962 | 0592 | | | | | | | | | |
| LINEF | 1460 | 1465 | | | | | | | | | |
| LISTA | 0167 | | | | | | | | | | |
| LNFD | 0072 | 0968 | 1068 | 1233 | 1241 | 1278 | 1306 | | | | |
| LNINC | 0315 | | | | | | | | | | |
| LNUM | 0457 | | | | | | | | | | |
| LOCL1 | 0345 | 0925 | 0934 | 1074 | 1075 | 1076 | 1077 | 1080 | 1234 | 1267 | 1270 |
| | 1411 | 1413 | 1454 | 1457 | 1667 | 1680 | 1684 | 1685 | 1686 | 1687 | 1691 |
| LOCL2 | 0346 | | | | | | | | | | |
| LPCK | 0437 | 0665 | | | | | | | | | |
| LPCKE | 0438 | 0727 | 0670 | | | | | | | | |
| LPOP | 0120 | 1145 | | | | | | | | | |
| LROMA | 0123 | 0762 | | | | | | | | | |
| LSTAK | 0299 | | | | | | | | | | |
| LSTPT | 0301 | 1254 | 1499 | 1503 | 1610 | 1615 | 1704 | 1733 | 1734 | | |
| LTR | 0479 | 0886 | | | | | | | | | |
| LWAM | 0295 | | | | | | | | | | |
| M1 | 0124 | 0983 | 1115 | 1160 | 1293 | 1317 | 1323 | 1395 | 1437 | 1502 | 1509 |
| | 1582 | 1591 | | | | | | | | | |
| M10 | 0131 | 1266 | | | | | | | | | |
| M100 | 0144 | 1369 | | | | | | | | | |
| M1024 | 0146 | | | | | | | | | | |
| M11 | 0132 | | | | | | | | | | |
| M12 | 0133 | | | | | | | | | | |
| M13 | 0134 | | | | | | | | | | |
| M14 | 0135 | | | | | | | | | | |
| M15 | 0136 | | | | | | | | | | |
| M2 | 0125 | 1157 | 1611 | | | | | | | | |
| M23 | 0137 | | | | | | | | | | |
| M25 | 0138 | | | | | | | | | | |
| M256 | 0145 | 0924 | | | | | | | | | |
| M3 | 0126 | | | | | | | | | | |
| M32 | 0139 | | | | | | | | | | |
| M36 | 0140 | | | | | | | | | | |
| M4 | 0127 | 1614 | | | | | | | | | |
| M48 | 0141 | | | | | | | | | | |
| M5 | 0128 | 1224 | | | | | | | | | |
| M6 | 0129 | | | | | | | | | | |
| M64 | 0142 | | | | | | | | | | |
| M8 | 0598 | 1199 | | | | | | | | | |
| M80 | 0143 | | | | | | | | | | |
| M9 | 0130 | | | | | | | | | | |
| MASK1 | 0153 | | | | | | | | | | |
| MASKS | 0154 | | | | | | | | | | |
| MAW | 0294 | 0766 | 0767 | | | | | | | | |
| MAXIN | 0400 | | | | | | | | | | |
| MAXSN | 0147 | | | | | | | | | | |
| MBIN1 | 0406 | | | | | | | | | | |
| MBIN2 | 0407 | | | | | | | | | | |
| MBOX1 | 0351 | | | | | | | | | | |
| MDIMA | 0208 | | | | | | | | | | |
| MEOV | 1250 | 1264 | | | | | | | | | |
| MER8 | 0445 | 1724 | | | | | | | | | |
| MF | 0524 | 0600 | 1334 | 1361 | 1388 | | | | | | |
| MINIT | 0455 | | | | | | | | | | |
| MODE | 0305 | 0849 | 1713 | 1716 | 1721 | 1740 | | | | | |
| MOUTA | 0638 | 0977 | | | | | | | | | |
| MSFLG | 0389 | | | | | | | | | | |
| MVTOH | 0477 | | | | | | | | | | |
| NAD1 | 1135 | 1181 | 1220 | | | | | | | | |
| NADD | 1132 | 1029 | 1034 | 1044 | 1226 | | | | | | |
| NBYB | 1239 | 1247 | 1322 | 1331 | 1394 | 1402 | 1406 | | | | |
| NBYT | 1232 | 1059 | 1067 | 1245 | | | | | | | |
| NDISP | 0382 | | | | | | | | | | |
| NDWRT | 0500 | | | | | | | | | | |
| NESC | 0708 | 0703 | | | | | | | | | |
| NEXT1 | 0450 | | | | | | | | | | |
| NEXTA | 0467 | | | | | | | | | | |
| NEXTL | 0449 | | | | | | | | | | |
| NFOP | 0896 | 0669 | 0682 | 0688 | | | | | | | |
| NFOPA | 0612 | 0896 | | | | | | | | | |
| NFOPT | 0578 | 0612 | 0612 | 1774 | | | | | | | |
| NMB1 | 1331 | 1339 | 1341 | 1355 | 1385 | | | | | | |
| NMB2 | 1343 | 1335 | 1337 | | | | | | | | |
| NMB3 | 1357 | 1333 | | | | | | | | | |
| NMB4 | 1366 | 1422 | | | | | | | | | |
| NMB5 | 1381 | 1358 | | | | | | | | | |
| NMB6 | 1387 | 1360 | | | | | | | | | |
| NMB7 | 1405 | 1415 | | | | | | | | | |
| NMB8 | 1417 | 1408 | | | | | | | | | |
| NMBR | 1314 | 1090 | | | | | | | | | |
| NMOTA | 0200 | 1719 | | | | | | | | | |
| NOEOF | 0482 | | | | | | | | | | |
| NPRIN | 0383 | | | | | | | | | | |
| NPWRT | 0499 | | | | | | | | | | |
| NULL | 0575 | 1776 | | | | | | | | | |
| NUM | 0396 | 0397 | 0657 | | | | | | | | |

CROSS-REFERENCE TABLE

| | | | | | | | | | | | |
|---|---|---|---|---|---|---|---|---|---|---|---|
| NUMCA | 0211 | | | | | | | | | | |
| NUMOA | 0212 | | | | | | | | | | |
| NXTDT | 0304 | | | | | | | | | | |
| NXTST | 0405 | | | | | | | | | | |
| OBLNK | 0468 | | | | | | | | | | |
| ODGIT | 0496 | | | | | | | | | | |
| OF | 0493 | | | | | | | | | | |
| ONE | 0045 | 1392 | | | | | | | | | |
| ONEXT | 0469 | 1286 | 1291 | | | | | | | | |
| OPCHI | 0646 | 1190 | | | | | | | | | |
| OPCHA | 0171 | | | | | | | | | | |
| OPDMK | 0079 | | | | | | | | | | |
| OPMSK | 0076 | 0658 | 1567 | | | | | | | | |
| OPTYP | 0397 | | | | | | | | | | |
| OTPT | 1454 | 0800 | 0805 | | | | | | | | |
| OTPTR | 0293 | | | | | | | | | | |
| OUTI | 1480 | 1470 | | | | | | | | | |
| OUTCR | 0470 | | | | | | | | | | |
| OUTIA | 0179 | | | | | | | | | | |
| OVCHA | 0216 | | | | | | | | | | |
| PAGE | 1778 | | | | | | | | | | |
| PARMA | 0306 | | | | | | | | | | |
| PARMN | 0307 | | | | | | | | | | |
| PBPTO | 0313 | | | | | | | | | | |
| PBPTR | 0310 | | | | | | | | | | |
| PBUFF | 0311 | | | | | | | | | | |
| PBUFO | 0312 | | | | | | | | | | |
| PEND | 0365 | 1113 | 1260 | 1289 | 1294 | 1712 | 1723 | | | | |
| PEXMA | 0165 | | | | | | | | | | |
| PFLAG | 0391 | | | | | | | | | | |
| PFOR | 1149 | 1137 | 1146 | | | | | | | | |
| PFORM | 0643 | 1677 | | | | | | | | | |
| PGIN0 | 0478 | | | | | | | | | | |
| PGINT | 0458 | | | | | | | | | | |
| PI/2 | 0044 | | | | | | | | | | |
| PLACE | 0384 | 1703 | | | | | | | | | |
| PLOTE | 0650 | 1014 | 1619 | | | | | | | | |
| PMODE | 0329 | | | | | | | | | | |
| PPFF | 0366 | | | | | | | | | | |
| PR17 | 1764 | 1761 | | | | | | | | | |
| PR2 | 1760 | 1737 | 1746 | 1747 | 1749 | | | | | | |
| PR3 | 1748 | 1757 | | | | | | | | | |
| PRADD | 0308 | 0807 | 0813 | 1133 | | | | | | | |
| PRCHK | 0644 | 0969 | 0997 | 1762 | | | | | | | |
| PRFLG | 0332 | | | | | | | | | | |
| PRINN | 0639 | 1748 | | | | | | | | | |
| PTR1 | 0518 | 1111 | 1497 | | | | | | | | |
| QTCHA | 0230 | | | | | | | | | | |
| QTCHK | 0642 | 0801 | 0809 | 1672 | | | | | | | |
| QTOP | 0109 | 0161 | 0764 | | | | | | | | |
| QUOTE | 0561 | 0562 | | | | | | | | | |
| RBOP | 0117 | | | | | | | | | | |
| RBUFF | 0360 | | | | | | | | | | |
| RCOUT | 0333 | | | | | | | | | | |
| RDYDA | 0166 | | | | | | | | | | |
| RECO2 | 0749 | 0743 | | | | | | | | | |
| REFD | 0161 | | | | | | | | | | |
| REFDL | 0339 | | | | | | | | | | |
| RES | 0417 | | | | | | | | | | |
| RESB1 | 0453 | | | | | | | | | | |
| RESBP | 0454 | | | | | | | | | | |
| RET1 | 1445 | 1435 | | | | | | | | | |
| RET2 | 0421 | | | | | | | | | | |
| RETN2 | 0420 | 0905 | | | | | | | | | |
| RETN3 | 0419 | 0877 | | | | | | | | | |
| RITE | 0637 | 0725 | 0733 | | | | | | | | |
| RLFLG | 0519 | | | | | | | | | | |
| ROUND | 0495 | | | | | | | | | | |
| RPCK | 0439 | 0910 | | | | | | | | | |
| RPCKE | 0440 | 0713 | 0876 | 0914 | | | | | | | |
| RPOP | 0115 | 1568 | | | | | | | | | |
| RRF1 | 1277 | 1269 | 1287 | 1301 | 1303 | | | | | | |
| RREC | 1254 | 1023 | 1063 | 1307 | | | | | | | |
| RSAVE | 0292 | | | | | | | | | | |
| RSLTE | 0373 | | | | | | | | | | |
| RSPTR | 0418 | 0865 | | | | | | | | | |
| RSTAK | 0416 | | | | | | | | | | |
| RSTKA | 0158 | | | | | | | | | | |
| RSULT | 0426 | 1032 | 1036 | 1096 | | | | | | | |
| RTBL | 0885 | 0913 | | | | | | | | | |
| RUNA | 0163 | | | | | | | | | | |
| S | 0082 | | | | | | | | | | |
| SALTA | 0207 | | | | | | | | | | |
| SAVBP | 0452 | | | | | | | | | | |
| SAVEA | 0325 | | | | | | | | | | |
| SAVEB | 0326 | | | | | | | | | | |
| SBADR | 0394 | | | | | | | | | | |
| SBPTR | 0387 | 0668 | 0696 | 0700 | 0726 | 0787 | 0869 | 0902 | 1258 | 1295 | 1300 |
| | 1482 | 1709 | | | | | | | | | |
| SBPUD | 0431 | 0900 | | | | | | | | | |

CROSS-REFERENCE TABLE

| | | | | | | | | | | | |
|---|---|---|---|---|---|---|---|---|---|---|---|
| SBUFA | 0199 | | | | | | | | | | |
| SC13 | 0599 | 1539 | 1543 | | | | | | | | |
| SCHK | 0849 | 0829 | 0838 | 0843 | | | | | | | |
| SD | 0525 | 1336 | 1343 | | | | | | | | |
| SEC | 0320 | | | | | | | | | | |
| SFLAG | 0393 | | | | | | | | | | |
| SFMT | 0640 | 1636 | | | | | | | | | |
| SGET | 0655 | 0566 | | | | | | | | | |
| SGNS | 0497 | | | | | | | | | | |
| SGP1 | 0665 | 0697 | | | | | | | | | |
| SGP2 | 0694 | 0689 | | | | | | | | | |
| SGP3 | 0695 | 0706 | | | | | | | | | |
| SGP4 | 0699 | 0666 | | | | | | | | | |
| SGP5 | 0713 | 0705 | | | | | | | | | |
| SIGN | 0399 | 0400 | | | | | | | | | |
| SKND | 1305 | 1283 | 1285 | | | | | | | | |
| SLCOD | 0328 | | | | | | | | | | |
| SLFND | 0202 | | | | | | | | | | |
| SLWST | 0447 | 1646 | 1668 | | | | | | | | |
| SNFLA | 0197 | | | | | | | | | | |
| SOUT | 0722 | 0565 | | | | | | | | | |
| SOUT1 | 0735 | 0730 | | | | | | | | | |
| SOUT2 | 0736 | 0729 | | | | | | | | | |
| SOUT3 | 0731 | 0738 | | | | | | | | | |
| SPA | 0975 | 0593 | | | | | | | | | |
| SPLFA | 0196 | | | | | | | | | | |
| SSBPT | 0395 | | | | | | | | | | |
| SSYMA | 0170 | 1572 | | | | | | | | | |
| ST | 0377 | 0867 | 0874 | 1012 | 1617 | 1714 | 1720 | | | | |
| STAR2 | 0490 | | | | | | | | | | |
| START | 0162 | 0007 | | | | | | | | | |
| STAT | 0943 | 0589 | | | | | | | | | |
| STBLK | 0758 | 0661 | 0722 | 0781 | 0796 | 1006 | 1625 | | | | |
| STEC | 0608 | 1171 | | | | | | | | | |
| STEXP | 0443 | 0898 | | | | | | | | | |
| STMAX | 0494 | | | | | | | | | | |
| STOR1 | 0428 | | | | | | | | | | |
| STORE | 0427 | 1209 | | | | | | | | | |
| STPFL | 0323 | 1521 | | | | | | | | | |
| STROP | 0430 | 0890 | | | | | | | | | |
| STSRH | 0442 | | | | | | | | | | |
| SUMPA | 0227 | | | | | | | | | | |
| SVAR | 0817 | 0802 | 0810 | | | | | | | | |
| SVARA | 0742 | 0701 | | | | | | | | | |
| SYF12 | 0485 | | | | | | | | | | |
| SYF25 | 0460 | | | | | | | | | | |
| SYMC1 | 0433 | 0678 | | | | | | | | | |
| SYMC2 | 0432 | | | | | | | | | | |
| SYMCK | 0434 | | | | | | | | | | |
| SYMTP | 0298 | | | | | | | | | | |
| SYSNT | 0570 | 1777 | | | | | | | | | |
| SYTSA | 0209 | | | | | | | | | | |
| T1 | 0516 | 0831 | 0839 | 0844 | 0855 | 0971 | 0993 | 1010 | 1429 | | |
| T2 | 0529 | 0656 | 0674 | 0708 | 0714 | 0716 | 0798 | 0840 | 0845 | 0859 | 1455 |
| T3 | 0530 | | | | | | | | | | |
| T5 | 0513 | 0728 | 0742 | 0749 | 0774 | 0782 | 0786 | 0817 | 1105 | 1117 | 1124 |
| | 1486 | 1507 | 1511 | 1634 | | | | | | | |
| T6 | 0531 | 1187 | 1198 | 1204 | 1210 | 1318 | 1340 | 1346 | 1365 | 1421 | |
| T7 | 0532 | 1320 | 1348 | 1350 | | | | | | | |
| T8 | 0514 | 0660 | 0897 | 1434 | 1469 | 1476 | 1589 | 1599 | | | |
| T9 | 0533 | 1016 | 1024 | 1089 | 1091 | 1381 | 1387 | 1505 | 1506 | | |
| TBEND | 0515 | 1473 | 1600 | | | | | | | | |
| TD | 0523 | 1084 | 1093 | | | | | | | | |
| TEMP | 0350 | 0351 | | | | | | | | | |
| TEMP1 | 0352 | 0888 | | | | | | | | | |
| TEMP2 | 0353 | 0891 | | | | | | | | | |
| TEMP3 | 0354 | | | | | | | | | | |
| TEMP4 | 0355 | | | | | | | | | | |
| TEMPS | 0349 | 0806 | 0812 | 0860 | 0866 | 0975 | 1007 | 1132 | 1135 | 1142 | 1152 |
| | 1154 | 1162 | 1170 | 1173 | 1179 | 1219 | 1222 | 1566 | 1570 | 1585 | 1626 |
| | 1627 | 1632 | 1641 | | | | | | | | |
| TERM | 0364 | 1000 | 1742 | 1760 | | | | | | | |
| TFLAG | 0318 | | | | | | | | | | |
| TFLG1 | 0322 | | | | | | | | | | |
| TFOR | 1184 | 1147 | | | | | | | | | |
| TMPA | 0203 | | | | | | | | | | |
| TMPOP | 0184 | 1717 | | | | | | | | | |
| TMPRE | 0521 | 1114 | 1495 | 1504 | | | | | | | |
| TNULL | 0527 | 1119 | | | | | | | | | |
| TREGE | 0372 | | | | | | | | | | |
| TSRHA | 0168 | | | | | | | | | | |
| TSTPT | 0300 | | | | | | | | | | |
| TTY | 0503 | 0970 | 0982 | 0998 | 1458 | 1480 | 1544 | 1548 | 1700 | | |
| TW | 0520 | 1079 | 1086 | | | | | | | | |
| TX | 0522 | 1087 | 1239 | 1244 | | | | | | | |
| TYPEC | 0641 | 1045 | 1642 | | | | | | | | |
| TYPFL | 0078 | | | | | | | | | | |
| UFLAG | 0392 | | | | | | | | | | |

CROSS-REFERENCE TABLE

| | | | | | | | |
|---|---|---|---|---|---|---|---|
| UKPTR | 0309 | | | | | | |
| UNITS | 0319 | | | | | | |
| UNNM | 1554 | 0944 | 0955 | 1008 | | | |
| UNSTK | 0448 | 1679 | 1681 | | | | |
| UPARA | 0191 | | | | | | |
| VALUE | 0297 | | | | | | |
| VAR01 | 0648 | 0751 | | | | | |
| VAROA | 0214 | 0675 | 0744 | | | | |
| WBUFF | 0423 | 1483 | | | | | |
| WIDTH | 0385 | 1693 | | | | | |
| WRIT2 | 1642 | 1653 | 1664 | 1731 | | | |
| WRIT4 | 1669 | 1675 | | | | | |
| WRIT5 | 1677 | 1673 | | | | | |
| WRIT6 | 1728 | 1701 | | | | | |
| WRIT7 | 1703 | 1694 | | | | | |
| WRITA | 1735 | 1671 | 1730 | | | | |
| WRITB | 1688 | 1683 | | | | | |
| WRITE | 0159 | | | | | | |
| WRITF | 1667 | 1647 | | | | | |
| WRITN | 1654 | 1643 | | | | | |
| WRITQ | 1663 | 1644 | | | | | |
| WRITS | 1652 | 1654 | | | | | |
| WRITX | 1659 | 1649 | | | | | |
| XC | 0412 | 1484 | 1485 | 1491 | 1496 | | |
| XEC4A | 0164 | 0808 | 0814 | 1537 | 1764 | | |
| XEC6A | 0221 | | | | | | |
| XFAR1 | 0425 | 1718 | | | | | |
| XFAR2 | 0429 | 0920 | 0943 | 0954 | 0987 | 1192 | 1393 |
| XFTO$ | 1495 | 1487 | | | | | |
| XSCRA | 0220 | | | | | | |
| YC | 0414 | | | | | | |
| ZAP | 0152 | | | | | | |
| ZONK | 0491 | 1095 | | | | | |

MICROPROCESSOR

Figure 3A:
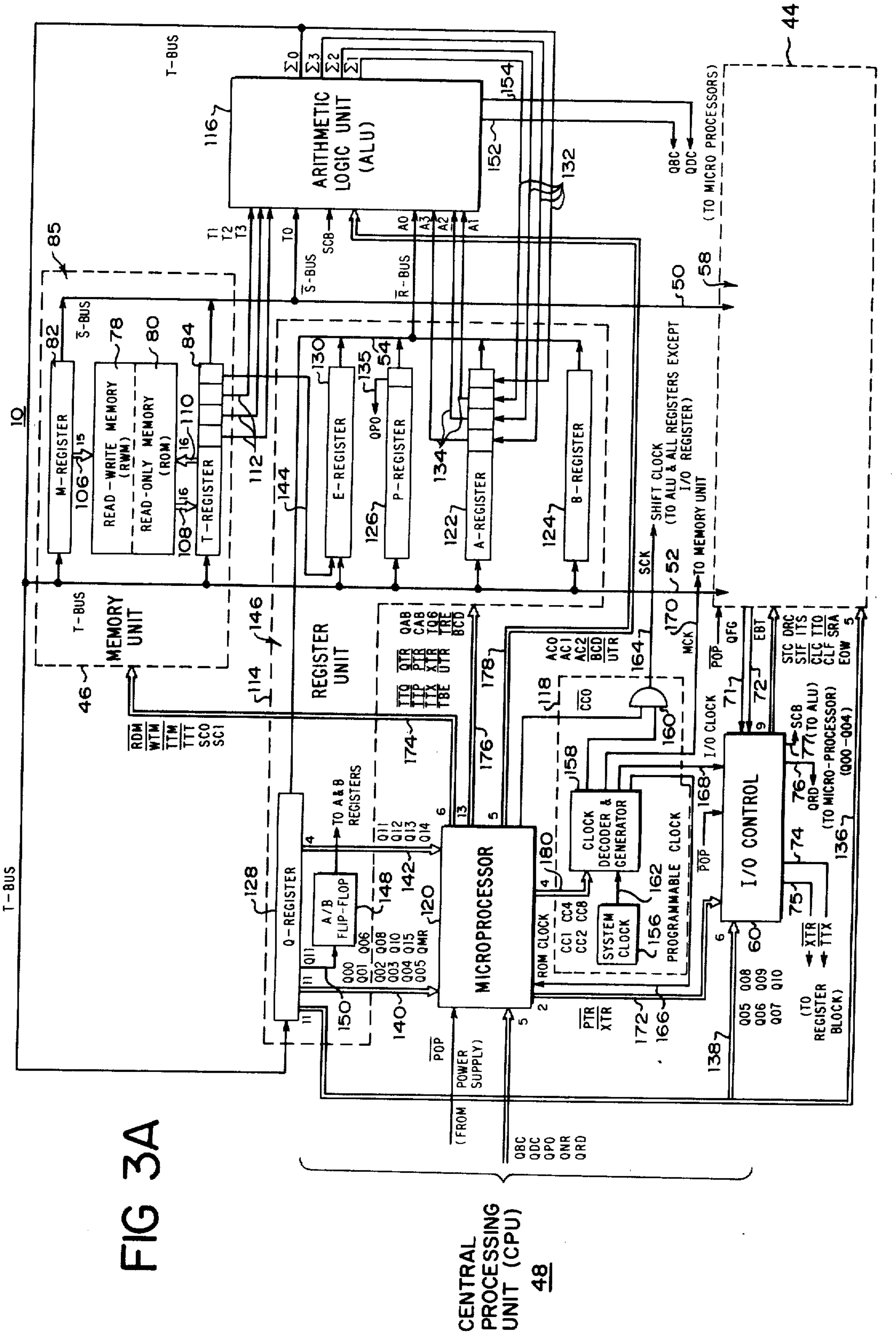
FIGS. 3A–B are a simplified block diagram of the adaptable programmable calculator of FIGS. 1 and 2.
Figure 3B:
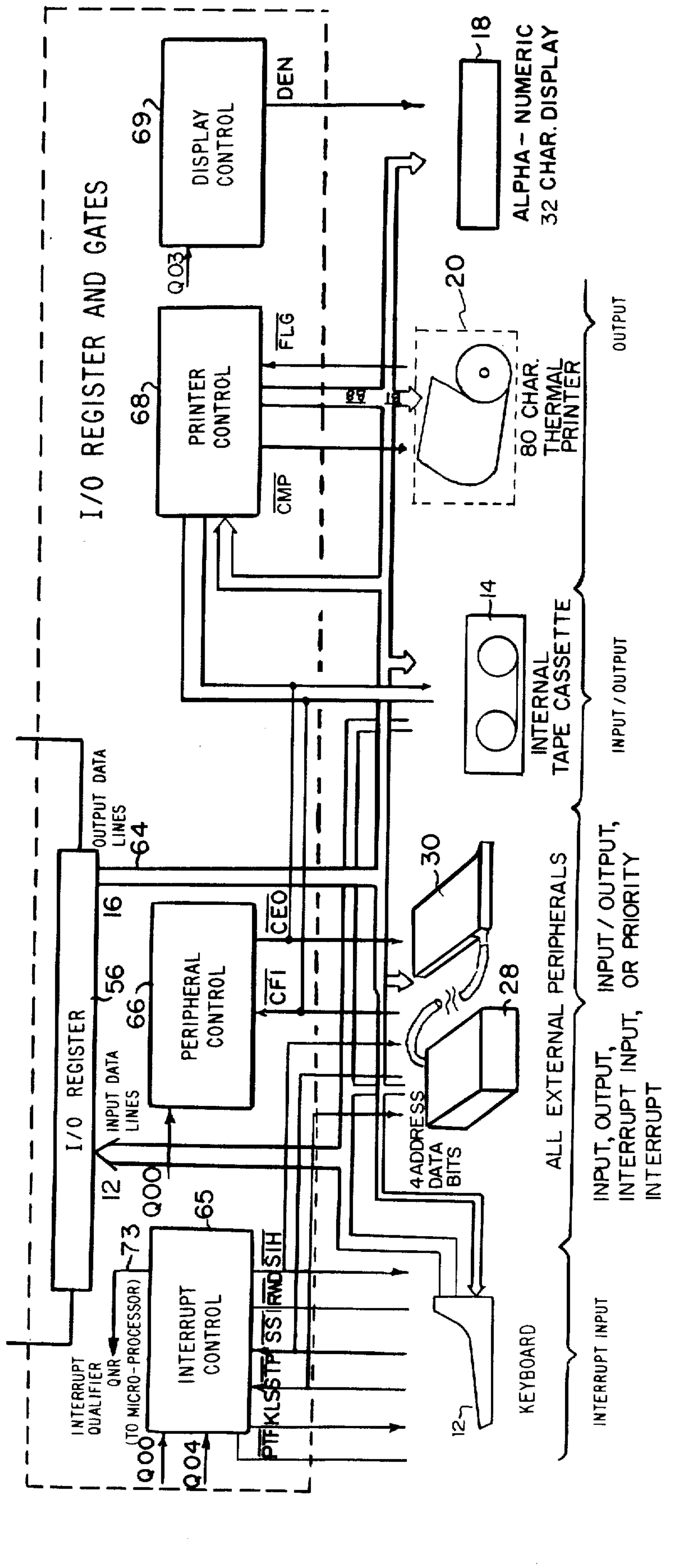
Figure 5:
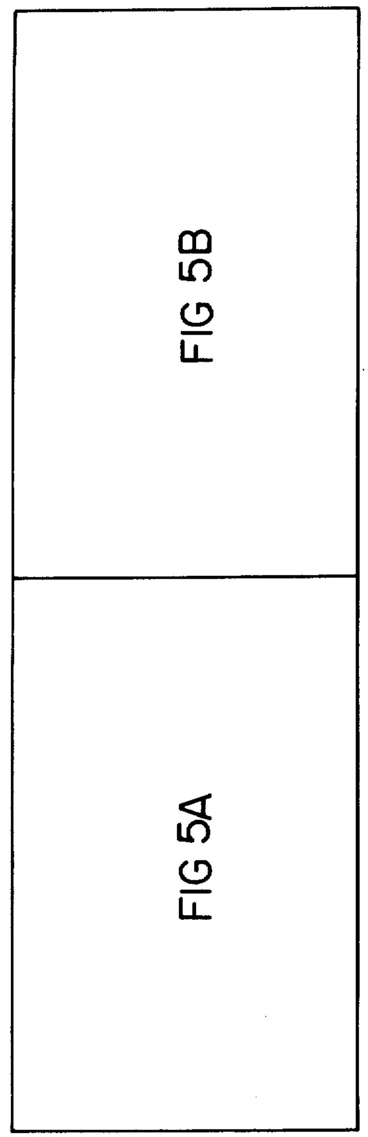
FIG. 5' is a diagram showing the arrangement of FIGS. 5A–B.

All of the above-listed routines and subroutines of basic instructions are implemented by the basic computing system shown in FIGS. 3A–B. Central control of this system is achieved by microprocessor 120. As shown in the block diagram of FIG. 27 and in the detailed scehmatic diagram of FIGS. 28 A–D, the microprocessor comprises a bipolar ROM 300 including seven ROM chips organized into 256 words of 28 bits. Eight J-K flip-flops contain the ROM address; (i.e. a 4-bit primary address and a 4-bit secondary address). A single chip 16-bit data selector permits any one of 16 different qualifier lines to be tested with a 4-bit qualifier code. This 4-bit qualifier code ROM chip serves a dual function in that it provides a complementing code to the 4 primary address flip-flops as well as selecting the proper qualifier to be tested. If branching in any ROM state is desired, the microinstruction BRC must also be given, BRC occurring with a QN (qualifier not met) signal from the data selector will cause the least significant bit of the address code to be inhibited to the secondary address flip-flop, thus causing the address to branch according to the state of the qualifier.

An additional feature of this ROM organization is the IQN microinstruction (inhibit if qualifier not met). When the IQN is given and the qualifier selected by the qualifier code is not met, the signal CCO (clock code zero) goes low. This inhibits all shift clock pulses from the clock decoder which in effect prevents execution of microinstructions in that ROM state.

To minimize the ROM word length, two 3-to-8 line decoders are used to expand 3 R-code outputs and 3 X-code outputs into a total of 14 microinstructions. Also the SCO and SCI outputs from ROM No. 5 are decoded in the Memory. The ALU code outputs AC0, AC1, and AC2 are treated as address inputs to the ALU ROM and therefore need no decoding.

The microprocessor is responsible for the following:

1. Issuing a four-bit clock code to the clock decoder during each ROM state.
2. Issuing microinstructions to the memory, including the read and write microinstructions.
3. Issuing microinstructions to the shift registers for gating serial data into or out of the proper registers.
4. Issuing a four-bit ALU code to the Arith Logic Unit to select the proper binary or BCD arithmetic function.
5. Performing logical decisions (branching) based on the states of 16 qualifier inputs to the microprocessor.
6. Issuing next address information to the ROM address flip-flops in the microprocessor.
7. Transferrinng control to the input/output controller via the I/O strobe for execution of input or output instructions.

The full set of 28 ROM outputs with their associated microinstructions, the list of 16 qualifiers and assigned codes, and the microprocessor mnemonics are contained in the following tables:

MICRO-INSTRUCTION SET TABLE

| CONTROL FIELD | ← POSITIVE TRUE → ROM OUTPUT | ← NEGATIVE TRUE → OUTPUTS DECODED μ-INSTRUCTION OUTPUT | FUNCTION |
|---|---|---|---|
| GENERAL | 1. IQN | | INHIBIT SHIFT CLOCK IF QUALIFIER NOT MET. |
| | 2. BRC | | BRANCH: INHIBITS S00 IF QUALIFIER NOT MET. |
| | 3. $\overline{TTT}$ | | T BUS ⟶ T REG |

-continued

| CONTROL FIELD | POSITIVE TRUE ROM OUTPUT | NEGATIVE TRUE OUTPUTS DECODED μ-INSTRUCTION OUTPUT | | | | FUNCTION |
|---|---|---|---|---|---|---|
| | 4. $\overline{TTM}$ | | | | | T BUS → M REG |
| | 5. $\overline{XTR}$ | DECODED IN MEMORY | | | | A/B REG → R BUS |
| | | | SC1- | SC0 | | |
| S-CODE | 6. SC1 | ZTS | 0 | 0 | | ZERO → S BUS |
| | 7. SC0 | MTS | 0 | 1 | | M REG → S BUS |
| | | TTS | 1 | 0 | | T REG → S BUS |
| | | UTS | 1 | 1 | | ONE → S BUS |
| | | DECODED IN MICROPROCESSOR | RC2 | RC1 | RC0 | |
| R-CODE | 8. RC2 | UTR | 0 | 0 | 0 | ONE → R BUS |
| | 9. RC1 | PTR | 0 | 0 | 1 | P REG → R BUS |
| | 10. RC0 | TRE | 0 | 1 | 0 | T REG → E REG → R BUS |
| | | WTM . 2TR | 0 | 1 | 1 | store contents T REG → MEMORY |
| | | TQ6 . 2TR | 1 | 0 | 0 | T BUS → Q REG (BIT 6) |
| | | QTR | 1 | 0 | 1 | Q REG → R BUS |
| | | RDM . ZTR | 1 | 1 | 0 | READ MEMORY <M> → T REG |
| | | ZTR | 1 | 1 | 1 | ZERO → R BUS |
| | | DECODED IN MICROPROCESSOR | XC2 | XC1 | XC0 | |
| X-CODE | 11. XC2 | TTQ | 0 | 0 | 0 | T BUS → Q REG |
| | 12. XC1 | QAB | 0 | 0 | | Q REG (BIT n) → AB FLIP-FLOP |
| | 13. XC0 | BCD | 0 | 1 | 0 | BCD ARITHMETIC MODE OF ALU |
| | | TBE | 0 | 1 | 1 | T BUS → E REG → R BUS |
| | | CAB | 1 | 0 | 0 | COMPLEMENT THE AB FLIP-FLOP |
| | | TPP | 1 | 0 | 1 | T BUS → P REG |
| | | TTX | 1 | 1 | 0 | T BUS → A/B REG |
| | | NOP | 1 | 1 | 1 | NONE OF THE ABOVE |
| | | DECODED IN ALU | AC2 | AC1 | AC0 | |
| ALU | 14. AC2 | XOR | 0 | 0 | 0 | EXCLUSIVE OR . . . . . R ⊕ S → T BUS |
| | 15. AC1 | AND | 0 | 0 | 1 | LOGICAL AND . . . . . R · S → T BUS |
| | 16. AC0 | IOR | 0 | 1 | 0 | INCLUSIVE OR . . . . . R + S →sd,5 T BUS |
| | | ZTT | 0 | 1 | 1 | ZERO → T BUS |
| | | ZTT . CBC | 1 | 0 | 0 | ZERO → T BUS, CLEAR BINARY CARRY |
| | | IOR . CBC | 1 | 0 | 1 | INCLUSIVE OR, CLEAR BINARY CARRY |
| | | IOR . SBC | 1 | 1 | 0 | INCLUSIVE OR, SET BINARY CARRY |
| | | ADD | 1 | 1 | 1 | BINARY ADD |

| CONTROL FIELD | ROM OUTPUT | FUNCTION |
|---|---|---|
| CLOCK | 17. CC1<br>18. CC2<br>19. CC4<br>20. CC8 | THIS 4-BIT CODE INITIALIZES A PRESETTABLE DOWN COUNTER TO GENERATE ANY NUMBER OF SHIFT CLOCKS FROM 1 THROUGH 16.<br>SHIFT IS INHIBITED BY IQN IF QUALIFIER NOT MET. |
| QUALIFIER | 21. QC3<br>22. QC2<br>23. QC1<br>24. QC0 | THIS 4-BIT CODE PERFORMS TWO FUNCTIONS:<br>(1.) ADDRESSING THE DATA SELECTOR TO SELECT ONE OF SIXTEEN QUALIFIER INPUTS,<br>(2.) PROVIDES COMPLEMENT CODE TO PRIMARY FLIP-FLOPS |
| SECONDARY ADDRESS | 25. S03<br>26. S02<br>27. S01<br>28. S00 | 10 THIS 4-BIT-CODE PROVIDES COMPLEMENT CODE TO THE SECONDARY FLIP-FLOPS.<br>IF BRC IS GIVEN AND QUALIFIER IS NOT MET, THE S00 BIT IS INHIBITED |

-continued

SPECIAL MICRO-INSTRUCTIONS:

TQR = UTR . XTR . . . . . TRANSFERS Q-REGISTER TO PRIMARY ADDRESS AS SHOWN

- Q14 . Q11 ⟶ PO4
- Q12 ⟶ PO5
- Q13 ⟶ PO6
- Q14s,6 ⟶ PO7

IOS = PTR · XTR . . . . . INITIATES:
a) TRANSFER OF CONTROL TO I/O if Q10 = 1
b) SETS "SINGLE SERVICE" FF IN I/O VIA $\overline{SRA}$ IF Q10 = 0

SPECIAL OPERATIONS:

BCD SUM ⟶ $A_{<0\text{-}3>}$ = BCD . $\overline{UTR}$ . ROM CLOCK

CLEAR DECIMAL CARRY = QAB . ROM CLOCK

SET DECIMAL CARRY = UTR . BCD . ROM CLOCK

DECIMAL ADD = BCD . ZTT . . . . . $T_{<0\text{-}3>} + A_{<0\text{-}3>} \longrightarrow Q_{<0\text{-}3>}$ 10'S COMPLEMENT W/DECIMAL ADD = $\overline{0}$ BCD . ADD . . . . .

. . . . . $\overline{T_{<0\text{-}3>}} + A_{<0\text{-}3>} \longrightarrow Q_{<0\text{-}3>}$

QUALIFIER SET TABLE

| QUALIFIER CODE QC3 | QC2 | QC1 | QC0 | MNEMONIC | FUNCTION |
|---|---|---|---|---|---|
| 0 | 0 | 0 | 0 | Q00 | SHIFT/SKIP ONE BIT |
| 0 | 0 | 0 | 1 | Q01 | SHIFT/SKIP TWO BITS |
| 0 | 0 | 1 | 0 | Q02 | SHIFT/SKIP FOUR BITS |
| 0 | 0 | 1 | 1 | Q03 | SHIFT/SKIP EIGHT BITS |
| 0 | 1 | 0 | 0 | Q04 | FAST SQUARE ROOT QUALIFIER |
| 0 | 1 | 0 | 1 | Q05 | SET BIT IN G/S GROUP; FDV QUALIFIER |
| 0 | 1 | 1 | 0 | Q06 | T-BUS QUALIFIER VIA TQ6 |
| 0 | 1 | 1 | 1 | QBC | BINARY CARRY FROM ALU |
| 1 | 0 | 0 | 0 | QP0 | P REGISTER, BIT 0, FOR BCD COUNTING |
| 1 | 0 | 0 | 1 | Q15 | INDIRECT ADDRESS, CLEAR BIT IN G/S GROUP |
| 1 | 0 | 1 | 0 | QMR | MEMORY REFERENCE QUALIFIER |
| 1 | 0 | 1 | 1 | Q10 | CURRENT PAGE QUALIFIER, FXA QUALIFIER |
| 1 | 1 | 0 | 0 | QNR | NON-SERVICE REQUEST QUALIFIER |
| 1 | 1 | 0 | 1 | Q08 | FMP QUALIFIER |
| 1 | 1 | 1 | 0 | QDC | DECIMAL CARRY FROM ALU |
| 1 | 1 | 1 | 1 | *QRD | ROM DISABLE (NORMALLY ZERO) |

POP WILL PRESET ROM ADDRESS FLIP-FLOPS AT TURN-ON

*QRD MAY BE USED WITH ION TO INSURE ZERO SHIFT EXCEPT WHEN IN I/O LOOP

MICROPROCESSOR MNEMONICS

| | |
|---|---|
| Clock Signals | |
| $\overline{MCK}$ | Memory Clock |
| SCK | Shift Clock |
| XTC | External Clock |
| RCF | ROM Clock for Flip Flops |
| RCA | ROM Clock for Address Flip Flops |
| $\overline{IIC}$ | Inhibit Internal Clock |
| $\overline{INH}$ | Inhibit Clock |
| $\overline{IPS}$ | Inhibit ROM Clock (Also primary and secondary Flip Flop) |
| CC8, CC4, CC2, CC1 | Clock Code: Binary Code that programs the number of shift clocks |
| $\overline{CC0}$ | Inhibits Shift Clocks |
| Address Mnemonics | |
| $\overline{POP}$ | Power on Preset |
| IQN | Inhibit if Qualifier not met |
| BRC | Branch |
| Q-Register | |
| $\overline{TQR}$ | Transfer Q11, Q12, Q13, Q14, to primary addr. Flip Flops |
| $\overline{TTQ}$ | T-Bus to Q-Register |

-continued

MICROPROCESSOR MNEMONICS

| | |
|---|---|
| $\overline{QTR}$ | Q-Register to R-Bus |
| Q10, Q9, Q8, Q7, Q6, Q5, Q4, Q3, Q2, Q1, Q0 | Bits 10 – 0 of Q-Register |
| Data Qualifiers | |
| $\overline{QP0}$ | Bit 0 of P-Register |
| QRD | Qualifier ROM Disable (I/O interupt) |
| QNR | Qualifier No Request (Keyboard Interupt) |
| QDC | Decimal Carry |
| QBC | Binary Carry |
| Memory | |
| $\overline{SC0}$, SCI | S-Bus Code |
| $\overline{TTT}$ | T-Bus to T-Register |
| $\overline{TTM}$ | T-Bus to M-Register |
| $\overline{RDM}$ | Read Memory |

-continued

| MICROPROCESSOR MNEMONICS | |
|---|---|
| $\overline{WTM}$ | Write Memory |
| A, B, P, E-Registers | |
| $\overline{QAB}$ | Q-Register to B Flip Flop |
| AB = 0 | A-Register Operation |
| $\overline{AB}$ = 0 | B-Register Operation |
| $\overline{TTX}$ (ROM) | T-Bus to A or B Register (Originates at ROM Decoder) |
| $\overline{XTR}$ | A or B Register to $\bar{R}$-Bus |
| $\overline{TTP}$ | T-Bus to P-Register |
| $\overline{PTR}$ | P-Registers to $\bar{R}$-Bus |
| $\overline{TBE}$ | T-Bus to E-Register to$\bar{R}$-Bus |
| $\overline{TRE}$ | T-Register to E-Register |

-continued

| MICROPROCESSOR MNEMONICS | |
|---|---|
| $\overline{UTR}$ | Units to $\bar{R}$-Bus |
| AC2, AC1, AC0 | Arithmetic Codes for Arithmetic Logic Unit |
| $\overline{BCD}$ | Decimal Arithmetic |
| SDR | Disables ROMs for Single Step Tester Operation |

Each of the ROM chips of FIGS. 27 and 28A–D is organized into 256 words of 4 bits each constructed in accordance with the following table, where each L represents a low (or 0) state and each H represents a high or (1) state:

ROM CHIP 3

| | | | | | | | | | |
|---|---|---|---|---|---|---|---|---|---|
| 0016 | 000-007 | LLLL | LLHL | HHHH | LHHL | HHHH | LHHH | HHLH | HHLH |
| 0017 | 008-015 | LHLL | LHLL | HLHH | LHHL | HLHL | LHLH | LLLL | LLLL |
| 0018 | 016-023 | LHHH | LHHH | LLLL | LHHH | LLLL | LLLL | LHLL | HHLL |
| 0019 | 024-031 | LLHL | LLHL | LHLH | HLHL | LHLL | HLHL | LLLL | LLLL |
| 0020 | 032-039 | LHLL | LLLL | HHLL | LLLL | HLLL | HLLL | LLHL | HLLH |
| 0021 | 046-047 | LLHH | LLHH | LLLL | LLLL | LHLH | HLLL | HHLH | LHHH |
| 0022 | 048-055 | HLLL | HHLL | LLLH | LLLH | LHHL | LLLH | HLHH | HLHH |
| 0023 | 056-063 | LLLH | LLLH | HHLL | LHLH | LLLH | HHLH | HLHH | LHLL |
| 0024 | 064-071 | LHHL | LHHH | HLHH | HHHL | LLLL | HLLL | LHHL | HLHH |
| 0025 | 072-079 | LLLH | LLLH | HLHH | LHLL | HLLL | LLHL | LLLL | HLLH |
| 0026 | 080-087 | LHHH | LHLH | HLLL | LHHL | HLHH | HHLL | LLLL | LLLL |
| 0027 | 088-095 | LLHH | LLLL | HHHH | LHHH | LLLL | LLHH | LLLL | LHLL |
| 0028 | 096-103 | HHHL | HLLL | LHHL | LHHH | LHHH | LHHH | LHHH | HHHH |
| 0029 | 104-111 | LLHH | LLHL | LHLL | LLLL | LLLL | LHLH | HHLL | HHLL |
| 0030 | 112-119 | LLLH | LLLH | LLLL | LHLH | LHLH | LHLH | HLLH | LHHH |
| 0031 | 120-127 | LLLL | LHLH | HHHH | LHHL | LLLH | LHLL | LLLL | LHLH |
| 0032 | 128-135 | HLHL | LHLL | HHLL | LHLH | LHHH | HLHH | LLLL | LLLL |
| 0033 | 136-143 | LHLH | LLHL | LLHH | HHLH | LLHL | HLHL | HLLH | LHLL |
| 0034 | 144-151 | LLLL | LLHL | HLLH | HLLL | HLLH | LLLH | HLLH | HLLH |
| 0035 | 152-159 | HHHL | LHHH | HLHH | HLLH | LLLH | LLLL | LHHH | HHLH |
| 0036 | 160-167 | HLLL | HHHL | LLLH | HHHL | LHHH | LLHL | LLHL | HHHH |
| 0037 | 168-175 | LHHL | HLLL | LHLL | HLHL | LLLL | LLLH | LHLL | HLLL |
| 0038 | 176-183 | LLLL | LHHL | LLHL | HLLH | LHHH | LLHH | HLHH | HLHH |
| 0039 | 184-191 | LHHH | HLLL | LLHL | LLHL | LHLH | LLLL | LLHL | LLLL |
| 0040 | 192-199 | LLLH | LLLL | LLLH | LLLH | HHLH | HHLH | LLHH | HLHH |
| 0041 | 200-207 | HHHH | LHLH | HLLH | LHLL | HHLH | LHLH | LLLL | LLLL |
| 0042 | 208-215 | HLHH | HLLL | LHHL | LLLH | HHHL | LLHL | HLHL | HLHL |
| 0043 | 216-223 | HHHH | HHLH | LLLL | LLLL | LLLL | LHLL | LLLH | HLLH |
| 0044 | 224-231 | HLLH | HLLH | LLLL | LLLL | HHLH | HLLL | LHHL | HHHL |
| 0045 | 232-239 | LLLL | HHHL | HLLL | HLLH | HHLL | HLHL | LLLL | LHHH |
| 0046 | 240-247 | LLHL | LLHL | LLHH | LLLL | LLLH | HHLH | LLHL | LHLL |
| 0047 | 248-255 | LHLL | LHLH | HLLL | LHHH | LLLL | LLLL | LHLH | LLLL |
| 0048 | | | | | | | | | |

ROM CHIP 4

| | | | | | | | | | |
|---|---|---|---|---|---|---|---|---|---|
| 0053 | 000-007 | HLHL | HLLH | LLLH | HLLL | LHHL | HLLL | HLHH | LLHH |
| 0054 | 008-015 | LHHH | HHLH | HLLL | HLLL | HLLH | LHHL | HLLL | LHHH |
| 0055 | 016-023 | HLLL | LLHH | LLHL | LLLL | HLHH | HLLH | LLLL | LLLH |

ROM CHIP 4 -continued

| | | | | | | | | | |
|---|---|---|---|---|---|---|---|---|---|
| 0056 | 024-031 | LLLL | LLLL | HLHL | LLHL | LLLL | LLLH | LHLL | LHHH |
| 0057 | 032-039 | LHLH | HLLH | HLLL | HLHH | LHLH | HHLH | HHLL | HLLL |
| 0058 | 040-047 | LLLL | LLLL | HHLH | HHLL | HHLH | HHLL | HLLH | HLHL |
| 0059 | 048-053 | HHHH | LLHH | LLLL | HLLL | LLLL | HLHH | HHLL | LHLL |
| 0060 | 056-063 | LLLH | LLLH | HHHL | HHHL | LLLL | HLLL | HLHL | LLLL |
| 0061 | 064-071 | LLLH | HHLH | HHLH | HLLL | HLHL | LLLL | HHHH | HLHH |
| 0062 | 072-079 | LLLL | LLLL | HLHL | LLHL | LLHH | HLLL | LHLH | LLHH |
| 0063 | 080-087 | HHHL | HLHH | HLHL | HLLL | LLLL | HHLH | LHLL | LLLH |
| 0064 | 088-095 | HLLL | LHLH | HHHL | HHLL | LHHH | LHLL | HLLL | LLLL |
| 0065 | 096-103 | HHHL | HLHH | HLLL | HLHL | HHHH | HHLL | HHHL | LLHL |
| 0066 | 104-111 | LLLL | LLLL | LHLL | LLHL | HLLL | LLLL | HLHL | LLHH |
| 0067 | 112-119 | LHHH | LHLH | HLLL | HLLL | LLHH | HLHH | HHHH | LHLL |
| 0068 | 120-127 | LLHL | HHHH | HLLL | HLHH | LHLL | HLLH | HLLH | HHHL |
| 0069 | 128-135 | LLLH | HLHH | LHHL | HLHH | HLHH | HLLH | HLHH | LLHH |
| 0070 | 136-143 | HLLH | LHLL | HLHL | LLHH | LLLL | HHHH | LLLL | HLLH |
| 0071 | 144-151 | HLHL | HLHL | HLLL | HLLH | HLHH | LHLL | HHLL | HHLL |
| 0072 | 152-159 | HLLL | HLLH | HLHL | HHHH | LLLL | HLLL | HLHL | LHLL |
| 0073 | 160-167 | LLLH | HHHL | HHHL | LLHH | HHHL | HLHH | HHHH | HHHL |
| 0074 | 168-175 | HLLL | HHLH | LHLL | HLLL | HLLL | LLLL | LLHL | LLLH |
| 0075 | 176-183 | HHLL | HLLH | HLLH | HLLL | HHHH | HLLL | HHLL | LHLL |
| 0076 | 184-191 | HLLL | LLHH | LHLL | HHLL | LLHH | HLLL | LHLH | LHHH |
| 0077 | 192-199 | LHHL | HLLH | LLLL | HLLL | HLHH | HLLL | HHHL | HHHL |
| 0078 | 200-207 | LLHL | HHHH | HHHL | HHHL | LLHH | LLLH | HLLL | LHHH |
| 0079 | 208-215 | LHHH | HLLL | HLLL | LLLH | HLHL | LLLH | LHLL | LHHL |
| 0080 | 216-223 | LLHL | HLHL | HLHL | LLHL | HLLL | LLLL | LLLL | HLHL |
| 0081 | 224-231 | HLLL | HLLH | LHHL | HHLL | HLLL | LHLL | LHLL | LHHH |
| 0082 | 232-239 | HHLL | LLHH | LLHL | LHLH | LHHH | LLLL | HLLL | LLHH |
| 0083 | 240-247 | HHLL | LHLL | LLHH | HLLL | HLLL | HLHH | LHLL | LHLL |
| 0084 | 248-255 | LLHH | HHLH | LLLH | LLLL | HHLL | HHLH | LHLL | HLLL |
| 0085 | | | | | | | | | |

ROM CHIP 5

| | | | | | | | | | |
|---|---|---|---|---|---|---|---|---|---|
| 0090 | 000-007 | HHHH | LLLL | LLLL | HHHH | LLLL | LLLL | LLLH | LLLH |
| 0091 | 008-015 | HHHH | LLLL | HLLH | LLLL | HHHH | HHHH | LLLL | LLHH |
| 0092 | 016-023 | LLLL | LLLL | LLLL | LLHH | LLLL | HHHH | HLHH | LLLL |
| 0093 | 024-031 | LLHH | LLHH | LLLL | LHLH | LLHH | LHLH | HLHH | HLHH |
| 0094 | 032-039 | HHHH | LLLL | LLLL | LLLL | HLHH | HLHH | HHHL | LLLL |
| 0095 | 040-047 | LHHH | LHHH | LLLL | LLLL | LLHH | HLHH | LLLL | LLLH |
| 0096 | 048-055 | LHLH | HLHH | LLLL | HHHH | LLLL | LLLL | LLLL | LLLL |
| 0097 | 056-063 | LLLH | LLLH | LLHH | LLHH | LLLL | HLHH | HHHH | HHHH |
| 0098 | 064-071 | HHHH | HLHH | LLHH | LLLL | LLLH | LLLL | LLLL | LHLH |
| 0099 | 072-079 | HHHH | LLLH | HHHH | LLLL | HHHH | HHHH | LLLH | HHHL |
| 0100 | 080-087 | LLLL | LLLL | HLHH | LLLL | HHHH | HHHH | HHHH | HHHH |
| 0101 | 088-095 | LHHH | LLLL | LLLH | LLLL | LHLL | LLHH | LLHL | HHLL |
| 0102 | 096-103 | HHHH | HLHH | HLHH | HLHH | LLHH | HLHH | LLLL | LLLH |
| 0103 | 104-111 | LLLL | LLHH | HHHH | HHHH | HLHH | HHHH | HHHH | LLLL |
| 0104 | 112-119 | HHHH | HLHH | HHHL | LLLL | LLHL | LLLL | LLHH | LLLL |
| 0105 | 120-127 | HLHH | LLLL | LLHH | HLHH | LLHH | HHLH | LLLL | HHHH |
| 0106 | 128-135 | HHHH | LHLH | HHHH | LLLL | LLLH | LLHH | LLLL | LLLL |
| 0107 | 136-143 | HHHH | HHHH | LHLH | HLHH | HLHH | HLHH | LLLL | LLLH |
| 0108 | 144-151 | LLLL | LLHH | HLHH | LLHH | LLLL | HHHL | LLLL | HHHL |
| 0109 | 152-159 | LLLL | LLLL | LLLL | LHLL | HHHH | HLHH | LLHH | LHLL |
| 0110 | 160-167 | HHHH | HHHH | LHLH | LLHL | HHHH | LLLL | HHHH | LLLH |

ROM CHIP 5 -continued

| | | | | | | | | | |
|---|---|---|---|---|---|---|---|---|---|
| 0111 | 168-175 | HHHH | HHHH | HHHH | LLLL | HHHH | HHHH | HHHH | LHLL |
| 0112 | 176-183 | HHHH | LHLH | HHHH | HHHH | LLLL | LLHL | HHHL | LLLL |
| 0113 | 184-191 | HHHH | HLHH | LHLH | LHLH | HHHH | HLHH | LLHH | LLHH |
| 0114 | 192-199 | HHHH | HLHH | HHHH | HHHH | LHLH | HLHH | LHLH | LHLH |
| 0115 | 200-207 | LLLL | HHHL | HHHH | LLLH | HHHH | LLLL | HLHH | HHHH |
| 0116 | 208-215 | HHHH | LLHH | HLHH | HHHH | LLHH | HHHH | LLLL | HHHH |
| 0117 | 216-223 | LLLL | HLHH | LLLL | LLLL | HLLH | LHLH | LHLH | LLLL |
| 0118 | 224-231 | LLLL | LLLL | LLLL | HHHL | HLHH | HLHH | LLHL | LLLL |
| 0119 | 232-239 | HHHH | LLLL | HLHH | HHHH | LLLL | LLLL | HHHL | HHHL |
| 0120 | 240-247 | LLHH | LLLL | LHLL | LLLH | HHHH | HHHH | HLLH | LHLH |
| 0121 | 248-255 | HHHH | LLLL | HLHH | LLHH | HHHH | LLLL | HHHH | HHHH |
| 0122 | | | | | | | | | |

ROM CHIP 6

| | | | | | | | | | |
|---|---|---|---|---|---|---|---|---|---|
| 0127 | 000-007 | LHHL | LHHH | HHHL | LLHH | HHHL | HLHH | HHHL | HHHL |
| 0128 | 008-015 | LLHL | LLHH | LLHH | LHLH | LHLH | LHLL | LHHH | LHLH |
| 0129 | 016-023 | LHHH | LHHH | LHHH | LHHL | LLLH | LHHL | LHHH | LHHH |
| 0130 | 024-031 | HHHH | HLHH | LLHH | LLLH | LHLH | LLLH | LHHH | LHHH |
| 0131 | 032-039 | LLLL | LHHH | LHHH | LHHH | LHLH | LHHH | LHHL | HHHH |
| 0132 | 040-047 | HHHH | HLHH | HHHH | HLHH | HLHH | LHLH | LHHH | HHHL |
| 0133 | 048-055 | LLLH | LHLH | LHHH | LHLL | LHHH | LLLH | LLHH | LLHH |
| 0134 | 056-063 | HHHH | HLHH | LHHH | LHHH | LHHH | LLHH | LHLH | LLLH |
| 0135 | 064-071 | LLHH | LHHL | LHHH | LHHH | LHHL | LHLH | HLHH | LLLH |
| 0136 | 072-079 | LHHH | HLHL | LHHL | LHHH | LHLH | LHHL | LLHL | LHHH |
| 0137 | 080-087 | LHHH | LHHH | LLHH | HHHL | LHHH | LHHL | LHLH | LHHH |
| 0138 | 088-095 | HLHL | HLHL | LLHH | LHHH | LHHH | LHHL | LLHH | LHHH |
| 0139 | 096-103 | LLHL | LHHH | LHHH | LHHL | LHLH | LHHL | LHHH | HHHL |
| 0140 | 104-111 | LLHH | HLHL | LHHH | LLHL | LLHH | LHHL | LHLH | LHHH |
| 0141 | 112-119 | LHLL | LHHH | LHHL | LHLH | LLLH | LHHH | HHLH | LHHH |
| 0142 | 120-127 | LHLH | HLHH | LHLL | LHHH | LHHH | LHHH | LHLH | LHHH |
| 0143 | 128-135 | LLHL | LHHH | LHHL | LHHH | LHLH | LHHH | LHLH | LHLH |
| 0144 | 136-143 | LHHL | LLHH | LLLH | LHLH | LHLH | LHHH | LHHH | LLLH |
| 0145 | 144-151 | LHHH | LHHH | LLLH | LHLL | LHHH | LHHH | LLHH | HHHL |
| 0146 | 152-159 | HLHL | HHHL | LHHH | LHHH | LHHH | LLHH | LHHH | LLHH |
| 0147 | 160-167 | LHLL | LLLL | LLLH | LLHH | LHHH | LLHH | LHLH | LLHH |
| 0148 | 168-175 | LLLL | LLHL | LHHH | LHHH | LHHH | LHLH | LHHH | LHHH |
| 0149 | 176-183 | LHHH | LHHH | LHLH | LHLH | LHLH | LLHH | LHHL | LHHH |
| 0150 | 184-191 | LLHL | LLHH | LHHH | LHHH | LHLH | LHHH | LHHH | LLHH |
| 0151 | 192-199 | LHLH | LLHH | LHLH | LHHH | LHLH | LHHH | LLLH | LLLH |
| 0152 | 200-207 | HLLH | HHHL | LHHL | LHHH | LHHL | LHHH | LHLH | LHHH |
| 0153 | 208-215 | LHLH | LHLL | LHLH | LHLH | HHHH | LHLH | LHHH | LHHH |
| 0154 | 216-223 | HLHH | LHHH | LHHH | LHHH | LLHH | LHHH | LHLH | LLHH |
| 0155 | 224-231 | HLHH | HHHL | LHHH | LHHH | LLHH | LHLH | LHHH | HLH |
| 0156 | 232-239 | HLLL | LHHH | LLLH | LLHH | LLLH | LHHH | LLHH | LHH |
| 0157 | 240-247 | LHLL | LHHH | LHLH | LLLH | LHLL | LHLH | LLHH | LLL |
| 0158 | 248-255 | LLHL | LHHH | LHHH | LHLL | LHLH | LHLH | LHHH | LHH |
| 0159 | | | | | | | | | |

ROM CHIP 7

| | | | | | | | | | |
|---|---|---|---|---|---|---|---|---|---|
| 0164 | 000-007 | LHHH | HHHH | LLLL | LLLH | LLLL | HHHH | LHHH | LHHH |
| 0165 | 008-015 | LLLH | HLLH | HHHH | HHHH | LLHL | LHHH | LHHH | LHLH |
| 0166 | 016-023 | LHLL | LHLL | LHHH | LHHH | LHHH | LHHH | LLHH | LHHH |
| 0167 | 024-031 | LHHH | LLLL | LHHH | LHHH | LLHL | LHHH | LHHH | LLHH |
| 0168 | 032-039 | LHHH | LHHH | LHLL | HHHH | LLLL | LHHH | LHHH | HHHH |
| 0169 | 040-047 | LHHH | LLLL | LHHH | LLLL | HHHH | HHHL | HHLH | LHLL |
| 0170 | 048-055 | LHHH | LHHL | LHHH | LHHH | LHLH | LHHH | LHHH | LLLL |
| 0171 | 056-063 | LHHH | LLLL | LHHH | LLLL | LHHH | HHHL | HLHL | LLLL |
| 0172 | 064-071 | LHHH | HHHH | LHHH | HHHH | LHHH | LHLL | HLLL | HHHH |
| 0173 | 072-079 | LLLH | LHHH | LHHH | LHHH | LHLL | LHHH | LHHH | LHHH |
| 0174 | 080-087 | LHLL | HHLL | HHHL | HHHH | LHHH | LHLL | LLLL | LLLL |
| 0175 | 088-095 | LHHH | LHHH | LHHH | LHHH | LHLL | LHHH | LHHH | LHHH |
| 0176 | 096-103 | LHHH | HHHL | HLHH | HHHH | HHHH | HHHH | HHLL | LHHH |
| 0177 | 104-111 | LLLH | LHHH | LLLL | LHHH | LLHH | LHHH | HLLL | LHHH |
| 0178 | 112-119 | LHHH | LHHL | LHHH | LHHH | LHHH | LHHH | LHHH | LHHH |
| 0179 | 120-127 | LHHH | HLLL | LHHH | LLHH | LLLL | LHHH | LHLL | LHHH |
| 0180 | 128-135 | LHHH | HLLL | LHHH | HHHH | HHHH | HHHH | LLLL | LHHH |
| 0181 | 136-143 | HHHH | LHHH | LHHH | LLHH | LHHL | LHHL | LHHH | HLLL |
| 0182 | 144-151 | LLLL | HHHH | HLHH | HHHH | HHHH | LHHH | LLLL | HHHH |
| 0183 | 152-159 | LLLH | LHLL | HHHH | LHLH | LHHH | LLHH | HHHH | HLLL |
| 0184 | 160-167 | LHHH | LHHH | LHHH | LLLL | LLLL | HLLH | LHLL | HHHH |
| 0185 | 168-175 | LLLH | LHHH | LHLL | HHHH | LLLL | LHLL | LHLL | LHLL |
| 0186 | 176-183 | LLLL | HHHH | LLLL | LLLL | LLLH | HLLH | LHHH | LHHH |
| 0187 | 184-191 | LLLH | LHHL | LHHH | LHHH | LHLH | LHHL | LHLH | LLLL |
| 0188 | 192-199 | LLLL | HHHL | LLLL | LHHH | HHHH | HHHH | HHHH | HHHH |
| 0189 | 200-207 | LLLH | HHHH | LHLH | HLLL | LHHH | LHHH | LLHH | LLLL |
| 0190 | 205-215 | LHHH | HHHH | HLHH | LHLL | HHHH | LLHL | LHHH | LHHH |
| 0191 | 216-223 | LLLH | HLHH | LLLH | LLLH | LLLL | LHHH | LHHH | HHHH |
| 0192 | 224-231 | HLLL | HHHH | LHHH | LHLL | HHHL | LLHH | LLLL | LHHH |
| 0193 | 232-239 | HHHH | LHHH | LLHH | LLLL | LHHH | LHLH | LHHH | LHHH |
| 0194 | 240-247 | LHHH | LHHH | LLLL | LLLL | HHHH | LLHL | LLLH | LHHH |
| 0195 | 248-255 | LHHH | HHHH | LLHH | LHHH | HHHH | HLLH | LHHH | LHHH |
| 0196 | | | | | | | | | |

ROM CHIP 8

| | | | | | | | | | |
|---|---|---|---|---|---|---|---|---|---|
| 0201 | 000-007 | LHHH | HHHL | HHHL | HHHL | HHHL | HLHL | LLHL | LLHH |
| 0202 | 000-015 | HHHL | HHHL | HHHL | HHHH | HHHL | LHHL | LHHL | HHHH |
| 0203 | 016-023 | HHHL | HHHL | HHHL | LHHH | HHHH | LHHH | LHLL | LHLL |
| 0204 | 024-031 | LHHL | LHHL | HHHH | HHHH | HHHL | HHHH | HHHL | HHHL |
| 0205 | 032-039 | HHHL | LHHL | HHLH | HHHL | HHHH | HHHL | HHHL | LHHL |
| 0206 | 040-047 | LHHL | LHHL | LHHL | LHHL | HLHL | HHHH | HHHL | HHHL |
| 0207 | 048-055 | HHHH | HHHH | HHHL | LHHL | HHHL | HHHH | HHHH | HHHH |
| 0208 | 056-063 | LHHL | LHHL | HLHH | HHHH | HHHL | LHLH | HLHL | HHHL |
| 0209 | 064-071 | LHHL | HHHL | HLHH | HHHL | HHHH | HHHL | LHHL | HHHH |
| 0210 | 072-079 | HHHL | HHHL | LHHH | HHHL | LLLH | LHHH | HHHH | HHHH |
| 0211 | 080-087 | HHHL | HHHL | HHHH | HHHL | HHHH | HHHH | LHHL | LHLH |
| 0212 | 088-095 | HHHL | HHHL | HHHL | HHHL | HHHL | LHHH | HHHH | HHHH |
| 0213 | 096-103 | HHHL | LHLL | HHHL | HHHL | LHHL | HHHL | HHHL | LLHL |
| 0214 | 104-111 | HHHL | HHHL | HHHH | HHHL | LHLH | LHHH | LLLL | LHLL |
| 0215 | 112-119 | HHHH | HHHL | LHHH | HHHH | HLHH | HHHL | HLHL | HHHL |
| 0216 | 120-127 | LHHL | LHHL | HLHL | LHLL | HHHH | HHHL | HHHL | HHHH |
| 0217 | 128-135 | LHHL | HHHH | LHHH | HHHL | HHHL | HLHL | HHHH | HHHH |
| 0218 | 136-143 | HHHH | LHHL | HHHH | LHLH | HHHH | HHHL | HHHH | LLHL |

ROM CHIP 8 -continued

| | | | | | | | | | |
|---|---|---|---|---|---|---|---|---|---|
| 0219 | 144-151 | HHHH | HLHH | HHHH | HHHL | HLLL | HHHH | LHHL | HHHL |
| 0220 | 152-159 | HHHL | HHHL | HHHL | HHHL | HHHH | HHHH | HLHL | HHHL |
| 0221 | 160-167 | LHHL | HHLL | HHHH | HHHH | HHHH | HHHH | LHLL | HHHL |
| 0222 | 168-175 | HHHL | HHHL | HHLH | HLLL | HHHH | HHHH | HHLH | HHHL |
| 0223 | 176-183 | HHHH | LHLL | HHLL | HHLL | HHHH | HHHL | HHHL | HHHL |
| 0224 | 184-191 | HHHL | HHHH | HHHL | HHHL | HHLL | HHHL | HHHL | HLLL |
| 0225 | 192-199 | LLLL | HHHH | HHHL | HHHH | HLHL | HLLL | HLHH | HLHH |
| 0226 | 200-207 | HLHL | HHHL | HHHH | HHHH | HHHH | HHHL | HHHH | HHHH |
| 0227 | 208-215 | HHLH | HHHL | HHHH | HHHL | HLHH | HLHL | LHLL | LHLH |
| 0228 | 216-223 | HLHL | HHHL | HHHH | HHHH | HHHL | HHHL | HHHL | HHHH |
| 0229 | 224-231 | HHHL | LHHH | LLLL | HHLH | HHHH | LHLH | HHHH | HHHH |
| 0230 | 232-239 | LHHL | HHHL | HHHH | LLLL | HHHH | HHHL | LLLH | HHHH |
| 0231 | 240-247 | HLHL | HHHL | LHLH | LLHL | LLLH | HLHL | HHHL | HHHH |
| 0232 | 248-255 | HHHL | HHHL | LHLL | HLHL | HHHL | HHHL | LHHL | LHHL |
| 0233 | | | | | | | | | |

ROM CHIP 9

| | | | | | | | | | |
|---|---|---|---|---|---|---|---|---|---|
| 0238 | 000-007 | HHLH | HHLL | HHLL | LHLH | HHLL | HHHH | HHLH | HHLH |
| 0239 | 008-015 | HHLL | HHHH | LHLH | HHLL | HLHH | HHLL | HHLL | LHLL |
| 0240 | 016-023 | HHLL | HHLL | HHLL | HHHH | HHLL | HHLL | HHLL | HHLL |
| 0241 | 024-031 | HHLL | HHHH | HHHL | LHLL | HLHH | LHLL | HHHL | HHLL |
| 0242 | 032-039 | HLLH | HHLL | LHHH | HHLL | LHHH | LHLL | HHLL | HHLL |
| 0243 | 040-047 | HHLL | HHHH | HHLL | HHHH | HHHH | HHLL | HHLL | HHLL |
| 0244 | 048-055 | LHLL | HHLL | HHLL | HHLH | HHLL | HHLL | LHLL | LHHH |
| 0245 | 056-063 | HHLL | HHHH | HHLL | HHLH | HHLL | HHLL | HHHH | HLLH |
| 0246 | 064-071 | HHLH | HHLH | HHLL | HHLL | HHLL | LHLL | HHHH | LHLL |
| 0247 | 072-079 | HLLL | HLHH | HHLL | HHLL | HHLH | LHLL | HHLL | LHHL |
| 0248 | 080-087 | HHLL | HHLL | HHLL | HHLL | LHHL | HHHH | HHLH | HHLH |
| 0249 | 088-095 | HLHH | HLHH | HHLL | HHLL | HHLL | HHHH | HHHL | LHHL |
| 0250 | 096-103 | HLLL | HHLL | HHLL | HHLL | HHLL | HHLL | HHLL | HHLH |
| 0251 | 104-111 | HHHH | HLHH | HHLH | LHLL | HHLL | LHLL | HHLH | HHLL |
| 0252 | 112-119 | HLLL | HHLL | HHLL | HHLL | HHLL | HHLL | HHLL | HHLL |
| 0253 | 120-127 | HHLH | HHHH | HHHH | HHLL | HHLH | HHHL | LHLL | HLLH |
| 0254 | 128-135 | HHLH | LHHH | HHLL | HHLL | LHLL | HHLL | LHHH | LHLL |
| 0255 | 136-143 | HHHH | HHHL | LHLL | HHLL | HHLL | HHLL | LHHL | HHLL |
| 0256 | 144-151 | HLLH | HHHH | HHLL | HLHH | HHLL | HLLH | HHHH | HHLL |
| 0257 | 152-159 | HHLL | HHLL | HHLL | HHLL | HLLH | HHLL | HHLL | LHHH |
| 0258 | 160-167 | HHLH | HHHL | LHLL | LHHH | LHHL | HHHH | LLLL | HHLL |
| 0259 | 168-175 | HHHH | LHLL | HHHH | HHLL | LHLH | HLLL | LHHL | HHLL |
| 0260 | 176-183 | HLLH | LHLL | HHLH | HHLH | LHHH | LHHH | HHLL | HHLL |
| 0261 | 184-191 | HHLL | HHLL | LHLL | HHHL | LHHH | HHLL | HHLL | LHHH |
| 0262 | 192-199 | HHHL | HHLL | LHLH | LHLL | LHLL | HHHL | LHLL | LHLL |
| 0263 | 200-207 | HHHH | HHLL | HLHL | LHHH | LHLL | LHLL | HHLL | HLLH |
| 0264 | 208-215 | HHHL | HLHH | HHLL | HLHH | HLLL | HHHH | HHHL | LHHL |
| 0265 | 216-223 | HHLL | HHLL | HHLL | HHHH | LHHH | LHLL | LHLL | HHLL |
| 0266 | 224-231 | LHHH | HHHH | LHLL | LHLL | HHLL | HHLL | LHHL | HHLL |
| 0267 | 232-239 | HHHH | HHLL | HHLL | LLHH | HHLL | HHLL | HHLL | LHLL |
| 0268 | 240-247 | HHHH | HHLL | LHHH | HHLL | LHHH | HHHH | LHHH | LHLL |
| 0269 | 248-255 | HLLL | HHLL | HHLL | HHHH | HLLL | HHLL | HHLL | HHLL |
| 0270 | | | | | | | | | |

Each of the 71 basic instructions employed by the calculator is implemented by one or more of the above-described microinstructions and associated control signals issued by the microprocessor. The manner in which this is accomplished is shown and described in detail in the flow charts of FIGS. 29A–H. Each rectangular box of these flow charts represents a state of ROM 300 of the microprocessor and includes the mnemonic of the microinstructions and control signals stored in that ROM state. The number at the upper right-hand corner of each of these rectangular boxes represents the number of shift clock pulses required by the microinstructions of that ROM state. A simplified overview of these detailed flow charts is shown in FIGS. 6A–B.

PROGRAMMABLE CLOCK

Figure 27:
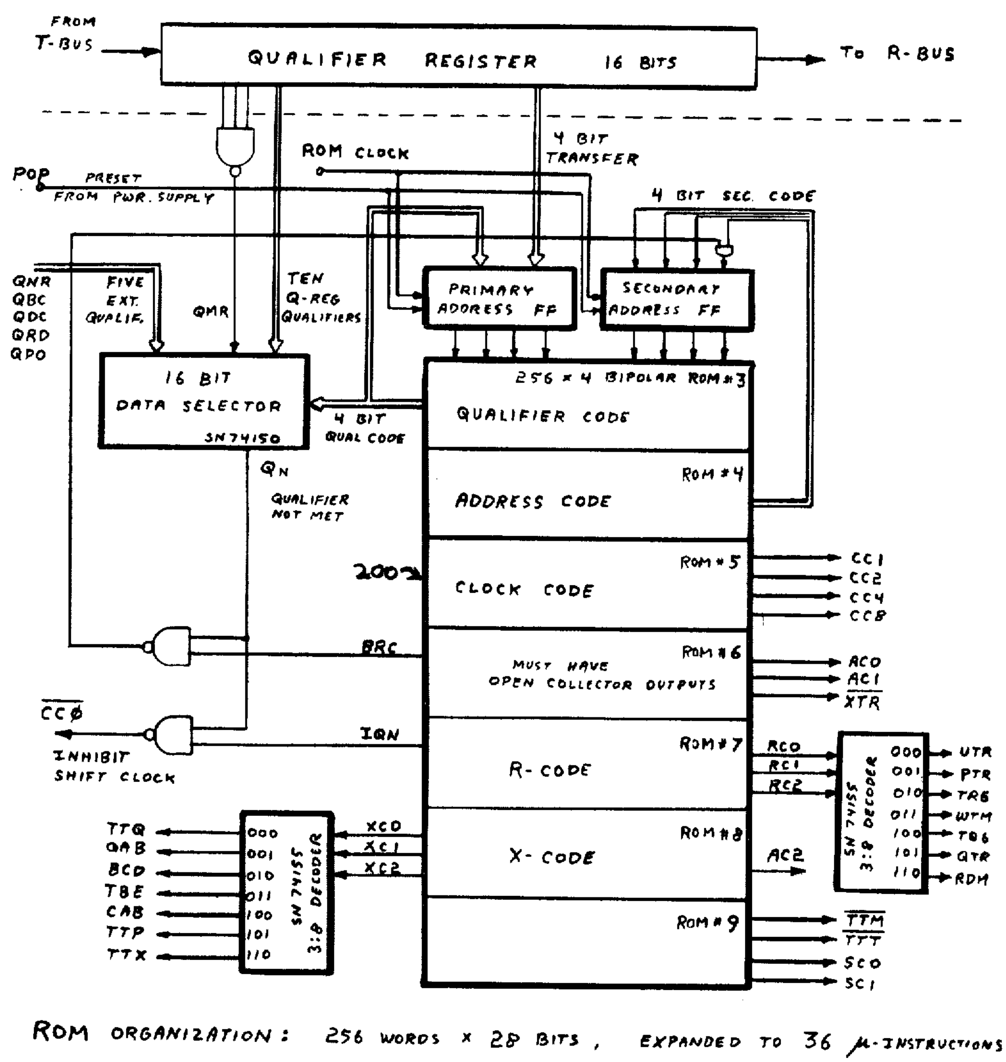
FIG. 27 is a block diagram of the microprocessor of FIGS. 3A–B.
Figure 28A:
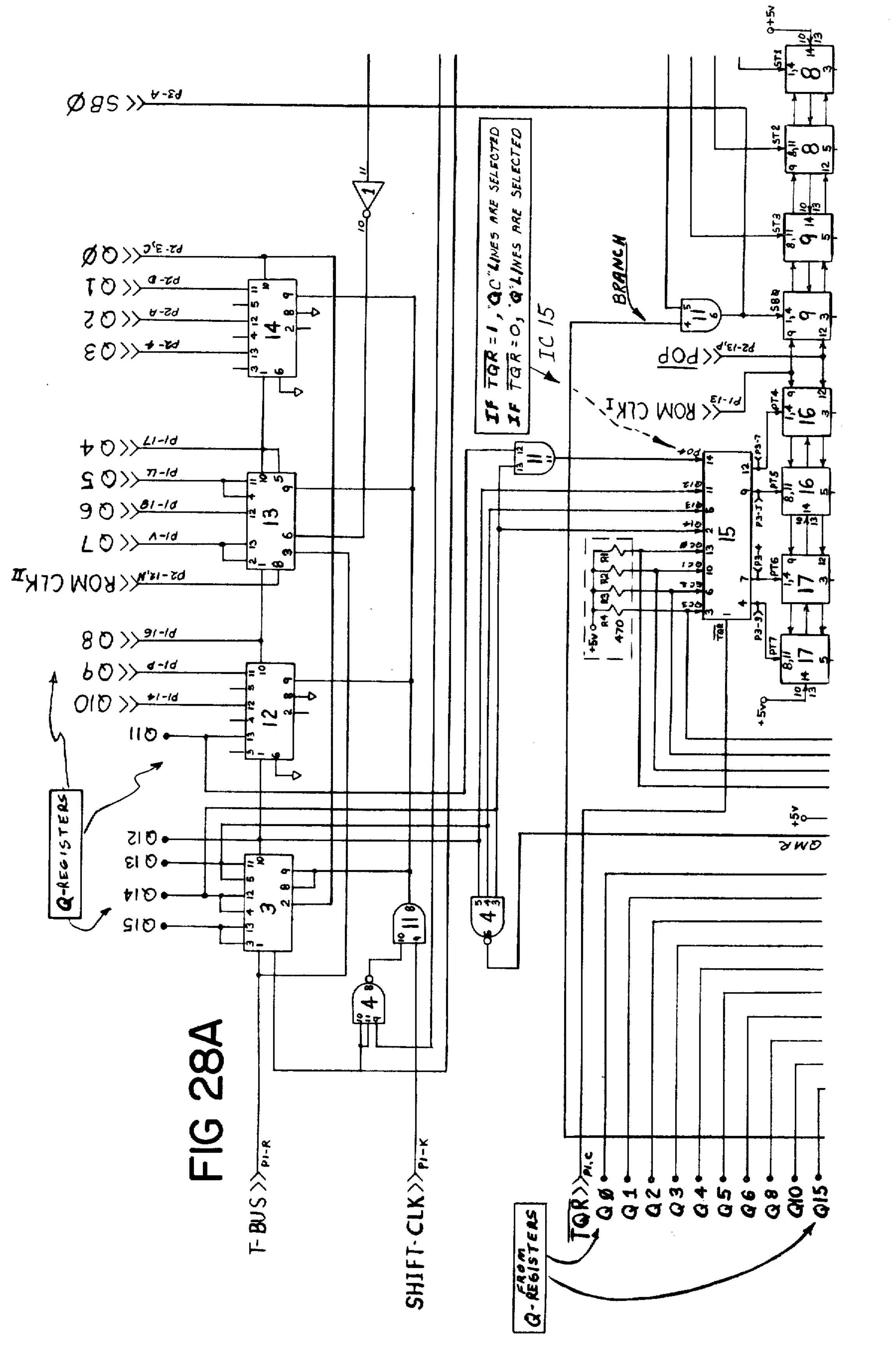
FIGS. 28A–D are a detailed schematic diagram of the microprocessor of FIGS. 3A–B and 27.
Figure 28B:
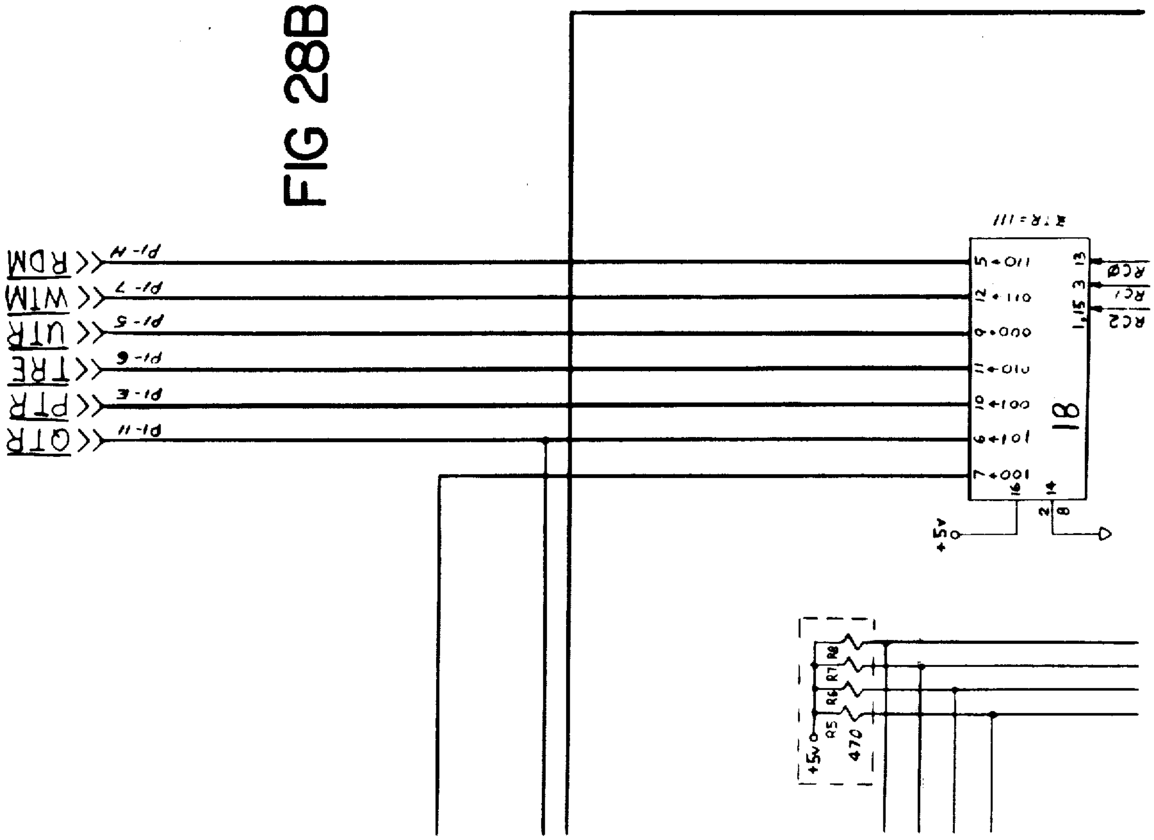
Figure 28C:
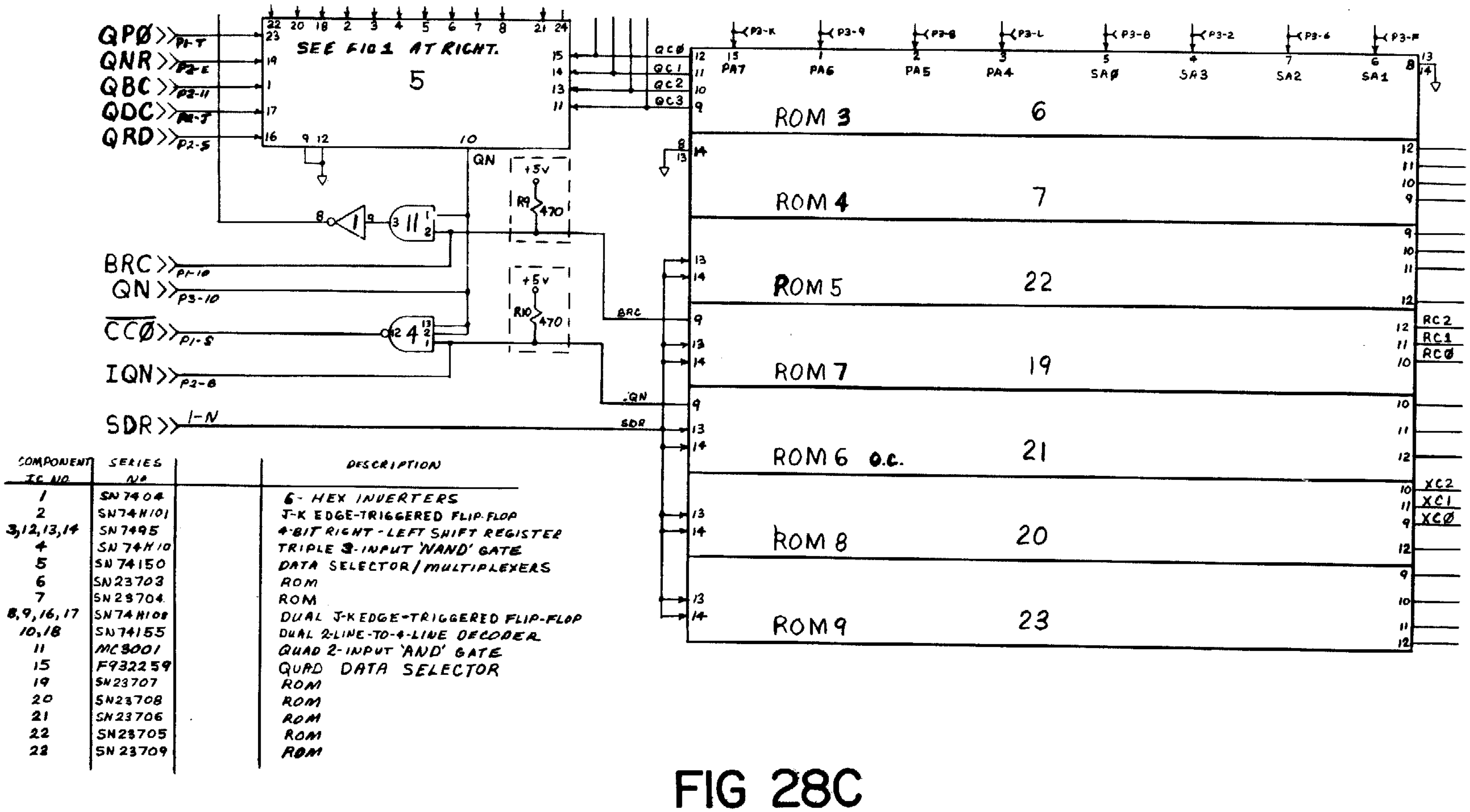
Figure 28D:
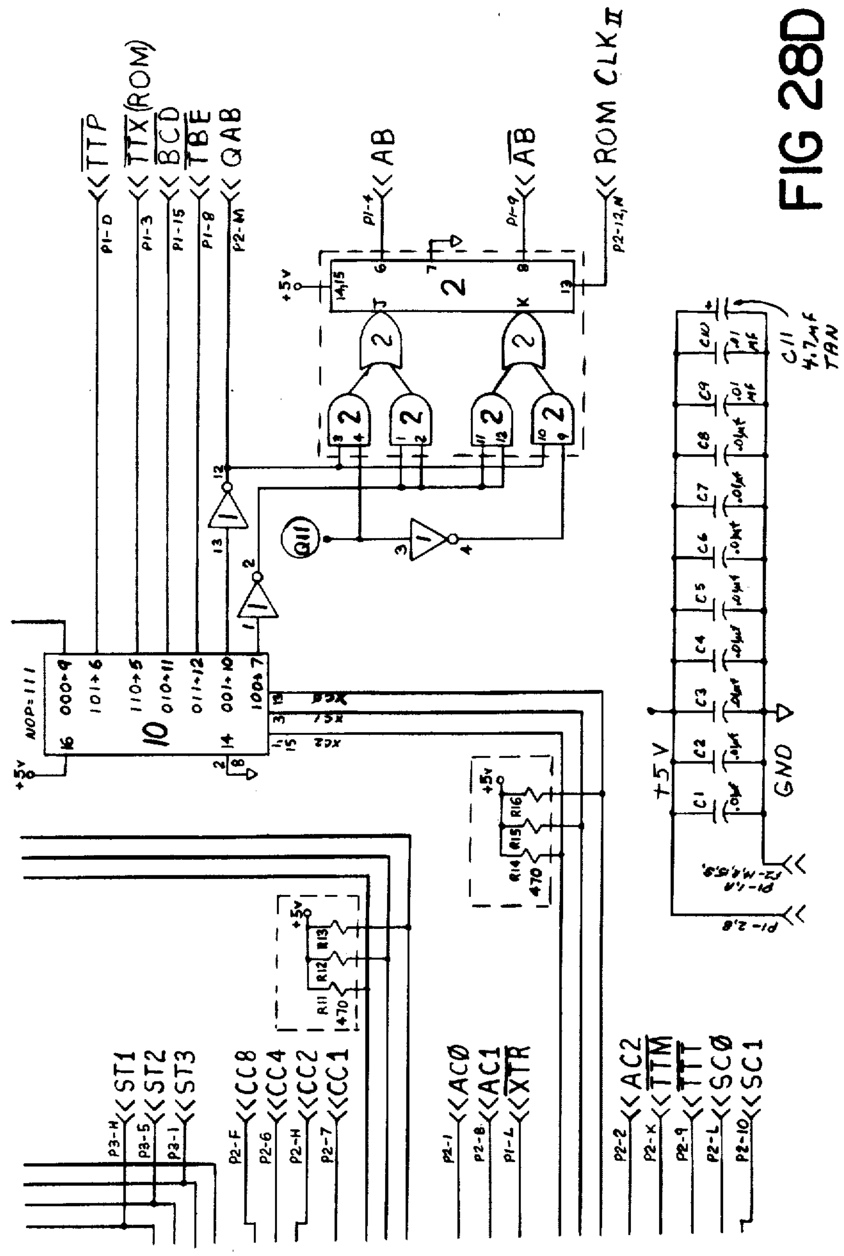
Figure 29A:
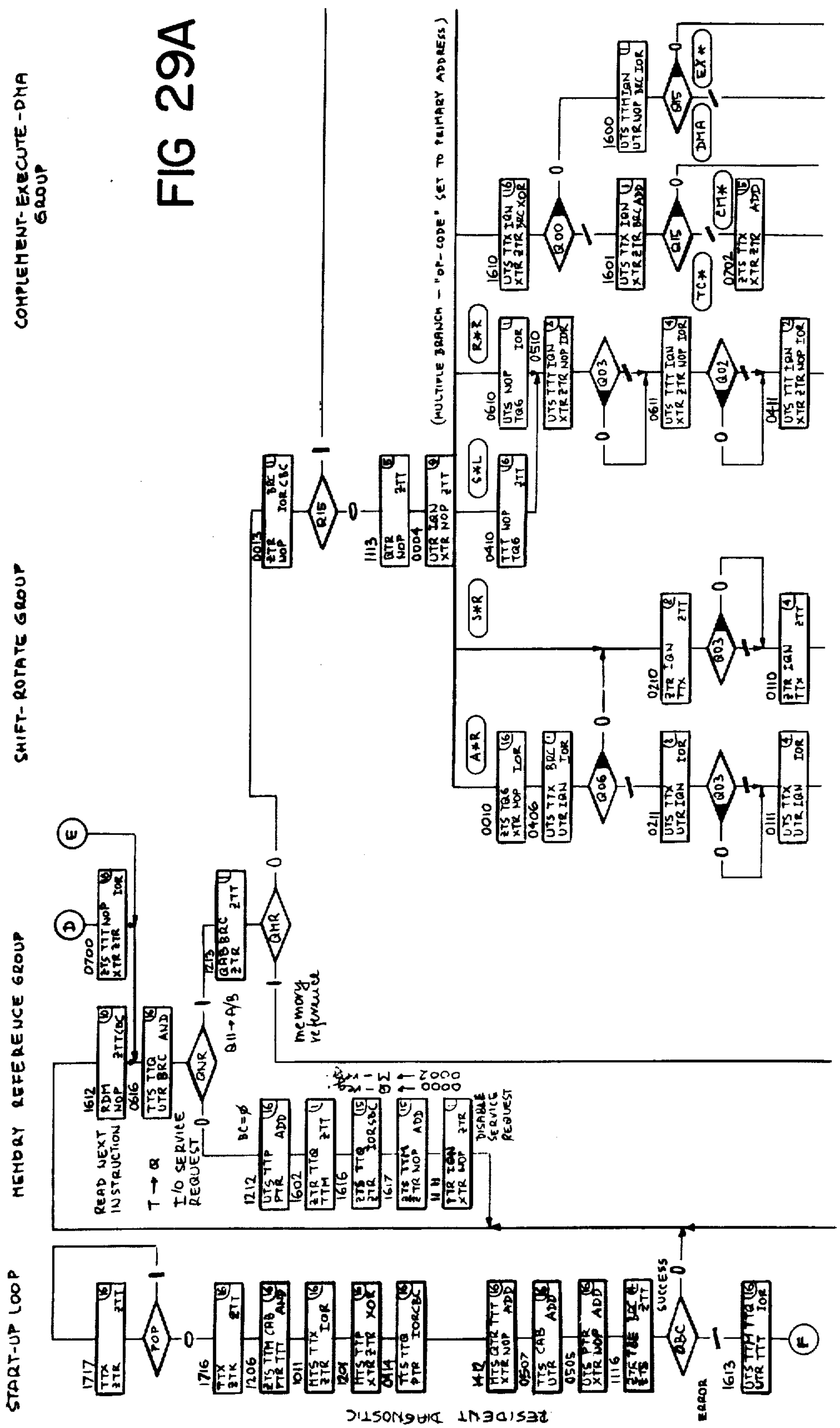
Figure 29B:
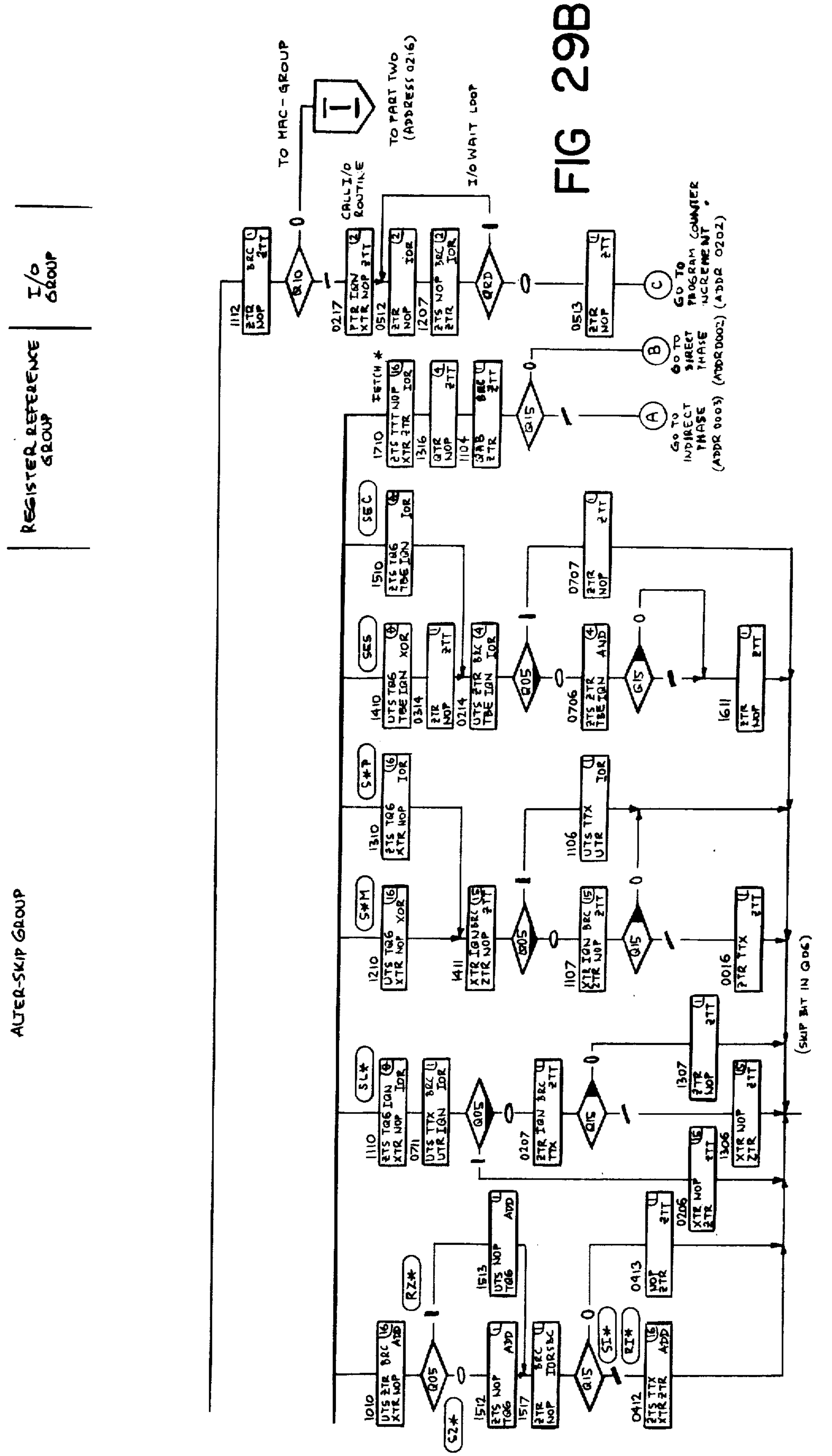
Figure 29C:
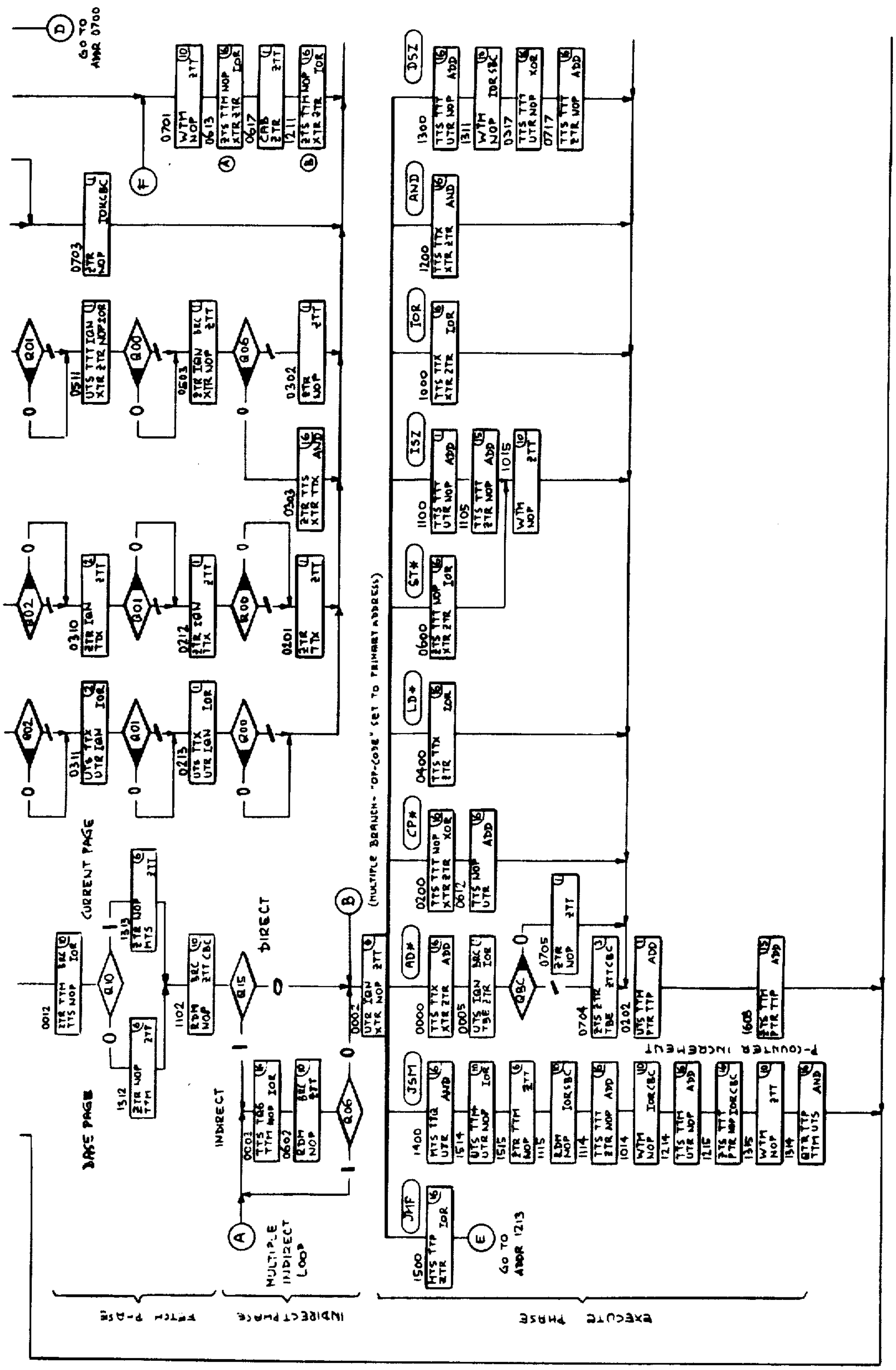
Figure 29D:
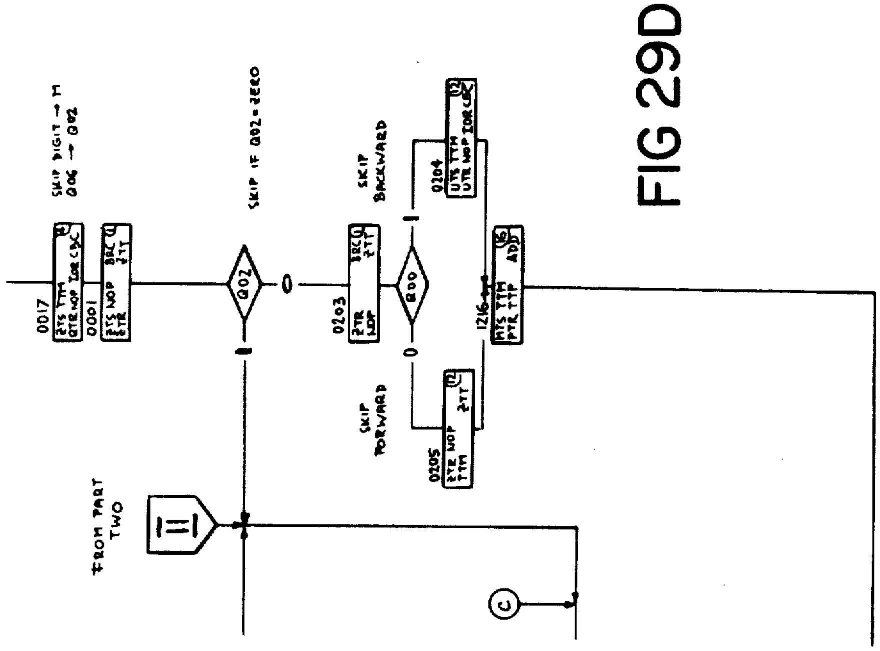
Figure 29E:
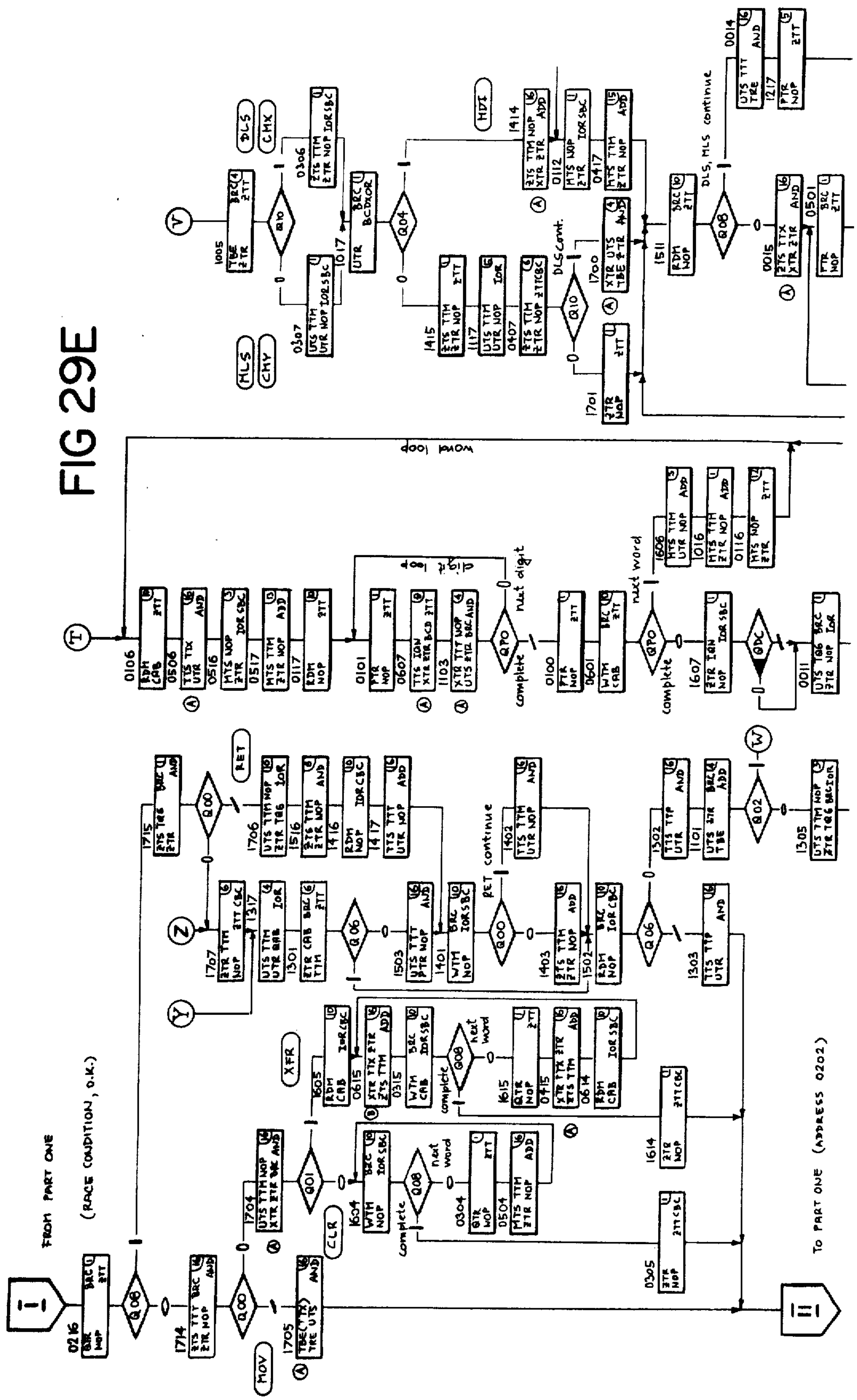
Figure 29G:
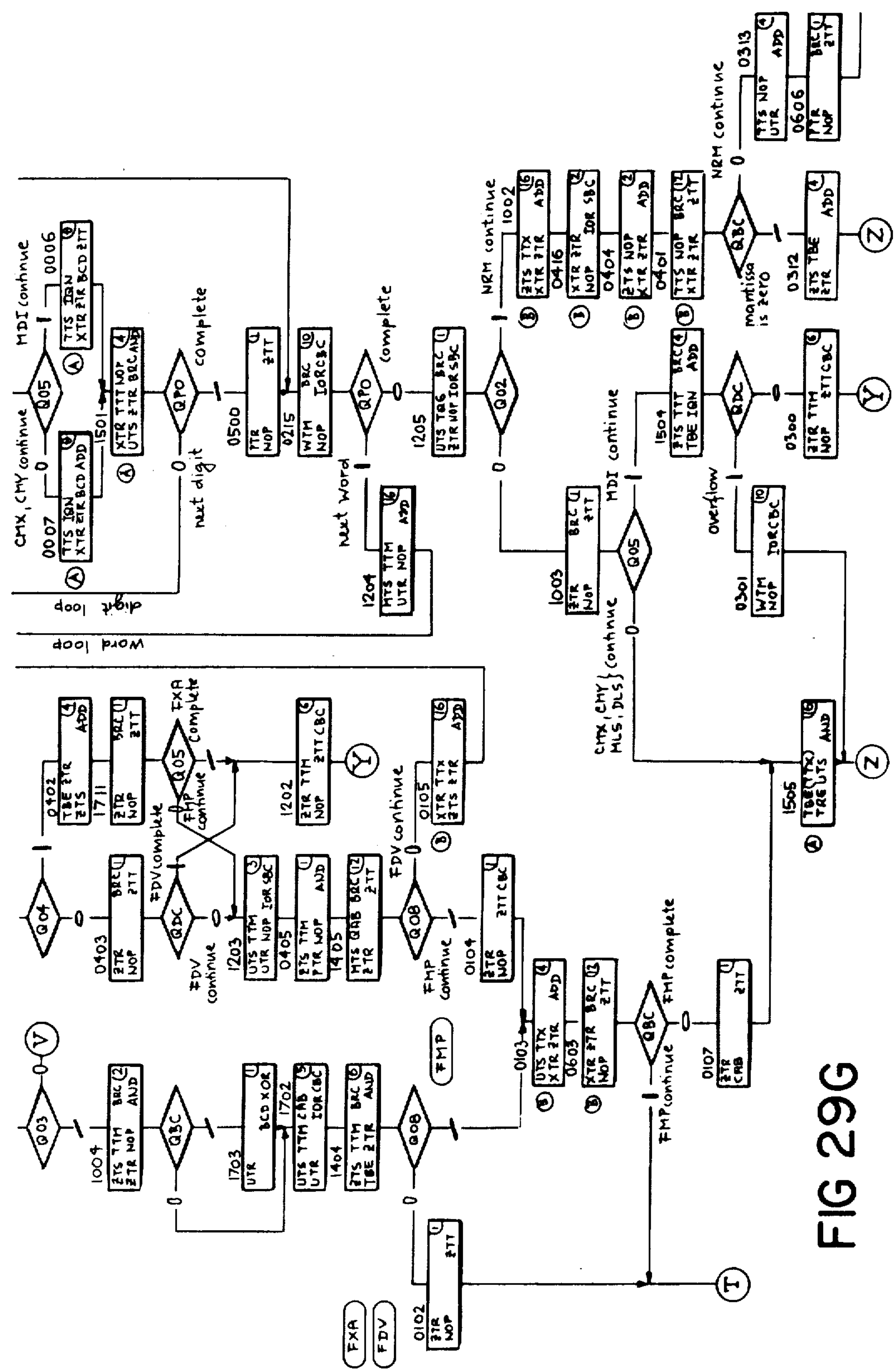

Given a computing system organized to process binary data serially and under control of microinstructions stored in ROM 300 as shown in FIGS. 3A–B and 27, the implementation of a general purpose instruction set requires that some number of bits be shifted into or out of the storage registers. Depending on the operation being performed, the number of bits may vary from zero to *n*, where *n* is the number of bits in a single machine word.

If each clock period of the ROM clock corresponds to a one bit shift, a count loop must be employed to provide the desired number of shifts. A rather large number of such count loops would exist in order to implement an entire instruction set. An alternative method is to provide additional hardware which permits assignment of the desired number of shifts in a single state of ROM 300. Such an arrangement requires a variable cycle time for each state of ROM 300 but results in a very substantive saving in total number of ROM states.

To implement a variable number of shift clocks in a single state of the microprocessor, two separate clocks are required. The shift clock is applied to the data storage registers in the memory, the shift register block, the arithmetic logic unit and the input/output block. The ROM clock is applied to the ROM address flip-flops in the microprocessor, and occurs once for each state in the microprogram. The number of shift clock pulses that occurs in any given ROM state is determined by a 4-bit clock code set to the clock decoder from the microprocessor.

If no shift clocks are desired, a separate signal $\overline{CC\emptyset}$ from the microprocessor inhibits the shift clock output, independent of the clock code issued in that state. In this way, any number of shifts between and including zero and 16 may be implemented with a 4-bit clock code and an inhibit signal.

This inhibit signal offers an additional powerful feature when gated by the qualifier test logic in the microprocessor as shown in FIG. 3A. The qualifier test logic includes a 4-bit qualifier code from ROM 3 that selects one of 16 qualifier inputs to the data selector. The data selector output QN (qualifier not met) will be high if the selected qualifier input was low. By using the QN signal to gate the inhibit microinstruction, IQN, the shift clock will be inhibited only when the qualifier is not met. Thus, all microinstructions requiring shift clocks that are issued in a given ROM state may be either executed or inhibited, depending on the logical state of the qualifier under test.

The ROM clock is applied to the eight J-K flip-flops which address the 256 word microprocessor ROM. During any given state, the complementing (J-K) inputs to the 4 primary address flip-flops are set up by the qualifier code or q-register code. The 4 secondary address flip-flop inputs are determined by the ROM 4 outputs, the BRC microinstruction, and the data selector output QN. Where ROM clock goes low, the negative edge-triggered flip-flops will cause transition of the ROM address to the next ROM state.

Figure 30:
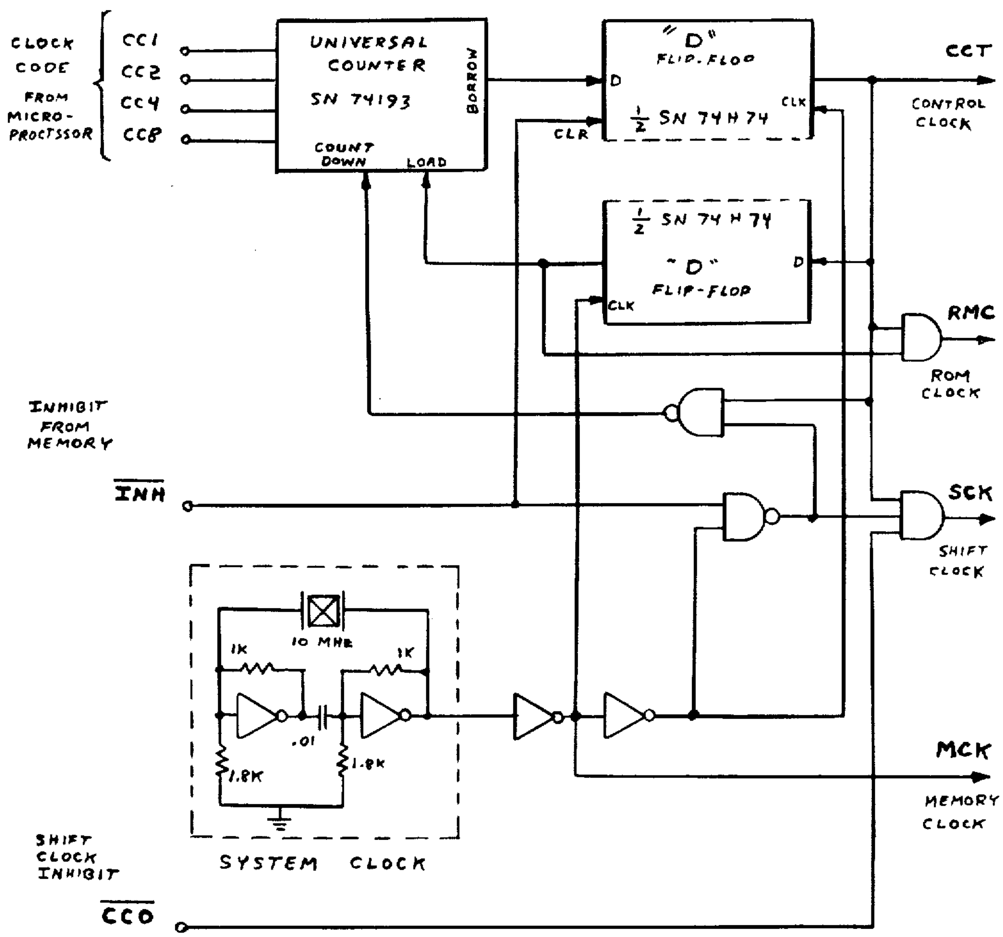
FIG. 30 is a block diagram of the programmable clock of FIGS. 3A–B.
Figure 31A:
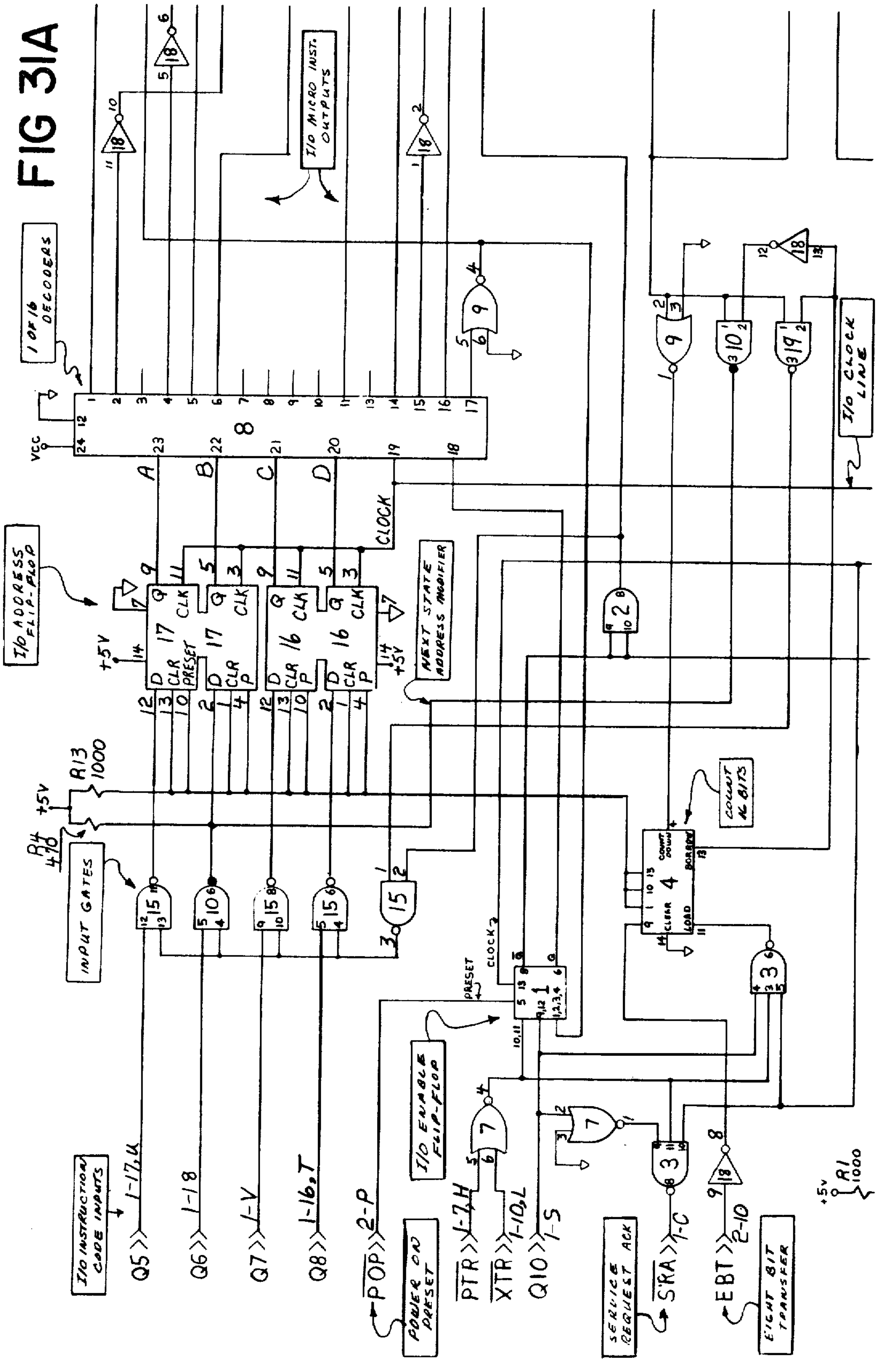
FIGS. 31A–C are a detailed schematic diagram of the programmable clock of FIGS. 3A-B and 30 and of a portion of the input-output control unit of FIGS. 3A–B.
Figure 31B:
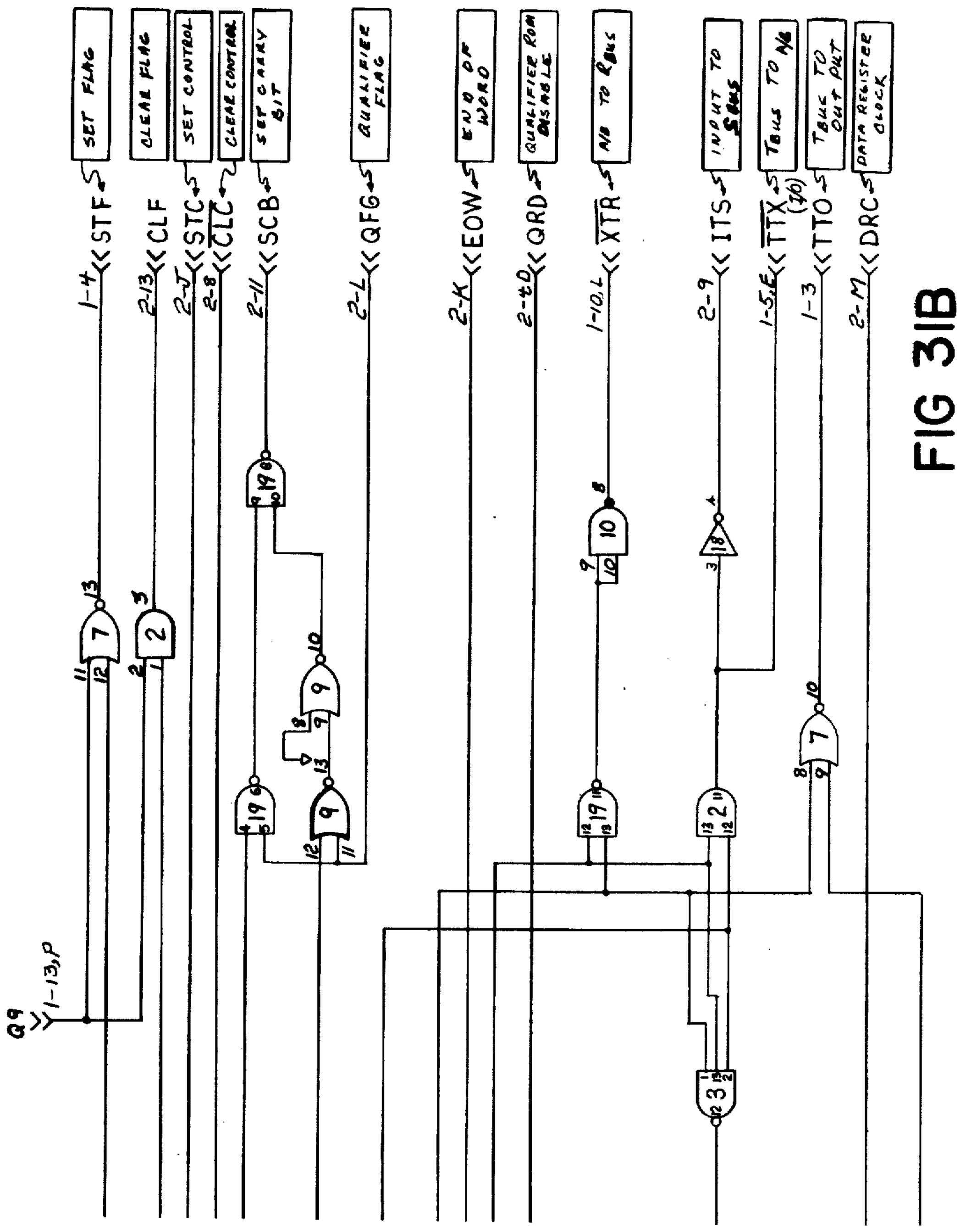
Figure 31C:
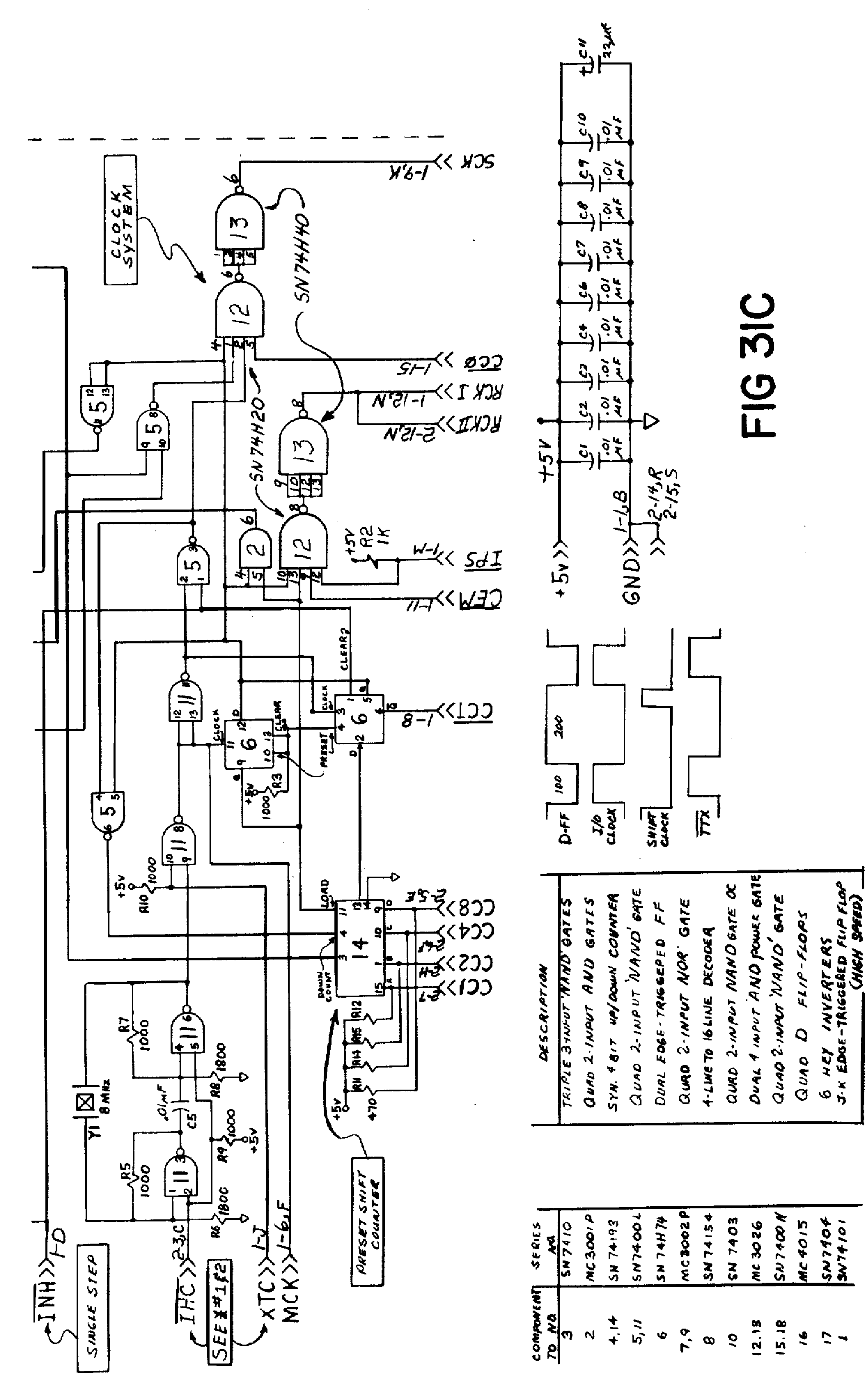

As shown in the block diagram of FIG. 30 and the detailed schematic diagram of FIGS. 31A–C, a crystal controlled system clock output is inverted to generate memory clock, MCK. This signal is again inverted to clock a D flip-flop having an output (control clock), which will go low if the end-of-count signal (borrow) from the down counter has occurred at the D input. The ROM clock will also go low at this time, initiating a new ROM state in the microprocessor. Control clock will normally remain low for one system clock period, and in turn generates a load signal which is delayed a half period from control clock by means of a second D flip-flop. The 4-bit clock code from the microprocessor is preset into the counter while the load signal is low.

Figure 32:
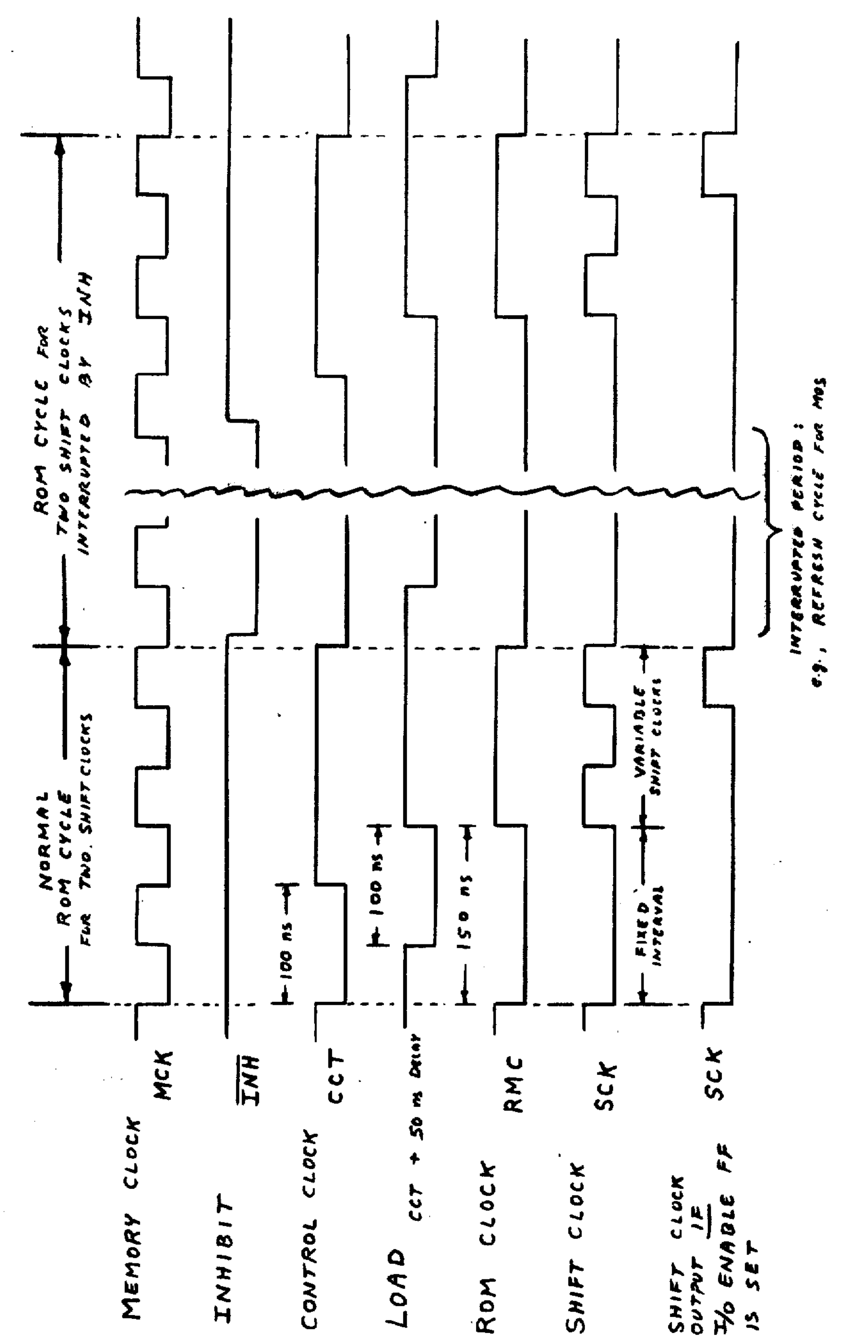
FIG. 32 is a waveform diagram illustrating the operation of the programmable clock of FIGS. 3A–B, 30, and 31A–C.
Figure 33A:
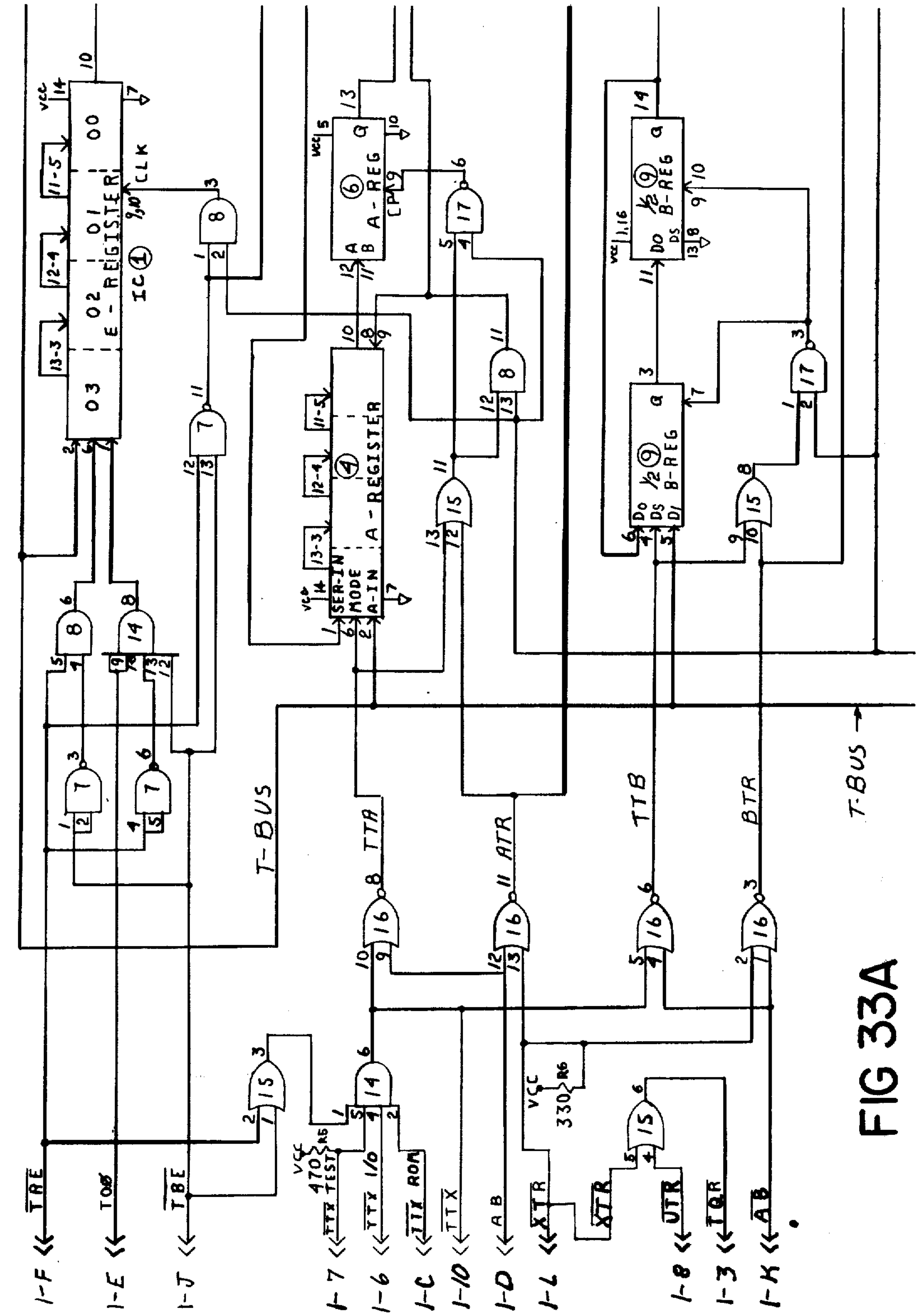
Figure 33B:
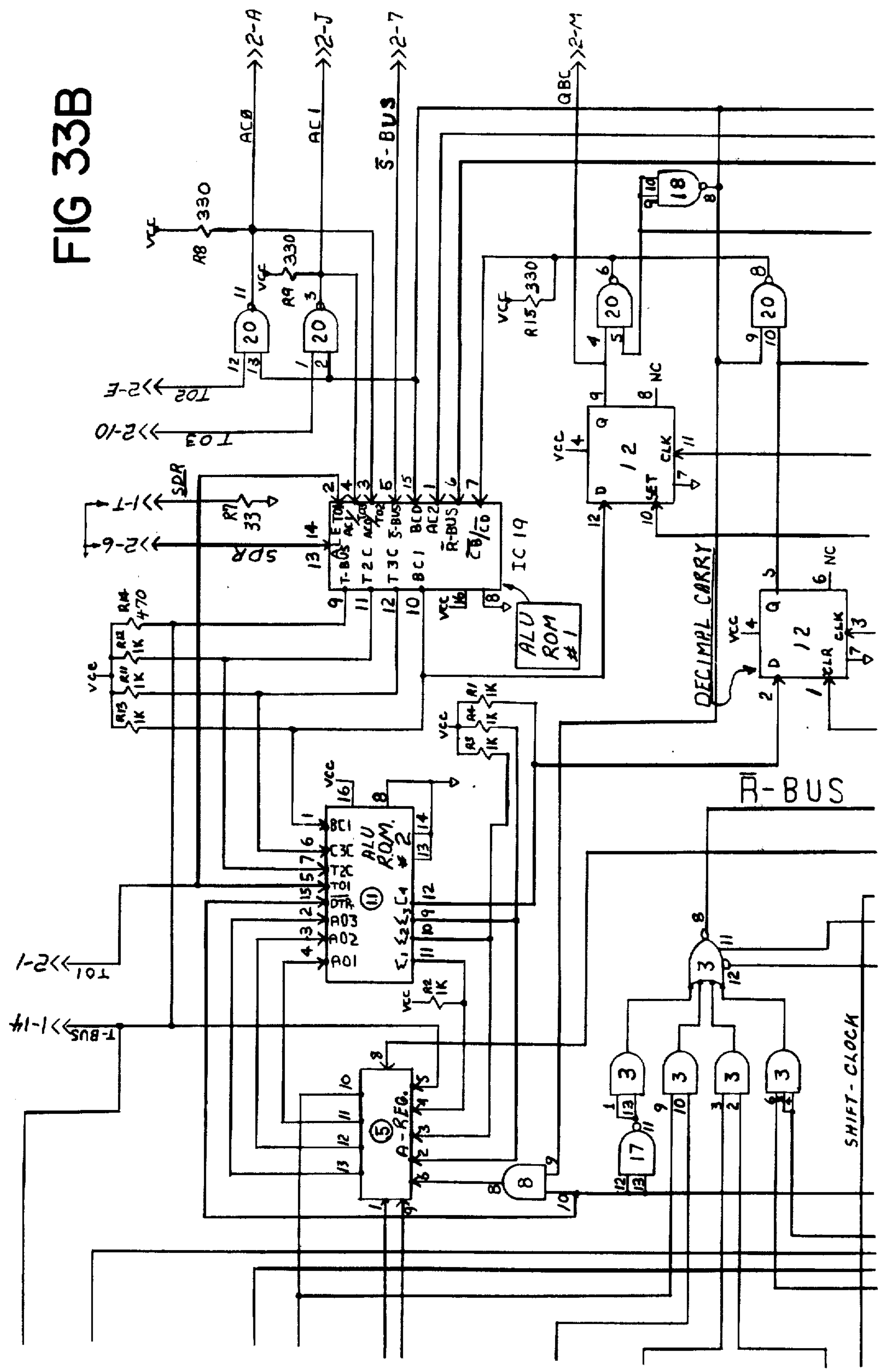
Figure 33D:
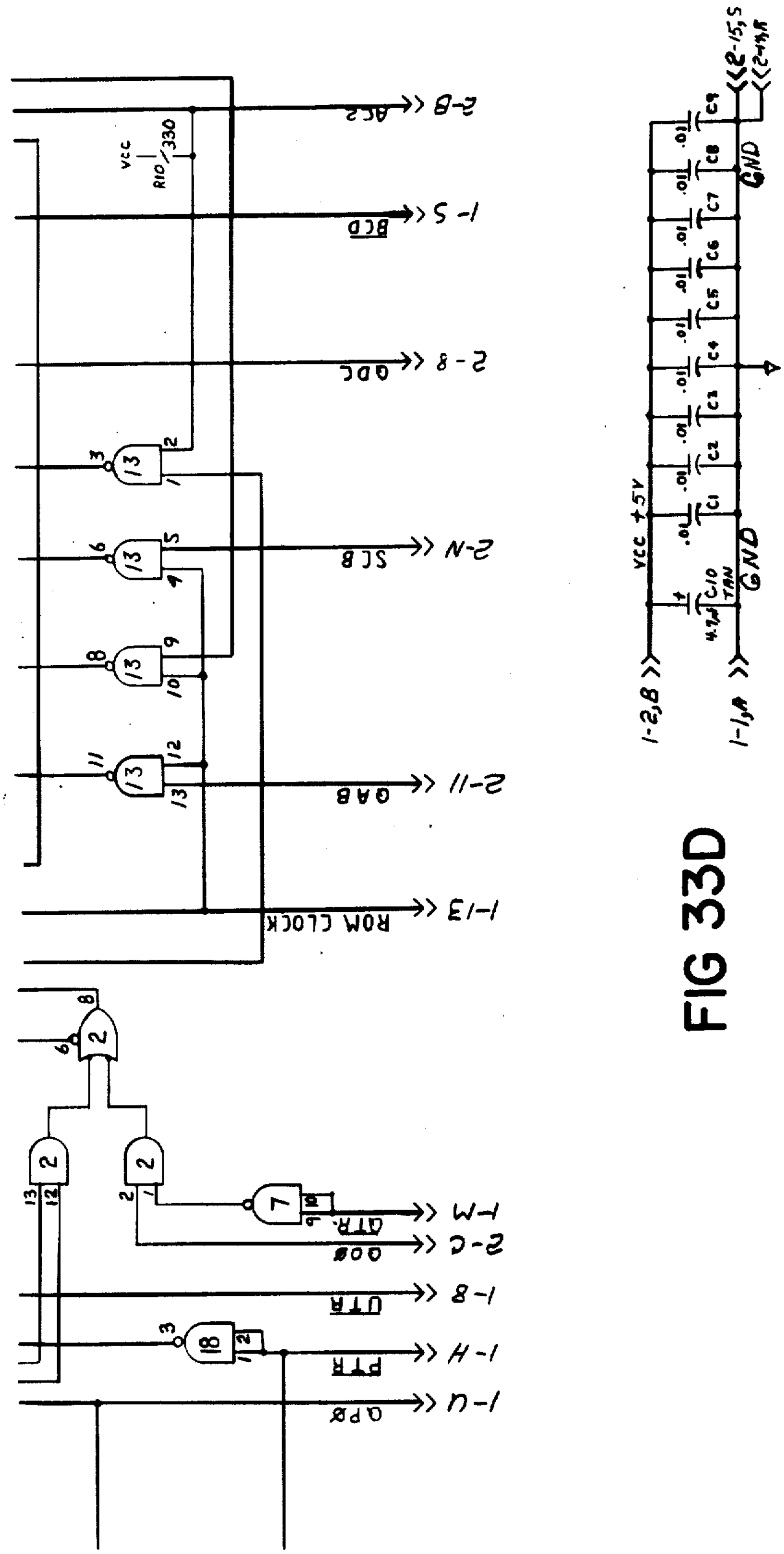

As the load signal goes high, ROM clock also goes high, completing the fixed interval portion of ROM clock and shift clock as shown in FIG. 32. A series of clock pulses are now gated onto shift clock, SCK, until the preset counter has counted down to zero, causing control clock to again go low, completing the ROM cycle.

The inhibit signal, INH, from memory may lengthen the normal fixed interval of ROM clock by clearing the D flip-flop and holding control clock low. This may occur during memory refresh or external test operations. In this situation, the counter remains preset and the correct number of shifts will be generated when the inhibit goes away.

SHIFT REGISTER UNIT

As shown in the detailed schematic diagrams of FIGS. 28A–D and 33A–D, A-register 122, B-register 124, P-register 126, Q-register 128, and E-register 130 of FIGS. 3A–B comprise bipolar status registers, the contents of which are recirculated when data is output to the R-bus or the S-bus. Full control of these registers in use and type of operations performed is maintained by the microinstructions from the microprocessor. The number of bits to be shifted in any one ROM state of the microprocessor is determined by the number of shift clocks from the clock decoder. This shift clock appears at the shift clock input of each shift register that is enabled by the microprocessor during that ROM cycle.

ARITHMETIC LOGIC UNIT

The development of complex read-only memory arrays on a single chip have made possible a hardware implementation of central processing units (CPUs) and arithmetic logic units (ALUs) with far fewer components than were previously possible. In this application, two bipolar read-only memory chips are combined with carry flip-flops and adapted to perform one-bit binary logic and arithmetic operations as well as four-bit binary-coded-decimal (BCD) arithmetic operations. The two bipolar read-only memory chips may comprise, for example, Hewlett-Packard 16-pin dual-in-line packaged bipolar ROMs organized into 256 words by 4-bits and of the same type as shown and described in U.S. Pat. No. 3,721,964.

Figure 34:
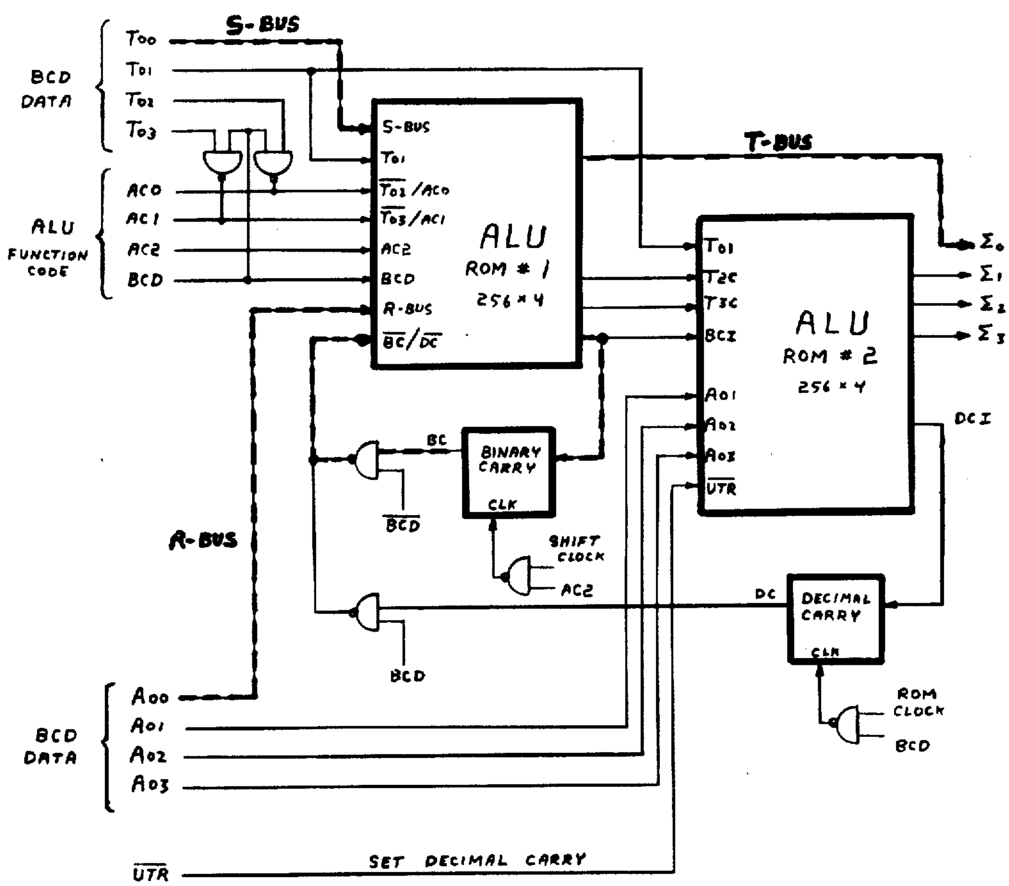
FIG. 34 is a block diagram of the arithmetic logic unit of FIGS. 3A–B.

The binary/BCD Arithmetic Logic Unit consists of five integrated circuits connected as shown in the block diagram of FIG. 34 and the detailed schematic diagram of FIGS. 33A–D. Specifically, the packages consist of two 1024-bit ROMs, a dual D-type flip-flop and two quad two-input NAND gates.

Internally the desired binary logical function, binary arithmetic operation or BCD operation is selected by the ALU code as shown below.

mented prior to input into ROM No. 2. The ten's complement with add is then found by presetting decimal carry and performing a BCD sum of the three most significant digits in ROM No. 2.

3. With only eight ROM inputs available, some sharing of inputs is required for ROM No. 1. During binary operations, all four function codes and only one bit of T-Register data is required. During BCD operations, all four bits of T-Register data and only

| | ALU CODE | | | | | |
|---|---|---|---|---|---|---|
| | BCD | AC2 | AC1 | AC0 | ALU FUNCTION | DESCRIPTION |
| | 0 | 0 | 0 | 0 | XOR | Exclusive OR . . . . R ⊕ S ⟶ T |
| | 0 | 0 | 0 | 1 | AND | Logical AND . . . . R . S ⟶ T |
| | 0 | 0 | 1 | 0 | IOR | Inclusive OR . . . . R + S ⟶ T |
| Binary | 0 | 0 | 1 | 1 | ZTT | Zero ⟶ T-BUS |
| Functions | 0 | 1 | 0 | 0 | ZZT.CBC | Zero ⟶ T-BUS, Clear Binary Carry |
| | 0 | 1 | 0 | 1 | IOR.CBC | Inclusive OR, Clear Binary Carry |
| | 0 | 1 | 1 | 0 | IOR.SBC | Inclusive OR, Set Binary Carry |
| | 0 | 1 | 1 | 1 | ADD | Binary ADD. . . .B + S + BC ⟶ T,C |
| BCD | 1 | 0 | 1 | 1 | BCD ADD | BCD ADD. . . . $T_{0-3} + A_{0-3} \longrightarrow T\,\Sigma_{0-3}$ |
| Functions | 1 | 1 | 1 | 1 | BCD COMP/ADD | IO's Complement and BCD ADD |

ALU FUNCTION CODE ASSIGNMENTS

The function code input BCD selects between the binary mode and BCD mode of operation.

In the binary mode, the function code inputs AC0 AC1, and AC2 select the desired logical function or arithmetic operation. The binary input data enters ROM #1 on the carry, S-bus and R-bus input lines, and the binary result appears on the T-bus and binary carry output lines. ROM #2 is not used in the binary mode.

In the BCD mode of operation, the two function code lines AC0 and AC1 are disabled from the Microprocessor and these two lines carry the T02 and T03 bits of BCD data from the T-Register. The ALU function code line AC2 is used to select the desired BCD operation. If AC2 is low, the four-bit output Σ0,Σ1,Σ2,Σ3 will be the BCD sum of the two BCD data inputs. If AC2 is high and decimal carry has been set, the four-bit output Σ0,Σ1,Σ2,Σ3 will be the BCD Tens Complement of the BCD data from the T-Register. In the BCD mode, the binary carry output will be disabled and the decimal carry output will be enabled to ROM #1.

Although only one-fourth of the available registers in ROM #1 are required for the eight binary operations, the concept of adding a second 1024-bit ROM to perform the BCD operations grew from several basic concepts:

1. The least significant BCD sum bit, Σ0, is always identical to the binary sum bit; therefore, only three additional outputs Σ1,Σ2, and Σ3 need be generated. For BCD complement operations, the decimal carry flip-flop defines whether or not the least significant bit should be complemented.
2. In forming the nine's complement of the T-Register BCD data in ROM #1, it can be seen that for 8421 code the second least significant bit T01 is the same before and after forming the complement. Thus only two bits, T02 and T03 need be completwo function codes are required. Use of two NAND gates in wire-OR connection with the open collector function codes AC0 and AC1 permits sharing of the two inputs.

This arrangement left one input still available to ROM #2. By programming this input to always make output DCI true, the micro-instruction $\overline{UTR}$ can serve two purposes—placing units on the R-bus and also set decimal carry if BCD is true. When BCD is false, clock is inhibited to decimal carry. This feature permits saving decimal carry information during all binary operations. Similarly, binary carry is saved during the four binary operations AND, IOR, XOR, and ZTT by connecting AC2 such that when AC2 is false the shift clock is inhibited to the binary carry flip-flop.

In summary, the mode select input BCD performs the following functions:

1. Addresses the proper 128 word set of word lines in ROM #1.
2. Enables the T02 and T03 data lines to ROM #1 only in BCD mode.
3. Enables clock to decimal carry flip-flop only in BCD mode.
4. Selects binary carry or decimal carry into ROM #1 as appropriate.
5. Transfers outputs Σ0,Σ1,Σ2,Σ3, to A-Register only in BCD mode.

The remaining three ALU function codes select the proper set of word lines in ROM No. 1 to perform the eight binary functions. In addition, the AC2 input performs the following functions.

1. Enables clock to binary carry flip-flop only during the four carry-related binary functions and the BCD comp/add function.
2. In the BCD mode, AC2 causes BCD data bit T00, T02 and T03 to convert to nine's complement form.

The ALU has a total of 15 inputs which include 8 data inputs, 2 clock inputs and 5 microinstructions. Four data output lines are required, and two additional output lines from carry flip-flops are available as qualifier inputs to the microprocessor. The ALU and shift register mnemonics are listed in the following table:

SHIFT REGISTERS & ALU BOARD MNEMONICS

| | |
|---|---|
| $\overline{TRE}$ | T-Register to E-Register to $\overline{R}$-Bus |
| TO0 | Bit 0 of T-Register |
| $\overline{TBE}$ | T-Bus to E-Register to $\overline{R}$-Bus |
| $\overline{TTX}$ - TEST | T-Bus to A/B-Register from Tester |
| $\overline{TTX}$ - I/O | T-Bus to A/B-Register from I/O (Board # 12) |
| $\overline{TTX}$ - ROM | T-Bus to A/B-Register from ⊢ Processo (Board #13) |
| $\overline{TTX}$ | Logical "OR" of Three $\overline{TTX}$ Signals |
| AB | Status of AB-Flip-Flop<br>AB = 0 A-Reg. Operation<br>AB - 1 B-Reg. Operation |
| $\overline{XTR}$ | A/B Register to $\overline{R}$-Bus |
| $\overline{UTR}$ | Logical "1" to $\overline{R}$-Bus |
| $\overline{TQR}$ | Q-Register to Primary Address Flip-Flop |
| $\overline{AB}$ | Complement of AB |
| $\overline{TTP}$ | T-Bus to P-Register |

-continued

SHIFT REGISTERS & ALU BOARD MNEMONICS

| | |
|---|---|
| SCK | Shift Clock |
| QP0 | Qualifier, Bit 0 of P-Register |
| $\overline{PTR}$ | P-Register to $\overline{R}$-Bus |
| QO0 | Q-Register Bit 0 |
| $\overline{QTR}$ | Q-Register to $\overline{R}$-Bus |
| RCK | ROM Clock |
| QAB | Q-Register to AB-Flip-Flop, also clears decimal carry. |
| SCB | Set Binary Carry |
| $\overline{BCD}$ | Decimal Arithmetic |
| AC2 | ALU Operation Code |
| QBC | Qualifier, Binary Carry |
| $\overline{S}$-BUS | Data Bus |
| AC1 | ALU Operation Code |
| AC0 | ALU Operation Code |
| T02 | Bit 2 of T-Register |
| T03 | Bit 3 of T-Register |
| SDR | Signal to Disable ROMs |
| T01 | Bit 1 of T-Register |
| T-BUS | Data Bus |
| ALU | Arithmetic Logic Unit |

(−) Indicates Negative True Signal

The following table gives an example of how the two ALU ROM chips shown in FIGS. 33A-D and 34 can be constructed to implement the above described ALU functions (in this table each 1 represents a low state and each 0 represents a high state):

ROM #1

| | | | | | | | |
|---|---|---|---|---|---|---|---|
| / | 1000; | 1/ | 0000; | 2/ | 0000; | 3/ | 1000 |
| 4/ | 1000; | 5/ | 0000; | 6/ | 0000; | 7/ | 1000 |
| 8/ | 0000; | 9/ | 0000; | 10/ | 0000; | 11/ | 1000 |
| 12/ | 0000; | 13/ | 0000; | 14/ | 0000; | 15/ | 1000 |
| 16/ | 0000; | 17/ | 1000; | 18/ | 1000; | 19/ | 1000 |
| 20/ | 0000; | 21/ | 1000; | 22/ | 1000; | 23/ | 1000 |
| 24/ | 1000; | 25/ | 1000; | 26/ | 1000; | 27/ | 1000 |
| 28/ | 1000; | 29/ | 1000; | 30/ | 1000; | 31/ | 1000 |
| 32/ | 1000; | 33/ | 0000; | 34/ | 0000; | 35/ | 1000 |
| 36/ | 1000; | 37/ | 0000; | 38/ | 0000; | 39/ | 1000 |
| 40/ | 0000; | 41/ | 0000; | 42/ | 0000; | 43/ | 1000 |
| 44/ | 0000; | 45/ | 0000; | 46/ | 0000; | 47/ | 1000 |
| 48/ | 0000; | 49/ | 1000; | 50/ | 1000; | 51/ | 1000 |
| 52/ | 0000; | 53/ | 1000; | 54/ | 1000; | 55/ | 1000 |
| 56/ | 1000; | 57/ | 1000; | 58/ | 1000; | 59/ | 1000 |
| 60/ | 1000; | 61/ | 1000; | 62/ | 1000; | 63/ | 1000 |
| 64/ | 1100; | 65/ | 1100; | 66/ | 1100; | 67/ | 1100 |
| 68/ | 1100; | 69/ | 1100; | 70/ | 1100; | 71/ | 1100 |
| 72/ | 0000; | 73/ | 0000; | 74/ | 0000; | 75/ | 1000 |
| 76/ | 0000; | 77/ | 0000; | 78/ | 0000; | 79/ | 1000 |
| 80/ | 0100; | 81/ | 0100; | 82/ | 0100; | 83/ | 1100 |
| 84/ | 0100; | 85/ | 0100; | 86/ | 0100; | 87/ | 1100 |
| 88/ | 0000; | 89/ | 1000; | 90/ | 1000; | 91/ | 0100 |
| 92/ | 1000; | 93/ | 0100; | 94/ | 0100; | 95/ | 1100 |
| 96/ | 1100; | 97/ | 1100; | 98/ | 1100; | 99/ | 1100 |
| 100/ | 1100; | 101/ | 1100; | 102/ | 1100; | 103/ | 1100 |
| 104/ | 0000; | 105/ | 0000; | 106/ | 0000; | 107/ | 1000 |
| 108/ | 0000; | 109/ | 0000; | 110/ | 0000; | 111/ | 1000 |
| 112/ | 0100; | 113/ | 0100; | 114/ | 0100; | 115/ | 1100 |
| 116/ | 0100; | 117/ | 0100; | 118/ | 0100; | 119/ | 1100 |
| 120/ | 0000; | 121/ | 1000; | 122/ | 1000; | 123/ | 0100 |
| 124/ | 1000; | 125/ | 0100; | 126/ | 0100; | 127/ | 1100 |
| 128/ | 0000; | 129/ | 0000; | 130/ | 0000; | 131/ | 0000 |
| 132/ | 0000; | 133/ | 0000; | 134/ | 0000; | 135/ | 0000 |
| 136/ | 0010; | 137/ | 1010; | 138/ | 1010; | 139/ | 0110 |
| 140/ | 1010; | 141/ | 0110; | 142/ | 0110; | 143/ | 1110 |
| 144/ | 0001; | 145/ | 1001; | 146/ | 1001; | 147/ | 0101 |

ROM #1 -continued

| | | | | | | | |
|---|---|---|---|---|---|---|---|
| 148/ | 1001; | 149/ | 0101; | 150/ | 0101; | 151/ | 1101 |
| 152/ | 0011; | 153/ | 1011; | 153/ | 1011; | 155/ | 0111 |
| 156/ | 1011; | 157/ | 0111; | 158/ | 0111; | 159/ | 1111 |
| 160/ | 0000; | 161/ | 0000; | 162/ | 0000; | 163/ | 0000 |
| 164/ | 0000; | 165/ | 0000; | 166/ | 0000; | 167/ | 0000 |
| 168/ | 0010; | 169/ | 1010; | 170/ | 1010; | 171/ | 0110 |
| 172/ | 1010; | 173/ | 0110; | 174/ | 0110; | 175/ | 1110 |
| 176/ | 0000; | 177/ | 0000; | 178/ | 0000; | 179/ | 0000 |
| 180/ | 0000; | 181/ | 0000; | 182/ | 0000; | 183/ | 0000 |
| 184/ | 0011; | 185/ | 1011; | 186/ | 1011; | 187/ | 0111 |
| 186/ | 1011; | 189/ | 0111; | 190/ | 0111; | 191/ | 1111 |
| 192/ | 0000; | 193/ | 0000; | 194/ | 0000; | 195/ | 0000 |
| 196/ | 0000; | 197/ | 0000; | 198/ | 0000; | 199/ | 0000 |
| 200/ | 1010; | 201/ | 0010; | 202/ | 0110; | 203/ | 1010 |
| 204/ | 0110; | 205/ | 1010; | 206/ | 1110; | 207/ | 0110 |
| 208/ | 1011; | 209/ | 0010; | 210/ | 0111; | 211/ | 1011 |
| 212/ | 0111; | 213/ | 1011; | 214/ | 1111; | 215/ | 0111 |
| 216/ | 1001; | 217/ | 0001; | 218/ | 0101; | 219/ | 1001 |
| 220/ | 0101; | 221/ | 1001; | 222/ | 1101; | 223/ | 0101 |
| 224/ | 0000; | 225/ | 0000; | 226/ | 0000; | 227/ | 0000 |
| 228/ | 0000; | 229/ | 0000; | 230/ | 0000; | 231/ | 0000 |
| 232/ | 1011; | 233/ | 0011; | 234/ | 0111; | 235/ | 1011 |
| 236/ | 0111; | 237/ | 1011; | 238/ | 1111; | 239/ | 0111 |
| 240/ | 0000; | 241/ | 0000; | 242/ | 0000; | 243/ | 0000 |
| 244/ | 0000; | 245/ | 0000; | 246/ | 0000; | 247/ | 0000 |
| 248/ | 1010; | 249/ | 0010; | 250/ | 0110; | 251/ | 1011 |
| 252/ | 0110; | 253/ | 1010; | 254/ | 1110; | 255/ | 0110 |

ROM #2

| | | | | | | | |
|---|---|---|---|---|---|---|---|
| / | 0000; | 1/ | 0000; | 2/ | 0000; | 3/ | 0000 |
| 4/ | 0000; | 5/ | 0000; | 6/ | 0000; | 7/ | 0000 |
| 8/ | 0000; | 9/ | 0000; | 10/ | 0000; | 11/ | 0000 |
| 12/ | 0000; | 13/ | 0000; | 14/ | 0000; | 15/ | 0000 |
| 16/ | 0000; | 17/ | 0000; | 18/ | 0000; | 19/ | 0000 |
| 20/ | 0000; | 21/ | 0000; | 22/ | 0000; | 23/ | 0000 |
| 24/ | 0000; | 25/ | 0000; | 26/ | 0000; | 27/ | 0000 |
| 28/ | 0000; | 29/ | 0000; | 30/ | 0000; | 31/ | 0000 |
| 32/ | 0000; | 33/ | 0000; | 34/ | 0000; | 35/ | 0000 |
| 36/ | 0000; | 37/ | 0000; | 38/ | 0000; | 39/ | 0000 |
| 40/ | 0000; | 41/ | 0000; | 42/ | 0000; | 43/ | 0000 |
| 44/ | 0000; | 45/ | 0000; | 46/ | 0000; | 47/ | 0000 |
| 48/ | 0000; | 49/ | 0000; | 50/ | 0000; | 51/ | 0000 |
| 52/ | 0000; | 53/ | 0000; | 54/ | 0000; | 55/ | 0000 |
| 56/ | 0000; | 57/ | 0000; | 58/ | 0000; | 59/ | 0000 |
| 60/ | 0000; | 61/ | 0000; | 62/ | 0000; | 63/ | 0000 |
| 64/ | 0000; | 65/ | 0000; | 66/ | 0000; | 67/ | 0000 |
| 68/ | 0000; | 69/ | 0000; | 70/ | 0000; | 71/ | 0000 |
| 72/ | 0000; | 73/ | 0000; | 74/ | 0000; | 75/ | 0000 |
| 76/ | 0000; | 77/ | 0000; | 78/ | 0000; | 79/ | 0000 |
| 80/ | 0000; | 81/ | 0000; | 82/ | 0000; | 83/ | 0000 |
| 84/ | 0000; | 85/ | 0000; | 86/ | 0000; | 87/ | 0000 |
| 88/ | 0000; | 89/ | 0000; | 90/ | 0000; | 91/ | 0000 |
| 92/ | 0000; | 93/ | 0000; | 94/ | 0000; | 95/ | 0000 |
| 96/ | 0000; | 97/ | 0000; | 98/ | 0000; | 99/ | 0000 |
| 100/ | 0000; | 101/ | 0000; | 102/ | 0000; | 103/ | 0000 |
| 104/ | 0000; | 105/ | 0000; | 106/ | 0000; | 107/ | 0000 |
| 108/ | 0000; | 109/ | 0000; | 110/ | 0000; | 111/ | 0000 |
| 112/ | 0000; | 113/ | 0000; | 114/ | 0000; | 115/ | 0000 |
| 116/ | 0000; | 117/ | 0000; | 118/ | 0000; | 119/ | 0000 |
| 120/ | 0000; | 121/ | 0000; | 122/ | 0000; | 123/ | 0000 |
| 124/ | 0000; | 125/ | 0000; | 126/ | 0000; | 127/ | 0000 |
| 128/ | 1111; | 129/ | 1101; | 130/ | 1011; | 131/ | 1001 |

ROM #2 -continued

| | | | | | | | |
|---|---|---|---|---|---|---|---|
| 132/ | 0111; | 133/ | 0000; | 134/ | 0000; | 135/ | 0000 |
| 136/ | 1101; | 137/ | 1011; | 138/ | 1001; | 139/ | 0111 |
| 140/ | 1110; | 141/ | 0000; | 142/ | 0000; | 143/ | 0000 |
| 144/ | 1011; | 145/ | 1001; | 146/ | 0111; | 147/ | 1110 |
| 148/ | 1100; | 149/ | 0000; | 150/ | 0000; | 151/ | 0000 |
| 152/ | 1001; | 153/ | 0111; | 154/ | 1110; | 155/ | 1100 |
| 156/ | 1010; | 157/ | 0000; | 158/ | 0000; | 159/ | 0000 |
| 160/ | 0111; | 161/ | 1110; | 162/ | 1100; | 163/ | 1010 |
| 164/ | 1000; | 165/ | 0000; | 166/ | 0000; | 167/ | 0000 |
| 168/ | 0000; | 169/ | 0000; | 170/ | 0000; | 171/ | 0000 |
| 172/ | 0000; | 173/ | 0000; | 174/ | 0000; | 175/ | 0000 |
| 176/ | 0000; | 177/ | 0000; | 178/ | 0000; | 179/ | 0000 |
| 180/ | 0000; | 181/ | 0000; | 182/ | 0000; | 183/ | 0000 |
| 184/ | 0000; | 185/ | 0000; | 186/ | 0000; | 187/ | 0000 |
| 188/ | 0000; | 189/ | 0000; | 190/ | 0000; | 191/ | 0000 |
| 192/ | 1101; | 193/ | 1011; | 194/ | 1001; | 195/ | 0111 |
| 196/ | 1110; | 197/ | 0000; | 198/ | 0000; | 199/ | 0000 |
| 200/ | 1011; | 201/ | 1001; | 202/ | 0111; | 203/ | 1110 |
| 204/ | 1100; | 205/ | 0000; | 206/ | 0000; | 207/ | 0000 |
| 208/ | 1001; | 209/ | 0111; | 210/ | 1110; | 211/ | 1100 |
| 212/ | 1010; | 213/ | 0000; | 214/ | 0000; | 215/ | 0000 |
| 216/ | 0111; | 217/ | 1110; | 218/ | 1100; | 219/ | 1010 |
| 220/ | 1000; | 221/ | 0000; | 222/ | 0000; | 223/ | 0000 |
| 224/ | 1110; | 225/ | 1100; | 226/ | 1010; | 227/ | 1000 |
| 228/ | 0110; | 229/ | 0000; | 230/ | 0000; | 231/ | 0000 |
| 232/ | 0000; | 233/ | 0000; | 234/ | 0000; | 235/ | 0000 |
| 236/ | 0000; | 237/ | 0000; | 238/ | 0000; | 239/ | 0000 |
| 240/ | 0000; | 241/ | 0000; | 242/ | 0000; | 243/ | 0000 |
| 244/ | 0000; | 245/ | 0000; | 246/ | 0000; | 247/ | 0110 |
| 248/ | 0000; | 249/ | 0000; | 250/ | 0000; | 251/ | 0000 |
| 252/ | 0000; | 253/ | 0000; | 254/ | 0000; | 255/ | 0000 |

MEMORY UNIT

The calculator uses an all semiconductor memory system. Peripheral circuitry is bipolar and the memory consists of n-channel MOS read-only memory (ROM) and p-channel MOS read/write memory (RWM).

Addressing and physical layout of the memory module is done so that the number of words can be increased from 5K in the basic machine to 9K in the largest machine. The smallest increment of memory that can be added is 512 words.

The basic machine contains 9.5K words of memory, organized into 7.5K × 16 ROM, and 2K × 16 RWM. The 16-bit RWM words are divided into user registers and processor words. The largest machine contains 15.5K words of ROM and 4K words of RWM.

Read/Write Memory

As shown in FIGS. 35–37B memory is made up of 1024 × 1, dynamics, read/write memory chips (Intel 1103). These devices are P-channel, MOS using silicon gate technology. To maintain the contents of memory, the device must be refreshed every 2 ms. This is accomplished by performing a read cycle at a given address. On each chip are 32 refresh amplifiers so that each read cycle, 32 cells get refreshed. The entire chip is then refreshed by cycling through the lower 5 address bits and reading each distinct address. The refresh period is 20 μs at least every 2 ms.

Logic levels on all input lines to the RWM chips are 0 to + 16v. This includes the 3 clock lines (chip select, Y-enable or write, and precharge), 10 address lines, and input data. The output data, however, is a current of 600 μa or more into 1K ohms or less. This low level output is wire-or-able with other chips to build larger systems.

Read Only Memory

As shown in Figs, 35 and 38–40 ROM chips are 4096 bit, *n*-channel MOS arranged 512 × 8. The devices are static and consume no power when not enabled. Data is retrieved from the ROMs by pulling the chip enable line from 0 to + 12v (turning the chip on), addressing the desired cells (0 or 4v levels) and selecting which output devices are to be enabled (4v or 0v). The output levels are sufficient to drive one TTL gate directly, and can be wire-or/ed for large systems.

As further shown in FIGS. 41 and 42A–D, each ROM chip comprises six input buffers. These input buffers generate both the input and its complement. On the basis of the 64 possible combinations of the 6-inputs $I_0$-$I_5$, one of the 64 lines in the decoder is selected. The selected line enables one of the vertical lines in the 64 × 64 bit storage array. For example, let $I_0 - I_5$=0 and $_6 - I_8$ be don't-cares. This means line X00 (octal) is selected.

The two 8 out of 32 select decoders must choose 16 lines from the 64 horizontal lines selected by the vertical line X00. (The 8 out of 32 select decoder is actually a 2 out of 8 decoder repeated 4 times in each of the sections A – B). The output from four MOS Fet's *a*, *b* *c*, and *d* are wire-or/ed. MOS devices *a'*, *b'*, *c'*, and *d'*are also connected similarly. If $I_6$ and $I_7$ =0, horizontal lines 1XX 2XX, 3XX, 5XX, 6XX, 7XX are grounded in each of the four sections A–B. This insures that MOS FET's *b*, *c*, *d*, *b'*, *c'*, and *d'*are non-conductive. This allows signals on lines 0XX and 4XX to pass into the output sections through transistors *a* and *a'*.

The output section contains the output buffer, 1 of 2 decoder, and the output drivers *s*. The output buffer provides a stage of gain and wire-or-'s 4 lines from the storage array. The 1 of 2 decoder clamps the gates of 2 of the 4 output drivers in each section A-B by enabling either line $I_8$ or its complement ($\overline{I_8}$). This disables 1 of 2 signals coming from the output buffer. The output drivers then can be tied together with line (*e* ) for a 512 × 8 organization.

Figures 44, 45:
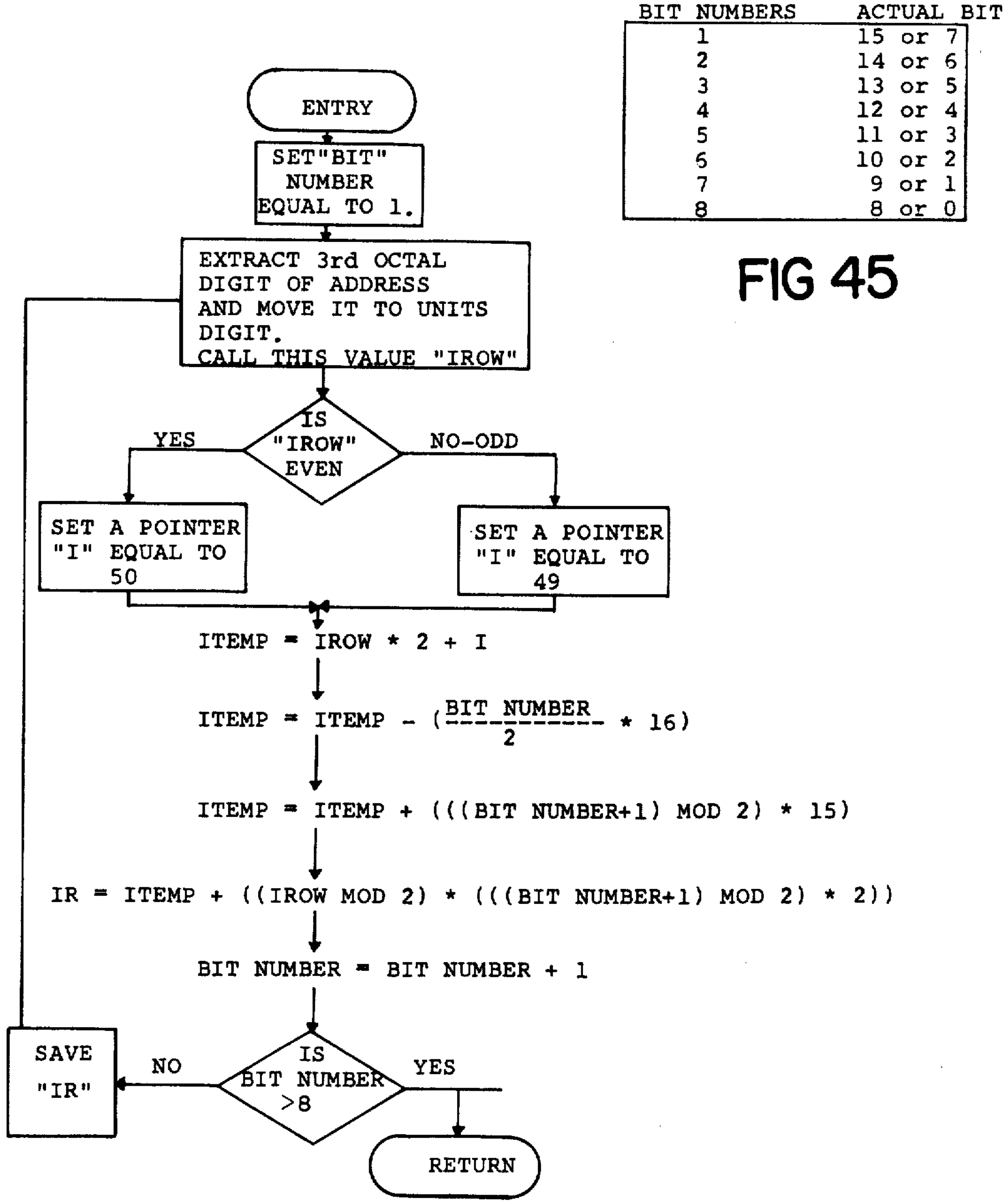
FIG. 44 is a flow chart illustrating how the row members of the lists stored in the read-only memory chips are computed.
FIG. 45 is a table of bit numbers and actual bits used in connection with the flow chart of FIG. 44.

Each of the above-listed constants and routines and subroutines of basic instructions employed by the calculator is stored in these ROM chips. The sixteen bits of each constant and basic instruction are stored in the $512_{10} \times 8_{10}$ ROM chips by organiziang the ROM chips into 64 ×64 bit matrices and computing the row and column numbers of each bit of each matrix by operating on each address and the particular bit (15 through 8, or 7 through 0). The column number is computed by subtracting the last two digits of the address from $100_8$. For example, the column number of address 000 = $100_8 - 00_8 = 100 = 64_{10}$ and the column number of address 777 = $100_8 - 77_8 = 1$. The computation of the row number (referred to as IR in the flow-chart of FIG. 44) can best be described by referring to the flowchart of FIG. 44 and the associated table of FIG. 45. Once the row and column numbers are found it is a simple matter of storing in that location of the matrix that particular bit (i.e., a 1 or a 0). A 0 is stored at a designated location by forming a metal gate to complete a MOS FET device at that location, and a 1 is stored at a designated location by leaving off the metal gate so that a a MOS FET device is not formed at that location.

M-Register

Figure 35:
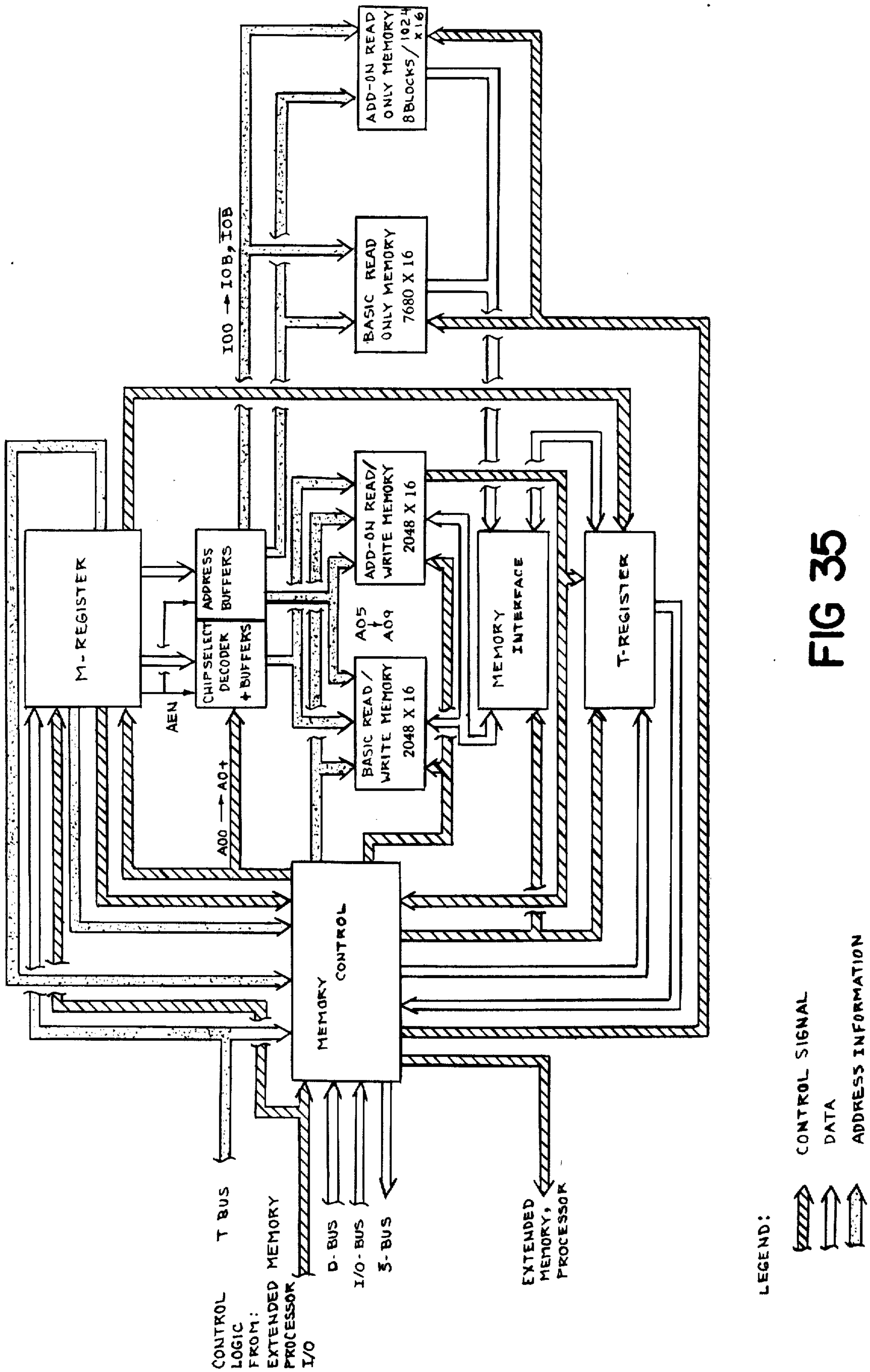
FIG. 35 is a block diagram of the memory unit of FIGS. 3A–B.
Figure 36:
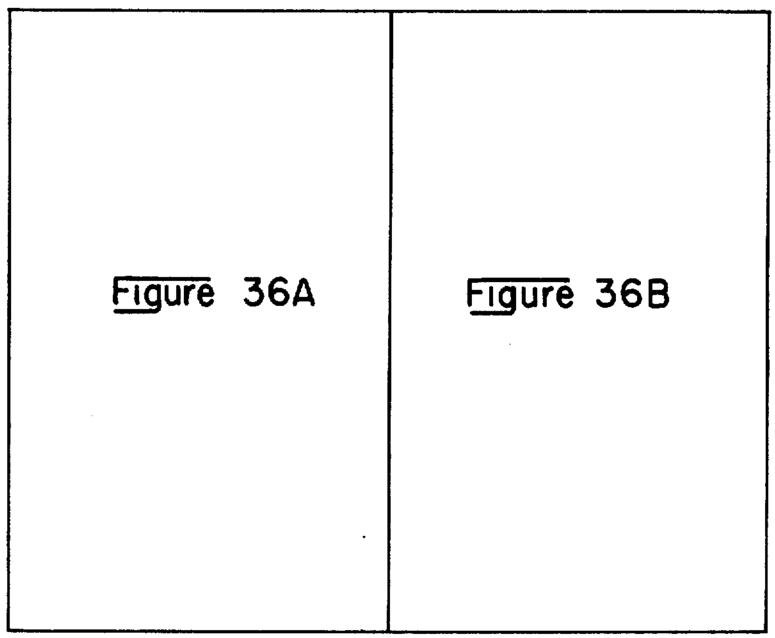
FIG. 36' is a diagram showing the arrangement of FIGS. 36A–B.
Figure 36A:
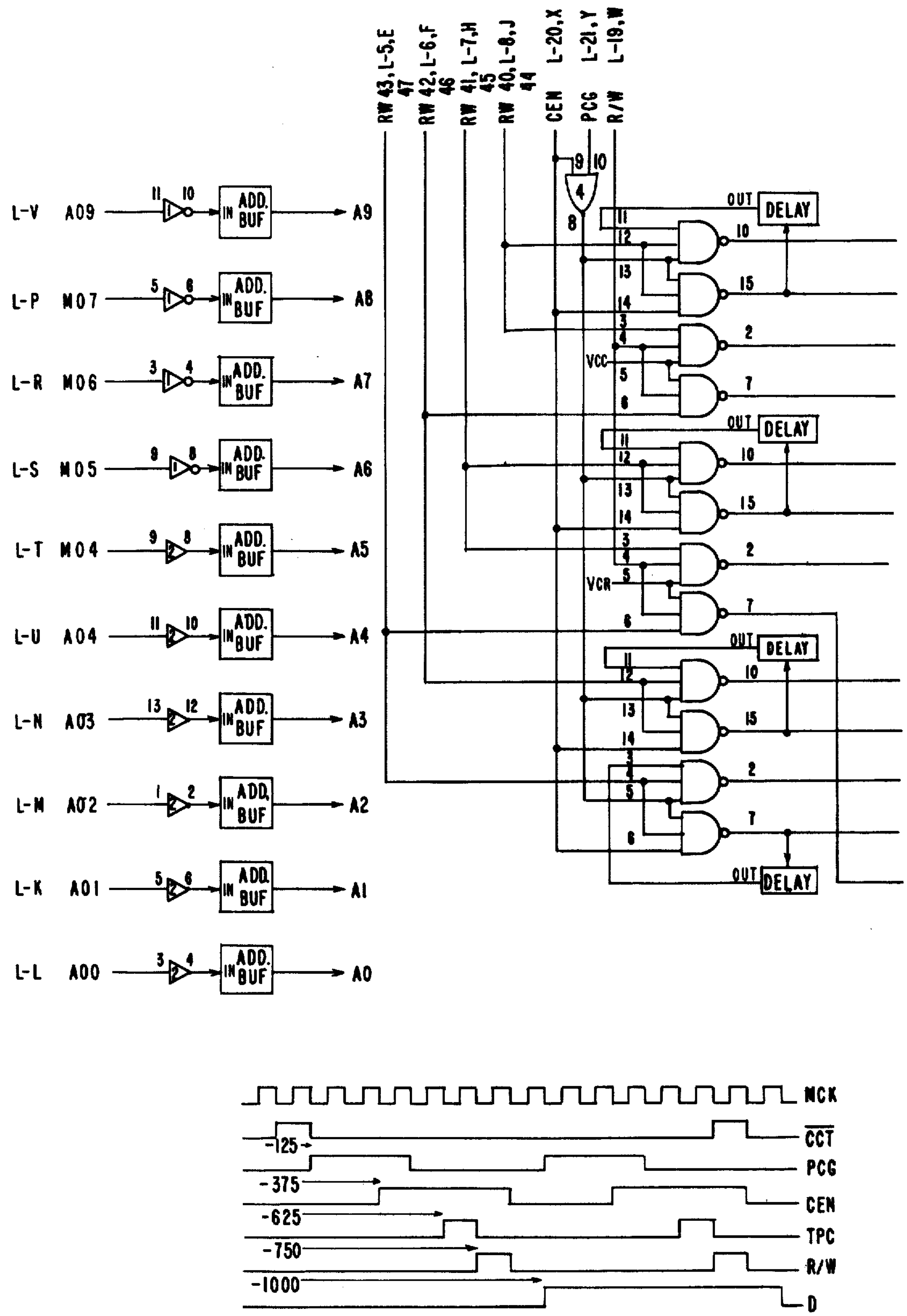
FIGS. 36A–B are a schematic diagram of the read-write memory of FIGS. 3A–B, 4A–F, and 35.
Figure 36B:
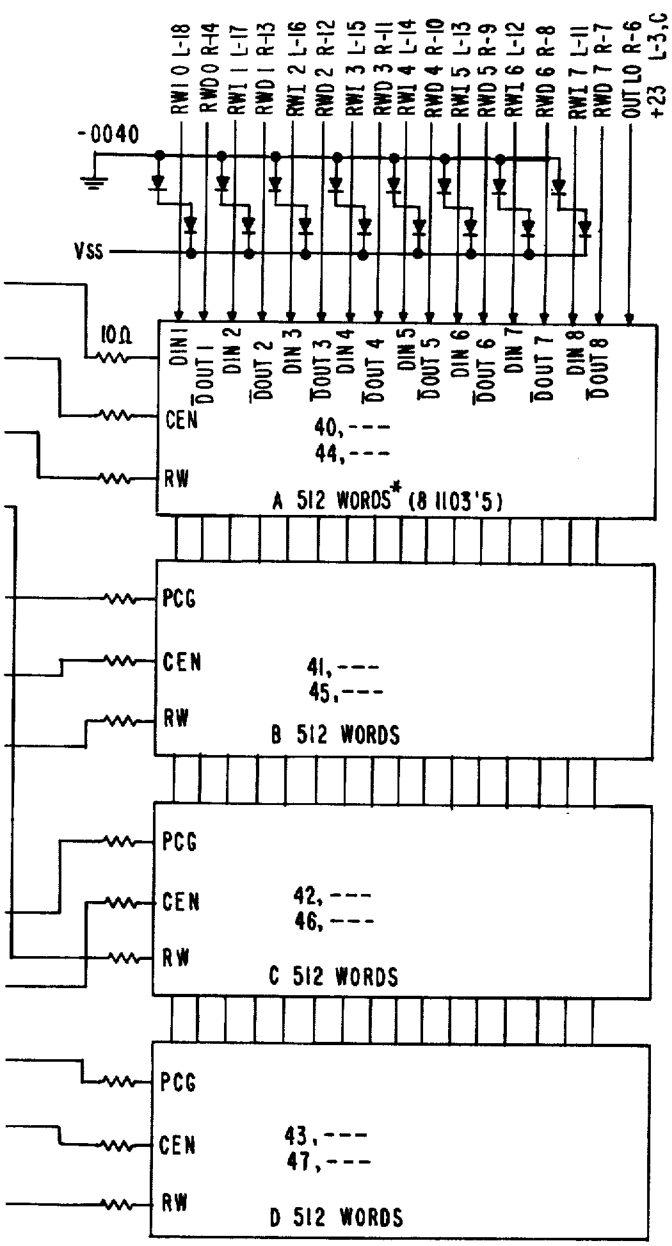
Figure 36B:
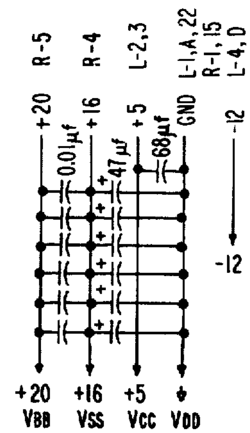
Figure 36B:
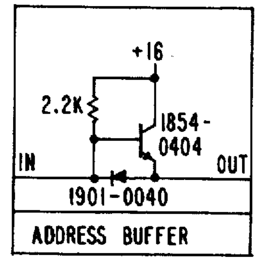
Figure 36B:
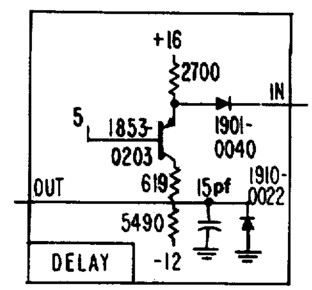
Figure 36B:
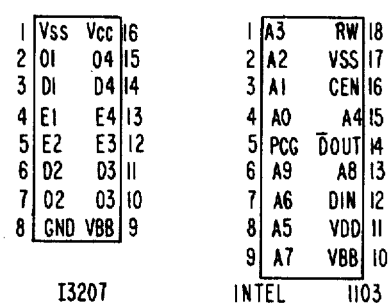
Figure 37:
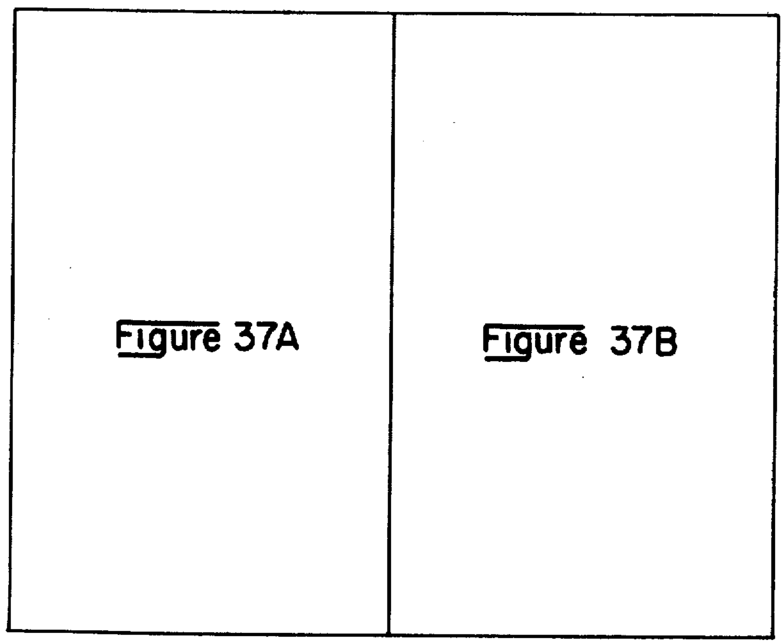
FIG. 37' is a diagram showing the arrangement of FIGS. 37A–B.
Figure 37A:
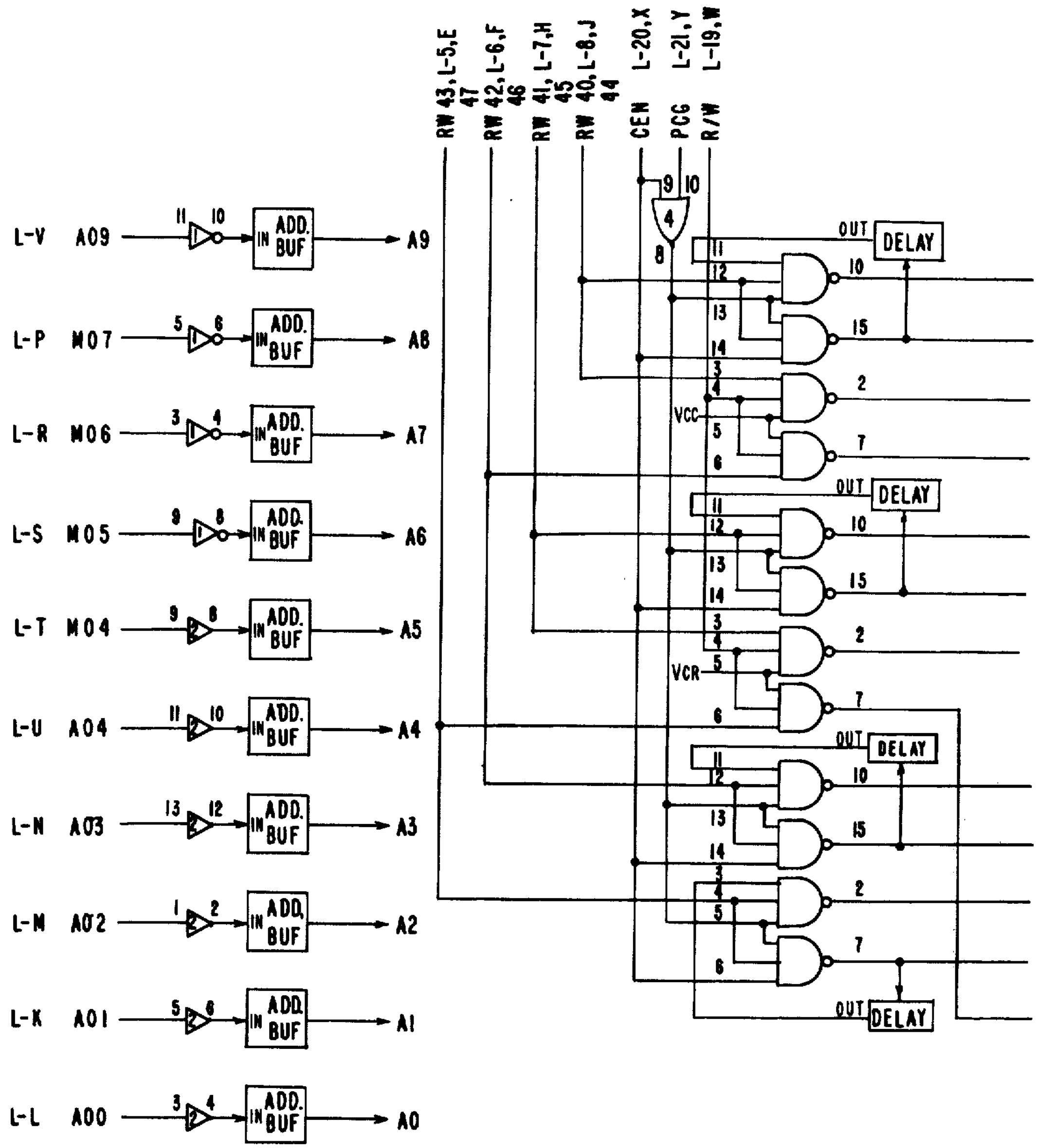
FIGS. 37A–B are a schematic diagram of the optional add-on read-write memory of FIGS. 3A–B, 4A–F, and 35.
Figure 37A:
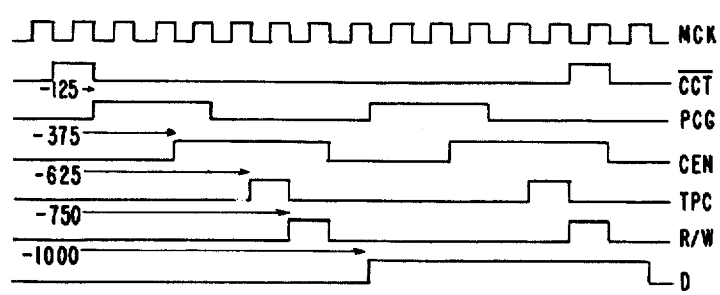
Figure 37B:
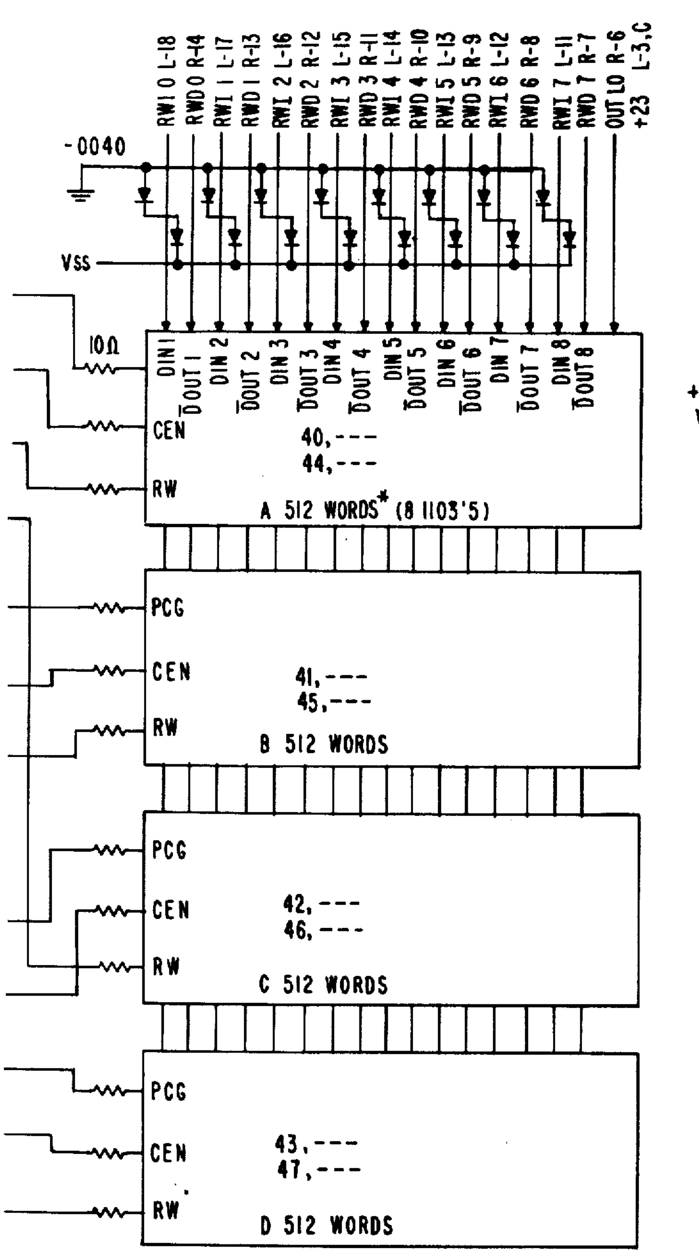
Figure 37B:
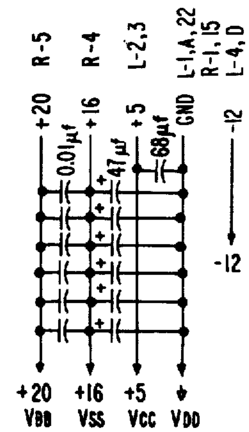
Figure 37B:
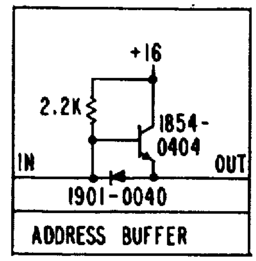
Figure 37B:
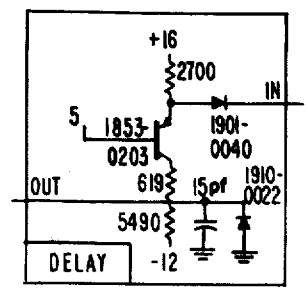
Figure 38:
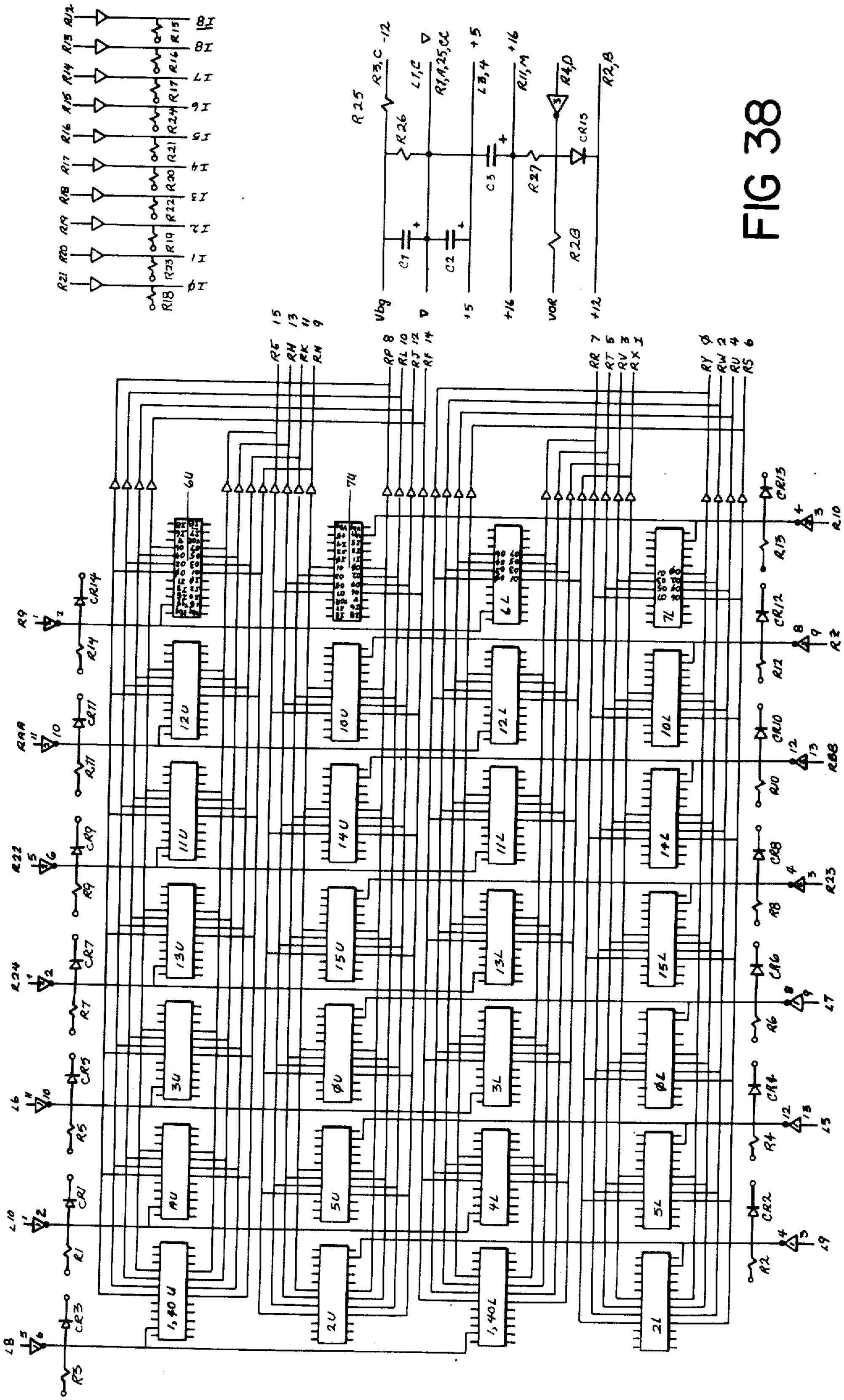
FIG. 38 is a schematic diagram of the basic read-only memory of FIGS. 3A–B, 4A–F, and 35.
Figure 39:
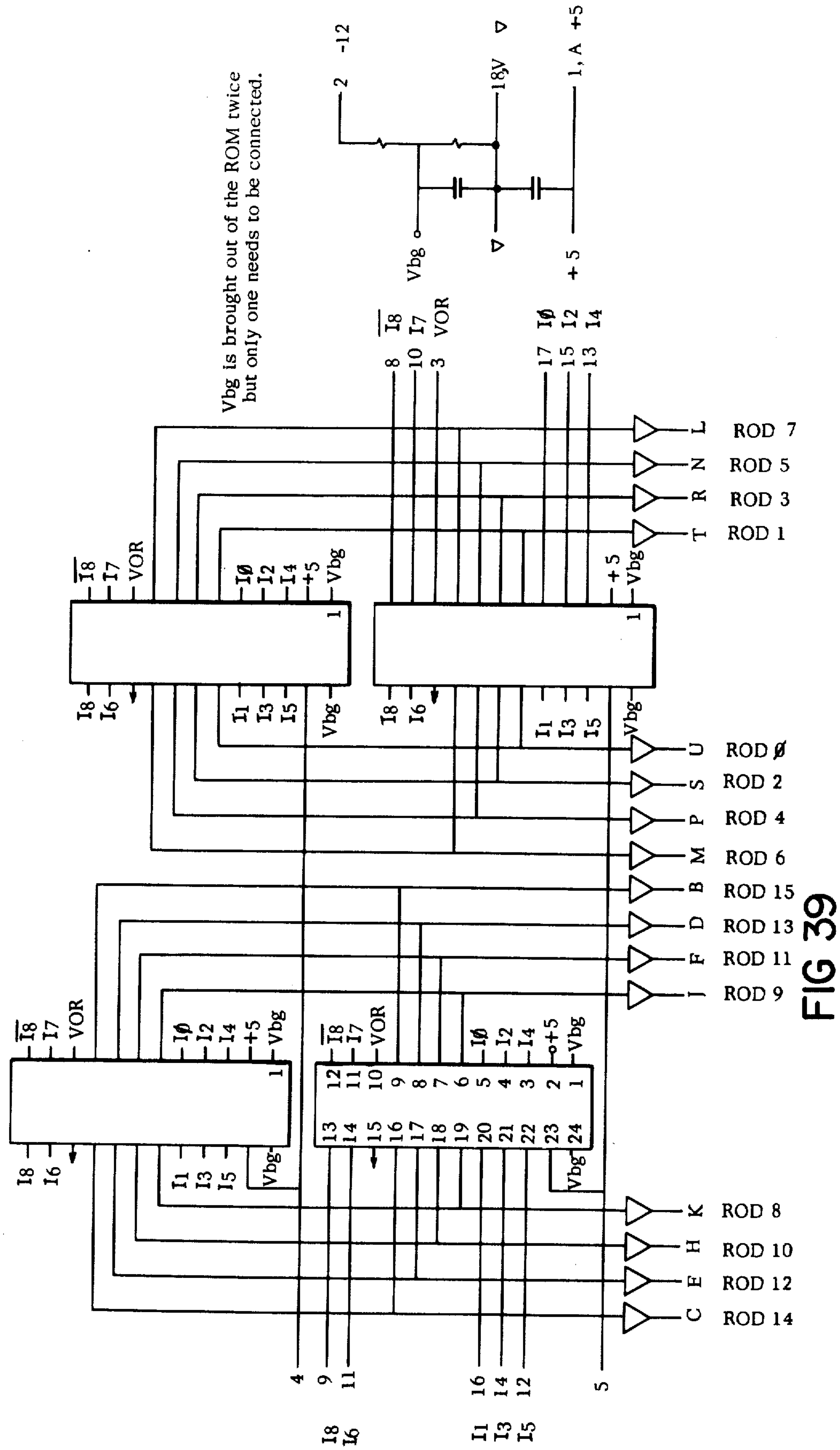
FIG. 39 is a sehematic diagram of the optional add-on read-only memory modules of FIG. 35 that may be plugged into the calculator to increase the number of functions available to the user.
Figure 40:
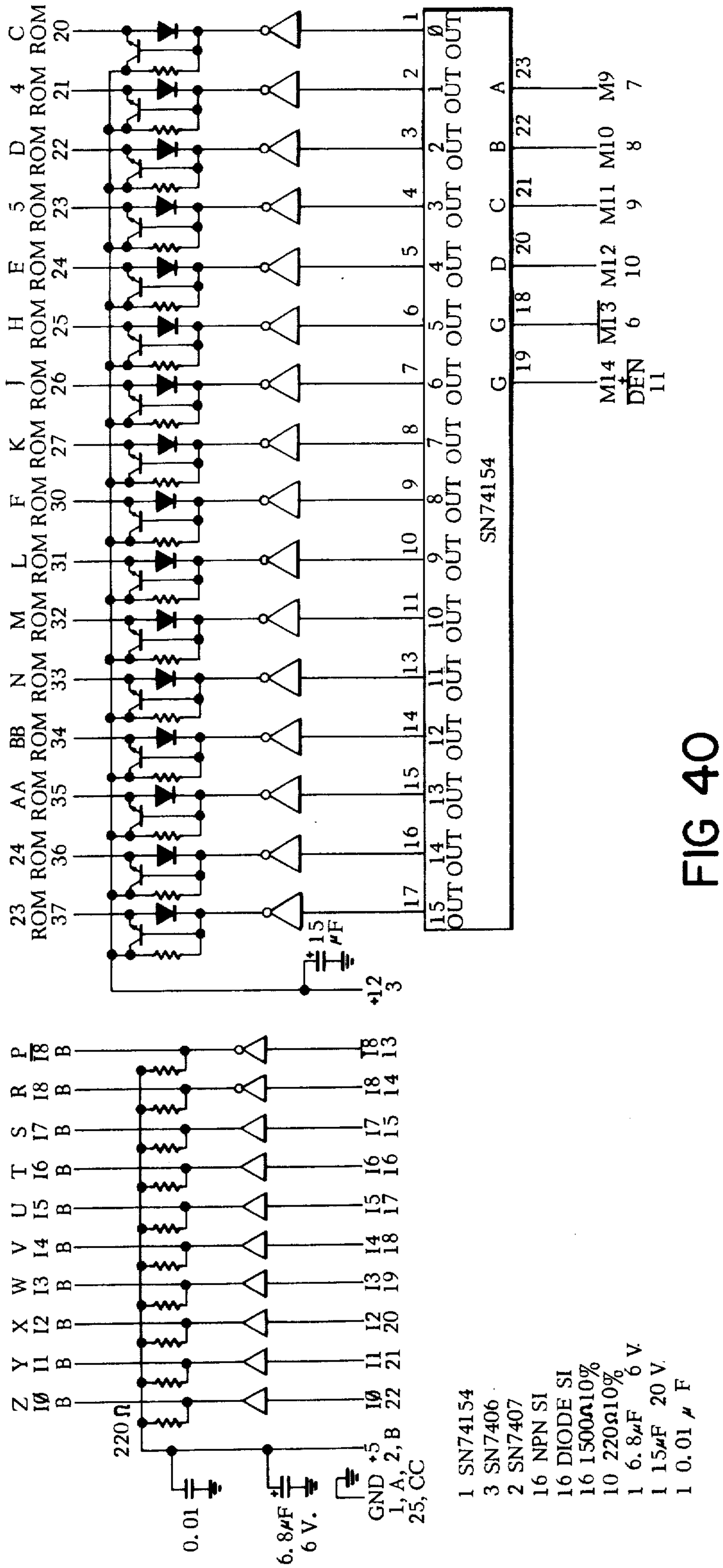
FIG. 40 is a detailed schematic diagram of the buffer circuitry associated with the read-only memory modules of FIG. 39.
Figure 41:
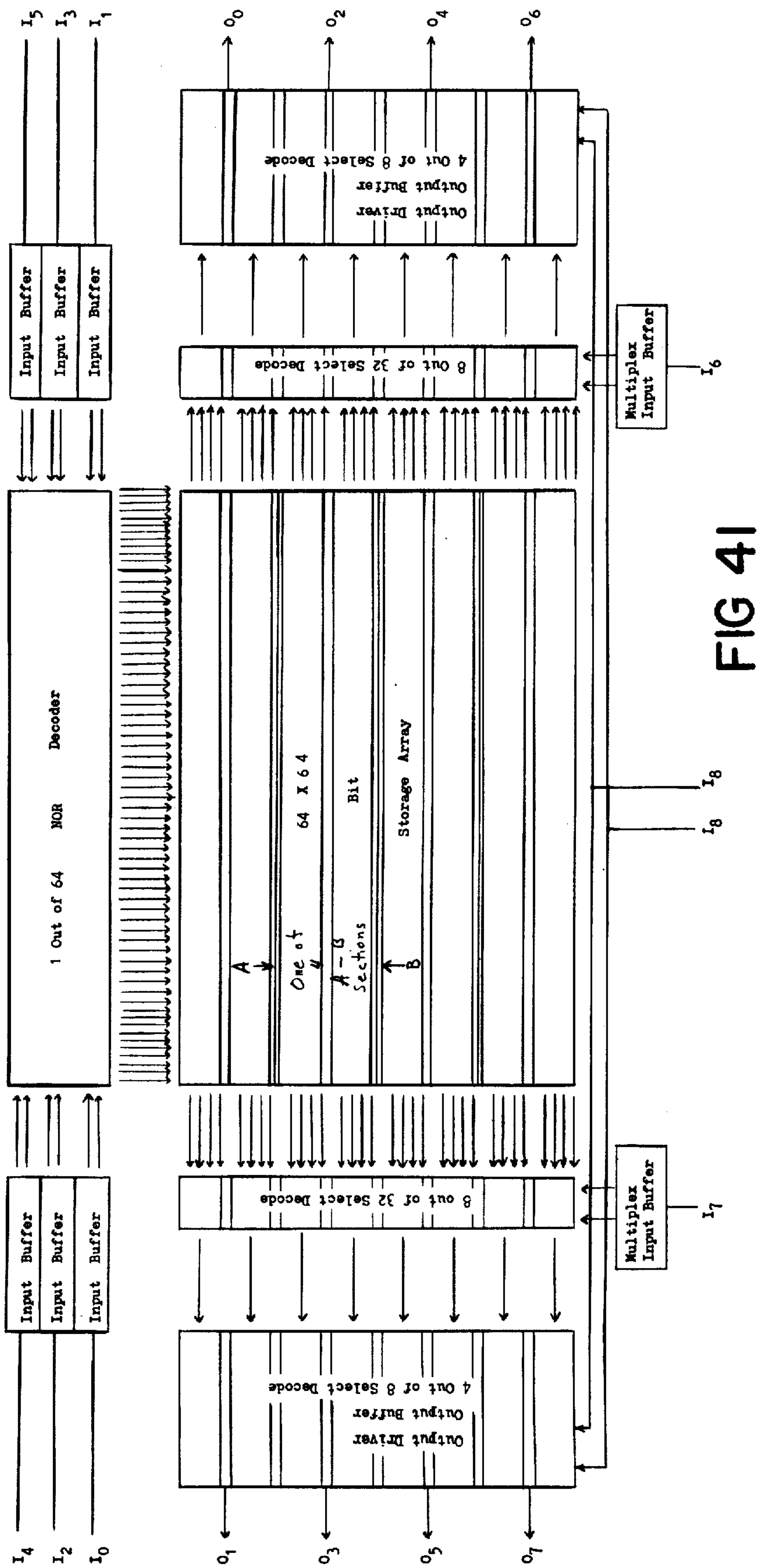
FIG. 41 is a block diagram of one of the read-only memory chips of FIGS. 38 and 39.
Figure 42:
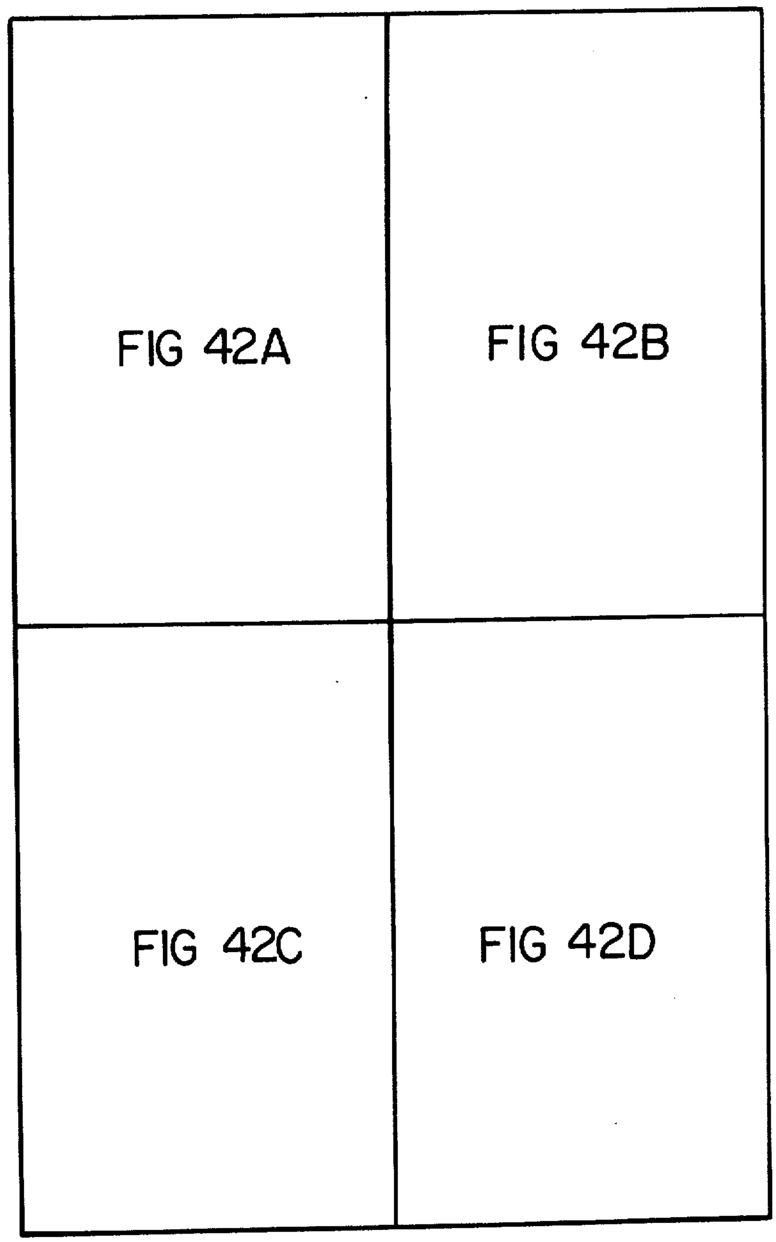
FIG. 42' is a diagram showing the arrangement of FIGS. 42A–D.
Figure 42A:
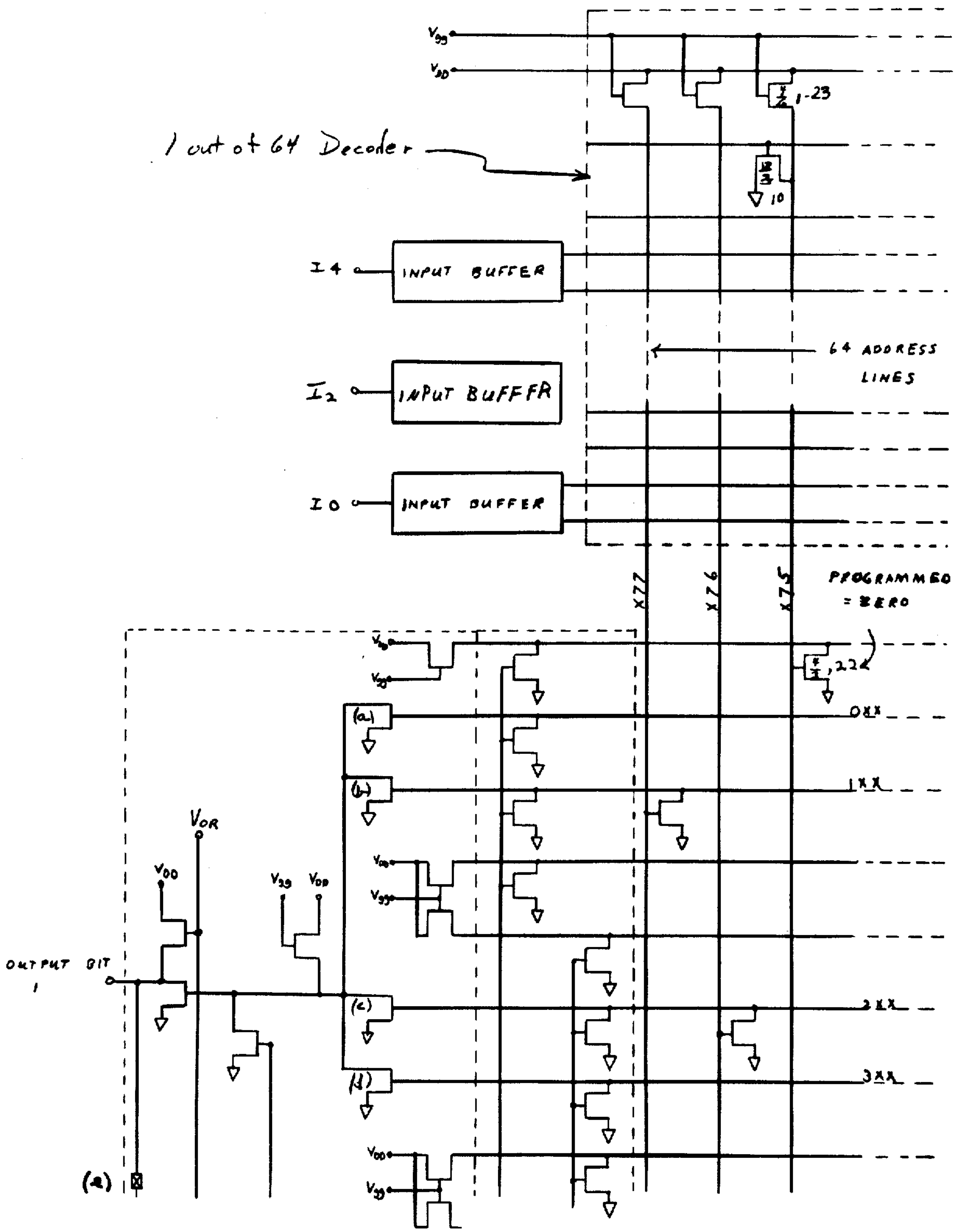
Figure 42B:
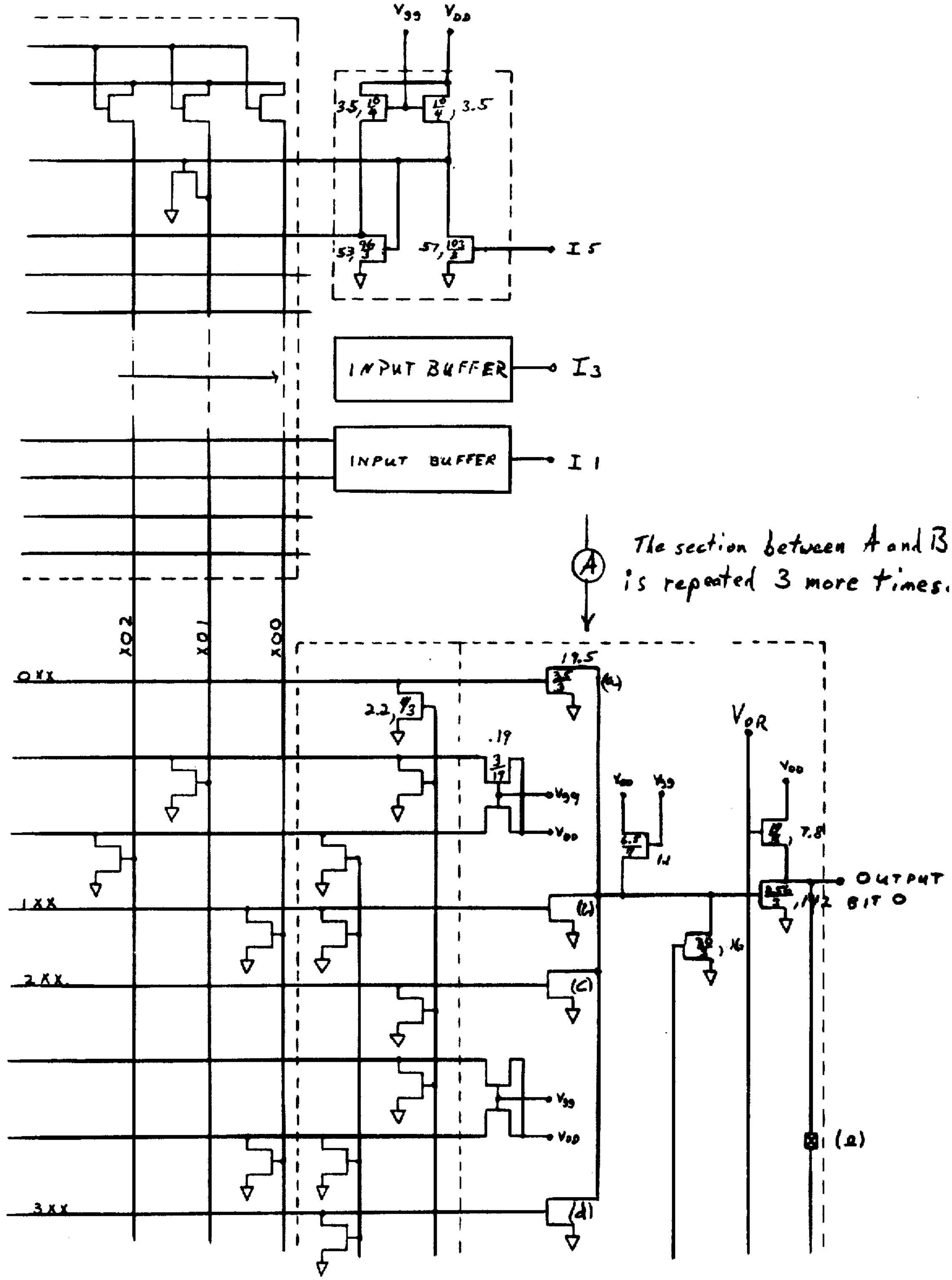
Figure 42D:
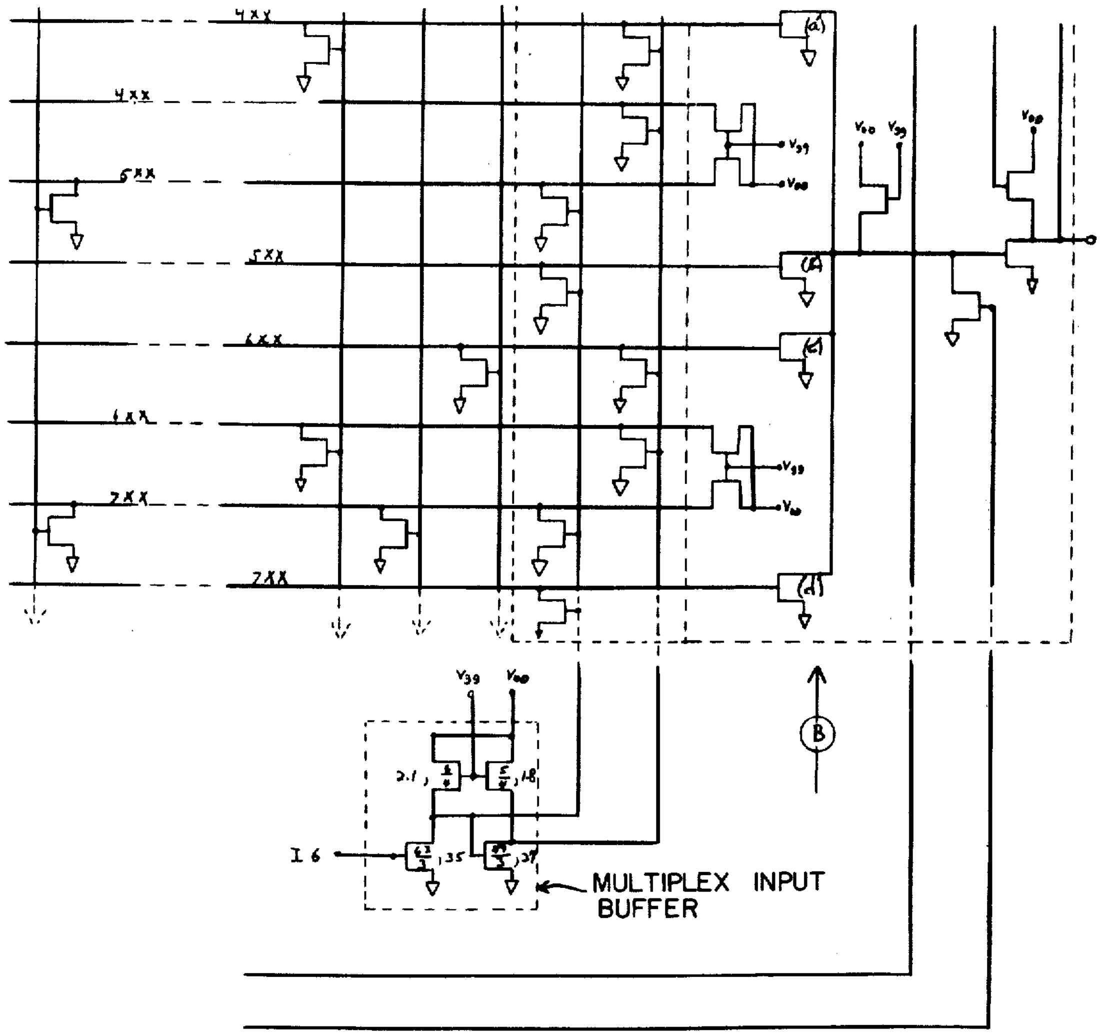
Figure 43:
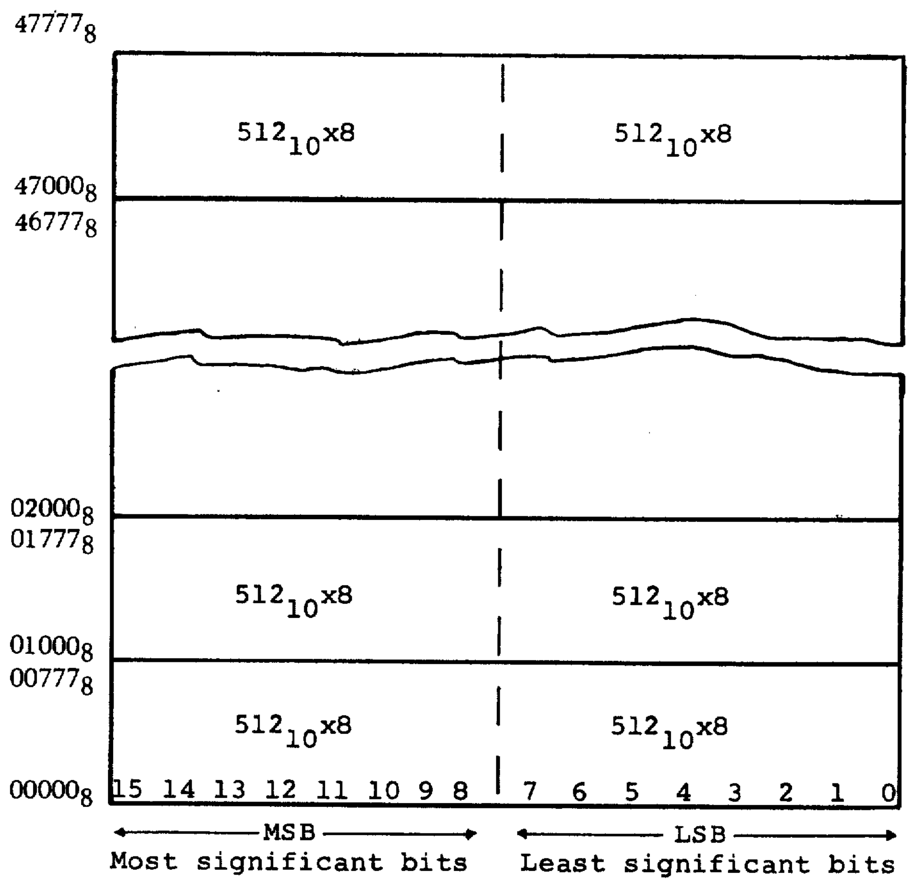
FIG. 43 is a memory map of the memory unit of FIGS. 3A–B and 4A–F illustrating how it is partitioned into the read-only and read-write memory chips of FIGS. 36A–B through 42A–D.
Figure 46:
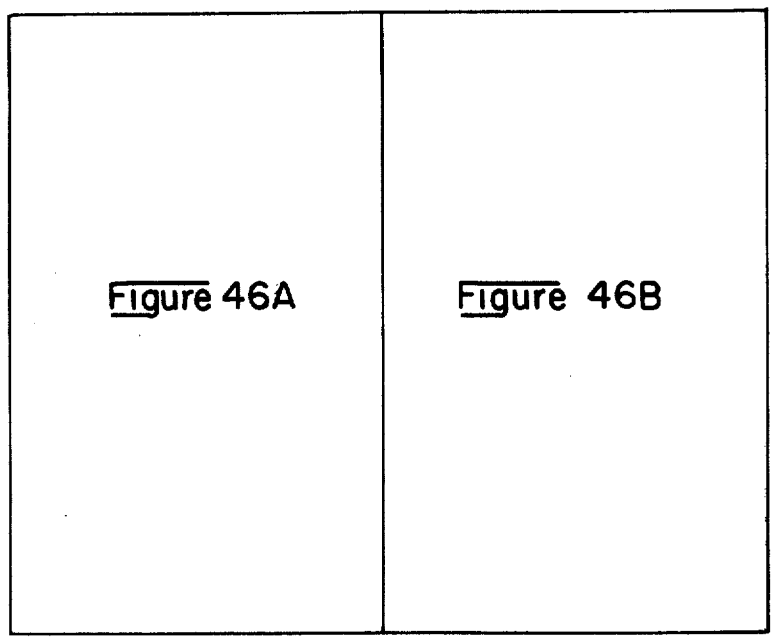
FIG. 46' is a diagram showing the arrangement of FIGS. 46A–B.
Figure 46A:
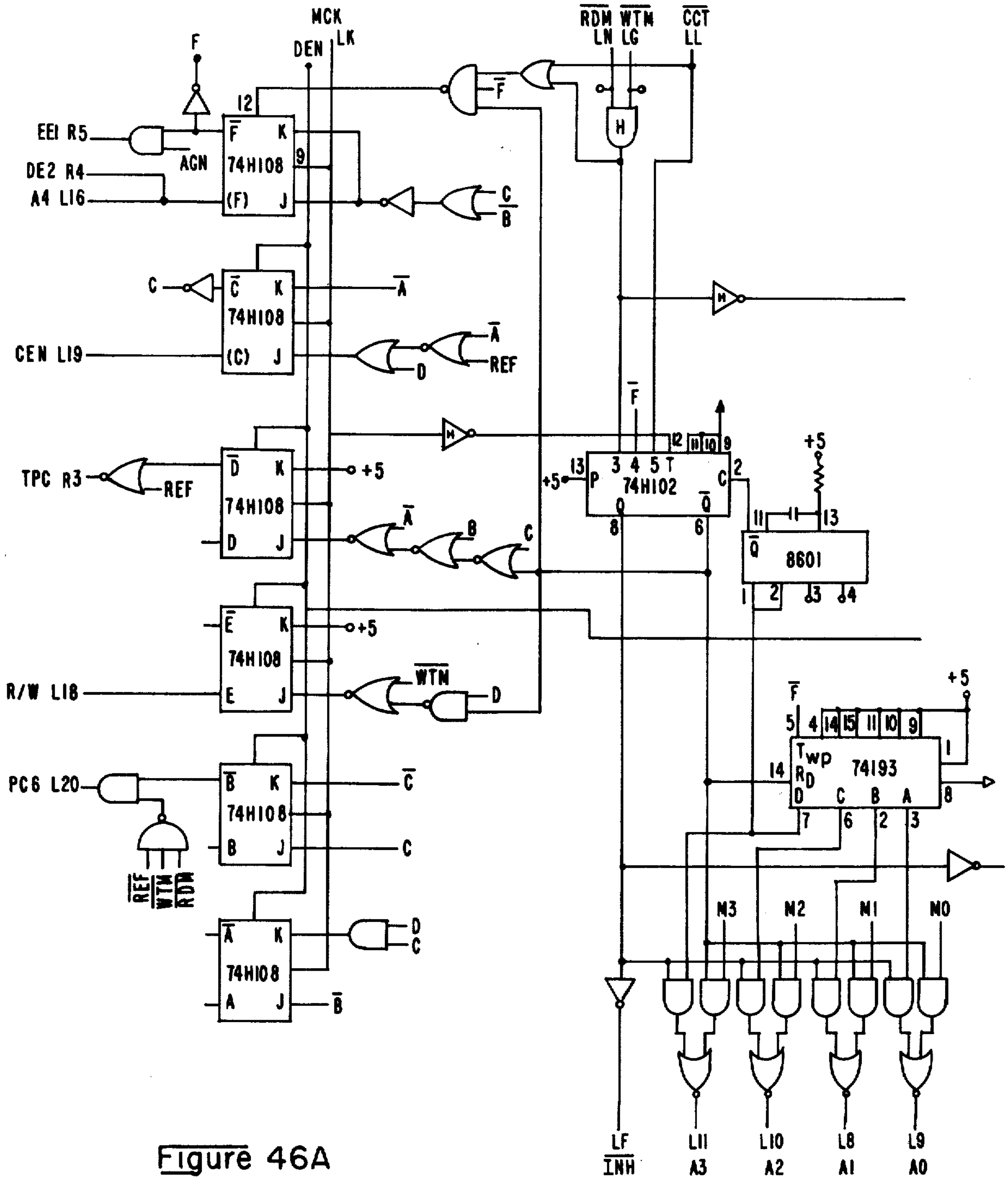
FIGS. 46A–B are a detailed schematic diagram of the memory address register of FIGS. 3A–B and 35 with its associated control circuitry.
Figure 46B:
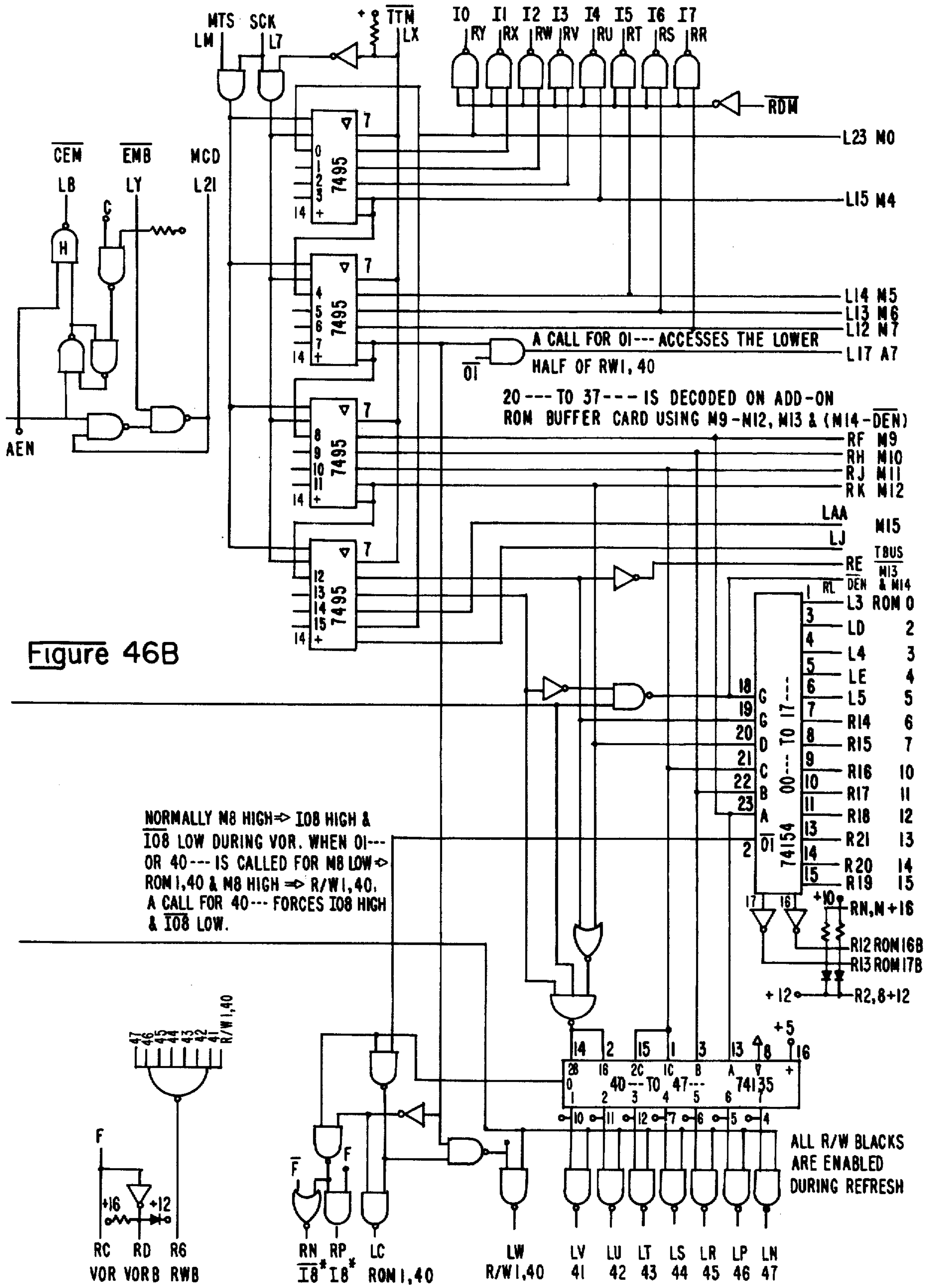
Figure 47A:
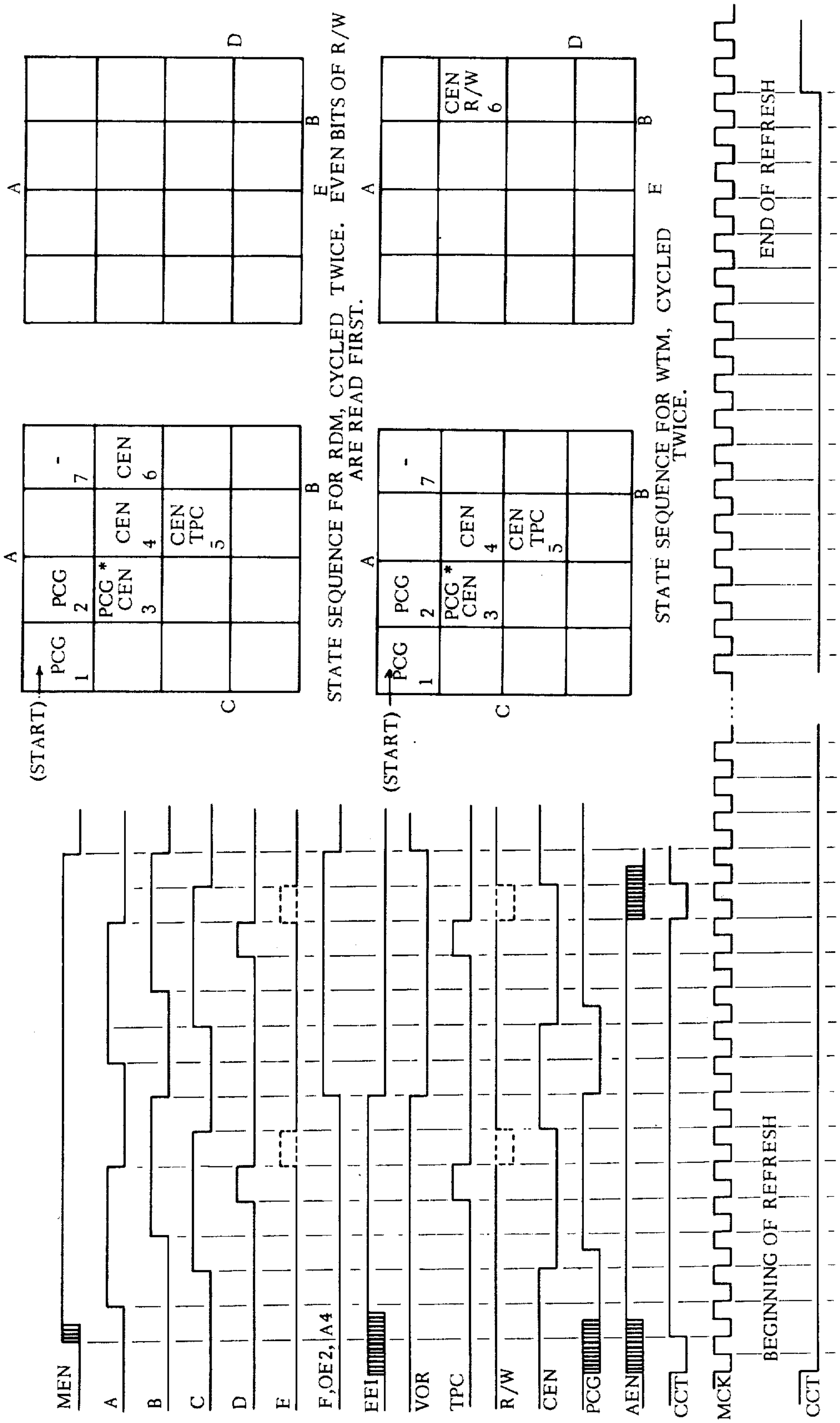
FIGS. 47A–B are a waveform diagram and state sequence charts illustrating the operation of the control circuitry of FIGS. 46A–B.
Figure 47B:
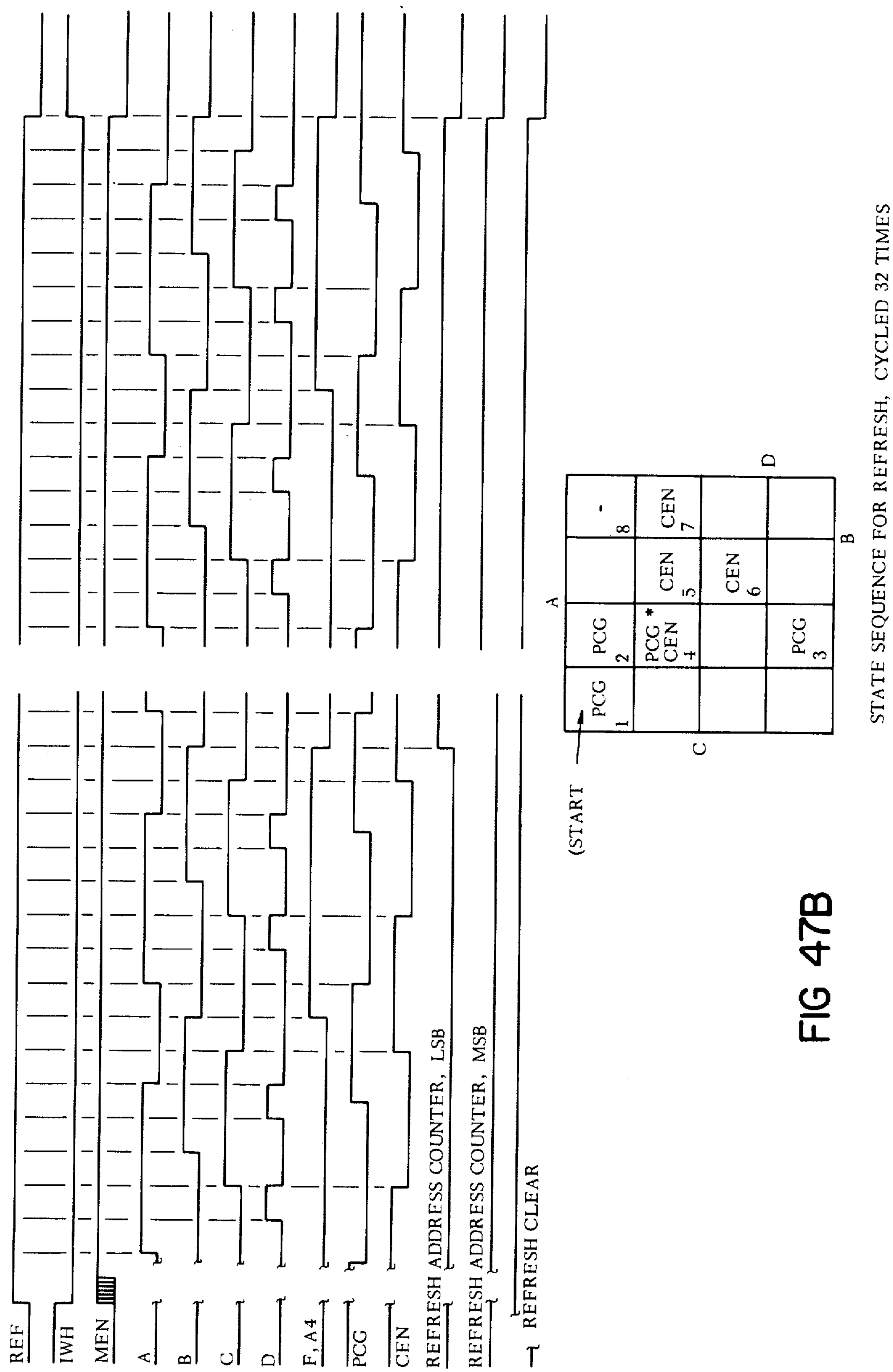

As shown in FIGS. 35 and 46A–B included on the M-Register board is the 16-bit Address or M-Register, all chip enable decoding and buffering, and address buffers for both ROM and RWM. The register uses four, four bit, serial in and out, parallel in and out shift Registers. Upon receipt of a TTM instruction from the microprocessor, serial data from the T-Bus is accepted into the M-register. Nothing is done with this data until either a read or write instruction is received, then one of two decoders are enabled. These chip Enable decoders uniquely decode which block of 512 words, either ROM or RWM, is being addressed. If ROM is being addressed, the signal is inverted and amplified to +12v. For RWM the Chip Enable enables a gate, which allows a 16 Volt clock signal to reach the enabled RWM chips. The clock wave-form is generated on the control card.

The dynamic characteristic of the RWM chips, requires that all chips be enabled simultaneously during a refresh cycle, to refresh the entire read/write memory. The buffer circuits in the output of the Chip enable decoders allow the chip select clock to reach all of the RWM chips during refresh but only those being accessed, during a read or write cycle.

Totem Pole outputs or gates with resistor pull-ups are used a buffers for the ROM address lines. Using the totem pole output gates, the effects of crosstalk can be minimized while the resister pullup lifts the address lines above the required 4v level. The nand gates are enabled during a memory cycle so that the ROM address lines are inhibited at a 5v level. The RWM address lines must pull from 0v to + 16v. High voltage, open collector, inverters with discrete transistor pull-ups are used as buffers for all the address bits.

Control

A memory cycle consists of a read or write instruction from the processor accompanied by 12 clock pulses from the shift clock. As shown in FIGS. 35, 46A–B and 47A–B, control uses these pluses and instructions to generate the clocks required by the RWM chips. A synchronous system of flip-flops and gates are used. The outputs from the flip-flops are then buffered to become the required clock signals (Pre-charge, Y-enable, chip select).

Refreshing the read/write memory is also taken care of by the control. An astable multivibrator with a repetition rate of 500 HZ minimum generates a signal which allows a refresh cycle to occur. A flip-flop generates the actual signal (REF), but only if the astable multivibrator signal is high, there is no read or write cycle in progress and the processor signal, $\overline{CCT}$, is high. $\overline{CCT}$ goes high between processor instructions, thus it is known that nothing is going to be interrupted when REF is generated. REF is then buffered by an open collector inverter and given to the processor $\overline{INH}$. $\overline{INH}$ halts the machine and the refresh cycle begins.

The same system used for a memory cycle is used during refresh to again generate the necessary clocks (Precharge and chip select). When the system returns to state 0 and REF is present, a counter is advanced one count. This counter provides the refresh addresses which go to the RWM only if REF is present. When this counter returns to state 0, it causes REF and $\overline{INH}$ to return to present conditions and the machine continues normal operation.

Another function of the control is to provide for extended memory capability. The control handles any external memory as if it were an extension of the internal memory. From the user's point of view, he does not need to know if an extended memory is connected other than the fact that avaiable memory has increased.

In addition, the control has the provision for extracting information from or loading information into the calculator T-Register through the D-Bus (data bus).

Other signals generated on the control are employed to direct the flow of data in the T-register.

T-Register

Figure 48A:
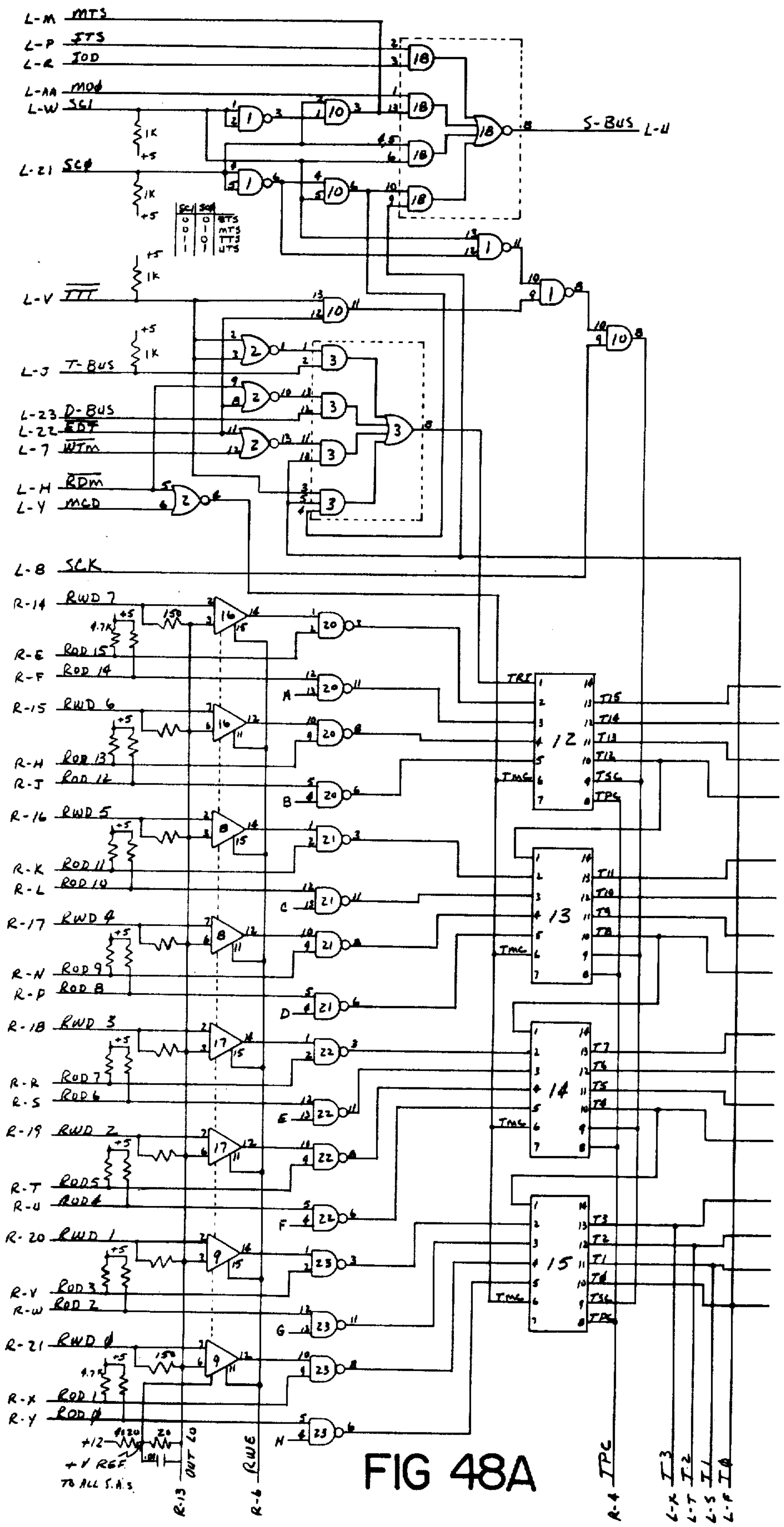
FIGS. 48A–B are a detailed schematic diagram of the memory access register of FIGS. 3A–B and 35.
Figure 48B:
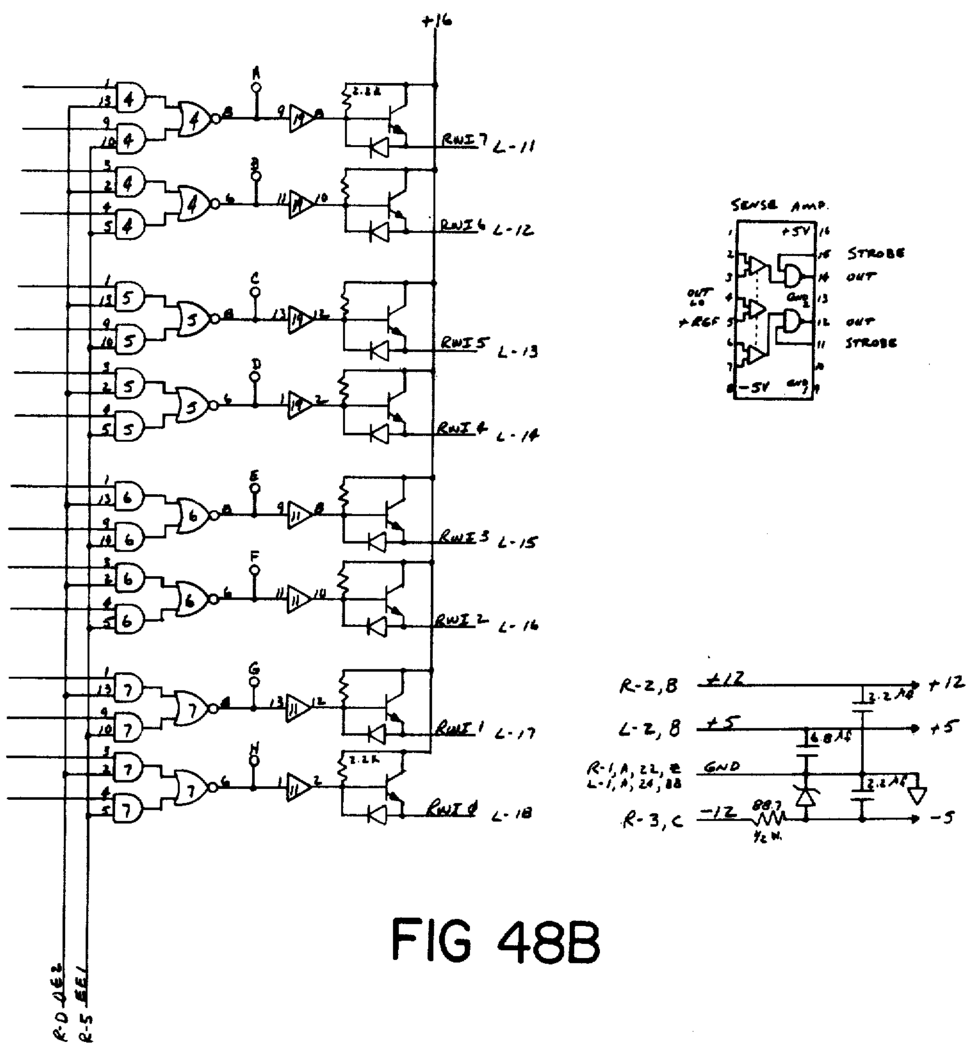
Figure 49A:
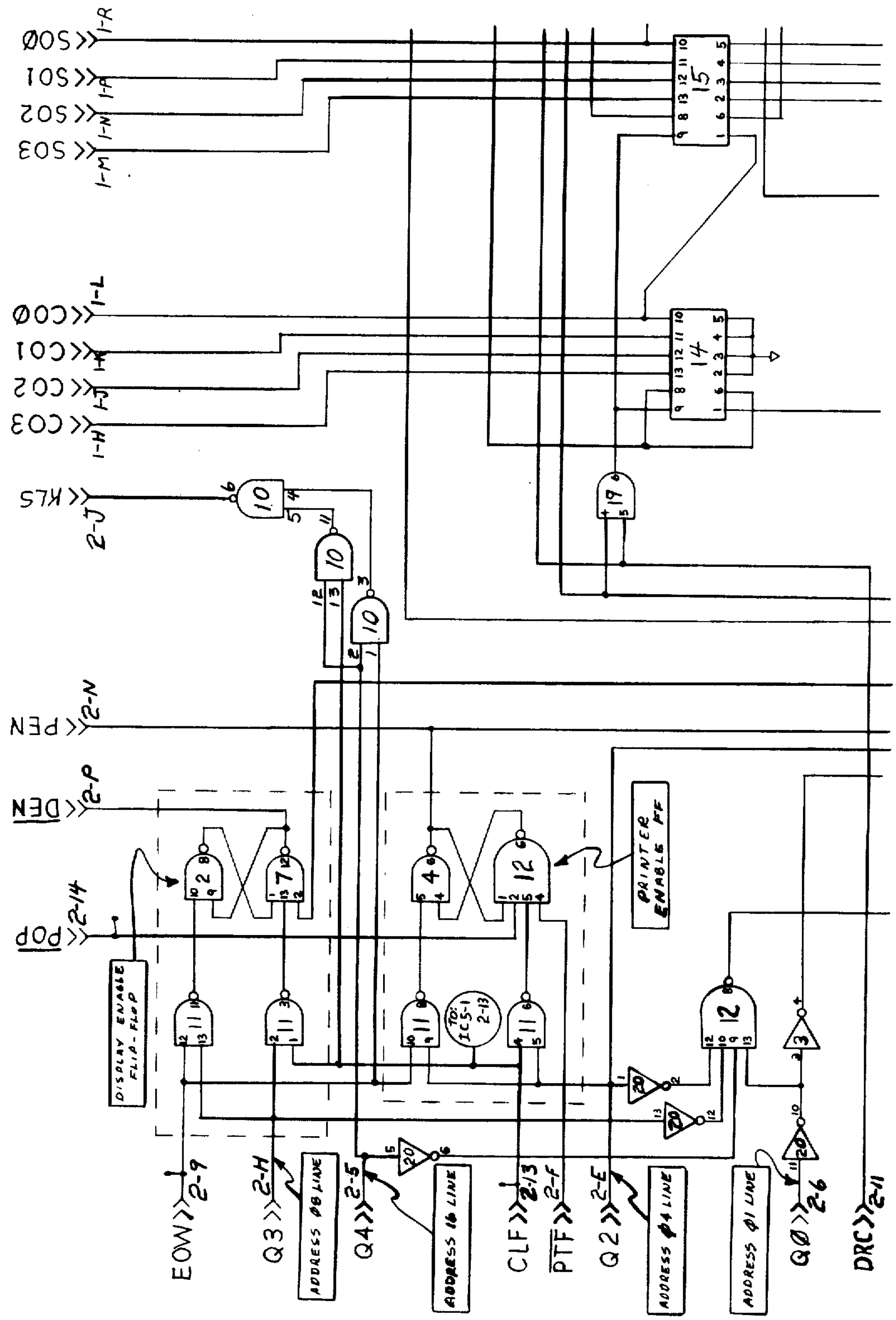
FIGS. 49A–D are a detailed schematic diagram of the input-output register and gating control circuits employed in the input-output control unit of FIGS. 3A–B.
Figure 49B:
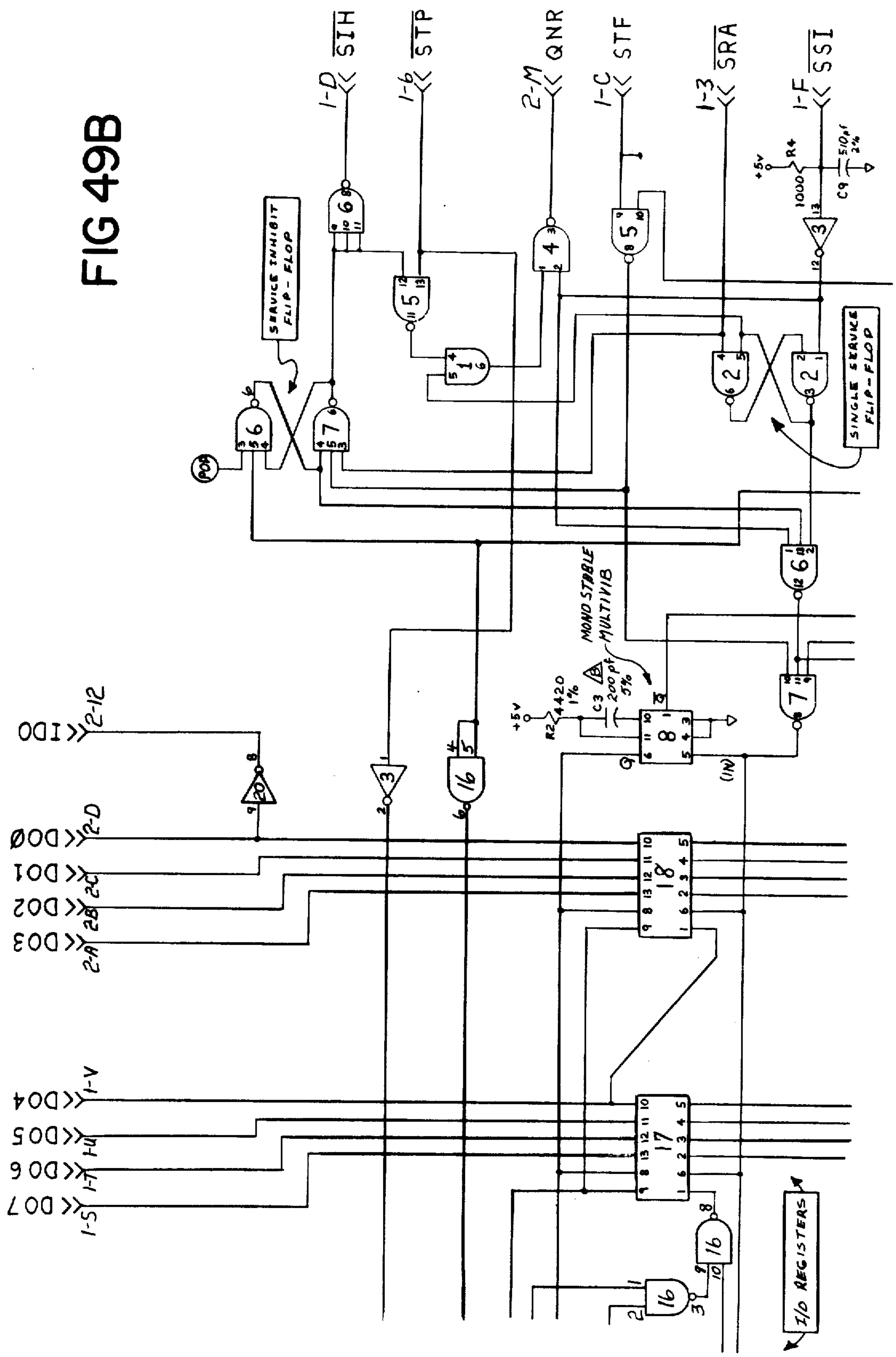
Figure 49C:
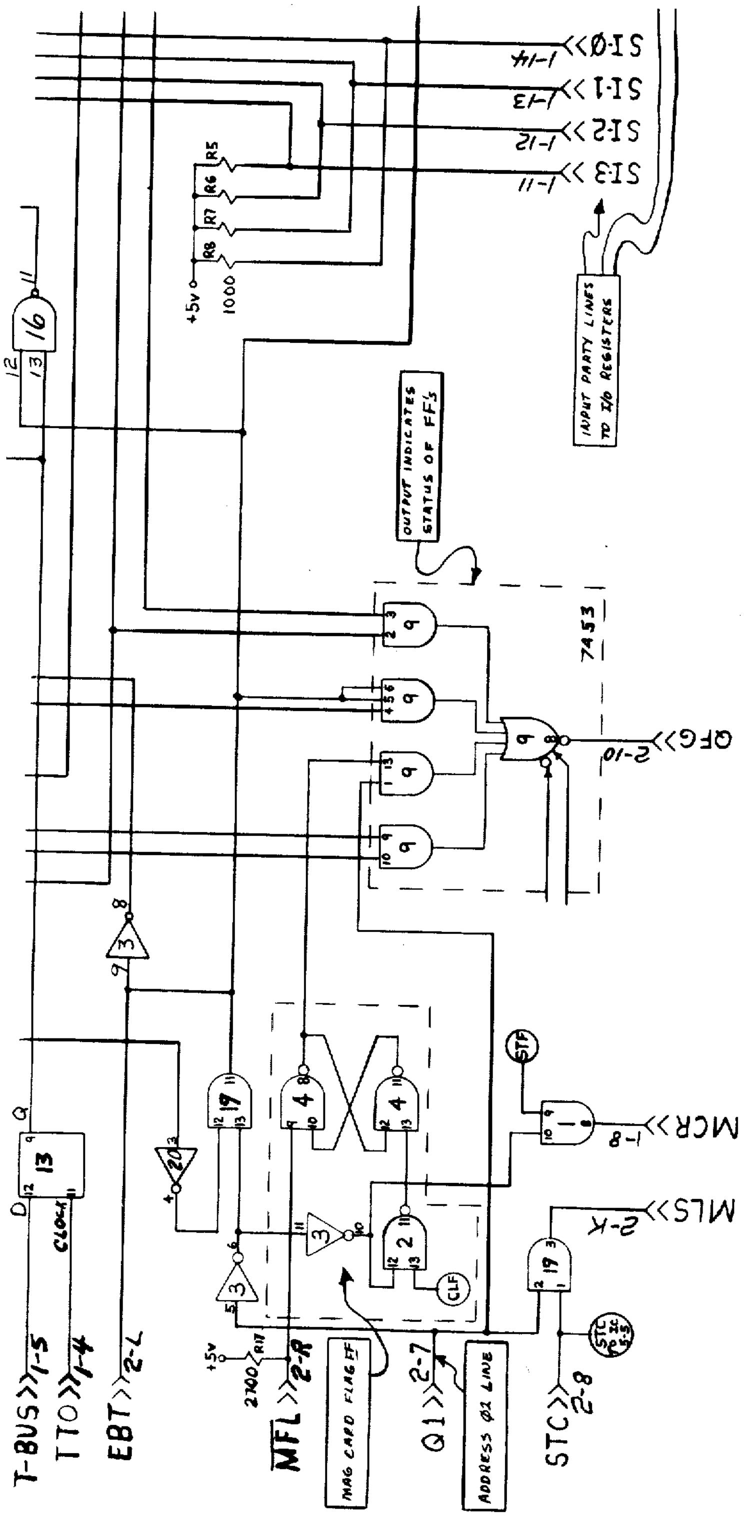
Figure 49D:
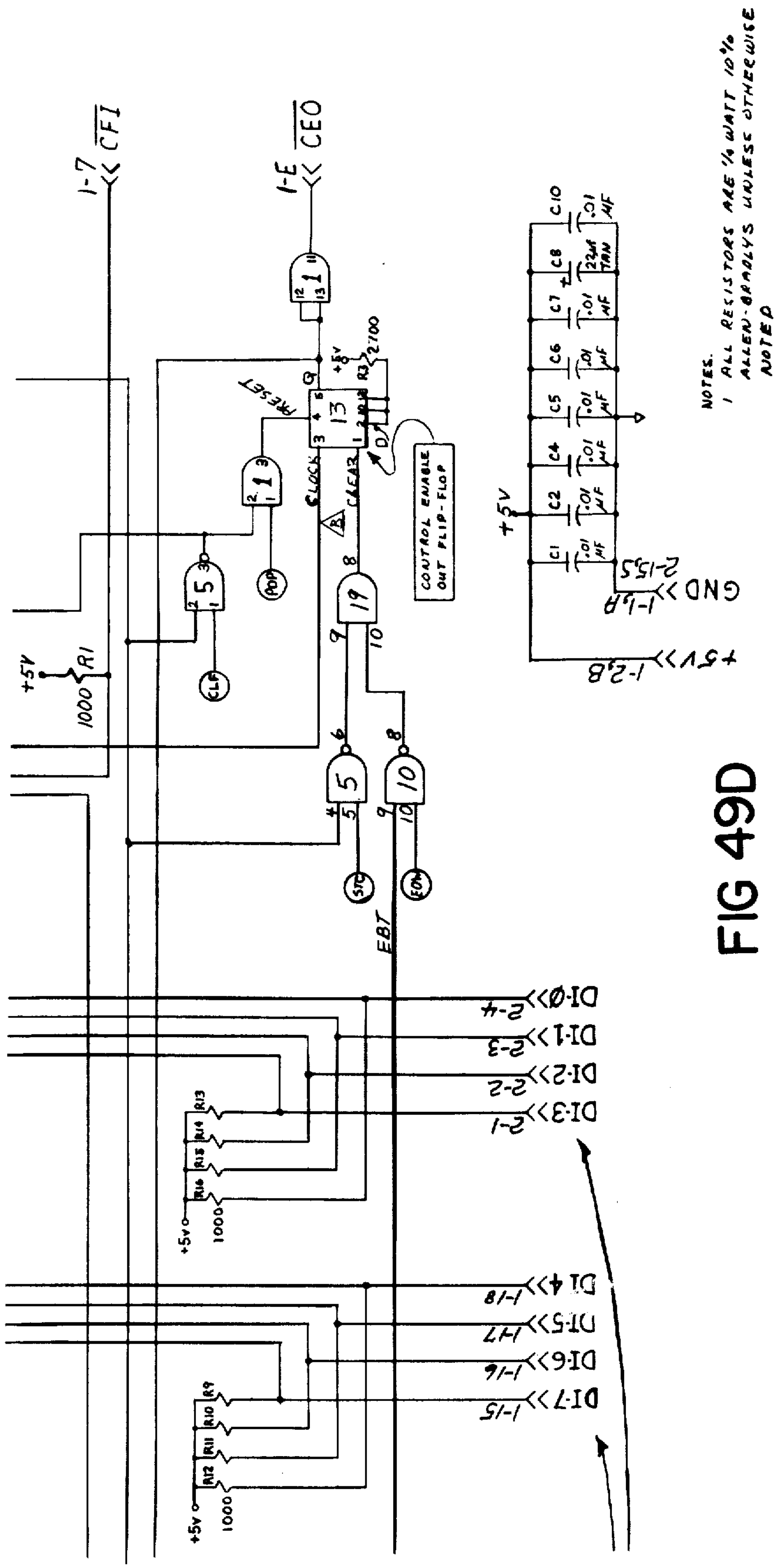

Data to and form the memory is temporarily stored in the T-register. As shown in FIGS. 35 and 48A–B four 4-bit, serial in and out, parallel in and out shift registers make up the actual T-register. The registers have a mode control (TMC) which when low, allows serial data flow and when high, allows parallel data flow.

Serial data enters the T-register in the presence of the $\overline{TTT}$ instruction, and in the presence of a $\overline{TTS}$ recirculated in the T-register to prevent loss of data.

Parallel data is accepted from eigher ROM or RWM during a read cycle. The ROM data is buffered by NANd gates and the RWM by sense amplifiers followed by the same NAND gates. All 16 bits are read from the ROM simultaneously. Eight bits are read from RWM twice during a read cycle. The eight bits to be written into RWM have their own discrete buffer stage that translates $T^2L$ logic levels into 16v logic levels used by the RWM.

MEMORY SYSTEM MNEMONIC TABLE

SIGNALS GENERATED OUTSIDE MEMORY I/O CONNECTOR

| | |
|---|---|
| $\overline{CCT}$ | — Control clock-not, the inverted envelop of SCK |
| SCK | -- Shift clock. |

-continued

| | |
|---|---|
| MCK | — Memory clock, a continuous pulse train, used by the memory control for timing of the memory and refresh cycles. |
| IOD | — I/O Data. Goes to control board to be gated to $\bar{S}$-BUS. |
| ITS | — I/O to $\bar{S}$-BUS, the signal which gates IOD to $\bar{S}$-BUS. |
| SCO & SCI | — Coded signals which generate UTS – Units to $\bar{S}$-BUS<br>ZTS – Zero to $\bar{S}$-BUS<br>MTS – M-Reg to $\bar{S}$-BUS<br>TTS – T-Reg to $\bar{S}$-BUS |
| TTT | — T-BUS to T-Reg, OV = True. |
| T-BUS | — Data on this bus acts as inputs to M & T registers. |
| $\overline{RDM}$ | — Read memory, negative true. Lasts for 12 clock pulses. |
| $\overline{WTM}$ | — Write memory, negative true. Lasts for 12 clock pulses. |
| $\overline{INH}$ | — Inhibit, negative true. The processor is stopped whenever $\overline{INH}$ is at zero volts. The memory control generates this signal while a R/W memory refresh cycle is present. I/O also generates it. |

OTHER SIGNALS AT I/O CONNECTOR

| Name | Source |
|---|---|
| TOO | T-Register |
| TO1 | T-Register |
| TO2 | T-Register |
| TO3 | T-Register |

| | |
|---|---|
| D-BUS | — Data Bus - external data (extended memory data) enters machine via this bus. |
| $\overline{EDT}$ | — External Data Transfer gates D-Bus data into machine $O^r$ = True. |
| $\overline{EMB}$ | — Extended memory busy. Signal provided by extended memory that tells memory control<br>a. Extended memory cycle is complete<br>b. Extended memory is present. |

SIGNALS GENERATED ON READ/WRITE MEMORY CARDS

| | |
|---|---|
| RWD(XX) | — Read/Write data. Output from the 1103 memory.<br>600μa into 150Ω = Ω1"<br>0 current = 0 |

OTHER SIGNALS USED BY (RWM)

| Name | Source |
|---|---|
| A00–A04 | CONTROL |
| A05–A09 | M-REG |
| CEN | M-REG |
| RWI(XX) | T-REG |
| R/W | CONTROL |
| PCG | CONTROL |

SIGNALS GENERATED ON T-REGISTER CARD

| | |
|---|---|
| T00–T15 | — T-register data bits. Used as data into memory T00-T03 are also outputs to the CPU. (4 bit processing) |
| RWI(XX) | — Read/write inputs. T-register data gates to Read/write memory. +16V ⟶ GND. |

OTHER SIGNALS USED BY T-REGISTER

| Name | Source |
|---|---|
| ROD(XX) | ROM |
| TRI | CONTROL |
| TSC | CONTROL |
| $\overline{TMC}$ | CONTROL |
| TPC | CONTROL |
| RWD(XX) | R/W MEM |
| RWE | M-REG |

SIGNALS GENERATED ON M-REGISTER CARD

| | |
|---|---|
| M00–M15 | — M-register data bits. Used to generate address and chip select information. (M00 also is gated out on $\bar{S}$-BUS by MTS) |
| I00–I07 | — ROM address bits. Decodes down to two bits available at ROM output buffers. |
| I00–$\overline{I08}$ | — Selects which RM output buffers are enabled. |
| CS(XX) | — Chip enable, basic machine selects which ROM chips are turned on (+12V - ON) |
| AEN | — Address enable. AEN = RDM + WTM |
| A05–A09 | — Address bits for R/W memory. (+16V & GND) |
| CEN | — Chip select, basic machine a negative true clock which selects which R/W chips are turned on. (+16V & GND) |
| RWE | — Read/Write enable. A +5V signal any time a $\overline{R/W}$ chip is addressed for a machine memory cycle. |

OTHER SIGNALS USED BY THE M-REGISTER

| Name | Source |
|---|---|
| T-BUS | PROCESSOR |
| SCK | " |
| $\overline{RDM}$ | " |

-continued

| | |
|---|---|
| $\overline{WTM}$ | " |
| $\overline{TTM}$ | " |
| VLD | CONTROL |
| MTS | " |
| $\overline{REF}$ | " |

SIGNALS GENERATED BY CONTROL j

| | | |
|---|---|---|
| VOR | — | A signal generated half way through the memory cycle to disable the active pull up devices on the ROM outputs. |
| TRI | — | T-Register input TRI = (T-BUS) . (TTT) + (TOO) . (TTS) |
| MTS | — | M-Register to $\bar{S}$-BUS. Generated from SCO, $\overline{SC1}$ |
| AO0–AO4 | — | Address bits for R/W memory also used during memory refresh. |
| $\overline{TSC}$ | — | T-Register series clock. $\overline{TSC} = \overline{SCK}. \overline{(TTS + TTT + EDT)}$ |
| TPC | — | T-Register parallel clock. (Strobes in data from memory) only during internal memory read cycle. |
| R/W | | Read/Write. A clock which left at +16V for a read and clocked to GND during a write. (R/W memory only) |
| PCG | — | Precharge. The 3rd 16V clock required by the 1103 R/W memory chips. |
| $\overline{REF}$ | — | Refresh. OV when the memory is in a refresh cycle. |
| $\overline{CEM}$ | — | Call extended memory. Prevents ROM clock from changing μprocessor states. Given for all read and write commands. Signal is removed if the memory cycle is not extended memory cycle. If extended memory cycle, $\overline{CEM}$ is removedafter extended memory has completed cycle. $O^v$ = True. |
| $\bar{S}$-BUS | — | Gates I/O register, data, T00, M00 or ones onto $\bar{S}$-BUS and sent to processor. 0 = True. |
| $\overline{INH}$ | — | Inhibit negative true. The processor is stopped INH is at zero volts. The memory control whenever generates this signal while a R/W memory refresh cycle is present. I/O also generates it. |
| $\overline{TMC}$ | — | T-reg mod control. $\overline{TMC}$ = 0; T-reg is set up to accept information from memory. $\overline{TMC}$ = 1; T-reg. is set up to shift serially. |
| $\overline{EMC}$ | — | Extended memory cycle. $+5^v$ signal used to signal extended memory to being its cycle. $0^v$ = True. |
| VOR | — | A signal generated half way thru memory cycle to allow data to flow out of ROM. |

OTHER SIGNALS USED BY THE CONTROL

| Name | Source |
|---|---|
| $\overline{CCT}$ | PROCESSOR |
| T00 | T-REG |
| IOD | PROCESSOR |
| ITS | " |
| SCO | " |
| SCI | " |
| $\overline{TTT}$ | " |
| T-BUS | " |
| SCK | " |
| $\overline{RDM}$ | " |
| $\overline{WTM}$ | " |
| MCK | " |
| M00–M04 | M-REG |
| AEN | M-REG |
| $\overline{EDT}$ | EXTENDED MEMORY |
| D-BUS | I-O CONNECTOR |
| $\overline{EMB}$ | EXTENDED MEMORY |

SIGNALS GENERATED ON ROM BOARD

| | | |
|---|---|---|
| ROD(XX) | — | Read Only Data |

OTHER SIGNALS USED BY ROM

| Name | Source |
|---|---|
| $\overline{CS(XX)}$ | $\overline{M\text{-}REG}$ |
| I00—I07 | M-REG |
| IO8 $\overline{IO8}$ | M-REG |
| VOR | CONTROL |

INPUT-OUTPUT CONTROL UNIT

Figure 50:
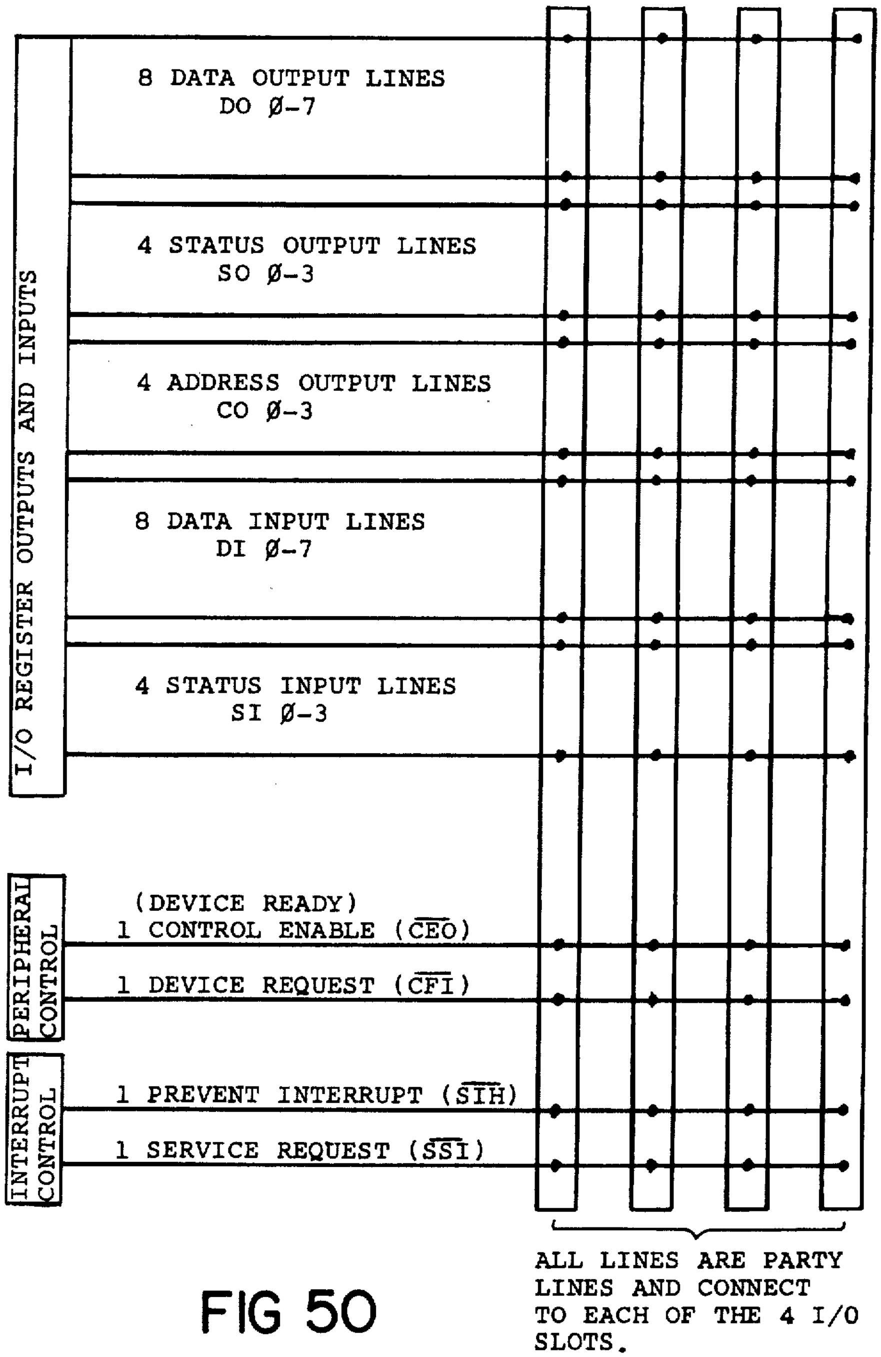
FIG. 50 is a schematic diagram of the source and relationship of the input-output party lines connected to the peripheral interface module receiving receptacles of FIG. 20.

The input-output control unit allows the calculator to communicate with the internal input, input-output, and output units and with external peripheral devices. As shown in FIGS. 31 A–C and 49 A–D, the input-output control unit is contained on two printed circuit boards, the "control and system clock" board and the "I/O register and gate interface" board. A third board, shown in FIG. 50, is an I/O motherboard providing room for connecting four external interface cards to the calculator.

The internal input, input-output, and output units are distinguished from peripheral devices by the fact that the I/O language set addresses them directly. Hence, each I/O instruction contains an internal peripheral address as part of its makeup. The four internal directly-addressable input, input-output, and output units are the I/O register, the magnetic card reading and recording unit, the output printer unit and display unit.

The external peripheral devices are indirectly addressable and are connected via cable to an interface card which is plugged into the I/O motherhood at the rear of the calculator. The term indirectly addressable is defined here to mean the external peripheral devices are addressed by lines leading from the four most significant bits in the I/O register, thereby requiring an address word to be loaded into the directly addressable I/O register.

I/O CONTROL AND SYSTEM CLOCK SECTION

The function of the I/O control and system clock section is to provide control to the I/O register and gate interface section. This is accomplished by use of an I/O instruction set stored in the main memory of the calculator.

The microprocessor causes instructions from the memory unit to be loaded into the T-Register and then to be transferred to the Q-Register. The microprocessor determines the type of instruction and causes the proper execution of the instruction. If the instruction is an I/O type, control is transferred by the microprocessor to the I/O control and system clock section.

The microprocessor remains in a two-state waiting loop while the I/O control section is active. Time in the wait loop is between 0.72 microseconds and 6.5 microseconds.

Figure 51:
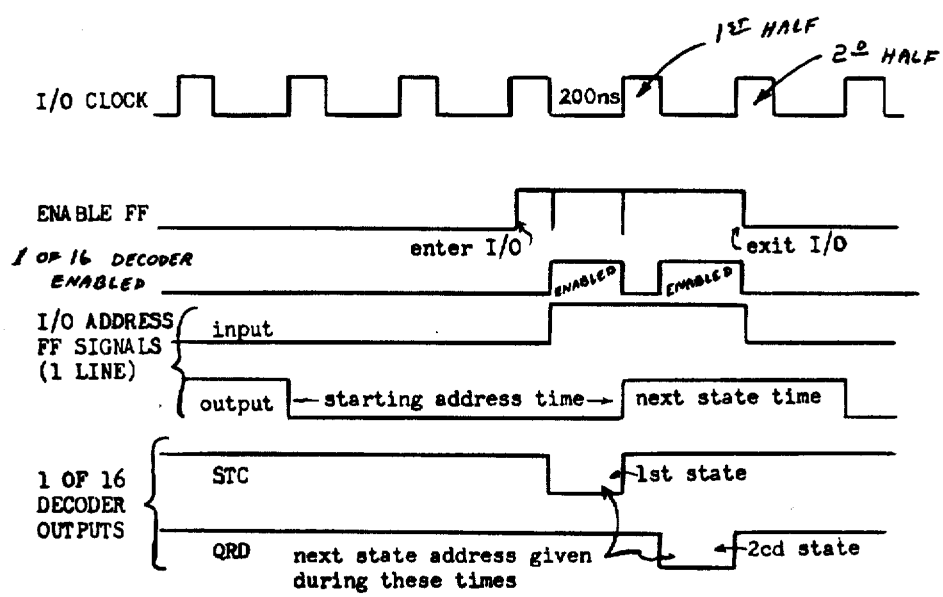
FIG. 51 is a waveform diagram illustrating the operation of the control section of the input-output control unit of FIGS. 3A–B and 32.

Bits 5 through 10 from the Q-Register are connected to the I/O control section and remain constant during an I/O instruction execution time. Bits 5 through 8 representing the I/O instruction code are gated to the I/O address flip flops and entered on each clock time while the I/O is inactive. The four outputs of the address flip flops are connected to the address input of a 1 of 16 decoder and represent the starting state address of the I/O instruction to be executed. When the I/O control section is enabled, the input gates passing bits 5 through 8 to the I/O address flip flops are closed and the 1 of 16 decoder enabled. This allows the starting state I/O micro instructions to come from the 1 of 16 decoder. The next state address coming from the closed input gates will be the exit state ($1111=17_8$) unless modified by reopening the gates to let the original starting state code through or by modifying the output of one or more of the input gates using a wire or connection coming from the 1 of 16 decoder output. This address is sent to the I/O address flip flops inputs and clocked in on the leading edge of the first half clock cycle. The first half clock cycle turns off the 1 of 16 decoder and the address changes. The second half clock cycle enables the 1 of 16 decoder, allowing the next state micro instruction to appear. (See FIG. 51 for the timing described above). This process continues until the exit state is encountered. On the exit state, the I/O Control is disabled and control is returned to the microprocessor.

The I/O instructions involving the transfer of data between the I/O and the CPU (OT, LI, MI), require 16 passes through the same state (1 pass for each of 16 bits). This is achieved by checking the output of a 16-bit down counter and then decrementing after each pass through the state. If the counter indicates 0 has not been reached, it causes the starting state address to be reloaded into the address flip flops by opening the input gates. When 16 passes have been indicated by the counter, the input gates are not allowed to open; however, the next state (1111) is modified by the output of the 1 of 16 decoder through a wire-or connection on the 2nd bit to give state 1101. This address is input to the I/O address flip flops as in the preceeding paragraph.

Figure 52:
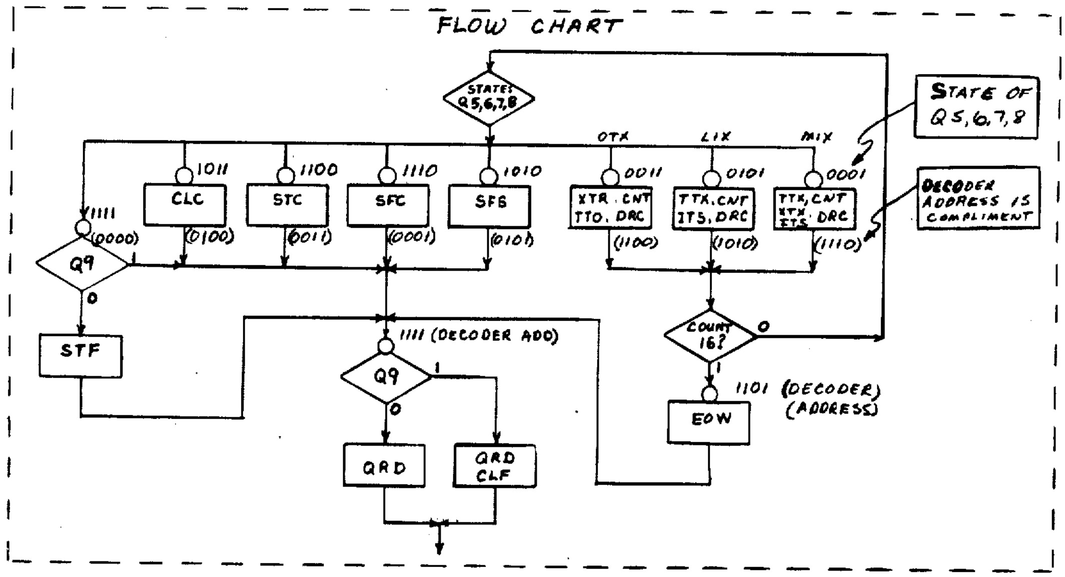
FIG. 52 is a flow chart illustrating the operation of the control section of the input-output control unit of FIGS. 3A–B and 31A–C.

The above-described operation of the I/O control section is also illustrated and further described in the flow chart of FIG. 52.

Bit 9 is called a hold/clear bit. It allows a clear flag (CLF) to take place or not to take place after execution of the other I/O instructions (STF excepted).

Bit 10 is used in conjunction with the micro instructions $\overline{\text{PTR}}$ and $\overline{\text{XTR}}$ to give control to the I/O.

The I/O control and programmable clock mnemonics are given in the following table:

I/O CONTROL BOARD MNEMONICS

| | |
|---|---|
| $\overline{\text{CC0}}$ | Clock Code Zero |
| CC1 | Clock Code One |
| CC2 | Clock Code Two |
| CC4 | Clock Code Four |
| CC8 | Clock Code Eight |
| CCT | Control Clock to Tester |
| CEM | Call Extended Memory |
| $\overline{\text{CLC}}$ | Clear Control |
| CLF | Clear Flag |
| DRC | Data Register Clock |
| EBT | Eight Bit Transfer |
| EOW | End of Word |
| $\overline{\text{IIO}}$ | Inhibit Internal OSC |
| $\overline{\text{INH}}$ | Inhibit Clock |
| $\overline{\text{IPS}}$ | Inhibit Primary/Secondary |
| ITS | Input to S-Bus |
| MCK | Memory Clock |
| $\overline{\text{POP}}$ | Power on Pulse |
| $\overline{\text{PTR}}$ | P-Reg to R-Bus |
| QFG | Qualifier Flag |
| Q5 | Qualifier Five |
| Q6 | Qualifier Six |
| Q7 | Qualifier Seven |
| Q8 | Qualifier Eight |
| Q9 | Qualifier Nine |
| Q10 | Qualifier Ten |
| QRD | Qualifier ROM Disable |
| RCA | ROM Clock Address |
| RCF | ROM Clock Flip Flop |
| SCB | Set Carry Bit |
| SCK | Shift Clock |
| SCT | Shift Clock to Tester |
| $\overline{\text{SRA}}$ | Service Request Acknowledge |
| STC | Set Control |
| STF | Set Flag |
| TCK | Tester Clock |
| TTO | T-Bus to Output |
| $\overline{\text{TTX}}$ | T-Bus to A/B Reg. |
| XTO | External OSC |
| $\overline{\text{XTR}}$ | A/B Reg. to R-Bus |

Note:

( $\overline{\quad}$ ) indicates negative true signal

I/O REGISTER AND GATE INTERFACE SECTION

As shown in FIGS. 49 A-D, the directly addressable I/O register (address 01) is a 16 bit universal parallel in/out, serial in/out) register that is connected to the calculator processor by the serial-in S-Bus and the serial-out T-Bus. Information is passed non-inverted from the A or B registers bit serial to the I/O register with the I/O instruction OTX 01. Sixteen lines connected to the parallel outputs of the I/O register provide data out to the internal input, input-output, and output units and to the external output interfaces. (NOTE: each I/O unit or interface may place only 1 TTL load on the output lines.)

Parallel entry to the I/O register is through 12 party lines connected to the 12 least significant parallel inputs. The input lines are negative true with all input interfaces tying to the lines through open collectors. Care must be taken to insure there is no distrubance to the lines while an interface is inactive. Input information is passed inverted to the A or B register bit serially with the I/O instructions LIX 01 or MIX 01. (The inversion puts positive true information into the A or B register).

Input information is entered into the I/O register in three ways:

a. Service Request

Entry by the services request method is controlled by a service inhibit flip flop. When the service inhibit flip flop has been cleared with the I/O instruction CLF ϕ1, a service request may be initiated by returning the $\overline{\text{SSI}}$ (Sevice Strobe Input) party line to ground through an open collector on the interface. This signal causes the parallel inputs to be strobed into the I/O register and sends a request for service (QNR) to the microprocessor. The microprocessor prior to receiving a request for service would have been cycling through various instruction paths and checking for a service instruction paths and checking for a service request after execution of each instruction. Upon receipt of a request for service, the processor interrupts the sequence of instructions it was doing and loads an address into the M-Register which contains the starting address of the service routine. At the same time a signal, $\overline{\text{SRA}}$ (Service Request Acknowledge), turns off the service inhibit flip flop and also sets the single service flip flop which permits only one service interrupt to the processor per service strobe input. The single service flip flop is reset when the service strobe is removed. All lines from an interface using the service request method for entering information are inhibited when the service inhibit flip flop is set.

b. Return of Channel Flag After Command is Given to an External Peripheral Device.

This method implies the calculator must control the peripheral. That is to say the calculator transmits the indirect address and control enable ($\overline{\text{CEO}}$) from the I/O Register and gate interface section to the interface with the expectation of information being returned by the peripheral through the interface to the I/O register. Because of this expectation, only limitd instructions may be performed by the calculator while waiting. The service request method must be inhibited during this wait so that input information is not destroyed by another peripheral using service request.

When a controlled peripheral, its flag and data are processed at the interface. The signal $\overline{\text{CFI}}$ (Channel Flag In) causes the loading of parallel data from the interface into the I/O register and clears the control enable flip flop so that the $\overline{\text{CEO}}$ signal is removed from the interface. The calculator can interrogate the control enable flip flop with the instructions SFS 01 or SFC 01 to determine when data has been loaded in.

c. Giving the I/O Instruction STF 01.

The instruction STF 01 as described in (a) sets the service inhibit flip flop inhibiting the service request mode of entry. The STF 01 instruction also causes a parallel load of the input lines into the I/O register.

The output display (address 08) receives information from the I/O register. A 16 bit word is transferred to the I/O register with the instruction OTX 08. The address 08 allows the display enable flip flop to be set with the micro-instruction EOW after the 16th bit has been transferred. The display enable flip flop sends a signal $\overline{\text{DEN}}$ to the display indicating information is ready in the I/O Register. The display enable flip flop is cleared with the I/O instruction CLF 08.

The keyboard operates as described below. 7 bit ASCII assigned keycodes are entered into the calculator by an interrupt process. When a key on the keyboard is depressed the keyboard interface card requests service. Input data is stored along with the request for service on the keyboard interface card. The stored signal for service is gated with the Prevent Interrupt signal through an open collector NAND gate onto the Service Request party line (SSI = Low for service). The giving of Service Request causes the I/O register to be loaded. However, input data from the keyboard interface card is not enabled yet. Thus all status and data inputs are high. This indicates to the CPU that a keyboard is interrupting. An OT × 16 instruction is given by the firmware. The select code of 16 enables the gate of the data input lines by a STF 1 instruction and data is loaded into the I/O register. LIA 0 allows data to be taken from the I/O register.

All external peripheral interfaces are indirectly addressed from the four most significant bits in the I/O register. Thus to communicate with an external peripheral, an address (0000 excluded) must be loaded into the I/O register. Data and status will be loaded at the same time if the peripheral is to act as a receiver. If the peripheral is to act as a transmitter, only the address and status need be loaded. Next, the I/O instruction STC 01 sets the Control Enable Out flip flop. This flip flop sends a signal $\overline{\text{CEO}}$ to all external interface slots. The $\overline{\text{CEO}}$ signal and the decoded (from the 4 bit address) address allow the interface to command the peripheral. After the peripheral has responded, information given back to the interface by the peripheral is processed to the I/O register in the manner described above under (b) Return of Channel Flag After Command is Given to an External Peripheral Device.

The I/O register and gating control circuit mnemonics are given in the following table:

I/O REGISTER AND GATE BOARD

| | |
|---|---|
| $\overline{\text{CEC}}$ | Control Enable Out |
| $\overline{\text{CFI}}$ | Channel Flag In |
| CLF | Clear Flag |
| CO0, 1,2,3 | Code Out |
| $\overline{\text{DEN}}$ | Display Enable |
| DI0, 1,2,3,4,5,6,7 | Data In |
| DO0, 1,2,3,4,5,6,7 | Data Out |
| DRC | Data Register Clock |
| EBT | Eight Bit Transfer |

I/O REGISTER AND GATE BOARD-continued

| | |
|---|---|
| EOW | End of Word |
| IOD | I/O Data |
| KLS | Key Lights Strobe |
| MCR | Mag Card Reset |
| $\overline{MFL}$ | Mag Flag |
| MLS | Mag Latch Strobe |
| PEN | Printer Enable |
| $\overline{POP}$ | Power On Pulse |
| $\overline{PTF}$ | Printer Flag |
| Q0 | Qualifier Bit 0 |
| Q1 | Qualifier Bit 1 |
| Q2 | Qualifier Bit 2 |
| Q3 | Qualifier Bit 3 |
| Q4 | Qualifier Bit 4 |
| QFG | Qualifier Flag |
| QNR | Qualifier Not Request |
| $\overline{SIH}$ | Service Inhibit |
| SI0, 1,2,3 | Status In |
| SO0, 1,2,3 | Status Out |
| $\overline{SRA}$ | Service Request Acknowledge |
| $\overline{SSI}$ | Service Strobe In |
| STC | Set Control |
| STP | Stop |
| STF | Set Flag |
| T-Bus | T-Bus |
| TTO | T Bus to Output |
| NOTE: | |

( $\overline{\quad}$ ) indicates negative true signal

Figure 53:
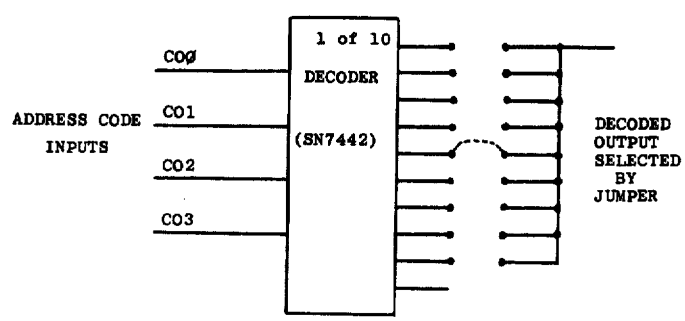
FIG. 53 is a diagram showing how a one-of-ten decoder is employed to address peripheral input-output units to the calculator through the input-output control unit of FIGS. 3A–B.

As shown in FIG. 53, when addressing a peripheral device, bits loaded into the 4 most significant locations in the I/O register from the CPU constitute the peripheral address code. As part of the output party line system the address code is routed to all I/O interface slots. Each I/O interface card decodes the 4 line address code to a unique single line for use on that particular I/O card. The binary codes 10 through 15 have been reserved for dedicated peripheral addresses which are used by dedicated keys (from the keyboard) and dedicated I/O drivers. Binary codes 1 through 9 are for general use. Code 0 is a non-addressing code and is used in operations that do not involve addressing a specific peripheral. The following table summarizes the address code assignments:

ADDRESS CODE ASSIGNMENTS

| ADDRESS | 4-BIT CODE | ASSIGNED PERIPHERAL |
|---|---|---|
| 15 | HHHH | TYPEWRITER |
| 14 | HHHL | PLOTTER |
| 13 | HHLH | |
| 12 | HHLL | KEYBOARD & KEYBOARD-LIKE PERIPHERALS |
| 11 | HLHH | |
| 10 | HLHL | |
| 9 | HLLH | GENERAL USE; ONE OF NINE SELECTABLE |
| 8 | HLLL | " |
| 7 | LHHH | " |
| 6 | LHHL | " |
| 5 | LHLH | " |
| 4 | LHLL | " |
| 3 | LLHH | " |
| 2 | LLHL | " |
| 1 | LLLH | " |
| 0 | LLLL | USED ON INTERRUPT I/O INTERFACE CARDS WHEN THE INTERRUPT BECOMES ENABLED |

The general usage codes (1-9) are decoded outputs from a 4 line to 1 of 10 decoder (SN 7442 for example). It is intended that the codes 1 through 9 be jumper selectable. This would allow the user to select a code for his system peripherals or allow him to use more than one of the same peripheral by selecting different address codes.

Since the I/O register is used to communicate with the internal input, input-output, and output units as well as peripheral devices, a given peripheral's address code will appear randomly in the I/O register address field with there being no intention of expecting the peripheral to respond. Therefore, a second piece of information is necessary for the I/O interface card to form a unique signal which will indicate to the peripheral to respond. This second piece of information is control information and is described hereinafter.

The I/O interface cards contain TTL compatible logic for manipulating control and data from the calculator and/or the peripheral. All I/O interface cards which are intended to be used with the calculator must provide storage either on the I/O interface card or in the peripheral. Thus data being transferred from the calculator to the I/O card must be stored at the instant the peripheral is requested to respond. Likewise data coming from a peripheral must be stored until the calculator accepts it. This requirement is important and must be considered on all compatible interface cards.

The calculator can supply up to 100 ma. maximum at +5 volts to each I/O interface card. Power exceeding this absolute maximum must be supplied by the peripheral.

The following table lists the pin assignments for all I/O lines at the plug-in slots on the calculator back plane, as viewed from the rear of the calculator, left to right.

EXTERNAL I/O INTEFACE
PIN ASSIGNMENTS

| Bottom | Top |
|---|---|
| 1 ⊥ | A ⊥ |
| 2 +5 | B +5 |
| 3 USED | C USED |
| 4 USED | D 10/20 |
| 5 USED | E USED |
| 6 DI 0 | F DO 0 |
| 7 DO 1 | H DO 2 |
| 8 DI 3 | J DO 3 |
| 9 DI 2 | K DI 1 |
| 10 DO 4 | L DI 4 |
| 11 DO 5 | M DI 5 |
| 12 DO 6 | N DI 6 |
| 13 DO 7 | P DI 7 |
| 14 SO 0 | R SI 0 |
| 15 SO 1 | S SI 1 |

-continued

| | |
|---|---|
| 16 SO 2 | T SI 2 |
| 17 SO 3 | U SI 3 |
| 18 CO 0 | V CO 1 |
| 19 CO 2 | W CO 3 |
| 20 $\overline{SSI}$ | X $\overline{SIH}$ |
| 21 $\overline{CEO}$ | Y $\overline{CFI}$ |
| 22 ⊥ | Z $\overline{STP}$ |

The chart below lists all I/O lines with brief definitions and specifications and FIG. 50 shows the source and relative relationship of the I/O lines. The output address data lines (Co 0–3) transmit the address code along the party lines to all interface slots. These lines will go high and low according to information being shifted in or out of the I/O Register. At anytime a peripheral is addressed the lines will become steady 1 instruction time (8 μs) before control information is passed to the I/O interface card or before data or status is taken from the I/O interface card and will remain constant until the control information is removed. After the control information is removed, the state of the I/O lines become unpredicatable until the next addressing takes place. Address data coming to the I/O interface card is positive true and each interface may place 1 TTL load on each address line.

tional information to a peripheral. The logic state is positive true. One standard TTL load may be placed on each output data status line. (Special drivers, fast data transfer, and interrupt do not make use of SO 3).

The input data lines (DI 0–7) transmit input data in 8 bit bytes to the 8 least significant bit positions of the I/O register (Locations 0 thru 7) from the I/O interface card. Each Data In line has a 1K pull up resistor to +5 volts and under th party line system must be driven low for a logical 1 from open collector gates on each addressed I/O interface card. The logic state is negative true.

The input data status lines (SI 0–3) receive information from the I/O interface cards and transmit it to location 8 through 11 in the I/O register. Each line has a 1K pull us resistor to +5 volts. These lines are used to provide additional information to the calculator about the state of a peripheral. The logic state is negative true.

The negative true Device Ready output line ($\overline{CEO}$) transmits a control signal, which when combined with an address code will initiate a peripheral response on the addressed I/O interface card. Device Ready is controlled by the I/O interface driver and therefore may look different depending upon the driver. For example, when the calculator wishes to transmit data to the I/O interface card or to initiate a peripheral response prior to receiving data from the peripheral, the calculator I/O Line Specification Chart

| | Name of Line | Line Definition | Direction | Load/Loading | Voltage High | Voltage Low | No. of Lines |
|---|---|---|---|---|---|---|---|
| 1 | Address Data (CO 0-3) | Transmits a 4 bit address from the I/O Register to be recognized by an interface card. (Data = High) | Out | 1 TTL (1.6ma) allowed per interface. | 2.4v | .4v | 4 |
| 2 | Device Ready $\overline{CLO}$ | Indicates calculator is ready for information interchange with an addressed peripheral. (Active State = Low) | Out | 1 TTL (1.6ma) allowed per interface. | 2.4v | .4v | 1 |
| 3 | Device Request ($\overline{CFI}$) | Acknowledges receipt of data by a peripheral from the calculator or indicates data is to be input to the calculator. (Active Stage = Low) | In | Loading of 6.6 ma to the interface card. | lk resistor to + 5v use open collector | Must be driven below .4v. | 1 |
| 4 | Halt Status ($\overline{STP}$) | Indicates stop key has been depressed. (Active State = Low) | Out | 1 TTL (1.6ma) Allowed/interface. | 2.4v | .4 | 1 |
| 5 | Input Data (DI 0-7, SI 0-3) | Receives input data to I/O register. (Data = Low) | In | Loading of 6.1ma | 1k Res. To + 5v | Driven .4v | 12 |
| 6 | Output Data (DO 0-7, SO 0-3) | Transmits Data from the I/O register. (Data = High) | Out | 1 TTL (1.6 ma) Allowed/interface. | 2.4v | .4v | 12 |
| 7 | Prevent Interrupt ($\overline{BIH}$) | Indicates data cannot be entered under service request. (Interrupt) (Active State = Low) | Out | 1 TTL (1.6 ma) Allowed/interface | 2.4v | .4 | 1 |
| 8 | Service Request (Lo) (SSI) | Indicates a CPU interrupt is to take place to allow data to enter. (Active State = Low) | In | Loading of 6.6ma | 1k Res. to + 5v | Driven .4 | 1 |

The output data lines (DO 0–7) output data from the A or B accumulator in 8 bit bytes from the 8 least significant locations in the I/O register to all interface card slots. The logic state is positive true (Data = 1 = High). Each interface card may place 1 standard TTL load on each data line.

The output data status lines (SO 0–3) output status data from the A or B accumulator and are driven from the next four locations above the data out positions in the I/O register. (DO positions = 0 thru 7; SO positions = 8 thru 11). These lines are used for sending addicauses the Device Ready output line to go low and stay low until the peripheral response is over and the calculator receives the signal Device Request ($\overline{CFI}$) from the I/O interface card. The Device Ready flip-flop always receives a clear signal whenever the I/O register completes a parallel load.

The Device Request party line $\overline{CFI}$ when driven low from an open collector gate on the I/O interface card will cause the loading to parallel input information into the 12 least significant locations of the I/O register. The active state of the line is low (negative true).

The peripheral flag, indicating to the I/O interface card the peripheral has received data/control or is ready to input data, is gated through an open collector nand gate onto the Device Request ($\overline{CFI}$) party line. The open collector gate is enabled by the I/O interface card's address and Device Ready ($\overline{CEO}$). The Device Request line is pulled up inside the calculator by a 1K resistor to +5 volts.

The Device Request ($\overline{CFI}$) signal must stay low until Device Ready ($\overline{CEO}$) has been cleared (goes high). At this time data transfer has terminated and peripheral's flag and control must be cleared in preparation for the next pass. Since a parallel load in the I/O register causes the Device Ready flip-flop to receive a clear signal, when a Device request ($\overline{CFI}$) is entered, a parallel load takes place and afterward Device Ready ($\overline{CEO}$) is cleared. The calculator uses Device Request in its general mode of data transfer.

The Halt Status output line ($\overline{STP}$) is a line that goes low when the STOP key on the calculator is depressed. It will stay low for the duration of the key depression. One standard TTL load may be placed on this line by each I/O interface card.

The Prevent Interrupt output line ($\overline{SIH}$), when low indicates to the I/O interface card that a request for service must not be given to the calculator. One standard TTL load may be placed on this line by each I/O interface card.

The Service Request (Lo) line ($\overline{SSI}$), when driven low causes the loading of parallel input information into the 12 least significant locations of the I/O register and causes a CPU interrupt for service. The peripheral's request for service is gated with the Prevent Interrupt ($\overline{SIH}$) line onto the Service Request party line through an open collector nand gate. A 1K pull-up resistor to +5 volts is connected to the line inside the calculator.

The general format for all data transfer consists of 8 bit parallel bytes. Other data formats are handled by specially developed drivers, such as the ROM plug-in module employed for driving the typewriter.

Figure 54:
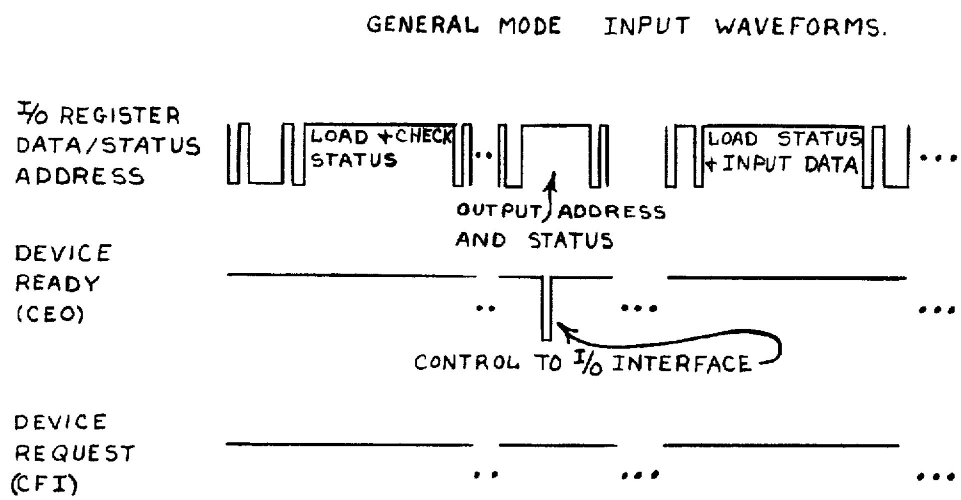
FIG. 54 is a waveform diagram of some of the input signals employed by the input-output control unit and associated interface modules of FIGS. 3A–B.
Figure 55:
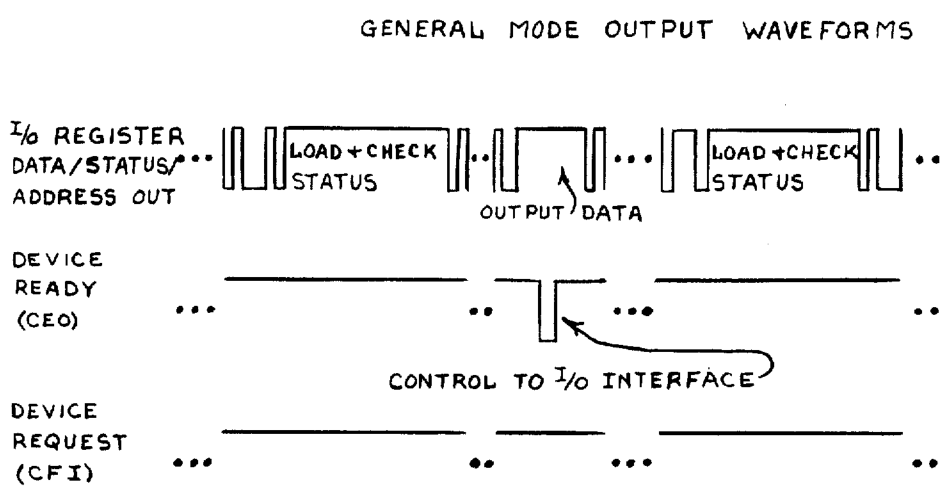
FIG. 55 is a waveform diagram of some of the output signals employed by the input-output control until and associated interface modules of FIGS. 3A–B.

The state of a peripheral is generally checked before attempting an output. This is done by first inhibiting the interrupt system. The address of the I/O interface card is shifted into the I/O register. The decoded address code enables the open collector gates on the I/O interface card. The status of the peripheral is passed to the Status In lines and loaded into the I/O register with a I/O instruction issued by the calculator. The I/O register information is transferred to the A or B accumulator and processed. If the peripheral is ready, the output data word consisting of the address code, output status (if necessary) and the eight bit data byte is formed in the A or B accumulator. The output data word is transferred to the I/O register after which the Device Ready ($\overline{CEO}$) flip-flop is set. The I/O interface card receives the data, address code and Device Ready and a peripheral response is initiated. The calculator interrogates the state of the Device Ready flip-flop to determine when the I/O interface card has received the information and the peripheral response is done. The peripheral I/O interface card signals the calculator it is done by transmitting the Device Request ($\overline{CIF}$) signal to the calculator. The output waveforms are shown in FIG. 54.

Figure 61:
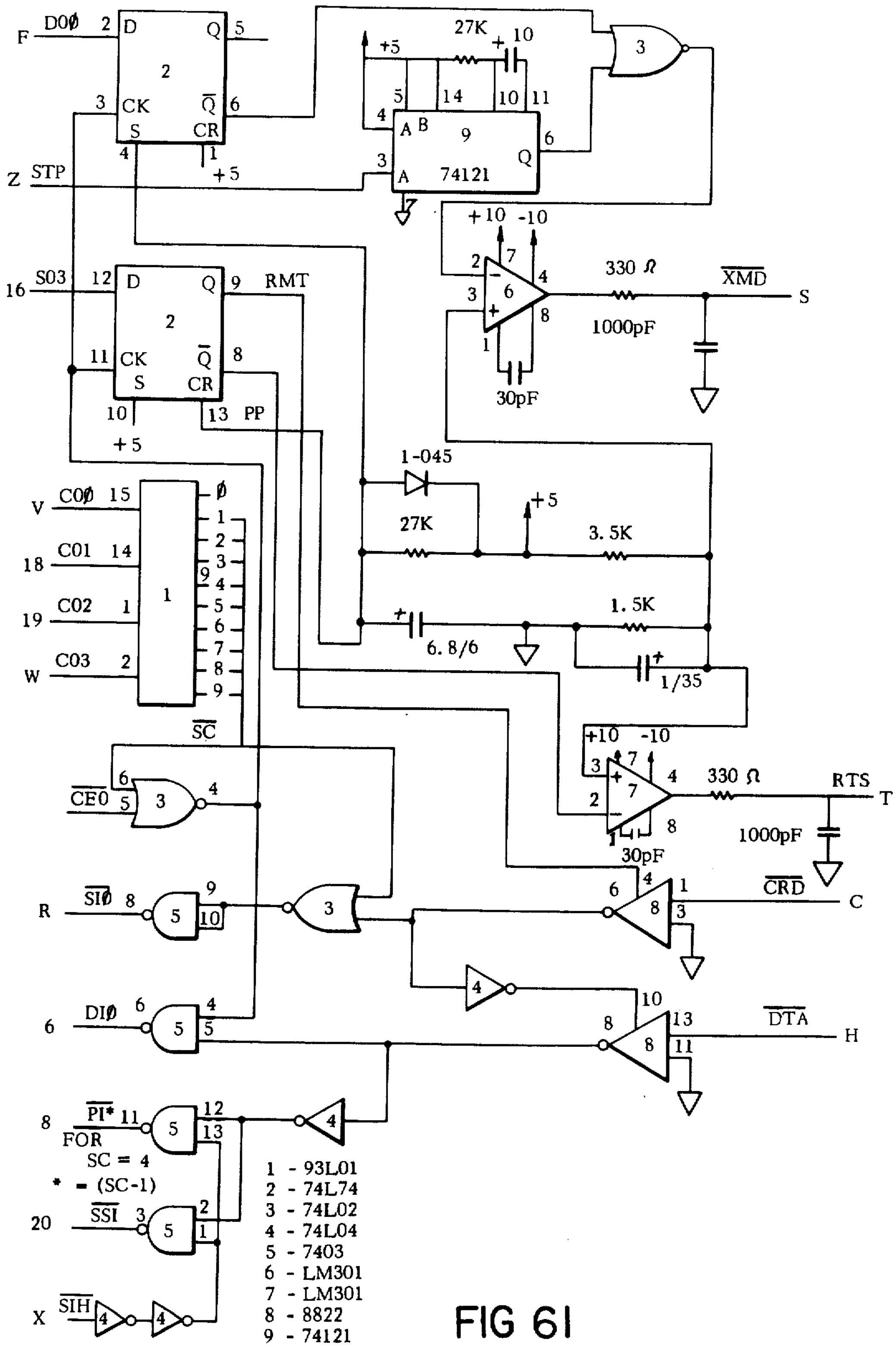
FIG. 61 is a schematic diagram of logic that may be used to interface a modem to the input-output control unit of FIGS. 3A–B.

Before inputing data from the I/O interface card it is necessary to determine if the peripheral has responded and is ready to input data. After a peripheral response has been initiated, as described previously, the calculator waits for the Device Request ($\overline{CFI}$) which loads the data into the I/O register and clears the Device Ready ($\overline{CEO}$). The calculator checks the state of Device Ready and when it goes false ($\overline{CEO}$ = HIGH), the calculator knows data is present in the I/O register and proceeds to shift it into the A or B accumulators for processing. The input waveforms are shown in FIG. 61.

When blocks of data are to be transferred between a peripheral and the calculator, the interrupt is turned off, and transfer rates as high as 100,000 bits/sec may be possible. Before either input or output of a block of data can start, it is necessary for the calculator to check the status of the peripheral to see if it is turned on and ready. The address locations of the I/O register will remain unchanged during the block transfer. A single I/O instruction shifts the 8 bit byte of data from the 8 least signficant locations in A or B to the 8 data locations in the I/O register; gives: Device Ready ($\overline{CEO}$ goes low) 120 nanoseconds after the shift is completed; and shifts the 8 most significant bits in A or B to the 8 least significant locations in A or B in preparation for the next transfer. (Note the address and status field in the I/O register are not disturbed in the shifting). Device Ready stays true (low) until the peripheral has received the data and is ready for more. The I/O interface card then returns Device Request ($\overline{CFI}$) to the calculator. The receiving the Device Request ($\overline{CFI}$) to the calculator causes loading of the parallel input party lines into the input status and input data locations of the I/O register, and clears the Device Ready signal ($\overline{CEO}$ goes high). The logic sense of Device Ready is observed by the calculator and when it goes false ($\overline{CEO}$ = HIGH) the CPU proceeds to output the next 8-bit byte of data.

If the output I/O interface card is not returning information on the input lines all input lines will be high when the loading, described in the preceeding paragraph, takes place. Therefore, if at the beginning the code in the output status field is being used by the I/O interface card and must remain something other than all high it will be necessary for the I/O interface card to receive the output status from the calculator and return it back to the status inputs so that when Device Request occurs the status field does not get changed in the I/O register.

Figure 56:
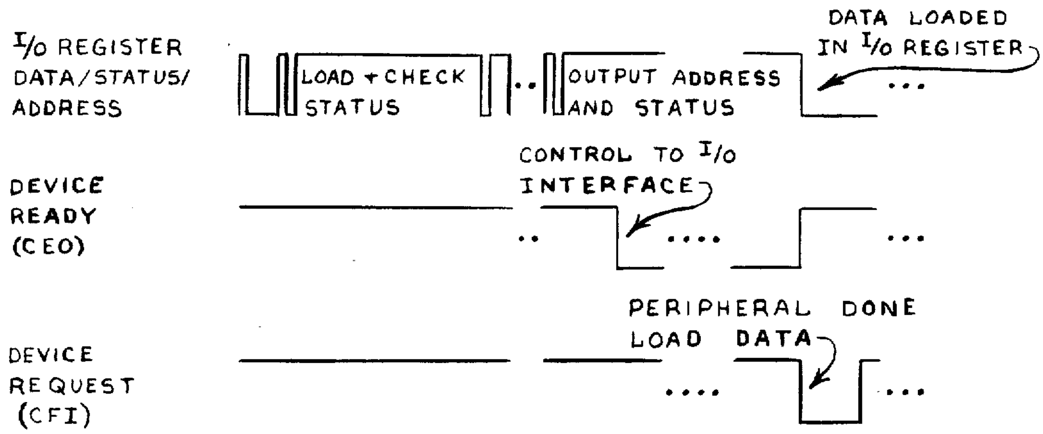
FIG. 56 is a waveform diagram of some of the high speed input signals employed by the input-output control unit and associated interface modules of FIGS. 3A–B.
Figure 57:
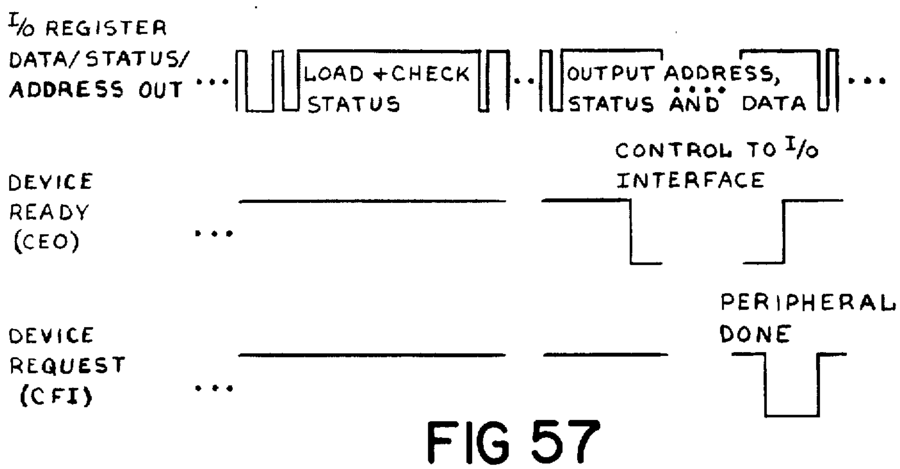
FIG. 57 is a waveform diagram of some of the high speed output signals employed by the input-output control unit and associated interface modules of FIGS. 3A–B.
Figure 58:
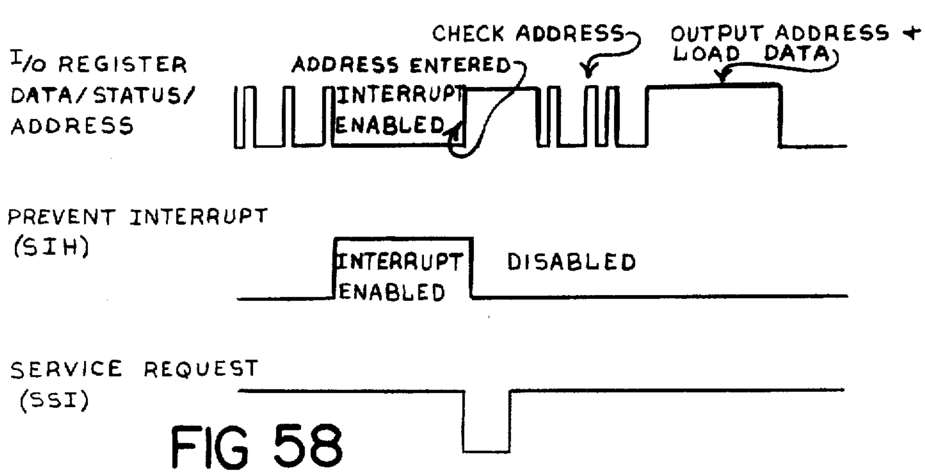
FIG. 58 is a waveform diagram illustrating the operation of the interrupt mode of operation of the input-output control unit of FIGS. 3A–B.

Input: After determining if the peripheral is ready to start transferring a block of data the calculator turns off the interrupt and shifts the address code into the I/O Register. (The address code remains unchanged during the block transfer). The Device Ready is given ($\overline{CEO}$ = Low) to the calculator when the 8-bit data byte is ready for input. The Device Request signal causes the input data and status to be loaded into the I/O register and causes Device Ready to go false ($\overline{CEO}$ = High). The calculator by checking when Device Ready goes false knows the data has been loaded. A single I/O instruction shifts the 8-bit data byte from the I/O register into the 8 most significant locations in the A or B accumulators (Shifting the previous information in A or B 8 places to the right) and causes Device Ready to go true ($\overline{CEO}$ = Low) 120 ns after the last bit has been shifte into A or B. As before if output status is to be retained on the I/O interface card it must be returned to the I/O register upon each input data transfer. Wave forms illustrating high speed operations are shown in FIGS. 56 and 57.

The calculator software makes use of the interrupt system in two different manners. The first is for remote keyboard like peripherals.

These are those peripherals which logically resemble the calculator keyboard. Only 7-bit ASCII assigned keycodes are recognized by the calculator. The interrupt takes place by the peripheral indicating to the I/O interface card that a request for service exists. Input data must be stored along with the request for service on the I/O interface card or in the peripheral itself. The stored signal for service is gated with the Prevent Interrupt signal through an open collector NAND gate onto the Service Request party line ($\overline{SSI}$ = Low for service). The giving of Service Request causes the I/O register to be loaded. However, input data from the I/O interface card is not enabled yet. Thus all status and data inputs are high. This indicates to the CPU that a keyboard-like peripheral is interrupting and address code 12 is shifted into the I/O register. The decoded address 12 on the I/O interface card enables the gates to the data in lines and data is now loaded into the I/O register. After the data has been taken from the I/O register address 12 is again put into the I/O register and Device Ready is given as a 360 nanosecond pulse to clear all stored keyboard-like requests for service. This implies all keyboard-like peripherals must be user controlled such that only one interrupt at a time is taking place. The second is nonkeyboard-like peripherals.

Figure 8:
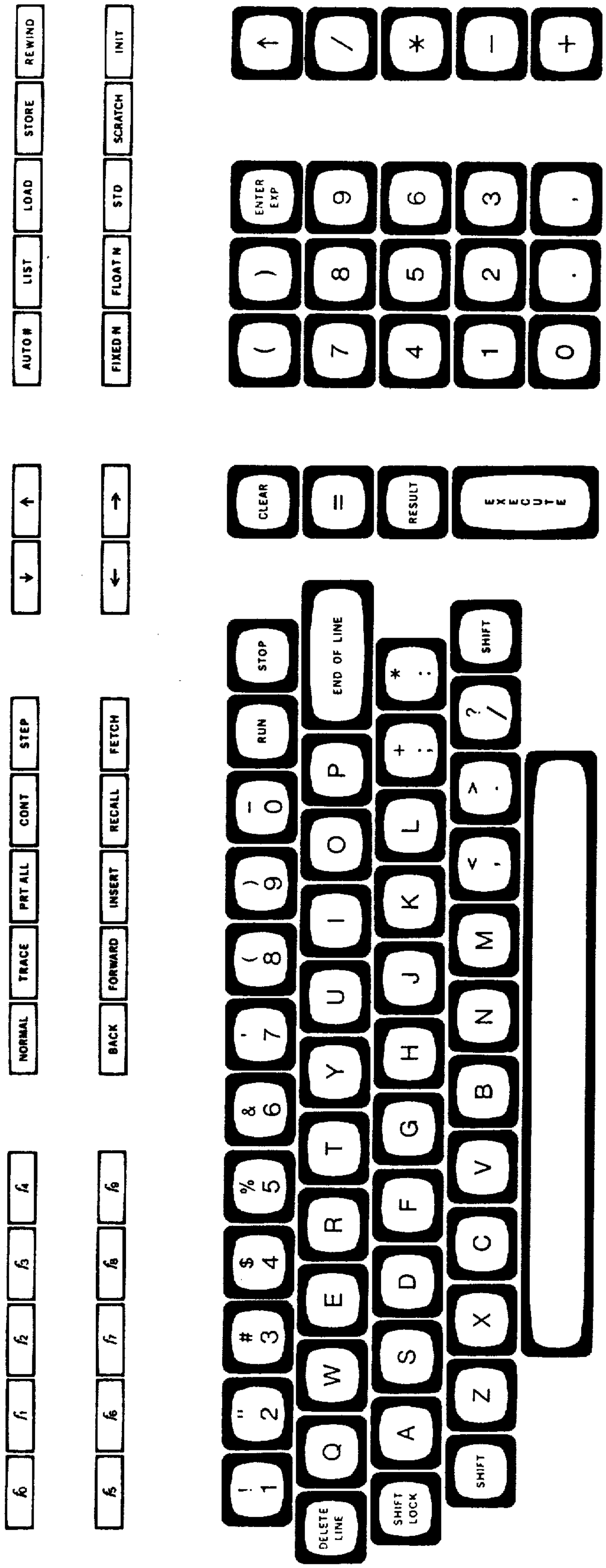
FIG 8 is a plan view of the keyboard input unit employed in the adaptable programmable calculator of FIGS. 1–3B.

These peripherals will output or enter standard ASCII codes for data by using a special ROM (other ROMs may be developed to handle different codes). When a request for service is given to the I/O interface card by a peripheral the request and all data must be stored until serviced by the calculator. The interface card may have any of 9 addresses (1 thru 9). The stored request for service is gated with Prevent Interrupt through an open collector NAND gate onto the Service Request party line. At the time Service Request is recognized address 0 is gated with the stored request for service through an open collector onto an input data or status line which corresponds with the address of the I/O interface card. For example, Data In 0 which is the 1st position in the I/O register represents card address 1, and 2nd position is card address 2, etc. When the I/O register is loaded as a result of the Service Request the interrupting I/O car's address is loaded into the I/O register and Prevent Interrupt enabled ($\overline{SIH}$ = Low). The contents of the I/O register are processed by the CPU which then shifts the interrupting card's address into the I/O register. The address enables the gates to the data-in lines and data is loaded into the I/O register. After the data is processed by the CPU the interrupting card's address is shifted from the CPU into the I/O register and a 360 nanosecond Device Ready pulse ($\overline{CEO}$ = Low) given to clear the stored request for service on the I/O interface card, after which the Prevent Interrupt is disabled and the next interrupt allowed to take place. Under this system, multiple interrupts may take place without consequence. Each will be serviced in turn from low to high address position. An interrupting peripheral may also interrupt to request output data from the I/O register. The interrupting process is the same as above except the calculator transmits data rather than receives data. FIG. 8 shows waveforms illustrating the interrupt.

The following table lists the general I/O instruction set and the associated codes.

I/O INSTRUCTION SET

| NAME | INSTRUCTION EXECUTION TIME | INSTRUCTION CODE 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| STF | 9 μs | H | H | H | H | — | H | L | H | H | H | H | | | SELECT CD | | |
| CLF | 9 μs | H | H | H | H | — | H | H | H | H | H | H | | | " | | |
| SFC | 9 μs | H | H | H | H | — | H | H/C | H | H | H | L | | | " | | |
| SFS | 9 μs | H | H | H | H | — | H | H/C | H | L | H | L | | | " | | |
| CLC | 9 μs | H | H | H | H | — | H | H/C | H | L | H | H | | | " | | |
| STC | 9 μs | H | H | H | H | — | H | H/C | H | H | L | L | | | " | | |
| OT* | 15 μs | H | H | H | H | A/B | H | H/C | L | L | H | H | | | " | | |
| LI* | 15 μs | H | H | H | H | A/B | H | H/C | L | H | L | H | | | " | | |
| MI* | 15 μs | H | H | H | H | A/B | H | H/C | L | L | L | H | | | " | | |

The following describes the function of each I/O instruction with the 5 allowable select codes.

| | |
|---|---|
| STF <SC> | Set the flag. STF is a 240 nanosecond positive true pulse which accomplishes the following with the various select codes. |
| STF 00 | Not used by the calculator. |
| STF 01 | a. Sets the "Service Inhibit" flip-flop to the true state ( SIH = Low; interrupt not allowed).<br>b. Causes parallel input data and status to be loaded into the I/O register. |
| STF 02 | Generates a 240 nanosecond positive true MCR pulse. |
| STF 04,08,16 | Not used by the calculator. |
| CLF <SC> | Clear the flag. CLF is a 240 ns positive true pulse which accomplishes the following with the various select codes. |
| CLF 00 | Not used by the calculator |
| CLF 01 | a. Clears the "Service Inhibit" flip-flop to the false state. ( SIH = High; interrupt allowed.)<br>b. Loads address locations in I/O register gister with 0's. (0 = Low)<br>c. Clears "Device Ready" flip-flop ($\overline{CEO}$ = High). |
| CLF 02 | Clears MCR flag flip-flop. |
| CLF 04 | Clears PEN flip-flop (PEN = Low). |

| | |
|---|---|
| CLF 08 | Clears DEN flip-flop ($\overline{DEN}$ = High). |
| CLF 16 | Generates a 240 nanosecond positive true KLS pulse |
| SFC <SC> H/C | Skip if flag clear. SFC is a 240 ns positive true pulse which accomplishes the following with the various select codes. If C is given a 240 nanosecond CLF pulse is given after SFC. |
| SFC 00 | Causes the next instruction to be skipped if the STOP key has not been depressed. |
| SFC 01 | Causes the next instruction to be skipped if Device Ready is true ($\overline{CEO}$ = Low). |
| SFC 02 | Causes the next instruction to be skipped if the MCR flag flip-flop is clear. |
| SFC 04 | Causes the next instruction to be skipped if the PEN flip-flop is clear. ($\overline{PEN}$ = Low). |
| SFS <SC> H/C | Skip is flag set. SFS is a 240 nanosecond positive true pulse which accomplishes the following with the various codes. If C is given then a 240 nanosecond CLF Pulse is issued after SFS. |
| SFS 00 | Causes the next instruction to be skipped if the STOP key is depressed. |
| SFS 01 | Causes the next instruction to be skipped if "Device Ready" is false ($\overline{CEO}$ = High). |
| SFS 02 | Causes the next instruction to be skipped if the MCR flag flip-flop is set. |
| SFS 04 | Causes the next instruction to be skipped if the PEN flip-flop is set (PEN = High). |
| $\overline{CLC}$<SC> H/C | Clear Control. $\overline{CLC}$is a 240 nanosecond negative true pulse and is not used by the calculator. If C is given then a 240 nanosecond positive true CLF pulse is given after $\overline{CLC}$. |
| STC <SC> H/C | Set the Control. STC is a 240 nanosecond positive true pulse which accomplishes the following with the various select codes. If C is given a 240 nanosecond CLF pulse is issued after STC. |
| STC 00 | Not used by the calculator. |
| STC 01 | Sets the "Device Ready" flip-flop ($\overline{CEO}$ = Low). |
| STC 02 | Generates a 240 nanosecond positive true MLS pulse for the magnetic card reader. |
| STC 04, 08, 16 | Not used by the calculator. |
| OTX <SC> H/C | Output A or B causes data bits from A or B to be shifted to the I/O register and accomplishes the following with the various select codes. If C is given, a 240 nanosecond CLF pulse is given after OTX is executed. |
| OTX 00 | The 8 least significant bits in the A or B register are shifted non-inverted to the 8 least significant locations in the I/O register, and 120 nanosecond after the 8th shift the "Device Ready" flip-flop is set ($\overline{CEO}$ = Low). The 8 most significant bits are shifted right 8 places and the least 8 significant bits are recirculated to the 8 most significant locations in the A or B registers. The 8 most significant bits in the I/O register are untouched. |
| OTX 01 | Sixteen bits from the A or B register are shifted non-inverted to the I/O register. The data in A or B recirculates. |
| OTX 02 | Not used by the calculator |
| OTX 04 | Same as OTX 01 and in addition, 120 ns after the 16th bit has been shifted nanoseconds printer enable flip-flop is set |
| OTX 03 | Same as OTX 01 and in addition, 120 nanoseconds after the 16th bit has been shifted the display enable flip-flop is set. |
| OTX 16 | Same as OTX 01 and in addition, 120 nanoseconds after the 16th bit has been shifted the 240 nanosecond KLS signal is generated |
| LIX <SC> H/C | Load into A or B. Loads data bits from the I/O register into the A or B register and accomplishes the following with the various select codes. If C is given, a 240 nanosecond CLF pulse is given after LIX is executed. |
| LIX 00 | The eight least significant bits in the I/O register are shifted inverted to the eight most significant locations of A or B, and 120 nanoseconds after the 8th shift the "Device Ready" flip-flop is set ($\overline{CEO}$ = Low). A or B is shifted right eight places as |

-continued

| | |
|---|---|
| | the I/O register data comes in. The 8 most significant bits in the I/O register are untouched. |
| LIX 01 | The 16 bits of the I/O register are transferred inverted to the A or B register. Data in the I/O register is lost. |
| LIX 02, 04, 08, 16 | Not used by the calculator. |
| MIX <SC> H/C | Merge into A or B. Merges data from the I/O register into A or B registers and accomplishes the following with various select codes. If C is given, a 240 nanosecond CLF pulse is given after MIX is executed. |
| MIX 00 | The eight least significant bits in the I/O register are merged with the eight least significant bits of the A or B register and shited to the 8 most significant locations of A or B; 120 nanosecond the merge takes place the Device Ready flip-flop is set (CEO = Low). A or B shifts right 8 places as the data is merged and shifted to the most significant locations. The 8 most significant bits of the I/O register are untouched. |
| MIX 01 | The 16 bits of the I/O register are merged with the 16 bits of the A or B register and contained in the A or B register. |
| MIX 02, 04, 08, 16 | Not used by the calculator. |

Examples of various drivers which transfer data are given below.

```
Example 1:    Typical Subroutine to Get Status of I/O Device.
              Calling Sequence:
                  LDB Select Code
                  JSM Stat
Stat              STF 1          Turn off the interrupt system.
                  OTB 1          Load I/O register with select code.
                  STF 1          Load I/O register with status of I/O
                                 device.
                  LIA 1          Load A-Register with status information.
                  CLF 1          Turn on interrup
                  RET            Return.
Example 2:    Typical Subroutine to Output an 8 bit character.
              Calling Sequence:
                  OTA 1          Output 16 bits to the I/O register.
                  STC 1
                  SFS 1          Loop until I/O flag is set by the
                  JMP *-1          output device.
                  CLF 1
Example 3:    High Speed Output Where the Calculator is Faster than
              Output Device.
              Calling Sequence:
                  ST* I          -(Number of 16 bit words to be output) + 1
                  ST* J          Address of first word in the array.
                  LDB SC         Select Code
                  JSM OUT2
OUT2              JSM STAT       Get status of output device
                  RAR 9            and position it.
Example 4A:   Typical Subroutine to Input an 8-bit Character.
              Calling sequence is:
                  LDB Select code
                  JSM In
                  . . . Return is made with the data in the A Register.
In                STF 1          Turn off interrupt system
                  OTB 1          Load I/O register with the select code
                  STC 1, C       Pulse the flag & turn interrupt system on
                  JSM STAT       Get status off the input device
                  RAR 9            and position it.
                  SAP *-2, C     If device is busy then continue to loop
                  SAR 7            else position data bits
                  RET            Return.
                  SAP OUT2       If device is busy, continue to loop
                  STF 1          Turn off interrupt system.
                  OTB 1          Output select code
                  LDB 1
                                 B ←Counter for number of words to be output
                  LDA J, I       Load next data word
                  SEC *+1, C
                                 E ←0
                  OTA 0          Output 8 bits from A
                  SFS 1          Loop until device sets
                  JMP *-1          flag.
                  SEC *-3, S
                                 If E=0 and E ←J then loop to output last
                                   8 bits
                  ISZ J          Increment array address pointer
                  RIB *-7        Increment count and loop if not finished.
                  CLF 1          Turn on interrupt system
                  RET            Return
Example 3B:   If the Output Device is Faster than the Calculator then n
              Fewer Instructions can be Used.
                  OTA 0          Output first 8 bits
                  OTA 0          Output second 8 bits.
```

-continued

```
Example 5A:  High speed input where the calculator is faster than
             the input device.
             Calling sequence:
                    ST* I        -(Number of 16 bit words to be input) + 1
                    ST* J        Address
                    LDB SC       Select code
                    JSM In2
   In 2             JSM STAT     Get status of input device
                    RAR 9          and position it.
                    SAP In2      If device is busy, continue to loop
```

All output I/O interface cards which are to be fully interchangeable with both the present and other calculators must have storage either on the I/O interface card or in the peripheral to which information is being transmitted.

Blocks (A) and (B) are the storage latches which store information coming from the I/O register. When the output of gate (C) goes high, data is latched; when low, the outputs of the latch track the inputs. Gates (D) decode the address code (14 = 1110) and pass it positive true to gate (E). Device Ready ($\overline{CEO}$) is also passed positive true to gate (E). Gates (H) are open collector and pass status and Device Request ($\overline{CFI}$) onto the input party lines.

An example of a calculator output would be: output the address 14 which enables status gates (H) and see if the power is on. If on, output address, status, and data to gates (A), (B), and (D). The output of (C) is low allowing data and status to pass. Next give Device Ready ($\overline{CEO}$ = Low); this enables flip-flop (G), clocks flip-flop (F) which causes (A) and (B) to latch, and sends control to the peripheral. The peripheral acknowledges receipt of control by returning FLAG (FLAG = High) in a busy state this continues to keep (A) and (B) latched and clears control flip-flop (F). When the peripheral is done acting, the FLAG is returned to the not busy state (FLAG = Low) which clocks flip-flop (G) and causes output at (C) to go low enabling (A) and (B). The output of (G) drives the $\overline{CFI}$ gate which has been enabled from (E) and $\overline{CFI}$ goes low. $\overline{CFI}$ is received by the calculator which responds by returning $\overline{CEO}$ high. This causes the output of (E) to go low, clearing flip-flop (G) and returning $\overline{CFI}$ high. This completes 1 output cycle.

All input I/0 interface cards which are to be fully interchangeable with both the present and other calculators must have storage either on the I/O interface card or in the peripheral from which information is being received.

Block (A) is used to store information coming from the peripheral. (B) stores status coming from the I/O register which may be needed by the peripheral. The output tracks the input whenever the enable on the latch is low. Block (C) decodes the address code into one of 10 addresses which are jumper selectable. An example of a calculator input would be as follows: the address code would be decoded by (C); the calculator would load status through the open collector input status gates (D). If the peripheral is on and ready, the address code and output status (if necessary) would be sent to (B) and (C). The decoded address is passed, positive true, to gate (E). The enable at (B) is low so that status is passed to the peripheral. The Device Ready is given ($\overline{CEO}$ = Low) and comes to (E) positive true. The output of (E) clocks flip-flop (F) through gate (H). The output of (F) gives control to the peripheral and also enables (A) to receive data. The peripheral responds in a busy state (FLAG = High). When data is ready to be input the FLAG is driven low. Data is latched when the FLAG goes low in (A). Also when FLAG goes low, (G), having been enabled by the output of (H), is clocked driving (J) from its Q output. (I) is enabled by the output of (H) and so $\overline{CFI}$ is driven low. Data is loaded into the I/O register from open collector gates (I) and $\overline{CEO}$ driven high as a result of the calculator receiving $\overline{CFI}$. This clears flip-flop (G) and disables the input gates (I) completing an input cycle.

Figure 59:
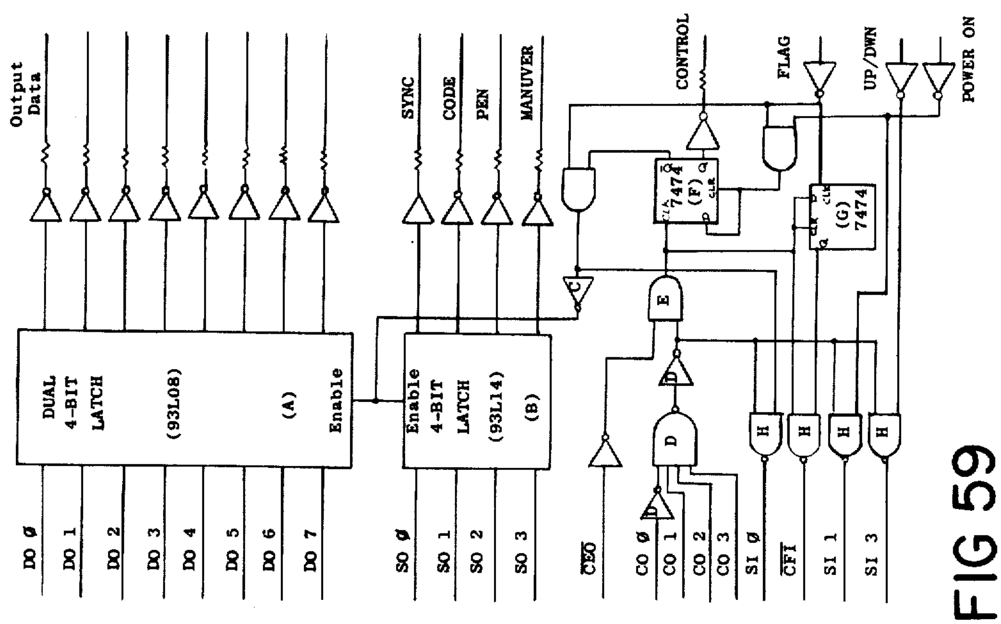
FIG. 59 is a schematic diagram of logic that may be used to interface an X-Y plotter to the input-output control unit of FIGS. 3A–B.

FIG. 59 illustrates the logic required on an I/O interface module to interface the calculator with an external X-Y plotter.

Figure 60:
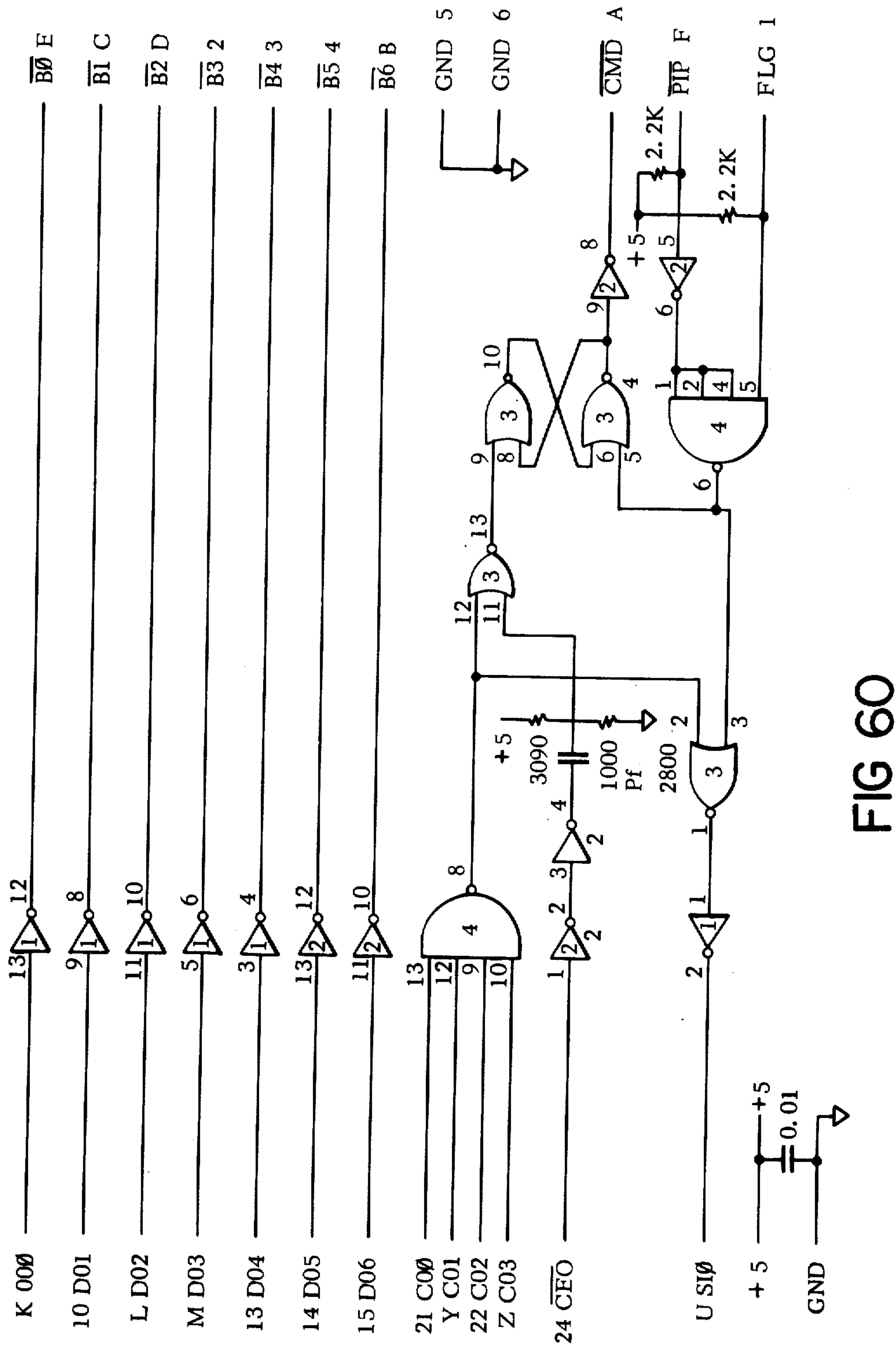
FIG. 60 is a schematic diagram of logic that may be used to interface a printing unit to the input-output control print of FIGS. 3A–B.

FIG. 60 illustrates the logic required on an I/O interface module to interface the calculator with an external line printing unit.

FIG. 61 illustrates the logic required on an I/O interface module to interface the calculator with an external modem for transmitting and receiving information via telephone lines.

Figure 62:
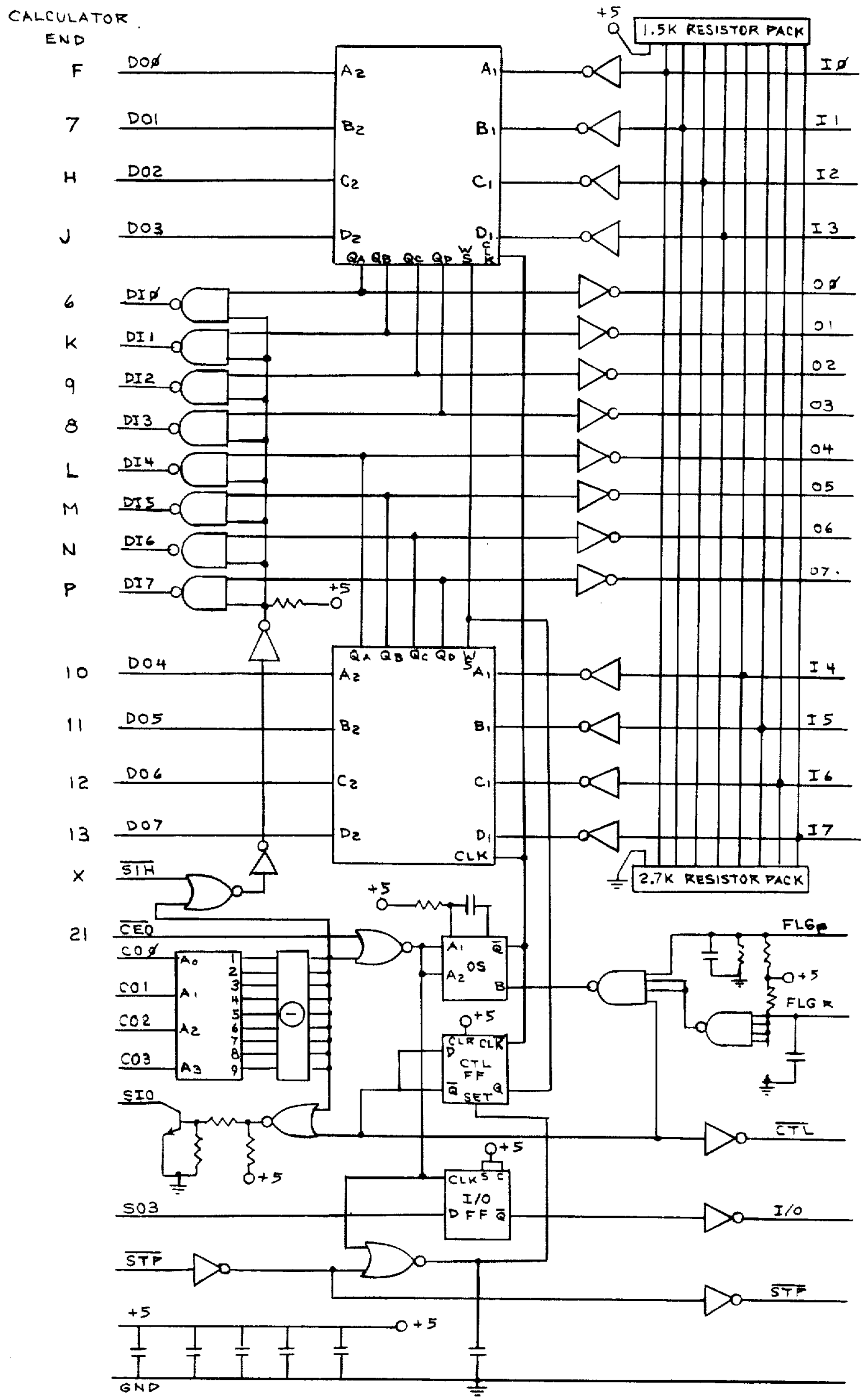
FIG. 62 is a schematic diagram of logic that may be used to transfer any eight-bit code into or out of the input-output control unit of FIGS. 3A–B.

FIG. 62 illustrates the logic required on an I/O interface module to input or output any eight-bit code.

A power preset circuit is employed on interface modules using the interrupt system to prevent an interrupt when the peripheral power is turned off or on. This can usually be done by sensing the peripherals' +5 volts and presetting when the voltage drops below 3 to 4 volts.

An example of a calculator interrupt would be as follows: (B) may be clocked at any time storing the data is (E) and (F). The calculator enables the interrupt to take place by making Prevent Interrupt false ($\overline{SIH}$ = High) and outputting address 0 to decoder (L). (G) is enabled when $\overline{SIH}$ goes high through gate (M) causing $\overline{SSI}$ to be driven low. The calculator responds by loading the I/O register. Gates (H) are inhibited by gates (N) and (J) and gate (K) is enabled because of address 0, thus DI0 is the only true signal loaded into the I/O register. The calculator interprets this to mean the I/O interface card at address 1 has caused the interrupt. The calculator outputs address 1 to the decoder which enables gates (H) with (N) and (J) and then loads the data. After the data is stored the calculator outputs address 1 and sends Device Ready ($\overline{CEO}$ = Low) as a 360 nanosecond pulse which is used to clear (B) through gates (O) and (D). This completes an input cycle.

KEYBOARD INPUT UNIT

Figure 63:
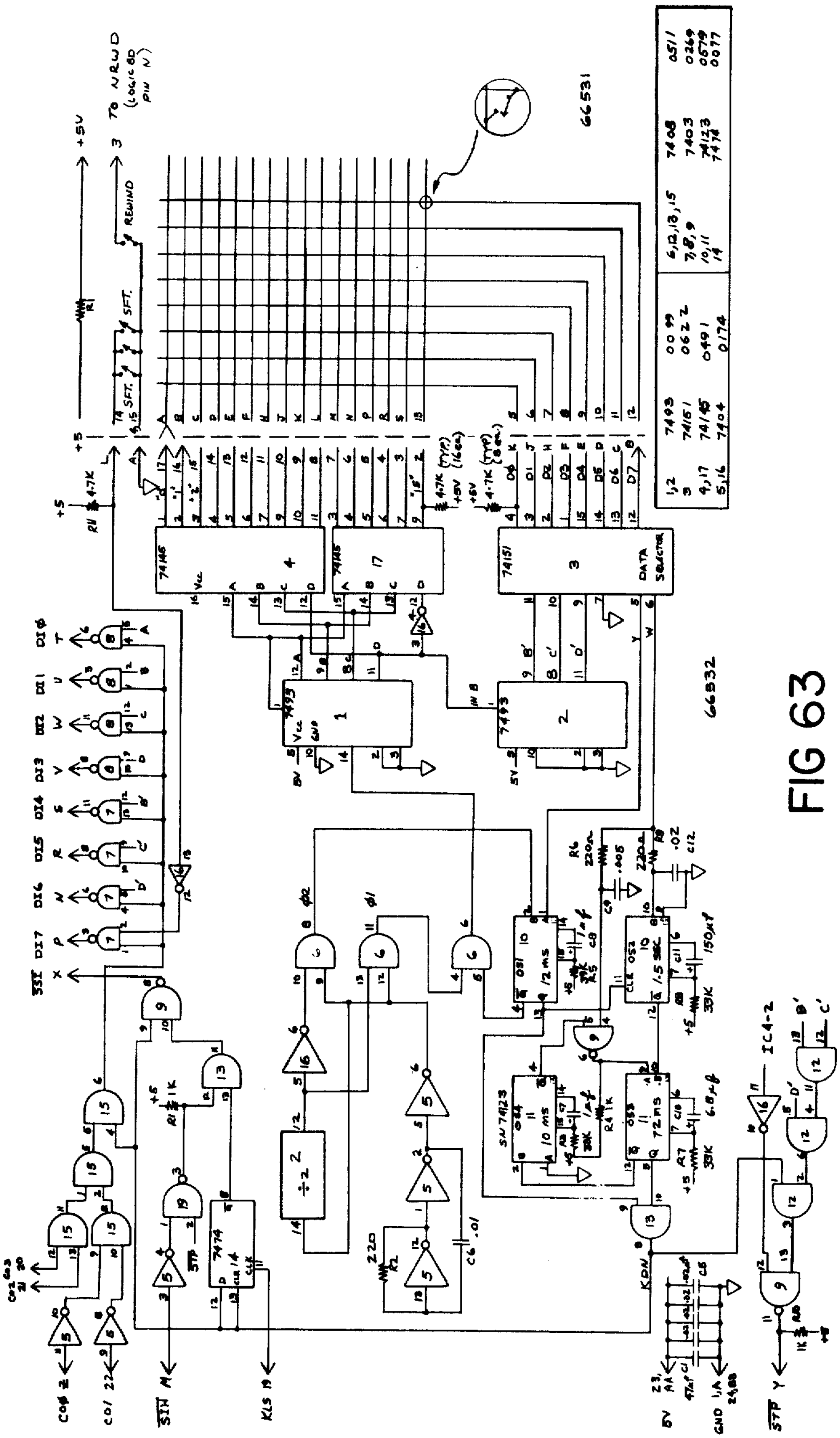
FIG. 63 is a detailed schematic diagram of the keyboard input unit employed in the adaptable programmable calculator of FIGS. 1–3B.

The keyboard input unit is shown in FIG. 63 and is designed around a 128-position matrix. Each position is scanned sequentially. When a key is depressed, the counter, which drives the scanner, is stopped. The address of the 7-bit counter corresponds to the ASCII code of the key depressed. The entire scan period is 4 milliseconds. Two key rollover is incorporated in this design.

When a key is depressed, $\overline{\text{SSI}}$ is generated unless inhibited by either $\overline{\text{SIH}}$ or KLS. As soon as the service request is acknowledged, the CPU will give a select code of 12 which will gate the ASCII keycode onto the data lines.

Another feature of this keyboard is automation repeat. If a key is depressed for more than 1.5 seconds, the keycode will be entered repeatedly at a rate of 15 entries per second until the key is released.

OUTPUT DISPLAY UNIT

Referring to FIGS. 72A–B and 73A–B, there is shown the hardware associated with the calculator display. The display comprises a single register 400 of 32 alphanumeric characters, each character position of which is a seven row by five column matrix of light emitting diodes (LED). In addition to the display hardware illustrated, the complete calculator display system comprises a firmware display routine which is detailed on page 35 of the basic system firmware listing and an I/O register shown in FIGS. 49A–D. The firmware display routine delivers a 16-bit word to the display circuitry. Four of these bits 402 and 404 are decoded into one of 16 character positions. The remaining 12 bits 422 are two six-bit ASCII coded characters which are alternatively decoded in ROM 430 into their row and column information. A seven-bit data latch 432 is provided to allow the ROM 430 to decode both the *n*th and the ($n$ = 16)th characters which are displayed simultaneously.

An assymmetrical clock circuit 426 drives input gating circuitry 436 and counter-decoder circuitry 434 to decode the row information of the *n*th and the ($n$ +16)th characters. Protection circuitry 428 is provided to blank the display in case of failure of either logic signal $\overline{\text{DEN}}$ 424 or CA0 438.

Three-bit column data 410 and three of the four-bit character position bits 402 are applied to a one-of-four decoder circuit 420. The output of circuit 420 is fed to the column drivers 418. Four columns eight emitting diodes 400 are driven by each of the 40 column driver. Thus, all 160 columns of the display can be scanned. The remaining character position bit 404 enables alternate sections of row drivers 416 to complete the one-of-16 character position decoding.

MAGNETIC TAPE CASSETTE READING AND RECORDING UNIT

Figure 64:
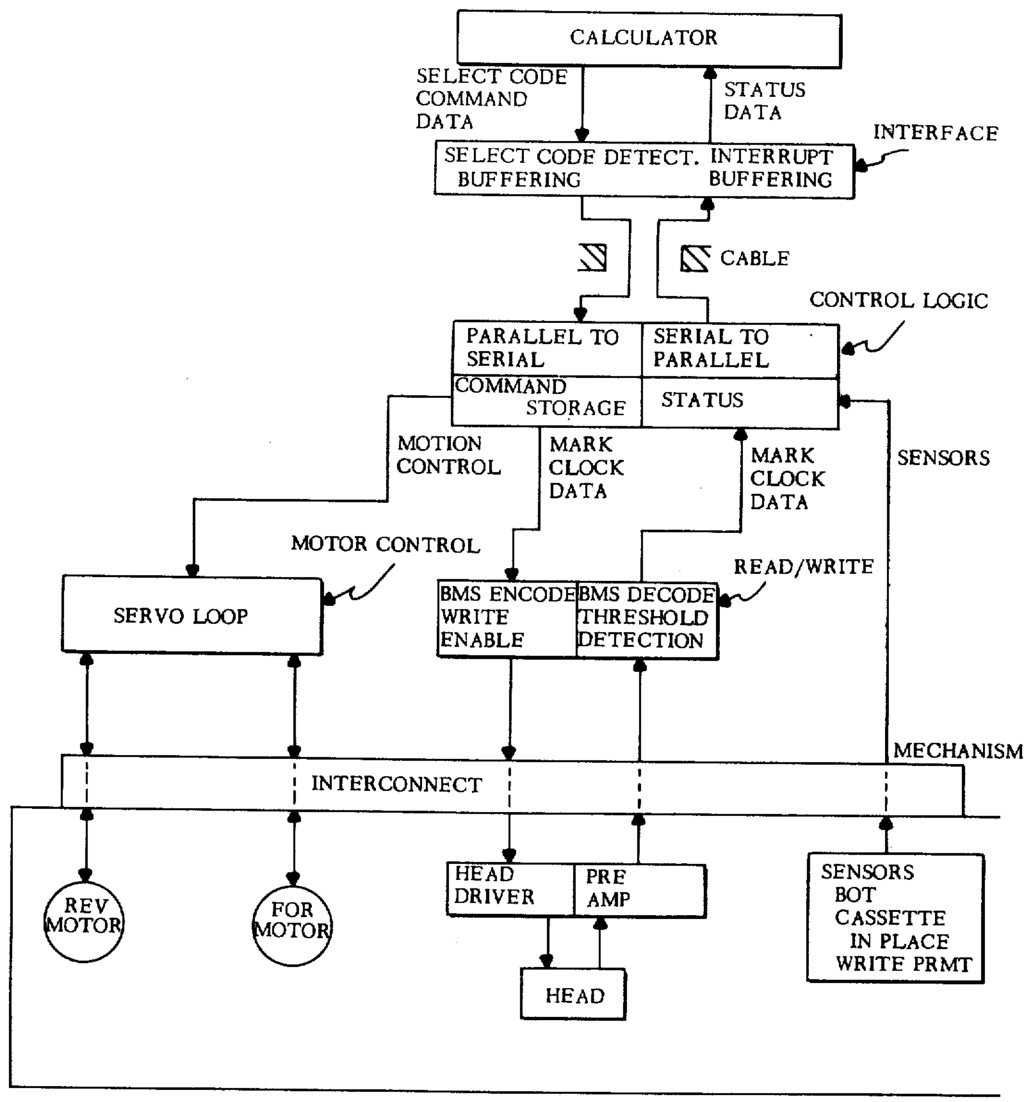
FIG. 64 is a block diagram of the magnetic tape cassette reading and recording unit employed in the calculator of FIGS. 1—3B.

The magnetic tape cassette reading and recording unit is shown in the block diagram of FIG. 64 and in the detailed schematic diagram of FIGS. 65–69. Operation of the magnetic tape cassette reading and recording unit is largely automatic. It is only necessary to specify the type of operation to be performed and the limits desired. The commands for doing this may either be entered directly from the keyboard input unit or as part of a program. The calculator then determines the necessary commands required to cause the magnetic tape cassette reading and recording unit to perform the desired operation.

Several modes of operation are possible. Secure and unsecure programs, data, and sets of user definable key definitions may be recorded on the magnetic tape and subsequently loaded back into the calculator.

Figure 65:
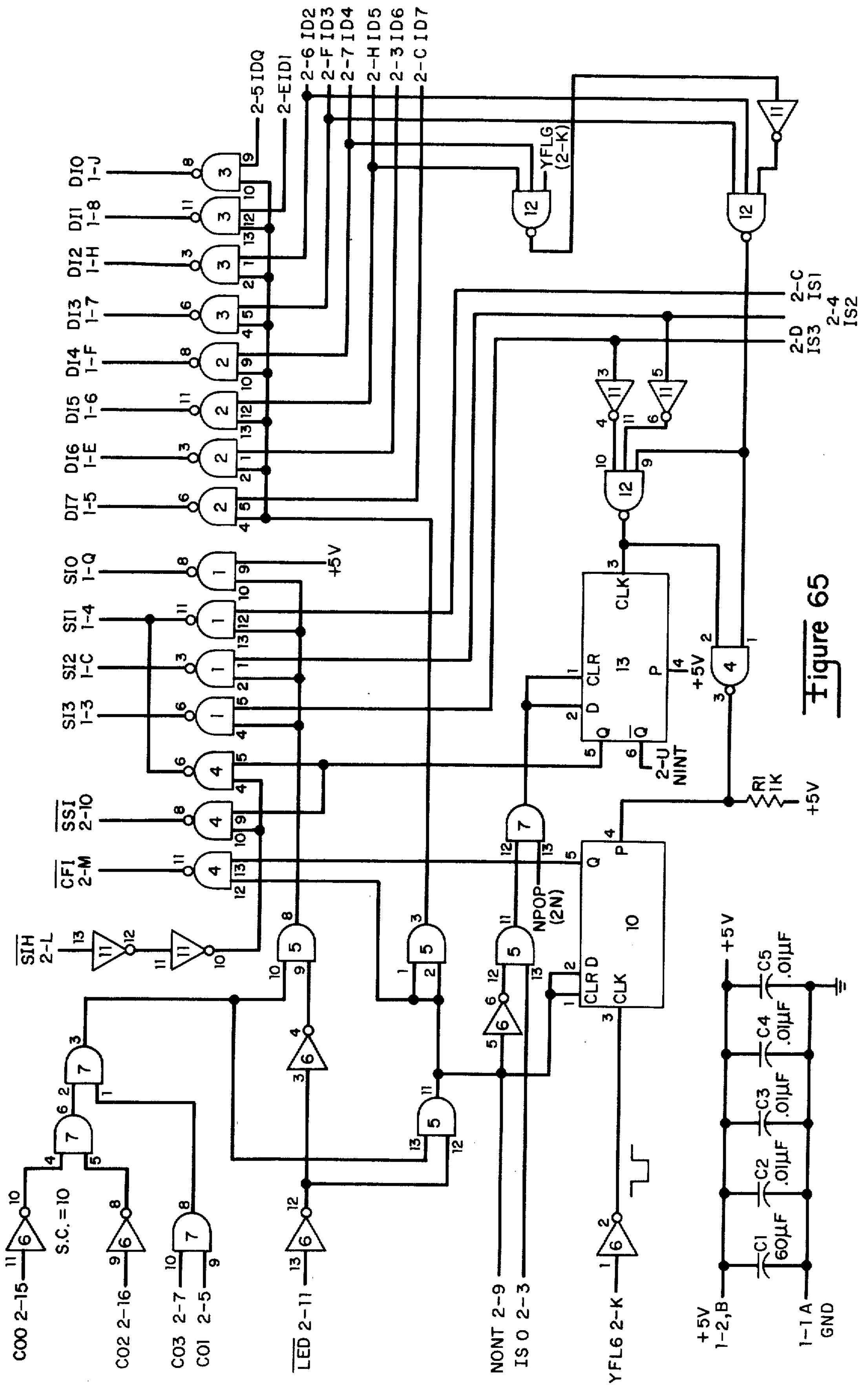
FIG. 65 is a detailed schematic diagram of the interface block of FIG. 64.

Referring now to FIGS. 64 and 65, the operation of the interface portion of the magnetic tape cassette reading and recording unit will be described.

I. Address Decoder

IC 6 and IC 7 are used to detect a select code of 10 when the cassette is accessed. When a select code of 10 is detected, and the control line $\overline{\text{CEO}}$ is true the cassette is enabled.

II. Enabling Input Data Bits

The open collector nands in IC 2 and IC 3 allow the input data bits (ID 0 through ID 7) to be gated onto the calculator input bus when the card is selected by the address and control line as described in Section I.

III. Enabling Input Status Bits

The open collector nands in IC 1 allow the input status bits (IS 0 through IS 3) to be gated onto the calculator input bus when a select code of 10 is given and the control line is true.

IV. Flag

D type flip-flop 10 is the flag flip-flop. It is held cleared except when the I/O card is selected as described in Section I. When the I/O card is selected the flip-flop is set by the trailing edge of the flag pulse from the cassette. In addition, the flag flip-flop is held preset (at pin 5) when the cassette door is open, clear leader is detected, or an interrupting character is read. A simultaneous preset and clear results in a true output from the flip-flop. The flag flip-flop signal is gated to the calculator ($\overline{\text{CIF}}$, pin 2-*m*) by the open collector nand gate only when the I/O card is selected.

V. Interrupt

D-type flip-flop 13 is the interrupt flip-flop. It is held cleared whenever the I/O card is selected as described in Section I. The interrupt is allowed only if the cassette is in control mode (pin 2-3). An interrupt signal comes whenever the cassette goes onto clear leader, the cassette door is opened, or an interrupting character is read. An interrupting character is a character with data bits 2, 3, 4, 5 all ones, read when the cassette is in control mode. When the signal Service Interrupt Inhibit is false ($\overline{\text{SIH}}$ = 1, pin 2-1) the interrupt signal is gated through IC 4 pin 6 and 8 to the calculator. The data bit SI 1, (Pin 1-4) is pulled low to tell the calculator the address of the peripheral which interrupted.

Figure 14:
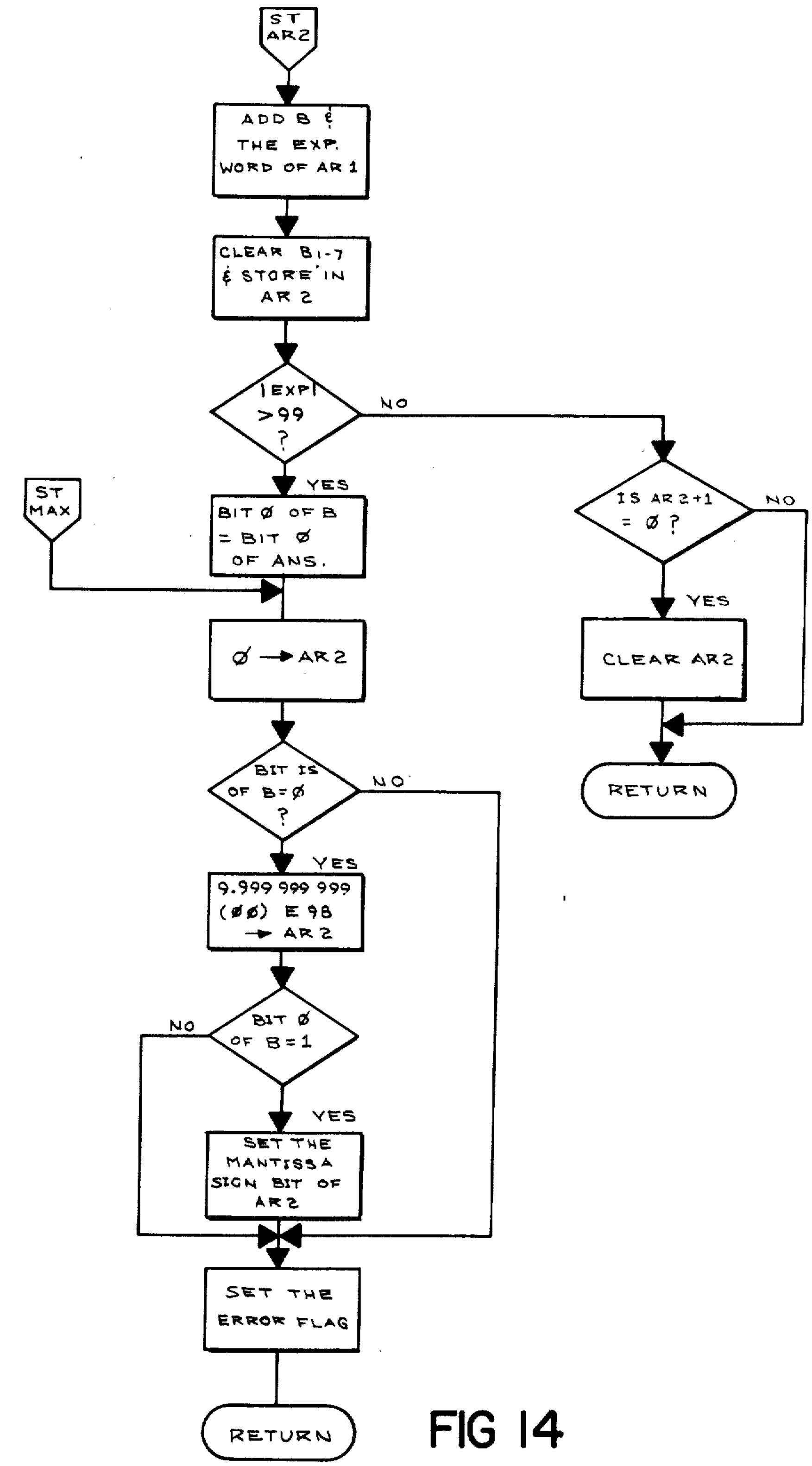
FIG. 14 is a flow chart of a store routine selectable by the execution monitor of FIG. 9.
Figure 15:
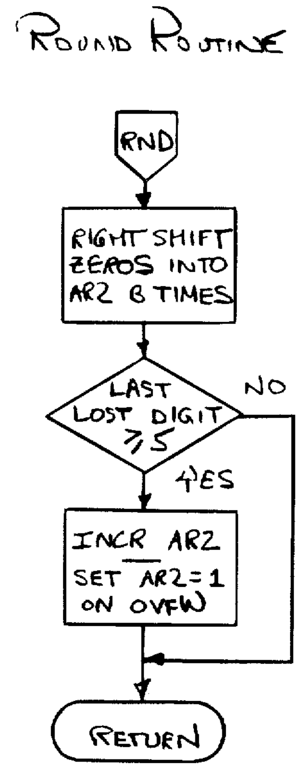
FIG. 15 is a flow chart of a rounding routine employed in connection with several of the routines selectable by the execution monitor of FIG. 9.
Figure 26:
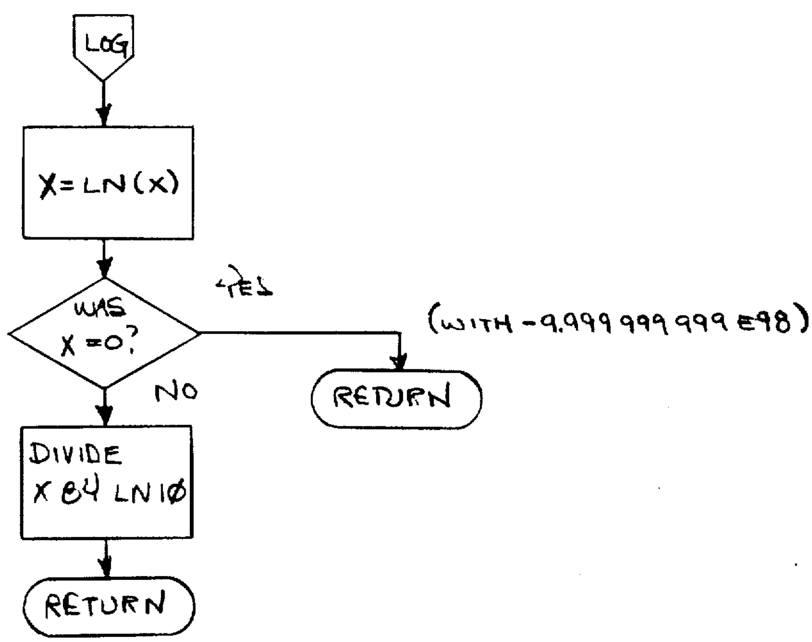
FIG. 26 is a flow chart of a logarithm to the base ten routine selectable by the execution monitor of FIG. 9.
Figure 16A:
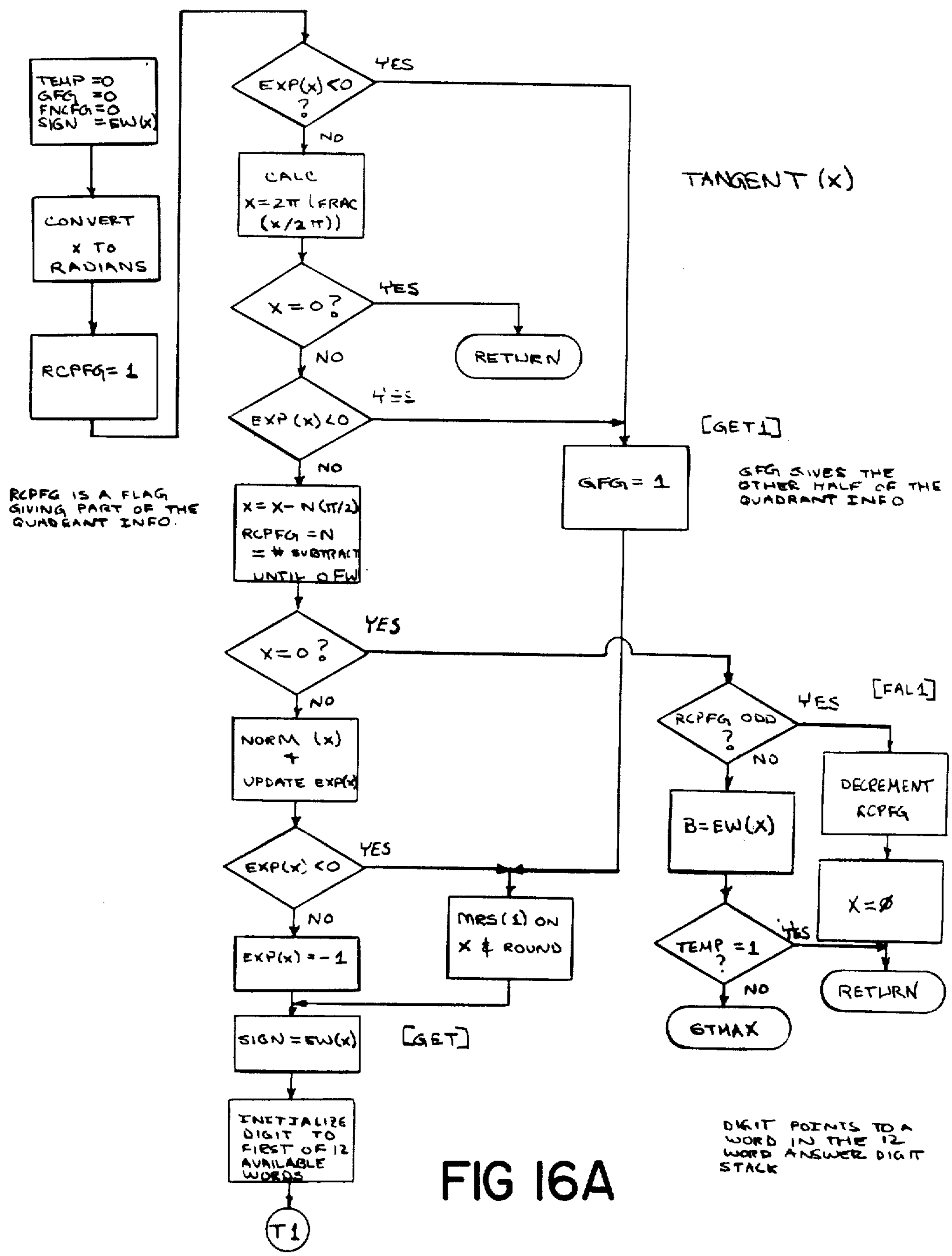
FIGS. 16A–B are a flow chart of a tangent X routine selectable by the execution monitor of FIG. 9.
Figure 16B:
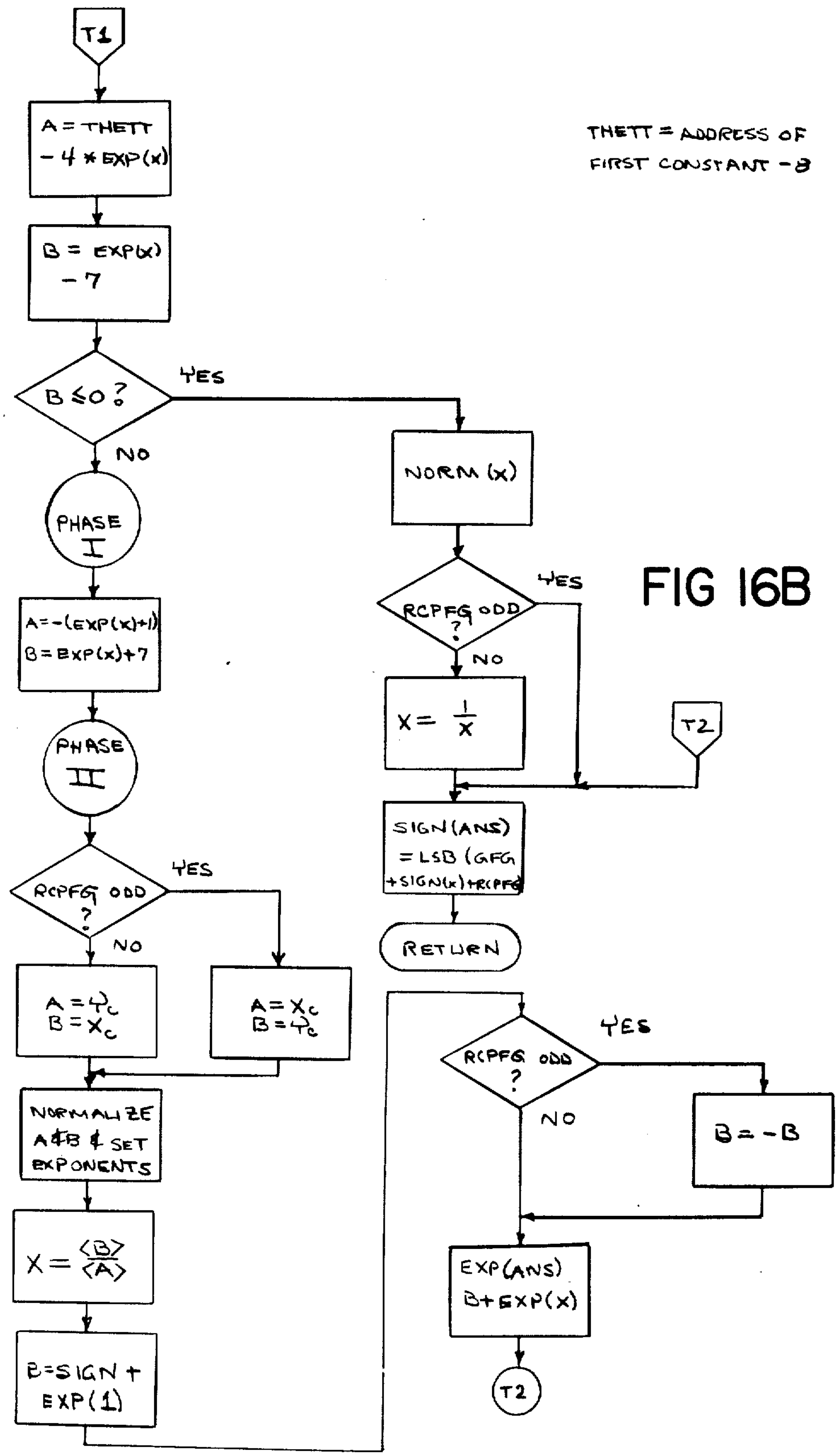
Figure 17A:
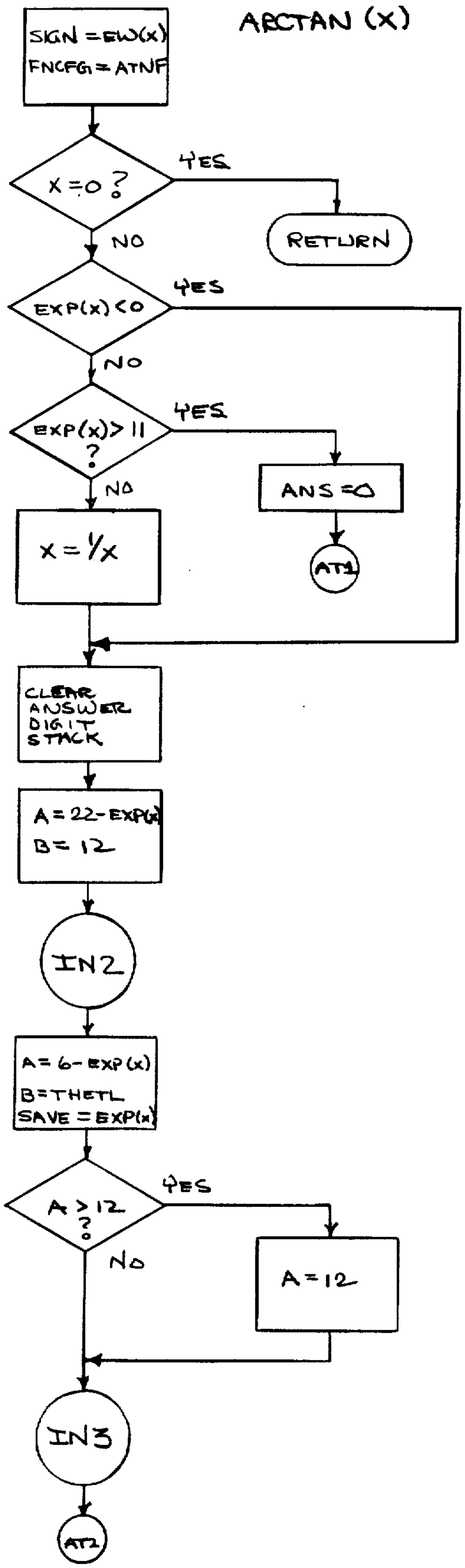
FIGS. 17A–B are a flow chart of an arctangent X routine selectable by the execution monitor of FIG. 9.
Figure 17B:
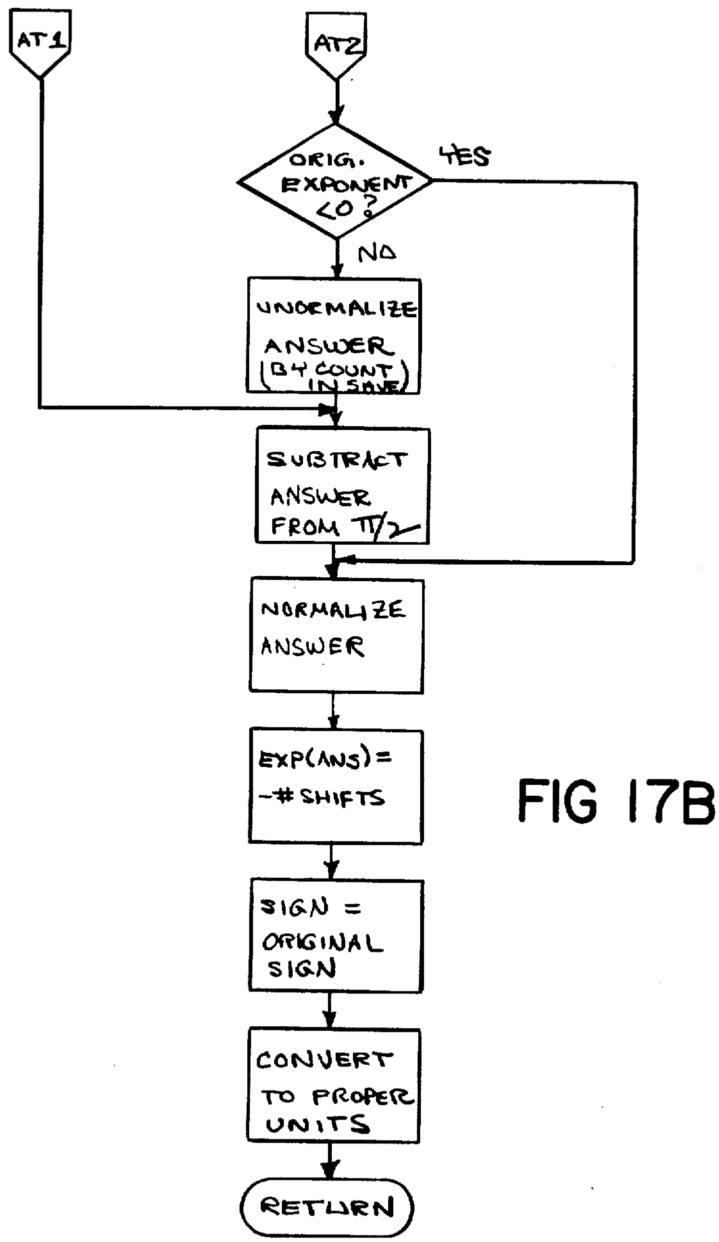
Figure 18B:
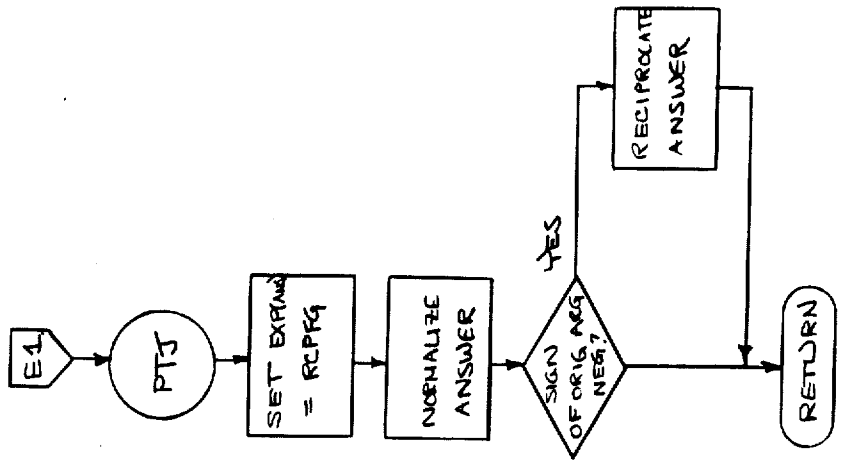
FIGS. 18A–B are a flow chart of an $e^X$ routine selectable by the execution monitor of FIG. 9.
Figure 18A:
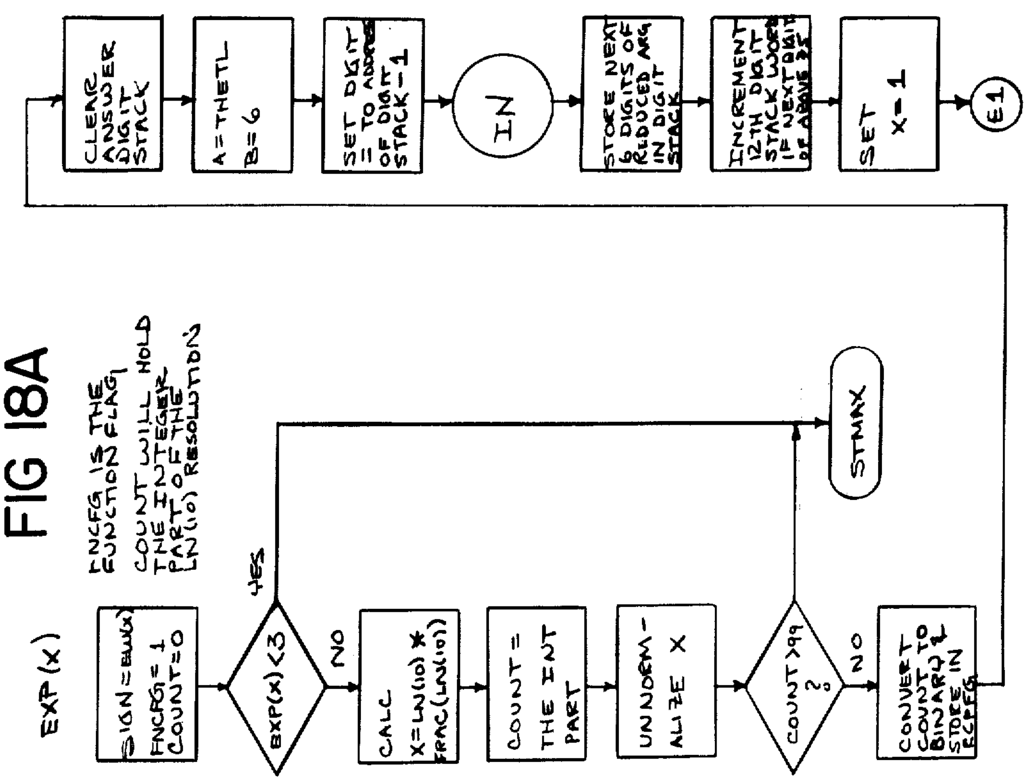
Figure 19:
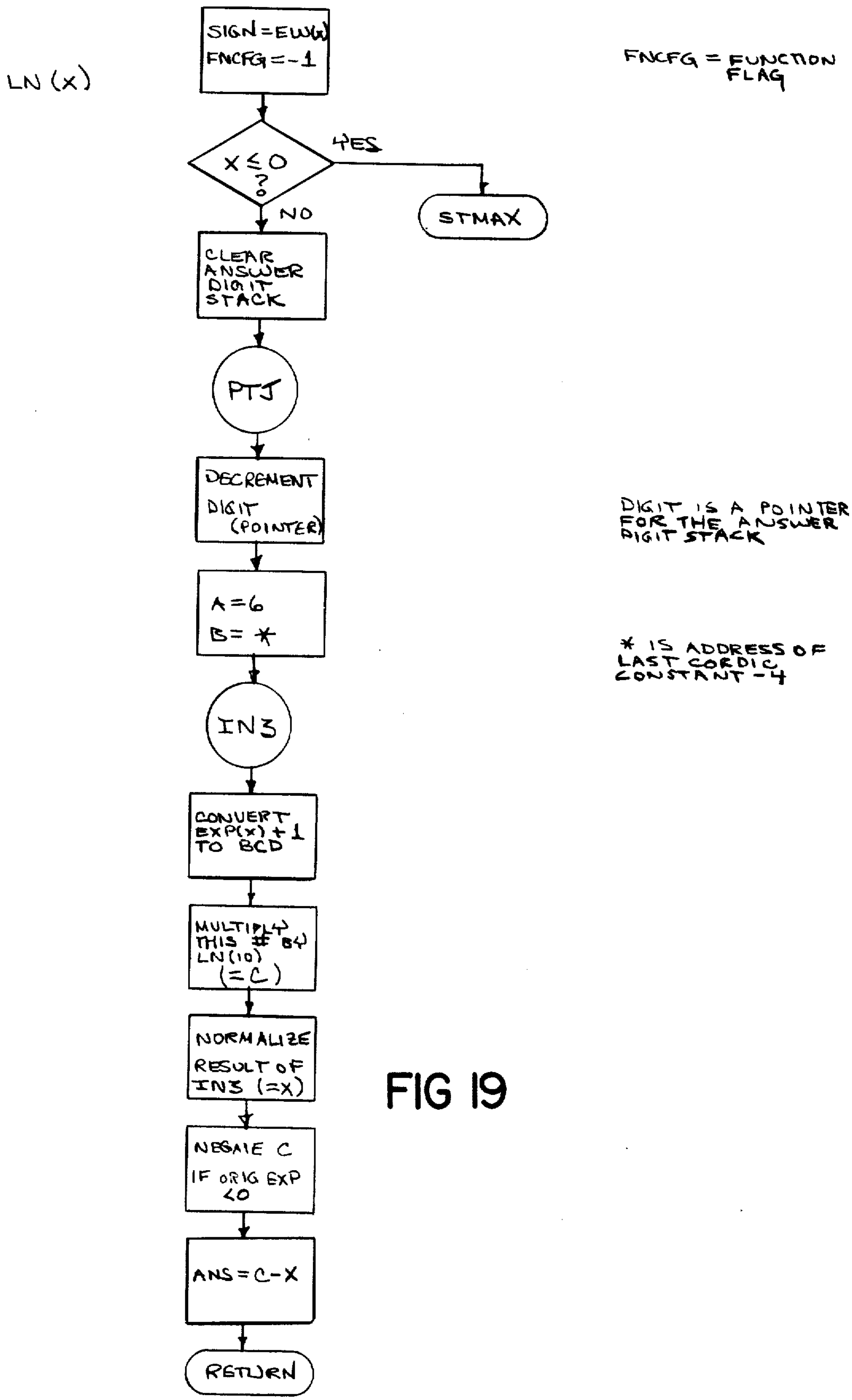
FIG. 19 is a flow chart of a natural logarithm X routine selectable by the execution monitor of FIG. 9.
Figure 20:
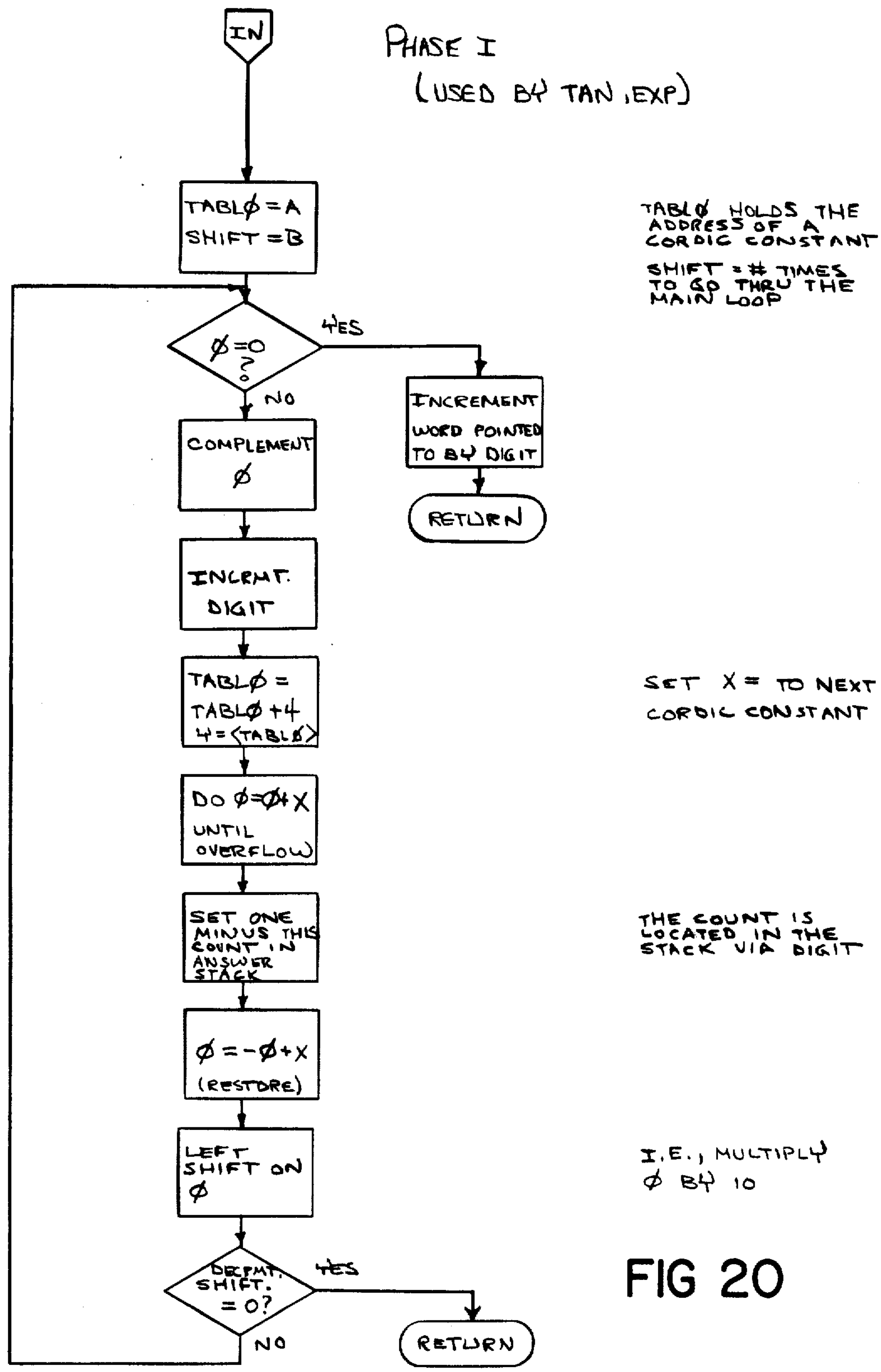
FIG. 20 is a flow chart of a subroutine employed by the tangent X and $e^X$ routines of FIGS. 16A–B and 18A–B, respectively.
Figure 21A:
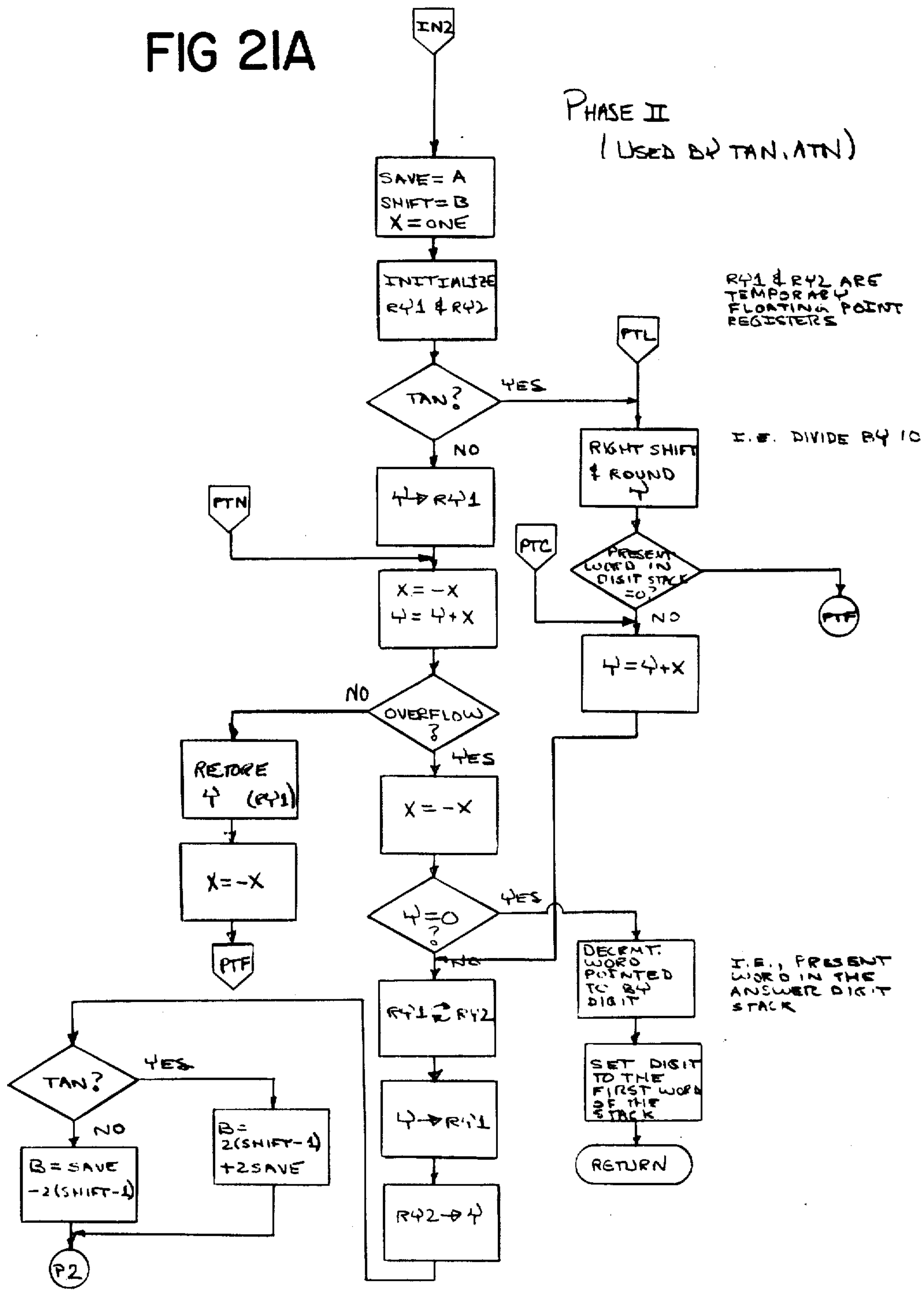
FIGS. 21A–B are a flow chart of a subroutine employed by the tangent X and arctangent X routines of FIGS. 16A–B and 17A–B, respectively.
Figure 21B:
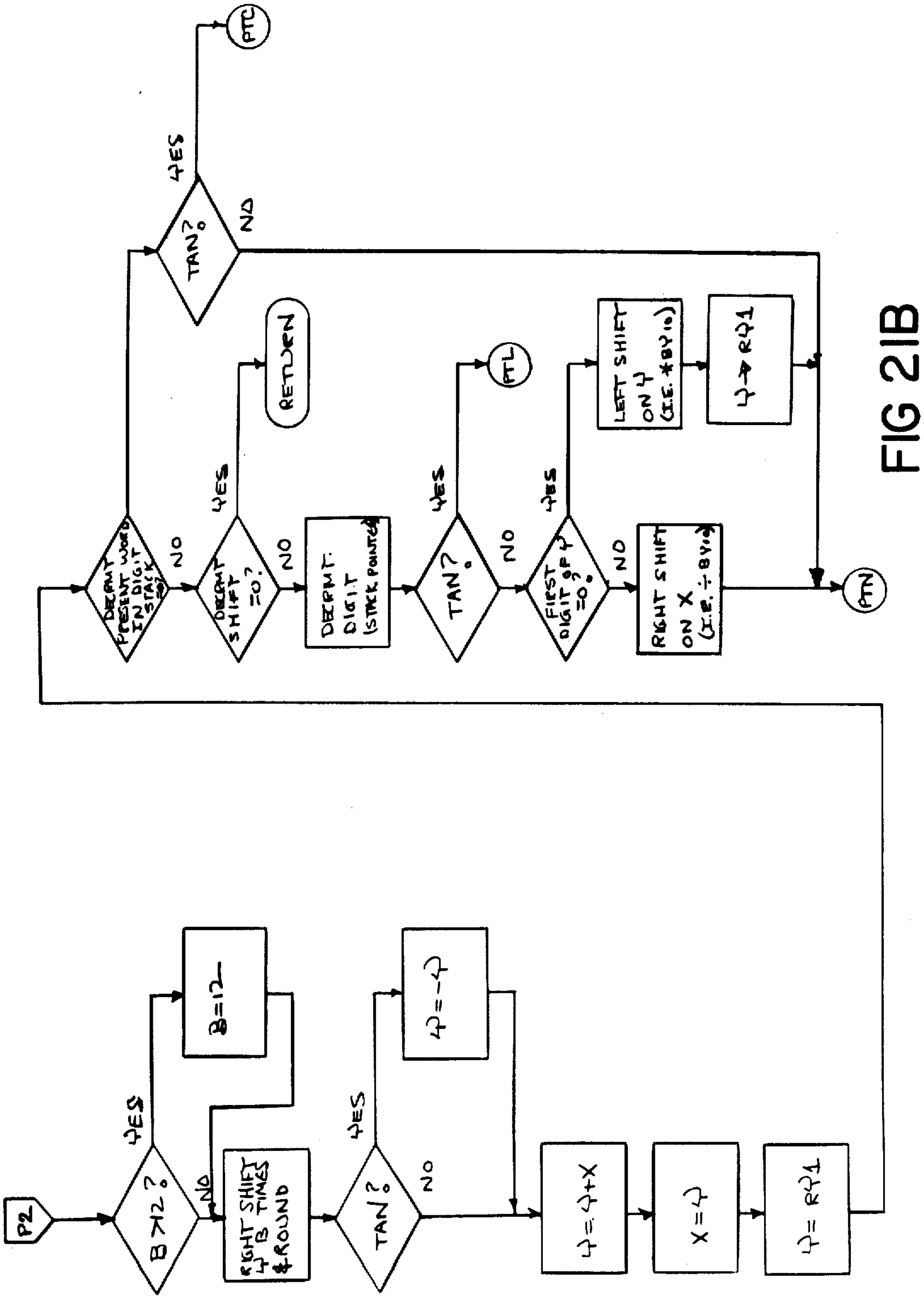
Figure 23:
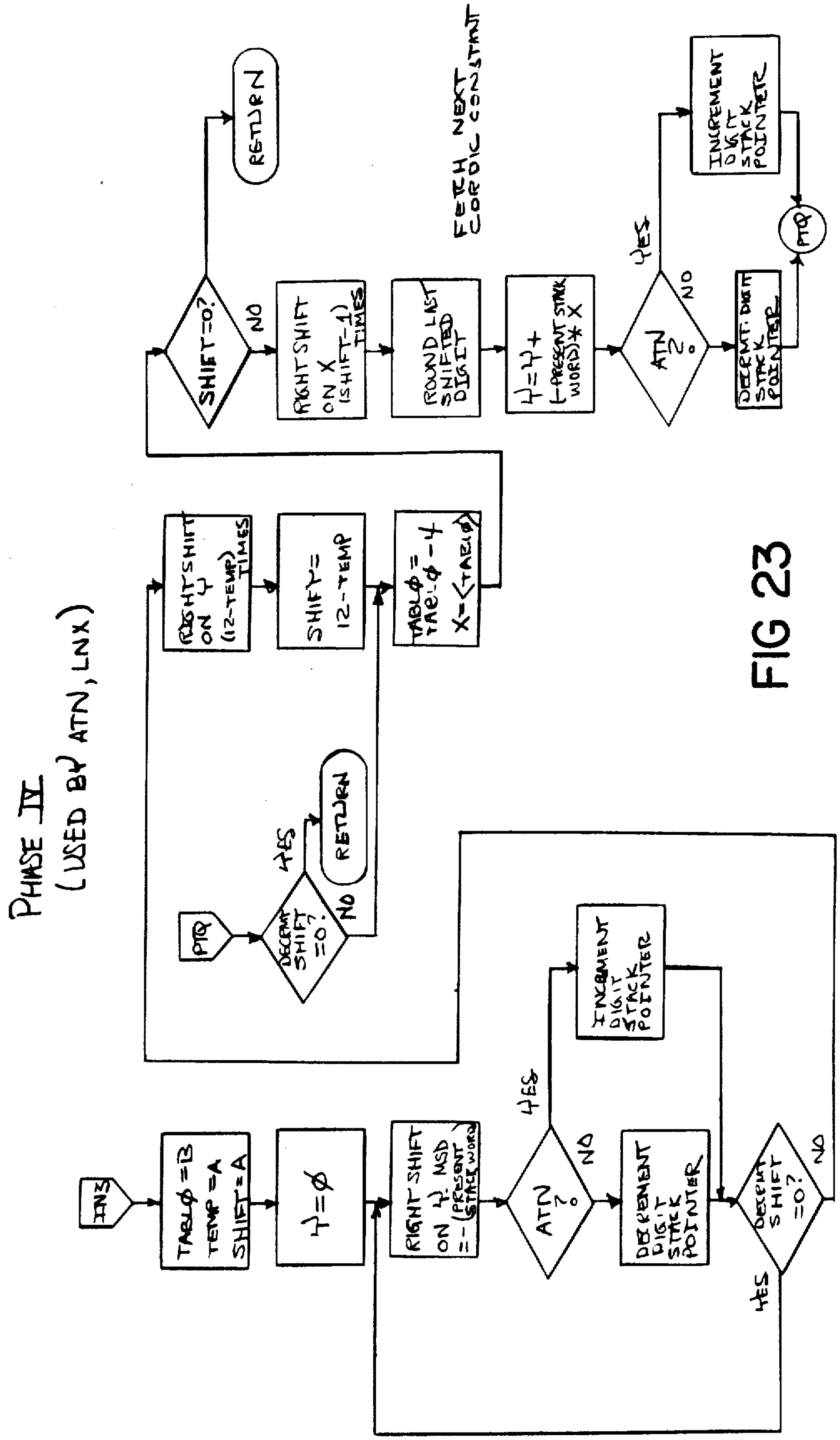
FIG. 23 is a flow chart of a subroutine employed by the arctangent X and natural logarithm X routines of FIGS. 18A–B and 19, respectively.
Figure 24:
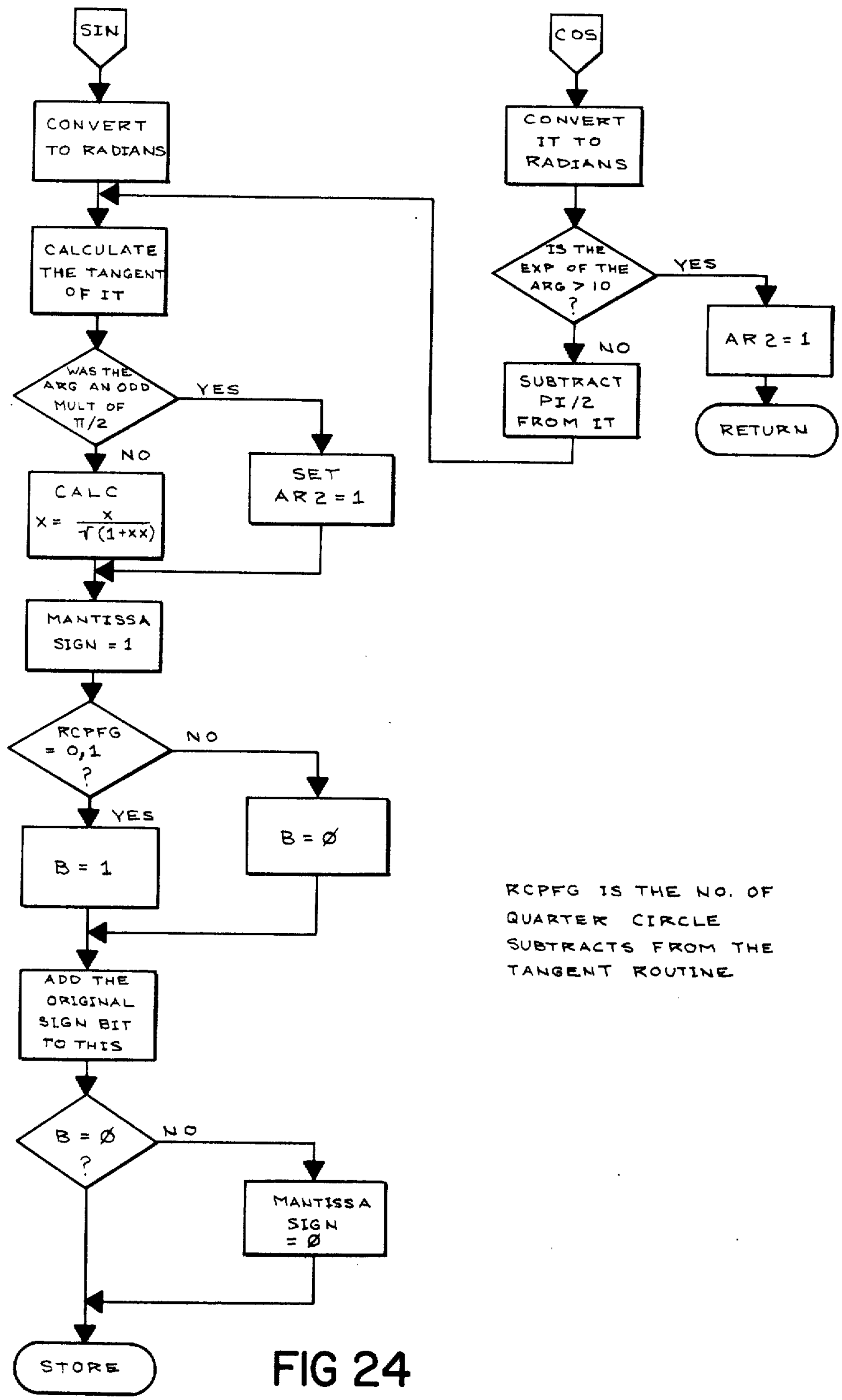
FIG. 24 is a flow chart of sine and cosine routines selectable by the execution monitor of FIG. 9.
Figure 25:
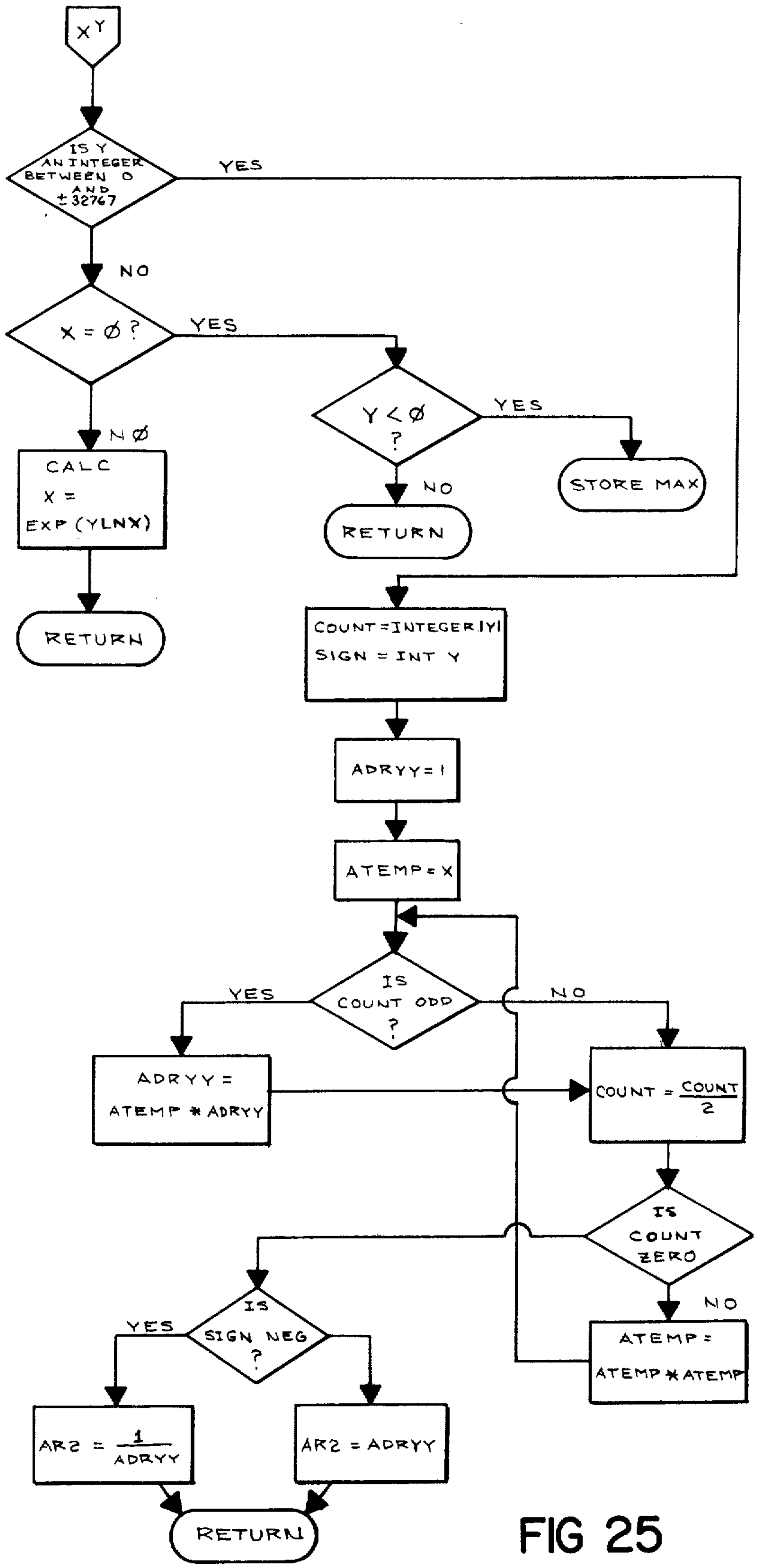
FIG. 25 is a flow chart of an $X^Y$ power routine selectable by the execution monitor of FIG. 9.
Figure 66:
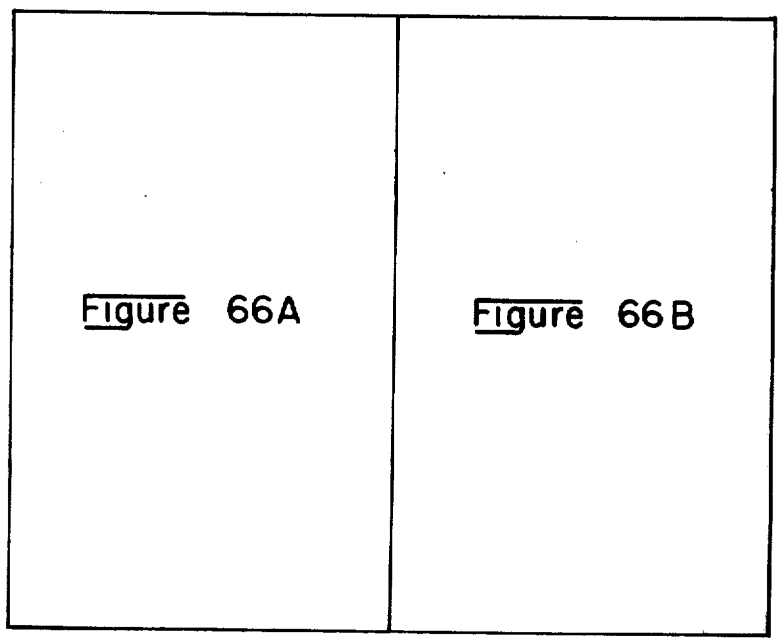
FIG. 66' is a diagram showing the arrangement of FIGS. 66A–B.
Figure 66A:
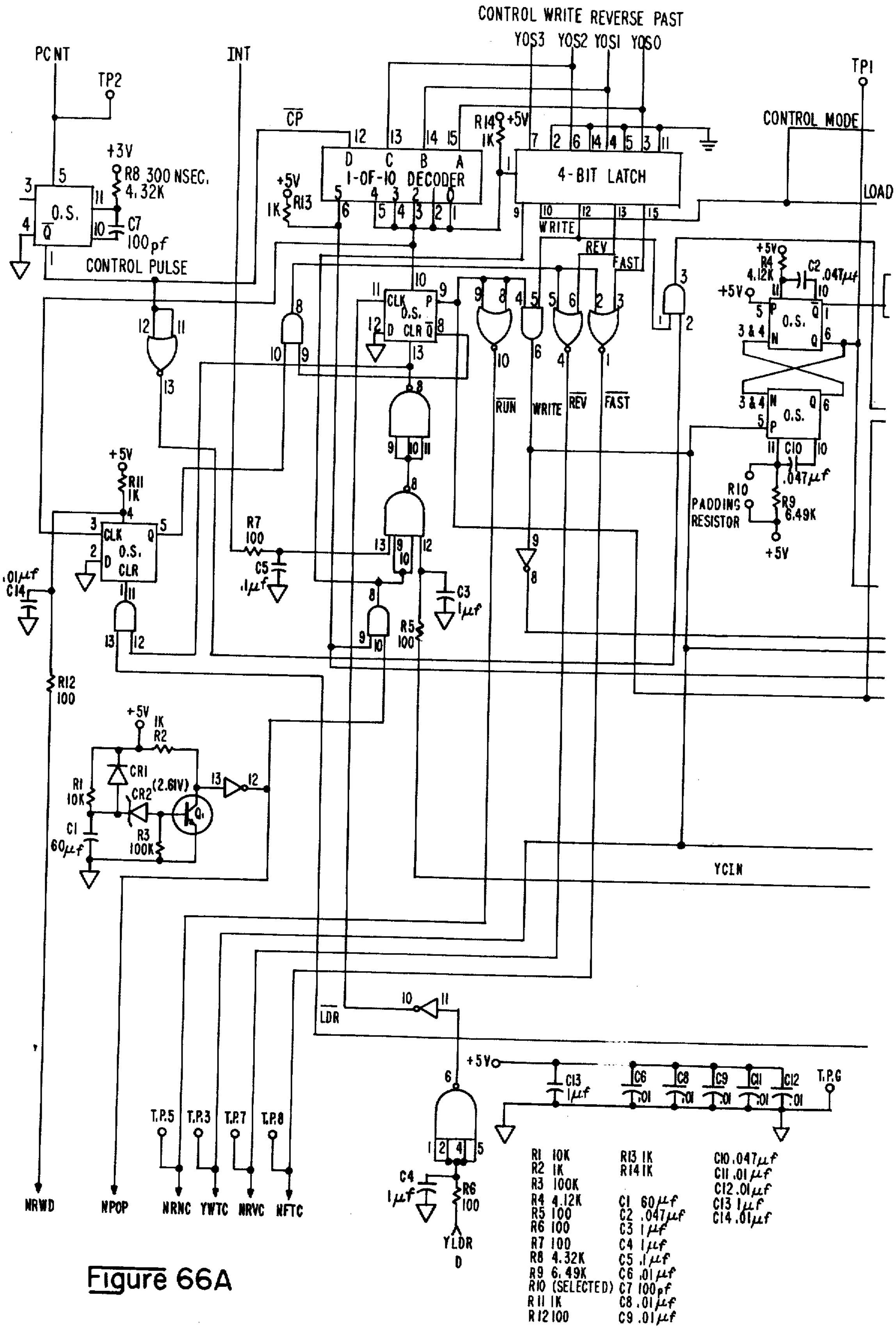
FIGS. 66A–B are a detailed schematic diagram of the control logic block of FIG. 64.
Figure 66B:
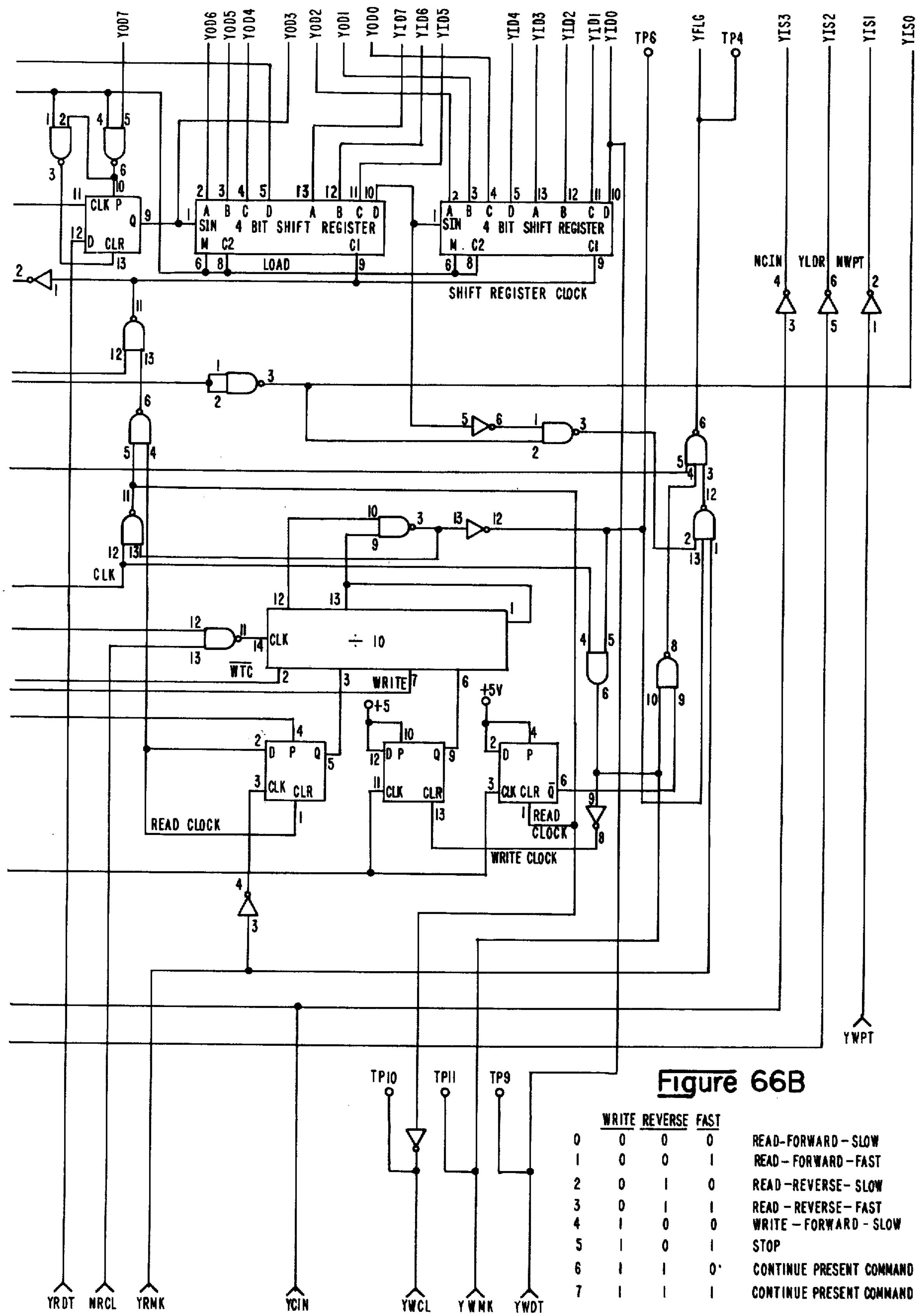
Figure 67:
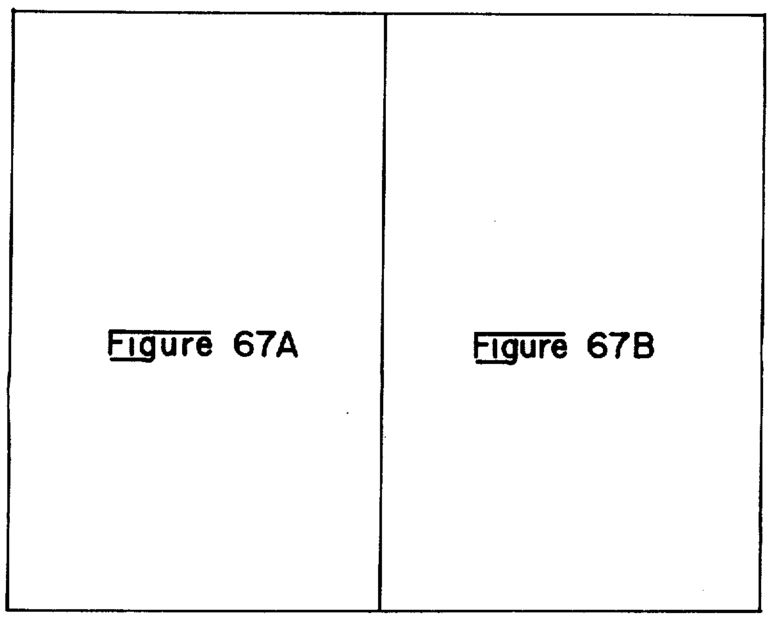
FIG. 67' is a diagram showing the arrangement of FIGS. 67A–B.
Figure 67A:
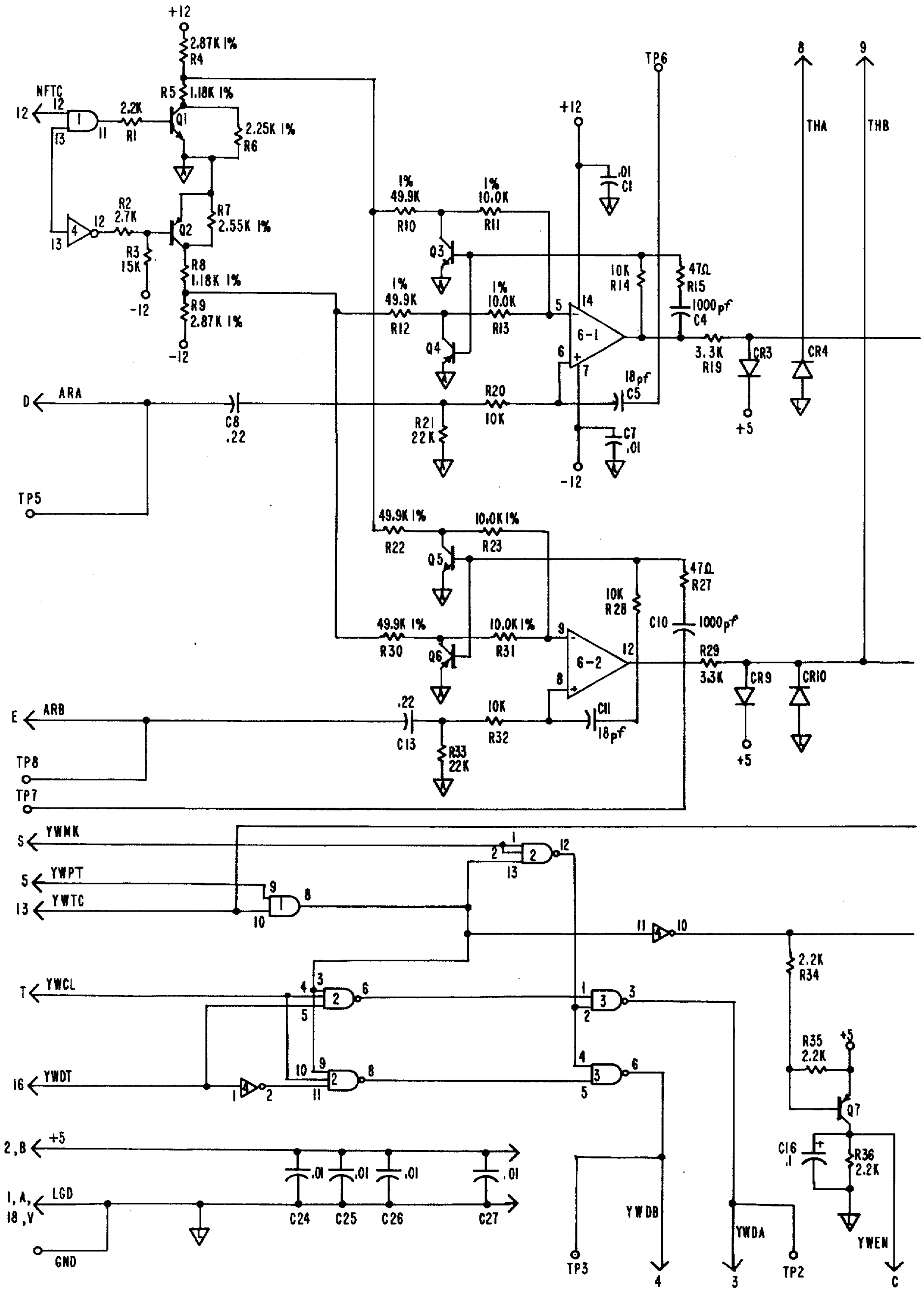

Referring to FIGS. 64, 66A–14 B, and 66' the operation of the control logic portion of the magnetic tape cassette reading and recording unit will be described.

I.1 Power on Preset

Transistor Q1 and diodes CR1 and CR2 are part of the power on circuit which makes sure that the cassette powers up in the proper modes.

I.2 Control Signal

The control signal (YCNT on pin 11) comes from the Interface card as a positive true signal telling the Logic card to process the command on the output lines. The positive going edge of the control signal fires the one-shot (IC 7) giving a 300 nsec. control Pulse used to strobe storage elements.

I.3 Decode and Storage of Commands

The 1-of-10 open collector decoder (IC 19) is strobed on its D input by the control pulse. (See Section I.2) On the A, B, and C inputs of the decoder are output status bits OS0 through OS2. Those output status bits contain commands for the transport as follows:

| OS2 (Write) | OS1 (Reverse) | OS0 (Fast) | Command |
|---|---|---|---|
| 0 | 0 | 0 | Read-Forward-Slow |
| 0 | 0 | 1 | Read-Forward-Fast |
| 0 | 1 | 0 | Read-Reverse-Slow |
| 0 | 1 | 1 | Read-Reverse-Fast |
| 1 | 0 | 0 | Write-Forward-Slow |
| 1 | 0 | 1 | STOP |
| 1 | 1 | 0 | Continue Present Command |
| 1 | 1 | 1 | Continue Present Command |

Output status bit 3 (OS3) indicates if the cassette should be in control mode or data mode. Control mode is explained in Section I.12.

If when the decoder is strobed, the command on the output status lines is other than STOP or CONTINUE, the open collector wired-or decoded outputs 0 through 4 are low for the width of the control pulse. This wired-or output pulse strobes the command on the output status bits into the Quad Latch, IC20, and preset the run flip-flop 15-2. The command on the run lines are gated off the logic card to the motor control card, and cassette motion begins.

If the command is STOP, the decoder output 5 (pin 6) goes low, which clears both the run flip-flop (15-2) and the Quad Latch (IC20). If the command is CONTINUE, both the Quad Latch and the run flip-flop remain unchanged.

The run flip-flop and the Quad Latch are also cleared by power on preset.

I.4 Run Flip-Flop

The run flip-flop (1502) is preset by the issuing of a command as described in Section 6.3. It is cleared by an interrupt signal from the I/O card, a stop command, power on preset, or a cassette not being in place. The run flip-flop is also cleared by the clear leader signal on its clock input, whenever the cassette runs into clear leader. Since the clock input of the flip-flop is edge sensitive, the transport is stopped only when it first goes onto clear leader, and tape motion is allowed by the issuing of a new command even when on clear leader.

The Schmidt-triggered gates 1-1 and 1-2 are used to filter noise on the interrupt, clear leader, and cassette in place lines.

I.5 Rewind Mode

D type flip-flop 15-1 is the rewind flip-flop. It is held preset as long as the rewind button is held in. It is cleared by clear leader detection, cassette not in place, power on preset, stop command, or on interrupt from the I/O card. The rewind flip-flop is also cleared through its clock input, whenever a new command is issued. A simultaneous preset and clear results in the Q output of the flip-flop being true. When the transport is stopped (flip-flop 15-2 cleared) and the rewind flip-flop is set the output of gate 16-3 will be true, which will force the NOR gates 17-1, 17-2, and 17-3 to 0 outputs. These outputs will cause the tape to be rewound in high speed reverse to clear reader, unless the rewind flip-flop is cleared as described above.

I.6 Transport Status

Input status bits; YIS3 (pin F), YIS2 (pin 6), YIS1 (pin E), and YIS0 (pin 5), reflect the status of the transport as follows:

YIS3 — Negative true, cassette in place

YIS2 — Positive true, clear leader detected

YIS1 — Negative true, writing on cassette permitted

YIS0 — Positive true, control mode

I.7 Internal Clock

The internal clock used for writing data is generated by the two one-shorts IC6 and IC13. The clock is not symmetrical, but IC6 is true for 133 μsec and IC13 is true for 220 μsec. Padding resistor R10 is then used to adjust the total time of 333 μsec for a 3KC clock rate. The internal clock is enabled only when the cassette command is write as detected at pin 5 of IC13.

I.8 Nine Bit Shift Register

A nine bit shift register is made from IC3, IC4, and flip-flop 5-2. In write operations this register is loaded parallel by a pulse from gate 16-1, and then shifts the data serially to IC3 pin 10 for writing on the tape. In read mode the data is clocked from the tape, serially, to IC5 pin 12 where it is serially loaded into the register. From the shift register it is read as parallel data, at the flag, by the calculator.

I.9 Data, Clock Mark Sequence

During write operation a write clock, a write data, and a write mark signal are sent from the logic card. During read operations a read clock, a read data, and a read mark signal are received by the logic card. The data lines are NRZ; clocked by the appropriate clock. When clock pulses and marker pulses are properly sequenced they constitute a character. The sequence is 9 data bits per character, separated by marks.

Mark - 9 data bits - mark - 9 data bits - mark.

BIT-MARK-SEQUENCE CODE

| Three types of information | Track |
|---|---|
| "1" | A |
| | B |
| "0" | A |
| | B |
| Mark | A |
| | B |

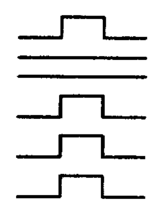

10 bit character $M \quad D_7 \quad D_6 \quad D_5 \quad D_4 \quad C \quad D_3 \quad D_2 \quad D_1 \quad D_0 M$ 8 data bits 1 marker 1 control bit I.10 Divide by 10 Counter During Write The divide by 10 counter (IC14) is used to sequence the clock and mark pulses during write (See section 6.9 for a sequence description). When the counter is at counts 0 through 8 the internal clock pulses generated by IC6 and IC13 are gated through gate 18-4 from where it goes off the card as the write clock, and through gate 18-2 to shift the shift register. When the divide by 10 counter is at count 9, the internal clock pulse is inhibited at gate 18-4, but is enabled at gate 10-2 from where it passes off the board as a write mark pulse. Since the counter wraps around from count 9 to count 0, we get the repeating sequence, marker - 9 bits - marker.

Each time the counter goes to 9, a character is completed and the write mark pulse, in addition to going off the board, is gated through gate 12-3 to make up a flag, telling the calculator that the character has been written. The calculator will then send another parallel character to the shift register and the sequence will be repeated.

Special conditions prevail for the writing of the first of a string of characters. When the transport goes from read to write mode, flip-flops 8-1 and 8-2 are set in their edge sensitive clock inputs. Flip-flop 8-2 presets the counter to count 9, making sure the sequence begins with a mark pulse. The same flip-flop 8-2 is cleared by this first mark pulse, after which the counter continues its wrap-around sequence. Flip-flop 8-2 being set, inhibits this first leading write mark pulse from passing through gate 12-3 and becoming a flag. Flip-flop 8-2 is cleared by the first write pulse, after which the write sequence continues as normal.

I.11 Divide by 10 Counter During Read

Only a sequence of 9 data bits followed by a mark is to be recognized as a character during read. The divide by 10 counter is used to detect this sequence.

Whenever the transport is stopped, flip-flop 5-1 is held preset. The output of flip-flop 5-1, presets the counter to a count of 0. Flip-flop 5-1 is cleared with the leading edge of the read data clock and the counter counts on the trailing edge. The read data pulses are counted by the counter and also pass through gate 18-2 to shift the shift register. When the counter has counted 9 read pulses, its count of 9 puts a true signal on pin 13 gate 19-1. If a read mark pulse comes next, pin 1 of gate 19-1 if true for the width of the read mark pulse. These two signals make up part of the flag signal which tells the calculator a valid character is in the shift register. The trailing edge of the read marker pulse, sets flip-flop 5-1, which presets the counter to 0 and the sequence is ready to be repeated.

If a marker is read when the counter is at a count other than 9; no flag is given, flip-flop 5-1 is set, and the counter is preset to 0. If 10 read pulses come in a row, the counter wraps around to 0 and no flag is given. Thus nothing but 9 read clock pulses, followed by a read mark pulse, generates a flag and is recognized as a character.

I.12 Control Mode and Flags

Each character contains 8 data bits. The middle bit of the 9 bit character is a control bit. If the center bit is a 1, the character is a control character. If the center bit is a 0, the character is a data character. If the transport is in control mode during write, the center bit is loaded as a 1 at IC4 pin 5, and the character is written as a control character. In data mode the center bit of each character written is 0.

If the transport is reading in control mode, flags are sent to the calculator only when a control character is in the shift register. If the transport is in control mode, and a data character is in the shift register, the read flag is inhibited at IC9-1 pin 2. This IC9-1 pin 2 is always true, except when the cassette is in control mode and the center bit of the shift register is 0. In data mode, flags are sent to the calculator for both data and control characters.

The flag circuitry on the interface card is trailing edge sensitive, making sure the character is completely written or completely read before the calculator is flagged.

Figure 68:
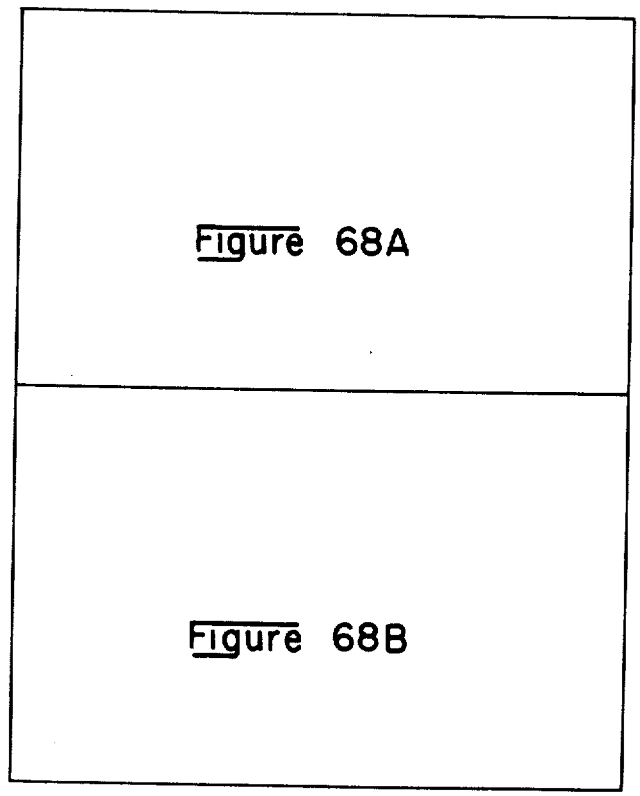
FIG. 68' is a diagram showing the arrangement of FIGS. 68A–B.
Figure 68A:
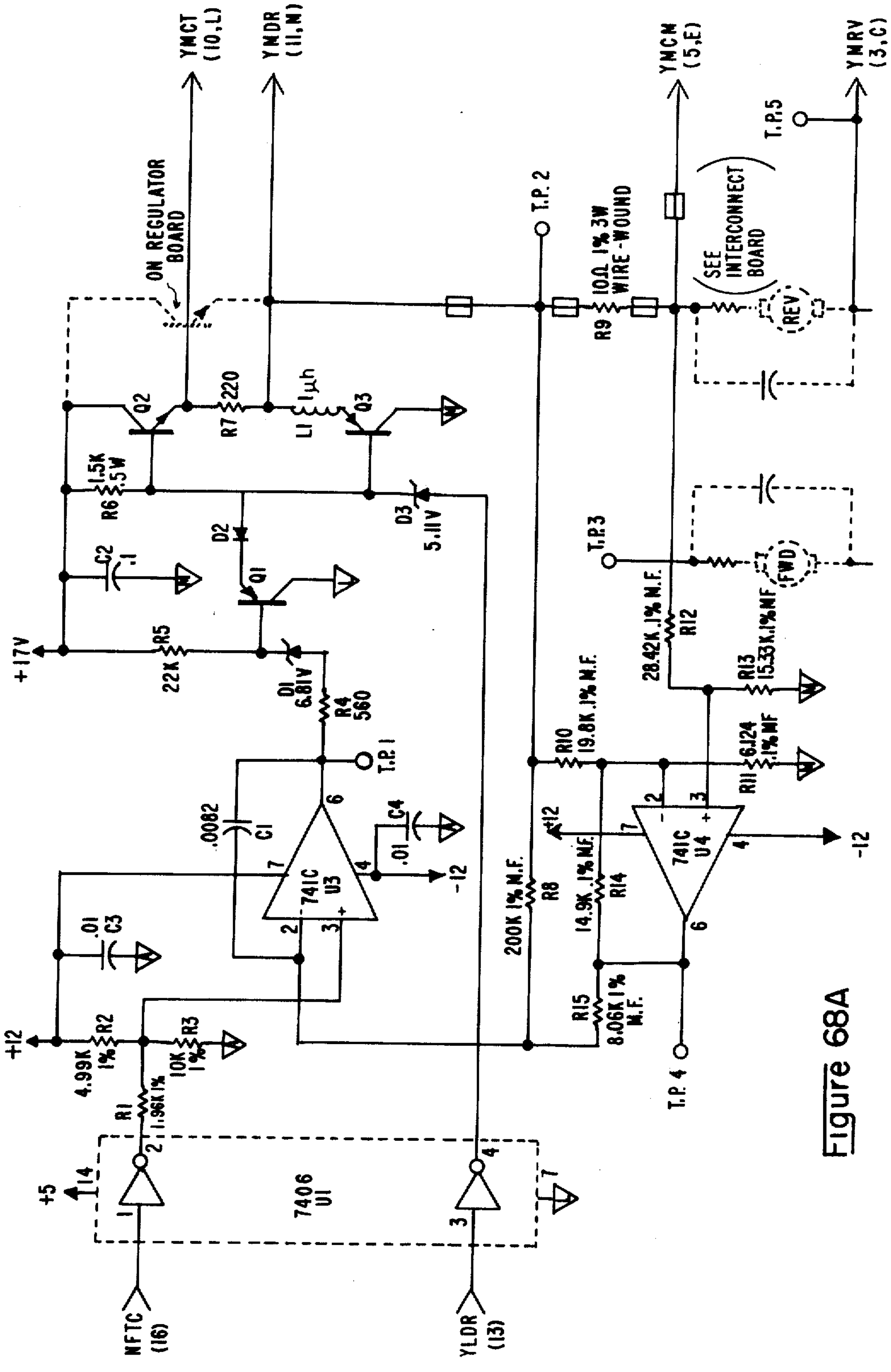
FIGS. 68A–B are a detailed schematic diagram of the motor control block of FIG. 64.
Figure 68B:
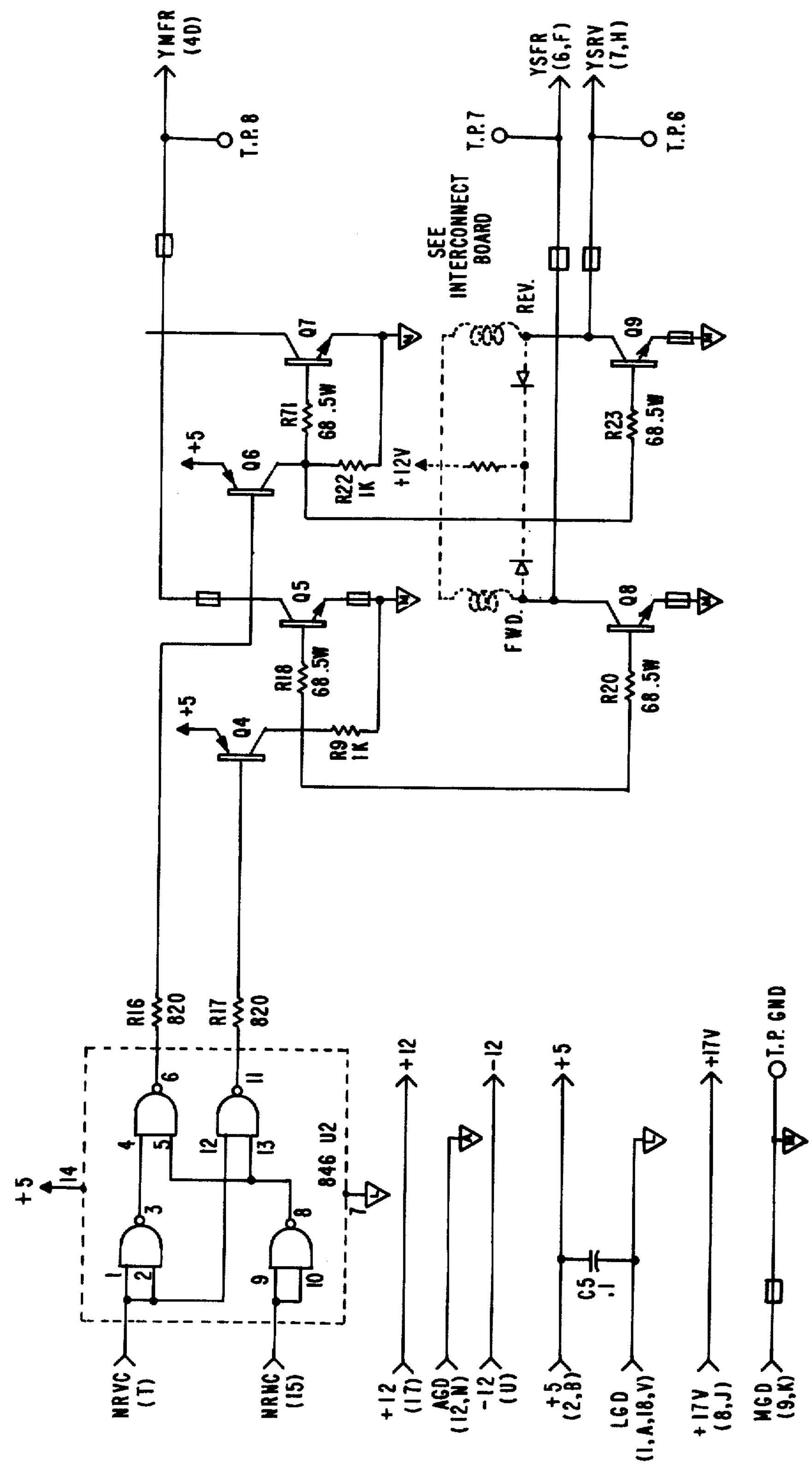

Referring now to FIGS. 64 and 68A–B, the operation of the read/write portion of the magnetic tape cassette reading and recording unit will be described.

I. General Description

The read/write board has two main functions. In the WRITE mode it encodes bit serial data into two-channel Bit-Mark-Sequence (BMS) data to be fed to the head driver and written on tape.

In the READ mode it decodes the two-channel analog BMS data from the head preamplifier into clock, mark, and bit-serial data pulses from the tape signals.

II. WRITE Mode

When Write Permit is true (YWPT = 1) and Write Command is true (YWTC = 1) then Write Enable is true (YWEN = 1; Q7 on) and writing on the tape is allowed. The 3-input NAND gates of IC2 are used to encode the bit-serial data (YWDT) into BMS. Logic 1's (YWDT = 1) are written on Channel A. Logic 0's (YWDT = 0) are written on Channel B. A mark is written when Write Mark is true (YWMK = 1). The data and marks are clocked in my means of the Write Clock (YWCL).

III. READ Mode

The two amplifiers of IC6 and their associated circuitry comprise two threshold detectors that convert the analog signals from the head (ARA, ARB) to digital signals. The amplifiers switch between their positive and negative saturated states. The thresholds are adjusted so that the amplifiers switch states when the analog signal is approximately 30% of its peak value measured near BOT, moving forward.

The head signal amplitude is proportional to tape speed. Therefore, the thresholds are adjusted high for fast tape motion and low for slow tape motion by switching Q1 and Q2 with the $\overline{\text{Fast Command}}$ (NFTC) line. The positive and negative references for the thresholds are derived from the 12 volt power supplies.

The two channels of digital data are gated to the decode circuitry through IC1. The decoder consists of IC3, IC5, IC8, and IC9.

IC8 is a 0.5 μs one-shot that is fired once for each data bit or mark that is gated in from the threshold detectors. This one-shot pulse comprises a read clock signal that is gated to NRCL by IC5 when the bit associated with the pulse is not a mark.

IC9-1 is a flip-flop that serves three functions. First, it provides a Read Mark pulse (YRMK) whenever a mark is read from the tape. Second, it controls IC5 to allow the one-shot pulse to appear as $\overline{\text{Read Clock}}$ (NRCL). Third, it controls IC3 and IC5 to allow data to be gated through to the data output flip-flop, IC9-2.

Referring now to FIGS. 64 and 68A–B, the operation of the motor control portion of the magnetic tape cassette reading and recording unit will be described.

I'. Speed Reference

Resistors R1, R2, and R3 are used to generate a reference voltage proportional to the desired motor speed. The voltage seen at the positive input of U3 is about 3.0 volts for low speed and 8.0 volts for high speed.

II'. Comparator-Amplifier

Op Amp U3 compares the speed reference with a signal representing the actual motor speed (see Item IV' below). The difference signal is amplified and fed to the driver circuitry which increases or decreases the drive voltage available to the motor.

Resistor R8 and capacitor C1 create negative feed back around U1, resulting in a DC gain of 26 db and a single pole at about 100 Hz. This tailors the servo loop frequency response to provide stable operation with rapid error correction.

III'. Motor Driver

Diode D1 shifts the DC drive level by about 7 volts. Transistors Q1, Q2, and the Motor Pass Transistor (located on the Regulator Board) furnish current gain to drive the motor. Resistor R7 ensures turnoff for the Motor Pass Transistor. Transistor Q3 is used to dynamically brake the motor if its speed is greater than desired.

Diode D3 reduces the maximum voltage at the motor when on clear leader. This voltage limit effectively reduces the motor torque, preventing damage to the motor, friction drive, or tape cassette should the tape be pulled against the hub. Diode D2 prevents damage to Q1 during this reduced torque condition.

IV'. Back-EMF Amplifier

The motor terminal voltage is composed of two parts — the IR voltage drop in the motor armature resistance, and the motor generated voltage, or Back-EMF. Back-EMF is directly proportional to motor speed, and is used as the motor speed feedback signal.

Sense resistor R9 produces a voltage proportional to the motor armature current, and therefore proportional to the IR voltage drop. Op amp U4 and resistors R10 thru R14 subtract the IR voltage drop from the motor terminal voltage, resulting in a voltage proportional to the motor speed. This signal is about 3.0 volts for low speed and 8.0 volts for high speed; it is fed back and compared with the reference voltage, as described in Item II' above.

The process of sensing the IR voltage drop, as described above, is accurate only for a single winding temperature. Because lower armature resistances (caused by lower temperatures) could cause instability in the servo, this perfect-compensation point is placed at the bottom of the operating range — 0° C in this case. Increasing temperature causes reduced load regulation (greater motor current causes reduced speed), but servo operation remains stable.

V'. Motor and Solenoid Selector

The selector circuitry activates the proper motor and solenoid. When in Run Fwd mode, Q4, Q5, and Q8 are saturated on; in Run Rev mode Q6, Q7, and Q9 are saturated. When in Stop mode, all devices are off.

Figure 69:
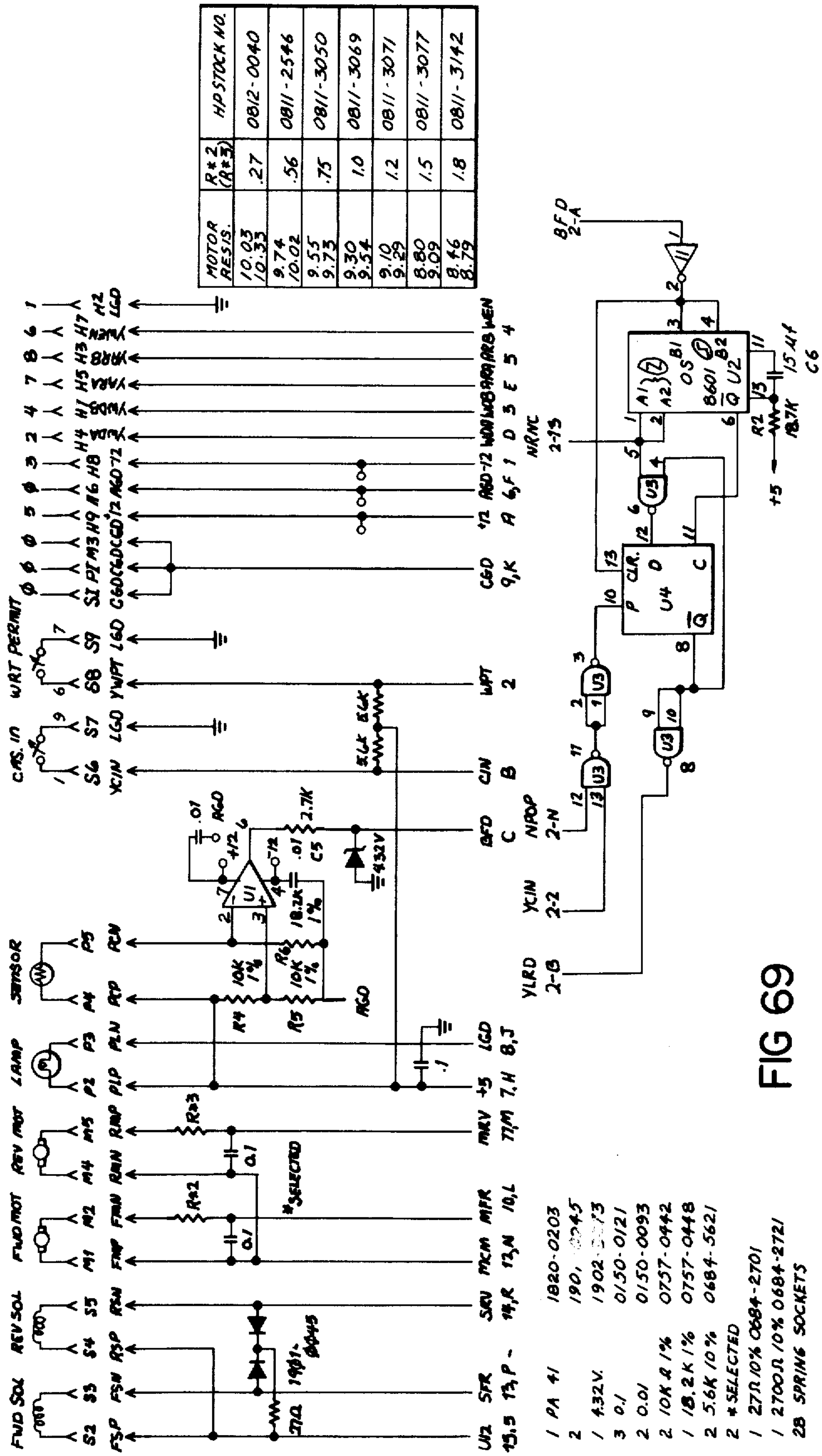
FIG. 69 is a detailed schematic diagram of the interconnect block of FIG. 64.
Figure 70:
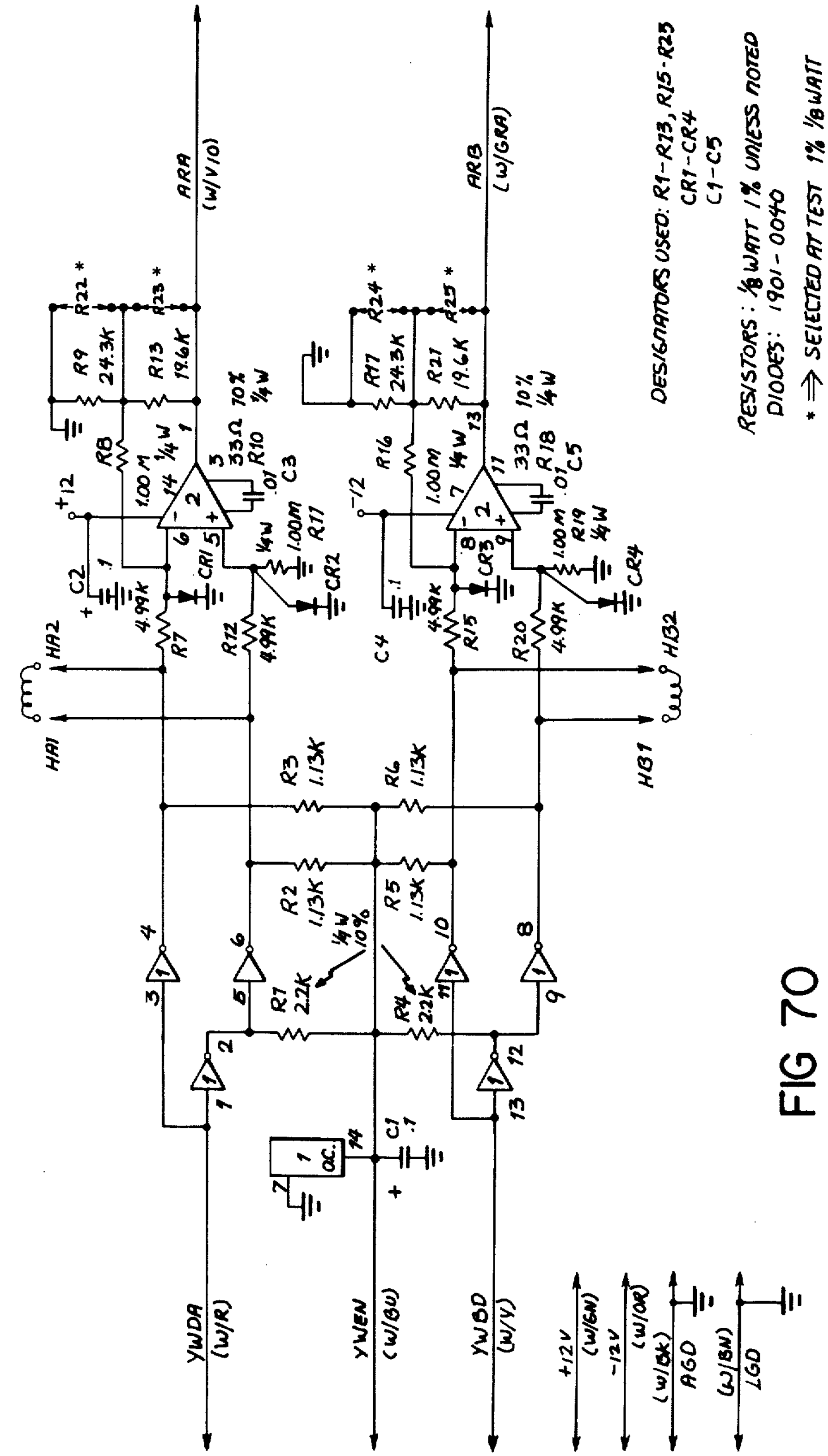
FIG. 70 is a detailed schematic diagram of the head driver and preamp blocks of FIG. 64.
Figure 71:
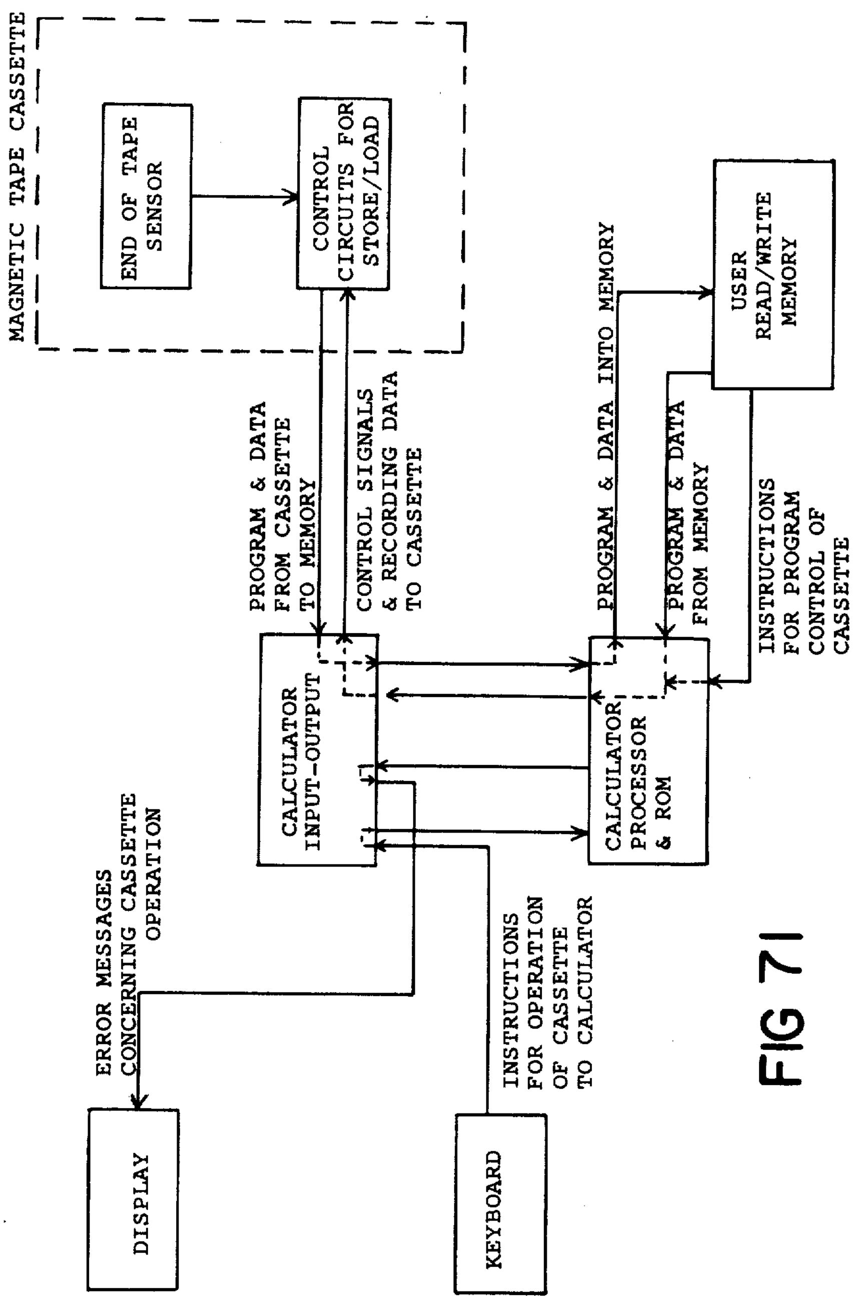
FIG. 71 is a block diagram illustrating how the magnetic tape cassette reading and recording unit of FIGS. 64–70 interacts with the calculator of FIGS. 1–3B.
Figure 72:
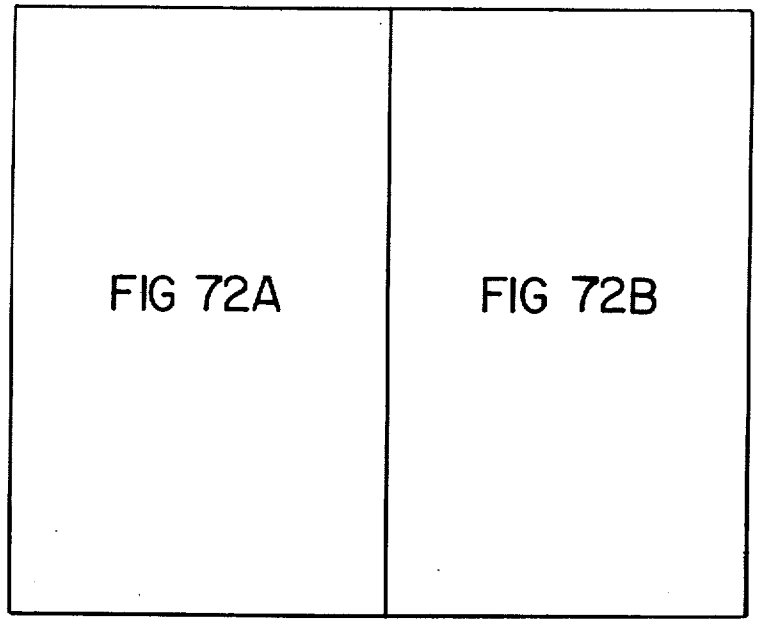
FIG. 72' is a diagram showing the arrangement of FIGS. 72A–B.
Figure 73:
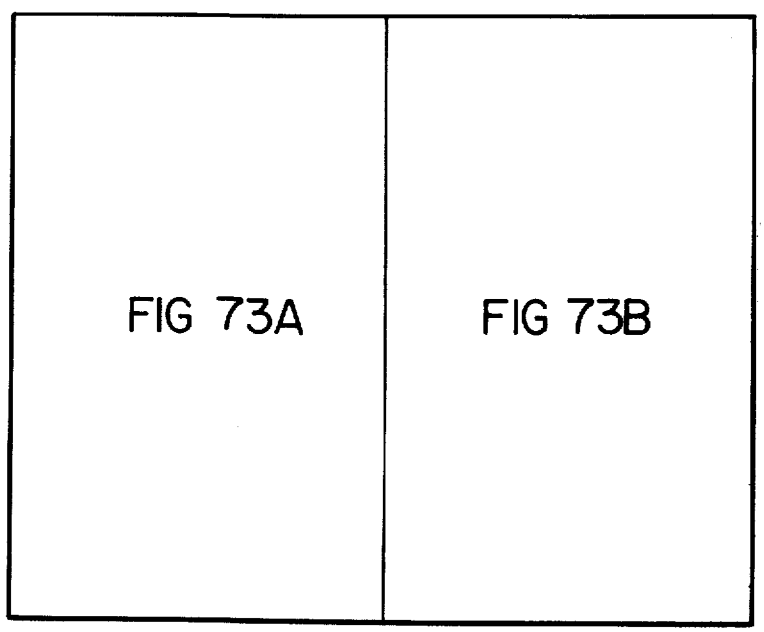
FIG. 73' is a diagram showing the arrangement of FIGS. 73A–B.
Figure 72A:
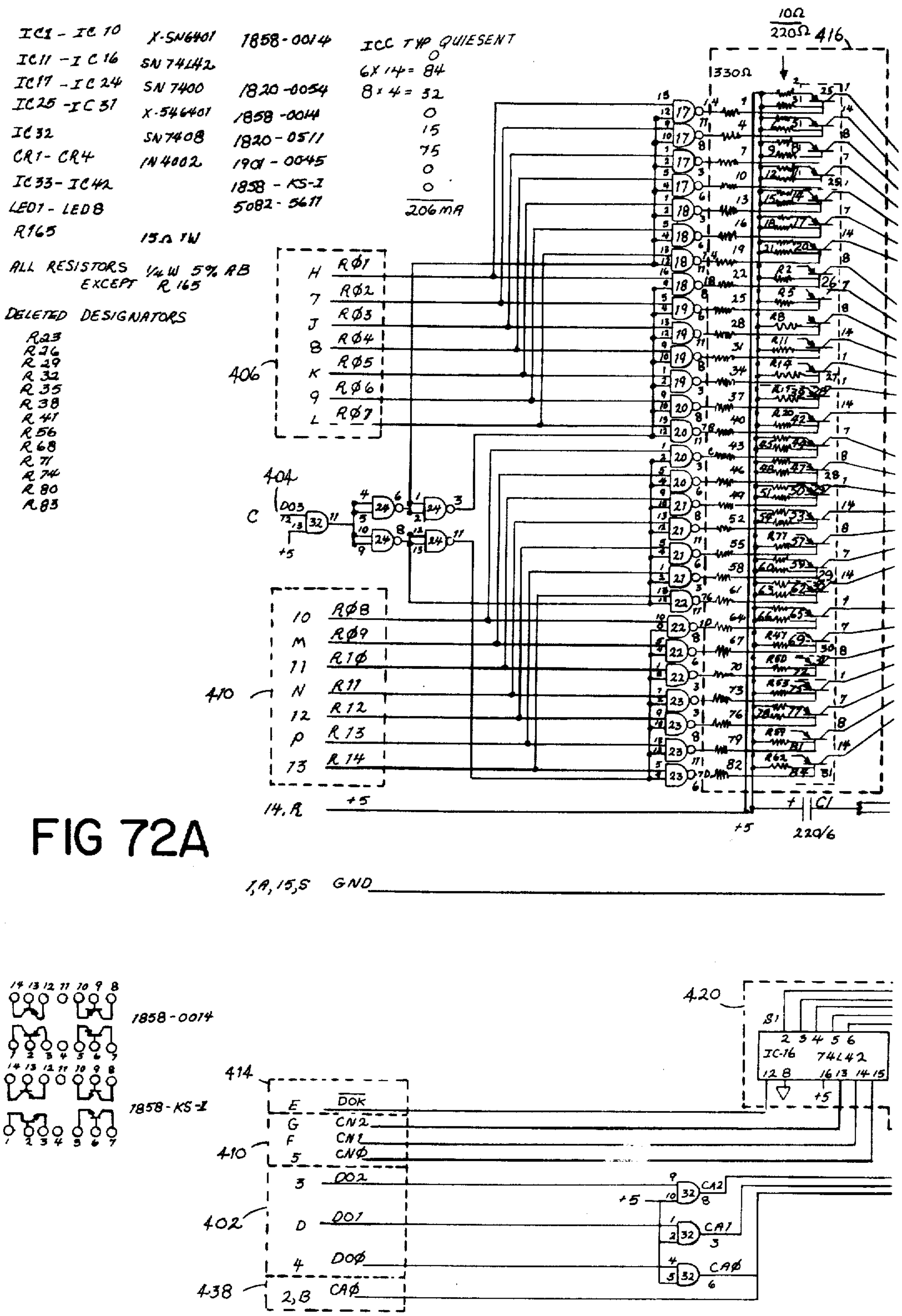
FIGS. 72A–B are a detailed schematic diagram of the output display unit employed in the adaptable programmable calculator of FIGS. 1–3B.
Figure 72B:
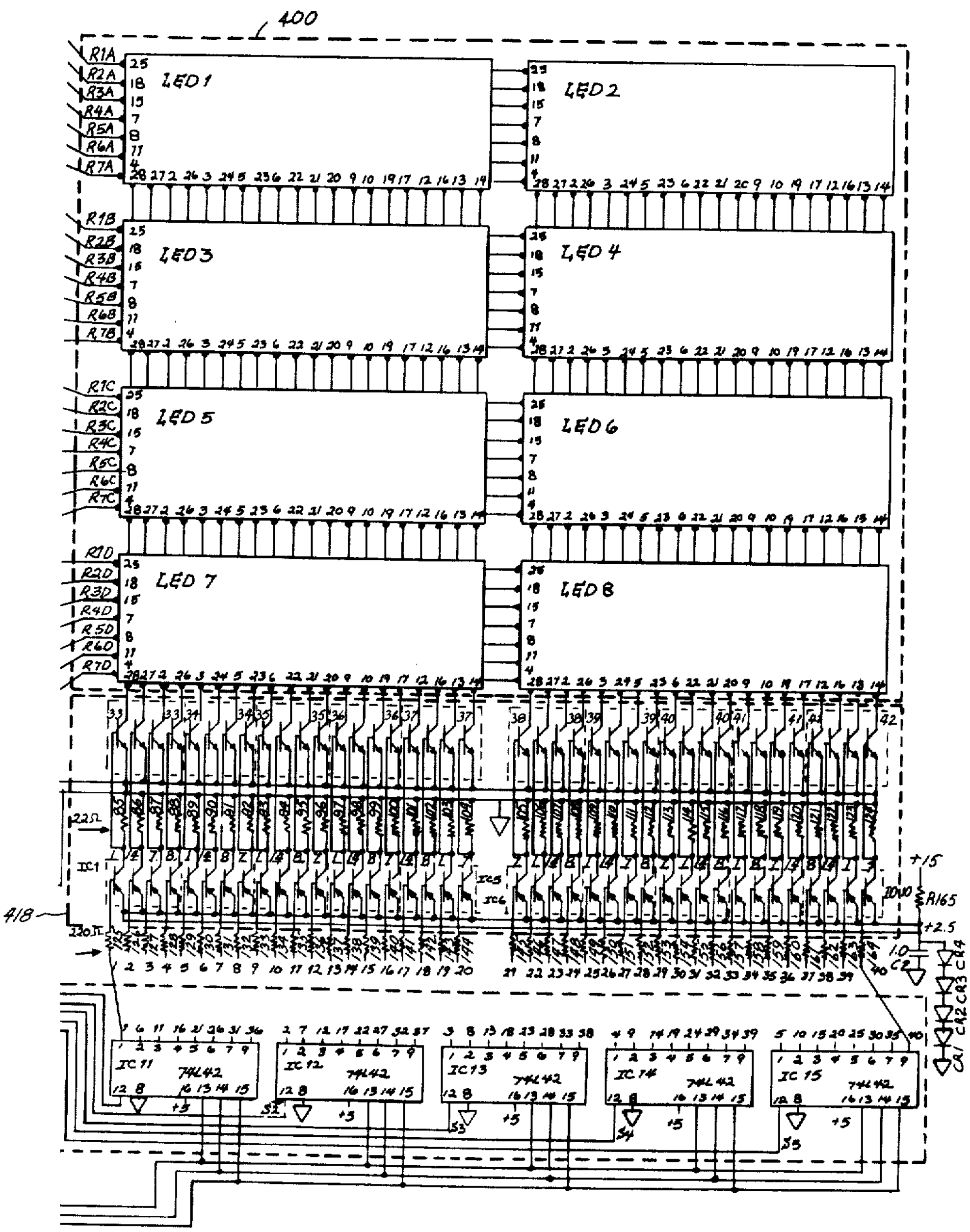
Figure 73A:
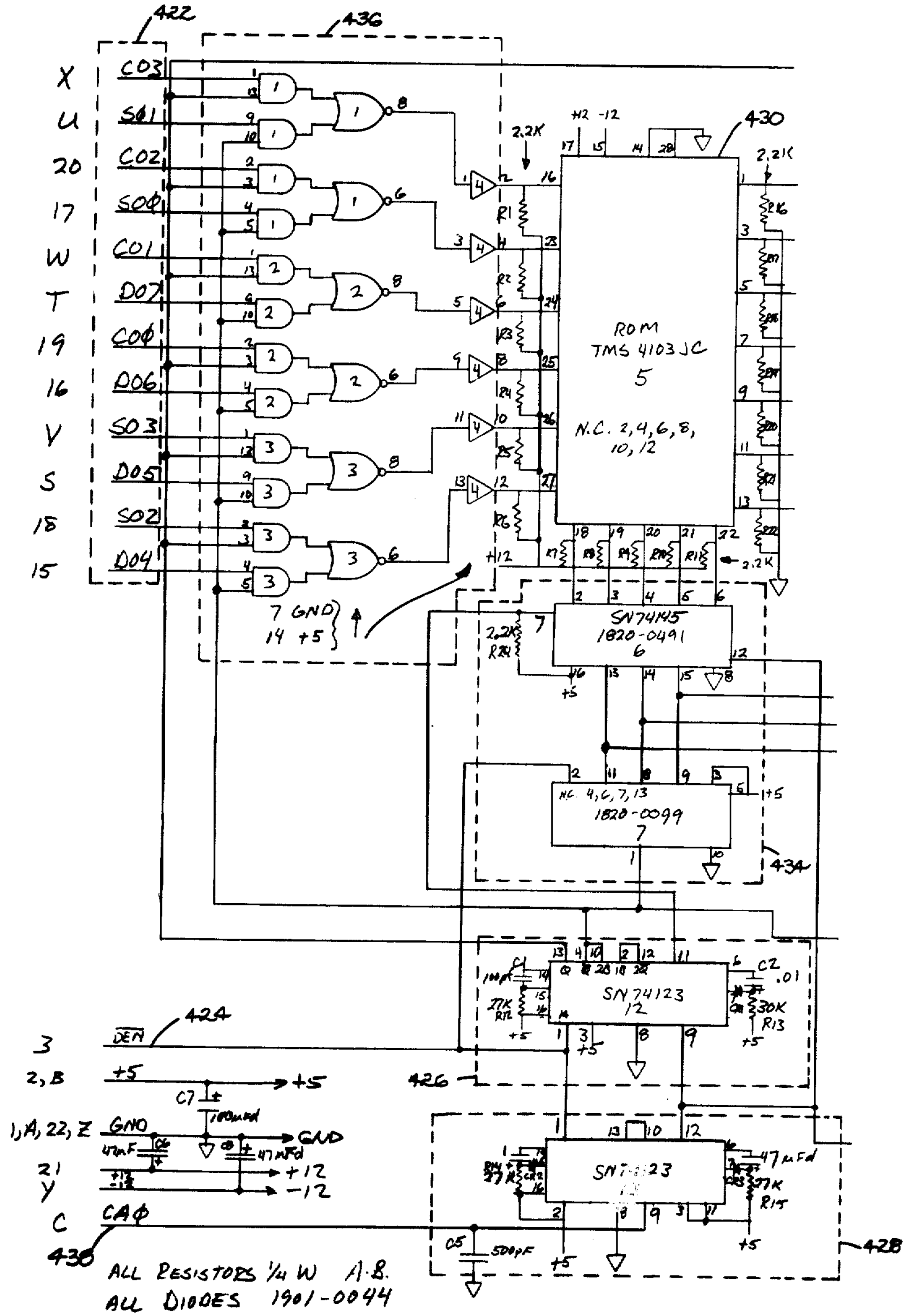
FIGS. 73A–B are a detailed schematic diagram of the control logic circuit associated with the output display unit of FIGS. 72A–B.
Figure 73B:
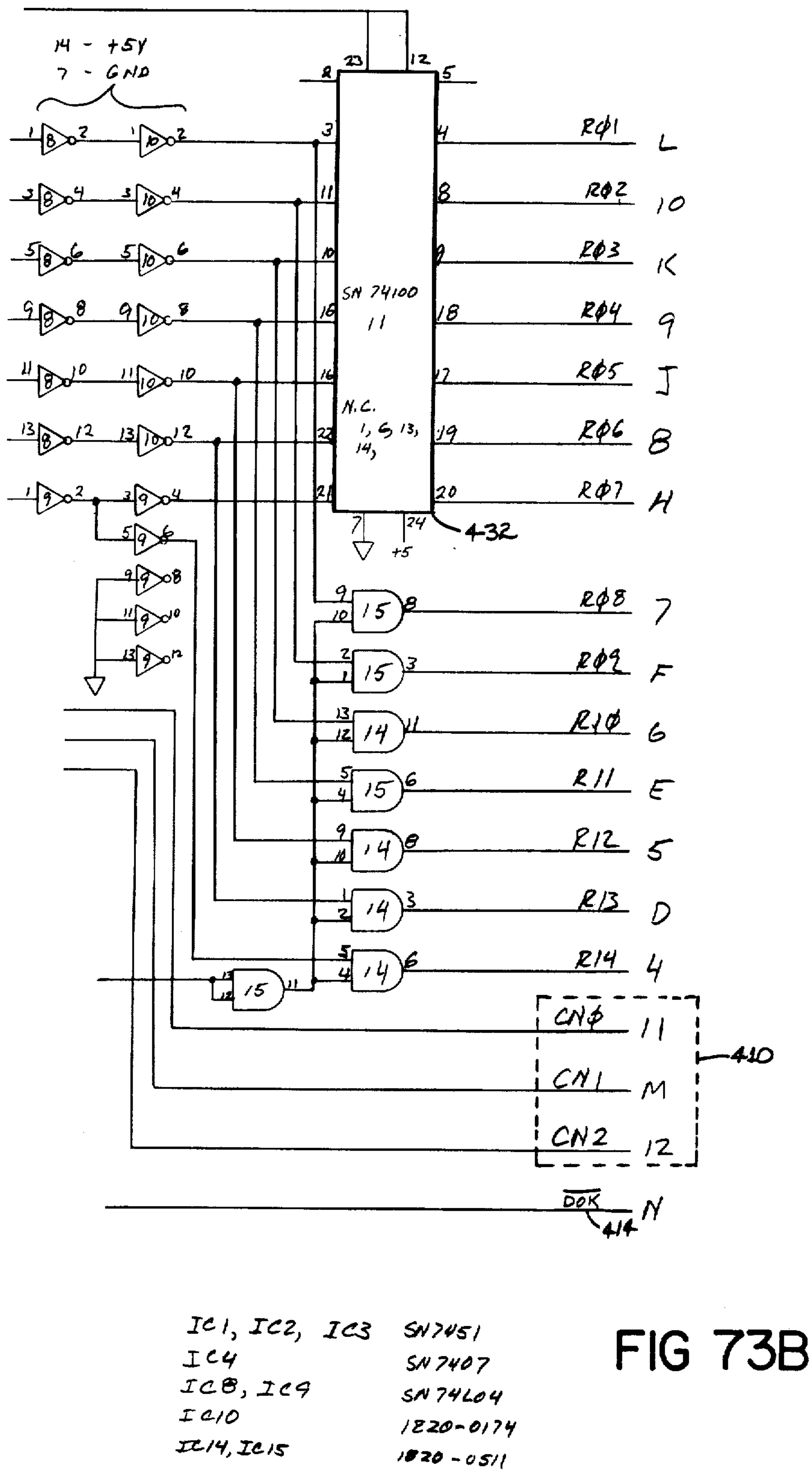

Referring now to FIGS. 64 and 69, the operation of the interconnect portion of the magnetic tape cassette reading and recording unit will be described.

I. Connection From Transport to Mother Board

The main function of the Interconnect Board is to electrically connect the transport mechanism to the Mother Board. There are four groups of wires coming from the transport: the Motor wires, the Solenoid and Switch wires, the Head Board wires, and the Photosensor wires. Each group of wires is terminated on a Pin Board which plugs into the Interconnect Board; this partitioning allows for ease of assembly and service.

II. Clear Leader Signal

Most of the circuitry on the Interconnect Board is used to generate the Clear Leader signal. The photosensor assembly on the transport contains an incandescent lamp and a photoconductive cell. When magnetic tape is over the photosensor, no optical coupling occurs, resulting in a high photoconductor impedance. When clear leader is over the photosensor, light is reflected off the light colored plastic of the cassette and onto the photoconductor, resulting in a low photoconductor impedance.

Integrated circuit U1 and resistors R4, 5, and 6 form a comparitor which switches when the photoconductor impedance is approximately 25kΩ. Capacitor C5 filters the output of U1 to eliminate false signals of less than 5ms. duration; transistor Q1 amplifies this signal.

Under certain conditions when the tape stops or changes direction a tape loop may form over the photosensor; a reflection can result which causes the same photoconductor impedance as a clear leader. IC's U2, 3, and 4 are used to prevent a tape loop from giving a false clear leader indication. Flip-flop U4 stores the clear leader signal; this flip-flop may be turned "on" when the cassette has been running on clear leader for the duration of one-shot U2 (85 ms). This delay period ensures that any loop has been pulled out of the tape, preventing reflection problems.

A mag tape (Clear Leader Not) indication is always accurate; therefore it directly resets flip-flop U4. The gates tied to the preset of U4 force the flip-flop on during power turn on and when the cassette loader is open; if the tape is, in fact, on mag tape, this signal persists after preset is removed and resets U4.

III. Solenoid Turnoff

Diodes D1 and D2 and resistor R1 limit the peak solenoid flyback voltage during turnoff to about 24 volts. This also provides rapid solenoid dropout by applying up to −12 volts across the solenoid during turnoff.

IV. Motor Padding Resistors

Resistors R2 and R3 are selected to trim a given motor to between 10.30 and 10.60 ohms effective armature resistance. Capacitors C1 and C2 are used to suppress motor brush noise.

V. Cassette Sense Switches

Resistors R11 and R12 and pullup resistors for the mechanical cassette sense switches. Cassette In (positive true) and Write Permit (positive true) are the signals generated.

POWER SUPPLY

Figure 74:
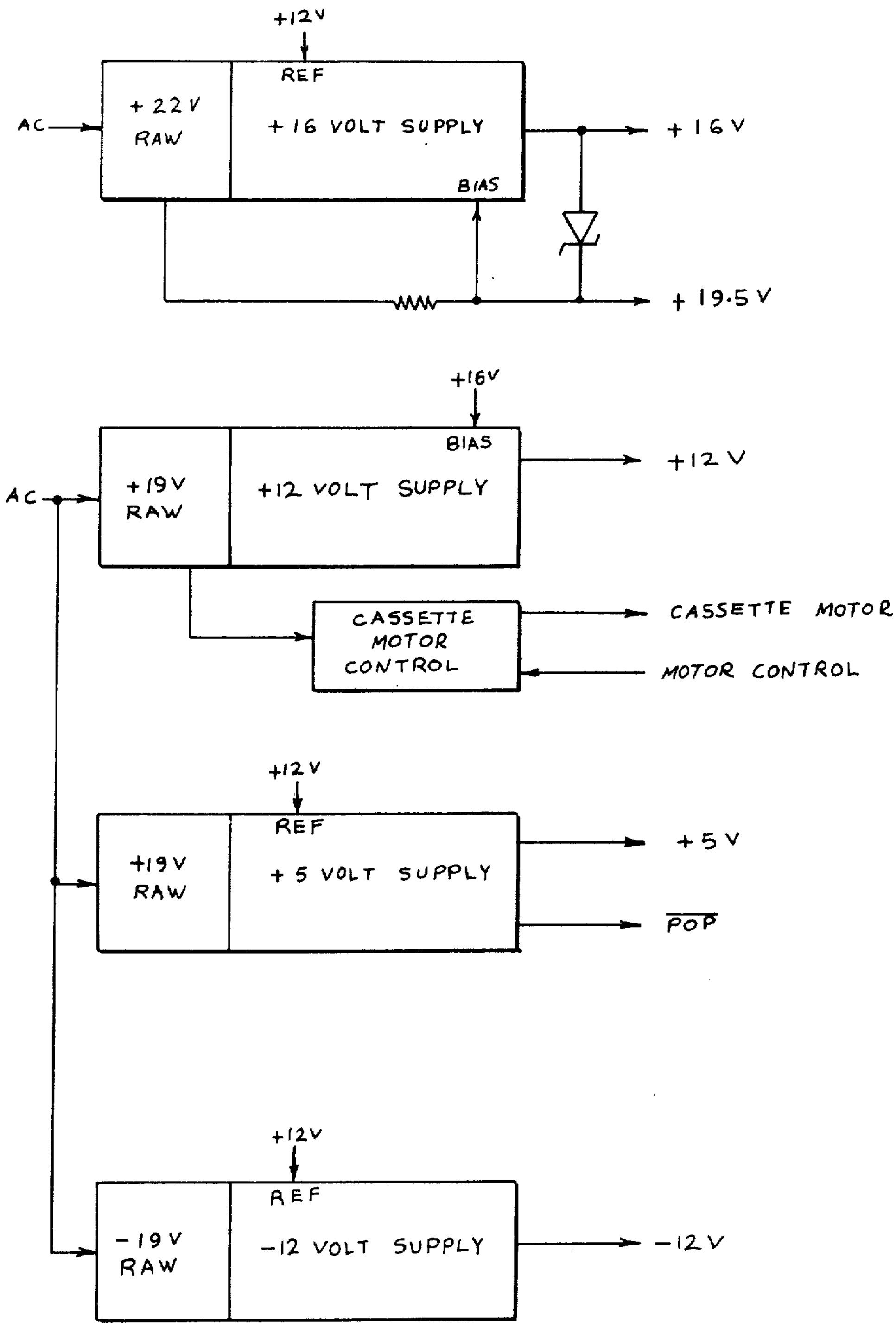
FIG. 74 is a block diagram of the power supply system employed in the adaptable programmable calculator of FIGS. 1–3B.
Figure 75:
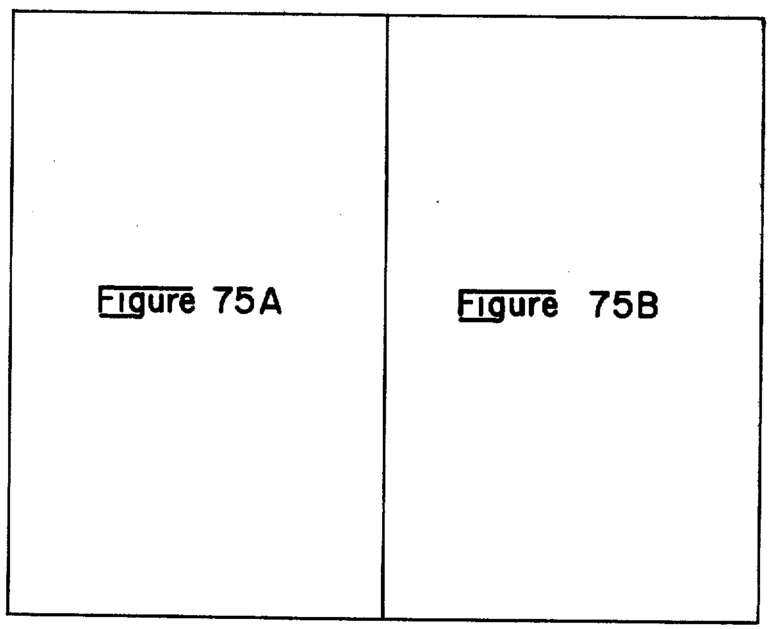
FIG. 75' is a diagram showing the arrangement of FIGS. 75A–B.
Figure 75A:
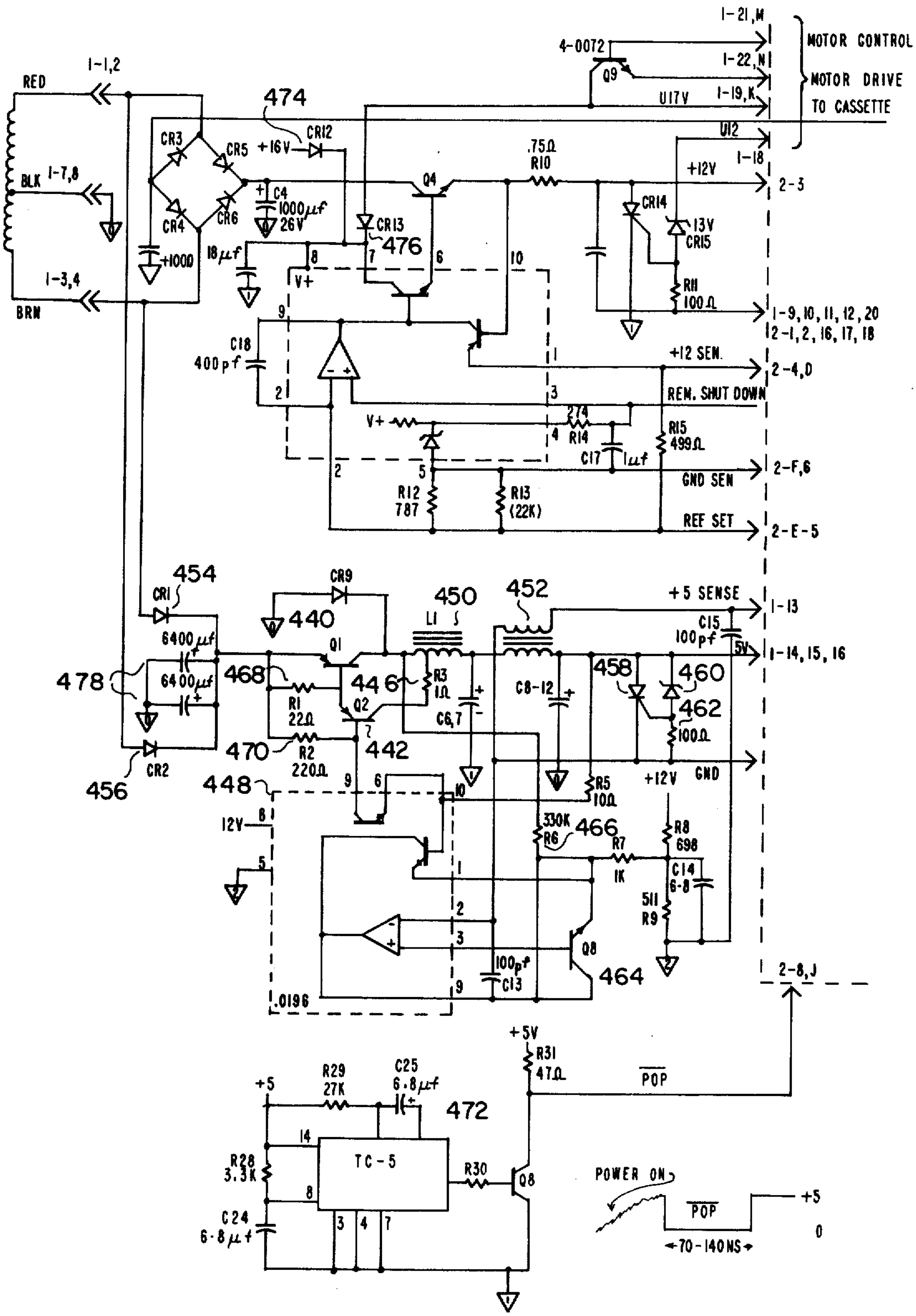
FIGS. 75A–B are a detailed schematic diagram of the power supply system of FIG. 74.
Figure 75B:
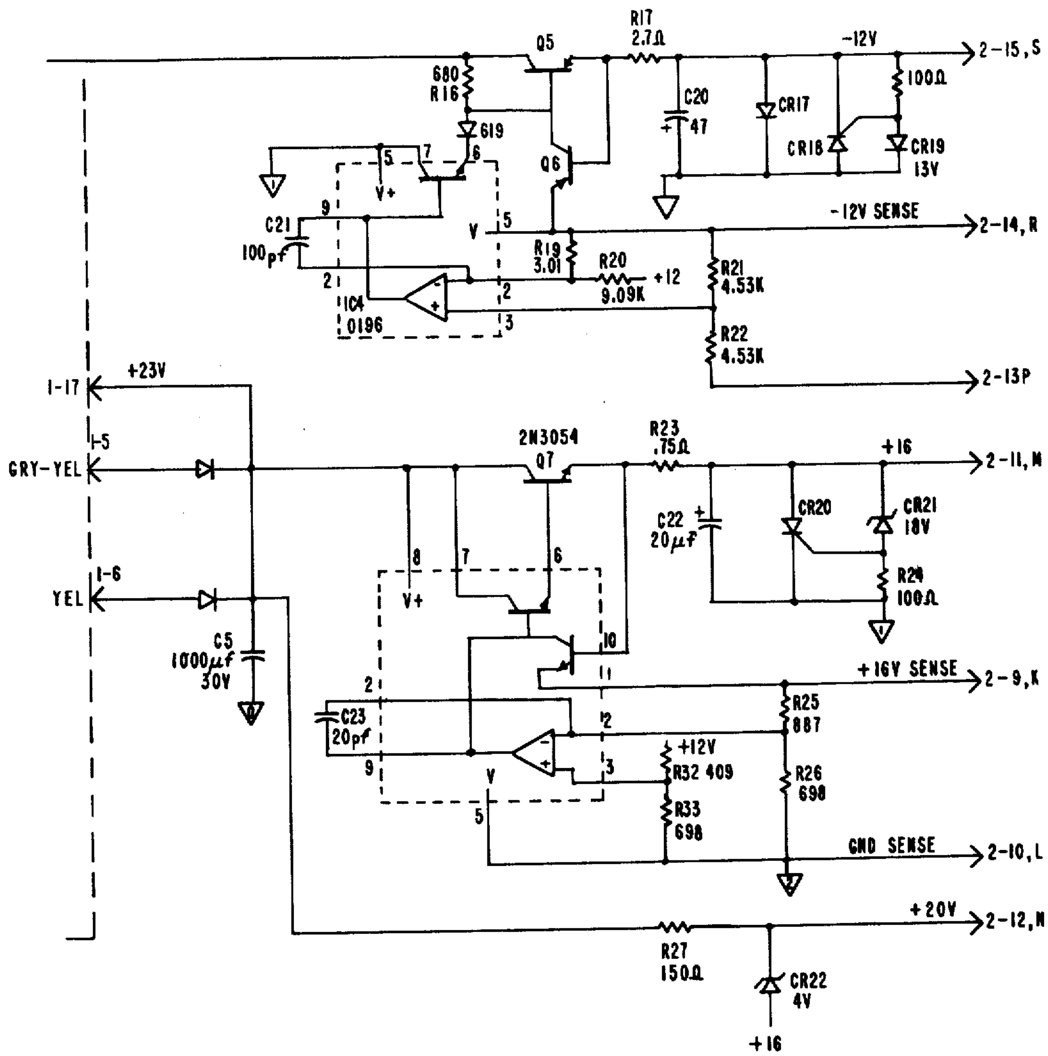
Figure 76:
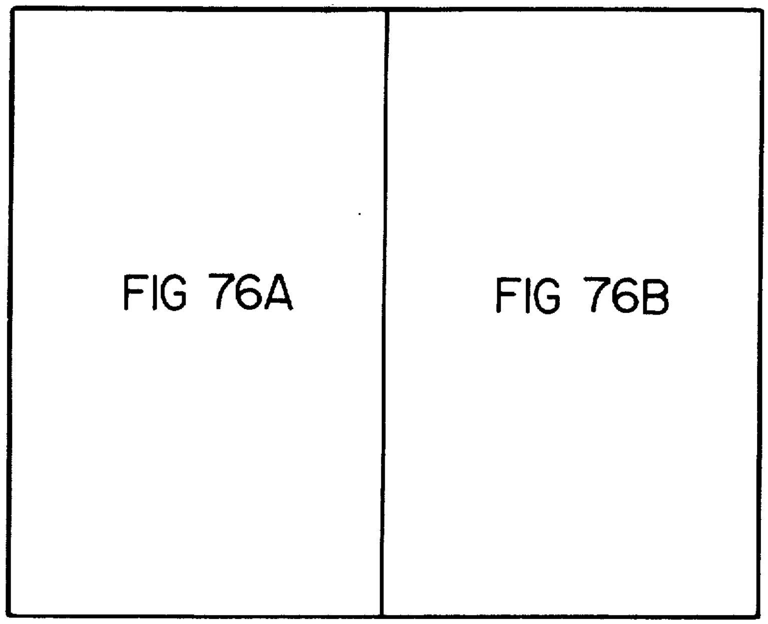
FIG. 76' is a diagram showing the arrangement of FIGS. 76A–B.
Figure 79:
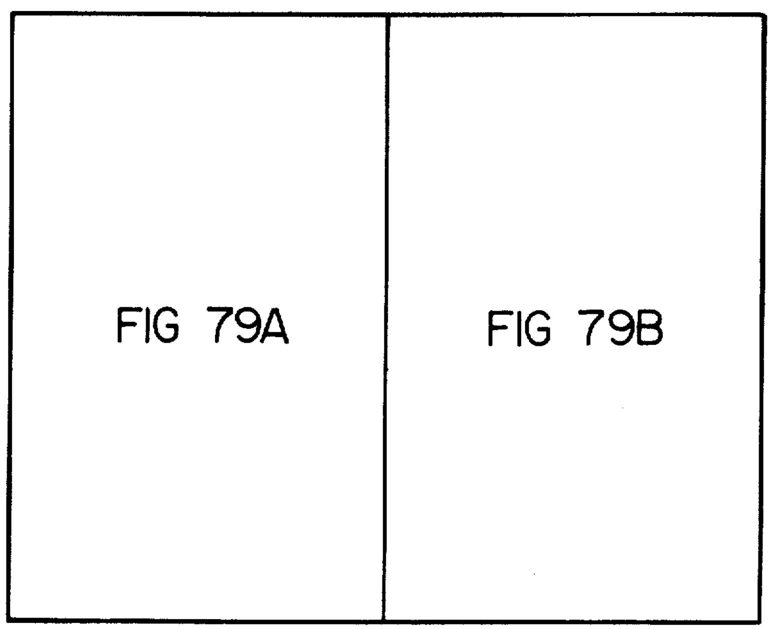
FIG. 79' is a diagram showing the arrangement of FIGS. 79A–B.
Figure 76A:
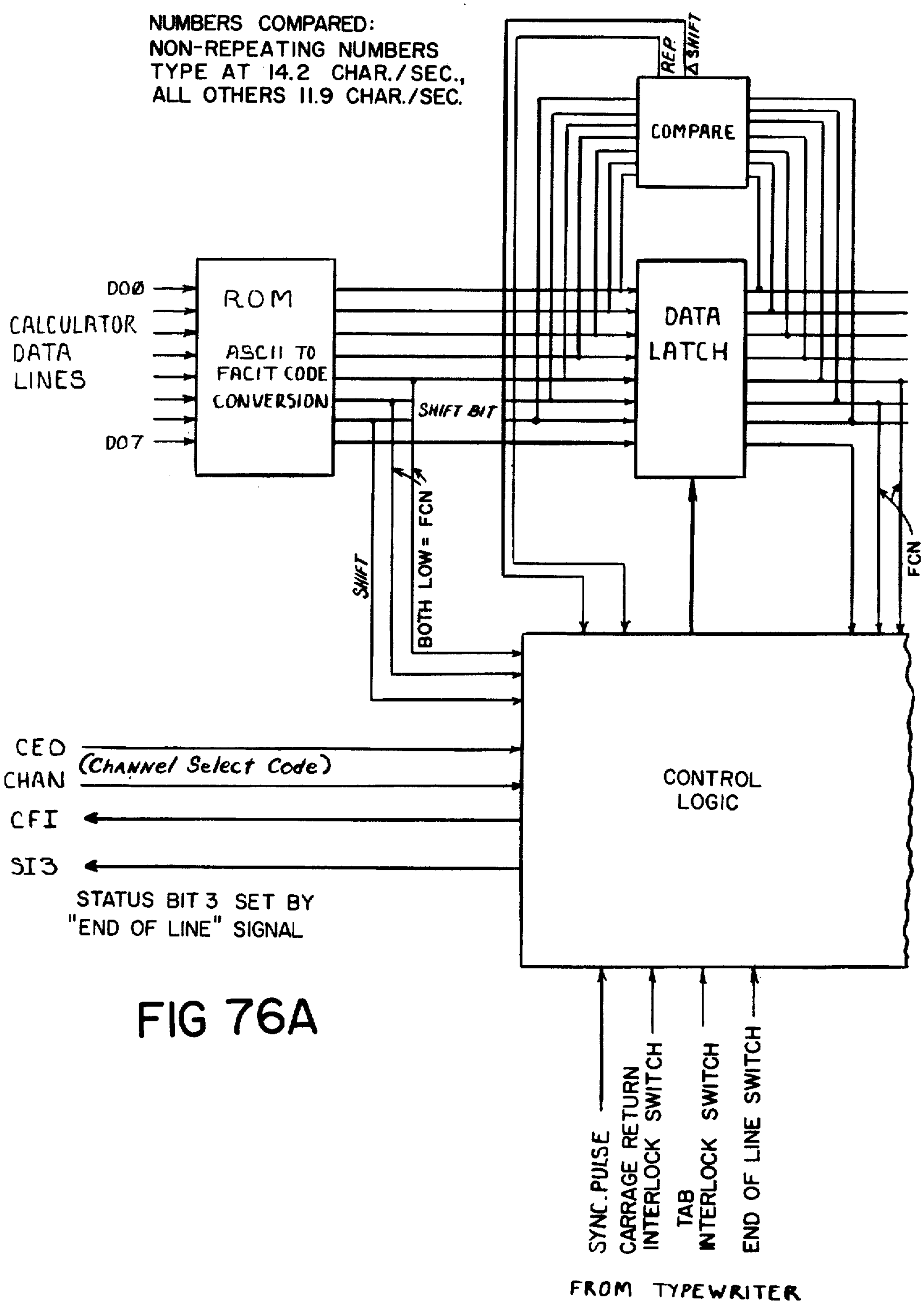
FIGS. 76A–B are a block diagram of an interface module that may be employed to interface a typewriter to the adaptable programmable calculator of FIG. 1–B.
Figure 76B:
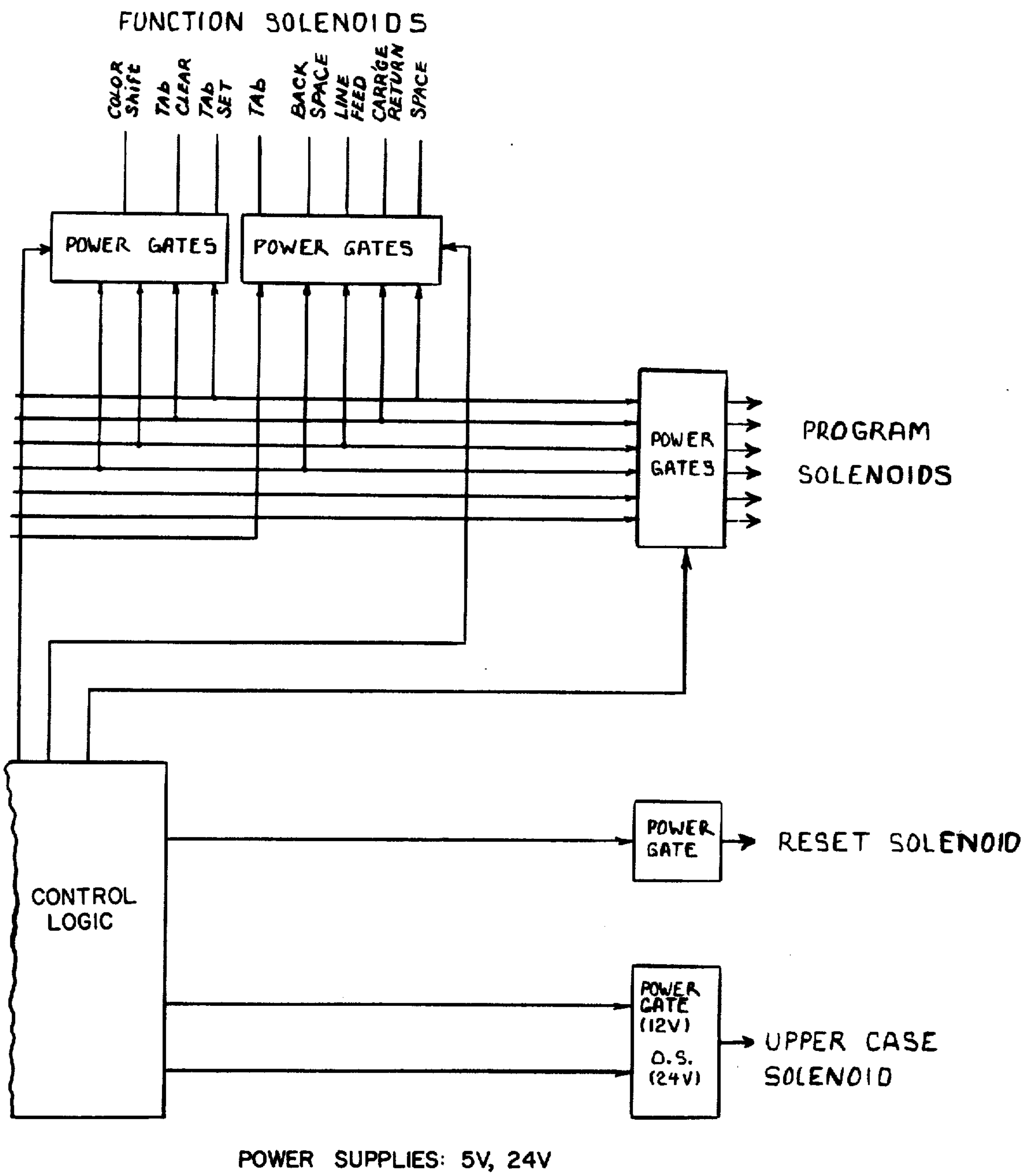
Figure 77:
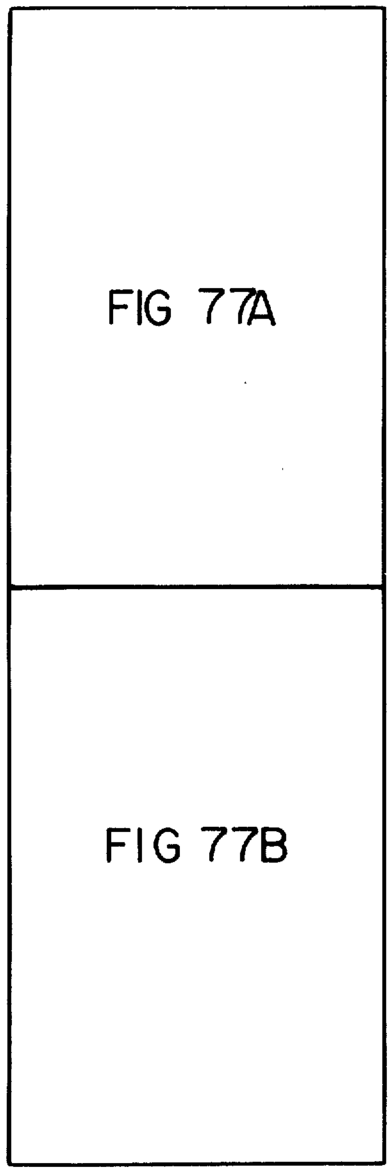
FIG. 77' is a diagram showing the arrangement of FIGS. 77A–B.
Figure 77A:
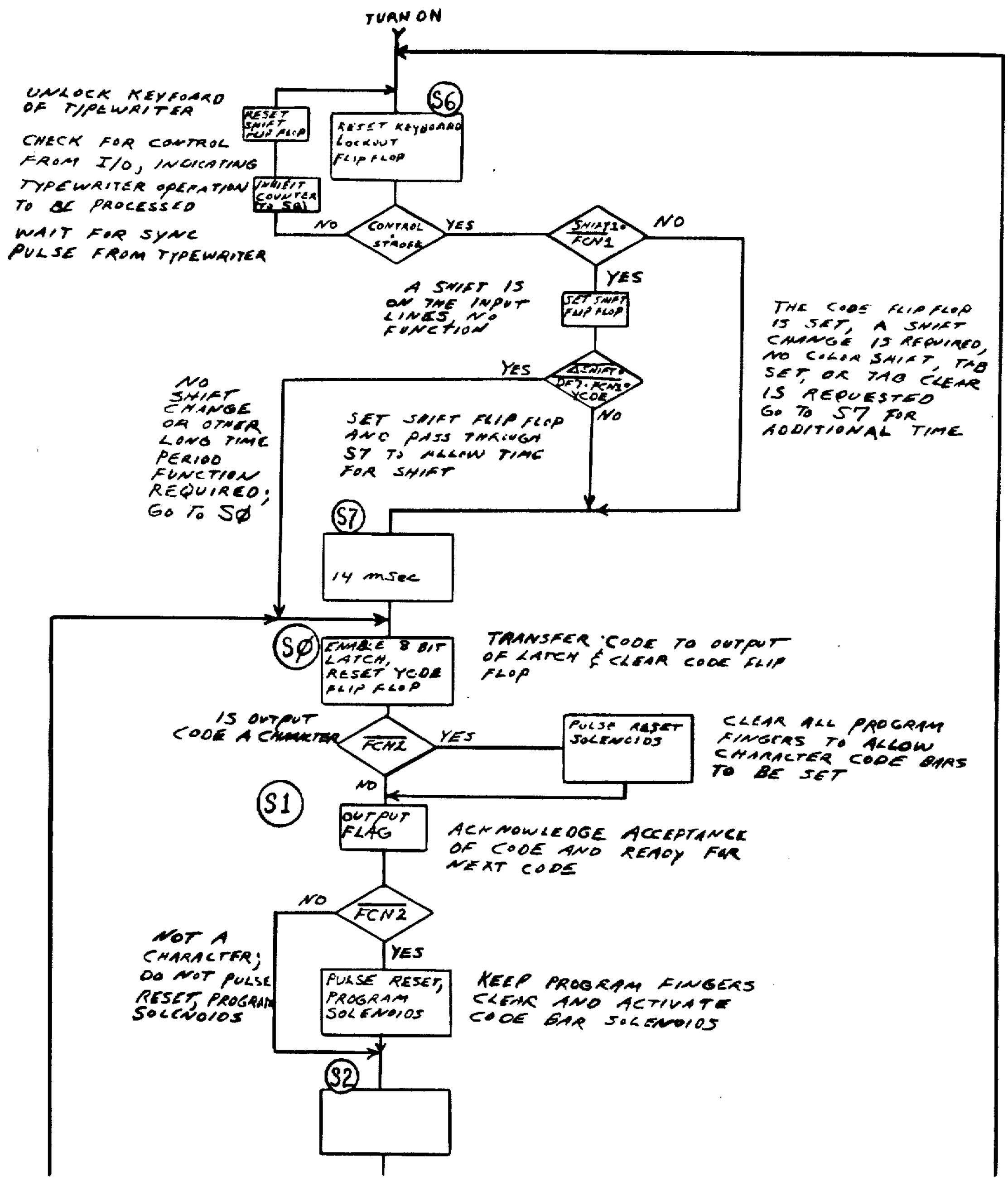
FIG. 77A–B are a flow chart of an input-output routine performed when a typewriter is employed with the programmable calculator of FIGS. 1–3B.
Figure 77B:
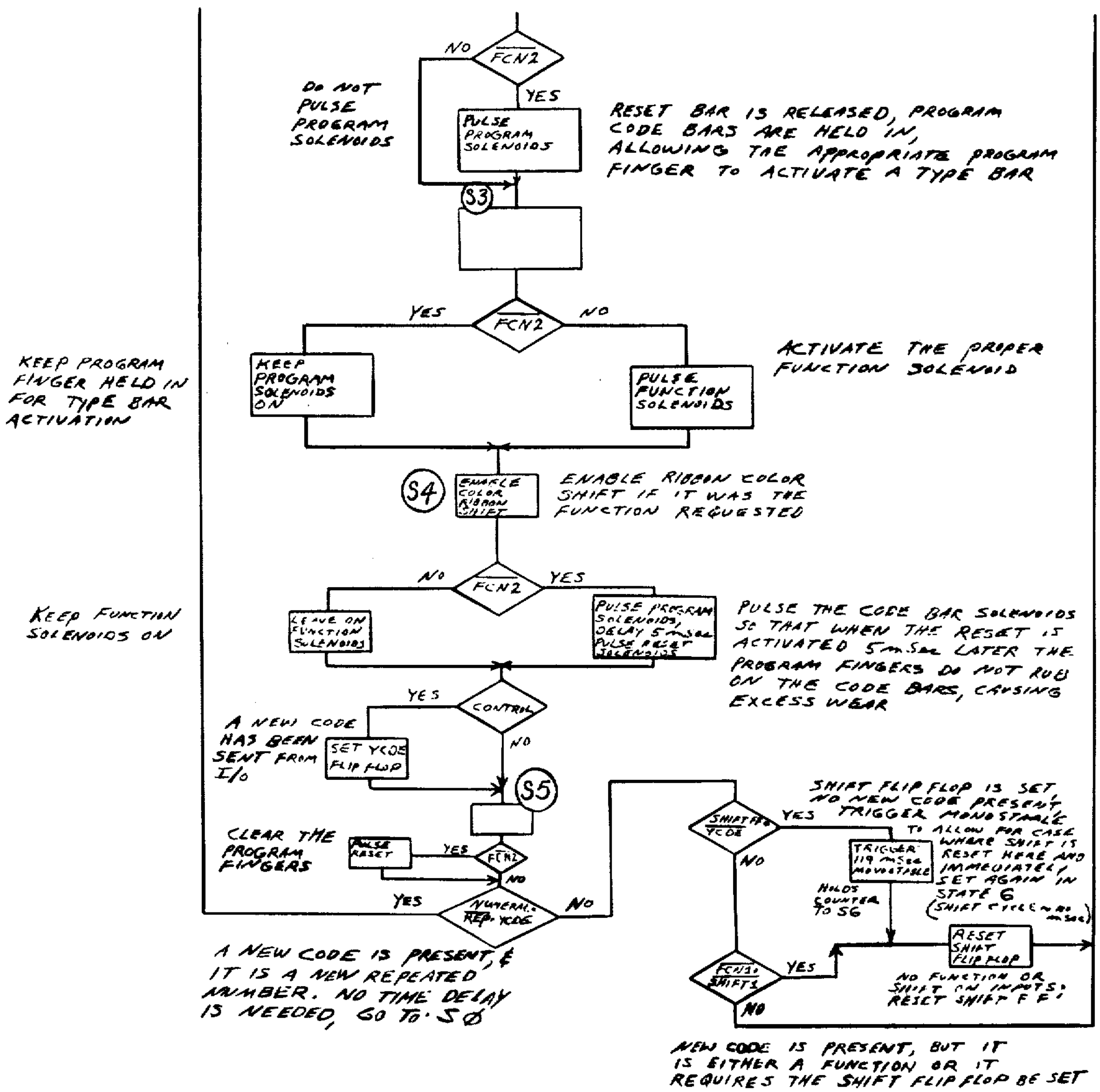
Figure 78:
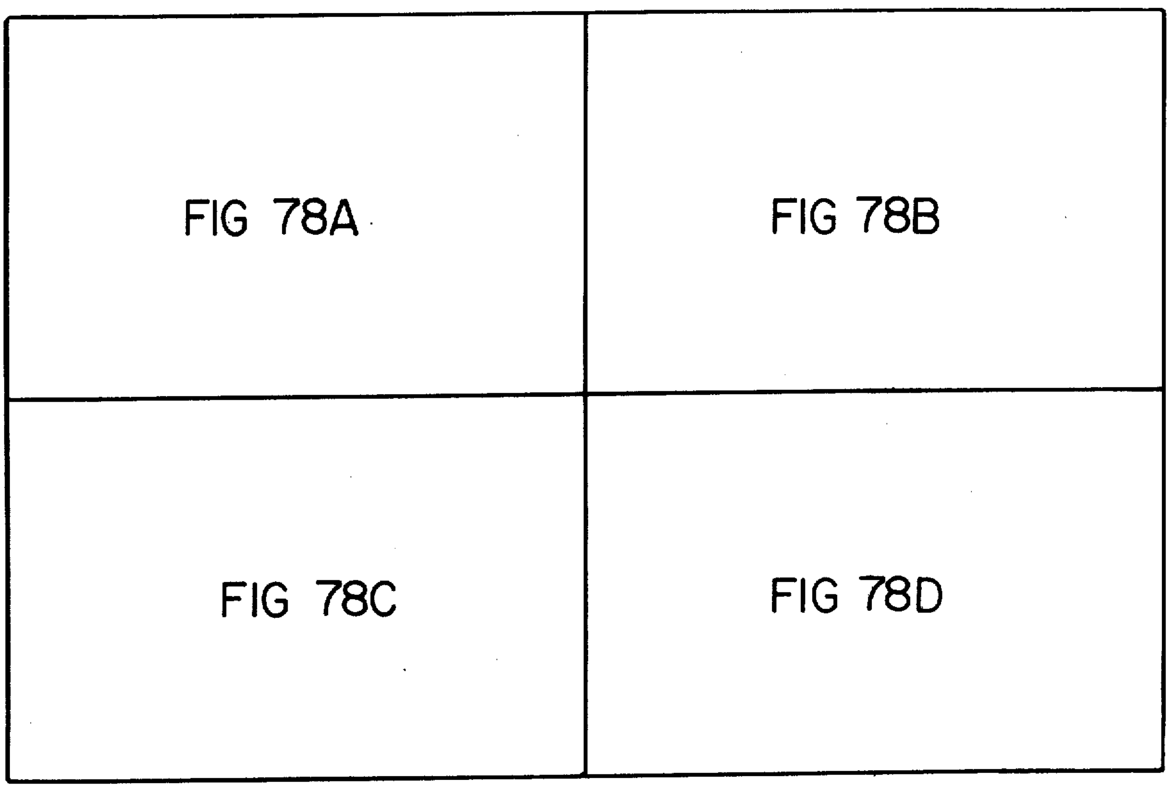
FIG. 78' is a diagram showing the arrangement of FIGS. 78A–D.
Figure 78A:
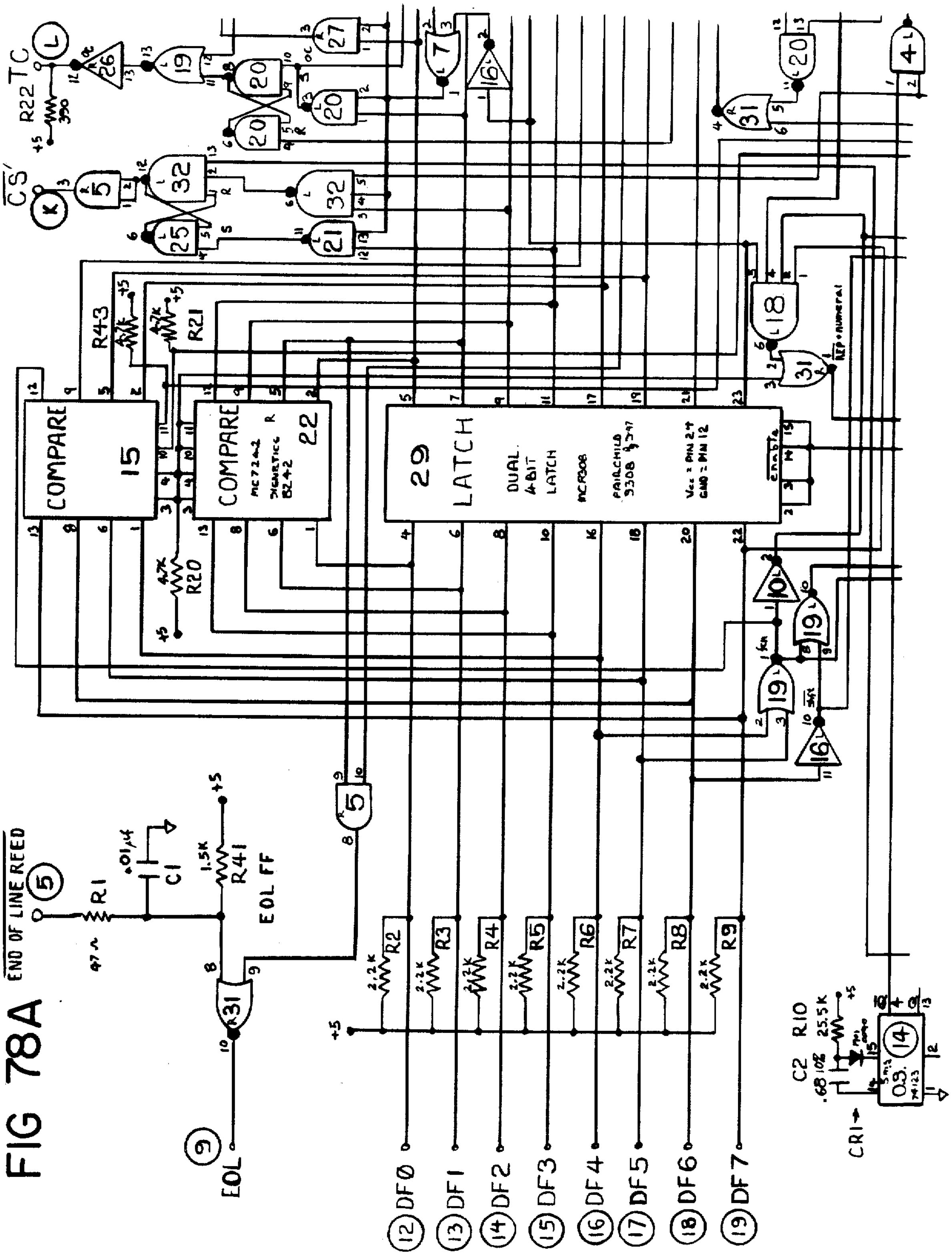
FIGS. 78A–D are a detailed schematic diagram of the control logic block of FIGS. 76A–B.
Figure 78B:
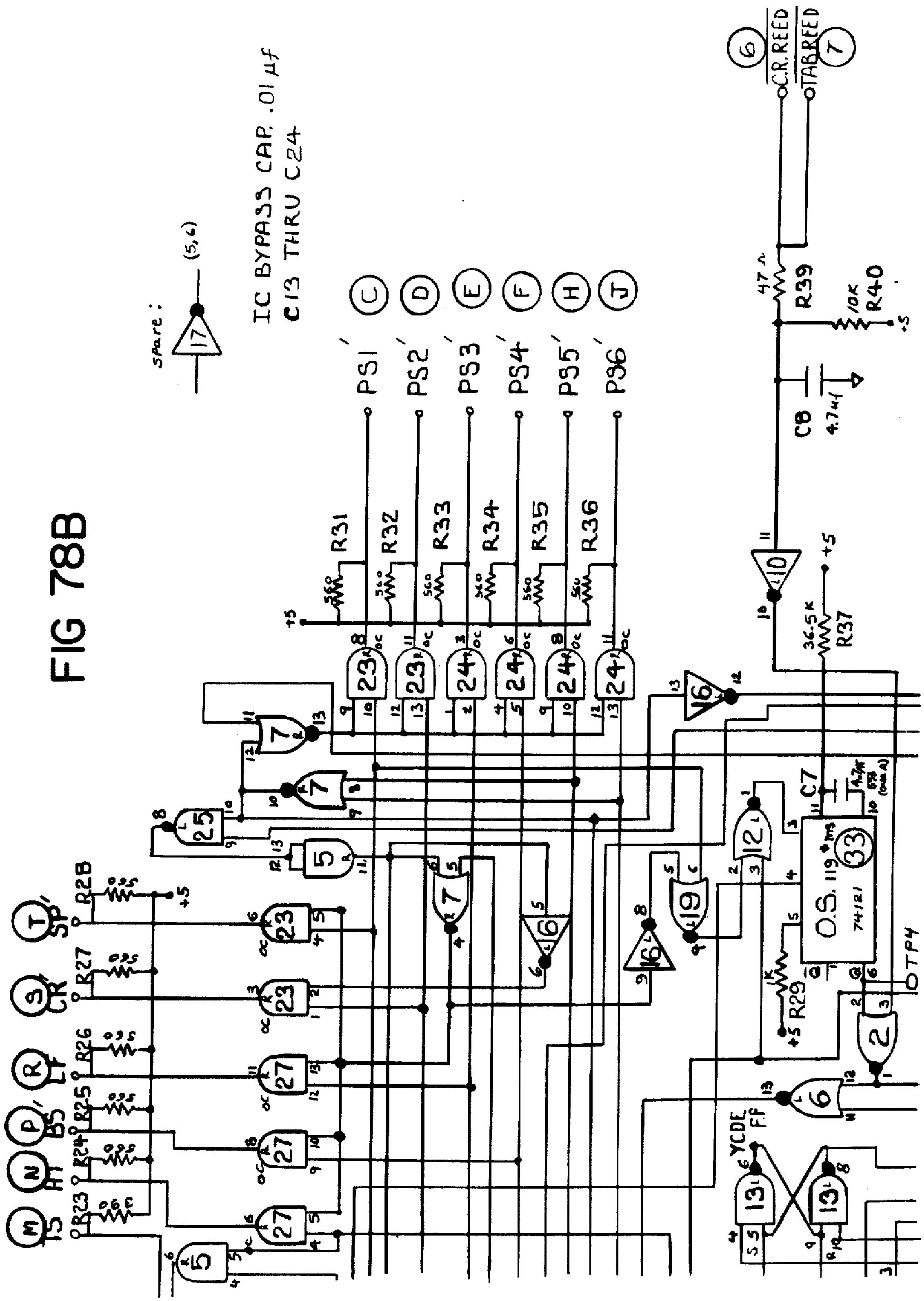
Figure 78C:
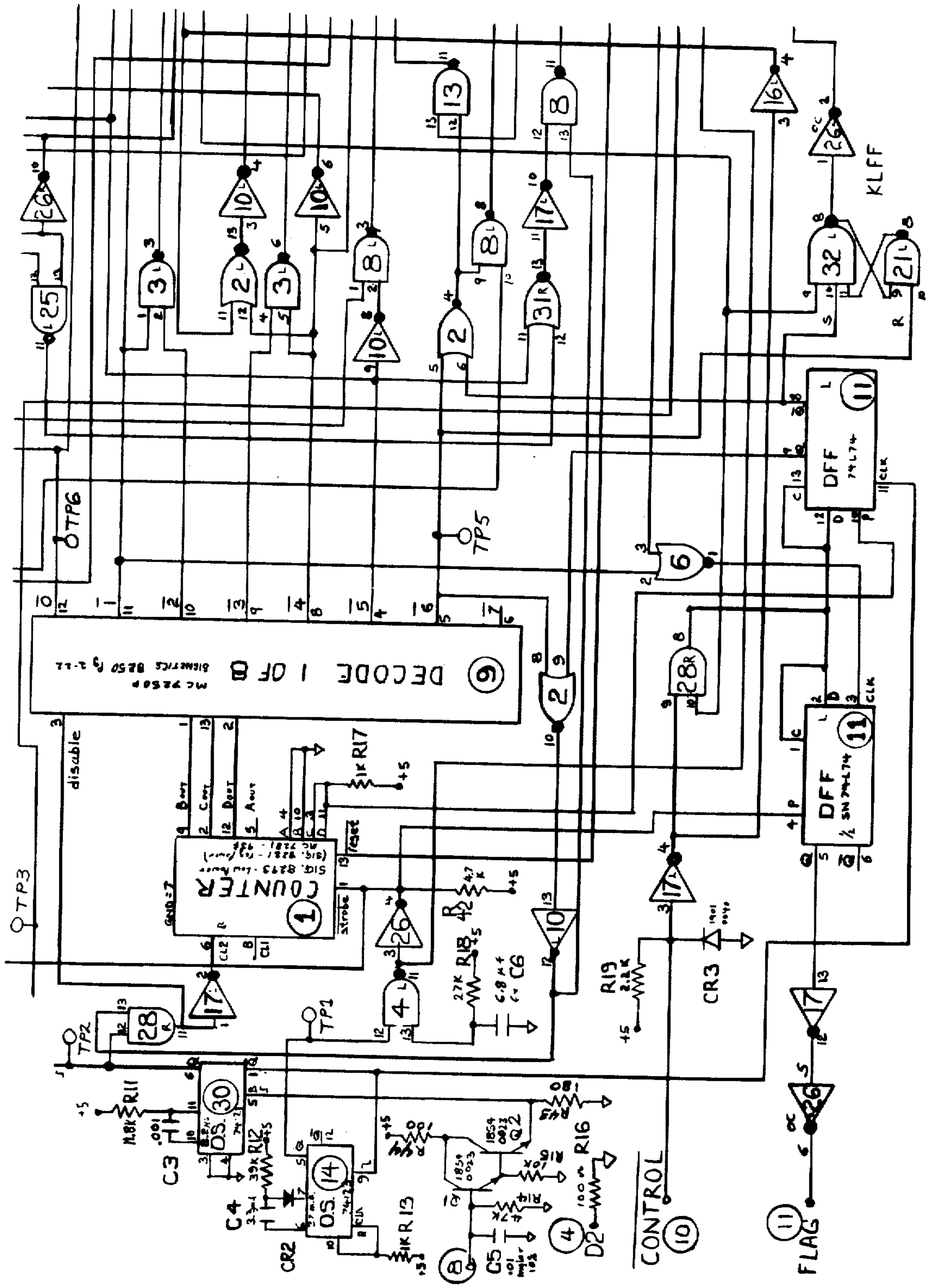
Figure 78D:
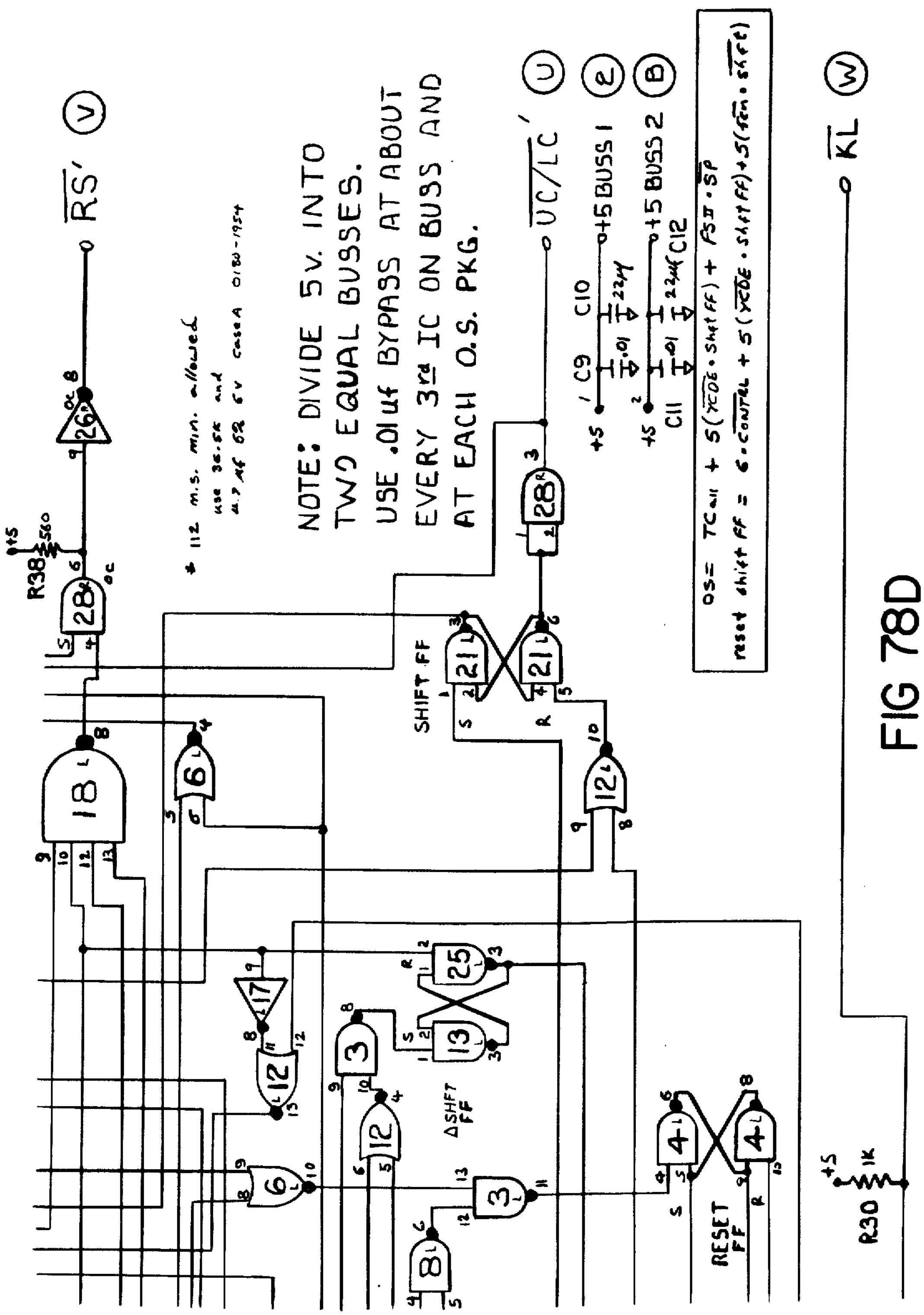
Figure 79A:
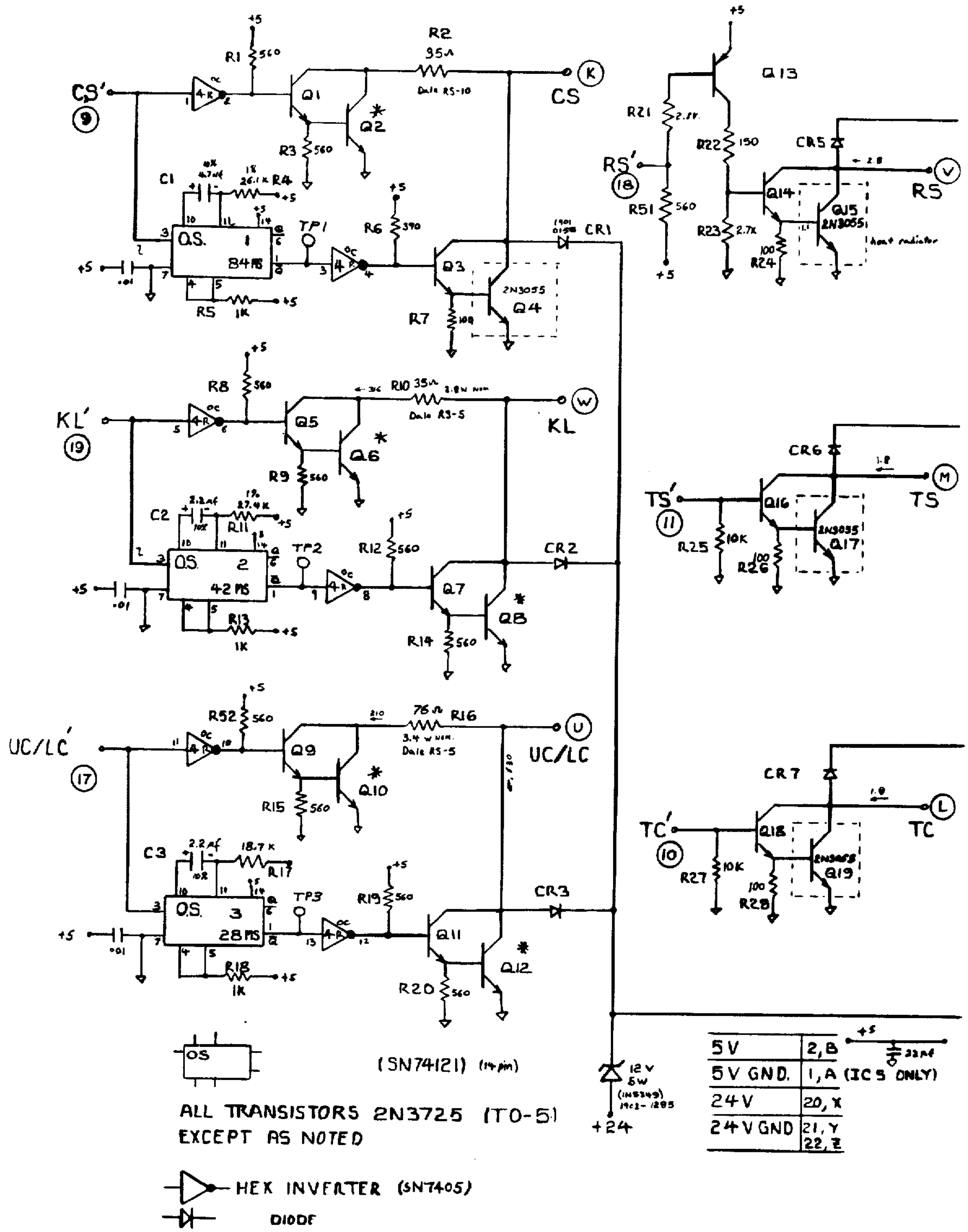
FIGS. 79A–B are a detailed schematic diagram of the power gates of FIGS. 76A–B.
Figure 79B:
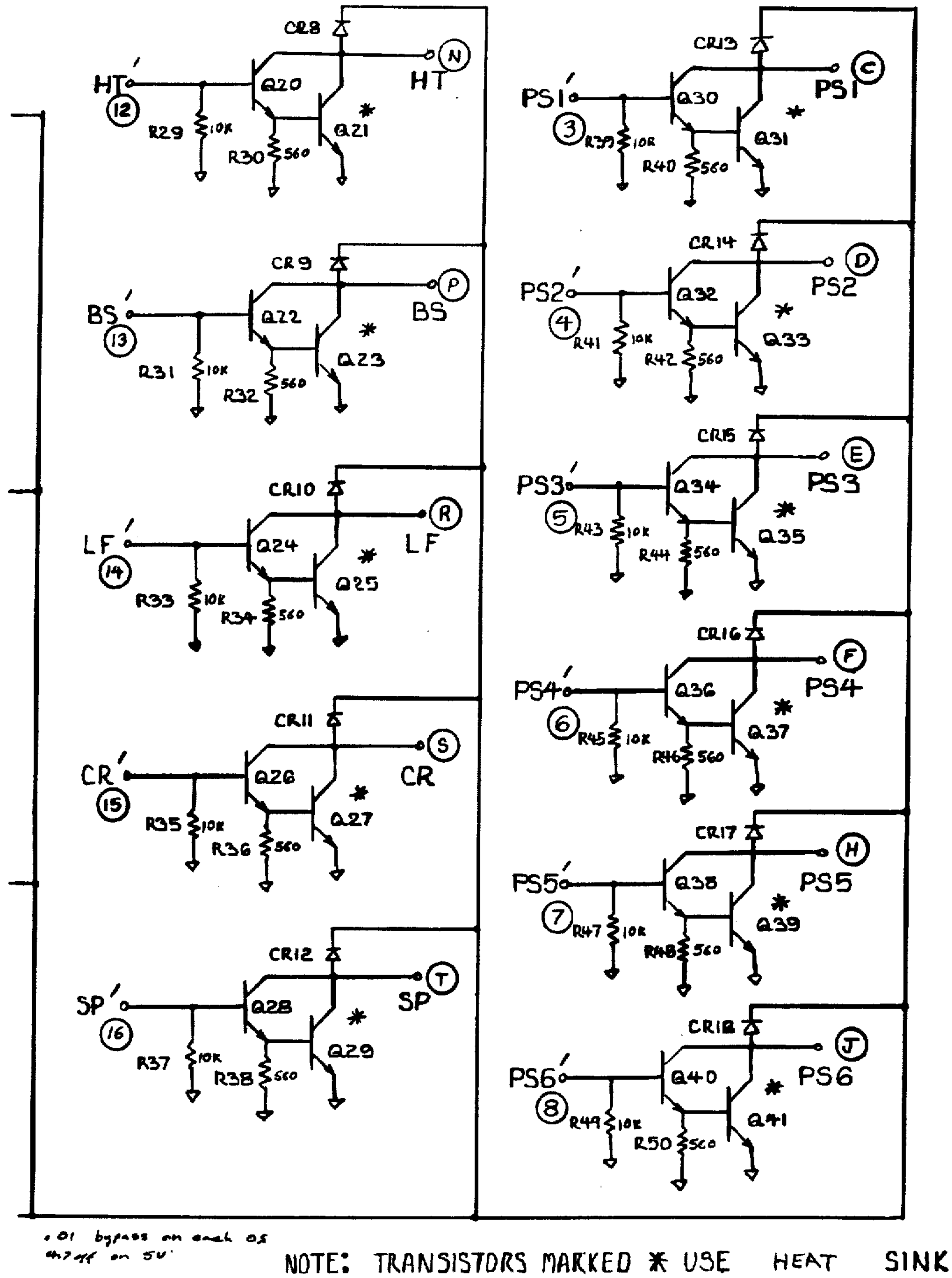
Figure 80A:
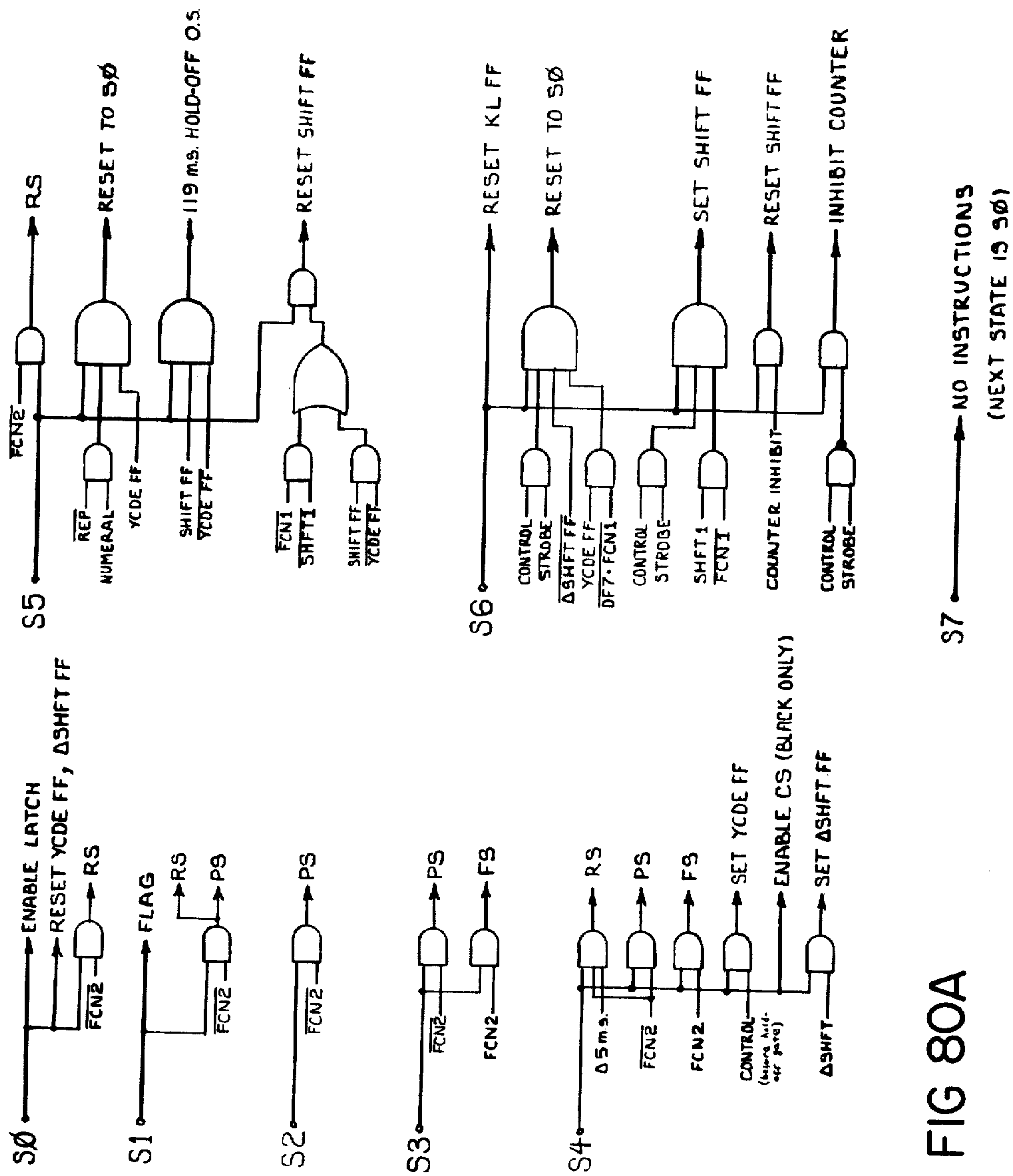

The power supply system employed in the calculator is constructed as shown in FIGS. 74 and 75A–B. As shown in FIGS. 75A–B, a centertapped transformer secondary is connected to supply the unregulated DC voltages indicated. Referring to FIG. 75A, the AC voltage from the transformer is rectified by diodes 454 and 456 and filtered by capacitor 478. The output of this rectifier/filter circuit is nominally 19 volts DC at 2.7 amps with a 2 volt peak-to-peak ripple. Transistors 440 and 442 serve as a switch to connect the 5-volt output bus to the 19 volt unregulated supply through inductors 450 and 452. Diode 444 serves to clamp the input of inductor 450 to ground when transistors 440 and 442 are switched off. Current flow in inductors 450 and 452 is substantially constant and equal to the load current.

Loss in high current transistor 440 is minimized because it can be completely saturated. Loss in driver transistor 442 is minimized because it can also be saturated. Resistor 446 limits the maximum drive current to transistor 440. Losses in resistor 446 can be minimized by proper positioning of the tap on inductor 450 consistent with transistor parameters and circuit requirements.

Integrated circuit 448 is a linear differential amplifier to drive Q1 and Q2. Any differential amplifier with sufficient voltage capability and bandwidth will work. Since the amplifier employed is linear, R7 and R4 have been included in the circuit to provide sufficient hysteresis for reliable switching. This hysteresis stabilizes the switching frequency and thus stabilizes the switching losses.

Because hysteresis has been added to the circuit, a significant ripple signal (at switching frequency) must be present on the feedback signal to the amplifier. This need for a ripple signal limits the amount of capacitance that can appear between the output of inductor 450 and ground. Inductor 452 serves to isolate this point from the rest of the system. The amount of capacity that can appear between the output of inductor 452 and ground is essentially unlimited and significantly reduces power supply ripple, and greatly improves response to load transients.

The second winding of inductor 452 is a path for the feedback from the remote sensing. The required ripple signal is added to the feedback signal by transformer action in inductor 452.

The power supply also includes an overvoltage crowbar circuit comprising transistor 458, diode 460, and resistor 462 and a short circuit shut-down circuit (using transistor 464). In the event that the +5 volt bus is grounded, or the crowbar is triggered, transistor 464 saturates and locks integrated circuit 448 off.

The resistor 466 makes a current generator of integrated circuit 448. Resistors 468 and 470 discharge the bases of transistors 450 and 452, respectively. Integrated circuit 472 and its associated components generate a power-on-pulse, $\overline{POP}$, to initialize the instrument. Integrated Circuit 448 is referenced and powered from an external +12 volt supply. Powering the IC from +12 rather than the unregulated +19 reduces power dissipation in IC 448.

The +12 volt supply of FIGS. 75A–B references the −12, +5, and +16 supplies directly. The +12 amplifier 448 may be biased either from the unregulated supply for the +12 volt supply or from the operating +16 volt supply. Diodes 474 and 476 determine the appropriate source. This provides a greater power supply margin for the +12 volt supply.

All supplies except the +20 volt supply are current limited. All supplies except the +20 volt supply are crowbar protected against over-voltage.

TYPEWRITER INTERFACE

This interface couples the Facit-Odhner model 3841 output typewriter to the calculator.

The unit mounts directly on the back of the typewriter. Communications with the calculator are made through about five feet of cable which is terminated by the I/O plug containing a board for buffering and some logic.

Referring to FIGS. 76A–82, characters from the calculator appear on the data lines as ASCII codes. These codes are recorded by a ROM into the six bit Facit typewriter code for the 46 type bars, and one bit for upper case shift. Functions such as space, tab, line feed, etc. are recoded for easy recognition in the interface since each function must be driven by a separate line. A data latch after the ROM holds codes for processing. If new data arrives during this processing, the two codes are compared to determine if they both drive the same type bar and if they are both numbers. Non-repeating numbers can be typed at 14.5 characters per second, otherwise typing speed is 12 characters per second (reduce these speeds 17% for 50HZ operation). Codes in the latch are gated to the program solenoids or the function solenoids by the control logic.

To understand the coding, notice that two blocks of codes on the Facit typewriter code map are empty. If all function codes are put in these blocks, they can be identified by control logic by testing for ($\overline{6}$.4). Each function code puts a 1 on one of five lines and this line opens the correct solenoid gate. Bit 8 is used to discriminate between two sets of function gates. In the case of a program solenoid code, bit 8 identifies numerals.

The control clock is provided by a synchronizing pulse which is generated in the typewriter by a vaned wheel attached to the end of the main drive shaft. The vanes interrupt a light beam. When a type cycle is initiated, a modulo eight counter counts synchronizing pulses and the count is decoded by a 1-of-8 decoder. At each of the eight states, comtinational logic can enable solenoid gates, set or clear flag flip-flops or change the counter to state zero, or state 6, or inhibit the counter.

Figure 81:
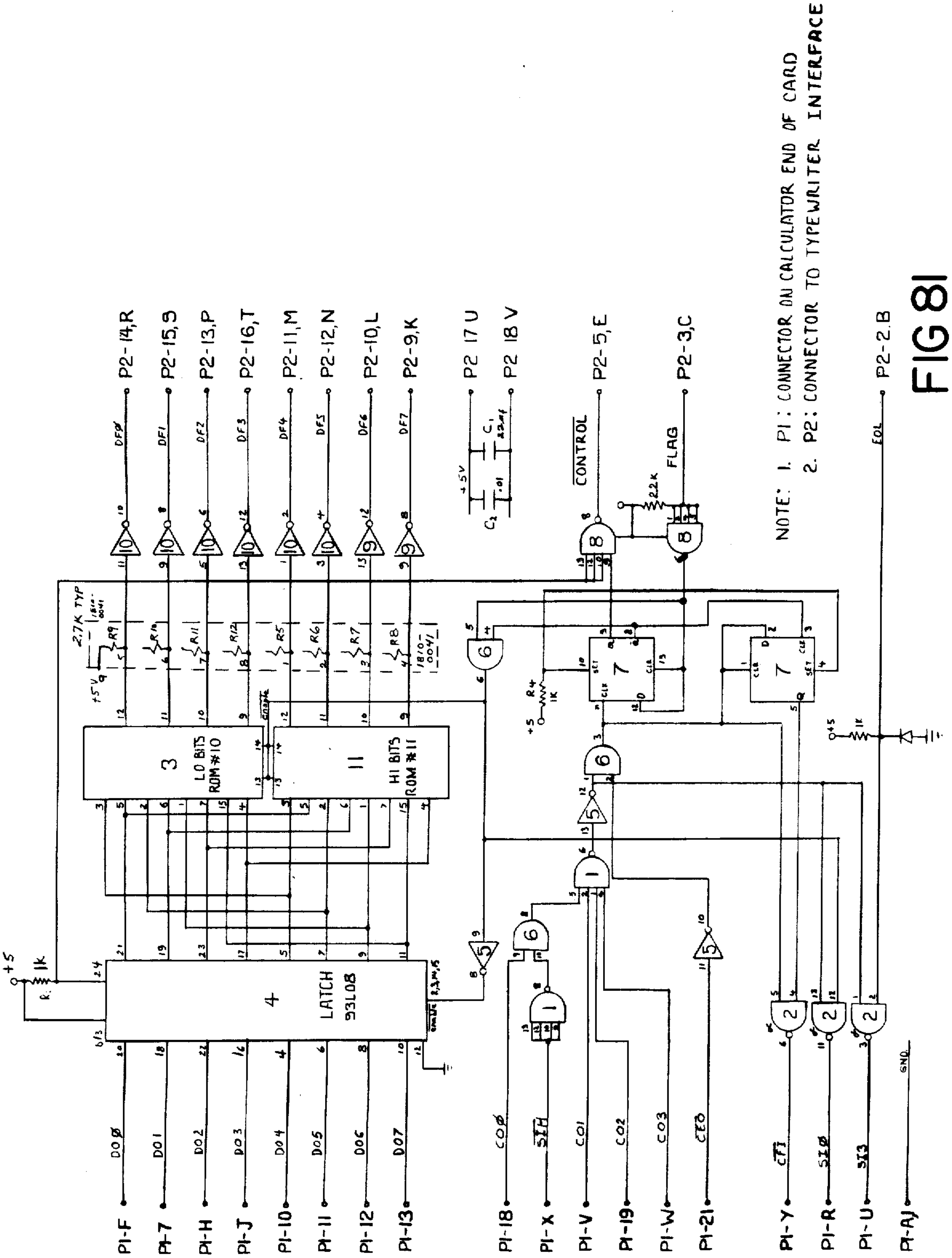
FIG. 81 is a detailed schematic diagram of the ROM, data latch, and compare circuitry of FIGS. 76A–B.
Figure 82:
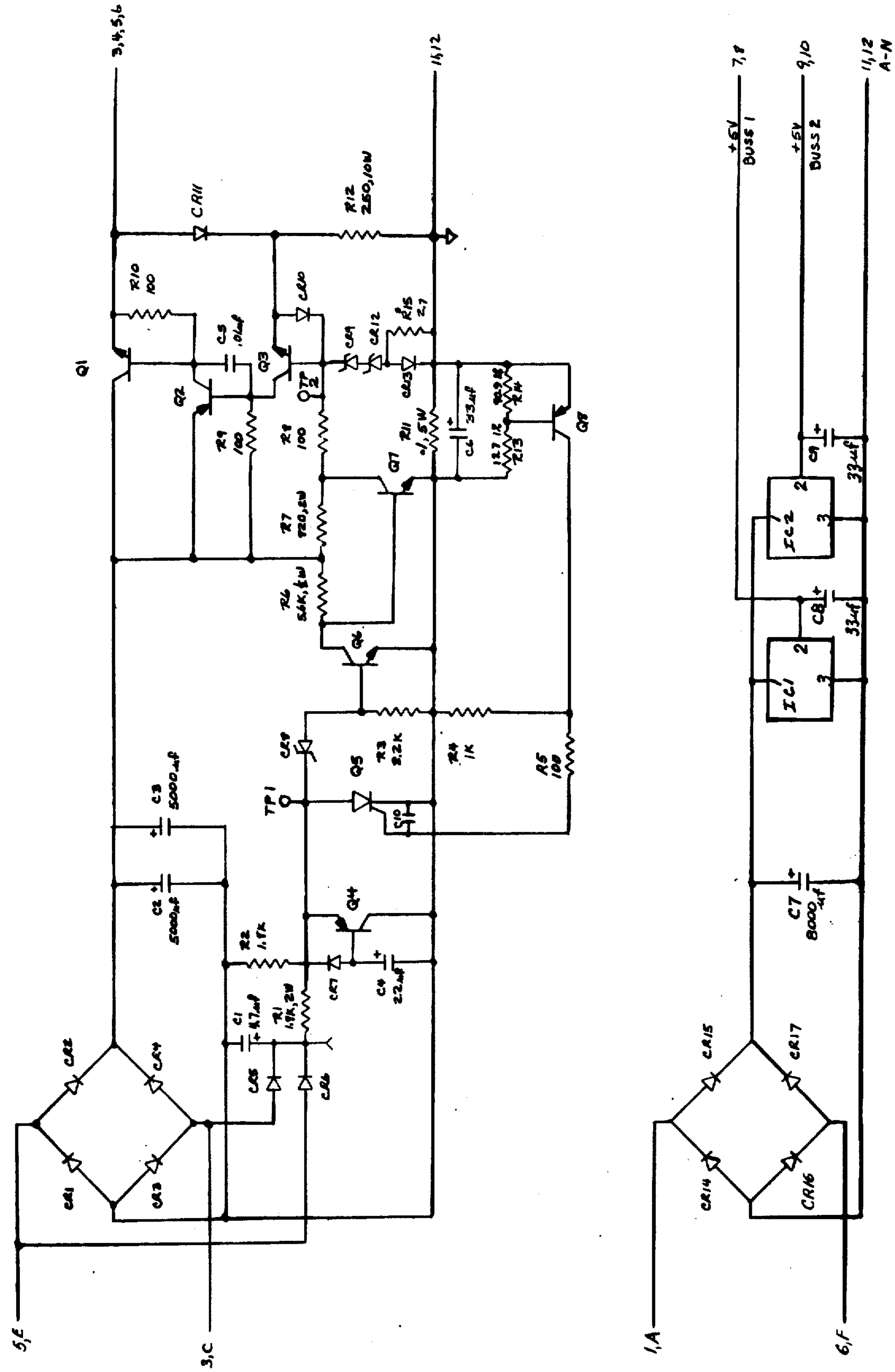
FIG. 82 is a detailed schematic diagram of a power supply that may be employed to power the typewriter interface circuitry of FIGS. 78A–D, 79A–B, and 81.

The tables below contain a guide for interpretation of bit pattern data as well as the actual bit patterns for ROM No. 10 and ROM No. 11 as shown in FIG. 81.

INTERPRETATION OF BIT PATTERN DATA (Bipolar ROM of FIG. 81)

1. FORMAT

The bit pattern information is in the following format:

$X_1X_2X_3$-$X_5X_6X_7$ B B $X_{10}X_{11}X_{12}X_{13}$ B $X_{15}X_{16}X_{17}X_{18}$ B...$X_{45}X_{46}X_{47}X_{48}$

A. $X_1X_2X_3$ — Three digits indicating the address (decimal) of the first word of that line. *1

B. $X_5X_6X_7$ — Three digits indicating the address of the last word in that line. *1

C. $X_9X_{10}X_{11}X_{12}$ — Four characters indicating the output states of the first word of that line (corresponding to address $X_1X_2X_3$). *2

D. $X_{15}X_{16}X_{17}X_{18}$ through $X_{40}X_{41}X_{42}X_{43}$ indicate successive output states. *2

E. $X_{45}X_{46}X_{47}X_{48}$ — Four characters indicating the output states of the last word of that line (corresponding to address $X_5X_6X_7$). *2

F. B = Blank or space between group of characters.

*1. Addresses are the digital equivalent of the binary address $A_7A_6A_5A_4A_3A_2A_1A$. Where a low input address equals a binary 0 and a high input equals a binary 1.

*2. Groups of output states are listed $O_4O_3O_2O_1$ respectively.

2. TRUTH TABLE

Logic level definition

L — Output Low (Logic 0)

H — Output High or Open Collector (Logic 1)

X — Don's Care — Output may be High or Low

BIPOLAR ROM 10 OF FIGURE 81

| | | | | | | | | |
|---|---|---|---|---|---|---|---|---|
| 000-007 | LLLL | LLLH | LLLL | LLLL | LLLL | LLLL | HLLL | LHLL |
| 008-015 | HLLL | LLLL | LHLL | LLHL | LLLL | LLHL | LLLL | LLLL |
| 016-023 | LLLL | LLLL | LLLL | LLLL | LLLL | LLLL | LLLL | LLLL |
| 024-031 | LLLL | LLLL | LLLL | LLLL | LLLL | LLLL | LLLL | LLLL |

BIPOLAR ROM 10 OF FIGURE 81 -continued

| | | | | | | | | |
|---|---|---|---|---|---|---|---|---|
| 032-039 | LLLH | LLLH | LLHL | LLHH | LHLL | LHLH | LHHL | LHHH |
| 040-047 | HLLL | HLLH | HLHL | HLHH | HHLL | HHLH | HHHL | HHHH |
| 048-055 | LLLL | LLLH | LLHL | LLHH | LHLL | LHLH | LHHL | LHHH |
| 056-063 | HLLL | HLLH | HLHL | HLHH | HHLL | HHLH | HHHL | HHHH |
| 064-071 | LLLL | LLLH | LLHL | LLHH | LHLL | LHLH | LHHL | LHHH |
| 072-079 | HLLL | HLLH | HLHL | HLHH | HHLL | HHLH | HHHL | HHHH |
| 080-087 | LLLL | LLLH | LLHL | LLHH | LHLL | LHLH | LHHL | LHHH |
| 088-095 | HLLL | HLLH | HLHL | HLHH | LLLL | HHLH | HHHL | LLLL |
| 096-103 | LLLL | LLLH | LLHL | LLHH | LHLL | LHLH | LHHL | LHHH |
| 104-111 | HLLL | HLLH | HLHL | HLHH | HHLL | HHLH | HHHL | HHHH |
| 112-119 | LLLL | LLLH | LLHL | LLHH | LHLL | LHLH | LHHL | LHHH |
| 120-127 | HLLL | HLLH | HLHL | HLHH | LLLL | HHLH | HHHL | LLLL |
| 128-135 | LLLL | LLLL | LLLL | LLLL | LLLL | LLLL | LLLL | LLLL |
| 136-143 | LLLL | LLLL | LLLL | LLLL | LLLL | LLLL | LLLL | LLLL |
| 144-151 | LLLL | LLLL | LLLL | LLLL | LLLL | LLLL | LLLL | LLLL |
| 152-159 | LLLL | LLLL | LLLL | LLLL | LLLL | LLLL | LLLL | LLLL |
| 160-167 | LLLL | LLLL | LLLL | LLLL | LLLL | LLLL | LLLL | LLLL |
| 168-175 | LLLL | LLLL | LLLL | LLLL | LLLL | LLLL | LLLL | LLLL |
| 176-183 | LLLL | LLLL | LLLL | LLLL | LLLL | LLLL | LLLL | LLLL |
| 184-191 | LLLL | LLLL | LLLL | LLLL | LLLL | LLLL | LLLL | LLLL |
| 192-199 | LLLL | LLLL | LLLL | LLLL | LLLL | LLLL | LLLL | LLLL |
| 200-207 | LLLL | LLLL | LLLL | LLLL | LLLL | LLLL | LLLL | LLLL |
| 208-215 | LLLL | LLLL | LLLL | LLLL | LLLL | LLLL | LLLL | LLLL |
| 216-223 | LLLL | LLLL | LLLL | HHLH | HLHH | LLLL | HHHL | HHHL |
| 224-231 | LLLL | LLLL | LLLL | LLLL | LLLL | LLLL | LLLL | LLLL |
| 232-239 | LLLL | LLLL | LLLL | LLLL | LLLL | LLLL | LLLL | LLLL |
| 240-247 | LLLL | LLLL | LLLL | LLLL | LLLL | LLLL | LLLL | LLLL |
| 248-255 | LLLL | LLLL | LLLL | LLLL | LLLL | LLLL | LLLL | LLLL |

BIPOLAR ROM 11 OF FIGURE 81

| | | | | | | | | |
|---|---|---|---|---|---|---|---|---|
| 000-007 | LLLL | HLLL | LLLL | LLLL | LLLL | LLLL | HLLL | HLLL |
| 008-015 | LLLL | LHLL | LLLL | HLLL | HHLL | LLLL | LLLL | LLLL |
| 016-023 | LLLL | LLLL | LLLL | LLLL | LLLL | LLLL | LLLL | LLLL |
| 024-031 | LLLL | LLLL | LLLL | LLLL | LLLL | LLLL | LLLL | LLLL |
| 032-039 | LLLL | LHLH | LHLH | LHLH | LHLH | LHLH | LHLH | LHLH |
| 040-047 | LHLH | LHLH | LHLH | LHLH | LLLH | HLLH | LLLH | LLLH |
| 048-055 | HLLH | HLLH | HLLH | HLLH | HLLH | HLLH | HLLH | HLLH |
| 056-063 | HLLH | HLLH | HLLH | LLLH | LHLH | LHLH | LHLH | LHLH |
| 064-071 | LLHL | LHHL | LHHL | LHHL | LHHL | LHHL | LHHL | LHHL |
| 072-079 | LHHL | LHHL | LHHL | LHHL | LHHL | LHHL | LHHL | LHHL |
| 080-087 | LHHH | LHHH | LHHH | LHHH | LHHH | LHHH | LHHH | LHHH |
| 088-095 | LHHH | LHHH | LHHH | LLHH | LLLL | LLHH | LLHH | LHLH |
| 096-103 | LHHL | LLHL | LLHL | LLHL | LLHL | LLHL | LLHL | LLHL |
| 104-111 | LLHL | LLHL | LLHL | LLHL | LLHL | LLHL | LLHL | LLHL |
| 112-119 | LLHH | LLHH | LLHH | LLHH | LLHH | LLHH | LLHH | LLHH |
| 120-127 | LLHH | LLHH | LLHH | LHHH | LLLL | LHHH | LHHH | LLLL |
| 128-135 | LLLL | LLLL | LLLL | LLLL | LLLL | LLLL | LLLL | LLLL |
| 136-143 | LLLL | LLLL | LLLL | LLLL | LLLL | LLLL | LLLL | LLLL |
| 144-151 | LLLL | LLLL | LLLL | LLLL | LLLL | LLLL | LLLL | LLLL |

BIPOLAR ROM 11 OF FIGURE 81-continued

| | | | | | | | | |
|---|---|---|---|---|---|---|---|---|
| 152-159 | LLLL | LLLL | LLLL | LLLL | LLLL | LLLL | LLLL | LLLL |
| 160-167 | LLLL | LLLL | LLLL | LLLL | LLLL | LLLL | LLLL | LLLL |
| 168-175 | LLLL | LLLL | LLLL | LLLL | LLLL | LLLL | LLLL | LLLL |
| 176-183 | LLLL | LLLL | LLLL | LLLL | LLLL | LLLL | LLLL | LLLL |
| 184-191 | LLLL | LLLL | LLLL | LLLL | LHHL | LLLL | LLLL | LLLL |
| 192-199 | LLLL | LLLL | LLLL | LLLL | LLLL | LLLL | LLLL | LLLL |
| 200-207 | LLLL | LLLL | LLLL | LLLL | LLLL | LLLL | LLLL | LLLL |
| 208-215 | LLLL | LLLL | LLLL | LLLL | LLLL | LLLL | LLLL | LLLL |
| 216-223 | LLLL | LLLL | LLLL | LHHH | LHHH | LLLL | LLHH | LHHH |
| 224-231 | LLLL | LLLL | LLLL | LLLL | LLLL | LLLL | LLLL | LLLL |
| 232-239 | LLLL | LLLL | LLLL | LLLL | LLLL | LLLL | LLLL | LLLL |
| 240-247 | LLLL | LLLL | LLLL | LLLL | LLLL | LLLL | LLLL | LLLL |
| 248-255 | LLLL | LLLL | LLLL | LLLL | LLLL | LLLL | LLLL | LLLL |

We claim:

1. Electronic data processing apparatus comprising:

keyboard input means for entering lines of one or more alphameric characters each into said electronic data processing apparatus;

first memory means for storing lines of one or more alphameric characters each;

second memory means, coupled to said keyboard input means and first memory means, for temporarily storing each line of one or more alphameric characters being entered into said electronic data processing apparatus from said keyboard input means or recalled from said first memory means;

said keyboard input means including store control means for causing a line of one or more alphameric characters then stored in said second memory means to be stored in said first memory means and including recall control means for causing a designated line of one or more alphameric characters stored in said first memory means to be recalled to said second memory means;

first logic means, coupled to said keyboard input means, first memory means, and second memory means, for transferring a line of one or more alphameric characters then stored in said second memory means to said first memory means in response to actuation of said store control means and for transferring a designated line of one or more alphameric characters from said first memory means to said second memory means in response to actuation of said recall control means;

display means, coupled to said second memory means, for visually displaying a line of one or more alphameric characters then stored in said second memory means;

said display means including means for visually displaying a cursor for designating any character position of the displayed line of one or more alphameric characters;

said keyboard input means including cursor control means for controlling the position of said cursor; and second logic means, coupled to said keyboard input means, second memory means, and display means, for positioning said cursor to designate any character position of the displayed line of one or more alphameric characters in response to actuation of said cursor control means.

2. Electronic data processing apparatus in claim 1 wherein said cursor control means comprises a single control key for moving said cursor to the left and a single control key for moving said cursor to the right.

3. Electronic data processing apparatus as in claim 1 wherein:

said keyboard input means includes a space bar; and said second logic means is responsive to actuation of said space bar for introducing a blank character at one or more character positions in a line of one or more alphameric characters then stored or being stored in said second memory means.

4. Electronic data processing apparatus as in claim 1 wherein:

said keyboard input means includes insertion control means for controlling the insertion of one or more characters into a line of one or more alphameric characters; and said second logic means is responsive to actuation of said insertion control means for inserting a blank character into a line of one or more alphameric characters then stored in said second memory means and displayed by said display means at the character position then designated by said cursor so that an alphameric character designated by actuation of an alphameric key of said keyboard input means may be inserted at the character position occupied by that blank character.

5. Electronic data processing apparatus as in claim 4 wherein said insertion control means comprises a single control key.

6. Electronic data processing apparatus as in claim 1 wherein:

said keyboard input means includes deletion control means for controlling the deletion of one or more characters from a line of one or more alphameric characters; and said second logic means is responsive to actuation of said deletion control means for deleting a character from a line of one or more alphameric characters then stored in said second memory means and displayed by said display means at the character position then designated by said cursor.

7. Electronic data processing apparatus as in claim 6 wherein:

said deletion control means comprises a shift control key and one other control key; and said second logic means is responsive to simultaneous actuation of those two keys for deleting a character from a line of one or more alphameric characters then stored in said second memory means and displayed by said display means at the character position then designated by said cursor.

8. Electronic data processing apparatus as in claim 1 wherein:

said keyboard input means includes display position control means for controlling the position of the displayed line of one or more alphameric characters; and said second logic means is responsive to actuation of said display position control means for moving the displayed line of one or more alphameric characters either to the left or the right independently of said cursor.

9. Electronic data processing apparatus as in claim 8 wherein said display position control means comprises a single control key for moving the displayed line of one or more alphameric characters to the left, and a single control key for moving the displayed line of one or more alphameric characters to the right.

10. Electronic data processing apparatus as in claim 8 wherein said first logic means is responsive to actuation of said store control means for transferring a line of one or more alphameric characters then stored in said second memory means and displayed by said display means from said second memory means to said first memory means irrespective of the position of said cursor or of the position of the displayed line of one or more alphameric characters.

11. Electronic data processing apparatus as in claim 10 wherein:

said store control means comprises a single control key; and said recall control means comprises a single control key actuated in sequence with one or more line number designating keys of the keyboard input means.

12. Electronic data processing apparatus as in claim 1 wherein said first logic means is responsive to actuation of said store control means for transferring a line of one or more alphameric characters then stored in said second memory means and displayed by said display means from said second memory means to said first memory means irrespective of the position of said cursor in the displayed line of one or more alphameric characters.

13. Electronic data processing apparatus as in claim 1 wherein:

said store control means comprises a single control key; and said recall control means comprises a single control key actuated in sequence with one or more line number designating keys of the keyboard input means.

14. Electronic data processing apparatus comprising:

keyboard input means, including a plurality of numeric keys, for entering lines of one or more alphameric characters each into said electronic data processing apparatus;

first memory means for storing lines of one or more alphameric characters each;

second memory means, coupled to said keyboard input means and first memory means, for temporarily storing each line of one or more alphameric characters entered into said electronic data processing apparatus from said keyboard input means or recalled from said first memory means;

said keyboard input means including a store control key for causing the line of one or more alphameric characters then stored in said second memory means to be stored in said first memory means; and logic means, coupled to said keyboard input means, first memory means, and second memory means, for transferring the line of one or more alphameric characters then stored in said second memory means to said first memory means in response to actuation of said store control key;

display means, coupled to said second memory means, for visually displaying the contents thereof;

said keyboard input means including a recall control key for recalling a designated line of one or more alphameric characters from said first memory means to said second memory means;

each line of one or more alphameric characters stored in said first memory means being associated with a separate line number;

said logic means is also operable for transferring a line of one or more alphameric characters from said first memory means to said second memory means in response to sequential actuation of said recall control key and one or more of said numeric keys designating the line number associated with the line of one or more alphameric characters to be transferred.

15. Electronic data processing apparatus as in claim 14 wherein:

said keyboard input means includes first and second memory control keys;

said logic means includes a line number counter for designating the line number associated with the line of one or more alphameric characters then stored in said second memory means; and said logic means is responsive to actuation of said first memory control key or said second memory control key for incrementing or decrementing, respectively, said line number counter and for transferring the line of one or more alphameric characters associated with the line number then designated by said line number counter from said first memory to said second memory means.

16. Electronic data processing apparatus as in claim 15 wherein said logic means is responsive to successive actuation of said first memory control key or said second memory control key for successively incrementing or decrementing, respectively, said line number counter and for successively transferring the lines of one or more alphameric characters associated with the line numbers successively designated by said line number counter from said memory means to said second memory means.

17. Electronic data processing apparatus as in claim 14 wherein said first means stores each separate line number as part of the line of one or alphameric characters associated therewith.

18. Electronic data processing apparatus as in claim 17 wherein:

said logic means includes comparison means for comparing the line number designating the line of one or more alphameric characters to be transferred from said first memory means to said second memory means with the line numbers stored in said first memory means;

said logic means being responsive to a condition of equality indicated by said comparison means for transferring the designated line of one or more alphameric characters from said first memory means to said second memory means; and said logic means being responsive to said comparison means in the event no condition of equality is detected for transferring, from said first memory means to said second memory means, the next higher numbered line above the designated line number.

19. Electronic data processing apparatus as in claim 14 wherein:

said keyboard input means includes first and second memory control keys;

said logic means includes a line number counter for storing the line number associated with a line of one or more alphameric characters stored in said first memory means that has been recalled to said second memory means; and said logic means is responsive to actuation of said first memory control key or said second memory control key for incrementing or decrementing, respectively, said line number counter and for transferring the next higher numbered line or the next lower numbered line, respectively from said first memory means to said second memory means.

20. Electronic data processing apparatus comprising:

keyboard input means for entering lines of one or more alphameric characters each into said electronic data processing apparatus;

first memory means, coupled to said keyboard input means, for temporarily storing each line of one or more alphameric characters being entered into said electronic data processing apparatus from said keyboard input means;

display means, coupled to said first memory means, for visually displaying the contents thereof;

said keyboard input means including one or more control keys for terminating entry of each line of one or more alphameric characters into said electronic data processing apparatus and including a recall key for recalling the line of one or more alphameric characters most recently terminated by one of said control keys to said first memory means;

second memory means, coupled to said keyboard input means and first memory means, for temporarily storing a line of one or more alphameric characters; and logic means, coupled to said keyboard input means, first memory means, and second memory means, for transferring the most recently terminated line of one or more alphameric characters then stored in said first memory means to said second memory means in response to termination of that line of one or more alphameric characters and for thereafter transferring the most recently terminated line of one or more alphameric characters then stored in said second memory means to said first memory means in response to actuation of said recall key.

21. An electronic calculator comprising:

keyboard input means for entering lines of one or more alphameric characters each into said electronic calculator;

first memory means for storing a program of one or more lines of one or more alphameric characters each;

second memory means, coupled to said keyboard input means and first memory means, for temporarily storing each line of one or more alphameric characters entered into said calculator from said keyboard input means or recalled from said first memory means;

said keyboard input means including store control means for causing a line of one or more alphameric characters then stored in said second memory means to be stored in said first memory means and including recall control means for causing a designated line of one or more alphameric characters stored in said first memory means to be recalled to said second memory means;

processing means, coupled to said keyboard input means, first memory means, and second memory means, for transferring a line of one or more alphameric characters then stored in said second memory means to said first memory means in response to actuation of said store control means, for transferring a designated line of one or more alphameric characters from said first memory means to said second memory means in response to actuation of said recall control means, and for executing said program to perform a selected calculation and storing the result of the selected calculation in said second memory means;

output display means, coupled to said second memory means, for visually displaying the contents thereof;

said keyboard input means including program halt control means for halting the execution of said program by said processing means, and program continue control means for resuming the execution of said program by said processing means; and logic means, coupled to said keyboard input means, first memory means, second memory means, and processing means, for halting execution of said program in response to actuation of said program halt control means, for thereafter transferring a designated line of one or more alphameric characters of said program from said first memory means to said second memory means in response to actuation of said recall control means, and for thereafter resuming execution of said program, at the point where its execution was halted, in response to actuation of said program continue control means.

22. An electronic calculator as in claim 21 wherein:

said recall control means comprises a recall control key operable in sequence with one or more numeric keys for recalling a designated line of one or more alphameric characters of said program from said first memory means to said second memory means;

said program halt control means comprises a single control key; and said program continue control means comprises a single control key.

23. Electronic data processing apparatus comprising:

keyboard input means for entering lines of one or more alphameric characters each into said electronic data processing apparatus;

memory means, coupled to said keyboard input means, for storing lines of one or more alphameric characters each entered into said electronic data processing apparatus, every one of said lines of one or more alphameric characters each stored in said memory means being associated with a separate line number;

output printing means, coupled to said keyboard input means and memory means, for printing lines of one or more alphameric characters each;

said keyboard input means including memory listing means for designating, by line number, any number of lines of one or more alphameric characters each then stored in said memory means to be printed and for initiating the printing of those designated lines of one or more alphameric characters each; and logic means, coupled to said keyboard input means, memory means, and output printing means, for selectively causing said output printing means to print out the designated lines of one or more alphameric characters each in response to actuation of said memory listing means.

24. An electronic calculator as in claim 21 wherein:

said keyboard input means includes an execute control key for initiating execution of a line of one or more alphameric statements entered into the calculator from said keyboard input means; and said logic means is responsive to entry of a line of one or more alphameric statements into the calculator and to actuation of said execute control key, during a period of time after which execution of a program has been halted by actuation of said program halt control means, for causing said processing means to execute that entered line of one or more alphameric statements, said logic means thereafter being responsive to actuation of said program continue control means for resuming execution of the program at the point where its execution was previously halted.

25. Electronic data processing apparatus as in claim 24 wherein:

said memory listing means comprises a list control key; and said logic means is responsive to sequential actuation of said list control key and selected other keys of said keyboard input means designating a beginning line number and an ending line number for causing said output printing means to print out the lines of one or more alphameric characters each stored in said memory means having line numbers within the range defined by said beginning and ending line numbers, inclusive.

26. Electronic data processing apparatus as in claim 24 wherein:

said memory listing means comprises a list control key; and said logic means is responsive to sequential actuation of said list control key and selected other keys of said keyboard input means designating a beginning line number for causing said output printing means to print out the lines of one or more alphameric characters each stored in said memory means commencing with the line associated with said beginning line number and including all lines associated with line numbers greater than said beginning line number.

27. Electronic data processing apparatus comprising:

keyboard input means, including a plurality of alphameric keys, for entering lines of one or more alphameric characters each into said electronic data processing apparatus;

memory means for storing lines of one or more alphameric characters each, every stored line of one or more alphameric characters being associated with a separate line number;

buffer storage means, coupled to said keyboard input means and memory means, for storing a line number and for storing an associated line of one or more alphameric characters entered into said electronic data processing apparatus;

display means, coupled to said buffer storage means, for visually displaying the contents thereof;

said keyboard input means including a control key for designating an automatic line numbering mode;

a line number counter for storing a current line number;

temporary storage means for storing a line number increment; and logic means coupled to said keyboard input means and buffer storage means, said logic means being responsive to actuation of said control key, followed by actuation of one or more alphameric keys designating both a starting line number and a line number increment, for storing the starting line number in both said buffer storage means and said line number counter and for storing the line number increment in said temporary storage means, said logic means being further responsive to completion of each entry of a line of one or more alphameric characters into the electronic data processing apparatus for combining the contents of said line number counter and said temporary storage means and for storing the result in both said line number counter and said buffer storage means.

28. Electronic data processing apparatus as in claim 27 wherein:

said keyboard input means includes a delete key; and said logic means is responsive to actuation of said delete key during entry of a line of one or more alphameric characters into the electronic data processing apparatus for deleting from said buffer storage means all of the characters previously entered as part of that line, while retaining the associated line number stored in said buffer storage means.

29. Electronic data processing apparatus as in claim 27 wherein said logic means is responsive to actuation of said control key, without further actuation of alphameric keys designating a starting line number and a line number increment, for storing a predetermined starting line number in both said buffer storage means and said line number counter and for storing a predetermined line number increment in said temporary storage means.

30. Electronic data processing apparatus as in claim 27 wherein said logic means is responsive to actuation of said control key, followed by actuation of one or more alphameric keys designating a starting line number, for storing that starting line number in both said buffer storage means and said line number counter and for storing a predetermined line number increment in said temporary storage means.

31. Electronic data processing apparatus comprising:

keyboard input means having a plurality of alphameric keys for entering lines of one or more alphameric characters each into said electronic data processing apparatus and having a plurality of user definable keys for entering an associated plurality of user-defined functions into said electronic data processing apparatus;

memory means, coupled to said keyboard input means, for storing a mainline program of one or more lines of one or more alphameric characters each entered into said electronic data processing apparatus and for storing said plurality of user-defined functions associated with said plurality of user-definable keys;

said keyboard input means including first, second, and third memory erase means for selectively initiating the erasure of said mainline program and/or said user-defined functions stored in said memory means; and logic means, coupled to said keyboard input means and memory means, for erasing said mainline program in response to said first memory erase means, for erasing a selected one of said plurality of user-defined functions in response to said second memory erase means, and for erasing all of said plurality of user-defined functions in response to said third memory erase means.

32. Electronic data processing apparatus as in claim 31 wherein:

said keyboard input means includes a memory erase control key and an execute control key; and said first memory erase means comprises sequential actuation of said memory erase control key and said execute control key.

33. Electronic data processing apparatus as in claim 31 wherein:

said keyboard input means includes a memory erase control key and an execute control key; and said second memory erase means comprises sequential actuation of said memory erase control key, a selected one of said plurality of user definable keys, and said execute control key.

34. Electronic data processing apparatus as in claim 31 wherein:

said keyboard input means includes a memory erase control key and an execute control key; and said third memory erase means comprises sequential actuation of said memory erase control key, one of said alphameric keys, and said execute control key.

35. An electronic calculator comprising:

keyboard input means having a plurality of alphameric keys for entering lines of one or more alphameric characters each into said calculator;

memory means, coupled to said keyboard input means, for storing a program of lines of one or more alphameric characters each entered into said calculator, every stored line being associated with a separate line number;

processing means, coupled to said keyboard input means and memory means, for executing the program stored in said memory means;

said keyboard input means including a halt execution key for conditioning the processing means to halt execution of the program immediately prior to the line thereof associated with a designated line number specified by one or more of said alphameric keys;

a program counter, coupled to said processing means, for storing the line number associated with the line currently being executed;

temporary storage means, coupled to said keyboard input means and memory means, for storing the designated line number; and logic means, coupled to said keyboard input means, processing means, program counter, and temporary storage means, for storing the designated line number in said temporary storage means in response to actuation of said halt execution key, followed by actuation of said one or more alphameric keys, prior to commencing execution of the program stored in said memory means and for subsequently halting the execution of the program in response to the occurrence of a condition of equality between the contents of said program counter and said temporary storage means.

36. An electronic calculator as in claim 35 wherein:

said keyboard input means includes an execute control key for initiating execution of a line of one or more alphameric statements entered into the calculator from said keyboard input means;

said keyboard input means further including program continue control means for resuming execution of the program whose execution has been halted; and said logic means is responsive to entry of a line of one or more alphameric statements into the calculator and to actuation of said execute control key, during a period of time after which execution of the program has been halted, for causing said processing means to execute that entered line of one or more alphameric statements, said logic means thereafter being responsive to actuation of said program continue control means for resuming execution of the program at the point where its execution was previously halted.

37. An electronic calculator comprising:

keyboard input means, including a plurality of alphameric keys, for entering lines of one or more alphameric characters each into said calculator, said keyboard input means further including a first program control key;

memory means, coupled to said keyboard input means, for storing a program of one or more lines of one or more alphameric characters each entered into said calculator from said keyboard input means;

line numbering means for associating every stored line with a separate line number;

processing means, coupled to said keyboard input means and memory means, for executing each line of the program stored in said memory means; and logic means coupled to said keyboard input means and processing means, said logic means being responsive to actuation of said first program control key, in sequence with one or more of said alphameric keys designating the line number of any selected line of the program stored in said memory means, for initiating execution of the program at that selected line.

38. An electronic calculator as in claim 37 wherein:

said keyboard input means still further includes a second program control key;

said memory means stores variables forming part of the program stored in said memory means;

said logic means is further responsive to actuation of said first program control key, in sequence with said one or more alphameric keys, for setting all of the variables of the program stored in said memory means to an initial state prior to initiating execution of the program; and said logic means is further responsive to actuation of said second program control key, followed by actuation of one or more of said alphameric keys designating the line number of any selected line of the program stored in said memory means, for initiating execution of the program at that line number without altering the variables stored in said memory means.

39. An electronic calculator comprising:

keyboard input means for entering lines of one or more alphameric characters each into the calculator, said keyboard input means including a line termination key for terminating entry of each line of one or more alphameric characters into the calculator and a print control key for designating a print-all mode of calculator operation;

memory means, coupled to said keyboard input means, for storing lines of one or more alphameric characters each entered into the calculator;

processing means, coupled to said keyboard input means and memory means, for executing lines of one or more alphameric characters each stored in said memory means;

output display means, coupled to said keyboard input means, memory means and processing means, for visually displaying lines of one or more alphameric characters each;

logic means, coupled to said keyboard input means, memory means, processing means, and display means, for initiating the display of lines of one or more alphameric characters entered into the calculator, alphameric error messages generated during execution of lines of one or more alphameric characters by said processing means, and executed display commands;

printing means for printing lines of one or more alphameric characters;

said logic means also being coupled to said printing means and being responsive to actuation of said print control key for initiating the printing of lines of one or more alphameric characters entered into the calculator and terminated by said line termination key, error messages generated during execution of lines of one or more alphameric characters by said processing means, and executed display commands.

40. An electronic calculator as in claim 39 wherein said logic means is responsive to two successive actuations of said print control key, after the print-all mode of calculator operation has been designated, for canceling the previously designated print-all mode of calculator operation.

41. Electronic data processing apparatus comprising:

keyboard input means including a plurality of keys for entering operands into the electronic data processing apparatus;

first memory means, coupled to said keyboard input means, for temporarily storing operands being entered into the electronic data processing apparatus from said keyboard input means;

display means, coupled to said first memory means, for visually displaying the contents thereof;

said keyboard input means including one or more control keys for terminating entry of operands into the electronic data processing apparatus and including a recall key for recalling the operand most recently terminated by one of said control keys to said first memory means;

second memory means, coupled to said keyboard input means and first memory means, for temporarily storing an operand; and logic means, coupled to said keyboard input means, first memory means, and second memory means, for transferring the most recently terminated operand then stored in said first memory means to said second memory means in response to termination of that operand and for thereafter transferring the most recently terminated operand then stored in said second memory means to said first memory means in response to actuation of said recall key.

* * * * *

UNITED STATES PATENT AND TRADEMARK OFFICE

CERTIFICATE OF CORRECTION

PATENT NO. : 4,012,725

DATED : March 15, 1977

INVENTOR(S) : Richard M. Spangler et al

It is certified that error appears in the above—identified patent and that said Letters Patent is hereby corrected as shown below:

Column 16, line 51, "Fig. 1-B" should be --Figs. 1-3B--;

Column 26, line 41, "illustrted" should be --illustrated--;

Column 700, line 55, Claim 16, after "said" (first occurrence) insert --first--;

Column 703, line 35, Claim 25, "24" should be --23--;

Column 703, line 49, Claim 26, "24" should be --23--.

Signed and Sealed this

*Twenty-ninth* Day of *September 1981*

[SEAL]

*Attest:*

GERALD J. MOSSINGHOFF

*Attesting Officer* *Commissioner of Patents and Trademarks*